US007555757B2

(12) United States Patent

Smith et al.

(10) Patent No.: US 7,555,757 B2

(45) Date of Patent: *Jun. 30, 2009

(54) APPLICATION PROGRAM INTERFACE FOR NETWORK SOFTWARE PLATFORM

(75) Inventors: Adam W. Smith, Redmond, WA (US); Anthony J. Moore, Seattle, WA (US); Brian A. LaMacchia, Bellevue, WA (US); Anders Hejlsberg, Seattle, WA (US); Brian M. Grunkemeyer, Issaquah, WA (US); Caleb L. Doise, Bellevue, WA (US); Christopher W. Brumme, Mercer Island, WA (US); Christopher L. Anderson, Issaquah, WA (US); Corina E. Feuerstein, Redmond, WA (US); Craig T. Sinclair, Sammamish, WA (US); Daniel Takacs, Bellevue, WA (US); David S. Ebbo, Redmond, WA (US); David O. Driver, Seattle, WA (US); David S. Mortenson, Redmond, WA (US); Erik B. Christensen, Seattle, WA (US); Erik B. Olson, Sammamish, WA (US); Fabio A. Yeon, Mill Creek, WA (US); Gopala Krishna R. Kakivaya, Sammamish, WA (US); George D. Fee, Seattle, WA (US); Hany E. Ramadan, Kirkland, WA (US); Henry L. Sanders, II, Kirkland, WA (US); Jayanth V. Rajan, Bellevue, WA (US); Jeffrey M. Cooperstein, Bellevue, WA (US); Jonathan C. Hawkins, Seattle, WA (US); James H. Hogg, Bellevue, WA (US); Joe D. Long, Woodinville, WA (US); John I. McConnell, Kirkland, WA (US); Jesus Ruiz-Scougall, Redmond, WA (US); James S. Miller, Bellevue, WA (US); Julie D. Bennett, Medina, WA (US); Krzysztof J. Cwalina, Redmond, WA (US); Lance E. Olson, Sammamish, WA (US); Loren M. Kohnfelder, Bellevue, WA (US); Michael M. Magruder, Sammamish, WA (US); Manish S. Prabhu, Redmond, WA (US); Radu Rares Palanca, Redmond, WA (US); Raja Krishnaswamy, Bellevue, WA (US); Shawn P. Burke, Kirkland, WA (US); Sean E. Trowbridge, Sammamish, WA (US); Seth M. Demsey, Kirkland, WA (US); Shajan Dasan, Sammamish, WA (US); Stefan H. Pharies, Seattle, WA (US); Suzanne M. Cook, Redmond, WA (US); Tarun Anand, Pitampura (IN); Travis J. Muhlestein, Redmond, WA (US); Yann E. Christensen, Seattle, WA (US); Yung-shin Lin, Sammamish, WA (US); Ramasamy Krishnaswamy, Redmond, WA (US); Joseph Roxe, Kirkland, WA (US); Alan Boshier, Redmond, WA (US); David Bau, Gladwyne, PA (US)

(73) Assignee: Microsoft Corporation, Redmond, WA (US)

( * ) Notice: Subject to any disclaimer, the term of this patent is extended or adjusted under 35 U.S.C. 154(b) by 532 days.

This patent is subject to a terminal disclaimer.

(21) Appl. No.: 11/159,853

(22) Filed: Jun. 23, 2005

(65) Prior Publication Data

US 2005/0246716 A1 Nov. 3, 2005

Related U.S. Application Data

(63) Continuation of application No. 09/902,811, filed on Jul. 10, 2001, now Pat. No. 7,017,162.

(51) Int. Cl.

| | |
|---|---|
| *G06F 3/00* | (2006.01) |
| *G06F 9/44* | (2006.01) |
| *G06F 9/46* | (2006.01) |
| *G06F 13/00* | (2006.01) |

(52) U.S. Cl. ....................................... 719/328; 719/313

(58) Field of Classification Search ......... 719/310–320, 719/328–330

See application file for complete search history.

(56) References Cited

U.S. PATENT DOCUMENTS

| | | | |
|---|---|---|---|
| 5,218,699 | A | 6/1993 | Brandle et al. |
| 5,430,876 | A | 7/1995 | Schreiber et al. |
| 5,689,700 | A | 11/1997 | Miller et al. |
| 5,748,962 | A | 5/1998 | Brechtel et al. |
| 5,761,494 | A | 6/1998 | Smedley et al. |
| 5,822,580 | A | 10/1998 | Leung |
| 5,903,753 | A | 5/1999 | Bramnick et al. |
| 5,937,406 | A | 8/1999 | Balabine et al. |
| 5,943,424 | A | 8/1999 | Berger et al. |
| 5,956,509 | A | 9/1999 | Kevner |
| 5,987,517 | A | 11/1999 | Firth et al. |
| 6,061,743 | A | 5/2000 | Thatcher et al. |
| 6,175,878 | B1 | 1/2001 | Seaman et al. |
| 6,209,124 | B1 | 3/2001 | Vermeire et al. |
| 6,256,678 | B1 | 7/2001 | Traughber et al. |
| 6,275,871 | B1 | 8/2001 | Reinfelder et al. |
| 6,282,581 | B1 | 8/2001 | Moore et al. |
| 6,298,354 | B1 | 10/2001 | Saulpaugh et al. |
| 6,349,343 | B1 | 2/2002 | Foody et al. |
| 6,353,830 | B1 | 3/2002 | Yee et al. |
| 6,360,230 | B1 | 3/2002 | Chan et al. |
| 6,360,266 | B1 | 3/2002 | Pettus |
| 6,381,632 | B1 | 4/2002 | Lowell |
| 6,418,448 | B1 | 7/2002 | Sarkar |
| 6,430,593 | B1 | 8/2002 | Lindsley |
| 6,442,548 | B1 | 8/2002 | Balabine et al. |
| 6,446,253 | B1 | 9/2002 | Mellmer |
| 6,446,256 | B1 | 9/2002 | Hyman et al. |
| 6,473,794 | B1 | 10/2002 | Guheen et al. |
| 6,480,865 | B1 | 11/2002 | Lee et al. |
| 6,487,578 | B2 | 11/2002 | Ranganathan |
| 6,507,856 | B1 | 1/2003 | Chen et al. |
| 6,519,571 | B1 | 2/2003 | Guheen et al. |
| 6,536,037 | B1 | 3/2003 | Guheen et al. |
| 6,598,093 | B1 | 7/2003 | Schmidt et al. |
| 6,615,166 | B1 | 9/2003 | Guheen et al. |
| 6,643,652 | B2 | 11/2003 | Helgeson et al. |
| 6,721,713 | B1 | 4/2004 | Guheen et al. |
| 6,792,605 | B1 | 9/2004 | Roberts et al. |
| 6,938,079 | B1 | 8/2005 | Anderson et al. |
| 6,961,750 | B1 | 11/2005 | Burd et al. |
| 6,968,503 | B1 | 11/2005 | Chang et al. |
| 7,013,340 | B1 | 3/2006 | Burd et al. |
| 2002/0073236 | A1 | 6/2002 | Helgeson |
| 2002/0092004 | A1 | 7/2002 | Lee et al. |
| 2002/0099687 | A1 | 7/2002 | Krishnaprasad |
| 2002/0112078 | A1 | 8/2002 | Yach |
| 2002/0152244 | A1 | 10/2002 | Dean et al. |
| 2002/0169679 | A1 | 11/2002 | Neumayer |
| 2002/0184401 | A1 | 12/2002 | Kadel, Jr. et al. |
| 2003/0028685 | A1 | 2/2003 | Smith et al. |
| 2003/0051236 | A1 | 3/2003 | Pace |
| 2003/0074206 | A1 | 4/2003 | Hoffman |
| 2003/0084120 | A1 | 5/2003 | Egli |
| 2003/0120665 | A1 | 6/2003 | Fox et al. |
| 2003/0149934 | A1 | 8/2003 | Worden |
| 2003/0167277 | A1 | 9/2003 | Hejlsberg et al. |
| 2003/0167355 | A1 | 9/2003 | Smith et al. |
| 2003/0167356 | A1 | 9/2003 | Smith et al. |
| 2003/0172196 | A1 | 9/2003 | Hejlsberg et al. |
| 2003/0177282 | A1 | 9/2003 | Hejlsberg et al. |
| 2004/0083463 | A1 | 4/2004 | Hawley |
| 2004/0117759 | A1 | 6/2004 | Rippert, Jr. |
| 2004/0205694 | A1 | 10/2004 | James et al. |
| 2006/0294500 | A1 | 12/2006 | Chiang |

OTHER PUBLICATIONS

Sun Microsystems, Java 2 Platform, Standard Edition, v1.2.2, API Specification, Sun MicroSystems, 1999, pp. 1-4.* http:///www.w3.org/TR/xsti,W3C, Nov. 1999, pp. 1-90.

http://www.w3.org/TR/1998/NOTE-XML-data-0105,W3C, Jan. 1998, pp. 1-34.

http://www.w3.org/TR/1999/REC-xpath-19991115. html,WC3,Nov. 1999, pp. 1-32.

Carr, et al. "Compiling Distributed C++" IEEE 1993 pp. 496-503.

Lam et al, .NET Framework Essentials Jun. 2001 O'Reilly pp. 1-320.

Meyer [Microsoft; NET is coming [Microsoft Web Services platform] IEEE Computer vol. 34 Issue: 8 Aug. 2001 pp. 92-97.

Cheng et al.; "XML and DB2" IEEE Data Engineering 2000. Proceedings 16th International Conference on Feb. 29-Mar. 3, 2000 pp. 569-573.

Deitel & Deitel; "Java(TM) How to Program book" Prentice Hall Third edition 1999 (pp. 7-29 698-699 714-717 876-878 936-977 980-998 1002-1046).

"Java(TM) Platform" Standard Edition v1.2.2 API Specification 1993-1999 Sun Microsystems Inc. in the USA and other countries. Palo Alto CA USA pp. 1-4.

"Java(TM) 2 Platform Enterprise Edition Specification" v1.2 Sun Micrososystems Palo Alto CA USA Dec. 17, 1999 pp. 2-1 thru 2-7 & 6-1.

"The Java(TM) 2 Enterprise Developer's Guide" v1.2.1 May 2000 Sun Microsystems Palo Alto CA USA Chapter 1 pp. 1-10 & pp. 152-155.

Tim O'Reilly; "The Network Really is the Computer" The O'Reilly Network at (http://www.oreilyynet.com) Jun. 8, 2000 pp. 1-11.

Shannon; "Java 2 Platrform Enterpise Edition Specification" v1.2 Dec. 17, 1999 pp. 2-8 thru 2-11 and 6-2 thru 6-6.

Flanagan; "Java in a Nutshell" O'Reilly & Associates 1996 pp. 193-200 237-253 267-270 339-342.

Flanagan; "Java foundation classes in a Nutshell" O'Reilly 9-1000 Chapters 1-2.

Gould; "Develop n-tier applications using J2EE" Java World Dec. 2000 pp. 1-10.

Ben, A comparative Overview of C#, Genamics, Jul. 31, 2000.

Cohn, Web programming with Visual J++, Sams.net, 1997, chapters 5-6, 17-19.

Flynn, Visual J++ Java programming, New Riders Publishing, 1996, pp. 133-143.

Microsoft, Delegates in Visual J++ 6.0, Mar. 11, 1998, pp. 1-6.

Farley, "*Microsoft.Net* vs. *J2EE*: How Do They Stack Up?", retrieved on Apr. 27, 2007, at <<http://www.oreillynet.com/1pt/a/1799>>, O'Reilly Media, Inc., 2007, pp. 6.

Perry, "Sams Teach Yourself Visual Basic 6 in 21 Days", Sams, 1998, pp. 23.

Wille, "Presenting C#", Sams Publishing 2000, pp. 22.

Ensel, et al., "Managing Application Service Dependencies with XML and the Resource Description Framework", IEEE, May 2001, pp. 661-674.

Jingyu, et al., "Object-Oriented Representation for XML Data", IEEE, Apr. 2001, pp. 40-49.

Sneed, "Wrapping Legacy COBOL Programs behind an XML-Interface", IEEE, Oct. 2001, pp. 189-197.

Arulanthu, et al, The Design and Performanceof A Scalable ORB Architecture for CORBA Asynchronous Messaging. Middleware 2000, Springer-Verlag, 2000,pp. 208-228.

Hanson, "Differences between J2SE and J2EE", Sep. 8, 2003, SearchTechTarget.com.

Deitel & Deitel "Java(TM) How to program book" Prentice Hall Third edition 1999 (pp. 7-29, 214-226, 698-699, 714-717, 817-838, 876-878, 936-977, 980-998, 1002-1046).

Williams, "Teach Yoursefl Visual C ++ 6 in 24 Hours", Sams Publishing, 1998, pp. 54.

Wille, "Presenting C#", Sams Publishing, 2002, pp. 21-29, 164-167.

* cited by examiner

*Primary Examiner*—Meng-Ai An
*Assistant Examiner*—Diem K Cao
(74) *Attorney, Agent, or Firm*—Lee & Hayes, PLLC

(57) ABSTRACT

An application program interface (API) provides a set of functions, including a set of base classes and types that are used in substantially all applications accessing the API, for application developers who build Web applications on Microsoft Corporation's .NET™ platform.

9 Claims, 4 Drawing Sheets

142

APPLICATION PROGRAM INTERFACE FOR NETWORK SOFTWARE PLATFORM

RELATED APPLICATIONS

This application is a continuation of U.S. patent application Ser. No. 09/902,811, filed Jul. 10, 2001, which is hereby incorporated by reference herein.

TECHNICAL FIELD

This invention relates to network software, such as Web applications, and to computer software development of such network software. More particularly, this invention relates to an application program interface (API) that facilitates use of a network software platform by application programs and computer hardware.

BACKGROUND

Very early on, computer software came to be categorized as "operating system" software or "application" software. Broadly speaking, an application is software meant to perform a specific task for the computer user such as solving a mathematical equation or supporting word processing. The operating system is the software that manages and controls the computer hardware. The goal of the operating system is to make the computer resources available to the application programmer while at the same time, hiding the complexity necessary to actually control the hardware.

The operating system makes the resources available via functions that are collectively known as the Application Program Interface or API. The term API is also used in reference to a single one of these functions. The functions are often grouped in terms of what resource or service they provide to the application programmer. Application software requests resources by calling individual API functions. API functions also serve as the means by which messages and information provided by the operating system are relayed back to the application software.

In addition to changes in hardware, another factor driving the evolution of operating system software has been the desire to simplify and speed application software development. Application software development can be a daunting task, sometimes requiring years of developer time to create a sophisticated program with millions of lines of code. For a popular operating system such as Microsoft Windows®, application software developers write thousands of different applications each year that utilize the operating system. A coherent and usable operating system base is required to support so many diverse application developers.

Often, development of application software can be made simpler by making the operating system more complex. That is, if a function may be useful to several different application programs, it may be better to write it once for inclusion in the operating system, than requiring dozens of software developers to write it dozens of times for inclusion in dozens of different applications. In this manner, if the operating system supports a wide range of common functionality required by a number of applications, significant savings in applications software development costs and time can be achieved.

Regardless of where the line between operating system and application software is drawn, it is clear that for a useful operating system, the API between the operating system and the computer hardware and application software is as important as efficient internal operation of the operating system itself.

Over the past few years, the universal adoption of the Internet, and networking technology in general, has changed the landscape for computer software developers. Traditionally, software developers focused on single-site software applications for standalone desktop computers, or LAN-based computers that were connected to a limited number of other computers via a local area network (LAN). Such software applications were typically referred to as "shrink wrapped" products because the software was marketed and sold in a shrink-wrapped package. The applications utilized well-defined APIs to access the underlying operating system of the computer.

As the Internet evolved and gained widespread acceptance, the industry began to recognize the power of hosting applications at various sites on the World Wide Web (or simply the "Web"). In the networked world, clients from anywhere could submit requests to server-based applications hosted at diverse locations and receive responses back in fractions of a second. These Web applications, however, were typically developed using the same operating system platform that was originally developed for standalone computing machines or locally networked computers. Unfortunately, in some instances, these applications do not adequately transfer to the distributed computing regime. The underlying platform was simply not constructed with the idea of supporting limitless numbers of interconnected computers.

To accommodate the shift to the distributed computing environment being ushered in by the Internet, Microsoft Corporation is developing a network software platform known as the ".NET" platform (read as "Dot Net"). The platform allows developers to create Web services that will execute over the Internet. Such a dynamic shift requires a new ground-up design of an entirely new API.

In response to this challenge, the inventors developed a unique set of API functions for Microsoft's .NET™ platform.

SUMMARY

An application program interface (API) provides a set of functions, including a set of base classes and types that are used in substantially all applications accessing the API, for application developers who build Web applications on a network platform, such as Microsoft Corporation's .NET™ platform.

BRIEF DESCRIPTION OF THE DRAWINGS

The same numbers are used throughout the drawings to reference like features.

BRIEF DESCRIPTION OF ACCOMPANYING COMPACT DISC

Accompanying the specification in the parent case, U.S. patent application Ser. No. 09/902,811, is a compact disc that stores a compiled HTML help file identifying the API (application program interface) for Microsoft's .NET™ network platform. The file is named "cpref.chm" and was created on Jun. 8, 2001. It is 30.81 Mbytes in size. The file can be executed on a Windows®-based computing device (e.g., IBM-PC, or equivalent) that executes a Windows®-brand operating system (e.g., Windows® NT, Windows® 98, Windows® 2000, etc.). The compiled HTML help file stored on the compact disk is hereby incorporated by reference.

Additionally, the APIs contained in the compiled HTML help file are also provided in approximately 100 separate text files named "NamespaceName.txt". The text files comply with the ASCII format.

The compact disc itself is a CD-ROM, and conforms to the ISO 9660 standard.

DETAILED DESCRIPTION

This disclosure addresses an application program interface (API) for a network platform upon which developers can build Web applications and services. More particularly, an exemplary API is described for the .NET™ platform created by Microsoft Corporation. The .NET™ platform is a software platform for Web services and Web applications implemented in the distributed computing environment. It represents the next generation of Internet computing, using open communication standards to communicate among loosely coupled Web services that are collaborating to perform a particular task.

In the described implementation, the .NET™ platform utilizes XML (extensible markup language), an open standard for describing data. XML is managed by the World Wide Web Consortium (W3C). XML is used for defining data elements on a Web page and business-to-business documents. XML uses a similar tag structure as HTML; however, whereas HTML defines how elements are displayed, XML defines what those elements contain. HTML uses predefined tags, but XML allows tags to be defined by the developer of the page. Thus, virtually any data items can be identified, allowing Web pages to function like database records. Through the use of XML and other open protocols, such as Simple Object Access Protocol (SOAP), the .NET™ platform allows integration of a wide range of services that can be tailored to the needs of the user. Although the embodiments described herein are described in conjunction with XML and other open standards, such are not required for the operation of the claimed invention. Other equally viable technologies will suffice to implement the inventions described herein.

Exemplary Network Environment

Figure 1:
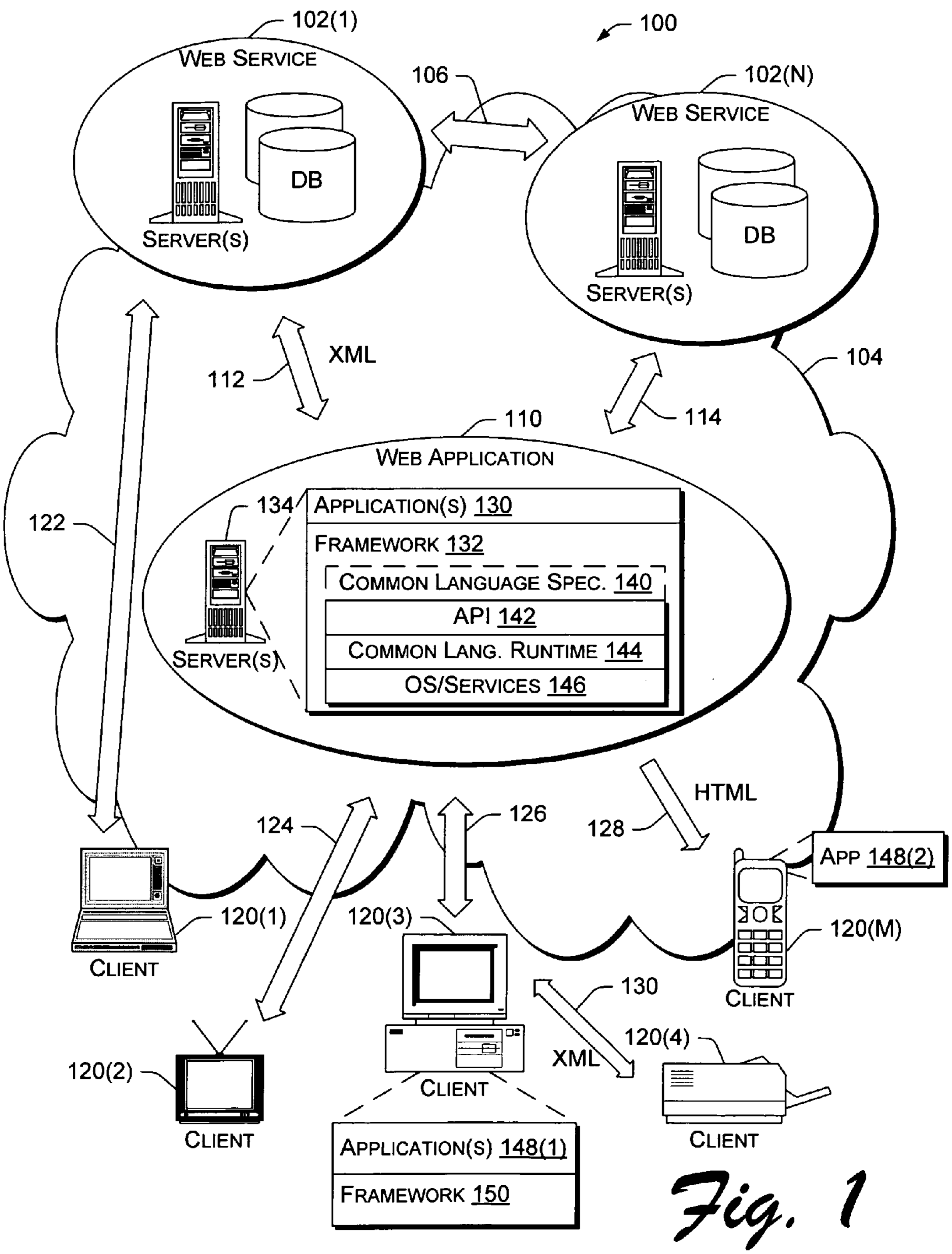
FIG. 1 illustrates a network architecture in which clients access Web services over the Internet using conventional protocols.

FIG. 1 shows a network environment 100 in which a network platform, such as the .NET™ platform, may be implemented. The network environment 100 includes representative Web services 102(1), . . . , 102(N), which provide services that can be accessed over a network 104 (e.g., Internet). The Web services, referenced generally as number 102, are programmable application components that are reusable and interact programmatically over the network 104, typically through industry standard Web protocols, such as XML, SOAP, WAP (wireless application protocol), HTTP (hypertext transport protocol), and SMTP (simple mail transfer protocol) although other means of interacting with the Web services over the network may also be used, such as Remote Procedure Call (RPC) or object broker type technology. A Web service can be self-describing and is often defined in terms of formats and ordering of messages.

Web services 102 are accessible directly by other services (as represented by communication link 106) or a software application, such as Web application 110 (as represented by communication links 112 and 114). Each Web service 102 is illustrated as including one or more servers that execute software to handle requests for particular services. Such services often maintain databases that store information to be served back to requesters. Web services may be configured to perform any one of a variety of different services. Examples of Web services include login verification, notification, database storage, stock quoting, location directories, mapping, music, electronic wallet, calendar/scheduler, telephone listings, news and information, games, ticketing, and so on. The Web services can be combined with each other and with other applications to build intelligent interactive experiences.

The network environment 100 also includes representative client devices 120(1), 120(2), 120(3), 120(4), . . . , 120(M) that utilize the Web services 102 (as represented by communication link 122) and/or the Web application 110 (as represented by communication links 124, 126, and 128). The clients may communicate with one another using standard protocols as well, as represented by an exemplary XML link 130 between clients 120(3) and 120(4).

The client devices, referenced generally as number 120, can be implemented many different ways. Examples of possible client implementations include, without limitation, portable computers, stationary computers, tablet PCs, televisions/set-top boxes, wireless communication devices, personal digital assistants, gaming consoles, printers, photocopiers, and other smart devices.

The Web application 110 is an application designed to run on the network platform and may utilize the Web services 102 when handling and servicing requests from clients 120. The Web application 110 is composed of one or more software applications 130 that run atop a programming framework 132, which are executing on one or more servers 134 or other computer systems. Note that a portion of Web application 110 may actually reside on one or more of clients 120. Alternatively, Web application 110 may coordinate with other software on clients 120 to actually accomplish its tasks.

The programming framework 132 is the structure that supports the applications and services developed by application developers. It permits multi-language development and seamless integration by supporting multiple languages. It supports open protocols, such as SOAP, and encapsulates the underlying operating system and object model services. The framework provides a robust and secure execution environment for the multiple programming languages and offers secure, integrated class libraries.

The framework 132 is a multi-tiered architecture that includes an application program interface (API) layer 142, a common language runtime (CLR) layer 144, and an operating system/services layer 146. This layered architecture allows updates and modifications to various layers without impacting other portions of the framework. A common language specification (CLS) 140 allows designers of various languages to write code that is able to access underlying library functionality. The specification 140 functions as a contract between language designers and library designers. By adhering to the CLS, libraries written in one language can be directly accessible to code modules written in other languages to achieve seamless integration between code modules written in one language and code modules written in another language.

The API layer 142 presents groups of functions that the applications 130 can call to access the resources and services provided by layer 146. By exposing the API functions for a network platform, application developers can create Web applications for distributed computing systems that make full use of the network resources and other Web services, without needing to understand the complex interworkings of how those network resources actually operate or are made available. Moreover, the Web applications can be written in any number of programming languages, and translated into an intermediate language supported by the common language runtime 144 and included as part of the common language specification 140. In this way, the API layer 142 can provide methods for a wide and diverse variety of applications.

Additionally, the framework 132 can be configured to support API calls placed by remote applications executing remotely from the servers 134 that host the framework. Representative applications 148(1) and 148(2) residing on clients 120(3) and 120(M), respectively, can use the API functions by making calls directly, or indirectly, to the API layer 142 over the network 104.

The framework may also be implemented at the clients. Client 120(3) represents the situation where a framework 150 is implemented at the client. This framework may be identical to server-based framework 132, or modified for client purposes. Alternatively, the client-based framework may be condensed in the event that the client is a limited or dedicated function device, such as a cellular phone, personal digital assistant, handheld computer, or other communication/computing device.

Developers' Programming Framework

Figure 2:
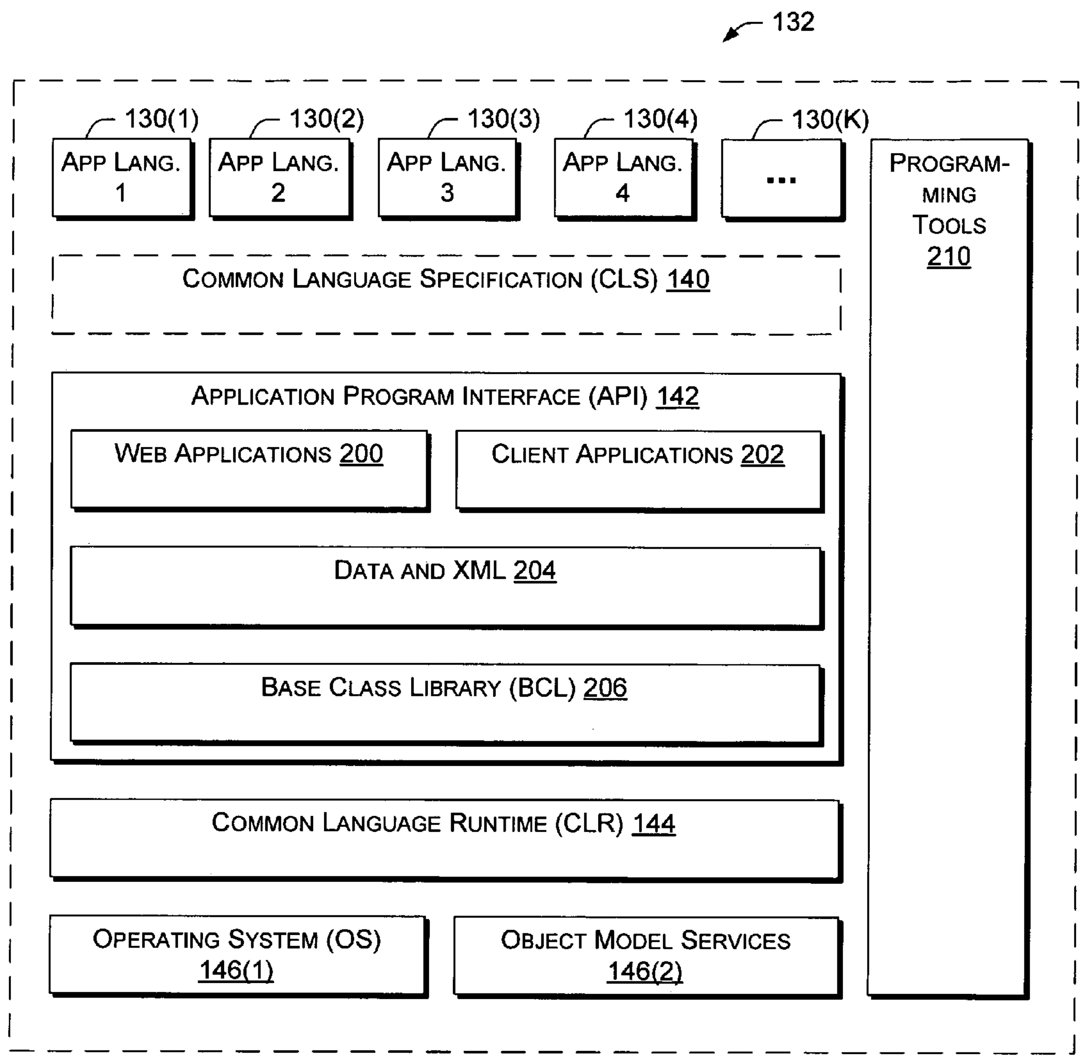
FIG. 2 is a block diagram of a software architecture for Microsoft's .NET™ platform, which includes an application program interface (API).

FIG. 2 shows the programming framework 132 in more detail. The common language specification (CLS) layer 140 supports applications written in a variety of languages 130(1), 130(2), 130(3), 130(4), . . . , 130(K). Such application languages include Visual Basic, C++, C#, COBOL, Jscript, Perl, Eiffel, Python, and so on. The common language specification 140 specifies a subset of features or rules about features that, if followed, allow the various languages to communicate. For example, some languages do not support a given type (e.g., an "int*" type) that might otherwise be supported by the common language runtime 144. In this case, the common language specification 140 does not include the type. On the other hand, types that are supported by all or most languages (e.g., the "int[ ]" type) is included in common language specification 140 so library developers are free to use it and are assured that the languages can handle it. This ability to communicate results in seamless integration between code modules written in one language and code modules written in another language. Since different languages are particularly well suited to particular tasks, the seamless integration between languages allows a developer to select a particular language for a particular code module with the ability to use that code module with modules written in different languages. The common language runtime 144 allow seamless multi-language development, with cross language inheritance, and provide a robust and secure execution environment for the multiple programming languages. For more information on the common language specification 140 and the common language runtime 144, the reader is directed to co-pending applications entitled "Method and System for Compiling Multiple Languages", filed Jun. 21, 2000 (Ser. No. 09/598,105) and "Unified Data Type System and Method" filed Jul. 10, 2000 (Ser. No. 09/613,289), which are incorporated by reference.

The framework 132 encapsulates the operating system 146(1) (e.g., Windows®-brand operating systems) and object model services 146(2) (e.g., Component Object Model (COM) or Distributed COM). The operating system 146(1) provides conventional functions, such as file management, notification, event handling, user interfaces (e.g., windowing, menus, dialogs, etc.), security, authentication, verification, processes and threads, memory management, and so on. The object model services 146(2) provide interfacing with other objects to perform various tasks. Calls made to the API layer 142 are handed to the common language runtime layer 144 for local execution by the operating system 146(1) and/or object model services 146(2).

The API 142 groups API functions into multiple namespaces. Namespaces essentially define a collection of classes, interfaces, delegates, enumerations, and structures, which are collectively called "types", that provide a specific set of related functionality. A class represents managed heap allocated data that has reference assignment semantics. A delegate is an object oriented function pointer. An enumeration is a special kind of value type that represents named constants. A structure represents static allocated data that has value assignment semantics. An interface defines a contract that other types can implement.

By using namespaces, a designer can organize a set of types into a hierarchical namespace. The designer is able to create multiple groups from the set of types, with each group containing at least one type that exposes logically related functionality. In the exemplary implementation, the API 142 is organized into four root namespaces: a first namespace 200 for Web applications, a second namespace 202 for client applications, a third namespace 204 for data and XML, and a fourth namespace 206 for base class libraries (BCLs). Each group can then be assigned a name. For instance, types in the Web applications namespace 200 are assigned the name "Web", and types in the data and XML namespace 204 can be assigned names "Data" and "XML" respectively. The named groups can be organized under a single "global root" namespace for system level APIs, such as an overall System namespace. By selecting and prefixing a top level identifier, the types in each group can be easily referenced by a hierarchical name that includes the selected top level identifier prefixed to the name of the group containing the type. For instance, types in the Web applications namespace 200 can be referenced using the hierarchical name "System.Web". In this way, the individual namespaces 200, 202, 204, and 206 become major branches off of the System namespace and can carry a designation where the individual namespaces are prefixed with a designator, such as a "System." prefix.

The Web applications namespace 200 pertains to Web based functionality, such as dynamically generated Web pages (e.g., Microsoft's Active Server Pages (ASP)). It supplies types that enable browser/server communication. The client applications namespace 202 pertains to drawing and client side UI functionality. It supplies types that enable drawing of two-dimensional (2D) and three-dimensional (3D) drawings, imaging, and printing, as well as the ability to construct window forms, menus, boxes, and so on.

The data and XML namespace 204 relates to connectivity to data sources and XML functionality. It supplies classes, interfaces, delegates, and enumerations that enable security, specify data types, and serialize objects into XML format documents or streams. The base class libraries (BCL) namespace 206 pertains to basic system and runtime functionality. It contains the fundamental types and base classes that define commonly-used value and reference data types, events and event handlers, interfaces, attributes, and processing exceptions.

In addition to the framework 132, programming tools 210 are provided to assist the developer in building Web services and/or applications. One example of the programming tools 200 is Visual Studio™, a multi-language suite of programming tools offered by Microsoft Corporation.

Root API Namespaces

Figure 3:
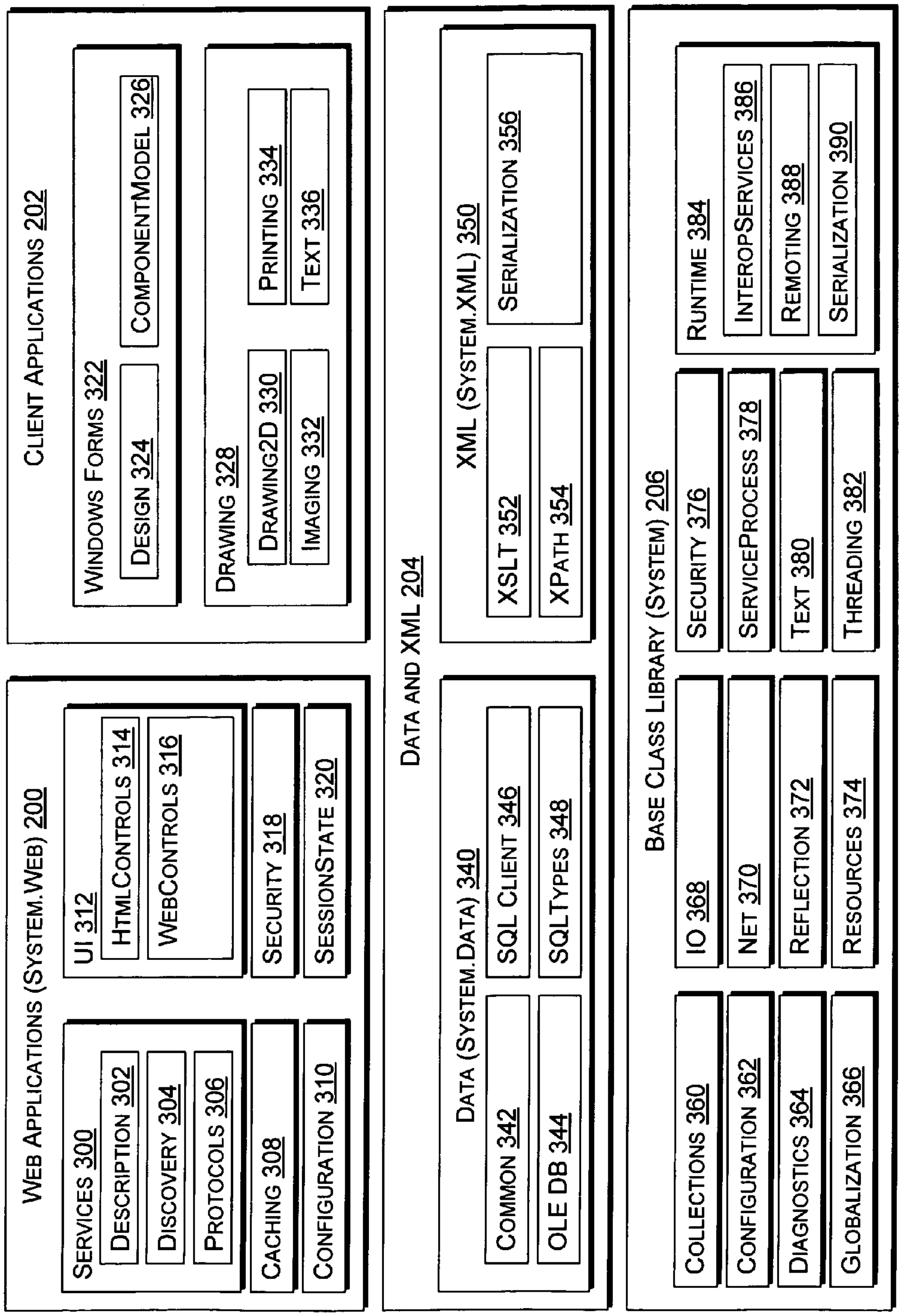
FIG. 3 is a block diagram of unique namespaces supported by the API, as well as function classes of the various API functions.

FIG. 3 shows the API 142 and its four root namespaces in more detail. In one embodiment, the namespaces are identified according to a hierarchical naming convention in which strings of names are concatenated with periods. For instance, the Web applications namespace 200 is identified by the root name "System.Web". Within the "Sytem.Web" namespace is another namespace for Web services, identified as "System.Web.Services", which further identifies another namespace for a description known as "System.Web.Services.Description". With this naming convention in mind, the following provides a general overview of selected namespaces of the API 142, although other naming conventions could be used with equal effect.

The Web applications namespace 200 ("System.Web") defines additional namespaces, including:

A services namespace 300 ("System.Web.Services") containing classes that enable a developer to build and use Web services. The services namespace 300 defines additional namespaces, including a namespace 302 ("System.Web.Services.Description") containing classes that enable a developer to publicly describe a Web service via a service description language (such as WSDL, a specification available from the W3C), a discovery namespace 304 ("System.Web.Services.Discovery") containing classes that allow Web service consumers to locate available Web Services on a Web server, and a protocols namespace 306 ("System.Web.Services.Protocols") containing classes that define the protocols used to transmit data across a network during communication between Web service clients and the Web service itself.

A caching namespace 308 ("System.Web.Caching") containing classes that enable developers to decrease Web application response time through temporarily caching frequently used resources on the server. This includes ASP.NET pages, web services, and user controls. (ASP.NET is the updated version of Microsoft's ASP technology.) Additionally, a cache dictionary is available for developers to store frequently used resources, such as hash tables and other data structures.

A configuration namespace 310 ("System.Web.Configuration") containing classes that are used to read configuration data in for an application.

A UI namespace 312 ("System.Web.UI") containing types that allow developers to create controls and pages that will appear in Web applications as user interfaces on a Web page. This namespace includes the control class, which provides all web based controls, whether those encapsulating HTML elements, higher level Web controls, or even custom User controls, with a common set of functionality. Also provided are classes which provide the web forms server controls data binding functionality, the ability to save the view state of a given control or page, as well as parsing functionality for both programmable and literal controls. Within the UI namespace 312 are two additional namespaces: an HTML controls namespace 314 ("System.Web.UI.HtmlControls") containing classes that permit developers to interact with types that encapsulates html 3.2 elements create HTML controls, and a Web controls namespace 316 ("System.Web.UI.Weblcontrols") containing classes that allow developers to create higher level Web controls.

A security namespace 318 ("System.Web.Securty") containing classes used to implement security in web server applications, such as basic authentication, challenge response authentication, and role based authentication.

A session state namespace 320 ("System.Web.SessionState") containing classes used to access session state values (i.e., data that lives across requests for the lifetime of the session) as well as session-level settings and lifetime management methods.

The client applications namespace 202 is composed of two namespaces:

A windows forms namespace 322 ("System.Windows.Forms") containing classes for creating Windows®-based client applications that take full advantage of the rich user interface features available in the Microsoft Windows® operating system, such as the ability to drag and drop screen elements. Such classes may include wrapped APIs available in the Microsoft Windows® operating system that are used in a windowing UI environment. Within this namespace are a design namespace 324 ("System.Windows.Forms.Design") that contains classes to extend design-time support for Windows forms and a component model namespace 326 ("System.Windows.Forms.ComponentModel") that contains the windows form implementation of the general component model defined in System.ComponentModel. This namespace contains designer tools, such as Visual Studio, which offer a rich experience for developers at design time.

A drawing namespace 328 ("System.Drawing") containing classes for graphics functionality. The drawing namespace 328 includes a 2D drawing namespace 330 ("System.Drawing.Drawing2D") that contains classes and enumerations to provide advanced 2-dimensional and vector graphics functionality, an imaging namespace 332 ("System.Drawing.Imaging") that contains classes for advanced imaging functionality, a printing namespace 334 ("System. Drawing.Printing") that contains classes to permit developers to customize printing, and a text namespace 336 ("System.Drawing.Text") that contains classes for advanced typography functionality.

The data and XML namespace 204 is composed of two namespaces:

A data namespace 340 ("System.Data") containing classes that enable developers to build components that efficiently manage data from multiple data sources. It implements an architecture that, in a disconnected scenario (such as the Internet), provides tools to request, update, and reconcile data in multiple tier systems. The data namespace 340 includes a common namespace 342 that contains types shared by data providers. A data provider describes a collection of types used to access a data source, such as a database, in the managed space. The data namespace 340 also includes an OLE DB namespace 344 that contains types pertaining to data used in object-oriented databases (e.g., Microsoft's SQL Server), and a SQL client namespace 346 that contains types pertaining to data used by SQL clients. The data namespace also includes a SQL types namespace 348 ("System.Data.SqlTypes") that contains classes for native data types within Microsoft's SQL Server. The classes provide a safer, faster alternative to other data types. Using the objects within this namespace helps prevent type conversion errors caused in situations where loss of precision could occur. Because other data types are converted to and from SQL types behind the scenes, explicitly creating and using objects within this namespace results in faster code as well.

An XML namespace 350 ("System.XML") containing classes that provide standards-based support for processing XML. The supported standards include XML (e.g., version 1.0), XML Namespaces (both stream level and DOM), XML Schemas, XPath expressions, XSL/T transformations, DOM Level 2 Core, and SOAP (e.g., version 1.1). The XML namespace 350 includes an XSLT namespace 352 ("System.XML.Xsl") that contains classes and enumerations to support XSLT (Extensible Stylesheet Language Transformations), an Xpath namespace 354 ("System.XML.Xpath") that contains an XPath parser and evaluation engine, and a serialization namespace 356 ("System.XML.Serialization") that contains classes used to serialize objects into XML format documents or streams.

The base class library namespace 206 ("System") includes the following namespaces:

A collections namespace 360 ("System.Collections") containing interfaces and classes that define various collections of objects, such as lists, queues, arrays, hash tables and dictionaries.

A configuration namespace 362 ("System.Configuration") containing classes and interfaces that allow developers to programmatically access configuration settings and handle errors in configuration files.

A diagnostics namespace 364 ("System.Diagnostics") containing classes that are used to debug applications and to trace code execution. The namespace allows developers to start system processes, read and write to event logs, and monitor system performance using performance counters.

A globalization namespace 366 ("System.Globalization") containing classes that define culture-related information, including the language, the country/region, the calendars in use, the format patterns for dates, currency and numbers, and the sort order for strings.

An I/O namespace 368 ("System.IO") containing the infrastructure pieces to operate with the intput/output of data streams, files, and directories. This namespace includes a model for working with streams of bytes, higher level readers and writers which consume those bytes, various constructions or implementations of the streams (e.g., FileStream and MemoryStream) and, a set of utility classes for working with files and directories.

A net namespace 370 ("System.Net") providing an extensive set of classes for building network-enabled application, referred to as the Net Class Libraries (NCL). One element to the design of the Net Class Libraries is an extensible, layered approach to exposing networking functionality. The NCL stack contains three basic layers. A base layer (System.Net.Socket) provides access to an interface to TCP/IP, the communications protocol of UNIX networks and the Internet. One example of such an interface is the "WinSock API" from Microsoft Corporation. The next layer is the Transport Protocol classes, which support such transport protocols as TCP and UDP. Developers may write their own protocol classes to provide support for protocols such as IGMP and ICMP. The third layer is the Web request, which provides an abstract factory pattern for the creation of other protocol classes. The NCL provides implementations for Hyper Text Transport Protocol (HTTP).

A reflection namespace ("System.Reflection") 372 containing types that provide a managed view of loaded types, methods, and fields, with the ability to dynamically create and invoke types.

A resources namespace 374 ("System.Resources") containing classes and interfaces that allow developers to create, store and manage various culture-specific resources used in an application.

A security namespace 376 ("System.Security") supporting the underlying structure of the security system, including interfaces, attributes, exceptions, and base classes for permissions.

A service process namespace 378 ("System.ServiceProcess") containing classes that allow developers to install and run services. Services are long-running executables that run without a user interface. They can be installed to run under a system account that enables them to be started at computer reboot. Services whose implementation is derived from processing in one class can define specific behavior for start, stop, pause, and continue commands, as well as behavior to take when the system shuts down.

A text namespace 380 ("System.Text") containing classes representing various types of encodings (e.g., ASCII, Unicode, UTF-7, and UTF-8), abstract base classes for converting blocks of characters to and from blocks of bytes, and a helper class that manipulates and formats string objects without creating intermediate instances.

A threading namespace 382 ("System.Threading") containing classes and interfaces that enable multi-threaded programming. The threading namespace includes a ThreadPool class that manages groups of threads, a Timer class that enables a delegate to be called after a specified amount of time, and a Mutex class for synchronizing mutually-exclusive threads. This namespace also provides classes for thread scheduling, wait notification, and deadlock resolution.

A runtime namespace 384 ("System.Runtime") containing multiple namespaces concerning runtime features, including an interoperation services namespace 386 ("System.Runtime.InteropServices") that contains a collection of classes useful for accessing COM objects. The types in the InteropServices namespace fall into the following areas of functionality: attributes, exceptions, managed definitions of COM types, wrappers, type converters, and the Marshal class. The runtime namespace 384 further includes a remoting namespace 388 ("System.Runtime.Remoting") that contains classes and interfaces allowing developers to create and configure distributed applications. Another namespace within the runtime namespace 384 is a serialization namespace 390 ("System.Runtime.Serialization") that contains classes used for serializing and deserializing objects. Serialization is the process of converting an object or a graph of objects into a linear sequence of bytes for either storage or transmission to another location.

Portions of the base class library namespace 206 ("System") are discussed in additional detail below.

System Namespace

The System namespace is the root namespace; it offers common functionality that is needed by a wide variety of application types. The System namespace includes common base classes, types and utility classes that will be needed in substantially all applications (that is, in nearly every application).

The System namespace provides commonly used base types. It includes Object, which is the ultimate base class for all types in the system. Object defines the base set of services that any type in the system is able to provide. Not surprisingly, Object provides default implementations for all of these services. The ValueType class is a reference type that serves as the base class for all value types. It customizes the implementations of the virtual methods on Object so that they are more appropriate for value types. Enum is a reference type that derives from ValueType and is the base class for all enums in the system. It further customizes the virtual methods from ValueType to make them specific to deal with exactly one integral field of instance data. Enum also offers utility methods for formatting and parsing of enum values. The ultimate base class for all exceptions in the system, the Exception class, is also in the System namespace. All custom attributes derive from the Attribute base class that contains utility methods for reading custom attribute off of reflection elements.

In addition, the base data types are also found in the system namespace. These are types that are so commonly used that languages typically use key words as aliases for them. These classes represent those types and provide formatting and parsing, comparing and coercion support.

NET Framework Built-In Value Types

| Category | Class name | Description | Visual Basic data type | C# data type | Managed Extensions for C++ data type |
|---|---|---|---|---|---|
| Integer | Byte | An 8-bit unsigned integer. | Byte | byte | char |
| | Sbyte | An 8-bit signed integer. Not CLS compliant. | Sbyte No built-in type. | sbyte | signed char |
| | Int16 | A 16-bit signed integer. | Short | short | short |
| | Int32 | A 32-bit signed integer. | Integer | int | int -or- long |
| | Int64 | A 64-bit signed integer. | Long | long | ___int64 |
| | UInt16 | A 16-bit unsigned integer. Not CLS compliant. | UInt16 No built-in type. | ushort | unsigned short |
| | UInt32 | A 32-bit unsigned integer. Not CLS compliant. | UInt32 No built-in type. | uint | unsigned int -or- unsigned long |
| | UInt64 | A 64-bit unsigned integer. Not CLS compliant. | UInt64 No built-in type. | ulong | unsigned ___int64 |
| Floating point | Single | A single-precision (32-bit) floating-point number. | Single | float | float |
| | Double | A double-precision (64-bit) floating-point number. | Double | double | double |
| Logical | Boolean | A Boolean value (true or false). | Boolean | bool | bool |
| Other | Char | A Unicode (16-bit) character. | Char | char | ___wchar_t |
| | Decimal | A 96-bit decimal value. | Decimal | decimal | Decimal |
| | Single | A signed integer, that is, a 32 bit value on a 32-bit platform and a 64 bit value on a 64-bit platform. | IntPtr No built-in type. | IntPtr No built-in type. | IntPtr No built-in type. |
| | Double | A native-sized unsigned integer. Not CLS compliant. | UIntPtr No built-in type. | UIntPtr No built-in type. | UIntPtr No built-in type. |

Other classes provide services including supervision of managed and unmanaged applications, mathematics, remote and local program invocation, data type conversion, and application environment management.

The following is a more detailed description of the System namespace, identifying various classes, interfaces, enumerations, and so forth contained in the System namespace.

System

This namespace contains fundamental classes and base classes that define commonly-used value and reference data types, events and event handlers, interfaces, attributes, and processing exceptions.

Description

This namespace contains fundamental classes and base classes that define commonly-used value and reference data types, events and event handlers, interfaces, attributes, and processing exceptions.

_AppDomain interface (System)

Description

Properties:

BaseDirectory

[C#] string BaseDirectory {get;}
[C++] String* get_BaseDirectory( );
[VB] ReadOnly Property BaseDirectory As String
[JScript] abstract function get BaseDirectory( ): String;

Description

DynamicDirectory

[C#] string DynamicDirectory {get;}
[C++] String* get_DynamicDirectory( );
[VB] ReadOnly Property DynamnicDirectory As String
[JScript] abstract function get DynamnicDirectory( ): String;

Description

Evidence

[C#] Evidence Evidence {get;}
[C++] Evidence* get_Evidence( );
[VB] ReadOnly Property Evidence As Evidence
[JScript] abstract function get Evidence( ): Evidence;

Description

FriendlyName

[C#] string FriendlyName {get;}
[C++] String* get_FriendlyName( );
[VB] ReadOnly Property FriendlyName As String
[JScript] abstract function get FriendlyName( ): String;

Description

RelativeSearchPath

[C#] string RelativeSearchPath {get;}
[C++] String* get_RelativeSearchPath( );
[VB] ReadOnly Property RelativeSearchPath As String
[JScript] abstract function get RelativeSearchPath( ): String;

Description

ShadowCopyFiles

[C#] bool ShadowCopyFiles {get;}
[C++] bool get_ShadowCopyFiles( );
[VB] ReadOnly Property ShadowCopyFiles As Boolean
[JScript] abstract function get ShadowCopyFiles( ): Boolean;

Description

[C#] event AssemblyLoadEventHandler AssemblyLoad;
[C++] _event AssemblyLoadEventHandler* AssemblyLoad;
[VB] Event AssemblyLoad As AssemblyLoadEventHandler Description

[C#] event ResolveEventHandler AssemblyResolve;
[C++]-event ResolveEventHandler* AssemblyResolve;
[VB] Event AssemblyResolve As ResolveEventHandler Description

[C#] event EventHandler DomainUnload;
[C++] _event EventHandler* DomainUnload;
[VB] Event DomainUnload As EventHandler Description

[C#] event EventHandler ProcessExit;
[C++] _event EventHandler* ProcessExit;
[VB] Event ProcessExit As EventHandler Description

[C#] event ResolveEventHandler ResourceResolve;
[C++] _event ResolveEventHandler* ResourceResolve;
[VB] Event ResourceResolve As ResolveEventHandler Description

[C#] event ResolveEventHandler TypeResolve;
[C++] _event ResolveEventHandler* TypeResolve;
[VB] Event TypeResolve As ResolveEventHandler Description

[C#] event UnhandledExceptionEventHandler UnhandledException;
[C++] _event UnhandledExceptionEventHandler* UnhandledException;
[VB] Event UnhandledException As UnhandledExceptionEventHandler Description Methods:

AppendPrivatePath

[C#] void AppendPrivatePath(string path);
[C++] void AppendPrivatePath(String* path);
[VB] Sub AppendPrivatePath(ByVal path As String)
[JScript] function AppendPrivatePath(path: String);

Description

ClearPrivatePath

[C#] void ClearPrivatePath( );
[C++] void ClearPrivatePath( );
[VB] Sub ClearPrivatePath( )
[JScript] function ClearPrivatePath( );

Description

ClearShadowCopyPath

[C#] void ClearShadowCopyPath( );
[C++] void ClearShadowCopyPath( );
[VB] Sub ClearShadowCopyPath( )
[JScript] function ClearShadowCopyPath( );

Description

CreateInstance

[C#] ObjectHandle CreateInstance(string assemblyName, string typeName);
[C++] ObjectHandle* CreateInstance(String* assemblyName, String* typeName);
[VB] Function CreateInstance(ByVal assemblyName As String, ByVal typeName As String) As ObjectHandle
[JScript] function CreateInstance(assemblyName: String, typeName: String): ObjectHandle;

Description

CreateInstance

[C#] ObjectHandle CreateInstance(string assemblyName, string typeName, object[ ] activationAttributes);

[C++] ObjectHandle* CreateInstance(String* assemblyName, String* typeName, Object* activation Attributes _gc[ ]);

[VB] Function CreateInstance(ByVal assemblyName As String, ByVal typeName As String, ByVal activationAttributes( ) As Object) As ObjectHandle

[JScript] function CreateInstance(assemblyName: String, typeName: String, activationAttributes: Object[ ]): ObjectHandle;

Description

CreateInstance

[C#] ObjectHandle CreateInstance(string assemblyName, string typeName, bool ignoreCase, BindingFlags binding Attr, Binder binder, object[ ] args, CultureInfo culture, object[ ] activationAttributes, Evidence securityAttributes);

[C++] ObjectHandle* CreateInstance(String* assemblyName, String* typeName, bool ignoreCase, BindingFlags bindingAttr, Binder* binder, Object* args _gc[ ], CultureInfo* culture, Object* activationAttributes _gc[ ], Evidence* securityAttributes);

[VB] Function CreateInstance(ByVal assemblyName As String, ByVal typeName As String, ByVal ignoreCase As Boolean, ByVal bindingAttr As BindingFlags, ByVal binder As Binder, ByVal args( ) As Object, ByVal culture As CultureInfo, ByVal activationAttributes( ) As Object, ByVal securityAttributes As Evidence) As ObjectHandle

[JScript] function CreateInstance(assemblyName: String, typeName: String, ignoreCase: Boolean, bindingAttr: BindingFlags, binder: Binder, args: Object[ ], culture: CultureInfo, activationAttributes: Object[ ], securityAttributes: Evidence): ObjectHandle;

Description

CreateInstanceFrom

[C#] ObjectHandle CreateInstanceFrom(string assemblyFile, string typeName);

[C++] ObjectHandle* CreateInstanceFrom(String* assemblyFile, String* typeName);

[VB] Function CreateInstanceFrom(ByVal assemblyFile As String, ByVal typeName As String) As ObjectHandle

[JScript] function CreateInstanceFrom(assemblyFile: String, typeName: String): ObjectHandle;

Description

CreateInstanceFrom

[C#] ObjectHandle CreateInstanceFrom(string assemblyFile, string typeName, object[ ] activationAttributes);

[C++] ObjectHandle* CreateInstanceFrom(String* assemblyFile, String* typeName, Object* activationAttributes _gc[ ]);

[VB] Function CreateInstanceFrom(ByVal assemblyFile As String, ByVal typeName As String, ByVal activationAttributes( ) As Object) As ObjectHandle

[JScript] function CreateInstanceFrom(assemblyFile: String, typeName: String, activationAttributes: Object[ ]): ObjectHandle;

Description

CreateInstanceFrom

[C#] ObjectHandle CreateInstanceFrom(string assemblyFile, string typeName, bool ignoreCase, BindingFlags bindingAttr, Binder binder, object[ ] args, CultureInfo culture, object[ ] activationAttributes, Evidence securityAttributes);

[C++] ObjectHandle* CreateInstanceFrom(String* assemblyFile, String* typeName, bool ignoreCase, BindingFlags bindingAttr, Binder* binder, Object* args _gc[ ], CultureInfo* culture, Object* activationAttributes _gc[ ], Evidence* securityAttributes);

[VB] Function CreateInstanceFrom(ByVal assemblyFile As String, ByVal typeName As String, ByVal ignoreCase As Boolean, ByVal bindingAttr As BindingFlags, ByVal binder As Binder, ByVal args( ) As Object, ByVal culture As CultureInfo, ByVal activationAttributes( ) As Object, ByVal securityAttributes As Evidence) As ObjectHandle

[JScript] function CreateInstanceFrom(assemblyFile: String, typeName: String, ignoreCase: Boolean, bindingAttr: BindingFlags, binder: Binder, args: Object[ ], culture: CultureInfo, activationAttributes: Object[ ], securityAttributes Evidence): ObjectHandle;

Description

DefineDynamicAssembly

[C#] AssemblyBuilder DefineDynamicAssembly(AssemblyName name, AssemblyBuilderAccess access);

[C++] AssemblyBuilder* DefineDynamicAssembly(AssemblyName* name, AssemblyBuilderAccess access);

[VB] Function DefineDynamicAssembly(ByVal name As AssemblyName, ByVal access As AssemblyBuilderAccess) As AssemblyBuilder

[JScript] function DefineDynamicAssembly(name: AssemblyName, access: AssemblyBuilderAccess): AssemblyBuilder;

Description

DefineDynamicAssembly

[C#] AssemblyBuilder DefineDynamicAssembly(AssemblyName name, AssemblyBuilderAccess access, Evidence evidence);

[C++] AssemblyBuilder* DefineDynamicAssembly(AssemblyName* name, AssemblyBuilderAccess access, Evidence* evidence);

[VB] Function DefineDynamicAssembly(ByVal name As AssemblyName, ByVal access As AssemblyBuilderAccess, ByVal evidence As Evidence) As AssemblyBuilder

[JScript] function DefineDynamicAssembly(name: AssemblyName, access: AssemblyBuilderAccess, evidence: Evidence): AssemblyBuilder;

Description

DefineDynamicAssembly

[C#] AssemblyBuilder DefineDynamicAssembly(AssemblyName name, AssemblyBuilderAccess access, string dir);

[C++] AssemblyBuilder* DefineDynamicAssembly(AssemblyName* name, AssemblyBuilderAccess access, String* dir);

[VB] Function DefineDynamicAssembly(ByVal name As AssemblyName, ByVal access As AssemblyBuilderAccess, ByVal dir As String) As AssemblyBuilder

[JScript] function DefineDynamicAssembly(name: AssemblyName, access: AssemblyBuilderAccess, dir: String): AssemblyBuilder;

Description

DefineDynamicAssembly

[C#] AssemblyBuilder DefineDynamicAssembly(AssemblyName name, AssemblyBuilderAccess access, string dir, Evidence evidence);

[C++] AssemblyBuilder* DefineDynamicAssembly(AssemblyName* name, AssemblyBuilderAccess access, String* dir, Evidence* evidence);

[VB] Function DefineDynamicAssembly(ByVal name As AssemblyName, ByVal access As AssemblyBuilderAccess, ByVal dir As String, ByVal evidence As Evidence) As AssemblyBuilder

[JScript] function DefineDynamicAssembly(name: AssemblyName, access: AssemblyBuilderAccess, dir: String, evidence: Evidence): AssemblyBuilder;

Description

DefineDynamicAssembly

[C#] AssemblyBuilder DefineDynamicAssembly(AssemblyName name, AssemblyBuilderAccess access, PermissionSet requiredPermissions, PermissionSet optionalPermissions, PermissionSet refusedPermissions);

[C++] AssemblyBuilder* DefineDynamicAssembly(AssemblyName* name, AssemblyBuilderAccess access, PermissionSet* requiredPermissions, PermissionSet* optionalPermissions, PermissionSet* refusedPermissions);

[VB] Function DefineDynamicAssembly(ByVal name As AssemblyName, ByVal access As AssemblyBuilderAccess, ByVal requiredPermissions As PermissionSet, ByVal optionalPermissions As PermissionSet, ByVal refusedPermissions As PermissionSet) As AssemblyBuilder

[JScript] function DefineDynamicAssembly(name: AssemblyName, access: AssemblyBuilderAccess, requiredPermissions: PermissionSet, optionalPermissions: PermissionSet, refusedPermissions: PermissionSet) AssemblyBuilder;

Description

DefineDynamicAssembly

[C#] AssemblyBuilder DefineDynamicAssembly(AssemblyName name, AssemblyBuilderAccess access, Evidence evidence, PermissionSet requiredPermissions, PermissionSet optionalPermissions, PermissionSet refusedPermissions);

[C++] AssemblyBuilder* DefineDynamicAssembly(AssemblyName* name, AssemblyBuilderAccess access, Evidence* evidence, PermissionSet* requiredPermissions, PermissionSet* optionalPermissions, PermissionSet* refusedPermissions);

[VB] Function DefineDynamicAssembly(ByVal name As AssemblyName, ByVal access As AssemblyBuilderAccess, ByVal evidence As Evidence, ByVal requiredPermissions As PermissionSet, ByVal optionalPermissions As PermissionSet, ByVal refusedPermissions As PermissionSet) As AssemblyBuilder

[JScript] function DefineDynamicAssembly(name: AssemblyName, access: AssemblyBuilderAccess, evidence: Evidence, requiredPermissions: PermissionSet, optionalPermissions: PermissionSet, refusedPermissions: PermissionSet): AssemblyBuilder;

Description

DefineDynamicAssembly

[C#] AssemblyBuilder DefineDynamicAssembly(AssemblyName name, AssemblyBuilderAccess access, string dir, PermissionSet requiredPermissions, PermissionSet optionalPermissions, PermissionSet refusedPermissions);

[C++] AssemblyBuilder* DefineDynamicAssembly(AssemblyName* name, AssemblyBuilderAccess access, String* dir, PermissionSet* requiredPermissions, PermissionSet* optionalPermissions, PermissionSet* refusedPermissions);

[VB] Function DefineDynamicAssembly(ByVal name As AssemblyName, ByVal access As AssemblyBuilderAccess, ByVal dir As String, ByVal requiredPermissions As PermissionSet, ByVal optionalPermissions As PermissionSet, ByVal refusedPermissions As PermissionSet) As AssemblyBuilder

[JScript] function DefineDynamicAssembly(name: AssemblyName, access: AssemblyBuilderAccess, dir: String, requiredPermissions: PermissionSet, optionalPermissions: PermissionSet, refusedPermissions: PermissionSet): AssemblyBuilder;

Description

DefineDynamicAssembly

[C#] AssemblyBuilder DefineDynamicAssembly(AssemblyName name, AssemblyBuilderAccess access, string dir, Evidence evidence, PermissionSet requiredPermissions, PermissionSet optionalPermissions, PermissionSet refusedPermissions);

[C++] AssemblyBuilder* DefineDynamicAssembly(AssemblyName* name, AssemblyBuilderAccess access, String* dir, Evidence* evidence, PermissionSet* requiredPermissions, PermissionSet* optionalPermissions, PermissionSet* refusedPermissions);

[VB] Function DefineDynamicAssembly(ByVal name As AssemblyName, ByVal access As AssemblyBuilderAccess, ByVal dir As String, ByVal evidence As Evidence, ByVal requiredPermissions As PermissionSet, ByVal optionalPermissions As PermissionSet, ByVal refusedPermissions As PermissionSet) As AssemblyBuilder

[JScript] function DefineDynamicAssembly(name: AssemblyName, access: AssemblyBuilderAccess, dir: String, evidence: Evidence, requiredPermissions: PermissionSet, optionalPermissions: PermissionSet, refusedPermissions: PermissionSet): AssemblyBuilder;

Description

DefineDynamicAssembly

[C#] AssemblyBuilder DefineDynamicAssembly(AssemblyName name, AssemblyBuilderAccess access, string dir, Evidence evidence, PermissionSet requiredPermissions, PermissionSet optionalPermissions, PermissionSet refusedPermissions, bool is Synchronized);

[C++] AssemblyBuilder* DefineDynamicAssembly(AssemblyName* name, AssemblyBuilderAccess access, String* dir, Evidence* evidence, PermissionSet* requiredPermissions, PermissionSet* optionalPermissions, PermissionSet* refusedPermissions, bool is Synchronized);

[VB] Function DefineDynamicAssembly(ByVal name As AssemblyName, ByVal access As AssemblyBuilderAccess, ByVal dir As String, ByVal evidence As Evidence, ByVal requiredPermissions As PermissionSet, ByVal optionalPermissions As PermissionSet, ByVal refusedPermissions As PermissionSet, ByVal is Synchronized As Boolean) As AssemblyBuilder

[JScript] function DefineDynamicAssembly(name: AssemblyName, access: AssemblyBuilderAccess, dir: String, evidence: Evidence, requiredPermissions: PermissionSet, optionalPermissions: PermissionSet, refusedPermissions: PermissionSet, is Synchronized: Boolean): AssemblyBuilder;

Description

DoCallBack

[C#] void DoCallBack(CrossAppDomainDelegate theDelegate);

[C++] void DoCallBack(CrossAppDomainDelegate* theDelegate);

[VB] Sub DoCallBack(ByVal theDelegate As CrossAppDomainDelegate)

[JScript] function DoCallBack(theDelegate: CrossAppDomainDelegate);

Description
Equals
[C#] bool Equals(object other);
[C++] bool Equals(Object* other);
[VB] Function Equals(ByVal other As Object) As Boolean
[JScript] function Equals(other: Object): Boolean;

Description
ExecuteAssembly
[C#] int ExecuteAssembly(string assemblyFile);
[C++] int ExecuteAssembly(String* assemblyFile);
[VB] Function ExecuteAssembly(ByVal assemblyFile As String) As Integer
[JScript] function ExecuteAssembly(assemblyFile: String): int;

Description
ExecuteAssembly
[C#] int ExecuteAssembly(string assemblyFile, Evidence assemblySecurity);
[C++] int ExecuteAssembly(String* assemblyFile, Evidence* assemblySecurity);
[VB] Function ExecuteAssembly(ByVal assemblyFile As String, ByVal assemblySecurity As Evidence) As Integer
[JScript] function ExecuteAssembly(assemblyFile: String, assemblySecurity: Evidence): int;

Description
ExecuteAssembly
[C#] int ExecuteAssembly(string assemblyFile, Evidence assemblySecurity, string[ ] args);
[C++] int ExecuteAssembly(String* assemblyFile, Evidence* assemblySecurity, String* args _gc[ ]);
[VB] Function ExecuteAssembly(ByVal assemblyFile As String, ByVal assemblySecurity As Evidence, ByVal args( ) As String) As Integer
[JScript] function ExecuteAssembly(assemblyFile: String, assemblySecurity: Evidence, args: String[ ]): int;

Description
GetAssemblies
[C#] Assembly[ ] GetAssemblies( );
[C++] Assembly* GetAssemblies( )[ ]
[VB] Function GetAssemblies( ) As Assembly( )
[JScript] function GetAssemblies( ): Assembly[ ];

Description
GetData
[C#] object GetData(string name);
[C++] Object* GetData(String* name);
[VB] Function GetData(ByVal name As String) As Object
[JScript] function GetData(name: String): Object;

Description
GetHashCode
[C#] int GetHashCode( );
[C++] int GetHashCode( );
[VB] Function GetHashCode( ) As Integer
[JScript] function GetHashCode( ): int;

Description
GetLifetimeService
[C#] object GetLifetimeService( );
[C++] Object* GetLifetimeService( );
[VB] Function GetLifetimeService( ) As Object
[JScript] function GetLifetimeService( ): Object;

Description
GetType
[C#] Type GetType( );
[C++] Type* GetType( );
[VB] Function GetType( ) As Type
[JScript] function GetType( ): Type;

Description
InitializeLifetimeService
[C#] object InitializeLifetimeService( );
[C++] Object* InitializeLifetimeService( );
[VB] Function InitializeLifetimeService( ) As Object
[JScript] function InitializeLifetimeService( ): Object;

Description
Load
[C#] Assembly Load(AssemblyName assemblyRef);
[C++] Assembly* Load(AssemblyName* assemblyRef);
[VB] Function Load(ByVal assemblyRef As AssemblyName) As Assembly
[JScript] function Load(assemblyRef: AssemblyName): Assembly;

Description
Load
[C#] Assembly Load(byte[ ] rawAssembly);
[C++] Assembly* Load(unsigned char rawAssembly _gc[ ]);
[VB] Function Load(ByVal rawAssembly( ) As Byte) As Assembly
[JScript] function Load(rawAssembly: Byte[ ]): Assembly;

Description
Load
[C#] Assembly Load(string assemblyString);
[C++] Assembly* Load(String* assemblyString);
[VB] Function Load(ByVal assemblyString As String) As Assembly
[JScript] function Load(assemblyString: String): Assembly;

Description
Load
[C#] Assembly Load(AssemblyName assemblyRef, Evidence assemblySecurity);
[C++] Assembly* Load(AssemblyName* assemblyRef, Evidence* assemblySecurity);
[VB] Function Load(ByVal assemblyRef As AssemblyName, ByVal assemblySecurity As Evidence) As Assembly
[JScript] function Load(assemblyRef: AssemblyName, assemblySecurity: Evidence): Assembly;

Description
Load
[C#] Assembly Load(byte[ ] rawAssembly, byte[ ] rawSymbolStore);
[C++] Assembly* Load(unsigned char rawAssembly _gc[ ], unsigned char rawSymbolStore _gc[ ]);
[VB] Function Load(ByVal rawAssembly( ) As Byte, ByVal rawSymbolStore( ) As Byte) As Assembly
[JScript] function Load(rawAssembly: Byte[ ], rawSymbolStore: Byte[ ]): Assembly;

Description
Load
[C#] Assembly Load(string assemblyString, Evidence assemblySecurity);
[C++] Assembly* Load(String* assemblyString, Evidence* assemblySecurity);
[VB] Function Load(ByVal assemblyString As String, ByVal assemblySecurity As Evidence) As Assembly
[JScript] function Load(assemblyString: String, assemblySecurity: Evidence): Assembly;

Description
Load
[C#] Assembly Load(AssemblyName assemblyRef, Evidence assemblySecurity, string callerLocation);
[C++] Assembly* Load(AssemblyName* assemblyRef, Evidence* assemblySecurity, String* callerLocation);
[VB] Function Load(ByVal assemblyRef As AssemblyName, ByVal assemblySecurity As Evidence, ByVal callerLocation As String) As Assembly
[JScript] function Load(assemblyRef: AssemblyName, assemblySecurity: Evidence, callerLocation: String): Assembly;

Description
Load
[C#] Assembly Load(byte[ ] rawAssembly, byte[ ] rawSymbolStore, Evidence securityEvidence);
[C++] Assembly* Load(unsigned char rawAssembly _gc[ ], unsigned char rawSymbolStore _gc[ ], Evidence* securityEvidence);
[VB] Function Load(ByVal rawAssembly( ) As Byte, ByVal rawSymbolStore( ) As Byte, ByVal securityEvidence As Evidence) As Assembly
[JScript] function Load(rawAssembly: Byte[ ], rawSymbolStore: Byte[ ], securityEvidence: Evidence): Assembly;

Description
Load
[C#] Assembly Load(string assemblyString, Evidence assemblySecurity, string callerLocation);
[C++] Assembly* Load(String* assemblyString, Evidence* assemblySecurity, String* callerLocation);
[VB] Function Load(ByVal assemblyString As String, ByVal assemblySecurity As Evidence, ByVal callerLocation As String) As Assembly
[JScript] function Load(assemblyString: String, assemblySecurity: Evidence, callerLocation: String): Assembly;

Description
SetAppDomainPolicy
[C#] void SetAppDomainPolicy(PolicyLevel domainPolicy);
[C++] void SetAppDomainPolicy(PolicyLevel* domainPolicy);
[VB] Sub SetAppDomainPolicy(ByVal domainPolicy As PolicyLevel)
[JScript] function SetAppDomainPolicy(domainPolicy: PolicyLevel);

Description
SetCachePath
[C#] void SetCachePath(string s);
[C++] void SetCachePath(String* s);
[VB] Sub SetCachePath(ByVal a As String)
[JScript] function SetCachePath(s: String);

Description
SetData
[C#] void SetData(string name, object data);
[C++] void SetData(String* name, Object* data);
[VB] Sub SetData(ByVal name As String, ByVal data As Object)
[JScript] function SetData(name: String, data: Object);

Description
SetPrincipalPolicy
[C#] void SetPrincipalPolicy(PrincipalPolicy policy);
[C++] void SetPrincipalPolicy(PrincipalPolicy policy);
[VB] Sub SetPrincipalPolicy(ByVal policy As PrincipalPolicy)
[JScript] function SetPrincipalPolicy(policy: PrincipalPolicy);

Description
SetShadowCopyPath
[C#] void SetShadowCopyPath(string s);
[C++] void SetShadowCopyPath(String* s);
[VB] Sub SetShadowCopyPath(ByVal s As String)
[JScript] function SetShadowCopyPath(s: String);

Description
SetThreadPrincipal
[C#] void SetThreadPrincipal(IPrincipal principal);
[C++] void SetThreadPrincipal(IPrincipal* principal);
[VB] Sub SetThreadPrincipal(ByVal principal As IPrincipal)
[JScript] function SetThreadPrincipal(principal: IPrincipal);

Description
ToString
[C#] string ToString( );
[C++] String* ToString( );
[VB] Function ToString( ) As String
[JScript] function ToString( ): String;

Description
Activator class (System)
ToString

Description
Contains methods to create types of objects locally or remotely, or obtain references to existing remote objects.

The System.Activator.CreateInstance(System.Type,System.Reflection.BindingFlags, System.Reflection.Binder,System.Object[ ],System.Globalization.CultureInfo) method creates an instance of a type defined in an assembly by invoking the constructor that best matches the specified arguments. If no arguments are specified, the constructor that takes no parameters, that is, the default constructor, is invoked.

CreateComInstanceFrom
[C#] public static ObjectHandle CreateComInstanceFrom (string assemblyName, string typeName);
[C++] public: static ObjectHandle* CreateComInstanceFrom(String* assemblyName, String* typeName);
[VB] Public Shared Function CreateComInstanceFrom(ByVal assemblyName As String, ByVal typeName As String) As ObjectHandle
[JScript] public static function CreateComInstanceFrom(assemblyName: String, typeName: String): ObjectHandle;

Description
Creates an instance of the COM object whose name is specified, using the named assembly file and the constructor that best matches the specified parameters.

Return Value: A handle, which must be unwrapped to access the newly created instance.

This method allows types to be created remotely without having to load the type locally. The name of a file that contains an assembly where the type named typeName is sought. The name of the desired type.

CreateInstance
[C#] public static object CreateInstance(Type type);
[C++] public: static Object* CreateInstance(Type* type);
[VB] Public Shared Function CreateInstance(ByVal type As Type) As Object
[JScript] public static function CreateInstance(type: Type): Object;

Description

Creates an instance of the specified type using the constructor that best matches the specified parameter.

Return Value: A reference to the newly created object.

The constructor to be invoked must be accessible. The type of object to create.

CreateInstance

[C#] public static ObjectHandle CreateInstance(string assemblyName, string typeName);

[C++] public: static ObjectHandle* CreateInstance(String* assemblyName, String* typeName);

[VB] Public Shared Function CreateInstance(ByVal assemblyName As String, ByVal typeName As String) As ObjectHandle

[JScript] public static function CreateInstance(assemblyName: String, typeName: String): ObjectHandle;

Description

Creates an instance of the type whose name is specified, using the named assembly and the constructor that best matches the specified parameters.

Return Value: A handle, which must be unwrapped to access the newly created instance.

This method allows types to be created remotely without having to load the type locally. The name of the assembly where the type named typeName is sought. If assemblyName is null, the executing assembly is searched. The name of the desired type.

CreateInstance

[C#] public static object CreateInstance(Type type, object[ ] args);

[C++] public: static Object* CreateInstance(Type* type, Object* args _gc[ ]);

[VB] Public Shared Function CreateInstance(ByVal type As Type, ByVal args( ) As Object) As Object

[JScript] public static function CreateInstance(type: Type, args: Object[ ]): Object;

Description

Creates an instance of the specified type using the constructor that best matches the specified parameters.

Return Value: A reference to the newly created object.

The constructor to be invoked must be accessible and provide the most specific match with the specified argument list. The type of object to create. An array of arguments that match in number, order, and type the parameters of the constructor to invoke. If args is an empty array or null, the constructor that takes no parameters (the default constructor) is invoked.

CreateInstance

[C#] public static ObjectHandle CreateInstance(string assemblyName, string typeName, object[ ] activationAttributes);

[C++] public: static ObjectHandle* CreateInstance(String* assemblyName, String* typeName, Object* activationAttributes _gc[ ]);

[VB] Public Shared Function CreateInstance(ByVal assemblyName As String, ByVal typeName As String, ByVal activationAttributes( ) As Object) As ObjectHandle

[JScript] public static function CreateInstance(assemblyName: String, typeName: String, activationAttributes: Object[ ]): ObjectHandle;

Description

Creates an instance of the type whose name is specified, using the named assembly and the constructor that best matches the specified parameters.

Return Value: A handle, which must be unwrapped to access the newly created instance.

This method allows types to be created remotely without having to load the type locally. The name of the assembly where the type named typeName is sought. If assemblyName is null, the executing assembly is searched. The name of the desired type. An array of one or more attributes that can participate in activation.

CreateInstance

[C#] public static object CreateInstance(Type type, object[ ] args, object[ ] activationAttributes);

[C++] public: static Object* CreateInstance(Type* type, Object* args _gc[ ], Object* activationAttributes _gc[ ]);

[VB] Public Shared Function CreateInstance(ByVal type As Type, ByVal args( ) As Object, ByVal activation Attributes( ) As Object) As Object

[JScript] public static function CreateInstance(type: Type, args: Object[ ], activationAttributes: Object[ ]): Object;

Description

Creates an instance of the specified type using the constructor that best matches the specified parameters.

Return Value: A reference to the newly created object.

The constructor to be invoked must be accessible and provide the most specific match with the specified argument list. The type of object to create. An array of arguments that match in number, order, and type the parameters of the constructor to invoke. If args is an empty array or null, the constructor that takes no parameters (the default constructor) is invoked. An array of one or more attributes that can participate in activation.

CreateInstance

[C#] public static object CreateInstance(Type type, BindingFlags bindingAttr, Binder binder, object[ ] args, CultureInfo culture);

[C++] public: static Object* CreateInstance(Type* type, BindingFlags bindingAttr, Binder* binder, Object* args _gc[ ], CultureInfo* culture);

[VB] Public Shared Function CreateInstance(ByVal type As Type, ByVal bindingAttr As BindingFlags, ByVal binder As Binder, ByVal args( ) As Object, ByVal culture As CultureInfo) As Object

[JScript] public static function CreateInstance(type: Type, bindingAttr: BindingFlags, binder: Binder, args: Object[ ], culture: CultureInfo): Object; Creates an instance of the specified type using the constructor that best matches the specified parameters.

Description

Creates an instance of the specified type using the constructor that best matches the specified parameters.

Return Value: A reference to the newly created object.

The constructor to be invoked must be accessible and provide the most specific match with the specified argument list under the constraints of the specified binder and binding attributes. The type of object to create. A combination of zero or more bit flags that affect the search for the type constructor. If bindingAttr is zero, a case-sensitive search for public properties is conducted. An object that uses bindingAttr and args to seek and identify the type constructor. If binder is null, the default binder is used. An array of arguments that match in number, order, and type the parameters of the constructor to invoke. If args is an empty array or null, the constructor that takes no parameters (the default constructor) is invoked. Culture-specific information that governs the coercion of args to the formal types declared for the type constructor. If culture is null, the System.Globalization.CultureInfo for the current thread is used.

CreateInstance

[C#] public static object CreateInstance(Type type, BindingFlags bindingAttr, Binder binder, object[ ] args, CultureInfo culture, object[ ] activationAttributes);

[C++] public: static Object* CreateInstance(Type* type, BindingFlags bindingAttr, Binder* binder, Object* args _gc[ ], CultureInfo* culture, Object* activationAttributes _gc[ ]);

[VB] Public Shared Function CreateInstance(ByVal type As Type, ByVal bindingAttr As BindingFlags, ByVal binder As Binder, ByVal args( ) As Object, ByVal culture As CultureInfo, ByVal activationAttributes( ) As Object) As Object

[JScript] public static function CreateInstance(type: Type, bindingAttr: BindingFlags, binder: Binder, args: Object[ ], culture: CultureInfo, activationAttributes: Object[ ]): Object;

Description

Creates an instance of the specified type using the constructor that best matches the specified parameters.

Return Value: A reference to the newly created object.

The constructor to be invoked must be accessible and provide the most specific match with the specified argument list under the constraints of the specified binder and binding attributes. The type of object to create. A combination of zero or more bit flags that affect the search for the type constructor. If bindingAttr is zero, a case-sensitive search for public properties is conducted. An object that uses bindingAttr and args to seek and identify the type constructor. If binder is null, the default binder is used. An array of arguments that match in number, order, and type the parameters of the constructor to invoke. If args is an empty array or null, the constructor that takes no parameters (the default constructor) is invoked. Culture-specific information that governs the coercion of args to the formal types declared for the type constructor. If culture is null, the System.Globalization.CultureInfo for the current thread is used. An array of one or more attributes that can participate in activation.

CreateInstance

[C#] public static ObjectHandle CreateInstance(string assemblyName, string typeName, bool ignoreCase, BindingFlags bindingAttr, Binder binder, object[ ] args, CultureInfo culture, object[ ] activationAttributes, Evidence securityInfo);

[C++] public: static ObjectHandle* CreateInstance(String* assemblyName, String* typeName, bool ignoreCase, BindingFlags bindingAttr, Binder* binder, Object* args _gc[ ], CultureInfo* culture, Object* activationAttributes _gc[ ], Evidence* securityInfo);

[VB] Public Shared Function CreateInstance(ByVal assemblyName As String, ByVal typeName As String, ByVal ignoreCase As Boolean, ByVal bindingAttr As BindingFlags, ByVal binder As Binder, ByVal args( ) As Object, ByVal culture As CultureInfo, ByVal activation Attributes( ) As Object, ByVal securityInfo As Evidence) As ObjectHandle

[JScript] public static function CreateInstance(assemblyName: String, typeName: String, ignoreCase: Boolean, bindingAttr: BindingFlags, binder: Binder, args: Object[ ], culture: CultureInfo, activationAttributes: Object[ ], securityInfo Evidence): ObjectHandle;

Description

Creates an instance of the type whose name is specified, using the named assembly and the constructor that best matches the specified parameters.

Return Value: A handle, which must be unwrapped to access the newly created instance.

This method allows types to be created remotely without having to load the type locally. The name of the assembly where the type named typeName is sought. If assemblyName is null, the executing assembly is searched. The name of the desired type. A Boolean that specifies whether the search for typeName is case-sensitive. If ignoreCase is true, the search is not case-sensitive. A combination of zero or more bit flags that affect the search for the typeName constructor. If bindingAttr is zero, a case-sensitive search for public properties is conducted. An object that uses bindingAttr and args to seek and identify the typeName constructor. If binder is null, the default binder is used. An array of arguments that match in number, order, and type the parameters of the constructor to invoke. If args is an empty array or null, the constructor that takes no parameters (the default constructor) is invoked. Culture-specific information that governs the coercion of args to the formal types declared for the typeName constructor. If culture is null, the System.Globalization.CultureInfo for the current thread is used. An array of one or more attributes that can participate in activation. Information used to make security policy decisions and grant code permissions.

CreateInstanceFrom

[C#] public static ObjectHandle CreateInstanceFrom(string assemblyFile, string typeName);

[C++] public: static ObjectHandle* CreateInstanceFrom (String* assemblyFile, String* typeName);

[VB] Public Shared Function CreateInstanceFrom(ByVal assemblyFile As String, ByVal typeName As String) As ObjectHandle

[JScript] public static function CreateInstanceFrom(assemblyFile: String, typeName: String): ObjectHandle; Creates an instance of the type whose name is specified, using the named assembly file and the constructor that best matches the specified parameters.

Description

Creates an instance of the type whose name is specified, using the named assembly file and the constructor that best matches the specified parameters.

Return Value: A handle, which must be unwrapped to access the newly created instance.

This method allows types to be created remotely without having to load the type locally. The name of a file that contains an assembly where the type named typeName is sought. The name of the desired type.

CreateInstanceFrom

[C#] public static ObjectHandle CreateInstanceFrom(string assemblyFile, string typeName, object[ ] activationAttributes);

[C++] public: static ObjectHandle* CreateInstanceFrom (String* assemblyFile, String* typeName, Object* activationAttributes _gc[ ]);

[VB] Public Shared Function CreateInstanceFrom(ByVal assemblyFile As String, ByVal typeName As String, ByVal activationAttributes( ) As Object) As ObjectHandle

[JScript] public static function CreateInstanceFrom(assemblyFile: String, typeName: String, activationAttributes: Object[ ]): ObjectHandle;

Description

Creates an instance of the type whose name is specified, using the named assembly file and the constructor that best matches the specified parameters.

Return Value: A handle, which must be unwrapped to access the newly created instance.

This method allows types to be created remotely without having to load the type locally. The name of a file that contains an assembly where the type named typeName is sought. The name of the desired type. An array of one or more attributes that can participate in activation.

CreateInstanceFrom

[C#] public static ObjectHandle CreateInstanceFrom(string assemblyFile, string typeName, bool ignoreCase, BindingFlags bindingAttr, Binder binder, object[ ] args, CultureInfo culture, object[ ] activationAttributes, Evidence securityInfo);

[C++] public: static ObjectHandle* CreateInstanceFrom (String* assemblyFile, String* typeName, bool ignoreCase, BindingFlags bindingAttr, Binder* binder, Object* args _gc[ ], CultureInfo* culture, Object* activationAttributes _gc[ ], Evidence* securityInfo);

[VB] Public Shared Function CreateInstanceFrom(ByVal assemblyFile As String, ByVal typeName As String, ByVal ignoreCase As Boolean, ByVal bindingAttr As BindingFlags, ByVal binder As Binder, ByVal args( ) As Object, ByVal culture As CultureInfo, ByVal activation Attributes( ) As Object, ByVal securityInfo As Evidence) As ObjectHandle

[JScript] public static function CreateInstanceFrom(assemblyFile: String, typeName: String, ignoreCase: Boolean, bindingAttr: BindingFlags, binder: Binder, args: Object[ ], culture: CultureInfo, activationAttributes: Object[ ], securityInfo: Evidence): ObjectHandle;

Description

Creates an instance of the type whose name is specified, using the named assembly file and the constructor that best matches the specified parameters.

Return Value: A handle, which must be unwrapped to access the newly created instance.

This method allows types to be created remotely without having to load the type locally. The name of a file that contains an assembly where the type named typeName is sought. The name of the desired type. A Boolean that specifies whether the search for typeName is case-sensitive. If ignoreCase is true, the search is not case-sensitive. A combination of zero or more bit flags that affect the search for the typeName constructor. If bindingAttr is zero, a case-sensitive search for public properties is conducted. An object that uses bindingAttr and args to seek and identify the typeName constructor. If binder is null, the default binder is used. An array of arguments that match in number, order, and type the parameters of the constructor to invoke. If args is an empty array or null, the constructor that takes no parameters (the default constructor) is invoked. Culture-specific information that governs the coercion of args to the formal types declared for the typeName constructor. If culture is null, the System.Globalization.CultureInfo for the current thread is used. An array of one or more attributes that can participate in activation. Information used to make security policy decisions and grant code permissions.

GetObject

[C#] public static object GetObject(Type type, string url);

[C++] public: static Object* GetObject(Type* type, String* url);

[VB] Public Shared Function GetObject(ByVal type As Type, ByVal url As String) As Object

[JScript] public static function GetObject(type: Type, url: String): Object; Creates a proxy for a currently running remote object, server-activated well-known object, or web service.

Description

Creates a proxy for the well-known object indicated by the specified type and URL.

Return Value: A proxy that points to an endpoint served by the requested well-known object. Call the proxy to send messages to the remote object. No messages are sent over the network until a method is called on the proxy. The type of the well-known object to which you want to connect. The URL of the well-known object.

GetObject

[C#] public static object GetObject(Type type, string url, object state);

[C++] public: static Object* GetObject(Type* type, String* url, Object* state);

[VB] Public Shared Function GetObject(ByVal type As Type, ByVal url As String, ByVal state As Object) As Object

[JScript] public static function GetObject(type: Type, url: String, state: Object) Object;

Description

Creates a proxy for the well-known object indicated by the specified type, URL, and channel data.

Return Value: A proxy that points to an endpoint served by the requested well-known object.

Call the proxy to send messages to the remote object. No messages are sent over the network until a method is called on the proxy. The type of the well-known object to which you want to connect. The URL of the well-known object. Channel-specific data or null.

AppDomain class (System)

ToString

Description

Represents an application domain, which is an isolated environment where applications execute. This class cannot be inherited.

Application domains isolate executing applications from one another. One or more applications can run in a single application domain.

BaseDirectory

ToString

[C#] public string BaseDirectory {get;}

[C++] public: _property String* get_BaseDirectory( );

[VB] Public ReadOnly Property BaseDirectory As String

[JScript] public function get BaseDirectory( ): String;

Description

Gets the base directory that the assembly resolver used to probe for assemblies.

This property corresponds to the assembly resolver's APPBASE.

CurrentDomain

ToString

[C#] public static AppDomain CurrentDomain {get;}

[C++] public: _property static AppDomain* get_CurrentDomain( );

[VB] Public Shared ReadOnly Property CurrentDomain As AppDomain

[JScript] public static function get CurrentDomain( ): AppDomain;

Description

Gets the current application domain for the current System.Threading.Thread.

DynamicDirectory

ToString

[C#] public string DynamicDirectory {get;}

[C++] public: _property String* get_DynamicDirectory( );

[VB] Public ReadOnly Property DynamicDirectory As String

[JScript] public function get DynamicDirectory( ): String;

Description

Gets the directory that the assembly resolver used to probe for dynamically-created assemblies.

Only available once an attempt has been made to load an assembly into this domain.

Evidence

ToString

[C#] public Evidence Evidence {get;}

[C++] public: _property Evidence* get_Evidence( );

[VB] Public ReadOnly Property Evidence As Evidence

[JScript] public function get Evidence( ): Evidence;

Description

Gets the System.Security.Policy.Evidence associated with this application domain that is used as input to security policy.

FriendlyName

ToString

[C#] public string FriendlyName {get;}

[C++] public: _property String* get_FriendlyName( );

[VB] Public ReadOnly Property FriendlyName As String

[JScript] public function get FriendlyName( ): String;

Description

Gets the friendly name of this application domain.

The friendly name of the default application domain is the name of the assembly file loaded in the application domain. The friendly name is formed by stripping the directory specification from the assembly's codebase. For example, if an assembly with the file name "c:MyAppDirectoryMyAssembly.exe" is loaded in the default application domain, the friendly name of that application domain is "MyAssembly. exe".

RelativeSearchPath

ToString

[C#] public string RelativeSearchPath {get;}

[C++] public: _property String* get_RelativeSearchPath( );

[VB] Public ReadOnly Property RelativeSearchPath As String

[JScript] public function get RelativeSearchPath( ): String;

Description

Gets the path relative to the base directory where the assembly resolver should probe for private assemblies.

Private assemblies are deployed in the same directory structure as the application.

SetupInformation

ToString

[C#] public AppDomainSetup SetupInformation {get;}

[C++] public: _property AppDomainSetup* get_SetupInformation( );

[VB] Public ReadOnly Property SetupInformation As AppDomainSetup

[JScript] public function get SetupInformation( ): AppDomainSetup;

Description

Gets the application domain configuration information for this instance.

ShadowCopyFiles

ToString

[C#] public bool ShadowCopyFiles {get;}

[C++] public: _property bool get_ShadowCopyFiles( );

[VB] Public ReadOnly Property ShadowCopyFiles As Boolean

[JScript] public function get ShadowCopyFiles( ): Boolean;

Description

Gets an indication whether all assemblies that are loaded in the application domain are shadow copied.

This method sets the System.AppDomainSetup.ShadowCopyFiles property of the internal System.AppDomainSetup object associated with this instance.

ToString

[C#] public event AssemblyLoadEventHandler AssemblyLoad;

[C++] public: _sealed _event AssemblyLoadEventHandler* AssemblyLoad;

[VB] NotOverridable Public Event AssemblyLoad As AssemblyLoadEventHandler

Description

Occurs when an assembly is loaded.

The System.AssemblyLoadEventHandler for this event can attempt to locate the assembly and load it.

ToString

[C#] public event ResolveEventandler AssemblyResolve;

[C++] public: _sealed _event ResolveEventandler* AssemblyResolve;

[VB] NotOverridable Public Event AssemblyResolve As ResolveEventHandler

Description

Occurs when the resolution of an assembly fails.

The System.ResolveEventHandler for this event can attempt to locate the assembly and load it.

ToString

[C#] public event EventHandler DomainUnload;

[C++] public: _sealed _event EventHandler* DomainUnload;

[VB] NotOverridable Public Event DomainUnload As EventHandler

Description

Occurs when an System.AppDomain is about to be unloaded.

The System.EventHandler for this event can attempt to locate the assembly and load it.

ToString

[C#] public event EventHandler ProcessExit;

[C++] public: _sealed _event EventHandler* ProcessExit;

[VB] NotOverridable Public Event ProcessExit As EventHandler

Description

Occurs when a process is about to exit.

The System.EventHandler for this event can perform termination activities, such as closing files, releasing storage and so on, before the process ends.

ToString

[C#] public event ResolveEventHandler ResourceResolve;

[C++] public: _sealed _event ResolveEventHandler* ResourceResolve;

[VB] NotOverridable Public Event ResourceResolve As ResolveEventHandler

Description

Occurs when the resolution of a resource fails.

The System.ResolveEventHandler for this event can attempt to locate the resource and load it.

ToString

[C#] public event ResolveEventHandler TypeResolve;

[C++] public: _sealed _event ResolveEventHandler* Type Resolve;

[VB] NotOverridable Public Event TypeResolve As ResolveEventHandler

Description

Occurs when the resolution of a type fails.

The System.ResolveEventHandler for this event can attempt to locate the type and load it.

ToString

[C#] public event UnhandledExceptionEventHandler UnhandledException;

[C++] public: _sealed _event UnhandledExceptionEventHandler* UnhandledException;

[VB] NotOverridable Public Event UnhandledException As UnhandledExceptionEventHandler Description Occurs when an exception is not caught by an event handler.

For more information about handling events, see.

AppendPrivatePath

[C#] public void AppendPrivatePath(string path);

[C++] public: _sealed void AppendPrivatePath(String* path);

[VB] NotOverridable Public Sub AppendPrivatePath(ByVal path As String)

[JScript] public function AppendPrivatePath(path: String);

Description

Appends the specified name of the directory to the private path.

The private path, or relative search path, is the path relative to the base directory where the assembly resolver probes for private assemblies. The name of the directory to be appended to the private path.

ClearPrivatePath

[C#] public void ClearPrivatePath( );

[C++] public: _sealed void ClearPrivatePath( );

[VB] NotOverridable Public Sub ClearPrivatePath( )

[JScript] public function ClearPrivatePath( );

Description

Resets the System.AppDomainSetup.PrivateBinPath for this instance to null.

ClearShadowCopyPath

[C#] public void ClearShadowCopyPath( );

[C++] public: _sealed void ClearShadowCopyPath( );

[VB] NotOverridable Public Sub ClearShadowCopyPath( )

[JScript] public function ClearShadowCopyPath( );

Description

Resets the System.AppDomainSetup.ShadowCopyDirectories property for this instance to null CreateComInstanceFrom

[C#] public ObjectHandle CreateComInstanceFrom(string assemblyName, string typeName);

[C++] public: ObjectHandle* CreateComInstanceFrom (String* assemblyName, String* typeName);

[VB] Public Function CreateComInstanceFrom(ByVal assemblyName As String, ByVal typeName As String) As ObjectHandle

[JScript] public function CreateComInstanceFrom(assemblyName: String, typeName: String): ObjectHandle;

Description

Creates an instance of a COM object. Parameters specify the name of the assembly that can create the object and the name of the type of the object.

Return Value: An object that is a wrapper for the new instance.

Use this method to create types remotely without having to load the type locally. The return value must to be unwrapped in order to access the real object. The name of the assembly in which this object type resides. The type name of the desired object.

CreateDomain

[C#] public static AppDomain CreateDomain(string friendlyName);

[C++] public: static AppDomain* CreateDomain(String* friendlyName);

[VB] Public Shared Function CreateDomain(ByVal friendlyName As String) As AppDomain

[JScript] public static function CreateDomain(friendlyName: String): AppDomain;

Description

Creates a new application domain with the specified name.

Return Value: The newly created application domain.

friendlyName can be displayed in user interfaces to identify the domain. The friendly name of the domain.

CreateDomain

[C#] public static AppDomain CreateDomain(string friendlyName, Evidence securityInfo);

[C++] public: static AppDomain* CreateDomain(String* friendlyName, Evidence* securityInfo);

[VB] Public Shared Function CreateDomain(ByVal friendlyName As String, ByVal securityInfo As Evidence) As AppDomain

[JScript] public static function CreateDomain(friendlyName: String, securityInfo: Evidence): AppDomain; Creates a new application domain.

Description

Creates a new application domain with the given name using the supplied evidence.

Return Value: The newly created application domain. The friendly name of the domain. This friendly name can be displayed in user interfaces to identify the domain. See the description of System.AppDomain.FriendlyName. Evidence mapped through security policy to establish a top-of-stack permission set.

CreateDomain

[C#] public static AppDomain CreateDomain(string friendlyName, Evidence securityInfo, AppDomainSetup info);

[C++] public: static AppDomain* CreateDomain(String* friendlyName, Evidence* securityInfo, AppDomainSetup* info);

[VB] Public Shared Function CreateDomain(ByVal friendlyName As String, ByVal securityInfo As Evidence, ByVal info As AppDomainSetup) As AppDomain

[JScript] public static function CreateDomain(friendlyName: String, securityInfo: Evidence, info: AppDomainSetup): AppDomain;

Description

Creates a new application domain using the specified name, evidence, application domain setup information.

Return Value: The newly created application domain. The friendly name of the domain. This friendly name can be displayed in user interfaces to identify the domain. See the description of System.AppDomain.FriendlyName. Evidence mapped through security policy to establish a top-of-stack permission set. An object that contains application domain initialization information.

CreateDomain

[C#] public static AppDomain CreateDomain(string friendlyName, Evidence securityInfo, string appBasePath, string appRelativeSearchPath, bool shadowCopyFiles);

[C++] public: static AppDomain* CreateDomain(String* friendlyName, Evidence* securityInfo, String* appBasePath, String* appRelativeSearchPath, bool shadowCopyFiles);

[VB] Public Shared Function CreateDomain(ByVal friendlyName As String, ByVal securityInfo As Evidence, ByVal appBasePath As String, ByVal appRelativeSearchPath As String, ByVal shadowCopyFiles As Boolean) As AppDomain

[JScript] public static function CreateDomain(friendlyName: String, securityInfo: Evidence, appBasePath: String, appRelativeSearchPath: String, shadowCopyFiles: Boolean): AppDomain;

Description

Creates a new application domain with the given name using, evidence, application base path, relative search path, and a parameter that specifies whether a shadow copy of an assembly is to be loaded in to the application domain.

Return Value: The newly created application domain. The friendly name of the domain. This friendly name can be displayed in user interfaces to identify the domain. See the description of System.AppDomain.FriendlyName. Evidence mapped through security policy to establish a top-of-stack permission set. The base directory that the assembly resolver uses to probe for assemblies. See the Description of System.AppDomain.BaseDirectory. The path relative to the base directory where the assembly resolver should probe for private assemblies. See the Description of System.AppDomain.RelativeSearchPath. If true, a shadow copy of an assembly is loaded into this application domain.

CreateInstance

[C#] public ObjectHandle CreateInstance(string assemblyName, string typeName);

[C++] public: _sealed ObjectHandle* CreateInstance (String* assemblyName, String* typeName);

[VB] NotOverridable Public Function CreateInstance(ByVal assemblyName As String, ByVal typeName As String) As ObjectHandle

[JScript] public function CreateInstance(assemblyName: String, typeName: String): ObjectHandle; Creates a new instance of a specified type defined in the specified assembly file.

Description

Creates a new instance of the specified type defined in the specified assembly.

Return Value: An object that is a wrapper for the new instance, or null if typeName is not found. The return value needs to be unwrapped to access the real object.

This is a convenience method that calls the default constructor for typeName. The display name of the assembly. See the description of System.Reflection.AssemblyName for the format of the display name. The full name of the type.

CreateInstance

[C#] public ObjectHandle CreateInstance(string assemblyName, string typeName, object[ ] activationAttributes);

[C++] public: _sealed ObjectHandle* CreateInstance (String* assemblyName, String* typeName, Object* activationAttributes _gc[ ]);

[VB] NotOverridable Public Function CreateInstance(ByVal assemblyName As String, ByVal typeName As String, ByVal activationAttributes( ) As Object) As ObjectHandle

[JScript] public function CreateInstance(assemblyName: String, typeName: String, activationAttributes: Object[ ]): ObjectHandle;

Description

Creates an instance using the name of the type and the assembly where it exists.

Return Value: A handle to the requested object.

This method allows types to be created remotely without having to load the type locally. This will return an System.Runtime.Remoting.ObjectHandle that needs to be unwrapped in order to access the real object. The name of the assembly in which this object type resides. The type name of the desired object. One or more attributes that can participate in activation.

CreateInstance

[C#] public ObjectHandle CreateInstance(string assemblyName, string typeName, bool ignoreCase, BindingFlags bindingAttr, Binder binder, object[ ] args, CultureInfo culture, object[ ] activationAttributes, Evidence securityAttributes);

[C++] public: _sealed ObjectHandle* CreateInstance (String* assemblyName, String* typeName, bool ignoreCase, BindingFlags bindingAttr, Binder* binder, Object* args _gc[ ], CultureInfo* culture, Object* activationAttributes _gc[ ], Evidence* securityAttributes);

[VB] NotOverridable Public Function CreateInstance(ByVal assemblyName As String, ByVal typeName As String, ByVal ignoreCase As Boolean, ByVal bindingAttr As BindingFlags, ByVal binder As Binder, ByVal args( ) As Object, ByVal culture As CultureInfo, ByVal activationAttributes( ) As Object, ByVal securityAttributes As Evidence) As ObjectHandle

[JScript] public function CreateInstance(assemblyName: String, typeName: String, ignoreCase: Boolean, binding Attr: BindingFlags, binder: Binder, args: Object[ ], culture: CultureInfo, activationAttributes: Object[ ], securityAttributes: Evidence): ObjectHandle;

Description

Creates an instance using the name of the type and the assembly where it exists.

Return Value: A handle to the requested object.

This method allows types to be created remotely without having to load the type locally. This will return an System.Runtime.Remoting.ObjectHandle that needs to be unwrapped in order to access the real object. The name of the assembly in which this object type resides. The type name of the desired object. A Boolean value specifying whether to perform a case-sensitive search or not. This bitmask affects the way in which the search is conducted. The value is a combination of zero or more bit flags from System.Reflection.BindingFlags, such as NonPublic and OABinding. An object that enables the binding, coercion of argument types, invocation of members and retrieval of System.Reflection.MemberInfo objects using reflection. If binder is null, the default binder is used. The arguments to be passed to the constructor. This array of arguments must match in number, order, and type the parameters of the constructor to be invoked. If the default constructor is desired, args must be an empty array or null. An instance of System.Globalization.CultureInfo used to govern the coercion of types. If this is null, the CultureInfo for the current thread is used. (Note that this is necessary to, for example, convert a String that represents 1000 to a Double value, since 1000 is represented differently by different cultures.) One or more attributes that can participate in activation.

CreateInstanceAndUnwrap

[C#] public object CreateInstanceAndUnwrap(string assemblyName, string typeName);

[C++] public: Object* CreateInstanceAndUnwrap(String* assemblyName, String* typeName);

[VB] Public Function CreateInstanceAndUnwrap(ByVal assemblyName As String, ByVal typeName As String) As Object

[JScript] public function CreateInstanceAndUnwrap(assemblyName: String, typeName: String): Object; Creates a new instance of a specified type.

Description

Creates a new instance of the specified type. Parameters specify the assembly where the type is defined, and the name of the type.

Return Value: An instance of typeName, or null if typeName is not found.

This a convenience method that combines System.AppDomain.CreateInstance(System.String,System.String) and System.Runtime.Remoting.ObjectHandle.Unwrap. This method calls the default constructor for typeName. The name of the assembly. The fully qualified name of the type.

CreateInstanceAndUnwrap

[C#] public object CreateInstanceAndUnwrap(string assemblyName, string typeName, object[ ] activationAttributes);

[C++] public: Object* CreateInstanceAndUnwrap(String* assemblyName, String* typeName, Object* activationAttributes _gc[ ]);

[VB] Public Function CreateInstanceAndUnwrap(ByVal assemblyName As String, ByVal typeName As String, ByVal activationAttributes( ) As Object) As Object

[JScript] public function CreateInstanceAndUnwrap(assemblyName: String, typeName: String, activationAttributes: Object[ ]): Object;

Description

Creates a new instance of the specified type. Parameters specify the assembly where the type is defined, the name of the type, and an array of activation attributes.

Return Value: An instance of typeName, or null if typeName is not found.

This a convenience method that combines System.AppDomain.CreateInstance(System.String,System.String) and System.Runtime.Remoting.ObjectHandle.Unwrap. This method calls the default constructor for typeName. The name of the assembly. The fully qualified name of the type. An array containing one or more attributes that can participate in activation.

CreateInstanceAndUnwrap

[C#] public object CreateInstanceAndUnwrap(string assemblyName, string typeName, bool ignoreCase, BindingFlags bindingAttr, Binder binder, object[ ] args, CultureInfo culture, object[ ] activationAttributes, Evidence securityAttributes);

[C++] public: Object* CreateInstanceAndUnwrap(String* assemblyName, String* typeName, bool ignoreCase, BindingFlags bindingAttr, Binder* binder, Object* args _gc[ ], CultureInfo* culture, Object* activationAttributes _gc[ ], Evidence* securityAttributes);

[VB] Public Function CreateInstanceAndUnwrap(ByVal assemblyName As String, ByVal typeName As String, ByVal ignoreCase As Boolean, ByVal bindingAttr As BindingFlags, ByVal binder As Binder, ByVal args( ) As Object, ByVal culture As CultureInfo, ByVal activationAttributes( ) As Object, ByVal securityAttributes As Evidence) As Object

[JScript] public function CreateInstanceAndUnwrap(assemblyName: String, typeName: String, ignoreCase: Boolean, bindingAttr: BindingFlags, binder: Binder, args: Object[ ], culture: CultureInfo, activationAttributes: Object[ ], securityAttributes: Evidence): Object;

Description

Creates a new instance of the specified type. Parameters specify the name of the type and how it is found and created.

Return Value: An System.Object, which is an instance of typeName, or null if typeName is not found.

This a convenience method that combines System.AppDomain.CreateInstance(System.String,System.String) and System.Runtime.Remoting.ObjectHandle.Unwrap. The name of the assembly. The fully qualified name of the type. A Boolean value specifying whether to perform a case-sensitive search or not. This bitmask affects the way in which the search is conducted. The value is a combination of zero or more bit flags from System.Reflection.BindingFlags, such as NonPublicand OABinding. An object that enables the binding, coercion of argument types, invocation of members and retrieval of System.Reflection.MemberInfo objects using reflection. If binder is null, the default binder is used. The arguments to be passed to the constructor. This array of arguments must match in number, order, and type the parameters of the constructor to be invoked. If the default constructor is desired, args must be an empty array or null. A culture-specific object used to govern the coercion of types. If culture is null, the CultureInfo for the current thread is used. (Note that this is necessary to, for example, convert a String that represents 1000 to a Double value, since 1000 is represented differently by different cultures.) An System.Object array containing one or more attributes that can participate in activation. An System.Security.Policy.Evidence object used to verify that typeName is allowed to be created.

CreateInstanceFrom

[C#] public ObjectHandle CreateInstanceFrom(string assemblyFile, string typeName);

[C++] public: _sealed ObjectHandle* CreateInstanceFrom (String* assemblyFile, String* typeName);

[VB] NotOverridable Public Function CreateInstanceFrom (ByVal assemblyFile As String, ByVal typeName As String) As ObjectHandle

[JScript] public function CreateInstanceFrom(assemblyFile: String, typeName: String): ObjectHandle; Creates a new instance of a specified type defined in the specified assembly file.

Description

Creates a new instance of the specified type defined in the specified assembly file.

Return Value: An object that is a wrapper for the new instance, or null if typeName is not found. The return value needs to be unwrapped to access the real object.

This is a convenience method that calls the default constructor for typeName. The assembly file name. The full name of the type.

CreateInstanceFrom

[C#] public ObjectHandle CreateInstanceFrom(string assemblyFile, string typeName, object[ ] activationAttributes);

[C++] public: _sealed ObjectHandle* CreateInstanceFrom (String* assemblyFile, String* typeName, Object* activationAttributes _gc[ ]);

[VB] NotOverridable Public Function CreateInstanceFrom (ByVal assemblyFile As String, ByVal typeName As String, ByVal activationAttributes( ) As Object) As ObjectHandle

[JScript] public function CreateInstanceFrom(assemblyFile: String, typeName: String, activationAttributes: Object[ ]): ObjectHandle;

Description

Creates a new instance of the specified type defined in the specified assembly file.

Return Value: A handle to the requested object.

This method allows types to be created remotely without having to load the type locally. This will return an System. Runtime.Remoting.ObjectHandle that needs to be unwrapped in order to access the real object. The file containing the desired object's assembly. The type name of the desired object. One or more attributes that can participate in activation.

CreateInstanceFrom

[C#] public ObjectHandle CreateInstanceFrom(string assemblyFile, string typeName, bool ignoreCase, BindingFlags bindingAttr, Binder binder, object[ ] args, CultureInfo culture, object[ ] activationAttributes, Evidence securityAttributes);

[C++] public: _sealed ObjectHandle* CreateInstanceFrom (String* assemblyFile, String* typeName, bool ignoreCase, BindingFlags bindingAttr, Binder* binder, Object* args _gc[ ], CultureInfo* culture, Object* activationAttributes _gc[ ], Evidence* securityAttributes);

[VB] NotOverridable Public Function CreateInstanceFrom (ByVal assemblyFile As String, ByVal typeName As String, ByVal ignoreCase As Boolean, ByVal bindingAttr As BindingFlags, ByVal binder As Binder, ByVal args( ) As Object, ByVal culture As CultureInfo, ByVal activationAttributes( ) As Object, ByVal securityAttributes As Evidence) As ObjectHandle

[JScript] public function CreateInstanceFrom(assemblyFile: String, typeName: String, ignoreCase: Boolean, binding Attr: BindingFlags, binder: Binder, args: Object[ ], culture: CultureInfo, activationAttributes: Object[ ], securityAttributes Evidence): ObjectHandle;

Description

Creates a new instance of the specified type defined in the specified assembly file.

Return Value: A handle to the requested object.

This method allows types to be created remotely without having to load the type locally. This will return an System. Runtime.Remoting.ObjectHandle that needs to be unwrapped in order to access the real object. The file for the assembly in which this object type resides. The type name of the desired object. A Boolean value specifying whether to perform a case-sensitive search or not. This bitmask affects the way in which the search is conducted. The value is a combination of zero or more bit flags from System.Reflection.BindingFlags, such as NonPublicand OABinding. An object that enables the binding, coercion of argument types, invocation of members and retrieval of System.Reflection. MemberInfo objects through reflection. If binder is null, the default binder is used. The arguments to be passed to the constructor. This array of arguments must match in number, order, and type the parameters of the constructor to be invoked. If the default constructor is desired, args must be an empty array or null. An instance of System.Globalization. CultureInfo used to govern the coercion of types. If this is null, the CultureInfo for the current thread is used. (Note that this is necessary to, for example, convert a String that represents 1000 to a Double value, since 1000 is represented differently by different cultures.) One or more attributes that can participate in activation.

CreateInstanceFromAndUnwrap

[C#] public object CreateInstanceFromAndUnwrap(string assemblyName, string typeName);

[C++] public: Object* CreateInstanceFromAndUnwrap (String* assemblyName, String* typeName);

[VB] Public Function CreateInstanceFromAndUnwrap(ByVal assemblyName As String, ByVal typeName As String) As Object

[JScript] public function CreateInstanceFromAndUnwrap (assemblyName: String, typeName: String): Object; Creates a new instance of a specified type defined in the specified assembly file.

Description

Creates a new instance of the specified type defined in the specified assembly file.

Return Value: Returns an System.Runtime.Remoting.ObjectHandle object that is a wrapper for the new instance. Returns null if the type is not found.

This a convenience method that combines System.AppDomain.CreateInstance(System.String,System.String) and System.Runtime.Remoting.ObjectHandle.Unwrap. This method calls the default constructor for typeName. The assembly file name. The full name of the type.

CreateInstanceFromAndUnwrap

[C#] public object CreateInstanceFromAndUnwrap(string assemblyName, string typeName, object[ ] activationAttributes);

[C++] public: Object* CreateInstanceFromAndUnwrap (String* assemblyName, String* typeName, Object* activationAttributes _gc[ ]);

[VB] Public Function CreateInstanceFromAndUnwrap(ByVal assemblyName As String, ByVal typeName As String, ByVal activationAttributes( ) As Object) As Object

[JScript] public function CreateInstanceFromAndUnwrap (assemblyName: String, typeName: String, activationAttributes: Object[ ]): Object;

Description

Creates an instance using the name of the type and the assembly where it exists. This allows types to be created remotely without having to load the type locally. This will return an ObjectHandle that needs to be unwrapped in order to access the real object.

Return Value: A handle to the desired object.

This a convenience method that combines System.AppDomain.CreateInstance(System.String,System.String) and System.Runtime.Remoting.ObjectHandle.Unwrap. This method calls the Is default constructor for typeName. The file containing the desired object's assembly. The type name of the desired object. One or more attributes that can participate in activation.

CreateInstanceFromAndUnwrap

[C#] public object CreateInstanceFromAndUnwrap(string assemblyName, string typeName, bool ignoreCase, BindingFlags bindingAttr, Binder binder, object[ ] args, CultureInfo culture, object[ ] activationAttributes, Evidence securityAttributes);

[C++] public: Object* CreateInstanceFromAndUnwrap (String* assemblyName, String* typeName, bool ignoreCase, BindingFlags bindingAttr, Binder* binder, Object* args _gc[ ], CultureInfo* culture, Object* activationAttributes _gc[ ], Evidence* securityAttributes);

[VB] Public Function CreateInstanceFromAndUnwrap(ByVal assemblyName As String, ByVal typeName As String, ByVal ignoreCase As Boolean, ByVal bindingAttr As BindingFlags, ByVal binder As Binder, ByVal args( ) As Object, ByVal culture As CultureInfo, ByVal activationAttributes( ) As Object, ByVal securityAttributes As Evidence) As Object

[JScript] public function CreateInstanceFromAndUnwrap (assemblyName: String, typeName: String, ignoreCase: Boolean, bindingAttr: BindingFlags, binder: Binder, args: Object[ ], culture: CultureInfo, activationAttributes: Object[ ], securityAttributes: Evidence): Object;

Description

Creates an instance using the name of the type and the assembly where it exists. This allows types to be created remotely without having to load the type locally. This will return an ObjectHandle that needs to be unwrapped in order to access the real object.

Return Value: A handle to the requested object.

This a convenience method that combines System.AppDomain.CreateInstance(System.String,System.String) and System.Runtime.Remoting.ObjectHandle.Unwrap. The file for the assembly in which this object type resides. The type name of the desired object. A Boolean value specifying whether to perform a case-sensitive search or not. This bitmask affects the way in which the search is conducted. The value is a combination of zero or more bit flags from System.Reflection.BindingFlags, such as NonPublicand OABinding. An object that enables the binding, coercion of argument types, invocation of members and retrieval of System.Reflection.MemberInfo objects through reflection. If binder is null, the default binder is used. The arguments to be passed to the constructor. This array of arguments must match in number, order, and type the parameters of the constructor to be invoked. If the default constructor is desired, args must be an empty array or null. An instance of System.Globalization.CultureInfo used to govern the coercion of types. If culture is null, the CultureInfo for the current thread is used. (Note that this is necessary to, for example, convert a String that represents 1000 to a Double value, since 1000 is represented differently by different cultures.) One or more attributes that can participate in activation.

DefineDynamicAssembly

[C#] public AssemblyBuilder DefineDynamicAssembly(AssemblyName name, AssemblyBuilderAccess access);

[C++] public: _sealed AssemblyBuilder* DefineDynamicAssembly(AssemblyName* name, AssemblyBuilderAccess access);

[VB] NotOverridable Public Function DefineDynamicAssembly(ByVal name As AssemblyName, ByVal access As AssemblyBuilderAccess) As AssemblyBuilder

[JScript] public function DefineDynamicAssembly(name: AssemblyName, access AssemblyBuilderAccess): AssemblyBuilder; Defines a dynamic assembly in the current application domain.

Description

Defines a dynamic assembly with the given name and the given access.

Return Value: Represents the dynamic assembly created.

You can specify partial signing of the assembly by specifying AssemblyName.Originator. You can specify full signing of the assembly by specifying AssemblyName.Originator and AssemblyName.KeyPair. The "strong name", or unique identity of the dynamic assembly. The access mode for the dynamic assembly.

DefineDynamicAssembly

[C#] public AssemblyBuilder DefineDynamicAssembly(AssemblyName name, AssemblyBuilderAccess access, Evidence evidence);

[C++] public: _sealed AssemblyBuilder* DefineDynamicAssembly(AssemblyName* name, AssemblyBuilderAccess access, Evidence* evidence);

[VB] NotOverridable Public Function DefineDynamicAssembly(ByVal name As AssemblyName, ByVal access As AssemblyBuilderAccess, ByVal evidence As Evidence) As AssemblyBuilder

[JScript] public function DefineDynamicAssembly(name: AssemblyName, access: AssemblyBuilderAccess, evidence: Evidence): AssemblyBuilder;

Description

Defines a dynamic assembly with the given name, the given access, and the supplied evidence.

Return Value: Represents the dynamic assembly created.

Only fully trusted callers can supply evidence when defining a dynamic assembly. The runtime will map the supplied evidence through policy to determine the granted permissions. Semi-trusted callers must supply a null evidence. If evidence is null, the runtime copies the permission sets, that is, the current grant and deny sets, from the caller's assembly to the dynamic assembly being defined and marks policy as resolved. If the dynamic assembly is saved to disk, subsequent loads will get grants based on policies associated with the location where the assembly was saved. The unique identity of the dynamic assembly. The mode in which the dynamic assembly will be accessed. The evidence supplied for the dynamic assembly.

DefineDynamicAssembly

[C#] public AssemblyBuilder DefineDynamicAssembly(AssemblyName name, AssemblyBuilderAccess access, string dir);

[C++] public: _sealed AssemblyBuilder* DefineDynamicAssembly(AssemblyName* name, AssemblyBuilderAccess access, String* dir);

[VB] NotOverridable Public Function DefineDynamicAssembly(ByVal name As AssemblyName, ByVal access As AssemblyBuilderAccess, ByVal dir As String) As AssemblyBuilder

[JScript] public function DefineDynamicAssembly(name: AssemblyName, access AssemblyBuilderAccess, dir: String): AssemblyBuilder;

Description

Defines a dynamic assembly with the given name, the given access, and the name of the directory for saving the assembly.

Return Value: Represents the dynamic assembly created.

You can specify partial signing of the assembly by specifying AssemblyName.Originator. You can specify full signing of the assembly by specifying AssemblyName.Originator and AssemblyName.KeyPair. The unique identity of the dynamic assembly. The mode in which the dynamic assembly will be accessed. The name of the directory in which the assembly will be saved. If dir is null, the directory defaults to the current directory.

DefineDynamicAssembly

[C#] public AssemblyBuilder DefineDynamicAssembly(AssemblyName name, AssemblyBuilderAccess access, string dir, Evidence evidence); [C++] public: _sealed AssemblyBuilder* DefineDynamicAssembly(AssemblyName* name, AssemblyBuilderAccess access, String* dir, Evidence* evidence);

[VB] NotOverridable Public Function DefineDynamicAssembly(ByVal name As AssemblyName, ByVal access As AssemblyBuilderAccess, ByVal dir As String, ByVal evidence As Evidence) As AssemblyBuilder

[JScript] public function DefineDynamicAssembly(name: AssemblyName, access: AssemblyBuilderAccess, dir: String, evidence: Evidence): AssemblyBuilder;

Description

Defines a dynamic assembly with the given name, given access, the name of the directory for saving the assembly, and the supplied evidence.

Return Value: Represents the dynamic assembly created.

Only fully trusted callers can supply their evidence when defining a dynamic assembly. The runtime will map the evidence through policy to determine the granted permissions. Semi-trusted callers must supply a null evidence. If evidence is null, the runtime copies the permission sets, that is, the current grant and deny sets, from the caller's assembly to the dynamic assembly being defined and marks policy as resolved. If the dynamic assembly is saved to disk, subsequent loads will get grants based on policies associated with the location where the assembly was saved. The unique identity of the dynamic assembly. The mode in which the dynamic assembly will be accessed. The name of the directory in which the assembly will be saved. If dir is null, the directory defaults to the current directory. The evidence supplied for the dynamic assembly.

DefineDynamicAssembly

[C#] public AssemblyBuilder DefineDynamicAssembly(AssemblyName name, AssemblyBuilderAccess access, PermissionSet requiredPermissions, PermissionSet optionalPermissions, PermissionSet refusedPermissions);

[C++] public: _sealed AssemblyBuilder* DefineDynamicAssembly(AssemblyName* name, AssemblyBuilderAccess access, PermissionSet* requiredPermissions, PermissionSet* optionalPermissions, PermissionSet* refusedPermissions);

[VB] NotOverridable Public Function DefineDynamicAssembly(ByVal name As AssemblyName, ByVal access As AssemblyBuilderAccess, ByVal requiredPermissions As PermissionSet, ByVal optionalPermissions As PermissionSet, ByVal refusedPermissions As PermissionSet) As AssemblyBuilder

[JScript] public function DefineDynamicAssembly(name: AssemblyName, access: AssemblyBuilderAccess, requiredPermissions: PermissionSet, optionalPermissions: PermissionSet, refusedPermissions: PermissionSet): AssemblyBuilder;

Description

Defines a dynamic assembly with the given name, the given access, and the given permission requests.

Return Value: Represents the dynamic assembly created.

You can specify partial signing of the assembly by specifying AssemblyName.Originator. You can specify full signing of the assembly by specifying AssemblyName.Originator and AssemblyName.KeyPair. The unique identity of the dynamic assembly. The mode in which the dynamic assembly will be accessed. The required permission request. The optional permission request. The refused permission request.

DefineDynamicAssembly

[C#] public AssemblyBuilder DefineDynamicAssembly(AssemblyName name, AssemblyBuilderAccess access, Evidence evidence, PermissionSet requiredPermissions, PermissionSet optionalPermissions, PermissionSet refusedPermissions);

[C++] public: _sealed AssemblyBuilder* DefineDynamicAssembly(AssemblyName* name, AssemblyBuilderAccess access, Evidence* evidence, PermissionSet* requiredPermissions, PermissionSet* optionalPermissions, PermissionSet* refusedPermissions);

[VB] NotOverridable Public Function DefineDynamicAssembly(ByVal name As AssemblyName, ByVal access As AssemblyBuilderAccess, ByVal evidence As Evidence, ByVal requiredPermissions As PermissionSet, ByVal optionalPermissions As PermissionSet, ByVal refusedPermissions As PermissionSet) As AssemblyBuilder

[JScript] public function DefineDynamicAssembly(name: AssemblyName, access: AssemblyBuilderAccess, evidence: Evidence, requiredPermissions: PermissionSet, optionalPermissions: PermissionSet, refusedPermissions PermissionSet): AssemblyBuilder;

Description

Defines a dynamic assembly with the given name, given access, supplied evidence, and the permission requests.

Return Value: Represents the dynamic assembly created.

Only fully trusted callers can supply their evidence when defining a dynamic assembly. The runtime will map the evidence through policy to determine the granted permissions. Semi-trusted callers must supply a null evidence. If evidence is null, the runtime copies the permission sets (that is, the current grant and deny sets) from the caller's assembly to the dynamic assembly being defined and marks policy as resolved. The unique identity of the dynamic assembly. The mode in which the dynamic assembly will be accessed. The evidence supplied for the dynamic assembly. The required permission request. The optional permission request. The refused permission request.

DefineDynamicAssembly

[C#] public AssemblyBuilder DefineDynamicAssembly(AssemblyName name, AssemblyBuilderAccess access, string dir, PermissionSet requiredPermissions, PermissionSet optionalPermissions, PermissionSet refusedPermissions);

[C++] public: _sealed AssemblyBuilder* DefineDynamicAssembly(AssemblyName* name, AssemblyBuilderAccess access, String* dir, PermissionSet* requiredPermissions, PermissionSet* optionalPermissions, PermissionSet* refusedPermissions);

[VB] NotOverridable Public Function DefineDynamicAssembly(ByVal name As AssemblyName, ByVal access As AssemblyBuilderAccess, ByVal dir As String, ByVal requiredPermissions As PermissionSet, ByVal optionalPermissions As PermissionSet, ByVal refusedPermissions As PermissionSet) As AssemblyBuilder

[JScript] public function DefineDynamicAssembly(name: AssemblyName, access: AssemblyBuilderAccess, dir: String, requiredPermissions: PermissionSet, optionalPermissions: PermissionSet, refusedPermissions: PermissionSet) AssemblyBuilder;

Description

Defines a dynamic assembly with the given name, given access, the name of the directory for saving the assembly, and the permission requests.

Return Value: Represents the dynamic assembly created.

You can specify partial signing of the assembly by specifying AssemblyName.Originator. You can specify full signing of the assembly by specifying AssemblyName.Originator and AssemblyName.KeyPair. The unique identity of the dynamic assembly. The mode in which the dynamic assembly will be accessed. The name of the directory in which the assembly will be saved. If dir is null, the directory defaults to the current directory. The required permission request. The optional permission request. The refused permission request.

DefineDynamicAssembly

[C#] public AssemblyBuilder DefineDynamicAssembly(AssemblyName name, AssemblyBuilderAccess access, string dir, Evidence evidence, PermissionSet requiredPermissions, PermissionSet optionalPermissions, PermissionSet refusedPermissions);

[C++] public: _sealed AssemblyBuilder* DefineDynamicAssembly(AssemblyName* name, AssemblyBuilderAccess access, String* dir, Evidence* evidence, PermissionSet* requiredPermissions, PermissionSet* optionalPermissions, PermissionSet* refusedPermissions);

[VB] NotOverridable Public Function DefineDynamicAssembly(ByVal name As AssemblyName, ByVal access As AssemblyBuilderAccess, ByVal dir As String, ByVal evidence As Evidence, ByVal requiredPermissions As PermissionSet, ByVal optionalPermissions As PermissionSet, ByVal refusedPermissions As PermissionSet) As AssemblyBuilder

[JScript] public function DefineDynamicAssembly(name: AssemblyName, access: AssemblyBuilderAccess, dir: String, evidence: Evidence, requiredPermissions: PermissionSet, optionalPermissions: PermissionSet, refusedPermissions: PermissionSet): AssemblyBuilder;

Description

Defines a dynamic assembly with the given name, given access, the name of the directory for saving the assembly, supplied evidence, and the permission requests.

Return Value: Represents the dynamic assembly created.

Only fully trusted callers can supply their evidence when defining a dynamic assembly. The runtime will map the evidence through policy to determine the granted permissions. Semi-trusted callers must supply a null evidence. If evidence is null, the runtime copies the permission sets, that is, the current grant and deny sets, from the caller's assembly to the dynamic assembly being defined and marks policy as resolved. The unique identity of the dynamic assembly. The mode in which the dynamic assembly will be accessed. The name of the directory in which the assembly will be saved. If dir is null, the directory defaults to the current directory. The evidence supplied for the dynamic assembly. The required permission request. The optional permission request. The refused permission request.

DefineDynamicAssembly

[C#] public AssemblyBuilder DefineDynamicAssembly(AssemblyName name, AssemblyBuilderAccess access, string dir, Evidence evidence, PermissionSet requiredPermissions, PermissionSet optionalPermissions, PermissionSet refusedPermissions, bool is Synchronized);

[C++] public: _sealed AssemblyBuilder* DefineDynamicAssembly(AssemblyName* name, AssemblyBuilderAccess access, String* dir, Evidence* evidence, PermissionSet* requiredPermissions, PermissionSet* optionalPermissions, PermissionSet* refusedPermissions, bool is Synchronized);

[VB] NotOverridable Public Function DefineDynamicAssembly(ByVal name As AssemblyName, ByVal access As AssemblyBuilderAccess, ByVal dir As String, ByVal evidence As Evidence, ByVal requiredPermissions As PermissionSet, ByVal optionalPermissions As PermissionSet, ByVal refusedPermissions As PermissionSet, ByVal is Synchronized As Boolean) As AssemblyBuilder

[JScript] public function DefineDynamicAssembly(name: AssemblyName, access: AssemblyBuilderAccess, dir: String, evidence: Evidence, requiredPermissions: PermissionSet, optionalPermissions: PermissionSet, refusedPermissions PermissionSet, is Synchronized: Boolean): AssemblyBuilder;

Description

Defines a dynamic assembly using the specified name, access mode, storage directory, evidence, permission requests, and synchronization option.

Return Value: Represents the dynamic assembly created.

Only fully trusted callers can supply their evidence when defining a dynamic System.Reflection.Assembly. The runtime will map the System.Security.Policy.Evidence through policy to determine the granted permissions. Semi-trusted callers must supply an System.Security.Policy.Evidence. If evidence is null, the runtime copies the permission sets, that is, the current grant and deny sets, from the caller's System.Reflection.Assembly to the dynamic System.Reflection.Assembly being defined and marks policy as resolved. The unique identity of the dynamic assembly. The mode in which the dynamic assembly will be accessed. The name of the directory in which the dynamic assembly will be saved. If dir is null, the directory defaults to the current directory. The evidence supplied for the dynamic assembly. The required permission request. The optional permission request. The refused permission request. If true, the creation of modules, types, and members in the dynamic assembly are synchronized.

DoCallBack

[C#] public void DoCallBack(CrossAppDomainDelegate callBackDelegate);

[C++] public: _sealed void DoCallBack(CrossAppDomainDelegate* callBackDelegate);

[VB] NotOverridable Public Sub DoCallBack(ByVal callBack[Delegate As CrossAppDomainDelegate)

[JScript] public function DoCallBack(callBackDelegate: CrossAppDomainDelegate);

Description

Executes the code in another application domain that is identified by the specified delegate.

callBackDelegate can specify a marshal-by-value, System.MarshalByRefObject, or System.ContextBoundObject object. A delegate that specifies a method to call.

ExecuteAssembly

[C#] public int ExecuteAssembly(string assemblyFile);

[C++] public: _sealed int ExecuteAssembly(String* assemblyFile);

[VB] NotOverridable Public Function ExecuteAssembly (ByVal assemblyFile As String) As Integer

[JScript] public function ExecuteAssembly(assemblyFile: String): int;

Description

Execute the System.Reflection.Assembly given its file name. The method specified in the .NET Framework header is called.

Return Value: The value returned by the entry point of the assembly.

The method does not spawn a new process, create a new application domain, or execute the entry point method on a new thread. The name of the file from which the assembly is to be loaded.

ExecuteAssembly

[C#] public int ExecuteAssembly(string assemblyFile, Evidence assemblySecurity);

[C++] public: _sealed int ExecuteAssembly(String* assemblyFile, Evidence* assemblySecurity);

[VB] NotOverridable Public Function ExecuteAssembly (ByVal assemblyFile As String, ByVal assemblySecurity As Evidence) As Integer

[JScript] public function ExecuteAssembly(assemblyFile: String, assemblySecurity: Evidence): int; Executes the specified assembly.

Description

Execute the System.Reflection.Assembly given its file name and supplied evidence.

Return Value: The value returned by the entry point of the assembly.

The method does not spawn a new process, create a new application domain, or execute the entry point method on a new thread. The name of the file from which the assembly is to be loaded. Evidence for loading the assembly.

ExecuteAssembly

[C#] public int ExecuteAssembly(string assemblyFile, Evidence assemblySecurity, string[ ] args);

[C++] public: _sealed int ExecuteAssembly(String* assemblyFile, Evidence* assemblySecurity, String* args _gc[ ]);

[VB] NotOverridable Public Function ExecuteAssembly (ByVal assemblyFile As String, ByVal assemblySecurity As Evidence, ByVal args( ) As String) As Integer

[JScript] public function ExecuteAssembly(assemblyFile: String, assemblySecurity: Evidence, args: String[ ]): int; Executes the assembly given its file name.

Description

Execute the System.Reflection.Assembly given its file name and supplied System.Security.Policy.Evidence. Optionally, the System.Reflection.Assembly can be loaded into the domain-neutral code area for use by multiple AppDomains.

Return Value: The value returned by the entry point of the assembly.

The method does not spawn a new process, create a new application domain, or execute the entry point method on a new thread. The name of the file from which the assembly is to be loaded. The supplied evidence for the assembly. The arguments to the entry point of the assembly.

GetAssemblies

[C#] public Assembly[ ] GetAssemblies( );

[C++] public: _sealed Assembly* GetAssemblies( ) [ ];

[VB] NotOverridable Public Function GetAssemblies( ) As Assembly( )

[JScript] public function GetAssemblies( ): Assembly[ ];

Description

Gets the assemblies that have been loaded into this application domain.

Return Value: An array of assemblies in this application domain.

GetCurrentThreadId

[C#] public static int GetCurrentThreadId( );

[C++] public: static int GetCurrentThreadId( );

[VB] Public Shared Function GetCurrentThreadId( ) As Integer

[JScript] public static function GetCurrentThreadId( ): int;

Description

Gets the current thread identifier.

Return Value: A 32-bit signed integer that is the identifier of the current thread.

GetData

[C#] public object GetData(string name);

[C++] public: _sealed Object* GetData(String* name);

[VB] NotOverridable Public Function GetData(ByVal name As String) As Object

[JScript] public function GetData(name: String): Object;

Description

Gets the value stored in the current application domain for the specified data name.

Return Value: The value of the name property.

name can be the value of one of the System.AppDomainSetup properties. The name of an application domain property.

GetType

[C#] public Type GetType( );

[C++] public: _sealed Type* GetType( );

[VB] NotOverridable Public Function GetType( ) As Type

[JScript] public function GetType( ): Type;

Description

Gets the type of the current instance.

Return Value: A System.Type object.

Description

Gets the type of the current instance.

Return Value: A System.Type object.

InitializeLifetimeService

[C#] public override object InitializeLifetimeService( );

[C++] public: Object* InitializeLifetimeService( );

[VB] Overrides Public Function InitializeLifetimeService( ) As Object

[JScript] public override function InitializeLifetime Service( ): Object;

Description

Gives the System.AppDomain an infinite lifetime by preventing a lease from being created.

Return Value: Always null.

IsFinalizingForUnload

[C#] public bool IsFinalizingForUnload( );

[C++] public: bool IsFinalizingForUnload( );

[VB] Public Function IsFinalizingForUnload( ) As Boolean

[JScript] public function IsFinalizingForUnload( ): Boolean;

Description

Indicates whether the common language runtime has started forcing objects to finalize.

Return Value: true if the common language runtime has started invoking finalizers, forcing objects to finalize; otherwise, false.

Some of the System.AppDomain infrastructure might have been garbage collected before the finalizers started running.

Load

[C#] public Assembly Load(AssemblyName assemblyRef);

[C++] public: _sea led Assembly* Load(AssemblyName* assemblyRef);

[VB] NotOverridable Public Function Load(ByVal assemblyRef As AssemblyName) As Assembly

[JScript] public function Load(assemblyRef: AssemblyName): Assembly; Loads an System.Reflection.Assembly into this application domain.

Description

Loads an System.Reflection.Assembly given its System.Reflection.AssemblyName.

Return Value: The loaded assembly.

This method should only be used to load an assembly into the current application domain. This method is defined for interoperability callers who cannot call the static Assembly.Load method. An object that describes the assembly to be loaded.

Load

[C#] public Assembly Load(byte[ ] rawAssembly);

[C++] public: _sealed Assembly* Load(unsigned char rawAssembly _gc[ ]);

[VB] NotOverridable Public Function Load(ByVal rawAssembly( ) As Byte) As Assembly

[JScript] public function Load(rawAssembly: Byte[ ]): Assembly;

Description

Loads the System.Reflection.Assembly with a COFF based image containing an emitted System.Reflection.Assembly.

Return Value: The loaded assembly.

This method should only be used to load an assembly into the current application domain. This method is defined for interoperability callers who cannot call the static Assembly. Load method. An array of type byte that is a COFF-based image containing an emitted assembly.

Load

[C#] public Assembly Load(string assemblyString);

[C++] public: _sealed Assembly* Load(String* assemblyString);

[VB] NotOverridable Public Function Load(ByVal assemblyString As String) As Assembly

[JScript] public function Load(assemblyString: String): Assembly;

Description

Loads an System.Reflection.Assembly given its display name.

Return Value: The loaded assembly.

This method should only be used to load an assembly into the current application domain. This method is defined for interoperability callers who cannot call the static Assembly. Load method. The display name of the assembly.

Load

[C#] public Assembly Load(AssemblyName assemblyRef, Evidence assemblySecurity);

[C++] public: _sealed Assembly* Load(AssemblyName* assemblyRef, Evidence* assemblySecurity);

[VB] NotOverridable Public Function Load(ByVal assemblyRef As AssemblyName, ByVal assemblySecurity As Evidence) As Assembly

[JScript] public function Load(assemblyRef: AssemblyName, assemblySecurity: Evidence): Assembly; Loads an System.Reflection.Assembly into this application domain.

Description

Loads an System.Reflection.Assembly given its System. Reflection.AssemblyName.

Return Value: The loaded assembly. An object that describes the assembly to be loaded. Evidence for loading the assembly.

Load

[C#] public Assembly Load(byte[ ] rawAssembly, byte[ ] rawSymbolStore);

[C++] public: _sealed Assembly* Load(unsigned char rawAssembly _gc[ ], unsigned char rawSymbolStore _gc[ ]);

[VB] NotOverridable Public Function Load(ByVal rawAssembly( ) As Byte, ByVal rawSymbolStore( ) As Byte) As Assembly

[JScript] public function Load(rawAssembly: Byte[ ], rawSymbolStore: Byte[ ]): Assembly;

Description

Loads the System.Reflection.Assembly with a COFF based image containing an emitted System.Reflection.Assembly. The raw bytes representing the symbols for the System.Reflection.Assembly are also loaded.

Return Value: The loaded assembly.

This method should only be used to load an assembly into the current application domain. This method is defined for interoperability callers who cannot call the static Assembly. Load method. An array of type byte that is a COFF-based image containing an emitted assembly. An array of type byte containing the raw bytes representing the symbols for the assembly. Load

[C#] public Assembly Load(string assemblyString, Evidence assemblySecurity);

[C++] public: _sealed Assembly* Load(String* assemblyString, Evidence* assemblySecurity);

[VB] NotOverridable Public Function Load(ByVal assemblyString As String, ByVal assemblySecurity As Evidence) As Assembly

[JScript] public function Load(assemblyString: String, assemblySecurity: Evidence): Assembly;

Description

Loads an System.Reflection.Assembly given its display name.

Return Value: The loaded assembly. The display name of the assembly. Evidence for loading the assembly.

Load

[C#] public Assembly Load(byte[ ] rawAssembly, byte[ ] rawSymbolStore, Evidence securityEvidence);

[C++] public: _sealed Assembly* Load(unsigned char rawAssembly _gc[ ], unsigned char rawSymbolStore _gc[ ], Evidence* securityEvidence);

[VB] NotOverridable Public Function Load(ByVal rawAssembly( ) As Byte, ByVal rawSymbolStore( ) As Byte, ByVal securityEvidence As Evidence) As Assembly

[JScript] public function Load(rawAssembly: Byte[ ], rawSymbolStore: Byte[ ], securityEvidence: Evidence): Assembly;

Description

Loads the System.Reflection.Assembly with a COFF based image containing an emitted System.Reflection.Assembly. The raw bytes representing the symbols for the System.Reflection.Assembly are also loaded.

Return Value: The loaded assembly.

This method should only be used to load an assembly into the current application domain. This method is defined for interoperability callers who cannot call the static Assembly. Load method. An array of type byte that is a COFF-based image containing an emitted assembly. An array of type byte containing the raw bytes representing the symbols for the assembly. Evidence for loading the assembly.

SetAppDomainPolicy

[C#] public void SetAppDomainPolicy(PolicyLevel domainPolicy);

[C++] public: _sealed void SetAppDomainPolicy(PolicyLevel* domainPolicy);

[VB] NotOverridable Public Sub SetAppDomainPolicy(ByVal domain Policy As PolicyLevel)

[JScript] public function SetAppDomainPolicy(domainPolicy: PolicyLevel);

Description

Establishes the security policy level for this application domain. The security policy level.

SetCachePath

[C#] public void SetCachePath(string path);

[C++] public: _sealed void SetCachePath(String* path);

[VB] NotOverridable Public Sub SetCachePath(ByVal path As String)

[JScript] public function SetCachePath(path: String);

Description

Establishes the specified directory path as the location where assemblies are shadow copied. The fully qualified path to the shadow copy location.

SetData

[C#] public void SetData(string name, object data);

[C++] public: __sealed void SetData(String* name, Object* data);

[VB] NotOverridable Public Sub SetData(ByVal name As String, ByVal data As Object)

[JScript] public function SetData(name: String, data: Object);

Description

Assigns the specified value to the specified application domain property.

This method has been superseded by properties of the System.AppDomainSetup class. The following table shows the System.AppDomainSetup property that corresponds to a value of name. The name of an application domain property. The value to set the name property.

SetDynamicBase

[C#] public void SetDynamicBase(string path);

[C++] public: void SetDynamicBase(String* path);

[VB] Public Sub SetDynamicBase(ByVal path As String)

[JScript] public function SetDynamicBase(path: String);

Description

Establishes the specified directory path as the location where dynamically generated files are stored and accessed.

This method sets the System.AppDomainSetup.DynamicBase property of the internal System.AppDomnainSetup object associated with this instance. The fully qualified path to where dynamic assemblies are stored.

SetPrincipalPolicy

[C#] public void SetPrincipalPolicy(PrincipalPolicy policy);

[C++] public: __sealed void SetPrincipalPolicy(PrincipalPolicy policy);

[VB] NotOverridable Public Sub SetPrincipalPolicy(ByVal policy As PrincipalPolicy)

[JScript] public function SetPrincipalPolicy(policy: PrincipalPolicy);

Description

Set the class of the default principal object to be attached to threads if they attempt to bind to a principal while executing in this application domain. The class of the principal object to be attached to threads.

SetShadowCopyFiles

[C#] public void SetShadowCopyFiles( );

[C++] public: void SetShadowCopyFiles( );

[VB] Public Sub SetShadowCopyFiles( )

[JScript] public function SetShadowCopyFiles( );

Description

Turns on shadow copying.

SetShadowCopyPath

[C#] public void SetShadowCopyPath(string path);

[C++] public: _sealed void SethadowCopyPath(String* path);

[VB] NotOverridable Public Sub SetShadowCopyPath(ByVal path As String)

[JScript] public function SetShadowCopyPath(path: String);

Description

Establishes the specified directory path as the location of assemblies to be "shadow copied".

This method sets the System.AppDomainSetup.ShadowCopyDirectories property of the internal System.AppDomainSetup object associated with this instance. A list of directory names, where each name is separated by a semicolon.

SetThreadPrincipal

[C#] public void SetThreadPrincipal(IPrincipal principal);

[C++] public: _sealed void SetThreadPrincipal(IPrincipal* principal);

[VB] NotOverridable Public Sub SetThreadPrincipal(ByVal principal As IPrincipal)

[JScript] public function SetThreadPrincipal(principal: IPrincipal);

Description

Set the default principal object to be attached to threads if they attempt to bind to a principal while executing in this application domain. The principal object to be attached to threads.

ToString

[C#] public override string ToString( );

[C++] public: String* ToString( );

[VB] Overrides Public Function ToString( ) As String

[JScript] public override function ToString( ): String;

Description

Obtains the System.String representation of the application domain.

Return Value: The friendly name, loader name, and loader context policy of the application domain.

The string representation specifies the friendly name of the application domain.

Unload

[C#] public static void Unload(AppDomain domain);

[C++] public: static void Unload(AppDomain* domain);

[VB] Public Shared Sub Unload(ByVal domain As AppDomain)

[JScript] public static function Unload(domain: AppDomain);

Description

Removes the specified application domain.

A long period of time can pass before domain unloads because it might be difficult to terminate executing threads. An application domain to be unloaded.

AppDomainSetup class (System)

Unload

Constructors:

AppDomainSetup

Example Syntax:

Unload

ApplicationBase

Unload

ApplicationName

Unload

CachePath

Unload

ConfigurationFile

Unload

DynamicBase

Unload

LicenseFile

Unload

LoaderOptimization

Unload

PrivateBinPath

Unload

PrivateBin PathProbe

Unload

ShadowCopyDirectories

Unload

ShadowCopyFiles
Unload
AppDomainUnloadedException class (System)
ToString

Description

The exception that is thrown when an attempt is made to access an unloaded application domain.

System.AppDomainUnloadedException uses the HRESULT COR_E_APPDOMAINUNLOADED, which has the value 0x80131014.

AppDomainUnloadedException
Example Syntax:
ToString

[C#] public AppDomainUnloadedException( );
[C++] public: AppDomainUnloadedException( );
[VB] Public Sub New( )
[JScript] public function AppDomainUnloadedException( );
Initializes a new instance of the System.AppDomainUnloadedException class.

Description

Initializes a new instance of the System.AppDomainUnloadedException class with default properties.

The following table shows the initial property values for an instance of System.AppDomainUnloadedException.

AppDomainUnloadedException
Example Syntax:
ToString

[C#] public AppDomainUnloadedException(string message);
[C++] public: AppDomainUnloadedException(String* message);
[VB] Public Sub New(ByVal message As String)
[JScript] public function AppDomainUnloadedException (message: String);

Description

Initializes a new instance of the System.AppDomainUnloadedException class with a specified error message.

The following table shows the initial property values for an instance of System.AppDomainUnloadedException. The error message that explains the reason for the exception.

AppDomainUnloadedException
Example Syntax:
ToString

[C#] protected AppDomainUnloadedException(SerializationInfo info, StreamingContext context);
[C++] protected: AppDomainUnloadedException(SerializationInfo* info, StreamingContext context);
[VB] Protected Sub New(ByVal info As SerializationInfo, ByVal context As StreamingContext)
[JScript] protected function AppDomainUnloadedException (info: SerializationInfo, context: StreamingContext);

Description

Initializes a new instance of the System.AppDomainUnloadedException class with serialized data.

This constructor is called during deserialization to reconstitute the exception object transmitted over a stream. For more information, see. The object that holds the serialized object data. The contextual information about the source or destination.

AppDomainUnloadedException
Example Syntax:
ToString

[C#] public AppDomainUnloadedException(string message, Exception innerException);
[C++] public: AppDomainUnloadedException(String* message, Exception* innerException);
[VB] Public Sub New(ByVal message As String, ByVal innerException As Exception)
[JScript] public function AppDomainUnloadedException (message: String, innerException: Exception);

Description

Initializes a new instance of the System.AppDomainUnloadedException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If innerException is non-null, then the current Exception is raised in a catch block handling innerException.

HelpLink
HResult
InnerException
Message
Source
StackTrace
TargetSite
ApplicationException class (System)
ToString Description The exception that is thrown when a non-fatal application error occurs.

System.ApplicationException is thrown by a user program, not by the common language runtime. If you are designing an application that needs to create its own exceptions, derive from the System.ApplicationException class.

ApplicationException
Example Syntax:
ToString

[C#] public ApplicationException( );
[C++] public: ApplicationException( );
[VB] Public Sub New( )
[JScript] public function ApplicationException( ); Initializes a new instance of the System.ApplicationException class.

Description

Initializes a new instance of the System.ApplicationException class with default properties.

The following table shows the initial property values for an instance of System.ApplicationException.

ApplicationException
Example Syntax:
ToString

[C#] public ApplicationException(string message);
[C++] public: ApplicationException(String* message);
[VB] Public Sub New(ByVal message As String)
[JScript] public function ApplicationException(message: String);

Description

Initializes a new instance of the System.ApplicationException class with a specified error message.

The following table shows the initial property values for an instance of System.ApplicationException. The error message that explains the reason for the exception.

ApplicationException
Example Syntax:
ToString

[C#] protected ApplicationException(SerializationInfo info, StreamingContext context);

[C++] protected: ApplicationException(SerializationInfo* info, StreamingContext context);

[VB] Protected Sub New(ByVal info As SerializationInfo, ByVal context As StreamingContext)

[JScript] protected function ApplicationException(info: SerializationInfo, context StreamingContext);

Description

Initializes a new instance of the System.ApplicationException class with serialized data.

This constructor is called during deserialization to reconstitute the exception object transmitted over a stream. For more information, see. The object that holds the serialized object data. The contextual information about the source or destination.

ApplicationException

Example Syntax:

ToString

[C#] public ApplicationException(string message, Exception innerException);

[C++] public: ApplicationException(String* message, Exception* innerException);

[VB] Public Sub New(ByVal message As String, ByVal innerException As Exception)

[JScript] public function ApplicationException(message: String, innerException: Exception);

Description

Initializes a new instance of the System.ApplicationException class with a specified error message and a reference to the inner exception that is the root cause It of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If innerException is non-null, then the current Exception is raised in a catch block handling innerException.

HelpLink

HResult

InnerException

Message

Source

StackTrace

TargetSite

ArgIterator structure (System)

ToString

Description

Represents a variable-length argument list; that is, the parameters of a function that takes a variable number of arguments.

Typically, you use this class for writing compilers. The methods in this class are not generally useful in other kinds of applications.

ArgIterator

Example Syntax:

ToString

[C#] public ArgIterator(RuntimeArgumentHandle arglist);

[C++] public: ArgIterator(RuntimeArgumentHandle arglist);

[VB] Public Sub New(ByVal arglist As RuntimeArgumentHandle)

[JScript] public function ArgIterator(arglist: RuntimeArgumentHandle); Initializes a new instance of the ArgIterator class.

Description

Initializes a new instance of the ArgIterator class using the specified argument list. An argument list consisting of both required and optional items.

ArgIterator

Example Syntax:

ToString

[C#] unsafe public ArgIterator(RuntimeArgumentHandle arglist, void* ptr);

[C++] public: ArgIterator(RuntimeArgumentHandle arglist, void* ptr);

End

[C#] public void End( );

[C++] public: void End( );

[VB] Public Sub End( )

[JScript] public function End( );

Description

Moves the iterator to the end of the variable-length argument list; that is, it invalidates the iterator.

Conceptually, this method moves the iterator to the end of the list so that the next call to System.ArgIterator.GetNextArg generates an exception.

Equals

[C#] public override bool Equals(object o);

[C++] public: bool Equals(Object* o);

[VB] Overrides Public Function Equals(ByVal o As Object) As Boolean

[JScript] public override function Equals(o: Object): Boolean;

Description

This method is not supported, and always throws NotSupportedException An object to be compared to this instance.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code of this object.

Return Value: A 32-bit signed integer hash code.

GetNextArg

[C#] public TypedReference GetNextArg( );

[C++] public: TypedReference GetNextArg( );

[VB] Public Function GetNextArg( ) As TypedReference

[JScript] public function GetNextArg( ): TypedReference; Returns the next argument in a variable-length argument list.

Description

Returns the next argument in a variable-length argument list.

Return Value: The next argument as a System.TypedReference object. The iterator is automatically advanced to the next argument.

GetNextArg

[C#] public TypedReference GetNextArg(RuntimeTypeHandle rth);

[C++] public: TypedReference GetNextArg(RuntimeTypeHandle rth);

[VB] Public Function GetNextArg(ByVal rth As RuntimeTypeHandle) As TypedReference

[JScript] public function GetNextArg(rth: RuntimeTypeHandle): TypedReference;

Description

Returns the next argument in a variable-length argument list that has a specified type.

Return Value: The next argument as a System.TypedReference object.

The iterator is automatically advanced to the next argument. A runtime type handle that identifies the type of the argument to retrieve.

GetNextArgType

[C#] public RuntimeTypeHandle GetNextArgType( );

[C++] public: RuntimeTypeHandle GetNextArgType( );

[VB] Public Function GetNextArgType( ) As RuntimeTypeHandle

[JScript] public function GetNextArgType( ): RuntimeTypeHandle;

Description

Returns the type of the next argument.

Return Value: The type of the next argument.

This method does not advance the iterator to the next argument.

GetRemainingCount

[C#] public int GetRemainingCount( );

[C++] public: int GetRemainingCount( );

[VB] Public Function GetRemainingCount( ) As Integer

[JScript] public function GetRemainingCount( ): int;

Description

Returns the number of arguments remaining in the argument list.

Return Value: The number of remaining arguments.

ArgumentException class (System)

ToString

Description

The exception that is thrown when one of the arguments provided to a method is not valid.

System.ArgumentException is thrown when a method is invoked and at least one of the passed arguments does not meet the parameter specification of the called method. All instances of System.ArgumentException should carry a meaningful error message describing the invalid argument, as well as the expected range of values for the argument.

ArgumentException

Example Syntax:

ToString

[C#] public ArgumentException( );

[C++] public: ArgumentException( );

[VB] Public Sub New( )

[JScript] public function ArgumentException( ); Initializes a new instance of the System.ArgumentException class.

Description

Initializes a new instance of the System.ArgumentException class with default properties.

The following table shows the initial property values for an instance of System.ArgumentException.

ArgumentException

Example Syntax:

ToString

[C#] public ArgumentException(string message);

[C++] public: ArgumentException(String* message);

[VB] Public Sub New(ByVal message As String)

[JScript] public function ArgumentException(message: String);

Description

Initializes a new instance of the System.ArgumentException class with a specified error message.

The following table shows the initial property values for an instance of System.ArgumentException. The error message that explains the reason for the exception.

ArgumentException

Example Syntax:

ToString

[C#] protected ArgumentException(SerializationInfo info, StreamingContext context);

[C++] protected: ArgumentException(SerializationInfo* info, StreamingContext context);

[VB] Protected Sub New(ByVal info As SerializationInfo, ByVal context As StreamingContext)

[JScript] protected function ArgumentException(info: SerializationInfo, context: StreamingContext);

Description

Initializes a new instance of the System.ArgumentException class with serialized data.

This constructor is called during deserialization to reconstitute the exception object transmitted over a stream. For more information, see. The object that holds the serialized object data. The contextual information about the source or destination.

ArgumentException

Example Syntax:

ToString

[C#] public ArgumentException(string message, Exception innerException);

[C++] public: ArgumentException(String* message, Exception* innerException);

[VB] Public Sub New(ByVal message As String, ByVal innerException As Exception)

[JScript] public function ArgumentException(message: String, innerException: Exception);

Description

Initializes a new instance of the System.ArgumentException class with a specified error message and a reference to the inner exception that is the root cause of this exception.

When an ExceptionX is thrown as a direct result of a previous exception Y. Is the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If innerException is non-null, then the current Exception is raised in a catch block handling innerException.

ArgumentException

Example Syntax:

ToString

[C#] public ArgumentException(string message, string paramName);

[C++] public: ArgumentException(String* message, String* paramName);

[VB] Public Sub New(ByVal message As String, ByVal paramName As String)

[JScript] public function ArgumentException(message: String, paramName: String);

Description

Initializes a new instance of the System.ArgumentException class with a specified error message and the name of the parameter that causes this exception.

The following table shows the initial property values for an instance of System.ArgumentException. The error message that explains the reason for the exception. The name of the invalid parameter.

ArgumentException

Example Syntax:

ToString

[C#] public ArgumentException(string message, string paramName, Exception innerException);

[C++] public: ArgumentException(String* message, String* paramName, Exception* innerException);

[VB] Public Sub New(ByVal message As String, ByVal paramName As String, ByVal innerException As Exception)

[JScript] public function ArgumentException(message: String, paramName: String, innerException: Exception);

Description

Initializes a new instance of the System.ArgumentException class with a specified error message, the parameter name, and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. The name of the invalid parameter. An instance of System.Exception that is the cause of the current Exception. If innerException is non-null, then the current Exception is raised in a catch block handling innerException.

HelpLink

HResult

InnerException

Message

ToString

Description

Gets the error message and the parameter name, or only the error message if no parameter name is s et.

This property overrides System.Exception.Message. The error message should be localized.

ParamName

ToString

[C#] public virtual string ParamName {get;}

[C++] public: _property virtual String* get_ParamName( );

[VB] Overridable Public ReadOnly Property ParamName As String

[JScript] public function get ParamName( ): String;

Description

Gets the name of the parameter that causes this exception.

Every System.ArgumentException should carry the name of the parameter that causes this exception. The parameter name should not be localized.

Source

StackTrace

TargetSite

GetObjectData

[C#] public override void GetObjectData(SerializationInfo info, StreamingContext context);

[C++] public: void GetObjectData(SerializationInfo* info, StreamingContext context);

[VB] Overrides Public Sub GetObjectData(ByVal info As SerializationInfo, ByVal context As StreamingContext)

[JScript] public override function GetObjectData(info: SerializationInfo, context: StreamingContext);

Description

Sets the System.Runtime.Serialization.SerializationInfo object with the parameter name and additional exception information.

System.ArgumentException.GetObjectData(System.Runtime.Serialization. SerializationInfo,System.Runtime.Serialization.StreamingContext) sets a System.Runtime.Serialization.SerializationInfo with all the exception object data targeted for serialization. During deserialization, the exception object is reconstituted from the System.Runtime.Serialization.SerializationInfo transmitted over the stream. The object that holds the serialized object data. The contextual information about the source or destination.

ArgumentNullException class (System)

ToString

Description

The exception that is thrown when null is passed to a method that does not accept it as a valid argument.

System.ArgumentNullException uses the HRESULT E_POINTER, which has the value 0x80004003.

ArgumentNullException

Example Syntax:

ToString

[C#] public ArgumentNullException( );

[C++] public: ArgumentNullException( );

[VB] Public Sub New( )

[JScript] public function ArgumentNullException( ); Initializes a new instance of the System.ArgumentNullException class.

Description

Initializes a new instance of the System.ArgumentNullException class with default properties.

The following table shows the initial property values for an instance of System.ArgumentNullException ArgumentNullException Example Syntax:

ToString

[C#] public ArgumentNullException(string paramName);

[C++] public: ArgumentNullException(String* paramName);

[VB] Public Sub New(ByVal paramName As String)

[JScript] public function ArgumentNullException(paramName: String);

Description

Initializes a new instance of the System.ArgumentNullException class with the name of the parameter that causes this exception.

The following table shows the initial property values for an instance of System.ArgumentNullException. The name of the parameter that is assigned null.

ArgumentNullException

Example Syntax:

ToString

[C#] protected ArgumentNullException(SerializationInfo info, StreamingContext context);

[C++] protected: ArgumentNullException(SerializationInfo* info, StreamingContext context);

[VB] Protected Sub New(ByVal info As SerializationInfo, ByVal context As StreamingContext)

[JScript] protected function ArgumentNullException(info: SerializationInfo, context: StreamingContext);

Description

Initializes a new instance of the System.ArgumentNullException class with serialized data.

This constructor is called during deserialization to reconstitute the exception object transmitted over a stream. For more information, see. The object that holds the serialized object data. The contextual information about the source or destination.

ArgumentNullException

Example Syntax:

ToString

[C#] public ArgumentNullException(string paramName, string message);

[C++] public: ArgumentNullException(String* paramName, String* message);

[VB] Public Sub New(ByVal paramName As String, ByVal message As String)

[JScript] public function ArgumentNullException(paramName: String, message: String);

Description

Initializes an instance of the System.ArgumentNullException class with a specified error message and the name of the parameter that causes this exception.

The following table shows the initial property values for an instance of System.ArgumentNullException. The name of the parameter that is assigned null. The error message that explains the reason for the exception.

HelpLink

HResult

InnerException

Message

ParamName

Source

StackTrace

TargetSite

ArgumentOutOfRangeException class (System)

ToString

Description

The exception that is thrown when the value of an argument is outside the allowable range of values as defined by the invoked method.

System.ArgumentOutOfRangeException is used extensively by: Classes in the System.Collections and System.IO namespaces.

ArgumentOutOfRangeException

Example Syntax:

ToString

[C#] public ArgumentOutOfRangeException( );

[C++] public: ArgumentOutOfRangeException( );

[VB] Public Sub New( )

[JScript] public function ArgumentOutOfRangeException( );

Initializes a new instance of the System.ArgumentOutOfRangeException class.

Description

Initializes a new instance of the System.ArgumentOutOfRangeException class with default properties. The following table shows the initial property values for an instance of System.ArgumentOutOfRangeException.

ArgumentOutOfRangeException

Example Syntax:

ToString

[C#] public ArgumentOutOfRangeException(string paramName);

[C++] public: ArgumentOutOfRangeException(String* paramName);

[VB] Public Sub New(ByVal paramName As String)

[JScript] public function ArgumentOutOfRangeException (paramName: String);

Description

Initializes a new instance of the System.ArgumentOutOfRangeException class with the name of the parameter that causes this exception.

The following table shows the initial property values for an instance of System.ArgumentOutOfRangeException. The name of the invalid parameter.

ArgumentOutOfRangeException

Example Syntax:

ToString

[C#] protected ArgumentOutOfRangeException(SerializationInfo info, StreamingContext context);

[C++] protected: ArgumentOutOfRangeException(SerializationInfo* info, StreamingContext context);

[VB] Protected Sub New(ByVal info As SerializationInfo, ByVal context As StreamingContext)

[JScript] protected function ArgumentOutOfRangeException(info: SerializationInfo, context: StreamingContext);

Description

Initializes a new instance of the System.ArgumentOutOfRangeException class with serialized data.

This constructor is called during deserialization to reconstitute the exception object transmitted over a stream. For more information, see. The object that holds the serialized object data. The contextual information about the source or destination.

ArgumentOutOfRangeException

Example Syntax:

ToString

[C#] public ArgumentOutOfRangeException(string paramName, string message);

[C++] public: ArgumentOutOfRangeException(String* paramName, String* message);

[VB] Public Sub New(ByVal paramName As String, ByVal message As String)

[JScript] public function ArgumentOutOfRangeException (paramName: String, message: String);

Description

Initializes a new instance of the System.ArgumentOutOfRangeException class with a specified error message and the name of the parameter that causes this exception.

The following table shows the initial property values for an instance of System.ArgumentOutOfRangeException. The name of the invalid parameter. The error message that explains the reason for the exception.

ArgumentOutOfRangeException

Example Syntax:

ToString

[C#) public ArgumentOutOfRangeException(string paramName, object actualValue, string message);

[C++] public: ArgumentOutOfRangeException(String* paramName, Object* actualValue, String* message);

[VB] Public Sub New(ByVal paramName As String, ByVal actualValue As Object, ByVal message As String)

[JScript] public function ArgumentOutOfRangeException (paramName: String, actualValue: Object, message: String);

Description

Initializes a new instance of the System.ArgumentOutOfRangeException class with a specified error message, the parameter name, and the value of the argument.

This constructor with the additional argument actualValue is not used within the .NET Framework class library. The System.ArgumentOutOfRangeException.ActualValue property is provided so that applications can make use of the available argument value. The name of the invalid parameter. The value of the argument that causes this exception. The error message that explains the reason for the exception.

ActualValue

ToString

[C#] public virtual object ActualValue {get;}

[C++] public: _property virtual Object* get_ActualValue( );

[VB] Overridable Public ReadOnly Property ActualValue As Object

[JScript] public function get ActualValue( ): Object;

Description

Gets the argument value that causes this exception.

The System.ArgumentOutOfRangeException.ActualValue property is assigned a value at the time of object construction. If the System.ArgumentOutOfRangeException.ActualValue property value is not null, a string representation of the value is then appended to the message string held by the System.ArgumentOutOfRangeException.Message property.

HelpLink

HResult

InnerException

Message

ToString

Description

Gets the error message and the string representation of the invalid argument value, or only the error message if the argument value is null.

This property overrides System.ArgumentException.Message.

ParamName

Source

StackTrace

TargetSite

GetObjectData

[C#] public override void GetObjectData(SerializationInfo info, StreamingContext context);

[C++] public: void GetObjectData(SerializationInfo* info, StreamingContext context);

[VB] Overrides Public Sub GetObjectData(ByVal info As SerializationInfo, ByVal context As StreamingContext)

[JScript] public override function GetObjectData(info: SerializationInfo, context: StreamingContext);

Description

Sets the System.Runtime.Serialization.SerializationInfo object with the invalid argument value and additional exception information.

System.ArgumentOutOfRangeException.GetObjectData (System.Runtime. Serialization.SerializationInfo,System.Runtime.Serialization.StreamingContext) sets a System.Runtime.Serialization.SerializationInfo with all the exception object data targeted for serialization. During deserialization, the exception object is reconstituted from the System.Runtime.Serialization.SerializationInfo transmitted over the stream. The object that holds the serialized object data. The contextual information about the source or destination.

ArithmeticException class (System)

ToString

Description

The exception that is thrown for errors in an arithmetic, casting, or conversion operation. System.ArithmeticException is the base class for System.DivideByZeroException, System.NotFiniteNumberException, and System.OverflowException. In general, use one of the derived classes of System.ArithmeticException to more precisely indicate the exact nature of the error. Throw an System.ArithmeticException if you are only interested in capturing a general arithmetic error.

ArithmeticException

Example Syntax:

ToString

[C#] public ArithmeticException( );

[C++] public: ArithmeticException( );

[VB] Public Sub New( )

[JScript] public function ArithmeticException( ); Initializes a new instance of the System.ArithmeticException class.

Description

Initializes a new instance of the System.ArithmeticException class with

The following table shows initial property values for an instance of System.ArithmeticException.

ArithmeticException

Example Syntax:

ToString

[C#] public ArithmeticException(string message);

[C++] public: ArithmeticException(String* message);

[VB] Public Sub New(ByVal message As String)

[JScript] public function ArithmeticException(message: String);

Description

Initializes a new instance of the System.ArithmeticException class with a specified error message.

The following table shows initial property values for an instance of System.ArithmeticException. The error message that explains the reason for the exception.

ArithmeticException

Example Syntax:

ToString

[C#] protected ArithmeticException(SerializationInfo info, StreamingContext context);

[C++] protected: ArithmeticException(SerializationInfo* info, StreamingContext context);

[VB] Protected Sub New(ByVal info As SerializationInfo, ByVal context As StreamingContext)

[JScript] protected function ArithmeticException(info: SerializationInfo, context: StreamingContext);

Description

Initializes a new instance of the System.ArithmeticException class with serialized data.

This constructor is called during deserialization to reconstitute the exception object transmitted over a stream. For more information, see. The object that holds the serialized object data. The contextual information about the source or destination.

ArithmeticException

Example Syntax:

ToString

[C#] public ArithmeticException(string message, Exception innerException);

[C++] public: ArithmeticException(String* message, Exception* innerException);

[VB] Public Sub New(ByVal message As String, ByVal innerException As Exception)

[JScript] public function ArithmeticException(message: String, innerException: Exception);

Description

Initializes a new instance of the System.ArithmeticException class with a specified error message and a reference to the exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If innerException is non-null, then the current Exception is raised in a catch block handling innerException.

HelpLink

HResult

InnerException

Message

Source

StackTrace

TargetSite

Array class (System)

ToString

Description

Provides methods for creating, manipulating, searching and sorting arrays, thereby serving as the base class for all arrays in the common language runtime.

An element is a value in the System.Array. The length of an System.Array is the total number of elements it can contain. The rank of an System.Array is the number of dimensions in the System.Array. The lower bound or lowbound of a dimension of an System.Array is the starting index of that dimension of the System.Array; a multidimensional System.Array can have different bounds for each dimension.

Array

Example Syntax:

ToString

[C#] protected Array( );

[C++] protected: Array( );

[VB] Protected Sub New( )

[JScript] protected function Array( );

IsFixedSize

ToString

[C#] public virtual bool IsFixedSize {get;}

[C++] public: _property virtual bool get_IsFixedSize( );

[VB] Overridable Public ReadOnly Property IsFixedSize As Boolean

[JScript] public function get IsFixedSize( ): Boolean;

Description

Gets a value indicating whether the System.Array has a fixed size.

This method implements the System.Collections.IList interface. It can be overridden by a derived class.

IsReadOnly

ToString

[C#] public virtual bool IsReadOnly {get;}

[C++] public: _property virtual bool get_IsReadOnly( );

[VB] Overridable Public ReadOnly Property IsReadOnly As Boolean

[JScript] public function get IsReadOnly( ): Boolean;

Description

Gets a value indicating whether the System.Array is read-only.

This method implements the System.Collections.IList interface. It can be overridden by a derived class.

IsSynchronized

ToString

[C#] public virtual bool IsSynchronized {get;}

[C++] public: _property virtual bool get_IsSynchronized( );

[VB] Overridable Public ReadOnly Property IsSynchronized As Boolean

[JScript] public function get IsSynchronized( ): Boolean;

Description

Gets a value indicating whether access to the System.Array is synchronized (thread-safe).

This property implements the System.Collections.ICollection interface.

Length

ToString

[C#] public int Length {get;}

[C++] public: _property int get_Length( );

[VB] Public ReadOnly Property Length As Integer

[JScript] public function get Length( ): int;

Description

Gets the total number of elements in all the dimensions of the System.Array.

Rank

ToString

[C#] public int Rank {get;}

[C++] public: _property int get_Rank( );

[VB] Public ReadOnly Property Rank As Integer

[JScript] public function get Rank( ): int;

Description

Gets the rank (number of dimensions) of the System.Array.

SyncRoot

ToString

[C#] public virtual object SyncRoot {get;}

[C++] public: _property virtual Object* get_SyncRoot( );

[VB] Overridable Public ReadOnly Property SyncRoot As Object

[JScript] public function get SyncRoot( ): Object;

Description

Gets an object that can be used to synchronize access to the System.Array

This property implements the System.Collections.ICollection interface.

BinarySearch

[C#] public static int BinarySearch(Array array, object value);

[C++] public: static int BinarySearch(Array* array, Object* value);

[VB] Public Shared Function BinarySearch(ByVal array As Array, ByVal value As Object) As Integer

[JScript] public static function BinarySearch(array: Array, value: Object): int; Searches a one-dimensional sorted System.Array for a value, using a binary search algorithm.

Description

Searches a one-dimensional sorted System.Array for a specific element, using the System.IComparable interface implemented by each element of the System.Array and by the specified System.Object.

Return Value: The index of value in the System.Array, if value is found; otherwise, a negative number, which is the bitwise complement of the index of the first element that is larger than value.

The value parameter and each element of array must implement the System.IComparable interface, which is used for comparisons. If array's elements are not already sorted in increasing value according to the System.IComparable implementation, the result might be incorrect. Duplicate elements are allowed. The one-dimensional System.Array to search. The System.Object to search for.

BinarySearch

[C#] public static int BinarySearch(Array array, object value, IComparer comparer);

[C++] public: static int BinarySearch(Array* array, Object* value, IComparer* comparer);

[VB] Public Shared Function BinarySearch(ByVal array As Array, ByVal value As Object, ByVal comparer As IComparer) As Integer

[JScript] public static function BinarySearch(array: Array, value: Object, comparer: IComparer): int;

Description

Searches a one-dimensional sorted System.Array for a value, using the specified System.Collections.IComparer interface.

Return Value: The index of value in the System.Array, if value is found; otherwise, a negative number, which is the bitwise complement of the index of the first element that is larger than value.

The comparer customizes how the elements are compared. For example, you can use a System.Collections.CaseInsensitiveComparer instance as the comparer to perform case-insensitive string searches. The one-dimensional System.Array to search. The System.Object to search for. The System.Collections.IComparer implementation to use when comparing elements.

BinarySearch

[C#] public static int BinarySearch(Array array, int index, int length, object value);

[C++] public: static int BinarySearch(Array* array, int index, int length, Object* value);

[VB] Public Shared Function BinarySearch(ByVal array As Array, ByVal index As Integer, ByVal length As Integer, ByVal value As Object) As Integer

[JScript] public static function BinarySearch(array: Array, index: int, length: int, value: Object): int;

Description

Searches a section of a one-dimensional sorted System.Array for a value, using the System.IComparable interface implemented by each element of the System.Array and by the specified value.

Return Value: The index of value in the System.Array, if value is found; otherwise, a negative number, which is the bitwise complement of the index of the first element that is larger than value.

The value parameter and each element of array must implement the System.IComparable interface, which is used for comparisons. If array's elements are not already sorted in increasing value according to the System.IComparable implementation, the result might be incorrect. Duplicate elements are allowed. The one-dimensional System.Array to search. The starting index of the range to search. The length of the range to search. The System.Object to search for.

BinarySearch

[C#] public static int BinarySearch(Array array, int index, int length, object value, IComparer comparer);

[C++] public: static int BinarySearch(Array* array, int index, int length, Object* value, IComparer* comparer);

[VB] Public Shared Function BinarySearch(ByVal array As Array, ByVal index As Integer, ByVal length As Integer, ByVal value As Object, ByVal comparer As IComparer) As Integer

[JScript] public static function BinarySearch(array: Array, index: int, length: int, value: Object, comparer: IComparer) int;

Description

Searches a section of a one-dimensional sorted System.Array for a value, using the specified System.Collections.IComparer interface.

Return Value: The index of value in the System.Array, if value is found; otherwise, a negative number, which is the bitwise complement of the index of the first element that is larger than value.

The comparer customizes how the elements are compared. For example, you can use a System.Collections.CaseInsensitiveComparer instance as the comparer to perform case-insensitive string searches. The one-dimensional System.Array to search. The starting index of the range to search. The length of the range to search. The System.Object to search for. The System.Collections.IComparer implementation to use when comparing elements.

Clear

[C#] public static void Clear(Array array, int index, int length);

[C++] public: static void Clear(Array* array, int index, int length);

[VB] Public Shared Sub Clear(ByVal array As Array, ByVal index As Integer, ByVal length As Integer)

[JScript] public static function Clear(array: Array, index: int, length: int);

Description

Sets a range of elements in the System.Array to zero or to null.

Reference-type elements are set to null. Value-type elements are set to zero. The System.Array whose elements need to be cleared. The starting index of the range of elements to clear. The number of elements to clear.

Clone

[C#] public virtual object Clone( );

[C++] public: virtual Object* Clone( );

[VB] Overridable Public Function Clone( ) As Object

[JScript] public function Clone( ): Object;

Description

Creates a shallow copy of the System.Array

Return Value: A shallow copy of the System.Array.

This method can be overridden by a derived class.

Copy

[C#] public static void Copy(Array sourceArray, Array destinationArray, int length);

[C++] public: static void Copy(Array* sourceArray, Array* destinationArray, int length);

[VB] Public Shared Sub Copy(ByVal sourceArray As Array, ByVal destinationArray As Array, ByVal length As Integer)

[JScript] public static function Copy(sourceArray: Array, destinationArray: Array, length: int); Copies a section of one System.Array to another System.Array and performs type downcasting as required.

Description

Copies a range of elements from an System.Array starting at the first element and pastes them into another System.Array starting at the first element.

sourceArray and destinationArray must have the same number of dimensions. The System.Array that contains the data to copy. The System.Array that receives the data. The number of elements to copy.

Copy

[C#] public static void Copy(Array sourceArray, int sourceIndex, Array destinationArray, int destinationIndex, int length);

[C++] public: static void Copy(Array* sourceArray, int sourceIndex, Array* destinationArray, int destinationIndex, int length);

[VB] Public Shared Sub Copy(ByVal sourceArray As Array, ByVal sourceIndex As Integer, ByVal destinationArray As Array, ByVal destinationIndex As Integer, ByVal length As Integer)

[JScript] public static function Copy(sourceArray: Array, sourceIndex: int, destinationArray: Array, destinationIndex: int, length: int);

Description

Copies a range of elements from an System.Array starting at the specified source index and pastes them to another System.Array starting at the specified destination index.

sourceArray and destinationArray must have the same number of dimensions. The System.Array that contains the data to copy. The index in the sourceArray at which copying begins. The System.Array that receives the data. The index in the destinationArray at which storing begins. The number of elements to copy.

CopyTo

[C#] public virtual void CopyTo(Array array, int index);

[C++] public: virtual void CopyTo(Array* array, int index);

[VB] Overridable Public Sub CopyTo(ByVal array As Array, ByVal index As Integer)

[JScript] public function CopyTo(array: Array, index: int);

Description

Copies all the elements of the current one-dimensional System.Array to the specified one-dimensional System.Array starting at the specified destination System.Array index.

This method can be overridden by a derived class. The one-dimensional System.Array that is the destination of the elements copied from the current System.Array. The zero-based relative index in array at which copying begins.

CreateInstance

[C#] public static Array CreateInstance(Type elementType, int length);

[C++] public: static Array* CreateInstance(Type* elementType, int length);

[VB] Public Shared Function CreateInstance(ByVal elementType As Type, ByVal length As Integer) As Array

[JScript] public static function CreateInstance(elementType: Type, length: int) Array; Initializes a new instance of the System.Array class.

Description

Creates a one-dimensional System.Array of the specified System.Type and length, with zero-based indexing.

Return Value: A new one-dimensional System.Array of the specified System.Type with the specified length, using zero-based indexing.

Unlike most classes, System.Array provides the System.Array.CreateInstance(System.Type,System.Int32) method, instead of public constructors, to allow for late bound access. The System.Type of System.Array to create. The size of the System.Array to create.

CreateInstance

[C#] public static Array CreateInstance(Type elementType, int[ ] lengths);

[C++] public: static Array* CreateInstance(Type* elementType, int lengths _gc[ ]);

[VB] Public Shared Function CreateInstance(ByVal elementType As Type, ByVal lengths( ) As Integer) As Array

[JScript] public static function CreateInstance(elementType: Type, lengths: int[ ]): Array;

Description

Creates a multidimensional System.Array of the specified System.Type and dimension lengths, with zero-based indexing.

Return Value: A new multidimensional System.Array of the specified System.Type with the specified length for each dimension, using zero-based indexing.

Unlike most classes, System.Array provides the System.Array.CreateInstance(System.Type,System.Int32) method, instead of public constructors, to allow for late bound access. The System.Type of System.Array to create. An array that contains the size of each dimension of the System.Array to create.

CreateInstance

[C#] public static Array CreateInstance(Type elementType, int length, int Length2);

[C++] public: static Array* CreateInstance(Type* elementType, int length, int length2);

[VB] Public Shared Function CreateInstance(ByVal elementType As Type, ByVal length1 As Integer, ByVal length2 As Integer) As Array

[JScript] public static function CreateInstance(elementType: Type, length1: int, length2: int): Array;

Description

Creates a two-dimensional System.Array of the specified System.Type and dimension lengths, with zero-based indexing.

Return Value: A new two-dimensional System.Array of the specified System.Type with the specified length for each dimension, using zero-based indexing.

Unlike most classes, System.Array provides the System.Array.CreateInstance(System.Type,System.Int32) method, instead of public constructors, to allow for late bound access. The System.Type of System.Array to create. The size of the first dimension of the System.Array to create. The size of the second dimension of the System.Array to create.

CreateInstance

[C#] public static Array CreateInstance(Type elementType, int[ ] lengths, int[ ] lowerBounds);

[C++] public: static Array* CreateInstance(Type* elementType, int lengths _gc[ ], int lowerBounds _gc[ ]);

[VB] Public Shared Function CreateInstance(ByVal elementType As Type, ByVal lengths( ) As Integer, ByVal lowerBounds( ) As Integer) As Array

[JScript] public static function CreateInstance(elementType: Type, lengths: int[ ], lowerBounds: int[ ]): Array;

Description

Creates a multidimensional System.Array of the specified System.Type and dimension lengths, with the specified lower bounds.

Return Value: A new multidimensional System.Array of the specified System.Type with the specified length and lower bound for each dimension.

Unlike most classes, System.Array provides the System.Array.CreateInstance(System.Type,System.Int32) method, instead of public constructors, to allow for late bound access. The System.Type of System.Array to create. A one-dimensional array that contains the size of each dimension of the System.Array to create. A one-dimensional array that contains the lower bound (starting index) of each dimension of the System.Array to create.

CreateInstance

[C#] public static Array CreateInstance(Type elementType, int length1, int length2, int length3);

[C++] public: static Array* CreateInstance(Type* elementType, int length1, int length2, int length3);

[VB] Public Shared Function CreateInstance(ByVal elementType As Type, ByVal length1 As Integer, ByVal length2 As Integer, ByVal length3 As Integer) As Array

[JScript] public static function CreateInstance(elementType: Type, length1: int, length2: int, length3: int): Array;

Description

Creates a three-dimensional System.Array of the specified System.Type and dimension lengths, with zero-based indexing.

Return Value: A new three-dimensional System.Array of the specified System.Type with the specified length for each dimension, using zero-based indexing.

Unlike most classes, System.Array provides the System.Array.CreateInstance(System.Type,System.Int32) method, instead of public constructors, to allow for late bound access. The System.Type of System.Array to create. The size of the first dimension of the System.Array to create. The size of the second dimension of the System.Array to create. The size of the third dimension of the System.Array to create.

GetEnumerator

[C#] public virtual IEnumerator GetEnumerator( );

[C++] public: virtual IEnumerator* GetEnumerator( );

[VB] Overridable Public Function GetEnumerator( ) As IEnumerator

[JScript] public function GetEnumerator( ): IEnumerator;

Description

Returns an System.Collections.IEnumerator for the System.Array.

Return Value: An System.Collections.IEnumerator for the System.Array.

This method can be overridden by a derived class.

GetLength

[C#] public int GetLength(int dimension);

[C++] public: int GetLength(int dimension);

[VB] Public Function GetLength(ByVal dimension As Integer) As Integer

[JScript] public function GetLength(dimension: int): int;

Description

Gets the number of elements in the specified dimension of the System.Array.

Return Value: The number of elements in the specified dimension.

For example, GetLength(0) returns the number of elements in the first dimension of the System.Array. A zero-based dimension of the System.Array whose length needs to be determined.

GetLowerBound

[C#] public int GetLowerBound(int dimension);

[C++] public: int GetLowerBound(int dimension);

[VB] Public Function GetLowerBound(ByVal dimension As Integer) As Integer

[JScript] public function GetLowerBound(dimension: int): int;

Description

Gets the lower bound of the specified dimension in the System.Array

Return Value: The lower bound of the specified dimension in the System.Array. For example, GetLowerBound(0) returns the lower bound for the indexes of the first dimension of the System.Array, and GetLowerBound(Rank−1) returns the lower bound of the last dimension of the System.Array. A zero-based dimension of the System.Array whose lower bound needs to be determined.

GetUpperBound

[C#] public int GetUpperBound(int dimension);

[C++] public: int GetUpperBound(int dimension);

[VB] Public Function GetUpperBound(ByVal dimension As Integer) As Integer

[JScript] public function GetUpperBound(dimension: int): int;

Description

Gets the upper bound of the specified dimension in the System.Array.

Return Value: The upper bound of the specified dimension in the System.Array.

For example, GetUpperBound(0) returns the upper bound for the indexes of the first dimension of the System.Array and GetUpperBound(Rank−1) returns the upper bound of the last dimension of the System.Array. A zero-based dimension of the System.Array whose upper bound needs to be determined.

GetValue

[C#] public object GetValue(int index);

[C++] public: Object* GetValue(int index);

[VB] Public Function GetValue(ByVal index As Integer) As Object

[JScript] public function GetValue(index: int): Object;

Description

Gets the value at the specified position in a one-dimensional System.Array

Return Value: The value at the specified position in the one-dimensional System.Array.

The System.Array.GetLowerBound(System.Int32) and ISystem.Array.GetUpperBound(System.Int32) methods can determine whether the value of index is out of bounds. The position of the value to get from the System.Array.

GetValue

[C#] public object GetValue(int[ ] indices);

[C++] public: Object* GetValue(int indices_gc[ ]);

[VB] Public Function GetValue(ByVal indices( ) As Integer) As Object

[JScript] public function GetValue(indices: int[ ]): Object;

Gets the values of the System.Array elements at the specified indexes.

Description

Gets the value at the specified position in a multidimensional System.Array.

Return Value: The value at the specified position in the System.Array.

The number of elements in indices must equal the number of dimensions in the System.Array. All elements in the indices array must collectively specify the position of the desired element in the multidimensional System.Array. A one-dimensional array of indexes that specifies the position of the element to get from the System.Array.

GetValue

[C#] public object GetValue(int index1, int index2);

[C++] public: Object* GetValue(int index1, int index2);

[VB] Public Function GetValue(ByVal index1 As Integer, ByVal index2 As Integer) As Object

[JScript] public function GetValue(index1: int, index2: int): Object;

Description

Gets the value at the specified position in a two-dimensional System.Array

Return Value: The value at the specified position in the System.Array.

The System.Array.GetLowerBound(System.Int32) and System.Array.GetUpperBound(System.Int32) methods can determine whether any of the indexes is out of bounds. The first-dimension index of the System.Array element to get. The second-dimension index of the System.Array element to get.

GetValue

[C#] public object GetValue(int index1, int index2, int index3);

[C++] public: Object* GetValue(int index1, int index2, int index3);

[VB] Public Function GetValue(ByVal index1 As Integer, ByVal index2 As Integer, ByVal index3 As Integer) As Object

[JScript] public function GetValue(index1: int, index2: int, index3: int): Object;

Description

Gets the value at the specified position in a three-dimensional System.Array.

Return Value: The value at the specified position in the System.Array.

The System.Array.GetLowerBound(System.Int32) and System.Array.GetUpperBound(System.Int32) methods can determine whether any of the indexes is out of bounds. The first-dimension index of the System.Array element to get. The second-dimension index of the System.Array element to get. The third-dimension index of the System.Array element to get.

IndexOf

[C#] public static int IndexOf(Array array, object value);

[C++] public: static int IndexOf(Array* array, Object* value);

[VB] Public Shared Function IndexOf(ByVal array As Array, ByVal value As Object) As Integer

[JScript] public static function IndexOf(array: Array, value: Object): int; Returns the index of the first occurrence of a value in a one-dimensional System.Array or in a portion of the System.Array.

Description

Searches for the specified System.Object and returns the index of the first occurrence within the entire one-dimensional System.Array.

Return Value: The index of the first occurrence of value within the entire array, if found; otherwise, the lower bound of the array−1.

The one-dimensional System.Array is searched forward starting at the first element and ending at the last element. The elements are compared to the specified value using the System.Object.Equals(System.Object) method. The one-dimensional System.Array to search. The System.Object to locate in array.

IndexOf

[C#] public static int IndexOf(Array array, object value, int startIndex);

[C++] public: static int IndexOf(Array* array, Object* value, int startIndex);

[VB] Public Shared Function IndexOf(ByVal array As Array, ByVal value As Object, ByVal startIndex As Integer) As Integer

[JScript] public static function IndexOf(array: Array, value: Object, startIndex: int): int;

Description

Searches for the specified System.Object and returns the index of the first occurrence within the section of the one-dimensional System.Array that extends from the specified index to the last element.

Return Value: The index of the first occurrence of value within the section of array that extends from startIndex to the last element, if found; otherwise, the lower bound of the array−1.

The one-dimensional System.Array is searched forward starting at startIndex and ending at the last element. The elements are compared to the specified value using the System.Object.Equals(System.Object) method. The one-dimensional System.Array to search. The System.Object to locate in array. The starting index of the search.

IndexOf

[C#] public static int IndexOf(Array array, object value, int startIndex, it count);

[C++] public: static int IndexOf(Array* array, Object* value, int startIndex, int count);

[VB] Public Shared Function IndexOf(ByVal array As Array, ByVal value As Object, ByVal startIndex As Integer, ByVal count As Integer) As Integer

[JScript] public static function IndexOf(array: Array, value: Object, startIndex: int, count: int): int;

Description

Searches for the specified System.Object and returns the index of the first occurrence within the section of the one-dimensional System.Array that starts at g the specified index and contains the specified number of elements.

Return Value: The index of the first occurrence of value within the section of array that starts at startIndex and contains count number of elements, if found; otherwise, the lower bound of the array−1.

The one-dimensional System.Array is searched forward starting at startIndex and ending at startIndex+count−1. The elements are compared to the specified value using the System.Object.Equals(System.Object) method. The one-dimensional System.Array to search. The System.Object to locate in array. The starting index of the search. The number of elements in the section to search.

Initialize

[C#] public void Initialize( );

[C++] public: void Initialize( );

[VB] Public Sub Initialize( )

[JScript] public function Initialize( );

Description

Initializes every element of the value-type System.Array by calling the default constructor of the value type.

This method must not be used on reference-type arrays.

LastIndexOf

[C#] public static int LastIndexOf(Array array, object value);

[C++] public: static int LastIndexOf(Array* array, Object* value);

[VB] Public Shared Function LastIndexOf(ByVal array As Array, ByVal value As Object) As Integer

[JScript] public static function LastIndexOf(array: Array, value: Object): int; Returns the index of the last occurrence of a value in a one-dimensional System.Array or in a portion of the System.Array.

Description

Searches for the specified System.Object and returns the index of the last occurrence within the entire one-dimensional System.Array.

Return Value: The index of the last occurrence of value within the entire array, if found; otherwise, the lower bound of the array−1.

The one-dimensional System.Array is searched backward starting at the last element and ending at the first element. The elements are compared to the specified value using the System.Object.Equals(System.Object) method. The one-dimensional System.Array to search. The System.Object to locate in array.

LastIndexOf

[C#] public static int LastIndexOf(Array array, object value, int startIndex);

[C++] public: static int LastIndexOf(Array* array, Object* value, int startIndex);

[VB] Public Shared Function LastIndexOf(ByVal array As Array, ByVal value As Object, ByVal startIndex As Integer) As Integer

[JScript] public static function LastIndexOf(array: Array, value: Object, startIndex: int): int;

Description

Searches for the specified System.Object and returns the index of the last occurrence within the section of the one-dimensional System.Array that extends from the first element to the specified index.

Return Value: The index of the last occurrence of value within the section of array that extends from the first element to startIndex, if found; otherwise, the lower bound of the array−1.

The one-dimensional System.Array is searched backward starting at startIndex and ending at the first element. The elements are compared to the specified value using the System.Object.Equals(System.Object) method. The one-dimensional System.Array to search. The System.Object to locate in array. The starting index of the backward search.

LastIndexOf

[C#] public static int LastIndexOf(Array array, object value, int startIndex, int count);

[C++] public: static int LastIndexOf(Array* array, Object* value, int startIndex, int count);

[VB] Public Shared Function LastIndexOf(ByVal array As Array, ByVal value As Object, ByVal startIndex As Integer, ByVal count As Integer) As Integer

[JScript] public static function LastIndexOf(array: Array, value: Object, startIndex: int, count: int): int;

Description

Searches for the specified System.Object and returns the index of the last occurrence within the section of the one-dimensional System.Array that contains the specified number of elements and ends at the specified index.

Return Value: The index of the last occurrence of value within the section of array that contains count number of elements and ends at startIndex, if found; otherwise, the lower bound of the array−1.

The one-dimensional System.Array is searched backward starting at startIndex and ending at startIndex−count+1. The elements are compared to the specified value using the System.Object.Equals(System.Object) method. The one-dimensional System.Array to search. The System.Object to locate in array. The starting index of the backward search. The number of elements in the section to search.

Reverse

[C#] public static void Reverse(Array array);

[C++] public: static void Reverse(Array* array);

[VB] Public Shared Sub Reverse(ByVal array As Array) to

[JScript] public static function Reverse(array: Array); Reverses the order of the elements in a one-dimensional System.Array or in a portion of the System.Array Description Reverses the sequence of the elements in the entire one-dimensional System.Array.

After a call to this method, the element at myArray[i], where i is any index in the array, moves to myArray[j], where j equals (myArray.Length+myArray.GetLowerBound(0))−(i−myArray.GetLowerBound(0))−1. The one-dimensional System.Array to reverse.

Reverse

[C#] public static void Reverse(Array array, int index, int length);

[C++] public: static void Reverse(Array* array, int index, int length);

[VB] Public Shared Sub Reverse(ByVal array As Array, ByVal index As Integer, ByVal length As Integer)

[JScript] public static function Reverse(array: Array, index: int, length: int);

Description

Reverses the sequence of the elements in a section of the one-dimensional System.Array.

After a call to this method, the element at myArray[i], where i is any index in the array, moves to myArray[j], where j equals (myArray.Length+myArray.GetLowerBound(0))−(i−myArray.GetLowerBound(0))−1. The one-dimensional System.Array to reverse. The starting index of the section to reverse. The number of elements in the section to reverse.

SetValue

[C#] public void SetValue(object value, int index);

[C++] public: void SetValue(Object* value, int index);

[VB] Public Sub SetValue(ByVal value As Object, ByVal index As Integer)

[JScript] public function SetValue(value: Object, index: int); Sets the specified System.Array elements to the specified value.

Description

Sets a value to the element at the specified position in a one-dimensional System.Array.

The System.Array.GetLowerBound(System.Int32) and System.Array.GetUpperBound(System.Int32) methods can determine whether the value of index is out of bounds. The new value for the specified element. The position of the System.Array element to set.

SetValue

[C#] public void SetValue(object value, int[ ] indices);

[C++] public: void SetValue(Object* value, int indices_gc[ ]);

[VB] Public Sub SetValue(ByVal value As Object, ByVal indices( ) As Integer)

[JScript] public function SetValue(value: Object, indices: int[ ]);

Description

Sets a value to the element at the specified position in a multidimensional System.Array.

The number of elements in indices must equal the number of dimensions in the System.Array. All elements in the indices array must collectively specify the Is position of the desired element in the multidimensional System.Array. The new value for the specified element. A one-dimensional array of indexes that specifies the position of the element to set.

SetValue

[C#] public void SetValue(object value, int index1, it index2);

[C++] public: void SetValue(Object* value, int index1, int index2);

[VB] Public Sub SetValue(ByVal value As Object, ByVal index1 As Integer, ByVal index2 As Integer)

[JScript] public function SetValue(value: Object, index1: int, index2: int);

Description

Sets a value to the element at the specified position in a two-dimensional System.Array.

The System.Array.GetLowerBound(System.Int32) and System.Array.GetUpperBound(System.Int32) methods can determine whether any of the indexes is out of bounds. The new value for the specified element. The first-dimension index of the System.Array element to set. The second-dimension index of the System.Array element to set.

SetValue

[C#] public void SetValue(object value, int index1, int index2, int index3);

[C++] public: void SetValue(Object* value, int index1, int index2, int index3);

[VB] Public Sub SetValue(ByVal value As Object, ByVal index1 As Integer, ByVal index2 As Integer, ByVal index3 As Integer)

[JScript] public function SetValue(value: Object, index1: int, index2: int, index3 int);

Description

Sets a value to the element at the specified position in a three-dimensional System.Array.

The System.Array.GetLowerBound(System.Int32) and System.Array.GetUpperBound(System.Int32) methods can determine whether any of the indexes is out of bounds. The new value for the specified element. The first-dimension index of the System.Array element to set. The second-dimension index of the System.Array element to set. The third-dimension index of the System.Array element to set.

Sort

[C#] public static void Sort(Array array);

[C++] public: static void Sort(Array* array);

[VB] Public Shared Sub Sort(ByVal array As Array)

[JScript] public static function Sort(array: Array); Sorts the elements in one-dimensional System.Array objects.

Description

Sorts the elements in an entire one-dimensional System.Array using the System.IComparable interface implemented by each element of the System.Array.

Each element of array must implement the System.IComparable interface to be capable of comparisons with every other element in array. The one-dimensional System.Array to sort.

Sort

[C#] public static void Sort(Array keys, Array items);

[C++] public: static void Sort(Array* keys, Array* items);

[VB] Public Shared Sub Sort(ByVal keys As Array, ByVal items As Array)

[JScript] public static function Sort(keys: Array, items: Array);

Description

Sorts a pair of one-dimensional System.Array objects (one contains the keys and the other contains the corresponding items) based on the keys in the first System.Array using the System.IComparable interface implemented by each key.

Each key in the keysSystem.Array has a corresponding item in the itemsSystem.Array. When a key is repositioned during the sorting, the corresponding item in the itemsSystem.Array is similarly repositioned. Therefore, the itemsSystem.Array is sorted according to the arrangement of the corresponding keys in the keysSystem.Array. The one-dimensional System.Array that contains the keys to sort. The one-dimensional System.Array that contains the items that correspond to each of the keys in the keysSystem.Array.

Sort

[C#] public static void Sort(Array array, IComparer comparer);

[C++] public: static void Sort(Array* array, IComparer* comparer);

[VB] Public Shared Sub Sort(ByVal array As Array, ByVal comparer As IComparer)

[JScript] public static function Sort(array: Array, comparer: IComparer);

Description

Sorts the elements in a one-dimensional System.Array using the specified System.Collections.IComparer interface.

If comparer is null, each element of array must implement the System.IComparable interface to be capable of comparisons with every other element in array. The one-dimensional System.Array to sort. The System.Collections.IComparer implementation to use when comparing elements.

Sort

[C#] public static void Sort(Array keys, Array items, IComparer comparer);

[C++] public: static void Sort(Array* keys, Array* items, IComparer* comparer);

[VB] Public Shared Sub Sort(ByVal keys As Array, ByVal items As Array, ByVal comparer As IComparer)

[JScript] public static function Sort(keys: Array, items: Array, comparer: IComparer);

Description

Sorts a pair of one-dimensional System.Array objects (one contains the keys and the other contains the corresponding items) based on the keys in the first System.Array using the specified System.Collections.IComparer interface.

Each key in the keysSystem.Array has a corresponding item in the itemsSystem.Array. When a key is repositioned during the sorting, the corresponding item in the itemsSystem.Array is similarly repositioned. Therefore, the itemsSystem.Array is sorted according to the arrangement of the corresponding keys in the keysSystem.Array. The one-dimensional System.Array that contains the keys to sort. The one-dimensional System.Array that contains the items that correspond to each of the keys in the keysSystem.Array. The System.Collections.IComparer implementation to use when comparing elements.

Sort

[C#] public static void Sort(Array array, int index, int length);

[C++] public: static void Sort(Array* array, int index, int length);

[VB] Public Shared Sub Sort(ByVal array As Array, ByVal index As Integer, ByVal length As Integer)

[JScript] public static function Sort(array: Array, index: int, length: int);

Description

Sorts the elements in a section of a one-dimensional System.Array using the System.IComparable interface implemented by each element of the System.Array.

Each element within the specified section of array must implement the System.IComparable interface to be capable of comparisons with every other element in array. The one-dimensional System.Array to sort. The starting index of the range to sort. The number of elements in the range to sort.

Sort

[C#] public static void Sort(Array keys, Array items, int index, int length);

[C++] public: static void Sort(Array* keys, Array* items, int index, int length);

[VB] Public Shared Sub Sort(ByVal keys As Array, ByVal items As Array, ByVal index As Integer, ByVal length As Integer)

[JScript] public static function Sort(keys: Array, items: Array, index: int, length int);

Description

Sorts a section of a pair of one-dimensional System.Array objects (one contains the keys and the other contains the corresponding items) based on the keys in the first System.Array using the System.IComparable interface implemented by each key.

Each key in the keysSystem.Array has a corresponding item in the itemsSystem.Array. When a key is repositioned during the sorting, the corresponding item in the itemsSystem.Array is similarly repositioned. Therefore, the itemsSystem.Array is sorted according to the arrangement of the corresponding keys in the keysSystem.Array. The one-dimensional System.Array that contains the keys to sort. The one-dimensional System.Array that contains the items that correspond to each of the keys in the keysSystem.Array. The starting index of the range to sort. The number of elements in the range to sort.

Sort

[C#] public static void Sort(Array array, int index, int length, IComparer comparer);

[C++] public: static void Sort(Array* array, int index, int length, IComparer* comparer);

[VB] Public Shared Sub Sort(ByVal array As Array, ByVal index As Integer, ByVal length As Integer, ByVal comparer As IComparer)

[JScript] public static function Sort(array: Array, index: int, length: int, comparer: IComparer);

Description

Sorts the elements in a section of a one-dimensional System.Array using the specified System.Collections.IComparer interface.

If comparer is null, each element within the specified section of array must implement the System.IComparable interface to be capable of comparisons with every other element in array. The one-dimensional System.Array to sort. The starting index of the range to sort. The number of elements in the range to sort. The System.Collections.IComparer implementation to use when comparing elements.

Sort

[C#] public static void Sort(Array keys, Array items, int index, int length, IComparer comparer);

[C++] public: static void Sort(Array* keys, Array* items, int index, int length, IComparer* comparer);

[VB] Public Shared Sub Sort(ByVal keys As Array, ByVal items As Array, ByVal index As Integer, ByVal length As Integer, ByVal comparer As IComparer)

[JScript] public static function Sort(keys: Array, items: Array, index: int, length: int, comparer: IComparer);

Description

Sorts a section of a pair of one-dimensional System.Array objects (one contains the keys and the other contains the corresponding items) based on the keys in the first System.Array using the specified System.Collections.IComparer interface.

Each key in the keysSystem.Array has a corresponding item in the itemsSystem.Array. When a key is repositioned during the sorting, the corresponding item in the itemsSystem.Array is similarly repositioned. Therefore, the itemsSystem.Array is sorted according to the arrangement of the corresponding keys in the keysSystem.Array. The one-dimensional System.Array that contains the keys to sort. The one-dimensional System.Array that contains the items that correspond to each of the keys in the keysSystem.Array. The starting index of the range to sort. The number of elements in the range to sort. The System.Collections.IComparer implementation to use when comparing elements.

IList.Add

[C#] int IList.Add(object value);

[C++] int IList::Add(Object* value);

[VB] Function Add(ByVal value As Object) As Integer Implements IList.Add

[JScript] function IList.Add(value: Object): int;

IList.Clear

[C#] void IList.Clear( );

[C++] void IList::Clear( );

[VB] Sub Clear( ) Implements IList.Clear

[JScript] function IList.Clear( );

IList.Contains

[C#] bool IList.Contains(object value);

[C++] bool IList::Contains(Object* value);

[VB] Function Contains(ByVal value As Object) As Boolean Implements IList.Contains

[JScript] function IList.Contains(value: Object): Boolean;

IList.IndexOf

[C#] int IList.IndexOf(object value);

[C++] int IList::IndexOf(Object* value);

[VB] Function IndexOf(ByVal value As Object) As Integer Implements IList.IndexOf

[JScript] function IList.IndexOf(value: Object): int;

IList.Insert

[C#] void IList.Insert(int index, object value);

[C++] void IList::Insert(int index, Object* value);

[VB] Sub Insert(ByVal index As Integer, ByVal value As Object) Implements IList.Insert

[JScript] function IList.Insert(index: int, value: Object);

IList.Remove

[C#] void IList.Remove(object value);

[C++] void IList::Remove(Object* value);

[VB] Sub Remove(ByVal value As Object) Implements IList.Remove

[JScript] function IList.Remove(value: Object);

IList.RemoveAt

[C#] void IList.RemoveAt(int index);

[C++] void IList::RemoveAt(int index);

[VB] Sub RemoveAt(ByVal index As Integer) Implements IList.RemoveAt

[JScript] function IList.RemoveAt(index: int);

ArrayTypeMismatchException class (System)

ToString

Description

The exception that is thrown when an attempt is made to store an element of the wrong type within an array.

System.ArrayTypeMismatchException uses the HRESULT COR_E_ARRAYTYPEMISMATCH, which has the value 0x80131503.

ArrayTypeMismatchException

Example Syntax:

ToString

[C#] public ArrayTypeMismatchException( );

[C++] public: ArrayTypeMismatchException( );

[VB] Public Sub New( )

[JScript] public function ArrayTypeMismatchException( ); Initializes a new instance of the System.ArrayTypeMismatchException class.

Description

Initializes a new instance of the System.ArrayTypeMismatchException class with default properties.

The following table shows the initial property values for an instance of System.ArrayTypeMismatchException.

ArrayTypeMismatchException
Example Syntax:
ToString
[C#] public ArrayTypeMismatchException(string message);
[C++] public: ArrayTypeMismatchException(String* message);
[VB] Public Sub New(ByVal message As String)
[JScript] public function ArrayTypeMismatchException (message: String);

Description
Initializes a new instance of the System.ArrayTypeMismatchException class with a specified error message.
The following table shows the initial property values for an instance of System.ArrayTypeMismatchException. The error message that explains the reason for the exception.
ArrayTypeMismatchException
Example Syntax:
ToString
[C#] protected ArrayTypeMismatchException(SerializationInfo info, StreamingContext context);
[C++] protected: ArrayTypeMismatchException(SerializationInfo* info, StreamingContext context);
[VB] Protected Sub New(ByVal info As SerializationInfo, ByVal context As StreamingContext)
[JScript] protected function ArrayTypeMismatchException (info: SerializationInfo, context: StreamingContext);

Description
Initializes a new instance of the System.ArrayTypeMismatchException class with serialized data.
This constructor is called during deserialization to reconstitute the exception object transmitted over a stream. For more information, see. The object that holds the serialized object data. The contextual information about the source or destination.
ArrayTypeMismatchException
Example Syntax:
ToString
[C#] public ArrayTypeMismatchException(string message, Exception innerException);
[C++] public: ArrayTypeMismatchException(String* message, Exception* innerException);
[VB] Public Sub New(ByVal message As String, ByVal innerException As Exception)
[JScript] public function ArrayTypeMismatchException (message: String, innerException: Exception);

Description
Initializes a new instance of the System.ArrayTypeMismatchException class with a specified error message and a reference to the inner exception that is the root cause of this exception.
When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If innerException is non-null, then the current Exception is raised in a catch block handling innerException.
HelpLink
HResult
InnerException
Message
Source
StackTrace
TargetSite
AssemblyLoadEventArgs class (System)
ToString Description
Provides data for the System.AppDomain.AssemblyLoad event.
AssemblyLoadEventArgs
Example Syntax:
ToString
[C#] public AssemblyLoadEventArgs(Assembly loadedAssembly);
[C++] public: AssemblyLoadEventArgs(Assemnbly* loadedAssembly);
[VB] Public Sub New(ByVal loadedAssembly As Assembly)
[JScript] public function AssemblyLoadEventArgs(loadedAssembly: Assembly);

Description
Initializes a new instance of the System.AssemblyLoadEventArgs.AssemblyLoadEventArgs class, using the specified System.Reflection.Assembly object. An instance that represents the currently loaded assembly.
LoadedAssembly
ToString
[C#] public Assembly LoadedAssembly {get;}
[C++] public: _property Assembly* get_LoadedAssembly( );
[VB] Public ReadOnly Property LoadedAssembly As Assembly
[JScript] public function get LoadedAssembly( ): Assembly;

Description
Gets an System.Reflection.Assembly object that represents the currently loaded assembly.
AssemblyLoadEventHandler delegate (System)
ToString Description
Represents the method that will handle the System.AppDomain.AssemblyLoad event of an System.AppDomain. The source of the event. An System.AssemblyLoadEvent Args that contains the event data.
AsyncCallback delegate (System)
ToString Description
References the callback method to be called when the asynchronous operation is completed. The result of the asynchronous operation.
System.AsyncCallback provides a way for client applications to complete an asynchronous operation. This callback delegate is supplied to the client when the asynchronous operation is initiated. The event handler referenced by System.AsyncCallback contains program logic to finish processing the asynchronous task for the client.
Attribute class (System)
ToString Description
Base class for custom attributes.
The Attribute class contains convenience methods to access and test custom attributes. While any user-defined type can be used as an attribute, it is expected that most attributes will be instances of types derived from Attribute.
Attribute
Example Syntax:
ToString
[C#] protected Attribute( );
[C++] protected: Attribute( );

[VB] Protected Sub New( )
[JScript] protected function Attribute( );

Description
Initializes a new instance of the Attribute class.
TypeId
ToString
[C#] public virtual object TypeId {get;}
[C++] public: _property virtual Object* get_TypeId( );
[VB] Overridable Public ReadOnly Property TypeId As Object
[JScript] public function get TypeId( ): Object;

Description
When implemented in a derived class, gets a unique identifier for this Attribute.

As implemented, this identifier is merely the System.Type of the attribute. However, it is intended that the unique identifier be used to identify two attributes of the same type.
Equals
[C#] public override bool Equals(object obj);
[C++] public: bool Equals(Object* obj);
[VB] Overrides Public Function Equals(ByVal obj As Object) As Boolean
[JScript] public override function Equals(obj: Object): Boolean;

Description
Returns a value indicating whether this instance is equal to a specified object.

Return Value: true if obj equals the type and value of this instance; otherwise, false. An System.Object to compare with this instance or null.
GetCustomAttribute
[C#] public static Attribute GetCustomAttribute(Assembly element, Type attributeType);
[C++] public: static Attribute* GetCustomAttribute(Assembly* element, Type* attributeType);
[VB] Public Shared Function GetCustomAttribute(ByVal element As Assembly, ByVal attributeType As Type) As Attribute
[JScript] public static function GetCustomAttribute(element: Assembly, attributeType: Type): Attribute;

Description
Retrieves a custom attribute of a specified type applied to a specified assembly and its ancestors.

Return Value: null, if no custom attribute of type attributeType is applied to element. An object derived from class System.Reflection.Assembly that describes a reusable, versionable, collection of modules. The System.Type object to which the custom attributes are applied. GetCustomAttribute
[C#] public static Attribute GetCustomAttribute(MemberInfo element, Type attributeType);
[C++] public: static Attribute* GetCustomAttribute(MemberInfo* element, Type* attributeType);
[VB] Public Shared Function GetCustomAttribute(ByVal element As MemberInfo, ByVal attributeType As Type) As Attribute
[JScript] public static function GetCustomAttribute(element: MemberInfo, attributeType: Type): Attribute;

Description
Retrieves a custom attribute of a specified type applied to a specified member of a class and its ancestors.

Return Value: null, if no custom attribute of type attributeType is applied to element. An object derived from class System.Reflection.MemberInfo that describes a constructor, event, field, method, or property member of a class. The System.Type object to which the custom attributes are applied.
It GetCustomAttribute
[C#] public static Attribute GetCustomAttribute(Module element, Type attributeType);
[C++] public: static Attribute* GetCustomAttribute(Module* element, Type* attributeType);
[VB] Public Shared Function GetCustomAttribute(ByVal element As Module, ByVal attributeType As Type) As Attribute
[JScript] public static function GetCustomAttribute(element: Module, attributeType: Type): Attribute;

Description
Retrieves a custom attribute of a specified type applied to a specified module and its ancestors.

Return Value: null, if no custom attribute of type attributeType is applied to element. An object derived from class System.Reflection.Module that describes a portable executable file. The System.Type object to which the custom attributes are applied.
GetCustomAttribute
[C#] public static Attribute GetCustomAttribute(ParameterInfo element, Type attributeType);
[C++] public: static Attribute* GetCustomAttribute(ParameterInfo* element, Type* attributeType);
[VB] Public Shared Function GetCustomAttribute(ByVal element As ParameterInfo, ByVal attributeType As Type) As Attribute
[JScript] public static function GetCustomAttribute(element: ParameterInfo, attributeType: Type): Attribute;

Description
Retrieves a custom attribute of a specified type applied to a specified parameter of a member of a class and its ancestors.

Return Value: null, if no custom attribute of type attributeType is applied to element. An object derived from class System.Reflection.ParameterInfo that describes a parameter of a member of a class. The System.Type object to which the custom attributes are applied.
GetCustomAttribute
[C#] public static Attribute GetCustomAttribute(Assembly element, Type attributeType, bool inherit);
[C++] public: static Attribute* GetCustomAttribute(Assembly* element, Type* attributeType, bool inherit);
[VB] Public Shared Function GetCustomAttribute(ByVal element As Assembly, ByVal attributeType As Type, ByVal inherit As Boolean) As Attribute
[JScript] public static function GetCustomAttribute(element: Assembly, attributeType: Type, inherit: Boolean): Attribute;

Description
Retrieves a custom attribute of a specified type applied to a specified assembly and optionally its ancestors.

Return Value: null, if no custom attribute of type attributeType is applied to element. An object derived from class System.Reflection.Assembly that describes a reusable, versionable, collection of modules. The System.Type object to which the custom attributes are applied. If true, specifies to also search the ancestors of element for custom attributes.
GetCustomAttribute
[C#] public static Attribute GetCustomAttribute(MemberInfo element, Type attributeType, bool inherit);
[C++] public: static Attribute* GetCustomAttribute(MemberInfo* element, Type* attributeType, bool inherit);

[VB] Public Shared Function GetCustomAttribute(ByVal element As MemberInfo, ByVal attributeType As Type, ByVal inherit As Boolean) As Attribute

[JScript] public static function GetCustomAttribute(element: MemberInfo, attributeType: Type, inherit: Boolean): Attribute; Retrieves a custom attribute of a specified type applied to a specified member of a class.

Description

Retrieves a custom attribute of a specified type applied to a specified member of a class and optionally its ancestors.

Return Value: null, if no custom attribute of type attributeType is applied to element. An object derived from class System.Reflection.MemberInfo that describes a constructor, event, field, method, or property member of a class. The System.Type object to which the custom attributes are applied. If true, specifies to also search the ancestors of element for custom attributes.

GetCustomAttribute

[C#] public static Attribute GetCustomAttribute(Module element, Type attributeType, bool inherit);

[C++] public: static Attribute* GetCustomAttribute(Module* element, Type* attributeType, bool inherit);

[VB] Public Shared Function GetCustomAttribute(ByVal element As Module, ByVal attributeType As Type, ByVal inherit As Boolean) As Attribute

[JScript] public static function GetCustomAttribute(element: Module, attributeType: Type, inherit: Boolean): Attribute;

Description

Retrieves a custom attribute of a specified type applied to a specified module and optionally its ancestors.

Return Value: null, if no custom attribute of type attributeType is applied to element. An object derived from class System.Reflection.Module that describes a portable executable file. The System.Type object to which the custom attributes are applied. If true, specifies to also search the ancestors of element for custom attributes.

GetCustomAttribute

[C#] public static Attribute GetCustomAttribute(ParameterInfo element, Type attributeType, bool inherit);

[C++] public: static Attribute* GetCustomAttribute(ParameterInfo* element, Type* attributeType, bool inherit);

[VB] Public Shared Function GetCustomAttribute(ByVal element As ParameterInfo, ByVal attributeType As Type, ByVal inherit As Boolean) As Attribute

[JScript] public static function GetCustomAttribute(element: ParameterInfo, attributeType: Type, inherit: Boolean): Attribute;

Description

Retrieves a custom attribute of a specified type applied to a specified parameter of a member of a class and optionally its ancestors.

Return Value: null, if no custom attribute of type attributeType is applied to element. An object derived from class System.Reflection.ParameterInfo that describes a parameter of a member of a class. The System.Type object to which the custom attributes are applied. If true, specifies to also search the ancestors of element for custom attributes.

GetCustomAttributes

[C#] public static Attribute[ ] GetCustomAttributes(Assembly element);

[C++] public: static Attribute* GetCustomAttributes(Assembly* element)[ ]

[VB] Public Shared Function GetCustomAttributes(ByVal element As Assembly) As Attribute( )

[JScript] public static function GetCustomAttributes(element: Assembly) Attribute[ ];

Description

Retrieves an array of the custom attributes of a specified type applied to a specified assembly and its ancestors.

Return Value: An System.Attribute array containing the custom attributes applied to element.—or—An empty array if no such custom attributes exist.

Return value contains the custom attributes for ancestors of element. An object derived from class System.Reflection.Assembly that describes a reusable, versionable, collection of modules.

GetCustomAttributes

[C#] public static Attribute[ ] GetCustomAttributes(MemberInfo element);

[C++] public: static Attribute* GetCustomAttributes(MemberInfo* element)[ ]

[VB] Public Shared Function GetCustomAttributes(ByVal element As MemberInfo) As Attribute( )

[JScript] public static function GetCustomAttributes(element: MemberInfo): Attribute[ ];

Description

Retrieves an array of the custom attributes applied to a specified member of a class and its ancestors.

Return Value: An System.Attribute array containing the custom attributes applied to element.—or—An empty array if no such custom attributes exist.

Return value contains the custom attributes for ancestors of element. An object derived from class System.Reflection.MemberInfo that describes a constructor, event, field, method, or property member of a class.

GetCustomAttributes

[C#] public static Attribute[ ] GetCustomAttributes(Module element);

[C++] public: static Attribute* GetCustomAttributes(Module* element)[ ]

[VB] Public Shared Function GetCustomAttributes(ByVal element As Module) As Attribute( )

[JScript] public static function GetCustomAttributes(element: Module) Attribute[ ];

Description

Retrieves an array of the custom attributes of a specified type applied to a specified module and its ancestors.

Return Value: An System.Attribute array containing the custom attributes applied to element.—or—An empty array if no such custom attributes exist.

Return value contains the custom attributes for ancestors of element. An object derived from class System.Reflection.Module that describes a portable executable file.

GetCustomAttributes

[C#] public static Attribute[ ] GetCustomAttributes(ParameterInfo element);

[C++] public: static Attribute* GetCustomAttributes(ParameterInfo* element)]

[VB] Public Shared Function GetCustomAttributes(ByVal element As ParameterInfo) As Attribute( )

[JScript] public static function GetCustomAttributes(element: ParameterInfo) Attribute[ ];

Description

Retrieves an array of the custom attributes of a specified type applied to a specified parameter of a member of a class and its ancestors.

Return Value: An System.Attribute array containing the custom attributes applied to element.—or—An empty array if no such custom attributes exist.

Return value contains the custom attributes for ancestors of element. An object derived from class System.Reflection.ParameterInfo that describes a parameter of a member of a class.

GetCustomAttributes

[C#] public static Attribute[ ] GetCustomAttributes(Assembly element, bool inherit);

[C++] public: static Attribute* GetCustomAttributes(Assembly* element, bool inherit)[ ];

[VB] Public Shared Function GetCustomAttributes(ByVal element As Assembly, ByVal inherit As Boolean) As Attribute( )

[JScript] public static function GetCustomAttributes(element: Assembly, inherit: Boolean): Attribute[ ];

Description

Retrieves an array of the custom attributes of a specified type applied to a specified assembly and optionally its ancestors.

Return Value: An System.Attribute array containing the custom attributes applied to element.—or—An empty array if no such custom attributes exist.

Return value contains the custom attributes for ancestors of element if inherit is true. An object derived from class System.Reflection.Assembly that describes a reusable, versionable, collection of modules. If true, specifies to also search the ancestors of element for custom attributes.

GetCustomAttributes

[C#] public static Attribute[ ] GetCustomAttributes(Assembly element, Type attributeType);

[C++] public: static Attribute* GetCustomAttributes(Assembly* element, Type* attributeType) [ ];

[VB] Public Shared Function GetCustomAttributes(ByVal element As Assembly, ByVal attributeType As Type) As Attribute( )

[JScript] public static function GetCustomAttributes(element: Assembly, attributeType: Type): Attribute[ ];

Description

Retrieves an array of the custom attributes of a specified type applied to a specified assembly and its ancestors.

Return Value: An System.Attribute array containing the custom attributes of type attributeType applied to element.—or—An empty array if no such custom attributes exist.

Return value contains the custom attributes for ancestors of element. An object derived from class System.Reflection.Assembly that describes a reusable, versionable, collection of modules. The System.Type object to which the custom attributes are applied.

GetCustomAttributes

[C#] public static Attribute[ ] GetCustomAttributes(MemberInfo element, bool inherit);

[C++] public: static Attribute* GetCustomAttributes(MemberInfo* element, bool inherit) [ ];

[VB] Public Shared Function GetCustomAttributes(ByVal element As MemberInfo, ByVal inherit As Boolean) As Attribute( )

[JScript] public static function GetCustomAttributes(element: MemberInfo, inherit: Boolean): Attribute[ ];

Description

Retrieves an array of the custom attributes of a specified member of a class and its ancestors.

Return Value: An System.Attribute array containing the custom attributes applied to element.—or—An empty array if no such custom attributes exist.

Return value contains the custom attributes for ancestors of element if inherit is true. An object derived from class System.Reflection.MemberInfo that describes a constructor, event, field, method, or property member of a class. If true, specifies to also search the ancestors of element for custom attributes.

GetCustomAttributes

[C#] public static Attribute[ ] GetCustomAttributes(MemberInfo element, Type type);

[C++] public: static Attribute* GetCustomAttributes(MemberInfo* element, Type* type) [ ];

[VB] Public Shared Function GetCustomAttributes(ByVal element As MemberInfo, ByVal type As Type) As Attribute( )

[JScript] public static function GetCustomAttributes(element: MemberInfo, type: Type): Attribute[ ]; Retrieves an array of the custom attributes of a specified type applied to a specified member of a class.

Description

Retrieves an array of the custom attributes of a specified type applied to a specified member of a class and its ancestors.

Return Value: An System.Attribute array containing the custom attributes of type type applied to element.—or—An empty array if no such custom attributes exist.

Return value contains the custom attributes for ancestors of element. An object derived from class System.Reflection.MemberInfo that describes a constructor, event, field, method, or property member of a class. The System.Type object to which the custom attributes are applied.

GetCustomAttributes

[C#] public static Attribute[ ] GetCustomAttributes(Module element, bool inherit);

[C++] public: static Attribute* GetCustomAttributes(Module* element, bool inherit) [ ];

[VB] Public Shared Function GetCustomAttributes(ByVal element As Module, ByVal inherit As Boolean) As Attribute( )

[JScript] public static function GetCustomAttributes(element: Module, inherit: Boolean): Attribute[ ];

Description

Retrieves an array of the custom attributes of a specified type applied to a specified module and optionally its ancestors.

Return Value: An System.Attribute array containing the custom attributes applied to element.—or—An empty array if no such custom attributes exist.

Return value contains the custom attributes for ancestors of element if inherit is true. An object derived from class System.Reflection.Module that describes a portable executable file. If true, specifies to also search the ancestors of element for custom attributes.

GetCustomAttributes

[C#] public static Attribute[ ] GetCustomAttributes(Module element, Type attributeType);

[C++] public: static Attribute* GetCustomAttributes(Module* element, Type* attributeType) [ ];

[VB] Public Shared Function GetCustomAttributes(ByVal element As Module, ByVal attributeType As Type) As Attribute( )

[JScript] public static function GetCustomAttributes(element: Module, attributeType: Type): Attribute[ ];

Description

Retrieves an array of the custom attributes of a specified type applied to a specified module and its ancestors.

Return Value: An System.Attribute array containing the custom attributes of type attributeType applied to element.—or—An empty array if no such custom attributes exist.

Return value contains the custom attributes for ancestors of element. An is object derived from class System.Reflection. Module that describes a portable executable file. The System. Type object to which the custom attributes are applied.

GetCustomAttributes

[C#] public static Attribute[ ] GetCustomAttributes(ParameterInfo element, bool inherit);

[C++] public: static Attribute* GetCustomAttributes(ParameterInfo* element, bool inherit) [ ];

[VB] Public Shared Function GetCustomAttributes(ByVal element As ParameterInfo, ByVal inherit As Boolean) As Attribute( )

[JScript] public static function GetCustomAttributes(element: ParameterInfo, inherit: Boolean): Attribute[ ];

Description

Retrieves an array of the custom attributes of a specified type applied to a specified parameter of a member of a class and optionally its ancestors.

Return Value: An System.Attribute array containing the custom attributes applied to element.—or—An empty array if no such custom attributes exist.

Return value contains the custom attributes for ancestors of element if inherit is true. An object derived from class System.Reflection.ParameterInfo that describes a parameter of a member of a class. If true, specifies to also search the ancestors of element for custom attributes.

GetCustomAttributes

[C#] public static Attribute[ ] GetCustomAttributes(ParameterInfo element, Type attributeType);

[C++] public: static Attribute* GetCustomAttributes(ParameterInfo* element, Type* attributeType) [ ];

[VB] Public Shared Function GetCustomAttributes(ByVal element As ParameterInfo, ByVal attributeType As Type) As Attribute( )

[JScript] public static function GetCustomAttributes(element: ParameterInfo, attributeType: Type): Attribute[ ];

Description

Retrieves an array of the custom attributes of a specified type applied to a specified parameter of a member of a class and its ancestors.

Return Value: An System.Attribute array containing the custom attributes of type attributeType applied to element.—or—An empty array if no such custom attributes exist.

Return value contains the custom attributes for ancestors of element. An object derived from class System.Reflection.ParameterInfo that describes a parameter of a member of a class. The System.Type object to which the custom attributes are applied.

GetCustomAttributes

[C#] public static Attribute[ ] GetCustomAttributes(Assembly element, Type attributeType, bool inherit);

[C++] public: static Attribute* GetCustomAttributes(Assembly* element, Type* attributeType, bool inherit) [ ];

[VB] Public Shared Function GetCustomAttributes(ByVal element As Assembly, ByVal attributeType As Type, ByVal inherit As Boolean) As Attribute( )

[JScript] public static function GetCustomAttributes(element: Assembly, attributeType: Type, inherit: Boolean): Attribute[ ];

Description

Retrieves an array of the custom attributes of a specified type applied to a specified assembly and optionally its ancestors.

Return Value: An System.Attribute array containing the custom attributes of type attributeType applied to element.—or—An empty array if no such custom attributes exist.

Return value contains the custom attributes for ancestors of element if inherit is true. An object derived from class System.Reflection.Assembly that describes a reusable, versionable, collection of modules. The System.Type object to which the custom attributes are applied. If true, specifies to also search the ancestors of element for custom attributes.

GetCustomAttributes

[C#] public static Attribute[ ] GetCustomAttributes(MemberInfo element, Type type, bool inherit);

[C++] public: static Attribute* GetCustomAttributes(MemberInfo* element, Type* type, bool inherit) [ ];

[VB] Public Shared Function GetCustomAttributes(ByVal element As MemberInfo, ByVal type As Type, ByVal inherit As Boolean) As Attribute( )

[JScript] public static function GetCustomAttributes(element: MemberInfo, type: Type, inherit: Boolean): Attribute[ ];

Description

Retrieves an array of the custom attributes of a specified type applied to a specified member of a class and optionally its ancestors.

Return Value: An System.Attribute array containing the custom attributes of type type applied to element.—or—An empty array if no such custom attributes exist.

Return value contains the custom attributes for ancestors of element if inherit is true. An object derived from class System.Reflection.MemberInfo that describes a constructor, event, field, method, or property member of a class. The System.Type object to which the custom attributes are applied. If true, specifies to also search the ancestors of element for custom attributes.

GetCustomAttributes

[C#] public static Attribute[ ] GetCustomAttributes(Module element, Type attributeType, bool inherit);

[C++] public: static Attribute* GetCustomAttributes(Module* element, Type* attributeType, bool inherit) [ ];

[VB] Public Shared Function GetCustomAttributes(ByVal element As Module, ByVal attributeType As Type, ByVal inherit As Boolean) As Attribute( )

[JScript] public static function GetCustomAttributes(element: Module, attributeType: Type, inherit: Boolean): Attribute[ ];

Description

Retrieves an array of the custom attributes of a specified type applied to a specified module and optionally its ancestors.

Return Value: An System.Attribute array containing the custom attributes of type attributeType applied to element.—or—An empty array if no such custom attributes exist.

Return value contains the custom attributes for ancestors of element if inherit is true. An object derived from class System.Reflection.Module that describes a portable executable file. The System.Type object to which the custom attributes are applied. If true, specifies to also search the ancestors of element for custom attributes.

GetCustomAttributes

[C#] public static Attribute[ ] GetCustomAttributes(ParameterInfo element, Type attributeType, bool inherit);

[C++] public: static Attribute* GetCustomAttributes(ParameterInfo* element, Type* attributeType, bool inherit) [ ];

[VB] Public Shared Function GetCustomAttributes(ByVal element As ParameterInfo, ByVal attributeType As Type, ByVal inherit As Boolean) As Attribute( )

[JScript] public static function GetCustomAttributes(element: ParameterInfo, attributeType: Type, inherit: Boolean): Attribute[ ];

Description

Retrieves an array of the custom attributes of a specified type applied to a specified parameter of a member of a class and optionally its ancestors.

Return Value: An System.Attribute array containing the custom attributes of type attributeType applied to element.—or—An empty array if no such custom attributes exist.

Return value contains the custom attributes for ancestors of element if inherit is true. An object derived from class System.Reflection.ParameterInfo that describes a parameter of a member of a class. The System.Type object to which the custom attributes are applied. If true, specifies to also search the ancestors of element for custom attributes.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for this instance.

Return Value: A 32-bit signed integer hash code.

IsDefaultAttribute

[C#] public virtual bool IsDefaultAttribute( );

[C++] public: virtual bool IsDefaultAttribute( );

[VB] Overridable Public Function IsDefaultAttribute( ) As Boolean

[JScript] public function IsDefaultAttribute( ): Boolean;

Description

When overridden in a derived class, returns an indication whether the value of this instance is the default value for the derived class.

Return Value: true if this instance is the default attribute for the class; otherwise, false.

The default implementation of this class returns false, and must be implemented in the derived class to be useful to that class.

IsDefined

[C#] public static bool IsDefined(Assembly element, Type attributeType);

[C++] public: static bool IsDefined(Assembly* element, Type* attributeType);

[VB] Public Shared Function IsDefined(ByVal element As Assembly, ByVal attributeType As Type) As Boolean

[JScript] public static function IsDefined(element: Assembly, attributeType Type): Boolean;

Description

Determines whether any custom attributes of a specified type are applied to a specified assembly.

Return Value: true if a custom attribute of type attributeType is applied to element; otherwise, false.

The ancestors of element are not searched for custom attributes. An object derived from class System.Reflection.Assembly that describes a reusable, versionable, collection of modules. The System.Type object to which the custom attributes are applied.

IsDefined

[C#] public static bool IsDefined(MemberInfo element, Type attributeType);

[C++] public: static bool IsDefined(MemberInfo* element, Type* attributeType);

[VB] Public Shared Function IsDefined(ByVal element As MemberInfo, ByVal attributeType As Type) As Boolean

[JScript] public static function IsDefined(element: MemberInfo, attributeType: Type): Boolean; Determines whether any custom attributes of a specified type are applied to a specified member of a class.

Description

Determines whether any custom attributes of a specified type are applied to a specified member of a class and its ancestors.

Return Value: true if a custom attribute of type attributeType is applied to element; otherwise, false.

The ancestors of element are searched for custom attributes if element is a method or a type. An object derived from class System.Reflection.MemberInfo that describes a constructor, event, field, method, type, or property member of a class. The System.Type object to which the custom attributes are applied.

IsDefined

[C#] public static bool IsDefined(Module element, Type attributeType);

[C++] public: static bool IsDefined(Module* element, Type* attributeType);

[VB] Public Shared Function IsDefined(ByVal element As Module, ByVal attributeType As Type) As Boolean

[JScript] public static function IsDefined(element: Module, attributeType: Type): Boolean;

Description

Determines whether any custom attributes of a specified type are applied to a specified module.

Return Value: true if a custom attribute of type attributeType is applied to element; otherwise, false.

The ancestors of element are not searched for custom attributes. An object derived from class System.Reflection.Module that describes a portable executable file. The System.Type object to which the custom attributes are applied.

IsDefined

[C#] public static bool IsDefined(ParameterInfo element, Type attributeType);

[C++] public: static bool IsDefined(ParameterInfo* element, Type* attributeType);

[VB] Public Shared Function IsDefined(ByVal element As ParameterInfo, ByVal attributeType As Type) As Boolean

[JScript] public static function IsDefined(element: ParameterInfo, attributeType: Type): Boolean;

Description

Determines whether any custom attributes of a specified type are applied to a specified parameter of a member of a class and its ancestors.

Return Value: true if a custom attribute of type attributeType is applied to element; otherwise, false.

The ancestors of element are searched for custom attributes. An object derived from class System.Reflection.ParameterInfo that describes a parameter of a member of a class. The System.Type object to which the custom attributes are applied.

IsDefined

[C#] public static bool IsDefined(Assembly element, Type attributeType, bool inherit);

[C++] public: static bool IsDefined(Assembly* element, Type* attributeType, bool inherit);

[VB] Public Shared Function IsDefined(ByVal element As Assembly, ByVal attributeType As Type, ByVal inherit As Boolean) As Boolean

[JScript] public static function IsDefined(element: Assembly, attributeType: Type, inherit: Boolean): Boolean;

Description

Determines whether any custom attributes of a specified type are applied to a specified assembly.

Return Value: true if a custom attribute of type attributeType is applied to element; otherwise, false.

This method ignores the value of parameter inherit. The ancestors of element are not searched for custom attributes. An object derived from class System.Reflection.Assembly that describes a reusable, versionable, collection of modules. The System.Type object to which the custom attributes are applied. If true, specifies to also search the ancestors of element for custom attributes.

IsDefined

[C#] public static bool IsDefined(MemberInfo element, Type attributeType, bool inherit);

[C++] public: static bool IsDefined(MemberInfo* element, Type* attributeType, bool inherit);

[VB] Public Shared Function IsDefined(ByVal element As MemberInfo, ByVal attributeType As Type, ByVal inherit As Boolean) As Boolean

[JScript] public static function IsDefined(element: MemberInfo, attributeType: Type, inherit: Boolean): Boolean;

Description

Determines whether any custom attributes of a specified type are applied to a specified member of a class and optionally its ancestors.

Return Value: true if a custom attribute of type attributeType is applied to element otherwise, false.

The ancestors of element are searched for custom attributes if inherit is true and element is a method or a type. An object derived from class System.Reflection.MemberInfo that describes a constructor, event, field, method, type, or property member of a class. The System.Type object to which the custom attributes are applied. If true, specifies to also search the ancestors of element for custom attributes.

IsDefined

[C#] public static bool IsDefined(Module element, Type attributeType, bool inherit);

[C++] public: static bool IsDefined(Module* element, Type* attributeType, bool inherit);

[VB] Public Shared Function IsDefined(ByVal element As Module, ByVal attributeType As Type, ByVal inherit As Boolean) As Boolean

[JScript] public static function IsDefined(element: Module, attributeType: Type, inherit: Boolean): Boolean;

Description

Determines whether any custom attributes of a specified type are applied to a specified module.

Return Value: true if a custom attribute of type attributeType is applied to element; otherwise, false.

This method ignores the value of parameter inherit. The ancestors of element are not searched for custom attributes. An object derived from class System.Reflection.Module that describes a portable executable file. The System.Type object to which the custom attributes are applied. If true, specifies to also search the ancestors of element for custom attributes.

IsDefined

[C#] public static bool IsDefined(ParameterInfo element, Type attributeType, bool inherit);

[C++] public: static bool IsDefined(ParameterInfo* element, Type* attributeType, bool inherit);

[VB] Public Shared Function IsDefined(ByVal element As ParameterInfo, ByVal attributeType As Type, ByVal inherit As Boolean) As Boolean

[JScript] public static function IsDefined(element: ParameterInfo, attributeType Type, inherit: Boolean): Boolean;

Description

Determines whether any custom attributes of a specified type are applied to a specified parameter of a member of a class and optionally its ancestors.

Return Value: true if a custom attribute of type attributeType is applied to element; otherwise, false.

The ancestors of element are searched for custom attributes if inherit is true and element is a method. An object derived from class System.Reflection.ParameterInfo that describes a parameter of a member of a class. The System.Type object to which the custom attributes are applied. If true, specifies to also search the ancestors of element for custom attributes.

Match

[C#] public virtual bool Match(object obj);

[C++] public: virtual bool Match(Object* obj);

[VB] Overridable Public Function Match(ByVal obj As Object) As Boolean

[JScript] public function Match(obj: Object): Boolean;

Description

When overridden in a derived class, returns a value indicating whether this instance equals a specified object.

Return Value: true if this instance equals obj; otherwise, false.

This method determines if one Attribute equals another. Its default implementation is the same as System.Attribute.Equals(System.Object), which performs a value and reference comparison. Override this method to implement support for attribute values, such as flags or bitfields, that consist of components that are meaningful in themselves. An System.Object to compare with this instance of Attribute.

AttributeTargets enumeration (System)

ToString

Description

Specifies the elements to which it is valid to apply an attribute.

AttributeTargets enumeration values can be combined with a bitwise OR operation to get the desired combination.

ToString

[C#] public const AttributeTargets All;

[C++] public: const AttributeTargets All;

[VB] Public Const All As AttributeTargets

[JScript] public var All: AttributeTargets;

Description

Attribute can be applied to any element.

ToString

[C#] public const AttributeTargets Assembly;

[C++] public: const AttributeTargets Assembly;

[VB] Public Const Assembly As AttributeTargets
[JScript] public var Assembly: AttributeTargets;

Description
Attribute can be applied to an assembly.
ToString
[C#] public const AttributeTargets Class;
[C++] public: const AttributeTargets Class;
[VB] Public Const Class As AttributeTargets
[JScript] public var Class: AttributeTargets;

Description
Attribute can be applied to a class.
ToString
[C#] public const AttributeTargets Constructor;
[C++] public: const AttributeTargets Constructor;
[VB] Public Const Constructor As AttributeTargets
[JScript] public var Constructor: AttributeTargets;

Description
Attribute can be applied to a constructor.
ToString
[C#] public const AttributeTargets Delegate;
[C++] public: const AttributeTargets Delegate;
[VB] Public Const Delegate As AttributeTargets
[JScript] public var Delegate: AttributeTargets;

Description
Attribute can be applied to a delegate.
ToString
[C#] public const AttributeTargets Enum;
[C++] public: const AttributeTargets Enum;
[VB] Public Const Enum As AttributeTargets
[JScript] public var Enum: AttributeTargets;

Description
Attribute can be applied to an enumeration.
ToString
[C#] public const AttributeTargets Event;
[C++] public: const AttributeTargets Event;
[VB] Public Const Event As AttributeTargets
[JScript] public var Event: AttributeTargets;

Description
Attribute can be applied to an event.
ToString
[C#] public const AttributeTargets Field;
[C++] public: const AttributeTargets Field;
[VB] Public Const Field As AttributeTargets
[JScript] public var Field: AttributeTargets;

Description
Attribute can be applied to a field.
ToString
[C#] public const AttributeTargets Interface;
[C++] public: const AttributeTargets Interface;
[VB] Public Const Interface As AttributeTargets
[JScript] public var Interface: AttributeTargets;

Description
Attribute can be applied to an interface.
ToString
[C#] public const AttributeTargets Method;
[C++] public: const AttributeTargets Method;
[VB] Public Const Method As AttributeTargets
[JScript] public var Method: AttributeTargets;

Description
Attribute can be applied to a method.
ToString
[C#] public const AttributeTargets Module;
[C++] public: const AttributeTargets Module;
[VB] Public Const Module As AttributeTargets
[JScript] public var Module: AttributeTargets;

Description
Attribute can be applied to a module.
ToString
[C#] public const AttributeTargets Parameter;
[C++] public: const AttributeTargets Parameter;
[VB] Public Const Parameter As AttributeTargets
[JScript] public var Parameter: AttributeTargets;

Description
Attribute can be applied to a parameter.
ToString
[C#] public const AttributeTargets Property;
[C++] public: const AttributeTargets Property;
[VB] Public Const Property As AttributeTargets
[JScript] public var Property: AttributeTargets;

Description
Attribute can be applied to a property.
ToString
[C#] public const AttributeTargets ReturnValue;
[C++] public: const AttributeTargets ReturnValue;
[VB] Public Const ReturnValue As AttributeTargets
[JScript] public var ReturnValue: AttributeTargets;

Description
Attribute can be applied to a Return value.
ToString
[C#] public const AttributeTargets Struct;
[C++] public: const AttributeTargets Struct;
[VB] Public Const Struct As AttributeTargets
[JScript] public var Struct: AttributeTargets;

Description
Attribute can be applied to a value type.

AttributeUsageAttribute class (System)
ToString

Description
Specifies the usage of another attribute class. This class cannot be inherited.

When you are defining your own attribute class, you can control the manner in which it is used by placing an System. AttributeUsageAttribute on your attribute class. The indicated attribute class must derive from System.Attribute, either directly or indirectly.

AttributeUsageAttribute
Example Syntax:
ToString
[C#] public AttributeUsageAttribute(AttributeTargets valid On);
[C++] public: AttributeUsageAttribute(AttributeTargets valid On);
[VB] Public Sub New(ByVal validOn As AttributeTargets)
[JScript] public function AttributeUsageAttribute(validOn: AttributeTargets);

Description
Initializes a new instance of the System.AttributeUsageAttribute class with the specified list of System.AttributeTargets, the System.AttributeUsageAttribute.AllowMultiple value, and the System.AttributeUsageAttribute.Inherited value.

You can combine several System.AttributeTargets values using a bitwise OR operation to get the desired combination of valid program elements. The set of values combined using a bitwise OR operation to indicate which program elements are valid.

AllowMultiple
ToString
[C#] public bool AllowMultiple {get; set;}
[C++] public: _property bool get_AllowMultiple( ); public: _property void set_AllowMultiple(bool);
[VB] Public Property AllowMultiple As Boolean

[JScript] public function get AllowMultiple( ): Boolean;public function set AllowMultiple(Boolean);

Description

Gets or sets a Boolean value indicating whether more than one instances of the indicated attribute can be specified for a single program element.

An attribute that can be specified more than once for a program element is called a multi-use attribute. An attribute that can be specified only once is called a single-use attribute.

Inherited

ToString

[C#] public bool Inherited {get; set;}

[C++] public: _property bool get_Inherited( );public: _property void set_Inherited(bool);

[VB] Public Property Inherited As Boolean

[JScript] public function get Inherited( ): Boolean;public function set Inherited(Boolean);

Description

Gets or sets a Boolean value indicating whether the indicated attribute is inherited by derived classes or overridden members.

TypeId

ValidOn

ToString

Description

Gets a set of values identifying which program elements that the indicated attribute can be applied to.

BadImageFormatException class (System)

ToString

Description

The exception that is thrown when the file image of a DLL or an executable program is invalid.

System.BadImageFormatException uses the HRESULT COR_E_BADIMAGEFORMAT, which has the value 0x8007000B.

BadImageFormatException

Example Syntax:

ToString

[C#] public BadImageFormatException( );

[C++] public: BadImageFormatException( );

[VB] Public Sub New( )

[JScript] public function BadImageFormatException( ); Initializes a new instance of the System.BadImageFormatException class.

Description

Initializes a new instance of the System.BadImageFormat Exception class with default properties.

The following table shows the initial property values for an instance of System.BadImageFormatException.

BadImageFormatException

Example Syntax:

ToString

[C#] public BadImageFormatException(string message);

[C++] public: BadImageFormatException(String* message);

[VB] Public Sub New(ByVal message As String)

[JScript] public function BadImageFormatException(message: String);

Description

Initializes a new instance of the System.BadImageFormat Exception class with a specified error message.

The following table shows the initial property values for an instance of System.BadImageFormatException. The error message that explains the reason for the exception.

BadImageFormatException

Example Syntax:

ToString

[C#] protected BadImageFormatException(SerializationInfo info, StreamingContext context);

[C++] protected: BadImageFormatException(SerializationInfo* info, StreamingContext context);

[VB] Protected Sub New(ByVal info As SerializationInfo, ByVal context As StreamingContext)

[JScript] protected function BadImageFormatException (info: SerializationInfo, context: StreamingContext);

Description

Initializes a new instance of the System.BadImageFormat Exception class with serialized data.

This constructor is called during deserialization to reconstitute the exception object transmitted over a stream. For more information, see. The object that holds the serialized object data. The contextual information about the source or destination.

BadImageFormatException

Example Syntax:

ToString

[C#] public BadImageFormatException(string message, Exception inner);

[C++] public: BadImageFormatException(String* message, Exception* inner);

[VB] Public Sub New(ByVal message As String, ByVal inner As Exception)

[JScript] public function BadImageFormatException(message: String, inner: Exception);

Description

Initializes a new instance of the System.BadImageFormat Exception class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If inner is non-null, then the current Exception is raised in a catch block handling inner.

BadImageFormatException

Example Syntax:

ToString

[C#] public BadImageFormatException(string message, string fileName);

[C++] public: BadImageFormatException(String* message, String* filename);

[VB] Public Sub New(ByVal message As String, ByVal fileName As String)

[JScript] public function BadImageFormatException(message: String, fileName: String);

Description

Initializes a new instance of the System.BadImageFormat Exception class with serialized data.

This constructor is called during deserialization to reconstitute the exception object transmitted over a stream. For more information, see. A reference to the inner exception.

BadImageFormatException

Example Syntax:

ToString

[C#] public BadImageFormatException(string message, string fileName, Exception inner);

[C++] public: BadImageFormatException(String* message, String* fileName, Exception* inner);

[VB] Public Sub New(ByVal message As String, ByVal fileName As String, ByVal inner As Exception)

[JScript] public function BadImageFormatException(message: String, fileName: String, inner: Exception);

Description

Initializes a new instance of the System.BadImageFormat Exception class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If inner is non-null, then the current Exception is raised in a catch block handling inner.

FileName

ToString

[C#] public string FileName {get;}

[C++] public: _property String* get_FileName( );

[VB] Public ReadOnly Property FileName As String

[JScript] public function get FileName( ): String;

Description

Gets the name of the file that causes this exception.

FusionLog

ToString

[C#] public string FusionLog {get;}

[C++] public: _property String* get_FusionLog( );

[VB] Public ReadOnly Property FusionLog As String

[JScript] public function get FusionLog( ): String;

Description

Gets the log file that describes why loading of an assembly failed.

HelpLink

HResult

InnerException

Message

ToString

Description

Gets the error message and the name of the file that caused this exception.

Source

StackTrace

TargetSite

GetObjectData

[C#] public override void GetObjectData(SerializationInfo info, StreamingContext context);

[C++] public: void GetObjectData(SerializationInfo* info, StreamingContext context);

[VB] Overrides Public Sub GetObjectData(ByVal info As SerializationInfo, ByVal context As StreamingContext)

[JScript] public override function GetObjectData(info: SerializationInfo, context: StreamingContext);

Description

Sets the System.Runtime.Serialization.SerializationInfo object with the file name, fusion log, and additional exception information.

ToString

[C#] public override string ToString( );

[C++] public: String* ToString( );

[VB] Overrides Public Function ToString( ) As String

[JScript] public override function ToString( ): String;

Description

Returns the fully qualified name of this exception and possibly the error message, the name of the inner exception, and the stack trace.

Return Value: A string containing the fully qualified name of this exception and possibly the error message, the name of the inner exception, and the stack trace.

BitConverter class (System)

ToString

Description

Converts base data types to an array of bytes, and an array of bytes to base data types.

This class facilitates manipulating value types in their fundamental form. A byte is defined as an 8-bit unsigned integer.

ToString

[C#] public static readonly bool IsLittleEndian;

[C++] public: static bool IsLittleEndian;

[VB] Public Shared ReadOnly IsLittleEndian As Boolean

[JScript] public static var IsLittleEndian: Boolean;

Description

Indicates the byte order ("endianess") in which data is stored in this computer architecture.

This value is true if the architecture is little-endian; false if it is big-endian.

DoubleToInt64 Bits

[C#] public static long DoubleToInt64 Bits(double value);

[C++] public: static _int64 DoubleToInt64 Bits(double value);

[VB] Public Shared Function DoubleToInt64 Bits(ByVal value As Double) As Long

[JScript] public static function DoubleToInt64 Bits(value: double): long;

Description

Converts the specified double-precision floating point number to a 64-bit signed integer.

Return Value: A 64-bit signed integer whose value is equivalent to value. The number to convert.

GetBytes

[C#] public static byte[ ] GetBytes(bool value);

[C++] public: static unsigned char GetBytes(bool value) _gc[ ];

[VB] Public Shared Function GetBytes(ByVal value As Boolean) As Byte( )

[JScript] public static function GetBytes(value: Boolean): Byte[ ]; Converts the specified data to an array of bytes.

Description

Returns the specified Boolean value as an array of bytes.

Return Value: An array of bytes with length 1. A Boolean value.

GetBytes

[C#] public static byte[ ] GetBytes(char value);

[C++] public: static unsigned char GetBytes(_wchar_t value) _gc[ ];

[VB] Public Shared Function GetBytes(ByVal value As Char) As Byte( )

[JScript] public static function GetBytes(value: Char): Byte [ ];

Description

Returns the specified Unicode character value as an array of bytes.

Return Value: An array of bytes with length 2. A character to convert.

GetBytes

[C#] public static byte[ ] GetBytes(double value);

[C++] public: static unsigned char GetBytes(double value) _gc[ ];

[VB] Public Shared Function GetBytes(ByVal value As Double) As Byte( )

[JScript] public static function GetBytes(value: double): Byte[ ];

Description

Returns the specified double-precision floating point value as an array of bytes.

Return Value: An array of bytes with length 8. The number to convert.

GetBytes

[C#] public static byte[ ] GetBytes(short value);

[C++] public: static unsigned char GetBytes(short value) _gc[ ];

[VB] Public Shared Function GetBytes(ByVal value As Short) As Byte( )

[JScript] public static function GetBytes(value: Int16): Byte[ ];

Description

Returns the specified 16-bit signed integer value as an array of bytes.

Return Value: An array of bytes with length 2. The number to convert.

GetBytes

[C#] public static byte[ ] GetBytes(int value);

[C++] public: static unsigned char GetBytes(int value) _gc[ ];

[VB] Public Shared Function GetBytes(ByVal value As Integer) As Byte( )

[JScript] public static function GetBytes(value: int): Byte[ ];

Description

Returns the specified 32-bit signed integer value as an array of bytes.

Return Value: An array of bytes with length 4. The number to convert.

GetBytes

[C#] public static byte[ ] GetBytes(long value);

[C++] public: static unsigned char GetBytes(_int64 value) _gc[ ];

[VB] Public Shared Function GetBytes(ByVal value As Long) As Byte( )

[JScript] public static function GetBytes(value: long): Byte[ ];

Description

Returns the specified 64-bit signed integer value as an array of bytes.

Return Value: An array of bytes with length 8. The number to convert.

GetBytes

[C#] public static byte[ ] GetBytes(float value);

[C++] public: static unsigned char GetBytes(float value) _gc[ ];

[VB] Public Shared Function GetBytes(ByVal value As Single) As Byte( )

[JScript] public static function GetBytes(value: float): Byte[ ];

Description

Returns the specified single-precision floating point value as an array of bytes.

Return Value: An array of bytes with length 4. The number to convert.

GetBytes

[C#] public static byte[ ] GetBytes(ushort value);

[C++] public: static unsigned char GetBytes(unsigned short value) _gc[ ];

[VB] Public Shared Function GetBytes(ByVal value As UInt16) As Byte( )

[JScript] public static function GetBytes(value: UInt16): Byte[ ];

Description

Returns the specified 16-bit unsigned integer value as an array of bytes.

Return Value: An array of bytes with length 2. The number to convert.

GetBytes

[C#] public static byte[ ] GetBytes(uint value);

[C++] public: static unsigned char GetBytes(unsigned int value) _gc[ ];

[VB] Public Shared Function GetBytes(ByVal value As UInt32) As Byte( )

[JScript] public static function GetBytes(value: UInt32): Byte[ ];

Description

Returns the specified 32-bit unsigned integer value as an array of bytes.

Return Value: An array of bytes with length 4. The number to convert.

GetBytes

[C#] public static byte[ ] GetBytes(ulong value);

[C++] public: static unsigned char GetBytes(unsigned _int64 value) _gc[ ];

[VB] Public Shared Function GetBytes(ByVal value As UInt64) As Byte( )

[JScript] public static function GetBytes(value: UInt64): Byte[ ];

Description

Returns the specified 64-bit unsigned integer value as an array of bytes.

Return Value: An array of bytes with length 8. The number to convert.

Int64 BitsToDouble

[C#] public static double Int64 BitsToDouble(long value);

[C++] public: static double Int64 BitsToDouble(_int64 value);

[VB] Public Shared Function Int64 BitsToDouble(ByVal value As Long) As Double

[JScript] public static function Int64 BitsToDouble(value: long): double;

Description

Converts the specified 64-bit signed integer to a double-precision floating point number.

Return Value: A double-precision floating point number whose value is equivalent to value. The number to convert.

ToBoolean

[C#] public static bool ToBoolean(byte[ ] value, int startIndex);

[C++] public: static bool ToBoolean(unsigned char value _gc[ ], int startIndex);

[VB] Public Shared Function ToBoolean(ByVal value( ) As Byte, ByVal startIndex As Integer) As Boolean

[JScript] public static function ToBoolean(value: Byte[ ], startIndex: int) Boolean;

Description

Returns a Boolean value converted from one byte at a specified position in a byte array.

Return Value: true if the byte at startIndex in value is nonzero; otherwise, false. An array of bytes. The starting position within value.

ToChar

[C#] public static char ToChar(byte[ ] value, int startIndex);

[C++] public: static _wchar_t ToChar(unsigned char value _gc[ ], int startIndex);

[VB] Public Shared Function ToChar(ByVal value( ) As Byte, ByVal startIndex As Integer) As Char

[JScript] public static function ToChar(value: Byte[ ], startIndex: int): Char;

Description

Returns a Unicode character converted from two bytes at a specified position in a byte array.

Return Value: A character formed by two bytes beginning at startIndex. An array. The starting position within value.

ToDouble

[C#] public static double ToDouble(byte[ ] value, int startIndex);

[C++] public: static double ToDouble(unsigned char value _gc[ ], int startIndex);

[VB] Public Shared Function ToDouble(ByVal value( ) As Byte, ByVal startIndex As Integer) As Double

[JScript] public static function ToDouble(value: Byte[ ], startIndex: int): double;

Description

Returns a double-precision floating point number converted from eight bytes at a specified position in a byte array.

Return Value: A double precision floating point number formed by eight bytes beginning at startIndex. An array of bytes. The starting position within value.

ToInt16

[C#] public static short ToInt16(byte[ ] value, int startIndex);

[C++] public: static short ToInt16(unsigned char value _gc[ ], int startIndex);

[VB] Public Shared Function ToInt16(ByVal value( ) As Byte, ByVal startIndex As Integer) As Short

[JScript] public static function ToInt16(value: Byte[ ], startIndex: int): Int16;

Description

Returns a 16-bit signed integer converted from two bytes at a specified position in a byte array.

Return Value: A 16-bit signed integer formed by two bytes beginning at startIndex. An array of bytes. The starting position within value.

ToInt32

[C#] public static int ToInt32(byte[ ] value, int startIndex);

[C++] public: static int ToInt32(unsigned char value _gc[ ], int startIndex);

[VB] Public Shared Function ToInt32(ByVal value( ) As Byte, ByVal startIndex As Integer) As Integer

[JScript] public static function ToInt32(value: Byte[ ], startIndex: int): int;

Description

Returns a 32-bit signed integer converted from four bytes at a specified position in a byte array.

Return Value: A 32-bit signed integer formed by four bytes beginning at startIndex.value is null. An array of bytes. The starting position within value.

ToInt64

[C#] public static long ToInt64(byte[ ] value, int startIndex);

[C++] public: static _int64 ToInt64(unsigned char value _gc[ ], int startIndex);

[VB] Public Shared Function ToInt64(ByVal value( ) As Byte, ByVal startIndex As Integer) As Long

[JScript] public static function ToInt64(value: Byte[ ], startIndex: int): long;

Description

Returns a 64-bit signed integer converted from eight bytes at a specified position in a byte array., Return Value: A 64-bit signed integer formed by eight bytes beginning at startIndex. An array of bytes. The starting position within value.

ToSingle

[C#] public static float ToSingle(byte[ ] value, int startIndex);

[C++] public: static float ToSingle(unsigned char value _gc[ ], int startIndex);

[VB] Public Shared Function ToSingle(ByVal value( ) As Byte, ByVal startIndex As Integer) As Single

[JScript] public static function ToSingle(value: Byte[ ], startIndex: int): float;

Description

Returns a single-precision floating point number converted from four bytes at a specified position in a byte array.

Return Value: A single-precision floating point number formed by four bytes beginning at startIndex. An array of bytes. The starting position within value.

ToString

[C#] public static string ToString(byte[ ] value);

[C++] public: static String* ToString(unsigned char value _gc[ ]);

[VB] Public Shared Function ToString(ByVal value( ) As Byte) As String

[JScript] public static function ToString(value: Byte[ ]): String;

Description

Returns a String converted from the elements of a byte array.

Return Value: A System.String of hexadecimal pairs separated by hyphens, where each pair represents the corresponding element in value; for example, "7F-2C-4A".

All the elements of value are converted. An array of bytes.

ToString

[C#] public static string ToString(byte[ ] value, int startIndex);

[C++] public: static String* ToString(unsigned char value _gc[ ], int startIndex);

[VB] Public Shared Function ToString(ByVal value( ) As Byte, ByVal startIndex As Integer) As String

[JScript] public static function ToString(value: Byte[ ], startIndex: int): String;

Description

Returns a String converted from the elements of a byte array starting at a specified array position.

Return Value: A System.String of hexadecimal pairs separated by hyphens, where each pair represents the corresponding element in value; for example, “7F-2C-4A”.

The elements from array position startIndex to the end of the array are converted. An array of bytes. The starting position within value.

ToString

[C#] public static string ToString(byte[ ] value, int startIndex, int length);

[C++] public: static String* ToString(unsigned char value _gc[ ], int startIndex, int length);

[VB] Public Shared Function ToString(ByVal value( ) As Byte, ByVal startIndex As Integer, ByVal length As Integer) As String

[JScript] public static function ToString(value: Byte[ ], startIndex: int, length int): String; Returns a String converted from the elements of a byte array.

Description

Returns a String converted from a specified number of bytes at a specified position in a byte array.

Return Value: A System.String of hexadecimal pairs separated by hyphens, where each pair represents the corresponding element in value; for example, “7F-2C-4A”.

The length elements from array position startIndex are converted. An array of bytes. The starting position within value. The number of bytes to convert.

ToUInt16

[C#] public static ushort ToUInt16(byte[ ] value, int startIndex);

[C++] public: static unsigned short ToUInt16(unsigned char value _gc[ ], int startIndex);

[VB] Public Shared Function ToUInt16(ByVal value( ) As Byte, ByVal startIndex As Integer) As UInt16

[JScript] public static function ToUInt16(value: Byte[ ], startIndex: int): UInt16;

Description

Returns a 16-bit unsigned integer converted from two bytes at a specified position in a byte array.

Return Value: A 16-bit unsigned integer formed by two bytes beginning at startIndex. The array of bytes. The starting position within value.

ToUInt32

[C#] public static uint ToUInt32(byte[ ] value, int startIndex);

[C++] public: static unsigned int ToUInt32(unsigned char value _gc[ ], int startIndex);

[VB] Public Shared Function ToUInt32(ByVal value( ) As Byte, ByVal startIndex As Integer) As UInt32

[JScript] public static function ToUInt32(value: Byte[ ], startIndex: int): UInt32;

Description

Returns a 32-bit unsigned integer converted from four bytes at a specified position in a byte array.

Return Value: A 32-bit unsigned integer formed by four bytes beginning at startIndex. An array of bytes. The starting position within value.

ToUInt64

[C#] public static ulong ToUInt64(byte[ ] value, int startIndex);

[C++] public: static unsigned _int64 ToUInt64(unsigned char value _gc[ ], int startIndex);

[VB] Public Shared Function ToUInt64(ByVal value( ) As Byte, ByVal startIndex As Integer) As UInt64

[JScript] public static function ToUInt64(value: Byte[ ], startIndex: int): UInt64;

Description

Returns a 64-bit unsigned integer converted from eight bytes at a specified position in a byte array.

Return Value: A 64-bit unsigned integer formed by the eight bytes beginning at startIndex. An array of bytes. The starting position within value.

Boolean structure (System)

ToUInt64

Description

Represents a boolean value.

Instances of this type have values of either true or false.

ToUInt64

[C#] public static readonly string FalseString;

[C++] public: static String* FalseString;

[VB] Public Shared ReadOnly FalseString As String

[JScript] public static var FalseString: String;

Description

Represents the boolean value false as a System.String. This field is read-only.

This field is equal to the System.String “False”.

ToUInt64

[C#] public static readonly string TrueString;

[C++] public: static String* TrueString;

[VB] Public Shared ReadOnly TrueString As String

[JScript] public static var TrueString: String;

Description

Represents the boolean value true as a System.String. This field is read-only.

This field is equal to the System.String “True”.

CompareTo

[C#] public int CompareTo(object obj);

[C++] public: _sealed int CompareTo(Object* obj);

[VB] NotOverridable Public Function CompareTo(ByVal obj As Object) As Integer

[JScript] public function CompareTo(obj: Object): int;

Description

Compares this instance to a specified object and returns an indication of their relative values.

Return Value: A signed integer that indicates the relative order of this instance and obj.

obj must be null or an instance of Boolean; otherwise, an exception is thrown. An System.Object to compare to this instance. It may be a null reference.

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Returns a value indicating whether this instance is equal to a specified object.

Return Value: true if obj is a Boolean and has the same value as this instance; otherwise, false.

This method overrides System.Object.Equals(System.Object). An System.Object to compare to this instance.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for this instance.

Return Value: A hash code for the current System.Boolean.

The System.Boolean class implements true as the integer, one, and false as the integer, zero. However, a particular programming language might represent true and false with other values.

GetTypeCode

[C#] public TypeCode GetTypeCode( );

[C++] public: _sealed TypeCode GetTypeCode( );

[VB] NotOverridable Public Function GetTypeCode( ) As TypeCode

[JScript] public function GetTypeCode( ): TypeCode;

Description

Returns the TypeCode for value type Boolean.

Return Value: The enumerated constant, System.TypeCode. Boolean.

Parse

[C#] public static bool Parse(string value);

[C++] public: static bool Parse(String* value);

[VB] Public Shared Function Parse(ByVal value As String) As Boolean

[JScript] public static function Parse(value: String): Boolean;

Description

Converts the specified System.String representation of a logical value to its System.Boolean equivalent.

Return Value: true if value is equivalent to System.Boolean. TrueString; otherwise false.value is a null reference.

The value parameter, optionally preceded or trailed by white space, must contain either TrueString or FalseString; otherwise, an exception is thrown. The comparison is case-insensitive. A System.String containing the value to convert.

IConvertible.ToBoolean

[C#] bool IConvertible.ToBoolean(IFormatProvider provider);

[C++] bool IConvertible::ToBoolean(IFormatProvider* provider);

[VB] Function ToBoolean(ByVal provider As IFormatProvider) As Boolean Implements IConvertible.ToBoolean

[JScript] function IConvertible.ToBoolean(provider: IFormatProvider): Boolean;

IConvertible.ToByte

[C#] byte IConvertible.ToByte(IFormatProvider provider);

[C++] unsigned char IConvertible::ToByte(IFormatProvider* provider);

[VB] Function ToByte(ByVal provider As IFormatProvider) As Byte Implements IConvertible.ToByte

[JScript] function IConvertible.ToByte(provider: IFormatProvider): Byte;

IConvertible.ToChar

[C#] char IConvertible.ToChar(IFormatProvider provider);

[C++] _wchar_t IConvertible::ToChar(IFormatProvider* provider);

[VB] Function ToChar(ByVal provider As IFormatProvider) As Char Implements IConvertible.ToChar

[JScript] function IConvertible.ToChar(provider: IFormatProvider): Char;

IConvertible.ToDateTime

[C#] DateTime IConvertible.ToDateTime(IFormatProvider provider);

[C++] DateTime IConvertible::ToDateTime(IFormatProvider* provider);

[VB] Function ToDateTime(ByVal provider As IFormatProvider) As DateTime Implements IConvertible.ToDateTime

[JScript] function IConvertible.ToDateTime(provider: IFormatProvider): DateTime;

IConvertible.ToDecimal

[C#] decimal IConvertible.ToDecimal(IFormatProvider provider);

[C++] Decimal IConvertible::ToDecimal(IFormatProvider* provider);

[VB] Function ToDecimal(ByVal provider As IFormatProvider) As Decimal Implements IConvertible.ToDecimal

[JScript] function IConvertible.ToDecimal(provider: IFormatProvider): Decimal;

IConvertible.ToDouble

[C#] double IConvertible.ToDouble(IFormatProvider provider);

[C++] double IConvertible::ToDouble(IFormatProvider* provider);

[VB] Function ToDouble(ByVal provider As IFormatProvider) As Double Implements IConvertible.ToDouble

[JScript] function IConvertible.ToDouble(provider: IFormatProvider): double;

IConvertible.ToInt16

[C#] short IConvertible.ToInt16(IFormatProvider provider);

[C++] short IConvertible::ToInt16(IFormatProvider* provider);

[VB] Function ToInt16(ByVal provider As IFormatProvider) As Short Implements IConvertible.ToInt16

[JScript] function IConvertible.ToInt16(provider: IFormatProvider): Int16;

IConvertible.ToInt32

[C#] int IConvertible.ToInt32(IFormatProvider provider);

[C++] int IConvertible::ToInt32(IFormatProvider* provider);

[VB] Function ToInt32(ByVal provider As IFormatProvider) As Integer Implements IConvertible.ToInt32

[JScript] function IConvertible.ToInt32(provider: IFormatProvider): int;

IConvertible.ToInt64

[C#] long IConvertible.ToInt64(IFormatProvider provider);

[VB] Function ToInt64(ByVal provider As IFormatProvider) As Long Implements IConvertible.ToInt64

[JScript] function IConvertible.ToInt64(provider: IFormatProvider): long;

IConvertible.ToSByte

[C#] sbyte IConvertible.ToSByte(IFormatProvider provider);

[C++] char IConvertible::ToSByte(IFormatProvider* provider);

[VB] Function ToSByte(ByVal provider As IFormatProvider) As SByte Implements IConvertible.ToSByte

[JScript] function IConvertible.ToSByte(provider: IFormatProvider): SByte;

IConvertible.ToSingle

[C#] float IConvertible.ToSingle(IFormatProvider provider);

[C++] float IConvertible::ToSingle(IFormatProvider* provider);

[VB] Function ToSingle(ByVal provider As IFormatProvider) As Single Implements IConvertible.ToSingle

[JScript] function IConvertible.ToSingle(provider: IFormatProvider): float;

IConvertible.ToType

[C#] object IConvertible.ToType(Type type, IFormatProvider provider);

[C++] Object* IConvertible::ToType(Type* type, IFormatProvider* provider);

[VB] Function ToType(ByVal type As Type, ByVal provider As IFormatProvider) As Object Implements IConvertible.ToType

[JScript] function IConvertible.ToType(type: Type, provider: IFormatProvider) Object;

IConvertible.ToUInt16

[C#] ushort IConvertible.ToUInt16(IFormatProvider provider);

[C++] unsigned short IConvertible::ToUInt16(IFormatProvider* provider);

[VB] Function ToUInt16(ByVal provider As IFormatProvider) As UInt16 Implements IConvertible.ToUInt16

[JScript] function IConvertible.ToUInt16(provider: IFormatProvider): UInt16;

IConvertible.ToUInt32

[C#] uint IConvertible.ToUInt32(IFormatProvider provider);

[VB] Function ToUInt32(ByVal provider As IFormatProvider) As UInt32 Implements IConvertible.ToUInt32

[JScript] function IConvertible.ToUInt32(provider: IFormatProvider): UInt32;

IConvertible.ToUInt64

[C#] ulong IConvertible.ToUInt64(IFormatProvider provider);

[C++] unsigned _int IConvertible::ToUInt64(IFormatProvider* provider);

[VB] Function ToUInt64(ByVal provider As IFormatProvider) As UInt64 Implements IConvertible.ToUInt64

[JScript] function IConvertible.ToUInt64(provider: IFormatProvider): UInt64;

ToString

[C#] public override string ToString( );

[C++] public: String* ToString( );

[VB] Overrides Public Function ToString( ) As String

[JScript] public override function ToString( ): String; Converts the value of this instance to its equivalent System.String representation.

Description

Converts the value of this instance to its equivalent System.String representation.

Return Value: System.Boolean.TrueString if the value of this instance is true, or System.Boolean.FalseString if the value of this instance is false.

ToString

[C#] public string ToString(IFormatProvider provider);

[C++] public: _sealed String ToString(IFormatProvider* provider);

[VB] NotOverridable Public Function ToString(ByVal provider As IFormatProvider) As String

[JScript] public function ToString(provider: IFormatProvider): String;

Description

Converts the value of this instance to its equivalent String representation.

Return Value: System.Boolean.TrueString if the value of this instance is true, or System.Boolean.FalseString if the value of this instance is false.

The provider parameter is reserved. It does not participate in the execution of this method. (Reserved) An System.IFormatProvider object.

Buffer class (System)

ToString

Description

Manipulates unmanaged memory represented as arrays of bytes.

This class provides methods to copy bytes from one primitive array to another primitive array without respecting types, get a byte from an array, set a byte in an array, and obtain the length of an array.

BlockCopy

[C#] public static void BlockCopy(Array src, int srcOffset, Array dst, int dstOffset, int count);

[C++] public: static void BlockCopy(Array* src, int srcOffset, Array* dst, int dstOffset, int count);

[VB] Public Shared Sub BlockCopy(ByVal src As Array, ByVal srcOffset As Integer, ByVal dst As Array, ByVal dstOffset As Integer, ByVal count As Integer)

[JScript] public static function BlockCopy(src: Array, srcOffset: int, dst: Array, dstOffset: int, count: int);

Description

Copies a specified number of bytes from a source array starting at a particular offset to a destination array starting at a particular offset.

Copies count bytes from src, beginning at srcOffset, to dst, beginning at dstOffset. The source buffer. The byte offset into src. The destination buffer. The byte offset into dst. The number of bytes to copy.

ByteLength

[C#] public static int ByteLength(Array array);

[C++] public: static int ByteLength(Array* array);

[VB] Public Shared Function ByteLength(ByVal array As Array) As Integer

[JScript] public static function ByteLength(array: Array): int;

Description

Returns the number of bytes in the specified array.

Return Value: The number of bytes in the array. An array.

GetByte

[C#] public static byte GetByte(Array array, int index);

[C++] public: static unsigned char GetByte(Array* array, int index);

[VB] Public Shared Function GetByte(ByVal array As Array, ByVal index As Integer) As Byte

[JScript] public static function GetByte(array: Array, index: int): Byte;

Description

Retrieves the byte at a specified location in a specified array.

Return Value: Returns the index byte in the array.

The GetByte method gets a particular byte out of the array. The array must be an array of primitives. An array. A location in the array.

SetByte

[C#] public static void SetByte(Array array, int index, byte value);

[C++] public: static void SetByte(Array* array, int index, unsigned char value);

[VB] Public Shared Sub SetByte(ByVal array As Array, ByVal index As Integer, ByVal value As Byte)

[JScript] public static function SetByte(array: Array, index: int, value: Byte);

Description

Assigns a specified value to a byte at a particular location in a specified array.

array must be an array of primitives. An array. A location in the array. A value to assign.

Byte structure (System)

ToString

Description

Represents an 8-bit unsigned integer.

The Byte value type represents unsigned integers with values ranging from 0 to 255.

ToString

[C#] public const byte MaxValue;

[C++] public: const unsigned char MaxValue;

[VB] Public Const MaxValue As Byte

[JScript] public var MaxValue: Byte;

Description

A constant representing the largest possible value of Byte.

The value of this constant is 255; that is, hexadecimal 0xFF.

ToString

[C#] public const byte MinValue;

[C++] public: const unsigned char MinValue;

[VB] Public Const MinValue As Byte

[JScript] public var MinValue: Byte;

Description

A constant representing the smallest possible value of Byte.

The value of this constant is.

CompareTo

[C#] public int CompareTo(object value);

[C++] public: _sealed int CompareTo(Object* value);

[VB] NotOverridable Public Function CompareTo(ByVal value As Object) As Integer

[JScript] public function CompareTo(value: Object): int;

Description

Compares this instance to a specified object and returns an indication of their relative values.

Return Value: A signed number indicating the relative values of this instance and value.

Any instance of Byte, regardless of its value, is considered greater than null. An object to compare, or null.

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Returns a value indicating whether this instance is equal to a specified object.

Return Value: true if obj is an instance of Byte and equals the value of this instance; otherwise, false. An object to compare with this instance or null.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for this instance.

Return Value: A 32-bit signed integer hash code.

GetTypeCode

[C#] public TypeCode GetTypeCode( );

[C++] public: _sealed TypeCode GetTypeCode( );

[VB] NotOverridable Public Function GetTypeCode( ) As TypeCode

[JScript] public function GetTypeCode( ): TypeCode;

Description

Returns the TypeCode for value type Byte.

Return Value: The enumerated constant, System.TypeCode.Byte.

Parse

[C#] public static byte Parse(string s);

[C++] public: static unsigned char Parse(String* s);

[VB] Public Shared Function Parse(ByVal s As String) As Byte

[JScript] public static function Parse(s: String): Byte; Converts the String representation of a number to its 8-bit unsigned integer equivalent.

Description

Converts the String representation of a number to its 8-bit unsigned integer equivalent.

Return Value: An 8-bit unsigned integer equivalent to the number contained in s.

s contains a number of the form: [ws][sign]digits[ws] Items in square brackets ('[' and ']') are optional, and other items are as follows. A System.String containing a number to convert.

Parse

[C#] public static byte Parse(string s, IFormatProvider provider);

[C++] public: static unsigned char Parse(String* s, IFormatProvider* provider);

[VB] Public Shared Function Parse(ByVal s As String, ByVal provider As IFormatProvider) As Byte

[JScript] public static function Parse(s: String, provider: IFormatProvider): Byte;

Description

Converts the String representation of a number in a specified culture-specific format to its 8-bit unsigned integer equivalent.

Return Value: An 8-bit unsigned integer equivalent to the number specified in s.

s contains a number of the form: [ws][sign]digits[ws] Items in square brackets ('[' and']') are optional, and other items are as follows. A System.String containing a number to convert. An System.IFormatProvider interface implementation which supplies culture-specific formatting information about s.

Parse

[C#] public static byte Parse(string s, NumberStyles style);

[C++] public: static unsigned char Parse(String* s, NumberStyles style);

[VB] Public Shared Function Parse(ByVal s As String, ByVal style As NumberStyles) As Byte

[JScript] public static function Parse(s: String, style: NumberStyles): Byte;

Description

Converts the String representation of a number in a specified style to its 8-bit unsigned integer equivalent.

Return Value: An 8-bit unsigned integer equivalent to the number specified in s.

s contains a number of the form: [ws][sign]digits[ws] Items in square brackets ('[' and ']') are optional, and other items are as follows. A System.String containing a number to convert. The combination of one or more System.Globalization.NumberStyles constants that indicate the permitted format of s.

Parse

[C#] public static byte Parse(string s, NumberStyles style, IFormatProvider provider);

[C++] public: static unsigned char Parse(String* s, NumberStyles style, IFormatProvider* provider);

[VB] Public Shared Function Parse(ByVal s As String, ByVal style As NumberStyles, ByVal provider As IFormatProvider) As Byte

[JScript] public static function Parse(s: String, style: NumberStyles, provider: IFormatProvider): Byte;

Description

Converts the String representation of a number in a specified style and culture-specific format to its 8-bit unsigned integer equivalent.

Return Value: An 8-bit unsigned integer equivalent to the number specified in s.

s contains a number of the form: [ws][sign]digits[ws] Items in square brackets ('[' and ']') are optional, and other items are as follows. A System.String containing a number to convert. The combination of one or more System.Globalization.NumberStylesconstants that indicate the permitted format of s. An System.IFormatProvider interface implementation which supplies culture-specific formatting information about s.

IConvertible.ToBoolean

[C#] bool IConvertible.ToBoolean(IFormatProvider provider);

[C++] bool IConvertible::ToBoolean(IFormatProvider* provider);

[VB] Function ToBoolean(ByVal provider As IFormatProvider) As Boolean Implements IConvertible.ToBoolean

[JScript] function IConvertible.ToBoolean(provider: IFormatProvider): Boolean;

IConvertible.ToByte

[C#] byte IConvertible.ToByte(IFormatProvider provider);

[C++] unsigned char IConvertible::ToByte(IFormatProvider* provider);

[VB] Function ToByte(ByVal provider As IFormatProvider) As Byte Implements IConvertible.ToByte

[JScript] function IConvertible.ToByte(provider: IFormatProvider): Byte; IConvertible.ToChar

[C#] char IConvertible.ToChar(IFormatProvider provider);

[C++] _wchar_t IConvertible::ToChar(IFormatProvider* provider);

[VB] Function ToChar(ByVal provider As IFormatProvider) As Char Implements IConvertible.ToChar

[JScript] function IConvertible.ToChar(provider: IFormatProvider): Char; IConvertible.ToDateTime

[C#] DateTime IConvertible.ToDateTime(IFormatProvider provider);

[C++] DateTime IConvertible::ToDateTime(IFormatProvider* provider);

[VB] Function ToDateTime(ByVal provider As IFormatProvider) As DateTime Implements IConvertible.ToDateTime

[JScript] function IConvertible.ToDateTime(provider: IFormatProvider): DateTime;

IConvertible.ToDecimal

[C#] decimal IConvertible.ToDecimal(IFormatProvider provider);

[C++] Decimal IConvertible::ToDecimal(IFormatProvider* provider);

[VB] Function ToDecimal(ByVal provider As IFormatProvider) As Decimal Implements IConvertible.ToDecimal

[JScript] function IConvertible.ToDecimal(provider: IFormatProvider): Decimal;

IConvertible.ToDouble

[C#] double IConvertible.ToDouble(IFormatProvider provider);

[C++] double IConvertible::ToDouble(IFormatProvider* provider);

[VB] Function ToDouble(ByVal provider As IFormatProvider) As Double Implements IConvertible.ToDouble

[JScript] function IConvertible.ToDouble(provider: IFormatProvider): double;

IConvertible.ToInt16

[C#] short IConvertible.ToInt16(IFormatProvider provider);

[C++] short IConvertible::ToInt16(IFormatProvider* provider);

[VB] Function ToInt16(ByVal provider As IFormatProvider) As Short Implements IConvertible.ToInt16

[JScript] function IConvertible.ToInt16(provider: IFormatProvider): Int16;

IConvertible.ToInt32

[C#] it IConvertible.ToInt32(IFormatProvider provider);

[C++] int IConvertible::ToInt32(IFormatProvider* provider);

[VB] Function ToInt32(ByVal provider As IFormatProvider) As Integer Implements IConvertible.ToInt32

[JScript] function IConvertible.ToInt32(provider: IFormatProvider): int;

IConvertible.ToInt64

[C#] long IConvertible.ToInt64(IFormatProvider provider);

[C++] _int64 IConvertible::ToInt64(IFormatProvider* provider);

[VB] Function ToInt64(ByVal provider As IFormatProvider) As Long Implements IConvertible.ToInt64

[JScript] function IConvertible.ToInt64(provider: IFormatProvider): long;

IConvertible.ToSByte

[C#] sbyte IConvertible.ToSByte(IFormatProvider provider);

[C++] char IConvertible::ToSByte(IFormatProvider* provider);

[VB] Function ToSByte(ByVal provider As IFormatProvider) As SByte Implements IConvertible.ToSByte

[JScript] function IConvertible.ToSByte(provider: IFormatProvider): SByte;

IConvertible.ToSingle

[C#] float IConvertible.ToSingle(IFormatProvider provider);

[C++] float IConvertible::ToSingle(IFormatProvider* provider);

[VB] Function ToSingle(ByVal provider As IFormatProvider) As Single Implements IConvertible.ToSingle

[JScript] function IConvertible.ToSingle(provider: IFormatProvider): float;

IConvertible.ToType

[C#] object IConvertible.ToType(Type type, IFormatProvider provider);

[C++] Object* IConvertible::ToType(Type* type, IFormatProvider* provider);

[VB] Function ToType(ByVal type As Type, ByVal provider As IFormatProvider) As Object Implements IConvertible.ToType

[JScript] function IConvertible.ToType(type: Type, provider: IFormatProvider): Object;

IConvertible.ToUInt16

[C#] ushort IConvertible.ToUInt16(IFormatProvider provider);

[C++] unsigned short IConvertible::ToUInt16(IFormatProvider* provider);

[VB] Function ToUInt16(ByVal provider As IFormatProvider) As UInt16 Implements IConvertible.ToUInt16

[JScript] function IConvertible.ToUInt16(provider: IFormatProvider): UInt16;

IConvertible.ToUInt32

[C#] uint IConvertible.ToUInt32(IFormatProvider provider);

[C++] unsigned int IConvertible::ToUInt32(IFormatProvider* provider);

[VB] Function ToUInt32(ByVal provider As IFormatProvider) As UInt32 Implements IConvertible.ToUInt32

[JScript] function IConvertible.ToUInt32(provider: IFormatProvider): UInt32;

IConvertible.ToUInt64

[C#] ulong IConvertible.ToUInt64(IFormatProvider provider);

[C++] unsigned _int64 IConvertible::ToUInt64(IFormatProvider* provider);

[VB] Function ToUInt64(ByVal provider As IFormatProvider) As UInt64 Implements IConvertible.ToUInt64

[JScript] function IConvertible.ToUInt64(provider: IFormatProvider): UInt64;

ToString

[C#] public override string ToString( );

[C++] public: String* ToString( );

[VB] Overrides Public Function ToString( ) As String

[JScript] public override function ToString( ): String; Converts the numeric value of this instance to its equivalent String representation.

Description

Converts the numeric value of this instance to its equivalent String representation.

Return Value: The System.String representation of the value of this instance, consisting of a sequence of digits ranging from 0 to 9, without a sign or leading zeroes.

The return value is formatted with the general format specifier ("G") and the System.Globalization.NumberFormatInfo for the current culture.

ToString

[C#] public string ToString(IFormatProvider provider); [C++] public: _sealed String* ToString(IFormatProvider* provider);

[VB] NotOverridable Public Function ToString(ByVal provider As IFormatProvider) As String

[JScript] public function ToString(provider: IFormatProvider): String;

Description

Converts the numeric value of this instance to its equivalent String representation using the specified culture-specific format information.

Return Value: The System.String representation of the value of this instance as specified by provider.

This instance is formatted with the general format specifier ("G"). An System.IFormatProvider interface implementation which supplies culture-specific formatting information.

ToString

[C#] public string ToString(string format);

[C++] public: String* ToString(String* format);

[VB] Public Function ToString(ByVal format As String) As String

[JScript] public function ToString(format: String): String;

Description

Converts the numeric value of this instance to its equivalent String representation using the specified format.

Return Value: The System.String representation of the value of this instance as specified by format.

If format is null or an empty string, the return value of this instance is formatted with the general format specifier ("G"). A format string.

ToString

[C#] public string ToString(string format, IFormatProvider provider);

[C++] public: _sealed String* ToString(String* format, IFormatProvider* provider);

[VB] NotOverridable Public Function ToString(ByVal format As String, ByVal provider As IFormatProvider) As String

[JScript] public function ToString(format: String, provider: IFormatProvider): String;

Description

Converts the numeric value of this instance to its equivalent String representation using the specified format and culture-specific format information.

Return Value: The System.String representation of the value of this instance as specified by format and provider.

If format is null or an empty string, the return value for this instance is formatted with the general format specifier ("G"). A format specification. An System.IFormatProvider interface implementation which supplies culture-specific formatting information.

CannotUnloadAppDomainException class (System)

ToString

Description

The exception that is thrown when an attempt to unload an application domain fails.

System.CannotUnloadAppDomainException is thrown when there is an attempt to unload: The default application domain, which must remains loaded during the lifetime of the application.

CannotUnloadAppDomainException

Example Syntax:

ToString

[C#] public CannotUnloadAppDomainException( );

[C++] public: CannotUnloadAppDomainException( );

[VB] Public Sub New( )

[JScript] public function CannotUnloadAppDomainException( ); Initializes a new instance of the System.CannotUnloadAppDomainException class.

Description

Initializes a new instance of the System.CannotUnload AppDomainException class with default properties.

The following table shows the initial property values for an instance of System.CannotUnloadAppDomainException.

CannotUnloadAppDomainException

Example Syntax:

ToString

[C#] public CannotUnloadAppDomainException(string message);

[C++] public: CannotUnloadAppDomainException(String* message);

[VB] Public Sub New(ByVal message As String)

[JScript] public function CannotUnloadAppDomainException(message: String);

Description

Initializes a new instance of the System.CannotUnload AppDomainException class with a specified error message.

The following table shows the initial property values for an instance of System.CannotUnloadAppDomainException. The error message that explains the reason for the exception.

CannotUnloadAppDomainException

Example Syntax:

ToString

[C#] protected CannotUnloadAppDomainException(SerializationInfo info, StreamingContext context);

[C++] protected: CannotUnloadAppDomainException(SerializationInfo* info, StreamingContext context);

[VB] Protected Sub New(ByVal info As SerializationInfo, ByVal context As StreamingContext)

[JScript] protected function CannotUnloadAppDomainException(info: SerializationInfo, context: StreamingContext);

Description

Initializes a new instance of the System.CannotUnloadAppDomainException class from serialized data.

This constructor is called during deserialization to reconstitute the exception object transmitted over a stream. For more information, see. The object that holds the serialized object data. The contextual information about the source or destination.

CannotUnloadAppDomainException

Example Syntax:

ToString

[C#] public CannotUnloadAppDomainException(string message, Exception innerException);

[C++] public: CannotUnloadAppDomainException(String* message, Exception* innerException);

[VB] Public Sub New(ByVal message As String, ByVal innerException As Exception)

[JScript] public function CannotUnloadAppDomainException(message: String, innerException: Exception);

Description

Initializes a new instance of the System.CannotUnloadAppDomainException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If innerException is non-null, then the current Exception is raised in a catch block handling innerException.

HelpLink

HResult

InnerException

Message

Source

StackTrace

TargetSite

Char structure (System)

ToString

Description

Represents a Unicode character.

The Char value type represents Unicode characters with values ranging from hexadecimal 0x0000 to 0xFFFF.

ToString

[C#] public const char MaxValue;

[C++] public: const _wchar_t MaxValue;

[VB] Public Const MaxValue As Char

[JScript] public var MaxValue: Char;

Description

A constant representing the largest possible value of Char. The value of this constant is hexadecimal 0xFFFF.

ToString

[C#] public const char MinValue;

[C++] public: const _wchar_t MinValue;

[VB] Public Const MinValue As Char

[JScript] public var MinValue: Char;

Description

A constant representing the smallest possible value of Char.

The value of this constant is hexadecimal 0x00.

CompareTo

[C#] public int CompareTo(object value);

[C++] public: _sealed int CompareTo(Object* value);

[VB] NotOverridable Public Function CompareTo(ByVal value As Object) As Integer

[JScript] public function CompareTo(value: Object): int;

Description

Compares this instance to a specified object and returns an indication of their relative values.

Return Value: A signed number indicating the relative values of this instance and value.

Any instance of Char, regardless of its value, is considered greater than null. An object to compare, or null.

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Returns a value indicating whether this instance is equal to a specified object.

Return Value: true if obj is an instance of Char and equals the value of this instance; otherwise, false. An object to compare with this instance or null.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for this instance.

Return Value: A 32-bit signed integer hash code.

GetNumericValue

[C#] public static double GetNumericValue(char c);

[C++] public: static double GetNumericValue(_wchar_t c);

[VB] Public Shared Function GetNumericValue(ByVal c As Char) As Double

[JScript] public static function GetNumericValue(c: Char): double; Converts a specified numeric Unicode character to a double-precision floating point number.

Description

Converts the specified numeric Unicode character to a double-precision floating point number.

Return Value: The numeric value of c if that character represents a number; otherwise, −1.

For example, if c is '5', the return value is 5. However, if c is 'z', the return value is −1. A Unicode character.

GetNumericValue

[C#] public static double GetNumericValue(string s, int index);

[C++] public: static double GetNumericValue(String* s, int index);

[VB] Public Shared Function GetNumericValue(ByVal s As String, ByVal index As Integer) As Double

[JScript] public static function GetNumericValue(s: String, index: int): double;

Description

Converts the numeric Unicode character at the specified position in a specified System.String to a double-precision floating point number.

Return Value: The numeric value of the character at position index in s if that character represents a number; otherwise, −1.

For example, if the character at position index in s is '5', the return value is 5. However, if the character at position index in s is 'z', the return value is −1. A System.String. A 32-bit signed integer that specifies a character position in s.

GetTypeCode

[C#] public TypeCode GetTypeCode( );

[C++] public: _sealed TypeCode GetTypeCode( );

[VB] NotOverridable Public Function GetTypeCode( ) As TypeCode

[JScript] public function GetTypeCode( ): TypeCode;

Description

Returns the TypeCode for value type Char.

Return Value: The enumerated constant, System.TypeCode. Char.

GetUnicodeCategory

[C#] public static UnicodeCategory GetUnicodeCategory (char c);

[C++] public: static UnicodeCategory GetUnicodeCategory (_wchar_t c);

[VB] Public Shared Function GetUnicodeCategory(ByVal c As Char) As UnicodeCategory

[JScript] public static function GetUnicodeCategory(c: Char): UnicodeCategory; Categorizes a Unicode character into a group identified by a UnicodeCategory enumerated constant.

Description

Categorizes a specified Unicode character into a group identified by a UnicodeCategory enumerated constant.

Return Value: A System.Globalization.UnicodeCategory enumerated constant that identifies the group that contains c. A Unicode character.

GetUnicodeCategory

[C#] public static UnicodeCategory GetUnicodeCategory (string s, int index);

[C++] public: static UnicodeCategory GetUnicodeCategory (String* s, int index);

[VB] Public Shared Function GetUnicodeCategory(ByVal s As String, ByVal index As Integer) As UnicodeCategory

[JScript] public static function GetUnicodeCategory(s: String, index: int) UnicodeCategory;

Description

Categorizes the character at the specified position in a specified String into a group identified by a UnicodeCategory enumerated constant.

Return Value: A System.Globalization.UnicodeCategory enumerated constant that identifies the group that contains the character at position index in s.

Character positions in a String are indexed starting from zero. A System.String. A 32-bit signed integer that specifies a character position in s.

IsControl

[C#] public static bool IsControl(char c);

[C++] public: static bool IsControl(_wchar_t c);

[VB] Public Shared Function IsControl(ByVal c As Char) As Boolean

[JScript] public static function IsControl(c: Char): Boolean; Indicates whether a specified Unicode character is categorized as a control character.

Description

Indicates whether the specified Unicode character is categorized as a control character.

Return Value: true if c is a control character; otherwise, false. A Unicode character.

IsControl

[C#] public static bool IsControl(string s, int index);

[C++] public: static bool IsControl(String* s, int index);

[VB] Public Shared Function IsControl(ByVal s As String, ByVal index As Integer) As Boolean

[JScript] public static function IsControl(s: String, index: int): Boolean;

Description

Indicates whether the character at the specified position in a specified String is categorized as a control character.

Return Value: true if the character at position index in s is a control character; otherwise, false.

Character positions in a String are indexed starting from zero. A System.String. A 32-bit signed integer that specifies a character position in s.

IsDigit

[C#] public static bool IsDigit(char c);

[C++] public: static bool IsDigit(_wchar_t c);

[VB] Public Shared Function IsDigit(ByVal c As Char) As Boolean

[JScript] public static function IsDigit(c: Char): Boolean; Indicates whether a Unicode character is categorized as a decimal digit.

Description

Indicates whether the specified Unicode character is categorized as a decimal digit.

Return Value: true if c is a decimal digit; otherwise, false. A Unicode character.

IsDigit

[C#] public static bool IsDigit(string s, int index);

[C++] public: static bool IsDigit(String* s, int index);

[VB] Public Shared Function IsDigit(ByVal s As String, ByVal index As Integer) As Boolean

[JScript] public static function IsDigit(s: String, index: int): Boolean;

Description

Indicates whether the character at the specified position in a specified String is categorized as a decimal digit.

Return Value: true if the character at position index in s is a decimal digit; otherwise, false.

Character positions in a String are indexed starting from zero. A System.String. A 32-bit signed integer that specifies a character position in s.

IsLetter

[C#] public static bool IsLetter(char c);

C++] public: static bool IsLetter(_wchar_t c);

[VB] Public Shared Function IsLetter(ByVal c As Char) As Boolean

[JScript] public static function IsLetter(c: Char): Boolean; Indicates whether a Unicode character is categorized as an alphabetic letter.

Description

Indicates whether the specified Unicode character is categorized as an alphabetic letter.

Return Value: true if c is an alphabetic letter; otherwise, false.

Valid letters are members of the following categories in System.Globalization.UnicodeCategory: UppercaseLetter, LowercaseLetter, TitlecaseLetter, ModifierLetter, and OtherLetter. A Unicode character.

IsLetter

[C#] public static bool IsLetter(string s, int index);

[C++] public: static bool IsLetter(String* s, int index);

[VB] Public Shared Function IsLetter(ByVal s As String, ByVal index As Integer) As Boolean

[JScript] public static function IsLetter(s: String, index: int): Boolean;

Description

Indicates whether the character at the specified position in a specified String is categorized as an alphabetic character.

Return Value: true if the character at position index in s is an alphabetic character; otherwise, false. Character positions in a String are indexed starting from zero. A System.String. A 32-bit signed integer that specifies a character position in s.

IsLetterOrDigit

[C#] public static bool IsLetterOrDigit(char c);

[C++] public: static bool IsLetterOrDigit(_wchar_t c);

[VB] Public Shared Function IsLetterOrDigit(ByVal c As Char) As Boolean

[JScript] public static function IsLetterOrDigit(c: Char): Boolean; Indicates whether a Unicode character is categorized as a letter or decimal digit.

Description

Indicates whether the specified Unicode character is categorized as a letter or decimal digit.

Return Value: true if c is a letter or decimal digit; otherwise, false. A Unicode character.

IsLetterOrDigit

[C#] public static bool IsLetterOrDigit(string s, int index);

[C++] public: static bool IsLetterOrDigit(String* s, int index);

[VB] Public Shared Function IsLetterOrDigit(ByVal s As String, ByVal index As Integer) As Boolean

[JScript] public static function IsLetterOrDigit(s: String, index: int): Boolean;

Description

Indicates whether the character at the specified position in a specified String is categorized as an alphabetic character or a decimal digit.

Return Value: true if the character at position index in s is an alphabetic character or a decimal digit; otherwise, false.

Character positions in a String are indexed starting from zero. A System.String. A 32-bit signed integer that specifies a character position in s.

IsLower

[C#] public static bool IsLower(char c);

[C++] public: static bool IsLower(_wchar_t c);

[VB] Public Shared Function IsLower(ByVal c As Char) As Boolean

[JScript] public static function IsLower(c: Char): Boolean; Indicates whether a Unicode character is categorized as a lowercase letter.

Description

Indicates whether the specified Unicode character is categorized as a lowercase letter.

Return Value: true if c is a lowercase letter; otherwise, false. A Unicode character.

IsLower

[C#] public static bool IsLower(string s, int index);

[C++] public: static bool IsLower(String* s, int index);

[VB] Public Shared Function IsLower(ByVal s As String, ByVal index As Integer) As Boolean

[JScript] public static function IsLower(s: String, index: int): Boolean;

Description

Indicates whether the character at the specified position in a specified String is categorized as a lowercase letter.

Return Value: true if the character at position index in s is a lowercase letter; otherwise, false.

Character positions in a String are indexed starting from zero. A System.String. A 32-bit signed integer that specifies a character position in s.

IsNumber

[C#] public static bool IsNumber(char c);

[C++] public: static bool IsNumber(_wchar_t c);

[VB] Public Shared Function IsNumber(ByVal c As Char) As Boolean

[JScript] public static function IsNumber(c: Char): Boolean; Indicates whether a Unicode character is categorized as a decimal digit or hexadecimal number.

Description

Indicates whether the specified Unicode character is categorized as a decimal digit or hexadecimal number.

Return Value: true if c is a decimal digit or hexadecimal number; otherwise, false A Unicode character.

IsNumber

[C#] public static bool IsNumber(string s, int index);

[C++] public: static bool IsNumber(String* s, int index);

[VB] Public Shared Function IsNumber(ByVal s As String, ByVal index As Integer) As Boolean

[JScript] public static function IsNumber(s: String, index: int): Boolean;

Description

Indicates whether the character at the specified position in a specified String is categorized as a decimal digit or hexadecimal number.

Return Value: true if the character at position index in s is a decimal digit or hexadecimal number; otherwise, false.

Character positions in a String are indexed starting from zero. A System.String. A 32-bit signed integer that specifies a character position in s.

IsPunctuation

[C#] public static bool IsPunctuation(char c);

[C++] public: static bool IsPunctuation(_wchar_t c);

[VB] Public Shared Function IsPunctuation(ByVal c As Char) As Boolean

[JScript] public static function IsPunctuation(c: Char): Boolean; Indicates whether a Unicode character is categorized as a punctuation mark.

Description

Indicates whether the specified Unicode character is categorized as a punctuation mark.

Return Value: true if c is a punctuation mark; otherwise, false. A Unicode character.

IsPunctuation

[C#] public static bool IsPunctuation(string s, int index);

[C++] public: static bool IsPunctuation(String* s, int index);

[VB] Public Shared Function IsPunctuation(ByVal s As String, ByVal index As Integer) As Boolean

[JScript] public static function IsPunctuation(s: String, index: int): Boolean;

Description

Indicates whether the character at the specified position in a specified String is categorized as a punctuation mark.

Return Value: true if the character at position index in s is a punctuation mark; otherwise, false.

Character positions in a String are indexed starting from zero. A System.String. A 32-bit signed integer that specifies a character position in s.

IsSeparator

[C#] public static bool IsSeparator(char c);

[C++] public: static bool IsSeparator(_wchar_t c);

[VB] Public Shared Function IsSeparator(ByVal c As Char) As Boolean

[JScript] public static function IsSeparator(c: Char): Boolean; Indicates whether a Unicode character is categorized as a separator character.

Description

Indicates whether the specified Unicode character is categorized as a separator character.

Return Value: true if c is a separator character; otherwise, false. A Unicode character.

IsSeparator

[C#] public static bool IsSeparator(string s, int index);

[C++] public: static bool IsSeparator(String* s, int index);

[VB] Public Shared Function IsSeparator(ByVal s As String, ByVal index As Integer) As Boolean

[JScript] public static function IsSeparator(s: String, index: int): Boolean;

Description

Indicates whether the character at the specified position in a specified String is categorized as a separator character.

Return Value: true if the character at position index in s is a separator character; otherwise, false.

Character positions in a String are indexed starting from zero. A System.String. A 32-bit signed integer that specifies a character position in s.

IsSurrogate

[C#] public static bool IsSurrogate(char c);

[C++] public: static bool IsSurrogate(_wchar_t c);

[VB] Public Shared Function IsSurrogate(ByVal c As Char) As Boolean

[JScript] public static function IsSurrogate(c: Char): Boolean; Indicates whether a Unicode character is categorized as a surrogate character.

Description

Indicates whether the specified Unicode character is categorized as a surrogate character.

Return Value: true if c is a surrogate character; otherwise, false.

For more information about surrogate pairs, see the Unicode Standard at http://www.unicode.org. A Unicode character.

IsSurrogate

[C#] public static bool IsSurrogate(string S, int index);

[C++] public: static bool IsSurrogate(String* s, int index);

[VB] Public Shared Function IsSurrogate(ByVal s As String, ByVal index As Integer) As Boolean

[JScript] public static function IsSurrogate(s: String, index: int): Boolean;

Description

Indicates whether the character at the specified position in a specified String is categorized as a surrogate character.

Return Value: true if the character at position index in s is a surrogate character; otherwise, false.

Character positions in a String are indexed starting from zero. A System.String. A 32-bit signed integer that specifies a character position in s.

IsSymbol

[C#] public static bool IsSymbol(char c);

[C++] public: static bool IsSymbol(_wchar_t c);

[VB] Public Shared Function IsSymbol(ByVal c As Char) As Boolean

[JScript] public static function IsSymbol(c: Char): Boolean; Indicates whether a Unicode character is categorized as a symbol character.

Description

Indicates whether the specified Unicode character is categorized as a symbol character.

Return Value: true if c is a symbol character; otherwise, false.

Valid symbols are members of the following categories in System.Globalization.UnicodeCategory: MathSymbol, CurrencySymbol, ModifierSymbol, and OtherSymbol. A Unicode character.

IsSymbol

[C#] public static bool IsSymbol(string s, int index);

[C++] public: static bool IsSymbol(String* s, int index);

[VB] Public Shared Function IsSymbol(ByVal s As String, ByVal index As Integer) As Boolean

[JScript] public static function IsSymbol(s: String, index: int): Boolean;

Description

Indicates whether the character at the specified position in a specified String is categorized as a symbol character.

Return Value: true if the character at position index in s is a symbol character; otherwise, false.

Character positions in a String are indexed starting from zero. A System.String. A 32-bit signed integer that specifies a character position in s.

IsUpper

[C#] public static bool IsUpper(char c);

[C++] public: static bool IsUpper(_wchar_t c);

[VB] Public Shared Function IsUpper(ByVal c As Char) As Boolean

[JScript] public static function IsUpper(c: Char): Boolean; Indicates whether a Unicode character is categorized as an uppercase letter.

Description

Indicates whether the specified Unicode character is categorized as an uppercase letter.

Return Value: true if c is an uppercase letter; otherwise, false. A Unicode character.

IsUpper

[C#] public static bool IsUpper(string s, int index);

[C++] public: static bool IsUpper(String* s, int index);

[VB] Public Shared Function IsUpper(ByVal s As String, ByVal index As Integer) As Boolean

[JScript] public static function IsUpper(s: String, index: int): Boolean;

Description

Indicates whether the character at the specified position in a specified String is categorized as an uppercase letter.

Return Value: true if the character at position index in s is an uppercase letter; otherwise, false. Character positions in a String are indexed starting from zero. A System.String. A 32-bit signed integer that specifies a character position in s.

IsWhiteSpace

[C#] public static bool IsWhiteSpace(char c);

[C++] public: static bool IsWhiteSpace(_wchar_t c);

[VB] Public Shared Function IsWhiteSpace(ByVal c As Char) As Boolean

[JScript] public static function IsWhiteSpace(c: Char): Boolean; Indicates whether a Unicode character is categorized as white space.

Description

Indicates whether the specified Unicode character is categorized as white space.

Return Value: true if c is white space; otherwise, false.

Valid white space characters are members of the SpaceSeparator category in System.Globalization.UnicodeCategory, as well as these Unicode characters: hexadecimal 0x0009, 0x000a, 0x000b, 0x000c, 0x000d, 0x0085, 0x2028, and 0x2029. A Unicode character.

IsWhiteSpace

[C#] public static bool IsWhiteSpace(string s, int index);

[C++] public: static bool IsWhiteSpace(String* s, int index);

[VB] Public Shared Function IsWhiteSpace(ByVal s As String, ByVal index As Integer) As Boolean

[JScript] public static function IsWhiteSpace(s: String, index: int): Boolean;

Description

Indicates whether the character at the specified position in a specified String is categorized as white space.

Return Value: true if the character at position index in s is white space; otherwise, false.

Character positions in a String are indexed starting from zero. A System.String. A 32-bit signed integer that specifies a character position in s.

Parse

[C#] public static char Parse(string s);

[C++] public: static __wchar_t Parse(String* s);

[VB] Public Shared Function Parse(ByVal s As String) As Char

[JScript] public static function Parse(s: String): Char;

Description

Converts the value of the specified String to its equivalent Unicode character.

Return Value: A Unicode character equivalent to the sole character in s. A System.String containing a single character or null.

IConvertible.ToBoolean

[C#] bool IConvertible.ToBoolean(IFormatProvider provider);

[C++] bool IConvertible::ToBoolean(IFormatProvider* provider);

[VB] Function ToBoolean(ByVal provider As IFormatProvider) As Boolean Implements IConvertible.ToBoolean

[JScript] function IConvertible.ToBoolean(provider: IFormatProvider): Boolean;

IConvertible.ToByte

[C#] byte IConvertible.ToByte(IFormatProvider provider);

[C++] unsigned char IConvertible::ToByte(IFormatProvider* provider);

[VB] Function ToByte(ByVal provider As IFormatProvider) As Byte Implements IConvertible.ToByte

[JScript] function IConvertible.ToByte(provider: IFormatProvider): Byte; IConvertible.ToChar

[C#] char IConvertible.ToChar(IFormatProvider provider);

I[C++] _wchar_t IConvertible::ToChar(IFormatProvider* provider);

[VB] Function ToChar(ByVal provider As IFormatProvider) As Char Implements IConvertible.ToChar

[JScript] function IConvertible.ToChar(provider: IFormatProvider): Char;

IConvertible.ToDateTime

[C#] DateTime IConvertible.ToDateTime(IFormatProvider provider);

[C++] DateTime IConvertible::ToDateTime(IFormatProvider* provider);

[VB] Function ToDateTime(ByVal provider As IFormatProvider) As DateTime Implements IConvertible.ToDateTime

[JScript] function IConvertible.ToDateTime(provider: IFormatProvider): DateTime;

IConvertible.ToDecimal

[C#] decimal IConvertible.ToDecimal(IFormatProvider provider);

[C++] Decimal IConvertible::ToDecimal(IFormatProvider* provider);

[VB] Function ToDecimal(ByVal provider As IFormatProvider) As Decimal Implements IConvertible.ToDecimal

[JScript] function IConvertible.ToDecimal(provider: IFormatProvider): Decimal;

IConvertible.ToDouble

[C#] double IConvertible.ToDouble(IFormatProvider provider);

[C++] double IConvertible::ToDouble(IFormatProvider* provider);

[VB] Function ToDouble(ByVal provider As IFormatProvider) As Double Implements IConvertible.ToDouble

[JScript] function IConvertible.ToDouble(provider: IFormatProvider): double;

IConvertible.ToInt16

[C#] short IConvertible.ToInt16(IFormatProvider provider);

[C++] short IConvertible::ToInt16(IFormatProvider* provider);

[VB] Function ToInt16(ByVal provider As IFormatProvider) As Short Implements IConvertible.ToInt16

[JScript] function IConvertible.ToInt16(provider: IFormatProvider): Int16;

IConvertible.ToInt32

[C#] int IConvertible.ToInt32(IFormatProvider provider);

[C++] int IConvertible::ToInt32(IFormatProvider* provider);

[VB] Function ToInt32(ByVal provider As IFormatProvider) As Integer Implements IConvertible.ToInt32

[JScript] function IConvertible.ToInt32(provider: IFormatProvider): int;

IConvertible.ToInt64

[C#] long IConvertible.ToInt64(IFormatProvider provider);

[C++]-int64 IConvertible::ToInt64(IFormatProvider* provider);

[VB] Function ToInt64(ByVal provider As IFormatProvider) As Long Implements IConvertible.ToInt64

[JScript] function IConvertible.ToInt64(provider: IFormatProvider): long; IConvertible.ToSByte

[C#] sbyte IConvertible.ToSByte(IFormatProvider provider);

[C++] char IConvertible::ToSByte(IFormatProvider* provider);

[VB] Function ToSByte(ByVal provider As IFormatProvider) As SByte Implements IConvertible.ToSByte

[JScript] function IConvertible.ToSByte(provider: IFormatProvider): SByte; IConvertible.ToSingle

[C#] float IConvertible.ToSingle(IFormatProvider provider);

[C++] float IConvertible::ToSingle(IFormatProvider* provider);

[VB] Function ToSingle(ByVal provider As IFormatProvider) As Single Implements IConvertible.ToSingle

[JScript] function IConvertible.ToSingle(provider: IFormatProvider): float; IConvertible.ToType

[C#] object IConvertible.ToType(Type type, IFormatProvider provider);

[C++] Object* IConvertible::ToType(Type* type, IFormatProvider* provider);

[VB] Function ToType(ByVal type As Type, ByVal provider As IFormatProvider) As Object Implements IConvertible.ToType

[JScript] function IConvertible.ToType(type: Type, provider: IFormatProvider): Object;

IConvertible.ToUInt16

[C#] ushort IConvertible.ToUInt16(IFormatProvider provider);

[C++] unsigned short IConvertible::ToUInt16(IFormatProvider* provider);

[VB] Function ToUInt16(ByVal provider As IFormatProvider) As UInt16 Implements IConvertible.ToUInt16

[JScript] function IConvertible.ToUInt16(provider: IFormatProvider): UInt16;

IConvertible.ToUInt32

[C#] uint IConvertible:ToUInt32(IFormatProvider provider);

[C++] unsigned int IConvertible::ToUInt32(IFormatProvider* provider);

[VB] Function ToUInt32(ByVal provider As IFormatProvider) As UInt32 Implements IConvertible.ToUInt32

[JScript] function IConvertible.ToUInt32(provider: IFormatProvider): UInt32; IConvertible.ToUInt64

[C#] ulong IConvertible.ToUInt64(IFormatProvider provider);

[C++] unsigned int64 IConvertible::ToUInt64(IFormatProvider* provider);

[VB] Function ToUInt64(ByVal provider As IFormatProvider) As UInt64 Implements IConvertible.ToUInt64

[JScript] function IConvertible.ToUInt64(provider: IFormatProvider): UInt64;

ToLower

[C#] public static char ToLower(char c);

[C++] public: static _wchar_t ToLower(_wchar_t c);

[VB] Public Shared Function ToLower(ByVal c As Char) As Char

[JScript] public static function ToLower(c: Char): Char;

Description

Converts the value of a specified Unicode character to its lowercase equivalent using specified culture-specific formatting information.

Return Value: The lowercase equivalent of c.

Formatting information is obtained from the current culture. A Unicode character.

ToLower

[C#] public static char ToLower(char c, CultureInfo culture);

[C++] public: static _wchar_t ToLower(_wchar_t c, CultureInfo* culture);

[VB] Public Shared Function ToLower(ByVal c As Char, ByVal culture As CultureInfo) As Char

[JScript] public static function ToLower(c: Char, culture: CultureInfo): Char; Converts the value of a Unicode character to its lowercase equivalent.

Description

Converts the value of a specified Unicode character to its lowercase equivalent using specified culture-specific formatting information.

Return Value: The lowercase equivalent of c, formatted according to culture.

Use System.String.ToLower to convert a string to lowercase. A Unicode character. A System.Globalization.CultureInfo object that supplies culture-specific formatting information, or null.

ToString

[C#] public override string ToString( );

[C++] public: String* ToString( );

[VB] Overrides Public Function ToString( ) As String

[JScript] public override function ToString( ): String; Converts the value of this instance to its equivalent String representation.

Description

Converts the value of this instance to its equivalent String representation.

Return Value: The System.String representation of the value of this instance.

ToString

[C#] public static string ToString(char c);

[C++] public: static String* ToString(__wchar_t c);

[VB] Public Shared Function ToString(ByVal c As Char) As String

[JScript] public static function ToString(c: Char): String;

Description

Converts the specified Unicode character to its equivalent String representation.

Return Value: The System.String representation of the value of c. A Unicode character.

ToString

[C#] public string ToString(IFormatProvider provider);

[C++] public: __sealed String* ToString(IFormatProvider* provider);

[VB] NotOverridable Public Function ToString(ByVal provider As IFormatProvider) As String

[JScript] public function ToString(provider: IFormatProvider): String;

Description

Converts the value of this instance to its equivalent String representation using the specified culture-specific format information.

Return Value: The System.String representation of the value of this instance as specified by provider.

provider is ignored; it does not participate in this operation. (Reserved) An System.IFormatProvider interface implementation that supplies culture-specific formatting information.

ToUpper

[C#] public static char ToUpper(char c);

[C++] public: static __wchar_t ToUpper(_wchar_t c);

[VB] Public Shared Function ToUpper(ByVal c As Char) As Char

[JScript] public static function ToUpper(c: Char): Char;

Description

Converts the value of a specified Unicode character to its uppercase equivalent using specified culture-specific formatting information.

Return Value: The uppercase equivalent of c.

Formatting information is obtained from the current culture. A Unicode character.

ToUpper

[C#] public static char ToUpper(char c, CultureInfo culture);

[C++] public: static _wchar_t ToUpper(wchar_t c, CultureInfo* culture);

[VB] Public Shared Function ToUpper(ByVal c As Char, ByVal culture As CultureInfo) As Char

[JScript] public static function ToUpper(c: Char, culture: CultureInfo): Char; Converts the value of a Unicode character to its uppercase equivalent.

Description

Converts the value of a specified Unicode character to its uppercase equivalent using specified culture-specific formatting information.

Return Value: The uppercase equivalent of c, formatted according to culture.

Use System.String.ToUpper to convert a string to uppercase. A Unicode character. A System.Globalization.CultureInfo object that supplies culture-specific formatting information, or null.

CharEnumerator class (System)

ToUpper

Description

Supports iterating over a System.String and reading its individual characters.

A System.CharEnumerator provides read-only access to the characters in a referenced System.String object. For example, the for each statement of the Microsoft Visual Basic and C# programming languages, which iterates through the elements of a collection, retrieves a System.CharEnumerator from an instance of System.String in order to iterate through the characters in that instance.

Current

ToUpper

[C#] public char Current {get;}

[C++] public: _property _wchar_t get_Current( );

[VB] Public ReadOnly Property Current As Char

[JScript] public function get Current( ): Char;

Description

Gets the character in the enumerated string currently indexed by this instance.

This property should only be invoked when the index maintained by this instance is valid, otherwise, an exception is thrown. The index is always invalid for an empty string (“ ”)

Clone

[C#] public object Clone( );

[C++] public: _sealed Object* Clone( );

[VB] NotOverridable Public Function Clone( ) As Object

[JScript] public function Clone( ): Object;

Description

Creates a copy of this instance.

Return Value: An System.Object that is a copy of this instance.

The return value is a copy of this instance of System.CharEnumerator and its current state. This is useful for saving your state while iterating through a System.String object.

MoveNext

[C#] public bool MoveNext( );

[C++] public: _sealed bool MoveNext( );

[VB] NotOverridable Public Function MoveNext( ) As Boolean

[JScript] public function MoveNext( ): Boolean;

Description

Increments the index to the next character of the enumerated string.

Return Value: true if the index is successfully incremented and within the enumerated string; otherwise, false.

The System.CharEnumerator.MoveNext method increments the index by one. Call System.CharEnumerator.MoveNext after calling System.String.GetEnumerator or System.CharEnumerator.Reset to increment the current character position to the first character in the enumerated string. Check that the return value is true to determine that the current character position is valid.

Reset

[C#] public void Reset( );

[C++] public: _sealed void Reset( );

[VB] NotOverridable Public Sub Reset( )

[JScript] public function Reset( );

Description

Initializes the index to a position logically before the first character of the enumerated string.

The index is set to the invalid state.

CLSCompliantAttribute class (System)

ToString

Description

Indicates whether a program element is compliant with the Common Language Specification (CLS). This class cannot be inherited.

If no System.CLSCompliantAttribute is applied to a program element, by default: The assembly is not CLS-compliant.

CLSCompliantAttribute

Example Syntax:

ToString

[C#] public CLSCompliantAttribute(bool is Compliant);

[C++] public: CLSCompliantAttribute(bool is Compliant);

[VB] Public Sub New(ByVal is Compliant As Boolean)

[JScript] public function CLSCompliantAttribute(is Compliant: Boolean);

Description

Initializes an instance of the System.CLSCompliantAttribute class with a Boolean value indicating whether the indicated program element is CLS-compliant. true if CLS-compliant; otherwise, false.

IsCompliant

ToString

[C#] public bool IsCompliant {get;}

[C++] public: _property bool get_IsCompliant( );

[VB] Public ReadOnly Property IsCompliant As Boolean

[JScript] public function get IsCompliant( ): Boolean;

Description

Gets the Boolean value indicating whether the indicated program element is CLS-compliant.

TypeId

Console class (System)

ToString

Description

Represents the standard input, output, and error streams for console applications.

The System.Console class provides basic support for applications that read characters from, and write characters to, the console. If the console does not exist, as in a Windows-based application, writes to the console are not displayed and no exception is raised.

Error

ToString

[C#] public static TextWriter Error {get;}

[C++] public: _property static TextWriter* get_Error( );

[VB] Public Shared ReadOnly Property Error As TextWriter

[JScript] public static function get Error( ): TextWriter;

Description

Gets the standard error output stream.

This property is set to the standard error stream by default. This property can be set to another stream with the System.Console.SetError(System.IO.TextWriter) method.

In

ToString

[C#] public static TextReader In {get;}

[C++] public: _property static TextReader* get_In( );

[VB] Public Shared ReadOnly Property In As TextReader

[JScript] public static function get In( ): TextReader;

Description

Gets the standard input stream.

This property is set to the standard input stream by default. This property can be set to another stream with the System.Console.SetIn(System.IO.TextReader) method.

Out

ToString

[C#] public static TextWriter Out {get;}

[C++] public: _property static TextWriter* get_Out( );

[VB] Public Shared ReadOnly Property Out As TextWriter

[JScript] public static function get Out( ): TextWriter;

Description

Gets the standard output stream.

This property is set to the standard output stream by default. This property can be set to another stream with the System.Console.SetOut(System.IO.TextWriter) method.

OpenStandardError

[C#] public static Stream OpenStandardError( );

[C++] public: static Stream* OpenStandardError( );

[VB] Public Shared Function OpenStandardError( ) As Stream

[JScript] public static function OpenStandardError( ): Stream; Acquires the standard error stream.

Description

Acquires the standard error stream.

Return Value: A System.IO.TextWriter object that represents the standard error stream.

This method can be used to reacquire the standard error stream after it has been changed by the System.Console.SetError(System.IO.TextWriter) method.

OpenStandardError

[C#] public static Stream OpenStandardError(int bufferSize);

[C++] public: static Stream* OpenStandardError(int bufferSize);

[VB] Public Shared Function OpenStandardError(ByVal bufferSize As Integer) As Stream

[JScript] public static function OpenStandardError(bufferSize: int): Stream;

Description

Acquires the standard error stream, set to a specified buffer size.

Return Value: A System.IO.TextWriter object that represents the standard error stream.

This method can be used to reacquire the standard error stream after it has been changed by the System.Console.SetError(System.IO.TextWriter) method. The internal stream buffer size.

OpenStandardInput

[C#] public static Stream OpenStandardInput( );

[C++] public: static Stream* OpenStandardInput( );

[VB] Public Shared Function OpenStandardInput( ) As Stream

[JScript] public static function OpenStandardInput( ): Stream; Acquires the standard input stream.

Description

Acquires the standard input stream.

Return Value: A System.IO.TextReader object that represents the standard input stream.

This method can be used to reacquire the standard input stream after it has been changed by the System.Console.SetIn(System.IO.TextReader) method.

OpenStandardInput

[C#] public static Stream OpenStandardInput(int bufferSize);

[C++] public: static Stream* OpenStandardInput(int bufferSize);

[VB] Public Shared Function OpenStandardInput(ByVal bufferSize As Integer) As Stream

[JScript] public static function OpenStandardInput(bufferSize: int): Stream;

Description

Acquires the standard input stream, set to a specified buffer size. Return Value: A System.IO.TextReader object that represents the standard output stream.

This method can be used to reacquire the standard output stream after it has been changed by the System.Console.SetIn(System.IO.TextReader) method. The internal stream buffer size.

OpenStandardOutput

[C#] public static Stream OpenStandardOutput( );

[C++] public: static Stream* OpenStandardoutput( );

[VB] Public Shared Function OpenStandardoutput( ) As Stream

[JScript] public static function OpenStandardoutput( ): Stream; Acquires the standard output stream.

Description

Acquires the standard output stream.

Return Value: A System.IO.TextWriter object that represents the standard output stream.

This method can be used to reacquire the standard output stream after it has been changed by the System.Console.SetOut(System.IO.TextWriter) method.

OpenStandardOutput

[C#] public static Stream OpenStandardOutput(int bufferSize);

[C++] public: static Stream* OpenStandardOutput(int bufferSize);

[VB] Public Shared Function OpenStandardOutput(ByVal bufferSize As Integer) As Stream

[JScript] public static function OpenStandardOutput(bufferSize: int): Stream;

Description

Acquires the standard output stream, set to a specified buffer size.

Return Value: A System.IO.TextWriter object that represents the standard output stream.

This method can be used to reacquire the standard output stream after it has been changed by the System.Console.SetOut(System.IO.TextWriter) method. The internal stream buffer size.

Read

[C#] public static int Read( );

[C++] public: static int Read( );

[VB] Public Shared Function Read( ) As Integer

[JScript] public static function Read( ): int;

Description

Reads the next character from the standard input stream.

Return Value: The next character from the input stream, or negative one if no more characters are available.

This method will not return until the read operation is terminated (for example, by the user pressing the enter key). If data is available, the input stream contains what the user entered, suffixed with a carriage-return character followed by a linefeed character ("\r\n").

ReadLine

[C#] public static string ReadLine( );

[C++] public: static String* ReadLine( );

[VB] Public Shared Function ReadLine( ) As String

[JScript] public static function ReadLine( ): String;

Description

Reads the next line of characters from the standard input stream.

Return Value: The next line from the input stream, or null if no more characters are available. A line is defined as a sequence of characters followed by a carriage return ('\r'), a line feed ('\n'), or a carriage return immediately followed by a line feed ('\r\n'). The string that is returned does not contain the terminating carriage return and/or line feed.

SetError

[C#] public static void SetError(TextWriter newError);

[C++] public: static void SetError(TextWriter* newError);

[VB] Public Shared Sub SetError(ByVal newError As TextWriter)

[JScript] public static function SetError(newError: TextWriter);

Description

Sets the System.Console.Error property to the specified output stream.

By default, the System.Console.Error property is set to the standard error output stream. A System.IO.TextWriter stream that is the new standard error output.

SetIn

[C#] public static void SetIn(TextReader newIn);

[C++] public: static void SetIn(TextReader* newIn);

[VB] Public Shared Sub SetIn(ByVal newIn As TextReader)

[JScript] public static function SetIn(newIn: TextReader);

Description

Sets the System.Console.In property to the specified input stream.

By default, the System.Console.In property is set to the standard input stream. A System.IO.TextReader stream that is the new standard input.

SetOut

[C#] public static void SetOut(TextWriter newOut);

[C++] public: static void SetOut(TextWriter* newOut);

[VB] Public Shared Sub SetOut(ByVal newOut As TextWriter)

[JScript] public static function SetOut(newOut: TextWriter);

Description

Sets the System.Console.Out property to the specified output stream.

By default, the System.Console.Out property is set to the standard output stream. A System.IO.TextWriter stream that is the new standard output.

Write

[C#] public static void Write(bool value);

[C++] public: static void Write(bool value);

[VB] Public Shared Sub Write(ByVal value As Boolean)

[JScript] public static function Write(value: Boolean);

Description

Writes the text representation of the specified Boolean value to the standard output stream.

The text representation of value is produced by calling System.Boolean.ToString. The value to write.

Write

[C#] public static void Write(char value);

[C++] public: static void Write(_wchar_t value);

[VB] Public Shared Sub Write(ByVal value As Char)

[JScript] public static function Write(value: Char);

Description

Writes the specified Unicode character value to the standard output stream. The value to write.

Write

[C#] public static void Write(char[ ] buffer);

[C++] public: static void Write(_wchar_t buffer _gc[ ]);

[VB] Public Shared Sub Write(ByVal buffers As Char)

[JScript] public static function Write(buffer: Char[ ]);

Description

Writes the specified array of Unicode characters to the standard output stream. A Unicode character array.

Write

[C#] public static void Write(decimal value);

[C++] public: static void Write(Decimal value);

[VB] Public Shared Sub Write(ByVal value As Decimal)

[JScript] public static function Write(value: Decimal);

Description

Writes the text representation of the specified System.Decimal value to the standard output stream.

The text representation of value is produced by calling System.Decimal.ToString. The value to write.

Write

[C#] public static void Write(double value);

[C++] public: static void Write(double value);

[VB] Public Shared Sub Write(ByVal value As Double)

[JScript] public static function Write(value: double);

Description

Writes the text representation of the specified double-precision floating point value to the standard output stream.

The text representation of value is produced by calling System.Double.ToString. The value to write.

Write

[C#] public static void Write(int value);

[C++] public: static void Write(int value);

[VB] Public Shared Sub Write(ByVal value As Integer)

[JScript] public static function Write(value: int);

Description

Writes the text representation of the specified 32-bit signed integer value to the standard output stream.

The text representation of value is produced by calling System.Int32.ToString. The value to write.

Write

[C#] public static void Write(long value);

[C++] public: static void Write(_int64 value);

[VB] Public Shared Sub Write(ByVal value As Long)

[JScript] public static function Write(value: long);

Description

Writes the text representation of the specified 64-bit signed integer value to the standard output stream.

The text representation of value is produced by calling System.Int64.ToString. The value to write.

Write

[C#] public static void Write(object value);

[C++] public: static void Write(Object* value);

[VB] Public Shared Sub Write(ByVal value As Object)

[JScript] public static function Write(value: Object);

Description

Writes the text representation of the specified object to the standard output stream.

If value is null, nothing is written and no exception is thrown. Otherwise, the ToString method of value is called to produce its string representation, and the resulting string is written to the standard output stream. The value to write.

Write

[C#] public static void Write(float value);

[C++] public: static void Write(float value);

[VB] Public Shared Sub Write(ByVal value As Single)

[JScript] public static function Write(value: float);

Description

Writes the text representation of the specified single-precision floating point value to the standard output stream.

The text representation of value is produced by calling System.Single.ToString. The value to write.

Write

[C#] public static void Write(string value);

[C++] public: static void Write(String* value);

[VB] Public Shared Sub Write(ByVal value As String)

[JScript] public static function Write(value: String);

Description

Writes the specified string value to the standard output stream.

If value is null, nothing is written to the standard output stream. The value to write.

Write

[C#] public static void Write(uint value);

[C++] public: static void Write(unsigned int value);

[VB] Public Shared Sub Write(ByVal value As UInt32)

[JScript] public static function Write(value: UInt32);

Description

Writes the text representation of the specified 32-bit unsigned integer value to the standard output stream.

The text representation of value is produced by calling System.UInt32.ToString. The value to write.

Write

[C#] public static void Write(ulong value);

[C++] public: static void Write(unsigned _int64 value);

[VB] Public Shared Sub Write(ByVal value As UInt64)

[JScript] public static function Write(value: UInt64);

Description

Writes the text representation of the specified 64-bit unsigned integer value to the standard output stream.

The text representation of value is produced by calling System.UInt64.ToString. The value to write.

Write

[C#] public static void Write(string format, object arg0);

[C++] public: static void Write(String* format, Object* arg0);

[VB] Public Shared Sub Write(ByVal format As String, ByVal arg0 As Object)

[JScript] public static function Write(format: String, arg0: Object); Writes the specified information to the standard output stream.

Description

Writes the specified object to the standard output stream using the specified format information.

This method uses the same semantics as

Is System.String.Format(System.String,System.Object). Format string. Object to write using format.

Write

[C#] public static void Write(string format, params object[ ] arg);

[C++] public: static void Write(String* format, Object* arg _gc[ ]);

[VB] Public Shared Sub Write(ByVal format As String, ByVal ParamArray arg( ) As Object)

[JScript] public static function Write(format: String, arg: Object[ ]);

Description

Writes the specified array of objects to the standard output stream using the specified format information.

This method uses the same semantics as System.String. Format(System.String,System.Object). Format string. An array of objects to write using format.

Write

[C#] public static void Write(char[ ] buffer, int index, int count);

[C++] public: static void Write(_wchar_t buffer _gc[ ], int index, int count);

[VB] Public Shared Sub Write(ByVal buffers As Char, ByVal index As Integer, ByVal count As Integer)

[JScript] public static function Write(buffer: Char[ ], index: int, count: int);

Description

Writes the specified subarray of Unicode characters to the standard output stream.

This method writes count characters starting at position index of buffer to the standard output stream. An array of Unicode characters. The starting position in buffer. The number of characters to write.

Write

[C#] public static void Write(string format, object arg0, object arg1);

[C++] public: static void Write(String* format, Object* arg0, Object* arg1);

[VB] Public Shared Sub Write(ByVal format As String, ByVal arg0 As Object, ByVal arg1 As Object)

[JScript] public static function Write(format: String, arg0: Object, arg1: Object);

Description

Writes the specified objects to the standard output stream using the specified format information.

This method uses the same semantics as System.String.Format(System.String,System.Object). Format string. First object to write using format. Second object to write using format.

Write

[C#] public static void Write(string format, object arg0, object arg1, object arg2);

[C++] public: static void Write(String* format, Object* arg0, Object* arg1, Object* arg2);

[VB] Public Shared Sub Write(ByVal format As String, ByVal arg0 As Object, ByVal arg1 As Object, ByVal arg2 As Object)

[JScript] public static function Write(format: String, arg0: Object, arg1: Object, arg2: Object);

Description

Writes the specified objects to the standard output stream using the specified format information.

This method uses the same semantics as System.String.Format(System.String,System.Object). Format string. First object to write using format. Second object to write using format. Third object to write using format.

Write

[C++] public: static void Write(String* format, Object* arg0, Object* arg1, Object* arg2, Object* arg3, . . . );

WriteLine

[C#] public static void WriteLine( );

[C++] public: static void WriteLine( );

[VB] Public Shared Sub WriteLine( )

[JScript] public static function WriteLine( ); Writes the specified data, followed by the current line terminator, to the standard output stream.

Description

Writes the current line terminator to the standard output stream.

The default line terminator is a string whose value is a carriage return followed by a line feed ("\r\n"). Change the line terminator by setting the System.IO.TextWriter.NewLine property of the System.Console.Out property to another string.

WriteLine

[C#] public static void WriteLine(bool value);

[C++] public: static void WriteLine(bool value);

[VB] Public Shared Sub WriteLine(ByVal value As Boolean)

[JScript] public static function WriteLine(value: Boolean);

Description

Writes the text representation of the specified Boolean value, followed by the current line terminator, to the standard output stream.

The text representation of value is produced by calling System.Boolean.ToString. The value to write.

WriteLine

[C#] public static void WriteLine(char value);

[C++] public: static void WriteLine(_wchar_t value);

[VB] Public Shared Sub WriteLine(ByVal value As Char)

[JScript] public static function WriteLine(value: Char);

Description

Writes the specified Unicode character, followed by the current line terminator, value to the standard output stream.

For more information about the line terminator, see the Remarks section of the System.Console.WriteLine method that takes no parameters. The value to write.

WriteLine

[C#] public static void WriteLine(char[ ] buffer);

[C++] public: static void WriteLine(_wchar_t buffer _gc[ ]);

[VB] Public Shared Sub WriteLine(ByVal buffers( ) As Char)

[JScript] public static function WriteLine(buffer: Char[ ]);

Description

Writes the specified array of Unicode characters, followed by the current line terminator, to the standard output stream.

For more information about the line terminator, see the Remarks section of the System.Console.WriteLine method that takes no parameters. A Unicode character array.

WriteLine

[C#] public static void WriteLine(decimal value);

[C++] public: static void WriteLine(Decimal value);

[VB] Public Shared Sub WriteLine(ByVal value As Decimal)

[JScript] public static function WriteLine(value: Decimal);

Description

Writes the text representation of the specified System.Decimal value, followed by the current line terminator, to the standard output stream.

The text representation of value is produced by calling System.Decimal.ToString. The value to write.

WriteLine

[C#] public static void WriteLine(double value);

[C++] public: static void WriteLine(double value);

[VB] Public Shared Sub WriteLine(ByVal value As Double)

[JScript] public static function WriteLine(value: double);

Description

Writes the text representation of the specified double-precision floating point value, followed by the current line terminator, to the standard output stream.

The text representation of value is produced by calling System.Double.ToString. The value to write.

WriteLine

[C#] public static void WriteLine(int value);

[C++] public: static void WriteLine(int value);

[VB] Public Shared Sub WriteLine(ByVal value As Integer)

[JScript] public static function WriteLine(value: int);

Description

Writes the text representation of the specified 32-bit signed integer value, followed by the current line terminator, to the standard output stream.

The text representation of value is produced by calling System.Int32.ToString. The value to write.

WriteLine

[C#] public static void WriteLine(long value);

[C++] public: static void WriteLine(__int64 value);

[VB] Public Shared Sub WriteLine(ByVal value As Long)

[JScript] public static function WriteLine(value: long);

Description

Writes the text representation of the specified 64-bit signed integer value, followed by the current line terminator, to the standard output stream.

The text representation of value is produced by calling System.Int64.ToString. The value to write.

WriteLine

[C#] public static void WriteLine(object value);

[C++] public: static void WriteLine(Object* value);

[VB] Public Shared Sub WriteLine(ByVal value As Object)

[JScript] public static function WriteLine(value: Object);

Description

Writes the text representation of the specified object, followed by the current line terminator, to the standard output stream.

If value is null, nothing is written and no exception is thrown. Otherwise, the ToString method of value is called to produce its string representation, and the resulting string is written to the standard output stream. The value to write.

WriteLine

[C#] public static void WriteLine(float value);

[C++] public: static void WriteLine(float value);

[VB] Public Shared Sub WriteLine(ByVal value As Single)

[JScript] public static function WriteLine(value: float);

Description

Writes the text representation of the specified single-precision floating point value, followed by the current line terminator, to the standard output stream.

The text representation of value is produced by calling System.Single.ToString. The value to write.

WriteLine

[C#] public static void WriteLine(string value);

[C++] public: static void WriteLine(String* value);

[VB] Public Shared Sub WriteLine(ByVal value As String)

[JScript] public static function WriteLine(value: String);

Description

Writes the specified string value, followed by the current line terminator, to the standard output stream. If value is null, nothing is written to the standard output stream. The value to write.

WriteLine

[C#] public static void WriteLine(uint value);

[C++] public: static void WriteLine(unsigned int value);

[VB] Public Shared Sub WriteLine(ByVal value As UInt32)

[JScript] public static function WriteLine(value: UInt32);

Description

Writes the text representation of the specified 32-bit unsigned integer value, followed by the current line terminator, to the standard output stream.

The text representation of value is produced by calling System.UInt32.ToString. The value to write.

WriteLine

[C#] public static void WriteLine(ulong value);

[C++] public: static void WriteLine(unsigned _int64 value);

[VB] Public Shared Sub WriteLine(ByVal value As UInt64)

[JScript] public static function WriteLine(value: UInt64);

Description

Writes the text representation of the specified 64-bit unsigned integer value, followed by the current line terminator, to the standard output stream.

The text representation of value is produced by calling System.UInt64.ToString. The value to write.

WriteLine

[C#] public static void WriteLine(string format, object arg0);

[C++] public: static void WriteLine(String* format, Object* arg0);

[VB] Public Shared Sub WriteLine(ByVal format As String, ByVal arg0 As Object)

[JScript] public static function WriteLine(format: String, arg0: Object);

Description

Writes the specified object, followed by the current line terminator, to the standard output stream using the specified format information.

This method uses the same semantics as System.String.Format(System.String,System.Object). Format string. Object to write using format.

WriteLine

[C#] public static void WriteLine(string format, params object[ ] arg);

[C++] public: static void WriteLine(String* format, Object* arg _gc[ ]);

[VB] Public Shared Sub WriteLine(ByVal format As String, ByVal ParamArray arg0 As Object)

[JScript] public static function WriteLine(format: String, arg: Object[ ]);

Description

Writes the specified array of objects, followed by the current line terminator, to the standard output stream using the specified format information. This method uses the same semantics as System.String.Format(System.String, System.Object). Format string. An array of objects to write using format.

WriteLine

[C#] public static void WriteLine(char[ ] buffer, int index, int count);

[C++] public: static void WriteLine(_wchar_t buffer gc[ ], int index, int count);

[VB] Public Shared Sub WriteLine(ByVal buffers As Char, ByVal index As Integer, ByVal count As Integer)

[JScript] public static function WriteLine(buffer: Char[ ], index: int, count: int);

Description

Writes the specified subarray of Unicode characters, followed by the current line terminator, to the standard output stream.

This method writes count characters starting at position index of buffer to the standard output stream. An array of Unicode characters. The starting position in buffer. The number of characters to write.

WriteLine

[C#] public static void WriteLine(string format, object arg0, object arg1);

[C++] public: static void WriteLine(String* format, Object* arg1, Object* arg1);

[VB] Public Shared Sub WriteLine(ByVal format As String, ByVal arg0 As Object, ByVal arg1 As Object)

[JScript] public static function WriteLine(format: String, arg0: Object, arg1 Object);

Description

Writes the specified objects, followed by the current line terminator, to the standard output stream using the specified format information.

This method uses the same semantics as System.String.Format(System.String,System.Object). Format string. First object to write using format. Second object to write using format.

WriteLine

[C#] public static void WriteLine(string format, object arg0, object arg1, object arg2);

[C++] public: static void WriteLine(String* format, Object* arg0, Object* arg1, Object* arg2);

[VB] Public Shared Sub WriteLine(ByVal format As String, ByVal arg0 As Object, ByVal arg1 As Object, ByVal arg2 As Object)

[JScript] public static function WriteLine(format: String, arg0: Object, arg1 Object, arg2: Object);

Description

Writes the specified objects, followed by the current line terminator, to the standard output stream using the specified format information.

This method uses the same semantics as

System.String.Format(System.String,System.Object). Format string. First object to write using format. Second object to write using format. Third object to write using format.

WriteLine

[C++] public: static void WriteLine(String* format, Object* arg0, Object* arg1, Object* arg2, Object* arg3, . . . );

ContextBoundObject class (System)

WriteLine

Description

Defines the base class for all context-bound classes.

Objects that reside in a context and are bound to the context rules are called context-bound objects. A context is a set of properties or usage rules that define an environment where a collection of objects resides. The rules are enforced when the objects are entering or leaving a context. Objects that are not context-bound are called agile objects.

ContextBoundObject

Example Syntax:

WriteLine

[C#] protected ContextBoundObject( );

[C++] protected: ContextBoundObject( );

[VB] Protected Sub New( )

[JScript] protected function ContextBoundObject( );

ContextMarshalException class (System)

ToString

Description

The exception that is thrown when an attempt to marshal an object across a context boundary fails.

Objects can marshal by value or by reference. Any attempt to pass an instance of an unmarshallable type through a context boundary will result in a System.ContextMarshalException.

ContextMarshalException

Example Syntax:

ToString

[C#] public ContextMarshalException( );

[C++] public: ContextMarshalException( );

[VB] Public Sub New( )

[JScript] public function ContextMarshalException( ); Initializes a new instance of the System.ContextMarshalException class.

Description

Initializes a new instance of the System.ContextMarshalException class with default properties.

The following table shows the initial property values for an instance of System.ContextMarshalException.

ContextMarshalException

Example Syntax:

ToString

[C#] public ContextMarshalException(string message);

[C++] public: ContextMarshalException(String* message);

[VB] Public Sub New(ByVal message As String)

[JScript] public function ContextMarshalException(message: String);

Description

Initializes a new instance of the System.ContextMarshalException class with a specified error message.

The following table shows the initial property values for an instance of System.ContextMarshalException. The error message that explains the reason for the exception.

ContextMarshalException

Example Syntax:

ToString

[C#] protected ContextMarshalException(SerializationInfo info, StreamingContext context);

[C++] protected: ContextMarshalException(SerializationInfo* info, StreamingContext context);

[VB] Protected Sub New(ByVal info As SerializationInfo, ByVal context As StreamingContext)

[JScript] protected function ContextMarshalException(info: SerializationInfo, context: StreamingContext);

Description

Initializes a new instance of the System.ContextMarshalException class with serialized data. The object that holds the serialized object data. The contextual information about the source or destination.

ContextMarshalException

Example Syntax:

ToString

[C#] public ContextMarshalException(string message, Exception inner);

[C++] public: ContextMarshalException(String* message, Exception* inner);

[VB] Public Sub New(ByVal message As String, ByVal inner As Exception)

[JScript] public function ContextMarshalException(message: String, inner: Exception);

Description

Initializes a new instance of the System.ContextMarshalException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If inner is non-null, then the current Exception is raised in a catch block handling inner.

HelpLink

HResult

InnerException

Message

Source

StackTrace

TargetSite

ContextStaticAttribute class (System)

ToString

Description

Indicates that the value of a static field is unique for a particular context.

A static field marked with System.ContextStaticAttribute is not shared between contexts. If the indicated static field is accessed on a different context, it will contain a different value.

ContextStaticAttribute

Example Syntax:

ToString

[C#] public ContextStaticAttribute( );

[C++] public: ContextStaticAttribute( );

[VB] Public Sub New( )
[JScript] public function ContextStaticAttribute( );

Description

Initializes a new instance of the System.ContextStaticAttribute class.

TypeId

Convert class (System)

ToString

Description

Converts base data types to other base data types.

This class returns a base type that is equivalent to the value of a specified type.

ToString

[C#] public static readonly object DBNull;
[C++] public: static Object* DBNull;
[VB] Public Shared ReadOnly DBNull As Object
[JScript] public static var DBNull: Object;

Description

A constant representing a database column absent of data; that is, database null.

ChangeType

[C#] public static object ChangeType(object value, Type conversionType);
[C++] public: static Object* ChangeType(Object* value, Type* conversionType);
[VB] Public Shared Function ChangeType(ByVal value As Object, ByVal conversionType As Type) As Object
[JScript] public static function ChangeType(value: Object, conversionType: Type): Object;

Description

Returns an Object with the specified Type and whose value is equivalent to the specified object.

Return Value: An object whose Type is conversionType and whose value is equivalent to value.

This method uses the current thread's culture for the conversion. An System.Object that implements the System.IConvertible interface. A System.Type.

ChangeType

[C#] public static object ChangeType(object value, TypeCode typeCode);
[C++] public: static Object* ChangeType(Object* value, TypeCode typeCode);
[VB] Public Shared Function ChangeType(ByVal value As Object, ByVal typeCode As TypeCode) As Object
[JScript] public static function ChangeType(value: Object, typeCode: TypeCode): Object; Returns an Object with a specified type and whose value is equivalent to a specified object.

Description

Returns an Object with the specified TypeCode and whose value is equivalent to the specified object.

Return Value: An object whose underlying TypeCode is typeCode and whose value is equivalent to value. An System.Object that implements the System.IConvertible interface. A System.TypeCode ChangeType

[C#] public static object ChangeType(object value, Type conversionType, IFormatProvider provider);
[C++] public: static Object* ChangeType(Object* value, Type* conversionType, IFormatProvider* provider);
[VB] Public Shared Function ChangeType(ByVal value As Object, ByVal conversionType As Type, ByVal provider As IFormatProvider) As Object
[JScript] public static function ChangeType(value: Object, conversionType: Type, provider: IFormatProvider): Object;

Description

Returns an Object with the specified Type and whose value is equivalent to the specified object. A parameter supplies culture-specific formatting information.

Return Value: An object whose Type is conversionType and whose value is equivalent to value.

provider enables the user to specify culture-specific conversion information about the contents of value. For example, if value is a String that represents a number, provider could supply culture-specific information about the notation used to represent that number. An System.Object that implements the System.IConvertible interface. A System.Type. An System.IFormatProvider interface implementation that supplies culture-specific formatting information.

ChangeType

[C#] public static object ChangeType(object value, TypeCode typeCode, IFormatProvider provider);
[C++] public: static Object* ChangeType(Object* value, TypeCode typeCode, IFormatProvider* provider);
[VB] Public Shared Function ChangeType(ByVal value As Object, ByVal typeCode As TypeCode, ByVal provider As IFormatProvider) As Object
[JScript] public static function ChangeType(value: Object, typeCode: TypeCode, provider: IFormatProvider): Object;

Description

Returns an Object with the specified TypeCode and whose value is equivalent to the specified object. A parameter supplies culture-specific formatting information.

Return Value: An object whose underlying TypeCode is typeCode and whose value is equivalent to value.

provider enables the user to specify culture-specific conversion information about the contents of value. For example, if value is a String that represents a number, provider could supply culture-specific information about the notation used to represent that number. An System.Object that implements the System.IConvertible interface. A System.TypeCode. An System.IFormatProvider interface implementation that supplies culture-specific formatting information.

FromBase64CharArray

[C#] public static byte[ ] FromBase64CharArray(char[ ] in Array, int offset, int length);
[C++] public: static unsigned char FromBase64CharArray (_wchar_t in Array _gc[ ], int offset, int length) _gc[ ];
[VB] Public Shared Function FromBase64CharArray(ByVal in Array( ) As Char, ByVal offset As Integer, ByVal length As Integer) As Byte( )
[JScript] public static function FromBase64CharArray(in Array: Char[ ], offset: int, length: int): Byte[ ];

Description

Converts the specified subset of an array of Unicode characters consisting of base 64 digits to an equivalent array of 8-bit unsigned integers. Parameters specify the offset and number of elements in the input array.

Return Value: An array of 8-bit unsigned integers equivalent to length elements at position offset in in Array.

The subset in in Array is composed of base 64 digits. The base 64 digits in ascending order from zero are the uppercase characters 'A' to 'Z', lowercase characters 'a' to 'z', numerals '0' to '9', and the symbols '+' and '/'. The valueless character, '=', is used for trailing padding. A Unicode character array. A position within in Array. The number of elements in in Array to convert.

FromBase64String

[C#] public static byte[ ] FromBase64String(string s);

[C++] public: static unsigned char FromBase64String (String* s) _gc[ ];

[VB] Public Shared Function FromBase64String(ByVal s As String) As Byte( )

[JScript] public static function FromBase64String(s: String): Byte[ ];

Description

Converts the specified String representation of a value consisting of base 64 digits to an equivalent array of 8-bit unsigned integers.

Return Value: An array of 8-bit unsigned integers equivalent to s.

s composed of base 64 digits. The base 64 digits in ascending order from zero are the uppercase characters 'A' to 'Z', lowercase characters 'a' to 'z', numerals '0' to '9', and the symbols '+' and '/'. The valueless character, '=', is used for trailing padding. A System.String.

GetTypeCode

[C#] public static TypeCode GetTypeCode(object value);

[C++] public: static TypeCode GetTypeCode(Object* value);

[VB] Public Shared Function GetTypeCode(ByVal value As Object) As TypeCode

[JScript] public static function GetTypeCode(value: Object): TypeCode;

Description

Returns the TypeCode for the specified object.

Return Value: The System.TypeCode for value, or System.TypeCode.Empty if value is null. An System.Object that implements the System.IConvertible interface.

IsDBNull

[C#] public static bool IsDBNull(object value);

[C++] public: static bool IsDBNull(Object* value);

[VB] Public Shared Function IsDBNull(ByVal value As Object) As Boolean

[JScript] public static function IsDBNull(value: Object): Boolean;

Description

Returns an indication whether the specified object is of type DBNull

Return Value: true if value is of type System.TypeCode.DBNull; otherwise, false. An object.

ToBase64CharArray

[C#] public static int ToBase64CharArray(byte[ ] inArray, int offsetIn, int length, char[ ] outArray, int offsetOut);

[C++] public: static int ToBase64CharArray(unsigned char in Array _gc[ ], int offsetIn, int length, _wchar_t out Array _gc[ ], int offsetOut);

[VB] Public Shared Function ToBase64CharArray(ByVal in Array( ) As Byte, ByVal offsetIn As Integer, ByVal length As Integer, ByVal outArray( ) As Char, ByVal offsetOut As Integer) As Integer

[JScript] public static function ToBase64CharArray(in Array: Byte[ ], offsetIn: int, length: int, outArray: Char[ ], offsetOut: int): int;

Description

Converts the value of a subset of an 8-bit unsigned integer array to an equivalent subset of a Unicode character array consisting of base 64 digits. Parameters specify the subsets as offsets of the input and output arrays and the number of elements in the input array.

Return Value: A 32-bit signed integer containing the number of bytes in outArray.

The subset of length elements of inArray starting at position offsetIn, are taken as a numeric value and converted to a subset of elements in outArray starting at position offsetOut. The return value indicates the number of converted elements in outArray. The subset of outArray consists of base 64 digits. An input array of 8-bit unsigned integers. A position within in Array. The number of elements of in Array to convert. An output array of Unicode characters. A position within outArray.

ToBase64String

[C#] public static string ToBase64String(byte[ ] in Array);

[C++] public: static String* ToBase64String(unsigned char in Array _gc[ ]);

[VB] Public Shared Function ToBase64String(ByVal in Array( ) As Byte) As String

[JScript] public static function ToBase64String(in Array: Byte[ ]): String; Converts the value of an array of 8-bit unsigned integers to its equivalent String representation consisting of base 64 digits.

Description

Converts the value of an array of 8-bit unsigned integers to its equivalent String representation consisting of base 64 digits.

Return Value: The System.String representation, in base 64, of the contents of in Array.

The elements of in Array are taken as a numeric value and converted to a String representation consisting of base 64 digits. An array of 8-bit unsigned integers.

ToBase64String

[C#] public static string ToBase64String(byte[ ] in Array, int offset, int length);

[C++] public: static String* ToBase64String(unsigned char in Array _gc[ ], int offset, int length);

[VB] Public Shared Function ToBase64String(ByVal in Array( ) As Byte, ByVal offset As Integer, ByVal length As Integer) As String

[JScript] public static function ToBase64String(in Array: Byte[ ], offset: int, length: int): String;

Description

Converts the value of a subset of an array of 8-bit unsigned integers to its equivalent String representation consisting of base 64 digits. Parameters specify the subset as an offset and number of elements in the array.

Return Value: The System.String representation in base 64 of length elements of in Array starting at position offset.

The elements of in Array are taken as a numeric value and converted to a String representation in base 64. An array of 8-bit unsigned integers. An offset in in Array. The number of elements of in Array to convert.

ToBoolean

[C#] public static bool ToBoolean(bool value);

[C++] public: static bool ToBoolean(bool value);

[VB] Public Shared Function ToBoolean(ByVal value As Boolean) As Boolean

[JScript] public static function ToBoolean(value: Boolean): Boolean;

Description

Returns the specified Boolean value; no actual conversion is performed.

Return Value: value is returned unchanged. A Boolean.

ToBoolean

[C#] public static bool ToBoolean(byte value);

[C++] public: static bool ToBoolean(unsigned char value);

[VB] Public Shared Function ToBoolean(ByVal value As Byte) As Boolean

[JScript] public static function ToBoolean(value: Byte): Boolean;

Description

Converts the value of the specified 8-bit unsigned integer to an equivalent Boolean value.

Return Value: true if value is non-zero; otherwise, false. An 8-bit unsigned integer.

ToBoolean

[C#] public static bool ToBoolean(char value);

[C++] public: static bool ToBoolean(__wchar_t value);

[VB] Public Shared Function ToBoolean(ByVal value As Char) As Boolean

[JScript] public static function ToBoolean(value: Char): Boolean;

Description

Conversion from Char to Boolean is not supported.

Return Value: (None) Attempt to convert Char to Boolean. A Unicode character.

ToBoolean

[C#] public static bool ToBoolean(DateTime value);

[C++] public: static bool ToBoolean(DateTime value);

[VB] Public Shared Function ToBoolean(ByVal value As DateTime) As Boolean

[JScript] public static function ToBoolean(value: DateTime): Boolean;

Description

Calling this method always throws System.InvalidCastException.

This method is reserved for future use. A System.DateTime.

ToBoolean

[C#] public static bool ToBoolean(decimal value);

[C++] public: static bool ToBoolean(Decimal value);

[VB] Public Shared Function ToBoolean(ByVal value As Decimal) As Boolean

[JScript] public static function ToBoolean(value: Decimal): Boolean;

Description

Converts the value of the specified Decimal number to an equivalent Boolean value.

Return Value: true if value is non-zero; otherwise, false.

Description

Converts the value of the specified Decimal number to an equivalent Boolean value.

Return Value: true if value is non-zero; otherwise, false. A System.Decimal number.

ToBoolean

[C#] public static bool ToBoolean(double value);

[C++] public: static bool ToBoolean(double value);

[VB] Public Shared Function ToBoolean(ByVal value As Double) As Boolean

[JScript] public static function ToBoolean(value: double): Boolean;

Description

Converts the value of the specified double-precision floating point number to an equivalent Boolean value.

Return Value: true if value is non-zero; otherwise, false. A double-precision floating point number.

ToBoolean

[C#] public static bool ToBoolean(short value);

[C++] public: static bool ToBoolean(short value);

[VB] Public Shared Function ToBoolean(ByVal value As Short) As Boolean

[JScript] public static function ToBoolean(value: Int16): Boolean;

Description

Converts the value of the specified 16-bit signed integer to an equivalent Boolean value.

Return Value: true if value is non-zero; otherwise, false. A 16-bit signed integer.

ToBoolean

[C#] public static bool ToBoolean(int value);

[C++] public: static bool ToBoolean(int value);

[VB] Public Shared Function ToBoolean(ByVal value As Integer) As Boolean

[JScript] public static function ToBoolean(value: int): Boolean;

Description

Converts the value of the specified 32-bit signed integer to an equivalent Is Boolean value.

Return Value: true if value is non-zero; otherwise, false. A 32-bit signed integer.

ToBoolean

[C#] public static bool ToBoolean(long value);

[C++] public: static bool ToBoolean(_int64 value);

[VB] Public Shared Function ToBoolean(ByVal value As Long) As Boolean

[JScript] public static function ToBoolean(value: long): Boolean;

Description

Converts the value of the specified 64-bit signed integer to an equivalent Boolean value.

Return Value: true if value is non-zero; otherwise, false. A 64-bit signed integer.

ToBoolean

[C#] public static bool ToBoolean(object value);

[C++] public: static bool ToBoolean(Object* value);

[VB] Public Shared Function ToBoolean(ByVal value As Object) As Boolean

[JScript] public static function ToBoolean(value: Object): Boolean; Converts a specified value to an equivalent Boolean value.

Description

Converts the value of a specified Object to an equivalent Boolean value.

Return Value: false if value equals null. An System.Object that implements the System.IConvertible interface or null.

ToBoolean

[C#] public static bool ToBoolean(sbyte value);

[C++] public: static bool ToBoolean(char value);

[VB] Public Shared Function ToBoolean(ByVal value As SByte) As Boolean

[JScript] public static function ToBoolean(value: SByte): Boolean;

Description

Converts the value of the specified 8-bit signed integer to an equivalent Boolean value.

Return Value: true if value is non-zero; otherwise, false. An 8-bit signed integer.

ToBoolean

[C#] public static bool ToBoolean(float value);

[C++] public: static bool ToBoolean(float value);

[VB] Public Shared Function ToBoolean(ByVal value As Single) As Boolean

[JScript] public static function ToBoolean(value: float): Boolean;

Description

Converts the value of the specified single-precision floating point number to an equivalent Boolean value.

Return Value: true if value is non-zero; otherwise, false. A single-precision floating point number.

ToBoolean

[C#] public static bool ToBoolean(string value);

[C++] public: static bool ToBoolean(String* value);

[VB] Public Shared Function ToBoolean(ByVal value As String) As Boolean

[JScript] public static function ToBoolean(value: String): Boolean;

Description

Converts the specified String representation of a logical value to its Boolean equivalent.

Return Value: true if value equals System.Boolean.TrueString, or false if value equals System.Boolean.FalseString. A System.String that contains the value of either System.Boolean.TrueString or System.Boolean.FalseString.

ToBoolean

[C#] public static bool ToBoolean(ushort value);

[C++] public: static bool ToBoolean(unsigned short value);

[VB] Public Shared Function ToBoolean(ByVal value As UInt16) As Boolean

[JScript] public static function ToBoolean(value: UInt16): Boolean;

Description

Converts the value of the specified 16-bit unsigned integer to an equivalent Boolean value.

Return Value: true if value is non-zero; otherwise, false. A 16-bit unsigned integer.

ToBoolean

[C#] public static bool ToBoolean(uint value);

[C++] public: static bool ToBoolean(unsigned int value);

[VB] Public Shared Function ToBoolean(ByVal value As UInt32) As Boolean

[JScript] public static function ToBoolean(value: UInt32): Boolean;

Description

Converts the value of the specified 32-bit unsigned integer to an equivalent Boolean value.

Return Value: true if value is non-zero; otherwise, false. A 32-bit unsigned integer.

ToBoolean

[C#] public static bool ToBoolean(ulong value);

[C++] public: static bool ToBoolean(unsigned _int64 value);

[VB] Public Shared Function ToBoolean(ByVal value As UInt64) As Boolean

[JScript] public static function ToBoolean(value: UInt64): Boolean;

Description

Converts the value of the specified 64-bit unsigned integer to an equivalent Boolean value.

Return Value: true if value is non-zero; otherwise, false. A 64-bit unsigned integer.

ToBoolean

[C#] public static bool ToBoolean(object value, IFormatProvider provider);

[C++] public: static bool ToBoolean(Object* value, IFormatProvider-* provider);

[VB] Public Shared Function ToBoolean(ByVal value As Object, ByVal provider As IFormatProvider) As Boolean

[JScript] public static function ToBoolean(value: Object, provider: IFormatProvider): Boolean;

Description

Converts the value of the specified Object to an equivalent Boolean value using the specified culture-specific formatting information.

Return Value: false if value equals null.

provider enables the user to specify culture-specific conversion information about the contents of value. For example, if value is a String that represents a number, provider could supply culture-specific information about the notation used to represent that number. An System.Object that implements the System.IConvertible interface or null. An System.IFormatProvider interface implementation that supplies culture-specific formatting information.

ToBoolean

[C#] public static bool ToBoolean(string value, IFormatProvider provider);

[C++] public: static bool ToBoolean(String* value, IFormatProvider* provider);

[VB] Public Shared Function ToBoolean(ByVal value As String, ByVal provider As IFormatProvider) As Boolean

[JScript] public static function ToBoolean(value: String, provider: IFormatProvider): Boolean;

Description

Converts the specified String representation of a logical value to its Boolean equivalent using the specified culture-specific formatting information.

Return Value: true if value equals System.Boolean.True String, or false if value equals System.Boolean.FalseString.

provider is ignored; it does not participate in this operation. A string that contains the value of either System.Boolean.TrueString or System.Boolean.FalseString. (Reserved) An System.IFormatProvider interface implementation that supplies culture-specific formatting information.

ToByte

[C#] public static byte ToByte(bool value);

[C++] public: static unsigned char ToByte(bool value);

[VB] Public Shared Function ToByte(ByVal value As Boolean) As Byte

[JScript] public static function ToByte(value: Boolean): Byte;

Description

Converts the value of the specified Boolean value to the equivalent 8-bit unsigned integer.

Return Value: The number 1 if value is true; otherwise, 0. A Boolean value.

ToByte

[C#] public static byte ToByte(byte value);

[C++] public: static unsigned char ToByte(unsigned char value);

[VB] Public Shared Function ToByte(ByVal value As Byte) As Byte

[JScript] public static function ToByte(value: Byte): Byte;

Description

Returns the specified 8-bit unsigned integer; no actual conversion is performed.

Return Value: value is returned unchanged. An 8-bit unsigned integer.

ToByte

[C#] public static byte ToByte(char value);

[C++] public: static unsigned char ToByte(_wchar_t value);

[VB] Public Shared Function ToByte(ByVal value As Char) As Byte

[JScript] public static function ToByte(value: Char): Byte;

Description

Converts the value of the specified Unicode character to the equivalent 8-bit unsigned integer.

Return Value: The 8-bit unsigned integer equivalent to value. A Unicode character.

ToByte

[C#] public static byte ToByte(DateTime value);

[C++] public: static unsigned char ToByte(DateTime value);

[VB] Public Shared Function ToByte(ByVal value As DateTime) As Byte

[JScript] public static function ToByte(value: DateTime): Byte;

Description

Calling this method always throws System.InvalidCastException.

This method is reserved for future use. A System.DateTime.

ToByte

[C#] public static byte ToByte(decimal value);

[C++] public: static unsigned char ToByte(Decimal value);

[VB] Public Shared Function ToByte(ByVal value As Decimal) As Byte

[JScript] public static function ToByte(value: Decimal): Byte;

Description

Converts the value of the specified Decimal number to an equivalent 8-bit unsigned integer.

Return Value: value rounded to the nearest 8-bit signed integer. If value is halfway between two whole numbers, the even number is returned; that is, 4.5 is converted to 4, and 5.5 is converted to 6. A System.Decimal number.

ToByte

[C#] public static byte ToByte(double value);

[C++] public: static unsigned char ToByte(double value);

[VB] Public Shared Function ToByte(ByVal value As Double) As Byte

[JScript] public static function ToByte(value: double): Byte;

Description

Converts the value of the specified double-precision floating point number to an equivalent 8-bit unsigned integer.

Return Value: value rounded to the nearest 8-bit signed integer. If value is halfway between two whole numbers, the even number is returned; that is, 4.5 is converted to 4, and 5.5 is converted to 6. A double-precision floating point number.

ToByte

[C#] public static byte ToByte(short value);

[C++] public: static unsigned char ToByte(short value);

[VB] Public Shared Function ToByte(ByVal value As Short) As Byte

[JScript] public static function ToByte(value: Int16): Byte;

Description

Converts the value of the specified 16-bit signed integer to an equivalent 8-bit unsigned integer.

Return Value: An 8-bit unsigned integer equivalent to the value of value. A 16-bit signed integer.

ToByte

[C#] public static byte ToByte(int value);

[C++] public: static unsigned char ToByte(int value);

[VB] Public Shared Function ToByte(ByVal value As Integer) As Byte

[JScript] public static function ToByte(value: int): Byte;

Description

Converts the value of the specified 32-bit signed integer to an equivalent 8-bit unsigned integer.

Return Value: An 8-bit unsigned integer equivalent to the value of value. A 32-bit signed integer.

ToByte

[C#] public static byte ToByte(long value);

[C++] public: static unsigned char ToByte(_int64 value);

[VB] Public Shared Function ToByte(ByVal value As Long) As Byte

[JScript] public static function ToByte(value: long): Byte;

Description

Converts the value of the specified 64-bit signed integer to an equivalent 8-bit unsigned integer.

Return Value: An 8-bit unsigned integer equivalent to the value of value. A 64-bit signed integer.

ToByte

[C#] public static byte ToByte(object value);

[C++] public: static unsigned char ToByte(Object* value);

[VB] Public Shared Function ToByte(ByVal value As Object) As Byte

[JScript] public static function ToByte(value: Object): Byte;

Converts a specified value to an 8-bit unsigned integer.

Description

Converts the value of the specified Object to an 8-bit unsigned integer.

Return Value: An 8-bit unsigned integer equivalent to the value of value, or zero if value is null.

The return value is the result of invoking the IConvertible.ToByte method of the underlying type of value. An System.Object that implements the System.IConvertible interface or null.

ToByte

[C#] public static byte ToByte(sbyte value);

[C++] public: static unsigned char ToByte(char value);

[VB] Public Shared Function ToByte(ByVal value As SByte) As Byte

[JScript] public static function ToByte(value: SByte): Byte;

Description

Converts the value of the specified 8-bit signed integer to an equivalent 8-bit unsigned integer.

Return Value: An 8-bit unsigned integer equivalent to the value of value. An 8-bit signed integer.

ToByte

[C#] public static byte ToByte(float value);

[C++] public: static unsigned char ToByte(float value);

[VB] Public Shared Function ToByte(ByVal value As Single) As Byte

[JScript] public static function ToByte(value: float): Byte;

Description

Converts the value of the specified single-precision floating point number to an equivalent 8-bit unsigned integer.

Return Value: value rounded to the nearest 8-bit signed integer. If value is halfway between two whole numbers, the even number is returned; that is, 4.5 is converted to 4, and 5.5 is converted to 6. A single-precision floating point number.

ToByte

[C#] public static byte ToByte(string value);

[C++] public: static unsigned char ToByte(String* value);

[VB] Public Shared Function ToByte(ByVal value As String) As Byte

[JScript] public static function ToByte(value: String): Byte;

Description

Converts the specified String representation of a number to an equivalent 8-bit unsigned integer.

Return Value: An 8-bit unsigned integer equivalent to the value of value. A System.String containing a number to convert. ToByte

[C#] public static byte ToByte(ushort value);

[C++] public: static unsigned char ToByte(unsigned short value);

[VB] Public Shared Function ToByte(ByVal value As UInt16) As Byte

[JScript] public static function ToByte(value: UInt16): Byte;

Description

Converts the value of the specified 16-bit unsigned integer to an equivalent 8-bit unsigned integer.

Return Value: An 8-bit unsigned integer equivalent to the value of value. A 16-bit unsigned integer.

ToByte

[C#] public static byte ToByte(uint value);

[C++] public: static unsigned char ToByte(unsigned int value);

[VB] Public Shared Function ToByte(ByVal value As UInt32) As Byte

[JScript] public static function ToByte(value: UInt32): Byte;

Description

Converts the value of the specified 32-bit unsigned integer to an equivalent 8-bit unsigned integer.

Return Value: An 8-bit unsigned integer equivalent to the value of value. A 32-bit unsigned integer.

ToByte

[C#] public static byte ToByte(ulong value);

[C++] public: static unsigned char ToByte(unsigned _int64 value);

[VB] Public Shared Function ToByte(ByVal value As UInt64) As Byte

[JScript] public static function ToByte(value: UInt64): Byte;

Description

Converts the value of the specified 64-bit unsigned integer to an equivalent 8-bit unsigned integer.

Return Value: An 8-bit unsigned integer equivalent to the value of value. A 64-bit unsigned integer.

ToByte

[C#] public static byte ToByte(object value, IFormatProvider provider);

[C++] public: static unsigned char ToByte(Object* value, IFormatProvider* provider);

[VB] Public Shared Function ToByte(ByVal value As Object, ByVal provider As IFormatProvider) As Byte

[JScript] public static function ToByte(value: Object, provider: IFormatProvider): Byte;

Description

Converts the value of the specified Object to an 8-bit unsigned integer using the specified culture-specific formatting information.

Return Value: An 8-bit unsigned integer equivalent to the value of value, or zero if value is null.

provider enables the user to specify culture-specific conversion information about the contents of value. For example, if value is a String that represents a number, provider could supply culture-specific information about the notation used to represent that number. An System.Object that implements the System.IConvertible interface. An System.IFormatProvider interface implementation that supplies culture-specific formatting information.

ToByte

[C#] public static byte ToByte(string value, IFormatProvider provider);

[C++] public: static unsigned char ToByte(String* value, IFormatProvider* provider);

[VB] Public Shared Function ToByte(ByVal value As String, ByVal provider As IFormatProvider) As Byte

[JScript] public static function ToByte(value: String, provider: IFormatProvider): Byte;

Description

Converts the specified String representation of a number to an equivalent 8-bit signed integer using specified culture-specific formatting information.

Return Value: An 8-bit signed integer equivalent to the value of value.

provider is an IFormatProvider instance that obtains a System.Globalization.NumberFormatInfo object. The NumberFormatInfo object provides culture-specific information about the format of value. If provider is null, the NumberFormatInfo for the current culture is used. A System.String containing a number to convert. An System.IFormatProvider interface implementation that supplies culture-specific formatting information.

ToByte

[C#] public static byte ToByte(string value, int fromBase);

[C++] public: static unsigned char ToByte(String* value, int fromBase);

[VB] Public Shared Function ToByte(ByVal value As String, ByVal fromBase As Integer) As Byte

[JScript] public static function ToByte(value: String, fromBase: t): Byte;

Description

Converts the String representation of a number in a specified base to an equivalent 8-bit unsigned integer.

Return Value: An 8-bit unsigned integer equivalent to the number in value. A System.String containing a number. The base of the number in value, which must be 2, 8, 10, or 16.

ToChar

[C#] public static char ToChar(bool value);

[C++] public: static __wchar_t ToChar(bool value);

[VB] Public Shared Function ToChar(ByVal value As Boolean) As Char

[JScript] public static function ToChar(value: Boolean): Char;

Description

Calling this method always throws System.InvalidCastException.

This method is reserved for future use. A System.Boolean value.

ToChar

[C#] public static char ToChar(byte value);

[C++] public: static _wchar_t ToChar(unsigned char value);

[VB] Public Shared Function ToChar(ByVal value As Byte) As Char

[JScript] public static function ToChar(value: Byte): Char;

Description

Converts the value of the specified 8-bit unsigned integer to its equivalent Unicode character.

Return Value: The Unicode character equivalent to the value of value. An 8-bit unsigned integer.

ToChar

[C#] public static char ToChar(char value);

[C++] public: static __wchar_t ToChar(_wchar_t value);

[VB] Public Shared Function ToChar(ByVal value As Char) As Char

[JScript] public static function ToChar(value: Char): Char;

Description

Returns the specified Unicode character value; no actual conversion is performed.

Return Value: value is returned unchanged. A Unicode character.

ToChar

[C#] public static char ToChar(DateTime value);

[C++] public: static __wchar_t ToChar(DateTime value);

[VB] Public Shared Function ToChar(ByVal value As DateTime) As Char

[JScript] public static function ToChar(value: DateTime): Char;

Description

Calling this method always throws System.InvalidCastException.

This method is reserved for future use. A System.DateTime.

ToChar

[C#] public static char ToChar(decimal value);

[C++] public: static _wchar_t ToChar(Decimal value);

[VB] Public Shared Function ToChar(ByVal value As Decimal) As Char

[JScript] public static function ToChar(value: Decimal): Char;

Description

Converts the value of the specified Decimal number to its equivalent Unicode character.

Return Value: A Unicode character equivalent to the value of value.

The return value is the result of invoking the IConvertible.ToChar method of the underlying type of value. An System.Decimal number.

ToChar

[C#] public static char ToChar(double value);

[C++] public: static _wchar_t ToChar(double value);

[VB] Public Shared Function ToChar(ByVal value As Double) As Char

[JScript] public static function ToChar(value: double): Char;

Description

Converts the value of the specified double-precision floating point number to its equivalent Unicode character.

Return Value: The Unicode character equivalent to the value of value.

The return value is the result of invoking the IConvertible.ToChar method of the underlying type of value. A double-precision floating point number.

ToChar

[C#] public static char ToChar(short value);

[C++] public: static __wchar_t ToChar(short value);

[VB] Public Shared Function ToChar(ByVal value As Short) As Char

[JScript] public static function ToChar(value: Int16): Char;

Description

Converts the value of the specified 16-bit signed integer to its equivalent Unicode character.

Return Value: The Unicode character equivalent to the value of value. A 16-bit signed integer.

ToChar

[C#] public static char ToChar(int value);

[C++] public: static __wchar_t ToChar(int value);

[VB] Public Shared Function ToChar(ByVal value As Integer) As Char

[JScript] public static function ToChar(value: int): Char;

Description

Converts the value of the specified 32-bit signed integer to its equivalent Unicode character.

Return Value: The Unicode character equivalent to the value of value. A 32-bit signed integer.

ToChar

[C#] public static char ToChar(long value);

[C++] public: static _wchar_t ToChar(_int64 value);

[VB] Public Shared Function ToChar(ByVal value As Long) As Char

[JScript] public static function ToChar(value: long): Char;

Description

Converts the value of the specified 64-bit signed integer to its equivalent Unicode character.

Return Value: The Unicode character equivalent to the value of value. A 64-bit signed integer.

ToChar

[C#] public static char ToChar(object value);

[C++] public: static __wchar_t ToChar(Object* value);

[VB] Public Shared Function ToChar(ByVal value As Object) As Char

[JScript] public static function ToChar(value: Object): Char;

Converts a specified value to a Unicode character.

Description

Converts the value of the specified Object to a Unicode character.

Return Value: The Unicode character equivalent to the value of value.

The return value is the result of invoking the IConvertible.ToChar method of the underlying type of value. An System.Object that implements the System.IConvertible interface.

ToChar

[C#] public static char ToChar(sbyte value);

[C++] public: static __wchar_t ToChar(char value);

[VB] Public Shared Function ToChar(ByVal value As SByte) As Char

[JScript] public static function ToChar(value: SByte): Char;

Description

Converts the value of the specified 8-bit signed integer to its equivalent Unicode character.

Return Value: The Unicode character equivalent to the value of value. An 8-bit signed integer.

ToChar

[C#] public static char ToChar(float value);

[C++] public: static __wchar_t ToChar(float value);

[VB] Public Shared Function ToChar(ByVal value As Single) As Char

[JScript] public static function ToChar(value: float): Char;

Description

Converts the value of the specified single-precision floating point number to its equivalent Unicode character.

Return Value: The Unicode character equivalent to the value of value.

The return value is the result of invoking the IConvertible. ToChar method of the underlying type of value. An single-precision floating point number.

ToChar

[C#] public static char ToChar(string value);

[C++] public: static __wchar_t ToChar(String* value);

[VB] Public Shared Function ToChar(ByVal value As String) As Char

[JScript] public static function ToChar(value: String): Char;

Description

Converts the first character of a String to a Unicode character.

Return Value: The Unicode character equivalent to the first and only character in value.value is null.

value must be null or a String containing a single character. A System.String of length 1 or null.

ToChar

[C#] public static char ToChar(ushort value);

[C++] public: static _wchar_t ToChar(unsigned short value);

[VB] Public Shared Function ToChar(ByVal value As UInt16) As Char

[JScript] public static function ToChar(value: UInt16): Char;

Description

Converts the value of the specified 16-bit unsigned integer to its equivalent Unicode character.

Return Value: The Unicode character equivalent to the value of value. A 16-bit unsigned integer.

ToChar

[C#] public static char ToChar(uint value);

[C++] public: static __wchar_t ToChar(unsigned int value);

[VB] Public Shared Function ToChar(ByVal value As UInt32) As Char

[JScript] public static function ToChar(value: UInt32): Char;

Description

Converts the value of the specified 32-bit unsigned integer to its equivalent Unicode character.

Return Value: The Unicode character equivalent to the value of value. A 32-bit unsigned integer.

ToChar

[C#] public static char ToChar(ulong value);

[C++] public: static _wchar_t ToChar(unsigned _int64 value);

[VB] Public Shared Function ToChar(ByVal value As UInt64) As Char

[JScript] public static function ToChar(value: UInt64): Char;

Description

Converts the value of the specified 64-bit unsigned integer to its equivalent Unicode character.

Return Value: The Unicode character equivalent to the value of value. A 64-bit unsigned integer.

ToChar

[C#] public static char ToChar(object value, IFormatProvider provider);

[C++] public: static _wchar_t ToChar(Object* value, IFormatprovider* provider);

[VB] Public Shared Function ToChar(ByVal value As Object, ByVal provider As IFormatProvider) As Char

[JScript] public static function ToChar(value: Object, provider: IFormatProvider): Char;

Description

Converts the value of the specified Object to its equivalent Unicode character using the specified culture-specific formatting information.

Return Value: The Unicode character equivalent to the value of value.

The return value is the result of invoking the IConvertible. ToChar method of the underlying type of value. An System. Object that implements the System.IConvertible interface. An System.IFormatProvider interface implementation that supplies culture-specific formatting information.

ToChar

[C#] public static char ToChar(string value, IFormatProvider provider);

[C++] public: static __wchar_t ToChar(String* value, IFormatProvider* provider);

[VB] Public Shared Function ToChar(ByVal value As String, ByVal provider As IFormatProvider) As Char

[JScript] public static function ToChar(value: String, provider: IFormatProvider): Char;

Description

Converts the first character of a String to a Unicode character using specified culture-specific formatting information.

Return Value: The Unicode character equivalent to the first and only character in value.value is null.

value must be null or a String containing a single character. A System.String of length 1 or null. (Reserved) An System.IFormatProvider interface implementation that supplies culture-specific formatting information.

ToDateTime

[C#] public static DateTime ToDateTime(bool value);

[C++] public: static DateTime ToDateTime(bool value);

[VB] Public Shared Function ToDateTime(ByVal value As Boolean) As DateTime

[JScript] public static function ToDateTime(value: Boolean): DateTime;

Description

Calling this method always throws System.InvalidCastException.

This method is reserved for future use. A Boolean value.

ToDateTime

[C#] public static DateTime ToDateTime(byte value);

[C++] public: static DateTime ToDateTime(unsigned char value);

[VB] Public Shared Function ToDateTime(ByVal value As Byte) As DateTime

[JScript] public static function ToDateTime(value: Byte): DateTime;

Description

Calling this method always throws System.InvalidCastException.

This method is reserved for future use. An 8-bit unsigned integer.

ToDateTime

[C#] public static DateTime ToDateTime(char value);

[C++] public: static DateTime ToDateTime(_wchar_t value);

[VB] Public Shared Function ToDateTime(ByVal value As Char) As DateTime

[JScript] public static function ToDateTime(value: Char): DateTime;

Description

Calling this method always throws System.InvalidCastException.

This method is reserved for future use. A Unicode character.

ToDateTime

[C#] public static DateTime ToDateTime(DateTime value);

[C++] public: static DateTime ToDateTime(DateTime value);

[VB] Public Shared Function ToDateTime(ByVal value As DateTime) As DateTime

[JScript] public static function ToDateTime(value: DateTime): DateTime; Converts a specified value to a DateTime.

Description

Returns the specified DateTime; no actual conversion is performed. A System.DateTime.

ToDateTime

[C#] public static DateTime ToDateTime(decimal value);

[C++] public: static DateTime ToDateTime(Decimal value);

[VB] Public Shared Function ToDateTime(ByVal value As Decimal) As DateTime

[JScript] public static function ToDateTime(value: Decimal): DateTime;

Description

Calling this method always throws System.InvalidCastException.

This method is reserved for future use. A System.Decimal value.

ToDateTime

[C#] public static DateTime ToDateTime(double value);

[C++] public: static DateTime ToDateTime(double value);

[VB] Public Shared Function ToDateTime(ByVal value As Double) As DateTime

[JScript] public static function ToDateTime(value: double): DateTime;

Description

This method is reserved for future use. A double-precision floating point value.

ToDateTime

[C#] public static DateTime ToDateTime(short value);

[C++] public: static DateTime ToDateTime(short value);

[VB] Public Shared Function ToDateTime(ByVal value As Short) As DateTime

[JScript] public static function ToDateTime(value: Int16): DateTime;

Description

Calling this method always throws System.InvalidCastException.

This method is reserved for future use. A 16-bit signed integer.

ToDateTime

[C#] public static DateTime ToDateTime(int value);

[C++] public: static DateTime ToDateTime(int value);

[VB] Public Shared Function ToDateTime(ByVal value As Integer) As DateTime

[JScript] public static function ToDateTime(value: int): DateTime;

Description

Calling this method always throws System.InvalidCastException.

This method is reserved for future use. A 32-bit signed integer.

ToDateTime

[C#] public static DateTime ToDateTime(long value);

[C++] public: static DateTime ToDateTime(_int64 value);

[VB] Public Shared Function ToDateTime(ByVal value As Long) As DateTime

[JScript] public static function ToDateTime(value: long): DateTime;

Description

Calling this method always throws System.InvalidCastException.

This method is reserved for future use. A 64-bit signed integer.

ToDateTime

[C#] public static DateTime ToDateTime(object value);

[C++] public: static DateTime ToDateTime(Object* value);

[VB] Public Shared Function ToDateTime(ByVal value As Object) As DateTime

[JScript] public static function ToDateTime(value: Object): DateTime; Converts a specified value to a DateTime.

Description

Converts the value of the specified Object to a DateTime.

Return Value: A DateTime equivalent to the value of value, or zero if value is null.

The return value is the result of invoking the IConvertible. ToDateTime method of the underlying type of value. An System.Object that implements the System.IConvertible interface or null.

ToDateTime

[C#] public static DateTime ToDateTime(sbyte value);

[C++] public: static DateTime ToDateTime(char value);

[VB] Public Shared Function ToDateTime(ByVal value As SByte) As DateTime

[JScript] public static function ToDateTime(value: SByte): DateTime;

Description

Calling this method always throws System.InvalidCastException.

This method is reserved for future use. An 8-bit signed integer.

ToDateTime

[C#] public static DateTime ToDateTime(float value);

[C++] public: static DateTime ToDateTime(float value);

[VB] Public Shared Function ToDateTime(ByVal value As Single) As DateTime

[JScript] public static function ToDateTime(value: float): DateTime;

Description

Calling this method always throws System.InvalidCastException.

This method is reserved for future use. A single-precision floating point value.

ToDateTime

[C#] public static DateTime ToDateTime(string value);

[C++] public: static DateTime ToDateTime(String* value);

[VB] Public Shared Function ToDateTime(ByVal value As String) As DateTime

[JScript] public static function ToDateTime(value: String): DateTime;

Description

Converts the specified String representation of a date and time to an equivalent DateTime.

Return Value: A DateTime equivalent to the value of value.

The return value is the result of invoking the System.DateTime.Parse(System.String) method on value. A System.String containing a date and time to convert.

ToDateTime

[C#] public static DateTime ToDateTime(ushort value);

[C++] public: static DateTime ToDateTime(unsigned short value);

[VB] Public Shared Function ToDateTime(ByVal value As UInt16) As DateTime

[JScript] public static function ToDateTime(value: UInt16): DateTime;

Description

Calling this method always throws System.InvalidCastException.

This method is reserved for future use. A 16-bit unsigned integer.

ToDateTime

[C#] public static DateTime ToDateTime(uint value);

[C++] public: static DateTime ToDateTime(unsigned int value);

[VB] Public Shared Function ToDateTime(ByVal value As UInt32) As DateTime

[JScript] public static function ToDateTime(value: UInt32): DateTime;

Description

Calling this method always throws System.InvalidCastException.

This method is reserved for future use. A 32-bit unsigned integer.

ToDateTime

[C#] public static DateTime ToDateTime(ulong value);

[C++] public: static DateTime ToDateTime(unsigned _int64 value);

[VB] Public Shared Function ToDateTime(ByVal value As UInt64) As DateTime

[JScript] public static function ToDateTime(value: UInt64): DateTime;

Description

Calling this method always throws System.InvalidCastException.

This method is reserved for future use. A 64-bit unsigned integer.

ToDateTime

[C#] public static DateTime ToDateTime(object value, IFormatProvider provider);

[C++] public: static DateTime ToDateTime(Object* value, IFormatProvider* provider);

[VB] Public Shared Function ToDateTime(ByVal value As Object, ByVal provider As IFormatProvider) As DateTime

[JScript] public static function ToDateTime(value: Object, provider: IFormatProvider): DateTime;

Description

Converts the value of the specified Object to a DateTime using the specified culture-specific formatting information.

Return Value: A DateTime equivalent to the value of value, or zero if value is null.

The return value is the result of invoking the IConvertible.ToDateTime method of the underlying type of value. An System.Object that implements the System.IConvertible interface. An System.IFormatProvider interface implementation that supplies culture-specific formatting information.

ToDateTime

[C#] public static DateTime ToDateTime(string value, IFormatProvider provider);

[C++] public: static DateTime ToDateTime(String* value, IFormatProvider* provider);

[VB] Public Shared Function ToDateTime(ByVal value As String, ByVal provider As IFormatProvider) As DateTime

[JScript] public static function ToDateTime(value: String, provider: IFormatProvider): DateTime;

Description

Converts the specified String representation of a number to an equivalent DateTime using the specified culture-specific formatting information.

Return Value: A DateTime equivalent to the value of value.

The return value is the result of invoking the System.DateTime.Parse(System.String) method on value. A System.String containing a number to convert. An System.IFormatProvider interface implementation that supplies culture-specific formatting information.

ToDecimal

[C#] public static decimal ToDecimal(bool value);

[C++] public: static Decimal ToDecimal(bool value);

[VB] Public Shared Function ToDecimal(ByVal value As Boolean) As Decimal

[JScript] public static function ToDecimal(value: Boolean): Decimal;

Description

Converts the value of the specified Boolean value to the equivalent Decimal number.

Return Value: The number 1 if value is true; otherwise, 0. A Boolean value.

ToDecimal

[C#] public static decimal ToDecimal(byte value);

[C++] public: static Decimal ToDecimal(unsigned char value);

[VB] Public Shared Function ToDecimal(ByVal value As Byte) As Decimal

[JScript] public static function ToDecimal(value: Byte): Decimal;

Description

Converts the value of the specified 8-bit unsigned integer to the equivalent Decimal number.

Return Value: The Decimal number equivalent to the value of value. An 8-bit unsigned integer.

ToDecimal

[C#] public static decimal ToDecimal(char value);

[C++] public: static Decimal ToDecimal(_wchar_t value);

[VB] Public Shared Function ToDecimal(ByVal value As Char) As Decimal

[JScript] public static function ToDecimal(value: Char): Decimal;

Description

Calling this method always throws System.InvalidCastException.

This method is reserved for future use. A Unicode character.

ToDecimal

[C#] public static decimal ToDecimal(DateTime value);

[C++] public: static Decimal ToDecimal(DateTime value);

[VB] Public Shared Function ToDecimal(ByVal value As DateTime) As Decimal

[JScript] public static function ToDecimal(value: DateTime): Decimal;

Description

Calling this method always throws System.InvalidCastException.

This method is reserved for future use. A System. DateTime.

ToDecimal

[C#] public static decimal ToDecimal(decimal value);

[C++] public: static Decimal ToDecimal(Decimal value);

[VB] Public Shared Function ToDecimal(ByVal value As Decimal) As Decimal

[JScript] public static function ToDecimal(value: Decimal): Decimal;

Description

Returns the specified Decimal number; no actual conversion is performed.

Return Value: value is returned unchanged. A Decimal number.

ToDecimal

[C#] public static decimal ToDecimal(double value);

[C++] public: static Decimal ToDecimal(double value);

[VB] Public Shared Function ToDecimal(ByVal value As Double) As Decimal

[JScript] public static function ToDecimal(value: double): Decimal;

Description

Converts the value of the specified double-precision floating point number to an equivalent Decimal number.

Return Value: A Decimal number equivalent to the value of value. A double-precision floating point number.

ToDecimal

[C#] public static decimal ToDecimal(short value);

[C++] public: static Decimal ToDecimal(short value);

[VB] Public Shared Function ToDecimal(ByVal value As Short) As Decimal

[JScript] public static function ToDecimal(value: Int16): Decimal;

Description

Converts the value of the specified 16-bit signed integer to an equivalent Decimal number.

Return Value: A Decimal number equivalent to the value of value. A 16-bit signed integer.

ToDecimal

[C#] public static decimal ToDecimal(int value);

[C++] public: static Decimal ToDecimal(int value);

[VB] Public Shared Function ToDecimal(ByVal value As Integer) As Decimal

[JScript] public static function ToDecimal(value: int): Decimal;

Description

Converts the value of the specified 32-bit signed integer to an equivalent Decimal number.

Return Value: A Decimal number equivalent to the value of value. A 32-bit signed integer.

ToDecimal

[C#] public static decimal ToDecimal(long value);

[C++] public: static Decimal ToDecimal(_int64 value);

[VB] Public Shared Function ToDecimal(ByVal value As Long) As Decimal

[JScript] public static function ToDecimal(value: long): Decimal;

Description

Converts the value of the specified 64-bit signed integer to an equivalent Decimal number.

Return Value: A Decimal number equivalent to the value of value. A 64-bit signed integer.

ToDecimal

[C#] public static decimal ToDecimal(object value);

[C++] public: static Decimal ToDecimal(Object* value);

[VB] Public Shared Function ToDecimal(ByVal value As Object) As Decimal

[JScript] public static function ToDecimal(value: Object): Decimal; Converts a specified value to a Decimal number.

Description

Converts the value of the specified Object to a Decimal number.

Return Value: A Decimal number equivalent to the value of value, or zero if value is null.

The return value is the result of invoking the IConvertible. ToDecimal method of the underlying type of value. An System.Object that implements the System.IConvertible interface or null.

ToDecimal

[C#] public static decimal ToDecimal(sbyte value);

[C++] public: static Decimal ToDecimal(char value);

[VB] Public Shared Function ToDecimal(ByVal value As SByte) As Decimal

[JScript] public static function ToDecimal(value: SByte): Decimal;

Description

Converts the value of the specified 8-bit signed integer to the equivalent Decimal number.

Return Value: The 8-bit signed integer equivalent to the value of value. An 8-bit signed integer.

ToDecimal

[C#] public static decimal ToDecimal(float value);

[C++] public: static Decimal ToDecimal(float value);

[VB] Public Shared Function ToDecimal(ByVal value As Single) As Decimal

[JScript] public static function ToDecimal(value: float): Decimal;

Description

Converts the value of the specified single-precision floating point number to the equivalent Decimal number.

Return Value: A Decimal number equivalent to the value of value. A single-precision floating point number.

ToDecimal

[C#] public static decimal ToDecimal(string value);

[C++] public: static Decimal ToDecimal(String* value);

[VB] Public Shared Function ToDecimal(ByVal value As String) As Decimal

[JScript] public static function ToDecimal(value: String): Decimal;

Description

Converts the specified String representation of a number to an equivalent Decimal number.

Return Value: A Decimal number equivalent to the value of value.

The return value is the result of invoking the System.Decimal.Parse(System.String) method on value. A System.String containing a number to convert.

ToDecimal

[C#] public static decimal ToDecimal(ushort value);

[C++] public: static Decimal ToDecimal(unsigned short value);

[VB] Public Shared Function ToDecimal(ByVal value As UInt16) As Decimal

[JScript] public static function ToDecimal(value: UInt16): Decimal;

Description

Converts the value of the specified 16-bit unsigned integer to the equivalent Decimal number.

Return Value: The Decimal number equivalent to the value of value. A 16-bit unsigned integer.

ToDecimal

[C#] public static decimal ToDecimal(uint value);

[C++] public: static Decimal ToDecimal(unsigned int value);

[VB] Public Shared Function ToDecimal(ByVal value As UInt32) As Decimal

[JScript] public static function ToDecimal(value: UInt32): Decimal;

Description

Converts the value of the specified 32-bit unsigned integer to an equivalent Decimal number.

Return Value: A Decimal number equivalent to the value of value. A 32-bit unsigned integer.

ToDecimal

[C#] public static decimal ToDecimal(ulong value);

[C++] public: static Decimal ToDecimal(unsigned _int64 value);

[VB] Public Shared Function ToDecimal(ByVal value As UInt64) As Decimal

[JScript] public static function ToDecimal(value: UInt64): Decimal;

Description

Converts the value of the specified 64-bit unsigned integer to an equivalent Decimal number.

Return Value: A Decimal number equivalent to the value of value. A 64-bit unsigned integer.

ToDecimal

[C#] public static decimal ToDecimal(object value, IFormatProvider provider);

[C++] public: static Decimal ToDecimal(Object* value, IFormatProvider* provider);

[VB] Public Shared Function ToDecimal(ByVal value As Object, ByVal provider As IFormatProvider) As Decimal

[JScript] public static function ToDecimal(value: Object, provider: IFormatProvider): Decimal;

Description

Converts the value of the specified Object to an Decimal number using the specified culture-specific formatting information.

Return Value: A Decimal number equivalent to the value of value, or zero if value is null.

The return value is the result of invoking the IConvertible.ToDecimal method of the underlying type of value. An System.Object that implements the System.IConvertible interface. An System.IFormatProvider interface implementation that supplies culture-specific formatting information.

ToDecimal

[C#] public static decimal ToDecimal(string value, IFormatProvider provider);

[C++] public: static Decimal ToDecimal(String* value, IFormatProvider* provider);

[VB] Public Shared Function ToDecimal(ByVal value As String, ByVal provider As IFormatProvider) As Decimal

[JScript] public static function ToDecimal(value: String, provider: IFormatProvider): Decimal;

Description

Converts the specified String representation of a number to an equivalent Decimal number using the specified culture-specific formatting information.

Return Value: A Decimal number equivalent to the value of value.

The return value is the result of invoking the System.Decimal.Parse(System.String) method on value. A System.String containing a number to convert. An System.IFormatProvider interface implementation that supplies culture-specific formatting information.

ToDouble

[C#] public static double ToDouble(bool value);

[C++] public: static double ToDouble(bool value);

[VB] Public Shared Function ToDouble(ByVal value As Boolean) As Double

[JScript] public static function ToDouble(value: Boolean): double;

Description

Converts the value of the specified Boolean value to the equivalent double-precision floating point number.

Return Value: The number 1 if value is true; otherwise, 0. A Boolean value.

ToDouble

[C#] public static double ToDouble(byte value);

[C++] public: static double ToDouble(unsigned char value);

[VB] Public Shared Function ToDouble(ByVal value As Byte) As Double

[JScript] public static function ToDouble(value: Byte): double;

Description

Converts the value of the specified 8-bit unsigned integer to the equivalent double-precision floating point number.

Return Value: The double-precision floating point number equivalent to the value of value. An 8-bit unsigned integer.

ToDouble

[C#] public static double ToDouble(char value);

[C++] public: static double ToDouble(_wchar_t value);

[VB] Public Shared Function ToDouble(ByVal value As Char) As Double

[JScript] public static function ToDouble(value: Char): double;

Description

Calling this method always throws System.InvalidCastException.

This method is reserved for future use. A Unicode character.

ToDouble

[C#] public static double ToDouble(DateTime value);

[C++] public: static double ToDouble(DateTime value);

[VB] Public Shared Function ToDouble(ByVal value As DateTime) As Double

[JScript] public static function ToDouble(value: DateTime): double;

Description

Calling this method always throws System.InvalidCastException.

This method is reserved for future use. A System. DateTime.

ToDouble

[C#] public static double ToDouble(decimal value);

[C++] public: static double ToDouble(Decimal value);

[VB] Public Shared Function ToDouble(ByVal value As Decimal) As Double

[JScript] public static function ToDouble(value: Decimal): double;

Description

Converts the value of the specified Decimal number to an equivalent double-precision floating point number.

Return Value: A double-precision floating point number equivalent to the value of value. A System.Decimal number.

ToDouble

[C#] public static double ToDouble(double value);

[C++] public: static double ToDouble(double value);

[VB] Public Shared Function ToDouble(ByVal value As Double) As Double

[JScript] public static function ToDouble(value: double): double;

Description

Returns the specified double-precision floating point number; no actual conversion is performed.

Return Value: value is returned unchanged. A double-precision floating point number.

ToDouble

[C#] public static double ToDouble(short value);

[C++] public: static double ToDouble(short value);

[VB] Public Shared Function ToDouble(ByVal value As Short) As Double

[JScript] public static function ToDouble(value: Int16): double;

Description

Converts the value of the specified 16-bit signed integer to an equivalent double-precision floating point number.

Return Value: A double-precision floating point number equivalent to the value of value. A 16-bit signed integer.

ToDouble

[C#] public static double ToDouble(int value);

[C++] public: static double ToDouble(int value);

[VB] Public Shared Function ToDouble(ByVal value As Integer) As Double

[JScript] public static function ToDouble(value: int): double;

Description

Converts the value of the specified 32-bit signed integer to an equivalent double-precision floating point number.

Return Value: A double-precision floating point number equivalent to the value of value. A 32-bit signed integer.

ToDouble

[C#] public static double ToDouble(long value);

[C++] public: static double ToDouble(_int64 value);

[VB] Public Shared Function ToDouble(ByVal value As Long) As Double

[JScript] public static function ToDouble(value: long): double;

Description

Converts the value of the specified 64-bit signed integer to an equivalent double-precision floating point number.

Return Value: A double-precision floating point number equivalent to the value of value. A 64-bit signed integer.

ToDouble

[C#] public static double ToDouble(object value);

[C++] public: static double ToDouble(Object* value);

[VB] Public Shared Function ToDouble(ByVal value As Object) As Double

[JScript] public static function ToDouble(value: Object): double; Converts a specified value to a double-precision floating point number.

Description

Converts the value of the specified Object to a double-precision floating point number.

Return Value: A double-precision floating point number equivalent to the value of value, or zero if value is null.

The return value is the result of invoking the IConvertible.ToDouble method of the underlying type of value. An System.Object that implements the System.IConvertible interface or null.

ToDouble

[C#] public static double ToDouble(sbyte value);

[C++] public: static double ToDouble(char value);

[VB] Public Shared Function ToDouble(ByVal value As SByte) As Double

[JScript] public static function ToDouble(value: SByte): double;

Description

Converts the value of the specified 8-bit signed integer to the equivalent double-precision floating point number.

Return Value: The 8-bit signed integer equivalent to the value of value. An 8-bit signed integer.

ToDouble

[C#] public static double ToDouble(float value);

[C++] public: static double ToDouble(float value);

[VB] Public Shared Function ToDouble(ByVal value As Single) As Double

[JScript] public static function ToDouble(value: float): double;

Description

Converts the value of the specified single-precision floating point number to an equivalent double-precision floating point number.

Return Value: A double-precision floating point number equivalent to the value of value. A single-precision floating point number.

ToDouble

[C#] public static double ToDouble(string value);

[C++] public: static double ToDouble(String* value);

[VB] Public Shared Function ToDouble(ByVal value As String) As Double

[JScript] public static function ToDouble(value: String): double;

Description

Converts the specified String representation of a number to an equivalent double-precision floating point number.

Return Value: A double-precision floating point number equivalent to the value of value.

The return value is the result of invoking the System. Double.Parse(System.String) method on value. A System. String containing a number to convert.

ToDouble

[C#] public static double ToDouble(ushort value);

[C++] public: static double ToDouble(unsigned short value);

[VB] Public Shared Function ToDouble(ByVal value As UInt16) As Double

[JScript] public static function ToDouble(value: UInt16): double;

Description

Converts the value of the specified 16-bit unsigned integer to the equivalent double-precision floating point number.

Return Value: The double-precision floating point number equivalent to the value of value. A 16-bit unsigned integer.

ToDouble

[C#] public static double ToDouble(uint value);

[C++] public: static double ToDouble(unsigned int value);

[VB] Public Shared Function ToDouble(ByVal value As UInt32) As Double

[JScript] public static function ToDouble(value: UInt32): double;

Description

Converts the value of the specified 32-bit unsigned integer to an equivalent double-precision floating point number.

Return Value: A double-precision floating point number equivalent to the value of value. A 32-bit unsigned integer.

ToDouble

[C#] public static double ToDouble(ulong value);

[C++] public: static double ToDouble(unsigned _int64 value);

[VB] Public Shared Function ToDouble(ByVal value As UInt64) As Double

[JScript] public static function ToDouble(value: UInt64): double;

Description

Converts the value of the specified 64-bit unsigned integer to an equivalent double-precision floating point number.

Return Value: A double-precision floating point number equivalent to the value of value. A 64-bit unsigned integer.

ToDouble

[C#] public static double ToDouble(object value, IFormatProvider provider);

[C++] public: static double ToDouble(Object* value, IFormatProvider* provider);

[VB] Public Shared Function ToDouble(ByVal value As Object, ByVal provider As IFormatProvider) As Double

[JScript] public static function ToDouble(value: Object, provider: IFormatProvider): double;

Description

Converts the value of the specified Object to an double-precision floating point number using the specified culture-specific formatting information.

Return Value: A double-precision floating point number equivalent to the value of value, or zero if value is null.

The return value is the result of invoking the IConvertible.ToDouble method of the underlying type of value. An System.Object that implements the System.IConvertible interface. An System.IFormatProvider interface implementation that supplies culture-specific formatting information.

ToDouble

[C#] public static double ToDouble(string value, IFormatProvider provider);

[C++] public: static double ToDouble(String* value, IFormatProvider* provider);

[VB] Public Shared Function ToDouble(ByVal value As String, ByVal provider As IFormatProvider) As Double

[JScript] public static function ToDouble(value: String, provider: IFormatProvider): double;

Description

Converts the specified String representation of a number to an equivalent double-precision floating point number using the specified culture-specific formatting information.

Return Value: A double-precision floating point number equivalent to the value of value.

The return value is the result of invoking the System. Double.Parse(System.String) method on value. A System. String containing a number to convert. An System.IFormatProvider interface implementation that supplies culture-specific formatting information.

ToInt16

[C#] public static short ToInt16(bool value);

[C++] public: static short ToInt16(bool value);

[VB] Public Shared Function ToInt16(ByVal value As Boolean) As Short

[JScript] public static function ToInt16(value: Boolean): Int16;

Description

Converts the value of the specified Boolean value to the equivalent 16-bit signed integer.

Return Value: The number 1 if value is true; otherwise, 0. A Boolean value.

ToInt16

[C#] public static short ToInt16(byte value);

[C++] public: static short ToInt16(unsigned char value);

[VB] Public Shared Function ToInt16(ByVal value As Byte) As Short

[JScript] public static function ToInt16(value: Byte): Int16;

Description

Converts the value of the specified 8-bit unsigned integer to the equivalent 16-bit signed integer.

Return Value: The 16-bit signed integer equivalent to the value of value. An 8-bit unsigned integer.

ToInt16

[C#] public static short ToInt16(char value);

[C++] public: static short ToInt16(_wchar_t value);

[VB] Public Shared Function ToInt16(ByVal value As Char) As Short

[JScript] public static function ToInt16(value: Char): Int16;

Description

Converts the value of the specified Unicode character to the equivalent 16-bit signed integer.

Return Value: The 16-bit signed integer equivalent to value. A Unicode character.

ToInt16

[C#] public static short ToInt16(DateTime value);

[C++] public: static short ToInt16(DateTime value);

[VB] Public Shared Function ToInt16(ByVal value As DateTime) As Short

[JScript] public static function ToInt16(value: DateTime): Int16;

Description

Calling this method always throws System.InvalidCastException.

This method is reserved for future use. A System. DateTime.

ToInt16

[C#] public static short ToInt16(decimal value);

[C++] public: static short ToInt16(Decimal value);

[VB] Public Shared Function ToInt16(ByVal value As Decimal) As Short

[JScript] public static function ToInt16(value: Decimal): Int16;

Description

Converts the value of the specified Decimal number to an equivalent 16-bit signed integer.

Return Value: value rounded to the nearest 16-bit signed integer. If value is halfway between two whole numbers, the even number is returned; that is, 4.5 is converted to 4, and 5.5 is converted to 6. A System.Decimal number.

ToInt16

[C#] public static short ToInt16(double value);

[C++] public: static short ToInt16(double value);

[VB] Public Shared Function ToInt16(ByVal value As Double) As Short

[JScript] public static function ToInt16(value: double): Int16;

Description

Converts the value of the specified double-precision floating point number to an equivalent 16-bit signed integer.

Return Value: value rounded to the nearest 16-bit signed integer. If value is halfway between two whole numbers, the even number is returned; that is, 4.5 is converted to 4, and 5.5 is converted to 6. A double-precision floating point number.

ToInt16

[C#] public static short ToInt16(short value);

[C++] public: static short ToInt16(short value);

[VB] Public Shared Function ToInt16(ByVal value As Short) As Short

[JScript] public static function ToInt16(value: Int16): Int16;

Description

Returns the specified 16-bit signed integer; no actual conversion is performed.

Return Value: value is returned unchanged. A 16-bit signed integer.

ToInt16

[C#] public static short ToInt16(int value);

[C++] public: static short ToInt16(int value);

[VB] Public Shared Function ToInt16(ByVal value As Integer) As Short

[JScript] public static function ToInt16(value: int): Int16;

Description

Converts the value of the specified 32-bit signed integer to an equivalent 16-bit signed integer.

Return Value: The 16-bit signed integer equivalent of value. A 32-bit signed integer.

ToInt16

[C#] public static short ToInt16(long value);

[C++] public: static short ToInt16(_int64 value);

[VB] Public Shared Function ToInt16(ByVal value As Long) As Short

[JScript] public static function ToInt16(value: long): Int16;

Description

Converts the value of the specified 64-bit signed integer to an equivalent 16-bit signed integer.

Return Value: A 16-bit signed integer equivalent to the value of value. A 64-bit signed integer.

ToInt16

[C#] public static short ToInt16(object value);

[C++] public: static short ToInt16(Object* value);

[VB] Public Shared Function ToInt16(ByVal value As Object) As Short

[JScript] public static function ToInt16(value: Object): Int16;

Converts a specified value to a 16-bit signed integer.

Description

Converts the value of the specified Object to a 16-bit signed integer.

Return Value: A 16-bit signed integer equivalent to the value of value, or zero if value is null.

The return value is the result of invoking the IConvertible. ToInt16 method of the underlying type of value. An System. Object that implements the System.IConvertible interface or null.

ToInt16

[C#] public static short ToInt16(sbyte value);

[C++] public: static short ToInt16(char value);

[VB] Public Shared Function ToInt16(ByVal value As SByte) As Short

[JScript] public static function ToInt16(value: SByte): Int16;

Description

Converts the value of the specified 8-bit signed integer to the equivalent 16-bit signed integer.

Return Value: The 8-bit signed integer equivalent to the value of value. An 8-bit signed integer. ToInt16

[C#] public static short ToInt16(float value);

[C++] public: static short ToInt16(float value);

[VB] Public Shared Function ToInt16(ByVal value As Single) As Short

[JScript] public static function ToInt16(value: float): Int16;

Description

Converts the value of the specified single-precision floating point number to an equivalent 16-bit signed integer.

Return Value: value rounded to the nearest 16-bit signed integer. If value is halfway between two whole numbers, the even number is returned; that is, 4.5 is converted to 4, and 5.5 is converted to 6. A single-precision floating point number.

ToInt16

[C#] public static short ToInt16(string value);

[C++] public: static short ToInt16(String* value);

[VB] Public Shared Function ToInt16(ByVal value As String) As Short

[JScript] public static function ToInt16(value: String): Int16;

Description

Converts the specified String representation of a number to an equivalent 16-bit signed integer.

Return Value: A 16-bit signed integer equivalent to the value of value. A System.String containing a number to convert.

ToInt16

[C#] public static short ToInt16(ushort value);

[C++] public: static short ToInt16(unsigned short value);

[VB] Public Shared Function ToInt16(ByVal value As UInt16) As Short

[JScript] public static function ToInt16(value: UInt16): Int16;

Description

Converts the value of the specified 16-bit unsigned integer to the equivalent 16-bit signed integer.

Return Value: The 16-bit signed integer equivalent to the value of value. A 16-bit unsigned integer.

ToInt16

[C#] public static short ToInt16(uint value);

[C++] public: static short ToInt16(unsigned int value);

[VB] Public Shared Function ToInt16(ByVal value As UInt32) As Short

[JScript] public static function ToInt16(value: UInt32): Int16;

Description

Converts the value of the specified 32-bit unsigned integer to an equivalent 16-bit signed integer.

Return Value: A 16-bit signed integer equivalent to the value of value. A 32-bit unsigned integer.

ToInt16

[C#] public static short ToInt16(ulong value);

[C++] public: static short ToInt16(unsigned _int64 value);

[VB] Public Shared Function ToInt16(ByVal value As UInt64) As Short

[JScript] public static function ToInt16(value: UInt64): Int16;

Description

Converts the value of the specified 64-bit unsigned integer to an equivalent 16-bit signed integer.

Return Value: A 16-bit signed integer equivalent to the value of value. A 64-bit unsigned integer. ToInt16

[C#] public static short ToInt16(object value, IFormatProvider provider);

[C++] public: static short ToInt16(Object* value, IFormatProvider* provider);

[VB] Public Shared Function ToInt16(ByVal value As Object, ByVal provider As IFormatProvider) As Short

[JScript] public static function ToInt16(value: Object, provider: IFormatProvider): Int16;

Description

Converts the value of the specified Object to a 16-bit signed integer using the specified culture-specific formatting information.

Return Value: A 16-bit signed integer equivalent to the value of value, or zero if value is null.

provider enables the user to specify culture-specific conversion information about the contents of value. For example, if value is a String that represents a number, provider could supply culture-specific information about the notation used to represent that number. An System.Object that implements the System.IConvertible interface. An System.IFormatProvider interface implementation that supplies culture-specific formatting information.

ToInt16

[C#] public static short ToInt16(string value, IFormatProvider provider);

[C++] public: static short ToInt16(String* value, IFormatProvider* provider);

[VB] Public Shared Function ToInt16(ByVal value As String, ByVal provider As IFormatProvider) As Short

[JScript] public static function ToInt16(value: String, provider: IFormatProvider): Int16;

Description

Converts the specified String representation of a number to an equivalent 16-bit signed integer using specified culture-specific formatting information.

Return Value: A 16-bit signed integer equivalent to the value of value.

provider is an IFormatProvider instance that obtains a System.Globalization.NumberFormatInfo object. The NumberFormatInfo object provides culture-specific information about the format of value. If provider is null, the NumberFormatInfo for the current culture is used. A System.String containing a number to convert. An System.IFormatProvider interface implementation that supplies culture-specific formatting information.

ToInt16

[C#] public static short ToInt16(string value, int fromBase);

[C++] public: static short ToInt16(String* value, int fromBase);

[VB] Public Shared Function ToInt16(ByVal value As String, ByVal fromBase As Integer) As Short

[JScript] public static function ToInt16(value: String, fromBase: int): Int16;

Description

Converts the String representation of a number in a specified base to an equivalent 16-bit signed integer.

Return Value: A 16-bit signed integer equivalent to the number in value. A System.String containing a number. The base of the number in value, which must be 2, 8, 10, or 16.

ToInt32

[C#] public static int ToInt32(bool value);

[C++] public: static int ToInt32(bool value);

[VB] Public Shared Function ToInt32(ByVal value As Boolean) As Integer

[JScript] public static function ToInt32(value: Boolean): int;

Description

Converts the value of the specified Boolean value to the equivalent 32-bit signed integer.

Return Value: The number 1 if value is true; otherwise, 0. A Boolean value.

ToInt32

[C#] public static int ToInt32(byte value);

[C++] public: static int ToInt32(unsigned char value);

[VB] Public Shared Function ToInt32(ByVal value As Byte) As Integer

[JScript] public static function ToInt32(value: Byte): int;

Description

Converts the value of the specified 8-bit unsigned integer to the equivalent 32-bit signed integer.

Return Value: The 32-bit signed integer equivalent to the value of value. An 8-bit unsigned integer. ToInt32

[C#] public static int ToInt32(char value);

[C++] public: static int ToInt32(_wchar_t value);

[VB] Public Shared Function ToInt32(ByVal value As Char) As Integer

[JScript] public static function ToInt32(value: Char): int;

Description

Converts the value of the specified Unicode character to the equivalent 32-bit signed integer.

Return Value: The 32-bit signed integer equivalent to value. A Unicode character.

ToInt32

[C#] public static int ToInt32(DateTime value);

[C++] public: static int ToInt32(DateTime value);

[VB] Public Shared Function ToInt32(ByVal value As DateTime) As Integer

[JScript] public static function ToInt32(value: DateTime): int;

Description

Calling this method always throws System.InvalidCastException.

This method is reserved for future use. A System.DateTime.

ToInt32

[C#] public static int ToInt32(decimal value);

[C++] public: static int ToInt32(Decimal value);

[VB] Public Shared Function ToInt32(ByVal value As Decimal) As Integer

[JScript] public static function ToInt32(value: Decimal): int;

Description

Converts the value of the specified Decimal number to an equivalent 32-bit signed integer.

Return Value: value rounded to the nearest 32-bit signed integer. If value is halfway between two whole numbers, the even number is returned; that is, 4.5 is converted to 4, and 5.5 is converted to 6. A System.Decimal number.

ToInt32

[C#] public static int ToInt32(double value);

[C++] public: static int ToInt32(double value);

[VB] Public Shared Function ToInt32(ByVal value As Double) As Integer

[JScript] public static function ToInt32(value: double): int;

Description

Converts the value of the specified double-precision floating point number to an equivalent 32-bit signed integer.

Return Value: value rounded to the nearest 32-bit signed integer. If value is halfway between two whole numbers, the even number is returned; that is, 4.5 is converted to 4, and 5.5 is converted to 6. A double-precision floating point number.

ToInt32

[C#] public static int ToInt32(short value);

[C++] public: static int ToInt32(short value);

[VB] Public Shared Function ToInt32(ByVal value As Short) As Integer

[JScript] public static function ToInt32(value: Int16): int;

Description

Converts the value of the specified 16-bit signed integer to an equivalent 32-bit signed integer.

Return Value: A 32-bit signed integer equivalent to the value of value. A 16-bit signed integer.

ToInt32

[C#] public static int ToInt32(int value);

[C++] public: static int ToInt32(int value);

[VB] Public Shared Function ToInt32(ByVal value As Integer) As Integer

[JScript] public static function ToInt32(value: int): int;

Description

Returns the specified 32-bit signed integer; no actual conversion is performed.

Return Value: value is returned unchanged. A 32-bit signed integer.

ToInt32

[C#] public static int ToInt32(long value);

[C++] public: static int ToInt32(_int64 value);

[VB] Public Shared Function ToInt32(ByVal value As Long) As Integer

[JScript] public static function ToInt32(value: long): int;

Description

Converts the value of the specified 64-bit signed integer to an equivalent 32-bit signed integer.

Return Value: A 32-bit signed integer equivalent to the value of value. A 64-bit signed integer.

ToInt32

[C#] public static int ToInt32(object value);

[C++] public: static int ToInt32(Object* value);

[VB] Public Shared Function ToInt32(ByVal value As Object) As Integer

[JScript] public static function ToInt32(value: Object): int;

Converts a specified value to a 32-bit signed integer.

Description

Converts the value of the specified Object to a 32-bit signed integer.

Return Value: A 32-bit signed integer equivalent to the value of value, or zero if value is null.

The return value is the result of invoking the IConvertible.ToInt32 method of the underlying type of value. An System.Object that implements the System.IConvertible interface or null.

ToInt32

[C#] public static int ToInt32(sbyte value);

[C++] public: static int ToInt32(char value);

[VB] Public Shared Function ToInt32(ByVal value As SByte) As Integer

[JScript] public static function ToInt32(value: SByte): int;

Description

Converts the value of the specified 8-bit signed integer to the equivalent 32-bit signed integer.

Return Value: The 8-bit signed integer equivalent to the value of value. An 8-bit signed integer.

ToInt32

[C#] public static int ToInt32(float value);

[C++] public: static int ToInt32(float value);

[VB] Public Shared Function ToInt32(ByVal value As Single) As Integer

[JScript] public static function ToInt32(value: float): int;

Description

Converts the value of the specified single-precision floating point number to an equivalent 32-bit signed integer.

Return Value: value rounded to the nearest 32-bit signed integer. If value is halfway between two whole numbers, the even number is returned; that is, 4.5 is converted to 4, and 5.5 is converted to 6. A single-precision floating point number.

ToInt32

[C#] public static int ToInt32(string value);

[C++] public: static int ToInt32(String* value);

[VB] Public Shared Function ToInt32(ByVal value As String) As Integer

[JScript] public static function ToInt32(value: String): int;

Description

Converts the specified String representation of a number to an equivalent 32-bit signed integer.

Return Value: A 32-bit signed integer equivalent to the value of value.

The return value is the result of invoking the System.Int32.Parse(System.String) method on value. A System.String containing a number to convert.

ToInt32

[C#] public static int ToInt32(ushort value);

[C++] public: static int ToInt32(unsigned short value);

[VB] Public Shared Function ToInt32(ByVal value As UInt16) As Integer

[JScript] public static function ToInt32(value: UInt16): int;

Description

Converts the value of the specified 16-bit unsigned integer to the equivalent 32-bit signed integer.

Return Value: The 32-bit signed integer equivalent to the value of value. A 16-bit unsigned integer.

ToInt32

[C#] public static int ToInt32(uint value);

[C++] public: static int ToInt32(unsigned int value);

[VB] Public Shared Function ToInt32(ByVal value As UInt32) As Integer

[JScript] public static function ToInt32(value: UInt32): int;

Description

Converts the value of the specified 32-bit unsigned integer to an equivalent 32-bit signed integer.

Return Value: A 32-bit signed integer equivalent to the value of value. A 32-bit unsigned integer.

ToInt32

[C#] public static int ToInt32(ulong value);

[C++] public: static int ToInt32(unsigned _int64 value);

[VB] Public Shared Function ToInt32(ByVal value As UInt64) As Integer

[JScript] public static function ToInt32(value: UInt64): int;

Description

Converts the value of the specified 64-bit unsigned integer to an equivalent 32-bit signed integer.

Return Value: A 32-bit signed integer equivalent to the value of value. A 64-bit unsigned integer.

ToInt32

[C#] public static int ToInt32(object value, IFormatProvider provider);

[C++] public: static int ToInt32(Object* value, IFormatProvider* provider);

[VB] Public Shared Function ToInt32(ByVal value As Object, ByVal provider As IFormatProvider) As Integer

[JScript] public static function ToInt32(value: Object, provider: IFormatProvider): int;

Description

Converts the value of the specified Object to a 32-bit signed integer using the specified culture-specific formatting information.

Return Value: A 32-bit signed integer equivalent to the value of value, or zero if value is null.

The return value is the result of invoking the IConvertible. ToInt32 method of the underlying type of value. An System. Object that implements the System.IConvertible interface. An System.IFormatProvider interface implementation that supplies culture-specific formatting information.

ToInt32

[C#] public static int ToInt32(string value, IFormatProvider provider);

[C++] public: static int ToInt32(String* value, IFormatProvider* provider);

[VB] Public Shared Function ToInt32(ByVal value As String, ByVal provider As IFormatProvider) As Integer

[JScript] public static function ToInt32(value: String, provider: IFormatProvider): int;

Description

Converts the specified String representation of a number to an equivalent 32-bit signed integer using specified culture-specific formatting information.

Return Value: A 32-bit signed integer equivalent to the value of value.

The return value is the result of invoking the System.Int32.Parse(System.String) method on value. A System.String containing a number to convert. An System.IFormatProvider interface implementation that supplies culture-specific formatting information.

ToInt32

[C#] public static int ToInt32(string value, int fromBase);

[C++] public: static int ToInt32(String* value, int fromBase);

[VB] Public Shared Function ToInt32(ByVal value As String, ByVal fromBase As to Integer) As Integer [JScript] public static function ToInt32(value: String, fromBase: int): int;

Description

Converts the String representation of a number in a specified base to an equivalent 32-bit signed integer.

Return Value: A 32-bit signed integer equivalent to the number in value. A System.String containing a number. The base of the number in value, which must be 2, 8, 10, or 16.

ToInt64

[C#] public static long ToInt64(bool value);

[C++] public: static _int64 ToInt64(bool value);

[VB] Public Shared Function ToInt64(ByVal value As Boolean) As Long

[JScript] public static function ToInt64(value: Boolean): long;

Description

Converts the value of the specified Boolean value to the equivalent 64-bit signed integer.

Return Value: The number 1 if value is true; otherwise, 0. A Boolean value.

ToInt64

[C#] public static long ToInt64(byte value);

[C++] public: static _int64 ToInt64(unsigned char value);

[VB] Public Shared Function ToInt64(ByVal value As Byte) As Long

[JScript] public static function ToInt64(value: Byte): long;

Description

Converts the value of the specified 8-bit unsigned integer to the equivalent 64-bit signed integer.

Return Value: The 64-bit signed integer equivalent to the value of value. An 8-bit unsigned integer.

ToInt64

[C#] public static long ToInt64(char value);

[C++] public: static _int64 ToInt64(_wchar_t value);

[VB] Public Shared Function ToInt64(ByVal value As Char) As Long

[JScript] public static function ToInt64(value: Char): long;

Description

Converts the value of the specified Unicode character to the equivalent 64-bit signed integer.

Return Value: The 64-bit signed integer equivalent to value. A Unicode character.

ToInt64

[C#] public static long ToInt64(DateTime value);

[C++] public: static _int64 ToInt64(DateTime value);

[VB] Public Shared Function ToInt64(ByVal value As DateTime) As Long

[JScript] public static function ToInt64(value: DateTime): long;

Description

Calling this method always throws System.InvalidCastException.

This method is reserved for future use. A System. DateTime.

ToInt64

[C#] public static long ToInt64(decimal value);

[C++] public: static _int64 ToInt64(Decimal value);

[VB] Public Shared Function ToInt64(ByVal value As Decimal) As Long

[JScript] public static function ToInt64(value: Decimal): long;

Description

Converts the value of the specified Decimal number to an equivalent 64-bit signed integer.

Return Value: value rounded to the nearest 64-bit signed integer. If value is halfway between two whole numbers, the even number is returned; that is, 4.5 is converted to 4, and 5.5 is converted to 6. A System.Decimal number.

ToInt64

[C#] public static long ToInt64(double value);

[C++] public: static _int64 ToInt64(double value);

[VB] Public Shared Function ToInt64(ByVal value As Double) As Long

[JScript] public static function ToInt64(value: double): long;

Description

Converts the value of the specified double-precision floating point number to an equivalent 64-bit signed integer.

Return Value: value rounded to the nearest 64-bit signed integer. If value is halfway between two whole numbers, the even number is returned; that is, 4.5 is converted to 4, and 5.5 is converted to 6. A double-precision floating point number.

ToInt64

[C#] public static long ToInt64(short value);

[C++] public: static _int64 ToInt64(short value);

[VB] Public Shared Function ToInt64(ByVal value As Short) As Long

[JScript] public static function ToInt64(value: Int16): long;

Description

Converts the value of the specified 16-bit signed integer to an equivalent 64-bit signed integer.

Return Value: A 64-bit signed integer equivalent to the value of value. A 16-bit signed integer.

ToInt64

[C#] public static long ToInt64(int value);

[C++] public: static _int64 ToInt64(int value);

[VB] Public Shared Function ToInt64(ByVal value As Integer) As Long

[JScript] public static function ToInt64(value: int): long;

Description

Converts the value of the specified 32-bit signed integer to an equivalent 64-bit signed integer.

Return Value: The 64-bit signed integer equivalent to the value of value. A 32-signed integer.

ToInt64

[C#] public static long ToInt64(long value);

[C++] public: static _int64 ToInt64(_int64 value);

[VB] Public Shared Function ToInt64(ByVal value As Long) As Long

[JScript] public static function ToInt64(value: long): long;

Description

Returns the specified 64-bit signed integer; no actual conversion is performed.

Return Value: value is returned unchanged. A 64-bit signed integer.

ToInt64

[C#] public static long ToInt64(object value);

[C++] public: static _int64 ToInt64(Object* value);

[VB] Public Shared Function ToInt64(ByVal value As Object) As Long

[JScript] public static function ToInt64(value: Object): long;

Converts a specified value to a 64-bit signed integer.

Description

Converts the value of the specified Object to a 64-bit signed integer.

Return Value: A 64-bit signed integer equivalent to the value of value, or zero if value is null.

The return value is the result of invoking the IConvertible. ToInt64 method of the underlying type of value. An System. Object that implements the System.IConvertible interface or null.

ToInt64

[C#] public static long ToInt64(sbyte value);

[C++] public: static _int64 ToInt64(char value);

[VB] Public Shared Function ToInt64(ByVal value As SByte) As Long

[JScript] public static function ToInt64(value: SByte): long;

Description

Converts the value of the specified 8-bit signed integer to the equivalent 64-bit signed integer.

Return Value: The 8-bit signed integer equivalent to the value of value. An 8-bit signed integer.

ToInt64

[C#] public static long ToInt64(float value);

[C++] public: static _int64 ToInt64(float value); I[VB] Public Shared Function ToInt64(ByVal value As Single) As Long

[JScript] public static function ToInt64(value: float): long;

Description

Converts the value of the specified single-precision floating point number to an equivalent 64-bit signed integer.

Return Value: value rounded to the nearest 64-bit signed integer. If value is halfway between two whole numbers, the even number is returned; that is, 4.5 is converted to 4, and 5.5 is converted to 6. A single-precision floating point number.

ToInt64

[C#] public static long ToInt64(string value);

[C++] public: static _int64 ToInt64(String* value);

[VB] Public Shared Function ToInt64(ByVal value As String) As Long

[JScript] public static function ToInt64(value: String): long;

Description

Converts the specified String representation of a number to an equivalent 64-bit signed integer.

Return Value: A 64-bit signed integer equivalent to the value of value.

The return value is the result of invoking the System.Int64.Parse(System.String) method on value. A System.String containing a number to convert.

ToInt64

[C#] public static long ToInt64(ushort value);

[C++] public: static _int64 ToInt64(unsigned short value);

[VB] Public Shared Function ToInt64(ByVal value As UInt16) As Long

[JScript] public static function ToInt64(value: UInt16): long;

Description

Converts the value of the specified 16-bit unsigned integer to the equivalent 64-bit signed integer.

Return Value: The 64-bit signed integer equivalent to the value of value. A 16-bit unsigned integer.

ToInt64

[C#] public static long ToInt64(uint value);

[C++] public: static _int64 ToInt64(unsigned int value);

[VB] Public Shared Function ToInt64(ByVal value As UInt32) As Long

[JScript] public static function ToInt64(value: UInt32): long;

Description

Converts the value of the specified 32-bit unsigned integer to an equivalent 64-bit signed integer.

Return Value: A 64-bit signed integer equivalent to the value of value. A 32-bit unsigned integer.

ToInt64

[C#] public static long ToInt64(ulong value);

[C++] public: static _int64 ToInt64(unsigned _int64 value);

[VB] Public Shared Function ToInt64(ByVal value As UInt64) As Long

[JScript] public static function ToInt64(value: UInt64): long;

Description

Converts the value of the specified 64-bit unsigned integer to an equivalent 64-bit signed integer.

Return Value: A 64-bit signed integer equivalent to the value of value. A 64-bit unsigned integer.

ToInt64

[C#] public static long ToInt64(object value, IFormatProvider provider);

[C++] public: static _int64 ToInt64(Object* value, IFormatProvider* provider);

[VB] Public Shared Function ToInt64(ByVal value As Object, ByVal provider As IFormatProvider) As Long

[JScript] public static function ToInt64(value: Object, provider: IFormatProvider): long;

Description

Converts the value of the specified Object to a 64-bit signed integer using the specified culture-specific formatting information.

Return Value: A 64-bit signed integer equivalent to the value of value, or zero if value is null.

The return value is the result of invoking the IConvertible.ToInt64 method of the underlying type of value. An System.Object that implements the System.IConvertible interface. An System.IFormatProvider interface implementation that supplies culture-specific formatting information.

ToInt64

[C#] public static long ToInt64(string value, IFormatProvider provider);

[C++] public: static _int64 ToInt64(String* value, IFormatProvider* provider);

[VB] Public Shared Function ToInt64(ByVal value As String, ByVal provider As IFormatProvider) As Long

[JScript] public static function ToInt64(value: String, provider: IFormatProvider): long;

Description

Converts the specified String representation of a number to an equivalent 64-bit signed integer using the specified culture-specific formatting information.

Return Value: A 64-bit signed integer equivalent to the value of value.

The return value is the result of invoking the System.Int64.Parse(System.String) method on value. A System.String containing a number to convert. An System.IFormatProvider interface implementation that supplies culture-specific formatting information.

ToInt64

[C#] public static long ToInt64(string value, int fromBase);

[C++] public: static _int64 ToInt64(String* value, int fromBase);

[VB] Public Shared Function ToInt64(ByVal value As String, ByVal fromBase As Integer) As Long

[JScript] public static function ToInt64(value: String, fromBase: int): long;

Description

Converts the String representation of a number in a specified base to an equivalent 64-bit signed integer.

Return Value: A 64-bit signed integer equivalent to the number in value. A System.String containing a number. The base of the number in value, which must be 2, 8, 10, or 16.

ToSByte

[C#] public static sbyte ToSByte(bool value);

[C++] public: static char ToSByte(bool value);

[VB] Public Shared Function ToSByte(ByVal value As Boolean) As SByte

[JScript] public static function ToSByte(value: Boolean): SByte;

Description

Converts the value of the specified Boolean value to the equivalent 8-bit signed integer.

Return Value: The number 1 if value is true; otherwise, 0. A Boolean value.

ToSByte

[C#] public static sbyte ToSByte(byte value);

[C++] public: static char ToSByte(unsigned char value);

[VB] Public Shared Function ToSByte(ByVal value As Byte) As SByte

[JScript] public static function ToSByte(value: Byte): SByte;

Description

Converts the value of the specified 8-bit unsigned integer to the equivalent 8-bit signed integer.

Return Value: The 8-bit signed integer equivalent to the value of value. An 8-bit unsigned integer.

ToSByte

[C#] public static sbyte ToSByte(char value);

[C++] public: static char ToSByte(_wchar_t value);

[VB] Public Shared Function ToSByte(ByVal value As Char) As SByte

[JScript] public static function ToSByte(value: Char): SByte;

Description

Converts the value of the specified Unicode character to the equivalent 8-bit signed integer.

Return Value: The 8-bit signed integer equivalent to value. A Unicode character.

ToSByte

[C#] public static sbyte ToSByte(DateTime value);

[C++] public: static char ToSByte(DateTime value);

[VB] Public Shared Function ToSByte(ByVal value As DateTime) As SByte

[JScript] public static function ToSByte(value: DateTime): SByte;

Description

Calling this method always throws System.InvalidCastException.

This method is reserved for future use. A System.DateTime.

ToSByte

[C#] public static sbyte ToSByte(decimal value);

[C++] public: static char ToSByte(Decimal value);

[VB] Public Shared Function ToSByte(ByVal value As Decimal) As SByte

[JScript] public static function ToSByte(value: Decimal): SByte;

Description

Converts the value of the specified Decimal number to an equivalent 8-bit signed integer.

Return Value: value rounded to the nearest 8-bit signed integer. If value is halfway between two whole numbers, the even number is returned; that is, 4.5 is converted to 4, and 5.5 is converted to 6. A System.Decimal number.

ToSByte

[C#] public static sbyte ToSByte(double value);

[C++] public: static char ToSByte(double value);

[VB] Public Shared Function ToSByte(ByVal value As Double) As SByte

[JScript] public static function ToSByte(value: double): SByte;

Description

Converts the value of the specified double-precision floating point number to an equivalent 8-bit signed integer.

Return Value: value rounded to the nearest 8-bit signed integer. If value is halfway between two whole numbers, the even number is returned; that is, 4.5 is converted to 4, and 5.5 is converted to 6. A double-precision floating point number.

ToSByte

[C#] public static sbyte ToSByte(short value);

[C++] public: static char ToSByte(short value);

[VB] Public Shared Function ToSByte(ByVal value As Short) As SByte

[JScript] public static function ToSByte(value: Int16): SByte;

Description

Converts the value of the specified 16-bit signed integer to the equivalent 8-bit signed integer.

Return Value: The 8-bit signed integer equivalent to the value of value. A 16-bit signed integer.

ToSByte

[C#] public static sbyte ToSByte(int value);

[C++] public: static char ToSByte(int value);

[VB] Public Shared Function ToSByte(ByVal value As Integer) As SByte

[JScript] public static function ToSByte(value: int): SByte;

Description

Converts the value of the specified 32-bit signed integer to an equivalent 8-bit signed integer.

Return Value: An 8-bit signed integer equivalent to the value of value.

Description

Converts the value of the specified 32-bit signed integer to an equivalent 8-bit signed integer.

Return Value: The 8-bit signed integer equivalent of value. A 32-signed integer.

ToSByte

[C#] public static sbyte ToSByte(long value);

[C++] public: static char ToSByte(_int64 value);

[VB] Public Shared Function ToSByte(ByVal value As Long) As SByte

[JScript] public static function ToSByte(value: long): SByte;

Description

Converts the value of the specified 64-bit signed integer to an equivalent 8-bit signed integer.

Return Value: An 8-bit signed integer equivalent to the value of value. A 64-bit signed integer.

ToSByte

[C#] public static sbyte ToSByte(object value);

[C++] public: static char ToSByte(Object* value);

[VB] Public Shared Function ToSByte(ByVal value As Object) As SByte

[JScript] public static function ToSByte(value: Object): SByte; Converts a specified value to an 8-bit signed integer.

Description

Converts the value of the specified Object to an 8-bit signed integer.

Return Value: An 8-bit signed integer equivalent to the value of value, or zero if value is null.

The return value is the result of invoking the IConvertible.ToSByte method of the underlying type of value. An System.Object that implements the System.IConvertible interface or null.

ToSByte

[C#] public static sbyte ToSByte(sbyte value);

[C++] public: static char ToSByte(char value);

[VB] Public Shared Function ToSByte(ByVal value As SByte) As SByte

[JScript] public static function ToSByte(value: SByte): SByte;

Description

Returns the specified 8-bit signed integer; no actual conversion is performed.

Return Value: value is returned unchanged. An 8-bit signed integer.

ToSByte

[C#] public static sbyte ToSByte(float value);

[C++] public: static char ToSByte(float value);

[VB] Public Shared Function ToSByte(ByVal value As Single) As SByte

[JScript] public static function ToSByte(value: float): SByte;

Description

Converts the value of the specified single-precision floating point number to an equivalent 8-bit signed integer.

Return Value: value rounded to the nearest 8-bit signed integer. If value is halfway between two whole numbers, the even number is returned; that is, 4.5 is converted to 4, and 5.5 is converted to 6. A single-precision floating point number.

ToSByte

[C#] public static sbyte ToSByte(string value);

[C++] public: static char ToSByte(String* value);

[VB] Public Shared Function ToSByte(ByVal value As String) As SByte

[JScript] public static function ToSByte(value: String): SByte;

Description

Converts the specified String representation of a number to an equivalent 8-bit signed integer.

Return Value: An 8-bit signed integer equivalent to the value of value. A System.String containing a number to convert.

ToSByte

[C#] public static sbyte ToSByte(ushort value);

[C++] public: static char ToSByte(unsigned short value);

[VB] Public Shared Function ToSByte(ByVal value As UInt16) As SByte

[JScript] public static function ToSByte(value: UInt16): SByte;

Description

Converts the value of the specified 16-bit unsigned integer to the equivalent 8-bit signed integer.

Return Value: The 8-bit signed integer equivalent to the value of value. A 16-bit unsigned integer.

ToSByte

[C#] public static sbyte ToSByte(uint value);

[C++] public: static char ToSByte(unsigned int value);

[VB] Public Shared Function ToSByte(ByVal value As UInt32) As SByte

[JScript] public static function ToSByte(value: UInt32): SByte;

Description

Converts the value of the specified 32-bit unsigned integer to an equivalent 8-bit signed integer.

Return Value: An 8-bit signed integer equivalent to the value of value. A 32-bit unsigned integer.

ToSByte

[C#] public static sbyte ToSByte(ulong value);

[C++] public: static char ToSByte(unsigned _int64 value);

[VB] Public Shared Function ToSByte(ByVal value As UInt64) As SByte

[JScript] public static function ToSByte(value: UInt64): SByte;

Description

Converts the value of the specified 64-bit unsigned integer to an equivalent 8-bit signed integer.

Return Value: An 8-bit signed integer equivalent to the value of value. A 64-bit unsigned integer.

ToSByte

[C#] public static sbyte ToSByte(object value, IFormatProvider provider);

[C++] public: static char ToSByte(Object* value, IFormatProvider* provider);

[VB] Public Shared Function ToSByte(ByVal value As Object, ByVal provider As IFormatProvider) As SByte

[JScript] public static function ToSByte(value: Object, provider: IFormatProvider): SByte;

Description

Converts the value of the specified Object to an 8-bit signed integer using the specified culture-specific formatting information.

Return Value: An 8-bit signed integer equivalent to the value of value, or zero if value is null.

provider enables the user to specify culture-specific conversion information about the contents of value. For example, if value is a String that represents a number, provider could supply culture-specific information about the notation used to represent that number. An System.Object that implements the System.IConvertible interface. An System.IFormatProvider interface implementation that supplies culture-specific formatting information.

ToSByte

[C#] public static sbyte ToSByte(string value, IFormatProvider provider);

[C++] public: static char ToSByte(String* value, IFormatProvider* provider);

[VB] Public Shared Function ToSByte(ByVal value As String, ByVal provider As IFormatProvider) As SByte

[JScript] public static function ToSByte(value: String, provider: IFormatProvider): SByte;

Description

Converts the specified String representation of a number to an equivalent 8-bit signed integer using specified culture-specific formatting information.

Return Value: An 8-bit signed integer equivalent to the value of value.

provider is an IFormatProvider instance that obtains a System.Globalization.NumberFormatInfo object. The NumberFormatInfo object provides culture-specific information about the format of value. If provider is null, the NumberFormatInfo for the current culture is used. A System.String containing a number to convert. An System.IFormatProvider interface implementation that supplies culture-specific formatting information.

ToSByte

[C#] public static sbyte ToSByte(string value, int fromBase);

[C++] public: static char ToSByte(String* value, int fromBase);

[VB] Public Shared Function ToSByte(ByVal value As String, ByVal fromBase As Integer) As SByte

[JScript] public static function ToSByte(value: String, fromBase: int): SByte;

Description

Converts the String representation of a number in a specified base to an equivalent 8-bit signed integer.

Return Value: An 8-bit signed integer equivalent to the number in value. A System.String containing a number. The base of the number in value, which must be 2, 8, 10, or 16.

ToSingle

[C#] public static float ToSingle(bool value);

[C++] public: static float ToSingle(bool value);

[VB] Public Shared Function ToSingle(ByVal value As Boolean) As Single

[JScript] public static function ToSingle(value: Boolean): float;

Description

Converts the value of the specified Boolean value to the equivalent single-precision floating point number.

Return Value: The number 1 if value is true; otherwise, 0. A Boolean value.

ToSingle

[C#] public static float ToSingle(byte value);

[C++] public: static float ToSingle(unsigned char value);

[VB] Public Shared Function ToSingle(ByVal value As Byte) As Single

[JScript] public static function ToSingle(value: Byte): float;

Description

Converts the value of the specified 8-bit unsigned integer to the equivalent single-precision floating point number.

Return Value: The single-precision floating point number equivalent to the value of value. An 8-bit unsigned integer.

ToSingle

[C#] public static float ToSingle(char value);

[C++] public: static float ToSingle(_wchar_t value);

[VB] Public Shared Function ToSingle(ByVal value As Char) As Single

[JScript] public static function ToSingle(value: Char): float;

Description

Calling this method always throws System.InvalidCastException.

This method is reserved for future use. A Unicode character.

ToSingle

[C#] public static float ToSingle(DateTime value);

[C++] public: static float ToSingle(DateTime value);

[VB] Public Shared Function ToSingle(ByVal value As DateTime) As Single

[JScript] public static function ToSingle(value: DateTime): float;

Description

Calling this method always throws System.InvalidCastException.

This method is reserved for future use. A System. DateTime.

ToSingle

[C#] public static float ToSingle(decimal value);

[C++] public: static float ToSingle(Decimal value);

[VB] Public Shared Function ToSingle(ByVal value As Decimal) As Single

[JScript] public static function ToSingle(value: Decimal): float;

Description

Converts the value of the specified Decimal number to an equivalent single-precision floating point number.

Return Value: A single-precision floating point number equivalent to the value of value. A System.Decimal number.

ToSingle

[C#] public static float ToSingle(double value);

[C++] public: static float ToSingle(double value);

[VB] Public Shared Function ToSingle(ByVal value As Double) As Single

[JScript] public static function ToSingle(value: double): float;

Description

Converts the value of the specified double-precision floating point number to an equivalent single-precision floating point number.

Return Value: A single-precision floating point number equivalent to the value of value. A double-precision floating point number.

ToSingle

[C#] public static float ToSingle(short value);

[C++] public: static float ToSingle(short value);

[VB] Public Shared Function ToSingle(ByVal value As Short) As Single

[JScript] public static function ToSingle(value: Int16): float;

Description

Converts the value of the specified 16-bit signed integer to an equivalent single-precision floating point number.

Return Value: A single-precision floating point number equivalent to the value of value. A 16-bit signed integer.

ToSingle

[C#] public static float ToSingle(int value);

[C++] public: static float ToSingle(int value);

[VB] Public Shared Function ToSingle(ByVal value As Integer) As Single

[JScript] public static function ToSingle(value: int): float;

Description

Converts the value of the specified 32-bit signed integer to an equivalent single-precision floating point number.

Return Value: A single-precision floating point number equivalent to the value of value. A 32-bit signed integer.

ToSingle

[C#] public static float ToSingle(long value);

[C++] public: static float ToSingle(_int64 value);

[VB] Public Shared Function ToSingle(ByVal value As Long) As Single

[JScript] public static function ToSingle(value: long): float;

Description

Converts the value of the specified 64-bit signed integer to an equivalent single-precision floating point number.

Return Value: A single-precision floating point number equivalent to the value of value. A 64-bit signed integer.

ToSingle

[C#] public static float ToSingle(object value);

[C++] public: static float ToSingle(Object* value);

[VB] Public Shared Function ToSingle(ByVal value As Object) As Single

[JScript] public static function ToSingle(value: Object): float;

Converts a specified value to a single-precision floating point number.

Description

Converts the value of the specified Object to a single-precision floating point number.

Return Value: A single-precision floating point number equivalent to the value of value, or zero if value is null.

The return value is the result of invoking the IConvertible. ToSingle method of the underlying type of value. An System. Object that implements the System.IConvertible interface or null.

ToSingle

[C#] public static float ToSingle(sbyte value);

[C++] public: static float ToSingle(char value);

[VB] Public Shared Function ToSingle(ByVal value As SByte) As Single

[JScript] public static function ToSingle(value: SByte): float;

Description

Converts the value of the specified 8-bit signed integer to the equivalent single-precision floating point number.

Return Value: The 8-bit signed integer equivalent to the value of value. An 8-bit signed integer.

ToSingle

[C#] public static float ToSingle(float value);

[C++] public: static float ToSingle(float value);

[VB] Public Shared Function ToSingle(ByVal value As Single) As Single

[JScript] public static function ToSingle(value: float): float;

Description

Returns the specified single-precision floating point number; no actual conversion is performed.

Return Value: value is returned unchanged. A single-precision floating point number.

ToSingle

[C#] public static float ToSingle(string value);

[C++] public: static float ToSingle(String* value);

[VB] Public Shared Function ToSingle(ByVal value As String) As Single

[JScript] public static function ToSingle(value: String): float;

Description

Converts the specified String representation of a number to an equivalent single-precision floating point number.

Return Value: A single-precision floating point number equivalent to the value of value.

The return value is the result of invoking the System.Single.Parse(System.String) method on value. A System.String containing a number to convert.

ToSingle

[C#] public static float ToSingle(ushort value);

[C++] public: static float ToSingle(unsigned short value);

[VB] Public Shared Function ToSingle(ByVal value As UInt16) As Single

[JScript] public static function ToSingle(value: UInt16): float;

Description

Converts the value of the specified 16-bit unsigned integer to the equivalent single-precision floating point number.

Return Value: The single-precision floating point number equivalent to the value of value. A 16-bit unsigned integer.

ToSingle

[C#] public static float ToSingle(uint value);

[C++] public: static float ToSingle(unsigned int value);

[VB] Public Shared Function ToSingle(ByVal value As UInt32) As Single

[JScript] public static function ToSingle(value: UInt32): float;

Description

Converts the value of the specified 32-bit unsigned integer to an equivalent single-precision floating point number.

Return Value: A single-precision floating point number equivalent to the value of value. A 32-bit unsigned integer.

ToSingle

[C#] public static float ToSingle(ulong value);

[C++] public: static float ToSingle(unsigned _int64 value);

[VB] Public Shared Function ToSingle(ByVal value As UInt64) As Single

[JScript] public static function ToSingle(value: UInt64): float;

Description

Converts the value of the specified 64-bit unsigned integer to an equivalent single-precision floating point number.

Return Value: A single-precision floating point number equivalent to the value of value. A 64-bit unsigned integer.

ToSingle

[C#] public static float ToSingle(object value, IFormatProvider provider);

[C++] public: static float ToSingle(Object* value, IFormatProvider* provider);

[VB] Public Shared Function ToSingle(ByVal value As Object, ByVal provider As IFormatProvider) As Single

[JScript] public static function ToSingle(value: Object, provider: IFormatProvider): float;

Description

Converts the value of the specified Object to an single-precision floating point number using the specified culture-specific formatting information.

Return Value: A single-precision floating point number equivalent to the value of value, or zero if value is null.

The return value is the result of invoking the IConvertible.ToSingle method of the underlying type of value. An System.Object that implements the System.IConvertible interface. An System.IFormatProvider interface implementation that supplies culture-specific formatting information.

ToSingle

[C#] public static float ToSingle(string value, IFormatProvider provider);

[C++] public: static float ToSingle(String* value, IFormatProvider* provider);

[VB] Public Shared Function ToSingle(ByVal value As String, ByVal provider As IFormatProvider) As Single

[JScript] public static function ToSingle(value: String, provider: IFormatProvider): float;

Description

Converts the specified String representation of a number to an equivalent single-precision floating point number using the specified culture-specific formatting information.

Return Value: A single-precision floating point number equivalent to the value of value.

The return value is the result of invoking the System.Single.Parse(System.String) method on value. A System.String containing a number to convert. An System.IFormatProvider interface implementation that supplies culture-specific formatting information.

ToString

[C#] public static string ToString(bool value);

[C++] public: static String* ToString(bool value);

[VB] Public Shared Function ToString(ByVal value As Boolean) As String

[JScript] public static function ToString(value: Boolean): String;

Description

Converts the value of the specified Boolean to its equivalent String representation.

Return Value: The System.String equivalent of the value of value.

This implementation is identical to System.Boolean.ToString. A Boolean value.

ToString

[C#] public static string ToString(byte value);

[C++] public: static String* ToString(unsigned char value);

[VB] Public Shared Function ToString(ByVal value As Byte) As String

[JScript] public static function ToString(value: Byte): String;

Description

Converts the value of the specified 8-bit unsigned integer to its equivalent String representation.

Return Value: The System.String equivalent of the value of value.

This implementation is identical to System.Byte.ToString. An 8-bit unsigned integer.

ToString

[C#] public static string ToString(char value);

[C++] public: static String* ToString(_wchar_t value);

[VB] Public Shared Function ToString(ByVal value As Char) As String

[JScript] public static function ToString(value: Char): String;

Description

Converts the value of the specified Unicode character to its equivalent String representation.

Return Value: The System.String equivalent of the value of value.

This implementation is identical to System.Char.ToString. A Unicode character.

ToString

[C#] public static string ToString(DateTime value);

[C++] public: static String* ToString(DateTime value);

[VB] Public Shared Function ToString(ByVal value As DateTime) As String

[JScript] public static function ToString(value: DateTime): String;

Description

Converts the value of the specified DateTime to its equivalent String representation.

Return Value: The System.String equivalent of the value of value.

This implementation is identical to System.DateTime.ToString. A DateTime.

ToString

[C#] public static string ToString(decimal value);

[C++] public: static String* ToString(Decimal value);

[VB] Public Shared Function ToString(ByVal value As Decimal) As String

[JScript] public static function ToString(value: Decimal): String;

Description

Converts the value of the specified Decimal number to its equivalent String representation.

Return Value: The System.String equivalent of the value of value.

This implementation is identical to System.Decimal.ToString. A Decimal number.

ToString

[C#] public static string ToString(double value);

[C++] public: static String* ToString(double value);

[VB] Public Shared Function ToString(ByVal value As Double) As String

[JScript] public static function ToString(value: double): String;

Description

Converts the value of the specified double-precision floating point number to its equivalent String representation.

Return Value: The System.String equivalent of the value of value.

This implementation is identical to System.Double.ToString. A double-precision floating point number.

ToString

[C#] public static string ToString(short value);

[C++] public: static String* ToString(short value);

[VB] Public Shared Function ToString(ByVal value As Short) As String

[JScript] public static function ToString(value: Int16): String;

Description

Converts the value of the specified 16-bit signed integer to its equivalent String representation.

Return Value: The System.String equivalent of the value of value.

This implementation is identical to System.Int16.ToString. A 16-bit signed integer.

ToString

[C#] public static string ToString(int value);

[C++] public: static String* ToString(int value);

[VB] Public Shared Function ToString(ByVal value As Integer) As String

[JScript] public static function ToString(value: int): String;

Description

Converts the value of the specified 32-bit signed integer to its equivalent String representation.

Return Value: The System.String equivalent of the value of value.

This implementation is identical to System.Int32.ToString. A 32-bit signed integer.

ToString

[C#] public static string ToString(long value);

[C++] public: static String* ToString(_int64 value);

[VB] Public Shared Function ToString(ByVal value As Long) As String

[JScript] public static function ToString(value: long): String;

Description

Converts the value of the specified 64-bit signed integer to its equivalent String representation.

Return Value: The System.String equivalent of the value of value.

This implementation is identical to System.Int64.ToString. A 64-bit signed integer.

ToString

[C#] public static string ToString(object value);

[C++] public: static String* ToString(Object* value);

[VB] Public Shared Function ToString(ByVal value As Object) As String

[JScript] public static function ToString(value: Object): String; Converts the specified value to its equivalent String representation.

Description

Converts the value of the specified Object to its String representation.

Return Value: The System.String representation of the value of value, or System.String.Empty if value is null.

The return value is the result of invoking the ToString method of the underlying type of value. An System.Object or null.

ToString

[C#] public static string ToString(sbyte value);

[C++] public: static String* ToString(char value);

[VB] Public Shared Function ToString(ByVal value As SByte) As String

[JScript] public static function ToString(value: SByte): String;

Description

Converts the value of the specified 8-bit signed integer to its equivalent String representation.

Return Value: The System.String equivalent of the value of value.

This implementation is identical to System.SByte.ToString. An 8-bit signed integer.

ToString

[C#] public static string ToString(float value);

[C++] public: static String* ToString(float value);

[VB] Public Shared Function ToString(ByVal value As Single) As String

[JScript] public static function ToString(value: float): String;

Description

Converts the value of the specified single-precision floating point number to its equivalent String representation.

Return Value: The System.String equivalent of the value of value.

This implementation is identical to System.Single.ToString. A single-precision floating point number.

ToString

[C#] public static string ToString(string value);

[C++] public: static String* ToString(String* value);

[VB] Public Shared Function ToString(ByVal value As String) As String

[JScript] public static function ToString(value: String): String;

Description

Returns the specified instance of System.String; no actual conversion is performed.

Return Value: value is returned unchanged. A System.String.

ToString

[C#] public static string ToString(ushort value);

[C++] public: static String* ToString(unsigned short value);

[VB] Public Shared Function ToString(ByVal value As UInt16) As String

[JScript] public static function ToString(value: UInt16): String;

Description

Converts the value of the specified 16-bit unsigned integer to its equivalent String representation.

Return Value: The System.String equivalent of the value of value.

This implementation is identical to System.UInt16.ToString. A 16-bit unsigned integer.

ToString

[C#] public static string ToString(uint value);

[C++] public: static String* ToString(unsigned int value);

[VB] Public Shared Function ToString(ByVal value As UInt32) As String

[JScript] public static function ToString(value: UInt32): String;

Description

Converts the value of the specified 32-bit unsigned integer to its equivalent String representation.

Return Value: The System.String equivalent of the value of value.

This implementation is identical to System.UInt32.ToString. A 32-bit unsigned integer.

ToString

[C#] public static string ToString(ulong value);

[C++] public: static String* ToString(unsigned _int64 value);

[VB] Public Shared Function ToString(ByVal value As UInt64) As String

[JScript] public static function ToString(value: UInt64): String;

Description

Converts the value of the specified 64-bit unsigned integer to its equivalent String representation.

Return Value: The System.String equivalent of the value of value.

This implementation is identical to System.UInt64.ToString. A 64-bit unsigned integer.

ToString

[C#] public static string ToString(bool value, IFormatProvider provider);

[C++] public: static String* ToString(bool value, IFormatProvider* provider);

[VB] Public Shared Function ToString(ByVal value As Boolean, ByVal provider As IFormatProvider) As String

[JScript] public static function ToString(value: Boolean, provider: IFormatProvider): String;

Description

Converts the value of the specified Boolean to its equivalent String representation.

Return Value: The System.String equivalent of the value of value.

This implementation is identical to System.Boolean.ToString. A Boolean value. (Reserved) An instance of an System.IFormatProvider interface implementation.

ToString

[C#] public static string ToString(byte value, IFormatProvider provider);

[C++] public: static String* ToString(unsigned char value, IFormatProvider* provider);

[VB] Public Shared Function ToString(ByVal value As Byte, ByVal provider As IFormatProvider) As String

[JScript] public static function ToString(value: Byte, provider: IFormatProvider): String;

Description

Converts the value of the specified 8-bit unsigned integer to its equivalent String representation.

Return Value: The System.String equivalent of the value of value.

This implementation is identical to System.Byte.ToString. An 8-bit unsigned integer. An System.IFormatProvider interface implementation that supplies culture-specific formatting information.

ToString

[C#] public static string ToString(byte value, int toBase);

[C++] public: static String* ToString(unsigned char value, int toBase);

[VB] Public Shared Function ToString(ByVal value As Byte, ByVal toBase As Integer) As String

[JScript] public static function ToString(value: Byte, toBase: int): String;

Description

Converts the value of an 8-bit unsigned integer to its equivalent String representation in a specified base.

Return Value: The String representation of value in base toBase. An 8-bit unsigned integer. The base of the return value, which must be 2, 8, 10, or 16.

ToString

[C#] public static string ToString(char value, IFormatProvider provider);

[C++] public: static String* ToString(_wchar_t value, IFormatProvider* provider);

[VB] Public Shared Function ToString(ByVal value As Char, ByVal provider As IFormatProvider) As String

[JScript] public static function ToString(value: Char, provider: IFormatProvider): String;

Description

Converts the value of the specified Unicode character to its equivalent String representation.

Return Value: The System.String equivalent of the value of value.

This implementation is identical to System.Char.ToString. A Unicode character. An System.IFormatProvider interface implementation that supplies culture-specific formatting information.

ToString

[C#] public static string ToString(DateTime value, IFormatProvider provider);

[C++] public: static String* ToString(DateTime value, IFormatProvider* provider);

[VB] Public Shared Function ToString(ByVal value As DateTime, ByVal provider As IFormatProvider) As String

[JScript] public static function ToString(value: DateTime, provider: IFormatProvider): String;

Description

Converts the value of the specified DateTime to its equivalent String representation.

Return Value: The System.String equivalent of the value of value.

This implementation is identical to System.DateTime.ToString. A DateTime. An System.IFormatProvider interface implementation that supplies culture-specific formatting information.

ToString

[C#] public static string ToString(decimal value, IFormatProvider provider);

[C++] public: static String* ToString(Decimal value, IFormatProvider* provider);

[VB] Public Shared Function ToString(ByVal value As Decimal, ByVal provider As IFormatProvider) As String

[JScript] public static function ToString(value: Decimal, provider: IFormatProvider): String;

Description

Converts the value of the specified Decimal number to its equivalent String representation.

Return Value: The System.String equivalent of the value of value.

This implementation is identical to System.Decimal.ToString. A Decimal number. An System.IFormatProvider interface implementation that supplies culture-specific formatting information.

ToString

[C#] public static string ToString(double value, IFormatProvider provider);

[C++] public: static String* ToString(double value, IFormatProvider* provider);

[VB] Public Shared Function ToString(ByVal value As Double, ByVal provider As IFormatProvider) As String

[JScript] public static function ToString(value: double, provider: IFormatProvider): String;

Description

Converts the value of the specified double-precision floating point number to its equivalent String representation.

Return Value: The System.String equivalent of the value of value.

This implementation is identical to System.Double.ToString. A double-precision floating point number. An System.IFormatProvider interface implementation that supplies culture-specific formatting information.

ToString

[C#] public static string ToString(short value, IFormatProvider provider);

[C++] public: static String* ToString(short value, IFormatProvider* provider);

[VB] Public Shared Function ToString(ByVal value As Short, ByVal provider As IFormatProvider) As String

[JScript] public static function ToString(value: Int16, provider: IFormatProvider): String;

Description

Converts the value of the specified 16-bit signed integer to its equivalent String representation.

Return Value: The System.String equivalent of the value of value.

This implementation is identical to System.Int16.ToString. A 16-bit signed integer. An System.IFormatProvider interface implementation that supplies culture-specific formatting information.

ToString

[C#] public static string ToString(short value, int toBase);

[C++] public: static String* ToString(short value, int toBase);

[VB] Public Shared Function ToString(ByVal value As Short, ByVal toBase As Integer) As String

[JScript] public static function ToString(value: Int16, toBase: int): String;

Description

Converts the value of a 16-bit signed integer to its equivalent String representation in a specified base.

Return Value: The String representation of value in base toBase. A 16-bit signed integer. The base of the return value, which must be 2, 8, 10, or 16.

ToString

[C#] public static string ToString(int value, IFormatProvider provider);

[C++] public: static String* ToString(int value, IFormatProvider* provider);

[VB] Public Shared Function ToString(ByVal value As Integer, ByVal provider As IFormatProvider) As String

[JScript] public static function ToString(value: int, provider: IFormatProvider): String;

Description

Converts the value of the specified 32-bit signed integer to its equivalent String representation.

Return Value: The System.String equivalent of the value of value.

This implementation is identical to System.Int32.ToString. A 32-bit signed integer. An System.IFormatProvider interface implementation that supplies culture-specific formatting information.

ToString

[C#] public static string ToString(int value, int toBase);

[C++] public: static String* ToString(int value, int toBase);

[VB] Public Shared Function ToString(ByVal value As Integer, ByVal toBase As Integer) As String

[JScript] public static function ToString(value: int, toBase: int): String;

Description

Converts the value of a 32-bit signed integer to its equivalent String representation in a specified base.

Return Value: The String representation of value in base toBase. A 32-bit signed integer. The base of the return value, which must be 2, 8, 10, or 16.

ToString

[C#] public static string ToString(long value, IFormatProvider provider);

[C++] public: static String* ToString(_int64 value, IFormatProvider* provider);

[VB] Public Shared Function ToString(ByVal value As Long, ByVal provider As IFormatProvider) As String

[JScript] public static function ToString(value: long, provider: IFormatProvider): String;

Description

Converts the value of the specified 64-bit signed integer to its equivalent String representation.

Return Value: The System.String equivalent of the value of value.

This implementation is identical to System.Int64.ToString. A 64-bit signed integer. An System.IFormatProvider interface implementation that supplies culture-specific formatting information.

ToString

[C#] public static string ToString(long value, int toBase);

[C++] public: static String* ToString(_int64 value, int toBase);

[VB] Public Shared Function ToString(ByVal value As Long, ByVal toBase As Integer) As String

[JScript] public static function ToString(value: long, toBase: int): String;

Description

Converts the value of a 64-bit signed integer to its equivalent String representation in a specified base.

Return Value: The String representation of value in base toBase. A 64-bit signed integer. The base of the return value, which must be 2, 8, 10, or 16.

ToString

[C#] public static string ToString(object value, IFormatProvider provider);

[C++] public: static String* ToString(Object* value, IFormatProvider* provider);

[VB] Public Shared Function ToString(ByVal value As Object, ByVal provider As IFormatProvider) As String

[JScript] public static function ToString(value: Object, provider: IFormatProvider): String;

Description

Converts the value of the specified Object to its equivalent String representation using the specified culture-specific formatting information.

Return Value: The System.String representation of the value of value, or System.String.Empty if value is null.

provider enables the user to specify culture-specific conversion information about the contents of value. For example, if value is a String that represents a number, provider could supply culture-specific information about the notation used to represent that number. An System.Object or null. An System.IFormatProvider interface implementation that supplies culture-specific formatting information.

ToString

[C#] public static string ToString(sbyte value, IFormatProvider provider);

[C++] public: static String* ToString(char value, IFormatProvider* provider);

[VB] Public Shared Function ToString(ByVal value As SByte, ByVal provider As IFormatProvider) As String

[JScript] public static function ToString(value: SByte, provider: IFormatProvider): String;

Description

Converts the value of the specified 8-bit signed integer to its equivalent String representation.

Return Value: The System.String equivalent of the value of value.

This implementation is identical to System.SByte.ToString. An 8-bit signed integer. An System.IFormatProvider interface implementation that supplies culture-specific formatting information.

ToString

[C#] public static string ToString(float value, IFormatProvider provider);

[C++] public: static String* ToString(float value, IFormatProvider* provider);

[VB] Public Shared Function ToString(ByVal value As Single, ByVal provider As IFormatProvider) As String

[JScript] public static function ToString(value: float, provider: IFormatProvider): String;

Description

Converts the value of the specified single-precision floating point number to its equivalent String representation.

Return Value: The System.String equivalent of the value of value.

This implementation is identical to System.Single.ToString. A single-precision floating point number. An System.IFormatProvider interface implementation that supplies culture-specific formatting information.

ToString

[C#] public static string ToString(string value, IFormatProvider provider);

[C++] public: static String* ToString(String* value, IFormatProvider* provider);

[VB] Public Shared Function ToString(ByVal value As String, ByVal provider As IFormatProvider) As String

[JScript] public static function ToString(value: String, provider: IFormatProvider): String;

Description

Returns the specified instance of System.String; no actual conversion is performed.

Return Value: value is returned unchanged.

This method ignores the provider parameter. A System. String. An System.IFormatProvider interface implementation that supplies culture-specific formatting information.

ToString

[C#] public static string ToString(ushort value, IFormatProvider provider);

[C++] public: static String* ToString(unsigned short value, IFormatProvider* provider);

[VB] Public Shared Function ToString(ByVal value As UInt16, ByVal provider As IFormatProvider) As String

[JScript] public static function ToString(value: UInt16, provider: IFormatProvider): String;

Description

Converts the value of the specified 16-bit unsigned integer to its equivalent String representation.

Return Value: The System.String equivalent of the value of value.

This implementation is identical to System.UInt16.ToString. A 16-bit unsigned integer. An System.IFormatProvider interface implementation that supplies culture-specific formatting information.

ToString

[C#] public static string ToString(uint value, IFormatProvider provider);

[C++] public: static String* ToString(unsigned int value, IFormatProvider* provider);

[VB] Public Shared Function ToString(ByVal value As UInt32, ByVal provider As IFormatProvider) As String

[JScript] public static function ToString(value: UInt32, provider: IFormatProvider): String;

Description

Converts the value of the specified 32-bit unsigned integer to its equivalent String representation.

Return Value: The System.String equivalent of the value of value.

This implementation is identical to System.UInt32.ToString. A 32-bit unsigned integer. An System.IFormatProvider interface implementation that supplies culture-specific formatting information.

ToString

[C#] public static string ToString(ulong value, IFormatProvider provider);

[C++] public: static String* ToString(unsigned _int64 value, IFormatProvider* provider);

[VB] Public Shared Function ToString(ByVal value As UInt64, ByVal provider As IFormatProvider) As String

[JScript] public static function ToString(value: UInt64, provider: IFormatProvider): String;

Description

Converts the value of the specified 64-bit unsigned integer to its equivalent String representation.

Return Value: The System.String equivalent of the value of value.

This implementation is identical to System.UInt64.ToString. A 64-bit unsigned integer. An System.IFormatProvider interface implementation that supplies culture-specific formatting information.

ToUInt16

[C#] public static ushort ToUInt16(bool value);

[C++] public: static unsigned short ToUInt16(bool value);

[VB] Public Shared Function ToUInt16(ByVal value As Boolean) As UInt16

[JScript] public static function ToUInt16(value: Boolean): UInt16;

Description

Converts the value of the specified Boolean value to the equivalent 16-bit unsigned integer.

Return Value: The number 1 if value is true; otherwise, 0. A Boolean value.

ToUInt16

[C#] public static ushort ToUInt16(byte value);

[C++] public: static unsigned short ToUInt16(unsigned char value);

[VB] Public Shared Function ToUInt16(ByVal value As Byte) As UInt16

[JScript] public static function ToUInt16(value: Byte): UInt16;

Description

Converts the value of the specified 8-bit unsigned integer to the equivalent 16-bit unsigned integer.

Return Value: The 16-bit unsigned integer equivalent to the value of value. An 8-bit unsigned integer.

ToUInt16

[C#] public static ushort ToUInt16(char value);

[C++] public: static unsigned short ToUInt16(_wchar_t value);

[VB] Public Shared Function ToUInt16(ByVal value As Char) As UInt16

[JScript] public static function ToUInt16(value: Char): UInt16;

Description

Converts the value of the specified Unicode character to the equivalent 16-bit unsigned integer.

Return Value: The 16-bit unsigned integer equivalent to value. A Unicode character.

ToUInt16

[C#] public static ushort ToUInt16(DateTime value);

[C++] public: static unsigned short ToUInt16(DateTime value);

[VB] Public Shared Function ToUInt16(ByVal value As DateTime) As UInt16

[JScript] public static function ToUInt16(value: DateTime): UInt16;

Description

Calling this method always throws System.InvalidCastException.

This method is reserved for future use. A System.DateTime.

ToUInt16

[C#] public static ushort ToUInt16(decimal value);

[C++] public: static unsigned short ToUInt16(Decimal value);

[VB] Public Shared Function ToUInt16(ByVal value As Decimal) As UInt16

[JScript] public static function ToUInt16(value: Decimal): UInt16;

Description

Converts the value of the specified Decimal number to an equivalent 16-bit unsigned integer.

Return Value: value rounded to the nearest 16-bit unsigned integer. If value is halfway between two whole numbers, the even number is returned; that is, 4.5 is converted to 4, and 5.5 is converted to 6. A System.Decimal number.

ToUInt16

[C#] public static ushort ToUInt16(double value);

[C++] public: static unsigned short ToUInt16(double value);

[VB] Public Shared Function ToUInt16(ByVal value As Double) As UInt16

[JScript] public static function ToUInt16(value: double): UInt16;

Description

Converts the value of the specified double-precision floating point number to an equivalent 16-bit unsigned integer.

Return Value: value rounded to the nearest 16-bit unsigned integer. If value is halfway between two whole numbers, the even number is returned; that is, 4.5 is converted to 4, and 5.5 is converted to 6. A double-precision floating point number.

ToUInt16

[C#] public static ushort ToUInt16(short value);

[C++] public: static unsigned short ToUInt16(short value);

[VB] Public Shared Function ToUInt16(ByVal value As Short) As UInt16

[JScript] public static function ToUInt16(value: Int16): UInt16;

Description

Converts the value of the specified 16-bit signed integer to the equivalent 16-bit unsigned integer.

Return Value: The 16-bit unsigned integer equivalent to the value of value. A 16-bit signed integer.

ToUInt16

[C#] public static ushort ToUInt16(int value);

[C++] public: static unsigned short ToUInt16(int value);

[VB] Public Shared Function ToUInt16(ByVal value As Integer) As UInt16

[JScript] public static function ToUInt16(value: int): UInt16;

Description

Converts the value of the specified 32-bit signed integer to an equivalent 16-bit unsigned integer.

Return Value: The 16-bit unsigned integer equivalent of value. A 32-bit signed integer.

ToUInt16

[C#] public static ushort ToUInt16(long value);

[C++] public: static unsigned short ToUInt16(_int64 value);

[VB] Public Shared Function ToUInt16(ByVal value As Long) As UInt16

[JScript] public static function ToUInt16(value: long): UInt16;

Description

Converts the value of the specified 64-bit signed integer to an equivalent 16-bit unsigned integer.

Return Value: A 16-bit unsigned integer equivalent to the value of value. A 64-bit signed integer.

ToUInt16

[C#] public static ushort ToUInt16(object value);

[C++] public: static unsigned short ToUInt16(Object* value);

[VB] Public Shared Function ToUInt16(ByVal value As Object) As UInt16

[JScript] public static function ToUInt16(value: Object): UInt16; Converts a specified value to a 16-bit unsigned integer.

Description

Converts the value of the specified Object to a 16-bit unsigned integer.

Return Value: A 16-bit unsigned integer equivalent to the value of value, or zero if value is null.

The return value is the result of invoking the IConvertible. ToUInt16 method of the underlying type of value. An System.Object that implements the System.IConvertible interface or null.

ToUInt16

[C#] public static ushort ToUInt16(sbyte value);

[C++] public: static unsigned short ToUInt16(char value);

[VB] Public Shared Function ToUInt16(ByVal value As SByte) As UInt16

[JScript] public static function ToUInt16(value: SByte): UInt16;

Description

Converts the value of the specified 8-bit signed integer to the equivalent 16-bit unsigned integer.

Return Value: The 8-bit unsigned integer equivalent to the value of value. An 8-bit signed integer.

ToUInt16

[C#] public static ushort ToUInt16(float value);

[C++] public: static unsigned short ToUInt16(float value);

[VB] Public Shared Function ToUInt16(ByVal value As Single) As UInt16

[JScript] public static function ToUInt16(value: float): UInt16;

Description

Converts the value of the specified single-precision floating point number to an equivalent 16-bit unsigned integer.

Return Value: value rounded to the nearest 16-bit unsigned integer. If value is halfway between two whole numbers, the even number is returned; that is, 4.5 is converted to 4, and 5.5 is converted to 6. A single-precision floating point number.

ToUInt16

[C#] public static ushort ToUInt16(string value);

[C++] public: static unsigned short ToUInt16(String* value);

[VB] Public Shared Function ToUInt16(ByVal value As String) As UInt16

[JScript] public static function ToUInt16(value: String): UInt16;

Description

Converts the specified String representation of a number to an equivalent 16-bit unsigned integer.

Return Value: A 16-bit unsigned integer equivalent to the value of value.

The return value is the result of invoking System.UInt16.Parse(System.String) on value. A System. String containing a number to convert.

ToUInt16

[C#] public static ushort ToUInt16(ushort value);

[C++] public: static unsigned short ToUInt16(unsigned short value);

[VB] Public Shared Function ToUInt16(ByVal value As UInt16) As UInt16

[JScript] public static function ToUInt16(value: UInt16): UInt16;

Description

Returns the specified 16-bit unsigned integer; no actual conversion is performed.

Return Value: value is returned unchanged. A 16-bit unsigned integer.

ToUInt16

[C#] public static ushort ToUInt16(uint value);

[C++] public: static unsigned short ToUInt16(unsigned int value);

[VB] Public Shared Function ToUInt16(ByVal value As UInt32) As UInt16

[JScript] public static function ToUInt16(value: UInt32): UInt16;

Description

Converts the value of the specified 32-bit unsigned integer to an equivalent 16-bit unsigned integer.

Return Value: A 16-bit unsigned integer equivalent to the value of value. A 32-bit unsigned integer.

ToUInt16

[C#] public static ushort ToUInt16(ulong value);

[C++] public: static unsigned short ToUInt16 (unsigned _int64 value);

[VB] Public Shared Function ToUInt16(ByVal value As UInt64) As UInt16

[JScript] public static function ToUInt16(value: UInt64): UInt16;

Description

Converts the value of the specified 64-bit unsigned integer to an equivalent 16-bit unsigned integer.

Return Value: A 16-bit unsigned integer equivalent to the value of value. A 64-bit unsigned integer.

ToUInt16

[C#] public static ushort ToUInt16(object value, IFormatProvider provider);

[C++] public: static unsigned short ToUInt16(Object* value, IFormatProvider* provider);

[VB] Public Shared Function ToUInt16(ByVal value As Object, ByVal provider As IFormatProvider) As UInt16

[JScript] public static function ToUInt16(value: Object, provider: IFormatProvider): UInt16;

Description

Converts the value of the specified Object to a 16-bit unsigned integer using the specified culture-specific formatting information.

Return Value: A 16-bit unsigned integer equivalent to the value of value, or zero if value is null.

The return value is the result of invoking the IConvertible. ToUInt16 method of the underlying type of value. An System.Object that implements the System.IConvertible interface. An System.IFormatProvider interface implementation that supplies culture-specific formatting information.

ToUInt16

[C#] public static ushort ToUInt16(string value, IFormatProvider provider);

[C++] public: static unsigned short ToUInt16(String* value, IFormatProvider* provider);

[VB] Public Shared Function ToUInt16(ByVal value As String, ByVal provider As IFormatProvider) As UInt16

[JScript] public static function ToUInt16(value: String, provider: IFormatProvider): UInt16;

Description

Converts the specified String representation of a number to an equivalent 16-bit unsigned integer using specified culture-specific formatting information.

Return Value: A 16-bit unsigned integer equivalent to the value of value.

The return value is the result of invoking System.UInt16.Parse(System.String) on value. A System. String containing a number to convert. An System.IFormatProvider interface implementation that supplies culture-specific formatting information.

ToUInt16

[C#] public static ushort ToUInt16(string value, int fromBase);

[C++] public: static unsigned short ToUInt16(String* value, int fromBase);

[VB] Public Shared Function ToUInt16(ByVal value As String, ByVal fromBase As Integer) As UInt16

[JScript] public static function ToUInt16(value: String, fromBase: int): UInt16;

Description

Converts the String representation of a number in a specified base to an equivalent 16-bit unsigned integer.

Return Value: A 16-bit unsigned integer equivalent to the number in value. A System.String containing a number. The base of the number in value, which must be 2, 8, 10, or 16.

ToUInt32

[C#] public static uint ToUInt32(bool value);

[C++] public: static unsigned int ToUInt32(bool value);

[VB] Public Shared Function ToUInt32(ByVal value As Boolean) As UInt32

[JScript] public static function ToUInt32(value: Boolean): UInt32;

Description

Converts the value of the specified Boolean value to the equivalent 32-bit unsigned integer.

Return Value: The number 1 if value is true; otherwise, 0. A Boolean value. ToUInt32

[C#] public static uint ToUInt32(byte value);

[C++] public: static unsigned int ToUInt32(unsigned char value);

[VB] Public Shared Function ToUInt32(ByVal value As Byte) As UInt32 I[JScript] public static function ToUInt32 (value: Byte): UInt32;

Description

CONVERTS the value of the specified 8-bit unsigned integer to the equivalent 32-bit signed integer.

Return Value: The 32-bit signed integer equivalent to the value of value. An 8-bit unsigned integer.

ToUInt32

[C#] public static uint ToUInt32(char value);

[C++] public: static unsigned int ToUInt32(_wchar_t value);

[VB] Public Shared Function ToUInt32(ByVal value As Char) As UInt32

[JScript] public static function ToUInt32(value: Char): UInt32;

Description

Converts the value of the specified Unicode character to the equivalent 32-bit unsigned integer.

Return Value: The 32-bit unsigned integer equivalent to value. A Unicode character.

ToUInt32

[C#] public static uint ToUInt32(DateTime value);

[C++] public: static unsigned int ToUInt32(DateTime value);

[VB] Public Shared Function ToUInt32(ByVal value As DateTime) As UInt32

[JScript] public static function ToUInt32(value: DateTime): UInt32;

Description

Calling this method always throws System.InvalidCastException.

This method is reserved for future use. A System. DateTime.

ToUInt32

[C#] public static uint ToUInt32(decimal value);

[C++] public: static unsigned int ToUInt32(Decimal value);

[VB] Public Shared Function ToUInt32(ByVal value As Decimal) As UInt32

[JScript] public static function ToUInt32(value: Decimal): UInt32;

Description

Converts the value of the specified Decimal number to an equivalent 32-bit unsigned integer.

Return Value: value rounded to the nearest 32-bit unsigned integer. If value is halfway between two whole numbers, the even number is returned; that is, 4.5 is converted to 4, and 5.5 is converted to 6. A System.Decimal number.

ToUInt32

[C#] public static uint ToUInt32(double value);

[C++] public: static unsigned int ToUInt32(double value);

[VB] Public Shared Function ToUInt32(ByVal value As Double) As UInt32

[JScript] public static function ToUInt32(value: double): UInt32;

Description

Converts the value of the specified double-precision floating point number to an equivalent 32-bit unsigned integer.

Return Value: value rounded to the nearest 32-bit unsigned integer. If value is halfway between two whole numbers, the even number is returned; that is, 4.5 is converted to 4, and 5.5 is converted to 6. A double-precision floating point number.

ToUInt32

[C#] public static uint ToUInt32(short value);

[C++] public: static unsigned int ToUInt32(short value);

[VB] Public Shared Function ToUInt32(ByVal value As Short) As UInt32

[JScript] public static function ToUInt32(value: Int16): UInt32;

Description

Converts the value of the specified 16-bit signed integer to the equivalent 32-bit unsigned integer.

Return Value: The 32-bit unsigned integer equivalent to the value of value. A 32-bit signed integer.

ToUInt32

[C#] public static uint ToUInt32(int value);

[C++] public: static unsigned int ToUInt32(int value);

[VB] Public Shared Function ToUInt32(ByVal value As Integer) As UInt32

[JScript] public static function ToUInt32(value: int): UInt32;

Description

Converts the value of the specified 32-bit signed integer to an equivalent 32-bit unsigned integer.

Return Value: The 32-bit unsigned integer equivalent of value. A 32-bit signed integer.

ToUInt32

[C#] public static uint ToUInt32(long value);

[C++] public: static unsigned int ToUInt32(_int64 value);

[VB] Public Shared Function ToUInt32(ByVal value As Long) As UInt32

[JScript] public static function ToUInt32(value: long): UInt32;

Description

Converts the value of the specified 64-bit signed integer to an equivalent 32-bit unsigned integer.

Return Value: A 32-bit unsigned integer equivalent to the value of value. A 64-bit signed integer.

ToUInt32

[C#] public static uint ToUInt32(object value);

[C++] public: static unsigned int ToUInt32(Object* value);

[VB] Public Shared Function ToUInt32(ByVal value As Object) As UInt32

[JScript] public static function ToUInt32(value: Object): UInt32; Converts a specified value to a 32-bit unsigned integer.

Description

Converts the value of the specified Object to a 32-bit unsigned integer.

Return Value: A 32-bit unsigned integer equivalent to the value of value, or zero if value is null.

The return value is the result of invoking the IConvertible. ToUInt32 method of the underlying type of value. An System.Object that implements the System.IConvertible interface or null.

ToUInt32

[C#] public static uint ToUInt32(sbyte value);

[C++] public: static unsigned int ToUInt32(char value);

[VB] Public Shared Function ToUInt32(ByVal value As SByte) As UInt32

[JScript] public static function ToUInt32(value: SByte): UInt32;

Description

Converts the value of the specified 8-bit signed integer to the equivalent 32-bit unsigned integer.

Return Value: The 8-bit unsigned integer equivalent to the value of value. An 8-bit signed integer.

ToUInt32

[C#] public static uint ToUInt32(float value);

[C++] public: static unsigned int ToUInt32(float value);

[VB] Public Shared Function ToUInt32(ByVal value As Single) As UInt32

[JScript] public static function ToUInt32(value: float): UInt32;

Description

Converts the value of the specified single-precision floating point number to an equivalent 32-bit unsigned integer.

Return Value: value rounded to the nearest 32-bit unsigned integer. If value is halfway between two whole numbers, the even number is returned; that is, 4.5 is converted to 4, and 5.5 is converted to 6. A single-precision floating point number.

ToUInt32

[C#] public static uint ToUInt32(string value);

[C++] public: static unsigned int ToUInt32(String* value);

[VB] Public Shared Function ToUInt32(ByVal value As String) As UInt32

[JScript] public static function ToUInt32(value: String): UInt32;

Description

Converts the specified String representation of a number to an equivalent 32-bit signed integer.

Return Value: A 32-bit signed integer equivalent to the value of value.

The return value is the result of invoking the System.Int32.Parse(System.String) method on value. A System.String containing a number to convert.

ToUInt32

[C#] public static uint ToUInt32(ushort value);

[C++] public: static unsigned int ToUInt32(unsigned short value);

[VB] Public Shared Function ToUInt32(ByVal value As UInt16) As UInt32

[JScript] public static function ToUInt32(value: UInt16): UInt32;

Description

Converts the value of the specified 16-bit unsigned integer to the equivalent 32-bit unsigned integer.

Return Value: The 32-bit unsigned integer equivalent to the value of value. A 32-bit signed integer.

ToUInt32

[C#] public static uint ToUInt32(uint value);

[C++] public: static unsigned int ToUInt32(unsigned int value);

[VB] Public Shared Function ToUInt32(ByVal value As UInt32) As UInt32

[JScript] public static function ToUInt32(value: UInt32): UInt32;

Description

Returns the specified 32-bit unsigned integer; no actual conversion is performed.

Return Value: value is returned unchanged. A 32-bit unsigned integer.

ToUInt32

[C#] public static uint ToUInt32(ulong value);

[C++] public: static unsigned int ToUInt32(unsigned _int64 value);

[VB] Public Shared Function ToUInt32(ByVal value As UInt64) As UInt32

[JScript] public static function ToUInt32(value: UInt64): UInt32;

Description

Converts the value of the specified 64-bit unsigned integer to an equivalent 32-bit unsigned integer.

Return Value: A 32-bit unsigned integer equivalent to the value of value. A 64-bit unsigned integer.

ToUInt32

[C#] public static uint ToUInt32(object value, IFormatProvider provider);

[C++] public: static unsigned int ToUInt32(Object* value, IFormatProvider* provider);

[VB] Public Shared Function ToUInt32(ByVal value As Object, ByVal provider As IFormatProvider) As UInt32

[JScript] public static function ToUInt32(value: Object, provider: IFormatProvider): UInt32;

Description

Converts the value of the specified Object to a 32-bit unsigned integer using the specified culture-specific formatting information.

Return Value: A 32-bit unsigned integer equivalent to the value of value, or zero if value is null.

The return value is the result of invoking the IConvertible. ToUInt32 method of the underlying type of value. An System. Object that implements the System.IConvertible interface. An System.IFormatProvider interface implementation that supplies culture-specific formatting information.

ToUInt32

[C#] public static uint ToUInt32(string value, IFormatProvider provider);

[C++] public: static unsigned int ToUInt32(String* value, IFormatProvider* provider);

[VB] Public Shared Function ToUInt32(ByVal value As String, ByVal provider As IFormatProvider) As UInt32

[JScript] public static function ToUInt32(value: String, provider: IFormatProvider): UInt32;

Description

Converts the specified String representation of a number to an equivalent 32-bit unsigned integer using the specified culture-specific formatting information.

Return Value: A 32-bit unsigned integer equivalent to the value of value.

The return value is the result of invoking System.UInt32.Parse(System.String) on value. A System. String containing a number to convert. An System.IFormatProvider interface implementation that supplies culture-specific formatting information.

ToUInt32

[C#] public static uint ToUInt32(string value, int fromBase);

[C++] public: static unsigned int ToUInt32(String* value, int fromBase);

[VB] Public Shared Function ToUInt32(ByVal value As String, ByVal fromBase As Integer) As UInt32

[JScript] public static function ToUInt32(value: String, fromBase: int): UInt32;

Description

Converts the String representation of a number in a specified base to an equivalent 32-bit unsigned integer.

Return Value: A 32-bit unsigned integer equivalent to the number in value. A System.String containing a number. The base of the number in value, which must be 2, 8, 10, or 16.

ToUInt64

[C#] public static ulong ToUInt64(bool value);

[C++] public: static unsigned _int64 ToUInt64(bool value);

[VB] Public Shared Function ToUInt64(ByVal value As Boolean) As UInt64

[JScript] public static function ToUInt64(value: Boolean): UInt64;

Description

Converts the value of the specified Boolean value to the equivalent 64-bit unsigned integer.

Return Value: The number 1 if value is true; otherwise, 0. A Boolean value.

ToUInt64

[C#] public static ulong ToUInt64(byte value);

[C++] public: static unsigned _int64 ToUInt64(unsigned char value);

[VB] Public Shared Function ToUInt64(ByVal value As Byte) As UInt64

[JScript] public static function ToUInt64(value: Byte): UInt64;

Description

Converts the value of the specified 8-bit unsigned integer to the equivalent 64-bit signed integer.

Return Value: The 64-bit signed integer equivalent to the value of value. An 8-bit unsigned integer.

ToUInt64

[C#] public static ulong ToUInt64(char value);

[C++] public: static unsigned _int64 ToUInt64(_wchar_t value);

[VB] Public Shared Function ToUInt64(ByVal value As Char) As UInt64

[JScript] public static function ToUInt64(value: Char): UInt64;

Description

Converts the value of the specified Unicode character to the equivalent 64-bit unsigned integer.

Return Value: The 64-bit unsigned integer equivalent to value. A Unicode character.

ToUInt64

[C#] public static ulong ToUInt64(DateTime value);

[C++] public: static unsigned _int64 ToUInt64(DateTime value);

[VB] Public Shared Function ToUInt64(ByVal value As DateTime) As UInt64

[JScript] public static function ToUInt64(value: DateTime): UInt64;

Description

Calling this method always throws System.InvalidCastException.

This method is reserved for future use. A System.DateTime.

ToUInt64

[C#] public static ulong ToUInt64(decimal value);

[C++] public: static unsigned _int64 ToUInt64(Decimal value);

[VB] Public Shared Function ToUInt64(ByVal value As Decimal) As UInt64

[JScript] public static function ToUInt64(value: Decimal): UInt64;

Description

Converts the value of the specified Decimal number to an equivalent 64-bit unsigned integer.

Return Value: value rounded to the nearest 64-bit unsigned integer. If value is halfway between two whole numbers, the even number is returned; that is, 4.5 is converted to 4, and 5.5 is converted to 6. A System.Decimal number.

ToUInt64

[C#] public static ulong ToUInt64(double value);

[C++] public: static unsigned _int64 ToUInt64(double value);

[VB] Public Shared Function ToUInt64(ByVal value As Double) As UInt64

[JScript] public static function ToUInt64(value: double): UInt64;

Description

Converts the value of the specified double-precision floating point number to an equivalent 64-bit unsigned integer.

Return Value: value rounded to the nearest 64-bit unsigned integer. If value is halfway between two whole numbers, the even number is returned; that is, 4.5 is converted to 4, and 5.5 is converted to 6. A double-precision floating point number.

ToUInt64

[C#] public static ulong ToUInt64(short value);

[C++] public: static unsigned _int64 ToUInt64(short value);

[VB] Public Shared Function ToUInt64(ByVal value As Short) As UInt64

[JScript] public static function ToUInt64(value: Int16): UInt64;

Description

Converts the value of the specified 16-bit signed integer to the equivalent 64-bit unsigned integer.

Return Value: The 64-bit unsigned integer equivalent to the value of value. A 64-bit signed integer.

ToUInt64

[C#] public static ulong ToUInt64(int value);

[C++] public: static unsigned _int64 ToUInt64(int value);

[VB] Public Shared Function ToUInt64(ByVal value As Integer) As UInt64

[JScript] public static function ToUInt64(value: int): UInt64;

Description

Converts the value of the specified 32-bit signed integer to an equivalent 64-bit unsigned integer.

Return Value: The 64-bit unsigned integer equivalent of value. A 32-bit signed integer.

ToUInt64

[C#] public static ulong ToUInt64(long value);

[C++] public: static unsigned _int64 ToUInt64(_int64 value);

[VB] Public Shared Function ToUInt64(ByVal value As Long) As UInt64

[JScript] public static function ToUInt64(value: long): UInt64;

Description

Converts the value of the specified 64-bit signed integer to an equivalent 64-bit unsigned integer.

Return Value: A 64-bit unsigned integer equivalent to the value of value. A 64-bit signed integer.

ToUInt64

[C#] public static ulong ToUInt64(object value);

[C++] public: static unsigned _int64 ToUInt64(Object* value);

[VB] Public Shared Function ToUInt64(ByVal value As Object) As UInt64

[JScript] public static function ToUInt64(value: Object): UInt64; Converts a specified value to a 64-bit unsigned integer.

Description

Converts the value of the specified Object to a 64-bit unsigned integer.

Return Value: A 64-bit unsigned integer equivalent to the value of value, or zero if value is null.

The return value is the result of invoking the IConvertible.ToUInt64 method of the underlying type of value. An System.Object that implements the System.IConvertible interface or null.

ToUInt64

[C#] public static ulong ToUInt64(sbyte value);

[C++] public: static unsigned _int64 ToUInt64(char value);

[VB] Public Shared Function ToUInt64(ByVal value As SByte) As UInt64

[JScript] public static function ToUInt64(value: SByte): UInt64;

Description

Converts the value of the specified 8-bit signed integer to the equivalent 64-bit unsigned integer.

Return Value: The 8-bit unsigned integer equivalent to the value of value. An 8-bit signed integer.

ToUInt64

[C#] public static ulong ToUInt64(float value);

[C++] public: static unsigned _int64 ToUInt64(float value);

[VB] Public Shared Function ToUInt64(ByVal value As Single) As UInt64

[JScript] public static function ToUInt64(value: float): UInt64;

Description

Converts the value of the specified single-precision floating point number to an equivalent 64-bit unsigned integer.

Return Value: value rounded to the nearest 64-bit unsigned integer. If value is halfway between two whole numbers, the even number is returned; that is, 4.5 is converted to 4, and 5.5 is converted to 6. A single-precision floating point number. ToUInt64

[C#] public static ulong ToUInt64(string value);

[C++] public: static unsigned _int64 ToUInt64(String* value);

[VB] Public Shared Function ToUInt64(ByVal value As String) As UInt64

[JScript] public static function ToUInt64(value: String): UInt64;

Description

Converts the specified String representation of a number to an equivalent 64-bit signed integer.

Return Value: A 64-bit signed integer equivalent to the value of value.

The return value is the result of invoking the System.Int64.Parse(System.String) method on value. A System.String containing a number to convert.

ToUInt64

[C#] public static ulong ToUInt64(ushort value);

[C++] public: static unsigned _int64 ToUInt64(unsigned short value);

[VB] Public Shared Function ToUInt64(ByVal value As UInt16) As UInt64

[JScript] public static function ToUInt64(value: UInt16): UInt64;

Description

Converts the value of the specified 16-bit unsigned integer to the equivalent 64-bit unsigned integer.

Return Value: The 64-bit unsigned integer equivalent to the value of value. A 16-bit unsigned integer.

ToUInt64

[C#] public static ulong ToUInt64(uint value);

[C++] public: static unsigned _int64 ToUInt64(unsigned int value);

[VB] Public Shared Function ToUInt64(ByVal value As UInt32) As UInt64

[JScript] public static function ToUInt64(value: UInt32): UInt64;

Description

Converts the value of the specified 32-bit unsigned integer to an equivalent 64-bit unsigned integer.

Return Value: The 64-bit unsigned integer equivalent of value. A 32-bit unsigned integer.

ToUInt64

[C#] public static ulong ToUInt64(ulong value);

[C++] public: static unsigned _int64 ToUInt64 (unsigned _int64 value);

[VB] Public Shared Function ToUInt64(ByVal value As UInt64) As UInt64

[JScript] public static function ToUInt64(value: UInt64): UInt64;

Description

Returns the specified 64-bit unsigned integer; no actual conversion is performed.

Return Value: value is returned unchanged. A 64-bit unsigned integer.

ToUInt64

[C#] public static ulong ToUInt64(object value, IFormatProvider provider);

[C++] public: static unsigned _int64 ToUInt64(Object* value, IFormatProvider* provider);

[VB] Public Shared Function ToUInt64(ByVal value As Object, ByVal provider As IFormatProvider) As UInt64

[JScript] public static function ToUInt64(value: Object, provider: IFormatProvider): UInt64;

Description

Converts the value of the specified Object to a 64-bit unsigned integer using the specified culture-specific formatting information.

Return Value: A 64-bit unsigned integer equivalent to the value of value, or zero if value is null.

The return value is the result of invoking the IConvertible. ToUInt64 method of the underlying type of value. An System. Object that implements the System.IConvertible interface. An System.IFormatProvider interface implementation that supplies culture-specific formatting information.

ToUInt64

[C#] public static ulong ToUInt64(string value, IFormatProvider provider);

[C++] public: static unsigned _int64 ToUInt64(String* value, IFormatProvider* provider);

[VB] Public Shared Function ToUInt64(ByVal value As String, ByVal provider As IFormatProvider) As UInt64

[JScript] public static function ToUInt64(value: String, provider: IFormatProvider): UInt64;

Description

Converts the specified String representation of a number to an equivalent 64-bit unsigned integer using the specified culture-specific formatting information.

Return Value: A 64-bit unsigned integer equivalent to the value of value.

The return value is the result of invoking System.UInt64.Parse(System.String) on value. A System. String containing a number to convert. An System.IFormatProvider interface implementation that supplies culture-specific formatting information.

ToUInt64

[C#] public static ulong ToUInt64(string value, int fromBase);

[C++] public: static unsigned _int64 ToUInt64(String* value, int fromBase);

[VB] Public Shared Function ToUInt64(ByVal value As String, ByVal fromBase As Integer) As UInt64

[JScript] public static function ToUInt64(value: String, fromBase: int): UInt64;

Description

Converts the String representation of a number in a specified base to an equivalent 64-bit unsigned integer.

Return Value: A 64-bit unsigned integer equivalent to the number in value. A System.String containing a number. The base of the number in value, which must be 2, 8, 10, or 16.

CrossAppDomainDelegate delegate (System)

ToUInt64

Description

Used by System.AppDomain.DoCallBack(System. CrossAppDomainDelegate) for cross-application domain calls.

Every derived class of System.Delegate and System.MulticastDelegate has a constructor and an Invoke method. See the Managed Extensions for C++ code example given in the description for System.Delegate.

DateTime structure (System)

ToUInt64

Description

Represents an instant in time, typically expressed as a date and time of day.

The DateTime value type represents dates and times with values ranging from 12:00:00 AM, 1/1/0001 CE (Common Era) to 11:59:59 PM, 12/31/9999 CE.

ToUInt64

[C#] public static readonly DateTime MaxValue;

[C++] public: static DateTime MaxValue;

[VB] Public Shared ReadOnly MaxValue As DateTime

[JScript] public static var MaxValue: DateTime;

Description

A constant representing the largest possible value of DateTime.

The value of this constant is 11:59:59 PM, 12/31/9999 CE.

ToUInt64

[C#] public static readonly DateTime MinValue;

[C++] public: static DateTime MinValue;

[VB] Public Shared ReadOnly MinValue As DateTime

[JScript] public static var MinValue: DateTime;

Description

A constant representing the smallest possible value of DateTime.

The value of this constant is 12:00:00 AM, 1/1/0001 CE.

DateTime

Example Syntax:

ToUInt64

[C#] public DateTime(long ticks);

[C++] public: DateTime(_int64 ticks);

[VB] Public Sub New(ByVal ticks As Long)

[JScript] public function DateTime(ticks: long); Initializes a new instance of the DateTime structure.

Description

Initializes a new instance of the DateTime structure to a specified number of ticks. A date and time expressed in 100-nanosecond units.

DateTime

Example Syntax:

ToUInt64

[C#] public DateTime(int year, int month, int day);

[C++] public: DateTime(int year, int month, int day);

[VB] Public Sub New(ByVal year As Integer, ByVal month As Integer, ByVal day As Integer)

[JScript] public function DateTime(year: int, month: int, day: int);

Description

Initializes a new instance of the DateTime structure to the specified year, month, and day.

The time of day for the resulting DateTime is midnight. The year (1 through 9999). The month (1 through 12). The day (1 through the number of days in month).

DateTime

Example Syntax:

ToUInt64

[C#] public DateTime(int year, int month, int day, Calendar calendar);

[C++] public: DateTime(int year, int month, int day, Calendar* calendar);

[VB] Public Sub New(ByVal year As Integer, ByVal month As Integer, ByVal day As Integer, ByVal calendar As Calendar)

[JScript] public function DateTime(year: int, month: int, day: int, calendar: Calendar);

Description

Initializes a new instance of the DateTime structure to the specified year, month, and day for the specified calendar.

The time of day for the resulting DateTime is midnight. The year (1 through 9999). The month (1 through the number of months in calendar). The day (1 through the number of days in month). The calendar which applies to this DateTime.

DateTime

Example Syntax:

ToUInt64

[C#] public DateTime(int year, int month, int day, int hour, int minute, it second);

[C++] public: DateTime(int year, int month, int day, int hour, int minute, int second);

[VB] Public Sub New(ByVal year As Integer, ByVal month As Integer, ByVal day As Integer, ByVal hour As Integer, ByVal minute As Integer, ByVal second As Integer)

[JScript] public function DateTime(year: int, month: int, day: int, hour: int, minute: int, second: int);

Description

Initializes a new instance of the DateTime structure to the specified year, month, day, hour, minute, and second. The year (1 through 9999) The month (1 through 12) The day (1 through the number of days in month) The hours (0 through 23) The minutes (0 through 59) The seconds (0 through 59)

DateTime

Example Syntax:

ToUInt64

[C#] public DateTime(int year, int month, int day, int hour, int minute, int second, Calendar calendar);

[C++] public: DateTime(int year, int month, int day, int hour, int minute, int second, Calendar* calendar);

[VB] Public Sub New(ByVal year As Integer, ByVal month As Integer, ByVal day As Integer, ByVal hour As Integer, ByVal minute As Integer, ByVal second As Integer, ByVal calendar As Calendar)

[JScript] public function DateTime(year: int, month: int, day: int, hour: int, minute: int, second: int, calendar: Calendar);

Description

Initializes a new instance of the DateTime structure to the specified year, month, day, hour, minute, and second for the specified calendar.

The time of day for the resulting DateTime is midnight. The year (1 through 9999) The month (1 through the number of months in calendar) The day (1 through the number of days in month) The hours (0 through 23) The minutes (0 through 59) The seconds (0 through 59) The calendar which applies to this DateTime DateTime Example Syntax:

ToUInt64

[C#] public DateTime(int year, int month, int day, int hour, int minute, int second, int millisecond);

[C++] public: DateTime(int year, int month, int day, int hour, int minute, int second, int millisecond);

[VB] Public Sub New(ByVal year As Integer, ByVal month As Integer, ByVal day As Integer, ByVal hour As Integer, ByVal minute As Integer, ByVal second As Integer, ByVal millisecond As Integer)

[JScript] public function DateTime(year: int, month: int, day: int, hour: int, minute: int, second: int, millisecond: int);

Description

Initializes a new instance of the DateTime structure to the specified year, month, day, hour, minute, second, and millisecond. The year (1 through 9999) The month (1 through 12) The day (1 through the number of days in month) The hours (0 through 23) The minutes (0 through 59) The seconds (0 through 59) The milliseconds DateTime Example Syntax:

ToUInt64

[C#] public DateTime(int year, int month, int day, int hour, int minute, int second, int millisecond, Calendar calendar);

[C++] public: DateTime(int year, int month, int day, int hour, int minute, int second, int millisecond, Calendar* calendar);

[VB] Public Sub New(ByVal year As Integer, ByVal month As Integer, ByVal day As Integer, ByVal hour As Integer, ByVal minute As Integer, ByVal second As Integer, ByVal millisecond As Integer, ByVal calendar As Calendar)

[JScript] public function DateTime(year: int, month: int, day: int, hour: int, minute: int, second: int, millisecond: int, calendar: Calendar);

Description

Initializes a new instance of the DateTime structure to the specified year, month, day, hour, minute, second, and millisecond for the specified calendar.

The time of day for the resulting DateTime is midnight. The year (1 through 9999) The month (1 through the number of months in calendar) The day (1 through the number of days in month) The hours (0 through 23) The minutes (0 through 59) The seconds (0 through 59) The milliseconds The calendar which applies to this System.DateTime Date ToUInt64

[C#] public DateTime Date {get;}

[C++] public: _property DateTime get_Date( );

[VB] Public ReadOnly Property Date As DateTime
[JScript] public function get Date( ): DateTime;

Description

Gets the date component of this instance.

Day

ToUInt64

[C#] public int Day {get;}
[C++] public: _property int get_Day( );
[VB] Public ReadOnly Property Day As Integer
[JScript] public function get Day( ): int;

Description

Gets the day of the month represented by this instance.

DayOfWeek

ToUInt64

[C#] public DayOfWeek DayOfWeek {get;}
[C++] public: _property DayOfWeek get_DayOfWeek( );
[VB] Public ReadOnly Property DayOfWeek As DayOfWeek
[JScript] public function get DayOfWeek( ): DayOfWeek;

Description

Gets the day of the week represented by this instance.

DayOfYear

ToUInt64

[C#] public int DayOfYear {get;}
[C++] public: _property int get_DayOfYear( );
[VB] Public ReadOnly Property DayOfYear As Integer
[JScript] public function get DayOfYear( ): int;

Description

Gets the day of the year represented by this instance.

Hour

ToUInt64

[C#] public int Hour {get;}
[C++] public: _property int get_Hour( );
[VB] Public ReadOnly Property Hour As Integer
[JScript] public function get Hour( ): int;

Description

Gets the hour component of the date represented by this instance.

Millisecond

ToUInt64

[C#] public int Millisecond {get;}
[C++] public: _property int get_Millisecond( );
[VB] Public ReadOnly Property Millisecond As Integer
[JScript] public function get Millisecond( ): int;

Description

Gets the milliseconds component of the date represented by this instance.

Minute

ToUInt64

[C#] public int Minute {get;}
[C++] public: _property int get_Minute( );
[VB] Public ReadOnly Property Minute As Integer
[JScript] public function get Minute( ): int;

Description

Gets the minute component of the date represented by this instance.

Month

ToUInt64

[C#] public int Month {get;}
[C++] public: _property int get_Month( );
[VB] Public ReadOnly Property Month As Integer
[JScript] public function get Month( ): int;

Description

Gets the month component of the date represented by this instance.

Now

ToUInt64

[C#] public static DateTime Now {get;}
[C++] public: _property static DateTime get_Now( );
[VB] Public Shared ReadOnly Property Now As DateTime
[JScript] public static function get Now( ): DateTime;

Description

Gets a DateTime that is the current local time on this computer.

The resolution of this property depends on the system timer.

Second

ToUInt64

[C#] public int Second {get;}
[C++] public: _property int get_Second( );
[VB] Public ReadOnly Property Second As Integer
[JScript] public function get Second( ): int;

Description

Retrieves the seconds component of the date represented by this instance.

Ticks

ToUInt64

[C#] public long Ticks {get;}
[C++] public: _property _int64 get_Ticks( );
[VB] Public ReadOnly Property Ticks As Long
[JScript] public function get Ticks( ): long;

Description

Gets the number of 100-nanosecond ticks that represent the date and time of this instance.

The value of this property is the number of 100-nanosecond intervals that have elapsed since 1/1/0001, 12:00 am.

TimeOfDay

ToUInt64

[C#] public TimeSpan TimeOfDay {get;}I
[C++] public: _property TimeSpan get_TimeOfDay( );
[VB] Public ReadOnly Property TimeOfDay As TimeSpan
[JScript] public function get TimeOfDay( ): TimeSpan;

Description

Gets the time of day for this instance.

Today

ToUInt64

[C#] public static DateTime Today {get;}
[C++] public: _property static DateTime get_Today( );
[VB] Public Shared ReadOnly Property Today As DateTime
[JScript] public static function get Today( ): DateTime;

Description

Gets the current date.

UtcNow

ToUInt64

[C#] public static DateTime UtcNow {get;}
[C++] public: _property static DateTime get_UtcNow( );
[VB] Public Shared ReadOnly Property UtcNow As DateTime
[JScript] public static function get UtcNow( ): DateTime;

Description

Gets a DateTime that is the current local time on this computer expressed as the coordinated universal time (UTC).

The resolution of this property depends on the system timer.

Year

ToUInt64

[C#] public int Year {get;}

[C++] public: _property int get_Year( );

[VB] Public ReadOnly Property Year As Integer

[JScript] public function get Year( ): int;

Description

Gets the year component of the date represented by this instance.

Add

[C#] public DateTime Add(TimeSpan value);

[C++] public: DateTime Add(TimeSpan value);

[VB] Public Function Add(ByVal value As TimeSpan) As DateTime

[JScript] public function Add(value: TimeSpan): DateTime;

Description

Adds the value of the specified TimeSpan instance to the value of this instance.

Return Value: A DateTime whose value is the sum of the date and time represented by this instance and the time interval represented by value.

This method does not change the value of this DateTime instance. Instead, a new DateTime instance is returned whose value is the result of this operation. A time interval.

AddDays

[C#] public DateTime AddDays(double value);

[C++] public: DateTime AddDays(double value);

[VB] Public Function AddDays(ByVal value As Double) As DateTime

[JScript] public function AddDays(value: double): DateTime;

Description

Adds the specified number of days to the value of this instance.

Return Value: A DateTime whose value is the sum of the date and time represented by this instance and the number of days represented by value.

This method does not change the value of this DateTime instance. Instead, a new DateTime instance is returned whose value is the result of this operation. A number of whole and fractional days.

AddHours

[C#] public DateTime AddHours(double value);

[C++] public: DateTime AddHours(double value);

[VB] Public Function AddHours(ByVal value As Double) As DateTime

[JScript] public function AddHours(value: double): DateTime;

Description

Adds the specified number of hours to the value of this instance.

Return Value: A DateTime whose value is the sum of the date and time represented by this instance and the number of hours represented by value.

This method does not change the value of this DateTime instance. Instead, a new DateTime instance is returned whose value is the result of this operation. A number of whole and fractional hours.

AddMilliseconds

[C#] public DateTime AddMilliseconds(double value);

[C++] public: DateTime AddMilliseconds(double value);

[VB] Public Function AddMilliseconds(ByVal value As Double) As DateTime

[JScript] public function AddMilliseconds(value: double): DateTime;

Description

Adds the specified number of milliseconds to the value of this instance.

Return Value: A DateTime whose value is the sum of the date and time represented by this instance and the number of milliseconds represented by value.

This method does not change the value of this DateTime instance. Instead, a new DateTime instance is returned whose value is the result of this operation. A number of milliseconds.

AddMinutes

[C#] public DateTime AddMinutes(double value);

[C++] public: DateTime AddMinutes(double value);

[VB] Public Function AddMinutes(ByVal value As Double) As DateTime

[JScript] public function AddMinutes(value: double): DateTime;

Description

Adds the specified number of minutes to the value of this instance.

Return Value: A DateTime whose value is the sum of the date and time represented by this instance and the number of minutes represented by value.

This method does not change the value of this DateTime instance. Instead, a new DateTime instance is returned whose value is the result of this operation. A number of whole and fractional minutes.

AddMonths

[C#] public DateTime AddMonths(int months);

[C++] public: DateTime AddMonths(int months);

[VB] Public Function AddMonths(ByVal months As Integer) As DateTime

[JScript] public function AddMonths(months: int): DateTime;

Description

Adds the specified number of months to the value of this instance.

Return Value: A DateTime whose value is the sum of the date and time represented by this instance and months.

This method does not change the value of this DateTime instance. Instead, a new DateTime instance is returned whose value is the result of this operation. A number of months.

AddSeconds

[C#] public DateTime AddSeconds(double value);

[C++] public: DateTime AddSeconds(double value);

[VB] Public Function AddSeconds(ByVal value As Double) As DateTime

[JScript] public function AddSeconds(value: double): DateTime;

Description

Adds the specified number of seconds to the value of this instance.

Return Value: A DateTime whose value is the sum of the date and time represented by this instance and the number of seconds represented by value.

This method does not change the value of this DateTime instance. Instead, a new DateTime instance is returned whose value is the result of this operation. A number of whole and fractional seconds.

AddTicks

[C#] public DateTime AddTicks(long value);

[C++] public: DateTime AddTicks(_int64 value);

[VB] Public Function AddTicks(ByVal value As Long) As DateTime

[JScript] public function AddTicks(value: long): DateTime;

Description

Adds the specified number of ticks to the value of this instance.

Return Value: A DateTime whose value is the sum of the date and time represented by this instance and the time represented by value.

This method does not change the value of this DateTime instance. Instead, a new DateTime instance is returned whose value is the result of this operation. A number of 100-nanosecond ticks.

AddYears

[C#] public DateTime AddYears(int value);

[C++] public: DateTime AddYears(int value);

[VB] Public Function AddYears(ByVal value As Integer) As DateTime

[JScript] public function AddYears(value: int): DateTime;

Description

Adds the specified number of years to the value of this instance.

Return Value: A DateTime whose value is the sum of the date and time represented by this instance and the number of years represented by value.

This method does not change the value of this DateTime instance. Instead, a new DateTime instance is returned whose value is the result of this operation. A number of years.

Compare

[C#] public static int Compare(DateTime t1, DateTime t2);

[C++] public: static int Compare(DateTime t1, DateTime t2);

[VB] Public Shared Function Compare(ByVal t1 As DateTime, ByVal t2 As DateTime) As Integer

[JScript] public static function Compare(t1: DateTime, t2: DateTime): int;

Description

Compares two instances of DateTime and returns an indication of their relative values.

Return Value: A signed number indicating the relative values of t1 and t2. The first DateTime. The second DateTime.

CompareTo

[C#] public int CompareTo(object value);

[C++] public: _sealed int CompareTo(Object* value);

[VB] NotOverridable Public Function CompareTo(ByVal value As Object) As Integer

[JScript] public function CompareTo(value: Object): int;

Description

Compares this instance to a specified object and returns an indication of their relative values.

Return Value: A signed number indicating the relative values of this instance and value.

Any instance of DateTime, regardless of its value, is considered greater than null. An object to compare, or null.

DaysInMonth

[C#] public static int DaysInMonth(int year, int month);

[C++] public: static int DaysInMonth(int year, int month);

[VB] Public Shared Function DaysInMonth(ByVal year As Integer, ByVal month As Integer) As Integer

[JScript] public static function DaysInMonth(year: int, month: int): int;

Description

Returns the number of days in the specified month of the specified year.

Return Value: The number of days in month for the specified year. The year. The month (a number ranging from 1 to 12).

Equals

[C#] public override bool Equals(object value);

[C++] public: bool Equals(Object* value);

[VB] Overrides Public Function Equals(ByVal value As Object) As Boolean

[JScript] public override function Equals(value: Object): Boolean; Returns a value indicating whether an instance of DateTime is equal to a specified object.

Description

Returns a value indicating whether this instance is equal to a specified object.

Return Value: true if value is an instance of DateTime and equals the value of this instance; otherwise, false. An object to compare with this instance.

Equals

[C#] public static new bool Equals(DateTime t1, DateTime t2);

[C++] public: static bool Equals(DateTime t1, DateTime t2);

[VB] Shadows Public Shared Function Equals(ByVal t1 As DateTime, ByVal t2 As DateTime) As Boolean

[JScript] public static hide function Equals(t1: DateTime, t2: DateTime) Boolean;

Description

Returns a value indicating whether two instances of System.DateTime are equal.

Return Value: true if the two DateTime values are equal; otherwise, false. The first DateTime. The second DateTime.

FromFileTime

[C#] public static DateTime FromFileTime(long fileTime);

[C++] public: static DateTime FromFileTime(_int64 fileTime);

[VB] Public Shared Function FromFileTime(ByVal fileTime As Long) As
DateTime

[JScript] public static function FromFileTime(fileTime: long): DateTime;

Description

Returns a DateTime equivalent to the specified operating system file timestamp.

Return Value: A DateTime value representing the date and time of fileTime, adjusted to local time.

fileTime is a 64-bit signed integer value representing a Windows file timestamp. The timestamp is the number of 100-nanosecond intervals that have elapsed since 1/1/1601 12:00 AM coordinated universal time (UTC). A Windows file time.

FromOADate

[C#] public static DateTime FromOADate(double d);

[C++] public: static DateTime FromOADate(double d);

[VB] Public Shared Function FromOADate(ByVal d As Double) As DateTime

[JScript] public static function FromOADate(d: double): DateTime;

Description

Returns a DateTime equivalent to the specified OLE Automation Date.

Return Value: A DateTime that represents the same date and time as d.

d must be a value between negative 657435.0 through positive 2958466.0. It is stored as a double-precision floating point number. An OLE Automation Date value.

GetDateTimeFormats

[C#] public string[ ] GetDateTimeFormats( );

[C++] public: String* GetDateTimeFormats( ) _gc[ ];

[VB] Public Function GetDateTimeFormats( ) As String( )

[JScript] public function GetDateTimeFormats( ): String[ ]; Converts the value of this instance to all of the String representations supported by the standard DateTime format specifiers.

Description

Converts the value of this instance to all of the String representations supported by the standard DateTime format specifiers.

Return Value: A String array where each element is the representation of the value of this instance formatted with one of the standard DateTime formatting specifiers.

Each element of the return value is formatted using information from the current culture. For more information about culture-specific formatting information for the current culture, see System.Globalization.CultureInfo.CurrentCulture.

GetDateTimeFormats

[C#] public string[ ] GetDateTimeFormats(char format);

[C++] public: String* GetDateTimeFormats(_wchar_t format) _gc[ ];

[VB] Public Function GetDateTimeFormats(ByVal format As Char) As String( )

[JScript] public function GetDateTimeFormats(format: Char): String[ ];

Description

Converts the value of this instance to all of the String representations supported by the specified standard DateTime format specifier.

Return Value: A String array where each element is the representation of the value of this instance formatted with the format standard DateTime formatting specifier.

Each element of the return value is formatted using information from the current culture. For more information about culture-specific formatting information for the current culture, see System.Globalization.CultureInfo.CurrentCulture. A Unicode character containing a format specifier.

GetDateTimeFormats

[C#] public string[ ] GetDateTimeFormats(IFormatProvider provider);

[C++] public: String* GetDateTimeFormats(IFormatProvider* provider) _gc[ ];

[VB] Public Function GetDateTimeFormats(ByVal provider As IFormatProvider) As String( )

[JScript] public function GetDateTimeFormats(provider: IFormatProvider): String[ ];

Description

Converts the value of this instance to all of the String representations supported by the standard DateTime format specifiers and the specified culture-specific formatting information.

Return Value: A String array where each element is the representation of the value of this instance formatted with one of the standard DateTime formatting specifiers.

Each element of the return value is formatted using culture-specific information supplied by provider. An System.IFormatProvider interface implementation that supplies culture-specific formatting information about this instance.

GetDateTimeFormats

[C#] public string[ ] GetDateTimeFormats(char format, IFormatProvider provider);

[C++] public: String* GetDateTimeFormats(_wchar_t format, IFormatProvider* provider) _gc[ ];

[VB] Public Function GetDateTimeFormats(ByVal format As Char, ByVal provider As IFormatProvider) As String( )

[JScript] public function GetDateTimeFormats(format: Char, provider: IFormatProvider): String[ ];

Description

Converts the value of this instance to all of the String representations supported by the specified standard DateTime format specifier and culture-specific formatting information.

Return Value: A String array where each element is the representation of the value of this instance formatted with one of the standard DateTime formatting specifiers.

Each element of the return value is formatted using culture-specific information supplied by provider. A Unicode character containing a format specifier. An System.IFormatProvider interface implementation that supplies culture-specific formatting information about this instance.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for this instance.

Return Value: A 32-bit signed integer hash code.

GetTypeCode

[C#] public TypeCode GetTypeCode( );

[C++] public: _sealed TypeCode GetTypeCode( );

[VB] NotOverridable Public Function GetTypeCode( ) As TypeCode

[JScript] public function GetTypeCode( ): TypeCode;

Description

Returns the TypeCode for value type DateTime.

Return Value: The enumerated constant, System.TypeCode.DateTime.

IsLeapYear

[C#] public static bool IsLeapYear(int year);

[C++] public: static bool IsLeapYear(int year);

[VB] Public Shared Function IsLeapYear(ByVal year As Integer) As Boolean

[JScript] public static function IsLeapYear(year: int): Boolean;

Description

Returns an indication whether the specified year is a leap year.

Return Value: true if the year is a leap year; otherwise, false.

year is specified as a 4-digit base 10 number; for example, 1996. A 4-digit year.

op_Addition

[C#] public static DateTime operator+(DateTime d, TimeSpan t);

[C++] public: static DateTime op_Addition(DateTime d, TimeSpan t);

[VB] returnValue=DateTime.op_Addition(d, t)

[JScript] returnValue=d+t;

Description

Adds a specified time interval to a specified date and time, yielding a new date and time.

Return Value: A DateTime that is the sum of the values of d and t. A date and time. A time interval.

op_Equality

[C#] public static bool operator==(DateTime d1, DateTime d2);

[C++] public: static bool op_Equality(DateTime d1, DateTime d2);

[VB] returnValue=DateTime.op_Equality(d1, d2)

[JScript] returnValue=d1==d2;

Description

Determines whether two specified instances of DateTime are equal.

Return Value: true if d1 and d2 represent the same date and time; otherwise, false. A DateTime. A DateTime.

op_GreaterThan

[C#] public static bool operator>(DateTime t1, DateTime t2);

[C++] public: static bool op_GreaterThan(DateTime t1, DateTime t2);

[VB] returnValue=DateTime.op_GreaterThan(t1, t2)

[JScript] returnValue=t1>t2;

Description

Determines whether one specified DateTime is greater than another specified DateTime.

Return Value: true if t1 is greater than t2; otherwise, false. A DateTime. A DateTime.

op_GreaterThanOrEqual

[C#] public static bool operator>=(DateTime t1, DateTime t2);

[C++] public: static bool op_GreaterThanOrEqual(DateTime t1, DateTime t2);

[VB] returnValue=DateTime.op_GreaterThanOrEqual(t1, t2)

[JScript] returnValue=t1>=t2;

Description

Determines whether one specified DateTime is greater than or equal to another specified DateTime.

Return Value: true if t1 is greater than or equal to t2; otherwise, false. A DateTime. A DateTime.

op_Inequality

[C#] public static bool operator!=(DateTime d1, DateTime d2);

[C++] public: static bool op_Inequality(DateTime d1, DateTime d2);

[VB] returnValue=DateTime.op_Inequality(d1, d2)

[JScript] returnValue=d1 !=d2;

Description

Determines whether two specified instances of DateTime are not equal.

Return Value: true if d1 and d2 do not represent the same date and time; otherwise, false. A DateTime. A DateTime.

op_LessThan

[C#] public static bool operator

[C++] public: static bool op_LessThan(DateTime t1, DateTime t2);

[VB] returnValue=DateTime.op_LessThan(t1, t2)

[JScript] returnValue=t1<t2;

Description

Determines whether one specified DateTime is less than another specified DateTime.

Return Value: true if t1 is less than t2; otherwise, false. A DateTime. A DateTime.

op_LessThanOrEqual

[C#] public static bool operator<=(DateTime t1, DateTime t2);

[C++] public: static bool op_LessThanOrEqual(DateTime t1, DateTime t2);

[VB] returnValue=DateTime.op_LessThanOrEqual(t1, t2)

[JScript] returnValue=t1<=t2;

Description

Determines whether one specified DateTime is less than or equal to another specified DateTime.

Return Value: true if t1 is less than or equal to t2; otherwise, false. A DateTime. A DateTime.

op_Subtraction

[C#] public static TimeSpan operator−(DateTime d1, DateTime d2);

[C++] public: static TimeSpan op_Subtraction(DateTime d1, DateTime d2);

[VB] returnValue=DateTime.op_Subtraction(d1, d2)

[JScript] returnValue=d1−d2;

Description

Subtracts a specified date and time from another specified date and time, yielding a time interval.

Return Value: A System.TimeSpan that is the time interval between d1 and d2; that is, d1 minus d2. A DateTime (the minuend). A DateTime (the subtrahend).

op_Subtraction

[C#] public static DateTime operator−(DateTime d, TimeSpan t);

[C++] public: static DateTime op_Subtraction(DateTime d, TimeSpan t);

[VB] returnValue=DateTime.op Subtraction(d, t)

[JScript] returnValue=d−t; Subtracts a specified System. DateTime or System.TimeSpan instance from a specified System.DateTime instance.

Description

Subtracts a specified time interval from a specified date and time, yielding a new date and time.

Return Value: A DateTime whose value is the value of d minus the value of t.

This method subtracts the ticks values of t from the ticks value of d. A DateTime. A System.TimeSpan.

Parse

[C#] public static DateTime Parse(string s);

[C++] public: static DateTime Parse(String* s);

[VB] Public Shared Function Parse(ByVal s As String) As DateTime

[JScript] public static function Parse(s: String): DateTime; Converts the specified String representation of a date and time to its DateTime equivalent.

Description

Converts the specified String representation of a date and time to its DateTime equivalent.

Return Value: A DateTime equivalent to the date and time contained in s.

This method attempts to parse s completely and avoid throwing FormatException. It ignores unrecognized data if possible and fills in missing month, day, and year information with the current time. A System.String containing a date and time to convert.

Parse

[C#] public static DateTime Parse(string s, IFormatProvider provider);

[C++] public: static DateTime Parse(String* s, IFormatProvider* provider);

[VB] Public Shared Function Parse(ByVal s As String, ByVal provider As IFormatProvider) As DateTime

[JScript] public static function Parse(s: String, provider: IFormatProvider): DateTime;

Description

Converts the specified String representation of a date and time to its DateTime equivalent using the specified culture-specific format information.

Return Value: A DateTime equivalent to the date and time contained in s as specified by provider.

This method attempts to parse s completely and avoid throwing FormatException. It ignores unrecognized data if possible and fills in missing month, day, and year information with the current time. A System.String containing a date and time to convert. An System.IFormatProvider object that supplies culture-specific format information about s.

Parse

[C#] public static DateTime Parse(string s, IFormatProvider provider, DateTimeStyles styles);

[C++] public: static DateTime Parse(String* s, IFormatProvider* provider, DateTimeStyles styles);

[VB] Public Shared Function Parse(ByVal s As String, ByVal provider As IFormatProvider, ByVal styles As Date TimeStyles) As DateTime

[JScript] public static function Parse(s: String, provider: IFormatProvider, styles DateTimeStyles): DateTime;

Description

Converts the specified String representation of a date and time to its DateTime equivalent using the specified culture-specific format information and formatting style.

Return Value: A DateTime equivalent to the date and time contained in s as specified by provider and styles.

This method attempts to parse s completely and avoid throwing FormatException. It ignores unrecognized data if possible and fills in missing month, day, and year information with the current time. A System.String containing a date and time to convert. An System.IFormatProvider interface implementation that supplies culture-specific formatting information about s. The combination of one or more System.Globalization.DateTimeStyles constants that indicate the permitted format of s.

ParseExact

[C#] public static DateTime ParseExact(string s, string format, IFormatProvider provider);

[C++] public: static DateTime ParseExact(String* s, String* format, IFormatProvider* provider);

[VB] Public Shared Function ParseExact(ByVal s As String, ByVal format As String, ByVal provider As IFormatProvider) As DateTime

[JScript] public static function ParseExact(s: String, format: String, provider: IFormatProvider): DateTime; Converts the specified String representation of a date and time to its DateTime equivalent. The format of the String representation must match a specified format exactly.

Description

Converts the specified String representation of a date and time to its DateTime equivalent using the specified format and culture-specific format information. The format of the String representation must match the specified format exactly.

Return Value: A DateTime equivalent to the date and time contained in s as specified by format and provider.

This method throws FormatException if the format of s is not exactly as specified by the format pattern in format. If format consists of a single standard format character, the format pattern that character represents is used. For more information, see the System.Globalization.DateTimeFormatInfo topic. A System.String containing a date and time to convert. The expected format of s. An System.IFormatProvider object that supplies culture-specific format information about s.

ParseExact

[C#] public static DateTime ParseExact(string s, string format, IFormatProvider provider, DateTimeStyles style);

[C++] public: static DateTime ParseExact(String* s, String* format, IFormatProvider* provider, DateTimeStyles style);

[VB] Public Shared Function ParseExact(ByVal s As String, ByVal format As String, ByVal provider As IFormatProvider, ByVal style As DateTimeStyles) As DateTime

[JScript] public static function ParseExact(s: String, format: String, provider: IFormatProvider, style: DateTimeStyles): DateTime;

Description

Converts the specified String representation of a date and time to its DateTime equivalent using the specified format, culture-specific format information, and style. The format of the String representation must match the specified format exactly.

Return Value: A DateTime equivalent to the date and time contained in s as specified by format, provider, and style.

This method throws FormatException if the format of s is not exactly as specified by the format pattern in format. If format consists of a single standard format character, the format pattern that character represents is used. For more information, see the System.Globalization.DateTimeFormatInfo topic. A System.String containing a date and time to convert. The expected format of s. An System.IFormatProvider interface implementation that supplies culture-specific formatting information about s. The combination of one or more System.Globalization.DateTimeStylesconstants that indicate the permitted format of s.

ParseExact

[C#] public static DateTime ParseExact(string s, string[ ] formats, IFormatProvider provider, DateTimeStyles style);

[C++] public: static DateTime ParseExact(String* s, String* formats gc[ ], IFormatProvider* provider, DateTimeStyles style);

[VB] Public Shared Function ParseExact(ByVal s As String, ByVal formats( ) As String, ByVal provider As IFormatProvider, ByVal style As DateTimeStyles) As DateTime

[JScript] public static function ParseExact(s: String, formats: String[ ], provider: IFormatProvider, style: Date TimeStyles): DateTime;

Description

Converts the specified String representation of a date and time to its DateTime equivalent using the specified array of formats, culture-specific format information, and style. The format of the String representation must match at least one of the specified formats exactly.

Return Value: A DateTime equivalent to the date and time contained in s as specified by formats, provider, and style.

This method throws FormatException if the format of s is not exactly as specified by at least one of the format patterns in formats. If an element of formats consists of a single standard format character, the format pattern that character represents is used. For more information, see the System.Globalization.DateTimeFormatInfo topic. A System.String containing one or more dates and times to convert. An array of expected formats of s. An System.IFormatProvider object that supplies culture-specific format information about s. The combination of one or more System.Globalization.Date TimeStylesconstants that indicate the permitted format of s.

Subtract

[C#] public TimeSpan Subtract(DateTime value);

[C++] public: TimeSpan Subtract(DateTime value);

[VB] Public Function Subtract(ByVal value As DateTime) As TimeSpan

[JScript] public function Subtract(value: DateTime): TimeSpan; Subtracts the specified time or duration from this instance.

Description

Subtracts the specified date and time from this instance.

Return Value: A System.TimeSpan interval equal to the date and time represented by this instance minus the date and time represented by value.

This method does not change the value of this DateTime instance. Instead, a new TimeSpan instance is returned whose value is the result of this operation. A instance of DateTime.

Subtract

[C#] public DateTime Subtract(TimeSpan value);

[C++] public: DateTime Subtract(TimeSpan value);

[VB] Public Function Subtract(ByVal value As TimeSpan) As DateTime

[JScript] public function Subtract(value: TimeSpan): DateTime;

Description

Subtracts the specified TimeSpan from this instance.

Return Value: A new DateTime equal to the date and time represented by this instance minus time interval, value This method does not change the value of this DateTime instance. Instead, a new DateTime instance is returned whose value is the result of this operation. An instance of System. TimeSpan.

IConvertible.ToBoolean

[C#] bool IConvertible.ToBoolean(IFormatProvider provider);

[C++] bool IConvertible::ToBoolean(IFormatProvider* provider);

[VB] Function ToBoolean(ByVal provider As IFormatProvider) As Boolean Implements IConvertible.ToBoolean

[JScript] function IConvertible.ToBoolean(provider: IFormatProvider): Boolean;

IConvertible.ToByte

[C#] byte IConvertible.ToByte(IFormatProvider provider);

[C++] unsigned char IConvertible::ToByte(IFormatProvider* provider);

[VB] Function ToByte(ByVal provider As IFormatProvider) As Byte Implements IConvertible.ToByte

[JScript] function IConvertible.ToByte(provider: IFormatProvider): Byte;

IConvertible.ToChar

[C#] char IConvertible.ToChar(IFormatProvider provider);

[C++] _wchar_t IConvertible::ToChar(IFormatProvider* provider);

[VB] Function ToChar(ByVal provider As IFormatProvider) As Char Implements IConvertible.ToChar

[JScript] function IConvertible.ToChar(provider: IFormatProvider): Char;

IConvertible.ToDateTime

[C#] DateTime IConvertible.ToDateTime(IFormatProvider provider);

[C++] DateTime IConvertible::ToDateTime(IFormatProvider* provider);

[VB] Function ToDateTime(ByVal provider As IFormatProvider) As DateTime Implements IConvertible.ToDateTime

[JScript] function IConvertible.ToDateTime(provider: IFormatProvider): DateTime;

IConvertible.ToDecimal

[C#] decimal IConvertible.ToDecimal(IFormatProvider provider);

[C++] Decimal IConvertible::ToDecimal(IFormatProvider* provider);

[VB] Function ToDecimal(ByVal provider As IFormatProvider) As Decimal Implements IConvertible.ToDecimal

[JScript] function IConvertible.ToDecimal(provider: IFormatProvider): Decimal; IConvertible.ToDouble

[C#] double IConvertible.ToDouble(IFormatProvider provider);

[C++] double IConvertible::ToDouble(IFormatProvider* provider);

[VB] Function ToDouble(ByVal provider As IFormatProvider) As Double Implements IConvertible.ToDouble

[JScript] function IConvertible.ToDouble(provider: IFormatProvider): double;

IConvertible.ToInt16

[C#] short IConvertible.ToInt16(IFormatProvider provider);

[C++] short IConvertible::ToInt16(IFormatProvider* provider);

[VB] Function ToInt16(ByVal provider As IFormatProvider) As Short Implements IConvertible.ToInt16

[JScript] function IConvertible.ToInt16(provider: IFormatProvider): Int16;

IConvertible.ToInt32

[C#] int IConvertible.ToInt32(IFormatProvider provider);

[C++] int IConvertible::ToInt32(IFormatProvider* provider);

[VB] Function ToInt32(ByVal provider As IFormatProvider) As Integer Implements IConvertible.ToInt32

[JScript] function IConvertible.ToInt32(provider: IFormatProvider): int;

IConvertible.ToInt64

[C#] long IConvertible.ToInt64(IFormatProvider provider);

[C++]-int64 IConvertible::ToInt64(IFormatProvider* provider);

[VB] Function ToInt64(ByVal provider As IFormatProvider) As Long Implements IConvertible.ToInt64

[JScript] function IConvertible.ToInt64(provider: IFormatProvider): long;

IConvertible.ToSByte

[C#] sbyte IConvertible.ToSByte(IFormatProvider provider);

[C++] char IConvertible::ToSByte(IFormatProvider* provider);

[VB] Function ToSByte(ByVal provider As IFormatProvider) As SByte Implements IConvertible.ToSByte

[JScript] function IConvertible.ToSByte(provider: IFormatProvider): SByte;

IConvertible.ToSingle

[C#] float IConvertible.ToSingle(IFormatProvider provider);

[C++] float IConvertible::ToSingle(IFormatProvider* provider);

[VB] Function ToSingle(ByVal provider As IFormatProvider) As Single Implements IConvertible.ToSingle

[JScript] function IConvertible.ToSingle(provider: IFormatProvider): float;

IConvertible.ToType

[C#] object IConvertible.ToType(Type type, IFormatProvider provider);

[C++] Object* IConvertible::ToType(Type* type, IFormatProvider* provider);

[VB] Function ToType(ByVal type As Type, ByVal provider As IFormatProvider) As Object Implements IConvertible.ToType

[JScript] function IConvertible.ToType(type: Type, provider: IFormatProvider): Object;

IConvertible.ToUInt16

[C#] ushort IConvertible. ToUInt16(IFormatProvider provider);

[C++] unsigned short IConvertible::ToUInt16(IFormatProvider* provider);

[VB] Function ToUInt16(ByVal provider As IFormatProvider) As UInt16 Implements IConvertible.ToUInt16

[JScript] function IConvertible.ToUInt16(provider: IFormatProvider): UInt16;

IConvertible.ToUInt32

[C#] uint IConvertible.ToUInt32(IFormatProvider provider);

[C++] unsigned int IConvertible::ToUInt32(IFormatProvider* provider);

[VB] Function ToUInt32(ByVal provider As IFormatProvider) As UInt32 Implements IConvertible.ToUInt32

[JScript] function IConvertible.ToUInt32(provider: IFormatProvider): UInt32;

IConvertible.ToUInt64

[C#] ulong IConvertible.ToUInt64(IFormatProvider provider);

[C++] unsigned _int64 IConvertible::ToUInt64(IFormatProvider* provider);

[VB] Function ToUInt64(ByVal provider As IFormatProvider) As UInt64 Implements IConvertible.ToUInt64

[JScript] function IConvertible.ToUInt64(provider: IFormatProvider): UInt64;

ToFileTime

[C#] public long ToFileTime( );

[C++] public: _int64 ToFileTime( );

[VB] Public Function ToFileTime( ) As Long

[JScript] public function ToFileTime( ): long;

Description

Converts the value of this instance to the format of the local system file time.

Return Value: The value of this DateTime in the format of the local system file time.

A system file time is a 64-bit unsigned value representing the date and time as the number of 100-nanosecond intervals that have elapsed since 1/1/1601 12:00 AM.

ToLocalTime

[C#] public DateTime ToLocalTime( );

[C++] public: DateTime ToLocalTime( );

[VB] Public Function ToLocalTime( ) As DateTime

[JScript] public function ToLocalTime( ): DateTime;

Description

Converts the current coordinated universal time (UTC) to local time.

Return Value: The DateTime equivalent to the current UTC time, adjusted to the local time zone and daylight saving time.

This method always uses the local time zone when making calculations.

ToLongDateString

[C#] public string ToLongDateString( );

[C++] public: String* ToLongDateString( );

[VB] Public Function ToLongDateString( ) As String

[JScript] public function ToLongDateString( ): String;

Description

Converts the date denoted by this instance to its equivalent long date String representation.

Return Value: A String containing the name of the day of the week, the name of the month, the numeric day of the month, and the year equivalent to the date value of this instance.

The value of this instance is formatted using the long date format character, 'D'.

ToLongTimeString

[C#] public string ToLongTimeString( );

[C++] public: String* ToLongTimeString( );

[VB] Public Function ToLongTimeString( ) As String

[JScript] public function ToLongTimeString( ): String;

Description

Converts the time denoted by this instance to its equivalent long time String representation.

Return Value: A String containing the name of the day of the week, the name of the month, the numeric day of the hours, minutes, and seconds equivalent to the time value of this instance.

The value of this instance is formatted using the long time format character, 'T'.

ToOADate

[C#] public double ToOADate( );

[C++] public: double ToOADate( );

[VB] Public Function ToOADate ( ) As Double

[JScript] public function ToOADate( ): double;

Description

Converts the value of this instance to the equivalent OLE Automation date.

Return Value: A double-precision floating point number that contains an OLE Automation date equivalent to the value of this instance.

An OLE Automation date is implemented as a floating-point number whose value is the number of days from midnight, 30 Dec. 1899. For example, midnight, 31 Dec. 1899 is represented by 1.0; 6 AM, 1 Jan. 1900 is represented by 2.25; midnight, 29 Dec. 1899 represented by −1.0; and 6 AM, 29 Dec. 1899 represented by −1.25.

ToShortDateString

[C#] public string ToShortDateString( );

[C++] public: String* ToShortDateString( );

[VB] Public Function ToShortDateString( ) As String

[JScript] public function ToShortDateString( ): String;

Description

Converts the date denoted by this instance to its equivalent short date String representation.

Return Value: A String containing the numeric month, the numeric day of the month, and the year equivalent to the date value of this instance.

The value of this instance is formatted using the short date format character, ‘d’.

ToShortTimeString

[C#] public string ToShortTimeString( );

[C++] public: String* ToShortTimeString( );

[VB] Public Function ToShortTimeString( ) As String

[JScript] public function ToShortTimeString( ): String;

Description

Converts the time denoted by this instance to its equivalent short time String representation.

Return Value: A String containing the name of the day of the week, the name of the month, the numeric day of the hours, minutes, and seconds equivalent to the time value of this instance.

The value of this instance is formatted using the short time format character, ‘t’.

ToString

[C#] public override string ToString( );

[C++] public: String* ToString( );

[VB] Overrides Public Function ToString( ) As String

[JScript] public override function ToString( ): String; Converts the value of this instance to its equivalent String representation.

Description

Converts the value of this instance to its equivalent String.

Return Value: A String representation of value of this instance.

The value of this instance is formatted using the general format specifier, ‘G’, as described in the topic. The return value is of the following form: MM/dd/yyyy HH:mm:ss The items in the return value are as follows.

ToString

[C#] public string ToString(IFormatProvider provider);

[C++] public: _sealed String* ToString(IFormatProvider* provider);

[VB] NotOverridable Public Function ToString(ByVal provider As IFormatProvider) As String

[JScript] public function ToString(provider: IFormatProvider): String;

Description

Converts the value of this instance to its equivalent String representation using the specified culture-specific format information.

Return Value: A String representation of value of this instance as specified by provider.

This instance is formatted with the general format specifier, ‘G’. An System.IFormatProvider interface implementation that supplies culture-specific formatting information.

ToString

[C#] public string ToString(string format);

[C++] public: String* ToString(String* format);

[VB] Public Function ToString(ByVal format As String) As String

[JScript] public function ToString(format: String): String;

Description

Converts the value of this instance to its equivalent String representation using the specified format.

Return Value: A String representation of value of this instance as specified by format.

The format parmeter should contain either a format specifier character or a custom format pattern. For more information, see the summary page for System.Globalization.DateTimeFormatInfo. A format string.

ToString

[C#] public string ToString(string format, IFormatProvider provider);

[C++] public: _sealed String* ToString(String* format, IFormatProvider* provider);

[VB] NotOverridable Public Function ToString(ByVal format As String, ByVal provider As IFormatProvider) As String

[JScript] public function ToString(format: String, provider: IFormatProvider): String;

Description

Converts the value of this instance to its equivalent String representation using the specified format and culture-specific format information.

Return Value: A String representation of value of this instance as specified by format and provider.

The format parameter should contain either a format specifier character or a custom format pattern. For more information, see the summary page for System.Globalization.DateTimeFormatInfo. A format string. An System.IFormatProvider interface implementation that supplies culture-specific formatting information.

ToUniversalTime

[C#] public DateTime ToUniversalTime( );

[C++] public: DateTime ToUniversalTime( );

[VB] Public Function ToUniversalTime( ) As DateTime

[JScript] public function ToUniversalTime( ): DateTime;

Description

Converts the current local time to coordinated universal time (UTC).

Return Value: The UTC DateTime equivalent to the current local time.

The UTC time is equal to the local time minus the UTC offset. For more information about the UTC offset, see System.TimeZone.GetUtcOffset(System.DateTime).

DayOfWeek enumeration (System)

ToUniversalTime

Description

Specifies the day of the week.

The DayOfWeek enumeration represents the day of the week in calendars that have seven days per week. This enumeration ranges from zero, indicating Sunday, to six, indicating Saturday.

ToUniversalTime

[C#] public const DayOfWeek Friday;

[C++] public: const DayOfWeek Friday;

[VB] Public Const Friday As DayOfWeek

[JScript] public var Friday: DayOfWeek;

Description

Indicates Friday.

ToUniversalTime

[C#] public const DayOfWeek Monday;

[C++] public: const DayofWeek Monday;

[VB] Public Const Monday As DayofWeek

[JScript] public var Monday: DayofWeek;

Description

Indicates Monday.

ToUniversalTime

[C#] public const DayofWeek Saturday;

[C++] public: const DayofWeek Saturday;

[VB] Public Const Saturday As DayofWeek

[JScript] public var Saturday: DayofWeek;

Description

Indicates Saturday.

ToUniversalTime

[C#] public const DayOfWeek Sunday;

[C++] public: const DayOfWeek Sunday;

[VB] Public Const Sunday As DayOfWeek

[JScript] public var Sunday: DayOfWeek;

Description

Indicates Sunday.

ToUniversalTime

[C#] public const DayOfWeek Thursday;

[C++] public: const DayofWeek Thursday;

[VB] Public Const Thursday As DayOfWeek

[JScript] public var Thursday: DayOfWeek;

Description

Indicates Thursday.

ToUniversalTime

[C#] public const DayOfWeek Tuesday;

[C++] public: const DayOfWeek Tuesday;

[VB] Public Const Tuesday As DayOfWeek

[JScript] public var Tuesday: DayOfWeek;

Description

Indicates Tuesday.

ToUniversalTime

[C#] public const DayOfWeek Wednesday;

[C++] public: const DayofWeek Wednesday;

[VB] Public Const Wednesday As DayOfWeek

[JScript] public var Wednesday: DayOfWeek;

Description

Indicates Wednesday.

DBNull class (System)

ToString

Description

Represents a null value.

This class is used to indicate the absence of a known value, typically in a database application.

ToString

[C#] public static readonly DBNull Value;

[C++] public: static DBNull* Value;

[VB] Public Shared ReadOnly Value As DBNull

[JScript] public static var Value: DBNull;

Description

Represents the sole instance of the System.DBNull class.

System.DBNull is a singleton class, which means only this instance of this class can exist.

GetObjectData

[C#] public void GetObjectData(SerializationInfo info, StreamingContext context);

[C++] public: _sealed void GetObjectData(SerializationInfo* info, StreamingContext context);

[VB] NotOverridable Public Sub GetObjectData(ByVal info As SerializationInfo, ByVal context As StreamingContext)

[JScript] public function GetObjectData(info: SerializationInfo, context: StreamingContext);

Description

Implements the System.Runtime.Serialization.ISerializable interface and returns the data needed to serialize the System.DBNull object. A System.Runtime.Serialization.SerializationInfo object containing information required to serialize the System.DBNull object. A System.Runtime.Serialization.StreamingContext object containing the source and destination of the serialized stream associated with the System.DBNull object.

GetTypeCode

[C#] public TypeCode GetTypeCode( );

[C++] public: _sealed TypeCode GetTypeCode( );

[VB] NotOverridable Public Function GetTypeCode( ) As TypeCode

[JScript] public function GetTypeCode( ): TypeCode;

Description

Gets the System.TypeCode value for System.DBNull.

Return Value: The System.TypeCode value for System.DBNull, which is System.TypeCode.DBNull.

IConvertible.ToBoolean

[C#] bool IConvertible.ToBoolean(IFormatProvider provider);

[C++] bool IConvertible::ToBoolean(IFormatProvider* provider);

[VB] Function ToBoolean(ByVal provider As IFormatProvider) As Boolean Implements IConvertible.ToBoolean

[JScript] function IConvertible.ToBoolean(provider: IFormatProvider): Boolean;

IConvertible.ToByte

[C#] byte IConvertible.ToByte(IFormatProvider provider);

[C++] unsigned char IConvertible::ToByte(IFormatProvider* provider);

[VB] Function ToByte(ByVal provider As IFormatProvider) As Byte Implements IConvertible.ToByte

[JScript] function IConvertible.ToByte(provider: IFormatProvider): Byte;

IConvertible.ToChar

[C#] char IConvertible.ToChar(IFormatProvider provider);

[C++] wchar_t IConvertible::ToChar(IFormatProvider* provider);

[VB] Function ToChar(ByVal provider As IFormatProvider) As Char Implements IConvertible.ToChar

[JScript] function IConvertible.ToChar(provider: IFormatProvider): Char;

IConvertible.ToDateTime

[C#] DateTime IConvertible.ToDateTime(IFormatProvider provider);

[C++] DateTime IConvertible::ToDateTime(IFormatProvider* provider);

[VB] Function ToDateTime(ByVal provider As IFormatProvider) As DateTime Implements IConvertible.ToDateTime

[JScript] function IConvertible.ToDateTime(provider: IFormatProvider): DateTime;

IConvertible.ToDecimal

[C#] decimal IConvertible.ToDecimal(IFormatProvider provider);

[C++] Decimal IConvertible::ToDecimal(IFormatProvider* provider);

[VB] Function ToDecimal(ByVal provider As IFormatProvider) As Decimal Implements IConvertible.ToDecimal

[JScript] function IConvertible.ToDecimal(provider: IFormatProvider): Decimal;

IConvertible.ToDouble

[C#] double IConvertible.ToDouble(IFormatProvider provider);

[C++] double IConvertible::ToDouble(IFormatProvider* provider);

[VB] Function ToDouble(ByVal provider As IFormatProvider) As Double Implements IConvertible.ToDouble

[JScript] function IConvertible.ToDouble(provider: IFormatProvider): double;

IConvertible.ToInt16

[C#] short IConvertible.ToInt16(IFormatProvider provider);

[C++] short IConvertible::ToInt16(IFormatProvider* provider);

[VB] Function ToInt16(ByVal provider As IFormatProvider) As Short Implements IConvertible.ToInt16

[JScript] function IConvertible.ToInt16(provider: IFormatProvider): Int16;

IConvertible.ToInt32

[C#] int IConvertible.ToInt32(IFormatProvider provider);

[C++] int IConvertible::ToInt32(IFormatProvider* provider);

[VB] Function ToInt32(ByVal provider As IFormatProvider) As Integer Implements IConvertible.ToInt32

[JScript] function IConvertible.ToInt32(provider: IFormatProvider): int;

IConvertible.ToInt64

[C#] long IConvertible.ToInt64(IFormatProvider provider);

[C++] _int64 IConvertible::ToInt64(IFormatProvider* provider);

[VB] Function ToInt64(ByVal provider As IFormatProvider) As Long Implements IConvertible.ToInt64

[JScript] function IConvertible.ToInt64(provider: IFormatProvider): long;

IConvertible.ToSByte

[C#] sbyte IConvertible.ToSByte(IFormatProvider provider);

[C++] char IConvertible::ToSByte(IFormatProvider* provider);

[VB] Function ToSByte(ByVal provider As IFormatProvider) As SByte Implements IConvertible.ToSByte

[JScript] function IConvertible.ToSByte(provider: IFormatProvider): SByte;

IConvertible.ToSingle

[C#] float IConvertible.ToSingle(IFormatProvider provider);

[C++] float IConvertible::ToSingle(IFormatProvider* provider);

[VB] Function ToSingle(ByVal provider As IFormatProvider) As Single Implements IConvertible.ToSingle

[JScript] function IConvertible.ToSingle(provider: IFormatProvider): float;

IConvertible.ToType

[C#] object IConvertible.ToType(Type type, IFormatProvider provider);

[C++] Object* IConvertible::ToType(Type* type, IFormatProvider* provider);

[VB] Function ToType(ByVal type As Type, ByVal provider As IFormatProvider) As Object Implements IConvertible.ToType

[JScript] function IConvertible.ToType(type: Type, provider: IFormatProvider): Object;

IConvertible.ToUInt16

[C#] ushort IConvertible. ToUInt16(IFormatProvider provider);

[C++] unsigned short IConvertible::ToUInt16(IFormatProvider* provider);

[VB] Function ToUInt16(ByVal provider As IFormatProvider) As UInt16 Implements IConvertible.ToUInt16

[JScript] function IConvertible.ToUInt16(provider: IFormatProvider): UInt16;

IConvertible.ToUInt32

[C#] uint IConvertible.ToUInt32(IFormatProvider provider);

[C++] unsigned int IConvertible::ToUInt32(IFormatProvider* provider);

[VB] Function ToUInt32(ByVal provider As IFormatProvider) As UInt32 Implements IConvertible.ToUInt32

[JScript] function IConvertible.ToUInt32(provider: IFormatProvider): UInt32;

IConvertible.ToUInt64

[C#] ulong IConvertible.ToUInt64(IFormatProvider provider);

[C++] unsigned _int64 IConvertible::ToUInt64(IFormatProvider* provider);

[VB] Function ToUInt64(ByVal provider As IFormatProvider) As UInt64 Implements IConvertible.ToUInt64

[JScript] function IConvertible.ToUInt64(provider: IFormatProvider): UInt64;

ToString

[C#] public override string ToString( );

[C++] public: String* ToString( );

[VB] Overrides Public Function ToString( ) As String

[JScript] public override function ToString( ): String; Returns an empty string.

Description

Returns an empty string (System.String.Empty).

Return Value: An empty string (System.String.Empty).

ToString

[C#] public string ToString(IFormatProvider provider);

[C++] public: _sealed String* ToString(IFormatProvider* provider);

[VB] NotOverridable Public Function ToString(ByVal provider As IFormatProvider) As String

[JScript] public function ToString(provider: IFormatProvider): String;

Description

Returns an empty string using the specified System.IFormatProvider

Return Value: An empty string (System.String.Empty). The System.IFormatProvider to be used to format the string.

Decimal structure (System)

ToString

Description

Represents a decimal number.

The Decimal value type represents decimal numbers ranging from positive 79,228,162,514,264,337,593,543,950,335 to negative 79,228,162,514,264,337,593,543,950,335. The Decimal value type is appropriate for financial calculations requiring large numbers of significant integral and fractional digits and no round-off errors.

ToString

[C#] public static readonly decimal MaxValue;

[C++] public: static Decimal MaxValue;

[VB] Public Shared ReadOnly MaxValue As Decimal

[JScript] public static var MaxValue: Decimal;

Description

A constant representing the largest possible value of Decimal The value of this constant is positive 79,228,162,514,264,337,593,543,950,335.

ToString

[C#] public static readonly decimal MinusOne;

[C++] public: static Decimal MinusOne;

[VB] Public Shared ReadOnly MinusOne As Decimal

[JScript] public static var MinusOne: Decimal;

Description

A constant representing the number, negative one.

ToString

[C#] public static readonly decimal MinValue;

[C++] public: static Decimal MinValue;

[VB] Public Shared ReadOnly MinValue As Decimal

[JScript] public static var MinValue: Decimal;

Description

A constant representing the smallest possible value of Decimal.

The value of this constant is negative 79,228,162,514,264,337,593,543,950,335.

ToString

[C#] public static readonly decimal One;

[C++] public: static Decimal One;

[VB] Public Shared ReadOnly One As Decimal

[JScript] public static var One: Decimal;

Description

A constant representing the number, one.

ToString

[C#] public static readonly decimal Zero;

[C++] public: static Decimal Zero;

[VB] Public Shared ReadOnly Zero As Decimal

[JScript] public static var Zero: Decimal;

Description

A constant representing the number, zero.

Decimal

Example Syntax:

ToString

[C#] public Decimal(double value);

[C++] public: Decimal(double value);

[VB] Public Sub New(ByVal value As Double)

[JScript] public function Decimal(value: double);

Description

Initializes a new instance of Decimal to the value of the specified double-precision floating point number. The value to represent as a Decimal.

Decimal

Example Syntax:

ToString

[C#] public Decimal(int value);

[C++] public: Decimal(int value);

[VB] Public Sub New(ByVal value As Integer)

[JScript] public function Decimal(value: int); Initializes a new instance of Decimal.

Description

Initializes a new instance of Decimal to the value of the specified 32-bit signed integer. The value to represent as a Decimal.

Decimal

Example Syntax:

ToString

[C#] public Decimal(int[ ] bits);

[C++] public: Decimal(int bits gc[ ]);

[VB] Public Sub New(ByVal bits( ) As Integer)

[JScript] public function Decimal(bits: int[ ]);

Description

Initializes a new instance of Decimal to a decimal value represented in binary and contained in a specified array.

The binary representation of a Decimal number consists of a 1-bit sign, a 96-bit integer number, and a scaling factor used to divide the integer number and specify what portion of it is a decimal fraction. The scaling factor is implicitly the number 10, raised to an exponent ranging from 0 to 28. An array of 32-bit signed integers containing a representation of a decimal value.

Decimal

Example Syntax:

ToString

[C#] public Decimal(long value);

[C++] public: Decimal(_int64 value);

[VB] Public Sub New(ByVal value As Long)

[JScript] public function Decimal(value: long);

Description

Initializes a new instance of Decimal to the value of the specified 64-bit signed integer. The value to represent as a Decimal.

Decimal

Example Syntax:

ToString

[C#] public Decimal(float value);

[C++] public: Decimal(float value);

[VB] Public Sub New(ByVal value As Single)

[JScript] public function Decimal(value: float);

Description

Initializes a new instance of Decimal to the value of the specified single-precision floating point number. The value to represent as a Decimal.

Decimal

Example Syntax:

ToString

[C#] public Decimal(uint value);

[C++] public: Decimal(unsigned int value);

[VB] Public Sub New(ByVal value As UInt32)

[JScript] public function Decimal(value: UInt32);

Description

Initializes a new instance of Decimal to the value of the specified 32-bit unsigned integer. The value to represent as a Decimal.

Decimal

Example Syntax:

ToString

[C#] public Decimal(ulong value);

[C++] public: Decimal(unsigned _int64 value);

[VB] Public Sub New(ByVal value As UInt64)

[JScript] public function Decimal(value: UInt64);

Description

Initializes a new instance of Decimal to the value of the specified 64-bit unsigned integer. The value to represent as a Decimal.

Decimal

Example Syntax:

ToString

[C#] public Decimal(int lo, int mid, int hi, bool is Negative, byte scale);

[C++] public: Decimal(int lo, int mid, int hi, bool is Negative, unsigned char scale);

[VB] Public Sub New(ByVal lo As Integer, ByVal mid As Integer, ByVal hi As Integer, ByVal is Negative As Boolean, ByVal scale As Byte)

[JScript] public function Decimal(lo: int, mid: int, hi: int, is Negative: Boolean, scale: Byte);

Description

Initializes a new instance of Decimal from parameters specifying the instance's constituent parts.

The binary representation of a Decimal number consists of a 1-bit sign, a 96-bit integer number, and a scaling factor used to divide the integer number and specify what portion of it is a decimal fraction. The scaling factor is implicitly the number 10, raised to an exponent ranging from 0 to 28. The low 32 bits of a 96-bit integer. The middle 32 bits of a 96-bit integer. The high 32 bits of a 96-bit integer. The sign; 1 is negative, 0 is positive. A power of 10 ranging from 0 to 28.

Add

[C#] public static decimal Add(decimal d1, decimal d2);

[C++] public: static Decimal Add(Decimal d1, Decimal d2);

[VB] Public Shared Function Add(ByVal d1 As Decimal, ByVal d2 As Decimal) As Decimal

[JScript] public static function Add(d1: Decimal, d2: Decimal): Decimal;

Description

Adds two specified Decimal values.

Return Value: A Decimal value that is the sum of d1 and d2. A Decimal. A Decimal.

Compare

[C#] public static int Compare(decimal d1, decimal d2);

[C++] public: static int Compare(Decimal d1, Decimal d2);

[VB] Public Shared Function Compare(ByVal d1 As Decimal, ByVal d2 As Decimal) As Integer

[JScript] public static function Compare(d1: Decimal, d2: Decimal): int;

Description

Compares two specified Decimal values.

Return Value: A signed number indicating the relative values of d1 and d2. A Decimal. A Decimal.

CompareTo

[C#] public int CompareTo(object value);

[C++] public: _sealed int CompareTo(Object* value);

[VB] NotOverridable Public Function CompareTo(ByVal value As Object) As Integer

[JScript] public function CompareTo(value: Object): int;

Description

Compares this instance to a specified Object.

Return Value: A signed number indicating the relative values of this instance and value.

Any instance of Decimal, regardless of its value, is considered greater than null. An System.Object or null.

Divide

[C#] public static decimal Divide(decimal d1, decimal d2);

[C++] public: static Decimal Divide(Decimal d1, Decimal d2);

[VB] Public Shared Function Divide(ByVal d1 As Decimal, ByVal d2 As Decimal) As Decimal

[JScript] public static function Divide(d1: Decimal, d2: Decimal): Decimal;

Description

Divides two specified Decimal values.

Return Value: The Decimal that is the result of dividing d1 by d2. A Decimal (the dividend). A Decimal (the divisor).

Equals

[C#] public override bool Equals(object value);

[C++] public: bool Equals(Object* value);

[VB] Overrides Public Function Equals(ByVal value As Object) As Boolean

[JScript] public override function Equals(value: Object): Boolean; Returns a value indicating whether two instances of Decimal are equal.

Description

Returns a value indicating whether this instance and a specified Object are equal.

Return Value: true if value is a Decimal and equal to this instance; otherwise, false. An System.Object.

Equals

[C#] public static new bool Equals(decimal d1, decimal d2);

[C++] public: static bool Equals(Decimal d1, Decimal d2);

[VB] Shadows Public Shared Function Equals(ByVal d1 As Decimal, ByVal d2 As Decimal) As Boolean

[JScript] public static hide function Equals(d1: Decimal, d2: Decimal): Boolean;

Description

Returns a value indicating whether two specified instances of Decimal are equal.

Return Value: true if d1 and d2 are equal; otherwise, false. A Decimal. A Decimal.

Floor

[C#] public static decimal Floor(decimal d);

[C++] public: static Decimal Floor(Decimal d);

[VB] Public Shared Function Floor(ByVal d As Decimal) As Decimal

[JScript] public static function Floor(d: Decimal): Decimal;

Description

Rounds a specified Decimal number to the next lower whole number.

Return Value: If d has a fractional part, the next whole Decimal number towards negative infinity that is less than d.—or—If d doesn't have a fractional part, d is returned unchanged. A Decimal.

FromOACurrency

[C#] public static decimal FromOACurrency(long cy);

[C++] public: static Decimal FromOACurrency(_int64 cy);

[VB] Public Shared Function FromOACurrency(ByVal cy As Long) As Decimal

[JScript] public static function FromOACurrency(cy: long): Decimal;

Description

Converts the specified 64-bit signed integer, which contains an OLE Automation Currency value, to the equivalent Decimal value.

Return Value: A Decimal that contains the equivalent of cy. An OLE Automation Currency value.

GetBits

[C#] public static int[ ] GetBits(decimal d);

[C++] public: static int GetBits(Decimal d) _gc[ ];

[VB] Public Shared Function GetBits(ByVal d As Decimal) As Integer( )

[JScript] public static function GetBits(d: Decimal): int[ ];

Description

Converts the value of a specified instance of Decimal to its equivalent binary representation, and returns that representation in an array of 32-bit signed integers.

Return Value: A 32-bit integer array with four elements that contain the binary representation of d.

The binary representation of a Decimal number consists of a 1-bit sign, a 96-bit integer number, and a scaling factor used to divide the integer number and specify what portion of it is a decimal fraction. The scaling factor is implicitly the number 10, raised to an exponent ranging from 0 to 28. A Decimal value.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for this instance.

Return Value: A 32-bit signed integer hash code.

GetTypeCode

[C#] public TypeCode GetTypeCode( );

[C++] public: _sealed TypeCode GetTypeCode( );

[VB] NotOverridable Public Function GetTypeCode( ) As TypeCode

[JScript] public function GetTypeCode( ): TypeCode;

Description

Returns the TypeCode for value type Decimal.

Return Value: The enumerated constant, System.TypeCode.Decimal.

Multiply

[C#] public static decimal Multiply(decimal d1, decimal d2);

[C++] public: static Decimal Multiply(Decimal d1, Decimal d2);

[VB] Public Shared Function Multiply(ByVal d1 As Decimal, ByVal d2 As Decimal) As Decimal

[JScript] public static function Multiply(d1: Decimal, d2: Decimal): Decimal;

Description

Multiplies two specified Decimal values.

Return Value: A Decimal that is the result of multiplying d1 and d2. A Decimal (the multiplicand). A Decimal (the multiplier).

Negate

[C#] public static decimal Negate(decimal d);

[C++] public: static Decimal Negate(Decimal d);

[VB] Public Shared Function Negate(ByVal d As Decimal) As Decimal

[JScript] public static function Negate(d: Decimal): Decimal;

Description

Negates the value of a specified Decimal.

Return Value: A Decimal with the value of d, but the opposite sign.

The Negate method returns the negative of the specified Decimal value. For example: If d is non-zero, the result is −d. A Decimal.

op_Addition

[C#] public static decimal operator+(decimal d1, decimal d2);

[C++] public: static Decimal op_Addition(Decimal d1, Decimal d2);

[VB] returnValue=Decimal.op_Addition(d1, d2)

[JScript] returnValue=d1+d2;

Description

Adds two specified Decimal values.

Return Value: The Decimal result of adding d1 and d2. A Decimal. A Decimal.

op_Decrement

[C#] public static decimal operator−(decimal d);

[C++] public: static Decimal op_Decrement(Decimal d);

[VB] returnValue=Decimal.op_Decrement(d)

[JScript] returnValue=d−;

Description

Decrements the Decimal operand by 1.

Return Value: The value of d decremented by 1. The Decimal operand.

op_Division

[C#] public static decimal operator/(decimal d1, decimal d2);

[C++] public: static Decimal op_Division(Decimal d1, Decimal d2);

[VB] returnValue=Decimal.op_Division(d1, d2)

[JScript] returnValue=d1/d2;

Description

Divides two specified Decimal values.

Return Value: The Decimal result of d1 by d2. A Decimal (the dividend). A Decimal (the divisor).

op_Equality

[C#] public static bool operator==(decimal d1, decimal d2);

[C++] public: static bool op_Equality(Decimal d1, Decimal d2);

[VB] returnValue=Decimal.op_Equality(d1, d2)

[JScript] returnValue=d1==d2;

Description

Returns a value indicating whether two instances of Decimal are equal.

Return Value: true if d1 and d2 are equal; otherwise, false. A Decimal. A Decimal.

op_Explicit

[C#] public static explicit operator ushort(decimal value);

[C++] public: static unsigned short op_Explicit( );

[VB] returnValue=Decimal.op_Explicit(value)

[JScript] returnValue=UInt16(value);

Description

Converts a Decimal to a 16-bit unsigned integer.

Return Value: A 16-bit unsigned integer that represents the converted Decimal. A Decimal to convert.

op_Explicit

[C#] public static explicit operator int(decimal value);

[C++] public: static int op_Explicit( );

[VB] returnValue=Decimal.op_Explicit(value)

[JScript] returnValue=Int32(value);

Description

Converts a Decimal to a 32-bit signed integer.

Return Value: A 32-bit signed integer that represents the converted Decimal. A Decimal to convert.

op_Explicit

[C#] public static explicit operator byte(decimal value);

[C++] public: static unsigned char op_Explicit( );

[VB] returnValue=Decimal.op_Explicit(value)

[JScript] returnValue=Byte(value);

Description

Converts a Decimal to an 8-bit unsigned integer.

Return Value: An 8-bit unsigned integer that represents the converted Decimal. A Decimal to convert.

op_Explicit

[C#] public static explicit operator sbyte(decimal value);

[C++] public: static char op_Explicit( );

[VB] returnValue=Decimal.op_Explicit(value)

[JScript] returnValue=SByte(value);

Description

Converts a Decimal to an 8-bit signed integer.

Return Value: An 8-bit signed integer that represents the converted Decimal. A Decimal to convert.

op_Explicit

[C#] public static explicit operator char(decimal value);

[C++] public: static _wchar_t op_Explicit( );

[VB] returnValue=Decimal.op_Explicit(value)

[JScript] returnValue=Char(value);

Description

Converts a Decimal to a Unicode character.

Return Value: A Unicode character that represents the converted Decimal. A Decimal to convert.

op_Explicit

[C#] public static explicit operator short(decimal value);

[C++] public: static short op_Explicit( );

[VB] returnValue=Decimal.op_Explicit(value)

[JScript] returnValue=Int16(value);

Description
Converts a Decimal to a 16-bit signed integer.

Return Value: A 16-bit signed integer that represents the converted Decimal. A Decimal to convert.
op_Explicit
[C#] public static explicit operator float(decimal value);
[C++] public: static float op_Explicit( );
[VB] returnValue=Decimal.op_Explicit(value)
[JScript] returnValue=Single(value);

Description
Converts a Decimal to a single-precision floating point number.

Return Value: A single-precision floating point number that represents the converted Decimal. A Decimal to convert.
op_Explicit
[C#] public static explicit operator double(decimal value);
[C++] public: static double op_Explicit( );
[VB] returnValue=Decimal.op_Explicit(value)
[JScript] returnValue=Double(value);

Description
Converts a Decimal to a double-precision floating point number.

Return Value: A double-precision floating point number that represents the converted Decimal. A Decimal to convert.

op_Explicit
[C#] public static explicit operator ulong(decimal value);
[C++] public: static unsigned _int64 op_Explicit( );
[VB] returnValue=Decimal.op_Explicit(value)
[JScript] returnValue=UInt64(value);

Description
Converts a Decimal to a 64-bit unsigned integer.

Return Value: A 64-bit unsigned integer that represents the converted Decimal. A Decimal to convert.
op_Explicit
[C#] public static explicit operator uint(decimal value);
[C++] public: static unsigned int op_Explicit( );
[VB] returnValue=Decimal.op_Explicit(value)
[JScript] returnValue=UInt32(value);

Description
Converts a Decimal to a 32-bit unsigned integer.

Return Value: A 32-bit unsigned integer that represents the converted Decimal. A Decimal to convert.
op_Explicit
[C#] public static explicit operator long(decimal value);
[C++] public: static _int64 op_Explicit( );
[VB] returnValue=Decimal.op_Explicit(value)
[JScript] returnValue=Int64(value);

Description
Converts a Decimal to a 64-bit signed integer.

Return Value: A 64-bit signed integer that represents the converted Decimal. A Decimal to convert.
op_Explicit
[C#] public static explicit operator decimal(double value);
[C++] public: static Decimal op_Explicit(double value);
[VB] returnValue=Decimal.op_Explicit(value)
[JScript] returnValue=Decimal(value);

Description
Converts a double-precision floating point number to a Decimal.

Return Value: A Decimal that represents the converted double-precision floating point number. A double-precision floating point number.
op_Explicit
[C#] public static explicit operator decimal(float value);
[C++] public: static Decimal op_Explicit(float value);
[VB] returnValue=Decimal.op_Explicit(value)
[JScript] returnValue=Decimal(value);

Description
Converts a single-precision floating point number to a Decimal.

Return Value: A Decimal that represents the converted single-precision floating point number. A single-precision floating point number.
op_GreaterThan
[C#] public static bool operator>(decimal d1, decimal d2);
[C++] public: static bool op_GreaterThan(Decimal d1, Decimal d2);
[VB] returnValue=Decimal.op_GreaterThan(d1, d2)
[JScript] returnValue=d1>d2;

Description
Returns a value indicating whether a specified Decimal is greater than another specified Decimal.

Return Value: true if d1 is greater than d2; otherwise, false. A Decimal. A Decimal.

op_GreaterThanOrEqual
[C#] public static bool operator>=(decimal d1, decimal d2);
[C++] public: static bool op_GreaterThanOrEqual(Decimal d1, Decimal d2);
[VB] returnValue=Decimal.op_GreaterThanOrEqual(d1, d2)
[JScript] returnValue=d1>=d2;

Description
Returns a value indicating whether a specified Decimal is greater than or equal to another specified Decimal.

Return Value: true if d1 is greater than or equal to d2; otherwise, false. A Decimal. A Decimal.
op_Implicit
[C#] public static implicit operator decimal(byte value);
[C++] public: static Decimal op_Implicit(unsigned char value);
[VB] returnValue=Decimal.op_Implicit(value)
[JScript] returnValue=value;

Description
Converts an 8-bit unsigned integer to a Decimal.

Return Value: A Decimal that represents the converted 8-bit unsigned integer. An 8-bit unsigned integer.

op_Implicit
[C#] public static implicit operator decimal(char value);
[C++] public: static Decimal op_Implicit(_wchar_t value);
[VB] returnValue=Decimal.op_Implicit(value)
[JScript] returnValue=value;

Description
Converts a Unicode character to a Decimal.

Return Value: A Decimal that represents the converted Unicode character. A Unicode character.
op_Implicit
[C#] public static implicit operator decimal(short value);
[C++] public: static Decimal op_Implicit(short value);
[VB] returnValue=Decimal.op_Implicit(value)
[JScript] returnValue=value;

Description
Converts a 16-bit signed integer to a Decimal.

Return Value: A Decimal that represents the converted 16-bit signed integer. A 16-bit signed integer.

op_Implicit
[C#] public static implicit operator decimal(int value);
[C++] public: static Decimal op_Implicit(int value);
[VB] returnValue=Decimal.op_Implicit(value)
[JScript] returnValue=value;

Description
Converts a 32-bit signed integer to a Decimal.

Return Value: A Decimal that represents the converted 32-bit signed integer. A 32-bit signed integer.

op_Implicit
[C#] public static implicit operator decimal(long value);
[C++] public: static Decimal op_Implicit(_int64 value);
[VB] returnValue=Decimal.op_Implicit(value)
[JScript] returnValue=value;

Description
Converts a 64-bit signed integer to a Decimal.

Return Value: A Decimal that represents the converted 64-bit signed integer. A 64-bit signed integer.

op_Implicit
[C#] public static implicit operator decimal(sbyte value);
[C++] public: static Decimal op_Implicit(char value);
[VB] returnValue=Decimal.op_Implicit(value)
[JScript] returnValue=value;

Description
Converts an 8-bit signed integer to a Decimal.

Return Value: A Decimal that represents the converted 8-bit signed integer. An 8-bit signed integer.

op_Implicit
[C#] public static implicit operator decimal(ushort value);
[C++] public: static Decimal op_Implicit(unsigned short value);
[VB] returnValue=Decimal.op_Implicit(value)
[JScript] returnValue=value;

Description
Converts a 16-bit unsigned integer to a Decimal.

Return Value: A Decimal that represents the converted 16-bit unsigned integer. A 16-bit unsigned integer.

op_Implicit
[C#] public static implicit operator decimal(uint value);
[C++] public: static Decimal op_Implicit(unsigned int value);
[VB] returnValue=Decimal.op_Implicit(value)
[JScript] returnValue=value;

Description
Converts a 32-bit unsigned integer to a Decimal.

Return Value: A Decimal that represents the converted 32-bit unsigned integer. A 32-bit unsigned integer.

op_Implicit
[C#] public static implicit operator decimal(ulong value);
[C++] public: static Decimal op_Implicit(unsigned _int64 value);
[VB] returnValue=Decimal.op_Implicit(value)
[JScript] returnValue=value;

Description
Converts a 64-bit unsigned integer to a Decimal.

Return Value: A Decimal that represents the converted 64-bit unsigned integer. A 64-bit unsigned integer.

op_Increment
[C#] public static decimal operator++(decimal d);
[C++] public: static Decimal op_Increment(Decimal d);
[VB] returnValue=Decimal.op Increment(d)
[JScript] returnValue=d++;

Description
Increments the Decimal operand by 1.

Return Value: The value of d incremented by 1. The Decimal operand.

op_Inequality
[C#] public static bool operator !=(decimal d1, decimal d2);
[C++] public: static bool op_Inequality(Decimal d1, Decimal d2);
[VB] returnValue=Decimal.op_Inequality(d1, d2)
[JScript] returnValue=d1 !=d2;

Description
Returns a value indicating whether two instances of Decimal are not equal.

Return Value: true if d1 and d2 are not equal; otherwise, false. A Decimal. A Decimal.

op_LessThan
[C#] public static bool operator
[C++] public: static bool op_LessThan(Decimal d1, Decimal d2);
[VB] returnValue=Decimal.op_LessThan(d1, d2)
[JScript] returnValue=d1<d2;

Description
Returns a value indicating whether a specified Decimal is less than another specified Decimal.

Return Value: true if d1 is less than d2; otherwise, false. A Decimal. A Decimal.

op_LessThanOrEqual
[C#] public static bool operator<=(decimal d1, decimal d2);
[C++] public: static bool op_LessThanOrEqual(Decimal d1, Decimal d2);
[VB] returnValue=Decimal.op_LessThanOrEqual(d1, d2)
[JScript] returnValue=d1<=d2;

Description
Returns a value indicating whether a specified Decimal is less than or equal to another specified Decimal.

Return Value: true if d1 is less than or equal to d2; otherwise, false. A Decimal. A Decimal.

op_Modulus
[C#] public static decimal operator % (decimal d1, decimal d2);
[C++] public: static Decimal op_Modulus(Decimal d1, Decimal d2);
[VB] returnValue=Decimal.op_Modulus(d1, d2)
[JScript] returnValue=d1% d2;

Description
Returns the remainder resulting from dividing two specified Decimal values.

Return Value: The Decimal remainder resulting from dividing d1 by d2. A Decimal (the dividend). A Decimal (the divisor).

op_Multiply
[C#] public static decimal operator*(decimal d1, decimal d2);
[C++] public: static Decimal op_Multiply(Decimal d1, Decimal d2);

[VB] returnValue=Decimal.op_Multiply(d1, d2)
[JScript] returnValue=d1* d2;

Description

Multiplies two specified Decimal values.

Return Value: The Decimal result of multiplying d1 by d2. A Decimal. A Decimal.

op_Subtraction

[C#] public static decimal operator−(decimal d1, decimal d2);

[C++] public: static Decimal op_Subtraction(Decimal d1, Decimal d2);

[VB] returnValue=Decimal.op_Subtraction(d1, d2)

[JScript] returnValue=d1−d2;

Description

Subtracts two specified Decimal values.

Return Value: The Decimal result of subtracting d2 from d1. A Decimal. A Decimal.

op_UnaryNegation

[C#] public static decimal operator−(decimal d);

[C++] public: static Decimal op_UnaryNegation(Decimal d);

[VB] returnValue=Decimal.op_UnaryNegation(d)

[JScript] returnValue=−d;

Description

Negates the value of the Decimal operand.

Return Value: The negated value of the operand, d. The Decimal operand.

op_UnaryPlus

[C#] public static decimal operator+(decimal d);

[C++] public: static Decimal op_UnaryPlus(Decimal d);

[VB] returnValue=Decimal.op_UnaryPlus(d)

[JScript] returnValue=+d;

Description

Returns the value of the Decimal operand (the sign of the operand is unchanged).

Return Value: The value of the operand, d. The Decimal operand.

Parse

[C#] public static decimal Parse(string s);

[C++] public: static Decimal Parse(String* s);

[VB] Public Shared Function Parse(ByVal s As String) As Decimal

[JScript] public static function Parse(s: String): Decimal; Converts the String representation of a number to its Decimal equivalent.

Description

Converts the String representation of a number to its Decimal equivalent.

Return Value: The Decimal number equivalent to the number contained in s.

s contains a number of the form: [ws][sign]digits[.fractional-digits][ws] Items in square brackets ('[' and ']') are optional, and other items are as follows. A System.String containing a number to convert.

Parse

[C#] public static decimal Parse(string s, IFormatProvider provider);

[C++] public: static Decimal Parse(String* s, IFormatProvider* provider);

[VB] Public Shared Function Parse(ByVal s As String, ByVal provider As IFormatProvider) As Decimal

[JScript] public static function Parse(s: String, provider: IFormatProvider) Decimal;

Description

Converts the String representation of a number in a specified style to its Decimal equivalent.

Return Value: A Decimal with the value represented by s.

s contains a number of the form: [ws][sign]digits[.fractional-digits][ws] Items in square brackets ('[' and ']') are optional, and other items are as follows. A System.String containing a number to convert. An System.IFormatProvider interface implementation which supplies culture-specific formatting information about s.

Parse

[C#] public static decimal Parse(string s, NumberStyles style);

[C++] public: static Decimal Parse(String* s, NumberStyles style);

[VB] Public Shared Function Parse(ByVal s As String, ByVal style As NumberStyles) As Decimal

[JScript] public static function Parse(s: String, style: NumberStyles): Decimal;

Description

Converts the String representation of a number in a specified style to its Decimal equivalent.

Return Value: A Decimal with the value represented by s.

s contains a number of the form: [ws][sign]digits[.fractional-digits][ws] Items in square brackets ('[' and ']') are optional, and other items are as follows. A System.String containing a number to convert. The combination of one or more System.Globalization.NumberStyles constants that indicate the permitted format of s.

Parse

[C#] public static decimal Parse(string s, NumberStyles style, IFormatProvider provider);

[C++] public: static Decimal Parse(String* s, NumberStyles style, IFormatProvider* provider);

[VB] Public Shared Function Parse(ByVal s As String, ByVal style As NumberStyles, ByVal provider As IFormatProvider) As Decimal

[JScript] public static function Parse(s: String, style: NumberStyles, provider: IFormatProvider): Decimal;

Description

Converts the String representation of a number in a specified style and culture-specific format to its Decimal equivalent.

Return Value: A Decimal with the value represented by s.

s contains a number of the form: [ws][sign]digits[.fractional-digits][ws] Items in square brackets ('[' and ']') are optional, and other items are as follows. A System.String containing a number to convert. The combination of one or more System.Globalization.NumberStyles constants that indicate the permitted format of s. An System.IFormatProvider interface implementation which supplies culture-specific formatting information about s.

Remainder

[C#] public static decimal Remainder(decimal d1, decimal d2);

[C++] public: static Decimal Remainder(Decimal d1, Decimal d2);

[VB] Public Shared Function Remainder(ByVal d1 As Decimal, ByVal d2 As Decimal) As Decimal

[JScript] public static function Remainder(d1: Decimal, d2: Decimal): Decimal;

Description

Round

[C#] public static decimal Round(decimal d, int decimals);

[C++] public: static Decimal Round(Decimal d, int decimals);

[VB] Public Shared Function Round(ByVal d As Decimal, ByVal decimals As Integer) As Decimal

[JScript] public static function Round(d: Decimal, decimals: int): Decimal;

Description

Rounds a Decimal value to a specified number of decimal places.

Return Value: d rounded to decimals number of decimal places. A Decimal value to round. A value from 0 to 28 that specifies the number of decimal places to round to.

Subtract

[C#] public static decimal Subtract(decimal d1, decimal d2);

[C++] public: static Decimal Subtract(Decimal d1, Decimal d2);

[VB] Public Shared Function Subtract(ByVal d1 As Decimal, ByVal d2 As Decimal) As Decimal

[JScript] public static function Subtract(d1: Decimal, d2: Decimal): Decimal;

Description

Subtracts two specified Decimal values.

Return Value: The Decimal result of subtracting d2 from d1. A Decimal (the minuend). A Decimal (the subtrahend).

IConvertible.ToBoolean

[C#] bool IConvertible.ToBoolean(IFormatProvider provider);

[C++] bool IConvertible::ToBoolean(IFormatProvider* provider);

[VB] Function ToBoolean(ByVal provider As IFormatProvider) As Boolean Implements IConvertible.ToBoolean

[JScript] function IConvertible.ToBoolean(provider: IFormatProvider): Boolean;

IConvertible.ToByte

[C#] byte IConvertible.ToByte(IFormatProvider provider);

[C++] unsigned char IConvertible::ToByte(IFormatProvider* provider);

[VB] Function ToByte(ByVal provider As IFormatProvider) As Byte Implements IConvertible.ToByte

[JScript] function IConvertible.ToByte(provider: IFormatProvider): Byte;

IConvertible.ToChar

[C#] char IConvertible.ToChar(IFormatProvider provider);

[C++] _wchar_t IConvertible::ToChar(IFormatProvider* provider);

[VB] Function ToChar(ByVal provider As IFormatProvider) As Char Implements IConvertible.ToChar

[JScript] function IConvertible.ToChar(provider: IFormatProvider): Char;

IConvertible.ToDateTime

[C#] DateTime IConvertible.ToDateTime(IFormatProvider provider);

[C++] DateTime IConvertible::ToDateTime(IFormatProvider* provider);

[VB] Function ToDateTime(ByVal provider As IFormatProvider) As DateTime Implements IConvertible.ToDateTime

[JScript] function IConvertible.ToDateTime(provider: IFormatProvider): DateTime;

IConvertible.ToDecimal

[C#] decimal IConvertible.ToDecimal(IFormatProvider provider);

[C++] Decimal IConvertible::ToDecimal(IFormatProvider* provider);

[VB] Function ToDecimal(ByVal provider As IFormatProvider) As Decimal Implements IConvertible.ToDecimal

[JScript] function IConvertible.ToDecimal(provider: IFormatProvider): Decimal;

IConvertible.ToDouble

[C#] double IConvertible.ToDouble(IFormatProvider provider);

[C++] double IConvertible::ToDouble(IFormatProvider* provider);

[VB] Function ToDouble(ByVal provider As IFormatProvider) As Double Implements IConvertible.ToDouble

[JScript] function IConvertible.ToDouble(provider: IFormatProvider): double;

IConvertible.ToInt16

[C#] short IConvertible.ToInt16(IFormatProvider provider);

[C++] short IConvertible::ToInt16(IFormatProvider* provider);

[VB] Function ToInt16(ByVal provider As IFormatProvider) As Short Implements IConvertible.ToInt16

[JScript] function IConvertible.ToInt16(provider: IFormatProvider): Int16;

IConvertible.ToInt32

[C#] int IConvertible.ToInt32(IFormatProvider provider);

[C++] int IConvertible::ToInt32(IFormatProvider* provider);

[VB] Function ToInt32(ByVal provider As IFormatProvider) As Integer Implements IConvertible.ToInt32

[JScript] function IConvertible.ToInt32(provider: IFormatProvider): int;

IConvertible.ToInt64

[C#] long IConvertible.ToInt64(IFormatProvider provider);

[C++] _int64 IConvertible::ToInt64(IFormatProvider* provider);

[VB] Function ToInt64(ByVal provider As IFormatProvider) As Long Implements IConvertible.ToInt64

[JScript] function IConvertible.ToInt64(provider: IFormatProvider): long;

IConvertible.ToSByte

[C#] sbyte IConvertible.ToSByte(IFormatProvider provider);

[C++] char IConvertible::ToSByte(IFormatProvider* provider);

[VB] Function ToSByte(ByVal provider As IFormatProvider) As SByte Implements IConvertible.ToSByte

[JScript] function IConvertible.ToSByte(provider: IFormatProvider): SByte;

IConvertible.ToSingle

[C#] float IConvertible.ToSingle(IFormatProvider provider);

[C++] float IConvertible::ToSingle(IFormatProvider* provider);

[VB] Function ToSingle(ByVal provider As IFormatProvider) As Single Implements IConvertible.ToSingle

[JScript] function IConvertible.ToSingle(provider: IFormatProvider): float;

IConvertible.ToType

[C#] object IConvertible.ToType(Type type, IFormatProvider provider);

[C++] Object* IConvertible::ToType(Type* type, IFormatProvider* provider);

[VB] Function ToType(ByVal type As Type, ByVal provider As IFormatProvider) As Object Implements IConvertible.ToType

[JScript] function IConvertible.ToType(type: Type, provider: IFormatProvider): Object;

IConvertible.ToUInt16

[C#] ushort IConvertible.ToUInt16(IFormatProvider provider);

[C++] unsigned short IConvertible::ToUInt16(IFormatProvider* provider);

[VB] Function ToUInt16(ByVal provider As IFormatProvider) As UInt16 Implements IConvertible.ToUInt16

[JScript] function IConvertible.ToUInt16(provider: IFormatProvider): UInt16;

IConvertible.ToUInt32

[C#] uint IConvertible.ToUInt32(IFormatProvider provider);

[C++] unsigned int IConvertible::ToUInt32(IFormatProvider* provider);

[VB] Function ToUInt32(ByVal provider As IFormatProvider) As UInt32 Implements IConvertible.ToUInt32

[JScript] function IConvertible.ToUInt32(provider: IFormatProvider): UInt32;

IConvertible.ToUInt64

[C#] ulong IConvertible.ToUInt64(IFormatProvider provider);

[C++] unsigned _int64 IConvertible::ToUInt64(IFormatProvider* provider);

[VB] Function ToUInt64(ByVal provider As IFormatProvider) As UInt64 Implements IConvertible.ToUInt64

[JScript] function IConvertible.ToUInt64(provider: IFormatProvider): UInt64;

ToByte

[C#] public static byte ToByte(decimal value);

[C++] public: static unsigned char ToByte(Decimal value);

[VB] Public Shared Function ToByte(ByVal value As Decimal) As Byte

[JScript] public static function ToByte(value: Decimal): Byte;

Description

Converts the value of the specified Decimal to the equivalent 8-bit unsigned integer.

Return Value: An 8-bit unsigned integer equivalent to value.

value is rounded to the nearest integer value towards zero, and that result is returned. The Decimal value.

ToDouble

[C#] public static double ToDouble(decimal d);

[C++] public: static double ToDouble(Decimal d);

[VB] Public Shared Function ToDouble(ByVal d As Decimal) As Double

[JScript] public static function ToDouble(d: Decimal): double;

Description

Converts the value of the specified Decimal to the equivalent double-precision floating point number.

Return Value: A double-precision floating point number equivalent to d.

Since a Double has fewer significant digits than a Decimal, this operation can produce round-off errors. The Decimal value to convert.

ToInt16

[C#] public static short ToInt16(decimal value);

[C++] public: static short ToInt16(Decimal value);

[VB] Public Shared Function ToInt16(ByVal value As Decimal) As Short

[JScript] public static function ToInt16(value: Decimal): Int16;

Description

Converts the value of the specified Decimal to the equivalent 16-bit signed integer.

Return Value: An 16-bit signed integer equivalent to value. A Decimal value.

ToInt32

[C#] public static int ToInt32(decimal d);

[C++] public: static int ToInt32(Decimal d);

[VB] Public Shared Function ToInt32(ByVal d As Decimal) As Integer

[JScript] public static function ToInt32(d: Decimal): int;

Description

Converts the value of the specified Decimal to the equivalent 32-bit signed integer.

Return Value: A 32-bit signed integer equivalent to the value of d.

The return value is the integral part of the decimal value; fractional digits are truncated. The Decimal value to convert.

ToInt64

[C#] public static long ToInt64(decimal d);

[C++] public: static __int64 ToInt64(Decimal d);

[VB] Public Shared Function ToInt64(ByVal d As Decimal) As Long

[JScript] public static function ToInt64(d: Decimal): long;

Description

Converts the value of the specified Decimal to the equivalent 64-bit signed integer.

Return Value: A 64-bit signed integer equivalent to the value of d.

The return value is the integral part of the decimal value; fractional digits are truncated. The Decimal value to convert.

ToOACurrency

[C#] public static long ToOACurrency(decimal value);

[C++] public: static _int64 ToOACurrency(Decimal value);

[VB] Public Shared Function ToOACurrency(ByVal value As Decimal) As Long

[JScript] public static function ToOACurrency(value: Decimal): long; i

Description

Converts the specified Decimal value to the equivalent OLE Automation Currency value, which is contained in a 64-bit signed integer.

Return Value: A 64-bit signed integer that contains the OLE Automation equivalent of value. A Decimal value. ToSByte

[C#] public static sbyte ToSByte(decimal value);

[C++] public: static char ToSByte(Decimal value);

[VB] Public Shared Function ToSByte(ByVal value As Decimal) As SByte

[JScript] public static function ToSByte(value: Decimal): SByte;

Description

Converts the value of the specified Decimal to the equivalent 8-bit signed integer.

Return Value: An 8-bit signed integer equivalent to value. A Decimal value.

ToSingle

[C#] public static float ToSingle(decimal d);

[C++] public: static float ToSingle(Decimal d);

[VB] Public Shared Function ToSingle(ByVal d As Decimal) As Single

[JScript] public static function ToSingle(d: Decimal): float;

Description

Converts the value of the specified Decimal to the equivalent single-precision floating point number.

Return Value: A single-precision floating point number equivalent to the value of d.

This operation can produce round-off errors because a single-precision floating point number has fewer significant digits than a Decimal. A Decimal value to convert.

ToString

[C#] public override string ToString( );

[C++] public: String* ToString( );

[VB] Overrides Public Function ToString( ) As String

[JScript] public override function ToString( ): String; Converts the numeric value of this instance to its equivalent String representation.

Description

Converts the numeric value of this instance to its equivalent String representation.

Return Value: A String representing the value of this instance.

The return value is formatted with the general format specifier ("G"). That is, an optional minus sign symbol followed by a sequence of integral digits ("0" through "9"), optionally followed by a decimal point symbol and a sequence of fractional digits. No leading zeroes are prefixed to the returned value.

ToString

[C#] public string ToString(IFormatProvider provider);

[C++] public: _sealed String* ToString(IFormatProvider* provider);

[VB] NotOverridable Public Function ToString(ByVal provider As IFormatProvider) As String

[JScript] public function ToString(provider: IFormatProvider): String;

Description

Converts the numeric value of this instance to its equivalent String representation using the specified culture-specific format information.

Return Value: The String representation of the value of this instance as specified by provider.

provider is an IFormatProvider instance that obtains a System.Globalization.NumberFormatInfo object. The NumberFormatInfo object provides culture-specific format information about this instance. If provider is null, the return value for this instance is formatted with the NumberFormatInfo for the current culture. An System.IFormatProvider interface implementation which supplies culture-specific formatting information.

ToString

[C#] public string ToString(string format);

[C++] public: String* ToString(String* format);

[VB] Public Function ToString(ByVal format As String) As String

[JScript] public function ToString(format: String): String;

Description

Converts the numeric value of this instance to its equivalent String representation, using the specified format specification.

Return Value: A String representation of the value of this instance as specified by format.

If format is null or an empty string, the return value of this instance is formatted with the general format specifier ("G"). A String containing a format specification.

ToString

[C#] public string ToString(string format, IFormatProvider provider);

[C++] public: _sealed String* ToString(String* format, IFormatProvider* provider);

[VB] NotOverridable Public Function ToString(ByVal format As String, ByVal provider As IFormatProvider) As String

[JScript] public function ToString(format: String, provider: IFormatProvider) String;

Description

Converts the numeric value of this instance to its equivalent String representation using the specified format and culture-specific format information.

Return Value: The String representation of the value of this instance as specified by format and provider.

If format is null or an empty string, the return value for this instance is formatted with the general format specifier ("G"). A format specification. An System.IFormatProvider interface implementation which supplies culture-specific formatting information.

ToUInt16

[C#] public static ushort ToUInt16(decimal value);

[C++] public: static unsigned short ToUInt16(Decimal value);

[VB] Public Shared Function ToUInt16(ByVal value As Decimal) As UInt16

[JScript] public static function ToUInt16(value: Decimal): UInt16;

Description

Converts the value of the specified Decimal to the equivalent 16-bit unsigned integer.

Return Value: A 16-bit unsigned integer equivalent to the value of value.

The return value is the integral part of the decimal value; fractional digits are truncated. A Decimal value to convert.

ToUInt32

[C#] public static uint ToUInt32(decimal d);

[C++] public: static unsigned int ToUInt32(Decimal d);

[VB] Public Shared Function ToUInt32(ByVal d As Decimal) As UInt32

[JScript] public static function ToUInt32(d: Decimal): UInt32;

Description

Converts the value of the specified Decimal to the equivalent 32-bit unsigned integer.

Return Value: A 32-bit unsigned integer equivalent to the value of d.

The return value is the integral part of the decimal value; fractional digits are truncated. A Decimal value to convert.

ToUInt64

[C#] public static ulong ToUInt64(decimal d);

[C++] public: static unsigned _int64 ToUInt64(Decimal d);

[VB] Public Shared Function ToUInt64(ByVal d As Decimal) As UInt64

[JScript] public static function ToUInt64(d: Decimal): UInt64;

Description

Converts the value of the specified Decimal to the equivalent 64-bit unsigned integer.

Return Value: A 64-bit unsigned integer equivalent to the value of d.

The return value is the integral part of the decimal value; fractional digits are truncated. A Decimal value to convert.

Truncate

[C#] public static decimal Truncate(decimal d);

[C++] public: static Decimal Truncate(Decimal d);

[VB] Public Shared Function Truncate(ByVal d As Decimal) As Decimal

[JScript] public static function Truncate(d: Decimal): Decimal;

Description

Returns the integral digits of the specified Decimal; any fractional digits are discarded.

Return Value: d rounded toward zero, to the nearest whole number.

This method rounds parameter d towards zero to the nearest whole number, which corresponds to discarding any digits after the decimal point. A Decimal to truncate.

Delegate class (System)

Truncate

Description

Represents a delegate, which is a data structure that refers to a static method or to an object instance and an instance method of that object.

The System.Delegate class is the base class for delegates.

Delegate

Example Syntax:

Truncate

[C#] protected Delegate(object target, string method);

[C++] protected: Delegate(Object* target, String* method);

[VB] Protected Sub New(ByVal target As Object, ByVal method As String)

[JScript] protected function Delegate(target: Object, method: String); Initializes a new instance of the System.Delegate class.

Description

Creates a System.Delegate to represent the specified target System.Object and the specified method.

This protected constructor is accessible only through this class or a derived class. The System.Object to be represented by the System.Delegate. The System.String containing the name of the method to be represented by the System.Delegate.

Delegate

Example Syntax:

Truncate

[C#] protected Delegate(Type target, string method);

[C++] protected: Delegate(Type* target, String* method);

[VB] Protected Sub New(ByVal target As Type, ByVal method As String)

[JScript] protected function Delegate(target: Type, method: String);

Description

Creates a System.Delegate to represent the specified target System.Type and the specified method.

This protected constructor is accessible only through this class or a derived class. The System.Type to be represented by the System.Delegate. The System.String containing the name of the method to be represented by the System.Delegate.

Method

Truncate

[C#] public MethodInfo Method {get;}

[C++] public: _property MethodInfo* get_Method( );

[VB] Public ReadOnly Property Method As MethodInfo

[JScript] public function get Method( ): MethodInfo;

Description

Gets the static method of the class represented by the System.Delegate.

Target

Truncate

[C#] public object Target {get;}

[C++] public: _property Object* get_Target( );

[VB] Public ReadOnly Property Target As Object

[JScript] public function get Target( ): Object;

Description

Gets the class instance from which the System.Delegate was created.

An instance method is a method that is associated with an instance of a class; whereas, a static method is a method that is associated with the class itself.

Clone

[C#] public virtual object Clone( );

[C++] public: virtual Object* Clone( );

[VB] Overridable Public Function Clone( ) As Object

[JScript] public function Clone( ): Object;

Description

Creates a shallow copy of the System.Delegate.

Return Value: A shallow copy of the System.Delegate.

This method can be overridden by a derived class.

Combine

[C#] public static Delegate Combine(Delegate[ ] delegates);

[C++] public: static Delegate* Combine(Delegate* delegates [ ]);

[VB] Public Shared Function Combine(ByVal delegates( ) As Delegate) As Delegate

[JScript] public static function Combine(delegates: Delegate[ ]): Delegate;

Description

Combines the invocation lists of an array of multicast System.Delegate instances.

Return Value: A new multicast System.Delegate with an invocation list that concatenates the invocation lists of the delegates in the delegates array.

If the delegates array contains entries that are null, those entries are ignored. The array of multicast System.Delegate instances to combine.

Combine

[C#] public static Delegate Combine(Delegate a, Delegate b);

[C++] public: static Delegate* Combine(Delegate* a, Delegate* b);

[VB] Public Shared Function Combine(ByVal a As Delegate, ByVal b As Delegate) As Delegate

[JScript] public static function Combine(a: Delegate, b: Delegate): Delegate; Combines the invocation lists of the specified multicast System.Delegate instances.

Description

Combines the invocation lists of two multicast System.Delegate instances.

Return Value: A new multicast System.Delegate with an invocation list that concatenates the invocation lists of a and b in that order.

The invocation list can contain duplicate entries; that is, entries that refer to the same method on the same object. The multicast System.Delegate whose invocation list comes first. The multicast System.Delegate whose invocation list comes last.

CombineImpl

[C#] protected virtual Delegate CombineImpl(Delegate d);

[C++] protected: virtual Delegate* CombineImpl(Delegate* d);

[VB] Overridable Protected Function CombineImpl(ByVal d As Delegate) As Delegate

[JScript] protected function CombineImpl(d: Delegate): Delegate;

Description

When overridden in a derived class, combines the invocation lists of the specified multicast System.Delegate with the current multicast System.Delegate.

Return Value: When overridden in a derived class, a new System.Delegate with an invocation list that concatenates the invocation list of the current System.Delegate and the invocation list of d.

This method must be overridden by a derived class. The current implementation simply throws a System.Multicast-NotSupportedException. This protected method is accessible only through this class or a derived class. The multicast System.Delegate whose invocation list to append to the end of the invocation list of the current multicast System.Delegate.

CreateDelegate

[C#] public static Delegate CreateDelegate(Type type, MethodInfo method);

[C++] public: static Delegate* CreateDelegate(Type* type, MethodInfo* method);

[VB] Public Shared Function CreateDelegate(ByVal type As Type, ByVal method As MethodInfo) As Delegate

[JScript] public static function CreateDelegate(type: Type, method: MethodInfo): Delegate;

Description

Creates a System.Delegate of the specified type to represent the specified static method.

Return Value: A System.Delegate of the specified type to represent the specified static method.

This method creates delegates for static methods only. A static method is a method that is associated with the class itself. The System.Type of System.Delegate to create. The System.Reflection.MethodInfo describing the static method for which the System.Delegate is to be created.

CreateDelegate

[C#] public static Delegate CreateDelegate(Type type, object target, string method);

[C++] public: static Delegate* CreateDelegate(Type* type, Object* target, String* method);

[VB] Public Shared Function CreateDelegate(ByVal type As Type, ByVal target As Object, ByVal method As String) As Delegate

[JScript] public static function CreateDelegate(type: Type, target: Object, method: String): Delegate; Creates a System.Delegate of the specified System.Type.

Description

Creates a System.Delegate of the specified type to represent the specified instance method of the specified System.Object instance.

Return Value: A System.Delegate of the specified type to represent the specified instance method of the specified System.Object instance type is null.

This method creates delegates for instance methods only. An instance method is a method that is associated with an instance of a class. The System.Type of System.Delegate to create. The target System.Object instance that implements method. The name of the instance method for which the System.Delegate is to be created.

CreateDelegate

[C#] public static Delegate CreateDelegate(Type type, Type target, string method);

[C++] public: static Delegate* CreateDelegate(Type* type, Type* target, String* method);

[VB] Public Shared Function CreateDelegate(ByVal type As Type, ByVal target As Type, ByVal method As String) As Delegate

[JScript] public static function CreateDelegate(type: Type, target: Type, method: String): Delegate;

Description

Creates a System.Delegate of the specified type to represent the specified static method of the specified System.Type.

Return Value: A System.Delegate of the specified type to represent the specified static method of the specified System.Type.

This method creates delegates for static methods only. A static method is a method that is associated with the class itself, not with any particular instance of the class. The System.Type of System.Delegate to create. The target System.Type that implements method. The name of the static method for which the delegate is to be created.

DynamicInvoke

[C#] public object DynamicInvoke(object[ ] args);

[C++] public: Object* DynamicInvoke(Object* args _gc[ ]);

[VB] Public Function DynamicInvoke(ByVal args( ) As Object) As Object

[JScript] public function DynamicInvoke(args: Object[ ]): Object;

Description

Invokes the method, represented by the System.Delegate, dynamically (late-bound).

Return Value: The System.Object returned by the method represented by the System.Delegate.

This method calls the System.Delegate.DynamicInvokeImpl(System.Object[ ]) method. An array of System.Object instances that are the arguments to pass to the method represented by the System.Delegate.

DynamicInvokeImpl

[C#] protected virtual object DynamicInvokeImpl (object[ ]args);

[C++] protected: virtual Object* DynamicInvokeImpl(Object* args _gc[ ]);

[VB] Overridable Protected Function DynamicInvokeImpl (ByVal args( ) As Object) As Object

[JScript] protected function DynamicInvokeImpl(args: Object[ ]): Object;

Description

Invokes the method, represented by the System.Delegate, dynamically (late-bound).

Return Value: The System.Object returned by the method represented by the System.Delegate.

This method can be overridden by a derived class. This protected method is accessible only through this class or a derived class. An array of System.Object instances that are the arguments to pass to the method represented by the System.Delegate.

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Determines whether the specified object and the singlecast System.Delegate share the same target, method and invocation list.

Return Value: true if obj and the current System.Delegate have the same target, method and invocation list; otherwise, false.

Two delegates with the same methods, the same targets and the same invocation lists are considered equal, even if they are not both singlecast or both multicast. The System.Object to compare with the singlecast System.Delegate.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns a hash code for the delegate instance.

Return Value: A hash code for the delegate instance.

The return value from this method must not be persisted for two reasons. First, the hash function of a class might be altered to generate a better distribution, rendering any values from the old hash function useless. Second, the default implementation of this class does not guarantee that the same value will be returned by different instances.

GetInvocationList

[C#] public virtual Delegate[ ] GetInvocationList( );

[C++] public: virtual Delegate* GetInvocationList( )[ ]

[VB] Overridable Public Function GetInvocationList( ) As Delegate( )

[JScript] public function GetInvocationList( ): Delegate[ ];

Description

Returns the invocation list of the System.Delegate.

Return Value: An array of singlecast System.Delegate objects representing the invocation list of the current System.Delegate. If the current System.Delegate is singlecast, the array contains only one element. If the current System.Delegate is multicast, the array may contain more than one element.

This method can be overridden by a derived class.

GetMethodImpl

[C#] protected virtual MethodInfo GetMethodImpl( );

[C++] protected: virtual MethodInfo* GetMethodImpl( );

[VB] Overridable Protected Function GetMethodImpl( ) As MethodInfo

[JScript] protected function GetMethodImpl( ): MethodInfo;

Description

Gets the static method of the class represented by the System.Delegate.

Return Value: A System.Reflection.MethodInfo describing the static method represented by the System.Delegate.

This method can be overridden by a derived class. This protected method is accessible only through this class or a derived class.

GetObjectData

[C#] public virtual void GetObjectData(SerializationInfo info, StreamingContext context);

[C++] public: virtual void GetObjectData(SerializationInfo* info, StreamingContext context);

[VB] Overridable Public Sub GetObjectData(ByVal info As SerializationInfo, ByVal context As StreamingContext)

[JScript] public function GetObjectData(info: SerializationInfo, context StreamingContext);

Description

Implements the System.Runtime.Serialization.ISerializable interface and returns the data needed to serialize the System.Delegate.

This method can be overridden by a derived class. A System.Runtime.Serialization.SerializationInfo object containing information required to serialize the System.Delegate. A System.Runtime.Serialization.StreamingContext object containing the source and destination of the serialized stream associated with the System.Delegate.

op_Equality

[C#] public static bool operator==(Delegate d1, Delegate d2);

[C++] public: static bool op_Equality(Delegate* d1, Delegate* d2);

[VB] returnValue=Delegate.op_Equality(d1, d2)

[JScript] returnValue=d===d2;

Description

Determines whether the specified System.Delegate objects are equal.

Return Value: true if d] is equal to d2; otherwise, false.

Two delegates with the same methods, the same targets and the same invocation lists are considered equal, even if they are not both singlecast or both multicast. The first System.Delegate to compare. The second System.Delegate to compare.

op_Inequality

[C#] public static bool operator !=(Delegate d1, Delegate d2);

[C++] public: static bool op_Inequality(Delegate* d1, Delegate* d2);

[VB] returnValue=Delegate.op_Inequality(d1, d2)

[JScript] returnValue=d1 !=d2;

Description

Determines whether the specified System.Delegate objects are not equal.

Return Value: true if d1 is not equal to d2; otherwise, false.

Two delegates are considered not equal if they have different methods or different targets or different invocation lists. The first System.Delegate to compare. The second System.Delegate to compare.

Remove

[C#] public static Delegate Remove(Delegate source, Delegate value);

[C++] public: static Delegate* Remove(Delegate* source, Delegate* value);

[VB] Public Shared Function Remove(ByVal source As Delegate, ByVal value As Delegate) As Delegate

[JScript] public static function Remove(source: Delegate, value: Delegate) Delegate;

Description

Removes a System.Delegate from the invocation list of another System.Delegate.

Return Value: A new System.Delegate with an invocation list formed by taking the invocation list of source and removing the last occurrence of value, if value is found in the invocation list of source.

The System.Delegate removed from the invocation list is the last delegate for which the following expression is true: value. The System.Delegate from which to remove value. The System.Delegate to remove from the invocation list of source.

RemoveImpl

[C#] protected virtual Delegate RemoveImpl(Delegate d);

[C++] protected: virtual Delegate* RemoveImpl(Delegate* d);

[VB] Overridable Protected Function RemoveImpl(ByVal d As Delegate) As Delegate

[JScript] protected function RemoveImpl(d: Delegate): Delegate;

Description

Removes a System.Delegate from the invocation list of another System.Delegate.

Return Value: source, if d is not equal to source; otherwise, null.

This method can be overridden by a derived class. This protected method is accessible only through this class or a derived class. The System.Delegate to remove from the invocation list of the current System.Delegate.

DivideByZeroException class (System)

ToString

Description

The exception that is thrown when there is an attempt to divide an integral or decimal value by zero.

Dividing a floating-point value by zero will result in either positive infinity, negative infinity, or Not-a-Number (NaN) according to the rules of IEEE 754 arithmetic. Floating-point operations never throw an exception. For more information, see System.Single and System.Double.

DivideByZeroException

Example Syntax:

ToString

[C#] public DivideByZeroException( );

[C++] public: DivideByZeroException( );

[VB] Public Sub New( )

[JScript] public function DivideByZeroException( ); Initializes a new instance of the System.DivideByZeroException class.

Description

Initializes a new instance of the System.DivideByZeroException class with default properties.

The following table shows the initial property values for an instance of System.DivideByZeroException.

DivideByZeroException

Example Syntax:

ToString

[C#] public DivideByZeroException(string message);

[C++] public: DivideByZeroException(String* message);

[VB] Public Sub New(ByVal message As String)

[JScript] public function DivideByZeroException(message: String);

Description

Initializes a new instance of the System.DivideByZeroException class with a specified error message.

The following table shows the initial property values for an instance of System.DivideByZeroException. The error message that explains the reason for the exception.

DivideByZeroException

Example Syntax:

ToString

[C#] protected DivideByZeroException(SerializationInfo info, StreamingContext context);

[C++] protected: DivideByZeroException(SerializationInfo* info, StreamingContext context);

[VB] Protected Sub New(ByVal info As SerializationInfo, ByVal context As StreamingContext)

[JScript] protected function DivideByZeroException(info: SerializationInfo, context: StreamingContext);

Description

Initializes a new instance of the System.DivideByZeroException class with serialized data.

This constructor is called during deserialization to reconstitute the exception object transmitted over a stream. For more information, see. The object that holds the serialized object data. The contextual information about the source or destination.

DivideByZeroException

Example Syntax:

ToString

[C#] public DivideByZeroException(string message, Exception innerException);

[C++] public: DivideByZeroException(String* message, Exception* innerException);

[VB] Public Sub New(ByVal message As String, ByVal innerException As Exception)

[JScript] public function DivideByZeroException(message: String, innerException: Exception);

Description

Initializes a new instance of the System.DivideByZeroException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If innerException is non-null, then the current Exception is raised in a catch block handling innerException.

HelpLink

HResult

InnerException

Message

Source

StackTrace

TargetSite

DllNotFoundException class (System)

ToString

Description

The exception that is thrown when a DLL specified in a DLL import cannot be found.

System.DllNotFoundException uses the HRESULT COR_E_DLLNOTFOUND, which has the value 0x80131524.

DllNotFoundException

Example Syntax:

ToString

[C#] public DllNotFoundException( );

[C++] public: DllNotFoundException( );

[VB] Public Sub New( )

[JScript] public function DllNotFoundException( ); Initializes a new instance of the System.DllNotFoundException class.

Description

Initializes a new instance of the System.DllNotFoundException class with default properties.

The following table shows the initial property values for an instance of System.DllNotFoundException.

DllNotFoundException

Example Syntax:

ToString

[C#] public DllNotFoundException(string message);

[C++] public: DllNotFoundException(String* message);

[VB] Public Sub New(ByVal message As String)

[JScript] public function DllNotFoundException(message: String);

Description

Initializes a new instance of the System.DllNotFoundException class with a specified error message.

The following table shows the initial property values for an instance of System.DllNotFoundException. The error message that explains the reason for the exception.

DllNotFoundException

Example Syntax:

ToString

[C#] protected DllNotFoundException(SerializationInfo info, StreamingContext context);

[C++] protected: DllNotFoundException(SerializationInfo* info, StreamingContext context);

[VB] Protected Sub New(ByVal info As SerializationInfo, ByVal context As StreamingContext)

[JScript] protected function DllNotFoundException(info: SerializationInfo, context: StreamingContext);

Description

Initializes a new instance of the System.DllNotFoundException class with serialized data. The System.Runtime.Serialization.SerializationInfo that holds the serialized object data about the exception being thrown. The System.Run time.Serialization.StreaniingContext that contains contextual information about the source or destination.

DllNotFoundException

Example Syntax:

ToString

[C#] public DllNotFoundException(string message, Exception inner);

[C++] public: DllNotFoundException(String* message, Exception* inner);

[VB] Public Sub New(ByVal message As String, ByVal inner As Exception)

[JScript] public function DllNotFoundException(message: String, inner: Exception);

Description

Initializes a new instance of the System.DllNotFoundException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If inner is non-null, then the current Exception is raised in a catch block handling inner.

HelpLink

HResult

InnerException

Message

Source

StackTrace

TargetSite

TypeName

Double structure (System)

ToString

Description

Represents a double-precision floating point number.

The Double value type represents a double-precision 64-bit number with values ranging from negative 1.79769313486232e308 to positive 1.79769313486232e308, as well as positive or negative zero, System.Double.PositiveInfinity, System.Double.NegativeInfinity, and Not-a-Number (System.Double.NaN).

ToString

[C#] public const double Epsilon;

[C++] public: const double Epsilon;

[VB] Public Const Epsilon As Double

[JScript] public var Epsilon: double;

Description

A constant representing the smallest positive Double greater than zero.

The value of this constant is 4.94065645841247e-324.

ToString

[C#] public const double MaxValue;

[C++] public: const double MaxValue;

[VB] Public Const MaxValue As Double

[JScript] public var MaxValue: double;

Description

A constant representing the largest possible value of Double.

The value of this constant is positive 1.79769313486232e308.

ToString

[C#] public const double MinValue;

[C++] public: const double MinValue;

[VB] Public Const MinValue As Double

[JScript] public var MinValue: double;

Description

A constant representing the smallest possible value of Double.

The value of this constant is negative 1.79769313486232e308.

ToString

[C#] public const double NaN;

[C++] public: const double NaN;

[VB] Public Const NaN As Double

[JScript] public var NaN: double;

Description

A constant representing Not-a-Number (NaN).

The value of this constant is the result of dividing zero by zero.

ToString

[C#] public const double NegativeInfinity;

[C++] public: const double NegativeInfinity;

[VB] Public Const NegativeInfinity As Double

[JScript] public var NegativeInfinity: double;

Description

A constant representing negative infinity.

The value of this constant is the result of dividing a negative number by zero.

ToString

[C#] public const double PositiveInfinity;

[C++] public: const double PositiveInfinity;

[VB] Public Const PositiveInfinity As Double

[JScript] public var PositiveInfinity: double;

Description

A constant representing positive infinity.

The value of this constant is the result of dividing a positive number by zero.

CompareTo

[C#] public int CompareTo(object value);

[C++] public: __sealed int CompareTo(Object* value);

[VB] NotOverridable Public Function CompareTo(ByVal value As Object) As Integer

[JScript] public function CompareTo(value: Object): int;

Description

Compares this instance to a specified object and returns an indication of their relative values.

Return Value: A signed number indicating the relative values of this instance and value.

Any instance of Double, regardless of its value, is considered greater than null. An object to compare, or null.

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Returns a value indicating whether this instance is equal to a specified object.

Return Value: true if obj is an instance of Double and equals the value of this instance; otherwise, false. An object to compare with this instance.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for this instance.

Return Value: A 32-bit signed integer hash code.

GetTypeCode

[C#] public TypeCode GetTypeCode( );

[C++] public: _sealed TypeCode GetTypeCode( );

[VB] NotOverridable Public Function GetTypeCode( ) As TypeCode

[JScript] public function GetTypeCode( ): TypeCode;

Description

Returns the TypeCode for value type Double.

Return Value: The enumerated constant, System.Type Code.Double.

IsInfinity

[C#] public static bool IsInfinity(double d);

[C++] public: static bool IsInfinity(double d);

[VB] Public Shared Function IsInfinity(ByVal d As Double) As Boolean

[JScript] public static function IsInfinity(d: double): Boolean;

Description

Returns a value indicating whether the specified number evaluates to either negative or positive infinity.

Return Value: true if d evaluates to negative or positive infinity; otherwise, false. A double-precision floating point number.

IsNaN

[C#] public static bool IsNaN(double d);

[C++] public: static bool IsNaN(double d);

[VB] Public Shared Function IsNaN(ByVal d As Double) As Boolean

[JScript] public static function IsNaN(d: double): Boolean;

Description

Returns a value indicating whether the specified number evaluates to Not-a-Number (NaN).

Return Value: true if d evaluates to NaN; otherwise, false. A double-precision floating point number.

IsNegativeInfinity

[C#] public static bool IsNegativeInfinity(double d);

[C++] public: static bool IsNegativeInfinity(double d);

[VB] Public Shared Function IsNegativeInfinity(ByVal d As Double) As Boolean

[JScript] public static function IsNegativeInfinity(d: double): Boolean;

Description

Returns a value indicating whether the specified number evaluates to negative infinity.

Return Value: true if d evaluates to negative infinity; otherwise, false. A double-precision floating point number.

IsPositiveInfinity

[C#] public static bool IsPositiveInfinity(double d);

[C++] public: static bool IsPositiveInfinity(double d);

[VB] Public Shared Function IsPositiveInfinity(ByVal d As Double) As Boolean

[JScript] public static function IsPositiveInfinity(d: double): Boolean;

Description

Returns a value indicating whether the specified number evaluates to positive infinity.

Return Value: true if d evaluates to positive infinity; otherwise, false. A double-precision floating point number.

Parse

[C#] public static double Parse(string s);

[C++] public: static double Parse(String* s);

[VB] Public Shared Function Parse(ByVal s As String) As Double

[JScript] public static function Parse(s: String): double; Converts the String representation of a number to its double-precision floating point number equivalent.

Description

Converts the String representation of a number to its double-precision floating point number equivalent.

Return Value: A double-precision floating point number equivalent to the numeric value or symbol specified in s.

s can contain System.Globalization.NumberFormatInfo.PositiveInfinitySymbol, System.Globalization.NumberFormatInfo.NegativeInfInitySymbol, System.Globalization.NumberFormatInfo.NaNSymbol, or a string of the form: [ws][sign]integral-digits[.[fractional-digits]][e[sign]exponential-digits][ws] Optional items are framed in square brackets ('[' and ']'). Items containing the term "digits" consist of a series of numeric characters ranging from 0 to 9. A System.String containing a number to convert.

Parse

[C#] public static double Parse(string s, IFormatProvider provider);

[C++] public: static double Parse(String* s, IFormatProvider* provider);

[VB] Public Shared Function Parse(ByVal s As String, ByVal provider As IFormatProvider) As Double

[JScript] public static function Parse(s: String, provider: IFormatProvider) double;

Description

Converts the String representation of a number in a specified culture-specific format to its double-precision floating point number equivalent.

Return Value: A double-precision floating point number equivalent to the numeric value or symbol specified in s.

s can contain System.Globalization.NumberFormatInfo.PositiveInfinitySymbol, System.Globalization.NumberFormatInfo.NegativeInfInitySymbol, System.Globalization.NumberFormatInfo.NaNSymbol, or a string of the form: [ws][sign]integral-digits[.[fractional-digits]][e[sign]exponential-digits][ws] Optional items are framed in square brackets ('[' and ']'). Items containing the term "digits" consist of a series of numeric characters ranging from 0 to 9. A System.String containing a number to convert. An System.IFormatProvider interface implementation which supplies culture-specific formatting information about s.

Parse

[C#] public static double Parse(string s, NumberStyles style);

[C++] public: static double Parse(String* s, NumberStyles style);

[VB] Public Shared Function Parse(ByVal s As String, ByVal style As NumberStyles) As Double

[JScript] public static function Parse(s: String, style: NumberStyles): double;

Description

Converts the String representation of a number in a specified style to its double-precision floating point number equivalent.

Return Value: A double-precision floating point number equivalent to the numeric value or symbol specified in s.

s can contain System.Globalization.NumberFormatInfo.PositiveInfinitySymbol, System.Globalization.NumberFormatInfo.NegativeInfInitySymbol, System.Globalization.NumberFormatInfo.NaNSymbol, or a string of the form: [ws][sign]integral-digits [.[fractional-digits]][e[sign]exponential-digits] [ws] Optional items are framed in square brackets ('[' and ']'). Items containing the term "digits" consist of a series of numeric characters ranging from 0 to 9. A System.String containing a number to convert. The combination of one or more System.Globalization.NumberStylesconstants that indicate the permitted format of s.

Parse

[C#] public static double Parse(string s, NumberStyles style, IFormatProvider provider);

[C++] public: static double Parse(String* s, NumberStyles style, IFormatProvider* provider);

[VB] Public Shared Function Parse(ByVal s As String, ByVal style As NumberStyles, ByVal provider As IFormatProvider) As Double

[JScript] public static function Parse(s: String, style: NumberStyles, provider: IFormatProvider): double;

Description

Converts the String representation of a number in a specified style and culture-specific format to its double-precision floating point number equivalent.

Return Value: A double-precision floating point number equivalent to the numeric value or symbol specified in s.

s can contain System.Globalization.NumberFormatInfo.PositiveInfinitySymbol, System.Globalization.NumberFormatInfo.NegativeInfinitySymbol, System.Globalization.NumberFormatInfo.NaNSymbol, or a string of the form: [ws][sign]integral-digits[.[fractional-digits]][e[sign]exponential-digits][ws] Optional items are framed in square brackets ('[' and ']'). Items containing the term "digits" consist of a series of numeric characters ranging from 0 to 9. A System.String containing a number to convert. The combination of one or more System.Globalization.NumberStylesconstants that indicate the permitted format of s. An System.IFormatProvider interface implementation which supplies culture-specific formatting information about s.

IConvertible.ToBoolean

[C#] bool IConvertible.ToBoolean(IFormatProvider provider);

[C++] bool IConvertible::ToBoolean(IFormatProvider* provider);

[VB] Function ToBoolean(ByVal provider As IFormatProvider) As Boolean Implements IConvertible.ToBoolean

[JScript] function IConvertible.ToBoolean(provider: IFormatProvider): Boolean;

IConvertible.ToByte

[C#] byte IConvertible.ToByte(IFormatProvider provider);

[C++] unsigned char IConvertible::ToByte(IFormatProvider* provider);

[VB] Function ToByte(ByVal provider As IFormatProvider) As Byte Implements IConvertible.ToByte

[JScript] function IConvertible.ToByte(provider: IFormatProvider): Byte;

IConvertible.ToChar

[C#] char IConvertible.ToChar(IFormatProvider provider);

[C++] _wchar_t IConvertible::ToChar(IFormatProvider* provider);

[VB] Function ToChar(ByVal provider As IFormatProvider) As Char Implements IConvertible.ToChar

[JScript] function IConvertible.ToChar(provider: IFormatProvider): Char;

IConvertible.ToDateTime

[C#] DateTime IConvertible.ToDateTime(IFormatProvider provider);

[C++] DateTime IConvertible::ToDateTime(IFormatProvider* provider);

[VB] Function ToDateTime(ByVal provider As IFormatProvider) As DateTime Implements IConvertible.ToDateTime

[JScript] function IConvertible.ToDateTime(provider: IFormatProvider): DateTime;

IConvertible.ToDecimal

[C#] decimal IConvertible.ToDecimal(IFormatProvider provider);

[C++] Decimal IConvertible::ToDecimal(IFormatProvider* provider);

[VB] Function ToDecimal(ByVal provider As IFormatProvider) As Decimal Implements IConvertible.ToDecimal

[JScript] function IConvertible.ToDecimal(provider: IFormatProvider): Decimal;

IConvertible.ToDouble

[C#] double IConvertible.ToDouble(IFormatProvider provider);

[C++] double IConvertible::ToDouble(IFormatProvider* provider);

[VB] Function ToDouble(ByVal provider As IFormatProvider) As Double Implements IConvertible.ToDouble

[JScript] function IConvertible.ToDouble(provider: IFormatProvider): double;

IConvertible.ToInt16

[C#] short IConvertible.ToInt16(IFormatProvider provider);

[C++] short IConvertible::ToInt16(IFormatProvider* provider);

[VB] Function ToInt16(ByVal provider As IFormatProvider) As Short Implements IConvertible.ToInt16

[JScript] function IConvertible.ToInt16(provider: IFormatProvider): Int16;

IConvertible.ToInt32

[C#] int IConvertible.ToInt32(IFormatProvider provider);

[C++] int IConvertible::ToInt32(IFormatProvider* provider);

[VB] Function ToInt32(ByVal provider As IFormatProvider) As Integer Implements IConvertible.ToInt32

[JScript] function IConvertible.ToInt32(provider: IFormatProvider): int;

IConvertible.ToInt64

[C#] long IConvertible.ToInt64(IFormatProvider provider);

[C++] _int64 IConvertible::ToInt64(IFormatProvider* provider);

[VB] Function ToInt64(ByVal provider As IFormatProvider) As Long Implements IConvertible.ToInt64

[JScript] function IConvertible.ToInt64(provider: IFormatProvider): long;

IConvertible.ToSByte

[C#] sbyte IConvertible.ToSByte(IFormatProvider provider);

[C++] char IConvertible::ToSByte(IFormatProvider* provider);

[VB] Function ToSByte(ByVal provider As IFormatProvider) As SByte Implements IConvertible.ToSByte

[JScript] function IConvertible.ToSByte(provider: IFormatProvider): SByte;

IConvertible.ToSingle

[C#] float IConvertible.ToSingle(IFormatProvider provider);

[C++] float IConvertible::ToSingle(IFormatProvider* provider);

[VB] Function ToSingle(ByVal provider As IFormatProvider) As Single Implements IConvertible.ToSingle

[JScript] function IConvertible.ToSingle(provider: IFormatProvider): float;

IConvertible.ToType

[C#] object IConvertible.ToType(Type type, IFormatProvider provider);

[C++] Object* IConvertible::ToType(Type* type, IFormatProvider* provider);

[VB] Function ToType(ByVal type As Type, ByVal provider As IFormatProvider) As Object Implements IConvertible.ToType

[JScript] function IConvertible.ToType(type: Type, provider: IFormatProvider): Object;

IConvertible.ToUInt16

[C#] ushort IConvertible.ToUInt16(IFormatProvider provider);

[C++] unsigned short IConvertible::ToUInt16(IFormatProvider* provider);

[VB] Function ToUInt16(ByVal provider As IFormatProvider) As UInt16 Implements IConvertible.ToUInt16

[JScript] function IConvertible.ToUInt16(provider: IFormatProvider): UInt16;

IConvertible.ToUInt32

[C#] uint IConvertible.ToUInt32(IFormatProvider provider);

[C++] unsigned int IConvertible::ToUInt32(IFormatProvider* provider);

[VB] Function ToUInt32(ByVal provider As IFormatProvider) As UInt32 Implements IConvertible.ToUInt32

[JScript] function IConvertible.ToUInt32(provider: IFormatProvider): UInt32;

IConvertible.ToUInt64

[C#] ulong IConvertible.ToUInt64(IFormatProvider provider);

[C++] unsigned _int64 IConvertible::ToUInt64(IFormatProvider* provider);

[VB] Function ToUInt64(ByVal provider As IFormatProvider) As UInt64 Implements IConvertible.ToUInt64

[JScript] function IConvertible.ToUInt64(provider: IFormatProvider): UInt64;

ToString

[C#] public override string ToString( );

[C++] public: String* ToString( );

[VB] Overrides Public Function ToString( ) As String

[JScript] public override function ToString( ): String; Converts the numeric value of this instance to its equivalent String representation.

Description

Converts the numeric value of this instance to its equivalent String representation.

Return Value: The System.String representation of the value of this instance.

The return value can be System.Globalization.NumberFormatInfo.PositiveInfinitySymbol, System.Globalization.NumberFormatInfo.NegativeInfinitySymbol, System.Globalization.NumberFormatInfo.NaNSymbol, or a string of the form: [sign]integral-digits[.[fractional-digits]] [e[sign]exponential-digits] Optional items are framed in square brackets ('[' and ']'). Items containing the term "digits" consist of a series of numeric characters ranging from 0 to 9.

ToString

[C#] public string ToString(IFormatProvider provider);

[C++] public: _sealed String* ToString(IFormatProvider* provider);

[VB] NotOverridable Public Function ToString(ByVal provider As IFormatProvider) As String

[JScript] public function ToString(provider: IFormatProvider): String;

Description

Converts the numeric value of this instance to its equivalent String representation using the specified culture-specific format information.

Return Value: The System.String representation of the value of this instance as specified by provider.

The return value can be System.Globalization.NumberFormatInfo.PositiveInfinitySymbol, System.Globalization.NumberFormatInfo.NegativeInfinitySymbol, System.Globalization.NumberFormatInfo.NaNSymbol, or a string of the form: [sign]integral-digits[.[fractional-digits]] [e[sign]exponential-digits] Optional items are framed in square brackets ('[' and ']'). Items containing the term "digits" consist of a series of numeric characters ranging from 0 to 9. An System.IFormatProvider interface implementation which supplies culture-]9 specific formatting information.

ToString

[C#] public string ToString(string format);

[C++] public: String* ToString(String* format);

[VB] Public Function ToString(ByVal format As String) As String

[JScript] public function ToString(format: String): String;

Description

Converts the numeric value of this instance to its equivalent String representation, using the specified format.

Return Value: The System.String representation of the value of this instance as specified by format.

The return value can be System.Globalization.NumberFormatInfo.PositiveInfinitySymbol, System.Globalization.NumberFormatInfo.NegativeInfinitySymbol, System.Globalization.NumberFormatInfo.NaNSymbol, or a string of the form: [sign]integral-digits[.[fractional-digits]][e[sign]exponential-digits] Optional items are framed in square brackets ('[' and ']'). Items containing the term "digits" consist of a series of numeric characters ranging from 0 to 9. A format string.

ToString

[C#] public string ToString(string format, IFormatProvider provider);

[C++] public: _sealed String* ToString(String* format, IFormatProvider* provider);

[VB] NotOverridable Public Function ToString(ByVal format As String, ByVal provider As IFormatProvider) As String

[JScript] public function ToString(format: String, provider: IFormatProvider) String;

Description

Converts the numeric value of this instance to its equivalent String representation using the specified format and culture-specific format information.

Return Value: The System.String representation of the value of this instance as specified by format and provider.

The return value can be System.Globalization.NumberFormatInfo.PositiveInfinitySymbol, System.Globalization.NumberFormatInfo.NegativeInfinitySymbol, System.Globalization.NumberFormatInfo.NaNSymbol, or a string of the form: [sign]integral-digits [.[fractional-digits]][e[sign]exponential-digits] Optional items are framed in square brackets ('[' and ']'). Items containing the term "digits" consist of a series of numeric characters ranging from 0 to 9. A format specification. An System.IFormatProvider interface implementation which supplies culture-specific formatting information.

TryParse

[C#] public static bool TryParse(string s, NumberStyles style, IFormatProvider provider, out double result);

[C++] public: static bool TryParse(String* s, NumberStyles style, IFormatProvider* provider, double* result);

[VB] Public Shared Function TryParse(ByVal s As String, ByVal style As NumberStyles, ByVal provider As IFormatProvider, ByRef result As Double) As Boolean

[JScript] public static function TryParse(s: String, style: NumberStyles, provider: IFormatProvider, result: double): Boolean;

Description

Converts the String representation of a number in a specified style and culture-specific format to its double-precision floating point number equivalent.

Return Value: true if s is converted successfully; otherwise, false.

The system.Double.TryParse method is like the system.Double.Parse method, except this method does not throw an exception if the conversion fails. If the conversion succeeds, the return value is true and the result parameter is set to the outcome of the conversion. If the conversion fails, the return value is false and the result parameter is set to zero. A System.String containing a number to convert. The combination of one or more System.Globalization.NumberStylesconstants that indicate the permitted format of s. An System.IFormatProvider interface implementation which supplies culture-specific formatting information about s. A double-precision floating-point number equivalent to the numeric value or symbol specified in s. If the return value is false, result is set to zero.

DuplicateWaitObjectException class (System)

TryParse

Description

The exception that is thrown when an object appears more than once in an array of synchronization objects.

The common language runtime provides a thread synchronization mechanism based on synchronization objects waiting for execution in an array of System.Threading.WaitHandle objects. If the array of System.Threading.WaitHandle objects passed to System.Threading.WaitHandle.WaitAll (System.Threading.WaitHandle[ ],System.Int32,System.Boolean) or System.Threading.WaitHandle.WaitAny(System.Threading.WaitHandle[ ],System.Int32,System.Boolean) contains any duplicate operating system handles, System.DuplicateWaitObjectException is thrown. For more information, see System.Threading.WaitHandle.

DuplicateWaitObjectException

Example Syntax:

TryParse

[C#] public DuplicateWaitObjectException( );

[C++] public: DuplicateWaitObjectException( );

[VB] Public Sub New( )

[JScript] public function DuplicateWaitObjectException( ); Initializes a new instance of the System.DuplicateWait ObjectException class.

Description

Initializes a new instance of the System.DuplicateWait ObjectException class with default properties.

The following table shows the initial property values for an instance of System.DuplicateWaitObjectException.

DuplicateWaitObjectException

Example Syntax:

TryParse

[C#] public DuplicateWaitObjectException(string parameterName);

[C++] public: DuplicateWaitObjectException(String* parameterName);

[VB] Public Sub New(ByVal parameterName As String)

[JScript] public function DuplicateWaitObjectException(parameterName: String);

Description

Initializes a new instance of the System.DuplicateWait ObjectException class with the name of the parameter that causes this exception.

The following table shows the initial property values for an instance of System.DuplicateWaitObjectException. The name of the invalid parameter.

DuplicateWaitObjectException

Example Syntax:

TryParse

[C#] protected DuplicateWaitObjectException(SerializationInfo info, StreamingContext context);

[C++] protected: DuplicateWaitObjectException(SerializationInfo* info, StreamingContext context);

[VB] Protected Sub New(ByVal info As SerializationInfo, ByVal context As StreamingContext)

[JScript] protected function DuplicateWaitObjectException (info: SerializationInfo, context: StreamingContext);

Description

Initializes a new instance of the System.DuplicateWaitObjectException class with serialized data.

This constructor is called during deserialization to reconstitute the exception object transmitted over a stream. For more information, see. The object that holds the serialized object data. The contextual information about the source or destination.

DuplicateWaitObjectException

Example Syntax:

TryParse

[C#] public DuplicateWaitObjectException(string parameterName, string message);

[C++] public: DuplicateWaitObjectException(String* parameterName, String* message);

[VB] Public Sub New(ByVal parameterName As String, ByVal message As String)

[JScript] public function DuplicateWaitObjectException(parameterName: String, message: String);

Description

Initializes a new instance of the System.DuplicateWaitObjectException class with a specified error message and the name of the parameter that causes this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The name of the invalid parameter. The error message that explains the reason for the exception.

HelpLink

HResult

InnerException

Message

ParamName

Source

StackTrace

TargetSite

EntryPointNotFoundException class (System)

ToString

Description

The exception that is thrown when an attempt to load a class fails due to the absence of an entry method.

For a list of initial property values for an instance of System.EntryPointNotFoundException, see the System.EntryPointNotFoundException.#ctor constructors.

EntryPointNotFoundException

Example Syntax:

ToString

[C#] public EntryPointNotFoundException( );

[C++] public: EntryPointNotFoundException( );

[VB] Public Sub New( )

[JScript] public function EntryPointNotFoundException( ); Initializes a new instance of the System.EntryPointNotFoundException class.

Description

Initializes a new instance of the System.EntryPointNotFoundException class with default properties.

The following table shows the initial property values for an instance of System.EntryPointNotFoundException.

EntryPointNotFoundException

Example Syntax:

ToString

[C#] public EntryPointNotFoundException(string message);

[C++] public: EntryPointNotFoundException(String* message);

[VB] Public Sub New(ByVal message As String)

[JScript] public function EntryPointNotFoundException (message: String);

Description

Initializes a new instance of the System.EntryPointNotFoundException class with a specified error message.

The following table shows the initial property values for an instance of System.EntryPointNotFoundException. The error message that explains the reason for the exception.

EntryPointNotFoundException

Example Syntax:

ToString

[C#] protected EntryPointNotFoundException(SerializationInfo info, StreamingContext context);

[C++] protected: EntryPointNotFoundException(SerializationInfo* info, StreamingContext context);

[VB] Protected Sub New(ByVal info As SerializationInfo, ByVal context As StreamingContext)

[JScript] protected function EntryPointNotFoundException (info: SerializationInfo, context: StreamingContext);

Description

Initializes a new instance of the System.EntryPointNotFoundException class with serialized data.

This constructor is called during deserialization to reconstitute the exception object transmitted over a stream. For more information, see. The object that holds the serialized object data. The contextual information about the source or destination.

EntryPointNotFoundException

Example Syntax:

ToString

[C#] public EntryPointNotFoundException(string message, Exception inner);

[C++] public: EntryPointNotFoundException(String* message, Exception* inner);

[VB] Public Sub New(ByVal message As String, ByVal inner As Exception)

[JScript] public function EntryPointNotFoundException (message: String, inner: Exception);

Description

Initializes a new instance of the System.EntryPointNotFoundException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If inner is non-null, then the current Exception is raised in a catch block handling inner.

HelpLink

HResult

InnerException

Message

Source

StackTrace

TargetSite

TypeName

Enum class (System)

ToString

Description

Provides the base class for enumerations.

An enumeration type is a named constant whose underlying type is any integral type except System.Char. Programming languages typically provide syntax to declare an enumeration that consists of a set of named constants and their values.

Enum

Example Syntax:

ToString

[C#] protected Enum( );

[C++] protected: Enum( );

[VB] Protected Sub New( )

[JScript] protected function Enum( );

CompareTo

[C#] public int CompareTo(object target);

[C++] public: _sealed int CompareTo(Object* target);

[VB] NotOverridable Public Function CompareTo(ByVal target As Object) As Integer

[JScript] public function CompareTo(target: Object): int;

Description

Compares this instance to a specified object and returns an indication of their relative values.

Return Value: A signed number indicating the relative values of this instance and target. An object to compare, or null.

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Returns a value indicating whether this instance is equal to a specified object.

Return Value: true if obj is an Enum with the same underlying type and value as this instance; otherwise, false. An object to compare with this instance.

Format

[C#] public static string Format(Type enumType, object value, string format);

[C++] public: static String* Format(Type* enumType, Object* value, String* format);

[VB] Public Shared Function Format(ByVal enumType As Type, ByVal value As Object, ByVal format As String) As String

[JScript] public static function Format(enumType: Type, value: Object, format: String): String;

Description

Converts the specified value of a specified enumerated type to its equivalent String representation according to the specified format.

Return Value: A string representation of value.

The valid format values are: Format Description "G" or "g" If value is equal to a named enumerated constant, the name of that constant is returned; otherwise, the decimal equivalent of value is returned. The enumeration type of the value to be converted. The value to be converted. The output format to use.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for this instance.

Return Value: A 32-bit signed integer hash code.

GetName

[C#] public static string GetName(Type enumType, object value);

[C++] public: static String* GetName(Type* enumtype, Object* value);

[VB] Public Shared Function GetName(ByVal enumType As Type, ByVal value As Object) As String

[JScript] public static function GetName(enumType: Type, value: Object) String;

Description

Retrieves the name of the constant in the specified enumeration that has the specified value.

Return Value: A System.String containing the name of the enumerated constant in enumType whose value is value, or null if no such constant is found. An enumeration. The value of a particular enumerated constant in terms of its underlying type.

GetNames

[C#] public static string[ ] GetNames(Type enumType);

[C++] public: static String* GetNames(Type* enum Type) _gc[ ];

[VB] Public Shared Function GetNames(ByVal enumType As Type) As String( )

[JScript] public static function GetNames(enumType: Type): String[ ];

Description

Retrieves an array of the names of the constants in a specified enumeration.

Return Value: A System.String array of the names of the constants in enumType. The elements of the array are sorted by the values of the enumerated constants. An enumeration.

GetTypeCode

[C#] public TypeCode GetTypeCode( );

[C++] public: _sealed TypeCode GetTypeCode( );

[VB] NotOverridable Public Function GetTypeCode( ) As TypeCode

[JScript] public function GetTypeCode( ): TypeCode;

Description

Returns the underlying TypeCode for this instance.

Return Value: The System.TypeCode for this instance.

GetUnderlyingType

[C#] public static Type GetUnderlyingType(Type enumType);

[C++] public: static Type* GetUnderlyingType(Type* enumType);

[VB] Public Shared Function GetUnderlyingType(ByVal enumType As Type) As Type

[JScript] public static function GetUnderlyingType(enumType: Type): Type;

Description

Returns the underlying type of the specified enumeration.

Return Value: The underlying System.Type of enumType. An enumerated type.

GetValues

[C#] public static Array GetValues(Type enumType);

[C++] public: static Array* GetValues(Type* enumtype);

[VB] Public Shared Function GetValues(ByVal enumType As Type) As Array

[JScript] public static function GetValues(enumType: Type): Array;

Description

Retrieves an array of the values of the constants in a specified enumeration.

Return Value: An Array of the values of the constants in enumType. The elements of the array are sorted by the values of the enumeration constants. An enumeration.

IsDefined

[C#] public static bool IsDefined(Type enumType, object value);

[C++] public: static bool IsDefined(Type* enumType, Object* value);

[VB] Public Shared Function IsDefined(ByVal enumType As Type, ByVal value As Object) As Boolean

[JScript] public static function IsDefined(enumType: Type, value: Object) Boolean;

Description

Returns an indication whether a constant with a specified value exists in a specified enumeration.

Return Value: true if a constant in enumType has a value equal to value; otherwise, false. An enumeration. The value or name of a constant in enumType.

Parse

[C#] public static object Parse(Type enumType, string value);

[C++] public: static Object* Parse(Type* enumType, String* value);

[VB] Public Shared Function Parse(ByVal enumType As Type, ByVal value As String) As Object

[JScript] public static function Parse(enumType: Type, value: String): Object; Converts the String representation of the name or numeric value of one or more enumerated constants to an equivalent enumerated object.

Description

Converts the String representation of the name or numeric value of one or more enumerated constants to an equivalent enumerated object.

Return Value: An object of type enumType whose value is represented by value.

value contains a value, a named constant, or a list of named constants delimited by commas (","). One or more blanks (" ") can precede or follow each value, name, or comma in value. If value is a list, the return value is the value of the specified names combined with a bitwise OR operation. The System. Type of the enumeration. A System.String containing the name or value to convert.

Parse

[C#] public static object Parse(Type enumType, string value, bool ignoreCase);

[C++] public: static Object* Parse(Type* enumType, String* value, bool ignoreCase);

[VB] Public Shared Function Parse(ByVal enumType As Type, ByVal value As String, ByVal ignoreCase As Boolean) As Object

[JScript] public static function Parse(enumType: Type, value: String, ignoreCase Boolean): Object;

Description

Converts the String representation of the name or numeric value of one or more enumerated constants to an equivalent enumerated object. A parameter specifies whether the operation is case-sensitive.

Return Value: An object of type enumType whose value is represented by value.

value contains a value, a named constant, or a list of named constants delimited by commas (","). One or more blanks (" ") can precede or follow each value, name, or comma in value. If value is a list, the return value is the value of the specified names combined with a bitwise OR operation. The System. Type of the enumeration. A System.String containing the name or value to convert. If true, ignore case; otherwise, regard case.

IConvertible.ToBoolean

[C#] bool IConvertible.ToBoolean(IFormatProvider provider);

[C++] bool IConvertible::ToBoolean(IFormatProvider* provider);

[VB] Function ToBoolean(ByVal provider As IFormatProvider) As Boolean Implements IConvertible.ToBoolean

[JScript] function IConvertible.ToBoolean(provider: IFormatProvider): Boolean;

IConvertible.ToByte

[C#] byte IConvertible.ToByte(IFormatProvider provider);

[C++] unsigned char IConvertible::ToByte(IFormatProvider* provider);

[VB] Function ToByte(ByVal provider As IFormatProvider) As Byte Implements IConvertible.ToByte

[JScript] function IConvertible.ToByte(provider: IFormatProvider): Byte;

IConvertible.ToChar

[C#] char IConvertible.ToChar(IFormatProvider provider);

[C++] _wchar_t IConvertible::ToChar(IFormatProvider* provider);

[VB] Function ToChar(ByVal provider As IFormatProvider) As Char Implements IConvertible.ToChar

[JScript] function IConvertible.ToChar(provider: IFormatProvider): Char;

IConvertible.ToDateTime

[C#] DateTime IConvertible.ToDateTime(IFormatProvider provider);

[C++] DateTime IConvertible::ToDateTime(IFormatProvider* provider);

[VB] Function ToDateTime(ByVal provider As IFormatProvider) As DateTime Implements IConvertible.ToDateTime

[JScript] function IConvertible.ToDateTime(provider: IFormatProvider) DateTime;

IConvertible.ToDecimal

[C#] decimal IConvertible.ToDecimal(IFormatProvider provider);

[C++] Decimal IConvertible::ToDecimal(IFormatProvider* provider);

[VB] Function ToDecimal(ByVal provider As IFormatProvider) As Decimal Implements IConvertible.ToDecimal

[JScript] function IConvertible.ToDecimal(provider: IFormatProvider): Decimal;

IConvertible.ToDouble

[C#] double IConvertible.ToDouble(IFormatProvider provider);

[C++] double IConvertible::ToDouble(IFormatProvider* provider);

[VB] Function ToDouble(ByVal provider As IFormatProvider) As Double Implements IConvertible.ToDouble

[JScript] function IConvertible.ToDouble(provider: IFormatProvider): double;

IConvertible.ToInt16

[C#] short IConvertible.ToInt16(IFormatProvider provider);

[C++] short IConvertible::ToInt16(IFormatProvider* provider);

[VB] Function ToInt16(ByVal provider As IFormatProvider) As Short Implements IConvertible.ToInt16

[JScript] function IConvertible.ToInt16(provider: IFormatProvider): Int16;

IConvertible.ToInt32

[C#] int IConvertible.ToInt32(IFormatProvider provider);

[C++] int IConvertible::ToInt32(IFormatProvider* provider);

[VB] Function ToInt32(ByVal provider As IFormatProvider) As Integer Implements IConvertible.ToInt32

[JScript] function IConvertible.ToInt32(provider: IFormatProvider): int;

IConvertible.ToInt64

[C#] long IConvertible.ToInt64(IFormatProvider provider);

[C++] _int64 IConvertible::ToInt64(IFormatProvider* provider);

[VB] Function ToInt64(ByVal provider As IFormatProvider) As Long Implements IConvertible.ToInt64

[JScript] function IConvertible.ToInt64(provider: IFormatProvider): long;

IConvertible.ToSByte

[C#] sbyte IConvertible.ToSByte(IFormatProvider provider);

[C++] char IConvertible::ToSByte(IFormatProvider* provider);

[VB] Function ToSByte(ByVal provider As IFormatProvider) As SByte Implements IConvertible.ToSByte

[JScript] function IConvertible.ToSByte(provider: IFormatProvider): SByte;

IConvertible.ToSingle

[C#] float IConvertible.ToSingle(IFormatProvider provider);

[C++] float IConvertible::ToSingle(IFormatProvider* provider);

[VB] Function ToSingle(ByVal provider As IFormatProvider) As Single Implements IConvertible.ToSingle

[JScript] function IConvertible.ToSingle(provider: IFormatProvider): float;

IConvertible.ToType

[C#] object IConvertible.ToType(Type type, IFormatProvider provider);

[C++] Object* IConvertible::ToType(Type* type, IFormatProvider* provider);

[VB] Function ToType(ByVal type As Type, ByVal provider As IFormatProvider) As Object Implements IConvertible.ToType

[JScript] function IConvertible.ToType(type: Type, provider: IFormatProvider): Object;

IConvertible.ToUInt16

[C#] ushort IConvertible.ToUInt16(IFormatProvider provider);

[C++] unsigned short IConvertible::ToUInt16(IFormatProvider* provider);

[VB] Function ToUInt16(ByVal provider As IFormatProvider) As UInt16 Implements IConvertible.ToUInt16

[JScript] function IConvertible.ToUInt16(provider: IFormatProvider): UInt16;

IConvertible.ToUInt32

[C#] uint IConvertible.ToUInt32(IFormatProvider provider);

[C++] unsigned int IConvertible::ToUInt32(IFormatProvider* provider);

[VB] Function ToUInt32(ByVal provider As IFormatProvider) As UInt32 Implements IConvertible.ToUInt32

[JScript] function IConvertible.ToUInt32(provider: IFormatProvider): UInt32;

IConvertible.ToUInt64

[C#] ulong IConvertible.ToUInt64(IFormatProvider provider);

[C++] unsigned _int64 IConvertible::ToUInt64(IFormatProvider* provider);

[VB] Function ToUInt64(ByVal provider As IFormatProvider) As UInt64 Implements IConvertible.ToUInt64

[JScript] function IConvertible.ToUInt64(provider: IFormatProvider): UInt64;

ToObject

[C#] public static object ToObject(Type enumType, byte value);

[C++] public: static Object* ToObject(Type* enumType, unsigned char value);

[VB] Public Shared Function ToObject(ByVal enumType As Type, ByVal value As Byte) As Object

[JScript] public static function ToObject(enumType: Type, value: Byte): Object;

Description

Returns an instance of the specified enumeration type set to the specified 8-bit unsigned integer value.

Return Value: An instance of the enumeration set to value. The enumeration for which to create a value. The value to set.

ToObject

[C#] public static object ToObject(Type enumType, short value);

[C++] public: static Object* ToObject(Type* enumType, short value);

[VB] Public Shared Function ToObject(ByVal enumType As Type, ByVal value As Short) As Object

[JScript] public static function ToObject(enumType: Type, value: Int16): Object;

Description

Returns an instance of the specified enumeration type set to the specified 16-bit signed integer value.

Return Value: An instance of the enumeration set to value. The enumeration for which to create a value. The value to set.

ToObject

[C#] public staticObject ToObject(Type enumType, int value);

[C++] public: static Object* ToObject(Type* enumtype, int value);

[VB] Public Shared Function ToObject(ByVal enumType As Type, ByVal value As Integer) As Object

[JScript] public static function ToObject(enumType: Type, value: int): Object;

Description

Returns an instance of the specified enumeration type set to the specified 32-bit signed integer value.

Return Value: An instance of the enumeration set to value. The enumeration for which to create a value. The value to set.

ToObject

[C#] public staticObject ToObject(Type enum type, long value);

[C++] public: static Object* ToObject(Type* enumtype, _int64 value);

[VB] Public Shared Function ToObject(ByVal enumType As Type, ByVal value As Long) As Object

[JScript] public static function ToObject(enumType: Type, value: long): Object;

Description

Returns an instance of the specified enumeration type set to the specified 64-bit signed integer value.

Return Value: An instance of the enumeration set to value. The enumeration for which to create a value. The value to set.

ToObject

[C#] public static object ToObject(Type enumtype, object value);

[C++] public: static Object* ToObject(Type* enumType, Object* value);

[VB] Public Shared Function ToObject(ByVal enumType As Type, ByVal value As Object) As Object

[JScript] public static function ToObject(enumType: Type, value: Object) Object; Returns an instance of the specified enumeration set to the specified value.

Description

Returns an instance of the specified enumeration set to the specified value.

Return Value: An enumeration object whose value is value.

value is specified in terms of the underlying type of the enumeration. An enumeration. The value.

ToObject

[C#] public static object ToObject(Type enumtype, sbyte value);

[C++] public: static Object* ToObject(Type* enumType, char value);

[VB] Public Shared Function ToObject(ByVal enumType As Type, ByVal value As SByte) As Object

[JScript] public static function ToObject(enumType: Type, value: SByte): Object; Returns an instance of the specified enumeration type set to the specified value.

Description

Returns an instance of the specified enumeration type set to the specified 8-bit signed integer value.

Return Value: An instance of the enumeration set to value. The enumeration for which to create a value. The value to set.

ToObject

[C#] public static object ToObject(Type enumType, ushort value);

[C++] public: static Object* ToObject(Type* enumType, unsigned short value); I[VB] Public Shared Function ToObject(ByVal enumType As Type, ByVal value As UInt16) As Object

[JScript] public static function ToObject(enumType: Type, value: UInt16) Object;

Description

Returns an instance of the specified enumeration type set to the specified 16-bit unsigned integer value.

Return Value: An instance of the enumeration set to value. The enumeration for which to create a value. The value to set.

ToObject

[C#] public static object ToObject(Type enumType, uint value);

[C++] public: static Object* ToObject(Type* enumType, unsigned int value);

[VB] Public Shared Function ToObject(ByVal enumType As Type, ByVal value As UInt32) As Object

[JScript] public static function ToObject(enumType: Type, value: UInt32): Object;

Description

Returns an instance of the specified enumeration type set to the specified 32-bit unsigned integer value.

Return Value: An instance of the enumeration set to value. The enumeration for which to create a value. The value to set.

ToObject

[C#] public staticObject ToObject(Type enumtype, ulong value);

[C++] public: static Object* ToObject(Type* enumType, unsigned __int64 value);

[VB] Public Shared Function ToObject(ByVal enumType As Type, ByVal value As UInt64) As Object

[JScript] public static function ToObject(enumType: Type, value: UInt64): Object;

Description

Returns an instance of the specified enumeration type set to the specified 64-bit unsigned integer value.

Return Value: An instance of the enumeration set to value. The enumeration for which to create a value. The value to set.

ToString

[C#] public override string ToString( );

[C++] public: String* ToString( );

[VB] Overrides Public Function ToString( ) As String

[JScript] public override function ToString( ): String;

Description

Converts the value of this instance to its equivalent String representation.

Return Value: The String representation of the value of this instance.

This method behaves as if the general format character, "G", were specified. That is, if the System.FlagsAttribute is not applied to this enumerated type and there is a named constant equal to the value of this instance, then the return value is a string containing the name of the constant. If the System.FlagsAttribute is applied and there is a combination of one or more named constants equal to the value of this instance, then the return value is a string containing a delimiter-separated list of the names of the constants. Otherwise, the return value is the string representation of the numeric value of this instance.

ToString

[C#] public string ToString(IFormatProvider provider);

[C++] public: _sealed String* ToString(IFormatProvider* provider);

[VB] NotOverridable Public Function ToString(ByVal provider As IFormatProvider) As String

[JScript] public function ToString(provider: IFormatProvider): String;

Description

Converts the value of this instance to its equivalent String representation using the specified format information.

Return Value: The String representation of the name of the value of this instance as specified by provider.

provider is reserved; it does not participate in this operation and can be specified as null. Therefore, this method is equivalent to the System.Enum.ToString(System.String) method that takes no parameters. (Reserved) An System.IFormatProvider object that supplies format information about this instance.

ToString

[C#] public string ToString(string format);

[C++] public: String* ToString(String* format);

[VB] Public Function ToString(ByVal format As String) As String

[JScript] public function ToString(format: String): String; Converts the value of this instance to its equivalent String representation.

Description

Converts the value of this instance to its equivalent String representation using the specified format.

Return Value: The String representation of the value of this instance as specified by format.

format can contain format characters "G" or "g", "D" or "d", "X" or "x", and "F" or "f". If format is null or an empty string, the general format specifier ("G") is used. For more information about these format characters, see the Remarks section of the System.Enum.Format(System.Type, System.Object,System.String) method. For more information about formatting in general, see. A format string.

ToString

[C#] public string ToString(string format, IFormatProvider provider);

[C++] public: __sealed String* ToString(String* format, IFormatProvider* provider);

[VB] NotOverridable Public Function ToString(ByVal format As String, ByVal provider As IFormatProvider) As String

[JScript] public function ToString(format: String, provider: IFormatProvider): String;

Description

Converts the value of this instance to its equivalent String representation using the specified format and format information.

Return Value: The String representation of the value of this instance as specified by format and provider.

format can contain format characters "G" or "g", "D" or "d", "X" or "x", and "F" or "f". If format is null or an empty string, the general format specifier ("G") is used. For more information about these format characters, see the Remarks section of the System.Enum.Format(System.Type, System.Object,System.String) method. For more information about formatting in general, see. A format specification. (Reserved) An System.IFormatProvider object that supplies format information about this instance.

Environment class (System)

ToString

Description

Provides information about, and means to manipulate, the current environment and platform.

CommandLine

ToString

[C#] public static string CommandLine {get;}

[C++] public: _property static String* get_CommandLine( );

[VB] Public Shared ReadOnly Property CommandLine As String

[JScript] public static function get CommandLine( ): String;

Description

Gets the command line for this process.

CurrentDirectory

ToString

[C#] public static string CurrentDirectory {get; set;}

[C++] public: _property static String* get_CurrentDirectory( ); public: _property static void set_CurrentDirectory(String*);

[VB] Public Shared Property CurrentDirectory As String

[JScript] public static function get CurrentDirectory( ): String;public static function set CurrentDirectory(String);

Description

Gets and sets the fully qualified path of the current directory; that is, the directory from which this process starts.

By definition, if this process starts in the root directory of a local or network drive, the value of this property is the drive name followed by a trailing slash (for example, "C:\"). If this process starts in a subdirectory, the value of this property is the drive and subdirectory path, without a trailing slash (for example, "C:\mySubDirectory").

ExitCode

ToString

[C#] public static int ExitCode {get; set;}

[C++] public: _property static int get_ExitCode( ); public: _property static void set_ExitCode(int);

[VB] Public Shared Property ExitCode As Integer

[JScript] public static function get ExitCode( ): int;public static function set ExitCode(int);

Description

Gets or sets the exit code of the process.

This property can be used to return a success code from an application. For example, it can be used to control the execution of a set of applications invoked in a script.

HasShutdownStarted

ToString

[C#] public bool HasShutdownStarted {get;}

[C++] public: _property bool get_HasShutdownStarted( );

[VB] Public ReadOnly Property HasShutdownStarted As Boolean

[JScript] public function get HasShutdownStarted( ): Boolean;

Description

MachineName

ToString

[C#] public static string MachineName {get;}

[C++] public: _property static String* get_MachineName( );

[VB] Public Shared ReadOnly Property MachineName As String

[JScript] public static function get MachineName( ): String;

Description

Gets the NetBIOS name of this local computer.

The name of this computer is established at system startup when the name is read from the registry. If this computer is a node in a cluster, the name of the node is returned.

NewLine

ToString

[C#] public static string NewLine {get;}

[C++] public: _property static String* get_NewLine( );

[VB] Public Shared ReadOnly Property NewLine As String

[JScript] public static function get NewLine( ): String;

Description

Gets the newline string defined for this environment.

The property value is a constant customized specifically for the current platform.

OSVersion

ToString

[C#] public static OperatingSystem OSVersion {get;}

[C++] public: _property static OperatingSystem* get_OSVersion( );

[VB] Public Shared ReadOnly Property OSVersion As OperatingSystem

[JScript] public static function get OSVersion( ): OperatingSystem;

Description

Gets an OperatingSystem object that contains the current platform identifier and version number.

StackTrace

ToString

[C#] public static string StackTrace {get;}

[C++] public: _property static String* get_StackTrace( );

[VB] Public Shared ReadOnly Property StackTrace As String

[JScript] public static function get StackTrace( ): String;

Description

Gets current stack trace information.

SystemDirectory

ToString

[C#] public static string SystemDirectory {get;}

[C++] public: _property static String* get_SystemDirectory( );

[VB] Public Shared ReadOnly Property SystemDirectory As String

[JScript] public static function get SystemDirectory( ): String;

Description

Gets the fully qualified path of the system directory.

An example of the value returned is the string "C:\WinNT\System32".

TickCount

ToString

[C#] public static int TickCount {get;}

[C++] public: _property static int get_TickCount( );

[VB] Public Shared ReadOnly Property TickCount As Integer

[JScript] public static function get TickCount( ): int;

Description

Gets the number of milliseconds elapsed since the system started.

The value of this property is derived from the system timer and is stored as a 32-bit signed integer. Therefore, the elapsed time will wrap around to zero if the system is run continuously for 49.7 days.

UserDomainName

ToString

[C#] public static string UserDomainName {get;}

[C++] public: _property static String* get_UserDomainName( );

[VB] Public Shared ReadOnly Property UserDomainName As String

[JScript] public static function get UserDomainName( ): String;

Description

Gets the name of the application domain of the current user.

The value of this property is typically the host machine name, but can depend upon the application solution being deployed.

UserInteractive

ToString

[C#] public static bool UserInteractive {get;}

[C++] public: _property static bool get_UserInteractive( );

[VB] Public Shared ReadOnly Property UserInteractive As Boolean

[JScript] public static function get UserInteractive( ): Boolean;

Description

Gets a value indicating whether the current process is running in user interactive mode.

This will be false only when running as a Service Process or from inside a Web application. When this property is false, you should not display any modal dialogs or message boxes, because there is no graphical user interface for the user to interact with.

UserName

ToString

[C#] public static string UserName {get;}

[C++] public: _property static String* get_UserName( );

[VB] Public Shared ReadOnly Property UserName As String

[JScript] public static function get UserName( ): String;

Description

Gets the user name of the person who started the current thread.

This property can be used to identify the current user to the system and application for security or access purposes. It can also be used to customize a particular application for each user.

Version

ToString

[C#] public static Version Version {get;}

[C++] public: _property static Version* get_Version( );

[VB] Public Shared ReadOnly Property Version As Version

[JScript] public static function get Version( ): Version;

Description

Gets a Version object that describes the major, minor, build, and revision numbers of the common language runtime.

WorkingSet

ToString

[C#] public static long WorkingSet {get;}

[C++] public: _property static __int64 get_WorkingSet( );

[VB] Public Shared ReadOnly Property WorkingSet As Long

[JScript] public static function get WorkingSet( ): long;

Description

Gets the amount of physical memory mapped to the process context.

Exit

[C#] public static void Exit(int exitCode);

[C++] public: static void Exit(int exitCode);

[VB] Public Shared Sub Exit(ByVal exitCode As Integer)

[JScript] public static function Exit(exitCode: int);

Description

Terminates this process and gives the underlying operating system the specified exit code. Exit code to be given to the operating system.

ExpandEnvironmentVariables

[C#] public static string ExpandEnvironmentVariables(string name);

[C++] public: static String* ExpandEnvironmentVariables (String* name);

[VB] Public Shared Function ExpandEnvironmentVariables (ByVal name As String) As String

[JScript] public static function ExpandEnvironmentVariables (name: String): String;

Description

Replaces the name of each environment variable embedded in the specified string with the string equivalent of the value of the variable, then returns the resulting string.

Return Value: A System.String with each environment variable replaced by its value.

Replacement only occurs for environment variables that are set. For example, suppose name is "MyENV=% MyENV %". If the environment variable, MyENV, is set to 42, this method returns "MyENV=42". If MyENV is not set, no change occurs; this method returns "MyENV=% MyENV %". A string containing the names of zero or more environment variables. Each environment variable is quoted with the percent sign character ('%').

GetCommandLineArgs

[C#] public static string[ ] GetCommandLineArgs( );

[C++] public: static String* GetCommandLineArgs) _gc[ ];

[VB] Public Shared Function GetCommandLineArgs( ) As String( )

[JScript] public static function GetCommandLineArgs( ): String[ ];

Description

Returns a String array containing the command line arguments for the current process.

Return Value: An array of System.String where each element contains a command line argument. The first element is the executable file name, and the following zero or more elements contain the remaining command line arguments.

GetEnvironmentVariable

[C#] public static string GetEnvironmentVariable(string variable);

[C++] public: static String* GetEnvironmentVariable (String* variable);

[VB] Public Shared Function GetEnvironmentVariable(ByVal variable As String) As String

[JScript] public static function GetEnvironmentVariable (variable: String): String;

Description

Returns the value of the specified environment variable.

Return Value: A string containing the value of variable, or null if variable is not found. A string containing the name of an environment variable.

GetEnvironmentVariables

[C#] public static IDictionary GetEnvironmentVariables( );

[C++] public: static IDictionary* GetEnvironment Variables( );

[VB] Public Shared Function GetEnvironmentVariables( ) As IDictionary

[JScript] public static function GetEnvironmentVariables( ): IDictionary;

Description

Returns all environment variables and their values.

Return Value: An object derived from System.Collections. IDictionary, which can return all environment variables and their values.

GetFolderPath

[C#] public static string GetFolderPath(Environment.SpecialFolder folder);

[C++] public: static String* GetFolderPath(Environment.SpecialFolder folder);

[VB] Public Shared Function GetFolderPath(ByVal folder As Environment.SpecialFolder) As String

[JScript] public static function GetFolderPath(folder: Environment.SpecialFolder): String;

Description

Gets the path to the system special folder identified by the specified enumeration.

This method retrieves the path to a system special folder, such as Program Files, Programs, System, or Startup, which can be used to access common information. The folder enumeration specifies the folder to retrieve. Special folders are set by default by the system, or explicitly by the user, when installing a version of Windows. An enumerated constant that identifies a system special folder.

GetLogicalDrives

[C#] public static string[ ] GetLogicalDrives( );

[C++] public: static String* GetLogicalDrives( ) _gc[ ];

[VB] Public Shared Function GetLogicalDrives( ) As String( )

[JScript] public static function GetLogicalDrives( ): String[ ];

Description

Returns an array of String containing the names of the logical drives on the current computer.

Return Value: An array of System.String where each element contains the name of a logical drive. For example, if the computer's hard drive is the first logical drive, the first element returned is "C:\".

EventArgs class (System)

ToString

Description

System.EventArgs is the base class for event data.

For more information about events, see the.

ToString

[C#] public static readonly EventArgs Empty;

[C++] public: static EventArgs* Empty;

[VB] Public Shared ReadOnly Empty As EventArgs

[JScript] public static var Empty: EventArgs;

Description

Represents an event with no event data.

The value of System.EventArgs.Empty is a read-only instance of System.EventArgs.

EventArgs

Example Syntax:

ToString

[C#] public EventArgs( );

[C++] public: EventArgs( );

[VB] Public Sub New( )

[JScript] public function EventArgs( );

Description

Initializes a new instance of the System.EventArgs class.

This constructor is only called by the common language runtime.

EventHandler delegate (System)

ToString

Description

Represents the method that will handle the event that has no event data. The source of the event. An EventArgs that contains the event data.

The event model in the .NET Framework is based on having an event delegate that connects an event with its handler. To raise an event, two elements are needed: A class that holds the event data. This class must derive from the base class System.EventArgs.

Exception class (System)

ToString

Description

Defines the base class for all exceptions.

Exceptions are responses to abnormal or exceptional conditions that arise while a program is executing. The common language runtime provides an exception handling model that is based on the representation of exceptions as objects, and the separation of program code and exception handling code into try block and catch block, respectively. There can be one or more catch blocks, each designed to handle a particular type of exception, or one block designed to catch a more specific exception than another block.

Exception

Example Syntax:

ToString

[C#] public Exception( );

[C++] public: Exception( );

[VB] Public Sub New( )

[JScript] public function Exception( ); Initializes a new instance of the System.Exception class.

Description

Initializes a new instance of the System.Exception class with default properties.

All the derived classes should provide this default constructor. The following table shows the initial property values for an instance of System.Exception.

Exception

Example Syntax:

ToString

[C#] public Exception(string message);

[C++] public: Exception(String* message);

[VB] Public Sub New(ByVal message As String)

[JScript] public function Exception(message: String);

Description

Initializes a new instance of the System.Exception class with a specified error message.

The following table shows the initial property values for an instance of System.Exception. The error message that explains the reason for the exception.

Exception

Example Syntax:

ToString

[C#] protected Exception(SerializationInfo info, StreamingContext context);

[C++] protected: Exception(SerializationInfo* info, StreamingContext context);

[VB] Protected Sub New(ByVal info As SerializationInfo, ByVal context As StreamingContext)

[JScript] protected function Exception(info: SerializationInfo, context: StreamingContext);

Description

Initializes a new instance of the System.Exception class with serialized data.

This constructor is called during deserialization to reconstitute the exception object transmitted over a stream. For more information, see. The object that holds the serialized object data. The contextual information about the source or destination.

Exception

Example Syntax:

ToString

[C#] public Exception(string message, Exception innerException);

[C++] public: Exception(String* message, Exception* innerException);

[VB] Public Sub New(ByVal message As String, ByVal innerException As Exception)

[JScript] public function Exception(message: String, innerException: Exception);

Description

Initializes a new instance of the System.Exception class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If innerException is non-null, then the current Exception is raised in a catch block handling innerException.

HelpLink

ToString

[C#] public virtual string HelpLink {get; set;}

[C++] public: _property virtual String* get_HelpLink( );public: _property virtual void set_HelpLink(String*);

[VB] Overridable Public Property HelpLink As String

[JScript] public function get HelpLink( ): String;public function set HelpLink(String);

Description

Gets or sets a link to the help file associated with this exception.

The return value, which represents a help file, is a URN or URL. For example: "file:///C:/Applications/Bazzal/help.html#ErrorNum42"

HResult

ToString

[C#] protected int HResult {get; set;}

[C++] protected: _property int get_HResult( ); protected: _property void set_HResult(int);

[VB] Protected Property HResult As Integer

[JScript] protected function get HResult( ): int;protected function set HResult(int);

Description

Gets or sets HRESULT, a coded numerical value that is assigned to a specific exception.

HRESULT is a 32-bit value, divided into three different fields: a severity code, a facility code, and an error code. The severity code indicates whether the return value represents information, warning, or error. The facility code identifies the area of the system responsible for the error. The error code is a unique number that is assigned to represent the exception. Each exception is mapped to a distinct HRESULT. When managed code throws an exception, the runtime passes the HRESULT to the COM client. When unmanaged code returns an error, the HRESULT is converted to an exception, which is then thrown by the runtime.

InnerException

ToString

[C#] public Exception InnerException {get;}

[C++] public: _property Exception* get_InnerException( );

[VB] Public ReadOnly Property InnerException As Exception

[JScript] public function get InnerException( ): Exception;

Description

Gets a reference to the inner exception.

You can create a new exception that catches an earlier exception. The code that handles the second exception can make use of the additional information from the earlier exception to handle the error more appropriately.

Message

ToString

[C#] public virtual string Message {get;}

[C++] public: _property virtual String* get_Message( );

[VB] Overridable Public ReadOnly Property Message As String

[JScript] public function get Message( ): String;

Description

Gets the error message text.

Every exception should carry an error message that provides information about the exception, such as why it is thrown. The System.Exception.Message property is set when the exception object is constructed. If an exception is constructed without a supplied error message, this property provides a default message indicating the type of the exception that is thrown.

Source

ToString

[C#] public virtual string Source {get; set;}

[C++] public: _property virtual String* get_Source( ); public: _property virtual void set_Source(String*);

[VB] Overridable Public Property Source As String

[JScript] public function get Source( ): String;public function set Source(String);

Description

Gets or sets a string containing the name of the application or the object that causes the error.

If System.Exception.Source is not set, the name of the assembly where the exception originated is returned.

StackTrace

ToString

[C#] public virtual string StackTrace {get;}

[C++] public: _property virtual String* get_StackTrace( );

[VB] Overridable Public ReadOnly Property StackTrace As String

[JScript] public function get StackTrace( ): String;

Description

Gets the stack trace, which identifies the location in the code where the error occurs.

The execution stack keeps track of all the methods that are in execution at a given instant. A trace of the method calls is called a stack trace with the most recent method call appearing first. The stack trace listing provides a means to follow the call sequence to the line number in the method where the exception occurs.

TargetSite

ToString

[C#] public MethodBase TargetSite {get;}

[C++] public: _property MethodBase* get_TargetSite( );

[VB] Public ReadOnly Property TargetSite As MethodBase

[JScript] public function get TargetSite( ): MethodBase;

Description

Gets the method that throws this exception.

If the method that throws this exception is not available and the stack trace is not null, System.Exception.TargetSite obtains the method from the stack trace. If the stack trace is null, System.Exception.TargetSite returns null GetBaseException

[C#] public virtual Exception GetBaseException( );

[C++] public: virtual Exception* GetBaseException( );

[VB] Overridable Public Function GetBaseException( ) As Exception

[JScript] public function GetBaseException( ): Exception;

Description

Gets the original exception that is thrown.

Return Value: A reference to the original exception object.

System.Exception.GetBaseException returns the original, innermost exception that causes this exception and other related exceptions linked via the System.Exception.InnerException property. If the current exception is the only one thrown, then its reference will be returned.

GetObjectData

[C#] public virtual void GetObjectData(SerializationInfo info, StreamingContext context);

[C++] public: virtual void GetObjectData(SerializationInfo* info, StreamingContext context);

[VB] Overridable Public Sub GetObjectData(ByVal info As SerializationInfo, ByVal context As StreamingContext)

[JScript] public function GetObjectData(info: SerializationInfo, context: StreamingContext);

Description

Sets the System.Runtime.Serialization.SerializationInfo object with information about the exception.

System.TypeLoadException.GetObjectData(System.Runtime.Serialization.SerializationInfo,System.Runtime.Serialization.StreamingContext) sets a System.Runtime.Serialization.SerializationInfo with all the exception object data targeted for serialization. During deserialization, the exception object is reconstituted from the System.Runtime.Serialization.SerializationInfo transmitted over the stream. The object that holds the serialized object data. The contextual information about the source or destination.

ToString

[C#] public override string ToString( );

[C++] public: String* ToString( );

[VB] Overrides Public Function ToString( ) As String

[JScript] public override function ToString( ): String;

Description

Returns the fully qualified name of this exception and possibly the error message, the name of the inner exception, and the stack trace.

Return Value: The fully qualified class name, plus possibly the error message, the name of the inner exception, and the stack trace.

If there is no error message or if it is an empty string (" "), then no error message is returned. The name of the inner exception and the stack trace are returned only if they are not null.

ExecutionEngineException class (System)

ToString

Description

The exception that is thrown when there is an internal error in the execution engine of the common language runtime. This class cannot be inherited.

System.ExecutionEngineException uses the HRESULT COR_E_EXECUTIONENGINE, which has the value 0x80131506.

ExecutionEngineException

Example Syntax:

ToString

[C#] public ExecutionEngineException( );

[C++] public: ExecutionEngineException( );

[VB] Public Sub New( )

[JScript] public function ExecutionEngineException( ); Initializes a new instance of the System.ExecutionEngineException class.

Description

Initializes a new instance of the System.ExecutionEngineException class with default properties.

The following table shows the initial property values for an instance of System.ExecutionEngineException.

ExecutionEngineException

Example Syntax:

ToString

[C#] public ExecutionEngineException(string message);

[C++] public: ExecutionEngineException(String* message);

[VB] Public Sub New(ByVal message As String)

[JScript] public function ExecutionEngineException(message: String);

Description

Initializes a new instance of the System.ExecutionEngineException class with a specified error message.

The following table shows the initial property values for an instance of System.ExecutionEngineException. The error message that explains the reason for the exception.

ExecutionEngineException

Example Syntax:

ToString

[C#] public ExecutionEngineException(string message, Exception innerException);

[C++] public: ExecutionEngineException(String* message, Exception* innerException);

[VB] Public Sub New(ByVal message As String, ByVal innerException As Exception)

[JScript] public function ExecutionEngineException(message: String, innerException: Exception);

Description

Initializes a new instance of the System.ExecutionEngineException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If innerException is non-null, then the current Exception is raised in a catch block handling innerException.

HelpLink
HResult
InnerException
Message
Source
StackTrace
TargetSite
FieldAccessException class (System)
ToString Description The exception that is thrown when there is an illegal attempt to access a private or protected field inside a class.

System.FieldAccessException uses the HRESULT COR_E_FIELDACCESS, which has the value 0x80131507.

FieldAccessException
Example Syntax:
ToString

[C#] public FieldAccessException( );

[C++] public: FieldAccessException( );

[VB] Public Sub New( )

[JScript] public function FieldAccessException( ); Initializes a new instance of the System.FieldAccessException class.

Description

Initializes a new instance of the System.FieldAccessException class with default properties.

The following table shows the initial property values for an instance of System.FieldAccessException.

FieldAccessException
Example Syntax:
ToString

[C#] public FieldAccessException(string message);

[C++] public: FieldAccessException(String* message);

[VB] Public Sub New(ByVal message As String)

[JScript] public function FieldAccessException(message: String);

Description

Initializes a new instance of the System.FieldAccessException class with a specified error message.

The following table shows the initial property values for an instance of System.FieldAccessException. The error message that explains the reason for the exception.

FieldAccessException
Example Syntax:
ToString

[C#] protected FieldAccessException(SerializationInfo info, StreamingContext context);

[C++] protected: FieldAccessException(SerializationInfo* info, StreamingContext context);

[VB] Protected Sub New(ByVal info As SerializationInfo, ByVal context As StreamingContext)

[JScript] protected function FieldAccessException(info: SerializationInfo, context: StreamingContext);

Description

Initializes a new instance of the System.FieldAccessException class with serialized data.

This constructor is called during deserialization to reconstitute the exception object transmitted over a stream. For more information, see. The object that holds the serialized object data. The contextual information about the source or destination.

FieldAccessException
Example Syntax:
ToString

[C#] public FieldAccessException(string message, Exception inner);

[C++] public: FieldAccessException(String* message, Exception* inner);

[VB] Public Sub New(ByVal message As String, ByVal inner As Exception)

[JScript] public function FieldAccessException(message: String, inner: Exception);

Description

Initializes a new instance of the System.FieldAccessException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If inner is non-null, then the current Exception is raised in a catch block handling inner.

HelpLink
HResult
InnerException
Message
Source
StackTrace
TargetSite
FlagsAttribute class (System)
ToString Description Custom attribute indicating an enumeration should be treated as a bitfield; that is, a set of flags.

Bitfields can be combined using a bitwise OR operation, whereas enumerated constants cannot.

FlagsAttribute
Example Syntax:
ToString

[C#] public FlagsAttribute( );

[C++] public: FlagsAttribute( );

[VB] Public Sub New( )

[JScript] public function FlagsAttribute( );

Description

Initializes a new instance of the FlagsAttribute class.

TypeId
FormatException class (System)
ToString

Description

The exception that is thrown when the format of an argument does not meet the parameter specifications of the invoked method.

System.FormatException is thrown when the format of an argument in a method invocation does not match the format of the corresponding formal parameter type. For example, if a method specifies a System.String parameter consisting of two digits with an embedded period, passing a corresponding string argument containing only two digits to that method would cause System.FormatException to be thrown.

FormatException

Example Syntax:

ToString

[C#] public FormatException( );

[C++] public: FormatException( );

[VB] Public Sub New( )

[JScript] public function FormatException( ); Initializes a new instance of the System.FormatException class.

Description

Initializes a new instance of the System.FormatException class with default properties.

The following table shows the initial property values for an instance of System.FormatException.

FormatException

Example Syntax:

ToString

[C#] public FormatException(string message);

[C++] public: FormatException(String* message);

[VB] Public Sub New(ByVal message As String)

[JScript] public function FormatException(message: String);

Description

Initializes a new instance of the System.FormatException class with a specified error message.

The following table shows the initial property values for an instance of System.FormatException. The error message that explains the reason for the exception.

FormatException

Example Syntax:

ToString

[C#] protected FormatException(SerializationInfo info, StreamingContext context);

[C++] protected: FormatException(SerializationInfo* info, StreamingContext context);

[VB] Protected Sub New(ByVal info As SerializationInfo, ByVal context As StreamingContext)

[JScript] protected function FormatException(info: SerializationInfo, context: StreamingContext);

Description

Initializes a new instance of the System.FormatException class with serialized data.

This constructor is called during deserialization to reconstitute the exception object transmitted over a stream. For more information, see. The object that holds the serialized object data. The contextual information about the source or destination.

FormatException

Example Syntax:

ToString

[C#] public FormatException(string message, Exception innerException);

[C++] public: FormatException(String* message, Exception* innerException);

[VB] Public Sub New(ByVal message As String, ByVal innerException As Exception)

[JScript] public function FormatException(message: String, innerException: Exception);

Description

Initializes a new instance of the System.FormatException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If innerException is non-null, then the current Exception is raised in a catch block handling innerException.

HelpLink

HResult

InnerException

Message

Source

StackTrace

TargetSite

GC class (System)

ToString

Description

Controls the system garbage collector, a service that automatically reclaims unused memory.

Methods in this class influence when an object is garbage collected and when resources allocated by an object are released ("finalized"). Properties in this class provide information about the total amount of memory available in the system and the age category, or "generation", of memory allocated to an object.

MaxGeneration

ToString

[C#] public static int MaxGeneration {get;}

[C++] public: _property static int get_MaxGeneration( );

[VB] Public Shared ReadOnly Property MaxGeneration As Integer

[JScript] public static function get MaxGeneration( ): int;

Description

Gets the maximum number of generations the system currently supports.

A "generation" number indicates the relative age of each segment of allocated memory. The newest memory is in generation zero and the oldest memory is in generation MaxGeneration. The garbage collector service improves its performance by adjusting generation numbers each time it reclaims memory, then taking into consideration newer memory is more likely to be eligible for garbage collection than older memory.

Collect

[C#] public static void Collect( );

[C++] public: static void Collect( );

[VB] Public Shared Sub Collect( )

[JScript] public static function Collect( );

Description

Forces garbage collection of all generations.

Collect

[C#] public static void Collect(int generation);

[C++] public: static void Collect(int generation);

[VB] Public Shared Sub Collect(ByVal generation As Integer)

[JScript] public static function Collect(generation: int); Forces garbage collection.

Description

Forces garbage collection from generation zero through a specified generation. The maximum generation to garbage collect.

GetGeneration

[C#] public static int GetGeneration(object obj);

[C++] public: static int GetGeneration(Object* obj);

[VB] Public Shared Function GetGeneration(ByVal obj As Object) As Integer

[JScript] public static function GetGeneration(obj: Object): int; Returns the current generation of an object.

Description

Returns the current generation of a specified object.

Return Value: The current generation of obj. The object for which generation information is retrieved.

GetGeneration

[C#] public static int GetGeneration(WeakReference wo);

[C++] public: static int GetGeneration(WeakReference* wo);

[VB] Public Shared Function GetGeneration(ByVal wo As WeakReference) As Integer

[JScript] public static function GetGeneration(wo: WeakReference): int;

Description

Returns the current generation of the target of a specified weak reference.

Return Value: The current generation of the target of wo. The weak reference of a target.

GetTotalMemory

[C#] public static long GetTotalMemory(bool forceFulCollection);

[C++] public: static _int64 GetTotalMemory(bool forceFullCollection);

[VB] Public Shared Function GetTotalMemory(ByVal forceFullCollection As Boolean) As Long

[JScript] public static function GetTotalMemory(forceFullCollection: Boolean) long;

Description

Retrieves the number of bytes currently thought to be allocated. A parameter indicates whether this method should wait a short interval before returning while the system garbage collects and finalizes objects.

If forceFullCollection is true, this method waits a short interval before returning while the system garbage collects and finalizes objects. The duration of the interval is an internally specified limit determined by the number of garbage collection cycles completed and the change in the amount of memory recovered between cycles. A Boolean value, which if true indicates this method should wait before returning.

KeepAlive

[C#] public static void KeepAlive(object obj);

[C++] public: static void KeepAlive(Object* obj);

[VB] Public Shared Sub KeepAlive(ByVal obj As Object)

[JScript] public static function KeepAlive(obj: Object);

Description

References the specified object, making it ineligible for garbage collection from the start of the current routine to the point where this method is called.

When calling methods in unmanaged code (such as Win32 APIs, unmanaged DLLs, or methods using COM), it is sometimes necessary to indicate a particular object should not be garbage collected, even though there are no references to it from managed code or data. The object to reference.

ReRegisterForFinalize

[C#] public static void ReRegisterForFinalize(object obj);

[C++] public: static void ReRegisterForFinalize(Object* obj);

[VB] Public Shared Sub ReRegisterForFinalize(ByVal obj As Object)

[JScript] public static function ReRegisterForFinalize(obj: Object);

Description

Requests the system call the finalizer method for the specified object, for which SuppressFinalize has previously been called.

A finalizer can use this method to resurrect itself or an object it references. The object for which a finalizer should be called.

SuppressFinalize

[C#] public static void SuppressFinalize(object obj);

[C++] public: static void SuppressFinalize(Object* obj);

[VB] Public Shared Sub SuppressFinalize(ByVal obj As Object)

[JScript] public static function SuppressFinalize(obj: Object);

Description

Requests the system not call the finalizer method for the specified object. The object for which a finalizer should not be called.

WaitForPendingFinalizers

[C#] public static void WaitForPendingFinalizers( );

[C++] public: static void WaitForPendingFinalizers( );

[VB] Public Shared Sub WaitForPendingFinalizers( )

[JScript] public static function WaitForPendingFinalizers( );

Description

Suspends the current thread until the thread processing the queue of finalizers has emptied that queue.

Finalizers are run on a separate thread of execution, so there is no guarantee this method will terminate. However, this thread can be interrupted by another thread while this method is in progress. This means you can start another thread that waits for a period of time, then interrupts this thread if it is still suspended.

Guid structure (System)

WaitForPendingFinalizers

Description

Represents a globally unique identifier (GUID).

A GUID is a 128-bit integer (16 bytes) that can be used across all computers and networks wherever a unique identifier is required. Such an identifier has a very low probability of being duplicated.

WaitForPendingFinalizers

[C#] public static readonly Guid Empty;

[C++] public: static Guid Empty;

[VB] Public Shared ReadOnly Empty As Guid

[JScript] public static var Empty: Guid;

Description

Initializes a new instance of the Guid class.

Guid

Example Syntax:

WaitForPendingFinalizers

[C#] public Guid(byte[ ] b);

[C++] public: Guid(unsigned char b_gc[ ]);

[VB] Public Sub New(ByVal bo As Byte)

[JScript] public function Guid(b: Byte[ ]); Initializes a new instance of the Guid class.

Description

Initializes a new instance of the Guid class using the specified array of bytes. A 16 element byte array containing values with which to initialize the GUID.

Guid

Example Syntax:

WaitForPendingFinalizers

[C#] public Guid(string g);

[C++] public: Guid(String* g);

[VB] Public Sub New(ByVal g As String)

[JScript] public function Guid(g: String);

Description

Initializes a new instance of the Guid class using the value represented by the specified string.

The string may begin and end with braces: '{', and '}'. A String that contains a GUID in the following format: hexadecimal digits are arranged in groups of 8, 4, 4, 4, and 12 digits with hyphens between the groups. The GUID can optionally be enclosed in matching braces. For example: dddddddd-dddd-dddd-dddd-dddddddddddd or {dddddddd-dddd-dddd-dddd-dddddddddddd}.

Guid

Example Syntax:

WaitForPendingFinalizers

[C#] public Guid(int a, short b, short c, byte[ ] d);

[C++] public: Guid(int a, short b, short c, unsigned char d _ gc[ ]);

[VB] Public Sub New(ByVal a As Integer, ByVal b As Short, ByVal c As Short, ByVal do As Byte)

[JScript] public function Guid(a: int, b: Int16, c: Int16, d: Byte[ ]);

Description

Initializes a new instance of the Guid class using the specified integers and byte array. The first 4 bytes of the GUID. The next 2 bytes of the GUID. The next 2 bytes of the GUID. The remaining 8 bytes of the GUID.

Guid

Example Syntax:

WaitForPendingFinalizers

[C#] public Guid(int a, short b, short c, byte d, byte e, byte f, byte g, byte h, byte i, byte j, byte k);

[C++] public: Guid(int a, short b, short c, unsigned char d, unsigned char e, unsigned char f, unsigned char g, unsigned char h, unsigned char i, unsigned char j, unsigned char k);

[VB] Public Sub New(ByVal a As Integer, ByVal b As Short, ByVal c As Short, ByVal d As Byte, ByVal e As Byte, ByVal f As Byte, ByVal g As Byte, ByVal h As Byte, ByVal i As Byte, ByVal j As Byte, ByVal k As Byte)

[JScript] public function Guid(a: int, b: Int16, c: Int16, d: Byte, e: Byte, f: Byte, g: Byte, h: Byte, i: Byte, j: Byte, k: Byte);

Description

Initializes a new instance of the Guid class using the specified integers and bytes.

Specifying individual bytes in this manner can be used to circumvent byte order restrictions ("big endian" or "little endian" byte order) on particular types of computers. The first 4 bytes of the GUID. The next 2 bytes of the GUID. The next 2 bytes of the GUID. The next byte of the GUID. The next byte of the GUID. The next byte of the GUID. The next byte of the GUID. The next byte of the GUID. The next byte of the GUID. The next byte of the GUID. The next byte of the GUID.

Guid

Example Syntax:

WaitForPendingFinalizers

[C#] public Guid(uint a, ushort b, ushort c, byte d, byte e, byte f, byte g, byte h, byte i, byte j, byte k);

[C++] public: Guid(unsigned int a, unsigned short b, unsigned short c, unsigned char d, unsigned char e, unsigned char f, unsigned char g, unsigned char h, unsigned char i, unsigned char j, unsigned char k);

[VB] Public Sub New(ByVal a As UInt32, ByVal b As UInt16, ByVal c As UInt16, ByVal d As Byte, ByVal e As Byte, ByVal f As Byte, ByVal g As Byte, ByVal h As Byte, ByVal i As Byte, ByVal j As Byte, ByVal k As Byte)

[JScript] public function Guid(a: UInt32, b: UInt16, c: UInt16, d: Byte, e: Byte, f: Byte, g: Byte, h: Byte, i: Byte, j: Byte, k: Byte);

Description

Initializes a new instance of the Guid class using the specified unsigned integers and bytes.

Specifying the bytes in this manner avoids endianness issues. The first 4 bytes of the GUID. The next 2 bytes of the GUID. The next 2 bytes of the GUID. The next byte of the GUID. The next byte of the GUID. The next byte of the GUID. The next byte of the GUID. The next byte of the GUID. The next byte of the GUID. The next byte of the GUID. The next byte of the GUID.

CompareTo

[C#] public int CompareTo(object value);

[C++] public: _sealed int CompareTo(Object* value);

[VB] NotOverridable Public Function CompareTo(ByVal value As Object) As Integer

[JScript] public function CompareTo(value: Object): int;

Description

Compares this instance to a specified object and returns an indication of their relative values.

Return Value: A signed number indicating the relative values of this instance and value.

Any instance of Guid, regardless of its value, is considered greater than null. An object to compare, or null.

Equals

[C#] public override bool Equals(object o);

[C++] public: bool Equals(Object* o);

[VB] Overrides Public Function Equals(ByVal o As Object) As Boolean

[JScript] public override function Equals(o: Object): Boolean;

Description

Returns a value indicating whether this instance is equal to a specified object.

Return Value: true if o is a Guid that has the same value as this instance; otherwise, false. The object to compare with this instance.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for this instance.

Return Value: The hash code for this instance.

NewGuid

[C#] public static Guid NewGuid( );

[C++] public: static Guid NewGuid( );

[VB] Public Shared Function NewGuid( ) As Guid

[JScript] public static function NewGuid( ): Guid;

Description

Initializes a new instance of the Guid class.

Return Value: A new Guid object.

This is a convenient static method that you can call to get a new Guid.

op_Equality

[C#] public static bool operator==(Guid a, Guid b);

[C++] public: static bool op_Equality(Guid a, Guid b);

[VB] returnValue=Guid.op_Equality(a, b)

[JScript] returnValue=a==b;

Description

Returns an indication whether the values of two specified Guid objects are equal.

Return Value: true if a and b are equal; otherwise, false. A Guid object. A Guid object.

op_Inequality

[C#] public static bool operator !=(Guid a, Guid b);

[C++] public: static bool op_Inequality(Guid a, Guid b);

[VB] returnValue=Guid.op_Inequality(a, b)

[JScript] returnValue=a !=b;

Description

Returns an indication whether the values of two specified Guid objects are not equal.

Return Value: true if a and b are not equal; otherwise, false. A Guid object. A Guid object.

ToByteArray

[C#] public byte[ ] ToByteArray( );

[C++] public: unsigned char ToByteArray( ) _gc[ ];

[VB] Public Function ToByteArray( ) As Byte( )

[JScript] public function ToByteArray( ): Byte[ ];

Description

Returns a 16-element byte array that contains the value of the GUID.

Return Value: A 16-element byte array.

ToString

[C#] public override string ToString( );

[C++] public: String* ToString( );

[VB] Overrides Public Function ToString( ) As String

[JScript] public override function ToString( ): String; Returns a String representation of the value of this instance of the Guid class.

Description

Returns a String representation of the value of this instance in Registry format.

Return Value: A String formatted in this pattern: xxxxxxxx-xxxx-xxxx-xxxx-xxxxxxxxxxxx where the value of the GUID is represented as a series of lower-case hexadecimal digits in groups of 8, 4, 4, 4, and 12 digits and separated by hyphens. An example of a return value is “382c74c3-721d-4f34-80e5-57657b6cbc27”.

This method provides a default GUID format that is sufficient for typical use; however, other versions of this method that take a format parameter provide a few common format variations.

ToString

[C#] public string ToString(string format);

[C++] public: String* ToString(String* format);

[VB] Public Function ToString(ByVal format As String) As String

[JScript] public function ToString(format: String): String;

Description

Returns a String representation of the value of this Guid instance, according to the provided format specifier.

Return Value: A System.String representation of the value of this Guid instance.

format can contain the following format specifiers. In the table that follows, all digits in the return value are hexadecimal. Each character ‘x’ represents a hexadecimal digit; each hyphen (‘-’), bracket (‘{’, ‘}’), and parenthesis (‘(’, ‘)’) appears as shown. A String containing a single format specifier character indicating how the GUID value should be formatted.

ToString

[C#] public string ToString(string format, IFormatProvider provider);

[C++] public: _sealed String* ToString(String* format, IFormatProvider* provider);

[VB] NotOverridable Public Function ToString(ByVal format As String, ByVal provider As IFormatProvider) As String

[JScript] public function ToString(format: String, provider: IFormatProvider) String;

Description

Returns a String representation of the value of this instance of the Guid class, according to the provided format specifier and culture-specific format information.

Return Value: A System.String representation of the value of this Guid instance.

format can contain the following format specifiers. In the table that follows, all digits in the return value are hexadecimal. Each character ‘x’ represents a hexadecimal digit; each hyphen (‘-’), bracket (‘{’, ‘}’), and parenthesis (‘(’, ‘)’) appears as shown. A String containing a single format specifier character indicating how the GUID value should be formatted. (Reserved) An IFormatProvider reference that supplies culture-specific formatting services.

IAppDomainSetup interface (System)

ToString

Description

ApplicationBase

ToString

[C#] string ApplicationBase {get; set;}

[C++] String* get_ApplicationBase( ); void set_ApplicationBase(String*);

[VB] Property ApplicationBase As String

[JScript] abstract function get ApplicationBase( ): String; public abstract function set ApplicationBase(String);

Description

ApplicationName

ToString

[C#] string ApplicationName {get; set;}

[C++] String* get_ApplicationName( ); void set_ApplicationName(String*);

[VB] Property ApplicationName As String

[JScript] abstract function get ApplicationName( ): String; public abstract function set ApplicationName(String);

Description

CachePath

ToString

[C#] string CachePath {get; set;}

[C++] String* get_CachePath( ); void set_CachePath (String*);

[VB] Property CachePath As String

[JScript] abstract function get CachePath( ): String;public abstract function set CachePath(String);

Description

ConfigurationFile

ToString

[C#] string ConfigurationFile {get; set;}

[C++] String* get_ConfigurationFile( ); void set_ConfigurationFile(String*);

[VB] Property ConfigurationFile As String

[JScript] abstract function get ConfigurationFile( ): String; public abstract function set ConfigurationFile(String);

Description

DynamicBase

ToString

[C#] string DynamicBase {get; set;}

[C++] String* get_DynamicBase( ); void set_DynamicBase (String*);

[VB] Property DynamicBase As String

[JScript] abstract function get DynamicBase( ): String;public abstract function set DynamicBase(String);

Description

LicenseFile

ToString

[C#] string LicenseFile {get; set;}

[C++] String* get_LicenseFile( ); void set_LicenseFile (String*);

[VB] Property LicenseFile As String

[JScript] abstract function get LicenseFile( ): String;public abstract function set LicenseFile(String);

Description

PrivateBinPath

ToString

[C#] string PrivateBinPath {get; set;}

[C++] String* get_PrivateBinPath( ); void set_PrivateBinPath(String*);

[VB] Property PrivateBinPath As String

[JScript] abstract function get PrivateBinPath( ): String;public abstract function set PrivateBinPath(String);

Description

PrivateBinPathProbe

ToString

[C#] string PrivateBinPathProbe {get; set;}

[C++] String* get_PrivateBinPathProbe( ); void set_PrivateBinPathProbe(String*);

[VB] Property PrivateBinPathProbe As String

[JScript] abstract function get PrivateBinPathProbe( ): String; public abstract function set PrivateBinPathProbe(String);

Description

ShadowCopyDirectories

ToString

[C#] string ShadowCopyDirectories {get; set;}

[C++] String* get_ShadowCopyDirectories( ); void set_ShadowCopyDirectories(String*);

[VB] Property ShadowCopyDirectories As String

[JScript] abstract function get ShadowCopyDirectories( ) String;public abstract function set ShadowCopyDirectories(String);

Description

ShadowCopyFiles

ToString

[C#] string ShadowCopyFiles {get; set;}

[C++] String* get_ShadowCopyFiles( ); void set_ShadowCopyFiles(String*);

[VB] Property ShadowCopyFiles As String

[JScript] abstract function get ShadowCopyFiles( ): String; public abstract function set ShadowCopyFiles(String);

Description

IAsyncResult interface (System)

ToString

Description

Represents the the status on an asynchronous operation.

The System.IAsyncResult interface is implemented by classes containing methods that can operate asynchronously. It is the return type of the "BeginXXX" method that initiates an asynchronous operation, and is the type of the third parameter of the "EndXXX" method that concludes an asynchronous operation.

AsyncState

ToString

[C#] object AsyncState {get;}

[C++] Object* get_AsyncState( );

[VB] ReadOnly Property AsyncState As Object

[JScript] abstract function get AsyncState( ): Object;

Description

Gets a user-defined object that qualifies or contains information about an asynchronous operation.

This property returns the object that is the last parameter of the "BeginXXX" method that initiates an asynchronous operation.

AsyncWaitHandle

ToString

[C#] WaitHandle AsyncWaitHandle {get;}

[C++] WaitHandle* get_AsyncWaitHandle( );

[VB] ReadOnly Property AsyncWaitHandle As WaitHandle

[JScript] abstract function get AsyncWaitHandle( ): WaitHandle;

Description

Gets a System.Threading.WaitHandle instance that is used to wait for an asynchronous operation to complete.

The return value enables the client to wait for an asynchronous operation to complete instead of polling System.IAsyncResult.IsCompleted until the operation concludes. The return value can be used to perform a System.Threading.WaitHandle.WaitOne(System.Int32,System.Boolean), System.Threading.WaitHandle.WaitAny(System.Threading.WaitHandle[ ],System. Int32,System.Boolean), or System.Threading.WaitHandle.WaitAll(System.Threading.WaitHandle[ ],System.Int32,System.Boolean) operation.

CompletedSynchronously

ToString

[C#] bool CompletedSynchronously {get;}

[C++] bool get_CompletedSynchronously( );

[VB] ReadOnly Property CompletedSynchronously As Boolean

[JScript] abstract function get CompletedSynchronously( ): Boolean;

Description

Gets an indication whether the "BeginXXX" call completed synchronously.

If the synchronous completion of the call is detected in the System.AsyncCallback delegate, it is probable that the thread that called "BeginXXX" is the current thread. Most implementers of the System.IAsyncResult interface will not use this ability and will return false.

IsCompleted

ToString

[C#] bool IsCompleted {get;}

[C++] bool get_IsCompleted( );

[VB] ReadOnly Property IsCompleted As Boolean

[JScript] abstract function get IsCompleted( ): Boolean;

Description

Gets an indication whether the asynchronous operation is finished. Implementers will typically return the value of a private field or internal test as the value of this property.

ICloneable interface (System)

ToString

Description

Supports cloning, which creates a new instance of a class with the same value as an existing instance.

The System.ICloneable interface contains one member, System.ICloneable.Clone, which is intended to support cloning beyond that supplied by System.Object.MemberwiseClone.

Clone

[C#] object Clone( );

[C++] Object* Clone( );

[VB] Function Clone( ) As Object

[JScript] function Clone( ): Object;

Description

Creates a new object that is a copy of the current instance.

Return Value: A new object that is a copy of this instance.

System.ICloneable.Clone can be implemented either as a deep copy or a shallow copy. In a deep copy, all objects are duplicated; whereas, in a shallow copy, only the top-level objects are duplicated and the lower levels contain references.

IComparable interface (System)

Clone

Description

Defines a generalized comparison method, which a value type or class implements to create a type-specific comparison method.

This interface is implemented by types whose values can be ordered; for example, the numeric and string classes.

CompareTo

[C#] int CompareTo(object obj);

[C++] int CompareTo(Object* obj);

[VB] Function CompareTo(ByVal obj As Object) As Integer

[JScript] function CompareTo(obj: Object): int;

Description

Compares the current instance with another object of the same type.

Return Value: A 32-bit signed integer that indicates the relative order of the comparands. The return value has these meanings: Value Meaning Less than zero This instance is less than obj.

This method is only a definition and must be implemented by a specific class or value type to have effect. The meaning of the comparisons, "less than," "equal to," and "greater than," depends on the particular implementation. An object to compare with this instance.

IConvertible interface (System)

CompareTo

Description

Defines methods that convert the value of the implementing reference or value type to a common language runtime type that has an equivalent value.

This interface provides methods to convert the value of an instance of an implementing type to a common language runtime type that has an equivalent value. The common language runtime types are System.Boolean, System.SByte, System.Byte, System.Int16, System.UInt16, System.Int32, System.UInt32, System.Int64, System.UInt64, System.Single, System.Double, System.Decimal, System.DateTime, System.Char, and System.String.

GetTypeCode

[C#] TypeCode GetTypeCode( );

[C++] TypeCode GetTypeCode( );

[VB] Function GetTypeCode( ) As TypeCode

[JScript] function GetTypeCode( ): TypeCode;

Description

Returns the System.TypeCode for this instance.

Return Value: The enumerated constant that is the System.TypeCode of the class or value type that implements this interface.

ToBoolean

[C#] bool ToBoolean(IFormatProvider provider);

[C++] bool ToBoolean(IFormatProvider* provider);

[VB] Function ToBoolean(ByVal provider As IFormatProvider) As Boolean

[JScript] function ToBoolean(provider: IFormatProvider): Boolean;

Description

Converts the value of this instance to an equivalent Boolean value using the specified culture-specific formatting information.

Return Value: A Boolean value equivalent to the value of this instance. An System.IFormatProvider interface implementation that supplies culture-specific formatting information.

ToByte

[C#] byte ToByte(IFormatProvider provider);

[C++] unsigned char ToByte(IFormatProvider* provider);

[VB] Function ToByte(ByVal provider As IFormatProvider) As Byte

[JScript] function ToByte(provider: IFormatProvider): Byte;

Description

Converts the value of this instance to an equivalent 8-bit unsigned integer using the specified culture-specific formatting information.

Return Value: An 8-bit unsigned integer equivalent to the value of this instance. An System.IFormatProvider interface implementation that supplies culture-specific formatting information.

ToChar

[C#] char ToChar(IFormatProvider provider);

[C++] _wchar_t ToChar(IFormatProvider* provider);

[VB] Function ToChar(ByVal provider As IFormatProvider) As Char

[JScript] function ToChar(provider: IFormatProvider): Char;

Description

Converts the value of this instance to an equivalent Unicode character using the specified culture-specific formatting information.

Return Value: A Unicode character equivalent to the value of this instance. An System.IFormatProvider interface implementation that supplies culture-specific formatting information.

ToDateTime

[C#] DateTime ToDateTime(IFormatProvider provider);

[C++] DateTime ToDateTime(IFormatProvider* provider);

[VB] Function ToDateTime(ByVal provider As IFormatProvider) As DateTime

[JScript] function ToDateTime(provider: IFormatProvider): DateTime;

Description

Converts the value of this instance to an equivalent System.DateTime using the specified culture-specific formatting information.

Return Value: A System.DateTime instance equivalent to the value of this instance. An System.IFormatProvider interface implementation that supplies culture-specific formatting information.

ToDecimal

[C#] decimal ToDecimal(IFormatProvider provider);

[C++] Decimal ToDecimal(IFormatProvider* provider);

[VB] Function ToDecimal(ByVal provider As IFormatProvider) As Decimal

[JScript] function ToDecimal(provider: IFormatProvider): Decimal;

Description

Converts the value of this instance to an equivalent System.Decimal number using the specified culture-specific formatting information.

Return Value: A System.Decimal number equivalent to the value of this instance. An System.IFormatProvider interface implementation that supplies culture-specific formatting information.

ToDouble

[C#] double ToDouble(IFormatProvider provider);

[C++] double ToDouble(IFormatProvider* provider);

[VB] Function ToDouble(ByVal provider As IFormatProvider) As Double

[JScript] function ToDouble(provider: IFormatProvider): double;

Description

Converts the value of this instance to an equivalent double-precision floating-point number using the specified culture-specific formatting information.

Return Value: A double-precision floating-point number equivalent to the value of this instance. An System.IFormatProvider interface implementation that supplies culture-specific formatting information.

ToInt16

[C#] short ToInt16(IFormatProvider provider);

[C++] short ToInt16(IFormatProvider* provider);

[VB] Function ToInt16(ByVal provider As IFormatProvider) As Short

[JScript] function ToInt16(provider: IFormatProvider): Int16;

Description

Converts the value of this instance to an equivalent 16-bit signed integer using the specified culture-specific formatting information.

Return Value: An 16-bit signed integer equivalent to the value of this instance. An System.IFormatProvider interface implementation that supplies culture-specific formatting information.

ToInt32

[C#] int ToInt32(IFormatProvider provider);

[C++] int ToInt32(IFormatProvider* provider);

[VB] Function ToInt32(ByVal provider As IFormatProvider) As Integer

[JScript] function ToInt32(provider: IFormatProvider): int;

Description

Converts the value of this instance to an equivalent 32-bit signed integer using the specified culture-specific formatting information.

Return Value: An 32-bit signed integer equivalent to the value of this instance. An System.IFormatProvider interface implementation that supplies culture-specific formatting information.

ToInt64

[C#] long ToInt64(IFormatProvider provider);

[C++]-int64 ToInt64(IFormatProvider* provider);

[VB] Function ToInt64(ByVal provider As IFormatProvider) As Long

[JScript] function ToInt64(provider: IFormatProvider): long;

Description

Converts the value of this instance to an equivalent 64-bit signed integer using the specified culture-specific formatting information.

Return Value: An 64-bit signed integer equivalent to the value of this instance. An System.IFormatProvider interface implementation that supplies culture-specific formatting information.

ToSByte

[C#] sbyte ToSByte(IFormatProvider provider);

[C++] char ToSByte(IFormatProvider* provider);

[VB] Function ToSByte(ByVal provider As IFormatProvider) As SByte

[JScript] function ToSByte(provider: IFormatProvider): SByte;

Description

Converts the value of this instance to an equivalent 8-bit signed integer using the specified culture-specific formatting information.

Return Value: An 8-bit signed integer equivalent to the value of this instance. An System.IFormatProvider interface implementation that supplies culture-specific formatting information.

ToSingle

[C#] float ToSingle(IFormatProvider provider);

[C++] float ToSingle(IFormatProvider* provider);

[VB] Function ToSingle(ByVal provider As IFormatProvider) As Single

[JScript] function ToSingle(provider: IFormatProvider): float;

Description

Converts the value of this instance to an equivalent single-precision floating-point number using the specified culture-specific formatting information.

Return Value: A single-precision floating-point number equivalent to the value of this instance. An System.IFormatProvider interface implementation that supplies culture-specific formatting information.

ToString

[C#] string ToString(IFormatProvider provider);

[C++] String* ToString(IFormatProvider* provider);

[VB] Function ToString(ByVal provider As IFormatProvider) As String

[JScript] function ToString(provider: IFormatProvider): String;

Description

Converts the value of this instance to an equivalent System.String using the specified culture-specific formatting information.

Return Value: A System.String instance equivalent to the value of this instance. An System.IFormatProvider interface implementation that supplies culture-specific formatting information.

ToType

[C#] object ToType(Type conversionType, IFormatProvider provider);

[C++] Object* ToType(Type* conversionType, IFormatProvider* provider);

[VB] Function ToType(ByVal conversionType As Type, ByVal provider As IFormatProvider) As Object

[JScript] function ToType(conversionType: Type, provider: IFormatProvider): Object;

Description

Converts the value of this instance to an System.Object of the specified System.Type that has an equivalent value, using the specified culture-specific formatting information.

Return Value: An System.Object instance of type conversionType whose value is equivalent to the value of this instance. The System.Type to which the value of this instance is converted. An System.IFormatProvider interface implementation that supplies culture-specific formatting information.

ToUInt16

[C#] ushort ToUInt16(IFormatProvider provider);

[C++] unsigned short ToUInt16(IFormatProvider* provider);

[VB] Function ToUInt16(ByVal provider As IFormatProvider) As UInt16

[JScript] function ToUInt16(provider: IFormatProvider): UInt16;

Description

Converts the value of this instance to an equivalent 16-bit unsigned integer using the specified culture-specific formatting information.

Return Value: An 16-bit unsigned integer equivalent to the value of this instance. An System.IFormatProvider interface implementation that supplies culture-specific formatting information.

ToUInt32

[C#] uint ToUInt32(IFormatProvider provider);

[C++] unsigned int ToUInt32(IFormatProvider* provider);

[VB] Function ToUInt32(ByVal provider As IFormatProvider) As UInt32

[JScript] function ToUInt32(provider: IFormatProvider): UInt32;

Description

Converts the value of this instance to an equivalent 32-bit unsigned integer using the specified culture-specific formatting information.

Return Value: An 32-bit unsigned integer equivalent to the value of this instance. An System.IFormatProvider interface implementation that supplies culture-specific formatting information.

ToUInt64

[C#] ulong ToUInt64(IFormatProvider provider);

[C++] unsigned _int64 ToUInt64(IFormatProvider* provider);

[VB] Function ToUInt64(ByVal provider As IFormatProvider) As UInt64

[JScript] function ToUInt64(provider: IFormatProvider): UInt64;

Description

Converts the value of this instance to an equivalent 64-bit unsigned integer using the specified culture-specific formatting information.

Return Value: An 64-bit unsigned integer equivalent to the value of this instance. An System.IFormatProvider interface implementation that supplies culture-specific formatting information.

ICustomFormatter interface (System)

ToUInt64

Description

Defines a method that supports custom, user-defined formatting of the value of an object.

When this interface is implemented by a reference or value type, the System.ICustomFormatter.Format(System.String, System.Object,System.IFormatProvider) method returns a custom-formatted string representation of an object's value.

Format

[C#] string Format(string format, object arg, IFormatProvider formatProvider);

[C++] String* Format(String* format, Object* arg, IFormatProvider* formatProvider);

[VB] Function Format(ByVal format As String, ByVal arg As Object, ByVal formatProvider As IFormatProvider) As String

[JScript] function Format(format: String, arg: Object, formatProvider: IFormatProvider): String;

Description

Converts the value of a specified object to an equivalent string representation using specified format and culture-specific formatting information.

Return Value: The string representation of the value of arg, formatted as specified by format and formatProvider.

The format parameter contains a user-defined formatting specification. For more information about standard .NET Framework formatting specifications, see. A format string containing formatting specifications. An object to format. An System.IFormatProvider object that supplies format information about the current instance.

IDisposable interface (System)

Format

Description

Defines a method to release allocated unmanaged resources.

The common language runtime garbage collector automatically releases memory allocated to a managed object when that object is no longer used. Furthermore, it is unpredictable when garbage collection will occur. However, the garbage collector has no knowledge of unmanaged resources, such as window handles and open files and streams.

Dispose

[C#] void Dispose( );

[C++] void Dispose( );

[VB] Sub Dispose( )

[JScript] function Dispose( );

Description

Releases unmanaged resources.

Use this method to close or release unmanaged resources such as files, streams, and handles, held by an instance of the class that implements this interface.

IFormatProvider interface (System)

Dispose

Description

Provides a mechanism for retrieving an object to control formatting.

A class or value type implements the System.IFormatProvider.GetFormat(System.Type) method of this interface to obtain an object that provides format information or processing for the implementing type.

GetFormat

[C#] object GetFormat(Type formatType);

[C++] Object* GetFormat(Type* formatType);

[VB] Function GetFormat(ByVal formatType As Type) As Object

[JScript] function GetFormat(formatType: Type): Object;

Description

Gets the format object of the specified type.

Return Value: A format object of type formatType—or—null if there is no format object of type formatType. An object that specifies the type of format object to get.

IFormattable interface (System)

GetFormat

Description

Provides functionality to format the value of an object into a string representation.

System.IFormattable is implemented by the base data types.

ToString

[C#] string ToString(string format, IFormatProvider formatProvider);

[C++] String* ToString(String* format, IFormatProvider* formatProvider);

[VB] Function ToString(ByVal format As String, ByVal formatprovider As IFormatProvider) As String

[JScript] function ToString(format: String, formatprovider: IFormatProvider): String;

Description

Formats the value of the current instance using the specified format.

Return Value: A System.String containing the value of the current instance in the specified format.

System.Globalization.NumberFormatInfo, System.Globalization.DateTimeFormatInfo and System.Globalization.CultureInfo implement the System.IFormatProvider interface. The System.String specifying the format to use. The System.IFormatProvider to use to format the value.

IndexOutOfRangeException class (System)

ToString

Description

The exception that is thrown when an attempt is made to access an element of an array with an index that is outside the bounds of the array. This class cannot be inherited.

System.IndexOutOfRangeException uses the HRESULT COR_E_INDEXOUTOFRANGE, which has the value 0x80131508.

IndexOutOfRangeException

Example Syntax:

ToString

[C#] public IndexOutOfRangeException( );

[C++] public: IndexOutOfRangeException( );

[VB] Public Sub New( )

[JScript] public function IndexOutOfRangeException( ); Initializes a new instance of the System.IndexOutOfRangeException class.

Description

Initializes a new instance of the System.IndexOutOf RangeException class with default properties.

The following table shows the initial property values for an instance of System.IndexOutOfRangeException.

IndexOutOfRangeException

Example Syntax:

ToString

[C#] public IndexOutOfRangeException(string message);

[C++] public: IndexOutOfRangeException(String* message);

[VB] Public Sub New(ByVal message As String)

[JScript] public function IndexOutOfRangeException(message: String);

Description

Initializes a new instance of the System.IndexOutOf RangeException class with a specified error message.

The following table shows the initial property values for an instance of System.IndexOutOfRangeException. The error message that explains the reason for the exception.

IndexOutOfRangeException

Example Syntax:

ToString

[C#] public IndexOutOfRangeException(string message, Exception innerException);

[C++] public: IndexOutOfRangeException(String* message, Exception* innerException);

[VB] Public Sub New(ByVal message As String, ByVal innerException As Exception)

[JScript] public function IndexOutOfRangeException(message: String, innerException: Exception);

Description

Initializes a new instance of the System.IndexOutOf RangeException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If innerException is non-null, then the current Exception is raised in a catch block handling innerException.

HelpLink

HResult

InnerException

Message

Source

StackTrace

TargetSite

Int16 structure (System)

ToString

Description

Represents a 16-bit signed integer.

The Int16 value type represents signed integers with values ranging from negative 32768 through positive 32767.

ToString

[C#] public const short MaxValue;

[C++] public: const short MaxValue;

[VB] Public Const MaxValue As Short

[JScript] public var MaxValue: Int16;

Description

A constant representing the largest possible value of Int16.

The value of this constant is 32767; that is, hexadecimal 0x7FFF.

ToString

[C#] public const short MinValue;

[C++] public: const short MinValue;

[VB] Public Const MinValue As Short

[JScript] public var MinValue: Int16;

Description

A constant representing the smallest possible value of Int16.

The value of this constant is −32768; that is, hexadecimal 0x8000.

CompareTo

[C#] public int CompareTo(object value);

[C++] public: _sealed int CompareTo(Object* value);

[VB] NotOverridable Public Function CompareTo(ByVal value As Object) As Integer

[JScript] public function CompareTo(value: Object): int;

Description

Compares this instance to a specified object and returns an indication of their relative values.

Return Value: A signed number indicating the relative values of this instance and value.

An Int16, regardless of its value, is considered greater than a null reference. An object to compare, or null.

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Returns a value indicating whether this instance is equal to a specified object.

Return Value: true if obj is an instance of Int16 and equals the value of this instance; otherwise, false. An object to compare with this instance.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for this instance.

Return Value: A 32-bit signed integer hash code.

GetTypeCode

[C#] public TypeCode GetTypeCode( );

[C++] public: _sealed TypeCode GetTypeCode( );

[VB] NotOverridable Public Function GetTypeCode( ) As TypeCode

[JScript] public function GetTypeCode( ): TypeCode;

Description

Returns the TypeCode for value type Int16.

Return Value: The enumerated constant, System.TypeCode.Int16.

Parse

[C#] public static short Parse(string s);

[C++] public: static short Parse(String* s);

[VB] Public Shared Function Parse(ByVal s As String) As Short

[JScript] public static function Parse(s: String): Int16; Converts the String representation of a number to its 16-bit signed integer equivalent.

Description

Converts the String representation of a number to its 16-bit signed integer equivalent.

Return Value: A 16-bit signed integer equivalent to the number contained in s.

s contains a number of the form: [ws][sign]digits[ws] Items in square brackets ('[' and ']') are optional, and other items are as follows. A System.String containing a number to convert.

Parse

[C#] public static short Parse(string s, IFormatProvider provider);

[C++] public: static short Parse(String* s, IFormatProvider* provider);

[VB] Public Shared Function Parse(ByVal s As String, ByVal provider As IFormatProvider) As Short

[JScript] public static function Parse(s: String, provider: IFormatProvider) Int16;

Description

Converts the String representation of a number in a specified culture-specific format to its 16-bit signed integer equivalent.

Return Value: A 16-bit signed integer equivalent to the number specified in s.

s contains a number of the form: [ws][sign]digits[ws] Items in square brackets ('[' and ']') are optional, and other items are as follows. A System.String containing a number to convert. An System.IFormatProvider interface implementation which supplies culture-specific formatting information about s.

Parse

[C#] public static short Parse(string s, NumberStyles style);

[C++] public: static short Parse(String* s, NumberStyles style);

[VB] Public Shared Function Parse(ByVal s As String, ByVal style As NumberStyles) As Short

[JScript] public static function Parse(s: String, style: NumberStyles): Int16;

Description

Converts the String representation of a number in a specified style to its 16-bit signed integer equivalent.

Return Value: A 16-bit signed integer equivalent to the number specified in s.

s contains a number of the form: [ws][sign]digits[ws] Items in square brackets ('[' and ']') are optional, and other items are as follows. A System.String containing a number to convert. The combination of one or more System.Globalization.NumberStylesconstants that indicate the permitted format of s.

Parse

[C#] public static short Parse(string s, NumberStyles style, IFormatProvider provider);

[C++] public: static short Parse(String* s, NumberStyles style, IFormatProvider* provider);

[VB] Public Shared Function Parse(ByVal s As String, ByVal style As NumberStyles, ByVal provider As IFormatProvider) As Short

[JScript] public static function Parse(s: String, style: NumberStyles, provider: IFormatProvider): Int16;

Description

Converts the String representation of a number in a specified style and culture-specific format to its 16-bit signed integer equivalent.

Return Value: A 16-bit signed integer equivalent to the number specified in s.

s contains a number of the form: [ws][sign]digits[ws] Items in square brackets ('[' and ']') are optional, and other items are as follows. A System.String containing a number to convert. The combination of one or more System.Globalization.NumberStylesconstants that indicate the permitted format of s. An System.IFormatProvider interface implementation which supplies culture-specific formatting information about s.

IConvertible.ToBoolean

[C#] bool IConvertible.ToBoolean(IFormatProvider provider);

[C++] bool IConvertible::ToBoolean(IFormatProvider* provider);

[VB] Function ToBoolean(ByVal provider As IFormatProvider) As Boolean Implements IConvertible.ToBoolean

[JScript] function IConvertible.ToBoolean(provider: IFormatProvider): Boolean;

IConvertible.ToByte

[C#] byte IConvertible.ToByte(IFormatProvider provider);

[C++] unsigned char IConvertible::ToByte(IFormatProvider* provider);

[VB] Function ToByte(ByVal provider As IFormatProvider) As Byte Implements IConvertible.ToByte

[JScript] function IConvertible.ToByte(provider: IFormatProvider): Byte;

IConvertible.ToChar

[C#] char IConvertible.ToChar(IFormatProvider provider);

[C++] _wchar_t IConvertible::ToChar(IFormatProvider* provider);

[VB] Function ToChar(ByVal provider As IFormatProvider) As Char Implements IConvertible.ToChar

[JScript] function IConvertible.ToChar(provider: IFormatProvider): Char;

IConvertible.ToDateTime

[C#] DateTime IConvertible.ToDateTime(IFormatProvider provider);

[C++] DateTime IConvertible::ToDateTime(IFormatProvider* provider);

[VB] Function ToDateTime(ByVal provider As IFormatProvider) As DateTime Implements IConvertible.ToDateTime

[JScript] function IConvertible.ToDateTime(provider: IFormatProvider): DateTime;

IConvertible.ToDecimal

[C#] decimal IConvertible.ToDecimal(IFormatProvider provider);

[C++] Decimal IConvertible::ToDecimal(IFormatProvider* provider);

[VB] Function ToDecimal(ByVal provider As IFormatProvider) As Decimal Implements IConvertible.ToDecimal

[JScript] function IConvertible.ToDecimal(provider: IFormatProvider): Decimal;

IConvertible.ToDouble

[C#] double IConvertible.ToDouble(IFormatProvider provider);

[C++] double IConvertible::ToDouble(IFormatProvider* provider);

[VB] Function ToDouble(ByVal provider As IFormatProvider) As Double Implements IConvertible.ToDouble

[JScript] function IConvertible.ToDouble(provider: IFormatProvider): double;

IConvertible.ToInt16

[C#] short IConvertible.ToInt16(IFormatProvider provider);

[C++] short IConvertible::ToInt16(IFormatProvider* provider);

[VB] Function ToInt16(ByVal provider As IFormatProvider) As Short Implements IConvertible.ToInt16

[JScript] function IConvertible.ToInt16(provider: IFormatProvider): Int16;

IConvertible.ToInt32

[C#] int IConvertible.ToInt32(IFormatProvider provider);

[C++] int IConvertible::ToInt32(IFormatProvider* provider);

[VB] Function ToInt32(ByVal provider As IFormatProvider) As Integer Implements IConvertible.ToInt32

[JScript] function IConvertible.ToInt32(provider: IFormatProvider): int;

IConvertible.ToInt64

[C#] long IConvertible.ToInt64(IFormatProvider provider);

[C++]-int64 IConvertible::ToInt64(IFormatProvider* provider);

[VB] Function ToInt64(ByVal provider As IFormatProvider) As Long Implements IConvertible.ToInt64

[JScript] function IConvertible.ToInt64(provider: IFormatProvider): long;

IConvertible.ToSByte

[C#] sbyte IConvertible.ToSByte(IFormatProvider provider);

[C++] char IConvertible::ToSByte(IFormatProvider* provider);

[VB] Function ToSByte(ByVal provider As IFormatProvider) As SByte Implements IConvertible.ToSByte

[JScript] function IConvertible.ToSByte(provider: IFormatProvider): SByte;

IConvertible.ToSingle

[C#] float IConvertible.ToSingle(IFormatProvider provider);

[C++] float IConvertible::ToSingle(IFormatProvider* provider);

[VB] Function ToSingle(ByVal provider As IFormatProvider) As Single Implements IConvertible.ToSingle

[JScript] function IConvertible.ToSingle(provider: IFormatProvider): float;

IConvertible.ToType

[C#] object IConvertible.ToType(Type type, IFormatProvider provider);

[C++] Object* IConvertible::ToType(Type* type, IFormatProvider* provider);

[VB] Function ToType(ByVal type As Type, ByVal provider As IFormatProvider) As Object Implements IConvertible.ToType

[JScript] function IConvertible.ToType(type: Type, provider: IFormatProvider): Object;

IConvertible.ToUInt16

[C#] ushort IConvertible. ToUInt16(IFormatProvider provider);

[C++] unsigned short IConvertible::ToUInt16(IFormatProvider* provider);

[VB] Function ToUInt16(ByVal provider As IFormatProvider) As UInt16 Implements IConvertible.ToUInt16

[JScript] function IConvertible.ToUInt16(provider: IFormatProvider): UInt16;

IConvertible.ToUInt32

[C#] uint IConvertible:ToUInt32(IFormatProvider provider);

[C++] unsigned int IConvertible::ToUInt32(IFormatProvider* provider);

[VB] Function ToUInt32(ByVal provider As IFormatProvider) As UInt32 Implements IConvertible.ToUInt32

[JScript] function IConvertible.ToUInt32(provider: IFormatProvider): UInt32;

IConvertible.ToUInt64

[C#] ulong IConvertible.ToUInt64(IFormatProvider provider);

[C++] unsigned _int64 IConvertible::ToUInt64(IFormatProvider* provider);

[VB] Function ToUInt64(ByVal provider As IFormatProvider) As UInt64 Implements IConvertible.ToUInt64

[JScript] function IConvertible.ToUInt64(provider: IFormatProvider): UInt64;

ToString

[C#] public override string ToString( );

[C++] public: String* ToString( );

[VB] Overrides Public Function ToString( ) As String

[JScript] public override function ToString( ): String; Converts the numeric value of this instance to its equivalent String representation.

Description

Converts the numeric value of this instance to its equivalent String representation.

Return Value: The System.String representation of the value of this instance, consisting of a minus sign if the value is negative, and a sequence of digits ranging from 0 to 9 with no leading zeroes.

The return value is formatted with the general format specifier ("G") and the System.Globalization.NumberFormatInfo for the current culture.

ToString

[C#] public string ToString(IFormatProvider provider);

[C++] public: _sealed String* ToString(IFormatProvider* provider);

[VB] NotOverridable Public Function ToString(ByVal provider As IFormatProvider) As String

[JScript] public function ToString(provider: IFormatProvider): String;

Description

Converts the numeric value of this instance to its equivalent String representation using the specified culture-specific format information.

Return Value: The System.String representation of the value of this instance as specified by provider.

This instance is formatted with the general format specifier ("G"). An System.IFormatProvider interface implementation which supplies culture-specific formatting information.

ToString

[C#] public string ToString(string format);

[C++] public: String* ToString(String* format);

[VB] Public Function ToString(ByVal format As String) As String

[JScript] public function ToString(format: String): String;

Description

Converts the numeric value of this instance to its equivalent String representation, using the specified format.

Return Value: The System.String representation of the value of this instance as specified by format.

If format is null or an empty string, the return value of this instance is formatted with the general format specifier ("G"). A format string.

ToString

[C#] public string ToString(string format, IFormatProvider provider);

[C++] public: _sealed String* ToString(String* format, IFormatProvider* provider);

[VB] NotOverridable Public Function ToString(ByVal format As String, ByVal provider As IFormatProvider) As String

[JScript] public function ToString(format: String, provider: IFormatProvider) String;

Description

Converts the numeric value of this instance to its equivalent String representation using the specified format and culture-specific format information.

Return Value: The System.String representation of the value of this instance as specified by format and provider.

If format is null or an empty string, the return value for this instance is formatted with the general format specifier ("G"). A format specification. An System.IFormatProvider interface implementation which supplies culture-specific formatting information about this instance.

Int32 structure (System)

ToString

Description

Represents a 32-bit signed integer.

The Int32 value type represents signed integers with values ranging from negative 2,147,483,648 through positive 2,147,483,647.

ToString

[C#] public const int MaxValue;

[C++] public: const int MaxValue;

[VB] Public Const MaxValue As Integer

[JScript] public var MaxValue: int;

Description

A constant representing the largest possible value of Int32.

The value of this constant is 2,147,483,647; that is, hexadecimal 0x7FFFFFFF.

ToString

[C#] public const int MinValue;

[C++] public: const int MinValue;

[VB] Public Const MinValue As Integer

[JScript] public var MinValue: int;

Description

A constant representing the smallest possible value of Int32.

The value of this constant is −2,147,483,648; that is, hexadecimal 0x80000000.

CompareTo

[C#] public int CompareTo(object value);

[C++] public: _sealed int CompareTo(Object* value);

[VB] NotOverridable Public Function CompareTo(ByVal value As Object) As Integer

[JScript] public function CompareTo(value: Object): int;

Description

Compares this instance to a specified object and returns an indication of their relative values.

Return Value: A signed number indicating the relative values of this instance and value.

Any instance of Int32, regardless of its value, is considered greater than null. An object to compare, or null.

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Returns a value indicating whether this instance is equal to a specified object.

Return Value: true if obj is an instance of Int32 and equals the value of this instance; otherwise, false. An object to compare with this instance.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for this instance.

Return Value: A 32-bit signed integer hash code.

GetTypeCode

[C#] public TypeCode GetTypeCode( );

[C++] public: _sealed TypeCode GetTypeCode( );

[VB] NotOverridable Public Function GetTypeCode( ) As TypeCode

[JScript] public function GetTypeCode( ): TypeCode;

Description

Returns the TypeCode for value type Int32.

Return Value: The enumerated constant, System.Type Code.Int32.

Parse

[C#] public static int Parse(string s);

[C++] public: static int Parse(String* s);

[VB] Public Shared Function Parse(ByVal s As String) As Integer

[JScript] public static function Parse(s: String): int; Converts the String representation of a number to its 32-bit signed integer equivalent.

Description

Converts the String representation of a number to its 32-bit signed integer equivalent.

Return Value: An 32-bit signed integer equivalent to the number contained in s.

s contains a number of the form: [ws][sign]digits [ws] Items in square brackets ('[' and ']') are optional, and other items are as follows. A System.String containing a number to convert.

Parse

[C#] public static int Parse(string s, IFormatProvider provider);

[C++] public: static int Parse(String* s, IFormatProvider* provider);

[VB] Public Shared Function Parse(ByVal s As String, ByVal provider As IFormatProvider) As Integer

[JScript] public static function Parse(s: String, provider: IFormatProvider) int;

Description

Converts the String representation of a number in a specified culture-specific format to its 32-bit signed integer equivalent.

Return Value: A 32-bit signed integer equivalent to the number specified in s.

s contains a number of the form: [ws][sign]digits[ws] Items in square brackets ('[' and ']') are optional, and other items are as follows. A System.String containing a number to convert. An System.IFormatProvider interface implementation which supplies culture-specific formatting information about s.

Parse

[C#] public static int Parse(string s, NumberStyles style);

[C++] public: static int Parse(String* s, NumberStyles style);

[VB] Public Shared Function Parse(ByVal s As String, ByVal style As NumberStyles) As Integer

[JScript] public static function Parse(s: String, style: NumberStyles): int;

Description

Converts the String representation of a number in a specified style to its 32-bit signed integer equivalent.

Return Value: An 32-bit signed integer equivalent to the number specified in s.

s contains a number of the form: [ws][sign]digits[ws] Items in square brackets ('[' and ']') are optional, and other items are as follows. A System.String containing a number to convert. The combination of one or more System.Globalization.NumberStylesconstants that indicate the permitted format of s.

Parse

[C#] public static int Parse(string s, NumberStyles style, IFormatProvider provider);

[C++] public: static int Parse(String* s, NumberStyles style, IFormatProvider* provider);

[VB] Public Shared Function Parse(ByVal s As String, ByVal style As NumberStyles, ByVal provider As IFormatProvider) As Integer

[JScript] public static function Parse(s: String, style: NumberStyles, provider: IFormatProvider): int;

Description

Converts the String representation of a number in a specified style and culture-specific format to its 32-bit signed integer equivalent.

Return Value: An 32-bit signed integer equivalent to the number specified in s.

s contains a number of the form: [ws][sign]digits[ws] Items in square brackets ('[' and ']') are optional, and other items are as follows. A System.String containing a number to convert. The combination of one or more System.Globalization.NumberStylesconstants that indicate the permitted format of s. An System.IFormatProvider interface implementation which supplies culture-specific formatting information about s.

IConvertible.ToBoolean

[C#] bool IConvertible.ToBoolean(IFormatProvider provider);

[C++] bool IConvertible::ToBoolean(IFormatProvider* provider);

[VB] Function ToBoolean(ByVal provider As IFormatProvider) As Boolean Implements IConvertible.ToBoolean

[JScript] function IConvertible.ToBoolean(provider: IFormatProvider): Boolean;

IConvertible.ToByte

[C#] byte IConvertible.ToByte(IFormatProvider provider);

[C++] unsigned char IConvertible::ToByte(IFormatProvider* provider);

[VB] Function ToByte(ByVal provider As IFormatProvider) As Byte Implements IConvertible.ToByte

[JScript] function IConvertible.ToByte(provider: IFormatProvider): Byte;

IConvertible.ToChar

[C#] char IConvertible.ToChar(IFormatProvider provider);

[C++] _wchar_t IConvertible::ToChar(IFormatProvider* provider);

[VB] Function ToChar(ByVal provider As IFormatProvider) As Char Implements IConvertible.ToChar

[JScript] function IConvertible.ToChar(provider: IFormatProvider): Char;

IConvertible.ToDateTime

[C#] DateTime IConvertible.ToDateTime(IFormatProvider provider);

[C++] DateTime IConvertible::ToDateTime(IFormatProvider* provider);

[VB] Function ToDateTime(ByVal provider As IFormatProvider) As DateTime Implements IConvertible.ToDateTime

[JScript] function IConvertible.ToDateTime(provider: IFormatProvider) DateTime;

IConvertible.ToDecimal

[C#] decimal IConvertible.ToDecimal(IFormatProvider provider);

[C++] Decimal IConvertible::ToDecimal(IFormatProvider* provider);

[VB] Function ToDecimal(ByVal provider As IFormatProvider) As Decimal Implements IConvertible.ToDecimal

[JScript] function IConvertible.ToDecimal(provider: IFormatProvider): Decimal;

IConvertible.ToDouble

[C#] double IConvertible.ToDouble(IFormatProvider provider);

[C++] double IConvertible::ToDouble(IFormatProvider* provider);

[VB] Function ToDouble(ByVal provider As IFormatProvider) As Double Implements IConvertible.ToDouble

[JScript] function IConvertible.ToDouble(provider: IFormatProvider): double;

IConvertible.ToInt16

[C#] short IConvertible:ToInt16(IFormatProvider provider);

[C++] short IConvertible::ToInt16(IFormatProvider* provider);

[VB] Function ToInt16(ByVal provider As IFormatProvider) As Short Implements IConvertible.ToInt16

[JScript] function IConvertible.ToInt16(provider: IFormatProvider): Int16;

IConvertible.ToInt32

[C#] int IConvertible.ToInt32(IFormatProvider provider);

[C++] int IConvertible::ToInt32(IFormatProvider* provider);

[VB] Function ToInt32(ByVal provider As IFormatProvider) As Integer Implements IConvertible.ToInt32

[JScript] function IConvertible.ToInt32(provider: IFormatProvider): int;

IConvertible.ToInt64

[C#] long IConvertible.ToInt64(IFormatProvider provider);

[C++] _int64 IConvertible::ToInt64(IFormatProvider* provider);

[VB] Function ToInt64(ByVal provider As IFormatProvider) As Long Implements IConvertible.ToInt64

[JScript] function IConvertible.ToInt64(provider: IFormatProvider): long;

IConvertible.ToSByte

[C#] sbyte IConvertible.ToSByte(IFormatProvider provider);

[C++] char IConvertible::ToSByte(IFormatProvider* provider);

[VB] Function ToSByte(ByVal provider As IFormatProvider) As SByte Implements IConvertible.ToSByte

[JScript] function IConvertible.ToSByte(provider: IFormatProvider): SByte;

IConvertible.ToSingle

[C#] float IConvertible.ToSingle(IFormatProvider provider);

[C++] float IConvertible::ToSingle(IFormatProvider* provider);

[VB] Function ToSingle(ByVal provider As IFormatProvider) As Single Implements IConvertible.ToSingle

[JScript] function IConvertible.ToSingle(provider: IFormatProvider): float;

IConvertible.ToType

[C#] object IConvertible.ToType(Type type, IFormatProvider provider);

[C++] Object* IConvertible::ToType(Type* type, IFormatProvider* provider);

[VB] Function ToType(ByVal type As Type, ByVal provider As IFormatProvider) As Object Implements IConvertible. ToType

[JScript] function IConvertible.ToType(type: Type, provider: IFormatProvider): Object;

IConvertible.ToUInt16

[C#] ushort IConvertible. ToUInt16(IFormatProvider provider);

[C++] unsigned short IConvertible::ToUInt16(IFormatProvider* provider);

[VB] Function ToUInt16(ByVal provider As IFormatProvider) As UInt16 Implements IConvertible.ToUInt16

[JScript] function IConvertible.ToUInt16(provider: IFormatProvider): UInt16;

IConvertible.ToUInt32

[C#] uint IConvertible.ToUInt32(IFormatProvider provider);

[C++] unsigned int IConvertible::ToUInt32(IFormatProvider* provider);

[VB] Function ToUInt32(ByVal provider As IFormatProvider) As UInt32 Implements IConvertible.ToUInt32

[JScript] function IConvertible.ToUInt32(provider: IFormatProvider): UInt32;

IConvertible.ToUInt64

[C#] ulong IConvertible.ToUInt64(IFormatProvider provider);

[C++] unsigned _int64 IConvertible::ToUInt64(IFormatProvider* provider);

[VB] Function ToUInt64(ByVal provider As IFormatProvider) As UInt64 Implements IConvertible.ToUInt64

[JScript] function IConvertible.ToUInt64(provider: IFormatProvider): UInt64;

ToString

[C#] public override string ToString( );

[C++] public: String* ToString( );

[VB] Overrides Public Function ToString( ) As String

[JScript] public override function ToString( ): String; Converts the numeric value of this instance to its equivalent String representation.

Description

Converts the numeric value of this instance to its equivalent String to representation.

Return Value: The System.String representation of the value of this instance, consisting of a negative sign if the value is negative, and a sequence of digits ranging from 0 to 9 with no leading zeroes.

The return value is formatted with the general format specifier ("G") and the System.Globalization.NumberFormatInfo for the current culture.

ToString

[C#] public string ToString(IFormatProvider provider);

[C++] public: __sealed String* ToString(IFormatProvider* provider);

[VB] NotOverridable Public Function ToString(ByVal provider As IFormatProvider) As String

[JScript] public function ToString(provider: IFormatProvider): String;

Description

Converts the numeric value of this instance to its equivalent String representation using the specified culture-specific format information.

Return Value: The System.String representation of the value of this instance as specified by provider.

This instance is formatted with the general format specifier ("G"). An System.IFormatProvider interface implementation which supplies culture-specific formatting information.

ToString

[C#] public string ToString(string format);

[C++] public: String* ToString(String* format);

[VB] Public Function ToString(ByVal format As String) As String

[JScript] public function ToString(format: String): String;

Description

Converts the numeric value of this instance to its equivalent String representation, using the specified format.

Return Value: The System.String representation of the value of this instance as specified by format.

If format is null or an empty string (" "), the return value of this instance is formatted with the general format specifier ("G"). A format string.

ToString

[C#] public string ToString(string format, IFormatProvider provider);

[C++] public: _sealed String* ToString(String* format, IFormatProvider* provider);

[VB] NotOverridable Public Function ToString(ByVal format As String, ByVal provider As IFormatProvider) As String

[JScript] public function ToString(format: String, provider: IFormatProvider): String;

Description

Converts the numeric value of this instance to its equivalent String representation using the specified format and culture-specific format information.

Return Value: The System.String representation of the value of this instance as specified by format and provider.

If format is null or an empty string ( ),the return value for this instance is formatted with the general format specifier ("G"). A format specification. An System.IFormatProvider interface implementation which supplies culture-specific formatting information.

Int64 structure (System)

ToString

Description

Represents a 64-bit signed integer.

The Int64 value type represents integers with values ranging from negative 9,223,372,036,854,775,808 through positive 9,223,372,036,854,775,807.

ToString

[C#] public const long MaxValue;

[C++] public: const _int64 MaxValue;

[VB] Public Const MaxValue As Long

[JScript] public var MaxValue: long;

Description

A constant representing the largest possible value of Int64.

The value of this constant is 9,223,372,036,854,775,807; that is, hexadecimal 0x7FFFFFFFFFFFFFFF.

ToString

[C#] public const long MinValue;

[C++] public: const _int64 MinValue;

[VB] Public Const MinValue As Long

[JScript] public var MinValue: long;

Description

A constant representing the smallest possible value of Int64.

The value of this constant is negative 9,223,372,036,854,775,808; that is, hexadecimal 0x8000000000000000.

CompareTo

[C#] public int CompareTo(object value);

[C++] public: _sealed int CompareTo(Object* value);

[VB] NotOverridable Public Function CompareTo(ByVal value As Object) As Integer

[JScript] public function CompareTo(value: Object): int;

Description

Compares this instance to a specified object and returns an indication of their relative values.

Return Value: A signed number indicating the relative values of this instance and value.

An Int64, regardless of its value, is considered greater than a null reference. An object to compare, or null.

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Returns a value indicating whether this instance is equal to a specified object.

Return Value: true if obj is an instance of Int64 and equals the value of this instance; otherwise, false. An object to compare with this instance.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for this instance.

Return Value: A 32-bit signed integer hash code.

GetTypeCode

[C#] public TypeCode GetTypeCode( );

[C++] public: _sealed TypeCode GetTypeCode( );

[VB] NotOverridable Public Function GetTypeCode( ) As TypeCode

[JScript] public function GetTypeCode( ): TypeCode;

Description

Returns the TypeCode for value type Int64.

Return Value: The enumerated constant, System.TypeCode.Int64.

Parse

[C#] public static long Parse(string s);

[C++] public: static _int64 Parse(String* s);

[VB] Public Shared Function Parse(ByVal s As String) As Long

[JScript] public static function Parse(s: String): long; Converts the String representation of a number to its 64-bit signed integer equivalent.

Description

Converts the String representation of a number to its 64-bit signed integer equivalent.

Return Value: A 64-bit signed integer equivalent to the number contained in s.

s contains a number of the form: [ws][sign]digits[ws] Items in square brackets ('[' and ']') are optional, and other items are as follows. A System.String containing a number to convert.

Parse

[C#] public static long Parse(string s, IFormatProvider provider);

[C++] public: static _int64 Parse(String* s, IFormatProvider* provider);

[VB] Public Shared Function Parse(ByVal s As String, ByVal provider As IFormatProvider) As Long

[JScript] public static function Parse(s: String, provider: IFormatProvider): long;

Description

Converts the String representation of a number in a specified culture-specific format to its 64-bit signed integer equivalent.

Return Value: A 64-bit signed integer equivalent to the number specified in s.

s contains a number of the form: [ws][sign]digits[ws] Items in square brackets ('[' and ']') are optional, and other items are as follows. A System.String containing a number to convert. An System.IFormatProvider interface implementation which supplies culture-specific formatting information about s.

Parse

[C#] public static long Parse(string s, NumberStyles style);

[C++] public: static _int64 Parse(String* s, NumberStyles style);

[VB] Public Shared Function Parse(ByVal s As String, ByVal style As NumberStyles) As Long

[JScript] public static function Parse(s: String, style: NumberStyles): long;

Description

Converts the String representation of a number in a specified style to its 64-bit signed integer equivalent.

Return Value: A 64-bit signed integer equivalent to the number specified in s.

s contains a number of the form: [ws][sign]digits[ws] Items in square brackets ('[' and ']') are optional, and other items are as follows. A System.String containing a number to convert. The combination of one or more System.Globalization.NumberStylesconstants that indicate the permitted format of s.

Parse

[C#] public static long Parse(string s, NumberStyles style, IFormatProvider provider);

[C++] public: static _int64 Parse(String* s, NumberStyles style, IFormatProvider* provider);

[VB] Public Shared Function Parse(ByVal s As String, ByVal style As NumberStyles, ByVal provider As IFormatProvider) As Long

[JScript] public static function Parse(s: String, style: NumberStyles, provider: IFormatProvider): long;

Description

Converts the String representation of a number in a specified style and culture-specific format to its 64-bit signed integer equivalent.

Return Value: A 64-bit signed integer equivalent to the number specified in s.

s contains a number of the form: [ws][sign]digits[ws] Items in square brackets ('[' and ']') are optional, and other items are as follows. A System.String containing a number to convert. The combination of one or more System.Globalization.NumberStylesconstants that indicate the permitted format of s. An System.IFormatProvider interface implementation which supplies culture-specific formatting information about s.

IConvertible.ToBoolean

[C#] bool IConvertible.ToBoolean(IFormatProvider provider);

[C++] bool IConvertible::ToBoolean(IFormatProvider* provider);

[VB] Function ToBoolean(ByVal provider As IFormatProvider) As Boolean Implements IConvertible.ToBoolean

[JScript] function IConvertible.ToBoolean(provider: IFormatProvider): Boolean;

IConvertible.ToByte

[C#] byte IConvertible.ToByte(IFormatProvider provider);

[C++] unsigned char IConvertible::ToByte(IFormatProvider* provider);

[VB] Function ToByte(ByVal provider As IFormatProvider) As Byte Implements IConvertible.ToByte

[JScript] function IConvertible.ToByte(provider: IFormatProvider): Byte;

IConvertible.ToChar

[C#] char IConvertible.ToChar(IFormatProvider provider);

[C++] _wchar_t IConvertible::ToChar(IFormatProvider* provider);

[VB] Function ToChar(ByVal provider As IFormatProvider) As Char Implements IConvertible.ToChar

[JScript] function IConvertible.ToChar(provider: IFormatProvider): Char;

IConvertible.ToDateTime

[C#] DateTime IConvertible.ToDateTime(IFormatProvider provider);

[C++] DateTime IConvertible::ToDateTime(IFormatProvider* provider);

[VB] Function ToDateTime(ByVal provider As IFormatProvider) As DateTime Implements IConvertible.ToDateTime

[JScript] function IConvertible.ToDateTime(provider: IFormatProvider) DateTime;

IConvertible.ToDecimal

[C#] decimal IConvertible.ToDecimal(IFormatProvider provider);

[C++] Decimal IConvertible::ToDecimal(IFormatProvider* provider);

[VB] Function ToDecimal(ByVal provider As IFormatProvider) As Decimal Implements IConvertible.ToDecimal

[JScript] function IConvertible.ToDecimal(provider: IFormatProvider): Decimal;

IConvertible.ToDouble

[C#] double IConvertible.ToDouble(IFormatProvider provider);

[C++] double IConvertible::ToDouble(IFormatProvider* provider);

[VB] Function ToDouble(ByVal provider As IFormatProvider) As Double Implements IConvertible.ToDouble

[JScript] function IConvertible.ToDouble(provider: IFormatProvider): double;

IConvertible.ToInt16

[C#] short IConvertible.ToInt16(IFormatProvider provider);

[C++] short IConvertible::ToInt16(IFormatProvider* provider);

[VB] Function ToInt16(ByVal provider As IFormatProvider) As Short Implements IConvertible.ToInt16

[JScript] function IConvertible.ToInt16(provider: IFormatProvider): Int16;

IConvertible.ToInt32

[C#] int IConvertible.ToInt32(IFormatProvider provider);

[C++] int IConvertible::ToInt32(IFormatProvider* provider);

[VB] Function ToInt32(ByVal provider As IFormatProvider) As Integer Implements IConvertible.ToInt32

[JScript] function IConvertible.ToInt32(provider: IFormatProvider): int;

IConvertible.ToInt64

[C#] long IConvertible.ToInt64(IFormatProvider provider);

[C++] _int64 IConvertible::ToInt64(IFormatProvider* provider);

[VB] Function ToInt64(ByVal provider As IFormatProvider) As Long Implements IConvertible.ToInt64

[JScript] function IConvertible.ToInt64(provider: IFormatProvider): long;

IConvertible.ToSByte

[C#] sbyte IConvertible.ToSByte(IFormatProvider provider);

[C++] char IConvertible::ToSByte(IFormatProvider* provider);

[VB] Function ToSByte(ByVal provider As IFormatProvider) As SByte Implements IConvertible.ToSByte

[JScript] function IConvertible.ToSByte(provider: IFormatProvider): SByte;

IConvertible.ToSingle

[C#] float IConvertible.ToSingle(IFormatProvider provider);

[C++] float IConvertible::ToSingle(IFormatProvider* provider);

[VB] Function ToSingle(ByVal provider As IFormatProvider) As Single Implements IConvertible.ToSingle

[JScript] function IConvertible.ToSingle(provider: IFormatProvider): float;

IConvertible.ToType

[C#] object IConvertible.ToType(Type type, IFormatProvider provider);

[C++] Object* IConvertible::ToType(Type* type, IFormatProvider* provider);

[VB] Function ToType(ByVal type As Type, ByVal provider As IFormatProvider) As Object Implements IConvertible.ToType

[JScript] function IConvertible.ToType(type: Type, provider: IFormatProvider): Object;

IConvertible.ToUInt16

[C#] ushort IConvertible.ToUInt16(IFormatProvider provider);

[C++] unsigned short IConvertible::ToUInt16(IFormatProvider* provider);

[VB] Function ToUInt16(ByVal provider As IFormatProvider) As UInt16 Implements IConvertible.ToUInt16

[JScript] function IConvertible.ToUInt16(provider: IFormatProvider): UInt16;

IConvertible.ToUInt32

[C#] uint IConvertible.ToUInt32(IFormatProvider provider);

[C++] unsigned _int IConvertible::ToUInt32(IFormatProvider* provider);

[VB] Function ToUInt32(ByVal provider As IFormatProvider) As UInt32 Implements IConvertible.ToUInt32

[JScript] function IConvertible.ToUInt32(provider: IFormatProvider): UInt32;

IConvertible.ToUInt64

[C#] ulong IConvertible.ToUInt64(IFormatProvider provider);

[C++] unsigned _int64 IConvertible::ToUInt64(IFormatProvider* provider);

[VB] Function ToUInt64(ByVal provider As IFormatProvider) As UInt64 Implements IConvertible.ToUInt64

[JScript] function IConvertible.ToUInt64(provider: IFormatProvider): UInt64;

ToString

[C#] public override string ToString( );

[C++] public: String* ToString( );

[VB] Overrides Public Function ToString( ) As String

[JScript] public override function ToString( ): String; Converts the numeric value of this instance to its equivalent String representation.

Description

Converts the numeric value of this instance to its equivalent String representation.

Return Value: The System.String representation of the value of this instance, consisting of a minus sign if the value is negative, and a sequence of digits ranging from 0 to 9 with no leading zeroes.

The return value is formatted with the general format specifier ("G") and the System.Globalization.NumberFormatInfo for the current culture.

ToString

[C#] public string ToString(IFormatProvider provider);

[C++] public: _sealed String* ToString(IFormatProvider* provider);

[VB] NotOverridable Public Function ToString(ByVal provider As IFormatProvider) As String

[JScript] public function ToString(provider: IFormatProvider): String;

Description

Converts the numeric value of this instance to its equivalent String representation using the specified culture-specific format information.

Return Value: The System.String representation of the value of this instance as specified by provider.

This instance is formatted with the general format specifier ("G"). An System.IFormatProvider interface implementation which supplies culture-specific formatting information.

ToString

[C#] public string ToString(string format);

[C++] public: String* To String(String* format);

[VB] Public Function ToString(ByVal format As String) As String

[JScript] public function ToString(format: String): String;

Description

Converts the numeric value of this instance to its equivalent String representation, using the specified format.

Return Value: The System.String representation of the value of this instance as specified by format.

If format is null or an empty string (" "), the return value of this instance is formatted with the general format specifier ("G"). A format string.

ToString

[C#] public string ToString(string format, IFormatProvider provider);

[C++] public: _sealed String* ToString(String* format, IFormatProvider* provider);

[VB] NotOverridable Public Function ToString(ByVal format As String, ByVal provider As IFormatProvider) As String

[JScript] public function ToString(format: String, provider: IFormatProvider): String;

Description

Converts the numeric value of this instance to its equivalent String representation using the specified format and culture-specific format information.

Return Value: The System.String representation of the value of this instance as specified by format and provider.

If format is null or an empty string (" "), the return value for this instance is formatted with the general format specifier ("G"). A format specification. An System.IFormatProvider interface implementation which supplies culture-specific formatting information about this instance.

IntPtr structure (System)

ToString

Description

A platform-specific type that is used to represent a pointer or a handle.

The System.IntPtr type is designed to be a platform-specific, machine-sized integer. That is, an instance of this type is expected to be 32-bits on 32-bit hardware and operating systems, and 64-bits on 64-bit hardware and operating systems.

ToString

[C#] public static readonly IntPtr Zero;

[C++] public: static IntPtr Zero;

[VB] Public Shared ReadOnly Zero As IntPtr

[JScript] public static var Zero: IntPtr;

Description

A read-only field that represents an uninitialized pointer or handle.

The value of this field is not equivalent to null, but is instead a pointer which has not been assigned any value whatsoever. Use this field to efficiently determine whether an instance of IntPtr has been set.

IntPtr

Example Syntax:

ToString

[C#] public IntPtr(int value);

[C++] public: IntPtr(int value);

[VB] Public Sub New(ByVal value As Integer)

[JScript] public function IntPtr(value: int); Initializes a new instance of the System.IntPtr structure.

Description

Initializes a new instance of the System.IntPtr structure to the specified 32-bit pointer or handle. A pointer or handle contained in a 32-bit signed integer.

IntPtr

Example Syntax:

ToString

[C#] public IntPtr(long value);

[C++] public: IntPtr(_int64 value);

[VB] Public Sub New(ByVal value As Long)

[JScript] public function IntPtr(value: long);

Description

Initializes a new instance of the System.IntPtr structure to the specified 64-bit pointer.

An exception is only thrown if the value of value requires more bits than the current platform supports. A pointer or handle contained in a 64-bit signed integer.

IntPtr

Example Syntax:

ToString

[C#] unsafe public IntPtr(void* value);

[C++] public: IntPtr(void* value);

Size

ToString

[C#] public static int Size {get;}

[C++] public: _property static int get_Size( );

[VB] Public Shared ReadOnly Property Size As Integer

[JScript] public static function get Size( ): int;

Description

Gets the size of this instance.

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Returns a value indicating whether this instance is equal to a specified object.

Return Value: true if obj is an instance of IntPtr and equals the value of this instance; otherwise, false. An object to compare with this instance or null.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for this instance.

Return Value: A 32-bit signed integer hash code.

op_Equality

[C#] public static bool operator==(IntPtr value1, IntPtr value2);

[C++] public: static bool op_Equality(IntPtr value1, IntPtr value2);

[VB] returnValue=IntPtr.op_Equality(value1, value2)

[JScript] returnValue=value1==value2;

Description

Determines whether two specified instances of System.IntPtr are equal.

Return Value: true if value1 equals value2; otherwise, false. An IntPtr. An IntPtr.

op_Explicit

[C#] public static explicit operator IntPtr(int value);

[C++] public: static IntPtr op_Explicit(int value);

[VB] returnValue=IntPtr.op_Explicit(value)

[JScript] returnValue=IntPtr(value);

Description

Converts the value of a 32-bit signed integer to an System.IntPtr.

Return Value: A new instance of System.IntPtr initialized to value. A 32-bit signed integer.

op_Explicit

[C#] public static explicit operator IntPtr(long value);

[C++] public: static IntPtr op_Explicit(_int64 value);

[VB] returnValue=IntPtr.op_Explicit(value)

[JScript] returnValue=IntPtr(value);

Description

Converts the value of a 64-bit signed integer to an System.IntPtr

Return Value: A new instance of System.IntPtr initialized to value. A 64-bit signed integer.

op_Explicit

[C#] public static explicit operator int(IntPtr value);

[C++] public: static int op_Explicit( );

[VB] returnValue=IntPtr.op_Explicit(value)

[JScript] returnValue=Int32(value);

Description

Converts the value of the specified System.IntPtr instance to a 32-bit signed integer.

An exception is only thrown if the value of value requires more bits than the current platform supports. An IntPtr.

op_Explicit

[C#] unsafe public static explicit operator void*(IntPtr value);

[C++] public: static void* op_Explicit( );

op_Explicit

[C#] public static explicit operator long(IntPtr value);

[C++] public: static _int64 op_Explicit( );

[VB] returnValue=IntPtr.op_Explicit(value)

[JScript] returnValue=Int64(value);

Description

Converts the value of the specified System.IntPtr instance to a 64-bit signed integer. An IntPtr.

op_Explicit

[C#] unsafe public static explicit operator IntPtr(void* value);

[C++] public: static IntPtr op_Explicit(void* value);

op_Inequality

[C#] public static bool operator !=(IntPtr value1, IntPtr value2);

[C++] public: static bool op_Inequality(IntPtr value1, IntPtr value2);

[VB] returnValue=IntPtr.op_Inequality(value1, value2)

[JScript] returnValue=value1 !=value2;

Description

Determines whether two specified instances of System-.IntPtr are not equal.

Return Value: true if value1 does not equal value2; otherwise, false. An IntPtr. An IntPtr. Serializable.GetObjectData

[C#] void ISerializable.GetObjectData(SerializationInfo info, StreamingContext context);

[C++] void ISerializable::GetObjectData(SerializationInfo* info, StreamingContext context);

[VB] Sub GetObjectData(ByVal info As SerializationInfo, ByVal context As StreamingContext) Implements ISerializable.GetObjectData

[JScript] function ISerializable.GetObjectData(info: SerializationInfo, context: StreamingContext);

ToInt32

[C#] public int ToInt320;

[C++] public: int ToInt320;

[VB] Public Function ToInt320 As Integer

[JScript] public function ToInt320: int;

Description

Converts the value of this instance to a 32-bit signed integer.

Return Value: A 32-bit signed integer.

An exception is only thrown if the value of value requires more bits than the current platform supports.

ToInt64

[C#] public long ToInt64( );

[C++] public: _int64 ToInt64( );

[VB] Public Function ToInt64( ) As Long

[JScript] public function ToInt64( ): long;

Description

Converts the value of this instance to a 64-bit signed integer.

Return Value: A a 64-bit signed integer.

ToPointer

[C#] unsafe public void* ToPointer( );

[C++] public: void* ToPointer( );

Description

Converts the value of this instance to a pointer to an unspecified type.

Return Value: A pointer to System.Void; that is, a pointer to memory containing data of an unspecified type.

ToString

[C#] public override string ToString( );

[C++] public: String* ToString( );

[VB] Overrides Public Function ToString( ) As String

[JScript] public override function ToString( ): String;

Description

Converts the numeric value of this instance to its equivalent String representation.

Return Value: The System.String representation of the value of this instance.

InvalidCastException class (System)

ToString

Description

The exception that is thrown for invalid casting or explicit conversion.

System.InvalidCastException is thrown if: For a conversion from a System.Single or a System.Double to a System-.Decimal, the source value is infinity, Not-a-Number (NaN), or too large to be represented as the destination type.

InvalidCastException

Example Syntax:

ToString

[C#] public InvalidCastException( );

[C++] public: InvalidCastException( );

[VB] Public Sub New( )

[JScript] public function InvalidCastException( ); Initializes a new instance of the System.InvalidCastException class.

Description

Initializes a new instance of the System.InvalidCastException class with default properties.

The following table shows the initial property values for an instance of System.InvalidCastException.

InvalidCastException

Example Syntax:

ToString

[C#] public InvalidCastException(string message);

[C++] public: InvalidCastException(String* message);

[VB] Public Sub New(ByVal message As String)

[JScript] public function InvalidCastException(message: String);

Description

Initializes a new instance of the System.InvalidCastException class with a specified error message.

The following table shows the initial property values for an instance of System.InvalidCastException. The error message that explains the reason for the exception.

InvalidCastException

Example Syntax:

ToString

[C#] protected InvalidCastException(SerializationInfo info, StreamingContext context);

[C++] protected: InvalidCastException(SerializationInfo* info, StreamingContext context);

[VB] Protected Sub New(ByVal info As SerializationInfo, ByVal context As StreamingContext)

[JScript] protected function InvalidCastException(info: SerializationInfo, context StreamingContext);

Description

Initializes a new instance of the System.InvalidCastException class with serialized data.

This constructor is called during deserialization to reconstitute the exception object transmitted over a stream. For more information, see. The object that holds the serialized object data. The contextual information about the source or destination.

InvalidCastException

Example Syntax:

ToString

[C#] public InvalidCastException(string message, Exception innerException);

[C++] public: InvalidCastException(String* message, Exception* innerException);

[VB] Public Sub New(ByVal message As String, ByVal innerException As Exception)

[JScript] public function InvalidCastException(message: String, innerException: Exception);

Description

Initializes a new instance of the System.InvalidCastException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the to constructor. The error message that explains the reason for the exception. An instance of System.Exception that is the cause of the current Exception. If innerException is non-null, then the current Exception is raised in a catch block handling innerException.

HelpLink

HResult

InnerException

Message

Source

StackTrace

TargetSite

InvalidOperationException class (System)

ToString

Description

The exception that is thrown when a method call is invalid for the object's current state.

System.InvalidOperationException is used in cases when the failure to invoke a method is caused by reasons other than invalid arguments. For example, System.InvalidOperationException is thrown by: System.Collections.IEnumerator.MoveNext if objects of a collection are modified after the enumerator is created.

InvalidOperationException

Example Syntax:

ToString

[C#] public InvalidOperationException( );

[C++] public: InvalidOperationException( );

[VB] Public Sub New( )

[JScript] public function InvalidOperationException( ); Initializes a new instance of the System.InvalidOperationException class.

Description

Initializes a new instance of the System.InvalidOperationException class with default properties.

The following table shows the initial property values for an instance of System.InvalidOperationException.

InvalidOperationException

Example Syntax:

ToString

[C#] public InvalidOperationException(string message);

[C++] public: InvalidOperationException(String* message);

[VB] Public Sub New(ByVal message As String)

[JScript] public function InvalidOperationException(message: String);

Description

Initializes a new instance of the System.InvalidOperationException class with a specified error message.

The following table shows the initial property values for an instance of System.InvalidOperationException. The error message that explains the reason for the exception.

InvalidOperationException

Example Syntax:

ToString

[C#] protected InvalidOperationException(SerializationInfo info, StreamingContext context);

[C++] protected: InvalidOperationException(SerializationInfo* info, StreamingContext context);

[VB] Protected Sub New(ByVal info As SerializationInfo, ByVal context As StreamingContext)

[JScript] protected function InvalidOperationException(info: SerializationInfo, context: StreamingContext);

Description

Initializes a new instance of the System.InvalidOperationException class with serialized data.

This constructor is called during deserialization to reconstitute the exception object transmitted over a stream. For more information, see. The object that holds the serialized object data. The contextual information about the source or destination.

InvalidOperationException

Example Syntax:

ToString

[C#] public InvalidOperationException(string message, Exception innerException);

[C++] public: InvalidOperationException(String* message, Exception* innerException);

[VB] Public Sub New(ByVal message As String, ByVal innerException As Exception)

[JScript] public function InvalidOperationException(message: String, innerException: Exception);

Description

Initializes a new instance of the System.InvalidOperationException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If innerException is non-null, then the current Exception is raised in a catch block handling innerException.

HelpLink
HResult
InnerException
Message
Source
StackTrace
TargetSite
InvalidProgramException class (System)
ToString Description The exception that is thrown when a program contains an invalid IL or metadata. Generally this indicates a bug in a compiler.

System.InvalidProgramException uses the HRESULT COR_E_INVALIDPROGRAM, which has the value 0x8013153A.

InvalidProgramException
Example Syntax:
ToString

[C#] public InvalidProgramException( );
[C++] public: InvalidProgramException( );
[VB] Public Sub New( )
[JScript] public function InvalidProgramException( ); Initializes a new instance of the System.InvalidProgramException class.

Description

Initializes a new instance of the System.InvalidProgramException class with default properties.

The following table shows the initial property values for an instance of System.InvalidProgramException.

InvalidProgramException
Example Syntax:
ToString

[C#] public InvalidProgramException(string message);
[C++] public: InvalidProgramException(String* message);
[VB] Public Sub New(ByVal message As String)
[JScript] public function InvalidProgramException(message: String);

Description

Initializes a new instance of the System.InvalidProgramException class with a specified error message.

The following table shows the initial property values for an instance of System.InvalidProgramException. The error message that explains the reason for the exception.

InvalidProgramException
Example Syntax:
ToString

[C#] public InvalidProgramException(string message, Exception inner);
[C++] public: InvalidProgramException(String* message, Exception* inner);
[VB] Public Sub New(ByVal message As String, ByVal inner As Exception)
[JScript] public function InvalidProgramException(message: String, inner: Exception);

Description

Initializes a new instance of the System.InvalidProgramException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If inner is non-null, then the current Exception is raised in a catch block handling inner.

HelpLink
HResult
InnerException
Message
Source
StackTrace
TargetSite
IServiceProvider interface (System)
ToString Description Defines a mechanism for retrieving a "service" object; that is, an object which provides custom support to other objects.

This interface is implemented by a class or value type which provides a service to other objects.

GetService

[C#] object GetService(Type serviceType);
[C++] Object* GetService(Type* serviceType);
[VB] Function GetService(ByVal serviceType As Type) As Object
[JScript] function GetService(serviceType: Type): Object;

Description

Gets the service object of the specified type.

Return Value: A service object of type serviceType—or—null if there is no service object of type serviceType. An object that specifies the type of service object to get.

LoaderOptimization enumeration (System)
GetService

Description

An enumeration used with the System.LoaderOptimizationAttribute class to specify loader optimizations for an executable.

GetService

[C#] public const LoaderOptimization MultiDomain;
[C++] public: const LoaderOptimization MultiDomain;
[VB] Public Const MultiDomain As LoaderOptimization
[JScript] public var MultiDomain: LoaderOptimization;

Description

Indicates that the application will probably have many domains which use the same code, and the loader should share maximal internal resources across application domains.

GetService

[C#] public const LoaderOptimization MultiDomainost;
[C++] public: const LoaderOptimization MultiDomainHost;

[VB] Public Const MultiDomainHost As LoaderOptimization
[JScript] public var MultiDomainHost: LoaderOptimization;

Description

Indicates that the application will probably host unique code in multiple domains, and the loader should share resources across application domains for globally available (strong named) assemblies only.

GetService
[C#] public const LoaderOptimization NotSpecified;
[C++] public: const LoaderOptimization NotSpecified;
[VB] Public Const NotSpecified As LoaderOptimization
[JScript] public var NotSpecified: LoaderOptimization;

Description

Indicates no optimizations for sharing internal resources are specified. If the default domain or hosting interface specified an optimization then the loader uses that; otherwise, the loader uses System.LoaderOptimization.SingleDomain.

GetService
[C#] public const LoaderOptimization SingleDomain;
[C++] public: const LoaderOptimization SingleDomain;
[VB] Public Const SingleDomain As LoaderOptimization
[JScript] public var SingleDomain: LoaderOptimization;

Description

Indicates that the application will probably have a single domain, and loader should not share internal resources across application domains.

LoaderOptimizationAttribute class (System)
ToString

Description

Used to set the default loader optimization policy for the process. Should only be set on the main method for an application. It is ignored on all other methods.

The loader can make optimizations to share internal resource across application domains, at a slight expense in static access speed. This attribute tells the loader what type of application to optimize for—SingleDomain, MultiDomain (each domain running the same classes), or MultiDomainHost (multiple domains that can run different classes).

LoaderOptimizationAttribute
Example Syntax:
ToString
[C#] public LoaderOptimizationAttribute(byte value);
[C++] public: LoaderOptimizationAttribute(unsigned char value);
[VB] Public Sub New(ByVal value As Byte)
[JScript] public function LoaderOptimizationAttribute (value: Byte); Initializes a new instance of the System.LoaderOptimizationAttribute class.

Description

Initializes a new instance of the System.LoaderOptimizationAttribute class to the specified value. A value equivalent to a System.LoaderOptirnization constant.

LoaderOptimizationAttribute
Example Syntax:
ToString
[C#] public LoaderOptimizationAttribute(LoaderOptimization value);
[C++] public: LoaderOptimizationAttribute(LoaderOptimization value);
[VB] Public Sub New(ByVal value As LoaderOptimization)
[JScript] public function LoaderOptimizationAttribute (value: LoaderOptimization);

Description

Initializes a new instance of the System.LoaderOptimizationAttribute class to the specified value. A System.LoaderOptimization constant.

TypeId
Value
ToString

Description

Gets the current System.LoaderOptimization value for this instance.

LocalDataStoreSlot class (System)
ToString

Description

Encapsulates a memory slot to store local data. This class cannot be inherited.

Threads and contexts use a local store memory mechanism to store thread-specific and context-specific data, respectively. The common language runtime allocates a multi-slot data store array to each process when it is created. The thread or context calls various functions to allocate a data slot in the data store, to store and retrieve a data value in the slot, and to free a data slot for reuse after the thread or context object expires.

Finalize
[C#]~LocalDataStoreSlot( );
[C++]~LocalDataStoreSlot( );
[VB] Overrides Protected Sub Finalize( )
[JScript] protected override function Finalize( );

Description

Releases the memory slot reserved by an object when the object no longer exists.

System.LocalDataStoreSlot.Finalize locks the data store manager before marking the data slot as unoccupied.

MarshalByRefObject class (System)
ToString

Description

Base class for Remoting objects that need to be marshal by reference. This includes WellKnown SingleCall and WellKnown Singleton WebService objects and Client Activated Objects.

Some key points to classes that derived from MarshalByRefObject:* Derive from System.MarshalByRefObject or any of its children (except from context bound objects which derive from System.ContextBoundObject).

MarshalByRefObject
Example Syntax:
ToString
[C#] protected MarshalByRefObject( );
[C++] protected: MarshalByRefObject( );
[VB] Protected Sub New( )
[JScript] protected function MarshalByRefObject( );
CreateObjRef
[C#] public virtual Obj Ref CreateObjRef(Type requestedType);
[C++] public: virtual ObjRef* CreateObjRef(Type* requestedType);
[VB] Overridable Public Function CreateObjRef(ByVal requestedType As Type) As ObjRef
[JScript] public function CreateObjRef(requestedType: Type): ObjRef;
GetLifetimeService
[C#] public object GetLifetimeService( );
[C++] public: _sealed Object* GetLifetimeService( );

[VB] NotOverridable Public Function GetLifetimeService( ) As Object
[JScript] public function GetLifetimeService( ): Object;

Description

Retrieves a lifetime service object that controls the lifetime policy for this instance. For the default Lifetime service this will be an object of type ILease.

Return Value: Returns Object to control lifetime Service.

InitializeLifetimeService
[C#] public virtual object InitializeLifetimeService( );
[C++] public: virtual Object* InitializeLifetimeService( );
[VB] Overridable Public Function InitializeLifetimeService( ) As Object
[JScript] public function InitializeLifetimeService( ): Object;

Description

Objects can provide their own lease and so control their own lifetime. They do this by overriding the InitializeLifetimeService method provided on MarshalByRefObject.

Math class (System)

ToString

Description

Provides constants and static methods for trigonometric, logarithmic, and other common mathematical functions.

ToString
[C#] public const double E;
[C++] public: const double E;
[VB] Public Const E As Double
[JScript] public var E: double;

Description

A constant, e, that specifies the natural logarithmic base.

The value of this field is 2.7182818284590452354.

ToString
[C#] public const double PI;
[C++] public: const double PI;
[VB] Public Const PI As Double
[JScript] public var PI: double;

Description

A constant, (pi), that specifies the ratio of the circumference of a circle to its diameter.

The value of this field is 3.14159265358979323846.

Abs
[C#] public static decimal Abs(decimal value);
[C++] public: static Decimal Abs(Decimal value);
[VB] Public Shared Function Abs(ByVal value As Decimal) As Decimal
[JScript] public static function Abs(value: Decimal): Decimal;

Description

Returns the absolute value of a Decimal number.

Return Value: A Decimal, x, such that 0 (<=)x(<=) System.Decimal.MaxValue. A number in the range System.Decimal.MinValue (<=) value (<=) System.Decimal.MaxValue.

Abs
[C#] public static double Abs(double value);
[C++] public: static double Abs(double value);
[VB] Public Shared Function Abs(ByVal value As Double) As Double
[JScript] public static function Abs(value: double): double;

Description

Returns the absolute value of a double-precision floating point number.

Return Value: A double-precision floating point number, x, such that 0 (<=)x(=System.Double.MaxValue. A number in the range System.Double.MinValue<value (<=) System.Double.MaxValue. Abs
[C#] public static short Abs(short value);
[C++] public: static short Abs(short value);
[VB] Public Shared Function Abs(ByVal value As Short) As Short
[JScript] public static function Abs(value: Int16): Int16;

Description

Returns the absolute value of a 16-bit signed integer.

Return Value: A 16-bit signed integer, x, such that 0 (<=)x (<=) System.Int16.MaxValue. A number in the range System.Int16.MinValue<value (<=) System.Int16.MaxValue.

Abs
[C#] public static int Abs(int value);
[C++] public: static int Abs(int value);
[VB] Public Shared Function Abs(ByVal value As Integer) As Integer
[JScript] public static function Abs(value: int): int;

Description

Returns the absolute value of a 32-bit signed integer.

Return Value: A 32-bit signed integer, x, such that 0 (<=)x (<=) System.Int32.MaxValue. A number in the range System.Int32.MinValue<value (<=) System.Int32.MaxValue.

Abs
[C#] public static long Abs(long value);
[C++] public: static _int64 Abs(_int64 value);
[VB] Public Shared Function Abs(ByVal value As Long) As Long
[JScript] public static function Abs(value: long): long;

Description

Returns the absolute value of a 64-bit signed integer.

Return Value: A 64-bit signed integer, x, such that 0 (<=)x (<=) System.Int64.MaxValue. A number in the range System.Int64.MinValue<value (<=) System.Int64.MaxValue.

Abs
[C#] public static sbyte Abs(sbyte value);
[C++] public: static char Abs(char value);
[VB] Public Shared Function Abs(ByVal value As SByte) As SByte
[JScript] public static function Abs(value: SByte): SByte;

Returns the absolute value of a specified number.

Description

Returns the absolute value of an 8-bit signed integer.

Return Value: An 8-bit signed integer, x, such that 0 (<=)x (<=) System.SByte.MaxValue. A number in the range System.SByte.MinValue<value (<=) System.SByte.MaxValue.

Abs
[C#] public static float Abs(float value);
[C++] public: static float Abs(float value);
[VB] Public Shared Function Abs(ByVal value As Single) As Single
[JScript] public static function Abs(value: float): float;

Description

Returns the absolute value of a single-precision floating point number.

Return Value: A single-precision floating point number, x, such that 0 (<=)x(<=) System.Single.MaxValue. A number in the range System.Single.MinValue<value (<=) System.Single.MaxValue.

Acos

[C#] public static double Acos(double d);

[C++] public: static double Acos(double d);

[VB] Public Shared Function Acos(ByVal d As Double) As Double

[JScript] public static function Acos(d: double): double;

Description

Returns the angle whose cosine is the specified number.

Return Value: An angle, q, measured in radians, such that 0(<=)q(<=)(pi)—or—System.Double.NaN if d<−1 or d>1. Multiply the return value by 180/(pi) to convert from radians to degrees. A number representing a cosine, where −1(<=)d (<=)1.

Asin

[C#] public static double Asin(double d);

[C++] public: static double Asin(double d);

[VB] Public Shared Function Asin(ByVal d As Double) As Double

[JScript] public static function Asin(d: double): double;

Description

Returns the angle whose sine is the specified number.

Return Value: An angle, q, measured in radians, such that −(pi)/2(<=)q(<=)(pi)/2—or—System.Double.NaN if d<−1 or d>1.

A positive return value represents a counterclockwise angle from the x-axis; a negative return value represents a clockwise angle. A number representing a sine, where −1 (<=)d(<=)1.

Atan

[C#] public static double Atan(double d);

[C++] public: static double Atan(double d);

[VB] Public Shared Function Atan(ByVal d As Double) As Double

[JScript] public static function Atan(d: double): double;

Description

Returns the angle whose tangent is the specified number.

Return Value: An angle, q, measured in radians, such that −(pi)/2(<=)q(<=) (pi)/2.

A positive return value represents a counterclockwise angle from the x-axis; a negative return value represents a clockwise angle. A number representing a tangent.

Atan2

[C#] public static double Atan2(double y, double x);

[C++] public: static double Atan2(double y, double x);

[VB] Public Shared Function Atan2(ByVal y As Double, ByVal x As Double) As Double

[JScript] public static function Atan2(y: double, x: double): double;

Description

Returns the angle whose tangent is the quotient of two specified numbers.

Return Value: An angle, q, measured in radians, such that −(pi)<q(<=)(pi), and tan(q)=y/x, where (x, y) is a point in the Cartesian plane. Observe the following: For (x, y) in quadrant 1, 0<q<(pi)/2.

The return value is the angle in the Cartesian plane formed by the x-axis, and a vector starting from the origin, (0,0), and terminating at the point, (x,y). The y coordinate of a point. The x coordinate of a point.

Ceiling

[C#] public static double Ceiling(double a);

[C++] public: static double Ceiling(double a);

[VB] Public Shared Function Ceiling(ByVal a As Double) As Double

[JScript] public static function Ceiling(a: double): double;

Description

Returns the smallest whole number greater than or equal to the specified number.

Return Value: The smallest whole number greater than or equal to a.

The behavior of this method follows IEEE Standard 754, section 4. This kind of rounding is sometimes called rounding towards positive infinity. A number.

Cos

[C#] public static double Cos(double d);

[C++] public: static double Cos(double d);

[VB] Public Shared Function Cos(ByVal d As Double) As Double

[JScript] public static function Cos(d: double): double;

Description

Returns the cosine of the specified angle.

Return Value: The cosine of d.

The angle, d, must be in radians. Multiply by (pi)/180 to convert degrees to radians. An angle, measured in radians.

Cosh

[C#] public static double Cosh(double value);

[C++] public: static double Cosh(double value);

[VB] Public Shared Function Cosh(ByVal value As Double) As Double

[JScript] public static function Cosh(value: double): double;

Description

Returns the hyperbolic cosine of the specified angle.

Return Value: The hyperbolic cosine of value. An angle, measured in radians.

Exp

[C#] public static double Exp(double d);

[C++] public: static double Exp(double d);

[VB] Public Shared Function Exp(ByVal d As Double) As Double

[JScript] public static function Exp(d: double): double;

Description

Returns e raised to the specified power.

Return Value: The number e raised to the power d.

Use the System.Math.Pow(System.Double,System.Double) method to calculate powers of other bases. A number specifying a power.

Floor

[C#] public static double Floor(double d);

[C++] public: static double Floor(double d);

[VB] Public Shared Function Floor(ByVal d As Double) As Double

[JScript] public static function Floor(d: double): double;

Description

Returns the largest whole number less than or equal to the specified number.

Return Value: The largest whole number less than or equal to d.

The behavior of this method follows IEEE Standard 754, section 4. This kind of rounding is sometimes called rounding towards negative infinity. A number.

IEEERemainder

[C#] public static double IEEERemainder(double x, double y);

[C++] public: static double IEEERemainder(double x, double y);

[VB] Public Shared Function IEEERemainder(ByVal x As Double, ByVal y As Double) As Double

[JScript] public static function IEEERemainder(x: double, y: double): double;

Description

Returns the remainder resulting from the division of a specified number by another specified number.

Return Value: A number equal to x-(y Q), where Q is the quotient of x/y rounded to the nearest integer (if x/y falls halfway between two integers, the even integer is returned).

This operation complies with the remainder operation defined in Section 5.1 of ANSI/IEEE Std 754-1985; IEEE Standard for Binary Floating-Point Arithmetic; Institute of Electrical and Electronics Engineers, Inc; 1985. A dividend. A divisor.

Log

[C#] public static double Log(double d);

[C++] public: static double Log(double d);

[VB] Public Shared Function Log(ByVal d As Double) As Double

[JScript] public static function Log(d: double): double; Returns the logarithm of a specified number.

Description

Returns the natural (base e) logarithm of a specified number.

Return Value: Sign of d Returns Positive The natural logarithm of d; that is, In d, or log e d Zero System.Double.PositiveInfinity Negative System.Double.NaN d is specified as a base 10 number. A number whose logarithm is to be found.

Log

[C#] public static double Log(double a, double newBase);

[C++] public: static double Log(double a, double newBase);

[VB] Public Shared Function Log(ByVal a As Double, ByVal newBase As Double) As Double

[JScript] public static function Log(a: double, newBase: double): double;

Description

Returns the logarithm of a specified number in a specified base.

Return Value: Sign of d Returns Positive The logarithm of a, in base, newBase; that is, log a.

a and newBase are specified as base 10 numbers. A number whose logarithm is to be found. The base of the logarithm.

Log10

[C#] public static double Log10(double d);

[C++] public: static double Log10(double d);

[VB] Public Shared Function Log10(ByVal d As Double) As Double

[JScript] public static function Log10(d: double): double;

Description

Returns the base 10 logarithm of a specified number.

Return Value: Sign of d Returns Positive The base 10 log of d; that is, log d.

d is specified as a base 10 number. A number whose logarithm is to be found.

Max

[C#] public static byte Max(byte val1, byte val2);

[C++] public: static unsigned char Max(unsigned char val1, unsigned char val2);

[VB] Public Shared Function Max(ByVal val1 As Byte, ByVal val2 As Byte) As Byte

[JScript] public static function Max(val1: Byte, val2: Byte): Byte;

Description

Returns the larger of two 8-bit unsigned integers.

Return Value: val1 or val2, whichever is larger. The first of two 8-bit unsigned integers to compare. The second of two 8-bit unsigned integers to compare.

Max

[C#] public static decimal Max(decimal val1, decimal val2);

[C++] public: static Decimal Max(Decimal val1, Decimal val2);

[VB] Public Shared Function Max(ByVal val1 As Decimal, ByVal val2 As Decimal) As Decimal

[JScript] public static function Max(val 1: Decimal, val2: Decimal): Decimal;

Description

Returns the larger of two Decimal numbers.

Return Value: val1 or val2, whichever is larger. The first of two System.Decimal numbers to compare. The second of two System.Decimal numbers to compare.

Max

[C#] public static double Max(double val1, double val2);

[C++] public: static double Max(double val, double val2);

[VB] Public Shared Function Max(ByVal val1 As Double, ByVal val2 As Double) As Double

[JScript] public static function Max(val1: double, val2: double): double;

Description

Returns the larger of two double-precision floating point numbers.

Return Value: val1 or val2, whichever is larger. The first of two double-precision floating point numbers to compare. The second of two double-precision floating point numbers to compare.

Max

[C#] public static short Max(short val1, short val2);

[C++] public: static short Max(short val1, short val2);

[VB] Public Shared Function Max(ByVal val1 As Short, ByVal val2 As Short) As Short

[JScript] public static function Max(val1: Int16, val2: Int16): Int16;

Description

Returns the larger of two 16-bit signed integers.

Return Value: val1 or val2, whichever is larger. The first of two 16-bit signed integers to compare. The second of two 16-bit signed integers to compare.

Max

[C#] public static int Max(int val1, int val2);

[C++] public: static int Max(int val1, int val2);

[VB] Public Shared Function Max(ByVal val1 As Integer, ByVal val2 As Integer) As Integer

[JScript] public static function Max(val1: int, val2: int): int;

Description

Returns the larger of two 32-bit signed integers.

Return Value: val1 or val2, whichever is larger. The first of two 32-bit signed integers to compare. The second of two 32-bit signed integers to compare.

Max

[C#] public static long Max(long val1, long val2);

[C++] public: static _int64 Max(int64 val1, _int64 val2);

[VB] Public Shared Function Max(ByVal val1 As Long, ByVal val2 As Long) As Long

[JScript] public static function Max(val1: long, val2: long): long;

Description

Returns the larger of two 64-bit signed integers.

Return Value: val1 or val2, whichever is larger. The first of two 64-bit signed integers to compare. The second of two 64-bit signed integers to compare.

Max

[C#] public static sbyte Max(sbyte val1, sbyte val2);

[C++] public: static char Max(char val1, char val2);

[VB] Public Shared Function Max(ByVal val1 As SByte, ByVal val2 As SByte) As SByte

[JScript] public static function Max(val1: SByte, val2: SByte): SByte; Returns the larger of two specified numbers.

Description

Returns the larger of two 8-bit signed integers.

Return Value: val1 or val2, whichever is larger. The first of two 8-bit unsigned integers to compare. The second of two 8-bit unsigned integers to compare.

Max

[C#] public static float Max(float val1, float val2);

[C++] public: static float Max(float val1, float val2);

[VB] Public Shared Function Max(ByVal val1 As Single, ByVal val2 As Single) As Single

[JScript] public static function Max(val1: float, val2: float): float;

Description

Returns the larger of two single-precision floating point numbers.

Return Value: val1 or val2, whichever is larger. The first of two single-precision floating point numbers to compare. The second of two single-precision floating point numbers to compare.

Max

[C#] public static ushort Max(ushort val1, ushort val2);

[C++] public: static unsigned short Max(unsigned short val1, unsigned short val2);

[VB] Public Shared Function Max(ByVal val1 As UInt16, ByVal val2 As UInt16) As UInt16

[JScript] public static function Max(val1: UInt16, val2: UInt16): UInt16;

Description

Returns the larger of two 16-bit unsigned integers.

Return Value: val1 or val2, whichever is larger. The first of two 16-bit unsigned integers to compare. The second of two 16-bit unsigned integers to compare.

Max

[C#] public static uint Max(uint val1, uint val2);

[C++] public: static unsigned _int Max(unsigned _int val1, unsigned _int val2);

[VB] Public Shared Function Max(ByVal val1 As UInt32, ByVal val2 As UInt32) As UInt32

[JScript] public static function Max(val1: UInt32, val2: UInt32): UInt32;

Description

Returns the larger of two 32-bit unsigned integers.

Return Value: val1 or val2, whichever is larger. The first of two 32-bit unsigned integers to compare. The second of two 32-bit unsigned integers to compare.

Max

[C#] public static ulong Max(ulong val1, ulong val2);

[C++] public: static unsigned _int64 Max(unsigned _int64 val1, unsigned _int64 val2);

[VB] Public Shared Function Max(ByVal val1 As UInt64, ByVal val2 As UInt64) As UInt64

[JScript] public static function Max(val1: UInt64, val2: UInt64): UInt64;

Description

Returns the larger of two 64-bit unsigned integers.

Return Value: val1 or val2, whichever is larger. The first of two 64-bit unsigned integers to compare. The second of two 64-bit unsigned integers to compare.

Min

[C#] public static byte Min(byte val1, byte val2);

[C++] public: static unsigned char Min(unsigned char val1, unsigned char val2);

[VB] Public Shared Function Min(ByVal val1 As Byte, ByVal val2 As Byte) As Byte

[JScript] public static function Min(val1: Byte, val2: Byte): Byte;

Description

Returns the smaller of two 8-bit unsigned integers.

Return Value: val1 or val2, whichever is smaller. The first of two 8-bit unsigned integers to compare. The second of two 8-bit unsigned integers to compare.

Min

[C#] public static decimal Min(decimal val1, decimal val2);

[C++] public: static Decimal Min(Decimal val1, Decimal val2);

[VB] Public Shared Function Min(ByVal val1 As Decimal, ByVal val2 As Decimal) As Decimal

[JScript] public static function Min(val1: Decimal, val2: Decimal): Decimal;

Description

Returns the smaller of two Decimal numbers.

Return Value: a or val2, whichever is smaller. The first of two System.Decimal numbers to compare. The second of two System.Decimal numbers to compare.

Min

[C#] public static double Min(double val1, double val2);

[C++] public: static double Min(double val1, double val2);

[VB] Public Shared Function Min(ByVal val1 As Double, ByVal val2 As Double) As Double

[JScript] public static function Min(val1: double, val2: double): double;

Description

Returns the smaller of two double-precision floating point numbers.

Return Value: a or val2, whichever is smaller. The first of two double-precision floating point numbers to compare. The second of two double-precision floating point numbers to compare.

Min

[C#] public static short Min(short val1, short val2);

[C++] public: static short Min(short val1, short val2);

[VB] Public Shared Function Min(ByVal val1 As Short, ByVal val2 As Short) As Short

[JScript] public static function Min(val1: Int16, val2: Int16): Int16;

Description

Returns the smaller of two 16-bit signed integers.

Return Value: val1 or val2, whichever is smaller. The first of two 16-bit signed integers to compare. The second of two 16-bit signed integers to compare.

Min

[C#] public static int Min(int val1, int val2);

[C++] public: static int Min(int val1, int val2);

[VB] Public Shared Function Min(ByVal val1 As Integer, ByVal val2 As nteger) As Integer

[JScript] public static function Min(val1: int, val2: int): int;

Description

Returns the smaller of two 32-bit signed integers.

Return Value: val1 or val2, whichever is smaller. The first of two 32-bit signed integers to compare. The second of two 32-bit signed integers to compare.

Min

[C#] public static long Min(long val1, long val2);

[C++] public: static _int64 Min(_int64 val1, _int64 val2);

[VB] Public Shared Function Min(ByVal val1 As Long, ByVal val2 As Long) As Long

[JScript] public static function Min(val1: long, val2: long): long;

Description

Returns the smaller of two 64-bit signed integers.

Return Value: val1 or val2, whichever is smaller. The first of two 64-bit signed integers to compare. The second of two 64-bit signed integers to compare.

Min

[C#] public static sbyte Min(sbyte val1, sbyte val2);

[C++] public: static char Min(char val1, char val2);

[VB] Public Shared Function Min(ByVal val1 As SByte, ByVal val2 As SByte) As SByte

[JScript] public static function Min(val1: SByte, val2: SByte): SByte; Returns the smaller of two numbers.

Description

Returns the smaller of two 8-bit signed integers.

Return Value: val1 or val2, whichever is smaller. The first of two 8-bit signed integers to compare. The second of two 8-bit signed integers to compare.

Min

[C#] public static float Min(float val1, float val2);

[C++] public: static float Min(float val1, float val2);

[VB] Public Shared Function Min(ByVal val1 As Single, ByVal val2 As Single) As Single

[JScript] public static function Min(val1: float, val2: float): float;

Description

Returns the smaller of two single-precision floating point numbers.

Return Value: val1 or val2, whichever is smaller. The first of two single-precision floating point numbers to compare. The second of two single-precision floating point numbers to compare.

Min

[C#] public static ushort Min(ushort val1, ushort val2);

[C++] public: static unsigned short Min(unsigned short val1, unsigned short val2);

[VB] Public Shared Function Min(ByVal val1 As UInt16, ByVal val2 As UInt16) As UInt16

[JScript] public static function Min(val1: UInt16, val2: UInt16): UInt16;

Description

Returns the smaller of two 16-bit unsigned integers.

Return Value: val1 or val2, whichever is smaller. The first of two 16-bit unsigned integers to compare. The second of two 16-bit unsigned integers to compare.

Min

[C#] public static uint Min(uint val1, uint val2);

[C++] public: static unsigned _int Min(unsigned _int val1, unsigned _int val2);

[VB] Public Shared Function Min(ByVal val1 As UInt32, ByVal val2 As UInt32) As UInt32

[JScript] public static function Min(val1: UInt32, val2: UInt32): UInt32;

Description

Returns the smaller of two 32-bit unsigned integers.

Return Value: val1 or val2, whichever is smaller. The first of two 32-bit unsigned integers to compare. The second of two 32-bit unsigned integers to compare.

Min

[C#] public static ulong Min(ulong val1, ulong val2);

[C++] public: static unsigned _int64 Min(unsigned _int64 val1, unsigned _int64 val2);

[VB] Public Shared Function Min(ByVal val1 As UInt64, ByVal val2 As UInt64) As UInt64

[JScript] public static function Min(val1: UInt64, val2: UInt64): UInt64;

Description

Returns the smaller of two 64-bit unsigned integers.

Return Value: val1 or val2, whichever is smaller. The first of two 64-bit unsigned integers to compare. The second of two 64-bit unsigned integers to compare.

Pow

[C#] public static double Pow(double x, double y);

[C++] public: static double Pow(double x, double y);

[VB] Public Shared Function Pow(ByVal x As Double, ByVal y As Double) As Double

[JScript] public static function Pow(x: double, y: double): double;

Description

Returns a specified number raised to the specified power.

Return Value: The number x raised to the power y. A number to be raised to a power. A number that specifies a power.

Round

[C#] public static decimal Round(decimal d);

[C++] public: static Decimal Round(Decimal d);

[VB] Public Shared Function Round(ByVal d As Decimal) As Decimal

[JScript] public static function Round(d: Decimal): Decimal;

Description

Returns the whole number nearest the specified value.

Return Value: The whole number nearest parameter d. If d is halfway between two whole numbers, one of which by definition is even and the other odd, then the even number is returned.

The behavior of this method follows IEEE Standard 754, section 4. This kind of rounding is sometimes called rounding to nearest, or banker's rounding. A System.Decimal number to be rounded.

Round

[C#] public static double Round(double a);

[C++] public: static double Round(double a);

[VB] Public Shared Function Round(ByVal a As Double) As Double

[JScript] public static function Round(a: double): double; Returns the number nearest the specified value.

Description

Returns the whole number nearest the specified value.

Return Value: The whole number nearest a. If a is halfway between two whole numbers, one of which by definition is even and the other odd, then the even number is returned.

The behavior of this method follows IEEE Standard 754, section 4. This kind of rounding is sometimes called rounding to nearest, or banker's rounding. A double-precision floating point number to be rounded.

Round

[C#] public static decimal Round(decimal d, int decimals);

[C++] public: static Decimal Round(Decimal d, int decimals);

[VB] Public Shared Function Round(ByVal d As Decimal, ByVal decimals As Integer) As Decimal

[JScript] public static function Round(d: Decimal, decimals: int): Decimal;

Description

Returns the number with the specified precision nearest the specified value.

Return Value: The number nearest d with precision equal to decimals. If d is halfway between two numbers, one of which is even and the other odd, then the even number is returned. If the precision of d is less than decimals, then d is returned unchanged. The decimals parameter specifies the number of significant fractional digits in the return value and ranges from 0 to 28. If decimals is zero, then a whole number is returned. A System.Decimal number to be rounded. The number of significant fractional digits (precision) in the return value.

Round

[C#] public static double Round(double value, int digits);

[C++] public: static double Round(double value, int digits);

[VB] Public Shared Function Round(ByVal value As Double, ByVal digits As Integer) As Double

[JScript] public static function Round(value: double, digits: int): double;

Description

Returns the number with the specified precision nearest the specified value.

Return Value: The number nearest value with precision equal to digits. If value is halfway between two numbers, one of which is even and the other odd, then the even number is returned. If the precision of value is less than digits, then value is returned unchanged.

The digits parameter specifies the number of significant fractional digits in the return value and ranges from 0 to 15. If digits is zero, then a whole number is returned. A double-precision floating point number to be rounded. The number of significant fractional digits (precision) in the return value.

Sign

[C#] public static int Sign(decimal value);

[C++] public: static int Sign(Decimal value);

[VB] Public Shared Function Sign(ByVal value As Decimal) As Integer

[JScript] public static function Sign(value: Decimal): int;

Description

Returns a value indicating the sign of a Decimal number.

Return Value: A number indicating the sign of value. A signed System.Decimal number.

Sign

[C#] public static int Sign(double value);

[C++] public: static int Sign(double value);

[VB] Public Shared Function Sign(ByVal value As Double) As Integer

[JScript] public static function Sign(value: double): int;

Description

Returns a value indicating the sign of a double-precision floating point number.

Return Value: A number indicating the sign of value. A signed number.

Sign

[C#] public static int Sign(short value);

[C++] public: static int Sign(short value);

[VB] Public Shared Function Sign(ByVal value As Short) As Integer

[JScript] public static function Sign(value: Int16): int; Returns a value indicating the sign of a number.

Description

Returns a value indicating the sign of a 16-bit signed integer.

Return Value: A number indicating the sign of value. A signed number.

Sign

[C#] public static int Sign(int value);

[C++] public: static int Sign(int value);

[VB] Public Shared Function Sign(ByVal value As Integer) As Integer

[JScript] public static function Sign(value: int): int; Returns a value indicating the sign of a number.

Description

Returns a value indicating the sign of a 32-bit signed integer.

Return Value: A number indicating the sign of value. A signed number.

Sign

[C#] public static int Sign(long value);

[C++] public: static int Sign(_int64 value);

[VB] Public Shared Function Sign(ByVal value As Long) As Integer

[JScript] public static function Sign(value: long): int;

Description

Returns a value indicating the sign of a 64-bit signed integer.

Return Value: A number indicating the sign of value. A signed number.

Sign

[C#] public static int Sign(sbyte value);

[C++] public: static int Sign(char value);

[VB] Public Shared Function Sign(ByVal value As SByte) As Integer

[JScript] public static function Sign(value: SByte): int; Returns a value indicating the sign of a number.

Description

Returns a value indicating the sign of an 8-bit signed integer.

Return Value: A number indicating the sign of value. Number Description−1 value is less than zero. A signed number. Sign

[C#] public static int Sign(float value);

[C++] public: static int Sign(float value);

[VB] Public Shared Function Sign(ByVal value As Single) As Integer

[JScript] public static function Sign(value: float): int;

Description

Returns a value indicating the sign of a single-precision floating point number.

Return Value: A number indicating the sign of value. A signed number.

Sin

[C#] public static double Sin(double a);

[C++] public: static double Sin(double a);

[VB] Public Shared Function Sin(ByVal a As Double) As Double

[JScript] public static function Sin(a: double): double;

Description

Returns the sine of the specified angle.

Return Value: The sine of a. The angle, a, must be in radians. Multiply by (pi)/180 to convert degrees to radians. An angle, measured in radians.

Sinh

[C#] public static double Sinh(double value);

[C++] public: static double Sinh(double value);

[VB] Public Shared Function Sinh(ByVal value As Double) As Double

[JScript] public static function Sinh(value: double): double;

Description

Returns the hyperbolic sine of the specified angle.

Return Value: The hyperbolic sine of value. An angle, measured in radians.

Sqrt

[C#] public static double Sqrt(double d);

[C++] public: static double Sqrt(double d);

[VB] Public Shared Function Sqrt(ByVal d As Double) As Double

[JScript] public static function Sqrt(d: double): double;

Description

Returns the square root of a specified number.

Return Value: Value of d Returns Zero, or positive The positive square root of d. A number.

Tan

[C#] public static double Tan(double a);

[C++] public: static double Tan(double a);

[VB] Public Shared Function Tan(ByVal a As Double) As Double

[JScript] public static function Tan(a: double): double;

Description

Returns the tangent of the specified angle.

Return Value: The tangent of a.

The angle, a, must be in radians. Multiply by (pi)/180 to convert degrees to radians. An angle, measured in radians.

Tanh

[C#] public static double Tanh(double value);

[C++] public: static double Tanh(double value);

[VB] Public Shared Function Tanh(ByVal value As Double) As Double

[JScript] public static function Tanh(value: double): double;

Description

Returns the hyperbolic tangent of the specified angle.

Return Value: The hyperbolic tangent of value. An angle, measured in radians.

MemberAccessException class (System)

ToString

Description

The exception that is thrown when an attempt to access a class member fails.

System.MemberAccessException is the base class for System.FieldAccessException, System.MethodAccessException, System.MissingMemberException, System.MissingMethodException, and System.MissingFieldException. These exceptions are thrown when a class member is not found or access to the member is not permitted.

MemberAccessException

Example Syntax:

ToString

[C#] public MemberAccessException( );

[C++] public: MemberAccessException( );

[VB] Public Sub New( )

[JScript] public function MemberAccessException( ); Initializes a new instance of the System.MemberAccessException class.

Description

Initializes a new instance of the System.MemberAccessException class with default properties.

The following table shows the initial property values for an instance of System.MemberAccessException.

MemberAccessException

Example Syntax:

ToString

[C#] public MemberAccessException(string message);

[C++] public: MemberAccessException(String* message);

[VB] Public Sub New(ByVal message As String)

[JScript] public function MemberAccessException(message: String);

Description

Initializes a new instance of the System.MemberAccessException class with a specified error message.

The following table shows the initial property values for an instance of System.MemberAccessException. The error message that explains the reason for the exception.

MemberAccessException

Example Syntax:

ToString

[C#] protected MemberAccessException(SerializationInfo info, StreamingContext context);

[C++] protected: MemberAccessException(SerializationInfo* info, StreamingContext context);

[VB] Protected Sub New(ByVal info As SerializationInfo, ByVal context As StreamingContext)

[JScript] protected function MemberAccessException(info: SerializationInfo, context: StreamingContext);

Description

Initializes a new instance of the System.MemberAccessException class with serialized data.

This constructor is called during deserialization to reconstitute the exception object transmitted over a stream. For more information, see. The object that holds the serialized object data. The contextual information about the source or destination.

MemberAccessException

Example Syntax:

ToString

[C#] public MemberAccessException(string message, Exception inner);

[C++] public: MemberAccessException(String* message, Exception* inner);

[VB] Public Sub New(ByVal message As String, ByVal inner As Exception)

[JScript] public function MemberAccessException(message: String, inner: Exception);

Description

Initializes a new instance of the System.MemberAccessException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If inner is non-null, then the current Exception is raised in a catch block handling inner.

HelpLink

HResult

InnerException

Message

Source

StackTrace

TargetSite

MethodAccessException class (System)

ToString

Description

The exception that is thrown when there is an illegal attempt to access a private or protected method inside a class.

System.MethodAccessException uses the HRESULT COR_E_METHODACCESS, which has the value 0x80131510.

MethodAccessException

Example Syntax:

ToString

[C#] public MethodAccessException( );

[C++] public: MethodAccessException( );

[VB] Public Sub New( )

[JScript] public function MethodAccessException( ); Initializes a new instance of the System.MethodAccessException class.

Description

Initializes a new instance of the System.MethodAccessException class with default properties.

The following table shows the initial property values for an instance of System.MethodAccessException.

MethodAccessException

Example Syntax:

ToString

[C#] public MethodAccessException(string message);

[C++] public: MethodAccessException(String* message);

[VB] Public Sub New(ByVal message As String)

[JScript] public function MethodAccessException(message: String);

Description

Initializes a new instance of the System.MethodAccessException class with a specified error message.

The following table shows the initial property values for an instance of System.MethodAccessException. The error message that explains the reason for the exception.

MethodAccessException

Example Syntax:

ToString

[C#] protected MethodAccessException(SerializationInfo info, StreamingContext context);

[C++] protected: MethodAccessException(SerializationInfo* info, StreamingContext context);

[VB] Protected Sub New(ByVal info As SerializationInfo, ByVal context As StreamingContext)

[JScript] protected function MethodAccessException(info: SerializationInfo, context: StreamingContext);

Description

Initializes a new instance of the System.MethodAccessException class with serialized data.

This constructor is called during deserialization to reconstitute the exception object transmitted over a stream. For more information, see. The object that holds the serialized object data. The contextual information about the source or destination.

MethodAccessException

Example Syntax:

ToString

[C#] public MethodAccessException(string message, Exception inner);

[C++] public: MethodAccessException(String* message, Exception* inner);

[VB] Public Sub New(ByVal message As String, ByVal inner As Exception)

[JScript] public function MethodAccessException(message: String, inner: Exception);

Description

Initializes a new instance of the System.MethodAccessException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If inner is non-null, then the current Exception is raised in a catch block handling inner.

HelpLink

HResult

InnerException

Message

Source

StackTrace

TargetSite

MissingFieldException class (System)

ToString

Description

The exception that is thrown when there is an attempt to dynamically access a field that does not exist.

System.MissingFieldException uses the HRESULT COR_E_MISSINGFIELD, which has the value 0x80131511.

MissingFieldException

Example Syntax:

ToString

System.MissingFieldException

Description

Initializes a new instance of the System.MissingFieldException class with default properties.

The following table shows the initial property values for an instance of System.MissingFieldException.

MissingFieldException

Example Syntax:

ToString

[C#] public MissingFieldException(string message);

[C++] public: MissingFieldException(String* message);

[VB] Public Sub New(ByVal message As String)

[JScript] public function MissingFieldException(message: String);

Description

Initializes a new instance of the System.MissingFieldException class with a specified error message.

The following table shows the initial property values for an instance of System.MissingFieldException. The error message that explains the reason for the exception.

MissingFieldException

Example Syntax:

ToString

[C#] protected MissingFieldException(SerializationInfo info, StreamingContext context);

[C++] protected: MissingFieldException(SerializationInfo* info, StreatingContext context);

[VB] Protected Sub New(ByVal info As SerializationInfo, ByVal context As StreamingContext)

[JScript] protected function MissingFieldException(info: SerializationInfo, context: StreamingContext);

Description

Initializes a new instance of the System.MissingFieldException class with serialized data.

This constructor is called during deserialization to reconstitute the exception object transmitted over a stream. For more information, see. The object that holds the serialized object data. The contextual information about the source or destination.

MissingFieldException

Example Syntax:

ToString

[C#] public MissingFieldException(string message, Exception inner);

[C++] public: MissingFieldException(String* message, Exception* inner);

[VB] Public Sub New(ByVal message As String, ByVal inner As Exception)

[JScript] public function MissingFieldException(message: String, inner: Exception);

Description

Initializes a new instance of the System.MissingFieldException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If inner is non-null, then the current Exception is raised in a catch block handling inner.

MissingFieldException

Example Syntax:

ToString

[C#] public MissingFieldException(string className, string fieldName);

[C++] public: MissingFieldException(String* className, String* fieldName);

[VB] Public Sub New(ByVal className As String, ByVal fieldName As String)

[JScript] public function MissingFieldException(className: String, fieldName: String);

Description

Initializes a new instance of the System.MissingFieldException class with the specified class name and field name. The name of the class in which access to a nonexistent field was attempted. The name of the field that cannot be accessed.

HelpLink

HResult

InnerException

Message

ToString

Description

Gets the text string showing the signature of the missing field, the class name, and the field name.

If the class name is not specified when the object is constructed, the default text string inherited from the base class is returned. This property overrides System.MissingMemberException.Message. The error message should be localized.

Source

StackTrace

TargetSite

MissingMemberException class (System)

ToString

Description

The exception that is thrown when there is an attempt to dynamically access a class member that does not exist.

Normally a compilation error is generated if the code attempts to access a nonexistent member of a class.

ToString

[C#] protected string ClassName;

[C++] protected: String* ClassName;

[VB] Protected ClassName As String

[JScript] protected var ClassName: String;

Description

Holds the class name of the missing member.

ToString

[C#] protected string MemberName;

[C++] protected: String* MemberName;

[VB] Protected MemberName As String

[JScript] protected var MemberName: String;

Description

Holds the name of the missing member.

ToString

[C#] protected byte[ ] Signature;

[C++] protected: unsigned char Signature _gc[ ];

[VB] Protected Signature( ) As Byte

[JScript] protected var Signature: Byte[ ];

Description

Holds the signature of the missing member.

System.MissingMemberException.Signature contains a System.Byte value that represents the signature of the missing member.

MissingMemberException

Example Syntax:

ToString

[C#] public MissingMemberException( );

[C++] public: MissingMemberException( );

[VB] Public Sub New( )

[JScript] public function MissingMemberException( ); Initializes a new instance of the System.MissingMemberException class.

Description

Initializes a new instance of the System.MissingMemberException class with default properties.

The following table shows the initial property values for an instance of System.MissingMemberException.

MissingMemberException

Example Syntax:

ToString

[C#] public MissingMemberException(string message);

[C++] public: MissingMemberException(String* message);

[VB] Public Sub New(ByVal message As String)

[JScript] public function MissingMemberException(message: String);

Description

Initializes a new instance of the System.MissingMemberException class with a specified error message.

The following table shows the initial property values for an instance of System.MissingMemberException. The error message that explains the reason for the exception.

MissingMemberException

Example Syntax:

ToString

[C#] protected MissingMemberException(SerializationInfo info, StreamingContext context);

[C++] protected: MissingMemberException(SerializationInfo* info, StreamingContext context);

[VB] Protected Sub New(ByVal info As SerializationInfo, ByVal context As StreamingContext)

[JScript] protected function MissingMemberException(info: SerializationInfo, context: StreamingContext);

Description

Initializes a new instance of the System.MissingMemberException class with serialized data.

This constructor is called during deserialization to reconstitute the exception object transmitted over a stream. For more information, see. The object that holds the serialized object data. The contextual information about the source or destination.

MissingMemberException

Example Syntax:

ToString

[C#] public MissingMemberException(string message, Exception inner);

[C++] public: MissingMemberException(String* message, Exception* inner);

[VB] Public Sub New(ByVal message As String, ByVal inner As Exception)

[JScript] public function MissingMemberException(message: String, inner: Exception);

Description

Initializes a new instance of the System.MissingMemberException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If inner is non-null, then the current Exception is raised in a catch block handling inner.

MissingMemberException

Example Syntax:

ToString

[C#] public MissingMemberException(string className, string memberName);

[C++] public: MissingMemberException(String* className, String* memberName);

[VB] Public Sub New(ByVal className As String, ByVal memberName As String)

[JScript] public function MissingMemberException(className: String, memberName: String);

Description

Initializes a new instance of the System.MissingMemberException class with the specified class name and member name. The name of the class in which access to a nonexistent member was attempted. The name of the member that cannot be accessed.

HelpLink

HResult

InnerException

Message

ToString

Description

Gets the text string showing the class name, the member name, and the signature of the missing member. If the class name is not specified when the object is constructed, the default text string inherited from the base class is returned.

This property overrides System.Exception.Message. The error message should be localized.

Source

StackTrace

TargetSite

GetObjectData

[C#] public override void GetObjectData(SerializationInfo info, StreamingContext context);

[C++] public: void GetObjectData(SerializationInfo* info, StreamingContext context);

[VB] Overrides Public Sub GetObjectData(ByVal info As SerializationInfo, ByVal context As StreamingContext)

[JScript] public override function GetObjectData(info: SerializationInfo, context: StreamingContext);

Description

Sets the System.Runtime.Serialization.SerializationInfo object with the class name, the member name, the signature of the missing member, and additional exception information.

System.TypeLoadException.GetObjectData(System.Runtime.Serialization.SerializationInfo, System.Runtime.Serialization.StreamingContext) sets a System.Runtime.Serialization.SerializationInfo with all the exception object data targeted for serialization. During deserialization, the exception object is reconstituted from the System.Runtime.Serialization.SerializationInfo transmitted over the stream. The object that holds the serialized object data. The contextual information about the source or destination.

MissingMethodException class (System)

ToString

Description

The exception that is thrown when there is an attempt to dynamically access a method that does not exist.

System.MissingMethodException uses the HRESULT COR_E_MISSINGMETHOD, which has the value 0x80131513.

MissingMethodException

Example Syntax:

ToString

System.MissingMethodException

Description

Initializes a new instance of the System.MissingMethodException class with default properties.

The following table shows the initial property values for an instance of System.MissingMethodException.

MissingMethodException

Example Syntax:

ToString

[C#] public MissingMethodException(string message);

[C++] public: MissingMethodException(String* message);

[VB] Public Sub New(ByVal message As String)

[JScript] public function MissingMethodException(message: String);

Description

Initializes a new instance of the System.MissingMethodException class with a specified error message.

The following table shows the initial property values for an instance of System.MissingMethodException. The error message that explains the reason for the exception.

MissingMethodException

Example Syntax:

ToString

[C#] protected MissingMethodException(SerializationInfo info, StreamingContext context);

[C++] protected: MissingMethodException(SerializationInfo* info, StreamingContext context);

[VB] Protected Sub New(ByVal info As SerializationInfo, ByVal context As StreamingContext)

[JScript] protected function MissingMethodException(info: SerializationInfo, context: StreamingContext);

Description

Initializes a new instance of the System.MissingMethodException class with serialized data.

This constructor is called during deserialization to reconstitute the exception object transmitted over a stream. For more information, see. The object that holds the serialized object data. The contextual information about the source or destination.

MissingMethodException

Example Syntax:

ToString

[C#] public MissingMethodException(string message, Exception inner);

[C++] public: MissingMethodException(String* message, Exception* inner);

[VB] Public Sub New(ByVal message As String, ByVal inner As Exception)

[JScript] public function MissingMethodException(message: String, inner: Exception);

Description

Initializes a new instance of the System.MissingMethodException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If inner is non-null, then the current Exception is raised in a catch block handling inner.

MissingMethodException

Example Syntax:

ToString

[C#] public MissingMethodException(string className, string methodName);

[C++] public: MissingMethodException(String* className, String* methodName);

[VB] Public Sub New(ByVal className As String, ByVal methodName As String)

[JScript] public function MissingMethodException(className: String, methodName: String);

Description

Initializes a new instance of the System.MissingMethodException class with the specified class name and method name. The name of the class in which access to a nonexistent method was attempted. The name of the method that cannot be accessed.

HelpLink

HResult

InnerException

Message

ToString

Description

Gets the text string showing the class name, the method name, and the signature of the missing method.

If the class name is not specified when the object is constructed, the default text string inherited from the base class is returned.

Source

StackTrace

TargetSite

MTAThreadAttribute class (System)

ToString

Description

Indicates the default threading model for an application is multi-threaded apartment.

Only apply this attribute to the main method of an application.

MTAThreadAttribute

Example Syntax:

ToString

[C#] public MTAThreadAttribute( );

[C++] public: MTAThreadAttribute( ));

[VB] Public Sub New( )

[JScript] public function MTAThreadAttribute( );

Description

Initializes a new instance of the System.MTAThreadAttribute class.

TypeId

MulticastDelegate class (System)

ToString

Description

Represents a multicast delegate; that is, a delegate that can have more than one element in its invocation list.

All multicast delegates are derived from class MulticastDelegate.

MulticastDelegate

Example Syntax:

ToString

[C#] protected MulticastDelegate(object target, string method);

[C++] protected: MulticastDelegate(Object* target, String* method);

[VB] Protected Sub New(ByVal target As Object, ByVal method As String)

[JScript] protected function MulticastDelegate(target: Object, method: String); Initializes a new instance of the MulticastDelegate class.

Description

Initializes a new instance of the MulticastDelegate class. This constructor is called from the class generated by the compiler-generated code.

This must match the constructor in Delegate. The object on which the specified method is defined. The name of the method for which to create a delegate.

MulticastDelegate

Example Syntax:

ToString

[C#] protected MulticastDelegate(Type target, string method);

[C++] protected: MulticastDelegate(Type* target, String* method);

[VB] Protected Sub New(ByVal target As Type, ByVal method As String)

[JScript] protected function MulticastDelegate(target: Type, method: String);

Description

Initializes a new instance of the MulticastDelegate class. This constructor is called from a class to generate a delegate based upon a static method name and the Type object for the class defining the method. The Type object that represents the class that the specified method is defined on. The name of the static method for which to create a delegate.

Method

Target

CombineImpl

[C#] protected override Delegate CombineImpl(Delegate follow);

[C++] protected: Delegate* CombineImpl(Delegate* follow);

[VB] Overrides Protected Function CombineImpl(ByVal follow As Delegate) As Delegate

[JScript] protected override function CombineImpl(follow: Delegate): Delegate;

Description

Combines this System.Delegate with the passed Delegate to form a new delegate.

Return Value: A Delegate object as the new root. The Delegate with which to combine this Delegate.

DynamicInvokeImpl

[C#] protected override object DynamicInvokeImpl(object[ ] args);

[C++] protected: Object* DynamicInvokeImpl(Object* args _gc[ ]);

[VB] Overrides Protected Function DynamicInvokeImpl (ByVal args( ) As Object) As Object

[JScript] protected override function DynamicInvokeImpl (args: Object[ ]): Object;

Description

Processes the full invocation list.

Return Value: An array of type Object that contains the return value of the encapsulated method. The arguments to be passed to the encapsulated method.

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Determines whether this multicast delegate and the specified object are equal.

Return Value: true if obj and this instance have the same invocation lists; otherwise, false.

Two delegates, whether single- or multi-cast, are equal if they have the same invocation lists. Two invocation lists are considered identical if they have the same order, and the corresponding elements from the two lists represent the same method and target. The object to compare with this instance.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for this instance.

Return Value: A 32-bit signed integer hash code.

GetInvocationList

[C#] public override Delegate[ ] GetInvocationList( );

[C++] public: Delegate* GetInvocationList( ) [ ];

[VB] Overrides Public Function GetInvocationList( ) As Delegate( )

[JScript] public override function GetInvocationList( ): Delegate[ ];

Description

Returns the invocation list of this multicast delegate, in invocation order.

Return Value: An array of delegates in the invocation list.

op_Equality

[C#] public static new bool operator==(MulticastDelegate d1, MulticastDelegate d2);

[C++] public: static bool op_Equality(MulticastDelegate* d1, MulticastDelegate* d2);

[VB] returnValue=MulticastDelegate.op_Equality(d1, d2)

[JScript] returnValue=d1==d2;

Description

Determines whether two MulticastDelegate objects are equal.

Return Value: True if d1 and d2 have the same invocation lists; otherwise false.

Two delegates, whether single- or multi-cast, are equal if they have the same invocation lists. Two invocation lists are considered identical if they have the same order, and the corresponding elements from the two lists represent the same method and target. The left operand. The right operand.

op_Inequality

[C#] public static new bool operator !=(MulticastDelegate d1, MulticastDelegate d2);

[C++] public: static bool op_Inequality(MulticastDelegate* d1, MulticastDelegate* d2);

[VB] returnValue=MulticastDelegate.op_Inequality(d1, d2)

[JScript] returnValue=d1 !=d2;

Description

Determines whether two MulticastDelegate objects are not equal.

Return Value: True if d1 and d2 do not have the same invocation lists; otherwise false.

Two delegates, whether single- or multi-cast, are equal if they have the same invocation lists. Two invocation lists are considered identical if they have the same order, and the corresponding elements from the two lists represent the same method and target. The left operand. The right operand.

RemoveImpl

[C#] protected override Delegate RemoveImpl(Delegate value);

[C++] protected: Delegate* RemoveImpl(Delegate* value);

[VB] Overrides Protected Function RemoveImpl(ByVal value As Delegate) As Delegate

[JScript] protected override function RemoveImpl(value: Delegate): Delegate;

Description

Searches the invocation list for an element that has System.Delegate-based equality with value Return Value: A new Delegate if an element on the invocation list is found that has Delegate-based equality with value (and thus is removed from the invocation list). If such an element is not found, the current invocation list is returned. The Delegate to search for in the invocation list.

MulticastNotSupportedException class (System)

ToString

Description

The exception that is thrown when there is an attempt to combine two instances of a non-combinable delegate type unless one of the operands is null. This class cannot be inherited.

A valid delegate combination is made when one or both operands is a combinable delegate type. If both operands are non-combinable delegate type, then one operand must be null. A combinable delegate type must satisfy the following conditions: The declared return type of the delegate must be void.

MulticastNotSupportedException

Example Syntax:

ToString

[C#] public MulticastNotSupportedException( );

[C++] public: MulticastNotSupportedException( );

[VB] Public Sub New( )

[JScript] public function MulticastNotSupported Exception( ); Initializes a new instance of the System.MulticastNotSupportedException class.

Description

Initializes a new instance of the System.MulticastNotSupportedException class with default properties.

The following table shows the initial property values for an instance of System.MulticastNotSupportedException.

MulticastNotSupportedException

Example Syntax:

ToString

[C#] public MulticastNotSupportedException(string message);

[C++] public: MulticastNotSupportedException(String* message);

[VB] Public Sub New(ByVal message As String)

[JScript] public function MulticastNotSupportedException (message: String);

Description

Initializes a new instance of the System.MulticastNotSupportedException class with a specified error message.

The following table shows the initial property values for an instance of System.MulticastNotSupportedException. The error message that explains the reason for the exception.

MulticastNotSupportedException

Example Syntax:

ToString

[C#] public MulticastNotSupportedException(string message, Exception inner);

[C++] public: MulticastNotSupportedException(String* message, Exception* inner);

[VB] Public Sub New(ByVal message As String, ByVal inner As Exception)

[JScript] public function MulticastNotSupportedException (message: String, inner; Exception);

Description

Initializes a new instance of the System.MulticastNotSupportedException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If inner is non-null, then the current Exception is raised in a catch block handling inner.

HelpLink

HResult

InnerException

Message

Source

StackTrace

TargetSite

NonSerializedAttribute class (System)

ToString

Description

Indicates that a field of a serializable class should not be serialized. This class cannot be inherited.

The target objects for the System.NonSerializedAttribute are public and private fields of a serializable class. By default, classes are not serializable unless they are marked with the System.SerializableAttribute. During the serialization process all the public and private fields of a class are serialized by default. Fields that must not be serialized can be marked with the System.NonSerializedAttribute, which instructs the serialization process to ignore the target field during serialization.

NonSerializedAttribute

Example Syntax:

ToString

[C#] public NonSerializedAttribute( );

[C++] public: NonSerializedAttribute( );

[VB] Public Sub New( )

[JScript] public function NonSerializedAttribute( );

Description

Initializes a new instance of the System.NonSerializedAttribute class.

TypeId

NotFiniteNumberException class (System)

ToString

Description

The exception that is thrown when a floating-point value is positive infinity, negative infinity, or Not-a-Number (NaN).

Applications written in C# will not throw this exception.

NotFiniteNumberException

Example Syntax:

ToString

[C#] public NotFiniteNumberException( );

[C++] public: NotFiniteNumberException( );

[VB] Public Sub New( )

[JScript] public function NotFiniteNumberException( ); Initializes a new instance of the System.NotFiniteNumberException class.

Description

Initializes a new instance of the System.NotFiniteNumberException class with default properties.

The following table shows the initial property values for an instance of System.NotFiniteNumberException.

NotFiniteNumberException

Example Syntax:

ToString

[C#] public NotFiniteNumberException(double offendingNumber);

[C++] public: NotFiniteNumberException(double offendingNumber);

[VB] Public Sub New(ByVal offendingNumber As Double)

[JScript] public function NotFiniteNumberException(offendingNumber: double);

Description

Initializes a new instance of the System.NotFiniteNumberException class with the invalid number.

The offendingNumber parameter must be both a System.Double and an invalid number. The invalid number.

NotFiniteNumberException

Example Syntax:

ToString

[C#] public NotFiniteNumberException(string message);

[C++] public: NotFiniteNumberException(String* message);

[VB] Public Sub New(ByVal message As String)

[JScript] public function NotFiniteNumberException(message: String);

Description

Initializes a new instance of the System.NotFiniteNumberException class with a specified error message.

The following table shows the initial property values for an instance of System.NotFiniteNumberException. The error message that explains the reason for the exception.

NotFiniteNumberException

Example Syntax:

ToString

[C#] protected NotFiniteNumberException(SerializationInfo info, StreamingContext context);

[C++] protected: NotFiniteNumberException(SerializationInfo* info, StreamingContext context);

[VB] Protected Sub New(ByVal info As SerializationInfo, ByVal context As StreamingContext)

[JScript] protected function NotFiniteNumberException (info: SerializationInfo, context: StreamingContext);

Description

Initializes a new instance of the System.NotFiniteNumberException class with serialized data.

This constructor is called during deserialization to reconstitute the exception object transmitted over a stream. For more information, see. The object that holds the serialized object data. The contextual information about the source or destination.

NotFiniteNumberException

Example Syntax:

ToString

[C#] public NotFiniteNumberException(string message, double offendingNumber);

[C++] public: NotFiniteNumberException(String* message, double offendingNumber);

[VB] Public Sub New(ByVal message As String, ByVal offendingNumber As Double)

[JScript] public function NotFiniteNumberException(message: String, offendingNumber: double);

Description

Initializes a new instance of the System.NotFiniteNumberException class with a specified error message and the invalid number.

The following table shows the initial property values for an instance of System.NotFiniteNumberException. The error message that explains the reason for the exception. The invalid number.

NotFiniteNumberException

Example Syntax:

ToString

[C#] public NotFiniteNumberException(string message, double offendingNumber, Exception innerException);

[C++] public: NotFiniteNumberException(String* message, double offendingNumber, Exception* innerException);

[VB] Public Sub New(ByVal message As String, ByVal offendingNumber As Double, ByVal innerException As Exception)

[JScript] public function NotFiniteNumberException(message: String, offendingNumber: double, innerException: Exception);

Description

Initializes a new instance of the System.NotFiniteNumberException class with a specified error message, the invalid number, and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. The invalid number. An instance of System.Exception that is the cause of the current Exception. If innerException is non-null, then the current Exception is raised in a catch block handling innerException.

HelpLink

HResult

InnerException

Message

OffendingNumber

ToString

Description

Gets the invalid number that is a positive infinity, a negative infinity, or Not-a-Number (NaN).

Source

StackTrace

TargetSite

GetObjectData

[C#] public override void GetObjectData(SerializationInfo info, StreamingContext context);

[C++] public: void GetObjectData(SerializationInfo* info, StreamingContext context);

[VB] Overrides Public Sub GetObjectData(ByVal info As SerializationInfo, ByVal context As StreamingContext)

[JScript] public override function GetObjectData(info: SerializationInfo, context: StreamingContext);

Description

Sets the System.Runtime.Serialization.SerializationInfo object with the invalid number and additional exception information.

System.TypeLoadException.GetObjectData(System. Runtime.Serialization. SerializationInfo,System.Run time.Serialization.StreamingContext) sets a System.Run time.Serialization.SerializationInfo with all the exception object data targeted for serialization. During deserialization, the exception object is reconstituted from the System.Run time.Serialization.SerializationInfo transmitted over the stream. The object that holds the serialized object data. The contextual information about the source or destination.

NotImplementedException class (System)

ToString

Description

The exception that is thrown when a requested method or operation is not implemented.

System.NotImplementedException uses the default System. Object.Equals(System.Object) implementation, which supports reference equality. For a list of initial values for an instance of System.NotImplementedException, see the System.NotImplementedException.#ctor constructors.

NotImplementedException

Example Syntax:

ToString

[C#] public NotImplementedException( );

[C++] public: NotImplementedException( );

[VB] Public Sub New( )

[JScript] public function NotImplementedException( ); Initializes a new instance of the System.NotImplementedException class.

Description

Initializes a new instance of the System.NotImplementedException class with default properties.

The following table shows the initial property values for an instance of System.NotImplementedException.

NotImplementedException

Example Syntax:

ToString

[C#] public NotImplementedException(string message);

[C++] public: NotImplementedException(String* message);

[VB] Public Sub New(ByVal message As String)

[JScript] public function NotImplementedException(message: String);

Description

Initializes a new instance of the System.NotImplementedException class with a specified error message.

The following table shows the initial property values for an instance of System.NotImplementedException. The error message that explains the reason for the exception.

NotImplementedException

Example Syntax:

ToString

[C#] protected NotImplementedException(SerializationInfo info, StreamingContext context);

[C++] protected: NotImplementedException(SerializationInfo* info, StreamingContext context);

[VB] Protected Sub New(ByVal info As SerializationInfo, ByVal context As StreamingContext)

[JScript] protected function NotImplementedException(info: SerializationInfo, context: StreamingContext);

Description

Initializes a new instance of the System.NotImplementedException class with serialized data. The object that holds the serialized object data. The contextual information about the source or destination.

NotImplementedException

Example Syntax:

ToString

[C#] public NotImplementedException(string message, Exception inner);

[C++] public: NotImplementedException(String* message, Exception* inner);

[VB] Public Sub New(ByVal message As String, ByVal inner As Exception)

[JScript] public function NotImplementedException(message: String, inner: Exception);

Description

Initializes a new instance of the System.NotImplementedException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If inner is non-null, then the current Exception is raised in a catch block handling inner.

HelpLink

HResult

InnerException

Message

Source

StackTrace

TargetSite

NotSupportedException class (System)

ToString

Description

The exception that is thrown when an invoked method is not supported, or when there is an attempt to read, seek, or write to a stream that does not support the invoked functionality.

There are methods that are not supported in the base class, with the expectation that these methods will be implemented in the derived classes instead. The derived class might implement only a subset of the methods from the base class, and throw System.NotSupportedException for the unsupported methods.

NotSupportedException

Example Syntax:

ToString

[C#] public NotSupportedException( );

[C++] public: NotSupportedException( );

[VB] Public Sub New( )

[JScript] public function NotSupportedException( ); Initializes a new instance of the System.NotSupportedException class.

Description

Initializes a new instance of the System.NotSupportedException class with default properties.

The following table shows the initial property values for an instance of System.NotSupportedException.

NotSupportedException

Example Syntax:

ToString

[C#] public NotSupportedException(string message);

[C++] public: NotSupportedException(String* message);

[VB] Public Sub New(ByVal message As String)

[JScript] public function NotSupportedException(message: String);

Description

Initializes a new instance of the System.NotSupportedException class with a specified error message.

The following table shows the initial property values for an instance of System.NotSupportedException. The error message that explains the reason for the exception.

NotSupportedException

Example Syntax:

ToString

[C#] protected NotSupportedException(SerializationInfo info, StreamingContext context);

[C++] protected: NotSupportedException(SerializationInfo* info, StreamingContext context);

[VB] Protected Sub New(ByVal info As SerializationInfo, ByVal context As StreamingContext)

[JScript] protected function NotSupportedException(info: SerializationInfo, context: StreamingContext);

Description

Initializes a new instance of the System.NotSupportedException class with serialized data.

This constructor is called during deserialization to reconstitute the exception object transmitted over a stream. For more information, see. The object that holds the serialized object data. The contextual information about the source or destination.

NotSupportedException

Example Syntax:

ToString

[C#] public NotSupportedException(string message, Exception innerException);

[C++] public: NotSupportedException(String* message, Exception* innerException);

[VB] Public Sub New(ByVal message As String, ByVal innerException As Exception)

[JScript] public function NotSupportedException(message: String, innerException: Exception);

Description

Initializes a new instance of the System.NotSupportedException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If innerException is non-null, then the current Exception is raised in a catch block handling innerException.

HelpLink

HResult

InnerException

Message

Source

StackTrace

TargetSite

NullReferenceException class (System)

ToString

Description

The exception that is thrown when there is an attempt to dereference a null object reference.

System.NullReferenceException uses the HRESULT COR_E_NULLREFERENCE, which has the value 0x80004003.

NullReferenceException

Example Syntax:

ToString

[C#] public NullReferenceException( );

[C++] public: NullReferenceException( );

[VB] Public Sub New( )

[JScript] public function NullReferenceException( ); Initializes a new instance of the System.NullReferenceException class.

Description

Initializes a new instance of the System.NullReferenceException class with default properties.

The following table shows the initial property values for an instance of System.NullReferenceException NullReferenceException Example Syntax:

ToString

[C#] public NullReferenceException(string message);

[C++] public: NullReferenceException(String* message);

[VB] Public Sub New(ByVal message As String)

[JScript] public function NullReferenceException(message: String);

Description

Initializes a new instance of the System.NullReferenceException class with a specified error message.

The following table shows the initial property values for an instance of System.NullReferenceException. The error message that explains the reason for the exception.

NullReferenceException

Example Syntax:

ToString

[C#] protected NullReferenceException(SerializationInfo info, StreamingContext context);

[C++] protected: NullReferenceException(SerializationInfo* info, StreamingContext context);

[VB] Protected Sub New(ByVal info As SerializationInfo, ByVal context As StreamingContext)

[JScript] protected function NullReferenceException(info: SerializationInfo, context: StreamingContext);

Description

Initializes a new instance of the System.NullReferenceException class with serialized data.

This constructor is called during deserialization to reconstitute the exception object transmitted over a stream. For more information, see. The object that holds the serialized object data. The contextual information about the source or destination.

NullReferenceException

Example Syntax:

ToString

[C#] public NullReferenceException(string message, Exception innerException);

[C++] public: NullReferenceException(String* message, Exception* innerException);

[VB] Public Sub New(ByVal message As String, ByVal innerException As Exception)

[JScript] public function NullReferenceException(message: String, innerException: Exception);

Description

Initializes a new instance of the System.NullReferenceException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If innerException is non-null, then the current Exception is raised in a catch block handling innerException.

HelpLink

HResult

InnerException

Message

Source

StackTrace

TargetSite

Object class (System)

ToString

Description

Supports all classes in the .NET Framework class hierarchy and provides low-level services to derived classes. This is the ultimate superclass of all classes in the .NET Framework; it is the root of the type hierarchy.

Languages typically do not require a class to declare inheritance from System.Object because the inheritance is implicit.

Object

Example Syntax:

ToString

[C#] public Object( );

[C++] public: Object( );

[VB] Public Sub New( )

[JScript] public function Object( );

Description

Initializes a new instance of the System.Object class.

This constructor is called by constructors in derived classes, but it can also be used to directly create an instance of the System.Object class.

Equals

[C#] public virtual bool Equals(object obj);

[C++] public: virtual bool Equals(Object* obj);

[VB] Overridable Public Function Equals(ByVal obj As Object) As Boolean

[JScript] public function Equals(obj: Object): Boolean; Determines whether two System.Object instances are equal.

Description

Determines whether the specified System.Object is equal to the current System.Object.

Return Value: true if the specified System.Object is equal to the current System.Object; otherwise, false.

The default implementation of System.Object.Equals(System.Object) supports reference equality only, but derived classes can override this method to support value equality. The System.Object to compare with the current System.Object.

Equals

[C#] public static bool Equals(object objA, object objB);

[C++] public: static bool Equals(Object* objA, Object* objB);

[VB] Public Shared Function Equals(ByVal objA As Object, ByVal objB As Object) As Boolean

[JScript] public static function Equals(objA: Object, objB: Object): Boolean;

Description

Determines whether the specified System.Object instances are considered equal.

Return Value: true if objA is the same instance as objB or if both are null references or if objA.Equals(objB) returns true; otherwise, false.

The default implementation of System.Object.Equals(System.Object) supports reference equality only, but derived classes can override this method to support value equality. The first System.Object to compare. The second System.Object to compare.

Finalize

[C#]~Object( );

[C++]~Object( );

[VB] Overrides Protected Sub Finalize( )

[JScript] protected override function Finalize( );

Description

Allows an System.Object to attempt to free resources and perform other cleanup operations before the System.Object is reclaimed by garbage collection.

System.Object.Finalize is protected and, therefore, is accessible only through this class or a derived class.

GetHashCode

[C#] public virtual int GetHashCode( );

[C++] public: virtual int GetHashCode( );

[VB] Overridable Public Function GetHashCode( ) As Integer

[JScript] public function GetHashCode( ): int;

Description

Serves as a hash function for a particular type, suitable for use in hashing algorithms and data structures like a hash table.

Return Value: A hash code for the current System.Object.

This method can be overridden by a derived class. Value classes must override this method to provide a hash function that is appropriate for the class and that ensures a better distribution in the hash table. Classes that might be used as a key in a hash table must also override this method, because objects that are used as keys in a hash table are required to generate their own hash code through this method.

GetType

[C#] public Type GetType( );

[C++] public: Type* GetType( );

[VB] Public Function GetType( ) As Type

[JScript] public function GetType( ): Type;

Description

Gets the System.Type of the current instance.

Return Value: The System.Type instance that represents the exact runtime type of the current instance.

For two objects x and y that have identical runtime types, Object.ReferenceEquals(x.GetType( ),y.GetType( )) returns true.

MemberwiseClone

[C#] protected object MemberwiseClone( );

[C++] protected: Object* MemberwiseClone( );

[VB] Protected Function MemberwiseClone( ) As Object

[JScript] protected function MemberwiseClone( ): Object;

Description

Creates a shallow copy of the current System.Object

Return Value: A shallow copy of the current System.Object.

This method cannot be overridden; a derived class should implement the System.ICloneable interface if a shallow copy is not appropriate.

ReferenceEquals

[C#] public static bool ReferenceEquals(object objA, object objB);

[C++] public: static bool ReferenceEquals(Object* objA, Object* objB);

[VB] Public Shared Function ReferenceEquals(ByVal objA As Object, ByVal objB As Object) As Boolean

[JScript] public static function ReferenceEquals(objA: Object, objB: Object) Boolean;

Description

Determines whether the specified System.Object instances are the same instance.

Return Value: true if objA is the same instance as objB or if both are null references; otherwise, false. The first System. Object to compare. The second System.Object to compare.

ToString

[C#] public virtual string ToString( );

[C++] public: virtual String* ToString( );

[VB] Overridable Public Function ToString( ) As String

[JScript] public function ToString( ): String;

Description

Returns a System.String that represents the current System. Object.

Return Value: A System.String that represents the current System.Object.

This method returns a human-readable string that is culture-sensitive. For example, for an instance of the System. Double class whose value is zero, the implementation of System.Double.ToString might return "0.00" or "0,00" depending on the current UI culture.

ObjectDisposedException class (System)

ToString

ObjectDisposedException

Example Syntax:

ToString

System.ObjectDisposedException

ObjectDisposedException

Example Syntax:

ToString

ObjectDisposedException

Example Syntax:

ToString

System.ObjectDisposedException

HelpLink

HResult

InnerException

Message

ToString

ObjectName

ToString

Source

StackTrace

TargetSite

ObsoleteAttribute class (System)

ToString

Description

Marks the program elements that are no longer in use. This class cannot be inherited.

System.ObsoleteAttribute is applicable to all program elements except assemblies, modules, parameters or return values. Marking an element as obsolete informs the users that the element will be removed in future versions of the product or that the functionality provided by the element is made internal to your application.

ObsoleteAttribute

Example Syntax:

ToString

[C#] public ObsoleteAttribute( );

[C++] public: ObsoleteAttribute( );

[VB] Public Sub New( )

[JScript] public function ObsoleteAttribute( ); Initializes a new instance of the System.ObsoleteAttribute class.

Description

Initializes a new instance of the System.ObsoleteAttribute class with default properties.

The following table shows the initial property values for an instance of System.ObsoleteAttribute.

ObsoleteAttribute

Example Syntax:

ToString

[C#] public ObsoleteAttribute(string message);

[C++] public: ObsoleteAttribute(String* message);

[VB] Public Sub New(ByVal message As String)

[JScript] public function ObsoleteAttribute(message: String);

Description

Initializes a new instance of the System.ObsoleteAttribute class with a specified workaround message.

The following table shows the initial property values for an instance of System.ObsoleteAttribute. The text string that describes alternative workarounds.

ObsoleteAttribute

Example Syntax:

ToString

[C#] public ObsoleteAttribute(string message, bool error);

[C++] public: ObsoleteAttribute(String* message, bool error);

[VB] Public Sub New(ByVal message As String, ByVal error As Boolean)

[JScript] public function ObsoleteAttribute(message: String, error: Boolean);

Description

Initializes a new instance of the System.ObsoleteAttribute class with a workaround message and a Boolean value indicating whether the obsolete element usage is considered an error.

The following table shows the initial property values for an instance of System.ObsoleteAttribute. The text string that describes alternative workarounds. The Boolean value that indicates whether the obsolete element usage is considered an error.

IsError

ToString

[C#] public bool IsError {get;}

[C++] public: _property bool get_IsError( );

[VB] Public ReadOnly Property IsError As Boolean

[JScript] public function get IsError( ): Boolean;

Description

Gets a Boolean value indicating whether the compiler will treat usage of the obsolete program element as an error.

Message

ToString

[C#] public string Message {get;}

[C++] public: _property String* get_Message( );

[VB] Public ReadOnly Property Message As String

[JScript] public function get Message( ): String;

Description

Gets the workaround message, including a description of the alternative program elements.

TypeId

OperatingSystem class (System)

ToString

Description

Represents information about an operating system, such as the version and platform identifier.

This class provides a method to copy an instance of OperatingSystem, and a method to return a string representation of operating system information.

OperatingSystem

Example Syntax:

ToString

[C#] public OperatingSystem(PlatformID platform, Version version);

[C++] public: OperatingSystem(PlatformID platform, Version* version);

[VB] Public Sub New(ByVal platform As PlatformID, ByVal version As Version)

[JScript] public function OperatingSystem(platform: PlatformID, version: Version);

Description

Initializes a new instance of the OperatingSystem class, using the specified platform identifier value and version object. A System.PlatformID enumerated constant that indicates the operating system platform. A System.Version object that indicates the version of the operating system.

Platform

ToString

[C#] public PlatformID Platform {get;}

[C++] public: _property PlatformID get_Platform( );

[VB] Public ReadOnly Property Platform As PlatformID

[JScript] public function get Platform( ): PlatformID;

Description

Gets a PlatformID value that identifies this operating system platform.

Version

ToString

[C#] public Version Version {get;}

[C++] public: _property Version* get_Version( );

[VB] Public ReadOnly Property Version As Version

[JScript] public function get Version( ): Version;

Description

Gets a Version object that identifies this operating system.

Clone

[C#] public object Clone( );

[C++] public: _sealed Object* Clone( );

[VB] NotOverridable Public Function Clone( ) As Object

[JScript] public function Clone( ): Object;

Description

Returns an OperatingSystem object that is identical to this instance.

Return Value: An OperatingSystem object that is a copy of this instance.

ToString

[C#] public override string ToString( );

[C++] public: String* ToString( );

[VB] Overrides Public Function ToString( ) As String

[JScript] public override function ToString( ): String;

Description

Converts the value of this instance to its equivalent String representation.

Return Value: The format of the return value is: platform majorVersion.minorVersion.build.revision For example, if the operating sysem is Windows 2000, the return value is: "Microsoft Windows NT 5.0.0.2195".

OutOfMemoryException class (System)

ToString

Description

The exception that is thrown when there is not enough memory to continue the execution of a program.

System.OutOfMemoryException uses the HRESULT COR_E_OUTOFMEMORY, which has the value 0x8007000E.

OutOfMemoryException

Example Syntax:

ToString

[C#] public OutOfMemoryException( );

[C++] public: OutOfMemoryException( );

[VB] Public Sub New( )

[JScript] public function OutOfMemoryException( ); Initializes a new instance of the System.OutOfMemoryException class.

It Description

Initializes a new instance of the System.OutOfMemoryException class with default properties.

The following table shows the initial property values for an instance of System.OutOfMemoryException.

OutOfMemoryException

Example Syntax:

ToString

[C#] public OutOfMemoryException(string message);

[C++] public: OutOfMemoryException(String* message);

[VB] Public Sub New(ByVal message As String)

[JScript] public function OutOfMemoryException(message: String);

Description

Initializes a new instance of the System.OutOfMemoryException class with a specified error message.

The following table shows the initial property values for an instance of System.OutOfMemoryException. The error message that explains the reason for the exception.

OutOfMemoryException

Example Syntax:

ToString

[C#] protected OutOfMemoryException(SerializationInfo info, StreamingContext context);

[C++] protected: OutOfMemoryException(SerializationInfo* info, StreamingContext context);

[VB] Protected Sub New(ByVal info As SerializationInfo, ByVal context As StreamingContext)

[JScript] protected function OutOfMemoryException(info: SerializationInfo, context: StreamingContext);

Description

Initializes a new instance of the System.OutOfMemoryException class with serialized data.

This constructor is called during deserialization to reconstitute the exception object transmitted over a stream. For more information, see. The object that holds the serialized object data. The contextual information about the source or destination.

OutOfMemoryException

Example Syntax:

ToString

[C#] public OutOfMemoryException(string message, Exception innerException);

[C++] public: OutOfMemoryException(String* message, Exception* innerException);

[VB] Public Sub New(ByVal message As String, ByVal innerException As Exception)

[JScript] public function OutOfMemoryException(message: String, innerException: Exception);

Description

Initializes a new instance of the System.OutOfMemoryException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If innerException is non-null, then the current Exception is raised in a catch block handling innerException.

HelpLink

HResult

InnerException

Message

Source

StackTrace

TargetSite

OverflowException class (System)

ToString

Description

The exception that is thrown when an arithmetic, casting, or conversion operation in a checked context results in an overflow.

For a result from an integral or decimal-type arithmetic operation or conversion that is outside the range of the destination type: In a checked context, a compile-time error occurs if the operation is a constant expression. Otherwise, an System.OverflowException is thrown if the operation is performed at run-time.

OverflowException

Example Syntax:

ToString

[C#] public OverflowException( );

[C++] public: OverflowException( );

[VB] Public Sub New( )

[JScript] public function OverflowException( ); Initializes a new instance of the System.OverflowException class.

Description

Initializes a new instance of the System.OverflowException class with default properties.

The following table shows the initial property values for an instance of System.OverflowException.

OverflowException

Example Syntax:

ToString

[C#] public OverflowException(string message);

[C++] public: OverflowException(String* message);

[VB] Public Sub New(ByVal message As String)

[JScript] public function OverflowException(message: String);

Description

Initializes a new instance of the System.OverflowException class with a specified error message.

The following table shows the initial property values for an instance of System.OverflowException. The error message that explains the reason for the exception.

OverflowException

Example Syntax:

ToString

[C#] protected OverflowException(SerializationInfo info, StreamingContext context);

[C++] protected: OverflowException(SerializationInfo* info, StreamingContext context);

[VB] Protected Sub New(ByVal info As SerializationInfo, ByVal context As StreamingContext)

[JScript] protected function OverflowException(info: SerializationInfo, context: StreamingContext);

Description

Initializes a new instance of the System.OverflowException class with serialized data.

This constructor is called during deserialization to reconstitute the exception object transmitted over a stream. For more information, see. The object that holds the serialized object data. The contextual information about the source or destination.

OverflowException

Example Syntax:

ToString

[C#] public OverflowException(string message, Exception innerException);

[C++] public: OverflowException(String* message, Exception* innerException);

[VB] Public Sub New(ByVal message As String, ByVal innerException As Exception)

[JScript] public function OverflowException(message: String, innerException: Exception);

Description

Initializes a new instance of the System.OverflowException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If innerException is non-null, then the current Exception is raised in a catch block handling innerException.

HelpLink

HResult

InnerException

Message

Source

StackTrace

TargetSite

ParamArrayAttribute class (System)

ToString

Description

Indicates that the method will allow a variable number of arguments in its invocation. This class cannot be inherited.

A parameter array allows the specification of an unknown number of arguments. A parameter array must be the last parameter in a formal parameter list, and it must be a single-dimension array. A parameter array permits arguments to a method to be specified in two ways: A single expression of a type that is implicitly convertible to the parameter array type. The parameter array functions as a value parameter.

ParamArrayAttribute

Example Syntax:

ToString

[C#] public ParamArrayAttribute( );

[C++] public: ParamArrayAttribute( );

[VB] Public Sub New( )

[JScript] public function ParamArrayAttribute( );

Description

Initializes a new instance of the System.ParamArrayAttribute class with default properties.

TypeId

PlatformID enumeration (System)

ToString

Description

Describes the platforms supported by an assembly.

These flags are used to bind to an assembly.

ToString

[C#] public const PlatformID Win32NT;

[C++] public: const PlatformID Win32NT;

[VB] Public Const Win32NT As PlatformID

[JScript] public var Win32NT: PlatformID;

Description

The operating system is Windows NT or later.

ToString

[C#] public const PlatformID Win32S;

[C++] public: const PlatformID Win32S;

[VB] Public Const Win32S As PlatformID

[JScript] public var Win32S: PlatformID;

Description

The operating system is Win32s. Win32s is a layer that runs on 16-bit versions of Windows to provide access to 32-bit applications.

ToString

[C#] public const PlatformID Win32Windows;

[C++] public: const PlatformID Win32Windows;

[VB] Public Const Win32Windows As PlatformID

[JScript] public var Win32Windows: PlatformID;

Description

The operating system is Windows 95 or later.

PlatformNotSupportedException class (System)

ToString

Description

The exception that is thrown when a feature does not run on a particular platform.

PlatformNotSupportedException uses the HRESULT COR_E_PLATFORMNOTSUPPORTED, which has the value 0x80131539.

PlatformNotSupportedException

Example Syntax:

ToString

[C#] public PlatformNotSupportedException( );

[C++] public: PlatformNotSupportedException( );

[VB] Public Sub New( )

[JScript] public function PlatformNotSupportedException( );

Initializes a new instance of the System.PlatformNotSupportedException class.

Description

Initializes a new instance of the System.PlatformNotSupportedException class with default properties.

When an instance of the System.PlatformNotSupportedException class is created by a call to this constructor, the following properties are initialized to the specified values: Property Value System.Exception.InnerExceptionnull.

PlatformNotSupportedException

Example Syntax:

ToString

[C#] public PlatformNotSupportedException(string message);

[C++] public: PlatformNotSupportedException(String* message);

[VB] Public Sub New(ByVal message As String)

[JScript] public function PlatformNotSupportedException (message: String);

Description

Initializes a new instance of the System.PlatformNotSupportedException class with a specified error message.

When an instance of the System.PlatformNotSupportedException class is created by a call to this constructor, the following properties are initialized to the specified values: Property Value System.Exception.InnerExceptionnull. The text message that explains the reason for the exception.

PlatformNotSupportedException

Example Syntax:

ToString

[C#] protected PlatformNotSupportedException(SerializationInfo info, StreamingContext context);

[C++] protected: PlatformNotSupportedException(SerializationInfo* info, StreamingContext context);

[VB] Protected Sub New(ByVal info As SerializationInfo, ByVal context As StreamingContext)

[JScript] protected function PlatformNotSupportedException(info: SerializationInfo, context: StreamingContext);

Description

Initializes a new instance of the System.PlatformNotSupportedException class with serialized data. The System.Runtime.Serialization.SerializationInfo that holds the serialized object data about the exception being thrown. The System.Runtime.Serialization.StreamingContext that contains contextual information about the source or destination.

PlatformNotSupportedException

Example Syntax:

ToString

[C#] public PlatformNotSupportedException(string message, Exception inner);

[C++] public: PlatformNotSupportedException(String* message, Exception* inner);

[VB] Public Sub New(ByVal message As String, ByVal inner As Exception)

[JScript] public function PlatformNotSupportedException (message: String, inner: Exception);

Description

Initializes a new instance of the System.PlatformNotSupportedException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The text message that explains the reason for the exception. An instance of System.Exception that is the cause of the current Exception. If the inner parameter is non-null, then the current Exception is raised in a catch block handling inner.

HelpLink

HResult

InnerException

Message

Source

StackTrace

TargetSite

Random class (System)

ToString

Description

Represents a pseudo-random number generator, a device that produces a sequence of numbers that meet certain statistical requirements for randomness.

Pseudo-random numbers are chosen with equal probability from a finite set of numbers. The chosen numbers are not completely random because a definite mathematical algorithm is used to select them, but they are sufficiently random for practical purposes.

Random

Example Syntax:

ToString

[C#] public Random( );

[C++] public: Random( );

[VB] Public Sub New( )

[JScript] public function Random( ); Initializes a new instance of the Random class.

Description

Initializes a new instance of the Random class, using a time-dependent default seed value.

The distribution of the generated numbers is uniform; each number is equally likely to be returned.

Random

Example Syntax:

ToString

[C#] public Random(int Seed);

[C++] public: Random(int Seed);

[VB] Public Sub New(ByVal Seed As Integer)

[JScript] public function Random(Seed: int);

Description

Initializes a new instance of the Random class, using the specified seed value.

If your application requires different random number sequences, invoke this constructor repeatedly with different seed values. One way to produce a unique seed value is to make it time-dependent. For example, derive the seed value from the system clock. A number used to calculate a starting value for the pseudo-random number sequence.

Next

[C#] public virtual int Next( );

[C++] public: virtual int Next( );

[VB] Overridable Public Function Next( ) As Integer

[JScript] public function Next( ): int; Returns a random number.

Description

Returns a positive random number.

Return Value: A number greater than or equal to zero and less than System.Int32.MaxValue.

Next

[C#] public virtual int Next(int maxValue);

[C++] public: virtual int Next(int maxValue);

[VB] Overridable Public Function Next(ByVal maxValue As Integer) As Integer

[JScript] public function Next(maxValue: int): int;

Description

Returns a positive random number less than the specified maximum.

Return Value: A number greater than or equal to zero, and less than maxValue. The upper bound of the random number to be generated.

Next

[C#] public virtual int Next(int minValue, int maxValue);

[C++] public: virtual int Next(int minValue, int maxValue);

[VB] Overridable Public Function Next(ByVal minValue As Integer, ByVal maxValue As Integer) As Integer

[JScript] public function Next(minValue: int, maxValue: int): int;

Description

Returns a random number within a specified range.

Return Value: A number greater than or equal to minValue and less than maxValue. If min Value equals max Value, min Value is returned. The lower bound of the random number returned. The upper bound of the random number returned.

NextBytes

[C#] public virtual void NextBytes(byte[ ] buffer);

[C++] public: virtual void NextBytes(unsigned char buffer _gc[ ]);

[VB] Overridable Public Sub NextBytes(ByVal buffers As Byte)

[JScript] public function NextBytes(buffer: Byte[ ]);

Description

Fills the elements of a specified array of bytes with random numbers.

Each element of the array of bytes is set to a random number greater than or equal to zero, and less than or equal to System.Byte.MaxValue. An array of bytes to contain random numbers.

NextDouble

[C#] public virtual double NextDouble( );

[C++] public: virtual double NextDouble( );

[VB] Overridable Public Function NextDouble( ) As Double

[JScript] public function NextDouble( ): double;

Description

Returns a random number between 0.0 and 1.0.

Return Value: A double-precision floating point number greater than or equal to 0.0, and less than 1.0.

This method is the public version of the protected method, System.Random.Sample.

Sample

[C#] protected virtual double Sample( );

[C++] protected: virtual double Sample( );

[VB] Overridable Protected Function Sample( ) As Double

[JScript] protected function Sample( ): double;

Description

Returns a random number between 0.0 and 1.0.

Return Value: A double-precision floating point number greater than or equal to 0.0, and less than 1.0.

Create a derived class of Random to override this method and produce a different distribution.

RankException class (System)

ToString

Description

The exception that is thrown when an array with the wrong number of dimensions is passed to a method.

System.RankException uses the HRESULT COR_E_RANK, which has the value 0x80131517.

RankException

Example Syntax:

ToString

[C#] public RankException( );

[C++] public: RankException( );

[VB] Public Sub New( )

[JScript] public function RankException( ); Initializes a new instance of the System.RankException class.

Description

Initializes a new instance of the System.RankException class with default properties.

The following table shows the initial property values for an instance of System.RankException.

RankException

Example Syntax:

ToString

[C#] public RankException(string message);

[C++] public: RankException(String* message);

[VB] Public Sub New(ByVal message As String)

[JScript] public function RankException(message: String);

Description

Initializes a new instance of the System.RankException class with a specified error message.

The following table shows the initial property values for an instance of System.RankException. The error message that explains the reason for the exception.

RankException

Example Syntax:

ToString

[C#] protected RankException(SerializationInfo info, StreamingContext context);

[C++] protected: RankException(SerializationInfo* info, StreamingContext context);

[VB] Protected Sub New(ByVal info As SerializationInfo, ByVal context As StreamingContext)

[JScript] protected function RankException(info: SerializationInfo, context: StreamingContext);

Description

Initializes a new instance of the System.RankException class with serialized data.

This constructor is called during deserialization to reconstitute the exception object transmitted over a stream. For more information, see. The object that holds the serialized object data. The contextual information about the source or destination.

RankException

Example Syntax:

ToString

[C#] public RankException(string message, Exception innerException);

[C++] public: RankException(String* message, Exception* innerException);

[VB] Public Sub New(ByVal message As String, ByVal innerException As Exception)

[JScript] public function RankException(message: String, innerException: Exception);

Description

Initializes a new instance of the System.RankException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If innerException is non-null, then the current Exception is raised in a catch block handling innerException.

HelpLink

HResult

InnerException

Message

Source

StackTrace

TargetSite

ResolveEventArgs class (System)

ToString

Description

Provides data for the System.AppDomain.TypeResolve, System.AppDomain.ResourceResolve, and System.AppDomain.AssemblyResolve events.

ResolveEventArgs

Example Syntax:

ToString

[C#] public ResolveEventArgs(string name);

[C++] public: ResolveEventArgs(String* name);

[VB] Public Sub New(ByVal name As String)

[JScript] public function ResolveEventArgs(name: String);

Description

Initializes a new instance of the ResolveEventArgs class.

This constructor is typically only called by the common language runtime. The name of an item to resolve.

Name

ToString

[C#] public string Name {get;}

[C++] public: _property String* get_Name( );

[VB] Public ReadOnly Property Name As String

[JScript] public function get Name( ): String;

Description

The name of the item to be resolved.

ResolveEventHandler delegate (System)

ToString

Description

Represents the method that will handle the System.AppDomain.TypeResolve, System.AppDomain.ResourceResolve, and System.AppDomain.AssemblyResolve events of an System.AppDomain. The source of the event. A System.ResolveEventArgs that contains the event data.

If the runtime class loader cannot resolve a reference to an assembly, type or a resource through normal means, the corresponding events are raised to give the callback a chance to tell the runtime which assembly the referenced assembly, type or resource is in.

RuntimeArgumentHandle structure (System)

ToString

Description

References a variable-length argument list.

This class has no members, and exists solely to support C/C++ programming language functions that take a variable number of parameters.

RuntimeFieldHandle structure (System)

ToString

Description

The RuntimeFieldHandle is a handle to the internal metadata representation of a field.

Value

ToString

[C#] public IntPtr Value {get;}

[C++] public: _property IntPtr get_Value( );

[VB] Public ReadOnly Property Value As IntPtr

[JScript] public function get Value( ): IntPtr;

Description

The value of the handle.

GetObjectData

[C#] public void GetObjectData(SerializationInfo info, StreamingContext context);

[C++] public: _sealed void GetObjectData(SerializationInfo* info, StreamingContext context);

[VB] NotOverridable Public Sub GetObjectData(ByVal info As SerializationInfo, ByVal context As StreamingContext)

[JScript] public function GetObjectData(info: SerializationInfo, context: StreamingContext);

Description

Returns a SerializationInfo completely populated with all the data needed to reinstantiate the object at the other end of serialization. The object to be populated with serialization information. The destination context of the serialization.

RuntimeMethodHandle structure (System)

ToString

Description

The RuntimeMethodHandle is a handle to the internal metadata representation of a method.

Value

ToString

[C#] public IntPtr Value {get;}

[C++] public: _property IntPtr get_Value( );

[VB] Public ReadOnly Property Value As IntPtr

[JScript] public function get Value( ): IntPtr;

Description

The value of the handle.

GetFunctionPointer

[C#] public IntPtr GetFunctionPointer( );

[C++] public: IntPtr GetFunctionPointer( );

[VB] Public Function GetFunctionPointer( ) As IntPtr

[JScript] public function GetFunctionPointer( ): IntPtr;

GetObjectData

[C#] public void GetObjectData(SerializationInfo info, StreamingContext context);

[C++] public: _sealed void GetObjectData(SerializationInfo* info, StreamningContext context);

[VB] NotOverridable Public Sub GetObjectData(ByVal info As SerializationInfo, ByVal context As StreamingContext)

[JScript] public function GetObjectData(info: SerializationInfo, context: StreamingContext);

Description

Returns a SerializationInfo completely populated with all the data needed to reinstantiate the object at the other end of serialization. The object to be populated with serialization information. The destination context of the serialization.

RuntimeTypeHandle structure (System)

ToString

Description

The RuntimeTypeHandle is a handle to the internal metadata representation of a type.

Value

ToString

[C#] public IntPtr Value {get;}

[C++] public: _property IntPtr get_Value( );

[VB] Public ReadOnly Property Value As IntPtr

[JScript] public function get Value( ): IntPtr;

Description

The value of the handle.

GetObjectData

[C#] public void GetObjectData(SerializationInfo info, StreamingContext context);

[C++] public: _sealed void GetObjectData(SerializationInfo* info, StreamingContext context);

[VB] NotOverridable Public Sub GetObjectData(ByVal info As SerializationInfo, ByVal context As StreamingContext)

[JScript] public function GetObjectData(info: SerializationInfo, context: StreamingContext);

Description

Returns a SerializationInfo completely populated with all the data needed to reinstantiate the object at the other end of serialization. The object to be populated with serialization information. The destination context of the serialization.

SByte structure (System)

ToString

Description

Represents an 8-bit signed integer.

The SByte value type represents integers with values ranging from negative 128 to positive 127.

ToString

[C#] public const sbyte MaxValue;

[C++] public: const char MaxValue;

[VB] Public Const MaxValue As SByte

[JScript] public var MaxValue: SByte;

Description

A constant representing the largest possible value of SByte.

The value of this constant is 127; that is, hexadecimal 0x7F.

ToString

[C#] public const sbyte MinValue;

[C++] public: const char MinValue;

[VB] Public Const MinValue As SByte

[JScript] public var MinValue: SByte;

Description

A constant representing the smallest possible value of SByte.

The value of this constant is −128; that is, hexadecimal 0x80.

CompareTo

[C#] public int CompareTo(object obj);

[C++] public: _sealed int CompareTo(Object* obj);

[VB] NotOverridable Public Function CompareTo(ByVal obj As Object) As Integer

[JScript] public function CompareTo(obj: Object): int;

Description

Compares this instance to a specified object and returns an indication of their relative values.

Return Value: A signed number indicating the relative values of this instance and obj.

Any instance of SByte, regardless of its value, is considered greater than null. An object to compare, or null.

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Returns a value indicating whether this instance is equal to a specified object.

Return Value: true if obj is an instance of SByte and equals the value of this instance; otherwise, false. An object to compare with this instance.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for this instance.

Return Value: A 32-bit signed integer hash code.

GetTypeCode

[C#] public TypeCode GetTypeCode( );

[C++] public: __sealed TypeCode GetTypeCode( );

[VB] NotOverridable Public Function GetTypeCode( ) As TypeCode

[JScript] public function GetTypeCode( ): TypeCode;

Description

Returns the TypeCode for value type SByte

Return Value: The enumerated constant, System.TypeCode.SByte.

Parse

[C#] public static sbyte Parse(string s);

[C++] public: static char Parse(String* s);

[VB] Public Shared Function Parse(ByVal s As String) As SByte

[JScript] public static function Parse(s: String): SByte; Converts the String representation of a number to its 8-bit signed integer equivalent.

Description

Converts the String representation of a number to its 8-bit signed integer equivalent.

Return Value: An 8-bit signed integer equivalent to the number contained in s.

s contains a number of the form: [ws][sign]digits[ws] Items in square brackets ('[' and ']') are optional, and other items are as follows. A System.String containing a number to convert.

Parse

[C#] public static sbyte Parse(string s, IFormatProvider provider);

[C++] public: static char Parse(String* s, IFormatProvider* provider);

[VB] Public Shared Function Parse(ByVal s As String, ByVal provider As IFormatProvider) As SByte

[JScript] public static function Parse(s: String, provider: IFormatProvider) Byte;

Description

Converts the String representation of a number in a specified culture-specific format to its 8-bit signed integer equivalent.

Return Value: An 8-bit signed integer equivalent to the number specified in s.

s contains a number of the form: [ws][sign]digits[ws] Items in square brackets ('[' and ']') are optional, and other items are as follows. A System.String containing a number to convert. An System.IFormatProvider interface implementation which supplies culture-specific formatting information about s.

Parse

[C#] public static sbyte Parse(string s, NumberStyles style);

[C++] public: static char Parse(String* s, NumberStyles style);

[VB] Public Shared Function Parse(ByVal s As String, ByVal style As NumberStyles) As SByte

[JScript] public static function Parse(s: String, style: NumberStyles): SByte;

Description

Converts the String representation of a number in a specified style to its 8-bit signed integer equivalent.

Return Value: An 8-bit signed integer equivalent to the number specified in s.

s contains a number of the form: [ws][sign]digits[ws] Items in square brackets ('[' and ']') are optional, and other items are as follows. A System.String containing a number to convert. The combination of one or more System.Globalization.NumberStylesconstants that indicate the permitted format of s.

Parse

[C#] public static sbyte Parse(string s, NumberStyles style, IFormatProvider provider);

[C++] public: static char Parse(String* s, NumberStyles style, IFormatProvider* provider);

[VB] Public Shared Function Parse(ByVal s As String, ByVal style As NumberStyles, ByVal provider As IFormatProvider) As SByte

[JScript] public static function Parse(s: String, style: NumberStyles, provider: IFormatProvider): SByte;

Description

Converts the String representation of a number in a specified style and culture-specific format to its 8-bit signed integer equivalent.

Return Value: An 8-bit signed integer equivalent to the number specified in s.

s contains a number of the form: [ws][sign]digits[ws] Items in square brackets ('[' and ']') are optional, and other items are as follows. A System.String containing a number to convert. The combination of one or more System.Globalization.NumberStylesconstants that indicate the permitted format of s. An System.IFormatProvider interface implementation which supplies culture-specific formatting information about s.

IConvertible.ToBoolean

[C#] bool IConvertible.ToBoolean(IFormatProvider provider);

[C++] bool IConvertible::ToBoolean(IFormatProvider* provider);

[VB] Function ToBoolean(ByVal provider As IFormatProvider) As Boolean Implements IConvertible.ToBoolean

[JScript] function IConvertible.ToBoolean(provider: IFormatProvider): Boolean;

IConvertible.ToByte

[C#] byte IConvertible.ToByte(IFormatProvider provider);

[C++] unsigned char IConvertible::ToByte(IFormatProvider* provider);

[VB] Function ToByte(ByVal provider As IFormatProvider) As Byte Implements IConvertible.ToByte

[JScript] function IConvertible.ToByte(provider: IFormatProvider): Byte;

IConvertible.ToChar

[C#] char IConvertible.ToChar(IFormatProvider provider);

[C++] _wchar_t IConvertible::ToChar(IFormatProvider* provider);

[VB] Function ToChar(ByVal provider As IFormatProvider) As Char Implements IConvertible.ToChar

[JScript] function IConvertible.ToChar(provider: IFormatProvider): Char; IConvertible.ToDateTime

[C#] DateTime IConvertible.ToDateTime(IFormatProvider provider);

[C++] DateTime IConvertible::ToDateTime(IFormatProvider* provider);

[VB] Function ToDateTime(ByVal provider As IFormatProvider) As DateTime Implements IConvertible.ToDateTime

[JScript] function IConvertible.ToDateTime(provider: IFormatProvider): DateTime;

IConvertible.ToDecimal

[C#] decimal IConvertible.ToDecimal(IFormatProvider provider);

[C++] Decimal IConvertible::ToDecimal(IFormatProvider* provider);

[VB] Function ToDecimal(ByVal provider As IFormatProvider) As Decimal Implements IConvertible.ToDecimal

[JScript] function IConvertible.ToDecimal(provider: IFormatProvider): Decimal;

IConvertible.ToDouble

[C#] double IConvertible.ToDouble(IFormatProvider provider); [C++] double IConvertible::ToDouble(IFormatProvider* provider);

[VB] Function ToDouble(ByVal provider As IFormatProvider) As Double Implements IConvertible.ToDouble

[JScript] function IConvertible.ToDouble(provider: IFormatProvider): double;

IConvertible.ToInt16

[C#] short IConvertible.ToInt16(IFormatProvider provider);

[C++] short IConvertible::ToInt16(IFormatProvider* provider);

[VB] Function ToInt16(ByVal provider As IFormatProvider) As Short Implements IConvertible.ToInt16

[JScript] function IConvertible.ToInt16(provider: IFormatProvider): Int16;

IConvertible.ToInt32

[C#] int IConvertible.ToInt32(IFormatProvider provider);

[C++] int IConvertible::ToInt32(IFormatProvider* provider);

[VB] Function ToInt32(ByVal provider As IFormatProvider) As Integer Implements IConvertible.ToInt32

[JScript] function IConvertible.ToInt32(provider: IFormatProvider): int;

IConvertible.ToInt64

[C#] long IConvertible.ToInt64(IFormatProvider provider);

[C++] _int64 IConvertible::ToInt64(IFormatProvider* provider);

[VB] Function ToInt64(ByVal provider As IFormatProvider) As Long Implements IConvertible.ToInt64

[JScript] function IConvertible.ToInt64(provider: IFormatProvider): long;

IConvertible.ToSByte

[C#] sbyte IConvertible.ToSByte(IFormatProvider provider);

[C++] char IConvertible::ToSByte(IFormatProvider* provider);

[VB] Function ToSByte(ByVal provider As IFormatProvider) As SByte Implements IConvertible.ToSByte

[JScript] function IConvertible.ToSByte(provider: IFormatProvider): SByte;

IConvertible.ToSingle

[C#] float IConvertible.ToSingle(IFormatProvider provider);

[C++] float IConvertible::ToSingle(IFormatProvider* provider);

[VB] Function ToSingle(ByVal provider As IFormatProvider) As Single Implements IConvertible.ToSingle

[JScript] function IConvertible.ToSingle(provider: IFormatProvider): float;

IConvertible.ToType

[C#] object IConvertible.ToType(Type type, IFormatProvider provider);

[C++] Object* IConvertible::ToType(Type* type, IFormatProvider* provider);

[VB] Function ToType(ByVal type As Type, ByVal provider As IFormatProvider) As Object Implements IConvertible.ToType

[JScript] function IConvertible.ToType(type: Type, provider: IFormatProvider) Object;

IConvertible.ToUInt16

[C#] ushort IConvertible. ToUInt16(IFormatProvider provider);

[C++] unsigned short IConvertible::ToUInt16(IFormatProvider* provider);

[VB] Function ToUInt16(ByVal provider As IFormatProvider) As UInt16 Implements IConvertible.ToUInt16

[JScript] function IConvertible.ToUInt16(provider: IFormatProvider): UInt16; IConvertible.ToUInt32

[C#] uint IConvertible.ToUInt32(IFormatProvider provider);

[C++] unsigned int IConvertible::ToUInt32(IFormatProvider* provider);

[VB] Function ToUInt32(ByVal provider As IFormatProvider) As UInt32 Implements IConvertible.ToUInt32

[JScript] function IConvertible.ToUInt32(provider: IFormatProvider): UInt32;

IConvertible.ToUInt64

[C#] ulong IConvertible.ToUInt64(IFormatProvider provider);

[C++] unsigned _int64 IConvertible::ToUInt64(IFormatProvider* provider);

[VB] Function ToUInt64(ByVal provider As IFormatProvider) As UInt64 Implements IConvertible.ToUInt64

[JScript] function IConvertible.ToUInt64(provider: IFormatProvider): UInt64;

ToString

[C#] public override string ToString( );

[C++] public: String* ToString( );

[VB] Overrides Public Function ToString( ) As String
[JScript] public override function ToString( ): String; Converts the numeric value of this instance to its equivalent String representation.

Description

Converts the numeric value of this instance to its equivalent String representation.

Return Value: The System.String representation of the value of this instance, consisting of a negative sign if the value is negative, and a sequence of digits ranging from 0 to 9 with no leading zeroes.

The return value is formatted with the general format specifier ("G") and the System.Globalization.NumberFormatInfo for the current culture.

ToString

[C#] public string ToString(IFormatProvider provider);
[C++] public: _sealed String* ToString(IFormatProvider* provider);
[VB] NotOverridable Public Function ToString(ByVal provider As IFormatProvider) As String
[JScript] public function ToString(provider: IFormatProvider): String;

Description

Converts the numeric value of this instance to its equivalent String representation using the specified culture-specific format information.

Return Value: The System.String representation of the value of this instance as specified by provider.

This instance is formatted with the general format specifier ("G"). An System.IFormatProvider interface implementation which supplies culture-specific formatting information.

ToString

[C#] public string ToString(string format);
[C++] public: String* ToString(String* format);
[VB] Public Function ToString(ByVal format As String) As String
[JScript] public function ToString(format: String): String;

Description

Converts the numeric value of this instance to its equivalent String representation, using the specified format.

Return Value: The System.String representation of the value of this instance as specified by format.

If format is null or an empty string, the return value of this instance is formatted with the general format specifier ("G"). A format string.

ToString

[C#] public string ToString(string format, IFormatProvider provider);
[C++] public: _sealed String* ToString(String* format, IFormatProvider* provider);
[VB] NotOverridable Public Function ToString(ByVal format As String, ByVal provider As IFormatProvider) As String
[JScript] public function ToString(format: String, provider: IFormatProvider): String;

Description

Converts the numeric value of this instance to its equivalent String representation using the specified format and culture-specific format information.

Return Value: The System.String representation of the value of this instance as specified by format and provider.

If format is null or an empty string, the return value for this instance is formatted with the general format specifier ("G"). A format specification. An System.IFormatProvider interface implementation which supplies culture-specific formatting information.

SerializableAttribute class (System)

ToString

Description

Indicates that a class can be serialized. This class cannot be inherited.

Apply the System.SerializableAttribute attribute to a class to indicate it can be serialized. The common language runtime throws System.Runtime.Serialization.SerializationException if any class in the graph of objects being serialized does not have the System.SerializableAttribute attribute applied.

SerializableAttribute

Example Syntax:

ToString

[C#] public SerializableAttribute( );
[C++] public: SerializableAttribute( );
[VB] Public Sub New( )
[JScript] public function SerializableAttribute( );

Description

Initializes a new instance of the System.SerializableAttribute class.

TypeId

Single structure (System)

ToString

Description

Represents a single-precision floating point number.

The Single value type represents a single-precision 32-bit number with values ranging from negative 3.402823e38 to positive 3.402823e38, as well as positive or negative zero, System.Single.PositiveInfinity, System.Single.NegativeInfinity, and Not-a-Number (System.Single.NaN).

ToString

[C#] public const float Epsilon;
[C++] public: const float Epsilon;
[VB] Public Const Epsilon As Single
[JScript] public var Epsilon: float;

Description

A constant representing the smallest positive Single greater than zero.

The value of this constant is 1.4e-45.

ToString

[C#] public const float MaxValue;
[C++] public: const float MaxValue;
[VB] Public Const MaxValue As Single
[JScript] public var MaxValue: float;

Description

A constant representing the largest possible value of Single.

The value of this constant is positive 3.402823e38.

ToString

[C#] public const float MinValue;
[C++] public: const float MinValue;
[VB] Public Const MinValue As Single
[JScript] public var MinValue: float;

Description

A constant representing the smallest possible value of Single.

The value of this constant is negative 3.402823e38.

ToString

[C#] public const float NaN;
[C++] public: const float NaN;

[VB] Public Const NaN As Single
[JScript] public var NaN: float;

Description

A constant representing Not-a-Number (NaN).

The value of this constant is the result of dividing zero by zero.

ToString

[C#] public const float NegativeInfinity;
[C++] public: const float NegativeInfinity;
[VB] Public Const NegativeInfinity As Single
[JScript] public var NegativeInfinity: float;

Description

A constant representing negative infinity.

The value of this constant is the result of dividing a negative number by zero.

ToString

[C#] public const float PositiveInfinity;
[C++] public: const float PositiveInfinity;
[VB] Public Const PositiveInfinity As Single
[JScript] public var PositiveInfinity: float;

Description

A constant representing positive infinity.

The value of this constant is the result of dividing a positive number by zero.

CompareTo

[C#] public int CompareTo(object value);
[C++] public: _sealed int CompareTo(Object* value);
[VB] NotOverridable Public Function CompareTo(ByVal value As Object) As Integer
[JScript] public function CompareTo(value: Object): int;

Description

Compares this instance to a specified object and returns an indication of their relative values.

Return Value: A signed number indicating the relative values of this instance and value.

Any instance of Single, regardless of its value, is considered greater than null. An object to compare, or null.

Equals

[C#] public override bool Equals(object obj);
[C++] public: bool Equals(Object* obj);
[VB] Overrides Public Function Equals(ByVal obj As Object) As Boolean
[JScript] public override function Equals(obj: Object): Boolean;

Description

Returns a value indicating whether this instance is equal to a specified object.

Return Value: true if obj is an instance of Single and equals the value of this instance; otherwise, false. An object to compare with this instance.

GetHashCode

[C#] public override int GetHashCode( );
[C++] public: int GetHashCode( );
[VB] Overrides Public Function GetHashCode( ) As Integer
[JScript] public override function GetHashCode( ): int;

Description

Returns the hash code for this instance.

Return Value: A 32-bit signed integer hash code.

GetTypeCode

[C#] public TypeCode GetTypeCode( ));
[C++] public: _sealed TypeCode GetTypeCode( );
[VB] NotOverridable Public Function GetTypeCode( ) As TypeCode
[JScript] public function GetTypeCode( ): TypeCode;

Description

Returns the TypeCode for value type Single.

Return Value: The enumerated constant, System.TypeCode. Single.

IsInfinity

[C#] public static bool IsInfinity(float f);
[C++] public: static bool IsInfinity(float f);
[VB] Public Shared Function IsInfinity(ByVal f As Single) As Boolean
[JScript] public static function IsInfinity(f: float): Boolean;

Description

Returns a value indicating whether the specified number evaluates to either negative or positive infinity.

Return Value: true if f evaluates to negative or positive infinity; otherwise, false. A single-precision floating point number.

IsNaN

[C#] public static bool IsNaN(float f);
[C++] public: static bool IsNaN(float f);
[VB] Public Shared Function IsNaN(ByVal f As Single) As Boolean
[JScript] public static function IsNaN(f: float): Boolean;

Description

Returns a value indicating whether the specified number evaluates to Not-a-Number (NaN).

Return Value: true if f evaluates to NaN; otherwise, false. A single-precision floating point number.

IsNegativeInfinity

[C#] public static bool IsNegativeInfinity(float f);
[C++] public: static bool IsNegativeInfinity(float f);
[VB] Public Shared Function IsNegativeInfinity(ByVal f As Single) As Boolean
[JScript] public static function IsNegativeInfinity(f: float): Boolean;

Description

Returns a value indicating whether the specified number evaluates to negative infinity.

Return Value: true if f evaluates to negative infinity; otherwise, false. A single-precision floating point number.

IsPositiveInfinity

[C#] public static bool IsPositiveInfinity(float f);
[C++] public: static bool IsPositiveInfinity(float f);
[VB] Public Shared Function IsPositiveInfinity(ByVal f As Single) As Boolean
[JScript] public static function IsPositiveInfinity(f: float): Boolean;

Description

Returns a value indicating whether the specified number evaluates to

Return Value: true if f evaluates to positive infinity; otherwise, false. A single-precision floating point number.

Parse

[C#] public static float Parse(string s);
[C++] public: static float Parse(String* s);
[VB] Public Shared Function Parse(ByVal s As String) As Single
[JScript] public static function Parse(s: String): float; Converts the String representation of a number to its single-precision floating point number equivalent.

Description

Converts the String representation of a number to its single-precision floating point number equivalent.

Return Value: A single-precision floating point number equivalent to the numeric value or symbol specified in s.

s can contain System.Globalization.NumberFormatInfo.PositiveInfInitySymbol, System.Globalization.NumberFormatInfo.NegativeInfinitySymbol, System.Globalization.NumberFormatInfo.NaNSymbol, or a string of the form: [ws][sign]integral-digits[.[fractional-digits]][e[sign] exponential-digits][ws] Optional items are framed in square brackets ('[' and ']'). Items containing the term "digits" consist of a series of numeric characters ranging from 0 to 9. A System.String containing a number to convert.

Parse

[C#] public static float Parse(string s, IFormatProvider provider);

[C++] public: static float Parse(String* s, IFormatProvider* provider);

[VB] Public Shared Function Parse(ByVal s As String, ByVal provider As IFormatProvider) As Single

[JScript] public static function Parse(s: String, provider: IFormatProvider): float;

Description

Converts the String representation of a number in a specified culture-specific format to its single-precision floating point number equivalent.

Return Value: A single-precision floating point number equivalent to the numeric value or symbol specified in s.

s can contain System.Globalization.NumberFormatInfo.PositiveInfinitySymbol, System.Globalization.NumberFormatInfo.NegativeInfinitySymbol, System.Globalization.NumberFormatInfo.NaNSymbol, or a string of the form: [ws][sign]integral-digits[.[fractional-digits]][e[sign] exponential-digits][ws] Optional items are framed in square brackets ('[' and ']'). Items containing the term "digits" consist of a series of numeric characters ranging from 0 to 9. A System.String containing a number to convert. An System.IFormatProvider interface implementation which supplies culture-specific formatting information about s.

Parse

[C#] public static float Parse(string s, NumberStyles style);

[C++] public: static float Parse(String* s, NumberStyles style);

[VB] Public Shared Function Parse(ByVal s As String, ByVal style As NumberStyles) As Single

[JScript] public static function Parse(s: String, style: NumberStyles): float;

Description

Converts the String representation of a number in a specified style to its single-precision floating point number equivalent.

Return Value: A single-precision floating point number equivalent to the numeric value or symbol specified in s.

s can contain System.Globalization.NumberFormatInfo.PositiveInfinitySymbol, System.Globalization.NumberFormatInfo.NegativeInfinitySymbol, System.Globalization.NumberFormatInfo.NaNSymbol, or a string of the form:

[ws][sign]integral-digits [[fractional-digits]][e [sign] exponential-digits][ws] Optional items are framed in square brackets ('[' and ']'). Items containing the term "digits" consist of a series of numeric characters ranging from 0 to 9. A System.String containing a number to convert. The combination of one or more System.Globalization.NumberStylesconstants that indicate the permitted format of s.

Parse

[C#] public static float Parse(string s, NumberStyles style, IFormatProvider provider);

[C++] public: static float Parse(String* s, NumberStyles style, IFormatProvider* provider);

[VB] Public Shared Function Parse(ByVal s As String, ByVal style As NumberStyles, ByVal provider As IFormatProvider) As Single

[JScript] public static function Parse(s: String, style: NumberStyles, provider: IFormatProvider): float;

Description

Converts the String representation of a number in a specified style and culture-specific format to its single-precision floating point number equivalent.

Return Value: A single-precision floating point number equivalent to the numeric value or symbol specified in s.

s can contain System.Globalization.NumberFormatInfo.PositiveInfinitySymbol, System.Globalization.NumberFormatInfo.NegativeInfinitySymbol, System.Globalization.NumberFormatInfo.NaNSymbol, or a string of the form: [ws][sign]integral-digits [.[fractional-digits]][e[sign] exponential-digits][ws] Optional items are framed in square brackets ('[' and ']'). Items containing the term "digits" consist of a series of numeric characters ranging from 0 to 9. A System.String containing a number to convert. The combination of one or more System.Globalization.NumberStylesconstants that indicate the permitted format of s. An System.IFormatProvider interface implementation which supplies culture-specific formatting information about s.

IConvertible.ToBoolean

[C#] bool IConvertible.ToBoolean(IFormatProvider provider);

[C++] bool IConvertible::ToBoolean(IFormatProvider* provider);

[VB] Function ToBoolean(ByVal provider As IFormatProvider) As Boolean Implements IConvertible.ToBoolean

[JScript] function IConvertible.ToBoolean(provider: IFormatProvider): Boolean;

IConvertible.ToByte

[C#] byte IConvertible.ToByte(IFormatProvider provider);

[C++] unsigned char IConvertible::ToByte(IFormatProvider* provider);

[VB] Function ToByte(ByVal provider As IFormatProvider) As Byte Implements IConvertible.ToByte

[JScript] function IConvertible.ToByte(provider: IFormatProvider): Byte; IConvertible.ToChar

[C#] char IConvertible.ToChar(IFormatProvider provider);

[C++] _wchar_t IConvertible::ToChar(IFormatProvider* provider);

[VB] Function ToChar(ByVal provider As IFormatProvider) As Char Implements IConvertible.ToChar

[JScript] function IConvertible.ToChar(provider: IFormatProvider): Char;

IConvertible.ToDateTime

[C#] DateTime IConvertible.ToDateTime(IFormatProvider provider);

[C++] DateTime IConvertible::ToDateTime(IFormatProvider* provider);

[VB] Function ToDateTime(ByVal provider As IFormatProvider) As DateTime Implements IConvertible.ToDateTime

[JScript] function IConvertible.ToDateTime(provider: IFormatProvider): DateTime;

IConvertible.ToDecimal

[C#] decimal IConvertible.ToDecimal(IFormatProvider provider);

[C++] Decimal IConvertible::ToDecimal(IFormatProvider* provider);

[VB] Function ToDecimal(ByVal provider As IFormatProvider) As Decimal Implements IConvertible.ToDecimal

[JScript] function IConvertible.ToDecimal(provider: IFormatProvider): Decimal;

IConvertible.ToDouble

[C#] double IConvertible.ToDouble(IFormatProvider provider);

[C++] double IConvertible::ToDouble(IFormatProvider* provider);

[VB] Function ToDouble(ByVal provider As IFormatProvider) As Double Implements IConvertible.ToDouble

[JScript] function IConvertible.ToDouble(provider: IFormatProvider): double;

IConvertible.ToInt16

[C#] short IConvertible.ToInt16(IFormatProvider provider);

[C++] short IConvertible::ToInt16(IFormatProvider* provider);

[VB] Function ToInt16(ByVal provider As IFormatProvider) As Short Implements IConvertible.ToInt16

[JScript] function IConvertible.ToInt16(provider: IFormatProvider): Int16;

IConvertible.ToInt32

[C#] it IConvertible.ToInt32(IFormatProvider provider);

[C++] int IConvertible::ToInt32(IFormatProvider* provider);

[VB] Function ToInt32(ByVal provider As IFormatProvider) As Integer Implements IConvertible.ToInt32

[JScript] function IConvertible.ToInt32(provider: IFormatProvider): int;

IConvertible.ToInt64

[C#] long IConvertible.ToInt64(IFormatProvider provider);

[C++] _int64 IConvertible::ToInt64(IFormatProvider* provider);

[VB] Function ToInt64(ByVal provider As IFormatProvider) As Long Implements IConvertible.ToInt64

[JScript] function IConvertible.ToInt64(provider: IFormatProvider): long;

IConvertible.ToSByte

[C#] sbyte IConvertible.ToSByte(IFormatProvider provider);

[C++] char IConvertible::ToSByte(IFormatProvider* provider);

[VB] Function ToSByte(ByVal provider As IFormatProvider) As SByte Implements IConvertible.ToSByte

[JScript] function IConvertible.ToSByte(provider: IFormatProvider): SByte;

IConvertible.ToSingle

[C#] float IConvertible.ToSingle(IFormatProvider provider);

[C++] float IConvertible::ToSingle(IFormatProvider* provider);

[VB] Function ToSingle(ByVal provider As IFormatProvider) As Single Implements IConvertible.ToSingle

[JScript] function IConvertible.ToSingle(provider: IFormatProvider): float;

IConvertible.ToType

[C#] object IConvertible.ToType(Type type, IFormatProvider provider);

[C++] Object* IConvertible::ToType(Type* type, IFormatProvider* provider);

[VB] Function ToType(ByVal type As Type, ByVal provider As IFormatProvider) As Object Implements IConvertible.ToType

[JScript] function IConvertible.ToType(type: Type, provider: IFormatProvider): Object;

IConvertible.ToUInt16

[C#] ushort IConvertible.ToUInt16(IFormatProvider provider);

[C++] unsigned short IConvertible::ToUInt16(IFormatProvider* provider);

[VB] Function ToUInt16(ByVal provider As IFormatProvider) As UInt16 Implements IConvertible.ToUInt16

[JScript] function IConvertible.ToUInt16(provider: IFormatProvider): UInt16;

IConvertible.ToUInt32

[C#] uint IConvertible.ToUInt32(IFormatProvider provider);

[C++] unsigned int IConvertible::ToUInt32(IFormatProvider* provider);

[VB] Function ToUInt32(ByVal provider As IFormatProvider) As UInt32 Implements IConvertible.ToUInt32

[JScript] function IConvertible.ToUInt32(provider: IFormatProvider): UInt32;

IConvertible.ToUInt64

[C#] ulong IConvertible.ToUInt64(IFormatProvider provider);

[C++] unsigned int64 IConvertible::ToUInt64(IFormatProvider* provider);

[VB] Function ToUInt64(ByVal provider As IFormatProvider) As UInt64 Implements IConvertible.ToUInt64

[JScript] function IConvertible.ToUInt64(provider: IFormatProvider): UInt64;

ToString

[C#] public override string ToString( );

[C++] public: String* ToString( );

[VB] Overrides Public Function ToString( ) As String

[JScript] public override function ToString( ): String; Converts the numeric value of this instance to its equivalent String representation.

Description

Converts the numeric value of this instance to its equivalent String representation.

Return Value: The System.String representation of the value of this instance.

The return value can be System.Globalization.NumberFormatInfo.PositiveInfinitySymbol, System.Globalization.NumberFormatInfo.NegativeInfinitySymbol, System.Globalization.NumberFormatInfo.NaNSymbol, or a string of the form: [sign]integral-digits[.[fractional-digits]] [e[sign]exponential-digits] Optional items are framed in square brackets ('[' and ']'). Items containing the term "digits" consist of a series of numeric characters ranging from 0 to 9.

ToString

[C#] public string ToString(IFormatProvider provider);

[C++] public: _sealed String* ToString(IFormatProvider* provider);

[VB] NotOverridable Public Function ToString(ByVal provider As IFormatProvider) As String

[JScript] public function ToString(provider: IFormatProvider): String;

Description

Converts the numeric value of this instance to its equivalent String representation using the specified culture-specific format information.

Return Value: The System.String representation of the value of this instance as specified by provider.

The return value can be System.Globalization.NumberFormatInfo.PositiveInfinitySymbol, System.Globalization.NumberFormatInfo.NegativeInfinitySymbol, System.Globalization.NumberFormatInfo.NaNSymbol, or a string of the form: [sign]integral-digits[.[fractional-digits]] [e[sign]exponential-digits] Optional items are framed in square brackets ('[' and ']'). Items containing the term "digits" consist of a series of numeric characters ranging from 0 to 9. An System.IFormatProvider interface implementation which supplies culture-specific formatting information.

ToString

[C#] public string ToString(string format);

[C++] public: String* ToString(String* format);

[VB] Public Function ToString(ByVal format As String) As String

[JScript] public function ToString(format: String): String;

Description

Converts the numeric value of this instance to its equivalent String representation, using the specified format.

Return Value: The System.String representation of the value of this instance as specified by format.

The return value can be System.Globalization.NumberFormatInfo.PositiveInfinitySymbol, System.Globalization.NumberFormatInfo.NegativeInfinitySymbol, System.Globalization.NumberFormatInfo.NaNSymbol, or a string of the form: [sign]integral-digits[. [fractional-digits]] [e[sign]exponential-digits] Optional items are framed in square brackets ('[' and ']'). Items containing the term "digits" consist of a series of numeric characters ranging from 0 to 9. A format string.

ToString

[C#] public string ToString(string format, IFormatProvider provider);

[C++] public: _sealed String* ToString(String* format, IFormatProvider* provider);

[VB] NotOverridable Public Function ToString(ByVal format As String, ByVal provider As IFormatProvider) As String

[JScript] public function ToString(format: String, provider: IFormatProvider): String;

Description

Converts the numeric value of this instance to its equivalent String representation using the specified format and culture-specific format information.

Return Value: The System.String representation of the value of this instance as specified by format and provider.

The return value can be System.Globalization.NumberFormatInfo.PositiveInfinitySymbol, System.Globalization.NumberFormatInfo.NegativeInfinitySymbol, System.Globalization.NumberFormatInfo.NaNSymbol, or a string of the form: [sign] integral-digits [[fractional-digits]] [e [sign] exponential-digits] Optional items are framed in square brackets ('[' and ']'). Items containing the term "digits" consist of a series of numeric characters ranging from 0 to 9. A format specification. An System.IFormatProvider interface implementation which supplies culture-specific formatting information.

Environment.SpecialFolder enumeration (System)

ToString

Description

Specifies enumerated constants used to retrieve directory paths to system special folders.

The System.Environment.SpecialFolder.System method uses these enumerated constants to indicate the special folder path to retrieve.

ToString

[C#] public const Environment.SpecialFolder ApplicationData;

[C++] public: const Environment.SpecialFolder ApplicationData;

[VB] Public Const ApplicationData As Environment.SpecialFolder

[JScript] public var ApplicationData: Environment.SpecialFolder;

Description

The directory that serves as a common repository for application-specific data for the current, roaming user.

ToString

[C#] public const Environment.SpecialFolder CommonApplicationData;

[C++] public: const Environment.SpecialFolder CommonApplicationData;

[VB] Public Const CommonApplicationData As Environment.SpecialFolder

[JScript] public var CommonApplicationData: Environment.SpecialFolder;

Description

The directory that serves as a common repository for application-specific data that is used by all users.

ToString

[C#] public const Environment.SpecialFolder CommonProgramFiles;

[C++] public: const Environment. SpecialFolder CommonProgramFiles;

[VB] Public Const CommonProgramFiles As Environment.SpecialFolder

[JScript] public var CommonProgramFiles: Environment.SpecialFolder;

Description

The directory for components that are shared across applications.

ToString

[C#] public const Environment.SpecialFolder Cookies;

[C++] public: const Environment.SpecialFolder Cookies;

[VB] Public Const Cookies As Environment.SpecialFolder

[JScript] public var Cookies: Environment.SpecialFolder;

Description

The directory that serves as a common repository for Internet cookies.

ToString

[C#] public const Environment.SpecialFolder DesktopDirectory;

[C++] public: const Environment.SpecialFolder DesktopDirectory;

[VB] Public Const DesktopDirectory As Environment.SpecialFolder

[JScript] public var DesktopDirectory: Environment.SpecialFolder;

Description

The directory used to physically store file objects on the desktop.

ToString

[C#] public const Environment.SpecialFolder Favorites;

[C++] public: const Environment.SpecialFolder Favorites;

[VB] Public Const Favorites As Environment.SpecialFolder

[JScript] public var Favorites: Environment.SpecialFolder;

Description

The directory that serves as a common repository for the user's favorite items.

ToString

[C#] public const Environment.SpecialFolder History;

[C++] public: const Environment.SpecialFolder History;

[VB] Public Const History As Environment.SpecialFolder

[JScript] public var History: Environment.SpecialFolder;

Description

The directory that serves as a common repository for Internet history items.

ToString

[C#] public const Environment.SpecialFolder InternetCache;

[C++] public: const Environment.SpecialFolder InternetCache;

[VB] Public Const InternetCache As Environment.SpecialFolder

[JScript] public var InternetCache: Environment.SpecialFolder;

Description

The directory that serves as a common repository for temporary Internet files.

ToString

[C#] public const Environment.SpecialFolder LocalApplicationData;

[C++] public: const Environment.SpecialFolder LocalApplicationData;

[VB] Public Const LocalApplicationData As Environment.SpecialFolder

[JScript] public var LocalApplicationData: Environment.SpecialFolder;

Description

The directory that serves as a common repository for application-specific data that is used by the current, non-roaming user.

ToString

[C#] public const Environment.SpecialFolder Personal;

[C++] public: const Environment.SpecialFolder Personal;

[VB] Public Const Personal As Environment.SpecialFolder

[JScript] public var Personal: Environment.SpecialFolder;

Description

The directory that serves as a common repository for documents.

ToString

[C#] public const Environment.SpecialFolder ProgramFiles;

[C++] public: const Environment.SpecialFolder ProgramFiles;

[VB] Public Const ProgramFiles As Environment.SpecialFolder

[JScript] public var ProgramFiles: Environment.SpecialFolder;

Description

The program files directory.

ToString

[C#] public const Environment.SpecialFolder Programs;

[C++] public: const Environment.SpecialFolder Programs;

[VB] Public Const Programs As Environment.SpecialFolder

[JScript] public var Programs: Environment.SpecialFolder;

Description

The directory that contains the user's program groups.

ToString

[C#] public const Environment.SpecialFolder Recent;

[C++] public: const Environment.SpecialFolder Recent;

[VB] Public Const Recent As Environment.SpecialFolder

[JScript] public var Recent: Environment. SpecialFolder;

Description

The directory that contains the user's most recently used documents.

ToString

[C#] public const Environment.SpecialFolder SendTo;

[C++] public: const Environment.SpecialFolder SendTo;

[VB] Public Const SendTo As Environment.SpecialFolder

[JScript] public var SendTo: Environment.SpecialFolder;

Description

The directory that contains Send To menu items.

ToString

[C#] public const Environment.SpecialFolder StartMenu;

[C++] public: const Environment.SpecialFolder StartMenu;

[VB] Public Const StartMenu As Environment.SpecialFolder

[JScript] public var StartMenu: Environment.SpecialFolder;

Description

The directory that contains the Start menu items.

ToString

[C#] public const Environment.SpecialFolder Startup;

[C++] public: const Environment.SpecialFolder Startup;

[VB] Public Const Startup As Environment.SpecialFolder

[JScript] public var Startup: Environment.SpecialFolder;

Description

The directory that corresponds to the user's Startup program group.

ToString

[C#] public const Environment.SpecialFolder System;

[C++] public: const Environment.SpecialFolder System;

[VB] Public Const System As Environment.SpecialFolder

[JScript] public var System: Environment.SpecialFolder;

Description

The System directory.

ToString

[C#] public const Environment.SpecialFolder Templates;

[C++] public: const Environment.SpecialFolder Templates;

[VB] Public Const Templates As Environment.SpecialFolder

[JScript] public var Templates: Environment.SpecialFolder;

Description

The directory that serves as a common repository for document templates. StackOverflowException class (System)

ToString

Description

The exception that is thrown when the execution stack overflows by having too many pending method calls. This class cannot be inherited.

System.StackOverflowException is thrown for execution stack overflow errors, typically in case of a very deep or unbounded recursion.

StackOverflowException

Example Syntax:

ToString

[C#] public StackOverflowException( );

[C++] public: StackOverflowException( );

[VB] Public Sub New( )

[JScript] public function StackOverflowException( ); Initializes a new instance of the System.StackOverflowException class.

Description

Initializes a new instance of the System.StackOverflowException class with default properties.

The following table shows the initial property values for an instance of System.StackOverflowException.

StackOverflowException

Example Syntax:

ToString

[C#] public StackOverflowException(string message);

[C++] public: StackOverflowException(String* message);

[VB] Public Sub New(ByVal message As String)

[JScript] public function StackOverflowException(message: String);

Description

Initializes a new instance of the System.StackOverflowException class with a specified error message.

The following table shows the initial property values for an instance of System.StackOverflowException. The error message that explains the reason for the exception.

StackOverflowException

Example Syntax:

ToString

[C#] public StackOverflowException(string message, Exception innerException);

[C++] public: StackOverflowException(String* message, Exception* innerException);

[VB] Public Sub New(ByVal message As String, ByVal innerException As Exception)

[JScript] public function StackOverflowException(message: String, innerException: Exception);

Description

Initializes a new instance of the System.StackOverflowException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If innerException is non-null, then the current Exception is raised in a catch block handling innerException.

HelpLink

HResult

InnerException

Message

Source

StackTrace

TargetSite

STAThreadAttribute class (System)

ToString

Description

Indicates the default threading model for an application is single-threaded apartment.

Only apply this attribute to the main method of an application.

STAThreadAttribute

Example Syntax:

ToString

[C#] public STAThreadAttribute( );

[C++] public: STAThreadAttribute( );

[VB] Public Sub New( )

[JScript] public function STAThreadAttribute( );

Description

Initializes a new instance of the System.STAThreadAttribute class.

TypeId

String class (System)

ToString

Description

Represents an immutable string of characters.

An instance of String is said to be "immutable" because its value cannot be modified once it has been created. Methods that appear to modify a String instance actually return a new instance containing the modification. Use the System.Text.StringBuilder class if it is necessary to actually modify the contents of a string-like object.

ToString

[C#] public static readonly string Empty;

[C++] public: static String* Empty;

[VB] Public Shared ReadOnly Empty As String

[JScript] public static var Empty: String;

Description

A read-only field that represents the empty string.

The value of this field is the string, "".

String

Example Syntax:

ToString

[C#] unsafe public String(char* value);

[C++] public: String(_wchar_t* value); Initializes a new instance of the String class.

Description

Initializes a new instance of the String class to the value indicated by a specified pointer to an array of Unicode characters.

If value is a null pointer, an System.String.Empty instance is initialized. A pointer to an array of Unicode characters.

String

Example Syntax:

ToString

[C#] public String(char[ ] value);

[C++] public: String(_wchar_t value _gc[ ]);

[VB] Public Sub New(ByVal value( ) As Char)

[JScript] public function String(value: Char[ ]);

Description

Initializes a new instance of the String class to the value indicated by an array of Unicode characters. An array of Unicode characters.

String

Example Syntax:

ToString

[C#] unsafe public String(sbyte* value);

[C++] public: String(char* value);

Description

Initializes a new instance of the String class to the value indicated by a pointer to an array of 8-bit signed integers.

If value is a null pointer, an System.String.Empty instance is initialized. A pointer to an array of 8-bit signed integers.

String

Example Syntax:

ToString

[C#] public String(char c, int count);

[C++] public: String(_wchar_t c, int count);

[VB] Public Sub New(ByVal c As Char, ByVal count As Integer)

[JScript] public function String(c: Char, count: int);

Description

Initializes a new instance of the String class to the value indicated by a specified Unicode character repeated a specified number of times. A Unicode character. The number of times c occurs.

String

Example Syntax:

ToString

[C#] unsafe public String(char* value, int startIndex, int length);

[C++] public: String(_wchar_t* value, int startIndex, int length);

Description

Initializes a new instance of the String class to the value indicated by a specified pointer to an array of Unicode characters, a starting character position within that array, and a length.

If value is a null pointer, an System.String.Empty instance is initialized. A pointer to an array of Unicode characters. The starting position within value. The number of characters within value to use.

String

Example Syntax:

ToString

[C#] public String(char[ ] value, int startIndex, int length);

[C++] public: String(_wchar_t value _gc[ ], it startIndex, int length);

[VB] Public Sub New(ByVal value( ) As Char, ByVal startIndex As Integer, ByVal length As Integer)

[JScript] public function String(value: Char[ ], startIndex: int, length: int);

Description

Initializes a new instance of the String class to the value indicated by an array of Unicode characters, a starting character position within that array, and a length.

If value is null, an System.String.Empty instance is initialized. An array of Unicode characters. The starting position within value. The number of characters within value to use.

String

Example Syntax:

ToString

[C#] unsafe public String(sbyte* value, int startIndex, int length);

[C++] public: String(char* value, int startIndex, int length);

Description

Initializes a new instance of the String class to the value indicated by a specified pointer to an array of 8-bit signed integers, a starting character position within that array, and a length.

If value is a null pointer, an System.String.Empty instance is initialized. A pointer to an array of 8-bit signed integers. The starting position within value. The number of characters within value to use.

String

Example Syntax:

ToString

[C#] unsafe public String(sbyte* value, int startIndex, int length, Encoding enc);

[C++] public: String(char* value, int startIndex, int length, Encoding* enc);

Description

Initializes a new instance of the String class to the value indicated by a specified pointer to an array of 8-bit signed integers, a starting character position within that array, a length, and an Encoding object.

If value is a null pointer, an System.String.Empty instance is initialized. A pointer to an array of 8-bit signed integers. The starting position within value. The number of characters within value to use. An System.Text.Encoding object that specifies how the array referenced by value is encoded.

Chars

ToString

[C#] public char this[int index] {get;}

[C++] public: _property _wchar_t get_Chars(int index);

[VB] Public Default ReadOnly Property Chars(ByVal index As Integer) As Char

[JScript] returnValue=StringObject.Chars(index);

Description

Gets the character at a specified character position in this instance.

index is zero-based. A character position in this instance.

Length

ToString

[C#] public int Length {get;}

[C++] public: _property int get_Length( );

[VB] Public ReadOnly Property Length As Integer

[JScript] public function get Length( ): int;

Description

Gets the number of characters in this instance.

Clone

[C#] public object Clone( );

[C++] public: _sealed Object* Clone( );

[VB] NotOverridable Public Function Clone( ) As Object

[JScript] public function Clone( ): Object;

Description

Returns a reference to this instance of String.

Return Value: This instance of String.

The return value is not an independent copy of this instance; it is simply another view of the same data. Use the System.String.Copy(System.String) or System.String.CopyTo(System.Int32,System.Char[ ],System.Int32, System.Int32) method to create a separate String object with the same value as this instance.

Compare

[C#] public static int Compare(string strA, string strB);

[C++] public: static int Compare(String* strA, String* strB);

[VB] Public Shared Function Compare(ByVal strA As String, ByVal strB As String) As Integer

[JScript] public static function Compare(strA: String, strB: String): int; Compares two specified String objects.

Description

Compares two specified String objects.

Return Value: A 32-bit signed integer indicating the lexical relationship between the two comparands.

By definition, any String, including the empty string, compares greater than a null reference; and two null references compare equal to each other. The first String. The second String.

Compare

[C#] public static int Compare(string strA, string strB, bool ignoreCase);

[C++] public: static int Compare(String* strA, String* strB, bool ignoreCase);

[VB] Public Shared Function Compare(ByVal strA As String, ByVal strB As String, ByVal ignoreCase As Boolean) As Integer

[JScript] public static function Compare(strA: String, strB: String, ignoreCase: Boolean): int;

Description

Compares two specified String objects, ignoring or honoring their case.

Return Value: A 32-bit signed integer indicating the lexical relationship between the two comparands.

By definition, any String, including the empty string, compares greater than a null reference; and two null references compare equal to each other. The first String. The second String. A System.Boolean indicating a case-sensitive or insensitive comparison. (true indicates a case-insensitive comparison.)

Compare

[C#] public static int Compare(string strA, string strB, bool ignoreCase, CultureInfo culture);

[C++] public: static int Compare(String* strA, String* strB, bool ignoreCase, CultureInfo* culture);

[VB] Public Shared Function Compare(ByVal strA As String, ByVal strB As String, ByVal ignoreCase As Boolean, ByVal culture As CultureInfo) As Integer

[JScript] public static function Compare(strA: String, strB: String, ignoreCase Boolean, culture: CultureInfo): int;

Description

Compares two specified String objects, ignoring or honoring their case, and honoring culture-specific information about their formatting.

Return Value: A 32-bit signed integer indicating the lexical relationship between the two comparands.

culture specifies a System.Globalization.CultureInfo object, which provides culture-specific information that can affect the comparison. The first String. The second String. A System.Boolean indicating a case-sensitive or insensitive comparison. (true indicates a case-insensitive comparison.) A System.Globalization.CultureInfo object that supplies culture-specific formatting information.

Compare

[C#] public static int Compare(string strA, int indexA, string strB, int indexB, int length);

[C++] public: static int Compare(String* strA, int indexA, String* strB, int indexB, int length);

[VB] Public Shared Function Compare(ByVal strA As String, ByVal indexA As Integer, ByVal strB As String, ByVal indexB As Integer, ByVal length As Integer) As Integer

[JScript] public static function Compare(strA: String, indexA: int, strB: String, indexB: int, length: int): int;

Description

Compares substrings of two specified String objects.

Return Value: A 32-bit signed integer indicating the lexical relationship between the two comparands.

length cannot be negative. If length is zero, then zero is returned. The first String. The position of the substring within strA. The second String. The position of the substring within strB. The maximum number of characters in the substrings to compare.

Compare

[C#] public static int Compare(string strA, int indexA, string strB, int indexB, int length, bool ignoreCase);

[C++] public: static int Compare(String* strA, int indexA, String* strB, int indexB, int length, bool ignoreCase);

[VB] Public Shared Function Compare(ByVal strA As String, ByVal indexA As Integer, ByVal strB As String, ByVal indexB As Integer, ByVal length As Integer, ByVal ignoreCase As Boolean) As Integer

[JScript] public static function Compare(strA: String, indexA: int, strB: String, indexB: int, length: int, ignoreCase: Boolean): int;

Description

Compares substrings of two specified String objects, ignoring or honoring their case.

Return Value: A 32-bit signed integer indicating the lexical relationship between the two comparands.

indexA and indexB are zero-based. The first String. The position of the substring within strA. The second String. The position of the substring within strB. The maximum number of characters in the substrings to compare. A System.Boolean indicating a case-sensitive or insensitive comparison. (true indicates a case-insensitive comparison.)

Compare

[C#] public static int Compare(string strA, int indexA, string strB, int indexB, int length, bool ignoreCase, CultureInfo culture);

[C++] public: static int Compare(String* strA, int indexA, String* strB, int indexB, int length, bool ignoreCase, CultureInfo* culture);

[VB] Public Shared Function Compare(ByVal strA As String, ByVal indexA As Integer, ByVal strB As String, ByVal indexB As Integer, ByVal length As Integer, ByVal ignoreCase As Boolean, ByVal culture As CultureInfo) As Integer

[JScript] public static function Compare(strA: String, indexA: int, strB: String, indexB: int, length: int, ignoreCase: Boolean, culture: CultureInfo): int;

Description

Compares substrings of two specified String objects, ignoring or honoring their case, and honoring culture-specific information about their formatting.

Return Value: An integer indicating the lexical relationship between the two comparands.

culture specifies a System.Globalization.CultureInfo object, which provides culture-specific information that can affect the comparison. The first String. The position of the substring within strA. The second String. The position of the substring within the strB. The maximum number of characters in the substrings to compare. A System.Boolean indicating a case-sensitive or insensitive comparison. (true indicates a case-insensitive comparison.) A System.Globalization.CultureInfo object that supplies culture-specific formatting information.

CompareOrdinal

[C·] public static int CompareOrdinal(string strA, string strB);

[C++] public: static int CompareOrdinal(String* strA, String* strB);

[VB] Public Shared Function CompareOrdinal(ByVal strA As String, ByVal strB String) As Integer

[JScript] public static function CompareOrdinal(strA: String, strB: String): int; Compares two String objects, without considering the local national language or culture.

Description

Compares two specified String objects, without considering the local national language or culture.

Return Value: An integer indicating the lexical relationship between the two comparands.

By definition, any String, including the empty string, compares greater than a null reference; and two null references compare equal to each other. The first String. The second String.

CompareOrdinal

[C#] public static int CompareOrdinal(string strA, int indexA, string strB, int indexB, int length);

[C++] public: static int CompareOrdinal(String* strA, int indexA, String* strB, int indexB, int length);

[VB] Public Shared Function CompareOrdinal(ByVal strA As String, ByVal indexA As Integer, ByVal strB As String, ByVal indexB As Integer, ByVal length As Integer) As Integer

[JScript] public static function CompareOrdinal(strA: String, indexA: int, strB String, indexB: int, length: int): int;

Description

Compares substrings of two specified String objects, without considering the local national language or culture. Parameters specify the length and starting positions of the substrings.

Return Value: A 32-bit signed integer indicating the lexical relationship between the two comparands.

By definition, any String, including the empty string, compares greater than a null reference; and two null references compare equal to each other. The first String. The starting index of the substring in strA. The second String. The starting index of the substring in strB. The maximum number of characters in the substrings to compare.

CompareTo

[C#] public int CompareTo(object value);

[C++] public: _sealed int CompareTo(Object* value);

[VB] NotOverridable Public Function CompareTo(ByVal value As Object) As Integer

[JScript] public function CompareTo(value: Object): int; Compares this instance with a specified object.

Description

Compares this instance with a specified Object.

Return Value: A 32-bit signed integer indicating the lexical relationship between the two comparands.

value must be a String object. An System.Object that evaluates to a Sting.

CompareTo

[C#] public int CompareTo(string strB);

[C++] public: int CompareTo(String* strB);

[VB] Public Function CompareTo(ByVal strB As String) As Integer

[JScript] public function CompareTo(strB: String): int;

Description

Compares this instance with a specified String object.

Return Value: A 32-bit signed integer indicating the lexical relationship between the two comparands.

By definition, any String, including the empty string, compares greater than a null reference; and two null references compare equal to each other. A String.

Concat

[C#] public static string Concat(object arg0);

[C++] public: static String* Concat(Object* arg0);

[VB] Public Shared Function Concat(ByVal arg0 As Object) As String

[JScript] public static function Concat(arg0: Object): String; Concatenates one or more instances of String, or the String representations of the values of one or more instances of Object.

Description

Creates the String representation of a specified object.

Return Value: The String representation of the value of arg0.

An System.String.Empty string is used in place of any null argument. An System.Object or null.

Concat

[C#] public static string Concat(params object[ ] args);

[C++] public: static String* Concat(Object* args _gc[ ]);

[VB] Public Shared Function Concat(ByVal ParamArray args( ) As Object) As String

[JScript] public static function Concat(args: Object[ ]): String;

Description

Concatenates the String representations of the elements in a specified Object array.

Return Value: The concatenated String representations of the values of the elements in args.

An System.String.Empty string is used in place of any null object in the array. An System.Object array.

Concat

[C#] public static string Concat(params string[ ] values);

[C++] public: static String* Concat(String* values _gc[ ]);

[VB] Public Shared Function Concat(ByVal ParamArray values( ) As String) As String

[JScript] public static function Concat(values: String[ ]): String;

Description

Concatenates the elements of a specified String array.

Return Value: The concatenated elements of values.

An System.String.Empty string is used in place of any null object in the array. An array of String instances.

Concat

[C#] public static string Concat(object arg0, object arg1);

[C++] public: static String* Concat(Object* arg0, Object* arg1);

[VB] Public Shared Function Concat(ByVal arg0 As Object, ByVal arg1 As Object) As String

[JScript] public static function Concat(arg0: Object, arg1: Object): String;

Description

Concatenates the String representations of two specified objects.

Return Value: The concatenated String representations of the values of arg0 and arg1.

An System.String.Empty string is used in place of any null argument. The first System.Object. The second Object.

Concat

[C#] public static string Concat(string str0, string str1);

[C++] public: static String* Concat(String* str0, String* str1);

[VB] Public Shared Function Concat(ByVal str0 As String, ByVal str1 As String) As String

[JScript] public static function Concat(str0: String, str1: String): String;

Description

Concatenates two specified instances of String.

Return Value: The concatenation of str0 and str1.

An System.String.Empty string is used in place of any null argument. The first String. The second String.

Concat

[C#] public static string Concat(object arg0, object arg1, object arg2);

[C++] public: static String* Concat(Object* arg0, Object* arg1, Object* arg2);

[VB] Public Shared Function Concat(ByVal arg0 As Object, ByVal arg1 As Object, ByVal arg2 As Object) As String

[JScript] public static function Concat(arg0: Object, arg1: Object, arg2: Object) String;

Description

Concatenates the String representations of three specified objects.

Return Value: The concatenated String representations of the values of arg0, arg1, and arg2.

An System.String.Empty string is used in place of any null argument. The first System.Object. The second Object. The third Object.

Concat

[C#] public static string Concat(string str0, string str1, string str2);

[C++] public: static String* Concat(String* str0, String* str1, String* str2);

[VB] Public Shared Function Concat(ByVal str0 As String, ByVal str1 As String, ByVal str2 As String) As String

[JScript] public static function Concat(str0: String, str1: String, str2: String) String;

Description

Concatenates three specified instances of String.

Return Value: The concatenation of str0, str1, and str2.

An System.String.Empty string is used in place of any null argument. The first String. The second String. The third String.

Concat

[C++] public: static String* Concat(Object* arg0, Object* arg1, Object* arg2, Object* arg3, . . . );

Concat

[C#] public static string Concat(string str0, string str1, string str2, string str3);

[C++] public: static String* Concat(String* str0, String* str1, String* str2, String* str3);

[VB] Public Shared Function Concat(ByVal str0 As String, ByVal str1 As String, ByVal str2 As String, ByVal str3 As String) As String

[JScript] public static function Concat(str0: String, str1: String, str2: String, str3 String): String;

Description

Concatenates four specified instances of String.

Return Value: The concatenation of str0, str1, str2, and str3.

An System.String.Empty string is used in place of any null object in the array. The first String. The second String. The third String. The fourth String.

Copy

[C#] public static string Copy(string str);

[C++] public: static String* Copy(String* str);

[VB] Public Shared Function Copy(ByVal str As String) As String

[JScript] public static function Copy(str: String): String;

Description

Creates a new instance of String with the same value as a specified instance of String.

Return Value: A new String with the same value as str. The String to be copied

CopyTo

[C#] public void CopyTo(int sourceIndex, char[ ] destination, int destinationIndex, int count);

[C++] public: void CopyTo(int sourceIndex, _wchar_t destination _gc[ ], int destinationIndex, int count);

[VB] Public Sub CopyTo(ByVal sourceIndex As Integer, ByVal destination( ) As Char, ByVal destinationIndex As Integer, ByVal count As Integer)

[JScript] public function CopyTo(sourceIndex: int, destination: Char[ ], destinationIndex: int, count: int);

Description

Copies a specified number of characters from a specified position in this instance to a specified position in an array of Unicode characters.

count characters are copied from the sourceIndex position of this instance to the destinationIndex position of destination. A character position in this instance. An array of Unicode characters. An array element in destination. The number of characters in this instance to copy to destination.

EndsWith

[C#] public bool EndsWith(string value);

[C++] public: bool EndsWith(String* value);

[VB] Public Function EndsWith(ByVal value As String) As Boolean

[JScript] public function EndsWith(value: String): Boolean;

Description

Determines whether the end of this instance matches the specified String.

Return Value: true if the end of this instance matches value; false if value does not match or is longer than this instance.

The comparison is case-sensitive. A String.

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean; Determines whether two String objects have the same value.

Description

Determines whether this instance of String and a specified object, which must be a String, have the same value.

Return Value: true if obj is a String and its value is the same as this instance; otherwise, false. This instance is null.

This comparison is case-sensitive. An System.Object.

Equals

[C#] public new bool Equals(string value);

[C++] public: bool Equals(String* value);

[VB] Shadows Public Function Equals(ByVal value As String) As Boolean

[JScript] public hide function Equals(value: String): Boolean;

Description

Determines whether this instance and a specified String have the same value.

Return Value: true if the value of value is the same as this instance; otherwise, false. This instance is null.

This comparison is case-sensitive. A String.

Equals

[C#] public static new bool Equals(string a, string b);

[C++] public: static bool Equals(String* a, String* b);

[VB] Shadows Public Shared Function Equals(ByVal a As String, ByVal b As String) As Boolean

[JScript] public static hide function Equals(a: String, b: String): Boolean;

Description

Determines whether two specified String objects have the same value.

Return Value: true if the value of a is the same as the value of b; otherwise, false.

The comparison is case-sensitive. A String or null. A String or null.

Format

[C#] public static string Format(string format, object arg0);

[C++] public: static String* Format(String* format, Object* arg0);

[VB] Public Shared Function Format(ByVal format As String, ByVal arg0 As Object) As String

[JScript] public static function Format(format: String, arg0: Object): String; Replaces each format specification in a specified String with the textual equivalent of a corresponding object's value.

Description

Replaces the format specification in a specified String with the textual equivalent of the value of a specified Object instance.

Return Value: A copy of format in which the first format specification has be replaced by the String equivalent of the arg0.

The format parameter is embedded with zero or more format specifications of the form, {N [, M][: formatString]}, where: N is a zero-based integer indicating the argument to be formatted. A String containing zero or more format specifications. An System.Object to be formatted.

Format

[C#] public static string Format(string format, params object[ ] args);

[C++] public: static String* Format(String* format, Object* args _gc[ ]);

[VB] Public Shared Function Format(ByVal format As String, ByVal ParamArray args( ) As Object) As String

[JScript] public static function Format(format: String, args: Object[ ]): String;

Description

Replaces the format specification in a specified String with the textual equivalent of the value of a corresponding Object instance in a specified array.

Return Value: A copy of format in which the format specifications have been replaced by the String equivalent of the corresponding instances of Object in args.

The format parameter is embedded with zero or more format specifications of the form, {N [, M] [: formatString]}, where: N is a zero-based integer indicating the argument to be formatted. A String containing zero or more format specifications. An System.Object array containing zero or more objects to be formatted.

Format

[C#] public static string Format(IFormatProvider provider, string format, params object[ ] args);

[C++] public: static String* Format(IFormatProvider* provider, String* format, Object* args _gc[ ]);

[VB] Public Shared Function Format(ByVal provider As IFormatProvider, ByVal format As String, ByVal ParamArray args( ) As Object) As String

[JScript] public static function Format(provider: IFormatProvider, format: String, args: Object[ ]): String;

Description

Replaces the format specification in a specified String with the textual equivalent of the value of a corresponding Object instance in a specified array. A specified parameter supplies culture-specific formatting information.

Return Value: A copy of format in which the format specifications have been replaced by the String equivalent of the corresponding instances of Object in args The format parameter is embedded with zero or more format specifications of the form, {N [, M] [: formatString]}, where: N is a zero-based integer indicating the argument to be formatted. An System.IFormatProvider interface implementation that supplies culture-specific formatting information. A String containing zero or more format specifications. An System.Object array containing zero or more objects to be formatted.

Format

[C#] public static string Format(string format, object arg0, object arg1);

[C++] public: static String* Format(String* format, Object* arg0, Object* arg1);

[VB] Public Shared Function Format(ByVal format As String, ByVal arg0 As Object, ByVal arg1 As Object) As String

[JScript] public static function Format(format: String, arg0: Object, arg1 Object): String;

Description

Replaces the format specification in a specified String with the textual equivalent of the value of two specified Object instances.

Return Value: A copy of format in which the first and second format specifications have been replaced by the String equivalent of the arg0 and arg1.

A String containing zero or more format specifications. The first System.Object to be formatted. The second Object to be formatted.

Format

[C#] public static string Format(string format, object arg0, object arg1, object arg2);

[C++] public: static String* Format(String* format, Object* arg0, Object* arg1, Object* arg2);

[VB] Public Shared Function Format(ByVal format As String, ByVal arg0 As Object, ByVal arg1 As Object, ByVal arg2 As Object) As String

[JScript] public static function Format(format: String, arg0: Object, arg1: Object, arg2: Object): String;

Description

Replaces the format specification in a specified String with the textual equivalent of the value of three specified Object instances.

Return Value: A copy of format in which the first, second, and third format specifications have been replaced by the String equivalent of the arg0,arg1, and arg2.

The format parameter is embedded with zero or more format specifications of the form, {N [, M] [: formatString]}, where: N is a zero-based integer indicating the argument to be formatted. A String containing zero or more format specifications. The first System.Object to be formatted. The second Object to be formatted. The third Object to be formatted.

GetEnumerator

[C#] public CharEnumerator GetEnumerator( );

[C++] public: CharEnumerator* GetEnumerator( );

[VB] Public Function GetEnumerator( ) As CharEnumerator

[JScript] public function GetEnumerator( ): CharEnumerator;

Description

Retrieves an object that can iterate through the individual characters in this instance.

Return Value: A System.CharEnumerator object.

This method is required by programming languages that support the System.Collections.IEnumerator interface to iterate through members of a collection. For example, the Microsoft Visual Basic and C# programming languages' for each statement invokes this method to return a CharEnumerator object that can provide read-only access to the characters in this instance of String GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for this instance.

Return Value: A 32-bit signed integer hash code.

GetTypeCode

[C#] public TypeCode GetTypeCode( );

[C++] public: _sealed TypeCode GetTypeCode( );

[VB] NotOverridable Public Function GetTypeCode( ) As TypeCode

[JScript] public function GetTypeCode( ): TypeCode;

Description

Returns the TypeCode for class String.

Return Value: The enumerated constant, System.TypeCode. String.

IndexOf

[C#] public int IndexOf(char value);

[C++] public: int IndexOf(_wchar_t value);

[VB] Public Function IndexOf(ByVal value As Char) As Integer

[JScript] public function IndexOf(value: Char): int; Reports the index of the first occurrence of a String, or one or more characters, within this instance.

Description

Reports the index of the first occurrence of the specified Unicode character in this instance.

Return Value: A positive 32-bit signed integer, the index, that is the character position in this instance where value was found; otherwise, −1 if value was not found.

Index numbering starts from zero. A Unicode character to seek.

IndexOf

[C#] public int IndexOf(string value);

[C++] public: int IndexOf(String* value);

[VB] Public Function IndexOf(ByVal value As String) As Integer

[JScript] public function IndexOf(value: String): int;

Description

Reports the index of the first occurrence of the specified String in this instance.

Return Value: Value Meaning A positive index position.

The search begins at the first character position of this instance and continues until the last character position. The search is case-sensitive and uses the current culture. The String to seek.

IndexOf

[C#] public int IndexOf(char value, int startIndex);

[C++] public: int IndexOf(_wchar_t value, int startIndex);

[VB] Public Function IndexOf(ByVal value As Char, ByVal startIndex As Integer) As Integer

[JScript] public function IndexOf(value: Char, startIndex: int): int;

Description

Reports the index of the first occurrence of the specified Unicode character in this instance. The search starts at a specified character position.

Return Value: A positive 32-bit signed integer, the index, indicating the character position in this instance where value was found; otherwise, −1 if value was not found.

Index numbering starts from zero. A Unicode character to seek. The search starting position.

IndexOf

[C#] public int IndexOf(string value, int startIndex);

[C++] public: int IndexOf(String* value, int startIndex);

[VB] Public Function IndexOf(ByVal value As String, ByVal startIndex As Integer) As Integer

[JScript] public function IndexOf(value: String, startIndex: int): int;

Description

Reports the index of the first occurrence of the specified String in this instance. The search starts at a specified character position.

Return Value: Value Meaning A positive index position.

The search begins at the startIndex character position of this instance and continues until the last character position. The search is case-sensitive and uses the current culture. The String to seek. The search starting position.

IndexOf

[C#] public int IndexOf(char value, int startIndex, int count);

[C++] public: int IndexOf(_wchar_t value, int startIndex, int count);

[VB] Public Function IndexOf(ByVal value As Char, ByVal startIndex As Integer, ByVal count As Integer) As Integer

[JScript] public function IndexOf(value: Char, startIndex: int, count: int): int;

Description

Reports the index of the first occurrence of the specified character in this instance. The search starts at a specified character position and examines a specified number of character positions.

Return Value: A positive 32-bit signed integer, the index, that is the character position in this instance where value was found; otherwise, −1 if value was not found.

The search begins at startIndex and continues until count−1. The character at count is not included in the search. A Unicode character to seek. The search starting position. The number of character positions to examine.

IndexOf

[C#] public int IndexOf(string value, int startIndex, int count);

[C++] public: int IndexOf(String* value, int startIndex, int count);

[VB] Public Function IndexOf(ByVal value As String, ByVal startIndex As Integer, ByVal count As Integer) As Integer

[JScript] public function IndexOf(value: String, startIndex: int, count: int): int;

Description

Reports the index of the first occurrence of the specified String in this instance. The search starts at a specified character position and examines a specified number of character positions.

Return Value: Value Meaning A positive index position.

The search begins at the startIndex character position and continues for count character positions. The search is case-sensitive and uses the current culture. The String to seek. The search starting position. The number of character positions to examine.

IndexOfAny

[C#] public int IndexOfAny(char[ ] anyOf);

[C++] public: int IndexOfAny(_wchar_t anyOf _gc[ ]);

[VB] Public Function IndexOfAny(ByVal anyOf( ) As Char) As Integer

[JScript] public function IndexOfAny(anyOf: Char[ ]): int; Reports the index of the first occurrence in this instance of any character in a specified array of Unicode characters.

Description

Reports the index of the first occurrence in this instance of any character in a specified array of Unicode characters.

Return Value: The positive integer index of the first occurrence in this instance where any character in anyOf was found; otherwise, −1 if no character in anyOf was found.

Index numbering starts from zero. A Unicode character array containing one or more characters to seek.

IndexOfAny

[C#] public int IndexOfAny(char[ ] anyOf, int startIndex);

[C++] public: int IndexOfAny(_wchar_t anyOf _gc[ ], int startIndex);

[VB] Public Function IndexOfAny(ByVal anyOf( ) As Char, ByVal startIndex As Integer) As Integer

[JScript] public function IndexOfAny(anyOf: Char[ ], startIndex: int): int;

Description

Reports the index of the first occurrence in this instance of any character in a specified array of Unicode characters. The search starts at a specified character position.

Return Value: The positive integer index of the first occurrence in this instance where any character in anyOf was found; otherwise, −1 if no character in anyOf was found.

Index numbering starts from zero. A Unicode character array containing one or more characters to seek. The search starting position.

IndexOfAny

[C#] public int IndexOfAny(char[ ] anyOf, int startIndex, int count);

[C++] public: int IndexOfAny(_wchar_t anyOf _gc[ ], int startIndex, int count);

[VB] Public Function IndexOfAny(ByVal anyOf( ) As Char, ByVal startIndex As Integer, ByVal count As Integer) As Integer

[JScript] public function IndexOfAny(anyOf: Char[ ], startIndex: int, count: int): int;

Description

Reports the index of the first occurrence in this instance of any character in a specified array of Unicode characters. The search starts at a specified character position and examines a specified number of character positions.

Return Value: The positive integer index of the first occurrence in this instance where any character in anyOf was found; otherwise, −1 if no character in anyOf was found.

The search begins at startIndex and continues until count−1. The character at count is not included in the search. A Unicode character array containing one or more characters to seek. The search starting position. The number of character positions to examine.

Insert

[C#] public string Insert(int startIndex, string value);

[C++] public: String* Insert(int startIndex, String* value);

[VB] Public Function Insert(ByVal startIndex As Integer, ByVal value As String) As String

[JScript] public function Insert(startIndex: int, value: String): String;

Description

Inserts a specified instance of String at a specified index position in this instance.

Return Value: A new String equivalent to this instance but with value inserted at position startIndex.

If startIndex is equal to the length of this instance, value is appended to the end of this instance. The index position of the insertion. The String to insert.

Intern

[C#] public static string Intern(string str);

[C++] public: static String* Intern(String* str);

[VB] Public Shared Function Intern(ByVal str As String) As String

[JScript] public static function Intern(str: String): String;

Description

Retrieves the system's reference to the specified String

Return Value: The String reference to str.

The common language runtime automatically maintains a table, called the "intern pool", which contains a single instance of each unique literal string constant declared in a program, as well as any unique instance of String you add programmatically. A String, or null.

IsInterned

[C#] public static string IsInterned(string str);

[C++] public: static String* IsInterned(String* str);

[VB] Public Shared Function IsInterned(ByVal str As String) As String

[JScript] public static function IsInterned(str: String): String;

Description

Retrieves a reference to a specified String.

Return Value: A String reference to str if it is in the common language runtime "intern pool"; otherwise null.

The common language runtime automatically maintains a table, called the "intern pool", which contains a single instance of each unique literal string constant declared in a program, as well as any unique instance of String you add programmatically. A String.

Join

[C#] public static string Join(string separator, string[ ] value);

[C++] public: static String* Join(String* separator, String* value _gc[ ]);

[VB] Public Shared Function Join(ByVal separator As String, ByVal value( ) As String) As String

[JScript] public static function Join(separator: String, value: String[ ]): String; Concatenates a specified separator String between each element of a specified String array, yielding a single concatenated string.

Description

Concatenates a specified separator String between each element of a specified String array, yielding a single concatenated string.

Return Value: A String consisting of the elements of value interspersed with the separator string.

For example if separator is ", " and the elements of value are "apple", "orange", "grape", and "pear", Join(separator, value) returns "apple, orange, grape, pear". A System.String. An array of Strings.

Join

[C#] public static string Join(string separator, string[ ] value, int startIndex, int count);

[C++] public: static String* Join(String* separator, String* value _gc[ ], int startIndex, int count);

[VB] Public Shared Function Join(ByVal separator As String, ByVal value( ) As String, ByVal startIndex As Integer, ByVal count As Integer) As String

[JScript] public static function Join(separator: String, value: String[ ], startIndex int, count: int): String;

Description

Concatenates a specified separator String between each element of a specified String array, yielding a single concatenated string. Parameters specify the first array element and number of elements to use.

Return Value: A String consisting of the strings in value joined by separator.

For example if separator is ", "and the elements of value are "apple", "orange", "grape", and "pear", Join(separator, value, 1, 2) returns "orange, grape". A System.String. An array of String. The first array element in value to use. The number of elements of value to use.

LastIndexOf

[C#] public int LastIndexOf(char value);

[C++] public: int LastIndexOf(_wchar_t value);

[VB] Public Function LastIndexOf(ByVal value As Char) As Integer

[JScript] public function LastIndexOf(value: Char): int; Reports the index position of the last occurrence of a specified Unicode character or String within this instance.

Description

Reports the index position of the last occurrence of a specified Unicode character within this instance.

Return Value: The index position of value if that character is found, or −1 if it is not.

This method begins searching at the last character position of this instance and precedes backwards towards the beginning until either value is found or the first character position has been examined. The search is case-sensitive. A Unicode character to seek.

LastIndexOf

[C#] public int LastIndexOf(string value);

[C++] public: int LastIndexOf(String* value);

[VB] Public Function LastIndexOf(ByVal value As String) As Integer

[JScript] public function LastIndexOf(value: String): int;

Description

Reports the index position of the last occurrence of a specified String within this instance.

Return Value: Value Meaning A positive index position.

This method begins searching at the last character position of this instance and precedes backwards towards the beginning until either value is found or the first character position has been examined. The search is case-sensitive. A String to seek.

LastIndexOf

[C#] public int LastIndexOf(char value, int startIndex);

[C++] public: int LastIndexOf(_wchar_t value, int startIndex);

[VB] Public Function LastIndexOf(ByVal value As Char, ByVal startIndex As Integer) As Integer

[JScript] public function LastIndexOf(value: Char, startIndex: int): int;

Description

Reports the index position of the last occurrence of a specified Unicode character within this instance. The search starts at a specified character position.

Return Value: The index position of value if that character is found, or −1 if it is not.

This method begins searching at the startIndex character position of this instance and precedes backwards towards the beginning until either value is found or the first character position has been examined. The search is case-sensitive. A Unicode character to seek. The starting position of a substring within this instance.

LastIndexOf

[C#] public int LastIndexOf(string value, int startIndex);

[C++] public: int LastIndexOf(String* value, int startIndex);

[VB] Public Function LastIndexOf(ByVal value As String, ByVal startIndex As Integer) As Integer

[JScript] public function LastIndexOf(value: String, startIndex: int): int;

Description

Reports the index position of the last occurrence of a specified String within this instance. The search starts at a specified character position.

Return Value: Value Meaning A positive index position.

This method begins searching at the startIndex character position of this instance and precedes backwards towards the beginning until either value is found or the first character position has been examined. The search is case-sensitive. The String to seek. The search starting position.

LastIndexOf

[C#] public int LastIndexOf(char value, int startIndex, int count);

[C++] public: int LastIndexOf(_wchar_t value, int startIndex, int count);

[VB] Public Function LastIndexOf(ByVal value As Char, ByVal startIndex As Integer, ByVal count As Integer) As Integer

[JScript] public function LastIndexOf(value: Char, startIndex: int, count: int) int;

Description

Reports the index position of the last occurrence of the specified Unicode character in a substring within this instance. The search starts at a specified character position and examines a specified number of character positions.

Return Value: The index position of value if that character is found, or −1 if it is not.

This method begins searching at the startIndex character position of this instance and precedes backwards towards the beginning until either value is found or count character positions have been examined. The search is case-sensitive. A Unicode character to seek. The starting position of a substring within this instance.

The number of character positions to examine.

LastIndexOf

[C#] public int LastIndexOf(string value, int startIndex, int count);

[C++] public: int LastIndexOf(String* value, int startIndex, int count);

[VB] Public Function LastIndexOf(ByVal value As String, ByVal startIndex As Integer, ByVal count As Integer) As Integer

[JScript] public function LastIndexOf(value: String, startIndex: int, count: int) int;

Description

Reports the index position of the last occurrence of a specified String within this instance. The search starts at a specified character position and examines a specified number of character positions.

Return Value: Value Meaning A positive index position.

This method begins searching at the startIndex character position of this instance and precedes backwards towards the beginning until either value is found or count character positions have been examined. The search is case-sensitive. The String to seek. The search starting position. The number of character positions to examine.

LastIndexOfAny

[C#] public int LastIndexOfAny(char[ ] anyOf);

[C++] public: int LastIndexOfAny(_wchar_t anyOf _gc[ ]);

[VB] Public Function LastIndexOfAny(ByVal anyOf( ) As Char) As Integer

[JScript] public function LastIndexOfAny(anyOf: Char[ ]): int; Reports the index position of the last occurrence in this instance of one or more characters specified in a Unicode array.

Description

Reports the index position of the last occurrence in this instance of one or more characters specified in a Unicode array.

Return Value: The positive integer index of the last occurrence in this instance where any character in anyOf was found; otherwise, −1 if no character in anyOf was found.

This method begins searching at the last character position of this instance and precedes backwards towards the beginning until either a character in anyOf is found or the first character position has been examined. The search is case-sensitive. A Unicode character array containing one or more characters to seek.

LastIndexOfAny

[C#] public int LastIndexOfAny(char[ ] anyOf, it startIndex);

[C++] public: int LastIndexOfAny(_wchar_t anyOf _gc[ ], int startIndex);

[VB] Public Function LastIndexOfAny(ByVal anyOf( ) As Char, ByVal startIndex As Integer) As Integer

[JScript] public function LastIndexOfAny(anyOf: Char[ ], startIndex: int): int;

Description

Reports the index position of the last occurrence in this instance of one or more characters specified in a Unicode array. The search starts at a specified character position.

Return Value: The positive integer index of the last occurrence in this instance where any character in anyOf was found; otherwise, −1 if no character in anyOf was found.

This method begins searching at the startIndex character position of this instance and precedes backwards towards the beginning until either a character in anyOf is found or the first character position has been examined. The search is case-sensitive. A Unicode character array containing one or more characters to seek. The search starting position.

LastIndexOfAny

[C#] public int LastIndexOfAny(char[ ] anyOf, int startIndex, int count);

[C++] public: int LastIndexOfAny(_wchar_t anyOf _gc[ ], int startIndex, int count);

[VB] Public Function LastIndexOfAny(ByVal anyOf( ) As Char, ByVal startIndex As Integer, ByVal count As Integer) As Integer

[JScript] public function LastIndexOfAny(anyOf: Char[ ], startIndex: int, count: int): int;

Description

Reports the index position of the last occurrence in this instance of one or more characters specified in a Unicode array. The search starts at a specified character position and examines a specified number of character positions.

Return Value: The positive integer index of the last occurrence in this instance where any character in anyOf was found; otherwise, −1 if no character in anyOf was found.

This method begins searching at the startIndex character position of this instance and precedes backwards towards the beginning until either a character in anyOf is found or count character positions have been examined. The search is case-sensitive. A Unicode character array containing one or more characters to seek. The search starting position. The number of character positions to examine.

op_Equality

[C#] public static bool operator==(string a, string b);

[C++] public: static bool op_Equality(String* a, String* b);

[VB] returnValue=String.op_Equality(a, b)

[JScript] returnValue=a==b; Determines whether two specified instances of String or Object have the same value.

Description

Determines whether two specified String objects have the same value.

Return Value: true if the value of a is the same as the value of b; otherwise, false.

This operator is implemented using the System.String.Equals(System.Object) method, which means the comparands are tested for a combination of reference and value equality. The comparison is case-sensitive. A String or null. A String or null.

op_Inequality

[C#] public static bool operator !=(string a, string b);

[C++] public: static bool op_Inequality(String* a, String* b);

[VB] returnValue=String.op_Inequality(a, b)

[JScript] returnValue=a !=b; Determines whether two specified instances of String or Object have different values.

Description

Determines whether two specified String objects have different values.

Return Value: true if the value of a is different than the value of b; otherwise, false.

This operator is implemented using the System.String.Equals(System.Object) method, which means the comparands are tested for a combination of reference and value equality. The comparison is case-sensitive. A String or null. A String or null.

PadLeft

[C#] public string PadLeft(int totalWidth);

[C++] public: String* PadLeft(int totalWidth);

[VB] Public Function PadLeft(ByVal totalWidth As Integer) As String

[JScript] public function PadLeft(totalWidth: int): String; Right-aligns the characters in this instance, padding on the left with spaces or a specified Unicode character for a specified total length.

Description

Right-aligns the characters in this instance, padding with spaces on the left for a specified total length.

Return Value: A new String that is equivalent to this instance, but right-aligned and padded on the left with as many spaces as needed to create a length of totalWidth. The number of characters in the resulting string, equal to the number of original characters plus any additional padding characters.

PadLeft

[C#] public string PadLeft(int totalWidth, char paddingChar);

[C++] public: String* PadLeft(int totalWidth, _wchar_t paddingChar);

[VB] Public Function PadLeft(ByVal totalWidth As Integer, ByVal paddingChar As Char) As String

[JScript] public function PadLeft(totalWidth: int, paddingChar: Char): String;

Description

Right-aligns the characters in this instance, padding on the left with a specified Unicode character for a specified total length.

Return Value: A new String that is equivalent to this instance, but right-aligned and padded on the left with as many paddingChar characters as needed to create a length of totalWidth. The number of characters in the resulting string, equal to the number of original characters plus any additional padding characters. A Unicode padding character.

PadRight

[C#] public string PadRight(int totalWidth);

[C++] public: String* PadRight(int totalWidth);

[VB] Public Function PadRight(ByVal totalWidth As Integer) As String

[JScript] public function PadRight(totalWidth: int): String; Left-aligns the characters in this string, padding on the right with spaces or a specified Unicode character, for a specified total length.

Description

Left-aligns the characters in this string, padding with spaces on the right, for a specified total length.

Return Value: A new String that is equivalent to this instance, but left-aligned and padded on the right with as many spaces as needed to create a length of totalWidth. The number of characters in the resulting string, equal to the number of original characters plus any additional padding characters.

PadRight

[C#] public string PadRight(int totalWidth, char paddingChar);

[C++] public: String* PadRight(int totalWidth, _wchar_t paddingChar);

[VB] Public Function PadRight(ByVal totalWidth As Integer, ByVal paddingChar As Char) As String

[JScript] public function PadRight(totalWidth: int, paddingChar: Char): String;

Description

Left-aligns the characters in this string, padding on the right with a specified Unicode character, for a specified total length.

Return Value: A new String that is equivalent to this instance, but left-aligned and padded on the right with as many paddingChar characters as needed to create a length of totalWidth. The number of characters in the resulting string, equal to the number of original characters plus any additional padding characters. A Unicode padding character.

Remove

[C#] public string Remove(int startIndex, int count);

[C++] public: String* Remove(int startIndex, int count);

[VB] Public Function Remove(ByVal startIndex As Integer, ByVal count As Integer) As String

[JScript] public function Remove(startIndex: int, count: int): String;

Description

Deletes a specified number of characters from this instance beginning at a specified position.

Return Value: A new String that is equivalent to this instance less count number of characters.

For example, the following C# code prints "123456". The position in this instance to begin deleting characters. The number of characters to delete.

Replace

[C#] public string Replace(char oldChar, char newChar);

[C++] public: String* Replace(_wchar_t oldChar, _wchar_t newChar);

[VB] Public Function Replace(ByVal oldChar As Char, ByVal newChar As Char) As String

[JScript] public function Replace(oldChar: Char, newChar: Char): String; Replaces all occurrences of a specified Unicode character or String in this instance, with another specified Unicode character or String Description Replaces all occurrences of a specified Unicode character in this instance with another specified Unicode character.

Return Value: A String equivalent to this instance but with all instances of oldChar replaced with newChar. A Unicode character to be replaced. A Unicode character to replace all occurrences of oldChar.

Replace

[C#] public string Replace(string oldValue, string newValue);

[C++] public: String* Replace(String* oldValue, String* newValue);

[VB] Public Function Replace(ByVal oldValue As String, ByVal newValue As String) As String

[JScript] public function Replace(oldValue: String, newValue: String): String;

Description

Replaces all occurrences of a specified String in this instance, with another specified String.

Return Value: A String equivalent to this instance but with all instances of oldValue replaced with newValue. A String to be replaced. A String to replace all occurrences of oldValue.

Split

[C#] public string[ ] Split(params char[ ] separator);

[C++] public: String* Split(_wchar_t separator gc[ ]) _gc[ ];

[VB] Public Function Split(ByVal ParamArray separators As Char) As String( )

[JScript] public function Split(separator: Char[ ]): String[ ]; Identifies the substrings in this instance that are delimited by one or more characters specified in an array, then places the substrings into a String array.

Description

Identifies the substrings in this instance that are delimited by one or more characters specified in an array, then places the substrings into a String array.

Return Value: An array consisting of a single element containing this instance, if this instance contains none of the characters in separator.

For example: Input separator Output "42,\n12, 19" new Char[ ] {',', ' '} {"42", " ", "12", " ", "19"} "42 . . . 12 . . . 19" new Char[ ] {'.'} {"42", " ", "12", " ", "19"} "Banana" new Char[ ] {'.'} {"Banana"} "Darb\nSmarba" new Char[ ] { } {"Darb", "Smarba"} "Darb\nSmarba" null {"Darb", "Smarba" } An array of Unicode characters that delimit the substrings in this instance, an empty array containing no delimiters, or null.

Split

[C#] public string[ ] Split(char[ ] separator, int count);

[C++] public: String* Split(_wchar_t separator_gc[ ], int count) _gc[ ];

[VB] Public Function Split(ByVal separators As Char, ByVal count As Integer) As String( )

[JScript] public function Split(separator: Char[ ], count: int): String[ ];

Description

Identifies the substrings in this instance that are delimited by one or more characters specified in an array, then places the substrings into a String array. A parameter specifies the maximum number of array elements to return.

Return Value: An array consisting of a single element containing this instance, if this instance contains none of the characters in separator.

If there are more than count substrings in this instance, the first count minus substrings are returned in the first count minus 1 elements of the return value, and the remaining characters in this instance are returned in the last element of the return value. An array of Unicode characters that delimit the substrings in this instance, an empty array containing no delimiters, or null. The maximum number of array elements to return.

StartsWith

[C#] public bool StartsWith(string value);

[C++] public: bool StartsWith(String* value);

[VB] Public Function StartsWith(ByVal value As String) As Boolean

[JScript] public function StartsWith(value: String): Boolean;

Description

Determines whether the beginning of this instance matches the specified String.

Return Value: true if value matches the beginning of this string or is System.String.Empty; otherwise false.

The StartsWith method makes a comparison at the beginning of the string, determines whether it matches this current instance, and returns a System.Boolean represetation of their relationship. The specified string must match the prefix or be an empty string (i.e., equals System.String.Empty). The comparison is case-sensitive. The String to seek.

Substring

[C#] public string Substring(int startIndex);

[C++] public: String* Substring(int startIndex);

[VB] Public Function Substring(ByVal startIndex As Integer) As String

[JScript] public function Substring(startIndex: int): String; Retrieves a substring from this instance.

Description

Retrieves a substring from this instance. The substring starts at a specified character position.

Return Value: A String equivalent to the substring that begins at startIndex in this instance.

The index is zero-based. The starting character position of a substring in this instance.

Substring

[C#] public string Substring(int startIndex, int length);

[C++] public: String* Substring(int startIndex, int length);

[VB] Public Function Substring(ByVal startIndex As Integer, ByVal length As Integer) As String

[JScript] public function Substring(startIndex: int, length: int): String;

Description

Retrieves a substring from this instance. The substring starts at a specified character position and has a specified length.

Return Value: A String equivalent to the substring of length length that begins at startIndex in this instance.

startIndex is zero-based. The index of the start of the substring. The number of characters in the substring.

IEnumerable.GetEnumerator

[C#] IEnumerator IEnumerable.GetEnumerator( );

[C++] IEnumerator* IEnumerable::GetEnumerator( );

[VB] Function GetEnumerator( ) As IEnumerator Implements IEnumerable.GetEnumerator

[JScript] function IEnumerable.GetEnumerator( ): IEnumerator;

IConvertible.ToBoolean

[C#] bool IConvertible.ToBoolean(IFormatProvider provider);

[C++] bool IConvertible::ToBoolean(IFormatProvider* provider);

[VB] Function ToBoolean(ByVal provider As IFormatProvider) As Boolean Implements IConvertible.ToBoolean

[JScript] function IConvertible.ToBoolean(provider: IFormatProvider): Boolean;

IConvertible.ToByte

[C#] byte IConvertible.ToByte(IFormatProvider provider);

[C++] unsigned char IConvertible::ToByte(IFormatProvider* provider);

[VB] Function ToByte(ByVal provider As IFormatProvider) As Byte Implements IConvertible.ToByte

[JScript] function IConvertible.ToByte(provider: IFormatProvider): Byte;

IConvertible.ToChar

[C#] char IConvertible.ToChar(IFormatProvider provider);

[C++] _wchar_t IConvertible::ToChar(IFormatProvider* provider);

[VB] Function ToChar(ByVal provider As IFormatProvider) As Char Implements IConvertible.ToChar

[JScript] function IConvertible.ToChar(provider: IFormatProvider): Char;

IConvertible.ToDateTime

[C#] DateTime IConvertible.ToDateTime(IFormatProvider provider);

[C++] DateTime IConvertible::ToDateTime(IFormatProvider* provider);

[VB] Function ToDateTime(ByVal provider As IFormatProvider) As DateTime Implements IConvertible.ToDateTime

[JScript] function IConvertible.ToDateTime(provider: IFormatProvider): DateTime;

IConvertible.ToDecimal

[C#] decimal IConvertible.ToDecimal(IFormatProvider provider);

[C++] Decimal IConvertible::ToDecimal(IFormatProvider* provider);

[VB] Function ToDecimal(ByVal provider As IFormatProvider) As Decimal Implements IConvertible.ToDecimal

[JScript] function IConvertible.ToDecimal(provider: IFormatProvider): Decimal;

IConvertible.ToDouble

[C#] double IConvertible.ToDouble(IFormatProvider provider);

[C++] double IConvertible::ToDouble(IFormatProvider* provider);

[VB] Function ToDouble(ByVal provider As IFormatProvider) As Double Implements IConvertible.ToDouble

[JScript] function IConvertible.ToDouble(provider: IFormatProvider): double;

IConvertible.ToInt16

[C#] short IConvertible.ToInt16(IFormatProvider provider);

[C++] short IConvertible::ToInt16(IFormatProvider* provider);

[VB] Function ToInt16(ByVal provider As IFormatProvider) As Short Implements IConvertible.ToInt16

[JScript] function IConvertible.ToInt16(provider: IFormatProvider): Int16;

IConvertible.ToInt32

[C#] int IConvertible.ToInt32(IFormatProvider provider);

[C++] int IConvertible::ToInt32(IFormatProvider* provider);

[VB] Function ToInt32(ByVal provider As IFormatProvider) As Integer Implements IConvertible.ToInt32

[JScript] function IConvertible.ToInt32(provider: IFormatProvider): int;

IConvertible.ToInt64

[C#] long IConvertible.ToInt64(IFormatProvider provider);

[C++] _int64 IConvertible::ToInt64(IFormatProvider* provider);

[VB] Function ToInt64(ByVal provider As IFormatProvider) As Long Implements IConvertible.ToInt64

[JScript] function IConvertible.ToInt64(provider: IFormatProvider): long;

IConvertible.ToSByte

[C#] sbyte IConvertible.ToSByte(IFormatProvider provider);

[C++] char IConvertible::ToSByte(IFormatProvider* provider);

[VB] Function ToSByte(ByVal provider As IFormatProvider) As SByte Implements IConvertible.ToSByte

[JScript] function IConvertible.ToSByte(provider: IFormatProvider): SByte;

IConvertible.ToSingle

[C#] float IConvertible::ToSingle(IFormatProvider provider);

[C++] float IConvertible::ToSingle(IFormatProvider* provider);

[VB] Function ToSingle(ByVal provider As IFormatProvider) As Single Implements IConvertible.ToSingle

[JScript] function IConvertible.ToSingle(provider: IFormatProvider): float;

IConvertible.ToType

[C#] object IConvertible.ToType(Type type, IFormatProvider provider);

[C++] Object* IConvertible::ToType(Type* type, IFormatProvider* provider);

[VB] Function ToType(ByVal type As Type, ByVal provider As IFormatProvider) As Object Implements IConvertible.ToType

[JScript] function IConvertible.ToType(type: Type, provider: IFormatProvider): Object;

IConvertible.ToUInt16

[C#] ushort IConvertible::ToUInt16(IFormatProvider provider);

[C++] unsigned short IConvertible::ToUInt16(IFormatProvider* provider);

[VB] Function ToUInt16(ByVal provider As IFormatProvider) As UInt16 Implements IConvertible.ToUInt16

[JScript] function IConvertible.ToUInt16(provider: IFormatProvider): UInt16;

IConvertible.ToUInt32

[C#] uint IConvertible.ToUInt32(IFormatProvider provider);

[C++] unsigned int IConvertible::ToUInt32(IFormatProvider* provider);

[VB] Function ToUInt32(ByVal provider As IFormatProvider) As UInt32 Implements IConvertible.ToUInt32

[JScript] function IConvertible.ToUInt32(provider: IFormatProvider): UInt32;

IConvertible.ToUInt64

[C#] ulong IConvertible.ToUInt64(IFormatProvider provider);

[C++] unsigned int64 IConvertible::ToUInt64(IFormatProvider* provider);

[VB] Function ToUInt64(ByVal provider As IFormatProvider) As UInt64 Implements IConvertible.ToUInt64

[JScript] function IConvertible.ToUInt64(provider: IFormatProvider): UInt64;

ToCharArray

[C#] public char[ ] ToCharArray( );

[C++] public: _wchar_t ToCharArray( ) _gc[ ];

[VB] Public Function ToCharArray( ) As Char( )

[JScript] public function ToCharArray( ): Char[ ]; Copies the characters in this instance to a Unicode character array.

Description

Copies the characters in this instance to a Unicode character array.

Return Value: A Unicode character array whose elements are the individual characters of this instance.

ToCharArray

[C#] public char[ ] ToCharArray(int startIndex, int length);

[C++] public: _wchar_t ToCharArray(int startIndex, int length) _gc[ ];

[VB] Public Function ToCharArray(ByVal startIndex As Integer, ByVal length As Integer) As Char( )

[JScript] public function ToCharArray(startIndex: int, length: int): Char[ ];

Description

Copies the characters in a specified substring in this instance to a Unicode character array.

Return Value: A Unicode character array whose elements are the length number of characters in this instance starting from character position startIndex. The starting position of a substring in this instance. The length of the substring in this instance.

ToLower

[C#] public string ToLower( );

[C++] public: String* ToLower( );

[VB] Public Function ToLower( ) As String

[JScript] public function ToLower( ): String; Returns a copy of this String in lowercase.

Description

Returns a copy of this String in lowercase.

Return Value: A String in lowercase.

This method takes into account the current System.Globalization.CultureInfo information.

ToLower

[C#] public string ToLower(CultureInfo culture);

[C++] public: String* ToLower(CultureInfo* culture);

[VB] Public Function ToLower(ByVal culture As CultureInfo) As String

[JScript] public function ToLower(culture: CultureInfo): String;

Description

Returns a copy of this String in lowercase, taking into account specified culture-specific information.

Return Value: A String in lowercase. A System.Globalization.CultureInfo object that supplies culture-specific formatting information.

ToString

[C#] public override string ToString( );

[C++] public: String* ToString( );

[VB] Overrides Public Function ToString( ) As String

[JScript] public override function ToString( ): String; Converts the value of this instance to a String.

Description

Returns this instance of String; no actual conversion is performed.

Return Value: This String.

ToString

[C#] public string ToString(IFormatProvider provider);

[C++] public: _sealed String* ToString(IFormatProvider* provider);

[VB] NotOverridable Public Function ToString(ByVal provider As IFormatProvider) As String

[JScript] public function ToString(provider: IFormatProvider): String;

Description

Returns this instance of String; no actual conversion is performed.

Return Value: This String.

provider is reserved, and does not currently participate in this operation. (Reserved) An System.IFormatProvider interface implementation which supplies culture-specific formatting information.

ToUpper

[C#] public string ToUpper( );

[C++] public: String* ToUpper( );

[VB] Public Function ToUpper( ) As String

[JScript] public function ToUpper( ): String; Returns a copy of this String in uppercase.

Description

Returns a copy of this String in uppercase, using default properties.

Return Value: A new string in uppercase.

This method takes into account the current System.Globalization.CultureInfo information.

ToUpper

[C#] public string ToUpper(CultureInfo culture);

[C++] public: String* ToUpper(CultureInfo* culture);

[VB] Public Function ToUpper(ByVal culture As CultureInfo) As String

[JScript] public function ToUpper(culture: CultureInfo): String;

Description

Returns a copy of this String in uppercase, taking into account culture-specific information.

Return Value: A String in uppercase. A System.Globalization.CultureInfo object that supplies culture-specific formatting information.

Trim

[C#] public string Trim( );

[C++] public: String* Trim( );

[VB] Public Function Trim( ) As String

[JScript] public function Trim( ): String;

Description

Removes all occurrences of white space characters from the beginning and end of this instance.

Return Value: A new String equivalent to this instance after white space characters are removed.

This method defines white space characters as hexadecimal 0x9, 0xA, 0xB, 0xC, 0xD, 0x20, 0xA0, 0x2000, 0x2001, 0x2002, 0x2003, 0x2004, 0x2005, 0x2006, 0x2007, 0x2008, 0x2009, 0x200A, 0x200B, 0x3000, and 0xFEFF.

Trim

[C#] public string Trim(params char[ ] trimChars);

[C++] public: String* Trim(_wchar_t trimChars gc[ ]);

[VB] Public Function Trim(ByVal ParamArray trimChars( ) As Char) As String

[JScript] public function Trim(trimChars: Char[ ]): String; Removes all occurrences of a set of specified characters from the beginning and end of this instance.

Description

Removes all occurrences of a set of characters specified in a Unicode character array from the beginning and end of this instance.

Return Value: The String that remains after all occurrences of the characters in trimChars are removed. If trimChars is null, white space characters are removed instead.

This method defines white space characters as hexadecimal 0x9, 0xA, 0xB, 0xC, 0xD, 0x20, 0xA0, 0x2000, 0x2001, 0x2002, 0x2003, 0x2004, 0x2005, 0x2006, 0x2007, 0x2008, 0x2009, 0x200A, 0x200B, 0x3000, and 0xFEFF. An array of Unicode characters to be removed or null.

TrimEnd

[C#] public string TrimEnd(params char[ ] trimChars);

[C++] public: String* TrimEnd(_wchar_t trimChars _gc[ ]);

[VB] Public Function TrimEnd(ByVal ParamArray trimChars( ) As Char) As String

[JScript] public function TrimEnd(trimChars: Char[ ]): String;

Description

Removes all occurrences of a set of characters specified in a Unicode character array from the end of this instance.

Return Value: The String that remains after all occurrences of the characters in trimChars are removed. If trimChars is null, white space characters are removed instead.

This method defines white space characters as hexadecimal 0x9, 0xA, 0xB, 0xC, 0xD, 0x20, 0xA0, 0x2000, 0x2001, 0x2002, 0x2003, 0x2004, 0x2005, 0x2006, 0x2007, 0x2008, 0x2009, 0x200A, 0x200B, 0x3000, and 0xFEFF. An array of Unicode characters to be removed or null.

TrimStart

[C#] public string TrimStart(params char[ ] trimChars);

[C++] public: String* TrimStart(_wchar_t trimChars _gc[ ]);

[VB] Public Function TrimStart(ByVal ParamArray trimChars( ) As Char) As String

[JScript] public function TrimStart(trimChars: Char[ ]): String;

Description

Removes all occurrences of a set of characters specified in a Unicode character array from the beginning of this instance.

Return Value: The String that remains after all occurrences of characters in trimChars are removed. If trimChars is null, white space characters are removed instead.

This method defines white space characters as hexadecimal 0x9, 0xA, 0xB, 0xC, 0xD, 0x20, 0xA0, 0x2000, 0x2001, 0x2002, 0x2003, 0x2004, 0x2005, 0x2006, 0x2007, 0x2008, 0x2009, 0x200A, 0x200B, 0x3000, and 0xFEFF. An array of Unicode characters to be removed or null.

SystemException class (System)

TrimStart

Description

Defines the base class for predefined exceptions in the System namespace.

System.SystemException is thrown by the common language runtime when errors occur that are nonfatal and recoverable by user programs. These errors result from failed runtime check (such as an array out-of-bound error), and can occur during the execution of any method.

SystemException

Example Syntax:

TrimStart

[C#] public SystemException( );

[C++] public: SystemException( );

[VB] Public Sub New( )

[JScript] public function SystemException( ); Initializes a new instance of the System.SystemException class.

Description

Initializes a new instance of the System.SystemException class with default properties.

The following table shows the initial property values for an instance of System.SystemException.

SystemException

Example Syntax:

TrimStart

[C#] public SystemException(string message);

[C++] public: SystemException(String* message);

[VB] Public Sub New(ByVal message As String)

[JScript] public function SystemException(message: String);

Description

Initializes a new instance of the System.SystemException class with a specified error message.

The following table shows the initial property values for an instance of System.SystemException. The error message that explains the reason for the exception.

SystemException

Example Syntax:

TrimStart

[C#] protected SystemException(SerializationInfo info, StreamingContext context);

[C++] protected: SystemException(SerializationInfo* info, StreamingContext context);

[VB] Protected Sub New(ByVal info As SerializationInfo, ByVal context As StreamingContext)

[JScript] protected function SystemException(info: SerializationInfo, context: StreamingContext);

Description

Initializes a new instance of the System.SystemException class with serialized data.

This constructor is called during deserialization to reconstitute the exception object transmitted over a stream. For more information, see. The object that holds the serialized object data. The contextual information about the source or destination.

SystemException

Example Syntax:

TrimStart

[C#] public SystemException(string message, Exception innerException);

[C++] public: SystemException(String* message, Exception* innerException);

[VB] Public Sub New(ByVal message As String, ByVal innerException As Exception)

[JScript] public function SystemException(message: String, innerException: Exception);

Description

Initializes a new instance of the System.SystemException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If innerException is non-null, then the current Exception is raised in a catch block handling innerException.

HelpLink

HResult

InnerException

Message

Source

StackTrace

TargetSite

ThreadStaticAttribute class (System)

ToString

Description

Indicates that the value of a static field is unique for each thread.

A static field marked with System.ThreadStaticAttribute is not shared between threads. Each executing thread has a separate instance of the static field, and independently set and get values for that field. If the static field is accessed on a different thread, it will contain a different value.

ThreadStaticAttribute

Example Syntax:

ToString

[C#] public ThreadStaticAttribute( );

[C++] public: ThreadStaticAttribute( );

[VB] Public Sub New( )

[JScript] public function ThreadStaticAttribute( );

Description

Initializes a new instance of the System.ThreadStaticAttribute class.

TypeId

TimeSpan structure (System)

ToString

Description

Represents a time interval.

The value of an instance of TimeSpan represents a period of time. That value is the number of "ticks" contained in the instance. A tick is the smallest unit of time that can be specified, and is equal to 100 nanoseconds. Both the specification of a number of ticks and the value of a TimeSpan can be positive or negative.

ToString

[C#] public static readonly TimeSpan MaxValue;

[C++] public: static TimeSpan MaxValue;

[VB] Public Shared ReadOnly MaxValue As TimeSpan

[JScript] public static var MaxValue: TimeSpan;

Description

A constant whose value is the maximum TimeSpan value.

The value of this constant is equivalent to System.Int64.MaxValue ticks. The string representation of this value is positive 10675199.02:48:05.4775807.

ToString

[C#] public static readonly TimeSpan MinValue;

[C++] public: static TimeSpan MinValue;

[VB] Public Shared ReadOnly MinValue As TimeSpan

[JScript] public static var MinValue: TimeSpan;

Description

A constant whose value is the minimum TimeSpan value.

The value of this constant is equivalent to System.Int64.MinValue ticks. The string representation of this value is negative 10675199.02:48:05.4775808.

ToString

[C#] public const long TicksPerDay;

[C++] public: const _int64 TicksPerDay;

[VB] Public Const TicksPerDay As Long

[JScript] public var TicksPerDay: long;

Description

A constant whose value is the number of ticks equivalent to 1 day.

The value of this constant is 864 billion; that is, 864000000000.

ToString

[C#] public const long TicksPerHour;

[C++] public: const _int64 TicksPerHour;

[VB] Public Const TicksPerHour As Long

[JScript] public var TicksPerHour: long;

Description

A constant whose value is the number of ticks equivalent to 1 hour. The value of this constant is 36 billion; that is, 36000000000.

ToString

[C#] public const long TicksPerMillisecond;

[C++] public: const _int64 TicksPerMillisecond;

[VB] Public Const TicksPerMillisecond As Long

[JScript] public var TicksPerMillisecond: long;

Description

A constant whose value is the number of ticks equivalent to 1 millisecond.

The value of this constant is 10 thousand; that is, 10000.

ToString

[C#] public const long TicksPerMinute;

[C++] public: const _int64 TicksPerMinute;

[VB] Public Const TicksPerMinute As Long

[JScript] public var TicksPerMinute: long;

Description

A constant whose value is the number of ticks equivalent to 1 minute.

The value of this constant is 600 million; that is, 600000000.

ToString

[C#] public const long TicksPerSecond;

[C++] public: const _int64 TicksPerSecond;

[VB] Public Const TicksPerSecond As Long

[JScript] public var TicksPerSecond: long;

Description

A constant whose value is the number of ticks equivalent to 1 second.

The value of this constant is 10 million; that is, 10000000.

ToString

[C#] public static readonly TimeSpan Zero;

[C++] public: static TimeSpan Zero;

[VB] Public Shared ReadOnly Zero As TimeSpan

[JScript] public static var Zero: TimeSpan;

Description

A constant whose value is the zero TimeSpan value.

This constant provides a convenient source for zero in time calculations.

TimeSpan

Example Syntax:

ToString

[C#] public TimeSpan(long ticks);

[C++] public: TimeSpan(_int64 ticks);

[VB] Public Sub New(ByVal ticks As Long)

[JScript] public function TimeSpan(ticks: long); Initializes a new instance of the TimeSpan class.

Description

Initializes a new instance of the TimeSpan class to the specified number of ticks. A time period in the form of ticks.

TimeSpan

Example Syntax:

ToString

[C#] public TimeSpan(int hours, int minutes, int seconds);

[C++] public: TimeSpan(int hours, int minutes, int seconds);

[VB] Public Sub New(ByVal hours As Integer, ByVal minutes As Integer, ByVal seconds As Integer)

[JScript] public function TimeSpan(hours: int, minutes: int, seconds: int);

Description

Initializes a new instance of the TimeSpan class to a specified number of hours, minutes, and seconds.

The specified hours, minutes, and seconds are converted to ticks, and that value initializes this instance. Number of hours. Number of minutes. Number of seconds.

TimeSpan

Example Syntax:

ToString

[C#] public TimeSpan(int days, int hours, int minutes, int seconds);

[C++] public: TimeSpan(int days, int hours, int minutes, int seconds);

[VB] Public Sub New(ByVal days As Integer, ByVal hours As Integer, ByVal minutes As Integer, ByVal seconds As Integer)

[JScript] public function TimeSpan(days: int, hours: int, minutes: int, seconds: int);

Description

Initializes a new instance of the TimeSpan class to a specified number of days, hours, minutes, and seconds.

The specified days, hours, minutes, and seconds are converted to ticks, and that value initializes this instance. Number of days. Number of hours. Number of minutes. Number of seconds.

TimeSpan

Example Syntax:

ToString

[C#] public TimeSpan(int days, int hours, int minutes, int seconds, int milliseconds);

[C++] public: TimeSpan(int days, int hours, int minutes, int seconds, int milliseconds);

[VB] Public Sub New(ByVal days As Integer, ByVal hours As Integer, ByVal minutes As Integer, ByVal seconds As Integer, ByVal milliseconds As Integer)

[JScript] public function TimeSpan(days: int, hours: int, minutes: int, seconds int, milliseconds: int);

Description

Initializes a new instance of the TimeSpan class to a specified number of days, hours, minutes, seconds, and milliseconds.

The specified days, hours, minutes, seconds, and milliseconds are converted to ticks, and that value initializes this instance. Number of days. Number of hours. Number of minutes. Number of seconds. Number of milliseconds.

Days

ToString

[C#] public int Days {get;}

[C++] public: _property int get Days( );

[VB] Public ReadOnly Property Days As Integer

[JScript] public function get Days( ): int;

Description

Gets the number of whole days represented by this instance.

DateTime values can be represented as expressions of the form "d.hh:mm:ss.ff" where the "d" component is days, "hh" is hours, "mm" is minutes, "ss" is seconds, and "ff" is fractions of a second. The value of this property is the days component.

Hours

ToString

[C#] public int Hours {get;}

[C++] public: _property int get_Hours( );

[VB] Public ReadOnly Property Hours As Integer

[JScript] public function get Hours( ): int;

Description

Gets the number of whole hours represented by this instance.

DateTime values can be represented as expressions of the form "d.hh:mm:ss.ff" where the "d" component is days, "hh" is hours, "mm" is minutes, "ss" is seconds, and "ff" is fractions of a second. The value of this property is the hours component.

Milliseconds

ToString

[C#] public int Milliseconds {get;}

[C++] public: _property int get_Milliseconds( );

[VB] Public ReadOnly Property Milliseconds As Integer

[JScript] public function get Milliseconds( ): int;

Description

Gets the number of whole milliseconds represented by this instance.

DateTime values can be represented as expressions of the form "d.hh:mm:ss.ff" where the "d" component is days, "hh" is hours, "mm" is minutes, "ss" is seconds, and "ff" is fractions of a second. The value of this property is the fractions of a second component expressed in milliseconds.

Minutes

ToString

[C#] public int Minutes {get;}

[C++] public: _property int get_Minutes( );

[VB] Public ReadOnly Property Minutes As Integer

[JScript] public function get Minutes( ): int;

Description

Gets the number of whole minutes represented by this instance.

DateTime values can be represented as expressions of the form "d.hh:mm:ss.ff" where the "d" component is days, "hh" is hours, "mm" is minutes, "ss" is seconds, and "ff" is fractions of a second. The value of this property is the minutes component.

Seconds

ToString

[C#] public int Seconds {get;}

[C++] public: _property int get_Seconds( );

[VB] Public ReadOnly Property Seconds As Integer

[JScript] public function get Seconds( ): int;

Description

Gets the number of whole seconds represented by this instance.

DateTime values can be represented as expressions of the form "d.hh:mm:ss.ff" where the "d" component is days, "hh" is hours, "mm" is minutes, "ss" is seconds, and "ff" is fractions of a second. The value of this property is the seconds component.

Ticks

ToString

[C#] public long Ticks {get;}

[C++] public: _property _int64 get_Ticks( );

[VB] Public ReadOnly Property Ticks As Long

[JScript] public function get Ticks( ): long;

Description

Gets the value of this instance in ticks.

The smallest unit of time is the "tick," which is equal to 100-nanoseconds. A tick can be negative or positive.

TotalDays

ToString

[C#] public double TotalDays {get;}

[C++] public: _property double get TotalDays( );

[VB] Public ReadOnly Property TotalDays As Double

[JScript] public function get TotalDays( ): double;

Description

Gets the value of this instance expressed in whole and fractional days.

TotalHours

ToString

[C#] public double TotalHours {get;}

[C++] public: _property double get_TotalHours( );

[VB] Public ReadOnly Property TotalHours As Double

[JScript] public function get TotalHours( ): double;

Description

Gets the value of this instance expressed in whole and fractional hours.

TotalMilliseconds

ToString

[C#] public double TotalMilliseconds {get;}

[C++] public: _property double get_TotalMilliseconds( );

[VB] Public ReadOnly Property TotalMilliseconds As Double

[JScript] public function get TotalMilliseconds( ): double;

Description

Gets the value of this instance expressed in whole and fractional milliseconds.

TotalMinutes

ToString

[C#] public double TotalMinutes {get;}

[C++] public: _property double get_TotalMinutes( );

[VB] Public ReadOnly Property TotalMinutes As Double

[JScript] public function get TotalMinutes( ): double;

Description

Gets the value of this instance expressed in whole and fractional minutes.

TotalSeconds

ToString

[C#] public double TotalSeconds {get;}

[C++] public: _property double get_TotalSeconds( );

[VB] Public ReadOnly Property TotalSeconds As Double

[JScript] public function get TotalSeconds( ): double;

Description

Gets the value of this instance expressed in whole and fractional seconds.

Add

[C#] public TimeSpan Add(TimeSpan ts);

[C++] public: TimeSpan Add(TimeSpan ts);

[VB] Public Function Add(ByVal ts As TimeSpan) As TimeSpan

[JScript] public function Add(ts: TimeSpan): TimeSpan;

Description

Adds the specified TimeSpan to this instance.

Return Value: A TimeSpan that represents the value of this instance plus the value of ts.

The result must be between System.TimeSpan.MinValue and System.TimeSpan.MaxValue, otherwise an exception is thrown. A TimeSpan instance.

Compare

[C#] public static int Compare(TimeSpan t1, TimeSpan t2);

[C++] public: static int Compare(TimeSpan t1, TimeSpan t2);

[VB] Public Shared Function Compare(ByVal t1 As TimeSpan, ByVal t2 As TimeSpan) As Integer

[JScript] public static function Compare(t1: TimeSpan, t2: TimeSpan): int;

Description

Compares two TimeSpan values and returns an integer that indicates their relationship.

Return Value: Value Condition−1 t1 is less than t2 0 t1 is equal to t2 1 t1 is greater than t2 The first TimeSpan instance. The second TimeSpan instance.

CompareTo

[C#] public int CompareTo(object value);

[C++] public: _sealed int CompareTo(Object* value);

[VB] NotOverridable Public Function CompareTo(ByVal value As Object) As Integer

[JScript] public function CompareTo(value: Object): int;

Description

Compares this instance to a specified object and returns an indication of their relative values.

Return Value: Value Condition−1 The value of this instance is less than the value of value.

Any instance of TimeSpan, regardless of its value, is considered greater than null. An object to compare, or null.

Duration

[C#] public TimeSpan Duration( );

[C++] public: TimeSpan Duration( );

[VB] Public Function Duration( ) As TimeSpan

[JScript] public function Duration( ): TimeSpan;

Description

Returns a TimeSpan whose value is the absolute value of this instance.

Return Value: A TimeSpan whose value is the value of this instance and converted if necessary to a positive number.

The value of a TimeSpan, which is the number of ticks it contains, can be positive or negative.

Equals

[C#] public override bool Equals(object value);

[C++] public: bool Equals(Object* value);

[VB] Overrides Public Function Equals(ByVal value As Object) As Boolean

[JScript] public override function Equals(value: Object): Boolean; Returns a value indicating whether two instances of TimeSpan are equal.

Description

Returns a value indicating whether this instance is equal to a specified object.

Return Value: true if value is a TimeSpan that represents the same time as this instance; otherwise, false. An object to compare with this instance.

Equals

[C#] public static new bool Equals(TimeSpan t1, TimeSpan t2);

[C++] public: static bool Equals(TimeSpan t1, TimeSpan t2);

[VB] Shadows Public Shared Function Equals(ByVal t1 As TimeSpan, ByVal t2 As TimeSpan) As Boolean

[JScript] public static hide function Equals(t1: TimeSpan, t2: TimeSpan): Boolean;

Description

Returns a value indicating whether two specified instances of TimeSpan are equal.

Return Value: true if the values of t1 and t2 are equal; otherwise, false. An instance of TimeSpan. An instance of TimeSpan.

FromDays

[C#] public static TimeSpan FromDays(double value);

[C++] public: static TimeSpan FromDays(double value);

[VB] Public Shared Function FromDays(ByVal value As Double) As TimeSpan

[JScript] public static function FromDays(value: double): TimeSpan;

Description

Returns a TimeSpan that represents a specified number of days, where the specification is accurate to the nearest millisecond.

Return Value: A TimeSpan that represents value.

If value is System.Double.PositiveInfinity, System.TimeSpan.MaxValue is returned. If value is System.Double.NegativeInfinity or System.Double.NaN, System.TimeSpan.MinValue is returned. A number of days, accurate to the nearest millisecond.

FromHours

[C#] public static TimeSpan FromHours(double value);

[C++] public: static TimeSpan FromHours(double value);

[VB] Public Shared Function FromHours(ByVal value As Double) As TimeSpan

[JScript] public static function FromHours(value: double): TimeSpan;

Description

Returns a TimeSpan that represents a specified number of hours, where the specification is accurate to the nearest millisecond.

Return Value: A TimeSpan that represents value.

If value is System.Double.PositiveInfinity, System.TimeSpan.MaxValue is returned. If value is System.Double.

NegativeInfinity or System.Double.NaN, System.TimeSpan.MinValue is returned. A number of hours accurate to the nearest millisecond.

FromMilliseconds

[C#] public static TimeSpan FromMilliseconds(double value);

[C++] public: static TimeSpan FromMilliseconds(double value);

[VB] Public Shared Function FromMilliseconds(ByVal value As Double) As TimeSpan

[JScript] public static function FromMilliseconds(value: double): TimeSpan;

Description

Returns a TimeSpan that represents a specified number of milliseconds.

Return Value: A TimeSpan that represents value.

If value is System.Double.PositiveInfinity, System.TimeSpan.MaxValue is returned. If value is System.Double.NegativeInfinity or System.Double.NaN, System.TimeSpan.MinValue is returned. A number of milliseconds.

FromMinutes

[C#] public static TimeSpan FromMinutes(double value);

[C++] public: static TimeSpan FromMinutes(double value);

[VB] Public Shared Function FromMinutes(ByVal value As Double) As TimeSpan

[JScript] public static function FromMinutes(value: double): TimeSpan;

Description

Returns a TimeSpan that represents a specified number of minutes, where the specification is accurate to the nearest millisecond.

Return Value: A TimeSpan that represents value.

If value is System.Double.PositiveInfinity, System.TimeSpan.MaxValue is returned. If value is System.Double.NegativeInfinity or System.Double.NaN, System.TimeSpan.MinValue is returned. A number of minutes, accurate to the to nearest millisecond.

FromSeconds

[C#] public static TimeSpan FromSeconds(double value);

[C++] public: static TimeSpan FromSeconds(double value);

[VB] Public Shared Function FromSeconds(ByVal value As Double) As TimeSpan

[JScript] public static function FromSeconds(value: double): TimeSpan;

Description

Returns a TimeSpan that represents a specified number of seconds, where the specification is accurate to the nearest millisecond.

Return Value: A TimeSpan that represents value.

If value is System.Double.PositiveInfinity, System.TimeSpan.MaxValue is returned. If value is System.Double.NegativeInfinity or System.Double.NaN, System.TimeSpan.MinValue is returned. A number of seconds, accurate to the nearest millisecond.

FromTicks

[C#] public static TimeSpan FromTicks(long value);

[C++] public: static TimeSpan FromTicks(_int64 value);

[VB] Public Shared Function FromTicks(ByVal value As Long) As TimeSpan

[JScript] public static function FromTicks(value: long): TimeSpan;

Description

Returns a TimeSpan that represents a specified time, where the specification is in units of ticks.

Return Value: A TimeSpan with a value of value.

This is a convenience method with the same behavior as the System.TimeSpan.#ctor constructor. A number of ticks that represent a time.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns a hash code for this instance.

Return Value: A 32-bit signed integer hash code.

Two TimeSpan objects might have the same hash code even though they represent different time values.

Negate

[C#] public TimeSpan Negate( );

[C++] public: TimeSpan Negate( );

[VB] Public Function Negate( ) As TimeSpan

[JScript] public function Negate( ): TimeSpan;

Description

Returns a TimeSpan whose value is the negated value of this instance.

Return Value: The same numeric value as this instance, but with the opposite sign.

op_Addition

[C#] public static TimeSpan operator+(TimeSpan t1, TimeSpan t2);

[C++] public: static TimeSpan op_Addition(TimeSpan t1, TimeSpan t2);

[VB] returnValue=TimeSpan.op_Addition(t1, t2)

[JScript] returnValue=t1+t2;

Description

Adds two specified TimeSpan instances.

Return Value: A TimeSpan whose value is the sum of the values of t1 and t2. A TimeSpan A TimeSpan op_Equality

[C#] public static bool operator==(TimeSpan t1, TimeSpan t2);

[C++] public: static bool op_Equality(TimeSpan t1, TimeSpan t2);

[VB] returnValue=TimeSpan.op_Equality(t1, t2)

[JScript] returnValue=t1==t2;

Description

Indicates whether two TimeSpan instances are equal.

Return Value: true if the values of t1 and t2 are equal; otherwise, false. A TimeSpan A TimeSpan op_GreaterThan

[C#] public static bool operator>(TimeSpan t1, TimeSpan t2);

[C++] public: static bool op_GreaterThan(TimeSpan t1, TimeSpan t2);

[VB] returnValue=TimeSpan.op_GreaterThan(t1, t2)

[JScript] returnValue=t1>t2;

Description

Indicates whether a specified TimeSpan is greater than another specified TimeSpan.

Return Value: true if the value of t1 is greater than the value of t2; otherwise, false. A TimeSpan A TimeSpan op_GreaterThanOrEqual

[C#] public static bool operator>=(TimeSpan t1, TimeSpan t2);

[C++] public: static bool op_GreaterThanOrEqual (TimeSpan t1, TimeSpan t2);

[VB] returnValue=TimeSpan.op_GreaterThanOrEqual(t1, t2)

[JScript] returnValue=t1>=t2;

Description

Indicates whether a specified TimeSpan is greater than or equal to another specified TimeSpan.

Return Value: true if the value of t1 is greater than or equal to the value of t2; otherwise, false. A TimeSpan A TimeSpan op_Inequality

[C#] public static bool operator !=(TimeSpan t1, TimeSpan t2);

[C++] public: static bool op_Inequality(TimeSpan t1, TimeSpan t2);

[VB] returnValue=TimeSpan.op_Inequality(t1, t2)

[JScript] returnValue=t1 !=t2;

Description

Indicates whether two TimeSpan instances are not equal.

Return Value: true if the values of t1 and t2 are not equal; otherwise, false. A TimeSpan A TimeSpan op_LessThan

[C#] public static bool operator

[C++] public: static bool op_LessThan(TimeSpan t1, TimeSpan t2);

[VB] returnValue=TimeSpan.op_LessThan(t1, t2)

[JScript] returnValue=t1<t2;

Description

Indicates whether a specified TimeSpan is less than another specified TimeSpan.

Return Value: true if the value of t1 is less than the value of t2; otherwise, false. A TimeSpan A TimeSpan op_LessThanOrEqual

[C#] public static bool operator<=(TimeSpan t1, TimeSpan t2);

[C++] public: static bool op_LessThanOrEqual(TimeSpan t1, TimeSpan t2);

[VB] returnValue=TimeSpan.op_LessThanOrEqual(t1, t2)

[JScript] returnValue=t1<=t2;

Description

Indicates whether a specified TimeSpan is less than or equal to another specified TimeSpan.

Return Value: true if the value of t1 is less than or equal to the value of t2; otherwise, false. A TimeSpan A TimeSpan op_Subtraction

[C#] public static TimeSpan operator−(TimeSpan t1, TimeSpan t2);

[C++] public: static TimeSpan op_Subtraction(TimeSpan t1, TimeSpan t2);

[VB] returnValue=TimeSpan.op_Subtraction(t1, t2)

[JScript] returnValue=t1−t2;

Description

Subtracts a specified TimeSpan from another specified TimeSpan.

Return Value: A TimeSpan whose value is the result of the value of t1 minus the value of t2. A TimeSpan A TimeSpan op_UnaryNegation

[C#] public static TimeSpan operator−(TimeSpan t);

[C++] public: static TimeSpan op_UnaryNegation (TimeSpan t);

[VB] returnValue=TimeSpan.op_UnaryNegation(t)

[JScript] returnValue=−t;

Description

Returns a TimeSpan whose value is the negated value of the specified instance.

Return Value: A TimeSpan with the same numeric value as this instance, but the opposite sign. A TimeSpan op_UnaryPlus

[C#] public static TimeSpan operator+(TimeSpan t);

[C++] public: static TimeSpan op_UnaryPlus(TimeSpan t);

[VB] returnValue=TimeSpan.op_UnaryPlus(t)

[JScript] returnValue=+t;

Description

Returns the specified instance of TimeSpan.

Return Value: Returns t. A TimeSpan

Parse

[C#] public static TimeSpan Parse(string s);

[C++] public: static TimeSpan Parse(String* s);

[VB] Public Shared Function Parse(ByVal s As String) As TimeSpan

[JScript] public static function Parse(s: String): TimeSpan;

Description

Constructs a TimeSpan from a time indicated by a specified String.

Return Value: A TimeSpan that corresponds to s.

s contains a specification of the form: [ws][−][d.]hh:mm:ss[.ff][ws] Items in square brackets ('[' and ']') are optional, colons and periods (':' and '.') are literal characters, and other items are as follows. A String.

Subtract

[C#] public TimeSpan Subtract(TimeSpan ts);

[C++] public: TimeSpan Subtract(TimeSpan ts);

[VB] Public Function Subtract(ByVal ts As TimeSpan) As TimeSpan

[JScript] public function Subtract(ts: TimeSpan): TimeSpan;

Description

Subtracts the specified TimeSpan object from this instance.

Return Value: A TimeSpan whose value is the result of the value of this instance minus the value of ts.

The result must be between System.TimeSpan.MinValue and System.TimeSpan.MaxValue, otherwise an exception is thrown. A TimeSpan instance.

ToString

[C#] public override string ToString( );

[C++] public: String* ToString( );

[VB] Overrides Public Function ToString( ) As String

[JScript] public override function ToString( ): String; Returns the String representation of the value of this instance.

Description

Returns the String representation of the value of this instance.

Return Value: A System.String that represents the value of this instance. The format of the return value is of the form: [−][d.]hh:mm:ss[.ff] Items in square brackets ('[' and ']') are optional, colons and periods (':' and '.') are literal characters, and other items are as follows.

The return value of this method can be consumed by System.TimeSpan.Parse(System.String).

TimeZone class (System)

ToString

Description

Represents a time zone.

A time zone is a geographical region in which the same standard time is used.

TimeZone

Example Syntax:

ToString

[C#] protected TimeZone( );

[C++] protected: TimeZone( );

[VB] Protected Sub New( )

[JScript] protected function TimeZone( );

Description

Initializes a new instance of the System.TimeZone class.

CurrentTimeZone

ToString

[C#] public static TimeZone CurrentTimeZone {get;}

[C++] public: _property static TimeZone* get_CurrentTimeZone( );

[VB] Public Shared ReadOnly Property CurrentTimeZone As TimeZone

[JScript] public static function get CurrentTimeZone( ): TimeZone;

Description

Gets the time zone of the current computer system.

DaylightName

ToString

[C#] public abstract string DaylightName {get;}

[C++] public: _property virtual String* get_DaylightName( )=0;

[VB] MustOverride Public ReadOnly Property DaylightName As String

[JScript] public abstract function get DaylightName( ): String;

Description

Gets the daylight saving time zone name.

If daylight saving time is not used in the time zone, an empty string (" ") is returned.

StandardName

ToString

[C#] public abstract string StandardName {get;}

[C++] public: _property virtual String* get_StandardName( )=0;

[VB] MustOverride Public ReadOnly Property StandardName As String

[JScript] public abstract function get StandardName( ): String;

Description

Gets the standard time zone name.

GetDaylightChanges

[C#] public abstract DaylightTime GetDaylightChanges(int year);

[C++] public: virtual DaylightTime* GetDaylightChanges (int year)=0;

[VB] MustOverride Public Function GetDaylightChanges (ByVal year As Integer) As DaylightTime

[JScript] public abstract function GetDaylightChanges(year: int): DaylightTime;

Description

Returns the daylight saving time period for a particular year.

Return Value: A System.Globalization.DaylightTime instance containing the start and end date for daylight saving time in year.

Only one daylight saving time period per year is supported. If daylight saving time is not used in the current time zone, null is returned. The year to which the daylight saving time period applies.

GetUtcOffset

[C#] public abstract TimeSpan GetUtcOffset(DateTime time);

[C++] public: virtual TimeSpan GetUtcOffset(DateTime time)=0;

[VB] MustOverride Public Function GetUtcOffset(ByVal time As DateTime) As TimeSpan

[JScript] public abstract function GetUtcOffset(time: DateTime): TimeSpan;

Description

Returns the coordinated universal time (UTC) offset for the specified local time.

Return Value: The UTC offset from time, measured in ticks.

Coordinated universal time (UTC) was previously known as Greenwich Mean Time (GMT). "Local time" is the date and time on the computer you are using. "Offset" is the difference between local time and UTC. That is: local time=UTC+offset time must be in the Gregorian calendar and the time zone represented by this instance. If time is in daylight saving time, this method returns the UTC offset to the daylight saving time zone. This method obtains the daylight saving time rule from the system. The local date and time.

IsDaylightSavingTime

[C#] public virtual bool IsDaylightSavingTime(DateTime time);

[C++] public: virtual bool IsDaylightSavingTime(DateTime time);

[VB] Overridable Public Function IsDaylightSavingTime (ByVal time As DateTime) As Boolean

[JScript] public function IsDaylightSavingTime(time: DateTime): Boolean;

Returns a value indicating whether a specified date and time is within a daylight saving time period.

Description

Returns a value indicating whether the specified date and time is within a daylight saving time period.

Return Value: true if time is in a daylight saving time period; false otherwise, or if time is null.

The year to which the daylight saving time period applies is derived from time. A date and time.

IsDaylightSavingTime

[C#] public static bool IsDaylightSavingTime(DateTime time, DaylightTime daylightTimes);

[C++] public: static bool IsDaylightSavingTime(DateTime time, DaylightTime* daylightTimes);

[VB] Public Shared Function IsDaylightSavingTime(ByVal time As DateTime, ByVal daylightTimes As DaylightTime) As Boolean

[JScript] public static function IsDaylightSavingTime(time: DateTime, daylightTimes: DaylightTime): Boolean;

Description

Returns a value indicating whether the specified date and time is within the specified daylight saving time period.

Return Value: true if time is in daylightTimes; otherwise, false. A date and time. A daylight saving time period.

ToLocalTime

[C#] public virtual DateTime ToLocalTime(DateTime time);

[C++] public: virtual DateTime ToLocalTime(DateTime time);

[VB] Overridable Public Function ToLocalTime(ByVal time As DateTime) As DateTime

[JScript] public function ToLocalTime(time: DateTime): DateTime;

Description

Returns the local time that corresponds to a specified coordinated universal time (UTC).

Return Value: A System.DateTime instance whose value is the local time that corresponds to time.

Coordinated universal time (UTC) was previously known as Greenwich Mean Time (GMT). "Local time" is the date and time on the computer you are using. "Offset" is the difference between local time and GMT. That is: local time=UTC+offset A UTC time.

ToUniversalTime

[C#] public virtual DateTime ToUniversalTime(DateTime time);

[C++] public: virtual DateTime ToUniversalTime(DateTime time);

[VB] Overridable Public Function ToUniversalTime(ByVal time As DateTime) As DateTime

[JScript] public function ToUniversalTime(time: DateTime): DateTime;

Description

Returns the coordinated universal time (UTC) that corresponds to a specified local time.

Return Value: A System.DateTime instance whose value is the UTC time that corresponds to time.

Coordinated universal time (UTC) was previously known as Greenwich Mean Time (GMT). "Local time" is the date and time on the computer you are using. "Offset" is the difference between local time and UTC. That is: UTC=local time−offset The local date and time.

Type class (System)

ToUniversalTime

Description

Represents type declarations: class types, interface types, array types, value types, and enumeration types.

Type is the root of all reflection operations and the object that represents a type inside the system.

ToUniversalTime

[C#] public static readonly char Delimiter;

[C++] public: static _wchar_t Delimiter;

[VB] Public Shared ReadOnly Delimiter As Char

[JScript] public static var Delimiter: Char;

Description

Separates names in the namespace of the System.Type. This field is read-only.

ToUniversalTime

[C#] public static readonly Type[ ] EmptyTypes;

[C++] public: static Type* EmptyTypes[ ];

[VB] Public Shared ReadOnly EmptyTypes( ) As Type

[JScript] public static var EmptyTypes: Type[ ];

Description

Represents an empty array of type System.Type. This field is read-only.

ToUniversalTime

[C#] public static readonly MemberFilter FilterAttribute;

[C++] public: static MemberFilter* FilterAttribute;

[VB] Public Shared ReadOnly FilterAttribute As MemberFilter

[JScript] public static var FilterAttribute: MemberFilter;

Description

Represents the member filter used on attributes. This field is read-only. This field holds a reference to the delegate used by the System.Type.FindMembers(System.Reflection.MemberTypes,System.Reflection. BindingFlags,System.Reflection.MemberFilter,System.Object) method. The method encapsulated by this delegate takes two parameters: the first is a System.Reflection.MemberInfo object and the second is an Object. The method determines whether the MemberInfo object matches the criteria specified by the Object. The Object may be assigned the value of any one of the fields on the classes System.Reflection.FieldAttributes, System.Reflection.MethodAttributes, or System.Reflection.MethodImplAttributes.

ToUniversalTime

[C#] public static readonly MemberFilter FilterName;

[C++] public: static MemberFilter* FilterName;

[VB] Public Shared ReadOnly FilterName As MemberFilter

[JScript] public static var FilterName: MemberFilter;

Description

Represents the case-sensitive member filter used on names. This field is read-only.

This field holds a reference to the delegate used by the System.Type.FindMembers(System.Reflection.MemberTypes,System.Reflection.BindingFlags,System.Reflection.MemberFilter,System.Object) method. The method encapsulated by this delegate takes two parameters: the first is a System.Reflection.MemberInfo object and the second is an Object. The method determines whether the MemberInfo object matches the criteria specified by the Object. The Object is assigned a string value, which may include a trailing "*" wildcard character. Only wildcard end string matching is supported.

ToUniversalTime

[C#] public static readonly MemberFilter FilterNameIgnoreCase;

[C++] public: static MemberFilter* FilterNameIgnoreCase;

[VB] Public Shared ReadOnly FilterNameIgnoreCase As MemberFilter

[JScript] public static var FilterNameIgnoreCase: MemberFilter;

Description

Represents the case-insensitive member filter used on names. This field is read-only.

This field holds a reference to the delegate used by the System.Type.FindMembers(System.Reflection.MemberTypes,System.Reflection.BindingFlags,System.Reflection.MemberFilter,System.Object) method. The method encapsulated by this delegate takes two parameters: the first is a System.Reflection.MemberInfo object and the second is an Object. The method determines whether the MemberInfo object matches the criteria specified by the Object. The Object is assigned a string value, which may include a trailing "*" wildcard character. Only wildcard end string matching is supported.

ToUniversalTime

[C#] public static readonly object Missing;

[C++] public: static Object* Missing;

[VB] Public Shared ReadOnly Missing As Object

[JScript] public static var Missing: Object;

Description

Represents a missing value in the System.Type information. This field is read-only.

Use the Missing field to obtain the default value of a parameter. If the Missing field is passed in for a parameter value and there is no default value for that parameter, an System.ArgumentException is thrown.

Type

Example Syntax:

ToUniversalTime

[C#] protected Type( );

[C++] protected: Type( );

[VB] Protected Sub New( )

[JScript] protected function Type( );

Description

Initializes a new instance of the System.Type class.

This constructor is invoked by derived classes during the construction of type objects.

Assembly

ToUniversalTime

[C#] public abstract Assembly Assembly {get;}

[C++] public: _property virtual Assembly* get_Assembly( )=0;

[VB] MustOverride Public ReadOnly Property Assembly As Assembly

[JScript] public abstract function get Assembly( ): Assembly;

Description

Gets the System.Reflection.Assembly associated with a class.

AssemblyQualifiedName

ToUniversalTime

[C#]public abstract string AssemblyQualifiedName {get;}

[C++] public: _property virtual String* get_AssemblyQualifiedName( )=0;

[VB] MustOverride Public ReadOnly Property AssemblyQualifiedName As String

[JScript] public abstract function get AssemblyQualifiedName( ): String;

Description

Gets the fully qualified name of the System.Type, including the name of the assembly from which the System.Type was loaded.

All compilers that support the common language runtime will emit the simple name of a nested class, and reflection constructs a mangled name when queried, in accordance with the following conventions.

Attributes

ToUniversalTime

[C#] public TypeAttributes Attributes {get;}

[C++] public: _property TypeAttributes get_Attributes( );

[VB] Public ReadOnly Property Attributes As TypeAttributes

[JScript] public function get Attributes( ): TypeAttributes;

Description

Gets the attributes associated with the System.Type.

BaseType

ToUniversalTime

[C#] public abstract Type BaseType {get;}

[C++] public: _property virtual Type* get_BaseType( )=0;

[VB] MustOverride Public ReadOnly Property BaseType As Type

[JScript] public abstract function get BaseType( ): Type;

Description

Gets the type from which the current System.Type directly inherits.

The base type is the type from which the current type directly inherits.

DeclaringType

ToUniversalTime

[C#] public override Type DeclaringType {get;}

[C++] public: _property virtual Type* get_DeclaringType( );

[VB] Overrides Public ReadOnly Property DeclaringType As Type

[JScript] public function get DeclaringType( ): Type;

Description

Gets the class that declares this member.

This property implements the abstract property inherited from System.Reflection.MemberInfo.

DefaultBinder

ToUniversalTime

[C#] public static Binder DefaultBinder {get;}

[C++] public: _property static Binder* get_DefaultBinder( );

[VB] Public Shared ReadOnly Property DefaultBinder As Binder

[JScript] public static function get DefaultBinder( ): Binder;

Description

Gets the default binder used by the system.

Reflection models the accessibility rules of the common type system. For example, if the caller is in the same assembly, the caller does not need special permissions for internal members. Otherwise, the caller needs System.Security.Permissions.ReflectionPermission. This is consistent with lookup of members that are protected, private, and so on.

FullName

ToUniversalTime

[C#] public abstract string FullName {get;}

[C++] public: _property virtual String* get_FullName( )=0;

[VB] MustOverride Public ReadOnly Property FullName As String

[JScript] public abstract function get FullName( ): String;

Description

Gets the fully qualified name of the System.Type, including the namespace of the System.Type.

All compilers that support the common language runtime will emit the simple name of a nested class, and reflection constructs a mangled name when queried, in accordance with the following conventions.

GUID

ToUniversalTime

[C#] public abstract Guid GUID {get;}

[C++] public: _property virtual Guid get_GUID( )=0;

[VB] MustOverride Public ReadOnly Property GUID As Guid

[JScript] public abstract function get GUID( ): Guid;

Description

Gets the GUID associated with the System.Type.

HasElementType

ToUniversalTime

[C#] public bool HasElementType {get;}

[C++] public: _property bool get_HasElementType( );

[VB] Public ReadOnly Property HasElementType As Boolean

[JScript] public function get HasElementType( ): Boolean;

Description

Gets a value indicating whether the current System.Type encompasses or refers to another type; that is, whether the current System.Type is an array, a pointer, or is passed by reference.

For example, Type.GetType("Int32[ ]").HasElementType returns true, but Type.GetType("Int32").HasElementType returns false. HasElementType also returns true for "Int32*" and "Int32&".

IsAbstract

ToUniversalTime

[C#] public bool IsAbstract {get;}

[C++] public: _property bool get_IsAbstract( );

[VB] Public ReadOnly Property IsAbstract As Boolean

[JScript] public function get IsAbstract( ): Boolean;

Description

Gets a value indicating whether the System.Type is abstract and must be overridden.

IsAnsiClass

ToUniversalTime

[C#] public bool IsAnsiClass {get;}

[C++] public: _property bool get_IsAnsiClass( );

[VB] Public ReadOnly Property IsAnsiClass As Boolean

[JScript] public function get IsAnsiClass( ): Boolean;

Description

Gets a value indicating whether the string format attribute AnsiClass is selected for the System.Type.

The System.Reflection.TypeAttributes. StringFormatMask selects the string format attributes. The string format attributes enhance interoperability by defining how strings should be interpreted.

IsArray

ToUniversalTime

[C#] public bool IsArray {get;}

[C++] public: _property bool get_IsArray( );

[VB] Public ReadOnly Property IsArray As Boolean

[JScript] public function get IsArray( ): Boolean;

Description

Gets a value indicating whether the System.Type is an array.

An instance of the System.Array class will return false because it is an object, not an array.

IsAutoClass

ToUniversalTime

[C#] public bool IsAutoClass {get;}

[C++] public: _property bool get_IsAutoClass( );

[VB] Public ReadOnly Property IsAutoClass As Boolean

[JScript] public function get IsAutoClass( ): Boolean;

Description

Gets a value indicating whether the string format attribute AutoClass is selected for the System.Type.

The System.Reflection.TypeAttributes. StringFormatMask selects the string format attributes. The string format attributes enhance interoperability by defining how strings should be interpreted.

IsAutoLayout

ToUniversalTime

[C#] public bool IsAutoLayout {get;}

[C++] public: _property bool get_IsAutoLayout( );

[VB] Public ReadOnly Property IsAutoLayout As Boolean

[JScript] public function get IsAutoLayout( ): Boolean;

Description

Gets a value indicating whether the class layout attribute AutoLayout is selected for the System.Type.

The System.Reflection.TypeAttributes.LayoutMask is used to select the class layout attributes. The class layout attributes(AutoLayout, SequentialLayout and ExplicitLayout) define how the fields of the class instance are laid out in memory.

IsByRef

ToUniversalTime

[C#] public bool IsByRef {get;} [C++] public: _property bool get_IsByRef( );

[VB] Public ReadOnly Property IsByRef As Boolean

[JScript] public function get IsByRef( ): Boolean;

Description

Gets a value indicating whether the System.Type is passed by reference.

IsClass

ToUniversalTime

[C#] public bool IsClass {get;}

[C++] public: _property bool get_IsClass( );

[VB] Public ReadOnly Property IsClass As Boolean

[JScript] public function get IsClass( ): Boolean;

Description

Gets a value indicating whether the System.Type is a class; that is, not a value type or interface.

The System.Reflection.TypeAttributes.ClassSemanticsMask distinguishes a type declaration as class, interface, or value type.

IsCOMObject

ToUniversalTime

[C#] public bool IsCOMObject {get;}

[C++] public: _property bool get_IsCOMObject( );

[VB] Public ReadOnly Property IsCOMObject As Boolean

[JScript] public function get IsCOMObject( ): Boolean;

Description

Gets a value indicating whether the System.Type is a COM object.

This method returns false for COM interfaces because they are not objects. COM interfaces can be implemented by Microsoft.NET Framework objects.

IsContextful

ToUniversalTime

[C#] public bool IsContextful {get;}

[C++] public: _property bool get_IsContextful( );

[VB] Public ReadOnly Property IsContextful As Boolean

[JScript] public function get IsContextful( ): Boolean;

Description

Gets a value indicating whether the System.Type can be hosted in a context.

A context intercepts calls to the class members and enforces policies that are applied to the class, such as synchronization. For more detailed information on remoting contexts, see System.Runtime.Remoting.Contexts.Context.

IsEnum

ToUniversalTime

[C#] public bool IsEnum {get;}

[C++] public: _property bool get_IsEnum( );

[VB] Public ReadOnly Property IsEnum As Boolean

[JScript] public function get IsEnum( ): Boolean;

Description

Gets a value indicating whether the System.Type is an enumeration.

For example, GetType(Enum).IsEnum( ) returns false because System.Enum is an object, not an enumeration.

IsExplicitLayout

ToUniversalTime

[C#] public bool IsExplicitLayout {get;}

[C++] public: _property bool get_IsExplicitLayout( );

[VB] Public ReadOnly Property IsExplicitLayout As Boolean

[JScript] public function get IsExplicitLayout( ): Boolean;

Description

Gets a value indicating whether the class layout attribute ExplicitLayout is selected for the System.Type.

The System.Reflection.TypeAttributes.LayoutMask is used to select the class layout attributes. The class layout attributes (AutoLayout, SequentialLayout and ExplicitLayout) define how the fields of the class instance are laid out in memory.

IsImport

ToUniversalTime

[C#] public bool IsImport {get;}

[C++] public: _property bool get_IsImport( );

[VB] Public ReadOnly Property IsImport As Boolean

[JScript] public function get IsImport( ): Boolean;

Description

Gets a value indicating whether the System.Type was imported from another class.

IsInterface

ToUniversalTime

[C#] public bool IsInterface {get;}

[C++] public: _property bool get_IsInterface( );

[VB] Public ReadOnly Property IsInterface As Boolean

[JScript] public function get IsInterface( ): Boolean;

Description

Gets a value indicating whether the System.Type is an interface; that is, not a class or a value type.

The System.Reflection.TypeAttributes.ClassSemanticsMask distinguishes a type declaration as class, interface or value type.

IsLayoutSequential

ToUniversalTime

[C#] public bool IsLayoutSequential {get;}

[C++] public: _property bool get_IsLayoutSequential( );

[VB] Public ReadOnly Property IsLayoutSequential As Boolean

[JScript] public function get IsLayoutSequential( ): Boolean;

Description

Gets a value indicating whether the class layout attribute SequentialLayout is selected for the System.Type.

The System.Reflection.TypeAttributes.LayoutMask is used to select the class layout attributes. The class layout attributes (AutoLayout, SequentialLayout and ExplicitLayout) define how the fields of the class instance are laid out in memory.

IsMarshalByRef

ToUniversalTime

[C#] public bool IsMarshalByRef {get;}

[C++] public: _property bool get_IsMarshalByRef( );

[VB] Public ReadOnly Property IsMarshalByRef As Boolean

[JScript] public function get IsMarshalByRef( ): Boolean;

Description

Gets a value indicating whether the Type is marshaled by reference.

IsNestedAssembly

ToUniversalTime

[C#] public bool IsNestedAssembly {get;}

[C++] public: _property bool get_IsNestedAssembly( );

[VB] Public ReadOnly Property IsNestedAssembly As Boolean

[JScript] public function get IsNestedAssembly( ): Boolean;

Description

Gets a value indicating whether the System.Type is nested and visible only within its own assembly. The System.Reflection.TypeAttributes.VisibilityMask selects the visibility attributes.

IsNestedFamANDAssem

ToUniversalTime

[C#] public bool IsNestedFamANDAssem {get;}

[C++] public: _property bool get_IsNestedFamANDAssem( );

[VB] Public ReadOnly Property IsNestedFamANDAssem As Boolean

[JScript] public function get IsNestedFamANDAssem( ): Boolean;

Description

Gets a value indicating whether the System.Type is nested and visible only to classes that belong to both its own family and its own assembly.

The System.Reflection.TypeAttributes.VisibilityMask selects the visibility attributes.

IsNestedFamily

ToUniversalTime

[C#] public bool IsNestedFamily {get;}

[C++] public: _property bool get_IsNestedFamily( );

[VB] Public ReadOnly Property IsNestedFamily As Boolean

[JScript] public function get IsNestedFamily( ): Boolean;

Description

Gets a value indicating whether the System.Type is nested and visible only within its own family.

The System.Reflection.TypeAttributes.VisibilityMask selects the visibility attributes.

IsNestedFamORAssem

ToUniversalTime

[C#] public bool IsNestedFamORAssem {get;}

[C++] public: _property bool get_IsNestedFamORAssem( );

[VB] Public ReadOnly Property IsNestedFamORAssem As Boolean

[JScript] public function get IsNestedFamORAssem( ): Boolean;

Description

Gets a value indicating whether the System.Type is nested and visible only to classes that belong to either its own family or to its own assembly.

The System.Reflection.TypeAttributes.VisibilityMask selects the visibility attributes.

IsNestedPrivate

ToUniversalTime

[C#] public bool IsNestedPrivate {get;}

[C++] public: _property bool get_IsNestedPrivate( );

[VB] Public ReadOnly Property IsNestedPrivate As Boolean

[JScript] public function get IsNestedPrivate( ): Boolean;

Description

Gets a value indicating whether the System.Type is nested and declared private.

The System.Reflection.TypeAttributes.VisibilityMask selects the visibility attributes.

IsNestedPublic

ToUniversalTime

[C#] public bool IsNestedPublic {get;}

[C++] public: _property bool get_IsNestedPublic( );

[VB] Public ReadOnly Property IsNestedPublic As Boolean

[JScript] public function get IsNestedPublic( ): Boolean;

Description

Gets a value indicating whether the System.Type is nested and declared public.

The System.Reflection.TypeAttributes.VisibilityMask selects the visibility attributes.

IsNotPublic

ToUniversalTime

[C#] public bool IsNotPublic {get;}

[C++] public: _property bool get_IsNotPublic( );

[VB] Public ReadOnly Property IsNotPublic As Boolean

[JScript] public function get IsNotPublic( ): Boolean;

Description

Gets a value indicating whether the top-level System.Type is not declared public.

IsPublic and IsNotPublic get the visibility of the top-level type only.

IsPointer

ToUniversalTime

[C#] public bool IsPointer {get;}

[C++] public: _property bool get_IsPointer( );

[VB] Public ReadOnly Property IsPointer As Boolean

[JScript] public function get IsPointer( ): Boolean;

Description

Gets a value indicating whether the System.Type is a pointer.

IsPrimitive

ToUniversalTime

[C#] public bool IsPrimitive {get;}

[C++] public: _property bool get_IsPrimitive( );

[VB] Public ReadOnly Property IsPrimitive As Boolean

[JScript] public function get IsPrimitive( ): Boolean;

Description

Gets a value indicating whether the System.Type is one of the primitive types.

The primitive types are System.Boolean, System.Byte, System.SByte, System.Int16, System.UInt16, System.Int32, System.UInt32, System.Int64, System.UInt64, System.Char, System.Double, and System.Single.

IsPublic

ToUniversalTime

[C#] public bool IsPublic {get;}

[C++] public: _property bool get_IsPublic( );

[VB] Public ReadOnly Property IsPublic As Boolean

[JScript] public function get IsPublic( ): Boolean;

Description

Gets a value indicating whether the top-level System.Type is declared public.

IsPublic and IsNotPublic get the visibility of the top-level type only.

IsSealed

ToUniversalTime

[C#] public bool IsSealed {get;}

[C++] public: _property bool get_IsSealed( );

[VB] Public ReadOnly Property IsSealed As Boolean

[JScript] public function get IsSealed( ): Boolean;

Description

Gets a value indicating whether the System.Type is declared sealed.

IsSerializable

ToUniversalTime

[C#] public bool IsSerializable {get;}

[C++] public: _property bool get_IsSerializable( );

[VB] Public ReadOnly Property IsSerializable As Boolean

[JScript] public function get IsSerializable( ): Boolean;

Description

Gets a value indicating whether the System.Type is serializable.

IsSpecialName

ToUniversalTime

[C#] public bool IsSpecialName {get;}

[C++] public: _property bool get_IsSpecialName( );

[VB] Public ReadOnly Property IsSpecialName As Boolean

[JScript] public function get IsSpecialName( ): Boolean;

Description

Gets a value indicating whether the System.Type has a name that requires special handling.

Names that begin with or contain an underscore character ($_{13}$), property accessors, and operator overloading methods are examples of types that might require special treatment by some compilers.

IsUnicodeClass

ToUniversalTime

[C#] public bool IsUnicodeClass {get;}

[C++] public: _property bool get_IsUnicodeClass( );

[VB] Public ReadOnly Property IsUnicodeClass As Boolean

[JScript] public function get IsUnicodeClass( ): Boolean;

Description

Gets a value indicating whether the string format attribute UnicodeClass is selected for the System.Type.

The System.Reflection.TypeAttributes.String FormatMask is used to select the string format attributes. The string format attributes enhance interoperability by defining how strings should be interpreted.

IsValueType

ToUniversalTime

[C#] public bool IsValueType {get;}

[C++] public: _property bool get_IsValueType( );

[VB] Public ReadOnly Property IsValueType As Boolean

[JScript] public function get IsValueType( ): Boolean;

Description

Gets a value indicating whether the System.Type is a value type.

Value types are those that are represented as sequences of bits; value types are not classes or interfaces. These are referred to as "structs" in some programming languages. Enums are a special case of value types.

MemberType

ToUniversalTime

[C#] public override MemberTypes MemberType {get;}

[C++] public: _property virtual MemberTypes get_MemberType( );

[VB] Overrides Public ReadOnly Property MemberType As MemberTypes

[JScript] public function get MemberType( ): MemberTypes;

Description

Gets a bitmask indicating the member type.

Module

ToUniversalTime

[C#] public abstract Module Module {get;}

[C++] public: _property virtual Module* get_Module( )=0;

[VB] MustOverride Public ReadOnly Property Module As Module

[JScript] public abstract function get Module( ): Module;

Description

Gets the module (the DLL) in which the current System.Type is defined.

Name

Namespace

ToUniversalTime

Description

Gets the namespace of the System.Type.

ReflectedType

ToUniversalTime

[C#] public override Type ReflectedType {get;}

[C++] public: _property virtual Type* get_ReflectedType( );

[VB] Overrides Public ReadOnly Property ReflectedType As Type

[JScript] public function get ReflectedType( ): Type;

Description

Gets the class object that was used to obtain this member.

This property implements the abstract property inherited from System.Reflection.MemberInfo.

TypeHandle

ToUniversalTime

[C#] public abstract RuntimeTypeHandle TypeHandle {get;}

[C++] public: _property virtual RuntimeTypeHandle get_TypeHandle( )=0;

[VB] MustOverride Public ReadOnly Property TypeHandle As RuntimeTypeHandle

[JScript] public abstract function get TypeHandle( ): RuntimeTypeHandle;

Description

Gets the handle for the current System.Type.

TypeHandle encapsulates a pointer to an internal data structure that represents the type. This handle is unique during the process lifetime. The handle is valid only in the application domain in which it was obtained.

TypeInitializer

ToUniversalTime

[C#] public ConstructorInfo TypeInitializer {get;}

[C++] public: _property ConstructorInfo* get_TypeInitializer( );

[VB] Public ReadOnly Property TypeInitializer As ConstructorInfo

[JScript] public function get TypeInitializer( ): ConstructorInfo;

Description

Gets the name of the class constructor for the System.Type.

Class initializers are available through System.Type.GetMember(System.String), System.Type.GetMembers, System.Type.FindMembers(System.Reflection.MemberTypes, System.Reflection. BindingFlags, System.Reflection.MemberFilter,System.Object), and System.Type.GetConstructors.

UnderlyingSystemType

ToUniversalTime

[C#] public abstract Type UnderlyingSystemType {get;}

[C++] public: _property virtual Type* get_UnderlyingSystemType( )=0;

[VB] MustOverride Public ReadOnly Property UnderlyingSystemType As Type

[JScript] public abstract function get UnderlyingSystemType( ): Type;

Description

Indicates the type provided by the common language runtime that represents this type.

Equals

[C#] public override bool Equals(object o);

[C++] public: bool Equals(Object* o);

[VB] Overrides Public Function Equals(ByVal o As Object) As Boolean

[JScript] public override function Equals(o: Object): Boolean; Determines if the underlying system type of the current System.Type is the same as the underlying system type of the specified System.Object or System.Type.

Description

Determines if the underlying system type of the current System.Type is the same as the underlying system type of the specified System.Object.

Return Value: true if the underlying system type of o is the same as the underlying system type of the current System.Type; otherwise, false. The System.Object whose underlying system type is to be compared with the underlying system type of the current System.Type.

Equals

[C#] public new bool Equals(Type o);

[C++] public: bool Equals(Type* o);

[VB] Shadows Public Function Equals(ByVal o As Type) As Boolean

[JScript] public hide function Equals(o: Type): Boolean;

Description

Determines if the underlying system type of the current System.Type is the same as the underlying system type of the specified System.Type.

Return Value: true if the underlying system type of o is the same as the underlying system type of the current System.Type; otherwise, false. The System.Type whose underlying system type is to be compared with the underlying system type of the current System.Type.

FindInterfaces

[C#] public virtual Type[ ] FindInterfaces(TypeFilter filter, object filterCriteria);

[C++] public: virtual Type* FindInterfaces(TypeFilter* filter, Object* filterCriteria) [ ];

[VB] Overridable Public Function FindInterfaces(ByVal filter As TypeFilter, ByVal filterCriteria As Object) As Type( )

[JScript] public function FindInterfaces(filter: TypeFilter, filterCriteria: Object): Type[ ];

Description

Returns an array of System.Type objects representing a filtered list of interfaces implemented or inherited by the current System.Type.

Return Value: An array of System.Type objects representing a filtered list of the interfaces implemented or inherited by the current System.Type.

This method can be overridden by a derived class. The System.Reflection.TypeFilter delegate that compares the interfaces against filterCriteria. The search criteria that determines whether an interface should be included in the returned array.

FindMembers

[C#] public virtual MemberInfo[ ] FindMembers(MemberTypes memberType, BindingFlags bindingAttr, MemberFilter filter, object filterCriteria);

[C++] public: virtual MemberInfo* FindMembers(MemberTypes memberType, BindingFlags bindingAttr, MemberFilter* filter, Object* filterCriteria) [ ];

[VB] Overridable Public Function FindMembers(ByVal memberType As MemberTypes, ByVal bindingAttr As BindingFlags, ByVal filter As MemberFilter, ByVal filterCriteria As Object) As MemberInfo( )

[JScript] public function FindMembers(memberType: MemberTypes, bindingAttr: BindingFlags, filter: MemberFilter, filterCriteria: Object): MemberInfo[ ];

Description

Returns a filtered array of System.Reflection.MemberInfo objects of the specified member type.

Return Value: A filtered array of System.Reflection.MemberInfo objects of the specified member type.

This method can be overridden by a derived class. A MemberTypes object indicating the type of member to search for. A bitmask comprised of one or more System.Reflection.BindingFlags that specify how the search is conducted. The delegate that does the comparisons, returning true if the member currently being inspected matches the filterCriteria and false otherwise. You can use the FilterAttribute, FilterName, and FilterNameIgnoreCase delegates supplied by this class. The first uses the fields of FieldAttributes, MethodAttributes, and MethodImplAttributes as search criteria, and the other two delegates use String objects as the search criteria. The search criteria that determines whether a member is returned in the array of MemberInfo objects.

GetArrayRank

[C#] public virtual int GetArrayRank( );

[C++] public: virtual int GetArrayRank( );

[VB] Overridable Public Function GetArrayRank( ) As Integer

[JScript] public function GetArrayRank( ): int;

Description

Gets the number of dimensions in an System.Array.

Return Value: The number of dimensions in an System.Array.

GetAttributeFlagsImpl

[C++] protected: virtual TypeAttributes GetAttributeFlagsImpl( )=0;

[VB] MustOverride Protected Function GetAttributeFlagsImpl( ) As TypeAttributes

[JScript] protected abstract function GetAttributeFlags Impl( ): TypeAttributes;

Description

When overridden in a derived class, implements the System.Type.Attributes property and gets a bitmask indicating the attributes associated with the System.Type.

Return Value: A System.Reflection.TypeAttributes object representing the attribute set of the System.Type GetConstructor

[C#] public ConstructorInfo GetConstructor(Type[ ] types);

[C++] public: ConstructorInfo* GetConstructor(Type* types[ ]);

[VB] Public Function GetConstructor(ByVal types( ) As Type) As ConstructorInfo

[JScript] public function GetConstructor(types: Type[ ]): ConstructorInfo;

Description

Searches for a public instance constructor whose parameters match the types in the specified array.

Return Value: A System.Reflection.ConstructorInfo object representing the public instance constructor whose parameters match the types in the parameter type array, if found; otherwise, null.

System.Type.GetConstructor(System.Reflection.BindingFlags,System. Reflection.Binder,System.Reflection.CallingConventions,System.Type[ ],System. Reflection.ParameterModifier[ ]) looks for public instance constructors and cannot be used to obtain a class initializer. Class initializers are available through System.Type.GetMember(System. String), System.Type.GetMembers, System.Type.Find Members (System.Reflection.MemberTypes,System.Reflection.BindingFlags,System.Reflection.MemberFilter, System.Object), System.Type.GetConstructors, and System. Type.TypeInitializer. An array of System.Type objects representing the number, order, and type of the parameters for the constructor to get.

GetConstructor

[C#] public ConstructorInfo GetConstructor(BindingFlags bindingAttr, Binder binder, Type[ ] types, ParameterModifier[ ] modifiers);

[C++] public: ConstructorInfo* GetConstructor(BindingFlags bindingAttr, Binder* binder, Type* types[ ], ParameterModifier modifiers[ ]);

[VB] Public Function GetConstructor(ByVal bindingAttr As BindingFlags, ByVal binder As Binder, ByVal types( ) As Type, ByVal modifiers( ) As ParameterModifier) As ConstructorInfo

[JScript] public function GetConstructor(bindingAttr: BindingFlags, binder: Binder, types: Type[ ], modifiers: ParameterModifier[ ]): ConstructorInfo;

Description

Searches for a constructor whose parameters match the specified argument types and modifiers, using the specified binding constraints.

Return Value: A System.Reflection.ConstructorInfo object representing the constructor that matches the specified requirements, if found; otherwise, null The types array and the modifiers array have the same length. A parameter specified in the types array can have the following attributes, which are specified in the modifiers array: pdIn, pdOut, pdLcid, pdRetval, pdOptional, and pdHasDefault, which represent [In], [Out], [lcid], [retval], [optional], and a value specifying whether the parameter has a default value. A parameter's associated attributes are stored in the metadata and enhance interoperability. A bitmask comprised of one or more System.Reflection.BindingFlags that specify how the search is conducted. A System.Reflection. Binder object that defines a set of properties and enables binding, which can involve selection of an overloaded method, coercion of argument types, and invocation of a member through reflection. An array of System.Type objects representing the number, order, and type of the parameters for the constructor to get. An array of System.Reflection.ParameterModifier objects representing the attributes associated with the corresponding element in the parameter type array.

GetConstructor

[C#] public ConstructorInfo GetConstructor(BindingFlags bindingAttr, Binder binder, CallingConventions callConvention, Type[ ] types, ParameterModifier[ ] modifiers);

[C++] public: ConstructorInfo* GetConstructor(BindingFlags bindingAttr, Binder* binder, CallingConventions callConvention, Type* types[ ], ParameterModifier modifiers[ ]);

[VB] Public Function GetConstructor(ByVal bindingAttr As BindingFlags, ByVal binder As Binder, ByVal callConvention As CallingConventions, ByVal types( ) As Type, ByVal modifiers( ) As ParameterModifier) As ConstructorInfo

[JScript] public.function GetConstructor(bindingAttr: BindingFlags, binder: Binder, callConvention: CallingConventions, types: Type[ ], modifiers: ParameterModifier[ ]): ConstructorInfo; Gets a specific constructor of the current System.Type.

Description

Searches for a constructor whose parameters match the specified argument types and modifiers, using the specified binding constraints and the specified calling convention.

Return Value: A System.Reflection.ConstructorInfo object representing the constructor that matches the specified requirements, if found; otherwise, null.

The types array and the modifiers array have the same length. A parameter specified in the types array can have the following attributes, which are specified in the modifiers array: pdIn, pdOut, pdLcid, pdRetval, pdOptional, and pdHasDefault, which represent [In], [Out], [lcid], [retval], [optional], and a value specifying whether the parameter has a default value. A parameter's associated attributes are stored in the metadata and enhance interoperability. A bitmask comprised of one or more System.Reflection.BindingFlags that specify how the search is conducted. A System.Reflection.Binder object that defines a set of properties and enables binding, which can involve selection of an overloaded method, coercion of argument types, and invocation of a member through reflection. The System.Reflection.CallingConventions object that specifies the set of rules to use regarding the order and layout of arguments, how the return value is passed, what registers are used for arguments, and the stack is cleaned up. An array of System.Type objects representing the number, order, and type of the parameters for the constructor to get. An array of System.Reflection.ParameterModifier objects representing the attributes associated with the corresponding element in the types array.

GetConstructorImpl

[C#] protected abstract ConstructorInfo GetConstructorImpl (BindingFlags bindingAttr, Binder binder, CallingConventions callConvention, Type[ ] types, ParameterModifier[ ] modifiers);

[C++] protected: virtual ConstructorInfo* GetConstructorImpl(BindingFlags bindingAttr, Binder* binder, CallingConventions callConvention, Type* types[ ], ParameterModifier modifiers[ ])=0;

[VB] MustOverride Protected Function GetConstructorImpl (ByVal bindingAttr As BindingFlags, ByVal binder As Binder, ByVal callConvention As CallingConventions, ByVal types( ) As Type, ByVal modifiers( ) As ParameterModifier) As ConstructorInfo

[JScript] protected abstract function GetConstructorImpl (bindingAttr: BindingFlags, binder: Binder, callConvention: CallingConventions, types: Type[ ], modifiers: ParameterModifier[ ]): ConstructorInfo;

Description

When overridden in a derived class, searches for a constructor whose parameters match the specified argument types and modifiers, using the specified binding constraints and the specified calling convention.

Return Value: A System.Reflection.ConstructorInfo object representing the constructor that matches the specified requirements, if found; otherwise, null.

The types array and the modifiers array have the same length. A parameter specified in the types array can have the following attributes, which are specified in the modifiers array: pdIn, pdOut, pdLcid, pdRetval, pdOptional, and pdHasDefault, which represent [In], [Out], [lcid], [retval], [optional], and a value specifying whether the parameter has a default value. A parameter's associated attributes are stored in the metadata and are used for interoperability. A bitmask comprised of one or more System.Reflection.BindingFlags that specify how the search is conducted. A System.Reflection.Binder object that defines a set of properties and enables binding, which can involve selection of an overloaded method, coercion of argument types, and invocation of a member through reflection. The System.Reflection.CallingConventions object that specifies the set of rules to use regarding the order and layout of arguments, how the return value is passed, what registers are used for arguments, and the stack is cleaned up. An array of System.Type objects representing the number, order, and type of the parameters for the constructor to get. An array of System.Reflection.ParameterModifier objects representing the attributes associated with the corresponding element in the types array.

GetConstructors

[C#] public ConstructorInfo[ ] GetConstructors( );

[C++] public: ConstructorInfo* GetConstructors( ) [ ]

[VB] Public Function GetConstructors( ) As ConstructorInfo( )

[JScript] public function GetConstructors( ): ConstructorInfo[ ]; Gets the constructors of the current System.Type.

Description

Returns all the public constructors defined for the current System.Type.

Return Value: An array of System.Reflection.ConstructorInfo objects representing all the public constructors defined for the current System.Type, including the type initializer if it is defined.

The following table shows what members of a base class are returned by the Get methods when reflecting on a type.

GetConstructors

[C#] public abstract ConstructorInfo[ ] GetConstructors (BindingFlags bindingAttr);

[C++] public: virtual ConstructorInfo* GetConstructors (BindingFlags bindingAttr) [ ]=0;

[VB] MustOverride Public Function GetConstructors(ByVal bindingAttr As BindingFlags) As ConstructorInfo( )

[JScript] public abstract function GetConstructors(bindingAttr: BindingFlags) ConstructorInfo [ ];

Description

When overridden in a derived class, searches for the constructors defined for the current System.Type, using the specified BindingFlags.

Return Value: An array of System.Reflection.ConstructorInfo objects representing all constructors defined for the current System.Type that match the specified binding constraints, including the type initializer if it is defined.

bindingAttr can be used to specify whether to return only public constructors or both public and non-public constructors. A bitmask comprised of one or more System.Reflection.BindingFlags that specify how the search is conducted.

GetDefaultMembers

[C#] public virtual MemberInfo[ ] GetDefaultMembers( );

[C++] public: virtual MemberInfo* GetDefaultMembers( ) [ ]

[VB] Overridable Public Function GetDefaultMembers( ) As MemberInfo( )

[JScript] public function GetDefaultMembers( ): MemberInfo[ ];

Description

Searches for the members defined for the current System.Type whose System.Reflection.DefaultMemberAttribute is set.

Return Value: An array of System.Reflection.MemberInfo objects representing all default members of the current System.Type.

This method can be overridden by a derived class.

GetElementType

[C#] public abstract Type GetElementType( );

[C++] public: virtual Type* GetElementType( )=0;

[VB] MustOverride Public Function GetElementType( ) As Type

[JScript] public abstract function GetElementType( ): Type;

Description

When overridden in a derived class, returns the System.Type of the object encompassed or referred to by the current array, pointer or reference type.

Return Value: The System.Type of the object encompassed or referred to by the current array, pointer or reference type.

For example, Type.GetType("Int32[ ]").GetElementType returns Int32.

GetEvent

[C#] public EventInfo GetEvent(string name);

[C++] public: EventInfo* GetEvent(String* name);

[VB] Public Function GetEvent(ByVal name As String) As EventInfo

[JScript] public function GetEvent(name: String): EventInfo; Gets a specific event declared or inherited by the current System.Type.

Description

Returns the System.Reflection.EventInfo object representing the specified event.

Return Value: The System.Reflection.EventInfo object representing the specified event which is declared or inherited by the current System.Type, if found; otherwise, null.

The search for name is case-sensitive. The System.String containing the name of an event which is declared or inherited by the current System.Type.

GetEvent

[C#] public abstract EventInfo GetEvent(string name, BindingFlags bindingAttr);

[C++] public: virtual EventInfo* GetEvent(String* name, BindingFlags bindingAttr)=0;

[VB] MustOverride Public Function GetEvent(ByVal name As String, ByVal bindingAttr As BindingFlags) As EventInfo

[JScript] public abstract function GetEvent(name: String, bindingAttr: BindingFlags): EventInfo;

Description

When overridden in a derived class, returns the System.Reflection.EventInfo object representing the specified event, using the specified binding constraints.

Return Value: The System.Reflection.EventInfo object representing the specified event which is declared or inherited by the current System.Type, if found; otherwise, null.

The following System.Reflection.BindingFlags filter flags can be used to define which events to include in the search: Public to include public events in the search. The System.String containing the name of an event which is declared or inherited by the current System.Type. A bitmask comprised of one or more System.Reflection.BindingFlags that specify how the search is conducted.

GetEvents

[C#] public virtual EventInfo[ ] GetEvents( );

[C++] public: virtual EventInfo* GetEvents( ) [ ];

[VB] Overridable Public Function GetEvents( ) As EventInfo( )

[JScript] public function GetEvents( ): EventInfo[ ]; Gets the events that are declared or inherited by the current System.Type.

Description

Returns all the public events that are declared or inherited by the current System.Type.

Return Value: An array of System.Reflection.EventInfo objects representing all the public events which are declared or inherited by the current System.Type.

This method can be overridden by a derived class.

GetEvents

[C#] public abstract EventInfo[ ] GetEvents(BindingFlags bindingAttr);

[C++] public: virtual EventInfo* GetEvents(BindingFlags bindingAttr) [ ]=0;

[VB] MustOverride Public Function GetEvents(ByVal bindingAttr As BindingFlags) As EventInfo( )

[JScript] public abstract function GetEvents(bindingAttr: BindingFlags): EventInfo[ ];

Description

When overridden in a derived class, searches for events that are declared or inherited by the current System.Type, using the specified binding constraints.

Return Value: An array of System.Reflection.EventInfo objects representing all events which are declared or inherited by the current System.Type that match the specified binding constraints.

The following System.Reflection.BindingFlags filter flags can be used to define which events to include in the search: Public to include public events in the search. A bitmask comprised of one or more System.Reflection.BindingFlags that specify how the search is conducted.

GetField

[C#] public FieldInfo GetField(string name);

[C++] public: FieldInfo* GetField(String* name);

[VB] Public Function GetField(ByVal name As String) As FieldInfo

[JScript] public function GetField(name: String): FieldInfo;

Description

Searches for the field with the specified name.

Return Value: A System.Reflection.FieldInfo object representing the field with the specified name, if found; otherwise, null.

The search for name is case-sensitive. The System.String containing the name of the data field to get.

GetField

[C#] public abstract FieldInfo GetField(string name, BindingFlags bindingAttr);

[C++] public: virtual FieldInfo* GetField(String* name, BindingFlags bindingAttr)=0;

[VB] MustOverride Public Function GetField(ByVal name As String, ByVal bindingAttr As BindingFlags) As FieldInfo

[JScript] public abstract function GetField(name: String, bindingAttr: BindingFlags): FieldInfo; Gets a specific field of the current System.Type.

Description

Searches for the specified field, using the specified binding constraints.

Return Value: A System.Reflection.FieldInfo object representing the field that matches the specified requirements, if found; otherwise, null.

The following table shows what members of a base class are returned by the Get methods when reflecting on a type. The System.String containing the name of the data field to get. A bitmask comprised of one or more System.Reflection.BindingFlags that specify how the search is conducted.

GetFields

[C#] public FieldInfo[ ] GetFields( );

[C++] public: FieldInfo* GetFields( ) [ ];

[VB] Public Function GetFields( ) As FieldInfo( )

[JScript] public function GetFields( ): FieldInfo[ ]; Gets the fields of the current System.Type.

Description

Returns all the public fields of the current System.Type.

Return Value: An array of System.Reflection.FieldInfo objects representing all the public fields defined for the current System.Type.

The following table shows what members of a base class are returned by the Get methods when reflecting on a type.

GetFields

[C#] public abstract FieldInfo[ ] GetFields(BindingFlags bindingAttr);

[C++] public: virtual FieldInfo* GetFields(BindingFlags bindingAttr) [ ]=0;

[VB] MustOverride Public Function GetFields(ByVal bindingAttr As BindingFlags) As FieldInfo( )

[JScript] public abstract function GetFields(bindingAttr: BindingFlags) FieldInfo[ ];

Description

When overridden in a derived class, searches for the fields defined for the current System.Type, using the specified binding constraints.

Return Value: An array of System.Reflection.FieldInfo objects representing all fields defined for the current System.Type that match the specified binding constraints.

The following System.Reflection.BindingFlags filter flags can be used to define which fields to include in the search: Instance to include instance fields in the search. A bitmask comprised of one or more System.Reflection.BindingFlags that specify how the search is conducted.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code of the System.Type

Return Value: The hash code of the System.Type.

GetInterface

[C#] public Type GetInterface(string name);

[C++] public: Type* GetInterface(String* name);

[VB] Public Function GetInterface(ByVal name As String) As Type

[JScript] public function GetInterface(name: String): Type; Gets a specific interface implemented or inherited by the current System.Type.

Description

Searches for the interface with the specified name.

Return Value: A System.Type object representing the interface with the specified name, implemented or inherited by the current System.Type, if found; otherwise, null.

The search for name is case-sensitive. The System.String containing the name of the interface to get.

GetInterface

[C#] public abstract Type GetInterface(string name, bool ignoreCase);

[C++] public: virtual Type* GetInterface(String* name, bool ignoreCase)=0;

[VB] MustOverride Public Function GetInterface(ByVal name As String, ByVal ignoreCase As Boolean) As Type

[JScript] public abstract function GetInterface(name: String, ignoreCase: Boolean): Type;

Description

When overridden in a derived class, searches for the specified interface, specifying whether to do a case-sensitive search.

Return Value: A System.Type object representing the interface with the specified name, implemented or inherited by the current System.Type, if found; otherwise, null.

If name has 128 or more standard ASCII characters, a case-sensitive search is performed, regardless of the value of ignoreCase. Arrays or COM types are not searched for unless they have been previously loaded into the table of available classes. The System.String containing the name of the interface to get. true to perform a case-insensitive search for name.

GetInterfaceMap

[C#] public virtual InterfaceMapping GetInterfaceMap(Type interfaceType);

[C++] public: virtual InterfaceMapping GetInterfaceMap (Type* interfaceType);

[VB] Overridable Public Function GetInterfaceMap(ByVal interfaceType As Type) As InterfaceMapping

[JScript] public function GetInterfaceMap(interfaceType: Type) InterfaceMapping;

Description

Returns an interface mapping for the specified interface type.

Return Value: An System.Reflection.InterfaceMapping object representing the interface mapping for interfaceType.

The interface map denotes how an interface is mapped into the actual methods on a class that implements that interface. The System.Type of the interface of which to retrieve a mapping.

GetInterfaces

[C#] public abstract Type[ ] GetInterfaces( );

[C++] public: virtual Type* GetInterfaces( )[ ]=0;

[VB] MustOverride Public Function GetInterfaces( ) As Type( )

[JScript] public abstract function GetInterfaces( ): Type[ ];

Description

When overridden in a derived class, gets all the interfaces implemented or inherited by the current System.Type.

Return Value: An array of System.Type objects representing all the interfaces implemented or inherited by the current System.Type.

GetMember

[C#] public MemberInfo[ ] GetMember(string name);

[C++] public: MemberInfo* GetMember(String* name) [ ];

[VB] Public Function GetMember(ByVal name As String) As MemberInfo( )

[JScript] public function GetMember(name: String): MemberInfo[ ]; Gets the specified members of the current System.Type.

Description

Searches for the members with the specified name.

Return Value: An array of System.Reflection.MemberInfo objects representing the public members with the specified name, if found; otherwise, null.

The search for name is case-sensitive. The System.String containing the name of the public members to get.

GetMember

[C#] public virtual MemberInfo[ ] GetMember(string name, BindingFlags bindingAttr);

[C++] public: virtual MemberInfo* GetMember(String* name, BindingFlags bindingAttr) [ ];

[VB] Overridable Public Function GetMember(ByVal name As String, ByVal bindingAttr As BindingFlags) As MemberInfo( )

[JScript] public function GetMember(name: String, bindingAttr: BindingFlags): MemberInfo[ ];

Description

Searches for the specified members, using the specified binding constraints.

Return Value: An array of System.Reflection.MemberInfo objects representing the public members with the specified name, if found; otherwise, null.

This method can be overridden by a derived class. The System.String containing the name of the members to get. A bitmask comprised of one or more System.Reflection.BindingFlags that specify how the search is conducted.

GetMember

[C#] public virtual MemberInfo[ ] GetMember(string name, MemberTypes type, BindingFlags bindingAttr);

[C++] public: virtual MemberInfo* GetMember(String* name, MemberTypes type, BindingFlags bindingAttr) [ ];

[VB] Overridable Public Function GetMember(ByVal name As String, ByVal type As MemberTypes, ByVal bindingAttr As BindingFlags) As MemberInfo( )

[JScript] public function GetMember(name: String, type: MemberTypes, bindingAttr: BindingFlags): Member Info[ ];

Description

Searches for the specified members of the specified member type, using the specified binding constraints.

Return Value: An array of System.Reflection.MemberInfo objects representing the public members with the specified name, if found; otherwise, null.

Members include properties, methods, fields, events, and so on. The System.String containing the name of the members to get. The System.Type of member to search for. A bitmask comprised of one or more System.Reflection.BindingFlags that specify how the search is conducted.

GetMembers

[C#] public MemberInfo[ ] GetMembers( );

[C++] public: MemberInfo* GetMembers( ) [ ]

[VB] Public Function GetMembers( ) As MemberInfo( )

[JScript] public function GetMembers( ): MemberInfo[ ]; Gets the members (properties, methods, fields, events, and so on) of the current System.Type.

Description

Returns all the public members of the current System.Type.

Return Value: An array of System.Reflection.MemberInfo objects representing all the public members of the current System.Type. Members include properties, methods, fields, events, and so on.

GetMembers

[C#] public abstract MemberInfo[ ] GetMembers(BindingFlags bindingAttr);

[C++] public: virtual MemberInfo* GetMembers(BindingFlags bindingAttr) [ ]=0;

[VB] MustOverride Public Function GetMembers(ByVal bindingAttr As BindingFlags) As MemberInfo( )

[JScript] public abstract function GetMembers(bindingAttr: BindingFlags): MemberInfo[ ];

Description

When overridden in a derived class, searches for the members defined for the current System.Type, using the specified binding constraints.

Return Value: An array of System.Reflection.MemberInfo objects representing all members defined for the current System.Type that match the specified binding constraints.

Members include properties, methods, fields, events, and so on. A bitmask comprised of one or more System.Reflection.BindingFlags that specify how the search is conducted.

GetMethod

[C#] public MethodInfo GetMethod(string name);

[C++] public: MethodInfo* GetMethod(String* name);

[VB] Public Function GetMethod(ByVal name As String) As MethodInfo

[JScript] public function GetMethod(name: String): MethodInfo;

Description

Searches for the public method with the specified name.

Return Value: A System.Reflection.MethodInfo object representing the public method with the specified name, if found; otherwise, null.

The search for name is case-sensitive. The System.String containing the name of the public method to get.

GetMethod

[C#] public MethodInfo GetMethod(string name, BindingFlags bindingAttr);

[C++] public: _sealed MethodInfo* GetMethod(String* name, BindingFlags bindingAttr);

[VB] NotOverridable Public Function GetMethod(ByVal name As String, ByVal bindingAttr As BindingFlags) As MethodInfo

[JScript] public function GetMethod(name: String, bindingAttr: BindingFlags): MethodInfo;

Description

Searches for the specified method, using the specified binding constraints.

Return Value: A System.Reflection.MethodInfo object representing the method that matches the specified requirements, if found; otherwise, null.

The following System.Reflection.BindingFlags filter flags can be used to define which methods to include in the search: Instance to include instance methods in the search. The System.String containing the name of the method to get. A bitmask comprised of one or more System.Reflection.BindingFlags that specify how the search is conducted.

GetMethod

[C#] public MethodInfo GetMethod(string name, Type[ ] types);

[C++] public: MethodInfo* GetMethod(String* name, Type* types[ ]);

[VB] Public Function GetMethod(ByVal name As String, ByVal types( ) As Type) As MethodInfo

[JScript] public function GetMethod(name: String, types: Type[ ]): MethodInfo;

Description

Searches for the specified public method whose parameters match the specified argument types.

Return Value: A System.Reflection.MethodInfo object representing the public method whose parameters match the specified argument types, if found; otherwise, null.

The search for name is case-sensitive. The System.String containing the name of the public method to get. An array of System.Type objects representing the number, order, and type of the parameters for the method to get.

GetMethod

[C#] public MethodInfo GetMethod(string name, Type[ ] types, ParameterModifier[ ] modifiers);

[C++] public: MethodInfo* GetMethod(String* name, Type* types[ ], ParameterModifier modifiers[ ]);

[VB] Public Function GetMethod(ByVal name As String, ByVal types( ) As Type, ByVal modifiers( ) As ParameterModifier) As MethodInfo

[JScript] public function GetMethod(name: String, types: Type[ ], modifiers ParameterModifier[ ]): MethodInfo;

Description

Searches for the specified public method whose parameters match the specified argument types and modifiers.

Return Value: A System.Reflection.MethodInfo object representing the public method that matches the specified requirements, if found; otherwise, null.

The types array and the modifiers array have the same length. A parameter specified in the types array can have the following attributes, which are specified in the modifiers array: pdIn, pdOut, pdLcid, pdRetval, pdOptional, and pdHasDefault, which represent [In], [Out], [lcid], [retval], [optional], and a value specifying whether the parameter has a default value. A parameter's associated attributes are stored in the metadata and are used for interoperability. The System. String containing the name of the public method to get. An array of System.Type objects representing the number, order, and type of the parameters for the method to get. An array of System.Reflection.ParameterModifier objects representing the attributes associated with the corresponding element in the types array.

GetMethod

[C#] public MethodInfo GetMethod(string name, BindingFlags bindingAttr, Binder binder, Type[ ] types, ParameterModifier[ ] modifiers);

[C++] public: _sealed MethodInfo* GetMethod(String* name, BindingFlags bindingAttr, Binder* binder, Type* types[ ], ParameterModifier modifiers[ ]);

[VB] NotOverridable Public Function GetMethod(ByVal name As String, ByVal bindingAttr As BindingFlags, ByVal binder As Binder, ByVal types( ) As Type, ByVal modifiers( ) As ParameterModifier) As MethodInfo

[JScript] public function GetMethod(name: String, binding Attr: BindingFlags, binder: Binder, types: Type[ ], modifiers: ParameterModifier[ ]): MethodInfo;

Description

Searches for the specified method whose parameters match the specified argument types and modifiers, using the specified binding constraints.

Return Value: A System.Reflection.MethodInfo object representing the method that matches the specified requirements, if found; otherwise, null.

The types array and the modifiers array have the same length. A parameter specified in the types array can have the following attributes, which are specified in the modifiers array: pdIn, pdOut, pdLcid, pdRetval, pdOptional, and pdHasDefault, which represent [In], [Out], [lcid], [retval], [optional], and a value specifying whether the parameter has a default value. A parameter's associated attributes are stored in the metadata and enhance interoperability. The System. String containing the name of the method to get. A bitmask comprised of one or more System.Reflection.BindingFlags that specify how the search is conducted. A System.Reflection.Binder object that defines a set of properties and enables binding, which can involve selection of an overloaded method, coercion of argument types, and invocation of a member through reflection. An array of System.Type objects representing the number, order, and type of the parameters for the method to get. An array of System.Reflection.ParameterModifier objects representing the attributes associated with the corresponding element in the types array.

GetMethod

[C#] public MethodInfo GetMethod(string name, BindingFlags bindingAttr, Binder binder, CallingConventions callConvention, Type[ ] types, ParameterModifier[ ] modifiers);

[C++] public: MethodInfo* GetMethod(String* name, BindingFlags bindingAttr, Binder* binder, CallingConventions callConvention, Type* types[ ], ParameterModifier modifiers[ ]);

[VB] Public Function GetMethod(ByVal name As String, ByVal bindingAttr As BindingFlags, ByVal binder As Binder, ByVal callConvention As CallingConventions, ByVal types( ) As Type, ByVal modifiers( ) As ParameterModifier) As MethodInfo

[JScript] public function GetMethod(name: String, binding Attr: BindingFlags, binder: Binder, callConvention: CallingConventions, types: Type[ ], modifiers: ParameterModifier[ ]): MethodInfo; Gets a specific method of the current System.Type.

Description

Searches for the specified method whose parameters match the specified argument types and modifiers, using the specified binding constraints and the specified calling convention.

Return Value: A System.Reflection.MethodInfo object representing the method that matches the specified requirements, if found; otherwise, null.

The following table shows what members of a base class are returned by the GetXXX methods when reflecting on a type. The System.String containing the name of the method to get. A bitmask comprised of one or more System.Reflection. BindingFlags that specify how the search is conducted. A System.Reflection.Binder object that defines a set of properties and enables binding, which can involve selection of an overloaded method, coercion of argument types, and invocation of a member through reflection. The System.Reflection. CallingConventions object that specifies the set of rules to use regarding the order and layout of arguments, how the return value is passed, what registers are used for arguments, and how the stack is cleaned up. An array of System.Type objects representing the number, order, and type of the parameters for the method to get. An array of System.Reflection.Parameter- Modifier objects representing the attributes associated with the corresponding element in the types array.

GetMethodImpl

[C#] protected abstract MethodInfo GetMethodImpl(string name, BindingFlags bindingAttr, Binder binder, CallingConventions callConvention, Type[ ] types, ParameterModifier[ ] modifiers);

[C++] protected: virtual MethodInfo* GetMethodImpl (String* name, BindingFlags bindingAttr, Binder* binder, CallingConventions callConvention, Type* types[ ], ParameterModifier modifiers[ ])=0;

[VB] MustOverride Protected Function GetMethodImpl(ByVal name As String, ByVal bindingAttr As BindingFlags, ByVal binder As Binder, ByVal callConvention As CallingConventions, ByVal types( ) As Type, ByVal modifiers( ) As ParameterModifier) As MethodInfo

[JScript] protected abstract function GetMethodImpl(name: String, bindingAttr: BindingFlags, binder: Binder, callConvention: CallingConventions, types: Type[ ], modifiers: ParameterModifier[ ]): MethodInfo;

Description

When overridden in a derived class, searches for the specified method whose parameters match the specified argument types and modifiers, using the specified binding constraints and the specified calling convention.

Return Value: A System.Reflection.MethodInfo object representing the method that matches the specified requirements, if found; otherwise, null.

If types is null, arguments are not matched. The System. String containing the name of the method to get. A bitmask comprised of one or more System.Reflection.BindingFlags that specify how the search is conducted. A System.Reflection.Binder object that defines a set of properties and enables binding, which can involve selection of an overloaded method, coercion of argument types, and invocation of a member through reflection. The System.Reflection.CallingConventions object that specifies the set of rules to use regarding the order and layout of arguments, how the return value is passed, what registers are used for arguments, and what process cleans up the stack. An array of System.Type objects representing the number, order, and type of the parameters for the method to get. An array of System.Reflection.ParameterModifier objects representing the attributes associated with the corresponding element in the types array.

GetMethods

[C#] public MethodInfo[ ] GetMethods( );

[C++] public: MethodInfo* GetMethods( ) [ ]

[VB] Public Function GetMethods( ) As MethodInfo( )

[JScript] public function GetMethods( ): MethodInfo[ ]; Gets the methods of the current System.Type.

Description

Returns all the public methods of the current System.Type

Return Value: An array of System.Reflection.MethodInfo objects representing all the public methods defined for the current System.Type.

The following table shows what members of a base class are returned by the Get methods when reflecting on a type.

GetMethods

[C#] public abstract MethodInfo[ ] GetMethods(BindingFlags bindingAttr);

[C++] public: virtual MethodInfo* GetMethods(BindingFlags bindingAttr) [ ]=0;

[VB] MustOverride Public Function GetMethods(ByVal bindingAttr As BindingFlags) As MethodInfo( )

[JScript] public abstract function GetMethods(bindingAttr: BindingFlags) MethodInfo[ ];

Description

When overridden in a derived class, searches for the methods defined for current System.Type, using the specified binding constraints.

Return Value: An array of System.Reflection.MethodInfo objects representing all methods defined for the current System.Type that match the specified binding constraints.

The following System.Reflection.BindingFlags filter flags can be used to define which methods to include in the search: Instance to include instance methods in the search. A bitmask comprised of one or more System.Reflection.BindingFlags that specify how the search is conducted.

GetNestedType

[C#] public Type GetNestedType(string name);

[C++] public: Type* GetNestedType(String* name);

[VB] Public Function GetNestedType(ByVal name As String) As Type

[JScript] public function GetNestedType(name: String): Type; Gets a specific type nested within the current System.Type.

Description

Searches for the nested type with the specified name.

Return Value: A System.Type object representing the nested type with the specified name, if found; otherwise, null.

The search for name is case-sensitive. The System.String containing the name of the nested type to get.

GetNestedType

[C#] public abstract Type GetNestedType(string name, BindingFlags bindingAttr);

[C++] public: virtual Type* GetNestedType(String* name, BindingFlags bindingAttr)=0;

[VB] MustOverride Public Function GetNestedType(ByVal name As String, ByVal bindingAttr As BindingFlags) As Type

[JScript] public abstract function GetNestedType(name: String, bindingAttr: BindingFlags): Type;

Description

When overridden in a derived class, searches for the specified nested type, using the specified binding constraints.

Return Value: A System.Type object representing the nested type that matches the specified requirements, if found; otherwise, null.

The following System.Reflection.BindingFlags filter flags can be used to define which nested types to include in the search: Public to include public nested types in the search. The System.String containing the name of the nested type to get. A bitmask comprised of one or more System.Reflection.BindingFlags that specify how the search is conducted.

GetNestedTypes

[C#] public Type[ ] GetNestedTypes( );

[C++] public: Type* GetNestedTypes( ) [ ]

[VB] Public Function GetNestedTypes( ) As Type( )

[JScript] public function GetNestedTypes( ): Type[ ]; Gets the types nested within the current System.Type.

Description

Returns all the types nested within the current System. Type.

Return Value: An array of System.Type objects representing all the types nested within the current System.Type.

The following table shows what members of a base class are returned by the Get methods when reflecting on a type.

GetNestedTypes

[C#] public abstract Type[ ] GetNestedTypes(BindingFlags bindingAttr);

[C++] public: virtual Type* GetNestedTypes(BindingFlags bindingAttr)[ ]=0;

[VB] MustOverride Public Function GetNestedTypes(ByVal bindingAttr As BindingFlags) As Type( )

[JScript] public abstract function GetNestedTypes(bindingAttr: BindingFlags): Type[ ];

Description

When overridden in a derived class, searches for the types nested within the current System.Type, using the specified binding constraints.

Return Value: An array of System.Type objects representing all the types nested within the current System.Type that match the specified binding constraints.

The following System.Reflection.BindingFlags filter flags can be used to define which nested types to include in the search: Public to include public nested types in the search. A bitmask comprised of one or more System.Reflection.BindingFlags that specify how the search is conducted.

GetProperties

[C#] public PropertyInfo[ ] GetProperties( );

[C++] public: PropertyInfo* GetProperties( )[ ]

[VB] Public Function GetProperties( ) As PropertyInfo( )

[JScript] public function GetProperties( ): PropertyInfo[ ];

Description

Returns all the public properties of the current System.Type.

Return Value: An array of System.Reflection.PropertyInfo objects representing all public properties of the current System.Type.

The following table shows what members of a base class are returned by the Get methods when reflecting on a type.

GetProperties

[C#] public abstract PropertyInfo[ ] GetProperties(BindingFlags bindingAttr);

[C++] public: virtual PropertyInfo* GetProperties(BindingFlags bindingAttr) [ ]=0;

[VB] MustOverride Public Function GetProperties(ByVal bindingAttr As BindingFlags) As PropertyInfo( )

[JScript] public abstract function GetProperties(bindingAttr: BindingFlags) PropertyInfo[ ]; Gets the properties of the current System.Type.

Description

When overridden in a derived class, searches for the properties of the current System.Type, using the specified binding constraints.

Return Value: An array of System.Reflection.PropertyInfo objects representing all properties of the current System.Type that match the specified binding constraints.

A property is considered public to reflection if it has at least one accessor that is public. That is, you can call type.GetProperty("propertyname", BindingFlags.Public|BindingFlags.Instance|BindingFlags.Static) to get it. A bitmask comprised of one or more System.Reflection.BindingFlags that specify how the search is conducted.

GetProperty

[C#] public PropertyInfo GetProperty(string name);

[C++] public: PropertyInfo* GetProperty(String* name);

[VB] Public Function GetProperty(ByVal name As String) As PropertyInfo

[JScript] public function GetProperty(name: String): PropertyInfo;

Description

Searches for the public property with the specified name.

Return Value: A System.Reflection.PropertyInfo object representing the public property with the specified name, if found; otherwise, null.

The search for name is case-sensitive. The System.String containing the name of the public property to get.

GetProperty

[C#] public PropertyInfo GetProperty(string name, BindingFlags bindingAttr);

[C++] public: _sealed PropertyInfo* GetProperty(String* name, BindingFlags bindingAttr);

[VB] NotOverridable Public Function GetProperty(ByVal name As String, ByVal bindingAttr As BindingFlags) As PropertyInfo

[JScript] public function GetProperty(name: String, binding Attr: BindingFlags): PropertyInfo;

Description

Searches for the specified property, using the specified binding constraints.

Return Value: A System.Reflection.PropertyInfo object representing the property that matches the specified requirements, if found; otherwise, null.

The types array and the modifiers array have the same length. A parameter specified in the types array can have the following attributes, which are specified in the modifiers array: pdIn, pdOut, pdLcid, pdRetval, pdOptional, and pdHasDefault, which represent [In], [Out], [lcid], [retval], [optional], and a value specifying whether the parameter has a default value. A parameter's associated attributes are stored in the metadata and enhance interoperability. The System.String containing the name of the property to get. A bitmask comprised of one or more System.Reflection.BindingFlags that specify how the search is conducted.

GetProperty

[C#] public PropertyInfo GetProperty(string name, Type returnType);

[C++] public: PropertyInfo* GetProperty(String* name, Type* returnType);

[VB] Public Function GetProperty(ByVal name As String, ByVal returnType As Type) As PropertyInfo

[JScript] public function GetProperty(name: String, returnType: Type): PropertyInfo;

Description

Searches for the public property with the specified name and return type.

Return Value: A System.Reflection.PropertyInfo object representing the public property with the specified name, if found; otherwise, null.

The search for name is case-sensitive. The System.String containing the name of the public property to get. The return type of the property.

GetProperty

[C#] public PropertyInfo GetProperty(string name, Type[ ] types);

[C++] public: PropertyInfo* GetProperty(String* name, Type* types[ ]);

[VB] Public Function GetProperty(ByVal name As String, ByVal types( ) As Type) As PropertyInfo

[JScript] public function GetProperty(name: String, types: Type[ ]): PropertyInfo;

Description

Searches for the specified public property whose parameters match the specified argument types.

Return Value: A System.Reflection.PropertyInfo object representing the public property whose parameters match the specified argument types, if found; otherwise, null.

The search for name is case-sensitive. The System.String containing the name of the public property to get. An array of System.Type objects representing the number, order, and type of the parameters for the indexed property to get.

GetProperty

[C#] public PropertyInfo GetProperty(string name, Type returnType, Type[ ] types);

[C++] public: PropertyInfo* GetProperty(String* name, Type* returnType, Type* types[ ]);

[VB] Public Function GetProperty(ByVal name As String, ByVal returnType As Type, ByVal types( ) As Type) As PropertyInfo

[JScript] public function GetProperty(name: String, returnType: Type, types: Type[ ]): PropertyInfo;

Description

Searches for the specified public property whose parameters match the specified argument types.

Return Value: A System.Reflection.PropertyInfo object representing the public property whose parameters match the specified argument types, if found; otherwise, null.

The search for name is case-sensitive. The System.String containing the name of the public property to get. The return type of the property. An array of System.Type objects representing the number, order, and type of the parameters for the indexed property to get.

GetProperty

[C#] public PropertyInfo GetProperty(string name, Type returnType, Type[ ] types, ParameterModifier[ ] modifiers);

[C++] public: PropertyInfo* GetProperty(String* name, Type* returnType, Type* types[ ], ParameterModifier modifiers[ ]);

[VB] Public Function GetProperty(ByVal name As String, ByVal returnType As Type, ByVal types( ) As Type, ByVal modifiers( ) As ParameterModifier) As PropertyInfo

[JScript] public function GetProperty(name: String, returnType: Type, types: Type[ ], modifiers: ParameterModifier[ ]): PropertyInfo;

Description

Searches for the specified public property whose parameters match the specified argument types and modifiers.

Return Value: A System.Reflection.PropertyInfo object representing the public property that matches the specified requirements, if found; otherwise, null.

The types array and the modifiers array have the same length. A parameter specified in the types array can have the following attributes, which are specified in the modifiers array: pdIn, pdOut, pdLcid, pdRetval, pdOptional, and pdHasDefault, which represent [In], [Out], [lcid], [retval], [optional], and a value specifying whether the parameter has a default value. A parameter's associated attributes are stored in the metadata and enhance interoperability. The System. String containing the name of the public property to get. The return type of the property. An array of System.Type objects representing the number, order, and type of the parameters for the indexed property to get. An array of System.Reflection. ParameterModifier objects representing the attributes Is associated with the corresponding element in the types array.

GetProperty

[C#] public PropertyInfo GetProperty(string name, BindingFlags bindingAttr, Binder binder, Type returnType, Type[ ] types, ParameterModifier[ ] modifiers);

[C++] public: _sealed PropertyInfo* GetProperty(String* name, BindingFlags bindingAttr, Binder* binder, Type* returnType, Type* types[ ], ParameterModifier modifiers[ ]);

[VB] NotOverridable Public Function GetProperty(ByVal name As String, ByVal bindingAttr As BindingFlags, ByVal binder As Binder, ByVal returnType As Type, ByVal types( ) As Type, ByVal modifiers( ) As ParameterModifier) As PropertyInfo

[JScript] public function GetProperty(name: String, bindingAttr: BindingFlags, binder: Binder, returnType: Type, types: Type[ ], modifiers: ParameterModifier[ ]): PropertyInfo; Gets a specific property of the current System.Type.

Description

Searches for the specified property whose parameters match the specified argument types and modifiers, using the specified binding constraints.

Return Value: A System.Reflection.PropertyInfo object representing the property that matches the specified requirements, if found; otherwise, null The following table shows what members of a base class are returned by the Get methods when reflecting on a type. The System.String containing the name of the property to get. A bitmask comprised of one or more System.Reflection. BindingFlags that specify how the search is conducted. A System.Reflection.Binder object that defines a set of properties and enables binding, which can involve selection of an overloaded method, coercion of argument types, and invocation of a member through reflection. The return type of the property. An array of System.Type objects representing the number, order, and type of the parameters for the indexed property to get. An array of System.Reflection.ParameterModifier objects representing the attributes associated with the corresponding element in the types array.

GetPropertyImpl

[C#] protected abstract PropertyInfo GetPropertyImpl(string name, BindingFlags bindingAttr, Binder binder, Type returnType, Type[ ] types, ParameterModifier[ ] modifiers);

[C++] protected: virtual PropertyInfo* GetPropertyImpl (String* name, BindingFlags bindingAttr, Binder* binder, Type* returnType, Type* types[ ], ParameterModifier modifiers[ ])=0;

[VB] MustOverride Protected Function GetPropertyImpl (ByVal name As String, ByVal bindingAttr As BindingFlags, ByVal binder As Binder, ByVal returnType As Type, ByVal types( ) As Type, ByVal modifiers( ) As ParameterModifier) As PropertyInfo

[JScript] protected abstract function GetPropertyImpl(name: String, bindingAttr: BindingFlags, binder: Binder, returnType: Type, types: Type[ ], modifiers: ParameterModifier[ ]): PropertyInfo;

Description

When overridden in a derived class, searches for the specified property whose parameters match the specified argument types and modifiers, using the specified binding constraints.

Return Value: A System.Reflection.PropertyInfo object representing the property that matches the specified requirements, if found; otherwise, null.

The types array and the modifiers array have the same length. A parameter specified in the types array can have the following attributes, which are specified in the modifiers array: pdIn, pdOut, pdLcid, pdRetval, pdOptional, and pdHasDefault, which represent [In], [Out], [lcid], [retval], [optional], and a value specifying whether the parameter has a default value. A parameter's associated attributes are stored in the metadata and are used for interoperability. The System. String containing the name of the property to get. A bitmask comprised of one or more System.Reflection.BindingFlags that specify how the search is conducted. A System.Reflection.Binder object that defines a set of properties and enables binding, which can involve selection of an overloaded member, coercion of argument types, and invocation of a member through reflection. The return type of the property. An array of System.Type objects representing the number, order, and type of the parameters for the indexed property to get. An array of System.Reflection.ParameterModifier objects representing the attributes associated with the corresponding element in the types array.

GetType

[C#] public static Type GetType(string typeName);

[C++] public: static Type* GetType(String* typeName);

[VB] Public Shared Function GetType(ByVal typeName As String) As Type

[JScript] public static function GetType(typeName: String): Type;

Description

Gets the System.Type with the specified name, performing a case-sensitive search.

Return Value: The System.Type with the specified name, if found; otherwise, null GetType only works on assemblies loaded from disk. If you call GetType to look up a type defined in a dynamic assembly defined using the System.Reflection.Emit services, you might get inconsistent behavior. The behavior depends on whether the dynamic assembly is persistent, that is, created using the RunAndSave or Save access modes of the System. Reflection.Emit.AssemblyBuilderAccess enumeration. If the dynamic assembly is persistent and has been written to disk before GetType is called, the loader finds the saved assembly on disk, loads that assembly, and retrieves the type from that assembly. If the assembly has not been saved to disk when GetType is called, the method returns null. The name of the System.Type to get.

GetType

[C#] public static Type GetType(string typeName, bool throwOnError);

[C++] public: static Type* GetType(String* typeName, bool throwOnError);

[VB] Public Shared Function GetType(ByVal typeName As String, ByVal throwOnError As Boolean) As Type

[JScript] public static function GetType(typeName: String, throwOnError: Boolean): Type;

Description

Gets the System.Type with the specified name, performing a case-sensitive search and specifying whether to throw an exception if an error occurs while loading the System.Type.

Return Value: The System.Type with the specified name, if found; otherwise, null GetType only-works on assemblies loaded from disk. If you call GetType to look up a type defined in a dynamic assembly defined using the System.Reflection.Emit services, you might get inconsistent behavior. The behavior depends on whether the dynamic assembly is persistent, that is, created using the RunAndSave or Save access modes of the System. Reflection.Emit.AssemblyBuilderAccess enumeration. If the dynamic assembly is persistent and has been written to disk before GetType is called, the loader finds the saved assembly on disk, loads that assembly, and retrieves the type from that assembly. If the assembly has not been saved to disk when GetType is called, the method returns null. The name of the System.Type to get. true to throw a System.TypeLoadException if an error occurs while loading the System.Type.

GetType

[C#] public static Type GetType(string typeName, bool throwOnError, bool ignoreCase);

[C++] public: static Type* GetType(String* typeName, bool throwOnError, bool ignoreCase);

[VB] Public Shared Function GetType(ByVal typeName As String, ByVal throwOnError As Boolean, ByVal ignoreCase As Boolean) As Type

[JScript] public static function GetType(typeName: String, throwOnError: Boolean, ignoreCase: Boolean): Type; Gets the System.Type with the specified name.

Description

Gets the System.Type with the specified name, specifying whether to perform a case-sensitive search and whether to throw an exception if an error occurs while loading the System.Type.

Return Value: The System.Type with the specified name, if found; otherwise, null GetType only works on assemblies loaded from disk. If you call GetType to look up a type defined in a dynamic assembly defined using the System.Reflection.Emit services, you might get inconsistent behavior. The behavior depends on whether the dynamic assembly is persistent, that is, created using the RunAndSave or Save access modes of the System. Reflection.Emit.AssemblyBuilderAccess enumeration. If the dynamic assembly is persistent and has been written to disk before GetType is called, the loader finds the saved assembly on disk, loads that assembly, and retrieves the type from that assembly. If the assembly has not been saved to disk when GetType is called, the method returns null. The name of the System.Type to get. true to throw a System.TypeLoadException if an error occurs while loading the System.Type. true to perform a case-insensitive search for typeName, if typeName has less than 128 characters.

GetTypeArray

[C#] public static Type[ ] GetTypeArray(object[ ] args);

[C++] public: static Type* GetTypeArray(Object* args _gc[ ]) [ ];

[VB] Public Shared Function GetTypeArray(ByVal args( ) As Object) As Type( )

[JScript] public static function GetTypeArray(args: Object[ ]): Type[ ];

Description

Gets the types of the objects in the specified array.

Return Value: An array of System.Type objects representing the types of the corresponding elements in args. An array of objects whose types to determine.

GetTypeCode

[C#] public static TypeCode GetTypeCode(Type type);

[C++] public: static TypeCode GetTypeCode(Type* type);

[VB] Public Shared Function GetTypeCode(ByVal type As Type) As TypeCode

[JScript] public static function GetTypeCode(type: Type): TypeCode;

Description

Gets the underlying type code of the specified System. Type.

Return Value: The System.TypeCode value of the underlying type. The System.Type whose underlying type code to get.

GetTypeFromCLSID

[C#] public static Type GetTypeFromCLSID(Guid clsid);

[C++] public: static Type* GetTypeFromCLSID(Guid clsid);

[VB] Public Shared Function GetTypeFromCLSID(ByVal clsid As Guid) As Type

[JScript] public static function GetTypeFromCLSID(clsid: Guid): Type; Gets the System.Type associated with the specified class identifier (CLSID).

Description

Gets the System.Type associated with the specified class identifier (CLSID).

Return Value: System._ComObject regardless of whether the CLSID is valid. The CLSID of the System.Type to get.

GetTypeFromCLSID

[C#] public static Type GetTypeFromCLSID(Guid clsid, bool throwOnError);

[C++] public: static Type* GetTypeFromCLSID(Guid clsid, bool throwOnError);

[VB] Public Shared Function GetTypeFromCLSID(ByVal clsid As Guid, ByVal throwOnError As Boolean) As Type

[JScript] public static function GetTypeFromCLSID(clsid: Guid, throwOnError: Boolean): Type;

Description

Gets the System.Type associated with the specified class identifier (CLSID), specifying whether to throw an exception if an error occurs while loading the System.Type.

Return Value: System._ComObject regardless of whether the CLSID is valid.

Exceptions such as System.OutOfMemoryException will be thrown when specifying true for throwOnError, but it will not fail for unregistered CLSID's. The CLSID of the System. Type to get. true to throw a System.TypeLoadException if an error occurs while loading the System.Type.

GetTypeFromCLSID

[C#] public static Type GetTypeFromCLSID(Guid clsid, string server);

[C++] public: static Type* GetTypeFromCLSID(Guid clsid, String* server);

[VB] Public Shared Function GetTypeFromCLSID(ByVal clsid As Guid, ByVal server As String) As Type

[JScript] public static function GetTypeFromCLSID(clsid: Guid, server: String) Type;

Description

Gets the System.Type associated with the specified class identifier (CLSID) from the specified server.

Return Value: System._ComObject regardless of whether the CLSID is valid. The CLSID of the System.Type to get. The server from which to load the type.

GetTypeFromCLSID

[C#] public static Type GetTypeFromCLSID(Guid clsid, string server, bool throwOnError);

[C++] public: static Type* GetTypeFromCLSID(Guid clsid, String* server, bool throwOnError);

[VB] Public Shared Function GetTypeFromCLSID(ByVal cisid As Guid, ByVal server As String, ByVal throwOnError As Boolean) As Type

[JScript] public static function GetTypeFromCLSID(clsid: Guid, server: String, throwOnError: Boolean): Type;

Description

Gets the System.Type associated with the specified class identifier (CLSID) from the specified server, specifying whether to throw an exception if an error occurs while loading the System.Type.

Return Value: System._ComObject regardless of whether the CLSID is valid.

Exceptions such as System.OutOfMemoryException will be thrown when specifying true for throwOnError, but it will not fail for unregistered CLSID's. The CLSID of the System. Type to get. The server from which to load the type. true to throw a System.TypeLoadException if an error occurs while loading the System.Type.

GetTypeFromHandle

[C#] public static Type GetTypeFromHandle(RuntimeTypeHandle handle);

[C++] public: static Type* GetTypeFromandle(RuntimeTypeHandle handle);

[VB] Public Shared Function GetTypeFromHandle(ByVal handle As RuntimeTypeHandle) As Type

[JScript] public static function GetTypeFromHandle(handle RuntimeTypeHandle): Type;

Description

Gets the System.Type referenced by the specified type handle.

Return Value: The System.Type referenced by the specified System.RuntimeTypeHandle.

The handles are valid only in the application domain in which they were obtained. The System.RuntimeTypeHandle object that refers to the System.Type.

GetTypeFromProgID

[C#] public static Type GetTypeFromProgID(string progID);

[C++] public: static Type* GetTypeFromProgID(String* progID);

[VB] Public Shared Function GetTypeFromProgID(ByVal progID As String) As Type

[JScript] public static function GetTypeFromProgID (progID: String): Type; Gets the System.Type associated with the specified program identifier (PROGID).

Description

Gets the System.Type associated with the specified program identifier (PROGID), returning null if an error is encountered while loading the System.Type.

Return Value: The System.Type associated with the specified PROGID, if progID is a valid entry in the registry and a type is associated with it; otherwise, null.

This method is provided for COM support. PROGIDs are not used in the Microsoft.NET Framework because they have been superceded by the concept of namespace. The PROGID of the System.Type to get.

GetTypeFromProgID

[C#] public static Type GetTypeFromProgID(string progID, bool throwOnError);

[C++] public: static Type* GetTypeFromProgID(String* progID, bool throwOnError);

[VB] Public Shared Function GetTypeFromProgID(ByVal progID As String, ByVal throwOnError As Boolean) As Type

[JScript] public static function GetTypeFromProgID (progID: String, throwOnError: Boolean): Type;

Description

Gets the System.Type associated with the specified program identifier (PROGID), specifying whether to throw an exception if an error occurs while loading the System.Type.

Return Value: The System.Type associated with the specified program identifier (PROGID), if progID is a valid entry in the registry and a type is associated with it; otherwise, null.

This method is provided for COM support. Program IDs are not used in Microsoft .NET Framework because they have been superceded by the concept of namespace. The PROGID of the System.Type to get. true to throw a System.TypeLoadException if an error occurs while loading the System.Type.

GetTypeFromProgID

[C#] public static Type GetTypeFromProgID(string progID, string server);

[C++] public: static Type* GetTypeFromProgID(String* progID, String* server);

[VB] Public Shared Function GetTypeFromProgID(ByVal progID As String, ByVal server As String) As Type

[JScript] public static function GetTypeFromProgID (progID: String, server: String): Type;

Description

Gets the System.Type associated with the specified program identifier (progID) from the specified server, returning null if an error is encountered while loading the System.Type.

Return Value: The System.Type associated with the specified program identifier (progID), if progID is a valid entry in the registry and a type is associated with it; otherwise, null.

This method is provided for COM support. Program IDs are not used in Microsoft .NET Framework because they have been superceded by the concept of namespace. The progID of the System.Type to get. The server from which to load the type.

GetTypeFromProgID

[C#] public static Type GetTypeFromProgID(string progID, string server, bool throwOnError);

[C++] public: static Type* GetTypeFromProgID(String* progID, String* server, bool throwOnError);

[VB] Public Shared Function GetTypeFromProgID(ByVal progID As String, ByVal server As String, ByVal throwOnError As Boolean) As Type

[JScript] public static function GetTypeFromProgID (progID: String, server: String, throwOnError: Boolean): Type;

Description

Gets the System.Type associated with the specified program identifier (progID) from the specified server, specifying whether to throw an exception if an error occurs while loading the System.Type.

Return Value: The System.Type associated with the specified program identifier (progID), if progID is a valid entry in the registry and a type is associated with it; otherwise, null This method is provided for COM support. Program IDs are not used in Microsoft .NET Framework because they have been superceded by the concept of namespace. The progID of the System.Type to get. The server from which to load the type. true to throw a System.TypeLoadException if an error occurs while loading the System.Type.

GetTypeHandle

[C#] public static RuntimeTypeHandle GetTypeHandle(object o);

[C++] public: static RuntimeTypeHandle GetTypeHandle (Object* o);

[VB] Public Shared Function GetTypeHandle(ByVal o As Object) As RuntimeTypeHandle

[JScript] public static function GetTypeHandle(o: Object): RuntimeTypeHandle;

Description

Gets the handle for the System.Type of a specified object.

Return Value: The handle for the System.Type of the specified System.Object.

The handles are valid only in the application domain in which they were obtained. The System.Object for which to get the Type handle.

HasElementTypeImpl

[C#] protected abstract bool HasElementTypeImpl( );

[C++] protected: virtual bool HasElementTypeImpl( )=0;

[VB] MustOverride Protected Function HasElementTypeImpl( ) As Boolean

[JScript] protected abstract function HasElementType Impl( ): Boolean;

Description

When overridden in a derived class, implements the System.Type.HasElementType property and determines whether the current System.Type encompasses or refers to another type; that is, whether the current System.Type is an array, a pointer, or is passed by reference.

Return Value: true if the System.Type is an array, a pointer, or is passed by reference; otherwise, false.

For example, Type.GetType("Int32[ ]").HasElementTypeImpl returns true, but Type.GetType("Int32").HasElementTypeImpl returns false. HasElementTypeImpl also returns true for "Int32*" and "Int32&".

InvokeMember

[C#] public object InvokeMember(string name, BindingFlags invokeAttr, Binder binder, object target, object[ ] args);

[C++] public: Object* InvokeMember(String* name, BindingFlags invokeAttr, Binder* binder, Object* target, Object* args _gc[ ]);

[VB] Public Function InvokeMember(ByVal name As String, ByVal invokeAttr As BindingFlags, ByVal binder As Binder, ByVal target As Object, ByVal args( ) As Object) As Object

[JScript] public function InvokeMember(name: String, invokeAttr: BindingFlags, binder: Binder, target: Object, args: Object[ ]): Object;

Description

Invokes the specified member, using the specified binding constraints and matching the specified argument list.

Return Value: An System.Object representing the return value of the invoked member.

The following System.Reflection.BindingFlags filter flags can be used to define which members to include in the search: Instance to include instance members in the search. The System.String containing the name of the constructor, method, property, or field member to invoke. A bitmask comprised of one or more System.Reflection.BindingFlags that specify how the search is conducted. The access can be one of the BindingFlags such as Public, NonPublic, Private, InvokeMethod, GetField, and so on. The type of lookup need not be specified. If the type of lookup is omitted, BindingFlags.DefaultLookup will apply. A System.Reflection. Binder object that defines a set of properties and enables binding, which can involve selection of an overloaded method, coercion of argument types, and invocation of a member through reflection. The System.Object on which to invoke the specified member. An array containing the arguments to pass to the member to invoke.

InvokeMember

[C#] public object InvokeMember(string name, BindingFlags invokeAttr, Binder binder, object target, object[ ] args, CultureInfo culture);

[C++] public: Object* InvokeMember(String* name, BindingFlags invokeAttr, Binder* binder, Object* target, Object* args _gc[ ], CultureInfo* culture);

[VB] Public Function InvokeMember(ByVal name As String, ByVal invokeAttr As BindingFlags, ByVal binder As Binder, ByVal target As Object, ByVal args( ) As Object, ByVal culture As CultureInfo) As Object

[JScript] public function InvokeMember(name: String, invokeAttr: BindingFlags, binder: Binder, target: Object, args: Object[ ], culture: CultureInfo): Object;

Description

Invokes the specified member, using the specified binding constraints and matching the specified argument list and culture.

Return Value: An System.Object representing the return value of the invoked member.

The following System.Reflection.BindingFlags filter flags can be used to define which members to include in the search: Instance to include instance members in the search. The System.String containing the name of the constructor, method, property, or field member to invoke. A bitmask comprised of one or more System.Reflection.BindingFlags that specify how the search is conducted. The access can be one of the BindingFlags such as Public, NonPublic, Private, InvokeMethod, GetField, and so on. The type of lookup need not be specified. If the type of lookup is omitted, BindingFlags.DefaultLookup will apply. A System.Reflection. Binder object that defines a set of properties and enables binding, which can involve selection of an overloaded method, coercion of argument types, and invocation of a member through reflection. The System.Object on which to invoke the specified member. An array containing the arguments to pass to the member to invoke. The System.Globalization.CultureInfo object representing the globalization locale to use, which may be necessary for locale-specific conversions, such as converting a numeric String to a Double.

InvokeMember

[C#] public abstract object InvokeMember(string name, BindingFlags invokeAttr, Binder binder, object target, object[ ] args, ParameterModifier[ ] modifiers, CultureInfo culture, string[ ] namedParameters);

[C++] public: virtual Object* InvokeMember(String* name, BindingFlags invokeAttr, Binder* binder, Object* target, Object* args _gc[ ], ParameterModifier modifiers[ ], CultureInfo* culture, String* namedParameters_gc[ ])=0;

[VB] MustOverride Public Function InvokeMember(ByVal name As String, ByVal invokeAttr As BindingFlags, ByVal binder As Binder, ByVal target As Object, ByVal args( ) As Object, ByVal modifiers( ) As ParameterModifier, ByVal culture As CultureInfo, ByVal namedParameters( ) As String) As Object

[JScript] public abstract function InvokeMember(name: String, invokeAttr: BindingFlags, binder: Binder, target: Object, args: Object[ ], modifiers: ParameterModifier[ ], culture: CultureInfo, namedParameters: String[ ]): Object; Invokes a specific member of the current System.Type.

Description

When overridden in a derived class, invokes the specified member, using the specified binding constraints and matching the specified argument list, modifiers and culture.

Return Value: An System.Object representing the return value of the invoked member.

InvokeMember calls a constructor member or a method member, gets or sets a property member, gets or sets a data field member, or gets or sets an element of an array member. The System.String containing the name of the constructor, method, property, or field member to invoke. A bitmask comprised of one or more System.Reflection.BindingFlags that specify how the search is conducted. The access can be one of the BindingFlags such as Public, NonPublic, Private, InvokeMethod, GetField, and so on. The type of lookup need not be specified. If the type of lookup is omitted, BindingFlags.DefaultLookup will apply. A System.Reflection. Binder object that defines a set of properties and enables binding, which can involve selection of an overloaded method, coercion of argument types, and invocation of a member through reflection. The System.Object on which to invoke the specified member. An array containing the arguments to pass to the member to invoke. An array of System. Reflection.ParameterModifier objects representing the attributes associated with the corresponding element in the args array. A parameter's associated attributes are stored in the member's signature. The default binder does exact matching on the System.Reflection.ParameterAttributesOut and None attributes. The System.Globalization.CultureInfo object representing the globalization locale to use, which may be necessary for locale-specific conversions, such as converting a numeric String to a Double. An array containing the names of the parameters to which the values in the args array are passed.

IsArrayImpl

[C#] protected abstract bool IsArrayImpl( );

[C++] protected: virtual bool IsArrayImpl( )=0;

[VB] MustOverride Protected Function IsArrayImpl( ) As Boolean

[JScript] protected abstract function IsArrayImpl( ): Boolean;

Description

When overridden in a derived class, implements the System.Type.IsArray property and determines whether the System.Type is an array.

Return Value: true if the System.Type is an array; otherwise, false.

An instance of the System.Array class must return false because it is an object, not an array.

IsAssignableFrom

[C#] public virtual bool IsAssignableFrom(Type c);

[C++] public: virtual bool IsAssignableFrom(Type* c);

[VB] Overridable Public Function IsAssignableFrom(ByVal c As Type) As Boolean

[JScript] public function IsAssignableFrom(c: Type): Boolean;

Description

Determines whether an instance of the specified type can be assigned to the current System.Type instance.

Return Value: true if an instance of c can be assigned to the current System.Type instance; otherwise, false.

This method can be overridden by a derived class. The System.Type to examine whether its objects can be assigned to the current System.Type instance.

IsByRefImpl

[C#] protected abstract bool IsByRefImpl( );

[C++] protected: virtual bool IsByRefImpl( )=0;

[VB] MustOverride Protected Function IsByRefImpl( ) As Boolean

[JScript] protected abstract function IsByRefImpl( ): Boolean;

Description

When overridden in a derived class, implements the System.Type.IsByRef property and determines whether the System.Type is passed by reference.

Return Value: true if the System.Type is passed by reference; otherwise, false.

IsCOMObjectImpl

[C#] protected abstract bool IsCOMObjectImpl( );

[C++] protected: virtual bool IsCOMObjectImpl( )=0;

[VB] MustOverride Protected Function IsCOMObjectImpl( ) As Boolean

[JScript] protected abstract function IsCOMObjectImpl( ): Boolean;

Description

When overridden in a derived class, implements the System.Type.IsCOMObject property and determines whether the System.Type is a COM object.

Return Value: true if the System.Type is a COM object; otherwise, false.

This method returns false for COM interfaces because they are not objects. COM interfaces can be implemented by Microsoft .NET Framework objects.

IsContextfulImpl

[C#] protected virtual bool IsContextfulImpl( );

[C++] protected: virtual bool IsContextfulImpl( );

[VB] Overridable Protected Function IsContextfulImpl( ) As Boolean

[JScript] protected function IsContextfulImpl( ): Boolean;

Description

Implements the System.Type.IsContextful property and determines whether the System.Type can be hosted in a context.

Return Value: true if the System.Type can be hosted in a context; otherwise, false This method can be overridden by a derived class.

IsInstanceOfType

[C#] public virtual bool IsInstanceOfType(object o);

[C++] public: virtual bool IsInstanceOfType(Object* o);

[VB] Overridable Public Function IsInstanceOfType(ByVal o As Object) As Boolean

[JScript] public function IsInstanceOfType(o: Object): Boolean;

Description

Determines whether the specified object is an instance of the System.Type

Return Value: true if o is an instance of the System.Type; otherwise, false.

This method can be overridden by a derived class. The System.Object whose type to compare with System.Type.

IsMarshalByRefImpl

[C#] protected virtual bool IsMarshalByRefImpl( );

[C++] protected: virtual bool IsMarshalByRefImpl( ));

[VB] Overridable Protected Function IsMarshalByRefImpl( ) As Boolean

[JScript] protected function IsMarshalByRefImpl( ): Boolean;

Description

Implements the System.Type.IsMarshalByRef property and determines whether the System.Type is marshalled by reference.

Return Value: true if the System.Type is marshalled by reference; otherwise, false.

This method can be overridden by a derived class.

IsPointerImpl

[C#] protected abstract bool IsPointerImpl( );

[C++] protected: virtual bool IsPointerImpl( )=0;

[VB] MustOverride Protected Function IsPointerImpl( ) As Boolean

[JScript] protected abstract function IsPointerImpl( ): Boolean;

Description

When overridden in a derived class, implements the System.Type.IsPointer property and determines whether the System.Type is a pointer.

Return Value: true if the System.Type is a pointer; otherwise, false.

IsPrimitiveImpl

[C#] protected abstract bool IsPrimitiveImpl( );

[C++] protected: virtual bool IsPrimitiveImpl( )=0;

[VB] MustOverride Protected Function IsPrimitiveImpl( ) As Boolean

[JScript] protected abstract function IsPrimitiveImpl( ): Boolean;

Description

When overridden in a derived class, implements the System.Type.IsPrimitive property and determines whether the System.Type is one of the primitive types.

Return Value: true if the System.Type is one of the primitive types; otherwise, false.

The primitive types are System.Boolean, System.Byte, System.SByte, System.Int16, System.UInt16, System.Int32, System.UInt32, System.Int64, System.UInt64, System.Char, System.Double, and System.Single.

IsSubclassOf

[C#] public virtual bool IsSubclassOf(Type c);

[C++] public: virtual bool IsSubclassOf(Type* c);

[VB] Overridable Public Function IsSubclassOf(ByVal c As Type) As Boolean

[JScript] public function IsSubclassOf(c: Type): Boolean;

Description

Determines whether the current System.Type is a derived class of the specified class.

Return Value: true if the current System.Type is a direct or indirect derived class of c; otherwise, false.

This method can be overridden by a derived class. The System.Type that might be a base class of the current System.Type.

IsValueTypeImpl

[C#] protected virtual bool IsValueTypeImpl( );

[C++] protected: virtual bool IsValueTypeImpl( );

[VB] Overridable Protected Function IsValueTypeImpl( ) As Boolean

[JScript] protected function IsValueTypeImpl( ): Boolean;

Description

Implements the System.Type.IsValueType property and determines whether the System.Type is a value type; that is, not a class or an interface.

Return Value: true if the System.Type is a value type; otherwise, false.

Value types describe values that are represented as sequences of bits; value types are not classes or interfaces. These are referred to as "structs" in some programming languages. Enums are value types.

ToString

[C#] public override string ToString( );

[C++] public: String* ToString( );

[VB] Overrides Public Function ToString( ) As String

[JScript] public override function ToString( ): String;

Description

Returns a String representing the name of the current Type.

Return Value: A System.String representing the name of the current System.Type.

This method returns the fully qualified common language runtime namespace and name for all primitive types. For example, the C# instruction, (long)0.Type( ).ToString( ) returns "System.Int64" instead of merely "Int64".

TypeCode enumeration (System)

ToString

Description

Specifies the type of an object.

Call the System.IConvertible.GetTypeCode method on classes that implement the System.IConvertible interface to obtain the type code for an instance of that class.

ToString

[C#] public const TypeCode Boolean;

[C++] public: const TypeCode Boolean;

[VB] Public Const Boolean As TypeCode

[JScript] public var Boolean: TypeCode;

Description

A simple type representing Boolean values of true or false.

ToString

[C#] public const TypeCode Byte;

[C++] public: const TypeCode Byte;

[VB] Public Const Byte As TypeCode

[JScript] public var Byte: TypeCode;

Description

An integral type representing unsigned 8-bit integers with values between 0 and 255.

ToString

[C#] public const TypeCode Char;

[C++] public: const TypeCode Char;

[VB] Public Const Char As TypeCode

[JScript] public var Char: TypeCode;

Description

An integral type representing unsigned 16-bit integers with values between 0 and 65535. The set of possible values for the System.TypeCode.Char type corresponds to the Unicode character set.

ToString

[C#] public const TypeCode DateTime;

[C++] public: const TypeCode DateTime;

[VB] Public Const DateTime As TypeCode

[JScript] public var DateTime: TypeCode;

Description

A type representing a date and time value.

ToString

[C#] public const TypeCode DBNull;

[C++] public: const TypeCode DBNull;

[VB] Public Const DBNull As TypeCode

[JScript] public var DBNull: TypeCode;

Description

A database null (column) value.

ToString

[C#] public const TypeCode Decimal;

[C++] public: const TypeCode Decimal;

[VB] Public Const Decimal As TypeCode

[JScript] public var Decimal: TypeCode;

Description

A simple type representing values ranging from 1.0×10 to approximately 7.9×10 with 28-29 significant digits.

ToString

[C#] public const TypeCode Double;

[C++] public: const TypeCode Double;

[VB] Public Const Double As TypeCode

[JScript] public var Double: TypeCode;

Description

A floating point type representing values ranging from approximately 5.0×10 to 1.7×10 with a precision of 15-16 digits.

ToString

[C#] public const TypeCode Empty;

[C++] public: const TypeCode Empty;

[VB] Public Const Empty As TypeCode

[JScript] public var Empty: TypeCode;

Description

A null reference.

ToString

[C#] public const TypeCode Int16;

[C++] public: const TypeCode Int16;

[VB] Public Const Int16 As TypeCode

[JScript] public var Int16: TypeCode;

Description

An integral type representing signed 16-bit integers with values between −32768 and 32767.

ToString

[C#] public const TypeCode Int32; 3[C++] public: const TypeCode Int32;

[VB] Public Const Int32 As TypeCode

[JScript] public var Int32: TypeCode;

Description

An integral type representing signed 32-bit integers with values between −2147483648 and 2147483647.

ToString

[C#] public const TypeCode Int64;

[C++] public: const TypeCode Int64;

[VB] Public Const Int64 As TypeCode

[JScript] public var Int64: TypeCode;

Description

An integral type representing signed 64-bit integers with values between −9223372036854775808 and 9223372036854775807.

ToString

[C#] public const TypeCode Object;

[C++] public: const TypeCode Object;

[VB] Public Const Object As TypeCode

[JScript] public var Object: TypeCode;

Description

A general type representing any reference or value type not explicitly represented by another TypeCode.

ToString

[C#] public const TypeCode SByte;

[C++] public: const TypeCode SByte;

[VB] Public Const SByte As TypeCode

[JScript] public var SByte: TypeCode;

Description

An integral type representing signed 8-bit integers with values between −128 and 127.

ToString

[C#] public const TypeCode Single;

[C++] public: const TypeCode Single;

[VB] Public Const Single As TypeCode

[JScript] public var Single: TypeCode;

Description

A floating point type representing values ranging from approximately 1.5×10 to 3.4×10 with a precision of 7 digits.

ToString

[C#] public const TypeCode String;

[C++] public: const TypeCode String;

[VB] Public Const String As TypeCode

[JScript] public var String: TypeCode;

Description

A sealed class type representing Unicode character strings.

ToString

[C#] public const TypeCode UInt16;

[C++] public: const TypeCode UInt16;

[VB] Public Const UInt16 As TypeCode

[JScript] public var UInt16: TypeCode;

Description

An integral type representing unsigned 16-bit integers with values between 0 and 65535.

ToString

[C#] public const TypeCode UInt32; 8 [C++] public: const TypeCode UInt32;

[VB] Public Const UInt32 As TypeCode

[JScript] public var UInt32: TypeCode;

Description

An integral type representing unsigned 32-bit integers with values between 0 and 4294967295.

ToString

[C#] public const TypeCode UInt64;

[C++] public: const TypeCode UInt64;

[VB] Public Const UInt64 As TypeCode

[JScript] public var UInt64: TypeCode;

Description

An integral type representing unsigned 64-bit integers with values between 0 and 18446744073709551615.

TypedReference structure (System)

ToString

Description

Describes objects that contain both a managed pointer to a location and a runtime representation of the type that may be stored at that location.

A typed reference is a type/value combination used for varargs and other support.

Equals

[C#] public override bool Equals(object o);

[C++] public: bool Equals(Object* o);

[VB] Overrides Public Function Equals(ByVal o As Object) As Boolean

[JScript] public override function Equals(o: Object): Boolean;

Description

Checks if this object is equal to the specified object.

Return Value: true if this object is equal to the specified object; otherwise, false.

The object with which to compare the current object.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code of this object.

Return Value: The hash code of this object.

GetTargetType

[C#] public static Type GetTargetType(TypedReference value);

[C++] public: static Type* GetTargetType(TypedReference value);

[VB] Public Shared Function GetTargetType(ByVal value As TypedReference) As Type

[JScript] public static function GetTargetType(value: Typed Reference): Type;

Description

Returns the type of the target of the specified TypedReference.

Return Value: The type of the target of the specified Typed Reference. The value whose target's type is to be returned.

MakeTypedReference

[C#] public static TypedReference MakeTypedReference (object target, FieldInfo[ ] flds);

[C++] public: static TypedReference MakeTypedReference (Object* target, FieldInfo* flds[ ]);

[VB] Public Shared Function MakeTypedReference(ByVal target As Object, ByVal flds( ) As FieldInfo) As TypedReference

[JScript] public static function MakeTypedReference(target: Object, flds: FieldInfo[ ]): TypedReference;

Description

Makes a TypedReference for the specified target object using the specifying fields.

Return Value: A TypedReference for the specified target. The target object that defines the type of the TypedReference. The fields to be encapsulated.

SetTypedReference

[C#] public static void SetTypedReference(TypedReference target, object value);

[C++] public: static void SetTypedReference(TypedReference target, Object* value);

[VB] Public Shared Sub SetTypedReference(ByVal target As TypedReference, ByVal value As Object)

[JScript] public static function SetTypedReference(target: TypedReference, value Object);

Description

Converts the specified value to a TypedReference.

Return Value: This method assigns value to target. A change type of value converts it to the type of the TypedReference. The System.Convert.ChangeType(System.Object,System.

TypeCode) method does the conversion. The target of the conversion. The value to be converted.

TargetTypeToken

[C#] public static RuntimeTypeHandle TargetTypeToken (TypedReference value);

[C++] public: static RuntimeTypeHandle TargetTypeToken (TypedReference value);

[VB] Public Shared Function TargetTypeToken(ByVal value As TypedReference) As RuntimeTypeHandle

[JScript] public static function TargetTypeToken(value: TypedReference): RuntimeTypeHandle;

Description

Returns the internal metadata type handle for the specified TypedReference.

Return Value: The internal metadata type handle for the specified TypedReference. The TypedReference for which the type handle is requested.

ToObject

[C#] public static object ToObject(TypedReference value);

[C++] public: static Object* ToObject(TypedReference value);

[VB] Public Shared Function ToObject(ByVal value As Typed Reference) As Object

[JScript] public static function ToObject(value: TypedReference): Object;

Description

Converts the specified TypedReference to an Object.

Return Value: An Object converted from a TypedReference.

This might be a boxing operation. The TypedReference to be converted.

TypeInitializationException class (System)

ToString

Description

The exception that is thrown as a wrapper around the exception thrown by the class initializer. This class cannot be inherited.

When a class initializer fails to initialize a type, a System.TypeInitializationException is created and passed a reference to the exception thrown by the type's class initializer. The System.Exception.InnerException property of System.TypeInitializationException holds the underlying exception.

TypeInitializationException

Example Syntax:

ToString

[C#] public TypeInitializationException(string fullTypeName, Exception innerException);

[C++] public: TypeInitializationException(String* fullTypeName, Exception* innerException);

[VB] Public Sub New(ByVal fullTypeName As String, ByVal innerException As Exception)

[JScript] public function TypeInitializationException (fullTypeName: String, innerException: Exception);

Description

Initializes a new instance of the System.TypeInitializationException class with the default error message, the specified type name, and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The fully qualified name of the type that fails to initialize. An instance of System.Exception that is the cause of the current Exception. If innerException is non-null, then the current Exception is raised in a catch block handling innerException.

HelpLink

HResult

InnerException

Message

Source

StackTrace

TargetSite

TypeName

ToString

Description

Gets the fully qualified name of the type that fails to initialize.

TypeLoadException class (System)

ToString

Description

The exception that is thrown when type-loading failures occur.

System.TypeLoadException is thrown when the Common Language Runtime cannot find the assembly, the type within the assembly, or cannot load the type.

TypeLoadException

Example Syntax:

ToString

[C#] public TypeLoadException( );

[C++] public: TypeLoadException( );

[VB] Public Sub New( )

[JScript] public function TypeLoadException( ); Initializes a new instance of the System.TypeLoadException class.

Description

Initializes a new instance of the System.TypeLoadException class with default properties.

The following table shows the initial property values for an instance of System.TypeLoadException.

TypeLoadException

Example Syntax:

ToString

[C#] public TypeLoadException(string message);

[C++] public: TypeLoadException(String* message);

[VB] Public Sub New(ByVal message As String)

[JScript] public function TypeLoadException(message: String);

Description

Initializes a new instance of the System.TypeLoadException class with a specified error message.

The following table shows the initial property values for an instance of System.TypeLoadException. The error message that explains the reason for the exception.

TypeLoadException

Example Syntax:

ToString

[C#] protected TypeLoadException(SerializationInfo info, StreamingContext context);

[C++] protected: TypeLoadException(SerializationInfo* info, StreamingContext context);

[VB] Protected Sub New(ByVal info As SerializationInfo, ByVal context As StreamingContext)

[JScript] protected function TypeLoadException(info: SerializationInfo, context: StreamingContext);

Description

Initializes a new instance of the System.TypeLoadException class with serialized data.

This constructor is called during deserialization to reconstitute the exception object transmitted over a stream. For more information, see. The object that holds the serialized object data. The contextual information about the source or destination.

TypeLoadException

Example Syntax:

ToString

[C#] public TypeLoadException(string message, Exception inner);

[C++] public: TypeLoadException(String* message, Exception* inner);

[VB] Public Sub New(ByVal message As String, ByVal inner As Exception)

[JScript] public function TypeLoadException(message: String, inner: Exception);

Description

Initializes a new instance of the System.TypeLoadException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If inner is non-null, then the current Exception is raised in a catch block handling inner.

HelpLink

HResult

InnerException

Message

ToString

Description

Gets the error message for this exception.

This property overrides System.Exception.Message. The error message should be localized.

Source

StackTrace

TargetSite

TypeName

ToString

Description

Gets the fully qualified name of the type that causes the exception.

When overriding System.TypeLoadException.TypeName in a derived class, be sure to call the base class's System.TypeLoadException.TypeName property.

GetObjectData

[C#] public override void GetObjectData(SerializationInfo info, StreamingContext context);

[C++] public: void GetObjectData(SerializationInfo* info, StreamingContext context);

[VB] Overrides Public Sub GetObjectData(ByVal info As SerializationInfo, ByVal context As StreamingContext)

[JScript] public override function GetObjectData(info: SerializationInfo, context: StreamingContext);

Description

Sets the System.Runtime.Serialization.SerializationInfo object with the class name, method name, resource ID, and additional exception information. System.TypeLoadException.GetObjectData(System.Runtime.Serialization.SerializationInfo,System.Runtime.Serialization.StreamingContext) sets a System.Runtime.Serialization.SerializationInfo with all the exception object data targeted for serialization. During deserialization, the exception object is reconstituted from the System.Runtime.Serialization.SerializationInfo transmitted over the stream. The object that holds the serialized object data. The contextual information about the source or destination.

TypeUnloadedException class (System)

ToString

Description

The exception that is thrown when there is an attempt to access an unloaded class.

System.TypeUnloadedException uses the HRESULT COR_E_TYPEUNLOADED, which has the value 0x80131013.

TypeUnloadedException

Example Syntax:

ToString

[C#] public TypeUnloadedException( );

[C++] public: TypeUnloadedException( );

[VB] Public Sub New( )

[JScript] public function TypeUnloadedException( ); Initializes new instance of the System.TypeUnloadedException class.

Description

Initializes a new instance of the System.TypeUnloadedException class with default properties.

The following table shows the initial property values for an instance of System.TypeUnloadedException.

TypeUnloadedException

Example Syntax:

ToString

[C#] public TypeUnloadedException(string message);

[C++] public: TypeUnloadedException(String* message);

[VB] Public Sub New(ByVal message As String)

[JScript] public function TypeUnloadedException(message: String);

Description

Initializes a new instance of the System.TypeUnloadedException class with a specified error message.

The following table shows the initial property values for an instance of System.TypeUnloadedException. The error message that explains the reason for the exception.

TypeUnloadedException

Example Syntax:

ToString

[C#] protected TypeUnloadedException(SerializationInfo info, StreamingContext context);

[C++] protected: TypeUnloadedException(SerializationInfo* info, StreamingContext context);

[VB] Protected Sub New(ByVal info As SerializationInfo, ByVal context As StreamingContext)

[JScript] protected function TypeUnloadedException(info: SerializationInfo, context: StreamingContext);

Description

Initializes a new instance of the System.TypeUnloadedException class with serialized data.

This constructor is called during deserialization to reconstitute the exception object transmitted over a stream. For more information, see. The object that holds the serialized object data. The contextual information about the source or destination.

TypeUnloadedException

Example Syntax:

ToString

[C#] public TypeUnloadedException(string message, Exception innerException);

[C++] public: TypeUnloadedException(String* message, Exception* Is innerException);

[VB] Public Sub New(ByVal message As String, ByVal innerException As Exception)

[JScript] public function TypeUnloadedException(message: String, innerException: Exception);

Description

Initializes a new instance of the System.TypeUnloadedException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If innerException is non-null, then the current Exception is raised in a catch block handling innerException.

HelpLink

HResult

InnerException

Message

Source

StackTrace

TargetSite

UInt16 structure (System)

ToString

Description

Represents a 16-bit unsigned integer.

The UInt16 value type represents unsigned integers with values ranging from 0 to 65535.

ToString

[C#] public const ushort MaxValue;

[C++] public: const unsigned short MaxValue;

[VB] Public Const MaxValue As UInt16

[JScript] public var MaxValue: UInt16;

Description

A constant representing the largest possible value of UInt16.

The value of this constant is 65535; that is, hexadecimal 0xFFFF.

ToString

[C#] public const ushort MinValue;

[C++] public: const unsigned short MinValue;

[VB] Public Const MinValue As UInt16

[JScript] public var MinValue: UInt16;

Description

A constant representing the smallest possible value of UInt16.

The value of this constant is 0.

CompareTo

[C#] public int CompareTo(object value);

[C++] public: _sealed int CompareTo(Object* value);

[VB] NotOverridable Public Function CompareTo(ByVal value As Object) As Integer

[JScript] public function CompareTo(value: Object): int;

Description

Compares this instance to a specified object and returns an indication of their relative values.

Return Value: A signed number indicating the relative values of this instance and value.

Any instance of UInt16, regardless of its value, is considered greater than null. An object to compare, or null.

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Returns a value indicating whether this instance is equal to a specified object.

Return Value: true if obj is an instance of UInt16 and equals the value of this instance; otherwise, false. An object to compare with this instance.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for this instance.

Return Value: A 32-bit signed integer hash code.

GetTypeCode

[C#] public TypeCode GetTypeCode( );

[C++] public: _sealed TypeCode GetTypeCode( ); I[VB] NotOverridable Public Function GetTypeCode( ) As TypeCode

[JScript] public function GetTypeCode( ): TypeCode;

Description

Returns the TypeCode for value type UInt16.

Return Value: The enumerated constant, System.Type Code.UInt16.

Parse

[C#] public static ushort Parse(string s);

[C++] public: static unsigned short Parse(String* s);

[VB] Public Shared Function Parse(ByVal s As String) As UInt16

[JScript] public static function Parse(s: String): UInt16; Converts the String representation of a number to its 16-bit unsigned integer equivalent.

Description

Converts the String representation of a number to its 16-bit unsigned integer equivalent.

Return Value: An 16-bit unsigned integer equivalent to the number contained in s.

s contains a number of the form: [ws][sign]digits[ws] Items in square brackets ('[' and ']') are optional, and other items are as follows. A System.String containing a number to convert.

Parse

[C#] public static ushort Parse(string s, IFormatProvider provider);

[C++] public: static unsigned short Parse(String* s, IFormatProvider* provider);

[VB] Public Shared Function Parse(ByVal s As String, ByVal provider As IFormatProvider) As UInt16

[JScript] public static function Parse(s: String, provider: IFormatProvider): UInt16;

Description

Converts the String representation of a number in a specified culture-specific format to its 16-bit unsigned integer equivalent.

Return Value: An 16-bit unsigned integer equivalent to the number specified in s.

s contains a number of the form: [ws][sign]digits [ws] Items in square brackets ('[' and ']') are optional, and other items are as follows. A System.String containing a number to convert. An System.IFormatProvider interface implementation which supplies culture-specific formatting information about s.

Parse

[C#] public static ushort Parse(string S, NumberStyles style);

[C++] public: static unsigned short Parse(String* s, NumberStyles style);

[VB] Public Shared Function Parse(ByVal s As String, ByVal style As NumberStyles) As UInt16

[JScript] public static function Parse(s: String, style: NumberStyles): UInt16;

Description

Converts the String representation of a number in a specified style to its 16-bit unsigned integer equivalent.

Return Value: An 16-bit unsigned integer equivalent to the number specified in s.

s contains a number of the form: [ws][sign]digits[ws] Items in square brackets ('[' and ']') are optional, and other items are as follows. A System.String containing a number to convert. The combination of one or more System.Globalization.NumberStyles constants that indicate the permitted format of s.

Parse

[C#] public static ushort Parse(string s, NumberStyles style, IFormatProvider provider);

[C++] public: static unsigned short Parse(String* s, NumberStyles style, IFormatProvider* provider);

[VB] Public Shared Function Parse(ByVal s As String, ByVal style As NumberStyles, ByVal provider As IFormatProvider) As UInt16

[JScript] public static function Parse(s: String, style: NumberStyles, provider: IFormatProvider): UInt16;

Description

Converts the String representation of a number in a specified style and culture-specific format to its 16-bit unsigned integer equivalent.

Return Value: An 16-bit unsigned integer equivalent to the number specified in s.

s contains a number of the form: [ws][sign]digits[ws] Items in square brackets ('[' and ']') are optional, and other items are as follows. A System.String containing a number to convert. The combination of one or more System.Globalization.NumberStylesconstants that indicate the permitted format of s. An System.IFormatProvider interface implementation which supplies culture-specific formatting information about s.

IConvertible.ToBoolean

[C#] bool IConvertible.ToBoolean(IFormatProvider provider);

[C++] bool IConvertible::ToBoolean(IFormatProvider* provider);

[VB] Function ToBoolean(ByVal provider As IFormatProvider) As Boolean Implements IConvertible.ToBoolean

[JScript] function IConvertible.ToBoolean(provider: IFormatProvider): Boolean;

IConvertible.ToByte

[C#] byte IConvertible.ToByte(IFormatProvider provider);

[C++] unsigned char IConvertible::ToByte(IFormatProvider* provider);

[VB] Function ToByte(ByVal provider As IFormatProvider) As Byte Implements IConvertible.ToByte

[JScript] function IConvertible.ToByte(provider: IFormatProvider): Byte;

IConvertible.ToChar

[C#] char IConvertible.ToChar(IFormatProvider provider);

[C++] _wchar_t IConvertible::ToChar(IFormatProvider* provider);

[VB] Function ToChar(ByVal provider As IFormatProvider) As Char Implements IConvertible.ToChar

[JScript] function IConvertible.ToChar(provider: IFormatProvider): Char;

IConvertible.ToDateTime

[C#] DateTime IConvertible.ToDateTime(IFormatProvider provider);

[C++] DateTime IConvertible::ToDateTime(IFormatProvider* provider);

[VB] Function ToDateTime(ByVal provider As IFormatProvider) As DateTime Implements IConvertible.ToDateTime

[JScript] function IConvertible.ToDateTime(provider: IFormatProvider) DateTime;

IConvertible.ToDecimal

[C#] decimal IConvertible.ToDecimal(IFormatProvider provider);

[C++] Decimal IConvertible::ToDecimal(IFormatProvider* provider);

[VB] Function ToDecimal(ByVal provider As IFormatProvider) As Decimal Implements IConvertible.ToDecimal

[JScript] function IConvertible.ToDecimal(provider: IFormatProvider): Decimal;

IConvertible.ToDouble

[C#] double IConvertible.ToDouble(IFormatProvider provider);

[C++] double IConvertible::ToDouble(IFormatProvider* provider);

[VB] Function ToDouble(ByVal provider As IFormatProvider) As Double Implements IConvertible.ToDouble

[JScript] function IConvertible.ToDouble(provider: IFormatProvider): double; IConvertible.ToInt16

[C#] short IConvertible.ToInt16(IFormatProvider provider);

[C++] short IConvertible::ToInt16(IFormatProvider* provider);

[VB] Function ToInt16(ByVal provider As IFormatProvider) As Short Implements IConvertible.ToInt16

[JScript] function IConvertible.ToInt16(provider: IFormatProvider): Int16;

IConvertible.ToInt32

[C#] int IConvertible.ToInt32(IFormatProvider provider);

[C++] int IConvertible::ToInt32(IFormatProvider* provider);

[VB] Function ToInt32(ByVal provider As IFormatProvider) As Integer Implements IConvertible.ToInt32

[JScript] function IConvertible.ToInt32(provider: IFormatProvider): int;

IConvertible.ToInt64

[C#] long IConvertible.ToInt64(IFormatProvider provider);

[C++] _int64 IConvertible::ToInt64(IFormatProvider* provider);

[VB] Function ToInt64(ByVal provider As IFormatProvider) As Long Implements IConvertible.ToInt64

[JScript] function IConvertible.ToInt64(provider: IFormatProvider): long;

IConvertible.ToSByte

[C#] sbyte IConvertible.ToSByte(IFormatProvider provider);

[C++] char IConvertible::ToSByte(IFormatProvider* provider);

[VB] Function ToSByte(ByVal provider As IFormatProvider) As SByte Implements IConvertible.ToSByte

[JScript] function IConvertible.ToSByte(provider: IFormatProvider): SByte;

IConvertible.ToSingle

[C#] float IConvertible.ToSingle(IFormatProvider provider);

[C++] float IConvertible::ToSingle(IFormatProvider* provider);

[VB] Function ToSingle(ByVal provider As IFormatProvider) As Single Implements IConvertible.ToSingle

[JScript] function IConvertible.ToSingle(provider: IFormatProvider): float;

IConvertible.ToType

[C#] object IConvertible.ToType(Type type, IFormatProvider provider);

[C++] Object* IConvertible::ToType(Type* type, IFormatProvider* provider);

[VB] Function ToType(ByVal type As Type, ByVal provider As IFormatProvider) As Object Implements IConvertible.ToType

[JScript] function IConvertible.ToType(type: Type, provider: IFormatProvider): Object;

IConvertible.ToUInt16

[C#] ushort IConvertible.ToUInt16(IFormatProvider provider);

[C++] unsigned short IConvertible::ToUInt16(IFormatProvider* provider);

[VB] Function ToUInt16(ByVal provider As IFormatProvider) As UInt16 Implements IConvertible.ToUInt16

[JScript] function IConvertible.ToUInt16(provider: IFormatProvider): UInt16;

IConvertible.ToUInt32

[C#] uint IConvertible.ToUInt32(IFormatProvider provider);

[C++] unsigned int IConvertible::ToUInt32(IFormatProvider* provider);

[VB] Function ToUInt32(ByVal provider As IFormatProvider) As UInt32 Implements IConvertible.ToUInt32

[JScript] function IConvertible.ToUInt32(provider: IFormatProvider): UInt32;

IConvertible.ToUInt64

[C#] ulong IConvertible.ToUInt64(IFormatProvider provider);

[C++] unsigned _int64 IConvertible::ToUInt64(IFormatProvider* provider);

[VB] Function ToUInt64(ByVal provider As IFormatProvider) As UInt64 Implements IConvertible.ToUInt64

[JScript] function IConvertible.ToUInt64(provider: IFormatProvider): UInt64;

ToString

[C#] public override string ToString( );

[C++] public: String* ToString( );

[VB] Overrides Public Function ToString( ) As String

[JScript] public override function ToString( ): String; Converts the numeric value of this instance to its equivalent String representation.

Description

Converts the numeric value of this instance to its equivalent String representation.

Return Value: The System.String representation of the value of this instance, consisting of a sequence of digits ranging from 0 to 9, without a sign or leading zeroes.

The return value is formatted with the general format specifier ("G") and the System.Globalization.NumberFormatInfo for the current culture.

ToString

[C#] public string ToString(IFormatProvider provider);

[C++] public: __sealed String* ToString(IFormatProvider* provider);

[VB] NotOverridable Public Function ToString(ByVal provider As IFormatProvider) As String

[JScript] public function ToString(provider: IFormatProvider): String;

Description

Converts the numeric value of this instance to its equivalent String representation using the specified culture-specific format information.

Return Value: The System.String representation of the value of this instance as specified by provider.

This instance is formatted with the general format specifier ("G"). An System.IFormatProvider interface implementation which supplies culture-specific formatting information.

ToString

[C#] public string ToString(string format);

[C++] public: String* ToString(String* format);

[VB] Public Function ToString(ByVal format As String) As String

[JScript] public function ToString(format: String): String;

Description

Converts the numeric value of this instance to its equivalent String representation using the specified format.

Return Value: The System.String representation of the value of this instance as specified by format.

If format is null or an empty string (" "), the return value of this instance is formatted with the general format specifier ("G"). A format string.

ToString

[C#] public string ToString(string format, IFormatProvider provider);

[C++] public: _sealed String* ToString(String* format, IFormatProvider* provider);

[VB] NotOverridable Public Function ToString(ByVal format As String, ByVal provider As IFormatProvider) As String

[JScript] public function ToString(format: String, provider: IFormatProvider): String;

Description

Converts the numeric value of this instance to its equivalent String representation using the specified format and culture-specific format information.

Return Value: The System.String representation of the value of this instance as specified by format and provider.

If format is null or an empty string (" "), the return value for this instance is formatted with the general format specifier ("G"). A format specification. An System.IFormatProvider interface implementation which supplies culture-specific formatting information about this instance.

UInt32 structure (System)

ToString

Description

Represents a 32-bit unsigned integer.

The UInt32 value type represents unsigned integers with values ranging from 0 to 4,294,967,295.

ToString

[C#] public const uint MaxValue;

[C++] public: const unsigned int MaxValue;

[VB] Public Const MaxValue As UInt32

[JScript] public var MaxValue: UInt32;

Description

A constant representing the largest possible value of UInt32 The value of this constant is 4294967295; that is, hexadecimal 0xFFFFFFFF.

ToString

[C#] public const uint MinValue;

[C++] public: const unsigned int MinValue;

[VB] Public Const MinValue As UInt32

[JScript] public var MinValue: UInt32;

Description

A constant representing the smallest possible value of UInt32.

The value of this constant is 0.

CompareTo

[C#] public int CompareTo(object value);

[C++] public: _sealed int CompareTo(Object* value);

[VB] NotOverridable Public Function CompareTo(ByVal value As Object) As Integer

[JScript] public function CompareTo(value: Object): int;

Description

Compares this instance to a specified object and returns an indication of their relative values.

Return Value: A signed number indicating the relative values of this instance and value.

Any instance of UInt32, regardless of its value, is considered greater than null. An object to compare, or null.

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Returns a value indicating whether this instance is equal to a specified object.

Return Value: true if obj is an instance of UInt32 and equals the value of this instance; otherwise, false. An object to compare with this instance.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for this instance.

Return Value: A 32-bit signed integer hash code.

GetTypeCode

[C#] public TypeCode GetTypeCode( );

[C++] public: _sealed TypeCode GetTypeCode( );

[VB] NotOverridable Public Function GetTypeCode( ) As TypeCode

[JScript] public function GetTypeCode( ): TypeCode;

Description

Returns the TypeCode for value type UInt32.

Return Value: The enumerated constant, System.TypeCode.UInt32.

Parse

[C#] public static uint Parse(string s);

[C++] public: static unsigned int Parse(String* s);

[VB] Public Shared Function Parse(ByVal s As String) As UInt32

[JScript] public static function Parse(s: String): UInt32; Converts the String representation of a number to its 32-bit unsigned integer equivalent.

Description

Converts the String representation of a number to its 32-bit unsigned integer equivalent.

Return Value: An 32-bit unsigned integer equivalent to the number contained in s.

s contains a number of the form: [ws][sign]digits[ws] Items in square brackets ('[' and ']') are optional, and other items are as follows. A System.String containing a number to convert.

Parse

[C#] public static uint Parse(string s, IFormatProvider provider);

[C++] public: static unsigned int Parse(String* s, IFormatProvider* provider);

[VB] Public Shared Function Parse(ByVal s As String, ByVal provider As IFormatProvider) As UInt32

[JScript] public static function Parse(s: String, provider: IFormatProvider) UInt32;

Description

Converts the String representation of a number in a specified culture-specific format to its 32-bit unsigned integer equivalent.

Return Value: An 32-bit unsigned integer equivalent to the number specified in s.

s contains a number of the form: [ws][sign]digits[ws] Items in square brackets ('[' and ']') are optional, and other items are as follows. A System.String containing a number to convert. An System.IFormatProvider interface implementation which supplies culture-specific formatting information about s.

Parse

[C#] public static uint Parse(string 1, NumberStyles style);

[C++] public: static unsigned nt Parse(String* s, NumberStyles style);

[VB] Public Shared Function Parse(ByVal s As String, ByVal style As NumberStyles) As UInt32

[JScript] public static function Parse(s: String, style: NumberStyles): UInt32;

Description

Converts the String representation of a number in a specified style to its 32-bit unsigned integer equivalent.

Return Value: An 32-bit unsigned integer equivalent to the number specified in s.

s contains a number of the form: [ws][sign]digits[ws] Items in square brackets ('[' and ']') are optional, and other items are as follows. A System.String containing a number to convert. The combination of one or more System.Globalization.NumberStyles constants that indicate the permitted format of s.

Parse

[C#] public static uint Parse(string s, NumberStyles style, IFormatProvider provider);

[C++] public: static unsigned int Parse(String* s, NumberStyles style, IFormatProvider* provider);

[VB] Public Shared Function Parse(ByVal s As String, ByVal style As NumberStyles, ByVal provider As IFormatProvider) As UInt32

[JScript] public static function Parse(s: String, style: NumberStyles, provider: IFormatProvider): UInt32;

Description

Converts the String representation of a number in a specified style and culture-specific format to its 32-bit unsigned integer equivalent.

Return Value: An 32-bit unsigned integer equivalent to the number specified in s.

s contains a number of the form: [ws][sign]digits[ws] Items in square brackets ('[' and ']') are optional, and other items are as follows. A System.String containing a number to convert. The combination of one or more System.Globalization.NumberStylesconstants that indicate the permitted format of s. An System.IFormatProvider interface implementation which supplies culture-specific formatting information about s.

IConvertible.ToBoolean

[C#] bool IConvertible.ToBoolean(IFormatProvider provider);

[C++] bool IConvertible::ToBoolean(IFormatProvider* provider);

[VB] Function ToBoolean(ByVal provider As IFormatProvider) As Boolean Implements IConvertible.ToBoolean

[JScript] function IConvertible.ToBoolean(provider: IFormatProvider): Boolean;

IConvertible.ToByte

[C#] byte IConvertible.ToByte(IFormatProvider provider);

[C++] unsigned char IConvertible::ToByte(IFormatProvider* provider);

[VB] Function ToByte(ByVal provider As IFormatProvider) As Byte Implements IConvertible.ToByte

[JScript] function IConvertible.ToByte(provider: IFormatProvider): Byte;

IConvertible.ToChar

[C#] char IConvertible.ToChar(IFormatProvider provider);

[C++] _wchar_t IConvertible::ToChar(IFormatProvider* provider);

[VB] Function ToChar(ByVal provider As IFormatProvider) As Char Implements IConvertible.ToChar

[JScript] function IConvertible.ToChar(provider: IFormatProvider): Char;

IConvertible.ToDateTime

[C#] DateTime IConvertible.ToDateTime(IFormatProvider provider);

[C++] DateTime IConvertible::ToDateTime(IFormatProvider* provider);

[VB] Function ToDateTime(ByVal provider As IFormatProvider) As DateTime Implements IConvertible.ToDateTime

[JScript] function IConvertible.ToDateTime(provider: IFormatProvider): DateTime;

IConvertible.ToDecimal

[C#] decimal IConvertible.ToDecimal(IFormatProvider provider);

[C++] Decimal IConvertible::ToDecimal(IFormatProvider* provider);

[VB] Function ToDecimal(ByVal provider As IFormatProvider) As Decimal Implements IConvertible.ToDecimal

[JScript] function IConvertible.ToDecimal(provider: IFormatProvider): Decimal;

IConvertible.ToDouble

[C#] double IConvertible.ToDouble(IFormatProvider provider);

[C++] double IConvertible::ToDouble(IFormatProvider* provider);

[VB] Function ToDouble(ByVal provider As IFormatProvider) As Double Implements IConvertible.ToDouble

[JScript] function IConvertible.ToDouble(provider: IFormatProvider): double;

IConvertible.ToInt16

[C#] short IConvertible.ToInt16(IFormatProvider provider);

[C++] short IConvertible::ToInt16(IFormatProvider* provider);

[VB] Function ToInt16(ByVal provider As IFormatProvider) As Short Implements IConvertible.ToInt16

[JScript] function IConvertible.ToInt16(provider: IFormatProvider): Int16;

IConvertible.ToInt32

[C#] int IConvertible.ToInt32(IFormatProvider provider);

[C++] int IConvertible::ToInt32(IFormatProvider* provider);

[VB] Function ToInt32(ByVal provider As IFormatProvider) As Integer Implements IConvertible.ToInt32

[JScript] function IConvertible.ToInt32(provider: IFormatProvider): int;

IConvertible.ToInt64

[C#] long IConvertible.ToInt64(IFormatProvider provider);

[C++]-int64 IConvertible::ToInt64(IFormatProvider* provider);

[VB] Function ToInt64(ByVal provider As IFormatProvider) As Long Implements IConvertible.ToInt64

[JScript] function IConvertible.ToInt64(provider: IFormatProvider): long;

IConvertible.ToSByte

[C#] sbyte IConvertible.ToSByte(IFormatProvider provider);

[C++] char IConvertible::ToSByte(IFormatProvider* provider);

[VB] Function ToSByte(ByVal provider As IFormatProvider) As SByte Implements IConvertible.ToSByte

[JScript] function IConvertible.ToSByte(provider: IFormatProvider): SByte;

IConvertible.ToSingle

[C#] float IConvertible.ToSingle(IFormatProvider provider);

[C++] float IConvertible::ToSingle(IFormatProvider* provider);

[VB] Function ToSingle(ByVal provider As IFormatProvider) As Single Implements IConvertible.ToSingle

[JScript] function IConvertible.ToSingle(provider: IFormatProvider): float;

IConvertible.ToType

[C#] object IConvertible.ToType(Type type, IFormatProvider provider);

[C++] Object* IConvertible::ToType(Type* type, IFormatProvider* provider);

[VB] Function ToType(ByVal type As Type, ByVal provider As IFormatProvider) As Object Implements IConvertible.ToType

[JScript] function IConvertible.ToType(type: Type, provider: IFormatProvider) Object;

IConvertible.ToUInt16

[C#] ushort IConvertible.ToUInt16(IFormatProvider provider);

[C++] unsigned short IConvertible::ToUInt16(IFormatProvider* provider);

[VB] Function ToUInt16(ByVal provider As IFormatProvider) As UInt16 Implements IConvertible.ToUInt16

[JScript] function IConvertible.ToUInt16(provider: IFormatProvider): UInt16;

IConvertible.ToUInt32

[C#] uint IConvertible.ToUInt32(IFormatProvider provider);

[C++] unsigned int IConvertible::ToUInt32(IFormatProvider* provider);

[VB] Function ToUInt32(ByVal provider As IFormatProvider) As UInt32 Implements IConvertible.ToUInt32

[JScript] function IConvertible.ToUInt32(provider: IFormatProvider): UInt32;

IConvertible.ToUInt64

[C#] ulong IConvertible.ToUInt64(IFormatProvider provider);

[C++] unsigned _int64 IConvertible::ToUInt64(IFormatProvider* provider);

[VB] Function ToUInt64(ByVal provider As IFormatProvider) As UInt64 Implements IConvertible.ToUInt64

[JScript] function IConvertible.ToUInt64(provider: IFormatProvider): UInt64;

ToString

[C#] public override string ToString( );

[C++] public: String* ToString( );

[VB] Overrides Public Function ToString( ) As String

[JScript] public override function ToString( ): String; Converts the numeric value of this instance to its equivalent String representation.

Description

Converts the numeric value of this instance to its equivalent String representation.

Return Value: The System.String representation of the value of this instance, consisting of a sequence of digits ranging from 0 to 9, without a sign or leading zeroes.

The return value is formatted with the general format specifier ("G") and the System.Globalization.NumberFormatInfo for the current culture.

ToString

[C#] public string ToString(IFormatProvider provider);

[C++] public: _sealed String* ToString(IFormatProvider* provider);

[VB] NotOverridable Public Function ToString(ByVal provider As IFormatProvider) As String

[JScript] public function ToString(provider: IFormatProvider): String;

Description

Converts the numeric value of this instance to its equivalent String representation using the specified culture-specific format information.

Return Value: The System.String representation of the value of this instance as specified by provider.

This instance is formatted with the general format specifier ("G"). An System.IFormatProvider interface implementation which supplies culture-specific formatting information.

ToString

[C#] public string ToString(string format);

[C++] public: String* ToString(String* format);

[VB] Public Function ToString(ByVal format As String) As String

[JScript] public function ToString(format: String): String;

Description

Converts the numeric value of this instance to its equivalent String representation using the specified format.

Return Value: The System.String representation of the value of this instance as specified by format.

If format is null or an empty string (" ")the return value of this instance is formatted with the general format specifier ("G"). A format string.

ToString

[C#] public string ToString(string format, IFormatProvider provider);

[C++] public: _sealed String* ToString(String* format, IFormatProvider* provider);

[VB] NotOverridable Public Function ToString(ByVal format As String, ByVal provider As IFormatProvider) As String

[JScript] public function ToString(format: String, provider: IFormatProvider): String;

Description

Converts the numeric value of this instance to its equivalent String representation using the specified format and culture-specific format information.

Return Value: The System.String representation of the value of this instance as specified by format and provider.

If format is null or an empty string (" ") the return value for this instance is formatted with the general format specifier ("G"). A format specification. An System.IFormatProvider interface implementation which supplies culture-specific formatting information about this instance.

UInt64 structure (System)

ToString

Description

Represents a 64-bit unsigned integer.

The UInt64 value type represents unsigned integers with values ranging from 0 to 184,467,440,737,095,551,615.

ToString

[C#] public const ulong MaxValue;

[C++] public: const unsigned _int64 MaxValue;

[VB] Public Const MaxValue As UInt64

[JScript] public var MaxValue: UInt64;

Description

A constant representing the largest possible value of UInt64.

The value of this constant is 18,446,744,073,709,551,615; that is, hexadecimal 0xFFFFFFFFFFFFFFFF.

ToString

[C#] public const ulong MinValue;

[C++] public: const unsigned _int64 MinValue;

[VB] Public Const MinValue As UInt64

[JScript] public var MinValue: UInt64;

Description

A constant representing the smallest possible value of UInt64.

The value of this constant is 0.

CompareTo

[C#] public int CompareTo(object value);

[C++] public: _sealed int CompareTo(Object* value);

[VB] NotOverridable Public Function CompareTo(ByVal value As Object) As Integer

[JScript] public function CompareTo(value: Object): int;

Description

Compares this instance to a specified object and returns an indication of their relative values.

Return Value: A signed number indicating the relative values of this instance and value.

Any instance of UInt64, regardless of its value, is considered greater than null. An object to compare, or null.

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Returns a value indicating whether this instance is equal to a specified object.

Return Value: true if obj is an instance of UInt64 and equals the value of this instance; otherwise, false. An object to compare with this instance.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for this instance.

Return Value: A 32-bit signed integer hash code.

GetTypeCode

[C#] public TypeCode GetTypeCode( );

[C++] public: _sealed TypeCode GetTypeCode( );

[VB] NotOverridable Public Function GetTypeCode( ) As TypeCode

[JScript] public function GetTypeCode( ): TypeCode;

Description

Returns the TypeCode for value type UInt64.

Return Value: The enumerated constant, System.Type Code.UInt64.

Parse

[C#] public static ulong Parse(string s);

[C++] public: static unsigned _int64 Parse(String* s);

[VB] Public Shared Function Parse(ByVal s As String) As UInt64

[JScript] public static function Parse(s: String): UInt64; Converts the String representation of a number to its 64-bit unsigned integer equivalent.

Description

Converts the String representation of a number to its 64-bit unsigned integer equivalent.

Return Value: An 64-bit unsigned integer equivalent to the number contained in s.

s contains a number of the form: [ws][sign]digits[ws] Items in square brackets ('[' and ']') are optional, and other items are as follows. A System.String containing a number to convert.

Parse

[C#] public static ulong Parse(string s, IFormatProvider provider);

[C++] public: static unsigned _int64 Parse(String* s, IFormatProvider* provider);

[VB] Public Shared Function Parse(ByVal s As String, ByVal provider As IFormatProvider) As UInt64

[JScript] public static function Parse(s: String, provider: IFormatProvider) UInt64;

Description

Converts the String representation of a number in a specified culture-specific format to its 64-bit unsigned integer equivalent.

Return Value: An 64-bit unsigned integer equivalent to the number specified in s.

s contains a number of the form: [ws][sign]digits[ws] Items in square brackets ('[' and ']') are optional, and other items are as follows. A System.String containing a number to convert. An System.IFormatProvider interface implementation which supplies culture-specific formatting information about s.

Parse

[C#] public static ulong Parse(string s, NumberStyles style);

[C++] public: static unsigned _int64 Parse(String* s, NumberStyles style);

[VB] Public Shared Function Parse(ByVal s As String, ByVal style As NumberStyles) As UInt64

[JScript] public static function Parse(s: String, style: NumberStyles): UInt64;

Description

Converts the String representation of a number in a specified style to its 64-bit unsigned integer equivalent.

Return Value: An 64-bit unsigned integer equivalent to the number specified in s.

s contains a number of the form: [ws][sign]digits[ws] Items in square brackets ('[' and ']') are optional, and other items are as follows. A System.String containing a number to convert. The combination of one or more System.Globalization.NumberStyles constants that indicate the permitted format of s.

Parse

[C#] public static ulong Parse(string s, NumberStyles style, IFormatProvider provider);

[C++] public: static unsigned _int64 Parse(String* s, NumberStyles style, IFormatProvider* provider);

[VB] Public Shared Function Parse(ByVal s As String, ByVal style As NumberStyles, ByVal provider As IFormatProvider) As UInt64

[JScript] public static function Parse(s: String, style: NumberStyles, provider: IFormatProvider): UInt64;

Description

Converts the String representation of a number in a specified style and culture-specific format to its 64-bit unsigned integer equivalent.

Return Value: An 64-bit unsigned integer equivalent to the number specified in s.

s contains a number of the form: [ws][sign]digits[ws] Items in square brackets ('[' and ']') are optional, and other items are as follows. A System.String containing a number to convert. The combination of one or more System.Globalization.NumberStylesconstants that indicate the permitted format of s. An System.IFormatProvider interface implementation which supplies culture-specific formatting information about s.

IConvertible.ToBoolean

[C#] bool IConvertible.ToBoolean(IFormatProvider provider);

[C++] bool IConvertible::ToBoolean(IFormatProvider* provider);

[VB] Function ToBoolean(ByVal provider As IFormatProvider) As Boolean Implements IConvertible.ToBoolean

[JScript] function IConvertible.ToBoolean(provider: IFormatProvider): Boolean;

IConvertible.ToByte

[C#] byte IConvertible.ToBy te(IFormatProvider provider);

[C++] unsigned char IConvertible::ToByte(IFormatProvider* provider);

[VB] Function ToByte(ByVal provider As IFormatProvider) As Byte Implements IConvertible.ToByte

[JScript] function IConvertible.ToByte(provider: IFormatProvider): Byte;

IConvertible.ToChar

[C#] char IConvertible.ToChar(IFormatProvider provider);

[C++] _wchar_t IConvertible::ToChar(IFormatProvider* provider);

[VB] Function ToChar(ByVal provider As IFormatProvider) As Char Implements IConvertible.ToChar

[JScript] function IConvertible.ToChar(provider: IFormatProvider): Char; IConvertible.ToDateTime

[C#] DateTime IConvertible.ToDateTime(IFormatProvider provider);

[C++] DateTime IConvertible::ToDateTime(IFormatProvider* provider);

[VB] Function ToDateTime(ByVal provider As IFormatProvider) As DateTime Implements IConvertible.ToDateTime

[JScript] function IConvertible.ToDateTime(provider: IFormatProvider): DateTime; IConvertible.ToDecimal

[C#] decimal IConvertible.ToDecimal(IFormatProvider provider);

[C++] Decimal IConvertible::ToDecimal(IFormatProvider* provider);

[VB] Function ToDecimal(ByVal provider As IFormatProvider) As Decimal Implements IConvertible.ToDecimal

[JScript] function IConvertible.ToDecimal(provider: IFormatProvider): Decimal;

IConvertible.ToDouble

[C#] double IConvertible.ToDouble(IFormatProvider provider);

[C++] double IConvertible::ToDouble(IFormatProvider* provider);

[VB] Function ToDouble(ByVal provider As IFormatProvider) As Double Implements IConvertible.ToDouble

[JScript] function IConvertible.ToDouble(provider: IFormatProvider): double;

IConvertible.ToInt16

[C#] short IConvertible.ToInt16(IFormatProvider provider);

[C++] short IConvertible::ToInt16(IFormatProvider* provider);

[VB] Function ToInt16(ByVal provider As IFormatProvider) As Short Implements IConvertible.ToInt16

[JScript] function IConvertible.ToInt16(provider: IFormatProvider): Int16;

IConvertible.ToInt32

[C#] int IConvertible.ToInt32(IFormatProvider provider);

[C++] int IConvertible::ToInt32(IFormatProvider* provider);

[VB] Function ToInt32(ByVal provider As IFormatProvider) As Integer Implements IConvertible.ToInt32

[JScript] function IConvertible.ToInt32(provider: IFormatProvider): int;

IConvertible.ToInt64

[C#] long IConvertible.ToInt64(IFormatProvider provider);

[C++]-int64 IConvertible::ToInt64(IFormatProvider* provider);

[VB] Function ToInt64(ByVal provider As IFormatProvider) As Long Implements IConvertible.ToInt64

[JScript] function IConvertible.ToInt64(provider: IFormatProvider): long;

IConvertible.ToSByte

[C#] sbyte IConvertible.ToSByte(IFormatProvider provider);

[C++] char IConvertible::ToSByte(IFormatProvider* provider);

[VB] Function ToSByte(ByVal provider As IFormatProvider) As SByte Implements IConvertible.ToSByte

[JScript] function IConvertible.ToSByte(provider: IFormatProvider): SByte;

IConvertible.ToSingle

[C#] float IConvertible::ToSingle(IFormatProvider provider);

[C++] float IConvertible::ToSingle(IFormatProvider* provider);

[VB] Function ToSingle(ByVal provider As IFormatProvider) As Single Implements IConvertible.ToSingle

[JScript] function IConvertible.ToSingle(provider: IFormatProvider): float;

IConvertible.ToType

[C#] object IConvertible.ToType(Type type, IFormatProvider provider);

[C++] Object* IConvertible::ToType(Type* type, IFormatProvider* provider);

[VB] Function ToType(ByVal type As Type, ByVal provider As IFormatProvider) As Object Implements IConvertible.ToType

[JScript] function IConvertible.ToType(type: Type, provider: IFormatProvider): Object;

IConvertible.ToUInt16

[C#] ushort IConvertible.ToUInt16(IFormatProvider provider);

[C++] unsigned short IConvertible::ToUInt16(IFormatProvider* provider);

[VB] Function ToUInt16(ByVal provider As IFormatProvider) As UInt16 Implements IConvertible.ToUInt16

[JScript] function IConvertible.ToUInt16(provider: IFormatProvider): UInt16;

IConvertible.ToUInt32

[C#] uint IConvertible.ToUInt32(IFormatProvider provider);

[C++] unsigned int IConvertible::ToUInt32(IFormatProvider* provider);

[VB] Function ToUInt32(ByVal provider As IFormatProvider) As UInt32 Implements IConvertible.ToUInt32

[JScript] function IConvertible.ToUInt32(provider: IFormatProvider): UInt32;

IConvertible.ToUInt64

[C#] ulong IConvertible.ToUInt64(IFormatProvider provider);

[C++] unsigned _int64 IConvertible::ToUInt64(IFormatProvider* provider);

[VB] Function ToUInt64(ByVal provider As IFormatProvider) As UInt64 Implements IConvertible.ToUInt64

[JScript] function IConvertible.ToUInt64(provider: IFormatProvider): UInt64;

ToString

[C#] public override string ToString( );

[C++] public: String* ToString( );

[VB] Overrides Public Function ToString( ) As String

[JScript] public override function ToString( ): String; Converts the numeric value of this instance to its equivalent String representation.

Description

Converts the numeric value of this instance to its equivalent String representation.

Return Value: The System.String representation of the value of this instance, consisting of a sequence of digits ranging from 0 to 9, without a sign or leading zeroes.

The return value is formatted with the general format specifier ("G") and the System.Globalization.NumberFormatInfo for the current culture.

ToString

[C#] public string ToString(IFormatProvider provider);

[C++] public: _sealed String* ToString(IFormatProvider* provider);

[VB] NotOverridable Public Function ToString(ByVal provider As IFormatProvider) As String

[JScript] public function ToString(provider: IFormatProvider): String;

Description

Converts the numeric value of this instance to its equivalent String representation using the specified culture-specific format information.

Return Value: The System.String representation of the value of this instance as specified by provider.

This instance is formatted with the general format specifier ("G"). An System.IFormatProvider interface implementation which supplies culture-specific formatting information.

ToString

[C#] public string ToString(string format);

[C++] public: String* ToString(String* format);

[VB] Public Function ToString(ByVal format As String) As String

[JScript] public function ToString(format: String): String;

Description

Converts the numeric value of this instance to its equivalent String representation using the specified format.

Return Value: The System.String representation of the value of this instance as specified by format.

If format is null or an empty string (" "), the return value of this instance is formatted with the general format specifier ("G"). A format string.

ToString

[C#] public string ToString(string format, IFormatProvider provider);

[C++] public: _sealed String* ToString(String* format, IFormatProvider* provider);

[VB] NotOverridable Public Function ToString(ByVal format As String, ByVal provider As IFormatProvider) As String

[JScript] public function ToString(format: String, provider: IFormatProvider): String;

Description

Converts the numeric value of this instance to its equivalent String representation using the specified format and culture-specific format information.

Return Value: The System.String representation of the value of this instance as specified by format and provider.

If format is null or an empty string (" "), the return value for this instance is formatted with the general format specifier ("G"). A format specification. An System.IFormatProvider interface implementation which supplies culture-specific formatting information about this instance.

UIntPtr structure (System)

ToString

Description

A platform-specific type that is used to represent a pointer or a handle.

The System.UIntPtr type is designed to be a platform-specific, machine-sized integer. That is, an instance of this type is expected to be 32-bits on 32-bit hardware and operating systems, and 64-bits on 64-bit hardware and operating systems.

ToString

[C#] public static readonly UIntPtr Zero;

[C++] public: static UIntPtr Zero;

[VB] Public Shared ReadOnly Zero As UIntPtr

[JScript] public static var Zero: UIntPtr;

Description

A read-only field that represents an uninitialized pointer or handle.

The value of this field is not equivalent to null, but is instead a pointer which has not been assigned any value whatsoever. Use this field to efficiently determine whether an instance of UIntPtr has been set.

UIntPtr

Example Syntax:

ToString

[C#] public UIntPtr(uint value);

[C++] public: UIntPtr(unsigned int value);

[VB] Public Sub New(ByVal value As UInt32)

[JScript] public function UIntPtr(value: UInt32); Initializes a new instance of the System.UIntPtr structure.

Description

Initializes a new instance of the System.UIntPtr structure to the specified 32-bit pointer or handle. A pointer or handle contained in a 32-bit unsigned integer.

UIntPtr

Example Syntax:

ToString

[C#] public UIntPtr(ulong value);

[C++] public: UIntPtr(unsigned _int64 value);

[VB] Public Sub New(ByVal value As UInt64)

[JScript] public function UIntPtr(value: UInt64);

Description

Initializes a new instance of the System.UIntPtr structure to the specified 64-bit pointer or handle.

An exception is only thrown if the value of value requires more bits than the current platform supports. A pointer or handle contained in a 64-bit unsigned integer.

UIntPtr

Example Syntax:

ToString

[C#] unsafe public UIntPtr(void* value);

[C++] public: UIntPtr(void* value);

Size

ToString

[C#] public static int Size {get;}

[C++] public: _property static int get_Size( );

[VB] Public Shared ReadOnly Property Size As Integer

[JScript] public static function get Size( ): int;

Description

Gets the size of this instance.

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Returns a value indicating whether this instance is equal to a specified object.

Return Value: true if obj is an instance of UIntPtr and equals the value of this instance; otherwise, false. An object to compare with this instance or null.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for this instance.

Return Value: A 32-bit signed integer hash code.

op_Equality

[C#] public static bool operator==(UIntPtr value1, UIntPtr value2);

[C++] public: static bool op_Equality(UIntPtr value1, UIntPtr value2);

[VB] returnValue=UIntPtr.op_Equality(value1, value2)

[JScript] returnValue=value1==value2;

Description

Determines whether two specified instances of System. UIntPtr are equal.

Return Value: true if value1 equals value2; otherwise, false. A UIntPtr. A UIntPtr.

op_Explicit

[C#] public static explicit operator UIntPtr(uint value);

[C++] public: static UIntPtr op_Explicit(unsigned int value);

[VB] returnValue=UIntPtr.op_Explicit(value)

[JScript] returnValue=UIntPtr(value);

Description

Converts the value of a 32-bit unsigned integer to an System.UIntPtr

Return Value: A new instance of System.UIntPtr initialized to value. A 32-bit unsigned integer.

op_Explicit

[C#] public static explicit operator UIntPtr(ulong value);

[C++] public: static UIntPtr op Explicit(unsigned _int64 value);

[VB] returnValue=UIntPtr.op_Explicit(value)

[JScript] returnValue=UIntPtr(value);

Description

Converts the value of a 64-bit unsigned integer to an System.UIntPtr.

Return Value: A new instance of System.UIntPtr initialized to value. A 64-bit unsigned integer.

op_Explicit

[C#] unsafe public static explicit operator void*(UIntPtr value);

[C++] public: static void* op_Explicit( );

op_Explicit

[C#] public static explicit operator ulong(UIntPtr value);

[C++] public: static unsigned _int64 op_Explicit( );

[VB] returnValue=UIntPtr.op_Explicit(value)

[JScript] returnValue=UInt64(value);

Description

Converts the value of the specified System.UIntPtr instance to a 64-bit unsigned integer. A UIntPtr.

op_Explicit

[C#] public static explicit operator uint(UIntPtr value);

[C++] public: static unsigned int op_Explicit( );

[VB] returnValue=UIntPtr.op_Explicit(value)

[JScript] returnValue=UInt32(value);

Description

Converts the value of the specified System.UIntPtr instance to a 32-bit unsigned integer.

An exception is only thrown if the value of value requires more bits than the current platform supports. A UIntPtr.

op_Explicit

[C#] unsafe public static explicit operator UIntPtr(void* value);

[C++] public: static UIntPtr op_Explicit(void* value);

op_Inequality

[C#] public static bool operator !=(UIntPtr value1, UIntPtr value2);

[C++] public: static bool op_Inequality(UIntPtr value1, UIntPtr value2);

[VB] returnValue=UIntPtr.op_Inequality(value1, value2)

[JScript] returnValue=value1 !=value2;

Description

Determines whether two specified instances of System.UIntPtr are not equal.

Return Value: true if value1 does not equal value2; otherwise, false. A UIntPtr. A UIntPtr.

ISerializable.GetObjectData

[C#] void ISerializable.GetObjectData(SerializationInfo info, StreamingContext context);

[C++] void ISerializable::GetObjectData(SerializationInfo* info, StreamingContext context);

[VB] Sub GetObjectData(ByVal info As SerializationInfo, ByVal context As StreamingContext) Implements ISerializable.GetObjectData

[JScript] function ISerializable.GetObjectData(info: SerializationInfo, context: StreamingContext);

ToPointer

[C#] unsafe public void* ToPointer( );

[C++] public: void* ToPointer( );

Description

Converts the value of this instance to a pointer to an unspecified type.

Return Value: A pointer to System.Void; that is, a pointer to memory containing data of an unspecified type.

ToString

[C#] public override string ToString( );

[C++] public: String* ToString( );

[VB] Overrides Public Function ToString( ) As String

[JScript] public override function ToString( ): String;

Description

Converts the numeric value of this instance to its equivalent String representation.

Return Value: The System.String representation of the value of this instance.

ToUInt32

[C#] public uint ToUInt320;

[C++] public: unsigned int ToUInt320;

[VB] Public Function ToUInt320 As UInt32

[JScript] public function ToUInt320: UInt32;

Description

Converts the value of this instance to a 32-bit unsigned integer.

Return Value: A 32-bit unsigned integer.

An exception is only thrown if the value of value requires more bits than the current platform supports.

ToUInt64

[C#] public ulong ToUInt640;

[C++] public: unsigned _int64 ToUInt640;

[VB] Public Function ToUInt640 As UInt64

[JScript] public function ToUInt640: UInt64;

Description

Converts the value of this instance to a 64-bit unsigned integer.

Return Value: A a 64-bit unsigned integer.

UnauthorizedAccessException class (System)

ToUInt64

Description

The exception that is thrown when the operating system denies access because of an I/O error or a specific type of security error.

UnauthorizedAccessException uses the HRESULT ICOR_E_UNAUTHORIZEDACCESS, which has the value 0x80070005.

UnauthorizedAccessException

Example Syntax:

ToUInt64

[C#] public UnauthorizedAccessException( );

[C++] public: UnauthorizedAccessException( );

[VB] Public Sub New( )

[JScript] public function UnauthorizedAccessException( ); Initializes a new instance of the System.UnauthorizedAccessException class.

Description

Initializes a new instance of the System.UnauthorizedAccessException class.

UnauthorizedAccessException

Example Syntax:

ToUInt64

[C#] public UnauthorizedAccessException(string message);

[C++] public: UnauthorizedAccessException(String* message);

[VB] Public Sub New(ByVal message As String)

[JScript] public function UnauthorizedAccessException (message: String);

Description

Initializes a new instance of the System.UnauthorizedAccessException class with a specified error message. The error message that explains the reason for the exception.

UnauthorizedAccessException

Example Syntax:

ToUInt64

[C#] protected UnauthorizedAccessException(SerializationInfo info, StreamingContext context);

[C++] protected: UnauthorizedAccessException(SerializationInfo* info, StreamingContext context);

[VB] Protected Sub New(ByVal info As SerializationInfo, ByVal context As StreamingContext)

[JScript] protected function UnauthorizedAccessException (info: SerializationInfo, context: StreamingContext);

Description

Initializes a new instance of the System.UnauthorizedAccessException class with serialized data. The System.Runtime.Serialization.SerializationInfo that holds the serialized object data about the exception being thrown. The System.Runtime.Serialization.StreamingContext that contains contextual information about the source or destination.

UnauthorizedAccessException

Example Syntax:

ToUInt64

[C#] public UnauthorizedAccessException(string message, Exception inner);

[C++] public: UnauthorizedAccessException(String* message, Exception* inner);

[VB] Public Sub New(ByVal message As String, ByVal inner As Exception)

[JScript] public function UnauthorizedAccessException (message: String, inner: Exception);

Description

Initializes a new instance of the System.UnauthorizedAccessException class with a specified error message and a reference to the inner exception that is the root cause of this exception.

When an ExceptionX is thrown as a direct result of a previous exception Y, the System.Exception.InnerException property of X should contain a reference to Y. The InnerException property returns the same value as was passed into the constructor, or null if the inner exception value was not supplied to the constructor. The error message that explains the reason for the exception. An instance of System.Exception that is the cause of the current Exception. If the inner parameter is non-null, then the current Exception is raised in a catch block handling inner.

HelpLink

HResult

InnerException

Message

Source

StackTrace

TargetSite

UnhandledExceptionEventArgs class (System)

ToString

Description

Provides data for the event that is raised when there is an exception that is not handled by the application domain.

System.UnhandledExceptionEventArgs provides access to the exception object and a flag indicating whether the common language runtime is terminating. The System.UnhandledExceptionEventArgs is one of the parameters passed into System.UnhandledExceptionEventHandler.

UnhandledExceptionEventArgs

Example Syntax:

ToString

[C#] public UnhandledExceptionEventArgs(object exception, bool is Terminating);

[C++] public: UnhandledExceptionEventArgs(Object* exception, bool is Terminating);

[VB] Public Sub New(ByVal exception As Object, ByVal is Terminating As Boolean)

[JScript] public function UnhandledExceptionEventArgs (exception: Object, is Terminating: Boolean);

Description

Initializes a new instance of the System.UnhandledExceptionEventArgs class with the exception object and a common language runtime termination flag. The exception that is not handled. true if the runtime is terminating; otherwise, false.

ExceptionObject

ToString

[C#] public object ExceptionObject {get;}

[C++] public: _property Object* get_ExceptionObject( );

[VB] Public ReadOnly Property ExceptionObject As Object

[JScript] public function get ExceptionObject( ): Object;

Description

Gets the unhandled exception object.

IsTerminating

ToString

[C#] public bool IsTerminating {get;}

[C++] public: _property bool get_IsTerminating( );

[VB] Public ReadOnly Property IsTerminating As Boolean

[JScript] public function get IsTerminating( ): Boolean;

Description

Indicates whether the common language runtime is terminating.

UnhandledExceptionEventHandler delegate (System)

ToString

Description

Represents the method that will handle the event triggered by an exception that is not handled by the application domain. The source of the unhandled exception event. An UnhandledExceptionEventArgs that contains the event data.

When you create an System.UnhandledExceptionEventHandler delegate, you identify the method that will handle the event. To associate the event handler with your event, add an instance of the delegate to the event. The event handler is called whenever the event occurs, unless you remove the delegate. For more information about event handler delegates, see.

ValueType class (System)

ToString

Description

Provides the base class for value types.

ValueType overrides the virtual methods from System.Object with more appropriate implementations for value types. See also System.Enum, which inherits from ValueType.

ValueType

Example Syntax:

ToString

[C#] protected ValueType( );

[C++] protected: ValueType( );

[VB] Protected Sub New( )

[JScript] protected function ValueType( );

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Indicates whether this instance and a specified object are equal.

Return Value: true if obj and this instance are the same type and represent the same value; otherwise, false. Another object to compare to.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for this instance.

Return Value: A 32-bit signed integer that is the hash code for this instance.

Any value types that are inserted into a Hashtable must override GetHashCode( ) for performance reasons. The default implementation on ValueType will return the same value for all instances of a particular type, which makes hashing as slow as a linked list. See the documentation for Object's GetHashCode for more details.

ToString

[C#] public override string ToString( );

[C++] public: String* ToString( );

[VB] Overrides Public Function ToString( ) As String

[JScript] public override function ToString( ): String;

Description

Returns the fully qualified type name of this instance.

Return Value: A System.String containing a fully qualified type name.

Version class (System)

ToString

Description

Represents the version number for a common language runtime assembly. This class cannot be inherited.

Version numbers consist of four components: major, minor, build, and revision. Components major and minor are required. Component revision is only optional if build is not defined.

Version

Example Syntax:

ToString

[C#] public Version( );

[C++] public: Version( );

[VB] Public Sub New( )

[JScript] public function Version( );

Description

Initializes a new instance of the System.Version class.

Version

Example Syntax:

ToString

[C#] public Version(string version);

[C++] public: Version(String* version);

[VB] Public Sub New(ByVal version As String)

[JScript] public function Version(version: String);

Description

Initializes a new instance of the Version class using the value represented by the specified String.

version can only contain components major, minor, build, and revision, in that order and all separated by periods. There must be at least two components, and at most four. The first two components are assumed to be major and minor. A string containing the major, minor, build, and revision numbers, where each number is delimited with a period character ('.')

Version

Example Syntax:

ToString

[C#] public Version(int major, int minor);

[C++] public: Version(int major, int minor);

[VB] Public Sub New(ByVal major As Integer, ByVal minor As Integer)

[JScript] public function Version(major: int, minor: int);

Description

Initializes a new instance of the Version class using the specified major and minor values.

Metadata restricts major and minor to a maximum value of System.UInt16.MaxValue−1. The major version number. The minor version number.

Version

Example Syntax:

ToString

[C#] public Version(int major, int minor, int build);

[C++] public: Version(int major, int minor, int build);

[VB] Public Sub New(ByVal major As Integer, ByVal minor As Integer, ByVal build As Integer)

[JScript] public function Version(major: int, minor: int, build: int);

Description

Initializes a new instance of the Version class using the specified major, minor, and build values.

Metadata restricts major, minor, and build to a maximum value of System.UInt16.MaxValue−1. The major version number. The minor version number. The build number.

Version

Example Syntax:

ToString

[C#] public Version(int major, int minor, int build, int revision);

[C++] public: Version(int major, int minor, int build, int revision);

[VB] Public Sub New(ByVal major As Integer, ByVal minor As Integer, ByVal build As Integer, ByVal revision As Integer)

[JScript] public function Version(major: int, minor: int, build: int, revision: int); Initializes a new instance of the Version class with the specified major, minor, build, and revision numbers.

Description

Initializes a new instance of the Version class with the specified major, minor, build, and revision numbers.

Metadata restricts major, minor, build, and revision to a maximum of System.UInt16.MaxValue−1. The major version number. The minor version number. The build number. The revision number.

Build

ToString

[C#] public int Build {get;}

[C++] public: _property int get_Build( );

[VB] Public ReadOnly Property Build As Integer

[JScript] public function get Build( ): int;

Description

Gets the value of the build component of the version number for this instance.

For example, if the version number is 6.2.1.3, the build number is 1. If the version number is 6.2, the build number is undefined.

Major

ToString

[C#] public int Major {get;}

[C++] public: _property int get_Major( );

[VB] Public ReadOnly Property Major As Integer

[JScript] public function get Major( ): int;

Description

Gets the value of the major component of the version number for this instance.

For example, if the version number is 6.2, the major version is 6.

Minor

ToString

[C#] public int Minor {get;}

[C++] public: _property int get_Minor( );

[VB] Public ReadOnly Property Minor As Integer

[JScript] public function get Minor( ): int;

Description

Gets the value of the minor component of the version number for this instance.

For example, if the version number is 6.2, the minor version is 2.

Revision

ToString

[C#] public int Revision {get;}

[C++] public: _property int get_Revision( );

[VB] Public ReadOnly Property Revision As Integer

[JScript] public function get Revision( ): int;

Description

Gets the value of the revision component of the version number for this instance.

For example, if the version number is 6.2.1.3, the revision number is 3. If the version number is 6.2, the revision number is undefined.

Clone

[C#] public object Clone( );

[C++] public: _sealed Object* Clone( );

[VB] NotOverridable Public Function Clone( ) As Object

[JScript] public function Clone( ): Object;

Description

Returns a new Version object whose value is the same as this instance.

Return Value: A copy of this Version object.

CompareTo

[C#] public int CompareTo(object version);

[C++] public: _sealed int CompareTo(Object* version);

[VB] NotOverridable Public Function CompareTo(ByVal version As Object) As Integer

[JScript] public function CompareTo(version: Object): int;

Description

Compares this instance to a specified object and returns an indication of their relative values.

Return Value: Return Value Description Less than zero This instance is prior to version.

The components of Version in decreasing order of importance are: major, minor, build, and revision. An unknown component is assumed to be older than any known component. An object to compare, or null.

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Returns a value indicating whether this instance is equal to a specified object.

Return Value: true if this instance and version are both Version objects, and every component of this instance matches the corresponding component of version; otherwise, false. An object to compare with this instance.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns a hash code for this instance.

Return Value: A 32-bit signed integer hash code.

op_Equality

[C#] public static bool operator==(Version v1, Version v2);

[C++] public: static bool op_Equality(Version* v1, Version* v2);

[VB] returnValue=Version.op_Equality(v1, v2)

[JScript] returnValue=v1==v2;

Description

Determines whether two specified instances of Version are equal.

Return Value: true if v1 equals v2; otherwise false. The first instance of Version.

The second instance of Version.

op_GreaterThan

[C#] public static bool operator>(Version v1, Version v2);

[C++] public: static bool op_GreaterThan(Version* v1, Version* v2);

[VB] returnValue=Version.op_GreaterThan(v1, v2)

[JScript] returnValue=v1>v2;

Description

Determines whether the first specified instance of Version is greater than the second specified instance of Version.

Return Value: true if v1 is greater than v2; otherwise false. The first instance of Version. The second instance of Version.

op_GreaterThanOrEqual

[C#] public static bool operator>=(Version v1, Version v2);

[C++] public: static bool op_GreaterThanOrEqual(Version* v1, Version* v2);

[VB] returnValue=Version.op_GreaterThanOrEqual(v1, v2)

[JScript] returnValue=v1>=v2;

Description

Determines whether the first specified instance of Version is greater than or equal to the second instance of Version.

Return Value: true if v1 is greater than or equal to v2; otherwise false. The first instance of Version. The second instance of Version.

op_Inequality

[C#] public static bool operator !=(Version v1, Version v2);

[C++] public: static bool op_Inequality(Version* v I, Version* v2);

[VB] returnValue=Version.op_Inequality(v1, v2)

[JScript] returnValue=v1 !=v2;

Description

Determines whether two specified instances of Version are not equal.

Return Value: true if v1 does not equal v2; otherwise false. The first instance of Version. The second instance of Version.

op_LessThan

[C#] public static bool operator

[C++] public: static bool op_LessThan(Version* v1, Version* v2);

[VB] returnValue=Version.op_LessThan(v1, v2)

[JScript] returnValue=v1<v2;

Description

Determines whether the first specified instance of Version is less than the second specified instance of Version.

Return Value: true if v1 is less than v2; otherwise false. The first instance of Version. The second instance of Version.

op_LessThanOrEqual

[C#] public static bool operator<=(Version v1, Version v2);

[C++] public: static bool op_LessThanOrEqual(Version* v1, Version* v2);

[VB] returnValue=Version.op_LessThanOrEqual(v1, v2)

[JScript] returnValue=v1<=v2;

Description

Determines whether the first specified instance of Version is less than or equal to the second instance of Version.

Return Value: true if v1 is less than or equal to v2; otherwise false. The first instance of Version. The second instance of Version.

ToString

[C#] public override string ToString( );

[C++] public: String* ToString( );

[VB] Overrides Public Function ToString( ) As String

[JScript] public override function ToString( ): String; Converts the value of this instance to its equivalent String representation.

Description

Converts the value of this instance to its equivalent String representation.

Return Value: The System.String representation of the values of the major, minor, build, and revision components of this instance, as depicted in the following format. Each component is separated by a period character ('.'). Square brackets ('[' and ']') indicate a component that will not appear in the return value if the component is not defined: major.minor [.build[.revision]] For example, if you create an instance of Version using the constructor Version(1,1), the returned string is "1.1". If you create an instance of Version using the constructor Version(1,3,4,2), the returned string is "1.3.4.2".

ToString

[C#] public string ToString(int fieldCount);

[C++] public: String* ToString(int fieldCount);

[VB] Public Function ToString(ByVal fieldCount As Integer) As String

[JScript] public function ToString(fieldCount: int): String;

Description

Converts the value of this instance to its equivalent String representation. A specified count indicates the number of components to return.

Return Value: The System.String representation of the values of the major, minor, build, and revision components of this instance, each separated by a period character ('.'). The number of components to return.

Void structure (System)

ToString

Description

Indicates a method that does not return a value; that is, the method has the void return type.

This class is used in the System.Reflection namespace. This class has no members, and you cannot create an instance of this class.

WeakReference class (System)

ToString

Description

Represents a "weak reference", which references an object while still allowing it to be garbage collected.

The common language runtime "garbage collection" mechanism reclaims inaccessible (that is, "unreachable") memory allocated to an object. An object becomes unreachable if all references to it become invalid, for example, by setting those references to null.

WeakReference

Example Syntax:

ToString

[C#] public WeakReference(object target);

[C++] public: WeakReference(Object* target);

[VB] Public Sub New(ByVal target As Object)

[JScript] public function WeakReference(target: Object); Initializes a new instance of the WeakReference class.

Description

Initializes a new instance of the WeakReference class, referencing the specified object.

This constructor creates a short weak reference to target. The object to track.

WeakReference

Example Syntax:

ToString

[C#] public WeakReference(object target, bool trackResurrection);

[C++] public: WeakReference(Object* target, bool trackResurrection);

[VB] Public Sub New(ByVal target As Object, ByVal trackResurrection As Boolean)

[JScript] public function WeakReference(target: Object, trackResurrection: Boolean);

Description

Initializes a new instance of the WeakReference class, referencing the specified object and using the specified resurrection tracking.

If trackResurrection is false, a short weak reference is created. If trackResurrection is true, a long weak reference is created. Typically, only short weak references are needed. An object to track. Indicates when to stop tracking the object. If true, the object is tracked after finalization; if false, the object is only tracked until finalization.

WeakReference

Example Syntax:

ToString

[C#] protected WeakReference(SerializationInfo info, StreamingContext context);

[C++] protected: WeakReference(SerializationInfo* info, StreamingContext context);

[VB] Protected Sub New(ByVal info As SerializationInfo, ByVal context As StreamingContext)

[JScript] protected function WeakReference(info: SerializationInfo, context: StreamingContext);

Description

Initializes a new instance of the System.WeakReference class, using the specified serialization and stream information.

The context parameter is reserved, and does not currently participate in this operation. An object that holds all the data needed to serialize or deserialize this instance. (Reserved) Describes the source and destination of the serialized stream specified by info.

IsAlive

ToString

[C#] public virtual bool IsAlive {get;}

[C++] public: _property virtual bool get_IsAlive( );

[VB] Overridable Public ReadOnly Property IsAlive As Boolean

[JScript] public function get IsAlive( ): Boolean;

Description

Gets an indication whether the object referenced by this instance has been garbage collected.

WeakReferenceException is thrown if the object referenced by this instance is invalid. This can occur if there is an attempt to resurrect the referenced object after it has been finalized.

Target

ToString

[C#] public virtual object Target {get; set;}

[C++] public: _property virtual Object* get_Target( ); public: _property virtual void set_Target(Object*);

[VB] Overridable Public Property Target As Object

[JScript] public function get Target( ): Object;public function set Target(Object);

Description

Gets or sets the object (the "target") referenced by this instance.

WeakReferenceException will be thrown if the reference to the object referenced by this instance is invalid. This can occur if there is an attempt to resurrect the referenced object after it has been finalized.

TrackResurrection

ToString

[C#] public virtual bool TrackResurrection {get;}

[C++] public: _property virtual bool get_TrackResurrection( );

[VB] Overridable Public ReadOnly Property TrackResurrection As Boolean

[JScript] public function get TrackResurrection( ): Boolean;

Description

Gets an indication whether the object referenced by this instance is tracked after it is garbage collected and finalized.

Finalize

[C#]~WeakReference( );

[C++]~WeakReference( );

[VB] Overrides Protected Sub Finalize( )

[JScript] protected override function Finalize( );

Description

Frees any resources allocated by this instance.

GetObjectData

[C#] public virtual void GetObjectData(SerializationInfo info, StreamingContext context);

[C++] public: virtual void GetObjectData(SerializationInfo* info, StreamingContext context);

[VB] Overridable Public Sub GetObjectData(ByVal info As SerializationInfo, ByVal context As StreamingContext)

[JScript] public function GetObjectData(info: SerializationInfo, context: StreamingContext);

Description

Populates a SerializationInfo object with all the data needed to serialize this instance.

This method stores all the information in info necessary to serialize this instance. A SerializationInfo object. (Reserved) The location where serialized data will be stored and retrieved.

Uri class (System)

ToString

Description

Provides an object representation of a uniform resource indentifier (URI) and easy access to the parts of the URI.

A URI is a compact representation of a resource available to your application on the Internet. The System.Uri class defines the properties and methods for handling URIs, including parsing, comparing, and combining. The System.Uri class properties are read-only, to modify a System.Uri instance use the System.UriBuilder class.

ToString

[C#] public static readonly string SchemeDelimiter;

[C++] public: static String* SchemeDelimiter;

[VB] Public Shared ReadOnly SchemeDelimiter As String

[JScript] public static var SchemeDelimiter: String;

Description

Specifies the characters that separate the communication protocol scheme from the address portion of the URI. This field is read-only.

ToString

[C#] public static readonly string UriSchemeFile;

[C++] public: static String* UriSchemeFile;

[VB] Public Shared ReadOnly UriSchemeFile As String

[JScript] public static var UriSchemeFile: String;

Description

Specifies that the URI is a pointer to a file. This field is read-only.

ToString

[C#] public static readonly string UriSchemeFtp;

[C++] public: static String* UriSchemeFtp;

[VB] Public Shared ReadOnly UriSchemeFtp As String

[JScript] public static var UriSchemeFtp: String;

Description

Specifies that the URI is accessed through the File Transfer Protocol (FTP).

This field is read-only.

ToString

[C#] public static readonly string UriSchemeGopher;

[C++] public: static String* UriSchemeGopher;

[VB] Public Shared ReadOnly UriSchemeGopher As String

[JScript] public static var UriSchemeGopher: String;

Description

Specifies that the URI is accessed through the Gopher protocol. This field is read-only.

ToString

[C#] public static readonly string UriSchemeHttp;

[C++] public: static String* UriSchemeHttp;

[VB] Public Shared ReadOnly UriSchemeHttp As String

[JScript] public static var UriSchemeHttp: String;

Description

Specifies that the URI is accessed through the Hypertext Transfer Protocol (HTTP). This field is read-only.

ToString

[C#] public static readonly string UriSchemeHttps;

[C++] public: static String* UriSchemeHttps;

[VB] Public Shared ReadOnly UriSchemeHttps As String

[JScript] public static var UriSchemeHttps: String;

Description

Specifies that the URI is accessed through the Secure Hypertext Transfer Protocol (HTTPS). This field is read-only.

ToString

[C#] public static readonly string UriSchemeMailto;

[C++] public: static String* UriSchemeMailto;

[VB] Public Shared ReadOnly UriSchemeMailto As String

[JScript] public static var UriSchemeMailto: String;

Description

Specifies that the URI is an email address and is accessed through the Simple Network Mail Protocol (SNMP). This field is read-only.

ToString

[C#] public static readonly string UriSchemeNews;

[C++] public: static String* UriSchemeNews;

[VB] Public Shared ReadOnly UriSchemeNews As String

[JScript] public static var UriSchemeNews: String;

Description

Specifes that the URI is an Internet news group and is accessed through the Network News Transport Protocol (NNTP). This field is read-only.

ToString

[C#] public static readonly string UriSchemeNntp;

[C++] public: static String* UriSchemeNntp;

[VB] Public Shared ReadOnly UriSchemeNntp As String

[JScript] public static var UriSchemeNntp: String;

Description

Specifes that the URI is an Internet news group and is accessed through the Network News Transport Protocol (NNTP). This field is read-only.

Uri

Example Syntax:

ToString

[C#] public Uri(string uriString);

[C++] public: Uri(String* uriString);

[VB] Public Sub New(ByVal uriString As String)

[JScript] public function Uri(uriString: String); Initializes a new instance of the System.Uri class.

Description

Initializes a new instance of the System.Uri class with the specified URI.

This constructor creates a System.Uri instance from a URI string. It parses the URI, puts it in canonical format, and makes any required escape encodings. A URI.

Uri

Example Syntax:

ToString

[C#] protected Uri(SerializationInfo serializationInfo, StreamingContext streamingContext);

[C++] protected: Uri(SerializationInfo* serializationInfo, StreamingContext streamingContext);

[VB] Protected Sub New(ByVal serializationInfo As SerializationInfo, ByVal streamingContext As StreamingContext)

[JScript] protected function Uri(serializationInfo: SerializationInfo, streamingContext: StreamingContext);

Description

Initializes a new instance of the System.Uri class from the specified instances of the System.Runtime.Serialization.SerializationInfo and System.Runtime.Serialization. StreamingContext classes.

This constructor implements the System.Runtime.Serialization.ISerializable interface for the System.Uri class. An instance of the System.Runtime.Serialization.SerializationInfo class containing the information required to serialize the new System.Uri instance. An instance of the System.Runtime.Serialization.StreamingContext class containing the source of the serialized stream associated with the new System.Uri instance.

Uri

Example Syntax:

ToString

[C#] public Uri(string uriString, bool dontEscape);

[C++] public: Uri(String* uriString, bool dontEscape);

[VB] Public Sub New(ByVal uriString As String, ByVal dontEscape As Boolean)

[JScript] public function Uri(uriString: String, dontEscape: Boolean);

Description

Initializes a new instance of the System.Uri class with the specified URI, with control of character escaping.

This constructor creates a System.Uri instance from a URI string. It parses the URI, and puts it in canonical format. The caller must set dontEscape to true if the URI is already escaped, or false if the constructor should transform the URI to its escaped encoding. The URI. true if the URI contains escape characters; otherwise, false.

Uri

Example Syntax:

ToString

[C#] public Uri(Uri baseUri, string relativeUri);

[C++] public: Uri(Uri* baseUri, String* relativeUri);

[VB] Public Sub New(ByVal baseUri As Uri, ByVal relativeUri As String)

[JScript] public function Uri(baseUri: Uri, relativeUri: String);

Description

Initializes a new instance of the System.Uri class based on the specified base and relative URIs.

This constructor creates a System.Uri instance by combining the baseUri and the relativeUri. If relativeUri is an absolute URI (containing a scheme, hostname, and optionally a port number) the System.Uri instance is created using only relativeUri. The base URI. The relative URI to add to the base URI.

Uri

Example Syntax:

ToString

[C#] public Uri(Uri baseUri, string relativeUri, bool dontEscape);

[C++] public: Uri(Uri* baseUri, String* relativeUri, bool dontEscape);

[VB] Public Sub New(ByVal baseUri As Uri, ByVal relativeUri As String, ByVal dontEscape As Boolean)

[JScript] public function Uri(baseUri: Uri, relativeUri: String, dontEscape: Boolean);

Description

Initializes a new instance of the System.Uri class based on the specified base and releative URIs, with control of character escaping.

This constructor creates a System.Uri instance by combining baseUri and relativeUri. If the URI passed in relativeUri is an absolute URI (containing a scheme, hostname, and optionally a port number) the System.Uri instance is created using only relative Uri. The caller must set dontEscape to true if the URI is already escaped. The base URI. The relative URI to add to the base URI. true if the URI contains escape characters; otherwise, false.

AbsolutePath

ToString

[C#] public string AbsolutePath {get;}

[C++] public: _property String* get_AbsolutePath( );

[VB] Public ReadOnly Property AbsolutePath As String

[JScript] public function get AbsolutePath( ): String;

Description

Gets the absolute path of the URI.

The System.Uri.AbsolutePath property contains the path information that the server uses to resolve requests for information. Typically this is the path to the desired information on the server's file system, although it also can indicate the application or script the server must run to provide the information.

AbsoluteUri

ToString

[C#] public string AbsoluteUri {get;}

[C++] public: _property String* get_AbsoluteUri( );

[VB] Public ReadOnly Property AbsoluteUri As String

[JScript] public function get AbsoluteUri( ): String;

Description

Gets the absolute URI.

The System.Uri.AbsoluteUri property includes the entire URI stored in the System.Uri instance, including all fragments and query strings.

Authority

ToString

[C#] public string Authority {get;}

[C++] public: _property String* get_Authority( );

[VB] Public ReadOnly Property Authority As String

[JScript] public function get Authority( ): String;

Description

Gets the Domain Name System (DNS) host name or IP address and the port number for a server.

The Authority property returns the fully qualified DNS host name or IP address of the server specified in the URI, along with the port number for non-default ports.

Fragment

ToString

[C#] public string Fragment {get;}

[C++] public: _property String* get_Fragment( );

[VB] Public ReadOnly Property Fragment As String

[JScript] public function get Fragment( ): String;

Description

Gets the escaped fragment.

The System.Uri.Fragment property gets any text following a fragment marker (#) in the URI, including the fragment marker itself. Given the URI http://www.contoso.com/index.htm#main, the fragment property would get #main.

Host

ToString

[C#] public string Host {get;}

[C++] public: _property String* get_Host( );

[VB] Public ReadOnly Property Host As String

[JScript] public function get Host( ): String;

Description

Gets the Domain Name System (DNS) host name, or IP address of the server specified in the URI.

The System.Uri.Host property gets the fully qualified DNS host name or IP address of the server specified in the URI.

HostNameType

ToString

[C#] public UriHostNameType HostNameType {get;}

[C++] public: _property UriHostNameType get_HostNameType( );

[VB] Public ReadOnly Property HostNameType As UriHostNameType

[JScript] public function get HostNameType( ): UriHostNameType;

Description

Returns the type of the host name specified in the URI.

IsDefaultPort

ToString

[C#] public bool IsDefaultPort {get;}

[C++] public: _property bool get_IsDefaultPort( );

[VB] Public ReadOnly Property IsDefaultPort As Boolean

[JScript] public function get IsDefaultPort( ): Boolean;

Description

Gets a value indicating whether the port value of the URI is the default for this scheme.

IsFile

ToString

[C#] public bool IsFile {get;}

[C++] public: _property bool get_IsFile( );

[VB] Public ReadOnly Property IsFile As Boolean

[JScript] public function get IsFile( ): Boolean;

Description

Gets a value indicating whether the specified System.Uri is a file URI.

The System.Uri.IsFile property is true when the System.Uri.Scheme property equals System.Uri.UriSchemeFile.

IsLoopback

ToString

[C#] public bool IsLoopback {get;}

[C++] public: _property bool get_IsLoopback( );

[VB] Public ReadOnly Property IsLoopback As Boolean
[JScript] public function get IsLoopback( ): Boolean;

Description

Gets a value indicating whether the specified System.Uri references the local host.

IsUnc

ToString

[C#] public bool IsUnc {get;}
[C++] public: _property bool get_IsUnc( );
[VB] Public ReadOnly Property IsUnc As Boolean
[JScript] public function get IsUnc( ): Boolean;

Description

Gets a value indicating whether the specified System.Uri is a universal naming convention (UNC) path.

The System.Uri.IsUnc property is true if the specified System.Uri instance is a UNC path (suc as \\server\folder).

LocalPath

ToString

[C#] public string LocalPath {get;}
[C++] public: _property String* get_LocalPath( );
[VB] Public ReadOnly Property LocalPath As String
[JScript] public function get LocalPath( ): String;

Description

Gets a local operating-system representation of a file name.

PathAndQuery

ToString

[C#] public string PathAndQuery {get;}
[C++] public: _property String* get_PathAndQuery( );
[VB] Public ReadOnly Property PathAndQuery As String
[JScript] public function get PathAndQuery( ): String;

Description

Gets the System.Uri.AbsolutePath and System.Uri.Query properties separated by a question mark (?).

The System.Uri.PathAndQuery property contains the absolute path on the server and the query information sent with the request. It is identical to concatenating the System.Uri.AbsolutePath and System.Uri.Query properties.

Port

ToString

[C#] public int Port {get;}
[C++] public: _property int get_Port( );
[VB] Public ReadOnly Property Port As Integer
[JScript] public function get Port( ): int;

Description

Gets the port number of the specified URI.

The port number defines the protocol port used for contacting the server referenced in the URI. If a port is not is not specified as part of the URI, the System.Uri.Port property returns the default value for the protocol.

Query

ToString

[C#] public string Query {get;}
[C++] public: _property String* get_Query( );
[VB] Public ReadOnly Property Query As String
[JScript] public function get Query( ): String;

Description

Gets any query information included in the specified URI.

The System.Uri.Query property contains any query information included in the URI. Query information is separated from the path information by a question mark (?) and continues to the end of the URI. The query information returned includes the leading question mark.

Scheme

ToString

[C#] public string Scheme {get;}
[C++] public: _property String* get_Scheme( );
[VB] Public ReadOnly Property Scheme As String
[JScript] public function get Scheme( ): String;

Description

Gets the scheme name of the specified URI.

The following table lists the valid scheme names for the System.Uri.Scheme property.

Segments

ToString

[C#] public string[ ] Segments {get;}
[C++] public: _property String* get_Segments( );
[VB] Public ReadOnly Property Segments As String( )
[JScript] public function get Segments( ): String[ ];

Description

Gets an array of the segments that make up the specified URI.

UserEscaped

ToString

[C#] public bool UserEscaped {get;}
[C++] public: _property bool get_UserEscaped( );
[VB] Public ReadOnly Property UserEscaped As Boolean
[JScript] public function get UserEscaped( ): Boolean;

Description

Indicates that the URI string was escaped before the System.Uri instance was created.

The System.Uri.UserEscaped property is set to true to indicate that the string used to create the System.Uri instance was escaped before it was passed to the constructor; that is, the dontEscape parameter of the constructor call was set to true.

UserInfo

ToString

[C#] public string UserInfo {get;}
[C++] public: _property String* get_UserInfo( );
[VB] Public ReadOnly Property UserInfo As String
[JScript] public function get UserInfo( ): String;

Description

Gets the user name, password, and other user-specific information associated with the specified URI.

Canonicalize

[C#] protected virtual void Canonicalize( );
[C++] protected: virtual void Canonicalize( );
[VB] Overridable Protected Sub Canonicalize( )
[JScript] protected function Canonicalize( );

Description

CheckHostName

[C#] public static UriHostNameType CheckHostName (string name);
[C++] public: static UriHostNameType CheckHostName (String* name);
[VB] Public Shared Function CheckHostName(ByVal name As String) As UriHostNameType
[JScript] public static function CheckHostName(name: String) UriHostNameType;

Description

Determines whether the specified host name is valid.

Return Value: true if the host name is valid; otherwise, false.

The System.Uri.CheckHostName(System.String) method checks that the host name provided meets the requirements for a valid Internet host name. It does not, however, perform a host-name lookup to verify the existence of the host. The host name to validate.

CheckSchemeName

[C#] public static bool CheckSchemeName(string schemeName);

[C++] public: static bool CheckschemeName(String* schemeName);

[VB] Public Shared Function CheckSchemeName(ByVal schemeName As String) As Boolean

[JScript] public static function CheckSchemeName(schemeName: String): Boolean;

Description

Determines whether the specified scheme name is valid.

Return Value: true if the scheme name is valid; otherwise, false.

The CheckSchemeName method checks the scheme name for validity according to RFC 2396. The scheme name must begin with a letter, and must contain only letters, digits, and the characters ".", "+", or "–". The scheme name to validate.

CheckSecurity

[C#] protected virtual void CheckSecurity( );

[C++] protected: virtual void CheckSecurity( );

[VB] Overridable Protected Sub CheckSecurity( )

[JScript] protected function CheckSecurity( );

Description

Equals

[C#] public override bool Equals(object comparand);

[C++] public: bool Equals(Object* comparand);

[VB] Overrides Public Function Equals(ByVal comparand As Object) As Boolean

[JScript] public override function Equals(comparand: Object): Boolean;

Description

Compares two System.Uri instances for equality.

Return Value: true if the two System.Uri instances contain the same URI; otherwise, false.

The System.Uri.Equals(System.Object) method compares two URI instances without regard to any fragments that they might contain. For instance, given the URIs http://www.contoso.com/index.htm#search and http://www.contoso.com/index.htm the System.Uri.Equals(System.Object) method would return true. The System.Uri instance to compare with the current instance.

Escape

[C#] protected virtual void Escape( );

[C++] protected: virtual void Escape( );

[VB] Overridable Protected Sub Escape( )

[JScript] protected function Escape( );

Description

EscapeString

[C#] protected static string EscapeString(string str);

[C++] protected: static String* EscapeString(String* str);

[VB] Protected Shared Function EscapeString(ByVal str As String) As String

[JScript] protected static function EscapeString(str: String): String;

Description

Converts a string to its escaped representation.

Return Value: The escaped representation of the string.

The System.Uri.EscapeString(System.String) method converts all characters with an ASCII value greater than 127 to hexidecimal representation.

The string to transform to its escaped representation.

FromHex

[C#] public static int FromHex(char digit);

[C++] public: static int FromHex(_wchar_t digit);

[VB] Public Shared Function FromHex(ByVal digit As Char) As Integer

[JScript] public static function FromHex(digit: Char): int;

Description

Returns the decimal value of a hexadecimal digit.

Return Value: A number from 1-15 that corresponds to the specified hexadecimal digit.

The System.Uri.FromHex(System.Char) method converts a character representing a hexadecimal digit (0-9, a-f, A-F) to its decimal value (0-15). If digit is not a valid hexadecimal digit, System.ArgumentException is thrown. The hexadecimal digit (0-9, a-f, A-F) to convert.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for the specified URI.

Return Value: The hash value generated for the URI.

The System.Uri.GetHashCode method generates the URI's hash value without including any fragment identifiers. For example, the URIs http://www.contoso.com/index.htm#search and http://www.contoso.com/index.htm yield the same hash code.

GetLeftPart

[C#] public string GetLeftPart(UriPartial part);

[C++] public: String* GetLeftPart(UriPartial part);

[VB] Public Function GetLeftPart(ByVal part As UriPartial) As String

[JScript] public function GetLeftPart(part: UriPartial): String;

Description

Returns the specified portion of a URI.

Return Value: A string containing the specified portion of the URI.

The System.Uri.GetLeftPart(System.UriPartial) method returns a string containing the left-most portion of the URI, ending with the portion specified by part. The string returned includes delimiters but does not include any fragments or queries or their delimiters, except in certain cases. One of the System.UriPartial values that specifies the the end of the portion of the URI to return.

HexEscape

[C#] public static string HexEscape(char character);

[C++] public: static String* HexEscape(_wchar_t character);

[VB] Public Shared Function HexEscape(ByVal character As Char) As String

[JScript] public static function HexEscape(character: Char): String;

Description

Converts a specified character into its hexadecimal equivalent.

Return Value: The hexadecimal representation of the specified character. The character to convert to hexadecimal representation.

HexUnescape

[C#] public static char HexUnescape(string pattern, ref int index);

[C++] public: static _wchar_t HexUnescape(String* pattern, int* index);

[VB] Public Shared Function HexUnescape(ByVal pattern As String, ByRef index As Integer) As Char

[JScript] public static function HexUnescape(pattern: String, index: int): Char;

Description

Converts a specified hexadecimal representation of a character to the character.

Return Value: The character represented by the hexadecimal encoding at position index. If the character at index is not hexadecimal encoded, the character at index is returned. The value of index is incremented to point to the character following the one returned. The hexadecimal representation of a character. The location in pattern where the hexadecimal representation of a character begins.

IsBadFileSystemCharacter

[C#] protected virtual bool IsBadFileSystemCharacter(char character);

[C++] protected: virtual bool IsBadFileSystemCharacter (_wchar_t character);

[VB] Overridable Protected Function IsBadFileSystemCharacter(ByVal character As Char) As Boolean

[JScript] protected function IsBadFileSystemCharacter (character: Char): Boolean;

Description

IsExcludedCharacter

[C#] protected static bool IsExcludedCharacter(char character);

[C++] protected: static bool IsExcludedCharacter(_wchar_t character);

[VB] Protected Shared Function IsExcludedCharacter(ByVal character As Char) As Boolean

[JScript] protected static function IsExcludedCharacter(character: Char): Boolean;

Description

IsHexDigit

[C#] public static bool IsHexDigit(char character);

[C++] public: static bool IsHexDigit(_wchar_t character);

[VB] Public Shared Function IsHexDigit(ByVal character As Char) As Boolean

[JScript] public static function IsHexDigit(character: Char): Boolean;

Description

Determines whether a specified character is a valid hexadecimal digit.

Return Value: true if the character is a valid hexadecimal digit; otherwise false.

Hexadecimal digits are the digits 0-9 and the letters A-F or a-f. The character to validate.

IsHexEncoding

[C#] public static bool IsHexEncoding(string pattern, int index);

[C++] public: static bool IsHexEncoding(String* pattern, int index);

[VB] Public Shared Function IsHexEncoding(ByVal pattern As String, ByVal index As Integer) As Boolean

[JScript] public static function IsHexEncoding(pattern: String, index: int): Boolean;

Description

Determines whether a string is hex encoded.

Return Value: true if pattern is hex encoded at the specified location; otherwise, false.

The System.Uri.IsHexEncoding(System.String,System.Int32) method checks for hex encoding that follows the pattern "% hexhex" in a string, where "hex" is a digit from 0-9 or a letter from A-F (case-insensitive). The string to check. The location in pattern to check for hex encoding.

IsReservedCharacter

[C#] protected virtual bool IsReservedCharacter(char character);

[C++] protected: virtual bool IsReservedCharacter(_wchar_t character);

[VB] Overridable Protected Function IsReservedCharacter (ByVal character As Char) As Boolean

[JScript] protected function IsReservedCharacter(character: Char): Boolean;

Description

MakeRelative

[C#] public string MakeRelative(Uri toUri);

[C++] public: String* MakeRelative(Uri* toUri);

[VB] Public Function MakeRelative(ByVal toUri As Uri) As String

[JScript] public function MakeRelative(toUri: Uri): String;

Description

Determines the difference between two System.Uri instances.

Return Value: If the two URIs are the same except for the path information, then that difference; if the two have additional differences, the absolute URI of toUri. The URI to compare to the current URI.

Parse

[C#] protected virtual void Parse( );

[C++] protected: virtual void Parse( );

[VB] Overridable Protected Sub Parse( )

[JScript] protected function Parse( );

Description

ISerializable.GetObjectData

[C#] void ISerializable.GetObjectData(SerializationInfo serializationInfo, StreamingContext streamingContext);

[C++] void ISerializable::GetObjectData(SerializationInfo* serializationInfo, StreamingContext streamingContext);

[VB] Sub GetObjectData(ByVal serializationInfo As SerializationInfo, ByVal streamingContext As StreamingContext) Implements ISerializable.GetObjectData

[JScript] function ISerializable.GetObjectData(serializationInfo: SerializationInfo, streamingContext: StreamingContext);

ToString

[C#] public override string ToString( );

[C++] public: String* ToString( );

[VB] Overrides Public Function ToString( ) As String

[JScript] public override function ToString( ): String;

Description

Returns the display string for the specified System.Uri instance.

Return Value: The string containing the unescaped display name of the System.Uri.

Unescape

[C#] protected virtual string Unescape(string path);

[C++] protected: virtual String* Unescape(String* path);

[VB] Overridable Protected Function Unescape(ByVal path As String) As String

[JScript] protected function Unescape(path: String): String;

Description

UriBuilder class (System)

Unescape

Description

Provides a custom constructor for uniform resource identifiers (URIs) and modifies URIs for the System.Uri class.

The System.UriBuilder class provides a convenient way to modify the contents of a System.Uri instance without creating a new System.Uri instance for each modification.

UriBuilder

Example Syntax:

Unescape

[C#] public UriBuilder( );

[C++] public: UriBuilder( );

[VB] Public Sub New( )

[JScript] public function UriBuilder( ); Initializes a new instance of the System.UriBuilder class.

Description

Initializes a new instance of the System.UriBuilder class.

The default constructor creates a new instance of the System.UriBuilder class with all properties empty.

UriBuilder

Example Syntax:

Unescape

[C#] public UriBuilder(string uri);

[C++] public: UriBuilder(String* uri);

[VB] Public Sub New(ByVal uri As String)

[JScript] public function UriBuilder(uri: String);

Description

Initializes a new instance of the System.UriBuilder class with the specified URI.

This constructor initializes a new instance of the System.UriBuilder class with the System.UriBuilder.Fragment, System.UriBuilder.Host, System.UriBuilder.Path, System.UriBuilder.Port, System.UriBuilder.Query System.UriBuilder.Scheme, and System.UriBuilder.Uri properties set as specified in uri. A URI string.

UriBuilder

Example Syntax:

Unescape

[C#] public UriBuilder(Uri uri);

[C++] public: UriBuilder(Uri* uri);

[VB] Public Sub New(ByVal uri As Uri)

[JScript] public function UriBuilder(uri: Uri);

Description

Initializes a new instance of the System.UriBuilder class with the specified System.Uri instance.

This constructor initializes a new instance of the System.UriBuilder class with the System.UriBuilder.Fragment, System.UriBuilder.Host, System.UriBuilder.Path, System.UriBuilder.Port, System.UriBuilder.Query, System.UriBuilder.Scheme, and System.UriBuilder.Uri properties set as specified in uri. An instance of the System.Uri class.

UriBuilder

Example Syntax:

Unescape

[C#] public UriBuilder(string schemeName, string hostName);

[C++] public: UriBuilder(String* schemeName, String* hostName);

[VB] Public Sub New(ByVal schemeName As String, ByVal hostName As is String)

[JScript] public function UriBuilder(schemeName: String, hostName: String);

Description

Initializes a new instance of the System.UriBuilder class with the specified scheme and host.

The System.UriBuilder instance is initialized with the System.UriBuilder.Scheme property set to schemeName and the System.UriBuilder.Host property set to hostName. An Internet access protocol. A DNS-style domain name or IP address.

UriBuilder

Example Syntax:

Unescape

[C#] public UriBuilder(string scheme, string host, int portNumber);

[C++] public: UriBuilder(String* scheme, String* host, int portNumber);

[VB] Public Sub New(ByVal scheme As String, ByVal host As String, ByVal portNumber As Integer)

[JScript] public function UriBuilder(scheme: String, host: String, portNumber: int);

Description

Initializes a new instance of the System.UriBuilder class with the specified scheme, host, and port.

The System.UriBuilder instance is initialized with the System.UriBuilder.Scheme property set to schemeName, the System.UriBuilder.Host property set to hostName, and the System.UriBuilder.Port property set to portNumber. The System.UriBuilder.Path property is set to the slash character (/). An Internet access protocol. A DNS-style domain name or IP address. An IP port number for the service.

UriBuilder

Example Syntax:

Unescape

[C#] public UriBuilder(string scheme, string host, int port, string pathValue);

[C++] public: UriBuilder(String* scheme, String* host, int port, String* pathValue);

[VB] Public Sub New(ByVal scheme As String, ByVal host As String, ByVal port As Integer, ByVal pathValue As String)

[JScript] public function UriBuilder(scheme: String, host: String, port: int, pathValue: String);

Description

Initializes a new instance of the System.UriBuilder class with the specified scheme, host, port number, and path.

The System.UriBuilder instance is initialized with the System.UriBuilder.Scheme property set to schemeName, the System.UriBuilder.Host property set to hostName, the System.UriBuilder.Port property set to portNumber and the System.UriBuilder.Path property set to pathValue. An Internet access protocol. A DNS-style domain name or IP address. An IP port number for the service. The path to the Internet resource.

UriBuilder

Example Syntax:

Unescape

[C#] public UriBuilder(string scheme, string host, int port, string path, string extraValue);

[C++] public: UriBuilder(String* scheme, String* host, int port, String* path, String* extraValue);

[VB] Public Sub New(ByVal scheme As String, ByVal host As String, ByVal port As Integer, ByVal path As String, ByVal extraValue As String)

[JScript] public function UriBuilder(scheme: String, host: String, port: int, path: String, extraValue: String);

Description

Initializes a new instance of the System.UriBuilder class with the specified scheme, host, port number, path and query string or fragment identifier.

The System.UriBuilder instance is initialized with the System.UriBuilder.Scheme property set to schemeName, the System.UriBuilder.Host property set to hostName, the System.UriBuilder.Port property set to portNumber, and the System.UriBuilder.Path property is set to pathValue. If extraValue contains a number sign (#), then System.UriBuilder.Fragment is set to extraValue. If extraValue contains a question mark (?), then System.UriBuilder.Query is set to extraValue. An Internet access protocol. A DNS-style domain name or IP address. An IP port number for the service. The path to the Internet resource. A query string or fragment identifier.

Fragment

Unescape

[C#] public string Fragment {get; set;}

[C++] public: _property String* get_Fragment( ); public: _property void set_Fragment(String*);

[VB] Public Property Fragment As String

[JScript] public function get Fragment( ): String;public function set Fragment(String);

Description

Gets or sets the fragment portion of the URI.

The System.UriBuilder.Fragment property contains any text following a fragment marker (#) in the URI, including the marker itself. When setting the System.UriBuilder.Fragment property, the fragment marker is added to its value.

Host

Unescape

[C#] public string Host {get; set;}

[C++] public: _property String* get_Host( );public: _property void set_Host(String*);

[VB] Public Property Host As String

[JScript] public function get Host( ): String;public function set Host(String);

Description

Gets or sets the Domain Name System (DNS) host name or IP address of a server.

The System.UriBuilder.Host property contains the fully qualified DNS host name or IP address (in dotted-quad notation) of the server.

Password

Unescape

[C#] public string Password {get; set;}

[C++] public: _property String* get_Password( ); public: _property void set_Password(String*);

[VB] Public Property Password As String

[JScript] public function get Password( ): String;public function set Password(String);

Description

Gets or sets the password associated with the user accessing the URI.

Path

Unescape

[C#] public string Path {get; set;}

[C++] public: _property String* get_Path( );public: _property void set_Path(String*);

[VB] Public Property Path As String

[JScript] public function get Path( ): String;public function set Path(String);

Description

Gets or sets the path to the resource referenced by the URI.

The System.UriBuilder.Path property contains the path information that the server uses to resolve requests for information. Typically this is the path to the desired information on the server's file system, although it also can indicate the application or script that the server must run to provide the information.

Port

Unescape

[C#] public int Port {get; set;}

[C++] public: _property int get_Port( );public: _property void set_Port(int);

[VB] Public Property Port As Integer

[JScript] public function get Port( ): int;public function set Port(int);

Description

Gets or sets the port number of the URI.

The port number defines the protocol port for contacting the server referenced in the URI. If a port is not specified as part of the URI, the System.Uri.Port property returns the value −1 to indicate that the server uses the default value for the protocol.

Query

Unescape

[C#] public string Query {get; set;}

[C++] public: _property String* get_Query( );public: _property void set_Query(String*);

[VB] Public Property Query As String

[JScript] public function get Query( ): String;public function set Query(String);

Description

Gets or sets any query information included in the URI.

The System.Uri.Query property contains any query information included in the URI. Query information is separated from the path information by a question mark (?) and continues to the end of the URI. The query information returned includes the leading question mark.

Scheme

Unescape

[C#] public string Scheme {get; set;}

[C++] public: _property String* get_Scheme( ); public: _property void set_Scheme(String*);

[VB] Public Property Scheme As String

[JScript] public function get Scheme( ): String;public function set Scheme(String);

Description

Gets or sets the scheme name of the URI.

The following table lists the valid scheme names for the System.Uri.Scheme property.

Uri

Unescape

[C#] public Uri Uri {get;}

[C++] public: _property Uri* get_Uri( );

[VB] Public ReadOnly Property Uri As Uri

[JScript] public function get Uri( ): Uri;

Description

Gets the System.Uri instance constructed by the specified System.UriBuilder instance.

The System.UriBuilder.Uri property contains the System.Uri created by the System.UriBuilder. Any changes made to the System.UriBuilder properties are reflected in the System.UriBuilder.Uri property.

UserName

Unescape

[C#] public string UserName {get; set;}

[C++] public: _property String* get_UserName( ); public: _property void set_UserName(String*);

[VB] Public Property UserName As String

[JScript] public function get UserName( ): String;public function set UserName(String);

Description

The user name associated with the user accessing the URI.

Equals

[C#] public override bool Equals(object param);

[C++] public: bool Equals(Object* rparam);

[VB] Overrides Public Function Equals(ByVal rparam As Object) As Boolean

[JScript] public override function Equals(rparam: Object): Boolean;

Description

Compares an existing System.Uri instance with the contents of the System.UriBuilder for equality.

Return Value: true if the specified System.Uri is equal to the System.Uri constructed by this System.UriBuilder instance; otherwise, false.

The System.UriBuilder.Equals(System.Object) method compares a specified System.Uri instance with the System. Uri instance built by the System.UriBuilder instance. If the two are the same, the System.UriBuilder.Equals(System.Object) method returns true. The System.Uri instance to compare with the current instance.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for the URI.

Return Value: The hash code generated for the URI.

The hash code is generated without including any fragment included. The URIs http://www.contoso.com/index.htm#search and http://www.contoso.com/index.htm generate the same hash code.

ToString

[C#] public override string ToString( );

[C++] public: String* ToString( );

[VB] Overrides Public Function ToString( ) As String

[JScript] public override function ToString( ): String;

Description

Returns the display string for the specified System.UriBuilder instance.

Return Value: The string containing the unescaped display name of the System.UriBuilder.

UriFormatException class (System)

ToString

Description

The exception that is thrown when an invalid Uniform Resource Identifier (URI) is detected.

The System.UriFormatException is thrown by the Uri class constructor if the supplied URI could not correctly parsed. The format for a valid URI is defined in RFC 2396.

UriFormatException

Example Syntax:

ToString

[C#] public UriFormatException( );

[C++] public: UriFormatException( );

[VB] Public Sub New( )

[JScript] public function UriFormatException( ); Initializes a new instance of the System.UriFormatException class.

Description

Initializes a new instance of the System.UriFormatException class.

The default constructor initializes a new instance of the System.UriFormatException class with all fields set to null.

UriFormatException

Example Syntax:

ToString

[C#] public UriFormatException(String textString);

[C++] public: UriFormatException(String* textString);

[VB] Public Sub New(ByVal textString As String)

[JScript] public function UriFormatException(textString: String);

Description

Initializes a new instance of the System.UriFormatException class with the specified message.

The UriFormatException constructor initializes the System. UriFormatException instance with the System.Exception.Message property set to the value of textString. The error message string.

UriFormatException

Example Syntax:

ToString

[C#] protected UriFormatException(SerializationInfo serializationInfo, StreamingContext streamingContext);

[C++] protected: UriFormatException(SerializationInfo* serializationInfo, StreamingContext streamingContext);

[VB] Protected Sub New(ByVal serializationInfo As SerializationInfo, ByVal streamingContext As StreamingContext)

[JScript] protected function UriFormatException(serializationInfo: SerializationInfo, streamingContext: StreamingContext);

HelpLink

HResult

InnerException

Message

Source

StackTrace

TargetSite

ISerializable.GetObjectData

[C#] void ISerializable.GetObjectData(SerializationInfo serializationInfo, StreamingContext streamingContext);

[C++] void ISerializable::GetObjectData(SerializationInfo* serializationInfo, StreamingContext streamingContext);

[VB] Sub GetObjectData(ByVal serializationInfo As SerializationInfo, ByVal streamingContext As StreamingContext) Implements ISerializable.GetObjectData

[JScript] function ISerializable.GetObjectData(serializationInfo: SerializationInfo, streamingContext: StreamingContext);

UriHostNameType enumeration (System)

ToString

Description

Defines host name types for the System.Uri.CheckHostName(System.String) method.

The System.UriHostNameType enumeration defines the values that the System.Uri.CheckHostName(System.String) method can return.

ToString

[C#] public const UriHostNameType Basic;

[C++] public: const UriHostNameType Basic;

[VB] Public Const Basic As UriHostNameType

[JScript] public var Basic: UriHostNameType;

Description

The host is set, but the type cannot be determined.

ToString

[C#] public const UriHostNameType Dns;
[C++] public: const UriHostNameType Dns;
[VB] Public Const Dns As UriHostNameType
[JScript] public var Dns: UriHostNameType;

Description

The host name is a domain name system (DNS) style host name.

ToString

[C#] public const UriHostNameType IPv4;
[C++] public: const UriHostNameType IPv4;
[VB] Public Const IPv4 As UriHostNameType
[JScript] public var IPv4: UriHostNameType;

Description

The host name is an Internet Protocol (IP) version 4 host address.

ToString

[C#] public const UriHostNameType IPv6;
[C++] public: const UriHostNameType IPv6;
[VB] Public Const IPv6 As UriHostNameType
[JScript] public var IPv6: UriHostNameType;

Description

The host name is an Internet Protocol (IP) version 6 host address.

ToString

[C#] public const UriHostNameType Unknown;
[C++] public: const UriHostNameType Unknown;
[VB] Public Const Unknown As UriHostNameType
[JScript] public var Unknown: UriHostNameType;

Description

The type of the host name is not supplied.

UriPartial enumeration (System)

ToString

Description

Defines the parts of a URI for the System.Uri.GetLeftPart (System.UriPartial) method.

The System.UriPartial enumeration defines the values that can be passed to the System.Uri.GetLeftPart(System.UriPartial) method.

ToString

[C#] public const UriPartial Authority;
[C++] public: const UniPartial Authority;
[VB] Public Const Authority As UriPartial
[JScript] public var Authority: UriPartial;

Description

The scheme and authority segment of the URI.

ToString

[C#] public const UriPartial Path;
[C++] public: const UriPartial Path;
[VB] Public Const Path As UriPartial
[JScript] public var Path: UriPartial;

Description

The s

System.Collections Namespace

The System.Collections namespace contains classes and interfaces for in-memory data storage and manipulation. There are three main things this namespace is providing. The first is concrete implementations of commonly used collection classes such as a growable array (ArrayList), Hashtable, Stack, Queue, etc. Application developers use these classes as a convenient way to store and retrieve in-memory data. The second set of types in the System.Collections namespace is a set of interfaces to define a formal contract between developers creating new collections and developers consuming collections. For example the IEnumerable interface defines the contract for collections that can offer sequential access via an enumerator. The ASP.NET application model supports data binding controls to data sources that honor the IEnumerable contract. That means that any new collection implementation will automatically be databindable in the ASP.NET model. The third set of types in the System.Collections namespace supports creating strongly typed collections. The CollectionBase class offers data storage that is convenient for developers creating their own, strongly typed collections. This is common for library developers that frequently want to do something such as expose a ControlsCollection that has its Add and Remove method typed to take a Control. By implementing the ControlsCollection to derive from CollectionBase the developer is saved much of the tedious work of rewriting the collection from scratch.

The following example shows adding data to a data collection and outputting the data from collection.

```
static void Main(string[ ] args)
{
    Console.WriteLine("From an ArrayList");
    ArrayList l = new ArrayList ( );
    l.Add ("Damien");
    l.Add ("Mark");
    l.Add ("Brad");
    PrintItems (l);
    Console.WriteLine("From a stack");
    Stack s = new Stack ( );
    s.Push(4.5);
    s.Push(12.3);
    s.Push(66.2);
    PrintItems (s);
    Console.WriteLine("From a array");
    PrintItems (new string[ ] {"monkey","cat","dog"});
}
static void PrintItems (ICollection c)
{
    int ct=0;
    foreach (object o in c)
    {
        Console.WriteLine ("\t{1}:{0}", o,ct++);
    }
}
```

The following is a more detailed description of the System.Collections namespace, identifying various classes, interfaces, enumerations, and so forth contained in the System.Collections namespace (as well as the System.Collections.Specialized namespace included therein).

System.Collections

The namespace contains interfaces and classes that define various collections of objects, such as lists, queues, bit arrays, hashtables and dictionaries.

Description

The System.Collections namespace contains interfaces and classes that define various collections of objects, such as lists, queues, bit arrays, hashtables and dictionaries.

ArrayList class (System.Collections)

Description

Implements the System.Collections.IList interface using an array whose size is dynamically increased as required.

The capacity of an System.Collections.ArrayList is the number of elements the list can hold. As elements are added to an System.Collections.ArrayList, the capacity is automatically increased as required through reallocation. The capacity can be decreased by calling System.Collections.ArrayList.TrimToSize or by setting the System.Collections.ArrayList.Capacity property explicitly.

Constructors:

ArrayList

Example Syntax:

[C#] public ArrayList( );

[C++] public: ArrayList( );

[VB] Public Sub New( )

[JScript] public function ArrayList( ); Initializes a new instance of the System.Collections.ArrayList class.

Description

Initializes a new instance of the System.Collections.ArrayList class that is empty and has the default initial capacity.

The initial capacity is the starting capacity of the new System.Collections.ArrayList. The default initial capacity for an System.Collections.ArrayList is 16.

ArrayList

Example Syntax:

[C#] public ArrayList(ICollection c);

[C++] public: ArrayList(ICollection* c);

[VB] Public Sub New(ByVal c As ICollection)

[JScript] public function ArrayList(c: ICollection);

Description

Initializes a new instance of the System.Collections.ArrayList class that contains elements copied from the specified collection and that has the same initial capacity as the number of elements copied.

The initial capacity is the starting capacity of the new System.Collections.ArrayList. If the number of elements added to the list reaches the current capacity, the capacity is automatically doubled. The System.Collections.ICollection whose elements are copied to the new list.

ArrayList

Example Syntax:

[C#] public ArrayList(int capacity);

[C++] public: ArrayList(int capacity);

[VB] Public Sub New(ByVal capacity As Integer)

[JScript] public function ArrayList(capacity: int);

Description

Initializes a new instance of the System.Collections.ArrayList class that is empty and has the specified initial capacity.

The initial capacity is the starting capacity of the new System.Collections.ArrayList. The default initial capacity for an System.Collections.ArrayList is 16. If the specified initial capacity is zero, the default initial capacity is used. The number of elements that the new list is initially capable of storing.

Properties:

Capacity

[C#] public virtual int Capacity {get; set;}

[C++] public: _property virtual int get_Capacity( ); public: _property virtual void set_Capacity(int);

[VB] Overridable Public Property Capacity As Integer

[JScript] public function get Capacity( ): int;public function set Capacity(int);

Description

Gets or sets the number of elements that the System.Collections.ArrayList can contain.

System.Collections.ArrayList.Capacity is the number of elements that the System.Collections.ArrayList is capable of storing.

Count

[C#] public virtual int Count {get;}

[C++] public: _property virtual int get_Count( );

[VB] Overridable Public ReadOnly Property Count As Integer

[JScript] public function get Count( ): int;

Description

Gets the number of elements actually contained in the System.Collections.ArrayList.

System.Collections.ArrayList.Count is the number of elements that are actually in the System.Collections.ArrayList.

IsFixedSize

[C#] public virtual bool IsFixedSize {get;}

[C++] public: _property virtual bool get_IsFixedSize( );

[VB] Overridable Public ReadOnly Property IsFixedSize As Boolean

[JScript] public function get IsFixedSize( ): Boolean;

Description

Gets a value indicating whether the System.Collections.ArrayList has a fixed size.

A collection with a fixed size does not allow the addition or removal of elements, but it allows the modification of existing elements.

IsReadOnly

[C#] public virtual bool IsReadOnly {get;}

[C++] public: _property virtual bool get_IsReadOnly( );

[VB] Overridable Public ReadOnly Property IsReadOnly As Boolean

[JScript] public function get IsReadOnly( ): Boolean;

Description

Gets a value indicating whether the System.Collections.ArrayList is read-only.

IsSynchronized

[C#] public virtual bool IsSynchronized {get;}

[C++] public: _property virtual bool get_IsSynchronized( );

[VB] Overridable Public ReadOnly Property IsSynchronized As Boolean

[JScript] public function get IsSynchronized( ): Boolean;

Description

Gets a value indicating whether access to the System.Collections.ArrayList is synchronized (thread-safe).

To guarantee the thread safety of the System.Collections.ArrayList, all operations must be done through the wrapper returned by the System.Collections.ArrayList.Synchronized (System.Collections.IList) method. Item

[C#] public virtual object this[int index] {get; set;}

[C++] public: _property virtual Object* get_Item(int index); public: _property virtual void set_Item(int index, Object*);

[VB] Overridable Public Default Property Item(ByVal index As Integer) As Object

[JScript] returnValue=ArrayListObject.Item(index); ArrayListObject.Item(index)=returnValue;

Description

Gets or sets the element at the specified index.

This property provides the ability to access a specific element in the collection by using the following syntax: my Collection[index]. The zero-based index of the element to get or set.

SyncRoot

[C#] public virtual object SyncRoot {get;}

[C++] public: _property virtual Object* get_SyncRoot( );

[VB] Overridable Public ReadOnly Property SyncRoot As Object

[JScript] public function get SyncRoot( ): Object;

Description

Gets an object that can be used to synchronize access to the System.Collections.ArrayList To create a synchronized version of the System.Collections.ArrayList, use the System.Collections.ArrayList.Synchronized(System.Collections.IList) method. However, derived classes can provide their own synchronized version of the System.Collections.ArrayList using the System.Collections.ArrayList.SyncRoot property. The synchronizing code must perform operations on the System.Collections.ArrayList.SyncRoot of the System.Collections.ArrayList, not directly on the System.Collections.ArrayList. This ensures proper operation of collections that are derived from other objects. Specifically, it maintains proper synchronization with other threads that might be simultaneously modifying the System.Collections.ArrayList object.

Methods:

Adapter

[C#] public static ArrayList Adapter(IList list);

[C++] public: static ArrayList* Adapter(IList* list);

[VB] Public Shared Function Adapter(ByVal list As IList) As ArrayList

[JScript] public static function Adapter(list: IList): ArrayList;

Description

Creates an System.Collections.ArrayList wrapper for a specific System.Collections.IList.

Return Value: The System.Collections.ArrayList wrapper around the System.Collections.IList.

System.Collections.ArrayList.Adapter(System.Collections.IList) does not copy the contents of System.Collections.IList. Instead, it only creates an System.Collections.Array List wrapper around System.Collections.IList; therefore, changes to the System.Collections.IList also affect the System.Collections.ArrayList. The System.Collections.IList to wrap.

Add

[C#] public virtual int Add(object value);

[C++] public: virtual int Add(Object* value);

[VB] Overridable Public Function Add(ByVal value As Object) As Integer

[JScript] public function Add(value: Object): int;

Description

Adds an object to the end of the System.Collections.ArrayList.

Return Value: The System.Collections.ArrayList index at which the value has been added.

If System.Collections.ArrayList.Count already equals System.Collections.ArrayList.Capacity, the capacity of the list is doubled by automatically reallocating the internal array and copying the existing elements to the new array before the new element is added. The System.Object to be added to the end of the System.Collections.ArrayList.

AddRange

[C#] public virtual void AddRange(ICollection c);

[C++] public: virtual void AddRange(ICollection* c);

[VB] Overridable Public Sub AddRange(ByVal c As ICollection)

[JScript] public function AddRange(c: ICollection);

Description

Adds the elements of an System.Collections.ICollection to the end of the System.Collections.ArrayList.

If the new System.Collections.ArrayList.Count (the current System.Collections.ArrayList.Count plus the size of the collection) will be greater than System.Collections.ArrayList.Capacity, the capacity of the list is either doubled or increased to the new System.Collections.ArrayList.Count, whichever is greater. The internal array is automatically reallocated to accommodate the new elements and the existing elements are copied to the new array before the new elements are added. The System.Collections.ICollection whose elements should be added to the end of the System.Collections.ArrayList.

BinarySearch

[C#] public virtual int BinarySearch(object value);

[C++] public: virtual int BinarySearch(Object* value);

[VB] Overridable Public Function BinarySearch(ByVal value As Object) As Integer

[JScript] public function BinarySearch(value: Object): int;

Description

Searches the entire sorted System.Collections.ArrayList for an element using the default comparer and returns the zero-based index of the element.

Return Value: The zero-based index of the value in the sorted System.Collections.ArrayList, if value is found; otherwise, a negative number, which is the bitwise complement of the index of the next element.

The value parameter and each element of the System.Collections.ArrayList must implement the System.IComparable interface, which is used for comparisons. If the System.Collections.ArrayList is not already sorted according to the System.IComparable implementation, the result might be incorrect. The System.Object to locate.

BinarySearch

[C#] public virtual int BinarySearch(object value, IComparer comparer);

[C++] public: virtual int BinarySearch(Object* value, IComparer* comparer);

[VB] Overridable Public Function BinarySearch(ByVal value As Object, ByVal comparer As IComparer) As Integer

[JScript] public function BinarySearch(value: Object, comparer: IComparer): int;

Description

Searches the entire sorted System.Collections.ArrayList for an element using the specified comparer and returns the zero-based index of the element.

Return Value: The zero-based index of the value in the sorted System.Collections.ArrayList, if value is found; otherwise, a negative number, which is the bitwise complement of the index of the next element.

The comparer customizes how the elements are compared. For example, you can use a System.Collections.CaseInsensitiveComparer instance as the comparer to perform case-insensitive string searches. The System.Object to locate. The System.Collections.IComparer implementation to use when comparing elements.

BinarySearch

[C#] public virtual int BinarySearch(int index, int count, object value, IComparer comparer);

[C++] public: virtual int BinarySearch(int index, int count, Object* value, IComparer* comparer);

[VB] Overridable Public Function BinarySearch(ByVal index As Integer, ByVal count As Integer, ByVal value As Object, ByVal comparer As IComparer) As Integer

[JScript] public function BinarySearch(index: int, count: int, value: Object, comparer: IComparer): int; Uses a binary search algorithm to locate a specific element in the sorted System.Collections.ArrayList or a portion of it.

Description

Searches a section of the sorted System.Collections.ArrayList for an element using the specified comparer and returns the zero-based index of the element.

Return Value: The zero-based index of the value in the sorted System.Collections.ArrayList, if value is found; otherwise, a negative number, which is the bitwise complement of the index of the next element.

The comparer customizes how the elements are compared. For example, you can use a System.Collections.CaseInsensitiveComparer instance as the comparer to perform case-insensitive string searches. The zero-based starting index of the range to search. The length of the range to search. The System.Object to locate. The System.Collections.IComparer implementation to use when comparing elements.

Clear

[C#] public virtual void Clear( );

[C++] public: virtual void Clear( );

[VB] Overridable Public Sub Clear( )

[JScript] public function Clear( );

Description

Removes all elements from the System.Collections.ArrayList.

System.Collections.ArrayList.Count is set to zero.

Clone

[C#] public virtual object Clone( );

[C++] public: virtual Object* Clone( );

[VB] Overridable Public Function Clone( ) As Object

[JScript] public function Clone( ): Object;

Description

Creates a shallow copy of the System.Collections.ArrayList.

Return Value: A shallow copy of the System.Collections.ArrayList.

A shallow copy of a collection is a new collection containing references to the same elements as the original collection. The elements themselves or anything referenced by the elements are not copied. In contrast, a deep copy of a collection copies the elements and everything directly or indirectly referenced by the elements.

Contains

[C#] public virtual bool Contains(object item);

[C++] public: virtual bool Contains(Object* item);

[VB] Overridable Public Function Contains(ByVal item As Object) As Boolean

[JScript] public function Contains(item: Object): Boolean;

Description

Determines whether an element is in the System.Collections.ArrayList.

Return Value: true if item is found in the System.Collections.ArrayList; otherwise, false.

This method performs a linear search; therefore, the average execution time is proportional to System.Collections.ArrayList.Count. That is, this method is an O(n) operation, where n is System.Collections.ArrayList.Count. The System.Object to locate in the System.Collections.ArrayList.The element to locate can be null.

CopyTo

[C#] public virtual void CopyTo(Array array);

[C++] public: virtual void CopyTo(Array* array);

[VB] Overridable Public Sub CopyTo(ByVal array As Array)

[JScript] public function CopyTo(array: Array); Copies the System.Collections.ArrayList or a portion of it to a one-dimensional array.

Description

Copies the entire System.Collections.ArrayList to a compatible one-dimensional System.Array, starting at the beginning of the target array.

The specified array must be of a compatible type. The one-dimensional System.Array that is the destination of the elements copied from System.Collections.ArrayList. The System.Array must have zero-based indexing.

CopyTo

[C#] public virtual void CopyTo(Array array, int arrayIndex);

[C++] public: virtual void CopyTo(Array* array, int arrayIndex);

[VB] Overridable Public Sub CopyTo(ByVal array As Array, ByVal arrayIndex As Integer)

[JScript] public function CopyTo(array: Array, arrayIndex: int);

Description

Copies the entire System.Collections.ArrayList to a compatible one-dimensional System.Array, starting at the specified index of the target array.

The specified array must be of a compatible type. The one-dimensional System.Array that is the destination of the elements copied from System.Collections.ArrayList. The System.Array must have zero-based indexing. The zero-based index in array at which copying begins.

CopyTo

[C#] public virtual void CopyTo(int index, Array array, int arrayIndex, it count);

[C++] public: virtual void CopyTo(int index, Array* array, int arrayIndex, int count);

[VB] Overridable Public Sub CopyTo(ByVal index As Integer, ByVal array As Array, ByVal arrayIndex As Integer, ByVal count As Integer)

[JScript] public function CopyTo(index: int, array: Array, arrayIndex: int, count int);

Description

Copies a range of elements from the System.Collections.ArrayList to a compatible one-dimensional System.Array, starting at the specified index of the target array.

The specified array must be of a compatible type. The zero-based index in the source System.Collections.ArrayList at which copying begins. The one-dimensional System.Array that is the destination of the elements copied from System.Collections.ArrayList. The System.Array must have zero-based indexing. The zero-based index in array at which copying begins. The number of elements to copy.

FixedSize

[C#] public static ArrayList FixedSize(ArrayList list);

[C++] public: static ArrayList* FixedSize(ArrayList* list);

[VB] Public Shared Function FixedSize(ByVal list As ArrayList) As ArrayList

[JScript] public static function FixedSize(list: ArrayList): ArrayList;

Description

Returns an System.Collections.ArrayList wrapper with a fixed size.

Return Value: An System.Collections.ArrayList wrapper with a fixed size.

This wrapper can be used to prevent additions to and deletions from the original System.Collections.ArrayList. The elements can still be modified or replaced. The System.Collections.ArrayList to wrap.

FixedSize

[C#] public static IList FixedSize(IList list);

[C++] public: static IList* FixedSize(IList* list);

[VB] Public Shared Function FixedSize(ByVal list As IList) As IList

[JScript] public static function FixedSize(list: IList): IList; Returns a list wrapper with a fixed size, where elements are allowed to be modified, but not added or removed.

Description

Returns an System.Collections.IList wrapper with a fixed size.

Return Value: An System.Collections.IList wrapper with a fixed size.

This wrapper can be used to prevent additions to and deletions from the original System.Collections.IList. The elements can still be modified or replaced. The System.Collections.IList to wrap.

GetEnumerator

[C#] public virtual IEnumerator GetEnumerator( );

[C++] public: virtual IEnumerator* GetEnumerator( );

[VB] Overridable Public Function GetEnumerator( ) As IEnumerator

[JScript] public function GetEnumerator( ): IEnumerator; Returns an enumerator that can iterate through the System.Collections.ArrayList.

Description

Returns an enumerator for the entire System.Collections.ArrayList.

Return Value: An System.Collections.IEnumerator for the entire System.Collections.ArrayList.

Enumerators are intended to be used only to read data in the collection. Enumerators cannot be used to modify the underlying collection.

GetEnumerator

[C#] public virtual IEnumerator GetEnumerator(int index, int count);

[C++] public: virtual IEnumerator* GetEnumerator(int index, int count);

[VB] Overridable Public Function GetEnumerator(ByVal index As Integer, ByVal count As Integer) As IEnumerator

[JScript] public function GetEnumerator(index: int, count: int): IEnumerator;

Description

Returns an enumerator for a section of the System.Collections.ArrayList.

Return Value: An System.Collections.IEnumerator for the specified section of the System.Collections.ArrayList.

Enumerators are intended to be used only to read data in the collection.

Enumerators cannot be used to modify the underlying collection. The zero-based starting index of the System.Collections.ArrayList section that the enumerator should refer to. The number of elements in the System.Collections.ArrayList section that the enumerator should refer to.

GetRange

[C#] public virtual ArrayList GetRange(int index, int count);

[C++] public: virtual ArrayList* GetRange(int index, int count);

[VB] Overridable Public Function GetRange(ByVal index As Integer, ByVal count As Integer) As ArrayList

[JScript] public function GetRange(index: int, count: int): ArrayList;

Description

Returns an System.Collections.ArrayList which represents a subset of the elements in the source System.Collections.ArrayList.

Return Value: An System.Collections.ArrayList which represents a subset of the elements in the source System.Collections.ArrayList.

This method does not create copies of the elements. The new System.Collections.ArrayList is only a view window into the source System.Collections.ArrayList. However, all subsequent changes to the source System.Collections.ArrayList must be done through this view window System.Collections.ArrayList. If changes are made directly to the source System.Collections.ArrayList, the view window System.Collections.ArrayList is invalidated and any operations on it will return an System.InvalidOperationException. The zero-based System.Collections.ArrayList index at which the range starts. The number of elements in the range.

IndexOf

[C#] public virtual int IndexOf(object value);

[C++] public: virtual int IndexOf(Object* value);

[VB] Overridable Public Function IndexOf(ByVal value As Object) As Integer

[JScript] public function IndexOf(value: Object): int; Returns the zero-based index of the first occurrence of a value in the System.Collections.ArrayList or in a portion of it.

Description

Searches for the specified System.Object and returns the zero-based index of the first occurrence within the entire System.Collections.ArrayList.

Return Value: The zero-based index of the first occurrence of value within the entire the System.Collections.ArrayList, if found; otherwise, −1.

The System.Collections.ArrayList is searched forward starting at the first element and ending at the last element. The System.Object to locate in the System.Collections.ArrayList.

IndexOf

[C#] public virtual int IndexOf(object value, int startIndex);

[C++] public: virtual int IndexOf(Object* value, int startIndex);

[VB] Overridable Public Function IndexOf(ByVal value As Object, ByVal startIndex As Integer) As Integer

[JScript] public function IndexOf(value: Object, startIndex: int): int;

Description

Searches for the specified System.Object and returns the zero-based index of the first occurrence within the section of the System.Collections.ArrayList that extends from the specified index to the last element.

Return Value: The zero-based index of the first occurrence of value within the section of the System.Collections.ArrayList that extends from startIndex to the last element, if found; otherwise, −1.

The System.Collections.ArrayList is searched forward starting at startIndex and ending at the last element. The System.Object to locate in the System.Collections.ArrayList. The zero-based starting index of the search.

IndexOf

[C#] public virtual int IndexOf(object value, int startIndex, int count);

[C++] public: virtual int IndexOf(Object* value, int startIndex, int count);

[VB] Overridable Public Function IndexOf(ByVal value As Object, ByVal startIndex As Integer, ByVal count As Integer) As Integer

[JScript] public function IndexOf(value: Object, startIndex: int, count: int): int;

Description

Searches for the specified System.Object and returns the zero-based index of the first occurrence within the section of the System.Collections.ArrayList that starts at the specified index and contains the specified number of elements.

Return Value: The zero-based index of the first occurrence of value within the section of the System.Collections.ArrayList that starts at startIndex and contains count number of elements, if found; otherwise, −1.

The System.Collections.ArrayList is searched forward starting at startIndex and ending at startIndex+count−1. The System.Object to locate in the System.Collections.ArrayList. The zero-based starting index of the search. The number of elements in the section to search.

Insert

[C#] public virtual void Insert(int index, object value);

[C++] public: virtual void Insert(int index, Object* value);

[VB] Overridable Public Sub Insert(ByVal index As Integer, ByVal value As Object)

[JScript] public function Insert(index: int, value: Object);

Description

Inserts an element into the System.Collections.ArrayList at the specified index.

If System.Collections.ArrayList.Count already equals System.Collections.ArrayList.Capacity, the capacity of the list is doubled by automatically reallocating the internal array before the new element is inserted. The zero-based index at which value should be inserted. The System.Object to insert.

InsertRange

[C#] public virtual void InsertRange(int index, ICollection c);

[C++] public: virtual void InsertRange(int index, ICollection* c);

[VB] Overridable Public Sub InsertRange(ByVal index As Integer, ByVal c As ICollection)

[JScript] public function InsertRange(index: int, c: ICollection);

Description

Inserts the elements of a collection into the System.Collections.ArrayList at the specified index.

If the new System.Collections.ArrayList.Count (the current System.Collections.ArrayList.Count plus the size of the collection) is greater than System.Collections.ArrayList.Capacity, the capacity of the list is either doubled or increased to the new count, whichever is greater. The internal array is automatically reallocated to accommodate the new elements. The zero-based index at which the new elements should be inserted. The System.Collections.ICollection whose elements should be inserted into the System.Collections.ArrayList.

LastIndexOf

[C#] public virtual int LastIndexOf(object value);

[C++] public: virtual int LastIndexOf(Object* value);

[VB] Overridable Public Function LastIndexOf(ByVal value As Object) As Integer

[JScript] public function LastIndexOf(value: Object): int; Returns the zero-based index of the last occurrence of a value in the System.Collections.ArrayList or in a portion of it.

Description

Searches for the specified System.Object and returns the zero-based index of the last occurrence within the entire System.Collections.ArrayList.

Return Value: The zero-based index of the last occurrence of value within the entire the System.Collections.ArrayList, if found; otherwise, −1.

The System.Collections.ArrayList is searched backward starting at the last element and ending at the first element. The. System.Object to locate in the System.Collections.ArrayList.

LastIndexOf

[C#] public virtual int LastIndexOf(object value, int startIndex);

[C++] public: virtual it LastIndexOf(Object* value, int startIndex);

[VB] Overridable Public Function LastIndexOf(ByVal value As Object, ByVal startIndex As Integer) As Integer

[JScript] public function LastIndexOf(value: Object, startIndex: int): int;

Description

Searches for the specified System.Object and returns the zero-based index of the last occurrence within the section of the System.Collections.ArrayList that extends from the first element to the specified index.

Return Value: The zero-based index of the last occurrence of value within the section of the System.Collections.ArrayList that extends from the first element to startIndex, if found; otherwise, −1.

The System.Collections.ArrayList is searched backward starting at startIndex and ending at the first element. The System.Object to locate in the System.Collections.ArrayList. The zero-based starting index of the backward search.

LastIndexOf

[C#] public virtual int LastIndexOf(object value, int startIndex, int count);

[C++] public: virtual int LastIndexOf(Object* value, int startIndex, int count);

[VB] Overridable Public Function LastIndexOf(ByVal value As Object, ByVal startIndex As Integer, ByVal count As Integer) As Integer

[JScript] public function LastIndexOf(value: Object, startIndex: int, count: int): int;

Description

Searches for the specified System.Object and returns the zero-based index of the last occurrence within the section of the System.Collections.ArrayList that contains the specified number of elements and ends at the specified index.

Return Value: The zero-based index of the last occurrence of value within the section of the System.Collections.ArrayList that contains count number of elements and ends at startIndex, if found; otherwise, −1.

The System.Collections.ArrayList is searched backward starting at startIndex and ending at startIndex−count+1. The System.Object to locate in the System.Collections.ArrayList. The zero-based starting index of the backward search. The number of elements in the section to search.

ReadOnly

[C#] public static ArrayList ReadOnly(ArrayList list);

[C++] public: static ArrayList* ReadOnly(ArrayList* list);

[VB] Public Shared Function ReadOnly(ByVal list As ArrayList) As ArrayList

[JScript] public static function ReadOnly(list: ArrayList): ArrayList;

Description

Returns a read-only System.Collections.ArrayList wrapper.

Return Value: A read-only System.Collections.ArrayList wrapper around list.

To prevent any modifications to list, expose list only through this wrapper. The System.Collections.ArrayList to wrap.

ReadOnly

[C#] public static IList ReadOnly(IList list);

[C++] public: static IList* ReadOnly(IList* list);

[VB] Public Shared Function ReadOnly(ByVal list As IList) As IList

[JScript] public static function ReadOnly(list: IList): IList; Returns a list wrapper that is read-only.

Description

Returns a read-only System.Collections.IList wrapper.

Return Value: A read-only System.Collections.IList wrapper around list.

To prevent any modifications to list, expose list only through this wrapper. The System.Collections.IList to wrap.

Remove

[C#] public virtual void Remove(object obj);

[C++] public: virtual void Remove(Object* obj);

[VB] Overridable Public Sub Remove(ByVal obj As Object)

[JScript] public function Remove(obj: Object);

Description

Removes the first occurrence of a specific object from the System.Collections.ArrayList.

This method performs a linear search; therefore, the average execution time is proportional to System.Collections.ArrayList.Count. That is, this method is an O(n) operation, where n is System.Collections.ArrayList.Count. The System.Object to remove from the System.Collections.ArrayList.

RemoveAt

[C#] public virtual void RemoveAt(int index);

[C++] public: virtual void RemoveAt(int index);

[VB] Overridable Public Sub RemoveAt(ByVal index As Integer)

[JScript] public function RemoveAt(index: int);

Description

Removes the element at the specified index of the System.Collections.ArrayList.

In collections such as lists, queues and stacks, the elements that follow the removed element move up to occupy the vacated spot. The zero-based index of the element to remove.

RemoveRange

[C#] public virtual void RemoveRange(int index, int count);

[C++] public: virtual void RemoveRange(int index, int count);

[VB] Overridable Public Sub RemoveRange(ByVal index As Integer, ByVal count As Integer)

[JScript] public function RemoveRange(index: int, count: int);

Description

Removes a range of elements from the System.Collections.ArrayList.

In collections such as lists, queues and stacks, the elements that follow the removed elements move up to occupy the vacated spots. The zero-based starting index of the range of elements to remove. The number of elements to remove.

Repeat

[C#] public static ArrayList Repeat(object value, int count);

[C++] public: static ArrayList* Repeat(Object* value, int count);

[VB] Public Shared Function Repeat(ByVal value As Object, ByVal count As Integer) As ArrayList

[JScript] public static function Repeat(value: Object, count: int): ArrayList;

Description

Returns an System.Collections.ArrayList whose elements are copies of the specified value.

Return Value: An System.Collections.ArrayList with count number of elements, all of which are copies of value. The System.Object to copy multiple times in the new System.Collections.ArrayList. The value to copy can be null. The number of times value should be copied.

Reverse

[C#] public virtual void Reverse( );

[C++] public: virtual void Reverse( );

[VB] Overridable Public Sub Reverse( )

[JScript] public function Reverse( ); Reverses the order of the elements in the System.Collections.ArrayList or a portion of it.

Description

Reverses the order of the elements in the entire System.Collections.ArrayList.

Reverse

[C#] public virtual void Reverse(int index, int count);

[C++] public: virtual void Reverse(int index, int count);

[VB] Overridable Public Sub Reverse(ByVal index As Integer, ByVal count As Integer)

[JScript] public function Reverse(index: int, count: int);

Description

Reverses the order of the elements in the specified range.

This method uses System.Array.Reverse(System.Array) to reverse the order of the elements, such that the element at System.Collections.ArrayList [i], where i is any index within the range, moves to System.Collections.ArrayList [j], where j equals index+index+count−i−1. The zero-based starting index of the range to reverse. The number of elements in the range to reverse.

SetRange

[C#] public virtual void SetRange(int index, ICollection c);

[C++] public: virtual void SetRange(int index, ICollection* c);

[VB] Overridable Public Sub SetRange(ByVal index As Integer, ByVal c As ICollection)

[JScript] public function SetRange(index: int, c: ICollection);

Description

Copies the elements of a collection over a range of elements in the System.Collections.ArrayList. The zero-based System.Collections.ArrayList index at which to start copying the elements of c. The System.Collections.ICollection whose elements to copy to the System.Collections.ArrayList.

Sort

[C#] public virtual void Sort( );

[C++] public: virtual void Sort( );

[VB] Overridable Public Sub Sort( )

[JScript] public function Sort ( ); Sorts the elements in the System.Collections.ArrayList or a portion of it.

Description

Sorts the elements in the entire System.Collections.ArrayList using the System.IComparable implementation of each element.

This method uses System.Array.Sort(System.Array), which uses the QuickSort algorithm. This is an O(n log n) operation, where n is the number of elements to sort.

Sort

[C#] public virtual void Sort(IComparer comparer);

[C++] public: virtual void Sort(IComparer* comparer);

[VB] Overridable Public Sub Sort(ByVal comparer As IComparer)

[JScript] public function Sort(comparer: IComparer);

Description

Sorts the elements in the entire System.Collections.ArrayList using the specified comparer.

This method uses System.Array.Sort(System.Array), which uses the QuickSort algorithm. This is an O(n log n) operation, where n is the number of elements to sort. The System.Collections.IComparer implementation to use when comparing elements.

Sort

[C#] public virtual void Sort(int index, int count, IComparer comparer);

[C++] public: virtual void Sort(int index, int count, IComparer* comparer);

[VB] Overridable Public Sub Sort(ByVal index As Integer, ByVal count As Integer, ByVal comparer As IComparer)

[JScript] public function Sort(index: int, count: int, comparer: IComparer);

Description

Sorts the elements in a section of System.Collections.ArrayList using the specified comparer.

This method uses System.Array.Sort(System.Array), which uses the QuickSort algorithm. This is an O(n log n) operation, where n is the number of elements to sort. The zero-based starting index of the range to sort. The length of the range to sort. The System.Collections.IComparer implementation to use when comparing elements.

Synchronized

[C#] public static ArrayList Synchronized(ArrayList list);

[C++] public: static ArrayList* Synchronized(ArrayList* list);

[VB] Public Shared Function Synchronized(ByVal list As ArrayList) As ArrayList

[JScript] public static function Synchronized(list: ArrayList): ArrayList;

Description

Returns an System.Collections.ArrayList wrapper that is synchronized (thread-safe).

Return Value: An System.Collections.ArrayList wrapper that is synchronized (thread-safe).

To guarantee the thread safety of the System.Collections.ArrayList, all operations must be done through this wrapper. The System.Collections.ArrayList to synchronize.

Synchronized

[C#] public static IList Synchronized(IList list);

[C++] public: static IList* Synchronized(IList* list);

[VB] Public Shared Function Synchronized(ByVal list As IList) As IList

[JScript] public static function Synchronized(list: IList): IList; Returns a list Description Returns an System.Collections.IList wrapper that is synchronized (thread-safe).

Return Value: An System.Collections.IList wrapper that is synchronized (thread-safe).

To guarantee the thread safety of the System.Collections.ArrayList, all operations must be done through this wrapper. The System.Collections.IList to synchronize.

ToArray

[C#] public virtual object[ ] ToArray( );

[C++] public: virtual Object* ToArray( ) _gc[ ];

[VB] Overridable Public Function ToArray( ) As Object( )

[JScript] public function ToArray( ): Object[ ]; Copies the elements of the System.Collections.ArrayList to a new array.

Description

Copies the elements of the System.Collections.ArrayList to a new System.Object array.

Return Value: An System.Object array containing copies of the elements of the System.Collections.ArrayList.

The elements are copied using System.Array.Copy(System.Array,System.Array,System.Int32), which is an O(n) operation, where n is System.Collections.ArrayList.Count.

ToArray

[C#] public virtual Array ToArray(Type type);

[C++] public: virtual Array* ToArray(Type* type);

[VB] Overridable Public Function ToArray(ByVal type As Type) As Array

[JScript] public function ToArray(type: Type): Array;

Description

Copies the elements of the System.Collections.ArrayList to a new array of the specified type.

Return Value: An array of the specified type containing copies of the elements of the System.Collections.ArrayList.

The elements are copied using System.Array.Copy(System.Array,System.Array,System.Int32), which is an O(n) operation, where n is System.Collections.ArrayList.Count. The System.Type of array to create and copy elements to.

TrimToSize

[C#] public virtual void TrimToSize( );

[C++] public: virtual void TrimToSize( );

[VB] Overridable Public Sub TrimToSize( )

[JScript] public function TrimToSize( );

Description

Sets the capacity to the actual number of elements in the System.Collections.ArrayList.

This method can be used to minimize a list's memory overhead if no new elements will be added to the list.

BitArray class (System.Collections)

TrimToSize

Description

Manages a compact array of bit values, which are represented as Booleans, where true indicates that the bit is on (1) and false indicates the bit is off (0).

The size of a System.Collections.BitArray is controlled by the client; indexing past the end of the System.Collections.BitArray throws an System.ArgumentException.

BitArray

Example Syntax:

TrimToSize

[C#] public BitArray(BitArray bits);

[C++] public: BitArray(BitArray* bits);

[VB] Public Sub New(ByVal bits As BitArray)

[JScript] public function BitArray(bits: BitArray);

Description

Initializes a new instance of the System.Collections.BitArray class that contains bit values copied from the specified System.Collections.BitArray. The System.Collections.BitArray to copy.

BitArray

Example Syntax:

TrimToSize

[C#] public BitArray(bool[ ] values);

[C++] public: BitArray(bool values _gc[ ]);

[VB] Public Sub New(ByVal values( ) As Boolean)

[JScript] public function BitArray(values: Boolean[ ]);

Description

Initializes a new instance of the System.Collections.BitArray class that contains bit values copied from the specified array of Booleans. An array of Booleans to copy.

BitArray

Example Syntax:

TrimToSize

[C#] public BitArray(byte[ ] bytes);

[C++] public: BitArray(unsigned char bytes _gc[ ]);

[VB] Public Sub New(ByVal bytes( ) As Byte)

[JScript] public function BitArray(bytes: Byte[ ]);

Description

Initializes a new instance of the System.Collections.BitArray class that contains bit values copied from the specified array of bytes.

The first byte in the array represents bits 0 through 7, the second byte represents bits 8 through 15, and so on. The Least Significant Bit of each byte represents the lowest index value: "bytes [0] & 1" represents bit 0, "bytes [0] & 2" represents bit 1, "bytes [0] & 4" represents bit 2, and so on. An array of bytes containing the values to copy, where each byte represents eight consecutive bits.

BitArray

Example Syntax:

TrimToSize

[C#] public BitArray(int length);

[C++] public: BitArray(int length);

[VB] Public Sub New(ByVal length As Integer)

[JScript] public function BitArray(length: int); Initializes a new instance of the System.Collections.BitArray class whose capacity and initial values can be specified.

Description

Initializes a new instance of the System.Collections.BitArray class that can hold the specified number of bit values, which are initially set to false. The number of bit values in the new System.Collections.BitArray.

BitArray

Example Syntax:

TrimToSize

[C#] public BitArray(int[ ] values);

[C++] public: BitArray(int values _gc[ ]);

[VB] Public Sub New(ByVal values( ) As Integer)

[JScript] public function BitArray(values: int[ ]);

Description

Initializes a new instance of the System.Collections.BitArray class that contains bit values copied from the specified array of 32-bit integers.

The number in the first values array element represents bits 0 through 31, the second number in the array represents bits 32 through 63, and so on. The Least Significant Bit of each integer represents the lowest index value: "values [0] & 1" represents bit 0, "values [0] & 2" represents bit 1, "values [0] & 4" represents bit 2, and so on. An array of integers containing the values to copy, where each integer represents 32 consecutive bits.

BitArray

Example Syntax:

TrimToSize

[C#] public BitArray(int length, bool defaultValue);

[C++] public: BitArray(int length, bool defaultValue);

[VB] Public Sub New(ByVal length As Integer, ByVal defaultValue As Boolean)

[JScript] public function BitArray(length: int, defaultValue: Boolean);

Description

Initializes a new instance of the System.Collections.BitArray class that can hold the specified number of bit values, which are initially set to the specified value. The number of bit values in the new System.Collections.BitArray. The Boolean value to assign to each bit.

Count

TrimToSize

[C#] public int Count {get;}

[C++] public: _property int get_Count( );

[VB] Public ReadOnly Property Count As Integer

[JScript] public function get Count( ): int;

Description

Gets the number of elements contained in the System.Collections.BitArray.

System.Collections.BitArray.Length and System.Collections.BitArray.Count return the same value.

IsReadOnly

TrimToSize

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether the System.Collections.BitArray is read-only.

System.Collections.BitArray implements the System.Collections.BitArray.IsReadOnly property because it is required by the System.Collections.IList interface.

IsSynchronized

TrimToSize

[C#] public bool IsSynchronized {get;}

[C++] public: _property bool get_IsSynchronized( );

[VB] Public ReadOnly Property IsSynchronized As Boolean

[JScript] public function get IsSynchronized( ): Boolean;

Description

Gets a value indicating whether access to the System.Collections.BitArray is synchronized (thread-safe).

System.Collections.BitArray implements the System.Collections.BitArray.IsSynchronized property because it is required by the System.Collections.ICollection interface.

Item

TrimToSize

[C#] public bool this[int index] {get; set;}

[C++] public: _property bool get_Item(int index); public: _property void set_Item(int index, bool);

[VB] Public Default Property Item(ByVal index As Integer) As Boolean

[JScript] returnValue=BitArrayObject.Item(index); BitArrayObject.Item(index)=returnValue;

Description

Gets or sets the value of the bit at a specific position in the System.Collections.BitArray.

This property provides the ability to access a specific element in the collection by using the following syntax: my Collection[index]. The zero-based index of the value to get or set.

Length

TrimToSize

[C#] public int Length {get; set;}

[C++] public: _property int get_Length( );public: _property void set_Length(int);

[VB] Public Property Length As Integer

[JScript] public function get Length( ): int;public function set Length(int);

Description

Gets or sets the number of elements in the System.Collections.BitArray.

System.Collections.BitArray.Length and System.Collections.BitArray.Count return the same value.

SyncRoot

TrimToSize

[C#] public object SyncRoot {get;}

[C++] public: _property Object* get_SyncRoot( );

[VB] Public ReadOnly Property SyncRoot As Object

[JScript] public function get SyncRoot( ): Object;

Description

Gets an object that can be used to synchronize access to the System.Collections.BitArray.

Derived classes can provide their own synchronized version of the System.Collections.BitArray using the System.Collections.BitArray.SyncRoot property. The synchronizing code must perform operations on the System.Collections.BitArray.SyncRoot of the System.Collections.BitArray, not directly on the System.Collections.BitArray. This ensures proper operation of collections that are derived from other objects. Specifically, it maintains proper synchronization with other threads that might be simultaneously modifying the System.Collections.BitArray object.

And

[C#] public BitArray And(BitArray value);

[C++] public: BitArray* And(BitArray* value);

[VB] Public Function And(ByVal value As BitArray) As BitArray

[JScript] public function And(value: BitArray): BitArray;

Description

Performs the bitwise AND operation on the elements in the current System.Collections.BitArray against the corresponding elements in the specified System.Collections.BitArray.

Return Value: A System.Collections.BitArray containing the result of the bitwise AND operation on the elements in the current System.Collections.BitArray against the corresponding elements in the specified System.Collections.BitArray The bitwise AND operation returns true if both operands are true, and returns false if one or both operands are false. The System.Collections.BitArray with which to perform the bitwise AND operation.

Clone

[C#] public object Clone( );

[C++] public: _sealed Object* Clone( );

[VB] NotOverridable Public Function Clone( ) As Object

[JScript] public function Clone( ): Object;

Description

Creates a shallow copy of the System.Collections.BitArray.

Return Value: A shallow copy of the System.Collections.BitArray.

A shallow copy of a collection is a new collection containing references to the same elements as the original collection. The elements themselves or anything referenced by the elements are not copied. In contrast, a deep copy of a collection copies the elements and everything directly or indirectly referenced by the elements.

CopyTo

[C#] public void CopyTo(Array array, int index);

[C++] public: _sealed void CopyTo(Array* array, int index);

[VB] NotOverridable Public Sub CopyTo(ByVal array As Array, ByVal index As Integer)

[JScript] public function CopyTo(array: Array, index: int);

Description

Copies the entire System.Collections.BitArray to a compatible one-dimensional System.Array, starting at the specified index of the target array.

The specified array must be of a compatible type. Only bool int and byte types of arrays are supported. The one-dimensional System.Array that is the destination of the elements copied from System.Collections.BitArray. The System.Array must have zero-based indexing. The zero-based index in array at which copying begins.

Get

[C#] public bool Get(int index);

[C++] public: bool Get(int index);

[VB] Public Function Get(ByVal index As Integer) As Boolean

[JScript] public function Get(index: int): Boolean;

Description

Gets the value of the bit at a specific position in the System.Collections.BitArray.

Return Value: The value of the bit at position index. The zero-based index of the value to get.

GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Returns an enumerator that can iterate through the System.Collections.BitArray.

Return Value: An System.Collections.IEnumerator for the entire System.Collections.BitArray.

Enumerators are intended to be used only to read data in the collection. Enumerators cannot be used to modify the underlying collection.

Not

[C#] public BitArray Not( );

[C++] public: BitArray* Not( );

[VB] Public Function Not( ) As BitArray

[JScript] public function Not( ): BitArray;

Description

Inverts all the bit values in the current System.Collections.BitArray, so that elements set to true are changed to false, and elements set to false are changed to true.

Return Value: The current instance with inverted bit values.

Or

[C#] public BitArray Or(BitArray value);

[C++] public: BitArray* Or(BitArray* value);

[VB] Public Function Or(ByVal value As BitArray) As BitArray

[JScript] public function Or(value: BitArray): BitArray;

Description

Performs the bitwise OR operation on the elements in the current System.Collections.BitArray against the corresponding elements in the specified System.Collections.BitArray.

Return Value: A System.Collections.BitArray containing the result of the bitwise OR operation on the elements in the current System.Collections.BitArray against the corresponding elements in the specified System.Collections.BitArray.

The bitwise OR operation returns true if one or both operands are true, and returns false if both operands are false. The System.Collections.BitArray with which to perform the bitwise OR operation.

Set

[C#] public void Set(int index, bool value);

[C++] public: void Set(int index, bool value);

[VB] Public Sub Set(ByVal index As Integer, ByVal value As Boolean)

[JScript] public function Set(index: int, value: Boolean);

Description

Sets the bit at a specific position in the System.Collections.BitArray to the specified value. The zero-based index of the bit to set. The Boolean value to assign to the bit.

SetAll

[C#] public void SetAll(bool value);

[C++] public: void SetAll(bool value);

[VB] Public Sub SetAll(ByVal value As Boolean)

[JScript] public function SetAll(value: Boolean);

Description

Sets all bits in the System.Collections.BitArray to the specified value. The Boolean value to assign to all bits.

Xor

[C#] public BitArray Xor(BitArray value);

[C++] public: BitArray* Xor(BitArray* value);

[VB] Public Function Xor(ByVal value As BitArray) As BitArray

[JScript] public function Xor(value: BitArray): BitArray;

Description

Performs the bitwise exclusive OR operation on the elements in the current System.Collections.BitArray against the corresponding elements in the specified System.Collections.BitArray.

Return Value: A System.Collections.BitArray containing the result of the bitwise eXclusive OR operation on the elements in the current System.Collections.BitArray against the corresponding elements in the specified System.Collections.BitArray.

The bitwise exclusive OR operation returns true if exactly one operand is true, and returns false if both operands have the same Boolean value. The System.Collections.BitArray with which to perform the bitwise eXclusive OR operation.

CaseInsensitiveComparer class (System.Collections)

Xor

Description

Compares two objects for equivalence, ignoring the case of strings.

System.Collections.CaseInsensitiveComparer implements the System.Collections.IComparer interface supporting case-insensitive comparisons on strings, just as System.Collections.CaseInsensitiveHashCodeProvider implements the System.Collections.IHashCodeProvider interface supporting case-insensitive comparisons on strings.

CaseInsensitiveComparer

Example Syntax:

Xor

[C#] public CaseInsensitiveComparer( );

[C++] public: CaseInsensitiveComparer( );

[VB] Public Sub New( )

[JScript] public function CaseInsensitiveComparer( ); Initializes a new instance of the System.Collections.CaseInsensitiveComparer class.

Description

Initializes a new instance of the System.Collections.CaseInsensitiveComparer class using the System.Threading.Thread.CurrentCulture of the current thread.

Comparison procedures use the System.Threading.Thread.CurrentCulture of the current thread to determine the sort order. String comparisons might have different results depending on the culture. For more information on culture-specific comparisons, see the System.Globalization namespace and.

CaseInsensitiveComparer

Example Syntax:

Xor

[C#] public CaseInsensitiveComparer(CultureInfo culture);

[C++] public: CaseInsensitiveComparer(CultureInfo* culture);

[VB] Public Sub New(ByVal culture As CultureInfo)

[JScript] public function CaseInsensitiveComparer(culture: CultureInfo);

Description

Initializes a new instance of the System.Collections.CaseInsensitiveComparer class using the specified System.Globalization.CultureInfo.

Comparison procedures use the specified System.Globalization.CultureInfo to determine the sort order. String comparisons might have different results depending on the culture. For more information on culture-specific comparisons, see the System.Globalization namespace and. The System.Globalization.CultureInfo to use for the new System.Collections.CaseInsensitiveComparer.

Default

Xor

[C#] public static CaseInsensitiveComparer Default {get;}

[C++] public: _property static CaseInsensitiveComparer* get_Default( );

[VB] Public Shared ReadOnly Property Default As CaseInsensitiveComparer

[JScript] public static function get Default( ): CaseInsensitiveComparer;

Description

Gets an instance of System.Collections.CaseInsensitiveComparer that is always available.

Compare

[C#] public int Compare(object a, object b);

[C++] public: _sealed int Compare(Object* a, Object* b);

[VB] NotOverridable Public Function Compare(ByVal a As Object, ByVal b As Object) As Integer

[JScript] public function Compare(a: Object, b: Object): int;

Description

Performs a case-insensitive comparison of two objects of the same type and returns a value indicating whether one is less than, equal to or greater than the other.

Return Value: Value Condition Less than zero a is less than b, with casing ignored.

If a implements System.IComparable, then a. The first object to compare. The second object to compare.

CaseInsensitiveHashCodeProvider class (System. Collections)

ToString

Description

Supplies a hash code for an object, using a hashing algorithm that ignores the case of strings.

System.Collections.CaseInsensitiveHashCodeProvider implements the System.Collections.IHashCodeProvider interface supporting case-insensitive comparisons on strings, just as System.Collections.CaseInsensitiveComparer implements the System.Collections.IComparer interface supporting case-insensitive comparisons on strings.

CaseInsensitiveHashCodeProvider

Example Syntax:

ToString

[C#] public CaseInsensitiveHashCodeProvider( );

[C++] public: CaseInsensitiveHashCodeProvider( );

[VB] Public Sub New( )

[JScript] public function CaseInsensitiveHashCode Provider( ); Initializes a new instance of the System.Collections.CaseInsensitiveHashCodeProvider class.

Description

Initializes a new instance of the System.Collections. CaseInsensitiveHashCodeProvider class using the current System.Globalization.CultureInfo.

The System.Globalization.CultureInfo provides information about casing.

CaseInsensitiveHashCodeProvider

Example Syntax:

ToString

[C#] public CaseInsensitiveHashCodeProvider(CultureInfo culture);

[C++] public: CaseInsensitiveHashCodeProvider(CultureInfo* culture);

[VB] Public Sub New(ByVal culture As CultureInfo)

[JScript] public function CaseInsensitiveHashCodeProvider (culture: CultureInfo);

Description

Initializes a new instance of the System.Collections. CaseInsensitiveHashCodeProvider class using the current System.Globalization.CultureInfo.

The System.Globalization.CultureInfo provides information about casing.

The System.Globalization.CultureInfo to use for the new System.Collections.CaseInsensitiveHashCodeProvider.

Default

ToString

[C#] public static CaseInsensitiveHashCodeProvider Default {get;}

[C++] public: _property static CaseInsensitiveashCodeProvider* get_Default( );

[VB] Public Shared ReadOnly Property Default As CaseInsensitiveHashCodeProvider

[JScript] public static function get Default( ): CaseInsensitiveHashCodeProvider;

Description

Gets an instance of System.Collections.CaseInsensitiveHashCodeProvider that is always available.

GetHashCode

[C#] public int GetHashCode(object obi);

[C++] public: _sealed int GetHashCode(Object* obj);

[VB] NotOverridable Public Function GetHashCode(ByVal obj As Object) As Integer

[JScript] public function GetHashCode(obj: Object): int; Returns a hash code, using a hashing algorithm that ignores the case of strings.

Description

Returns a hash code for the given object, using a hashing algorithm that ignores the case of strings.

Return Value: A hash code for the given object, using a hashing algorithm that ignores the case of strings.

The return value from this method must not be persisted for two reasons. First, the hash function of a class might be altered to generate a better distribution, rendering any values from the old hash function useless. Second, the default implementation of this class does not guarantee that the same value will be returned by different instances. The System.Object for which a hash code is to be returned.

CollectionBase class (System.Collections)

ToString

Description

Provides the abstract base class for a strongly typed collection.

A System.Collections.CollectionBase instance is always modifiable. See System.Collections.ReadOnlyCollectionBase for a read-only version of this class.

CollectionBase

Example Syntax:

ToString

[C#] protected CollectionBase( );

[C++] protected: CollectionBase( );

[VB] Protected Sub New( )

[JScript] protected function CollectionBase( );

Count

ToString

[C#] public int Count {get;}

[C++] public: _property int get_Count( );

[VB] Public ReadOnly Property Count As Integer

[JScript] public function get Count( ): int;

Description

Gets the number of elements contained in the System.Collections.CollectionBase instance.

InnerList

ToString

[C#] protected ArrayList InnerList {get;}

[C++] protected: _property ArrayList* get_InnerList( );

[VB] Protected ReadOnly Property InnerList As ArrayList

[JScript] protected function get InnerList( ): ArrayList;

Description

Gets an System.Collections.ArrayList containing the list of elements in the System.Collections.CollectionBase instance.

List

ToString

[C#] protected IList List {get;}

[C++] protected: _property IList* get_List( );

[VB] Protected ReadOnly Property List As IList

[JScript] protected function get List( ): IList;

Description

Gets an System.Collections.IList containing the list of elements in the System.Collections.CollectionBase instance.

Clear

[C#] public void Clear( );

[C++] public: _sealed void Clear( );

[VB] NotOverridable Public Sub Clear( )

[JScript] public function Clear( );

Description

Removes all objects from the System.Collections.CollectionBase instance.

System.Collections.CollectionBase.Count is set to zero.

GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Returns an enumerator that can iterate through the System.Collections.CollectionBase instance.

Return Value: An System.Collections.IEnumerator for the System.Collections.CollectionBase instance.

Enumerators are intended to be used only to read data in the collection. Enumerators cannot be used to modify the underlying collection.

OnClear

[C#] protected virtual void OnClear( );

[C++] protected: virtual void OnClear( );

[VB] Overridable Protected Sub OnClear( )

[JScript] protected function OnClear( );

Description

Performs additional custom processes when clearing the contents of the System.Collections.CollectionBase instance.

The default implementation of this method is intended to be overridden by a derived class to perform some action before the collection is cleared.

OnClearComplete

[C#] protected virtual void OnClearComplete( );

[C++] protected: virtual void OnClearComplete( );

[VB] Overridable Protected Sub OnClearComplete( )

[JScript] protected function OnClearComplete( );

Description

Performs additional custom processes after clearing the contents of the System.Collections.CollectionBase instance.

The default implementation of this method is intended to be overridden by a derived class to perform some action after the collection is cleared.

OnInsert

[C#] protected virtual void OnInsert(int index, object value);

[C++] protected: virtual void OnInsert(int index, Object* value);

[VB] Overridable Protected Sub OnInsert(ByVal index As Integer, ByVal value As Object)

[JScript] protected function OnInsert(index: int, value: Object);

Description

Performs additional custom processes before inserting a new element into the System.Collections.CollectionBase instance.

The default implementation of this method is intended to be overridden by a derived class to perform some action before the specified element is inserted.

The zero-based index at which to insert value. The new value of the element at index.

OnInsertComplete

[C#] protected virtual void OnInsertComplete(int index, object value);

[C++] protected: virtual void OnInsertComplete(int index, Object* value);

[VB] Overridable Protected Sub OnInsertComplete(ByVal index As Integer, ByVal value As Object)

[JScript] protected function OnInsertComplete(index: int, value: Object);

Description

Performs additional custom processes after inserting a new element into the System.Collections.CollectionBase instance.

The default implementation of this method is intended to be overridden by a derived class to perform some action after the specified element is inserted. The zero-based index at which to insert value. The new value of the element at index.

OnRemove

[C#] protected virtual void OnRemove(int index, object value);

[C++] protected: virtual void OnRemove(int index, Object* value);

[VB] Overridable Protected Sub OnRemove(ByVal index As Integer, ByVal value As Object)

[JScript] protected function OnRemove(index: int, value: Object);

Description

Performs additional custom processes when removing an element from the System.Collections.CollectionBase instance.

The default implementation of this method is intended to be overridden by a derived class to perform some action before the specified element is removed. The zero-based index at which value can be found. The value of the element to remove from index.

OnRemoveComplete

[C#] protected virtual void OnRemoveComplete(int index, object value);

[C++] protected: virtual void OnRemoveComplete(int index, Object* value);

[VB] Overridable Protected Sub OnRemoveComplete(ByVal index As Integer, ByVal value As Object)

[JScript] protected function OnRemoveComplete(index: int, value: Object);

Description

Performs additional custom processes after removing an element from the System.Collections.CollectionBase instance.

The default implementation of this method is intended to be overridden by a derived class to perform some action after the specified element is removed. The zero-based index at which value can be found. The value of the element to remove from index.

OnSet

[C#] protected virtual void OnSet(int index, object oldValue, object newValue);

[C++] protected: virtual void OnSet(int index, Object* oldValue, Object* newValue);

[VB] Overridable Protected Sub OnSet(ByVal index As Integer, ByVal oldValue As Object, ByVal newValue As Object)

[JScript] protected function OnSet(index: int, oldValue: Object, newValue: Object);

Description

Performs additional custom processes before setting a value in the System.Collections.CollectionBase instance.

The default implementation of this method is intended to be overridden by a derived class to perform some action before the specified element is set. The zero-based index at which oldValue can be found. The value to replace with newValue. The new value of the element at index.

OnSetComplete

[C#] protected virtual void OnSetComplete(int index, object oldValue, object newValue);

[C++] protected: virtual void OnSetComplete(int index, Object* oldValue, Object* newValue);

[VB] Overridable Protected Sub OnSetComplete(ByVal index As Integer, ByVal oldValue As Object, ByVal newValue As Object)

[JScript] protected function OnSetComplete(index: int, oldValue: Object, newValue: Object);

Description

Performs additional custom processes after setting a value in the System.Collections.CollectionBase instance.

The default implementation of this method is intended to be overridden by a derived class to perform some action after the specified element is set. The zero-based index at which oldValue can be found. The value to replace with newValue. The new value of the element at index.

OnValidate

[C#] protected virtual void OnValidate(object value);

[C++] protected: virtual void OnValidate(Object* value);

[VB] Overridable Protected Sub OnValidate(ByVal value As Object)

[JScript] protected function OnValidate(value: Object);

Description

Performs additional custom processes when validating a value.

The default implementation of this method determines whether value is null, and, if so, throws System.ArgumentNullException. It is intended to be overridden by a derived class to perform additional action when the specified element is validated. The object to validate.

RemoveAt

[C#] public void RemoveAt(int index);

[C++] public: _sealed void RemoveAt(int index);

[VB] NotOverridable Public Sub RemoveAt(ByVal index As Integer)

[JScript] public function RemoveAt(index: int);

Description

Removes the element at the specified index of the System.Collections.CollectionBase instance.

In collections such as lists, queues and stacks, the elements that follow the removed element move up to occupy the vacated spot. The zero-based index of the element to remove.

ICollection.CopyTo

[C#] void ICollection.CopyTo(Array array, int index);

[C++] void ICollection::CopyTo(Array* array, int index);

[VB] Sub CopyTo(ByVal array As Array, ByVal index As Integer) Implements ICollection.CopyTo

[JScript] function ICollection.CopyTo(array: Array, index: int);

IList.Add

[C#] int IList.Add(object value);

[C++] int IList::Add(Object* value);

[VB] Function Add(ByVal value As Object) As Integer Implements IList.Add

[JScript] function IList.Add(value: Object): int;

IList.Contains

[C#] bool IList.Contains(object value);

[C++] bool IList::Contains(Object* value);

[VB] Function Contains(ByVal value As Object) As Boolean Implements IList.Contains

[JScript] function IList.Contains(value: Object): Boolean;

IList.IndexOf

[C#] int IList.IndexOf(object value);

[C++] int IList::IndexOf(Object* value);

[VB] Function IndexOf(ByVal value As Object) As Integer Implements IList.IndexOf

[JScript] function IList.IndexOf(value: Object): int;

IList.Insert

[C#] void IList.Insert(int index, object value);

[C++] void IList::Insert(int index, Object* value);

[VB] Sub Insert(ByVal index As Integer, ByVal value As Object) Implements IList.Insert

[JScript] function IList.Insert(index: int, value: Object);

IList.Remove

[C#] void IList.Remove(object value);

[C++] void IList::Remove(Object* value);

[VB] Sub Remove(ByVal value As Object) Implements IList.Remove

[JScript] function IList.Remove(value: Object);

Comparer class (System.Collections)

ToString

Description

Compares two objects for equivalence, where string comparisons are case-sensitive.

This class is the default implementation of the System.Collections.IComparer interface. The System.Collections.CaseInsensitiveComparer class is the implementation of the System.Collections.IComparer interface that performs case-insensitive string comparisons.

ToString

[C#] public static readonly Comparer Default;

[C++] public: static Comparer* Default;

[VB] Public Shared ReadOnly Default As Comparer

[JScript] public static var Default: Comparer;

Description

Gets an instance of System.Collections.Comparer that is always available.

An instance of System.Collections.Comparer that is always available.

Compare

[C#] public int Compare(object a, object b);

[C++] public: _sealed int Compare(Object* a, Object* b);

[VB] NotOverridable Public Function Compare(ByVal a As Object, ByVal b As Object) As Integer

[JScript] public function Compare(a: Object, b: Object): int;

Description

Performs a case-sensitive comparison of two objects of the same type and returns a value indicating whether one is less than, equal to or greater than the other.

Return Value: Value Condition Less than zero a is less than b.

If a implements System.IComparable, then a. The first object to compare. The second object to compare.

DictionaryBase class (System.Collections)

ToString

Description

Provides the abstract base class for a strongly typed collection of key-and-value pairs.

Each element is a key-and-value pair stored in a System.Collections.DictionaryEntry object.

DictionaryBase

Example Syntax:

ToString

[C#] protected DictionaryBase( );

[C++] protected: DictionaryBase( );

[VB] Protected Sub New( )

[JScript] protected function DictionaryBase( );

Count

ToString

[C#] public int Count {get;}

[C++] public: _property int get_Count( );

[VB] Public ReadOnly Property Count As Integer

[JScript] public function get Count( ): int;

Description

Gets the number of elements contained in the System.Collections.DictionaryBase instance.

Dictionary

ToString

[C#] protected IDictionary Dictionary {get;}

[C++] protected: _property IDictionary* get_Dictionary( );

[VB] Protected ReadOnly Property Dictionary As IDictionary

[JScript] protected function get Dictionary( ): IDictionary;

Description

Gets the list of elements contained in the System.Collections.DictionaryBase instance.

InnerHashtable

ToString

[C#] protected Hashtable InnerHashtable {get;}

[C++] protected: _property Hashtable* get_InnerHashtable( );

[VB] Protected ReadOnly Property InnerHashtable As Hashtable

[JScript] protected function get InnerHashtable( ): Hashtable;

Description

Gets the list of elements contained in the System.Collections.DictionaryBase instance.

Clear

[C#] public void Clear( );

[C++] public: _sealed void Clear( );

[VB] NotOverridable Public Sub Clear( )

[JScript] public function Clear( );

Description

Clears the contents of the System.Collections.DictionaryBase instance.

System.Collections.DictionaryBase.Count is set to zero.

CopyTo

[C#] public void CopyTo(Array array, int index);

[C++] public: _sealed void CopyTo(Array* array, int index);

[VB] NotOverridable Public Sub CopyTo(ByVal array As Array, ByVal index As Integer)

[JScript] public function CopyTo(array: Array, index: int);

Description

Copies the System.Collections.DictionaryBase elements to a one-dimensional System.Array at the specified index.

The elements are copied to the System.Array in the same order in which the enumerator iterates through the System.Collections.DictionaryBase. The one-dimensional System.Array that is the destination of the System.Collections.DictionaryEntry objects copied from the System.Collections.DictionaryBase instance. The System.Array must have zero-based indexing. The zero-based index in array at which copying begins.

GetEnumerator

[C#] public IDictionaryEnumerator GetEnumerator( );

[C++] public: _sealed IDictionaryEnumerator* GetEnumerator( );

[VB] NotOverridable Public Function GetEnumerator( ) As IDictionaryEnumerator

[JScript] public function GetEnumerator( ): IDictionaryEnumerator;

Description

Returns an enumerator that can iterate through the System.Collections.DictionaryBase instance.

Return Value: An System.Collections.IEnumerator for the System.Collections.DictionaryBase instance.

Enumerators are intended to be used only to read data in the collection. Enumerators cannot be used to modify the underlying collection.

OnClear

[C#] protected virtual void OnClear( );

[C++] protected: virtual void OnClear( );

[VB] Overridable Protected Sub OnClear( )

[JScript] protected function OnClear( );

Description

Performs additional custom processes before clearing the contents of the System.Collections.DictionaryBase instance.

The default implementation of this method is intended to be overridden by a derived class to perform some action before the collection is cleared.

OnClearComplete

[C#] protected virtual void OnClearComplete( );

[C++] protected: virtual void OnClearComplete( );

[VB] Overridable Protected Sub OnClearComplete( )

[JScript] protected function OnClearComplete( );

Description

Performs additional custom processes after clearing the contents of the System.Collections.DictionaryBase instance.

The default implementation of this method is intended to be overridden by a derived class to perform some action after the collection is cleared.

OnGet

[C#] protected virtual object OnGet(object key, object currentValue);

[C++] protected: virtual Object* OnGet(Object* key, Object* currentValue);

[VB] Overridable Protected Function OnGet(ByVal key As Object, ByVal currentValue As Object) As Object

[JScript] protected function OnGet(key: Object, currentValue: Object): Object;

Description

Gets the element with the specified key and value in the System.Collections.DictionaryBase instance.

Return Value: An System.Object containing the element with the specified key and value.

The default implementation of this method returns currentValue. It is intended to be overridden by a derived class to perform additional action when the specified element is retrieved. The key of the element to get. The current value of the element associated with key.

OnInsert

[C#] protected virtual void OnInsert(object key, object value);

[C++] protected: virtual void OnInsert(Object* key, Object* value);

[VB] Overridable Protected Sub OnInsert(ByVal key As Object, ByVal value As Object)

[JScript] protected function OnInsert(key: Object, value: Object);

Description

Performs additional custom processes before inserting a new element into the System.Collections.DictionaryBase instance.

The default implementation of this method is intended to be overridden by a derived class to perform some action before the specified element is inserted. The key of the element to insert. The value of the element to insert.

OnInsertComplete

[C#] protected virtual void OnInsertComplete(object key, object value);

[C++] protected: virtual void OnInsertComplete(Object* key, Object* value);

[VB] Overridable Protected Sub OnInsertComplete(ByVal key As Object, ByVal value As Object)

[JScript] protected function OnInsertComplete(key: Object, value: Object);

Description

Performs additional custom processes after inserting a new element into the System.Collections.DictionaryBase instance.

The default implementation of this method is intended to be overridden by a derived class to perform some action after the specified element is inserted. The key of the element to insert. The value of the element to insert.

OnRemove

[C#] protected virtual void OnRemove(object key, object value);

[C++] protected: virtual void OnRemove(Object* key, Object* value);

[VB] Overridable Protected Sub OnRemove(ByVal key As Object, ByVal value As Object)

[JScript] protected function OnRemove(key: Object, value: Object);

Description

Performs additional custom processes before removing an element from the System.Collections.DictionaryBase instance.

The default implementation of this method is intended to be overridden by a derived class to perform some action before the specified element is removed. The key of the element to remove. The value of the element to remove.

OnRemoveComplete

[C#] protected virtual void OnRemoveComplete(object key, object value);

[C++] protected: virtual void OnRemoveComplete(Object* key, Object* value);

[VB] Overridable Protected Sub OnRemoveComplete(ByVal key As Object, ByVal value As Object)

[JScript] protected function OnRemoveComplete(key: Object, value: Object);

Description

Performs additional custom processes after removing an element from the System.Collections.DictionaryBase instance.

The default implementation of this method is intended to be overridden by a derived class to perform some action after the specified element is removed. The key of the element to remove. The value of the element to remove.

OnSet

[C#] protected virtual void OnSet(object key, object oldValue, object newValue);

[C++] protected: virtual void OnSet(Object* key, Object* oldValue, Object* newValue);

[VB] Overridable Protected Sub OnSet(ByVal key As Object, ByVal oldValue As Object, ByVal newValue As Object)

[JScript] protected function OnSet(key: Object, oldValue: Object, newValue: Object);

Description

Performs additional custom processes before setting a value in the System.Collections.DictionaryBase instance.

The default implementation of this method is intended to be overridden by a derived class to perform some action before the specified element is set. The key of the element to locate. The old value of the element associated with key. The new value of the element associated with key.

OnSetComplete

[C#] protected virtual void OnSetComplete(object key, object oldValue, object newValue);

[C++] protected: virtual void OnSetComplete(Object* key, Object* oldValue, Object* newValue);

[VB] Overridable Protected Sub OnSetComplete(ByVal key As Object, ByVal oldValue As Object, ByVal newValue As Object)

[JScript] protected function OnSetComplete(key: Object, oldValue: Object, newValue: Object);

Description

Performs additional custom processes after setting a value in the System.Collections.DictionaryBase instance.

The default implementation of this method is intended to be overridden by a derived class to perform some action after the specified element is set. The key of the element to locate. The old value of the element associated with key. The new value of the element associated with key.

OnValidate

[C#] protected virtual void OnValidate(object key, object value);

[C++] protected: virtual void OnValidate(Object* key, Object* value);

[VB] Overridable Protected Sub OnValidate(ByVal key As Object, ByVal value As Object)

[JScript] protected function OnValidate(key: Object, value: Object);

Description

Performs additional custom processes when validating the element with the specified key and value.

The default implementation of this method is intended to be overridden by a derived class to perform some action when the specified element is validated. The key of the element to validate. The value of the element to validate.

IDictionary.Add

[C#] void IDictionary.Add(object key, object value);

[C++] void IDictionary::Add(Object* key, Object* value);

[VB] Sub Add(ByVal key As Object, ByVal value As Object) Implements IDictionary.Add

[JScript] function IDictionary.Add(key: Object, value: Object);

IDictionary.Contains

[C#] bool IDictionary.Contains(object key);

[C++] bool IDictionary::Contains(Object* key);

[VB] Function Contains(ByVal key As Object) As Boolean Implements IDictionary.Contains

[JScript] function IDictionary.Contains(key: Object): Boolean;

IDictionary.Remove

[C#] void IDictionary.Remove(object key);

[C++] void IDictionary::Remove(Object* key);

[VB] Sub Remove(ByVal key As Object) Implements IDictionary.Remove

[JScript] function IDictionary.Remove(key: Object); IEnumerable.GetEnumerator

[C#] IEnumerator IEnumerable.GetEnumerator( );

[C++] IEnumerator* IEnumerable::GetEnumerator( );

[VB] Function GetEnumerator( ) As IEnumerator Implements IEnumerable.GetEnumerator

[JScript] function IEnumerable.GetEnumerator( ): IEnumerator;

DictionaryEntry structure (System.Collections)

ToString

Description

Defines a dictionary key-and-value pair that can be set or retrieved.

The System.Collections.IDictionaryEnumerator.Entry method returns an instance of this class.

DictionaryEntry

Example Syntax:

ToString

[C#] public DictionaryEntry(object key, object value);

[C++] public: DictionaryEntry(Object* key, Object* value);

[VB] Public Sub New(ByVal key As Object, ByVal value As Object)

[JScript] public function DictionaryEntry(key: Object, value: Object);

Description

Initializes an instance of the System.Collections.DictionaryEntry class with the specified key and value. The object defined in each key-and-value pair. The definition associated with key.

Key

ToString

[C#] public object Key {get; set;}

[C++] public: _property Object* get_Key( );public: _property void set_Key(Object*);

[VB] Public Property Key As Object

[JScript] public function get Key( ): Object;public function set Key(Object);

Description

Gets or sets the key in the key-and-value pair.

Value

ToString

[C#] public object Value {get; set;}

[C++] public: _property Object* get_Value( );public: _property void set_Value(Object*);

[VB] Public Property Value As Object

[JScript] public function get Value( ): Object;public function set Value(Object);

Description

Gets or sets the value in the key-and-value pair.

Hashtable class (System.Collections)

ToString

Description

Represents a collection of key-and-value pairs that are organized based on the hash code of the key.

Each element is a key-and-value pair stored in a System.Collections.DictionaryEntry object.

Hashtable

Example Syntax:

ToString

[C#] public Hashtable( );

[C++] public: Hashtable( );

[VB] Public Sub New( )

[JScript] public function Hashtable( ); Initializes a new instance of the System.Collections.Hashtable class.

Description

Creates an empty System.Collections.Hashtable with the default initial capacity and using the default load factor, the default hash code provider and the default comparer.

A hashtable's capacity is used to calculate the optimal number of hashtable buckets based on the load factor. The default initial capacity is zero. Capacity is automatically increased as required.

Hashtable

Example Syntax:

ToString

[C#] public Hashtable(IDictionary d);

[C++] public: Hashtable(IDictionary* d);

[VB] Public Sub New(ByVal d As IDictionary)

[JScript] public function Hashtable(d: IDictionary);

Description

Copies the elements from the specified dictionary to a new System.Collections.Hashtable with the same initial capacity as the number of elements copied and using the default load factor, the default hash code provider and the default comparer.

The initial capacity is set to the number of elements in the source dictionary. Capacity is automatically increased as required based on the load factor. The System.Collections.IDictionary to copy to a new System.Collections.Hashtable.

Hashtable

Example Syntax:

ToString

[C#] public Hashtable(int capacity);

[C++] public: Hashtable(int capacity);

[VB] Public Sub New(ByVal capacity As Integer)

[JScript] public function Hashtable(capacity: int);

Description

Creates an empty System.Collections.Hashtable with the specified initial capacity and using the default load factor, the default hash code provider and the default comparer.

Specifying the initial capacity eliminates the need to perform a number of resizing operations while adding elements to the System.Collections.Hashtable. Capacity is automatically increased as required based on the load factor. The approximate number of elements that the System.Collections.Hashtable can initially contain.

Hashtable

Example Syntax:

ToString

[C#] public Hashtable(IDictionary d, float loadFactor);

[C++] public: Hashtable(IDictionary* d, float loadFactor);

[VB] Public Sub New(ByVal d As IDictionary, ByVal loadFactor As Single)

[JScript] public function Hashtable(d: IDictionary, loadFactor: float);

Description

Copies the elements from the specified dictionary to a new System.Collections.Hashtable with the same initial capacity as the number of elements copied and using the specified load factor, the default hash code provider and the default comparer.

The initial capacity is set to the number of elements in the source dictionary. Capacity is automatically increased as required based on the load factor. The System.Collections.IDictionary to copy to a new System.Collections.Hashtable. A number in the range from 0.1 through 1.0 indicating the maximum ratio of elements to buckets.

Hashtable

Example Syntax:

ToString

[C#] public Hashtable(IHashCodeProvider hcp, IComparer comparer);

[C++] public: Hashtable(IHashCodeProvider* hcp, IComparer* comparer);

[VB] Public Sub New(ByVal hcp As IHashCodeProvider, ByVal comparer As IComparer)

[JScript] public function Hashtable(hcp: IHashCodeProvider, comparer: IComparer);

Description

Creates an empty System.Collections.Hashtable with the default initial capacity and using the default load factor, the specified hash code provider and the specified comparer.

A hashtable's capacity is used to calculate the optimal number of hashtable buckets based on the load factor. The default initial capacity is zero. Capacity is automatically increased as required. The System.Collections.IHashCodeProvider that supplies the hash codes for all keys in the System.Collections.Hashtable. The System.Collections.IComparer to use to determine whether two keys are equal.

Hashtable

Example Syntax:

ToString

[C#] public Hashtable(int capacity, float loadFactor);

[C++] public: Hashtable(int capacity, float loadFactor);

[VB] Public Sub New(ByVal capacity As Integer, ByVal loadFactor As Single)

[JScript] public function Hashtable(capacity: int, loadFactor: float);

Description

Creates an empty System.Collections.Hashtable with the specified initial capacity and using the specified load factor, the default hash code provider and the default comparer.

Specifying the initial capacity eliminates the need to perform a number of resizing operations while adding elements to the System.Collections.Hashtable. Capacity is automatically increased as required based on the load factor. The approximate number of elements that the System.Collections.Hashtable can initially contain. A number in the range from 0.1 through 1.0 indicating the maximum ratio of elements to buckets.

Hashtable

Example Syntax:

ToString

[C#] protected Hashtable(SerializationInfo info, StreamingContext context);

[C++] protected: Hashtable(SerializationInfo* info, StreamingContext context);

[VB] Protected Sub New(ByVal info As SerializationInfo, ByVal context As StreamingContext)

[JScript] protected function Hashtable(info: SerializationInfo, context: StreamingContext);

Hashtable

Example Syntax:

ToString

[C#] public Hashtable(IDictionary d, IHashCodeProvider hcp, IComparer comparer);

[C++] public: Hashtable(IDictionary* d, IHashCodeProvider* hcp, IComparer* comparer);

[VB] Public Sub New(ByVal d As IDictionary, ByVal hcp As IHashCodeProvider, ByVal comparer As IComparer)

[JScript] public function Hashtable(d: IDictionary, hcp: IHashCodeProvider, comparer: IComparer);

Description

Copies the elements from the specified dictionary to a new System.Collections.Hashtable with the same initial capacity as the number of elements copied and using the default load factor, the specified hash code provider and the specified comparer.

The initial capacity is set to the number of elements in the source dictionary. Capacity is automatically increased as required based on the load factor. The System.Collections.IDictionary to copy to a new System.Collections.Hashtable. The System.Collections.IHashCodeProvider that supplies the hash codes for all keys in the System.Collections.Hashtable. The System.Collections.IComparer to use to determine whether two keys are equal.

Hashtable

Example Syntax:

ToString

[C#] public Hashtable(int capacity, IHashCodeProvider hcp, IComparer comparer);

[C++] public: Hashtable(int capacity, IHashCodeProvider* hcp, IComparer* comparer);

[VB] Public Sub New(ByVal capacity As Integer, ByVal hcp As IHashCodeProvider, ByVal comparer As IComparer)

[JScript] public function Hashtable(capacity: int, hcp: IHashCodeProvider, comparer: IComparer);

Description

Creates an empty System.Collections.Hashtable with the specified initial capacity and using the default load factor, the specified hash code provider and the specified comparer.

Specifying the initial capacity eliminates the need to perform a number of resizing operations while adding elements to the System.Collections.Hashtable. Capacity is automatically increased as required based on the load factor. The approximate number of elements that the System.Collections.Hashtable can initially contain. The System.Collections.IHashCodeProvider that supplies the hash codes for all keys in the System.Collections.Hashtable. The System.Collections.IComparer to use to determine whether two keys are equal.

Hashtable

Example Syntax:

ToString

[C#] public Hashtable(IDictionary d, float loadFactor, IHashCodeProvider hcp, IComparer comparer);

[C++] public: Hashtable(IDictionary* d, float loadFactor, IHashCodeProvider* hcp, IComparer* comparer);

[VB] Public Sub New(ByVal d As IDictionary, ByVal loadFactor As Single, ByVal hcp As IHashCodeProvider, ByVal comparer As IComparer)

[JScript] public function Hashtable(d: IDictionary, loadFactor: float, hcp: IHashCodeProvider, comparer: IComparer);

Description

Copies the elements from the specified dictionary to a new System.Collections.Hashtable with the same initial capacity as the number of elements copied and using the specified load factor, the specified hash code provider and the specified comparer.

The initial capacity is set to the number of elements in the source dictionary. Capacity is automatically increased as required based on the load factor. The System.Collections.IDictionary to copy to a new System.Collections.Hashtable. A number in the range from 0.1 through 1.0 indicating the maximum ratio of elements to buckets. The System.Collections.IHashCodeProvider that supplies the hash codes for all keys in the System.Collections.Hashtable. The System.Collections.IComparer to use to determine whether two keys are equal.

Hashtable

Example Syntax:

ToString

[C#] public Hashtable(int capacity, float loadFactor, IHashCodeProvider hcp, IComparer comparer);

[C++] public: Hashtable(int capacity, float loadFactor, IHashCodeProvider* hcp, IComparer* comparer);

[VB] Public Sub New(ByVal capacity As Integer, ByVal loadFactor As Single, ByVal hcp As IHashCodeProvider, ByVal comparer As IComparer)

[JScript] public function Hashtable(capacity: int, loadFactor: float, hcp: IHashCodeProvider, comparer: IComparer);

Description

Creates an empty System.Collections.Hashtable with the specified initial capacity and using the specified load factor, the specified hash code provider and the specified comparer.

Specifying the initial capacity eliminates the need to perform a number of resizing operations while adding elements to the System.Collections.Hashtable. Capacity is automatically increased as required based on the load factor. The approximate number of elements that the System.Collections.Hashtable can initially contain. A number in the range from 0.1 through 1.0 indicating the maximum ratio of elements to buckets. The System.Collections.IHashCodeProvider that supplies the hash codes for all keys in the System.Collections.Hashtable. The System.Collections.IComparer to use to determine whether two keys are equal.

comparer

ToString

[C#] protected IComparer comparer {get; set;}

[C++] protected: _property IComparer* get_comparer( );protected: _property void set_comparer(IComparer*);

[VB] Protected Property comparer As IComparer

[JScript] protected function get comparer( ): IComparer;protected function set comparer(IComparer);

Description

Gets or sets the comparer to use for the System.Collections.Hashtable

Count

ToString

[C#] public virtual int Count {get;}

[C++] public: _property virtual int get_Count( );

[VB] Overridable Public ReadOnly Property Count As Integer

[JScript] public function get Count( ): int;

Description

Gets the number of key-and-value pairs contained in the System.Collections.Hashtable.

hcp

ToString

[C#] protected IHashCodeProvider hcp {get; set;}

[C++] protected: _property IHashCodeProvider* get_hcp( );protected: _property void set_hcp(IHashCodeProvider*);

[VB] Protected Property hcp As IHashCodeProvider

[JScript] protected function get hcp( ): IHashCodeProvider; protected function set hcp(IHashCodeProvider);

Description

Gets or sets the object that can dispense hash codes.

IsFixedSize

ToString

[C#] public virtual bool IsFixedSize {get;}

[C++] public: _property virtual bool get_IsFixedSize( );

[VB] Overridable Public ReadOnly Property IsFixedSize As Boolean

[JScript] public function get IsFixedSize( ): Boolean;

Description

Gets a value indicating whether the System.Collections.Hashtable has a fixed size.

A collection with a fixed size does not allow the addition or removal of elements, but it allows the modification of existing elements.

IsReadOnly

ToString

[C#] public virtual bool IsReadOnly {get;}

[C++] public: _property virtual bool get_IsReadOnly( );

[VB] Overridable Public ReadOnly Property IsReadOnly As Boolean

[JScript] public function get IsReadOnly( ): Boolean;

Description

Gets a value indicating whether the System.Collections.Hashtable is read-only.

IsSynchronized

ToString

[C#] public virtual bool IsSynchronized {get;}

[C++] public: _property virtual bool get_IsSynchronized( );

[VB] Overridable Public ReadOnly Property IsSynchronized As Boolean

[JScript] public function get IsSynchronized( ): Boolean;

Description

Gets a value indicating whether access to the System.Collections.Hashtable is synchronized (thread-safe).

A System.Collections.Hashtable can safely support one writer and multiple readers concurrently. To support multiple writers, all operations must be done through the wrapper returned by the System.Collections.Hashtable.Synchronized (System.Collections.Hashtable) method.

Item

ToString

[C#] public virtual object this[object key] {get; set;}

[C++] public: _property virtual Object* get_Item(Object* key);public: _property virtual void set_Item(Object* key, Object*);

[VB] Overridable Public Default Property Item(ByVal key As Object) As Object

[JScript] returnValue=HashtableObject.Item(key); HashtableObject.Item(key)=returnValue;

Description

Gets or sets the value associated with the specified key.

This property provides the ability to access a specific element in the collection by using the following syntax: my Collection[key]. The key whose value to get or set.

Keys

ToString

[C#] public virtual ICollection Keys {get;}

[C++] public: _property virtual ICollection* get_Keys( );

[VB] Overridable Public ReadOnly Property Keys As ICollection

[JScript] public function get Keys( ): ICollection;

Description

Gets an System.Collections.ICollection containing the keys in the System.Collections.Hashtable.

The order of the keys in the System.Collections.ICollection is unspecified, but it is the same order as the associated values in the System.Collections.ICollection returned by the System.Collections.Hashtable.Values method.

SyncRoot

ToString

[C#] public virtual object SyncRoot {get;}

[C++] public: _property virtual Object* get_SyncRoot( );

[VB] Overridable Public ReadOnly Property SyncRoot As Object

[JScript] public function get SyncRoot( ): Object;

Description

Gets an object that can be used to synchronize access to the System.Collections.Hashtable.

To create a synchronized version of the System.Collections.Hashtable, use the System.Collections.Hashtable.Synchronized(System.Collections.Hashtable) method. However, derived classes can provide their own synchronized version of the System.Collections.Hashtable using the System.Collections.Hashtable.SyncRoot property. The synchronizing code must perform operations on the System.Collections.Hashtable.SyncRoot of the System.

Collections.Hashtable, not directly on the System.Collections.Hashtable. This ensures proper operation of collections that are derived from other objects. Specifically, it maintains proper synchronization with other threads that might be simultaneously modifying the System.Collections.Hashtable object.

Values

ToString

[C#] public virtual ICollection Values {get;}

[C++] public: _property virtual ICollection* get_Values( );

[VB] Overridable Public ReadOnly Property Values As ICollection

[JScript] public function get Values( ): ICollection;

Description

Gets an System.Collections.ICollection containing the values in the System.Collections.Hashtable.

The order of the values in the System.Collections.ICollection is unspecified, but it is the same order as the associated keys in the System.Collections.ICollection returned by the System.Collections.Hashtable.Keys method.

Add

[C#] public virtual void Add(object key, object value);

[C++] public: virtual void Add(Object* key, Object* value);

[VB] Overridable Public Sub Add(ByVal key As Object, ByVal value As Object)

[JScript] public function Add(key: Object, value: Object);

Description

Adds an element with the specified key and value into the System.Collections.Hashtable.

An object that has no correlation between its state and its hash code value should typically not be used as the key. For example, String objects are better than StringBuilder objects for use as keys. The key of the element to add. The value of the element to add.

Clear

[C#] public virtual void Clear( );

[C++] public: virtual void Clear( );

[VB] Overridable Public Sub Clear( )

[JScript] public function Clear( );

Description

Removes all elements from the System.Collections.Hashtable.

System.Collections.Hashtable.Count is set to zero.

Clone

[C#] public virtual object Clone( );

[C++] public: virtual Object* Clone( );

[VB] Overridable Public Function Clone( ) As Object

[JScript] public function Clone( ): Object;

Description

Creates a shallow copy of the System.Collections.Hashtable.

Return Value: A shallow copy of the System.Collections.Hashtable.

A shallow copy of a collection is a new collection containing references to the same elements as the original collection. The elements themselves or anything referenced by the elements are not copied. In contrast, a deep copy of a collection copies the elements and everything directly or indirectly referenced by the elements.

Contains

[C#] public virtual bool Contains(object key);

[C++] public: virtual bool Contains(Object* key);

[VB] Overridable Public Function Contains(ByVal key As Object) As Boolean

[JScript] public function Contains(key: Object): Boolean;

Description

Determines whether the System.Collections.Hashtable contains a specific key.

Return Value: true if the System.Collections.Hashtable contains an element with the specified key; otherwise, false.

This implementation is close to O(1) in most cases. The key to locate in the System.Collections.Hashtable.

ContainsKey

[C#] public virtual bool ContainsKey(object key);

[C++] public: virtual bool ContainsKey(Object* key);

[VB] Overridable Public Function ContainsKey(ByVal key As Object) As Boolean

[JScript] public function ContainsKey(key: Object): Boolean;

Description

Determines whether the System.Collections.Hashtable contains a specific key.

Return Value: true if the System.Collections.Hashtable contains an element with the specified key; otherwise, false.

This implementation is close to O(1) in most cases. The key to locate in the System.Collections.Hashtable.

ContainsValue

[C#] public virtual bool ContainsValue(object value);

[C++] public: virtual bool ContainsValue(Object* value);

[VB] Overridable Public Function ContainsValue(ByVal value As Object) As Boolean

[JScript] public function ContainsValue(value: Object): Boolean;

Description

Determines whether the System.Collections.Hashtable contains a specific value.

Return Value: true if the System.Collections.Hashtable contains an element with the specified value; otherwise, false.

This method performs a linear search; therefore, the average execution time is proportional to System.Collections.Hashtable.Count. That is, this method is an O(n) operation, where n is System.Collections.Hashtable.Count. The value to locate in the System.Collections.Hashtable.

CopyTo

[C#] public virtual void CopyTo(Array array, int arrayIndex);

[C++] public: virtual void CopyTo(Array* array, int arrayIndex);

[VB] Overridable Public Sub CopyTo(ByVal array As Array, ByVal arrayIndex As Integer)

[JScript] public function CopyTo(array: Array, arrayIndex: int);

Description

Copies the System.Collections.Hashtable elements to a one-dimensional System.Array instance at the specified index.

The elements are copied to the System.Array in the same order in which the enumerator iterates through the System.Collections.Hashtable. The one-dimensional System.Array that is the destination of the System.Collections.DictionaryEntry objects copied from System.Collections.Hashtable. The System.Array must have zero-based indexing. The zero-based index in array at which copying begins.

GetEnumerator

[C#] public virtual IDictionaryEnumerator GetEnumerator( );

[C++] public: virtual IDictionaryEnumerator* GetEnumerator( );

[VB] Overridable Public Function GetEnumerator( ) As IDictionaryEnumerator

[JScript] public function GetEnumerator( ): IDictionaryEnumerator;

Description

Returns an enumerator that can iterate through the System.Collections.Hashtable.

Return Value: An System.Collections.IDictionaryEnumerator for the System.Collections.Hashtable.

Enumerators are intended to be used only to read data in the collection. Enumerators cannot be used to modify the underlying collection.

GetHash

[C#] protected virtual int GetHash(object key);

[C++] protected: virtual int GetHash(Object* key);

[VB] Overridable Protected Function GetHash(ByVal key As Object) As Integer

[JScript] protected function GetHash(key: Object): int;

Description

Returns the hash code for the specified key.

Return Value: The hash code for key.

If the hashtable was created with a specific System.Collections.IHashCodeProvider implementation, this method uses that hash code provider; otherwise, it uses the System.Object.GetHashCode implementation of key. The System.Object for which a hash code is to be returned.

GetObjectData

[C#] public virtual void GetObjectData(SerializationInfo info, StreamingContext context);

[C++] public: virtual void GetObjectData(SerializationInfo* info, StreamingContext context);

[VB] Overridable Public Sub GetObjectData(ByVal info As SerializationInfo, ByVal context As StreamingContext)

[JScript] public function GetObjectData(info: SerializationInfo, context: StreamingContext);

Description

Implements the System.Runtime.Serialization.ISerializable interface and returns the data needed to serialize the System.Collections.Hashtable. A System.Runtime.Serialization.SerializationInfo object containing the information required to serialize the System.Collections.Hashtable. A System.Runtime.Serialization.StreamingContext object containing the source and destination of the serialized stream associated with the System.Collections.Hashtable.

KeyEquals

[C#] protected virtual bool KeyEquals(object item, object key);

[C++] protected: virtual bool KeyEquals(Object* item, Object* key);

[VB] Overridable Protected Function KeyEquals(ByVal item As Object, ByVal key As Object) As Boolean

[JScript] protected function KeyEquals(item: Object, key: Object): Boolean;

Description

Compares a specific System.Object with a specific key in the System.Collections.Hashtable.

Return Value: true if item and key are equal; otherwise, false.

If the hashtable was created with a specific System.Collections.IComparer implementation, this method uses that comparer; that is, System.Collections.IComparer.Compare(System.Object,System.Object) (item, key). Otherwise, it uses item.Equals(key). The System.Object to compare with key. The key in the System.Collections.Hashtable to compare with item.

OnDeserialization

[C#] public virtual void OnDeserialization(object sender);

[C++] public: virtual void OnDeserialization(Object* sender);

[VB] Overridable Public Sub OnDeserialization(ByVal sender As Object)

[JScript] public function OnDeserialization(sender: Object);

Description

Implements the System.Runtime.Serialization.ISerializable interface and raises the deserialization event when the deserialization is complete. The source of the deserialization event.

Remove

[C#] public virtual void Remove(object key);

[C++] public: virtual void Remove(Object* key);

[VB] Overridable Public Sub Remove(ByVal key As Object)

[JScript] public function Remove(key: Object);

Description

Removes the element with the specified key from the System.Collections.Hashtable.

If the System.Collections.Hashtable does not contain an element with the specified key, the System.Collections.Hashtable remains unchanged. No exception is thrown. The key of the element to remove.

Synchronized

[C#] public static Hashtable Synchronized(Hashtable table);

[C++] public: static Hashtable* Synchronized(Hashtable* table);

[VB] Public Shared Function Synchronized(ByVal table As Hashtable) As Hashtable

[JScript] public static function Synchronized(table: Hashtable): Hashtable;

Description

Returns a synchronized (thread-safe) wrapper for the System.Collections.Hashtable.

Return Value: A synchronized (thread-safe) wrapper for the System.Collections.Hashtable.

A System.Collections.Hashtable can safely support one writer and multiple readers concurrently. To support multiple writers, all operations must be done through this wrapper only. The System.Collections.Hashtable to synchronize.

IEnumerable.GetEnumerator

[C#] IEnumerator IEnumerable.GetEnumerator( );

[C++] IEnumerator* IEnumerable::GetEnumerator( );

[VB] Function GetEnumerator( ) As IEnumerator Implements IEnumerable.GetEnumerator

[JScript] function IEnumerable.GetEnumerator( ): IEnumerator;

ICollection interface (System.Collections)

ToString

Description

Defines size, enumerators and synchronization methods for all collections.

The System.Collections.ICollection interface is the base interface for classes in the System.Collections namespace.

Count

ToString

[C#] int Count {get;}

[C++] int get_Count( );

[VB] ReadOnly Property Count As Integer

[JScript] abstract function get Count( ): int;

Description

When implemented by a class, gets the number of elements contained in the System.Collections.ICollection.

IsSynchronized

ToString

[C#] bool IsSynchronized {get;}

[C++] bool get_IsSynchronized( );

[VB] ReadOnly Property IsSynchronized As Boolean

[JScript] abstract function get IsSynchronized( ): Boolean;

Description

When implemented by a class, gets a value indicating whether access to the System.Collections.ICollection is synchronized (thread-safe).

System.Collections.ICollection.SyncRoot returns an object, which can be used to synchronize access to the System.Collections.ICollection.

SyncRoot

ToString

[C#] object SyncRoot {get;}

[C++] Object* get_SyncRoot( );

[VB] ReadOnly Property SyncRoot As Object

[JScript] abstract function get SyncRoot( ): Object;

Description

When implemented by a class, gets an object that can be used to synchronize access to the System.Collections.ICollection.

For collections whose underlying store is not publicly available, the expected implementation is to return the current instance. Note that the pointer to the current instance might not be sufficient for collections that wrap other collections; those should return the underlying collection's SyncRoot property.

CopyTo

[C#] void CopyTo(Array array, int index);

[C++] void CopyTo(Array* array, int index);

[VB] Sub CopyTo(ByVal array As Array, ByVal index As Integer)

[JScript] function CopyTo(array: Array, index: int);

Description

When implemented by a class, copies the elements of the System.Collections.ICollection to an System.Array, starting at a particular System.Array index. The one-dimensional System.Array that is the destination of the elements copied from System.Collections.ICollection. The System.Array must have zero-based indexing. The zero-based index in array at which copying begins.

IComparer interface (System.Collections)

CopyTo

Description

Exposes a method that compares two objects.

This interface is used in conjunction with the System.Array.Sort(System.Array) and System.Array.BinarySearch (System.Array,System.Object) methods. It provides a way to customize the sort order of a collection.

Compare

[C#] int Compare(object x, object y);

[C++] int Compare(Object* x, Object* y);

[VB] Function Compare(ByVal x As Object, ByVal y As Object) As Integer

[JScript] function Compare(x: Object, y: Object): int;

Description

Compares two objects and returns a value indicating whether one is less than, equal to or greater than the other.

Return Value: Value Condition Less than zero x is less than y.

The preferred implementation is to use the System.IComparable.CompareTo(System.Object) method of one of the parameters. First object to compare. Second object to compare.

IDictionary interface (System.Collections)

Compare

Description

Represents a collection of key-and-value pairs.

The System.Collections.IDictionary class is the base interface for collections of key-and-value pairs.

IsFixedSize

Compare

[C#] bool IsFixedSize {get;}

[C++] bool get_IsFixedSize( );

[VB] ReadOnly Property IsFixedSize As Boolean

[JScript] abstract function get IsFixedSize( ): Boolean;

Description

When implemented by a class, gets a value indicating whether the System.Collections.IDictionary has a fixed size.

A collection with a fixed size does not allow the addition or removal of elements, but it allows the modification of existing elements.

IsReadOnly

Compare

[C#] bool IsReadOnly {get;}

[C++] bool get_IsReadOnly( );

[VB] ReadOnly Property IsReadOnly As Boolean

[JScript] abstract function get IsReadOnly( ): Boolean;

Description

When implemented by a class, gets a value indicating whether the System.Collections.IDictionary is read-only.

Item

Compare

[C#] object this[object key] {get; set;}

[C++] Object* get_Item(Object* key); void set_Item(Object* key, Object*);

[VB] Default Property Item(ByVal key As Object) As Object

[JScript] abstract returnValue=IDictionaryObject.Item(key); IDictionaryObject.Item(key)=returnValue;

Description

When implemented by a class, gets or sets the element with the specified key.

This property provides the ability to access a specific element in the collection by using the following syntax: my Collection[key]. The key of the element to get or set.

Keys

Compare

[C#] ICollection Keys {get;}

[C++] ICollection* get_Keys( );

[VB] ReadOnly Property Keys As ICollection

[JScript] abstract function get Keys( ): ICollection;

Description

When implemented by a class, gets an System.Collections.ICollection containing the keys of the System.Collections.IDictionary.

The order of the keys in the returned System.Collections.ICollection is unspecified, but it is guaranteed to be the same order as the corresponding values in the System.Collections.ICollection returned by the System.Collections.IDictionary.Values method.

Values

Compare

[C#] ICollection Values {get;}

[C++] ICollection* get_Values( );

[VB] ReadOnly Property Values As ICollection
[JScript] abstract function get Values( ): ICollection;

Description

When implemented by a class, gets an System.Collections.ICollection containing the values in the System.Collections.IDictionary.

The order of the values in the returned System.Collections.ICollection is unspecified, but it is guaranteed to be the same order as the corresponding keys in the System.Collections.ICollection returned by the System.Collections.IDictionary.Keys method.

Add

[C#] void Add(object key, object value);
[C++] void Add(Object* key, Object* value);
[VB] Sub Add(ByVal key As Object, ByVal value As Object)
[JScript] function Add(key: Object, value: Object);

Description

When implemented by a class, adds an element with the provided key and value to the System.Collections.IDictionary.

The System.Collections.IDictionary.Item(System.Object) property can also be used to add new elements by setting the value of a key that does not exist in the dictionary. For example: myCollection["myNonexistentKey"]=myValue. However, if the specified key already exists in the dictionary, setting the System.Collections.IDictionary.Item(System.Object) property overwrites the old value. In contrast, the System.Collections.IDictionary.Add(System.Object, System.Object) method does not modify existing elements. The System.Object to use as the key of the element to add. The System.Object to use as the value of the element to add.

Clear

[C#] void Clear( );
[C++] void Clear( );
[VB] Sub Clear( )
[JScript] function Clear( );

Description

When implemented by a class, removes all elements from the System.Collections.IDictionary.

Contains

[C#] bool Contains(object key);
[C++] bool Contains(Object* key);
[VB] Function Contains(ByVal key As Object) As Boolean
[JScript] function Contains(key: Object): Boolean;

Description

When implemented by a class, determines whether the System.Collections.IDictionary contains an element with the specified key.

Return Value: true if the System.Collections.IDictionary contains an element with the key; otherwise, false. The key to locate in the System.Collections.IDictionary.

GetEnumerator

[C#] IDictionaryEnumerator GetEnumerator( ); II [C++] IDictionaryEnumerator* GetEnumerator( );
[VB] Function GetEnumerator( ) As IDictionaryEnumerator
[JScript] function GetEnumerator( ): IDictionaryEnumerator;

Description

When implemented by a class, returns an System.Collections.IDictionaryEnumerator for the System.Collections.IDictionary.

Return Value: An System.Collections.IDictionaryEnumerator for the System.Collections.IDictionary Enumerators are intended to be used only to read data in the collection. Enumerators cannot be used to modify the underlying collection.

Remove

[C#] void Remove(object key);
[C++] void Remove(Object* key);
[VB] Sub Remove(ByVal key As Object)
[JScript] function Remove(key: Object);

Description

When implemented by a class, removes the element with the specified key from the System.Collections.IDictionary.

In collections such as lists, queues and stacks, the elements that follow the removed element move up to occupy the vacated spot. The key of the element to remove.

IDictionaryEnumerator interface (System.Collections)

Remove

Description

Enumerates the elements of a dictionary.

Enumerators are intended to be used only to read data in the collection. Enumerators cannot be used to modify the underlying collection.

Entry

Remove

[C#] DictionaryEntry Entry {get;}
[C++] DictionaryEntry get_Entry( );
[VB] ReadOnly Property Entry As DictionaryEntry
[JScript] abstract function get Entry( ): DictionaryEntry;

Description

When implemented by a class, gets both the key and the value of the current dictionary entry.

After an enumerator is created or after a System.Collections.IEnumerator.Reset, System.Collections.IEnumerator.MoveNext must be called to advance the enumerator to the first element of the collection before reading the value of System.Collections.IDictionaryEnumerator.Entry; otherwise, System.Collections.IDictionaryEnumerator.Entry is undefined.

Key

Remove

[C#] object Key {get;}
[C++] Object* get_Key( );
[VB] ReadOnly Property Key As Object
[JScript] abstract function get Key( ): Object;

Description

When implemented by a class, gets the key of the current dictionary entry.

After an enumerator is created or after a System.Collections.IEnumerator.Reset, System.Collections.IEnumerator.MoveNext must be called to advance the enumerator to the first element of the collection before reading the value of System.Collections.IDictionaryEnumerator.Key; otherwise, System.Collections.IDictionaryEnumerator.Key is undefined.

Value

Remove

[C#] object Value {get;}
[C++] Object* get_Value( );
[VB] ReadOnly Property Value As Object
[JScript] abstract function get Value( ): Object;

Description

When implemented by a class, gets the value of the current dictionary entry.

After an enumerator is created or after a System.Collections.IEnumerator.Reset, System.Collections.IEnumerator.MoveNext must be called to advance the enumerator to the first element of the collection before reading the value of System.Collections.IDictionaryEnumerator.Value; otherwise, System.Collections.IDictionaryEnumerator.Value is undefined.

IEnumerable interface (System.Collections)

Remove

Description

Exposes the enumerator, which supports a simple iteration over a collection.

System.Collections.IEnumerable must be implemented to support the For Each semantics of Microsoft Visual Basic. COM classes that allow enumerators also implement this interface.

GetEnumerator

[C#+] Enumerator GetEnumerator( );

[C++] IEnumerator* GetEnumerator( );

[VB] Function GetEnumerator( ) As IEnumerator

[JScript] function GetEnumerator( ): IEnumerator;

Description

Returns an enumerator that can iterate through a collection.

Return Value: An System.Collections.IEnumerator that can be used to iterate through the collection.

Enumerators are intended to be used only to read data in the collection. Enumerators cannot be used to modify the underlying collection.

IEnumerator interface (System.Collections)

GetEnumerator

Description

Supports a simple iteration over a collection.

System.Collections.IEnumerator is the base interface for all enumerators.

Current

GetEnumerator

[C#] object Current {get;}

[C++] Object* get_Current( );

[VB] ReadOnly Property Current As Object

[JScript] abstract function get Current( ): Object;

Description

Gets the current element in the collection.

After an enumerator is created or after a System.Collections.IEnumerator.Reset, System.Collections.IEnumerator.MoveNext must be called to advance the enumerator to the first element of the collection before reading the value of System.Collections.IEnumerator.Current; otherwise, System.Collections.IEnumerator.Current is undefined.

MoveNext

[C#] bool MoveNext( );

[C++] bool MoveNext( );

[VB] Function MoveNext( ) As Boolean

[JScript] function MoveNext( ): Boolean;

Advances the enumerator to the next element of the collection.

Return Value: true if the enumerator was successfully advanced to the next element; false if the enumerator has passed the end of the collection.

After an enumerator is created or after a call to System.Collections.IEnumerator.Reset, an enumerator is positioned before the first element of the collection, and the first call to System.Collections.IEnumerator.MoveNext moves the enumerator over the first element of the collection.

Reset

[C#] void Reset( );

[C++] void Reset( );

[VB] Sub Reset( )

[JScript] function Reset( );

Description

Sets the enumerator to its initial position, which is before the first element in the collection.

All calls to System.Collections.IEnumerator.Reset must result in the same state for the enumerator. This may involve taking a new snapshot of the collection or moving to the beginning of the collection.

IHashCodeProvider interface (System.Collections)

Reset

Description

Supplies a hash code for an object, using a custom hash function.

The System.Collections.IHashCodeProvider interface is used in conjunction with System.Collections.Hashtable. The objects used as keys by a System.Collections.Hashtable must implement or inherit the System.Object.GetHashCode and System.Object.Equals(System.Object) methods. However, if the System.Collections.Hashtable constructor is passed a reference to an object that implements both the System.Collections.IHashCodeProvider interface and the System.Collections.IComparer interface, then System.Collections.IHashCodeProvider.GetHashCode(System.Object) and System.Collections.IComparer.Compare (System.Object,System.Object) can be used instead.

GetHashCode

[C#] int GetHashCode(object obj);

[C++] int GetHashCode(Object* obj);

[VB] Function GetHashCode(ByVal obj As Object) As Integer

[JScript] function GetHashCode(obj: Object): int;

Description

Returns a hash code for the specified object.

Return Value: A hash code for the specified object.

The return value from this method must not be persisted for two reasons. First, the hash function of a class might be altered to generate a better distribution, rendering any values from the old hash function useless. Second, the default implementation of this class does not guarantee that the same value will be returned by different instances. The System.Object for which a hash code is to be returned.

IList interface (System.Collections)

GetHashCode

Description

Represents a collection of objects that can be individually accessed by index.

System.Collections.IList is a descendant of the Is System.Collections.ICollection interface and is the base interface of all lists.

IsFixedSize

GetHashCode

[C#] bool IsFixedSize {get;}

[C++] bool get_IsFixedSize( );

[VB] ReadOnly Property IsFixedSize As Boolean

[JScript] abstract function get IsFixedSize( ): Boolean;

Description

When implemented by a class, gets a value indicating whether the System.Collections.IList has a fixed size.

A collection with a fixed size does not allow the addition or removal of elements, but it allows the modification of existing elements.

IsReadOnly

GetHashCode

[C#] bool IsReadOnly {get;}

[C++] bool get_IsReadOnly( );

[VB] ReadOnly Property IsReadOnly As Boolean

[JScript] abstract function get IsReadOnly( ): Boolean;

Description

When implemented by a class, gets a value indicating whether the System.Collections.IList is read-only.

Item

GetHashCode

[C#] object this[int index] {get; set;}

[C++] Object* get_Item(int index); void set_Item(int index, Object*);

[VB] Default Property Item(ByVal index As Integer) As Object

[JScript] abstract returnValue=IListObject.Item(index); IListObject.Item(index)=returnValue;

Description

When implemented by a class, gets or sets the element at the specified index.

This property provides the ability to access a specific element in the collection by using the following syntax: my Collection[index]. The zero-based index of the element to get or set.

Add

[C#] int Add(object value);

[C++] int Add(Object* value);

[VB] Function Add(ByVal value As Object) As Integer

[JScript] function Add(value: Object): int;

Description

When implemented by a class, adds an item to the System.Collections.IList.

Return Value: The position into which the new element was inserted. The System.Object to add to the System.Collections.IList.

Clear

[C#] void Clear( );

[C++] void Clear( );

[VB] Sub Clear( )

[JScript] function Clear( );

Description

When implemented by a class, removes all items from the System.Collections.IList.

Contains

[C#] bool Contains(object value);

[C++] bool Contains(Object* value);

[VB] Function Contains(ByVal value As Object) As Boolean

[JScript] function Contains(value: Object): Boolean;

Description

When implemented by a class, determines whether the System.Collections.IList contains a specific value.

Return Value: true if the System.Object is found in the System.Collections.IList; otherwise, false. The System.Object to locate in the System.Collections.IList.

IndexOf

[C#] int IndexOf(object value);

[C++] int IndexOf(Object* value);

[VB] Function IndexOf(ByVal value As Object) As Integer

[JScript] function IndexOf(value: Object): int;

Description

When implemented by a class, determines the index of a specific item in the System.Collections.IList.

Return Value: The index of value if found in the list; otherwise, −1. The System.Object to locate in the System.Collections.IList.

Insert

[C#] void Insert(int index, object value);

[C++] void Insert(int index, Object* value);

VB] Sub Insert(ByVal index As Integer, ByVal value As Object)

[JScript] function Insert(index: int, value: Object);

Description

When implemented by a class, inserts an item to the System.Collections.IList at the specified position.

If index equals the number of items in the System.Collections.IList, then value is appended to the end. The zero-based index at which value should be inserted. The System.Object to insert into the System.Collections.IList.

Remove

[C#] void Remove(object value);

[C++] void Remove(Object* value);

[VB] Sub Remove(ByVal value As Object)

[JScript] function Remove(value: Object);

Description

When implemented by a class, removes the first occurrence of a specific object from the System.Collections.IList.

In collections such as lists, queues and stacks, the elements that follow the removed element move up to occupy the vacated spot. The System.Object to remove from the System.Collections.IList.

RemoveAt

[C#] void RemoveAt(int index);

[C++] void RemoveAt(int index);

[VB] Sub RemoveAt(ByVal index As Integer)

[JScript] function RemoveAt(index: int);

Description

When implemented by a class, removes the System.Collections.IList item at the specified index.

In collections such as lists, queues and stacks, the elements that follow the removed element move up to occupy the vacated spot. The zero-based index of the item to remove.

Queue class (System.Collections)

RemoveAt

Description

Represents a first-in, first-out collection of objects.

Queues are useful for storing messages in the order they were received for sequential processing. This class implements a queue as a circular array. Objects stored in a System.Collections.Queue are inserted at one end and removed from the other. If the number of elements added to the System.Collections.Queue reaches the current capacity, the capacity is automatically increased to accommodate more elements. The capacity can be decreased by calling System.Collections.Queue.TrimToSize.

Queue

Example Syntax:

RemoveAt

[C#] public Queue( );

[C++] public: Queue( );

[VB] Public Sub New( )

[JScript] public function Queue( ); Initializes a new instance of the System.Collections.Queue class.

Description

Initializes a new instance of the System.Collections.Queue class that is empty, has the default initial capacity and uses the default growth factor.

The initial capacity is the starting capacity of the new System.Collections.Queue. The growth factor is the number by which the current capacity is multiplied when a greater capacity is required. The default initial capacity is 32 and the default growth factor is 2.0.

Queue

Example Syntax:

RemoveAt

[C#] public Queue(ICollection col);

[C++] public: Queue(ICollection* col);

[VB] Public Sub New(ByVal col As ICollection)
[JScript] public function Queue(col: ICollection);

Description

Initializes a new instance of the System.Collections.Queue class that contains elements copied from the specified collection, has the same initial capacity as the number of elements copied and uses the default growth factor.

The initial capacity is the starting capacity of the new System.Collections.Queue. The growth factor is the number by which the current capacity is multiplied when a greater capacity is required. The default initial capacity is 32 and the default growth factor is 2.0. The System.Collections.ICollection to copy elements from.

Queue

Example Syntax:

RemoveAt

[C#] public Queue(int capacity);
[C++] public: Queue(int capacity);
[VB] Public Sub New(ByVal capacity As Integer)
[JScript] public function Queue(capacity: int);

Description

Initializes a new instance of the System.Collections.Queue class that is empty, has the specified initial capacity and uses the default growth factor.

The initial capacity is the starting capacity of the new System.Collections.Queue. The growth factor is the number by which the current capacity is multiplied when a greater capacity is required. The default initial capacity is 32 and the default growth factor is 2.0. The initial number of elements that the System.Collections.Queue can contain.

Queue

Example Syntax:

RemoveAt

[C#] public Queue(int capacity, float growFactor);
[C++] public: Queue(int capacity, float growFactor);
[VB] Public Sub New(ByVal capacity As Integer, ByVal growFactor As Single)
[JScript] public function Queue(capacity: int, growFactor: float);

Description

Initializes a new instance of the System.Collections.Queue class that is empty, has the specified initial capacity and uses the specified growth factor.

The initial capacity is the starting capacity of the new System.Collections.Queue. The growth factor is the number by which the current capacity is multiplied when a greater capacity is required. The default initial capacity is 32 and the default growth factor is 2.0. The initial number of elements that the System.Collections.Queue can contain. The factor by which the capacity of the System.Collections.Queue is expanded.

Count

RemoveAt

[C#] public virtual int Count {get;}
[C++] public: _property virtual int get_Count( );
[VB] Overridable Public ReadOnly Property Count As Integer
[JScript] public function get Count( ): int;

Description

Gets the number of elements contained in the System.Collections.Queue System.Collections.Queue.Count is the number of elements that are actually in the System.Collections.Queue. The capacity of a System.Collections.Queue is the number of elements that the System.Collections.Queue is capable of storing.

IsSynchronized

RemoveAt

[C#] public virtual bool IsSynchronized {get;}
[C++] public: _property virtual bool get_IsSynchronized( );
[VB] Overridable Public ReadOnly Property IsSynchronized As Boolean
[JScript] public function get IsSynchronized( ): Boolean;

Description

Gets a value indicating whether access to the System.Collections.Queue is synchronized (thread-safe).

To guarantee the thread safety of the System.Collections.Queue, all operations must be done through the wrapper returned by the System.Collections.Queue.Synchronized (System.Collections.Queue) method.

SyncRoot

RemoveAt

[C#] public virtual object SyncRoot {get;}
[C++] public: _property virtual Object* get_SyncRoot( );
[VB] Overridable Public ReadOnly Property SyncRoot As Object
[JScript] public function get SyncRoot( ): Object;

Description

Gets an object that can be used to synchronize access to the System.Collections.Queue.

To create a synchronized version of the System.Collections.Queue, use the System.Collections.Queue.Synchronized(System.Collections.Queue) method. However, derived classes can provide their own synchronized version of the System.Collections.Queue using the System.Collections. Queue.SyncRoot property. The synchronizing code must perform operations on the System.Collections.Queue.SyncRoot of the System.Collections.Queue, not directly on the System.Collections.Queue. This ensures proper operation of collections that are derived from other objects. Specifically, it maintains proper synchronization with other threads that might be simultaneously modifying the System.Collections.Queue object.

Clear

[C#] public virtual void Clear( );
[C++] public: virtual void Clear( );
[VB] Overridable Public Sub Clear( )
[JScript] public function Clear( );

Description

Removes all objects from the System.Collections.Queue.

System.Collections.Queue.Count is set to zero. To reset the capacity of the System.Collections.Queue, call System.Collections.Queue.TrimToSize Trimming an empty System.Collections.Queue sets the capacity of the System.Collections.Queue to the default capacity, not zero.

Clone

[C#] public virtual object Clone( );
[C++] public: virtual Object* Clone( );
[VB] Overridable Public Function Clone( ) As Object
[JScript] public function Clone( ): Object;

Description

Creates a shallow copy of the System.Collections.Queue.

Return Value: A shallow copy of the System.Collections.Queue.

A shallow copy of a collection is a new collection containing references to the same elements as the original collection. The elements themselves or anything referenced by the elements are not copied. In contrast, a deep copy of a collection copies the elements and everything directly or indirectly referenced by the elements.

Contains

[C#] public virtual bool Contains(object obj);
[C++] public: virtual bool Contains(Object* obi);

[VB] Overridable Public Function Contains(ByVal obj As Object) As Boolean
[JScript] public function Contains(obj: Object): Boolean;

Description

Determines whether an element is in the System.Collections.Queue

Return Value: true if obj is found in the System.Collections.Queue; otherwise, false.

This method performs a linear search; therefore, the average execution time proportional to System.Collections.Queue.Count. That is, this method is an O(n) operation, where n is System.Collections.Queue.Count. The System.Object to locate in the System.Collections.Queue. The element to locate can be null.

CopyTo

[C#] public virtual void CopyTo(Array array, int index);
[C++] public: virtual void CopyTo(Array* array, int index);
[VB] Overridable Public Sub CopyTo(ByVal array As Array, ByVal index As Integer)
[JScript] public function CopyTo(array: Array, index: int);

Description

Copies the System.Collections.Queue elements to an existing one-dimensional System.Array, starting at the specified array index.

The elements are copied to the System.Array in the same order in which the enumerator iterates through the System.Collections.Queue. The one-dimensional System.Array that is the destination of the elements copied from System.Collections.Queue. The System.Array must have zero-based indexing. The zero-based index in array at which copying begins.

Dequeue

[C#] public virtual object Dequeue( );
[C++] public: virtual Object* Dequeue( );
[VB] Overridable Public Function Dequeue( ) As Object
[JScript] public function Dequeue( ): Object;

Description

Removes and returns the object at the beginning of the System.Collections.Queue.

Return Value: The object that is removed from the beginning of the System.Collections.Queue.

This method is similar to the System.Collections.Queue.Peek method, but System.Collections.Queue.Peek does not modify the System.Collections.Queue Enqueue

[C#] public virtual void Enqueue(object obj);
[C++] public: virtual void Enqueue(Object* obj);
[VB] Overridable Public Sub Enqueue(ByVal obj As Object)
[JScript] public function Enqueue(obj: Object);

Description

Adds an object to the end of the System.Collections.Queue.

If System.Collections.Queue.Count already equals the capacity of the System.Collections.Queue, the capacity is increased by automatically reallocating the internal array before copying the old elements and adding the new element. The new capacity is determined by multiplying the current capacity by the growth factor, which is determined when the System.Collections.Queue is constructed. The object to add to the System.Collections.Queue.

GetEnumerator

[C#] public virtual IEnumerator GetEnumerator( );
[C++] public: virtual IEnumerator* GetEnumerator( );
[VB] Overridable Public Function GetEnumerator( ) As IEnumerator
[JScript] public function GetEnumerator( ): IEnumerator;

Description

Returns an enumerator that can iterate through the System.Collections.Queue.

Return Value: An System.Collections.IEnumerator for the System.Collections.Queue.

Enumerators are intended to be used only to read data in the collection. Enumerators cannot be used to modify the underlying collection.

Peek

[C#] public virtual object Peek( );
[C++] public: virtual Object* Peek( );
[VB] Overridable Public Function Peek( ) As Object
[JScript] public function Peek( ): Object;

Description

Returns the object at the beginning of the System.Collections.Queue without removing it.

Return Value: The object at the beginning of the System.Collections.Queue.

This method is similar to the System.Collections.Queue.Dequeue method, but System.Collections.Queue.Peek does not modify the System.Collections.Queue.

Synchronized

[C#] public static Queue Synchronized(Queue queue);
[C++] public: static Queue* Synchronized(Queue* queue);
[VB] Public Shared Function Synchronized(ByVal queue As Queue) As Queue
[JScript] public static function Synchronized(queue: Queue): Queue;

Description

Returns a System.Collections.Queue wrapper that is synchronized (thread-safe).

Return Value: A System.Collections.Queue wrapper that is synchronized (thread-safe).

To guarantee the thread safety of the System.Collections.Queue, all operations must be done through this wrapper only. The System.Collections.Queue to synchronize.

ToArray

[C#] public virtual object[ ] ToArray( );
[C++] public: virtual Object* ToArray( ) _gc[ ];
[VB] Overridable Public Function ToArray( ) As Object( )
[JScript] public function ToArray( ): Object[ ];

Description

Copies the System.Collections.Queue elements to a new array.

Return Value: A new array containing elements copied from the System.Collections.Queue.

The System.Collections.Queue is not modified. The order of the elements in the new array is the same as the order of the elements from the beginning of the System.Collections.Queue to its end.

TrimToSize

[C#] public virtual void TrimTosize( );
[C++] public: virtual void TrimToSize( );
[VB] Overridable Public Sub TrimToSize( )
[JScript] public function TrimToSize( );

Description

Sets the capacity to the actual number of elements in the System.Collections.Queue.

This method can be used to minimize a list's memory overhead if no new elements will be added to the list.

ReadOnlyCollectionBase class (System.Collections)

TrimToSize

Description

Provides the abstract base class for a strongly typed read-only collection.

A System.Collections.ReadOnlyCollectionBase instance is always read-only. See System.Collections.CollectionBase for a modifiable version of this class.

ReadOnlyCollectionBase

Example Syntax:

TrimToSize

[C#] protected ReadOnlyCollectionBase( );

[C++] protected: ReadOnlyCollectionBase( );

[VB] Protected Sub New( )

[JScript] protected function ReadOnlyCollectionBase( );

Count

TrimToSize

[C#] public int Count {get;}

[C++] public: _property int get_Count( );

[VB] Public ReadOnly Property Count As Integer

[JScript] public function get Count( ): int;

Description

Gets the number of elements contained in the System.Collections.ReadOnlyCollectionBase instance.

InnerList

TrimToSize

[C#] protected ArrayList InnerList {get;}

[C++] protected: _property ArrayList* get_InnerList( );

[VB] Protected ReadOnly Property InnerList As ArrayList

[JScript] protected function get InnerList( ): ArrayList;

Description

Gets the list of elements contained in the System.Collections.ReadOnlyCollectionBase instance.

GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Returns an enumerator that can iterate through the System.Collections.ReadOnlyCollectionBase instance.

Return Value: An System.Collections.IEnumerator for the System.Collections.ReadOnlyCollectionBase instance.

Enumerators are intended to be used only to read data in the collection. Enumerators cannot be used to modify the underlying collection.

ICollection.CopyTo

[C#] void ICollection.CopyTo(Array array, art index);

[C++] void ICollection::CopyTo(Array* array, int index);

[VB] Sub CopyTo(ByVal array As Array, ByVal index As Integer) Implements ICollection.CopyTo

[JScript] function ICollection.CopyTo(array: Array, index: int);

SortedList class (System.Collections)

ToString

Description

Represents a collection of key-and-value pairs that are sorted by the keys and are accessible by key and by index.

A System.Collections.SortedList is a hybrid between a System.Collections.Hashtable and an System.Array. When an element is accessed by its key using the System.Collections.SortedList.Item(System.Object) indexer property, it behaves like a System.Collections.Hashtable. When an element is accessed by its index using System.Collections.SortedList.GetByIndex(System.Int32) or System.Collections.SortedList.SetByIndex(System.Int32,System.Object), it behaves like an System.Array.

SortedList

Example Syntax:

ToString

[C#] public SortedList( );

[C++] public: SortedList( );

[VB] Public Sub New( )

[JScript] public function SortedList( ); Initializes a new instance of the System.Collections.SortedList class.

Description

Initializes a new instance of the System.Collections.SortedList class that is empty, has the default initial capacity and is sorted according to the System.IComparable interface implemented by each key added to the System.Collections.SortedList.

The initial capacity is the starting capacity of the new System.Collections.SortedList. The default initial capacity for a System.Collections.SortedList is 16.

SortedList

Example Syntax:

ToString

[C#] public SortedList(IComparer comparer);

[C++] public: SortedList(IComparer* comparer);

[VB] Public Sub New(ByVal comparer As IComparer)

[JScript] public function SortedList(comparer: IComparer);

Description

Initializes a new instance of the System.Collections.SortedList class that is empty, has the default initial capacity and is sorted according to the specified System.Collections.IComparer interface.

The initial capacity is the starting capacity of the new System.Collections.SortedList. The default initial capacity for a System.Collections.SortedList is 16. The System.Collections.IComparer implementation to use when comparing keys.

SortedList

Example Syntax:

ToString

[C#] public SortedList(IDictionary d);

[C++] public: SortedList(IDictionary* d);

[VB] Public Sub New(ByVal d As IDictionary)

[JScript] public function SortedList(d: IDictionary);

Description

Initializes a new instance of the System.Collections.SortedList class that contains elements copied from the specified dictionary, has the same initial capacity as the number of elements copied and is sorted according to the System.IComparable interface implemented by each key.

The initial capacity is the starting capacity of the new System.Collections.SortedList. When adding elements to the list, if the number of elements exceeds the current capacity, the capacity is automatically doubled. The System.Collections.IDictionary to copy to a new System.Collections.SortedList.

SortedList

Example Syntax:

ToString

[C#] public SortedList(int initialCapacity);

[C++] public: SortedList(int initialCapacity);

[VB] Public Sub New(ByVal initialCapacity As Integer)
[JScript] public function SortedList(initialCapacity: int);

Description

Initializes a new instance of the System.Collections.SortedList class that is empty, has the specified initial capacity and is sorted according to the System.IComparable interface implemented by each key added to the System.Collections.SortedList.

The initial capacity is the starting capacity of the new System.Collections.SortedList. The default initial capacity for a System.Collections.SortedList is 16. The initial number of elements that the System.Collections.SortedList can contain.

SortedList
Example Syntax:
ToString

[C#] public SortedList(IComparer comparer, int capacity);
[C++] public: SortedList(IComparer* comparer, int capacity);
[VB] Public Sub New(ByVal comparer As IComparer, ByVal capacity As Integer)
[JScript] public function SortedList(comparer: IComparer, capacity: int);

Description

Initializes a new instance of the System.Collections.SortedList class that is empty, has the specified initial capacity and is sorted according to the specified System.Collections.IComparer interface.

The initial capacity is the starting capacity of the new System.Collections.SortedList. The default initial capacity for a System.Collections.SortedList is 16. The System.Collections.IComparer implementation to use when comparing keys. The initial number of elements that the System.Collections.SortedList can contain.

SortedList
Example Syntax:
ToString

[C#] public SortedList(IDictionary d, IComparer comparer);
[C++] public: SortedList(IDictionary* d, IComparer* comparer);
[VB] Public Sub New(ByVal d As IDictionary, ByVal comparer As IComparer)
[JScript] public function SortedList(d: IDictionary, comparer: IComparer);

Description

Initializes a new instance of the System.Collections.SortedList class that contains elements copied from the specified dictionary, has the same initial capacity as the number of elements copied and is sorted according to the specified System.Collections.IComparer interface.

The initial capacity is the starting capacity of the new System.Collections.SortedList. When adding elements to the list, if the number of elements exceeds the current capacity, the capacity is automatically doubled. The System.Collections.IDictionary to copy to a new System.Collections.SortedList. The System.Collections.IComparer implementation to use when comparing keys.

Capacity
ToString

[C#] public virtual int Capacity {get; set;}
[C++] public: _property virtual int get_Capacity( ); public: _property virtual void set_Capacity(int);
[VB] Overridable Public Property Capacity As Integer
[JScript] public function get Capacity( ): int;public function set Capacity(int);

Description

Gets or sets the capacity of the System.Collections.SortedList

If the number of elements added to the list reaches the current capacity, the capacity is automatically doubled.

Count
ToString

[C#] public virtual int Count {get;}
[C++] public: _property virtual int get_Count( );
[VB] Overridable Public ReadOnly Property Count As Integer
[JScript] public function get Count( ): int;

Description

Gets the number of elements contained in the System.Collections.SortedList.

Each element is a key-and-value pair that can be accessed as a System.Collections.DictionaryEntry object.

IsFixedSize
ToString

[C#] public virtual bool IsFixedSize {get;}
[C++] public: _property virtual bool get_IsFixedSize( );
[VB] Overridable Public ReadOnly Property IsFixedSize As Boolean
[JScript] public function get IsFixedSize( ): Boolean;

Description

Gets a value indicating whether the System.Collections.SortedList has a fixed size.

A collection with a fixed size does not allow the addition or removal of elements, but it allows the modification of existing elements.

IsReadOnly
ToString

[C#] public virtual bool IsReadOnly {get;}
[C++] public: _property virtual bool get_IsReadOnly( );
[VB] Overridable Public ReadOnly Property IsReadOnly As Boolean
[JScript] public function get IsReadOnly( ): Boolean;

Description

Gets a value indicating whether the System.Collections.SortedList is read-only.

IsSynchronized
ToString

[C#] public virtual bool IsSynchronized {get;}
[C++] public: _property virtual bool get_IsSynchronized( );
[VB] Overridable Public ReadOnly Property IsSynchronized As Boolean
[JScript] public function get IsSynchronized( ): Boolean;

Description

Gets a value indicating whether access to the System.Collections.SortedList is synchronized (thread-safe).

To guarantee the thread safety of the System.Collections.SortedList, all operations must be done through the wrapper returned by the System.Collections.SortedList.Synchronized (System.Collections.SortedList) method.

Item
ToString

[C#] public virtual object this[object key] {get; set;}
[C++] public: _property virtual Object* get_Item(Object* key);public: _property virtual void set_Item(Object* key, Object*);
[VB] Overridable Public Default Property Item(ByVal key As Object) As Object
[JScript] returnValue=SortedListObject.Item(key); SortedListObject.Item(key)=returnValue;

Description

Gets and sets the value associated with a specific key in the System.Collections.SortedList.

If setting the value of key and key does not exist in the System.Collections.SortedList, a new element is created with the specified key and the specified value. The key associated with the value to get or set.

Keys

ToString

[C#] public virtual ICollection Keys {get;}

[C++] public: _property virtual ICollection* get_Keys( );

[VB] Overridable Public ReadOnly Property Keys As ICollection

[JScript] public function get Keys( ): ICollection;

Description

Gets the keys in the System.Collections.SortedList.

The System.Collections.ICollection is a read-only view of the keys of the System.Collections.SortedList. Modifications made to the underlying System.Collections.SortedList are immediately reflected in the System.Collections.ICollection SyncRoot ToString

[C#] public virtual object SyncRoot {get;}

[C++] public: _property virtual Object* get_SyncRoot( );

[VB] Overridable Public ReadOnly Property SyncRoot As Object

[JScript] public function get SyncRoot( ): Object;

Description

Gets an object that can be used to synchronize access to the System.Collections.SortedList.

To create a synchronized version of the System.Collections.SortedList, use the System.Collections.SortedList.Synchronized(System.Collections.SortedList) method. However, derived classes can provide their own synchronized version of the System.Collections.SortedList using the System.Collections.SortedList.SyncRoot property. The synchronizing code must perform operations on the System.Collections.SortedList.SyncRoot of the System.Collections.SortedList, not directly on the System.Collections.SortedList. This ensures proper operation of collections that are derived from other objects. Specifically, it maintains proper synchronization with other threads that might be simultaneously modifying the System.Collections.SortedList object.

Values

ToString

[C#] public virtual ICollection Values {get;}

[C++] public: _property virtual ICollection* get_Values( );

[VB] Overridable Public ReadOnly Property Values As ICollection

[JScript] public function get Values( ): ICollection;

Description

Gets the values in the System.Collections.SortedList

The System.Collections.ICollection is a read-only view of the values of the System.Collections.SortedList. Modifications made to the underlying System.Collections.SortedList are immediately reflected in the System.Collections.ICollection.

Add

[C#] public virtual void Add(object key, object value);

[C++] public: virtual void Add(Object* key, Object* value);

[VB] Overridable Public Sub Add(ByVal key As Object, ByVal value As Object)

[JScript] public function Add(key: Object, value: Object);

Description

Adds an element with the specified key and value to the System.Collections.SortedList.

If the number of elements added to the list reaches the current capacity, the capacity is automatically doubled. The insertion point is determined based on the comparer selected, either explicitly or by default when the System.Collections.SortedList was created. The key of the element to add. The value of the element to add.

Clear

[C#] public virtual void Clear( );

[C++] public: virtual void Clear( );

[VB] Overridable Public Sub Clear( )

[JScript] public function Clear( );

Description

Removes all elements from the System.Collections.SortedList.

System.Collections.SortedList.Count is set to zero.

Clone

[C#] public virtual object Clone( );

[C++] public: virtual Object* Clone( );

[VB] Overridable Public Function Clone( ) As Object

[JScript] public function Clone( ): Object;

Description

Creates a shallow copy of the System.Collections.SortedList.

Return Value: A shallow copy of the System.Collections.SortedList.

A shallow copy of a collection is a new collection containing references to the same elements as the original collection. The elements themselves or anything referenced by the elements are not copied. In contrast, a deep copy of a collection copies the elements and everything directly or indirectly referenced by the elements Contains

[C#] public virtual bool Contains(object key);

[C++] public: virtual bool Contains(Object* key);

[VB] Overridable Public Function Contains(ByVal key As Object) As Boolean

[JScript] public function Contains(key: Object): Boolean;

Description

Determines whether the System.Collections.SortedList contains a specific key.

Return Value: true if the System.Collections.SortedList contains an element with the specified key; otherwise, false.

The elements of a System.Collections.SortedList are sorted by the keys either according to a specific System.Collections.IComparer implementation specified when the System.Collections.SortedList is created or according to the System.IComparable implementation provided by the keys themselves. The key to locate in the System.Collections.SortedList.

ContainsKey

[C#] public virtual bool ContainsKey(object key);

[C++] public: virtual bool ContainsKey(Object* key);

[VB] Overridable Public Function ContainsKey(ByVal key As Object) As Boolean

[JScript] public function ContainsKey(key: Object): Boolean;

Description

Determines whether the System.Collections.SortedList contains a specific key.

Return Value: true if the System.Collections.SortedList contains an element with the specified key; otherwise, false.

The elements of a System.Collections.SortedList are sorted by the keys either according to a specific System.Collections.IComparer implementation specified when the System.Collections.SortedList is created or according to the System.IComparable implementation provided by the keys themselves. The key Ito locate in the System.Collections.SortedList.

ContainsValue

[C#] public virtual bool ContainsValue(object value);

[C++] public: virtual bool ContainsValue(Object* value);

[VB] Overridable Public Function ContainsValue(ByVal value As Object) As Boolean

[JScript] public function ContainsValue(value: Object): Boolean;

Description

Determines whether the System.Collections.SortedList contains a specific value.

Return Value: true if the System.Collections.SortedList contains an element with the specified value; otherwise, false.

This method performs a linear search; therefore, the average execution time is proportional to System.Collections.SortedList.Count. That is, this method is an O(n) operation, where n is System.Collections.SortedList.Count. The value to locate in the System.Collections.SortedList.

CopyTo

[C#] public virtual void CopyTo(Array array, int arrayIndex);

[C++] public: virtual void CopyTo(Array* array, int arrayIndex);

[VB] Overridable Public Sub CopyTo(ByVal array As Array, ByVal arrayIndex As Integer)

[JScript] public function CopyTo(array: Array, arrayIndex: int);

Description

Copies the System.Collections.SortedList elements to a one-dimensional System.Array instance at the specified index.

The key-and-value pairs are copied to the System.Array in the same order in which the enumerator iterates through the System.Collections.SortedList. The one-dimensional System.Array that is the destination of the System.Collections.DictionaryEntry objects copied from System.Collections.SortedList. The System.Array must have zero-based indexing. The zero-based index in array at which copying begins.

GetByIndex

[C#] public virtual object GetByIndex(int index);

[C++] public: virtual Objects* GetByIndex(in index);

[VB] Overridable Public Function GetByIndex(ByVal index As Integer) As Object

[JScript] public function GetByIndex(index: int): Object;

Description

Gets the value at the specified index of the System.Collections.SortedList

Return Value: The value at the specified index of the System.Collections.SortedList.

The index sequence is based on the sort sequence. When an element is added, it is inserted into System.Collections.SortedList in the correct sort order, and the indexing adjusts accordingly. When an element removed, the indexing also adjusts accordingly. Therefore, the index of a specific key-and-value pair might change as elements are added or removed from the System.Collections.SortedList. The zero-based index of the value to get.

GetEnumerator

[C#] public virtual IDictionaryEnumerator GetEnumerator( );

[C++] public: virtual IDictionaryEnumerator* GetEnumerator( );

[VB] Overridable Public Function GetEnumerator( ) As IDictionaryEnumerator

[JScript] public function GetEnumerator( ): IDictionaryEnumerator;

Description

Returns an enumerator that can iterate through the System.Collections.SortedList.

Return Value: An System.Collections.IDictionaryEnumerator for the System.Collections.SortedList.

Enumerators are intended to be used only to read data in the collection. Enumerators cannot be used to modify the underlying collection.

GetKey

[C#] public virtual object GetKey(int index);

[C++] public: virtual Object* GetKey(int index);

[VB] Overridable Public Function GetKey(ByVal index As Integer) As Object

[JScript] public function GetKey(index: int): Object;

Description

Gets the key at the specified index of the System.Collections.SortedList.

Return Value: The key at the specified index of the System.Collections.SortedList.

The index sequence is based on the sort sequence. When an element is added, it is inserted into System.Collections.SortedList in the correct sort order, and the indexing adjusts accordingly. When an element removed, the indexing also adjusts accordingly. Therefore, the index of a specific key-and-value pair might change as elements are added or removed from the System.Collections.SortedList. The zero-based index of the key to get.

GetKeyList

[C#] public virtual IList GetKeyList( );

[C++] public: virtual IList* GetKeyList( );

[VB] Overridable Public Function GetKeyList( ) As IList

[JScript] public function GetKeyList( ): IList;

Description

Gets the keys in the System.Collections.SortedList.

Return Value: An System.Collections.IList containing the keys in the System.Collections.SortedList.

The returned System.Collections.IList is a read-only view of the keys of the System.Collections.SortedList. Modifications made to the underlying System.Collections.SortedList are immediately reflected in the System.Collections.IList.

GetValueList

[C#] public virtual IList GetValueList( );

[C++] public: virtual IList* GetValueList( );

[VB] Overridable Public Function GetValueList( ) As IList

[JScript] public function GetValueList( ): IList;

Description

Gets the values in the System.Collections.SortedList.

Return Value: An System.Collections.IList containing the values in the System.Collections.SortedList.

The returned System.Collections.IList is a read-only view of the values of the System.Collections.SortedList. Modifications made to the underlying System.Collections.SortedList are immediately reflected in the System.Collections.IList IndexOfKey

[C#] public virtual int IndexOfKey(object key);

[C++] public: virtual int IndexOfKey(Object* key);

[VB] Overridable Public Function IndexOfKey(ByVal key As Object) As Integer
[JScript] public function IndexOfKey(key: Object): int;

Description

Returns the zero-based index of the specified key in the System.Collections.SortedList.

Return Value: The zero-based index of key, if key is found in the System.Collections.SortedList; otherwise, −1.

The elements of a System.Collections.SortedList are sorted by the keys either according to a specific System.Collections.IComparer implementation specified when the System.Collections.SortedList is created or according to the System.IComparable implementation provided by the keys themselves. The key to locate in the System.Collections.SortedList.

IndexOfValue

[C#] public virtual int IndexOfValue(object value);
[C++] public: virtual int IndexOfValue(Object* value);
[VB] Overridable Public Function IndexOfValue(ByVal value As Object) As Integer
[JScript] public function IndexOfValue(value: Object): int;

Description

Returns the zero-based index of the first occurrence of the specified value in the System.Collections.SortedList.

Return Value: The zero-based index of the first occurrence of value, if value is found in the System.Collections.SortedList; otherwise, −1.

The index sequence is based on the sort sequence. When an element is added, it is inserted into System.Collections.SortedList in the correct sort order, and the indexing adjusts accordingly. When an element removed, the indexing also adjusts accordingly. Therefore, the index of a specific key-and-value pair might change as elements are added or removed from the System.Collections.SortedList. The value to locate in the System.Collections.SortedList.

Remove

[C#] public virtual void Remove(object key);
[C++] public: virtual void Remove(Object* key);
[VB] Overridable Public Sub Remove(ByVal key As Object)
[JScript] public function Remove(key: Object);

Description

Removes the element with the specified key from System.Collections.SortedList.

If the System.Collections.SortedList does not contain an element with the specified key, the System.Collections.SortedList remains unchanged. No exception is thrown. The key of the element to remove.

RemoveAt

[C#] public virtual void RemoveAt(int index);
[C++] public: virtual void RemoveAt(int index);
[VB] Overridable Public Sub RemoveAt(ByVal index As Integer)
[JScript] public function RemoveAt(index: int);

Description

Removes the element at the specified index of System.Collections.SortedList.

The index sequence is based on the sort sequence. When an element is added, it is inserted into System.Collections.SortedList in the correct sort order, and the indexing adjusts accordingly. When an element removed, the indexing also adjusts accordingly. Therefore, the index of a specific key-and-value pair might change as elements are added or removed from the System.Collections.SortedList. The zero-based index of the element to remove.

SetByIndex

[C#] public virtual void SetByIndex(int index, object value);
[C++] public: virtual void SetByIndex(int index, Object* value);
[VB] Overridable Public Sub SetByIndex(ByVal index As Integer, ByVal value As Object)
[JScript] public function SetByIndex(index: int, value: Object);

Description

Replaces the value at a specific index in the System.Collections.SortedList.

The index sequence is based on the sort sequence. When an element is added, it is inserted into System.Collections.SortedList in the correct sort order, and the indexing adjusts accordingly. When an element removed, the indexing also adjusts accordingly. Therefore, the index of a specific key-and-value pair might change as elements are added or removed from the System.Collections.SortedList. The zero-based index at which to save value. The System.Object to save into the System.Collections.SortedList.

Synchronized

[C#] public static SortedList Synchronized(SortedList list);
[C++] public: static SortedList* Synchronized(SortedList* list);
[VB] Public Shared Function Synchronized(ByVal list As SortedList) As SortedList
[JScript] public static function Synchronized(list: SortedList): SortedList;

Description

Returns a synchronized (thread-safe) wrapper for the System.Collections.SortedList.

Return Value: A synchronized (thread-safe) wrapper for the System.Collections.SortedList.

To guarantee the thread safety of the System.Collections.SortedList, all operations must be done through this wrapper only. The System.Collections.SortedList to synchronize.

IEnumerable.GetEnumerator

[C#] IEnumerator IEnumerable.GetEnumerator( );
[C++] IEnumerator* IEnumerable::GetEnumerator( ));
[VB] Function GetEnumerator( ) As IEnumerator Implements IEnumerable.GetEnumerator
[JScript] function IEnumerable.GetEnumerator( ): IEnumerator;

TrimToSize

[C#] public virtual void TrimToSize( );
[C++] public: virtual void TrimToSize( );
[VB] Overridable Public Sub TrimToSize( )
[JScript] public function TrimToSize( );

Description

Sets the capacity to the actual number of elements in the System.Collections.SortedList.

This method can be used to minimize a list's memory overhead if no new elements will be added to the list.

Stack class (System.Collections)

TrimToSize

Description

Represents a simple last-in-first-out collection of objects.

System.Collections.Stack is implemented as a circular buffer.

Stack

Example Syntax:

TrimToSize

[C#] public Stack( );
[C++] public: Stack( );
[VB] Public Sub New( )
[JScript] public function Stack( ); Initializes a new instance of the System.Collections.Stack class.

Description

Initializes a new instance of the System.Collections.Stack class that is empty and has the default initial capacity.

The initial capacity is the starting capacity of the new System.Collections.Stack. The default initial capacity for a System.Collections.Stack is 10.

Stack

Example Syntax:

TrimToSize

[C#] public Stack(ICollection col);

[C++] public: Stack(ICollection* col);

[VB] Public Sub New(ByVal col As ICollection)

[JScript] public function Stack(col: ICollection);

Description

Initializes a new instance of the System.Collections.Stack class that contains elements copied from the specified collection and has the same initial capacity as the number of elements copied.

The initial capacity is the starting capacity of the new System.Collections.Stack. If the number of elements added to the stack reaches the current capacity, the capacity is automatically doubled. The System.Collections.ICollection to copy elements from.

Stack

Example Syntax:

TrimToSize

[C#] public Stack(int initialCapacity);

[C++] public: Stack(int initialCapacity);

[VB] Public Sub New(ByVal initialCapacity As Integer)

[JScript] public function Stack(initialCapacity: int);

Description

Initializes a new instance of the System.Collections.Stack class that is empty and has the specified initial capacity or the default initial capacity, whichever is greater.

The initial capacity is the starting capacity of the new System.Collections.Stack. The default initial capacity for a System.Collections.Stack is 10. The initial number of elements that the System.Collections.Stack can contain.

Count

TrimToSize

[C#] public virtual int Count {get;}

[C++] public: _property virtual int get_Count( );

[VB] Overridable Public ReadOnly Property Count As Integer

[JScript] public function get Count( ): int;

Description

Gets the number of elements contained in the System.Collections.Stack.

IsSynchronized

TrimToSize

[C#] public virtual bool IsSynchronized {get;}

[C++] public: _property virtual bool get_IsSynchronized( );

[VB] Overridable Public ReadOnly Property IsSynchronized As Boolean

[JScript] public function get IsSynchronized( ): Boolean;

Description

Gets a value indicating whether access to the System.Collections.Stack is synchronized (thread-safe).

To guarantee the thread safety of the System.Collections.Stack, all operations must be done through the wrapper returned by the System.Collections.Stack.Synchronized (System.Collections.Stack) method.

SyncRoot

TrimToSize

[C#] public virtual object SyncRoot {get;}

[C++] public: _property virtual Object* get_SyncRoot( );

[VB] Overridable Public ReadOnly Property SyncRoot As Object

[JScript] public function get SyncRoot( ): Object;

Description

Gets an object that can be used to synchronize access to the System.Collections.Stack.

To create a synchronized version of the System.Collections. Stack, use the System.Collections. Stack.Synchronized(System.Collections.Stack) method. However, derived classes can provide their own synchronized version of the System.Collections.Stack using the System. Collections.Stack.SyncRoot property. The synchronizing code must perform operations on the System.Collections. Stack.SyncRoot of the System.Collections.Stack, not directly on the System.Collections.Stack. This ensures proper operation of collections that are derived from other objects. Specifically, it maintains proper synchronization with other threads that might be simultaneously modifying the System.Collections.Stack object.

Clear

[C#] public virtual void Clear( );

[C++] public: virtual void Clear( );

[VB] Overridable Public Sub Clear( )

[JScript] public function Clear( );

Description

Removes all objects from the System.Collections.Stack.

System.Collections.Stack.Count is set to zero.

Clone

[C#] public virtual object Clone( );

[C++] public: virtual Object* Clone( );

[VB] Overridable Public Function Clone( ) As Object

[JScript] public function Clone( ): Object;

Description

Creates a shallow copy of the System.Collections.Stack.

Return Value: A shallow copy of the System.Collections. Stack.

A shallow copy of a collection is a new collection containing references to the same elements as the original collection. The elements themselves or anything referenced by the elements are not copied. In contrast, a deep copy of a collection copies the elements and everything directly or indirectly referenced by the elements.

Contains

[C#] public virtual bool Contains(object obj);

[C++] public: virtual bool Contains(Object* obj);

[VB] Overridable Public Function Contains(ByVal obj As Object) As Boolean

[JScript] public function Contains(obj: Object): Boolean;

Description

Determines whether an element is in the System.Collections.Stack

Return Value: true if obj is found in the System.Collections. Stack; otherwise, false.

This method performs a linear search; therefore, the average execution time is proportional to System.Collections. Stack.Count. That is, this method is an O(n) operation, where n is System.Collections.Stack.Count. The System.Object to locate in the System.Collections.Stack. The element to locate can be null.

CopyTo

[C#] public virtual void CopyTo(Array array, int index);

[C++] public: virtual void CopyTo(Array* array, int index);

[VB] Overridable Public Sub CopyTo(ByVal array As Array, ByVal index As Integer)

[JScript] public function CopyTo(array: Array, index: int);

Description

Copies the System.Collections.Stack to an existing one-dimensional System.Array, starting at the specified array index.

The elements are copied onto the array in a last-in-first-out order, similar to the order of the elements returned by a succession of calls to System.Collections.Stack.Pop. The one-dimensional System.Array that is the destination of the elements copied from System.Collections.Stack. The System.Array must have zero-based indexing. The zero-based index in array at which copying begins.

GetEnumerator

[C#] public virtual IEnumerator GetEnumerator( );

[C++] public: virtual IEnumerator* GetEnumerator( );

[VB] Overridable Public Function GetEnumerator( ) As IEnumerator

[JScript] public function GetEnumerator( ): IEnumerator;

Description

Returns an System.Collections.IEnumerator for the System.Collections.Stack.

Return Value: An System.Collections.IEnumerator for the System.Collections.Stack.

Enumerators are intended to be used only to read data in the collection. Enumerators cannot be used to modify the underlying collection.

Peek

[C#] public virtual object Peek( );

[C++] public: virtual Object* Peek( );

[VB] Overridable Public Function Peek( ) As Object

[JScript] public function Peek( ): Object;

Description

Returns the object at the top of the System.Collections.Stack without removing it.

Return Value: The System.Object at the top of the System.Collections.Stack.

null can be pushed onto the System.Collections.Stack as a placeholder, if needed. To distinguish between a null value and the end of the stack, check the System.Collections.Stack.Count property or catch the System.InvalidOperationException, which is thrown when the System.Collections.Stack is empty.

Pop

[C#] public virtual object Pop( );

[C++] public: virtual Object* Pop( );

[VB] Overridable Public Function Pop( ) As Object

[JScript] public function Pop( ): Object;

Description

Removes and returns the object at the top of the System.Collections.Stack

Return Value: The System.Object removed from the top of the System.Collections.Stack.

System.Collections.Stack is implemented as a circular buffer.

Push

[C#] public virtual void Push(object obj);

[C++] public: virtual void Push(Object* obj);

[VB] Overridable Public Sub Push(ByVal obj As Object)

[JScript] public function Push(obj: Object);

Description

Inserts an object at the top of the System.Collections.Stack.

System.Collections.Stack is implemented as a circular buffer. The System.Object to push onto the System.Collections.Stack.

Synchronized

[C#] public static Stack Synchronized(Stack stack);

[C++] public: static Stack* Synchronized(Stack* stack);

[VB] Public Shared Function Synchronized(ByVal stack As Stack) As Stack

[JScript] public static function Synchronized(stack: Stack): Stack;

Description

Returns a synchronized (thread-safe) wrapper for the System.Collections.Stack.

Return Value: A synchronized wrapper around the System.Collections.Stack.

To guarantee the thread safety of the System.Collections.Stack, all operations must be done through this wrapper. The System.Collections.Stack to synchronize.

ToArray

[C#] public virtual object[ ] ToArray( );

[C++] public: virtual Object* ToArray( ) _gc[ ];

[VB] Overridable Public Function ToArray( ) As Object( )

[JScript] public function ToArray( ): Object[ ];

Description

Copies the System.Collections.Stack to a new array.

Return Value: A new array containing copies of the elements of the System.Collections.Stack.

The elements are copied onto the array in a last-in-first-out order, similar to the order System.Collections.Specialized The namespace contains specialized and strongly-typed collections; for example, a linked list dictionary, a bit vector and collections that contain only strings.

Description

The System.Collections.Specialized namespace contains specialized and strongly-typed collections; for example, a linked list dictionary, a bit vector and collections that contain only strings.

BitVector32 structure (System.Collections.Specialized)

Description

Provides a simple structure that stores Boolean values and small integers in 32 bits of memory.

System.Collections.Specialized.BitVector32 is more efficient than System.Collections.BitArray for Boolean values and small integers that are used internally.

Constructors:

BitVector32

Example Syntax:

[C#] public BitVector32(BitVector32 value);

[C++] public: BitVector32(BitVector32 value);

[VB] Public Sub New(ByVal value As BitVector32)

[JScript] public function BitVector32(value: BitVector32);

Description

Initializes a new instance of the System.Collections.Specialized.BitVector32 structure containing the data represented in an existing System.Collections.Specialized.BitVector32 structure. A System.Collections.Specialized.BitVector32 structure that contains the data to copy.

BitVector32

Example Syntax:

[C#] public BitVector32(int data);

[C++] public: BitVector32(int data);

[VB] Public Sub New(ByVal data As Integer)

[JScript] public function BitVector32(data: int); Initializes a new instance of the System.Collections.Specialized. BitVector32 structure.

Description

Initializes a new instance of the System.Collections.Specialized.BitVector32 structure containing the data represented in an integer. An integer representing the data of the new System.Collections.Specialized.BitVector32.

Properties:

Data

[C#] public int Data {get;}

[C++] public: _property int get_Data( );

[VB] Public ReadOnly Property Data As Integer

[JScript] public function get Data( ): int;

Description

Gets the value of the System.Collections.Specialized. BitVector32 as an integer.

To access the value of the individual sections or bit flags, use the System.Collections.Specialized.BitVector32.Item (System.Int32) property.

Item

[C#] public int this[BitVector32.Section section] {get; set;}

[C++] public: _property int get_Item(BitVector32. Section section);public: _property void set_Item (BitVector32.Section section, int);

[VB] Public Default Property Item(ByVal section As BitVector32.Section) As Integer

[JScript] returnValue=BitVector32Object.Item(section); BitVector32Object.Item(section)=returnValue;

Description

Gets or sets the value stored in the specified System.Collections.Specialized.BitVector32.Section.

System.Collections.Specialized.BitVector32.Item (System.Int32) [Section] property is the indexer for a System.Collections.Specialized.BitVector32 that is set up as sections, and System.Collections.Specialized.BitVector32.Item (System.Int32) [int] property is the indexer for a System.Collections.Specialized.BitVector32 that is set up as bit flags. A System.Collections.Specialized. BitVector32.Section that contains the value to get or set.

Item

[C#] public bool this [int bit] {get; set;}

[C++] public: _property boot get_Item(int bit);public: _property void set_Item(int bit, bool);

[VB] Public Default Property Item(ByVal bit As Integer) As Boolean

[JScript] returnValue=BitVector32Object.Item(bit); BitVector32Object.Item(bit) =returnValue; Gets or sets the value of the specified section or bit flag.

Description

Gets or sets the state of the bit flag indicated by the specified mask.

System.Collections.Specialized.BitVector32.Item (System.Int32) [Section] property is the indexer for a System.Collections.Specialized.BitVector32 that is set up as sections, and System.Collections.Specialized.BitVector32.Item (System.Int32) [int] property is the indexer for a System.Collections.Specialized.BitVector32 that is set up as bit flags. A mask that indicates the bit to get or set.

Methods:

CreateMask

[C#] public static int CreateMask( );

[C++] public: static int CreateMask( );

[VB] Public Shared Function CreateMask( ) As Integer

[JScript] public static function CreateMask( ): int; Creates a series of masks that can be used to access individual bits in a System.Collections.Specialized.BitVector32 that is set up as bit flags.

Description

Creates the first mask in a series of masks that can be used to access individual bits in a System.Collections.Specialized. BitVector32 that is set up as bit flags.

Return Value: A mask that isolates the first bit flag in the System.Collections.Specialized.BitVector32.

Use CreateMask( ) to create the first mask in a series and CreateMask(int) for all subsequent masks.

CreateMask

[C#] public static int CreateMask(int previous);

[C++] public: static int CreateMask(int previous);

[VB] Public Shared Function CreateMask(ByVal previous As Integer) As Integer

[JScript] public static function CreateMask(previous: int): int;

Description

Creates the mask following the specified mask in a series of masks that can be used to access individual bits in a System. Collections.Specialized.BitVector32 that is set up as bit flags.

Return Value: A mask that isolates the bit flag following the one that previous points to in System.Collections.Specialized.BitVector32.

Use CreateMask( ) to create the first mask in a series and CreateMask(int) for all subsequent masks. The mask that indicates the previous bit flag.

CreateSection

[C#] public static Section CreateSection(short maxValue);

[C++] public: static Section CreateSection(short maxValue);

[VB] Public Shared Function CreateSection(ByVal maxValue As Short) As Section

[JScript] public static function CreateSection(maxValue: Int16): Section; Creates a series of sections that contain small integers.

Description

Creates the first System.Collections.Specialized. BitVector32.Section in a series of sections that contain small integers.

Return Value: A System.Collections.Specialized. BitVector32.Section that can hold a number from zero to maxValue.

A System.Collections.Specialized.BitVector32.Section is a window into the System.Collections.Specialized. BitVector32 and is composed of the smallest number of consecutive bits that can contain the maximum value specified in System. Collections.Specialized.BitVector32.CreateSection (System.Int16). For example, a section with a maximum value of 1 is composed of only one bit, whereas a section with a maximum value of 5 is composed of three bits. You can create a System.Collections.Specialized.BitVector32. Section with a maximum value of 1 to serve as a Boolean, thereby allowing you to store integers and Booleans in the same System.Collections.Specialized.BitVector32. A 16-bit signed integer that specifies the maximum value for the new System.Collections.Specialized.BitVector32.Section.

CreateSection

[C#] public static Section CreateSection(short maxValue, BitVector32.Section previous);

[C++] public: static Section CreateSection(short maxValue, BitVector32.Section previous);

[VB] Public Shared Function CreateSection(ByVal maxValue As Short, ByVal previous As BitVector32.Section) As Section

[JScript] public static function CreateSection(maxValue: Int16, previous BitVector32.Section): Section;

Description

Creates a new System.Collections.Specialized.BitVector32.Section following the specified System.Collections.Specialized.BitVector32.Section in a series of sections that contain small integers.

Return Value: A System.Collections.Specialized.BitVector32.Section that can hold a number from zero to maxValue.

A System.Collections.Specialized.BitVector32.Section is a window into the System.Collections.Specialized.Bit Vector32 and is composed of the smallest number of consecutive bits that can contain the maximum value specified in System.Collections.Specialized.BitVector32.CreateSection (System.Int16). For example, a section with a maximum value of 1 is composed of only one bit, whereas a section with a maximum value of 5 is composed of three bits. You can create a System.Collections.Specialized.BitVector32.Section with a maximum value of 1 to serve as a Boolean, thereby allowing you to store integers and Booleans in the same System.Collections.Specialized.BitVector32. A 16-bit signed integer that specifies the maximum value for the new System.Collections.Specialized.BitVector32.Section. The previous System.Collections.Specialized.BitVector32.Section in the System.Collections.Specialized.BitVector32.

Equals

[C#] public override bool Equals(object o);

[C++] public: bool Equals(Object* o);

[VB] Overrides Public Function Equals(ByVal o As Object) As Boolean

[JScript] public override function Equals(o: Object): Boolean;

Description

Determines whether the specified object is equal to the System.Collections.Specialized.BitVector32.

Return Value: true if the specified System.Object is equal to the System.Collections.Specialized.BitVector32; otherwise, false.

The object o is considered equal to the System.Collections.Specialized.BitVector32 if the type of o is compatible with the System.Collections.Specialized.BitVector32 type and if the value of o is equal to the value of System.Collections.Specialized.BitVector32.Data. The System.Object to compare with the current System.Collections.Specialized.BitVector32.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Serves as a hash function for the System.Collections.Specialized.BitVector32.

Return Value: A hash code for the System.Collections.Specialized.BitVector32.

The hash code of a System.Collections.Specialized.BitVector32 is based on the value of System.Collections.Specialized.BitVector32.Data. Two instances of System.Collections.Specialized.BitVector32 with the same value for System.Collections.Specialized.BitVector32.Data will also generate the same hash code.

ToString

[C#] public override string ToString( );

[C++] public: String* ToString( );

[VB] Overrides Public Function ToString( ) As String

[JScript] public override function ToString( ): String;

Description

ToString

[C#] public static string ToString(BitVector32 value);

[C++] public: static String* ToString(BitVector32 value);

[VB] Public Shared Function ToString(ByVal value As BitVector32) As String

[JScript] public static function ToString(value: BitVector32): String;

Description

CollectionsUtil class (System.Collections.Specialized)

ToString

Description

Creates collections that ignore the case in strings.

These methods generate a case-insensitive instance of the collection using case-insensitive implementations of the hash code provider and the comparer. The resulting instance can be used like any other instances of that class, although it may behave differently.

CollectionsUtil

Example Syntax:

ToString

[C#] public CollectionsUtil( );

[C++] public: CollectionsUtil( );

[VB] Public Sub New( )

[JScript] public function CollectionsUtil( );

CreateCaseInsensitiveHashtable

[C#] public static Hashtable CreateCaseInsensitiveHashtable( );

[C++] public: static Hashtable* CreateCaseInsensitiveHashtable( );

[VB] Public Shared Function CreateCaseInsensitiveHashtable( ) As Hashtable

[JScript] public static function CreateCaseInsensitiveHashtable( ): Hashtable; Creates a new instance of the System.Collections.Hashtable class that ignores the case of strings.

Description

Creates a new case-insensitive instance of the System.Collections.Hashtable class with the default initial capacity.

Return Value: A new case-insensitive instance of the System.Collections.Hashtable class with the default initial capacity.

The new System.Collections.Hashtable instance uses the default load factor, the System.Collections.CaseInsensitiveHashCodeProvider, and the System.Collections.CaseInsensitiveComparer.

CreateCaseInsensitiveHashtable

[C#] public static Hashtable CreateCaseInsensitiveHashtable (IDictionary d);

[C++] public: static Hashtable* CreateCaseInsensitiveHashtable(IDictionary* d);

[VB] Public Shared Function CreateCaseInsensitiveHashtable(ByVal d As IDictionary) As Hashtable

[JScript] public static function CreateCaseInsensitiveHashtable(d: IDictionary): Hashtable;

Description

Copies the entries from the specified dictionary to a new case-insensitive instance of the System.Collections.Hashtable class with the same initial capacity as the number of entries copied.

Return Value: A new case-insensitive instance of the System.Collections.Hashtable class containing the entries from the specified System.Collections.IDictionary.

The new System.Collections.Hashtable instance uses the default load factor, the System.Collections.CaseInsensitiveHashCodeProvider, and the System.Collections.CaseInsensitiveComparer. The System.Collections.IDictionary to copy to a new case-insensitive System.Collections.Hashtable.

CreateCaseInsensitiveHashtable

[C#] public static Hashtable CreateCaseInsensitiveHashtable (int capacity);

[C++] public: static Hashtable* CreateCaseInsensitiveHashtable(int capacity);

[VB] Public Shared Function CreateCaseInsensitiveHashtable(ByVal capacity As Integer) As Hashtable

[JScript] public static function CreateCaseInsensitiveHashtable(capacity: int): Hashtable;

Description

Creates a new case-insensitive instance of the System.Collections.Hashtable class with the specified initial capacity.

Return Value: A new case-insensitive instance of the System.Collections.Hashtable class with the specified initial capacity.

The new System.Collections.Hashtable instance uses the default load factor, the System.Collections.CaseInsensitiveHashCodeProvider, and the System.Collections.CaseInsensitiveComparer. The approximate number of entries that the System.Collections.Hashtable can initially contain.

CreateCaseInsensitiveSortedList

[C#] public static SortedList CreateCaseInsensitiveSortedList( );

[C++] public: static SortedList* CreateCaseInsensitiveSortedList( );

[VB] Public Shared Function CreateCaseInsensitiveSortedList( ) As SortedList

[JScript] public static function CreateCaseInsensitiveSortedList( ): SortedList;

Description

Creates a new instance of the System.Collections.SortedList class that ignores the case of strings.

Return Value: A new instance of the System.Collections.SortedList class that ignores the case of strings.

The new System.Collections.SortedList instance is sorted according to the System.Collections.CaseInsensitiveComparer.

HybridDictionary class (System.Collections.Specialized)

ToString

Description

Implements IDictionary by using a System.Collections.Specialized.ListDictionary while the collection is small, and then switching to a System.Collections.Hashtable when the collection gets large.

This class is recommended for cases where the number of elements in a dictionary is unknown. It takes advantage of the improved performance of a System.Collections.Specialized.ListDictionary with small collections, and offers the flexibility of switching to a System.Collections.Hashtable which handles larger collections better than System.Collections.Specialized.ListDictionary.

HybridDictionary

Example Syntax:

ToString

[C#] public HybridDictionary( );

[C++] public: HybridDictionary( );

[VB] Public Sub New( )

[JScript] public function HybridDictionary( ); Initializes a new instance of the System.Collections.Specialized.HybridDictionary class.

Description

Creates an empty case-sensitive System.Collections.Specialized.HybridDictionary.

By default, the collection is case-sensitive and uses the key's implementation of System.Object.GetHashCode as the hash code provider and the key's implementation of System.Object.Equals(System.Object) as the comparer.

HybridDictionary

Example Syntax:

ToString

[C#] public HybridDictionary(bool caseInsensitive);

[C++] public: HybridDictionary(bool caseInsensitive);

[VB] Public Sub New(ByVal caseInsensitive As Boolean)

[JScript] public function HybridDictionary(caseInsensitive: Boolean);

Description

Creates an empty System.Collections.Specialized.HybridDictionary with the specified case-sensitivity.

If caseInsensitive is false, the collection uses the key's implementations of System.Object.GetHashCode and System. Object.Equals(System.Object). If caseInsensitive is true, the collection uses the System.Collections.CaseInsensitiveHashCodeProvider and a private case-insensitive and culture-insensitive implementation of the System.Collections.IComparer interface that only converts the strings to the same case and compares the Unicode values of the characters. A Boolean that denotes whether the System.Collections.Specialized.HybridDictionary is case-insensitive.

HybridDictionary

Example Syntax:

ToString

[C#] public HybridDictionary(int initialSize);

[C++] public: HybridDictionary(int initialSize);

[VB] Public Sub New(ByVal initialSize As Integer)

[JScript] public function HybridDictionary(initialSize: int);

Description

Creates a case-sensitive System.Collections.Specialized.HybridDictionary with the specified initial size.

If the initial size of the collection is greater than the optimal size for a System.Collections.Specialized.ListDictionary, the collection is stored in a System.Collections.Hashtable right away to avoid the overhead of copying elements from the System.Collections.Specialized.ListDictionary to the System.Collections.Hashtable. The approximate number of entries that the System.Collections.Specialized.HybridDictionary can initially contain.

HybridDictionary

Example Syntax:

ToString

[C#] public HybridDictionary(int initialSize, bool caseInsensitive);

[C++] public: HybridDictionary(int initialSize, bool caseInsensitive);

[VB] Public Sub New(ByVal initialSize As Integer, ByVal caseInsensitive As Boolean)

[JScript] public function HybridDictionary(initialSize: int, caseInsensitive: Boolean);

Description

Creates a System.Collections.Specialized.HybridDictionary with the specified initial size and case-sensitivity.

If the initial size of the collection is greater than the optimal size for a System.Collections.Specialized.ListDictionary, the collection is stored in a System.Collections.Hashtable right away to avoid the overhead of copying elements from the System.Collections.Specialized.ListDictionary to the System.Collections.Hashtable. The approximate number of entries that the System.Collections.Specialized.HybridDictionary can initially contain. A Boolean that denotes whether the System.Collections.Specialized.HybridDictionary is case-insensitive.

Count

ToString

[C#] public int Count {get;}

[C++] public: _property int get_Count( );

[VB] Public ReadOnly Property Count As Integer

[JScript] public function get Count( ): int;

Description

Gets the number of key-and-value pairs contained in the System.Collections.Specialized.HybridDictionary.

IsFixedSize

ToString

[C#] public bool IsFixedSize {get;}

[C++] public: _property bool get_IsFixedSize( );

[VB] Public ReadOnly Property IsFixedSize As Boolean

[JScript] public function get IsFixedSize( ): Boolean;

Description

Gets a value indicating whether the System.Collections.Specialized.HybridDictionary has a fixed size.

System.Collections.Specialized.HybridDictionary implements the System.Collections.Specialized.HybridDictionary.IsFixedSize property because it is required by the interface.

IsReadOnly

ToString

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether the System.Collections.Specialized.HybridDictionary is read-only.

System.Collections.Specialized.HybridDictionary implements the System.Collections.Specialized.HybridDictionary.IsReadOnly property because it is required by the interface.

IsSynchronized

ToString

[C#] public bool IsSynchronized {get;}

[C++] public: _property bool get_IsSynchronized( );

[VB] Public ReadOnly Property IsSynchronized As Boolean

[JScript] public function get IsSynchronized( ): Boolean;

Description

Gets a value indicating whether the System.Collections.Specialized.HybridDictionary is synchronized (thread-safe).

System.Collections.Specialized.HybridDictionary implements the System.Collections.Specialized.HybridDictionary.IsSynchronized property because it is required by the interface.

Item

ToString

[C#] public object this[object key] {get; set;}

[C++] public: _property Object* get_Item(Object* key);public: _property void set_Item(Object* key, Object*);

[VB] Public Default Property Item(ByVal key As Object) As Object

[JScript] returnValue=HybridDictionaryObject.Item(key); HybridDictionaryObject.Item(key)=returnValue;

Description

Gets or sets the value associated with the specified key.

This property provides the ability to access a specific element in the collection by using the following syntax: my Collection[key]. The key whose value to get or set.

Keys

ToString

[C#] public ICollection Keys {get;}

[C++] public: _property ICollection* get_Keys( );

[VB] Public ReadOnly Property Keys As ICollection

[JScript] public function get Keys( ): ICollection;

Description

Gets an System.Collections.ICollection containing the keys in the System.Collections.Specialized.HybridDictionary.

The order of the values in the System.Collections.ICollection is unspecified, but it is the same order as the associated values in the System.Collections.ICollection returned by the System.Collections.Specialized.HybridDictionary.Values method.

SyncRoot

ToString

[C#] public object SyncRoot {get;}

[C++] public: _property Object* get_SyncRoot( );

[VB] Public ReadOnly Property SyncRoot As Object

[JScript] public function get SyncRoot( ): Object;

Description

Gets an object that can be used to synchronize access to the System.Collections.Specialized.HybridDictionary.

Derived classes can provide their own synchronized version of the System.Collections.Specialized.HybridDictionary using the System.Collections.Specialized.HybridDictionary.SyncRoot property. The synchronizing code must perform operations on the System.Collections.Specialized.HybridDictionary.SyncRoot of the System.Collections.Specialized.HybridDictionary, not directly on the System.Collections.Specialized.HybridDictionary. This ensures proper operation of collections that are derived from other objects. Specifically, it maintains proper synchronization with other threads that might be simultaneously modifying the System.Collections.Specialized.HybridDictionary object.

Values

ToString

[C#] public ICollection Values {get;}

[C++] public: _property ICollection* get_Values( );

[VB] Public ReadOnly Property Values As ICollection

[JScript] public function get Values( ): ICollection;

Description

Gets an System.Collections.ICollection containing the values in the System.Collections.Specialized.HybridDictionary.

The order of the values in the System.Collections.ICollection is unspecified, but it is the same order as the associated keys in the System.Collections.ICollection returned by the System.Collections.Specialized.HybridDictionary.Keys method.

Add

[C#] public void Add(object key, object value);

[C++] public: _sealed void Add(Object* key, Object* value);

[VB] NotOverridable Public Sub Add(ByVal key As Object, ByVal value As Object)

[JScript] public function Add(key: Object, value: Object);

Description

Adds an entry with the specified key and value into the System.Collections.Specialized.HybridDictionary.

An object that has no correlation between its state and its hash code value should typically not be used as the key. For example, String objects are better than StringBuilder objects for use as keys. The key of the entry to add. The value of the entry to add.

Clear

[C#] public void Clear( );

[C++] public: _sealed void Clear( );

[VB] NotOverridable Public Sub Clear( )

[JScript] public function Clear( );

Description

Removes all entries from the System.Collections.Specialized.HybridDictionary.

System.Collections.Specialized.HybridDictionary.Count is set to zero.

Contains

[C#] public bool Contains(object key);

[C++] public: _sealed bool Contains(Object* key);

[VB] NotOverridable Public Function Contains(ByVal key As Object) As Boolean

[JScript] public function Contains(key: Object): Boolean;

Description

Determines whether the System.Collections.Specialized.HybridDictionary contains a specific key.

Return Value: true if the System.Collections.Specialized.HybridDictionary contains an entry with the specified key; otherwise, false.

This implementation is close to O(1) in most cases. The key to locate in the System.Collections.Specialized.HybridDictionary.

CopyTo

[C#] public void CopyTo(Array array, int index);

[C++] public: _sealed void CopyTo(Array* array, int index);

[VB] NotOverridable Public Sub CopyTo(ByVal array As Array, ByVal index As Integer)

[JScript] public function CopyTo(array: Array, index: int);

Description

Copies the System.Collections.Specialized.HybridDictionary entries to a one-dimensional System.Array instance at the specified index.

The elements are copied to the System.Array in the same order in which the enumerator iterates through the System.Collections.Specialized.HybridDictionary. The one-dimensional System.Array that is the destination of the System.Collections.DictionaryEntry objects copied from System.Collections.Specialized.HybridDictionary. The System.Array must have zero-based indexing. The zero-based index in array at which copying begins.

GetEnumerator

[C#] public IDictionaryEnumerator GetEnumerator( );

[C++] public: _sealed IDictionaryEnumerator* GetEnumerator( );

[VB] NotOverridable Public Function GetEnumerator( ) As IDictionaryEnumerator

[JScript] public function GetEnumerator( ): IDictionaryEnumerator; Returns an enumerator that can iterate through the System.Collections.Specialized.HybridDictionary.

Description

Returns an enumerator that can iterate through the System.Collections.Specialized.HybridDictionary.

Return Value: An System.Collections.IDictionaryEnumerator for the System.Collections.Specialized.HybridDictionary.

Enumerators are intended to be used only to read data in the collection. Enumerators cannot be used to modify the underlying collection.

Remove

[C#] public void Remove(object key);

[C++] public: _sealed void Remove(Object* key);

[VB] NotOverridable Public Sub Remove(ByVal key As Object)

[JScript] public function Remove(key: Object);

Description

Removes the entry with the specified key from the System.Collections.Specialized.HybridDictionary.

If the System.Collections.Specialized.HybridDictionary does not contain an element with the specified key, the System.Collections.Specialized.HybridDictionary remains unchanged. No exception is thrown. The key of the entry to remove.

IEnumerable.GetEnumerator

[C#] IEnumerator IEnumerable.GetEnumerator( );

[C++] IEnumerator* IEnumerable::GetEnumerator( );

[VB] Function GetEnumerator( ) As IEnumerator Implements IEnumerable.GetEnumerator

[JScript] function IEnumerable.GetEnumerator( ): IEnumerator;

NameObjectCollectionBase.KeysCollection class (System.Collections.Specialized)

ToString

Description

Represents a collection of the System.String keys of a collection.

Count

ToString

[C#] public int Count {get;}

[C++] public: _property int get_Count( );

[VB] Public ReadOnly Property Count As Integer

[JScript] public function get Count( ): int;

Description

Gets the number of keys in the System.Collections.Specialized.NameObjectCollecffonBase.KeysCollection.

Item

ToString

[C#] public string this[int index] {get;}

[C++] public: _property String* get_Item(int index);

[VB] Public Default ReadOnly Property Item(ByVal index As Integer) As String

[JScript] returnValue=KeysCollectionObject.Item(index);

Description

Gets the entry at the specified index of the collection.

This property provides the ability to access a specific element in the collection by using the following syntax: my Collection[index] (In Visual Basic, myCollection(index)). The zero-based index of the entry to locate in the collection.

Get

[C#] public virtual string Get(int index);

[C++] public: virtual String* Get(int index);

[VB] Overridable Public Function Get(ByVal index As Integer) As String

[JScript] public function Get(index: int): String;

Description

Gets the key at the specified index of the collection.

Return Value: A System.String that contains the key at the specified index of the collection. The zero-based index of the key to get from the collection.

GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Returns an enumerator that can iterate through the System. Collections.Specialized.NamebiectCollectionBase.KeysCollection.

Return Value: An System.Collections.IEnumerator for the ISystem.Collections.Specialized.NamebiectCollectionBase.KeysCollection.

This enumerator returns the keys of the collection as strings.

ICollection.CopyTo

[C#] void ICollection.CopyTo(Array array, int index);

[C++] void ICollection::CopyTo(Array* array, int index);

[VB] Sub CopyTo(ByVal array As Array, ByVal index As Integer) Implements ICollection.CopyTo

[JScript] function ICollection.CopyTo(array: Array, index: int);

ListDictionary class (System.Collections.Specialized)

ToString

Description

Implements IDictionary using a singly linked list for collections that contain 10 items or less.

This is a simple implementation of System.Collections. IDictionary using a singly linked list. It is smaller and faster than a System.Collections.Hashtable if the number of elements is 10 or less. This should not be used if performance is important for large numbers of elements.

ListDictionary

Example Syntax:

ToString

[C#] public ListDictionary( );

[C++] public: ListDictionary( );

[VB] Public Sub New( )

[JScript] public function ListDictionary( ); Initializes a new instance of the System.Collections.Specialized. ListDictionary class.

Description

Creates an empty System.Collections.Specialized. ListDictionary using the default comparer.

The comparer determines whether two keys are equal. Every key in a System.Collections.Specialized. ListDictionary must be unique. The default comparer is the key's implementation of System.Object.Equals(System.Object).

ListDictionary

Example Syntax:

ToString

[C#] public ListDictionary(IComparer comparer);

[C++] public: ListDictionary(IComparer* comparer);

[VB] Public Sub New(ByVal comparer As IComparer)

[JScript] public function ListDictionary(comparer: IComparer);

Description

Creates an empty System.Collections.Specialized. ListDictionary using the specified comparer.

The comparer determines whether two keys are equal. Every key in a System.Collections.Specialized. ListDictionary must be unique. The default comparer is the key's implementation of System.Object.Equals(System.Object). The System.Collections.IComparer to use to determine whether two keys are equal.

Count

ToString

[C#] public int Count {get;}

[C++] public: _property int get_Count( );

[VB] Public ReadOnly Property Count As Integer

[JScript] public function get Count( ): int;

Description

Gets the number of key-and-value pairs contained in the System.Collections.Specialized.ListDictionary.

IsFixedSize

ToString

[C#] public bool IsFixedSize {get;}

[C++] public: _property bool get_IsFixedSize( );

[VB] Public ReadOnly Property IsFixedSize As Boolean

[JScript] public function get IsFixedSize( ): Boolean;

Description

Gets a value indicating whether the System.Collections. Specialized.ListDictionary has a fixed size.

System.Collections.Specialized.ListDictionary implements the System.Collections.Specialized.ListDictionary. IsFixedSize property because it is required by the interface.

IsReadOnly

ToString

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether the System.Collections. Specialized.ListDictionary is read-only.

System.Collections.Specialized.ListDictionary implements the System.Collections.Specialized.List Dictionary.IsReadOnly property because it is required by the interface.

IsSynchronized

ToString

[C#] public bool IsSynchronized {get;}

[C++] public: _property bool get_IsSynchronized( );

[VB] Public ReadOnly Property IsSynchronized As Boolean

[JScript] public function get IsSynchronized( ): Boolean;

Description

Gets a value indicating whether the System.Collections. Specialized.ListDictionary is synchronized (thread-safe).

System.Collections.Specialized.ListDictionary implements the System.Collections.Specialized.List Dictionary.IsSynchronized property because it is required by the interface.

Item

ToString

[C#] public object this[object key] {get; set;}

[C++] public: _property Object* get_Item(Object* key);public: _property void set_Item(Object* key, Object*);

[VB] Public Default Property Item(ByVal key As Object) As Object

[JScript] returnValue=ListDictionaryObject.Item(key); ListDictionaryObject.Item(key)=returnValue;

Description

Gets or sets the value associated with the specified key.

This property provides the ability to access a specific element in the collection by using the following syntax: my Collection[key]. The key whose value to get or set.

Keys

ToString

[C#] public ICollection Keys {get;}

[C++] public: _property ICollection* get_Keys( );

[VB] Public ReadOnly Property Keys As ICollection

[JScript] public function get Keys( ): ICollection;

Description

Gets an System.Collections.ICollection containing the keys in the System.Collections.Specialized.ListDictionary.

The order of the values in the System.Collections.ICollection is unspecified, but it is the same order as the associated values in the System.Collections.ICollection returned by the System.Collections.Specialized.ListDictionary.Values method.

SyncRoot

ToString

[C#] public object SyncRoot {get;}

[C++] public: _property Object* get_SyncRoot( );

[VB] Public ReadOnly Property SyncRoot As Object

[JScript] public function get SyncRoot( ): Object;

Description

Gets an object that can be used to synchronize access to the System.Collections.Specialized.ListDictionary.

Derived classes can provide their own synchronized version of the System.Collections.Specialized.ListDictionary using the System.Collections.Specialized.List Dictionary.SyncRoot property. The synchronizing code must perform operations on the System.Collections.Specialized.ListDictionary.SyncRoot of the System.Collections.Specialized.ListDictionary,not directly on the System.Collections.Specialized.ListDictionary. This ensures proper operation of collections that are derived from other objects. Specifically, it maintains proper synchronization with other threads that might be simultaneously modifying the System.Collections.Specialized.ListDictionary object.

Values

ToString

[C#] public ICollection Values {get;}

[C++] public: _property ICollection* get_Values( );

[VB] Public ReadOnly Property Values As ICollection

[JScript] public function get Values( ): ICollection;

Description

Gets an System.Collections.ICollection containing the values in the System.Collections.Specialized.ListDictionary.

The order of the values in the System.Collections.ICollection is unspecified, but it is the same order as the associated keys in the System.Collections.ICollection returned by the System.Collections.Specialized.ListDictionary.Keys method.

Add

[C#] public void Add(object key, object value);

[C++] public: _sealed void Add(Object* key, Object* value);

[VB] NotOverridable Public Sub Add(ByVal key As Object, ByVal value As Object)

[JScript] public function Add(key: Object, value: Object);

Description

Adds an entry with the specified key and value into the System.Collections.Specialized.ListDictionary.

An object that has no correlation between its state and its hash code value should typically not be used as the key. For example, String objects are better than StringBuilder objects for use as keys. The key of the entry to add. The value of the entry to add.

Clear

[C#] public void Clear( );

[C++] public: _sealed void Clear( );

[VB] NotOverridable Public Sub Clear( )

[JScript] public function Clear( );

Description

Removes all entries from the System.Collections.Specialized.ListDictionary.

System.Collections.Specialized.ListDictionary.Count is set to zero.

Contains

[C#] public bool Contains(object key);

[C++] public: _sealed bool Contains(Object* key);

[VB] NotOverridable Public Function Contains(ByVal key As Object) As Boolean

[JScript] public function Contains(key: Object): Boolean;

Description

Determines whether the System.Collections.Specialized.ListDictionary contains a specific key.

Return Value: true if the System.Collections.Specialized.ListDictionary contains an entry with the specified key; otherwise, false.

This implementation is close to O(1) in most cases. The key to locate in the System.Collections.Specialized.ListDictionary.

CopyTo

[C#] public void CopyTo(Array array, int index);

[C++] public: _sealed void CopyTo(Array* array, int index);

[VB] NotOverridable Public Sub CopyTo(ByVal array As Array, ByVal index As Integer)

[JScript] public function CopyTo(array: Array, index: int);

Description

Copies the System.Collections.Specialized.ListDictionary entries to a one-dimensional System.Array instance at the specified index.

The elements are copied to the System.Array in the same order in which the enumerator iterates through the System.Collections.Specialized.ListDictionary. The one-dimensional System.Array that is the destination of the System.Collections.DictionaryEntry objects copied from System.Collections.Specialized.ListDictionary. The System.Array must have zero-based indexing. The zero-based index in array at which copying begins.

GetEnumerator

[C#] public IDictionaryEnumerator GetEnumerator( );

[C++] public: _sealed IDictionaryEnumerator* GetEnumerator( );

[VB] NotOverridable Public Function GetEnumerator( ) As IDictionaryEnumerator

[JScript] public function GetEnumerator( ): IDictionaryEnumerator;

Description

Returns an enumerator that can iterate through the System.Collections.Specialized.ListDictionary.

Return Value: An System.Collections.IDictionary-Enumerator for the System.Collections.Specialized. ListDictionary.

Enumerators are intended to be used only to read data in the collection. Enumerators cannot be used to modify the underlying collection.

Remove

[C#] public void Remove(object key);

[C++] public: _sealed void Remove(Object* key); [VB] NotOverridable Public Sub Remove(ByVal key As Object)

[JScript] public function Remove(key: Object);

Description

Removes the entry with the specified key from the System. Collections.Specialized.ListDictionary.

If the System.Collections.Specialized.ListDictionary does not contain an element with the specified key, the System. Collections.Specialized.ListDictionary remains unchanged. No exception is thrown. The key of the entry to remove.

IEnumerable.GetEnumerator

[C#] IEnumerator IEnumerable.GetEnumerator( );

[C++] IEnumerator* IEnumerable::GetEnumerator( );

[VB] Function GetEnumerator( ) As IEnumerator Implements IEnumerable.GetEnumerator

[JScript] function IEnumerable.GetEnumerator( ): IEnumerator;

NameObjectCollectionBase class (System.Collections. Specialized)

ToString

Description

Provides the abstract base class for a sorted collection of associated System.String keys and System.Object values that can be accessed either with the key or with the index.

The underlying structure for this class is a hashtable.

NameObjectCollectionBase

Example Syntax:

ToString

[C#] protected NameObjectCollectionBase( );

[C++] protected: NameObjectCollectionBase( );

[VB] Protected Sub New( )

[JScript] protected function NameObjectCollectionBase( ); Initializes a new instance of the System.Collections.Specialized.NameObjectCollectionBase class.

Description

Initializes a new instance of the System.Collections.Specialized.NameObjectCollectionBase class that is empty.

The capacity is the number of key-and-value pairs that the System.Collections.Specialized.NameObject CollectionBaseinstancecancontain.Thedefaultinitialcapacity is zero. The capacity is automatically increased as required.

NameObjectCollectionBase

Example Syntax:

ToString

[C#] protected NameObjectCollectionBase(int capacity);

[C++] protected: NameObjectCollectionBase(int capacity);

[VB] Protected Sub New(ByVal capacity As Integer)

[JScript] protected function NameObjectCollectionBase(capacity: int);

Description

Initializes a new instance of the System.Collections.Specialized.NameObjectCollectionBase class that is empty and has the specified initial capacity.

The capacity is the number of key-and-value pairs that the System.Collections.Specialized.NameObject Collection-Base instance can contain. Specifying the initial capacity eliminates the need to perform a number of resizing operations while entries are added to the System.Collections.Specialized.NameObjectCollectionBase instance. The capacity is automatically increased as required. The approximate number of entries that the System.Collections.Specialized. NameObjectCollectionBase instance can initially contain.

NameObjectCollectionBase

Example Syntax:

ToString

[C#] protected NameObjectCollectionBase(IHashCodeProvider hashProvider, IComparer comparer);

[C++] protected: NameObjectCollectionBase(IHashCodeProvider* hashProvider, IComparer* comparer);

[VB] Protected Sub New(ByVal hashProvider As IHashCodeProvider, ByVal comparer As IComparer)

[JScript] protected function NameObjectCollectionBase (hashProvider: IHashCodeProvider, comparer: IComparer);

Description

Initializes a new instance of the System.Collections.Specialized.NameObjectCollectionBase class that is empty and uses the specified hash code provider and the specified comparer.

The capacity is the number of key-and-value pairs that the System.Collections.Specialized.NameObjectCollection Base instance can contain. The default initial capacity is zero. The capacity is automatically increased as required. The System.Collections.IHashCodeProvider that will supply the hash codes for all keys in the System.Collections.Specialized.NameObjectCollectionBase instance. The System.Collections.IComparer to use to determine whether two keys are equal.

NameObjectCollectionBase

Example Syntax:

ToString

[C#] protected NameObjectCollectionBase(SerializationInfo info, StreamingContext context);

[C++] protected: NameObjectCollectionBase(SerializationInfo* info, StreamingContext context);

[VB] Protected Sub New(ByVal info As SerializationInfo, ByVal context As StreamingContext)

[JScript] protected function NameObjectCollectionBase (info: SerializationInfo, context: StreamingContext);

Description

Initializes a new instance of the System.Collections.Specialized.NameObjectCollectionBase class that is serializable and uses the specified System.Runtime.Serialization. SerializationInfo and System.Runtime.Serialization. StreamingContext. A System.Runtime.Serialization.SerializationInfo object that contains the information required to serialize the new System.Collections.Specialized. NameObjectCollectionBase instance. A System.Run time.Serialization.StreamingContext object that contains the source and destination of the serialized stream associated with the new System.Collections.Specialized.Name ObjectCollectionBase instance.

NameObjectCollectionBase

Example Syntax:

ToString

[C#] protected NameObjectCollectionBase(int capacity, IHashCodeProvider hashProvider, IComparer comparer);

[C++] protected: NameObjectCollectionBase(int capacity, IHashCodeProvider* hashProvider, IComparer* comparer);

[VB] Protected Sub New(ByVal capacity As Integer, ByVal hashProvider As IHashCodeProvider, ByVal comparer As IComparer)

[JScript] protected function NameObjectCollectionBase(capacity: int, hashProvider: IHashCodeProvider, comparer: IComparer);

Description

Initializes a new instance of the System.Collections.Specialized.NameObjectCollectionBase class that is empty, has the specified initial capacity and uses the specified case-insensitive hash code provider and the specified case-insensitive comparer.

The capacity is the number of key-and-value pairs that the System.Collections.Specialized.NameObject CollectionBase instance can contain. Specifying the initial capacity eliminates the need to perform a number of resizing operations while entries are added to the System.Collections.Specialized.NameObjectCollectionBase instance. The capacity is automatically increased as required. The approximate number of entries that the System.Collections.Specialized.NameObjectCollectionBase instance can initially contain. The case-insensitive System.Collections.IHashCodeProvider that will supply the hash codes for all keys in the System.Collections.Specialized.NameObjectCollectionBase instance. The case-insensitive System.Collections.IComparer to use to determine whether two keys are equal.

Count

ToString

[C#] public virtual int Count {get;}

[C++] public: _property virtual int get_Count( );

[VB] Overridable Public ReadOnly Property Count As Integer

[JScript] public function get Count( ): int;

Description

Gets the number of key-and-value pairs contained in the System.Collections.Specialized.NameObject CollectionBase instance.

IsReadOnly

ToString

[C#] protected bool IsReadOnly {get; set;}

[C++] protected: _property bool get_IsReadOnly( );protected: _property void set_IsReadOnly(bool);

[VB] Protected Property IsReadOnly As Boolean

[JScript] protected function get IsReadOnly( ): Boolean;protected function set IsReadOnly(Boolean);

Description

Gets or sets a value indicating whether the System.Collections.Specialized.NameObjectCollectionBase instance is read-only.

Keys

ToString

[C#] public virtual NameObjectCollectionBase.KeysCollection Keys {get;}

[C++] public: _property virtual NameObjectCollectionBase.KeysCollection* get_Keys( );

[VB] Overridable Public ReadOnly Property Keys As NameObjectCollectionBase.KeysCollection

[JScript] public function get Keys( ): NameObjectCollectionBase.KeysCollection;

Description

Gets a System.Collections.Specialized.Name ObjectCollectionBase.KeysCollection instance that contains all the keys in the System.Collections.Specialized. NameObjectCollectionBase instance.

BaseAdd

[C#] protected void BaseAdd(string name, object value);

[C++] protected: void BaseAdd(String* name, Object* value);

[VB] Protected Sub BaseAdd(ByVal name As String, ByVal value As Object)

[JScript] protected function BaseAdd(name: String, value: Object);

Description

Adds an entry with the specified key and value into the System.Collections.Specialized.NameObject CollectionBase instance. The System.String key of the entry to add. The key can be null. The System.Object value of the entry to add. The value can be null.

BaseClear

[C#] protected void BaseClear( );

[C++] protected: void BaseClear( );

[VB] Protected Sub BaseClear( )

[JScript] protected function BaseClear( );

Description

Removes all entries from the System.Collections.Specialized.NameObjectCollectionBase instance.

System.Collections.Specialized.NameObject CollectionBase.Count is set to zero.

BaseGet

[C#] protected object BaseGet(int index);

[C++] protected: Object* BaseGet(int index);

[VB] Protected Function BaseGet(ByVal index As Integer) As Object

[JScript] protected function BaseGet(index: int): Object;

Description

Gets the value of the entry at the specified index of the System.Collections.Specialized.NameObject CollectionBase instance.

Return Value: An System.Object that represents the value of the entry at the specified index. The zero-based index of the value to get.

BaseGet

[C#] protected object BaseGet(string name);

[C++] protected: Object* BaseGet(String* name);

[VB] Protected Function BaseGet(ByVal name As String) As Object

[JScript] protected function BaseGet(name: String): Object; Gets the value of the specified entry from the System.Collections.Specialized.NameObjectCollectionBase instance.

Description

Gets the value of the first entry with the specified key from the System.Collections.Specialized.NameObject CollectionBase instance.

Return Value: An System.Object that represents the value of the first entry with the specified key, if found; otherwise, null.

If the collection contains multiple entries with the specified key, this method returns only the first entry. To get the values of subsequent entries with the same key, use the enumerator to iterate through the collection and compare the keys. The System.String key of the entry to get. The key can be null.

BaseGetAllKeys

[C#] protected string[ ] BaseGetAllKeys( );

[C++] protected: String* BaseGetAllKeys( ) _gc[ ];

[VB] Protected Function BaseGetAllKeys( ) As String( )

[JScript] protected function BaseGetAllKeys( ): String[ ];

Description

Returns a System.String array that contains all the keys in the System.Collections.Specialized.NameObjectCollectionBase instance.

Return Value: A System.String array that contains all the keys in the System.Collections.Specialized.NameObjectCollectionBase instance.

BaseGetAllValues

[C#] protected object[ ] BaseGetAllValues( );

[C++] protected: Object* BaseGetAllValues( ) _gc[ ];

[VB] Protected Function BaseGetAllValues( ) As Object( )

[JScript] protected function BaseGetAllValues( ): Object[ ];

Returns an array that contains all the values in the System.Collections.Specialized.NameObjectCollectionBase instance.

Description

Returns an System.Object array that contains all the values in the System.Collections.Specialized.NameObjectCollectionBase instance.

Return Value: An System.Object array that contains all the values in the System.Collections.Specialized. NameObjectCollectionBase instance.

BaseGetAllValues

[C#] protected object[ ] BaseGetAllValues(Type type);

[C++] protected: Object* BaseGetAllValues(Type* type) _gc[ ];

[VB] Protected Function BaseGetAllValues(ByVal type As Type) As Object( )

[JScript] protected function BaseGetAllValues(type: Type): Object[ ];

Description

Returns an array of the specified type that contains all the values in the System.Collections.Specialized. NameObjectCollectionBase instance.

Return Value: An array of the specified type that contains all the values in the System.Collections.Specialized. NameObjectCollectionBase instance. A System.Type that represents the type of array to return.

BaseGetKey

[C#] protected string BaseGetKey(int index);

[C++] protected: String* BaseGetKey(int index);

[VB] Protected Function BaseGetKey(ByVal index As Integer) As String

[JScript] protected function BaseGetKey(index: int): String;

Description

Gets the key of the entry at the specified index of the System.Collections.Specialized.NameObjectCollection Base instance.

Return Value: A System.String that represents the key of the entry at the specified index. The zero-based index of the key to get.

BaseHasKeys

[C#] protected bool BaseHasKeys( );

[C++] protected: bool BaseHasKeys( );

[VB] Protected Function BaseHasKeys( ) As Boolean

[JScript] protected function BaseHasKeys( ): Boolean;

Description

Gets a value indicating whether the System.Collections. Specialized.NameObjectCollectionBase instance contains entries whose keys are not null.

Return Value: true if the System.Collections.Specialized. NameObjectCollectionBase instance contains entries whose keys are not null; otherwise, false.

BaseRemove

[C#] protected void BaseRemove(string name);

[C++] protected: void BaseRemove(String* name);

[VB] Protected Sub BaseRemove(ByVal name As String)

[JScript] protected function BaseRemove(name: String);

Removes the specified entries from the System.Collections.Specialized.NameObjectCollectionBase instance.

Description

Removes the entries with the specified key from the System.Collections.Specialized.NameObjectCollectionBase instance.

In collections such as lists, queues and stacks, the elements that follow the removed element move up to occupy the vacated spot. The System.String key of the entries to remove. The key can be null.

BaseRemoveAt

[C#] protected void BaseRemoveAt(int index);

[C++] protected: void BaseRemoveAt(int index);

[VB] Protected Sub BaseRemoveAt(ByVal index As Integer)

[JScript] protected function BaseRemoveAt(index: int);

Description

Removes the entry at the specified index of the System.Collections.Specialized.NameObjectCollectionBase instance.

In collections such as lists, queues and stacks, the elements that follow the removed element move up to occupy the vacated spot. The zero-based index of the entry to remove.

BaseSet

[C#] protected void BaseSet(int index, object value);

[C++] protected: void BaseSet(int index, Object* value);

[VB] Protected Sub BaseSet(ByVal index As Integer, ByVal value As Object)

[JScript] protected function BaseSet(index: int, value: Object);

Description

Sets the value of the entry at the specified index of the System.Collections.Specialized.NameObjectCollectionBase instance. The zero-based index of the entry to set. The System.Object that represents the new value of the entry to set. The value can be null.

BaseSet

[C#] protected void BaseSet(string name, object value);

[C++] protected: void BaseSet(String* name, Object* value);

[VB] Protected Sub BaseSet(ByVal name As String, ByVal value As Object)

[JScript] protected function-BaseSet(name: String, value: Object); Sets the value of an entry in the System.Collections.Specialized.NameObjectCollectionBase instance.

Description

Sets the value of the first entry with the specified key in the System.Collections.Specialized.NameObjectCollectionBase instance, if found; otherwise, adds an entry with the specified key and value into the System.Collections.Specialized.NameObjectCollectionBase instance.

If the collection contains multiple entries with the specified key, this method sets only the first entry. To set the values of subsequent entries with the same key, use the enumerator to iterate through the collection and compare the keys. The System.String key of the entry to set. The key can be null. The System.Object that represents the new value of the entry to set. The value can be null.

GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Returns an enumerator that can iterate through the System.Collections.Specialized.NameObjectCollectionBase.

Return Value: An System.Collections.IEnumerator for the System.Collections.Specialized.NameObjectCollectionBase instance.

This enumerator returns the keys of the collection as strings.

GetObjectData

[C#] public virtual void GetObjectData(SerializationInfo info, StreamingContext context);

[C++] public: virtual void GetObjectData(SerializationInfo* info, StreamingContext context);

[VB] Overridable Public Sub GetObjectData(ByVal info As SerializationInfo, ByVal context As StreamingContext)

[JScript] public function GetObjectData(info: SerializationInfo, context: StreamingContext);

Description

Implements the System.Runtime.Serialization.ISerializable interface and returns the data needed to serialize the System.Collections.Specialized.NameObjectCollectionBase instance. A System.Runtime.Serialization.SerializationInfo object that contains the information required to serialize the System.Collections.Specialized.NameObjectCollectionBase instance. A System.Run time.Serialization.StreamingContext object that contains the source and destination of the serialized stream associated with the System.Collections.Specialized. NameObjectCollectionBase instance.

OnDeserialization

[C#] public virtual void OnDeserialization(object sender);

[C++] public: virtual void OnDeserialization(Object* sender);

[VB] Overridable Public Sub OnDeserialization(ByVal sender As Object)

[JScript] public function OnDeserialization(sender: Object);

Description

Implements the System.Runtime.Serialization.ISerializable interface and raises the deserialization event when the deserialization is complete. The source of the deserialization event.

ICollection.CopyTo

[C#] void ICollection.CopyTo(Array array, int index);

[C++] void ICollection::CopyTo(Array* array, int index);

[VB] Sub CopyTo(ByVal array As Array, ByVal index As Integer) Implements ICollection.CopyTo

[JScript] function ICollection.CopyTo(array: Array, index: int);

NameValueCollection class (System.Collections.Specialized)

ToString

Description

Represents a sorted collection of associated System.String keys and System.String values that can be accessed either with the key or with the index.

This collection is based on the System.Collections.Specialized.NameObjectCollectionBase class. However, unlike the System.Collections.Specialized. NameObjectCollectionBase, this class stores multiple string values under a single key.

NameValueCollection

Example Syntax:

ToString

[C#] public NameValueCollection( );

[C++] public: NameValueCollection( );

[VB] Public Sub New( )

[JScript] public function NameValueCollection( ); Initializes a new instance of the System.Collections.Specialized.NameValueCollection class.

Description

Initializes a new instance of the System.Collections.Specialized.NameValueCollection class that is empty, has the default initial capacity and uses the default case-insensitive hash code provider and the default case-insensitive comparer.

The capacity is the number of key-and-value pairs that the System.Collections.Specialized.NameValueCollection can contain. The default initial capacity is zero. The capacity is automatically increased as required.

NameValueCollection

Example Syntax:

ToString

[C#] public NameValueCollection(int capacity);

[C++] public: NameValueCollection(int capacity);

[VB] Public Sub New(ByVal capacity As Integer)

[JScript] public function NameValueCollection(capacity: int);

Description

Initializes a new instance of the System.Collections.Specialized.NameValueCollection class that is empty, has the specified initial capacity and uses the default case-insensitive hash code provider and the default case-insensitive comparer.

The capacity is the number of key-and-value pairs that the System.Collections.Specialized.NameValueCollection can contain. The default initial capacity is zero. The capacity is automatically increased as required. The initial number of entries that the System.Collections.Specialized. NameValueCollection can contain.

NameValueCollection

Example Syntax:

ToString

[C#] public NameValueCollection(NameValueCollection col);

[C++] public: NameValueCollection(NameValueCollection* col);

[VB] Public Sub New(ByVal col As NameValueCollection)

[JScript] public function NameValueCollection(col: NameValueCollection);

Description

Copies the entries from the specified System.Collections.Specialized.NameValueCollection to a new System.Collections.Specialized.NameValueCollection with the same initial capacity as the number of entries copied and using the same hash code provider and the same comparer as the source collection.

The capacity is the number of key-and-value pairs that the System.Collections.Specialized.NameValueCollection can contain. The default initial capacity is zero. The capacity is automatically increased as required. The System.Collections.Specialized.NameValueCollection to copy to the new System.Collections.Specialized.NameValueCollection instance.

NameValueCollection

Example Syntax:

ToString

[C#] public NameValueCollection(IHashCodeProvider hashProvider, IComparer comparer);

[C++] public: NameValueCollection(IHashCodeProvider* hashProvider, IComparer* comparer);

[VB] Public Sub New(ByVal hashProvider As IHashCodeProvider, ByVal comparer As IComparer)

[JScript] public function NameValueCollection(hashProvider: IHashCodeProvider, comparer: IComparer);

Description

Initializes a new instance of the System.Collections.Specialized.NameValueCollection class that is empty, has the default initial capacity and uses the specified hash code provider and the specified comparer.

The capacity is the number of key-and-value pairs that the System.Collections.Specialized.NameValueCollection can contain. The default initial capacity is zero. The capacity is automatically increased as required. The System.Collections.IHashCodeProvider that will supply the hash codes for all keys in the System.Collections.Specialized.NameValueCollection. The System.Collections.IComparer to use to determine whether two keys are equal.

NameValueCollection

Example Syntax:

ToString

[C#] public NameValueCollection(int capacity, NameValueCollection col);

[C++] public: NameValueCollection(int capacity, NameValueCollection* col);

[VB] Public Sub New(ByVal capacity As Integer, ByVal col As NameValueCollection)

[JScript] public function NameValueCollection(capacity: int, col: NameValueCollection);

Description

Copies the entries from the specified System.Collections.Specialized.NameValueCollection to a new System.Collections.Specialized.NameValueCollection with the specified initial capacity or the same initial capacity as the number of entries copied, whichever is greater, and using the default case-insensitive hash code provider and the default case-insensitive comparer.

The capacity is the number of key-and-value pairs that the System.Collections.Specialized.NameValueCollection can contain. The default initial capacity is zero. The capacity is automatically increased as required. The initial number of entries that the System.Collections.Specialized. NameValueCollection can contain. The System.Collections.Specialized.NameValueCollection to copy to the new System.Collections.Specialized.NameValueCollection instance.

NameValueCollection

Example Syntax:

ToString

[C#] protected NameValueCollection(SerializationInfo info, StreamingContext context);

[C++] protected: NameValueCollection(SerializationInfo* info, StreamingContext context);

[VB] Protected Sub New(ByVal info As SerializationInfo, ByVal context As StreamingContext)

[JScript] protected function NameValueCollection(info: SerializationInfo, context: StreamingContext);

Description

Initializes a new instance of the System.Collections.Specialized.NameValueCollection class that is serializable and uses the specified System.Runtime.Serialization.SerializationInfo and System.Runtime.Serialization.StreamingContext. A System.Runtime.Serialization.SerializationInfo object that contains the information required to serialize the new System.Collections.Specialized.NameValueCollection instance. A System.Runtime.Serialization.StreamingContext object that contains the source and destination of the serialized stream associated with the new System.Collections.Specialized.NameValueCollection instance.

NameValueCollection

Example Syntax:

ToString

[C#] public NameValueCollection(int capacity, IHashCodeProvider hashProvider, IComparer comparer);

[C++] public: NameValueCollection(int capacity, IHashCodeProvider* hashProvider, IComparer* comparer);

[VB] Public Sub New(ByVal capacity As Integer, ByVal hashProvider As IHashCodeProvider, ByVal comparer As IComparer)

[JScript] public function NameValueCollection(capacity: int, hashProvider: IHashCodeProvider, comparer: IComparer);

Description

Initializes a new instance of the System.Collections.Specialized.NameValueCollection class that is empty, has the specified initial capacity and uses the specified hash code provider and the specified comparer.

The capacity is the number of key-and-value pairs that the System.Collections.Specialized.NameValueCollection can contain. The default initial capacity is zero. The capacity is automatically increased as required. The initial number of entries that the System.Collections.Specialized. NameValueCollection can contain. The System.Collections.IHashCodeProvider that will supply the hash codes for all keys in the System.Collections.Specialized.NameValueCollection. The System.Collections.IComparer to use to determine whether two keys are equal.

AllKeys

ToString

[C#] public virtual string[ ] AllKeys {get;}

[C++] public: _property virtual String* get_AllKeys( );

[VB] Overridable Public ReadOnly Property AllKeys As String( )

[JScript] public function get AllKeys( ): String[ ];

Description

Gets all the keys in the System.Collections.Specialized.NameValueCollection.

If the collection is empty, this method returns an empty System.String array, not null.

Count

IsReadOnly

Item

ToString

Description

Gets the entry at the specified index of the System.Collections.Specialized.NameValueCollection.

This property provides the ability to access a specific element in the collection by using the following syntax: my Collection[index]. The zero-based index of the entry to locate in the collection.

Item

ToString

[C#] public string this[string name] {get; set;}

[C++] public: _property String* get_Item(String* name); public: _property void set_Item(String* name, String*);

[VB] Public Default Property Item(ByVal name As String) As String

[JScript] returnValue=NameValueCollectionObject.Item(name); NameValueCollectionObject.Item(name)=returnValue; Gets or sets the specified entry of the System.Collections.Specialized.NameValueCollection.

Description

Gets or sets the entry with the specified key in the System.Collections.Specialized.NameValueCollection.

This property provides the ability to access a specific element in the collection by using the following syntax: my Collection[name]. The System.String key of the entry to locate. The key can be null.

Keys

Add

[C#] public void Add(NameValueCollection c);

[C++] public: void Add(NameValueCollection* c);

[VB] Public Sub Add(ByVal c As NameValueCollection)

[JScript] public function Add(c: NameValueCollection); Adds entries to the current System.Collections.Specialized.NameValueCollection.

Description

Copies the entries in the specified System.Collections.Specialized.NameValueCollection to the current System.Collections.Specialized.NameValueCollection.

If a key in c already exists in the target System.Collections. Specialized.NameValueCollection instance, the associated value in c is added to the existing comma-separated list of values associated with the same key in the target System. Collections.Specialized.NameValueCollection instance. The System.Collections.Specialized.NameValueCollection to copy to the current System.Collections.Specialized. NameValueCollection.

Add

[C#] public virtual void Add(string name, string value);

[C++] public: virtual void Add(String* name, String* value);

[VB] Overridable Public Sub Add(ByVal name As String, ByVal value As String)

[JScript] public function Add(name: String, value: String);

Description

Adds an entry with the specified name and value to the System.Collections.Specialized.NameValueCollection.

If the specified key already exists in the target System. Collections.Specialized.NameValueCollection instance, the specified value is added to the existing comma-separated list of values associated with the same key in the target System.Collections.Specialized.NameValueCollection instance. The System.String key of the entry to add. The key can be null. The System.String value of the entry to add. The value can be null.

Clear

[C#] public void Clear( );

[C++] public: void Clear( );

[VB] Public Sub Clear( )

[JScript] public function Clear( );

Description

Invalidates the cached arrays and removes all entries from the System.Collections.Specialized.NameValueCollection.

CopyTo

[C#] public void CopyTo(Array dest, int index);

[C++] public: void CopyTo(Array* dest, int index);

[VB] Public Sub CopyTo(ByVal dest As Array, ByVal index As Integer)

[JScript] public function CopyTo(dest: Array, index: int);

Description

Copies the entire System.Collections.Specialized. NameValueCollection to a compatible one-dimensional System.Array, starting at the specified index of the target array.

The specified array must be of a compatible type. The one-dimensional System.Array that is the destination of the elements copied from System.Collections.Specialized. NameValueCollection. The System.Array must have zero-based indexing. The zero-based index in dest at which copying begins.

Get

[C#] public virtual string Get(int index);

[C++] public: virtual String* Get(int index);

[VB] Overridable Public Function Get(ByVal index As Integer) As String

[JScript] public function Get(index: int): String;

Description

Gets the values at the specified index of the System.Collections.Specialized.NameValueCollection combined into one comma-separated list.

Return Value: A System.String that contains a comma-separated list of the values at the specified index of the System. Collections.Specialized.NameValueCollection, if found; otherwise, null. The zero-based index of the entry that contains the values to get from the collection.

Get

[C#] public virtual string Get(string name);

[C++] public: virtual String* Get(String* name);

[VB] Overridable Public Function Get(ByVal name As String) As String

[JScript] public function Get(name: String): String; Gets the values of a specified entry in the System.Collections.Specialized.NameValueCollection combined into one comma-separated list.

Description

Gets the values associated with the specified key from the System.Collections.Specialized.NameValueCollection combined into one comma-separated list.

Return Value: A System.String that contains a comma-separated list of the values associated with the specified key from the System.Collections.Specialized.NameValueCollection, if found; otherwise, null. The System.String key of the entry that contains the values to get. The key can be null.

GetKey

[C#] public virtual string GetKey(int index);

[C++] public: virtual String* GetKey(int index);

[VB] Overridable Public Function GetKey(ByVal index As Integer) As String

[JScript] public function GetKey(index: int): String;

Description

Gets the key at the specified index of the System.Collections.Specialized.NameValueCollection.

Return Value: A System.String that contains the key at the specified index of the System.Collections.Specialized. NameValueCollection, if found; otherwise, null. The zero-based index of the key to get from the collection.

GetValues

[C#] public virtual string[ ] GetValues(int index);

[C++] public: virtual String* GetValues(int index) _gc[ ];

[VB] Overridable Public Function GetValues(ByVal index As Integer) As String( )

[JScript] public function GetValues(index: int): String[ ];

Description

Gets the values at the specified index of the System.Collections.Specialized.NameValueCollection.

Return Value: A System.String array that contains the values at the specified index of the System.Collections.Specialized. NameValueCollection, if found; otherwise, null. The zero-based index of the entry that contains the values to get from the collection.

GetValues

[C#] public virtual string[ ] GetValues(string name);

[C++] public: virtual String* GetValues(String* name) _gc[ ];

[VB] Overridable Public Function GetValues(ByVal name As String) As String( )

[JScript] public function GetValues(name: String): String[ ];

Gets the values of a specified entry in the System.Collections.Specialized.NameValueCollection.

Description

Gets the values associated with the specified key from the System.Collections.Specialized.NameValueCollection.

Return Value: A System.String array that contains the values associated with the specified key from the System.Collections.Specialized.NameValueCollection, if found; otherwise, null. The System.String key of the entry that contains the values to get. The key can be null.

HasKeys

[C#] public bool HasKeys( );

[C++] public: bool HasKeys( );

[VB] Public Function HasKeys( ) As Boolean

[JScript] public function HasKeys( ): Boolean;

Description

Gets a value indicating whether the System.Collections.Specialized.NameValueCollection contains keys that are not null.

Return Value: true if the System.Collections.Specialized.NameValueCollection contains keys that are not null; otherwise, false.

InvalidateCachedArrays

[C#] protected void InvalidateCachedArrays( );

[C++] protected: void InvalidateCachedArrays( );

[VB] Protected Sub InvalidateCachedArrays( )

[JScript] protected function InvalidateCachedArrays( );

Description

Resets the cached arrays of the collection to null.

The arrays returned by System.Collections.Specialized.NameValueCollection.AllKeys are cached for better performance and are automatically refreshed when the collection changes. A derived class can invalidate the cached version by calling System.Collections.Specialized.NameValueCollection.InvalidateCachedArrays, thereby forcing the arrays to be recreated.

Remove

[C#] public virtual void Remove(string name);

[C++] public: virtual void Remove(String* name);

[VB] Overridable Public Sub Remove(ByVal name As String)

[JScript] public function Remove(name: String);

Description

Removes the entries with the specified key from the System.Collections.Specialized.NameObjectCollectionBase instance.

In collections such as lists, queues and stacks, the elements that follow the removed element move up to occupy the vacated spot. The System.String key of the entry to remove. The key can be null.

Set

[C#] public virtual void Set(string name, string value);

[C++] public: virtual void Set(String* name, String* value);

[VB] Overridable Public Sub Set(ByVal name As String, ByVal value As String)

[JScript] public function Set(name: String, value: String);

Description

Sets the value of an entry in the System.Collections.Specialized.NameValueCollection.

If the specified key already exists in the collection, this method overwrites the existing values with the specified value. To add the new value to the existing list of values, use the System.Collections.Specialized.NameValueCollection.Add(System.Collections.Specialized.NameValueCollection) method. The System.String key of the entry to add the new value to. The key can be null. The System.Object that represents the new value to add to the specified entry. The value can be null.

BitVector32.Section structure (System.Collections.Specialized)

ToString

Description

Represents an section of the vector that can contain a integer number.

Use System.Collections.Specialized.BitVector32.CreateSection (System.Int16) to define a new section. A System.Collections.Specialized.BitVector32.Section is a window into the System.Collections.Specialized. BitVector32 and is composed of the smallest number of consecutive bits that can contain the maximum value specified in System.Collections.Specialized.BitVector32.CreateSection (System.Int16). For example, a section with a maximum value of 1 is composed of only one bit, whereas a section with a maximum value of 5 is composed of three bits. You can create a System.Collections.Specialized.BitVector32.Section with a maximum value of 1 to serve as a Boolean, thereby allowing you to store integers and Booleans in the same System.Collections.Specialized.BitVector32.

Mask

ToString

[C#] public short Mask {get;}

[C++] public: _property short get_Mask( );

[VB] Public ReadOnly Property Mask As Short

[JScript] public function get Mask( ): Int16;

Description

Offset

ToString

[C#] public short Offset {get;}

[C++] public: _property short get_Offset( );

[VB] Public ReadOnly Property Offset As Short

[JScript] public function get Offset( ): Int16;

Description

Equals

[C#] public override bool Equals(object o);

[C++] public: bool Equals(Object* o);

[VB] Overrides Public Function Equals(ByVal o As Object) As Boolean

[JScript] public override function Equals(o: Object): Boolean;

Description

GetHashCode

[C#] public override int GetHashCode( );

[C++] public: int GetHashCode( );

[VB] Overrides Public Function GetHashCode( ) As Integer
[JScript] public override function GetHashCode( ): int;

Description
ToString
[C#] public override string ToString( );
[C++] public: String* ToString( );
[VB] Overrides Public Function ToString( ) As String
[JScript] public override function ToString( ): String;

Description
ToString
[C#] public static string ToString(BitVector32.Section value);
[C++] public: static String* ToString(BitVector32.Section value);
[VB] Public Shared Function ToString(ByVal value As BitVector32.Section) As String
[JScript] public static function ToString(value: BitVector32.Section): String;

Description
StringCollection class (System.Collections.Specialized)
ToString

Description
Represents a collection of strings.
Duplicate strings are allowed in System.Collections.Specialized.StringCollection.
StringCollection
Example Syntax:
ToString
[C#] public StringCollection( );
[C++] public: StringCollection( );
[VB] Public Sub New( )
[JScript] public function StringCollection( );
Count
ToString
[C#] public int Count {get;}
[C++] public: _property int get_Count( );
[VB] Public ReadOnly Property Count As Integer
[JScript] public function get Count( ): int;

Description
Gets the number of strings contained in the System.Collections.Specialized.StringCollection.
IsReadOnly
ToString
[C#] public bool IsReadOnly {get;}
[C++] public: _property bool get_IsReadOnly( );
[VB] Public ReadOnly Property IsReadOnly As Boolean
[JScript] public function get IsReadOnly( ): Boolean;

Description
Gets a value indicating whether the System.Collections.Specialized.StringCollection is read-only.
System.Collections.Specialized.StringCollection implements the System.Collections.Specialized.String Collection.IsReadOnly property because it is required by the interface.
IsSynchronized
ToString
[C#] public bool IsSynchronized {get;}
[C++] public: _property bool get_IsSynchronized( );
[VB] Public ReadOnly Property IsSynchronized As Boolean
[JScript] public function get IsSynchronized( ): Boolean;

Description
Gets a value indicating whether access to the System.Collections.Specialized.StringCollection is synchronized (thread-safe).
System.Collections.Specialized.StringCollection implements the System.Collections.Specialized.String Collection.IsSynchronized property because it is required by the interface.
Item
ToString
[C#] public string this[int index] {get; set;}
[C++] public: _property String* get_Item(int index); public: _property void set_Item(int index, String*);
[VB] Public Default Property Item(ByVal index As Integer) As String
[JScript] returnValue=StringCollectionObject.Item(index); StringCollectionObject.Item(index)=returnValue;

Description
Gets or sets the element at the specified index.
This property provides the ability to access a specific element in the collection by using the following syntax: my Collection[index]. The zero-based index of the entry to get or set.
SyncRoot
ToString
[C#] public object SyncRoot {get;}
[C++] public: _property Object* get SyncRoot( );
[VB] Public ReadOnly Property SyncRoot As Object
[JScript] public function get SyncRoot( ): Object;

Description
Gets an object that can be used to synchronize access to the System.Collections.Specialized.StringCollection.
Derived classes can provide their own synchronized version of the System.Collections.Specialized.StringCollection using the System.Collections.Specialized.String Collection.SyncRoot property. The synchronizing code must perform operations on the System.Collections.Specialized. StringCollection.SyncRoot of the System.Collections.Specialized.StringCollection, not directly on the System.Collections.Specialized.StringCollection. This ensures proper operation of collections that are derived from other objects. Specifically, it maintains proper synchronization with other threads that might be simultaneously modifying the System. Collections.Specialized.StringCollection object.
Add
[C#] public int Add(string value);
[C++] public: int Add(String* value);
[VB] Public Function Add(ByVal value As String) As Integer
[JScript] public function Add(value: String): int;

Description
Adds a string to the end of the System.Collections.Specialized.StringCollection.

Return Value: The zero-based index at which the new element is inserted.
Duplicate strings are allowed in System.Collections.Specialized.StringCollection. The string to add to the end of the System.Collections.Specialized.StringCollection.
AddRange
[C#] public void AddRange(string[ ] value);
[C++] public: void AddRange(String* value _gc[ ]);
[VB] Public Sub AddRange(ByVal value( ) As String)
[JScript] public function AddRange(value: String[ ]);

Description

Copies the elements of a string array to the end of the System.Collections.Specialized.StringCollection.

Duplicate strings are allowed in System.Collections.Specialized.StringCollection. An array of strings to add to the end of the System.Collections.Specialized.StringCollection.

Clear

[C#] public void Clear( );

[C++] public: _sealed void Clear( );

[VB] NotOverridable Public Sub Clear( )

[JScript] public function Clear( );

Description

Removes all the strings from the System.Collections.Specialized.StringCollection.

System.Collections.Specialized.StringCollection.Count is set to zero.

Contains

[C#] public bool Contains(string value);

[C++] public: bool Contains(String* value);

[VB] Public Function Contains(ByVal value As String) As Boolean

[JScript] public function Contains(value: String): Boolean;

Description

Determines whether the specified string is in the System.Collections.Specialized.StringCollection.

Return Value: true if value is found in the System.Collections.Specialized.StringCollection; otherwise, false.

The System.Collections.Specialized.String Collection.Contains(System.String) method can confirm the existence of a string before performing further operations. The string to locate in the System.Collections.Specialized.StringCollection.

CopyTo

[C#] public void CopyTo(string[ ] array, int index);

[C++] public: void CopyTo(String* array c[ ], int index);

[VB] Public Sub CopyTo(ByVal array( ) As String, ByVal index As Integer)

[JScript] public function CopyTo(array: String[ ], index: int);

Description

Copies the System.Collections.Specialized. StringCollection values to a compatible one-dimensional System.Array, starting at the specified index of the target array.

The specified array must be of a compatible type. The one-dimensional System.Array that is the destination of the values copied from System.Collections.Specialized. StringCollection. The System.Array must have zero-based indexing. The zero-based index in array at which copying begins.

GetEnumerator

[C#] public StringEnumerator GetEnumerator( );

[C++] public: StringEnumerator* GetEnumerator( );

[VB] Public Function GetEnumerator( ) As StringEnumerator

[JScript] public function GetEnumerator( ): StringEnumerator;

Description

Returns an enumerator that can iterate through the System.Collections.Specialized.StringCollection.

Return Value: An System.Collections.IEnumerator for the System.Collections.Specialized.StringCollection.

Enumerators are intended to be used only to read data in the collection. Enumerators cannot be used to modify the underlying collection.

IndexOf

[C#] public int IndexOf(string value);

[C++] public: int IndexOf(String* value);

[VB] Public Function IndexOf(ByVal value As String) As Integer

[JScript] public function IndexOf(value: String): int;

Description

Searches for the specified string and returns the zero-based index of the first occurrence within the System.Collections.Specialized.StringCollection.

Return Value: The zero-based index of the first occurrence of value in the System.Collections.Specialized. StringCollection, if found; otherwise, −1.

This method performs a linear search. On average, this is an O(n/2) operation, where n is System.Collections.Specialized.StringCollection.Count. The longest search is an O(n) operation, where n is System.Collections.Specialized.StringCollection.Count. The string to locate.

Insert

[C#] public void Insert(int index, string value);

[C++] public: void Insert(int index, String* value);

[VB] Public Sub Insert(ByVal index As Integer, ByVal value As String)

[JScript] public function Insert(index: int, value: String);

Description

Inserts a string into the System.Collections.Specialized.StringCollection at the specified index.

Duplicate strings are allowed in System.Collections.Specialized.StringCollection. The zero-based index at which value is inserted. The string to insert.

Remove

[C#] public void Remove(string value);

[C++] public: void Remove(String* value);

[VB] Public Sub Remove(ByVal value As String)

[JScript] public function Remove(value: String);

Description

Removes the first occurrence of a specific string from the System.Collections.Specialized.StringCollection.

Duplicate strings are allowed in System.Collections.Specialized.StringCollection. Only the first occurrence is removed. To remove all occurrences of the specified string, use RemoveAt(IndexOf(value)) repeatedly while System.Collections.Specialized.StringCollection.IndexOf(System.String) does not return−1. The string to remove from the System.Collections.Specialized.StringCollection.

RemoveAt

[C#] public void RemoveAt(int index);

[C++] public: _sealed void RemoveAt(int index);

[VB] NotOverridable Public Sub RemoveAt(ByVal index As Integer)

[JScript] public function RemoveAt(index: int);

Description

Removes the string at the specified index of the System.Collections.Specialized.StringCollection.

In collections such as lists, queues and stacks, the elements that follow the removed element move up to occupy the vacated spot. The zero-based index of the string to remove.

ICollection.CopyTo

[C#] void ICollection.CopyTo(Array array, it index);

[C++] void ICollection::CopyTo(Array* array, int index);

[VB] Sub CopyTo(ByVal array As Array, ByVal index As Integer) Implements ICollection.CopyTo

[JScript] function ICollection.CopyTo(array: Array, index: int);

IEnumerable.GetEnumerator

[C#] IEnumerator IEnumerable.GetEnumerator( );

[C++] IEnumerator* IEnumerable::GetEnumerator( );

[VB] Function GetEnumerator( ) As IEnumerator Implements IEnumerable.GetEnumerator
[JScript] function IEnumerable.GetEnumerator( ): IEnumerator;
IList.Add
[C#] int IList.Add(object value);
[C++] int IList::Add(Object* value);
[VB] Function Add(ByVal value As Object) As Integer Implements IList.Add
[JScript] function IList.Add(value: Object): int;
IList.Contains
[C#] bool IList.Contains(object value);
[C++] bool IList::Contains(Object* value); IList.Contains
[JScript] function IList.Contains(value: Object): Boolean;
IList.IndexOf
[C#] int IList.IndexOf(object value);
[C++] int IList::IndexOf(Object* value);
[VB] Function IndexOf(ByVal value As Object) As Integer Implements IList.IndexOf
[JScript] function IList.IndexOf(value: Object): int;
IList.Insert
[C#] void IList.Insert(int index, object value);
[C++] void IList::Insert(int index, Object* value);
[VB] Sub Insert(ByVal index As Integer, ByVal value As Object) Implements IList.Insert
[JScript] function IList.Insert(index: int, value: Object);
IList.Remove
[C#] void IList.Remove(object value);
[C++] void IList::Remove(Object* value);
[VB] Sub Remove(ByVal value As Object) Implements IList.Remove
[JScript] function IList.Remove(value: Object);
StringDictionary class (System.Collections. Specialized)
ToString Description Implements a hashtable with the key strongly typed to be a string rather than an object.

The key is handled in a case-insensitive manner; it will be translated to lower case before it is used with the string dictionary.

StringDictionary
Example Syntax:
ToString
[C#] public StringDictionary( );
[C++] public: StringDictionary( );
[VB] Public Sub New( )
[JScript] public function StringDictionary( );

Description

Initializes a new instance of the System.Collections.Specialized.StringDictionary class.

Count
ToString
[C#] public virtual int Count {get;}
[C++] public: _property virtual int get_Count( );
[VB] Overridable Public ReadOnly Property Count As Integer
[JScript] public function get Count( ): int;

Description

Gets the number of key-and-value pairs in the System.Collections.Specialized.StringDictionary.

IsSynchronized
ToString
[C#] public virtual bool IsSynchronized {get;}
[C++] public: _property virtual bool get_IsSynchronized( );
[VB] Overridable Public ReadOnly Property IsSynchronized As Boolean
[JScript] public function get IsSynchronized( ): Boolean;

Description

Indicates whether access to the System.Collections.Specialized.StringDictionary is synchronized (thread-safe). This property is read-only.

Item
ToString
[C#] public virtual string this[string key] {get; set;}
[C++] public: _property virtual String* get_Item(String* key);public: _property virtual void set_Item(String* key, String*);
[VB] Overridable Public Default Property Item(ByVal key As String) As String
[JScript] returnValue=StringDictionaryObject.Item(key); StringDictionaryObject.Item(key)=returnValue;

Description

Gets or sets the value associated with the specified key.

The key is handled in a case-insensitive manner; it will be translated to lower case before it is used. The key whose value to get or set.

Keys
ToString
[C#] public virtual ICollection Keys {get;}
[C++] public: _property virtual ICollection* get_Keys( );
[VB] Overridable Public ReadOnly Property Keys As ICollection
[JScript] public function get_Keys( ): ICollection;

Description

Gets a collection of keys in the System.Collections.Specialized.StringDictionary The order of the keys in the System.Collections.ICollection is unspecified, but it is the same order as the associated values in the System.Collections.ICollection returned by the System.Collections.Specialized.StringDictionary.Values method.

SyncRoot
ToString
[C#] public virtual object SyncRoot {get;}
[C++] public: _property virtual Object* get_SyncRoot( );
[VB] Overridable Public ReadOnly Property SyncRoot As Object
[JScript] public function get SyncRoot( ): Object;

Description

Gets an object that can be used to synchronize access to the System.Collections.Specialized.StringDictionary Values
ToString
[C#] public virtual ICollection Values {get;}
[C++] public: _property virtual ICollection* get_Values( );
[VB] Overridable Public ReadOnly Property Values As ICollection
[JScript] public function get Values( ): ICollection;

Description

Gets a collection of values in the System.Collections.Specialized.StringDictionary.

The order of the values in the System.Collections.ICollection is unspecified, but it is the same order as the associated keys in the System.Collections.ICollection returned by the System.Collections.Specialized.StringDictionary.Keys method.

Add
[C#] public virtual void Add(string key, string value);
[C++] public: virtual void Add(String* key, String* value);

[VB] Overridable Public Sub Add(ByVal key As String, ByVal value As String)

[JScript] public function Add(key: String, value: String);

Description

Adds an entry with the specified key and value into the System.Collections.Specialized.StringDictionary.

The key is handled in a case-insensitive manner; it will be translated to lower case before it is added to the string dictionary. The key of the entry to add. The value of the entry to add.

Clear

[C#] public virtual void Clear( );

[C++] public: virtual void Clear( );

[VB] Overridable Public Sub Clear( )

[JScript] public function Clear( );

Description

Removes all entries from the System.Collections.Specialized.StringDictionary.

ContainsKey

[C#] public virtual bool ContainsKey(string key);

[C++] public: virtual bool ContainsKey(String* key);

[VB] Overridable Public Function ContainsKey(ByVal key As String) As Boolean

[JScript] public function ContainsKey(key: String): Boolean;

Description

Determines if the string dictionary contains a specific key

Return Value: true if the System.Collections.Specialized. StringDictionary contains an entry with the specified key; otherwise, false.

This implementation is an O(1) operation. The key to locate in the System.Collections.Specialized. StringDictionary.

ContainsValue

[C#] public virtual bool ContainsValue(string value);

[C++] public: virtual bool ContainsValue(String* value);

[VB] Overridable Public Function ContainsValue(ByVal value As String) As Boolean

[JScript] public function ContainsValue(value: String): Boolean;

Description

Determines if the System.Collections.Specialized. StringDictionary contains a specific value.

Return Value: true if the System.Collections.Specialized. StringDictionary contains an element with the specified value; otherwise, false.

The values of the elements of the StringDictionary are compared to the specified value using the System.Object. Equals(System.Object) method. The value to locate in the System.Collections.Specialized.StringDictionary.

CopyTo

[C#] public virtual void CopyTo(Array array, int index);

[C++] public: virtual void CopyTo(Array* array, int index);

[VB] Overridable Public Sub CopyTo(ByVal array As Array, ByVal index As Integer)

[JScript] public function CopyTo(array: Array, index: int);

Description

Copies the string dictionary values to a one-dimensional System.Array instance at the specified index.

System.Collections.Specialized.StringDictionary.CopyTo (System.Array, System.Int32) only copies the values in the StringDictionary, not the keys. The one-dimensional System.Array that is the destination of the values copied from the System.Collections.Specialized.StringDictionary. The index in the array where copying begins.

GetEnumerator

[C#] public virtual IEnumerator GetEnumerator( );

[C++] public: virtual IEnumerator* GetEnumerator( );

[VB] Overridable Public Function GetEnumerator( ) As IEnumerator

[JScript] public function GetEnumerator( ): IEnumerator;

Description

Returns an enumerator that can iterate through the string dictionary.

Return Value: An System.Collections.IEnumerator that can iterate through the string dictionary.

The enumerator does not have exclusive access to the System.Collections.Specialized.StringDictionary; therefore, any changes made to the System.Collections.Specialized. StringDictionary can cause System.Collections.IEnumerator. Current or System.Collections.IEnumerator.MoveNext to throw an exception.

Remove

[C#] public virtual void Remove(string key);

[C++] public: virtual void Remove(String* key);

[VB] Overridable Public Sub Remove(ByVal key As String)

[JScript] public function Remove(key: String);

Description

Removes the entry with the specified key from the string dictionary.

The key is handled in a case-insensitive manner; it will be translated to lower case before it is used to find the entry to remove from the string dictionary. The key of the entry to remove.

StringEnumerator class (System.Collections.Specialized)

ToString

Description

Supports a simple iteration over a System.Collections.Specialized.StringCollection.

Enumerators are intended to be used only to read data in the collection. Enumerators cannot be used to modify the underlying collection.

Current

ToString

[C#] public string Current {get;}

[C++] public: _property String* get_Current( );

[VB] Public ReadOnly Property Current As String

[JScript] public function get Current( ): String;

Description

Gets the current element in the collection.

After an enumerator is created or after a System.Collections.Specialized.StringEnumerator.Reset, System.Collections.Specialized.StringEnumerator.MoveNext must be called to advance the enumerator to the first element of the collection before reading the value of System.Collections. Specialized.StringEnumerator.Current; otherwise, System. Collections.Specialized.StringEnumerator.Current is undefined.

MoveNext

[C#] public bool MoveNext( );

[C++] public: bool MoveNext( );

[VB] Public Function MoveNext( ) As Boolean

[JScript] public function MoveNext( ): Boolean;

Description

Advances the enumerator to the next element of the collection.

Return Value: true if the enumerator was successfully advanced to the next element; false if the enumerator has passed the end of the collection.

After an enumerator is created or after a call to System. Collections.Specialized.StringEnumerator.Reset, an enumerator is positioned before the first element of the collection, and the first call to System.Collections.Specialized.StringEnumerator.MoveNext moves the enumerator over the first element of the collection.

Reset

[C#] public void Reset( );

[C++] public: void Reset( );

[VB] Public Sub Reset( )

[JScript] public function Reset( );

System.Globalization Namespace

The System.Globalization namespace contains classes that define culture-related information, such as the language, the country/region, the calendars in use, the format patterns for dates, currency and numbers, and the sort order for strings.

The .NET Framework is introducing a distinction to the globalization world. The concept that was previously referred to as "Locale" has been split apart into two separate types that allows much more flexibility. The Locale concept is represented as two different types in the .NET world: CultureInfo and RegionInfo. CultureInfo represents information about the users' culture, what language they specify, how they prefer numbers formatted, what calendar they use, etc. The RegionInfo class represents information about where a person physically is, what currency symbol they use, if they use metric or not, etc.

The following is a more detailed description of the System.Globalization namespace, identifying various classes, interfaces, enumerations, and so forth contained in the System.Globalization namespace.

System.Globalization

The namespace contains classes that define culture-related information, including the language, the country/region, the calendars in use, the format patterns for dates, currency and numbers, and the sort order for strings.

Description

The System.Globalization namespace contains classes that define culture-related information, including the language, the country/region, the calendars in use, the format patterns for dates, currency and numbers, and the sort order for strings.

Calendar class (System.Globalization)

Description

Represents time in divisions, such as weeks, months, and years.

A calendar divides time into measures, such as weeks, months, and years. The number, length, and start of the divisions vary in each calendar.

[C#] public const int CurrentEra;

[C++] public: const int CurrentEra;

[VB] Public Const CurrentEra As Integer

[JScript] public var CurrentEra: int;

Description

Represents the current era for the current calendar.

Constructors:

Calendar

Example Syntax:

[C#] protected Calendar( );

[C++] protected: Calendar( );

[VB] Protected Sub New( )

[JScript] protected function Calendar( );

Description

Initializes a new instance of the System.Globalization.Calendar class.

Properties:

Eras

[C#] public abstract int[ ] Eras {get;}

[C++] public: _property virtual int get_Eras( )=0;

[VB] MustOverride Public ReadOnly Property Eras As Integer ( )

[JScript] public abstract function get Eras( ): int[ ];

Description

When implemented by a derived class, gets the list of eras in the current calendar.

TwoDigitYearMax

[C#] public virtual int TwoDigitYearMax {get; set;}

[C++] public: _property virtual int get_TwoDigitYearMax( );public: _property virtual void set_TwoDigitYearMax(int);

[VB] Overridable Public Property TwoDigitYearMax As Integer

[JScript] public function get TwoDigitYearMax( ): int;public function set TwoDigitYearMax(int);

Description

Gets or sets the last year of a 100-year range that can be represented by a 2-digit year.

This property allows a 2-digit year to be properly translated to a 4-digit year. For example, if this property is set to 2029, the 100-year range is from 1930 to 2029; therefore, a 2-digit value of 30 is interpreted as 1930, while a 2-digit value of 29 is interpreted as 2029.

Methods:

AddDays

[C#] public virtual DateTime AddDays(DateTime time, int days);

[C++] public: virtual DateTime AddDays(DateTime time, int days);

[VB] Overridable Public Function AddDays(ByVal time As DateTime, ByVal days As Integer) As DateTime

[JScript] public function AddDays(time: DateTime, days: int): DateTime;

Description

Returns a System.DateTime that is the specified number of days away from the specified System.DateTime.

Return Value: The System.DateTime that results from adding the specified number of days to the specified System.DateTime.

The days value is rounded to the nearest millisecond before it is added to the specified System.DateTime. If days is negative, the resulting System.DateTime would be earlier than the specified System.DateTime. The System.DateTime instance to add. The number of days to add.

AddHours

[C#] public virtual DateTime AddHours(DateTime time, int hours);

[C++] public: virtual DateTime AddHours(DateTime time, int hours);

[VB] Overridable Public Function AddHours(ByVal time As DateTime, ByVal hours As Integer) As DateTime

[JScript] public function AddHours(time: DateTime, hours: int): DateTime;

Description

Returns a System.DateTime that is the specified number of hours away from the specified System.DateTime.

Return Value: The System.DateTime that results from adding the specified number of hours to the specified System.DateTime.

The hours value is rounded to the nearest millisecond before it is added to the specified System.DateTime. If hours is negative, the resulting System.DateTime would be earlier than the specified System.DateTime. The System.DateTime instance to add. The number of hours to add.

AddMilliseconds

[C#] public virtual DateTime AddMilliseconds(DateTime time, double milliseconds);

[C++] public: virtual DateTime AddMilliseconds(DateTime time, double milliseconds);

[VB] Overridable Public Function AddMilliseconds(ByVal time As DateTime, ByVal milliseconds As Double) As DateTime

[JScript] public function AddMilliseconds(time: DateTime, milliseconds: double): DateTime;

Description

Returns a System.DateTime that is the specified number of milliseconds away from the specified System.DateTime.

Return Value: The System.DateTime that results from adding the specified number of milliseconds to the specified System. DateTime.

The milliseconds value is rounded to the nearest integer before it is added to the specified System.DateTime. If milliseconds is negative, the resulting System.DateTime would be earlier than the specified System.DateTime. The System. DateTime instance to add. The number of milliseconds to add.

AddMinutes

[C#] public virtual DateTime AddMinutes(DateTime time, int minutes);

[C++] public: virtual DateTime AddMinutes(DateTime time, int minutes);

[VB] Overridable Public Function AddMinutes(ByVal time As DateTime, ByVal minutes As Integer) As DateTime

[JScript] public function AddMinutes(time: DateTime, minutes: int): DateTime;

Description

Returns a System.DateTime that is the specified number of minutes away from the specified System.DateTime.

Return Value: The System.DateTime that results from adding the specified number of minutes to the specified System. DateTime.

The minutes value is rounded to the nearest millisecond before it is added to the specified System.DateTime. If minutes is negative, the resulting System.DateTime would be earlier than the specified System.DateTime. The System. DateTime instance to add. The number of minutes to add.

AddMonths

[C#] public abstract DateTime AddMonths(DateTime time, int months);

[C++] public: virtual DateTime AddMonths(DateTime time, int months)=0;

[VB] MustOverride Public Function AddMonths(ByVal time As DateTime, ByVal months As Integer) As DateTime

[JScript] public abstract function AddMonths(time: DateTime, months: int): DateTime;

Description

When implemented by a derived class, returns a System. DateTime that is the specified number of months away from the specified System.DateTime.

Return Value: The System.DateTime that results from adding the specified number of months to the specified System. DateTime.

The year part of the resulting System.DateTime is affected if the resulting month is beyond the last month of the current year. The day part of the resulting System.DateTime is also affected if the resulting day is not a valid day in the resulting month of the resulting year; it is changed to the last valid day in the resulting month of the resulting year. The time-of-day part of the resulting System.DateTime remains the same as the specified System.DateTime. The System.DateTime instance to add. The number of months to add.

AddSeconds

[C#] public virtual DateTime AddSeconds(DateTime time, int seconds);

[C++] public virtual DateTime AddSeconds(DateTime time, int seconds);

[VB] Overridable Public Function AddSeconds(ByVal time As DateTime, ByVal seconds As Integer) As DateTime

[JScript] public function AddSeconds(time: DateTime, seconds: int): DateTime;

Description

Returns a System.DateTime that is the specified number of seconds away from the specified System.DateTime.

Return Value: The System.DateTime that results from adding the specified number of seconds to the specified System. DateTime.

The value parameter is rounded to the nearest millisecond before it is added to the specified System.DateTime. If value is negative, the resulting System.DateTime would be earlier than the specified System.DateTime. The System.DateTime instance to add. The number of seconds to add.

AddWeeks

[C#] public virtual DateTime AddWeeks(DateTime time, int weeks);

[C++] public: virtual DateTime AddWeeks(DateTime time, int weeks);

[VB] Overridable Public Function AddWeeks(ByVal time As DateTime, ByVal weeks As Integer) As DateTime

[JScript] public function AddWeeks(time: DateTime, weeks: int): DateTime;

Description

Returns a System.DateTime that is the specified number of weeks away from the specified System.DateTime.

Return Value: The System.DateTime that results from adding the specified number of weeks to the specified System. DateTime.

If weeks is negative, the resulting System.DateTime would be earlier than the specified System.DateTime. The System. DateTime instance to add. The number of weeks to add.

AddYears

[C#] public abstract DateTime AddYears(DateTime time, int years);

[C++] public: virtual DateTime AddYears(DateTime time, int years)=0;

[VB] MustOverride Public Function AddYears(ByVal time As DateTime, ByVal years As Integer) As DateTime

[JScript] public abstract function AddYears(time: DateTime, years: int) DateTime;

Description

When implemented by a derived class, returns a System. DateTime that is the specified number of years away from the specified System.DateTime.

Return Value: The System.DateTime that results from adding the specified number of years to the specified System. DateTime.

The day part of the resulting System.DateTime is affected if the resulting day is not a valid day in the resulting month of the resulting year; it is changed to the last valid day in the resulting month of the resulting year. The time-of-day part of the resulting System.DateTime remains the same as the specified System.DateTime. The System.DateTime instance to add. The number of years to add.

GetDayOfMonth

[C#] public abstract int GetDayOfMonth(DateTime time);

[C++] public: virtual int GetDayOfMonth(DateTime time)=0;

[VB] MustOverride Public Function GetDayOfMonth(ByVal time As DateTime) As Integer

[JScript] public abstract function GetDayOfMonth(time: DateTime): int;

Description

When implemented by a derived class, gets the day of the month in the specified System.DateTime.

Return Value: An integer that represents the day of the month in time. The System.DateTime instance to read.

GetDayOfWeek

[C#] public abstract DayOfWeek GetDayOfWeek(DateTime time);

[C++] public: virtual DayOfWeek GetDayOfWeek (DateTime time)=0;

[VB] MustOverride Public Function GetDayOfWeek(ByVal time As DateTime) As DayOfWeek

[JScript] public abstract function GetDayOfWeek(time: DateTime): DayOfWeek;

Description

When implemented by a derived class, gets the day of the week in the specified System.DateTime.

Return Value: A System.DayOfWeek value that represents the day of the week in time.

The System.DayOfWeek values are Sunday, Monday, Tuesday, Wednesday, Thursday, Friday, and Saturday. The System.DateTime instance to read.

GetDayOfYear

[C#] public abstract int GetDayOfYear(DateTime time);

[C++] public: virtual int GetDayOfYear(DateTime time)=0;

[VB] MustOverride Public Function GetDayOfYear(ByVal time As DateTime) As Integer

[JScript] public abstract function GetDayOfYear(time: DateTime): int;

Description

When implemented by a derived class, gets the day of the year in the specified System.DateTime.

Return Value: An integer that represents the day of the year in time. The System.DateTime instance to read.

GetDaysInMonth

[C#] public virtual int GetDaysInMonth(int year, int month);

[C++] public: virtual int GetDaysInMonth(int year, int month);

[VB] Overridable Public Function GetDaysInMonth(ByVal year As Integer, ByVal month As Integer) As Integer

[JScript] public function GetDaysInMonth(year: int, month: int): int; Gets the number of days in the specified month.

Description

Gets the number of days in the month specified by the year and month parameters.

Return Value: The number of days in the specified month in the specified year in the current era.

For example, in the Gregorian calendar, this method might return 28 or 29 for February (month=2), depending on whether year is a leap year. An integer that represents the year. An integer that represents the month.

GetDaysInMonth

[C#] public abstract int GetDaysInMonth(int year, int month, int era);

[C++] public: virtual int GetDaysInMonth(int year, int month, int era)=0;

[VB] MustOverride Public Function GetDaysInMonth(ByVal year As Integer, ByVal month As Integer, ByVal era As Integer) As Integer

[JScript] public abstract function GetDaysInMonth(year: int, month: int, era: int): int;

Description

When implemented by a derived class, gets the number of days in the month specified by the year, month, and era parameters.

Return Value: The number of days in the specified month in the specified year in the specified era.

For example, in the Gregorian calendar, this method might return 28 or 29 for February (month=2), depending on whether year is a leap year. An integer that represents the year. An integer that represents the month. An integer that represents the era.

GetDaysInYear

[C#] public virtual int GetDaysInYear(int year);

[C++] public: virtual int GetDaysInYear(int year);

[VB] Overridable Public Function GetDaysInYear(ByVal year As Integer) As Integer

[JScript] public function GetDaysInYear(year: int): int; Gets the number of days in the specified year.

Description

Gets the number of days in the year specified by the year parameter.

Return Value: The number of days in the specified year in the current era.

For example, in the Gregorian calendar, this method might return 365 or 366, depending on whether year is a leap year. An integer that represents the year.

GetDaysInYear

[C#] public abstract int GetDaysInYear(int year, int era);

[C++] public: virtual int GetDaysInYear(int year, int era)=0;

[VB] MustOverride Public Function GetDaysInYear(ByVal year As Integer, ByVal era As Integer) As Integer

[JScript] public abstract function GetDaysInYear(year: int, era: int): int;

Description

When implemented by a derived class, gets the number of days in the year specified by the year and era parameters.

Return Value: The number of days in the specified year in the specified era.

For example, in the Gregorian calendar, this method might return 365 or 366, depending on whether year is a leap year. An integer that represents the year. An integer that represents the era.

GetEra

[C#] public abstract int GetEra(DateTime time);

[C++] public: virtual int GetEra(DateTime time)=0;

[VB] MustOverride Public Function GetEra(ByVal time As DateTime) As Integer

[JScript] public abstract function GetEra(time: DateTime): int;

Description

When implemented by a derived class, gets the era in the specified System.DateTime instance.

Return Value: An integer that represents the era in time. The System.DateTime instance to read.

GetHour

[C#] public virtual int GetHour(DateTime time);

[C++] public: virtual int GetHour(DateTime time);

[VB] Overridable Public Function GetHour(ByVal time As DateTime) As Integer

[JScript] public function GetHour(time: DateTime): int;

Description

Gets the hours value in the specified System.DateTime.

Return Value: An integer from 0 to 23 that represents the hour in time. The System.DateTime instance to read.

GetMilliseconds

[C#] public virtual double GetMilliseconds(DateTime time);

[C++] public: virtual double GetMilliseconds(DateTime time);

[VB] Overridable Public Function GetMilliseconds(ByVal time As DateTime) As Double

[JScript] public function GetMilliseconds(time: DateTime): double;

Description

Gets the milliseconds value in the specified System. DateTime.

Return Value: An integer that represents the milliseconds in time.

The returned value is an integer from 0 to 999. The System.DateTime instance to read.

GetMinute

[C#] public virtual int GetMinute(DateTime time);

[C++] public: virtual int GetMinute(DateTime time);

[VB] Overridable Public Function GetMinute(ByVal time As DateTime) As Integer

[JScript] public function GetMinute(time: DateTime): int;

Description

Gets the minutes value in the specified System.DateTime.

Return Value: An integer that represents the minutes in time.

The returned value is an integer from 0 to 59. The System.DateTime instance to read.

GetMonth

[C#] public abstract int GetMonth(DateTime time);

[C++] public: virtual int GetMonth(DateTime time)=0;

[VB] MustOverride Public Function GetMonth(ByVal time As DateTime) As Integer

[JScript] public abstract function GetMonth(time: DateTime): int;

Description

When implemented by a derived class, gets the month in the specified System.DateTime.

Return Value: An integer that represents the month in time. The System.DateTime instance to read.

GetMonthsInYear

[C#] public virtual int GetMonthsInYear(int year);

[C++] public: virtual int GetMonthsInYear(int year);

[VB] Overridable Public Function GetMonthsInYear(ByVal year As Integer) As Integer

[JScript] public function GetMonthsInYear(year: int): int; Gets the number of months in the specified year.

Description

Gets the number of months in the year specified by the year parameter.

Return Value: The number of months in the specified year in the current era. An integer that represents the year.

GetMonthsInYear

[C#] public abstract int GetMonthsInYear(int year, int era);

[C++] public: virtual int GetMonthsInYear(int year, int era)=0;

[VB] MustOverride Public Function GetMonthsInYear(ByVal year As Integer, ByVal era As Integer) As Integer

[JScript] public abstract function GetMonthsInYear(year: int, era: int): int;

Description

When implemented by a derived class, gets the number of months in the year specified by the year and era parameters.

Return Value: The number of months in the specified year in the specified era. An integer that represents the year. An integer that represents the era.

GetSecond

[C#] public virtual int GetSecond(DateTime time);

[C++] public: virtual int GetSecond(DateTime time);

[VB] Overridable Public Function GetSecond(ByVal time As DateTime) As Integer

[JScript] public function GetSecond(time: DateTime): int;

Description

Gets the seconds value in the specified System.DateTime.

Return Value: An integer that represents the seconds in time.

The returned value is an integer from 0 to 59. The System.DateTime instance to read.

GetWeekOfYear

[C#] public virtual int GetWeekOfYear(DateTime time, CalendarWeekRule rule, DayOfWeek firstDayOfWeek);

[C++] public: virtual int GetWeekOfYear(DateTime time, CalendarWeekRule rule, DayOfWeek firstDayOfWeek);

[VB] Overridable Public Function GetWeekOfYear(ByVal time As DateTime, ByVal rule As CalendarWeekRule, ByVal firstDayOfWeek As DayOfWeek) As Integer

[JScript] public function GetWeekOfYear(time: DateTime, rule: CalendarWeekRule, firstDayOfWeek: DayOfWeek): int;

Description

Gets the week of the year that includes the date in the specified System.DateTime.

Return Value: An integer that represents the week of the year that includes the date in time.

System.Globalization.DateTimeFormatInfo.FirstDayOfWeek of System.Globalization.CultureInfo.DateTimeFormat contains the default System.DayOfWeek value that represents the first day of the week for a specific culture. The System.DateTime instance to read. A System.Globalization.CalendarWeekRule value that defines a calendar week. A System.DayOfWeek value that represents the first day of the week.

GetYear

[C#] public abstract int GetYear(DateTime time);

[C++] public: virtual int GetYear(DateTime time)=0;

[VB] MustOverride Public Function GetYear(ByVal time As DateTime) As Integer

[JScript] public abstract function GetYear(time: DateTime): int;

Description

When implemented by a derived class, gets the year in the specified System.DateTime.

Return Value: An integer that represents the year in time. The System.DateTime instance to read.

IsLeapDay

[C#] public virtual bool IsLeapDay(int year, int month, int day);

[C++] public: virtual bool IsLeapDay(int year, int month, int day);

[VB] Overridable Public Function IsLeapDay(ByVal year As Integer, ByVal month As Integer, ByVal day As Integer) As Boolean

[JScript] public function IsLeapDay(year: int, month: int, day: int): Boolean; Determines whether a date is a leap day.

Description

Determines whether the date specified by the year, month, and day parameters is a leap day.

Return Value: true if the specified day is a leap day; otherwise, false.

A leap year has a different number of days than a standard calendar year, in order to make up for the difference between the calendar year and the actual time that the earth rotates around the sun. Each System.Globalization.Calendar implementation defines leap years differently. An integer that represents the year. An integer that represents the month. An integer that represents the day.

IsLeapDay

[C#] public abstract bool IsLeapDay(int year, int month, int day, int era);

[C++] public: virtual bool IsLeapDay(int year, int month, int day, int era)=0;

[VB] MustOverride Public Function IsLeapDay(ByVal year As Integer, ByVal month As Integer, ByVal day As Integer, ByVal era As Integer) As Boolean

[JScript] public abstract function IsLeapDay(year: int, month: int, day: int, era: int): Boolean;

Description

When implemented by a derived class, determines whether the date specified by the year, month, day, and era parameters is a leap day.

Return Value: true if the specified day is a leap day; otherwise, false. An integer that represents the year. An integer that represents the month. An integer that represents the day. An integer that represents the era.

IsLeapMonth

[C#] public virtual bool IsLeapMonth(int year, int month);

[C++] public: virtual bool IsLeapMonth(int year, int month);

[VB] Overridable Public Function IsLeapMonth(ByVal year As Integer, ByVal month As Integer) As Boolean

[JScript] public function IsLeapMonth(year: int, month: int): Boolean; Determines whether a month is a leap month.

Description

Determines whether the month specified by the year and month parameters is a leap month.

Return Value: true if the specified month is a leap month; otherwise, false.

A leap year has a different number of days than a standard calendar year, in order to make up for the difference between the calendar year and the actual time that the earth rotates around the sun. Each System.Globalization.Calendar implementation defines leap years differently. An integer that represents the year. An integer that represents the month.

IsLeapMonth

[C#] public abstract bool IsLeapMonth(int year, int month, int era);

[C++] public: virtual bool IsLeapMonth(int year, int month, int era)=0;

[VB] MustOverride Public Function IsLeapMonth(ByVal year As Integer, ByVal month As Integer, ByVal era As Integer) As Boolean

[JScript] public abstract function IsLeapMonth(year: int, month: int, era: int) Boolean;

Description

When implemented by a derived class, determines whether the month specified by the year, month, and era parameters is a leap month.

Return Value: true if the specified month is a leap month; otherwise, false. An integer that represents the year. An integer that represents the month. An integer that represents the era.

IsLeapYear

[C#] public virtual bool IsLeapYear(int year);

[C++] public: virtual bool IsLeapYear(int year);

[VB] Overridable Public Function IsLeapYear(ByVal year As Integer) As Boolean

[JScript] public function IsLeapYear(year: int): Boolean; Determines whether a year is a leap year.

Description

Determines whether the year specified by the year parameter is a leap year.

Return Value: true if the specified year is a leap year; otherwise, false.

A leap year has a different number of days than a standard calendar year, in order to make up for the difference between the calendar year and the actual time that the earth rotates around the sun. Each System.Globalization.Calendar implementation defines leap years differently. An integer that represents the year.

IsLeapYear

[C#] public abstract bool IsLeapYear(int year, int era);

[C++] public: virtual bool IsLeapYear(int year, int era)=0;

[VB] MustOverride Public Function IsLeapYear(ByVal year As Integer, ByVal era As Integer) As Boolean

[JScript] public abstract function IsLeapYear(year: int, era: int): Boolean;

Description

When implemented by a derived class, determines whether the year specified by the year and era parameters is a leap year.

Return Value: true if the specified year is a leap year; otherwise, false. An integer that represents the year. An integer that represents the era.

ToDateTime

[C#] public virtual DateTime ToDateTime(int year, int month, int day, int hour, int minute, int second, int millisecond);

[C++] public: virtual DateTime ToDateTime(int year, int month, int day, int hour, int minute, int second, int millisecond);

[VB] Overridable Public Function ToDateTime(ByVal year As Integer, ByVal month As Integer, ByVal day As Integer, ByVal hour As Integer, ByVal minute As Integer, ByVal second As Integer, ByVal millisecond As Integer) As DateTime

[JScript] public function ToDateTime(year: int, month: int, day: int, hour: int, minute: int, second: int, millisecond: int): DateTime; Returns a System.DateTime that is set to the specified date and time.

Description

Returns a System.DateTime that is set to the specified date and time in the current era.

Return Value: The System.DateTime instance set to the specified date and time in the current era. An integer that represents the year. An integer that represents the month. An integer that represents the day. An integer that represents the hour. An integer that represents the minute. An integer that represents the second. An integer that represents the millisecond.

ToDateTime

[C#] public abstract DateTime ToDateTime(int year, int month, int day, int hour, int minute, int second, int millisecond, int era);

[C++] public: virtual DateTime ToDateTime(int year, int month, int day, int hour, int minute, int second, int millisecond, int era)=0;

[VB] MustOverride Public Function ToDateTime(ByVal year As Integer, ByVal month As Integer, ByVal day As Integer, ByVal hour As Integer, ByVal minute As Integer, ByVal second As Integer, ByVal millisecond As Integer, ByVal era As Integer) As DateTime

[JScript] public abstract function ToDateTime(year: int, month: int, day: int, hour: int, minute: int, second: int, millisecond: int, era: int): DateTime;

Description

When implemented by a derived class, returns a System. DateTime that is set to the specified date and time in the specified era.

Return Value: The System.DateTime instance set to the specified date and time in the current era. An integer that represents the year. An integer that represents the month. An integer that represents the day. An integer that represents the hour. An integer that represents the minute. An integer that represents the second. An integer that represents the millisecond. An integer that represents the era.

ToFourDigitYear

[C#] public virtual int ToFourDigitYear(int year);

[C++] public: virtual int ToFourDigitYear(int year);

[VB] Overridable Public Function ToFourDigitYear(ByVal year As Integer) As Integer

[JScript] public function ToFourDigitYear(year: int): int;

Description

Converts the specified two-digit year to a four-digit year by using the System.Globalization.Calendar.TwoDigitYearMax property to determine the appropriate century.

Return Value: An integer that contains the four-digit representation of year.

System.Globalization.Calendar.TwoDigitYearMax is the last year in the 100-year range that can be represented by a two-digit year. The century is determined by finding the sole occurrence of the two-digit year within that 100-year range. For example, if System.Globalization.Calendar. TwoDigitYearMax is set to 2029, the 100-year range is from 1930 to 2029; therefore, a 2-digit value of 30 is interpreted as 1930, while a 2-digit value of 29 is interpreted as 2029. A two-digit integer that represents the year to convert.

CalendarWeekRule enumeration (System.Globalization)

ToString

Description

Defines different rules for determining the first week of the year.

These calendar week rules depend on the System.DayOfWeek value that is designated as the first day of the week. The System.Globalization.DateTimeFormatInfo.FirstDayOfWeek property provides the default value for a culture, but any System.DayOfWeek value can be specified as the first day of the week in System.Globalization.Calendar.GetWeekOfYear(System. DateTime,System.Globalization.CalendarWeekRule, System.DayOfWeek).

ToString

[C#] public const CalendarWeekRule FirstDay;

[C++] public: const CalendarWeekRule FirstDay;

[VB] Public Const FirstDay As CalendarWeekRule

[JScript] public var FirstDay: CalendarWeekRule;

Description

Indicates that the first week of the year starts on the first day of the year and ends before the following designated first day of the week. The value is 0.

ToString

[C#] public const CalendarWeekRule FirstFourDayWeek;

[C++] public: const CalendarWeekRule FirstFourDayWeek;

[VB] Public Const FirstFourDayWeek As CalendarWeekRule

[JScript] public var FirstFourDayWeek: CalendarWeekRule;

Description

Indicates that the first week of the year is the first week with four or more days before the designated first day of the week. The value is 2.

ToString

[C#] public const CalendarWeekRule FirstFullWeek;

[C++] public: const CalendarWeekRule FirstFullWeek;

[VB] Public Const FirstFullWeek As CalendarWeekRule

[JScript] public var FirstFullWeek: CalendarWeekRule;

Description

Indicates that the first week of the year begins on the first occurrence of the designated first day of the week on or after the first day of the year. The value is 1.

CompareInfo class (System.Globalization)

ToString

Description

Implements a set of methods for culture-sensitive string comparisons.

The System.Globalization.CultureInfo class includes a System.Globalization.CultureInfo.CompareInfo property that is an instance of this class.

LCID

ToString

[C#] public int LCID {get;}

[C++] public: _property int get_LCID( );

[VB] Public ReadOnly Property LCID As Integer

[JScript] public function get LCID( ): int;

Description

Gets the properly formed culture identifier for the current System.Globalization.CompareInfo instance.

Compare

[C#] public virtual int Compare(string string1, string string2);

[C++] public: virtual int Compare(String* string1, String* string2);

[VB] Overridable Public Function Compare(ByVal string1 As String, ByVal string2 As String) As Integer

[JScript] public function Compare(string1: String, string2: String): int; Compares two strings.

Description

Compares two strings using the default System.Globalization.CompareOptions value.

Return Value: Value Condition zero The two strings are equal. The first string to compare. The second string to compare.

Compare

[C#] public virtual int Compare(string string1, string string2, CompareOptions options);

[C++] public: virtual int Compare(String* string1, String* string2, CompareOptions options);

[VB] Overridable Public Function Compare(ByVal string1 As String, ByVal string2 As String, ByVal options As CompareOptions) As Integer

[JScript] public function Compare(string1: String, string2: String, options: CompareOptions): int;

Description

Compares two strings using the specified System.Globalization.CompareOptions value.

Return Value: Value Condition zero The two strings are equal. The first string to compare. The second string to compare. The System.Globalization.CompareOptions value that defines how the strings should be compared.

Compare

[C#] public virtual int Compare(string string1, int offset1, string string2, int offset2);

[C++] public: virtual int Compare(String* string1 int offset1, String* string2, int offset2);

[VB] Overridable Public Function Compare(ByVal string1 As String, ByVal offset1 As Integer, ByVal string2 As String, ByVal offset2 As Integer) As Integer

[JScript] public function Compare(string1: String, offset1: int, string2: String, offset2: int): int;

Description

Compares the tail section of a string with the tail section of another string.

Return Value: Value Condition zero The two strings are equal. The first string to compare. The zero-based index of the character in string1 at which to start comparing. The second string to compare. The zero-based index of the character in string2 at which to start comparing.

Compare

[C#] public virtual int Compare(string string1, int offset1, string string2, int offset2, CompareOptions options);

[C++] public: virtual int Compare(String* string1, int offset1, String* string2, int offset2, CompareOptions options);

[VB] Overridable Public Function Compare(ByVal string1 As String, ByVal offset1 As Integer, ByVal string2 As String, ByVal offset2 As Integer, ByVal options As CompareOptions) As Integer

[JScript] public function Compare(string1: String, offset1: int, string2: String, offset2: int, options: CompareOptions): int;

Description

Compares the tail section of a string with the tail section of another string using the specified System.Globalization.CompareOptions value.

Return Value: Value Condition zero The two strings are equal. The first string to compare. The zero-based index of the character in string1 at which to start comparing. The second string to compare. The zero-based index of the character in string2 at which to start comparing. The System.Globalization.CompareOptions value that defines how the strings should be compared.

Compare

[C#] public virtual int Compare(string string1 int offset1, int length1, string string2, int offset2, int length2);

[C++] public: virtual int Compare(String* string1 int offset1, int length1, String* string2, int offset2, int length2);

[VB] Overridable Public Function Compare(ByVal string1 As String, ByVal offset1 As Integer, ByVal length1 As Integer, ByVal string2 As String, ByVal offset2 As Integer, ByVal length2 As Integer) As Integer

[JScript] public function Compare(string1:String, offset1: int, length1: int, string2: String, offset2: int, length2: int): int;

Description

Compares a section of one string with a section of another string.

Return Value: Value Condition zero The two strings are equal. The first string to compare. The zero-based index of the character in string1 at which to start comparing. The number of consecutive characters in string1 to compare. The second string to compare. The zero-based index of the character in string2 at which to start comparing. The number of consecutive characters in string2 to compare.

Compare

[C#] public virtual int Compare(string string1, int offset1, int length1, string string2, int offset2, int length2, Compare Options options);

[C++] public: virtual int Compare(String* string1, int offset1, int length1, String* string2, int offset2, int length2, CompareOptions options);

[VB] Overridable Public Function Compare(ByVal string1 As String, ByVal offset1 As Integer, ByVal length1 As Integer, ByVal string2 As String, ByVal offset2 As Integer, ByVal length2 As Integer, ByVal options As CompareOptions) As Integer

[JScript] public function Compare(string1: String, offset1: int, length1: int, string2: String, offset2: int, length2: int, options: CompareOptions): int;

Description

Compares a section of one string with a section of another string using the specified System.Globalization.CompareOptions value.

Return Value: Value Condition zero The two strings are equal. The first string to compare. The zero-based index of the character in string1 at which to start comparing. The number of consecutive characters in string1 to compare. The second string to compare. The zero-based index of the character in string2 at which to start comparing. The number of consecutive characters in string2 to compare. The System.Globalization.CompareOptions value that defines how the strings should be compared.

Equals

[C#] public override bool Equals(object value);

[C++] public: bool Equals(Object* value);

[VB] Overrides Public Function Equals(ByVal value As Object) As Boolean

[JScript] public override function Equals(value: Object): Boolean;

Description

Determines whether the specified System.Object is the same instance as the current System.Globalization.CompareInfo.

Return Value: true if the specified System.Object is the same instance as the current System.Globalization.CompareInfo; otherwise, false.

This method overrides System.Object.Equals(System.Object). The System.Object to compare with the current System.Globalization.CompareInfo.

GetCompareInfo

[C#] public static CompareInfo GetCompareInfo(int culture);

[C++] public: static CompareInfo* GetCompareInfo(int culture);

[VB] Public Shared Function GetCompareInfo(ByVal culture As Integer) As CompareInfo

[JScript] public static function GetCompareInfo(culture: int): CompareInfo;

Description

Initializes a new instance of the System.Globalization.CompareInfo class that is associated with the culture having the specified identifier.

Return Value: A new instance of the System.Globalization.CompareInfo class that is associated with the culture having the specified identifier and uses string comparison methods in the current System.Reflection.Assembly. An integer representing the culture identifier.

GetCompareInfo

[C#] public static CompareInfo GetCompareInfo(string name);

[C++] public: static CompareInfo* GetCompareInfo(String* name);

[VB] Public Shared Function GetCompareInfo(ByVal name As String) As CompareInfo

[JScript] public static function GetCompareInfo(name: String): CompareInfo;

Description

Initializes a new instance of the System.Globalization.CompareInfo class that is associated with the culture having the specified name.

Return Value: A new instance of the System.Globalization.CompareInfo class that is associated with the culture having the specified name and uses string comparison methods in the current System.Reflection.Assembly. A System.String representing the culture name.

GetCompareInfo

[C#] public static CompareInfo GetCompareInfo(int culture, Assembly assembly);

[C++] public: static CompareInfo* GetCompareInfo(int culture, Assembly* assembly);

[VB] Public Shared Function GetCompareInfo(ByVal culture As Integer, ByVal assembly As Assembly) As CompareInfo

[JScript] public static function GetCompareInfo(culture: int, assembly: Assembly): CompareInfo; Initializes a new instance of the System.Globalization.CompareInfo class.

Description

Initializes a new instance of the System.Globalization.CompareInfo class that is associated with the culture having the specified identifier and uses string comparison methods in the specified System.Reflection.Assembly.

Return Value: A new instance of the System.Globalization.CompareInfo class that is associated with the specified culture and uses string comparison methods in the specified System.Reflection.Assembly.

The assembly parameter must be of the same type as System.Reflection.Module.Assembly. An integer representing the culture identifier. An System.Reflection.Assembly that contains the string comparison methods to use.

GetCompareInfo

[C#] public static CompareInfo GetCompareInfo(string name, Assembly assembly);

[C++] public: static CompareInfo* GetCompareInfo(String* name, Assembly* assembly);

[VB] Public Shared Function GetCompareInfo(ByVal name As String, ByVal assembly As Assembly) As CompareInfo

[JScript] public static function GetCompareInfo(name: String, assembly: Assembly): CompareInfo;

Description

Initializes a new instance of the System.Globalization.CompareInfo class that is associated with the culture having the specified name and uses string comparison methods in the specified System.Reflection.Assembly.

Return Value: A new instance of the System.Globalization.CompareInfo class that is associated with the culture having the specified name and uses string comparison methods in the specified System.Reflection.Assembly.

The assembly parameter must be of the same type as System.Reflection.Module.Assembly. A System.String representing the culture name. An System.Reflection.Assembly that contains the string comparison methods to use.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Serves as a hash function for the current System.Globalization.CompareInfo instance, suitable for use in hashing algorithms and data structures, such as a hash table.

Return Value: A hash code for the current System.Globalization.CompareInfo instance.

This method overrides System.Object.GetHashCode.

GetSortKey

[C#] public virtual SortKey GetSortKey(string source);

[C++] public: virtual SortKey* GetSortKey(String* source);

[VB] Overridable Public Function GetSortKey(ByVal source As String) As SortKey

[JScript] public function GetSortKey(source: String): SortKey;

Description

Gets the System.Globalization.SortKey of the specified System.String.

Return Value: The System.Globalization.SortKey of the specified System.String

Each character in a string is given several categories of sort weights, including script, alphabetic, case, and diacritic weights. A sort key serves as the repository of these weights for a particular string. For example, a sort key might contain a string of alphabetic weights, followed by a string of case weights, and so on. The System.String for which to get the System.Globalization.SortKey.

GetSortKey

[C#] public virtual SortKey GetSortKey(string source, CompareOptions options);

[C++] public: virtual SortKey* GetSortKey(String* source, CompareOptions options);

[VB] Overridable Public Function GetSortKey(ByVal source As String, ByVal options As CompareOptions) As SortKey

[JScript] public function GetSortKey(source: String, options: CompareOptions) SortKey; Gets the System.Globalization.SortKey of a System.String.

Description

Gets the System.Globalization.SortKey of the specified System.String using the specified System.Globalization.CompareOptions value.

Return Value: The System.Globalization.SortKey of the specified System.String using the specified System.Globalization.CompareOptions value.

Each character in a string is given several categories of sort weights, including script, alphabetic, case, and diacritic weights. A sort key serves as the repository of these weights for a particular string. For example, a sort key might contain a string of alphabetic weights, followed by a string of case weights, and so on. The System.String whose System.Globalization.SortKey to get. The System.Globalization.CompareOptions value that defines how the strings should be compared.

IndexOf

[C#] public virtual int IndexOf(string source, char value);

[C++] public: virtual int IndexOf(String* source, _wchar_t value);

[VB] Overridable Public Function IndexOf(ByVal source As String, ByVal value As Char) As Integer

[JScript] public function IndexOf(source: String, value: Char): int; Returns the zero-based index of the first occurrence of a value within a System.String or within a portion of it.

Description

Searches for the specified character and returns the zero-based index of the first occurrence within the entire source System.String.

Return Value: The zero-based index of the first occurrence of value within the entire source, if found; otherwise, −1.

The source System.String is searched forward starting at the beginning of the System.String and ending at the end of the System.String. The System.String to search. The character to locate within source.

IndexOf

[C#] public virtual int IndexOf(string source, string value);

[C++] public: virtual int IndexOf(String* source, String* value);

[VB] Overridable Public Function IndexOf(ByVal source As String, ByVal value As String) As Integer

[JScript] public function IndexOf(source: String, value: String): int;

Description

Searches for the specified substring and returns the zero-based index of the first occurrence within the entire source System.String.

Return Value: The zero-based index of the first occurrence of value within the entire source, if found; otherwise, −1.

The source System.String is searched forward starting at the beginning of the System.String and ending at the end of the System.String. The System.String to search. The System.String to locate within source.

IndexOf

[C#] public virtual int IndexOf(string source, char value, CompareOptions options);

[C++] public: virtual int IndexOf(String* source, _wchar_t value, CompareOptions options);

[VB] Overridable Public Function IndexOf(ByVal source As String, ByVal value As Char, ByVal options As Compare Options) As Integer

[JScript] public function IndexOf(source: String, value: Char, options: CompareOptions): int;

Description

Searches for the specified character and returns the zero-based index of the first occurrence within the entire source System.String using the specified System.Globalization.CompareOptions value.

Return Value: The zero-based index of the first occurrence of value within the entire source using the specified System.Globalization.CompareOptions value, if found; otherwise, −1.

The source System.String is searched forward starting at the beginning of the System.String and ending at the end of the System.String. The System.String to search. The character to locate within source. The System.Globalization.CompareOptions value that defines how the strings should be compared.

IndexOf

[C#] public virtual int IndexOf(string source, char value, int startIndex);

[C++] public: virtual int IndexOf(String* source, _wchar_t value, int startIndex);

[VB] Overridable Public Function IndexOf(ByVal source As String, ByVal value As Char, ByVal startIndex As Integer) As Integer

[JScript] public function IndexOf(source: String, value: Char, startIndex: int) int;

Description

Searches for the specified character and returns the zero-based index of the first occurrence within the section of the source System.String that extends from the specified index to the end of the System.String.

Return Value: The zero-based index of the first occurrence of value within the section of source that extends from startIndex to the end of the System.String, if found; otherwise, −1.

The source System.String is searched forward starting at startIndex and ending at the end of the System.String. The System.String to search. The character to locate within source. The zero-based starting index of the search.

IndexOf

[C#] public virtual int IndexOf(string source, string value, CompareOptions options);

[C++] public: virtual int IndexOf(String* source, String* value, CompareOptions options);

[VB] Overridable Public Function IndexOf(ByVal source As String, ByVal value As String, ByVal options As Compare Options) As Integer

[JScript] public function IndexOf(source: String, value: String, options: CompareOptions): int;

Description

Searches for the specified substring and returns the zero-based index of the first occurrence within the entire source System.String using the specified System.Globalization.CompareOptions value.

Return Value: The zero-based index of the first occurrence of value within the entire source using the specified System.Globalization.CompareOptions value, if found; otherwise, −1.

The source System.String is searched forward starting at the beginning of the System.String and ending at the end of the System.String. The System.String to search. The System.

String to locate within source. The System.Globalization. CompareOptions value that defines how the strings should be compared.

IndexOf

[C#] public virtual int IndexOf(string source, string value, int startIndex);

[C++] public: virtual int IndexOf(String* source, String* value, int startIndex);

[VB] Overridable Public Function IndexOf(ByVal source As String, ByVal value As String, ByVal startIndex As Integer) As Integer

[JScript] public function IndexOf(source: String, value: String, startIndex: int) int;

Description

Searches for the specified substring and returns the zero-based index of the first occurrence within the section of the source System.String that extends from the specified index to the end of the System.String.

Return Value: The zero-based index of the first occurrence of value within the section of source that extends from startIndex to the end of the System.String, if found; otherwise, −1.

The source System.String is searched forward starting at startIndex and ending at the end of the System.String. The System.String to search. The System.String to locate within source. The zero-based starting index of the search.

IndexOf

[C#] public virtual int IndexOf(string source, char value, int startIndex, CompareOptions options);

[C++] public: virtual int IndexOf(String* source, _wchar_t value, int startIndex, CompareOptions options);

[VB] Overridable Public Function IndexOf(ByVal source As String, ByVal value As Char, ByVal startIndex As Integer, ByVal options As CompareOptions) As Integer

[JScript] public function IndexOf(source: String, value: Char, startIndex: int, options: CompareOptions): int;

Description

Searches for the specified character and returns the zero-based index of the first occurrence within the section of the source System.String that extends from the specified index to the end of the System.String using the specified System.Globalization.CompareOptions value.

Return Value: The zero-based index of the first occurrence of value within the section of source that extends from startIndex to the end of the System.String using the specified System.Globalization.CompareOptions value, if found; otherwise, −1.

The source System.String is searched forward starting at startIndex and ending at the end of the System.String. The System.String to search. The character to locate within source. The zero-based starting index of the search. The System.Globalization.CompareOptions value that defines how the strings should be compared.

IndexOf

[C#] public virtual int IndexOf(string source, char value, int startIndex, int count);

[C++] public: virtual int IndexOf(String* source, wchar_t value, int startIndex, int count);

[VB] Overridable Public Function IndexOf(ByVal source As String, ByVal value As Char, ByVal startIndex As Integer, ByVal count As Integer) As Integer

[JScript] public function IndexOf(source: String, value: Char, startIndex: int, count: int): int;

Description

Searches for the specified character and returns the zero-based index of the first occurrence within the section of the source System.String that starts at the specified index and contains the specified number of elements.

Return Value: The zero-based index of the first occurrence of value within the section of source that starts at startIndex and contains count number of elements, if found; otherwise, −1.

The source System.String is searched forward starting at startIndex and ending at startIndex+count−1. The System. String to search. The character to locate within source. The zero-based starting index of the search. The number of elements in the section to search.

IndexOf

[C#] public virtual int IndexOf(string source, string value, int startIndex, CompareOptions options);

[C++] public: virtual int IndexOf(String* source, String* value, int startIndex, CompareOptions options);

[VB] Overridable Public Function IndexOf(ByVal source As String, ByVal value As String, ByVal startIndex As Integer, ByVal options As CompareOptions) As Integer

[JScript] public function IndexOf(source: String, value: String, startIndex: int, options: CompareOptions): int;

Description

Searches for the specified substring and returns the zero-based index of the first occurrence within the section of the source System.String that extends from the specified index to the end of the System.String using the specified System.Globalization.CompareOptions value.

Return Value: The zero-based index of the first occurrence of value within the section of source that extends from startIndex to the end of the System.String using the specified System.Globalization.CompareOptions value, if found; otherwise, −1.

The source System.String is searched forward starting at startIndex and ending at the end of the System.String. The System.String to search. The System.String to locate within source. The zero-based starting index of the search. The System.Globalization.CompareOptions value that defines how the strings should be compared.

IndexOf

[C#] public virtual int IndexOf(string source, string value, int startIndex, int count);

[C++] public: virtual int IndexOf(String* source, String* value, int startIndex, int count);

[VB] Overridable Public Function IndexOf(ByVal source As String, ByVal value As String, ByVal startIndex As Integer, ByVal count As Integer) As Integer

[JScript] public function IndexOf(source: String, value: String, startIndex: int, count: int): int;

Description

Searches for the specified substring and returns the zero-based index of the first occurrence within the section of the source System.String that starts at the specified index and contains the specified number of elements.

Return Value: The zero-based index of the first occurrence of value within the section of source that starts at startIndex and contains count number of elements, if found; otherwise, −1.

The source System.String is searched forward starting at startIndex and ending at startIndex+count−1. The System. String to search. The System.String to locate within source.

The zero-based starting index of the search. The number of elements in the section to search.

IndexOf

[C#] public virtual int IndexOf(string source, char value, int startIndex, int count, CompareOptions options);

[C++] public: virtual int IndexOf(String* source, _wchar_t value, int startIndex, int count, CompareOptions options);

[VB] Overridable Public Function IndexOf(ByVal source As String, ByVal value As Char, ByVal startIndex As Integer, ByVal count As Integer, ByVal options As CompareOptions) As Integer

[JScript] public function IndexOf(source: String, value: Char, startIndex: int, count: int, options: CompareOptions): int;

Description

Searches for the specified character and returns the zero-based index of the first occurrence within the section of the source System.String that starts at the specified index and contains the specified number of elements using the specified System.Globalization.CompareOptions value.

Return Value: The zero-based index of the first occurrence of value within the section of source that starts at startIndex and contains count number of elements using the specified System.Globalization.CompareOptions value, if found; otherwise, −1.

The source System.String is searched forward starting at startIndex and ending at startIndex+count−1. The System.String to search. The character to locate within source. The zero-based starting index of the search. The number of elements in the section to search. The System.Globalization.CompareOptions value that defines how the strings should be compared.

IndexOf

[C#] public virtual int IndexOf(string source, string value, int startIndex, int count, CompareOptions options);

[C++] public: virtual int IndexOf(String* source, String* value, int startIndex, int count, CompareOptions options);

[VB] Overridable Public Function IndexOf(ByVal source As String, ByVal value As String, ByVal startIndex As Integer, ByVal count As Integer, ByVal options As CompareOptions) As Integer

[JScript] public function IndexOf(source: String, value: String, startIndex: int, count: int, options: CompareOptions): int;

Description

Searches for the specified substring and returns the zero-based index of the first occurrence within the section of the source System.String that starts at the specified index and contains the specified number of elements using the specified System.Globalization.CompareOptions value.

Return Value: The zero-based index of the first occurrence of value within the section of source that starts at startIndex and contains count number of elements using the specified System.Globalization.CompareOptions value, if found; otherwise, −1.

The source System.String is searched forward starting at startIndex and ending at startIndex+count−1. The System.String to search. The System.String to locate within source. The zero-based starting index of the search. The number of elements in the section to search. The System.Globalization.CompareOptions value that defines how the strings should be compared.

IsPrefix

[C#] public virtual bool IsPrefix(string source, string prefix);

[C++] public: virtual bool IsPrefix(String* source, String* prefix);

[VB] Overridable Public Function IsPrefix(ByVal source As String, ByVal prefix As String) As Boolean

[JScript] public function IsPrefix(source: String, prefix: String): Boolean;

Description

Determines whether the specified source System.String starts with the specified prefix.

Return Value: true if the length of prefix is less than or equal to the length of source and source starts with prefix; otherwise, false.

Every string starts and ends with an empty substring; therefore, if prefix is an empty string, this method returns true. The System.String to search in. The System.String to compare with the beginning of source.

IsPrefix

[C#] public virtual bool IsPrefix(string source, string prefix, CompareOptions options);

[C++] public: virtual bool IsPrefix(String* source, String* prefix, CompareOptions options);

[VB] Overridable Public Function IsPrefix(ByVal source As String, ByVal prefix As String, ByVal options As Compare Options) As Boolean

[JScript] public function IsPrefix(source: String, prefix: String, options CompareOptions): Boolean; Determines whether a string starts with a specific prefix.

Description

Determines whether the specified source System.String starts with the specified prefix using the specified System.Globalization.CompareOptions value.

Return Value: true if the length of prefix is less than or equal to the length of source and source starts with prefix; otherwise, false.

Every string starts and ends with an empty substring; therefore, if prefix is an empty string, this method returns true. The System.String to search in. The System.String to compare with the beginning of source. The System.Globalization.CompareOptions value that defines how the strings should be compared.

IsSuffix

[C#] public virtual bool IsSuffix(string source, string suffix);

[C++] public: virtual bool IsSuffix(String* source, String* suffix);

[VB] Overridable Public Function IsSuffix(ByVal source As String, ByVal suffix As String) As Boolean

[JScript] public function IsSuffix(source: String, suffix: String): Boolean;

Description

Determines whether the specified source System.String ends with the specified suffix.

Return Value: true if the length of suffix is less than or equal to the length of source and source ends with suffix; otherwise, false.

Every string starts and ends with an empty substring; therefore, if suffix is an empty string, this method returns true. The System.String to search in. The System.String to compare with the end of source.

IsSuffix

[C#] public virtual bool IsSuffix(string source, string suffix, CompareOptions options);

[C++] public: virtual bool IsSuffix(String* source, String* suffix, CompareOptions options);

[VB] Overridable Public Function IsSuffix(ByVal source As String, ByVal suffix As String, ByVal options As Compare Options) As Boolean

[JScript] public function IsSuffix(source: String, suffix: String, options CompareOptions): Boolean; Determines whether a string ends with a specific suffix.

Description

Determines whether the specified source System.String ends with the specified suffix using the specified System.Globalization.CompareOptions value.

Return Value: true if the length of suffix is less than or equal to the length of source and source ends with suffix; otherwise, false.

Every string starts and ends with an empty substring; therefore, if suffix is an empty string, this method returns true. The System.String to search in. The System.String to compare with the end of source. The System.Globalization.Compare Options value that defines how the strings should be compared.

LastIndexOf

[C#] public virtual int LastIndexOf(string source, char value);

[C++] public: virtual int LastIndexOf(String* source, _wchar_t value);

[VB] Overridable Public Function LastIndexOf(ByVal source As String, ByVal value As Char) As Integer

[JScript] public function LastIndexOf(source: String, value: Char): int; Returns the zero-based index of the last occurrence of a value within a System.String or within a portion of it.

Description

Searches for the specified character and returns the zero-based index of the last occurrence within the entire source System.String.

Return Value: The zero-based index of the last occurrence of value within the entire source, if found; otherwise, −1.

The source System.String is searched backward starting at the end of the System.String and ending at the beginning of the System.String. The System.String to search. The character to locate within source.

LastIndexOf

[C#] public virtual int LastIndexOf(string source, string value);

[C++] public: virtual int LastIndexOf(String* source, String* value);

[VB] Overridable Public Function LastIndexOf(ByVal source As String, ByVal value As String) As Integer

[JScript] public function LastIndexOf(source: String, value: String): int;

Description

Searches for the specified substring and returns the zero-based index of the last occurrence within the entire source System.String.

Return Value: The zero-based index of the last occurrence of value within the entire source, if found; otherwise, −1.

The source System.String is searched backward starting at the end of the System.String and ending at the beginning of the System.String. The System.String to search. The System.String to locate within source.

LastIndexOf

[C#] public virtual int LastIndexOf(string source, char value, CompareOptions options);

[C++] public: virtual int LastIndexOf(String* source, _wchar_t value, CompareOptions options);

[VB] Overridable Public Function LastIndexOf(ByVal source As String, ByVal value As Char, ByVal options As CompareOptions) As Integer

[JScript] public function LastIndexOf(source: String, value: Char, options: CompareOptions): int;

Description

Searches for the specified character and returns the zero-based index of the last occurrence within the entire source System.String using the specified System.Globalization.CompareOptions value.

Return Value: The zero-based index of the last occurrence of value within the entire source using the specified System.Globalization.CompareOptions value, if found; otherwise, −1.

The source System.String is searched backward starting at the end of the System.String and ending at the beginning of the System.String. The System.String to search. The character to locate within source. The System.Globalization.CompareOptions value that defines how the strings should be compared.

LastIndexOf

[C#] public virtual int LastIndexOf(string source, char value, int startIndex);

[C++] public: virtual int LastIndexOf(String* source, wchar_t value, int startIndex);

[VB] Overridable Public Function LastIndexOf(ByVal source As String, ByVal value As Char, ByVal startIndex As Integer) As Integer

[JScript] public function LastIndexOf(source: String, value: Char, startIndex: int): int;

Description

Searches for the specified character and returns the zero-based index of the last occurrence within the section of the source System.String that extends from the beginning of the System.String to the specified index.

Return Value: The zero-based index of the last occurrence of value within the section of source that extends from the beginning of the System.String to startIndex, if found; otherwise, −1.

The source System.String is searched backward starting at startIndex and ending at the beginning of the System.String. The System.String to search. The character to locate within source. The zero-based starting index of the backward search.

LastIndexOf

[C#] public virtual int LastIndexOf(string source, string value, CompareOptions options);

[C++] public: virtual int LastIndexOf(String* source, String* value, CompareOptions options);

[VB] Overridable Public Function LastIndexOf(ByVal source As String, ByVal value As String, ByVal options As CompareOptions) As Integer

[JScript] public function LastIndexOf(source: String, value: String, options: CompareOptions): int;

Description

Searches for the specified substring and returns the zero-based index of the last occurrence within the entire source System.String using the specified System.Globalization.CompareOptions value.

Return Value: The zero-based index of the last occurrence of value within the entire source using the specified System.Globalization.CompareOptions value, if found; otherwise, −1.

The source System.String is searched backward starting at the end of the System.String and ending at the beginning of the System.String. The System.String to search. The System.String to locate within source. The System.Globalization.CompareOptions value that defines how the strings should be compared.

LastIndexOf

[C#] public virtual int LastIndexOf(string source, string value, it startIndex);

[C++] public: virtual int LastIndexOf(String* source, String* value, int startIndex);

[VB] Overridable Public Function LastIndexOf(ByVal source As String, ByVal value As String, ByVal startIndex As Integer) As Integer

[JScript] public function LastIndexOf(source: String, value: String, startIndex: int): int;

Description

Searches for the specified substring and returns the zero-based index of the last occurrence within the section of the source System.String that extends from the beginning of the System.String to the specified index.

Return Value: The zero-based index of the last occurrence of value within the section of source that extends from the beginning of the System.String to startIndex, if found; otherwise, −1.

The source System.String is searched backward starting at startIndex and System.String to locate within source. The zero-based starting index of the backward search.

LastIndexOf

[C#] public virtual int LastIndexOf(string source, char value, int startIndex, CompareOptions options);

[C++] public: virtual int LastIndexOf(String* source, _wchar_t value, int startIndex, CompareOptions options);

[VB] Overridable Public Function LastIndexOf(ByVal source As String, ByVal value As Char, ByVal startIndex As Integer, ByVal options As CompareOptions) As Integer

[JScript] public function LastIndexOf(source: String, value: Char, startIndex: int, options: CompareOptions): int;

Description

Searches for the specified character and returns the zero-based index of the last occurrence within the section of the source System.String that extends from the beginning of the System.String to the specified index using the specified System.Globalization.CompareOptions value.

Return Value: The zero-based index of the last occurrence of value within the section of source that extends from the beginning of the System.String to startIndex using the specified System.Globalization.CompareOptions value, if found; otherwise, −1.

The source System.String is searched backward starting at startIndex and ending at the beginning of the System.String. The System.String to search. The character to locate within source. The zero-based starting index of the backward search. The System.Globalization.CompareOptions value that defines how the strings should be compared.

LastIndexOf

[C#] public virtual int LastIndexOf(string source, char value, int startIndex, int count);

[C++] public: virtual int LastIndexOf(String* source, _wchar_t value, int startIndex, int count);

[VB] Overridable Public Function LastIndexOf(ByVal source As String, ByVal value As Char, ByVal startIndex As Integer, ByVal count As Integer) As Integer

[JScript] public function LastIndexOf(source: String, value: Char, startIndex: int, count: int): int;

Description

Searches for the specified character and returns the zero-based index of the last occurrence within the section of the source System.String that contains the specified number of elements and ends at the specified index.

Return Value: The zero-based index of the last occurrence of value within the section of source that contains count number of elements and ends at startIndex, if found; otherwise, −1.

The source System.String is searched backward starting at startIndex and ending at startIndex−count+1. The System.String to search. The character to locate within source. The zero-based starting index of the backward search. The number of elements in the section to search.

LastIndexOf

[C#] public virtual int LastIndexOf(string source, string value, int startIndex, CompareOptions options);

[C++] public: virtual int LastIndexOf(String* source, String* value, int startIndex, CompareOptions options);

[VB] Overridable Public Function LastIndexOf(ByVal source As String, ByVal value As String, ByVal startIndex As Integer, ByVal options As CompareOptions) As Integer

[JScript] public function LastIndexOf(source: String, value: String, startIndex: int, options: CompareOptions): int;

Description

Searches for the specified substring and returns the zero-based index of the last occurrence within the section of the source System.String that extends from the beginning of the System.String to the specified index using the specified System.Globalization.CompareOptions value.

Return Value: The zero-based index of the last occurrence of value within the section of source that extends from the beginning of the System.String to startIndex using the specified System.Globalization.CompareOptions value, if found; otherwise, −1.

The source System.String is searched backward starting at startIndex and ending at the beginning of the System.String. The System.String to search. The System.String to locate within source. The zero-based starting index of the backward search. The System.Globalization.CompareOptions value that defines how the strings should be compared.

LastIndexOf

[C#] public virtual int LastIndexOf(string source, string value, int startIndex, int count);

[C++] public: virtual int LastIndexOf(String* source, String* value, int startIndex, int count);

[VB] Overridable Public Function LastIndexOf(ByVal source As String, ByVal value As String, ByVal startIndex As Integer, ByVal count As Integer) As Integer

[JScript] public function LastIndexOf(source: String, value: String, startIndex: int, count: int): int;

Description

Searches for the specified substring and returns the zero-based index of the last occurrence within the section of the source System.String that contains the specified number of elements and ends at the specified index.

Return Value: The zero-based index of the last occurrence of value within the section of source that contains count number of elements and ends at startIndex, if found; otherwise, −1.

The source System.String is searched backward starting at startIndex and ending at startIndex−count+1. The System.String to search. The System.String to locate within source. The zero-based starting index of the backward search. The number of elements in the section to search.

LastIndexOf

[C#] public virtual int LastIndexOf(string source, char value, int startIndex, int count, CompareOptions options);

[C++] public: virtual int LastIndexOf(String* source, _wchar_t value, int startIndex, int count, Compare Options options);

[VB] Overridable Public Function LastIndexOf(ByVal source As String, ByVal value As Char, ByVal startIndex As Integer, ByVal count As Integer, ByVal options As CompareOptions) As Integer

[JScript] public function LastIndexOf(source: String, value: Char, startIndex: int, count: int, options: CompareOptions): int;

Description

Searches for the specified character and returns the zero-based index of the last occurrence within the section of the source System.String that contains the specified number of elements and ends at the specified index using the specified System.Globalization.CompareOptions value.

Return Value: The zero-based index of the last occurrence of value within the section of source that contains count number of elements and ends at startIndex using the specified System.Globalization.CompareOptions value, if found; otherwise, −1.

The source System.String is searched backward starting at startIndex and ending at startIndex−count+1. The System.String to search. The character to locate within source. The zero-based starting index of the backward search. The number of elements in the section to search. The System.Globalization.CompareOptions value that defines how the strings should be compared.

LastIndexOf

[C#] public virtual int LastIndexOf(string source, string value, int startIndex, int count, CompareOptions options);

[C++] public: virtual int LastIndexOf(String* source, String* value, int startIndex, int count, CompareOptions options);

[VB] Overridable Public Function LastIndexOf(ByVal source As String, ByVal value As String, ByVal startIndex As Integer, ByVal count As Integer, ByVal options As CompareOptions) As Integer

[JScript] public function LastIndexOf(source: String, value: String, startIndex: int, count: int, options: CompareOptions): int;

Description

Searches for the specified substring and returns the zero-based index of the last occurrence within the section of the source System.String that contains the specified number of elements and ends at the specified index using the specified System.Globalization.CompareOptions value.

Return Value: The zero-based index of the last occurrence of value within the section of source that contains count number of elements and ends at startIndex using the specified System.Globalization.CompareOptions value, if found; otherwise, −1.

The source System.String is searched backward starting at startIndex and ending at startIndex−count+1. The System.String to search. The System.String to locate within source. The zero-based starting index of the backward search. The number of elements in the section to search. The System.Globalization.CompareOptions value that defines how the strings should be compared.

IDeserializationCallback.OnDeserialization

[C#] void IDeserializationCallback.OnDeserialization(object sender);

[C++] void IDeserializationCallback::OnDeserialization (Object* sender);

[VB] Sub OnDeserialization(ByVal sender As Object) Implements IDeserializationCallback.OnDeserialization

[JScript] function IDeserializationCallback.OnDeserialization(sender: Object);

ToString

[C#] public override string ToString( );

[C++] public: String* ToString( );

[VB] Overrides Public Function ToString( ) As String

[JScript] public override function ToString( ): String;

Description

Returns a System.String that represents the current System.Globalization.CompareInfo instance.

Return Value: A System.String that represents the current System.Globalization.CompareInfo instance.

This method overrides System.Object.ToString.

CompareOptions enumeration (System.Globalization)

ToString

Description

Defines the string comparison options to use with System.Globalization.CompareInfo.

These options denote case-sensitivity or whether to ignore types of characters.

ToString

[C#] public const CompareOptions IgnoreCase;

[C++] public: const CompareOptions IgnoreCase;

[VB] Public Const IgnoreCase As CompareOptions

[JScript] public var IgnoreCase: CompareOptions;

Description

Indicates that the string comparison must ignore case.

ToString

[C#] public const CompareOptions IgnoreKanaType;

[C++] public: const CompareOptions IgnoreKanaType;

[VB] Public Const IgnoreKanaType As CompareOptions

[JScript] public var IgnoreKanaType: CompareOptions;

Description

Indicates that the string comparison must ignore the Kana type. Kana type refers to Japanese hiragana and katakana characters, which represent phonetic sounds in the Japanese language. Hiragana is used for native Japanese expressions and words, while katakana is used for words borrowed from other languages, such as "computer" or "internet". A phonetic sound can be expressed in both hiragana and katakana. If this value is selected, the hiragana character for one sound is considered equal to the katakana character for the same sound.

ToString

[C#] public const CompareOptions IgnoreNonSpace;

[C++] public: const CompareOptions IgnoreNonSpace;

[VB] Public Const IgnoreNonSpace As CompareOptions

[JScript] public var IgnoreNonSpace: CompareOptions;

Description

Indicates that the string comparison must ignore nonspacing combining characters, such as diacritics. The Unicode Standard defines combining characters as characters that are combined with base characters to produce a new character. Non-spacing combining characters do not occupy a spacing position by themselves when rendered. For more information on non-spacing combining characters, see The Unicode Standard at http://www.unicode.org.

ToString

[C#] public const CompareOptions IgnoreSymbols;

[C++] public const CompareOptions IgnoreSymbols;

[VB] Public Const IgnoreSymbols As CompareOptions

[JScript] public var IgnoreSymbols: CompareOptions;

Description

Indicates that the string comparison must ignore symbols, such as white-space characters, punctuation, currency symbols, the percent sign, mathematical symbols, the ampersand, and so on.

ToString

[C#] public const CompareOptions IgnoreWidth;

[C++] public: const CompareOptions IgnoreWidth;

[VB] Public Const IgnoreWidth As CompareOptions
[JScript] public var IgnoreWidth: CompareOptions;

Description

Indicates that the string comparison must ignore the character width. For example, Japanese katakana characters can be written as full-width or half-width and, if this value is selected, the katakana characters written as full-width are considered equal to the same characters written in half-width.

ToString

[C#] public const CompareOptions None;
[C++] public: const CompareOptions None;
[VB] Public Const None As CompareOptions
[JScript] public var None: CompareOptions;

Description

Indicates the default option settings for string comparisons.

ToString

[C#] public const CompareOptions Ordinal;
[C++] public: const CompareOptions Ordinal;
[VB] Public Const Ordinal As CompareOptions
[JScript] public var Ordinal: CompareOptions;

Description

Indicates that the string comparison must be done using the Unicode values of each character, which is a fast comparison but is culture-insensitive. A string starting with "U+xxxx" comes before a string starting with "U+yyyy", if xxxx is less than yyyy.

ToString

[C#] public const CompareOptions StringSort;
[C++] public: const CompareOptions StringSort;
[VB] Public Const StringSort As CompareOptions
[JScript] public var StringSort: CompareOptions;

Description

Indicates that the string comparison must use the string sort method, where the hyphen and the apostrophe, as well as other non-alphanumeric characters, come before alphanumeric symbols.

CultureInfo class (System.Globalization)

ToString

Description

Represents information about a specific culture including the names of the culture, the writing system, and the calendar used, as well as methods for common operations, such as formatting dates and sorting strings.

The System.Globalization.CultureInfo class holds culture-specific information, such as the associated language, sublanguage, country/region, calendar, and cultural conventions. This class also provides the information required for culture-specific operations, such as casing, formatting dates and numbers, and comparing strings.

CultureInfo

Example Syntax:

ToString

[C#] public CultureInfo(int culture);
[C++] public: CultureInfo(int culture);
[VB] Public Sub New(ByVal culture As Integer)
[JScript] public function CultureInfo(culture: int);

Description

Initializes a new instance of the System.Globalization.CultureInfo class based on the culture specified by the culture identifier.

The culture parameter is mapped to the corresponding National Language Support (NLS) locale identifier. The value of the culture parameter becomes the value of the System.Globalization.CultureInfo.LCID property of the new instance. A predefined System.Globalization.CultureInfo identifier or the System.Globalization.CultureInfo.LCID of an existing System.Globalization.CultureInfo instance.

CultureInfo

Example Syntax:

ToString

[C#] public CultureInfo(string name);
[C++] public: CultureInfo(String* name);
[VB] Public Sub New(ByVal name As String)
[JScript] public function CultureInfo(name: String); Initializes a new instance of the System.Globalization.CultureInfo class.

Description

Initializes a new instance of the System.Globalization.CultureInfo class based on the culture specified by name.

The System.Globalization.CultureInfo names follow the RFC 1766 standard in the format "-", where is a lowercase two-letter code derived from ISO 639-1 and is an uppercase two-letter code derived from ISO 3166. For example, U.S. English is "en-US". The predefined System.Globalization.CultureInfo names are listed in the System.Globalization.CultureInfo class topic. A predefined System.Globalization.CultureInfo name or the name of an existing System.Globalization.CultureInfo instance.

CultureInfo

Example Syntax:

ToString

[C#] public CultureInfo(int culture, bool useUserOverride);
[C++] public: CultureInfo(int culture, bool useUserOverride);
[VB] Public Sub New(ByVal culture As Integer, ByVal use UserOverride As Boolean)
[JScript] public function CultureInfo(culture: int, use UserOverride: Boolean);

Description

Initializes a new instance of the System.Globalization.CultureInfo class based on the culture specified by the culture identifier and on the Boolean that specifies whether to use the user-selected culture settings from the system.

The culture parameter is mapped to the corresponding National Language Support (NLS) locale identifier. The value of the culture parameter becomes the value of the System.Globalization.CultureInfo.LCID property of the new instance. A predefined System.Globalization.CultureInfo identifier or the System.Globalization.CultureInfo.LCID of an existing System.Globalization.CultureInfo instance. A Boolean that denotes whether to use the user-selected culture settings (true) or the default culture settings (false).

CultureInfo

Example Syntax:

ToString

[C#] public CultureInfo(string name, bool useUserOverride);
[C++] public: CultureInfo(String* name, bool useUserOverride);
[VB] Public Sub New(ByVal name As String, ByVal use UserOverride As Boolean)
[JScript] public function CultureInfo(name: String, use UserOverride: Boolean);

Description

Initializes a new instance of the System.Globalization.CultureInfo class based on the culture specified by name and on the Boolean that specifies whether to use the user-selected culture settings from the system.

The System.Globalization.CultureInfo names follow the RFC 1766 standard in the format "-", where is a lowercase two-letter code derived from ISO 639-1 and is an uppercase two-letter code derived from ISO 3166. For example, U.S. English is "en-US". The predefined System.Globalization. CultureInfo names are listed in the System.Globalization. CultureInfo class topic. A predefined System.Globalization. CultureInfo name or the name of an existing System.Globalization.CultureInfo instance. A Boolean that denotes whether to use the user-selected culture settings (true) or the default culture settings (false).

Calendar

ToString

[C#] public virtual Calendar Calendar {get;}

[C++] public: _property virtual Calendar* get_Calendar( );

[VB] Overridable Public ReadOnly Property Calendar As Calendar

[JScript] public function get Calendar( ): Calendar;

Description

Gets the default calendar used by the culture.

The System.Globalization.CultureInfo.DateTimeFormat property is an instance of the System.Globalization. DateTimeFormatInfo class which includes properties that allow users to customize the date and time formatting associated with a specific System.Globalization.Calendar.

CompareInfo

ToString

[C#] public virtual CompareInfo CompareInfo {get;}

[C++] public: _property virtual CompareInfo* get_Compare Info( );

[VB] Overridable Public ReadOnly Property CompareInfo As CompareInfo

[JScript] public function get CompareInfo( ): CompareInfo;

Description

Gets the System.Globalization.CompareInfo instance that defines how to compare strings for the culture.

CurrentCulture

ToString

[C#] public static CultureInfo CurrentCulture {get;}

[C++] public: _property static CultureInfo* get_CurrentCulture( );

[VB] Public Shared ReadOnly Property CurrentCulture As CultureInfo

[JScript] public static function get CurrentCulture( ): CultureInfo;

Description

Gets the System.Globalization.CultureInfo instance that represents the culture used by the current thread.

The culture is a property of the executing thread. This read-only property returns System.Threading.Thread.CurrentCulture. When a thread is started, its culture is initially determined by using GetUserDefaultLCID from the Windows API. To change the culture used by a thread, set System.Threading.Thread.CurrentCulture to the new culture.

CurrentUICulture

ToString

[C#] public static CultureInfo CurrentUICulture {get;}

[C++] public: _property static CultureInfo* get_Current UICulture( );

[VB] Public Shared ReadOnly Property CurrentUICulture As CultureInfo

[JScript] public static function get CurrentUICulture( ): CultureInfo;

Description

Gets the System.Globalization.CultureInfo instance that represents the current culture used by the ResourceManager to look up culture-specific resources at run time.

The culture is a property of the executing thread. This property returns System.Threading.Thread.Current UICulture. When a thread is started, its UI culture is initially determined by using GetUserDefaultUILanguage from the Windows API. To change the UI culture used by a thread, set System.Threading.Thread.CurrentUICulture to the new culture.

DateTimeFormat

ToString

[C#] public virtual DateTimeFormatInfo DateTimeFormat {get; set;}

[C++] public: _property virtual DateTimeFormatInfo* get_DateTimeFormat( );public: _property virtual void set_DateTimeFormat(DateTimeFormatInfo*);

[VB] Overridable Public Property DateTimeFormat As DateTimeFormatInfo

[JScript] public function get DateTimeFormat( ): DateTimeFormatInfo;public function set DateTimeFormat (DateTimeFormatInfo);

Description

Gets or sets a System.Globalization.DateTimeFormatInfo instance that defines the culturally appropriate format of displaying dates and times.

A System.Globalization.DateTimeFormatInfo instance can be created only for the invariant culture or for specific cultures, not for neutral cultures.

DisplayName

ToString

[C#] public virtual string DisplayName {get;}

[C++] public: _property virtual String* get_DisplayName( );

[VB] Overridable Public ReadOnly Property DisplayName As String

[JScript] public function get DisplayName( ): String;

Description

Gets the culture name in the format "( )" in the localized language of the .NET Framework.

For example, if the .NET Framework English version is installed, the System.Globalization.CultureInfo. DisplayName for the specific culture U.S. English is "English (United States)". If the .NET Framework Spanish version is installed, regardless of the language that the system is set to display, the culture name is displayed in Spanish; therefore, the System.Globalization.CultureInfo.DisplayName for the specific culture U.S. English is "Ingles (Estados Unidos)".

EnglishName

ToString

[C#] public virtual string EnglishName {get;}

[C++] public: _property virtual String* get_EnglishName( );

[VB] Overridable Public ReadOnly Property EnglishName As String

[JScript] public function get EnglishName( ): String;

Description

Gets the culture name in the format "( )" in English.

For example, the System.Globalization.Culture Info.EnglishName for the specific culture U.S. English is "English (United States)".

InstalledUICulture

ToString

[C#] public static CultureInfo InstalledUICulture {get;}

[C++] public: _property static CultureInfo* get_InstalledUOCulture( );

[VB] Public Shared ReadOnly Property InstalledUICulture As CultureInfo
[JScript] public static function get InstalledUICulture( ): CultureInfo;

Description
Gets the System.Globalization.CultureInfo instance that represents the culture installed with the operating system.
In a localized operating system, such as Japanese Windows 2000 Professional, this property returns the culture of the operating system. This property is the equivalent of GetSystemDefaultUILanguage in the Windows API.
InvariantCulture
ToString
[C#] public static CultureInfo InvariantCulture {get;}
[C++] public: _property static CultureInfo* get_InvariantCulture( );
[VB] Public Shared ReadOnly Property InvariantCulture As CultureInfo
[JScript] public static function get InvariantCulture( ): CultureInfo;

Description
Gets the System.Globalization.CultureInfo instance that is culture-independent (invariant).
The invariant culture is culture-insensitive. You can specify the invariant culture by name using an empty string.
IsNeutralCulture
ToString
[C#] public virtual bool IsNeutralCulture {get;}
[C++] public: _property virtual bool get_IsNeutralCulture( );
[VB] Overridable Public ReadOnly Property IsNeutralCulture As Boolean
[JScript] public function get IsNeutralCulture( ): Boolean;

Description
Determines whether the current System.Globalization.CultureInfo instance is a neutral culture.
A neutral culture is a culture that is associated with a language but not with a country/region. A specific culture is a culture that is associated with a language and a country/region. For example, “fr” is a neutral culture and “fr-FR” is a specific culture. Note that “zh-CHS” (Simplified Chinese) and “zh-CHT” (Traditional Chinese) are neutral cultures.
IsReadOnly
ToString
[C#] public bool IsReadOnly {get;}
[C++] public: _property bool get_IsReadOnly( );
[VB] Public ReadOnly Property IsReadOnly As Boolean
[JScript] public function get IsReadOnly( ): Boolean;

Description
Gets a value indicating whether the current System.Globalization.CultureInfo instance is read-only.

LCID
ToString
[C#] public virtual int LCID {get;}
[C++] public: _property virtual int get_LCID( );
[VB] Overridable Public ReadOnly Property LCID As Integer
[JScript] public function get LCID( ): int;

Description
Gets the culture identifier for the current System.Globalization.CultureInfo instance.
The culture identifier is mapped to the corresponding National Language Support (NLS) locale identifier.
Name
ToString
[C#] public virtual string Name {get;}
[C++] public: _property virtual String* get_Name( );
[VB] Overridable Public ReadOnly Property Name As String
[JScript] public function get Name( ): String;

Description
Gets the culture name in the format
The System.Globalization.CultureInfo names follow the RFC 1766 standard in the format “-”, where is a lowercase two-letter code derived from ISO 639-1 and is an uppercase two-letter code derived from ISO 3166. For example, the System.Globalization.CultureInfo.Name for the specific culture U.S. English is “en-US”.
NativeName
ToString
[C#] public virtual string NativeName {get;}
[C++] public: _property virtual String* get_NativeName( );
[VB] Overridable Public ReadOnly Property NativeName As String
[JScript] public function get NativeName( ): String;

Description
Gets the culture name in the format “( )” in the language that the culture is set to display.
The culture’s full name might not display properly if the system is not set to display the culture’s language correctly. For example, if the System.Globalization.CultureInfo.Name is “ja-JP” for Japanese (Japan), System.Globalization.CultureInfo.NativeName will not display correctly on a system that is set to English only. However, multilingual operating systems, such as Windows 2000, display System.Globalization.CultureInfo.NativeName correctly.
NumberFormat
ToString
[C#] public virtual NumberFormatInfo NumberFormat {get; set;}
[C++] public: _property virtual NumberFormatInfo* get_NumberFormat( );public: _property virtual void set_NumberFormat(NumberFormatInfo*);
[VB] Overridable Public Property NumberFormat As NumberFormatInfo
[JScript] public function get NumberFormat( ): NumberFormatInfo;public function set NumberFormat(NumberFormatInfo);

Description
Gets or sets a System.Globalization.NumberFormatInfo instance that defines the culturally appropriate format of displaying numbers, currency, and percentage.
A System.Globalization.NumberFormatInfo instance can be created only for the invariant culture or for specific cultures, not for neutral cultures.
OptionalCalendars
ToString
[C#] public virtual Calendar[ ] OptionalCalendars {get;}
[C++] public: _property virtual Calendar* get_OptionalCalendars( );
[VB] Overridable Public ReadOnly Property OptionalCalendars As Calendar( )
[JScript] public function get OptionalCalendars( ): Calendar[ ];

Description
Gets the list of optional calendars that can be used by the culture.
Optional calendars are other calendars that can be used with the culture represented by the current System.Globalization.CultureInfo instance.
Parent
ToString
[C#] public virtual CultureInfo Parent {get;}
[C++] public: _property virtual CultureInfo* get_Parent( );

[VB] Overridable Public ReadOnly Property Parent As CultureInfo

[JScript] public function get Parent( ): CultureInfo;

Description

Gets the System.Globalization.CultureInfo instance that represents the parent culture of the current System.Globalization.CultureInfo instance.

A parent culture is a higher level culture that encompasses a more limited set of information that is common among its children. For example, the parent culture of "en-US" is "en"; the parent culture of "en" is the invariant culture.

TextInfo

ToString

[C#] public virtual TextInfo TextInfo {get;}

[C++] public: _property virtual TextInfo* get_TextInfo( );

[VB] Overridable Public ReadOnly Property TextInfo As TextInfo

[JScript] public function get TextInfo( ): TextInfo;

Description

Gets the System.Globalization.TextInfo instance that defines the writing system associated with the culture.

The System.Globalization.CultureInfo.TextInfo property provides culture-specific casing information for strings.

ThreeLetterISOLanguageName

ToString

[C#] public virtual string ThreeLetterISOLanguageName {get;}

[C++] public: _property virtual String* get_ThreeLetterISOLanguageName( );

[VB] Overridable Public ReadOnly Property ThreeLetterISOLanguageName As String

[JScript] public function get ThreeLetterISOLanguageName( ): String;

Description

Gets the ISO 639-2 three-letter code for the language of the current System.Globalization.CultureInfo instance.

For example, the three-letter abbreviation for English is "eng".

ThreeLetterWindowsLanguageName

ToString

[C#] public virtual string ThreeLetterWindowsLanguageName {get;}

[C++] public: _property virtual String* get_ThreeLetterWindowsLanguageName( );

[VB] Overridable Public ReadOnly Property ThreeLetterWindowsLanguageName As String

[JScript] public function get ThreeLetterWindowsLanguageName( ): String;

Description

Gets the three-letter code for the language as defined in the Windows API.

For example, the three-letter code for English (U.S.) as defined in the Windows API is "enu".

TwoLetterISOLanguageName

ToString

[C#] public virtual string TwoLetterISOLanguageName {get;}

[C++] public: _property virtual String* get_TwoLetterISOLanguageName( );

[VB] Overridable Public ReadOnly Property TwoLetterISOLanguageName As String

[JScript] public function get TwoLetterISOLanguage Name( ): String;

Description

Gets the ISO 639-1 two-letter code for the language of the current System.Globalization.CultureInfo instance.

For example, the two-letter abbreviation for English is "en".

UseUserOverride

ToString

[C#] public bool UseUserOverride {get;}

[C++] public: _property bool get_UseUserOverride( );

[VB] Public ReadOnly Property UseUserOverride As Boolean

[JScript] public function get UseUserOverride( ): Boolean;

Description

Gets a value indicating whether the current System.Globalization.CultureInfo instance uses the user-selected culture settings.

The user might choose to override some of the values associated with the default culture of the system through the Regional and Language Options (or Regional Options or Regional Settings) applet in Windows Control Panel. For example, the user might choose to display the date in a different format. This property denotes whether the current System.Globalization.CultureInfo instance uses those overrides (true) or whether it uses the default values (false) of the culture settings.

ClearCachedData

[C#] public void ClearCachedData( );

[C++] public: void ClearCachedData( );

[VB] Public Sub ClearCachedData( )

[JScript] public function ClearCachedData( );

Description

Refreshes cached culture-related information.

Information, such as the default culture and format patterns, is cached the first time it is requested. However, that information can change during the life of the System.AppDomain, for example, when the user modifies the Regional and Language Options (or Regional Options or Regional Settings) applet in Windows Control Panel. The System.Globalization.CultureInfo class does not detect changes in the system settings automatically. Use the System.Globalization.CultureInfo.ClearCachedData method to refresh that information in the System.Globalization.CultureInfo class, based on the current system settings.

Clone

[C#] public virtual object Clone( );

[C++] public: virtual Object* Clone( );

[VB] Overridable Public Function Clone( ) As Object

[JScript] public function Clone( ): Object;

Description

Creates a copy of the current System.Globalization.CultureInfo instance.

Return Value: A copy of the current System.Globalization.CultureInfo instance.

The clone is writable even if the original instance is read-only; therefore, the properties of the clone can be modified.

CreateSpecificCulture

[C#] public static CultureInfo CreateSpecificCulture(string name);

[C++] public: static CultureInfo* CreateSpecificCulture (String* name);

[VB] Public Shared Function CreateSpecificCulture(ByVal name As String) As CultureInfo

[JScript] public static function CreateSpecificCulture(name: String): CultureInfo;

Description

Creates a System.Globalization.CultureInfo instance that represents the specific culture that is associated with the specified name.

Return Value: A System.Globalization.CultureInfo instance that represents the invariant culture, if name is "" (invariant culture).

The invariant culture is culture-insensitive. You can specify the invariant culture by name using an empty string. A predefined System.Globalization.CultureInfo name or the name of an existing System.Globalization.CultureInfo instance.

Equals

[C#] public override bool Equals(object value);

[C++] public: bool Equals(Object* value);

[VB] Overrides Public Function Equals(ByVal value As Object) As Boolean

[JScript] public override function Equals(value: Object): Boolean;

Description

Determines whether the specified System.Object is the same culture as the current System.Globalization.CultureInfo instance.

Return Value: true if the specified System.Object is the same culture as the current System.Globalization.CultureInfo instance; otherwise, false.

This method overrides System.Object.Equals(System.Object). The System.Object to compare with the current System.Globalization.CultureInfo instance.

GetCultures

[C#] public static CultureInfo[ ] GetCultures(CultureTypes types);

[C++] public: static CultureInfo* GetCultures(CultureTypes types)[ ];

[VB] Public Shared Function GetCultures(ByVal types As CultureTypes) As CultureInfo( )

[JScript] public static function GetCultures(types: CultureTypes): CultureInfo[ ];

Description

Gets the list of supported cultures filtered by the specified System.Globalization.CultureTypes.

Return Value: An array of System.Globalization.CultureInfo objects that represent the supported cultures filtered by the specified System.Globalization.CultureTypes. A combination of System.Globalization.CultureTypes values that filter the cultures to retrieve.

GetFormat

[C#] public virtual object GetFormat(Type formatType);

[C++] public: virtual Object* GetFormat(Type* formatType);

[VB] Overridable Public Function GetFormat(ByVal formatType As Type) As Object

[JScript] public function GetFormat(formatType: Type): Object;

Description

Gets an object that defines how to format the specified type.

Return Value: A System.Globalization.NumberFormatInfo object containing the default number format information for the current System.Globalization.CultureInfo instance, if formatType is the System.Type object for the System.Globalization.NumberFormatInfo class. System.Globalization.CultureInfo.GetFormat(System.Type) implements System.IFormatProvider.GetFormat(System.Type). The System.Type for which to get a formatting object. This method only supports the System.Globalization.NumberFormatInfo and System.Globalization.DateTimeFormatInfo types.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Serves as a hash function for the current System.Globalization.CultureInfo instance, suitable for use in hashing algorithms and data structures, such as a hash table.

Return Value: A hash code for the current System.Globalization.CultureInfo instance.

This method overrides System.Object.GetHashCode.

ReadOnly

[C#] public static CultureInfo ReadOnly(CultureInfo ci);

[C++] public: static CultureInfo* ReadOnly(CultureInfo* ci);

[VB] Public Shared Function ReadOnly(ByVal ci As CultureInfo) As CultureInfo

[JScript] public static function ReadOnly(ci: CultureInfo): CultureInfo;

Description

Returns a read-only wrapper around the specified System.Globalization.CultureInfo instance.

Return Value: A read-only System.Globalization.CultureInfo wrapper around ci

This wrapper prevents any modifications to ci, to the ci. The System.Globalization.CultureInfo instance to wrap.

ToString

[C#] public override string ToString( );

[C++] public: String* ToString( );

[VB] Overrides Public Function ToString( ) As String

[JScript] public override function ToString( ): String;

Description

Returns a System.String containing the name of the current System.Globalization.CultureInfo instance in the format "-"

Return Value: A System.String containing the name of the current System.Globalization.CultureInfo instance in the format "-", where is a lowercase two-letter code derived from ISO 639-1 and is an uppercase two-letter code derived from ISO 3166.

This method overrides System.Object.ToString.

CultureTypes enumeration (System.Globalization)

ToString

Description

Defines the types of culture lists that can be retrieved using System.Globalization.CultureInfo.GetCultures(System.Globalization.Culture Types).

These culture types serve as a filter that limits which cultures are returned by System.Globalization.CultureInfo.GetCultures(System.Globalization.Culture Types).

ToString

[C#] public const CultureTypes AllCultures;

[C++] public: const CultureTypes AllCultures;

[VB] Public Const AllCultures As CultureTypes

[JScript] public var AllCultures: CultureTypes;

Description

Refers to all cultures.

ToString

[C#] public const CultureTypes InstalledWin32Cultures;

[C++] public: const CultureTypes InstalledWin32Cultures;

[VB] Public Const InstalledWin32Cultures As CultureTypes
[JScript] public var InstalledWin32Cultures: CultureTypes;

Description

Refers to all cultures that are installed in the system.

ToString

[C#] public const CultureTypes NeutralCultures;
[C++] public: const CultureTypes NeutralCultures;
[VB] Public Const NeutralCultures As CultureTypes
[JScript] public var NeutralCultures: CultureTypes;

Description

Refers to cultures that are associated with a language but are not specific to a country/region. The names of these cultures consist of the lowercase two-letter code derived from ISO 639-1. For example: "en".

ToString

[C#] public const CultureTypes SpecificCultures;
[C++] public: const CultureTypes SpecificCultures;
[VB] Public Const SpecificCultures As CultureTypes
[JScript] public var SpecificCultures: CultureTypes;

Description

Refers to cultures that are specific to a country/region. The names of these cultures follow the RFC 1766 standard in the format "-", where is a lowercase two-letter code derived from ISO 639-1 and is an uppercase two-letter code derived from ISO 3166. For example, "en-US".

DateTimeFormatInfo class (System.Globalization)

ToString

Description

Defines how System.DateTime values are formatted and displayed, depending on the culture.

This class contains information, such as date patterns, time patterns, and AM/PM designators.

DateTimeFormatInfo

Example Syntax:

ToString

[C#] public DateTimeFormatInfo( );
[C++] public: DateTimeFormatInfo( );
[VB] Public Sub New( )
[JScript] public function DateTimeFormatInfo( );

Description

Initializes a new writable instance of the System.Globalization.DateTimeFormatInfo class that is culture-independent (invariant).

The properties of this instance can be modified with user-defined patterns.

AbbreviatedDayNames

ToString

[C#] public string[ ] AbbreviatedDayNames {get; set;}
[C++] public: _property String* get_AbbreviatedDayNames( );public: _property void set_AbbreviatedDayNames(String* _gc[ ]);
[VB] Public Property AbbreviatedDayNames As String ( )
[JScript] public function get AbbreviatedDayNames( ): String[ ];public function set AbbreviatedDayNames (String[ ]);

Description

Gets or sets a one-dimensional array of type System.String containing the abbreviated names of the days of the week.

If setting this property, the array must be one-dimensional and must have exactly seven elements.

AbbreviatedMonthNames

ToString

[C#] public string[ ] AbbreviatedMonthNames {get; set;}
[C++] public: _property String* get_AbbreviatedMonthNames( );public: _property void set_AbbreviatedMonthNames(String* _gc[ ]);
[VB] Public Property AbbreviatedMonthNames As String ( )
[JScript] public function get AbbreviatedMonthNames( ): String[ ];public function set AbbreviatedMonthNames (String[ ]);

Description

Gets or sets a one-dimensional array of type System.String containing the abbreviated names of the months.

If setting this property, the array must be one-dimensional and must have exactly 13 elements.

AMDesignator

ToString

[C#] public string AMDesignator {get; set;}
[C++] public: _property String* get_AMDesignator( );public: _property void set_AMDesignator(String*);
[VB] Public Property AMDesignator As String
[JScript] public function get AMDesignator( ): String;public function set AMDesignator(String);

Description

Indicates the System.String designator for hours that are "ante meridiem" (before noon).

If the custom pattern includes the format pattern "tt" and the time is before noon, System.DateTime.ToString displays the value of System.Globalization.DateTimeFormatInfo.AMDesignator in place of the "tt" in the format pattern. If the custom pattern includes the format pattern "t", only the first character of System.Globalization.DateTimeFormatInfo.AMDesignator is displayed.

Calendar

ToString

[C#] public Calendar Calendar {get; set;}
[C++] public: _property Calendar* get_Calendar( ); public: _property void set_Calendar(Calendar*);
[VB] Public Property Calendar As Calendar
[JScript] public function get Calendar( ): Calendar;public function set Calendar(Calendar);

Description

Gets or sets the calendar to use for the current culture.

The System.Globalization.DateTimeFormatInfo.Calendar property only accepts calendars that are valid for the current culture of the current thread. The System.Globalization.CultureInfo.Calendar property specifies the default calendar for the culture and the System.Globalization.CultureInfo.OptionalCalendars property specifies other calendars supported by the culture.

CalendarWeekRule

ToString

[C#] public CalendarWeekRule CalendarWeekRule {get; set;}
[C++] public: _property CalendarWeekRule get_CalendarWeekRule( );public: _property void set_CalendarWeekRule(CalendarWeekRule);
[VB] Public Property CalendarWeekRule As CalendarWeekRule
[JScript] public function get CalendarWeekRule( ): CalendarWeekRule;public function set CalendarWeekRule(CalendarWeekRule);

Description

Gets or sets a value that specifies which rule is used to determine the first calendar week of the year.

This property is affected if the value of the System.Globalization.DateTimeFormatInfo.Calendar property changes.

CurrentInfo

ToString

[C#] public static DateTimeFormatInfo CurrentInfo {get;}
[C++] public: _property static DateTimeFormatInfo* get_CurrentInfo( );

[VB] Public Shared ReadOnly Property CurrentInfo As DateTimeFormatInfo
[JScript] public static function get CurrentInfo( ): DateTimeFormatInfo;

Description

Gets a read-only System.Globalization.DateTimeFormatInfo instance that formats values based on the current culture.

DateSeparator

ToString

[C#] public string DateSeparator {get; set;}
[C++] public: _property String* get_DateSeparator( ); public: _property void set_DateSeparator(String*);
[VB] Public Property DateSeparator As String
[JScript] public function get DateSeparator( ): String;public function set DateSeparator(String);

Description

Indicates the System.String that separates the components of a date; that is, the year, month, and day.

If the custom pattern includes the format pattern "/", System.DateTime.ToString displays the value of System.Globalization.DateTimeFormatInfo.DateSeparator in place of the "/" in the format pattern.

DayNames

ToString

[C#] public string[ ] DayNames {get; set;}
[C++] public: _property String* get_DayNames( ); public: _property void set_DayNames(String* _gc[ ]);
[VB] Public Property DayNames As String ( )
[JScript] public function get DayNames( ): String[ ];public function set DayNames(String[ ]);

Description

Gets or sets a one-dimensional array of type System.String containing the full names of the days of the week.

If setting this property, the array must be one-dimensional and must have exactly seven elements.

FirstDayOfWeek

ToString

[C#] public DayOfWeek FirstDayOfWeek {get; set;}
[C++] public: _property DayOfWeek get_FirstDayOfWeek( );public: _property void set_FirstDayOfWeek(DayOfWeek);
[VB] Public Property FirstDayOfWeek As DayOfWeek
[JScript] public function get FirstDayOfWeek( ): DayOfWeek;public function set FirstDayOfWeek(DayOfWeek);

Description

Indicates the first day of the week.

This property is affected if the value of the System.Globalization.DateTimeFormatInfo.Calendar property changes.

FullDateTimePattern

ToString

[C#] public string FullDateTimePattern {get; set;}
[C++] public: _property String* get_FullDateTimePattern( );public: _property void set_FullDateTimePattern (String*);
[VB] Public Property FullDateTimePattern As String
[JScript] public function get FullDateTimePattern( ): String; public function set FullDateTimePattern(String);

Description

Indicates the format pattern for a long date and long time value, which is associated with the 'F' format character. See System.Globalization.DateTimeFormatInfo for patterns that can be combined to construct custom patterns; for example, "dddd, dd MMMM yyyy HH:mm:ss".

InvariantInfo

ToString

[C#] public static DateTimeFormatInfo InvariantInfo {get;}
[C++] public: _property static DateTimeFormatInfo* get_InvariantInfo( );
[VB] Public Shared ReadOnly Property InvariantInfo As DateTimeFormatInfo
[JScript] public static function get InvariantInfo( ): DateTimeFormatInfo;

Description

Gets the default read-only System.Globalization.DateTimeFormatInfo instance that is culture-independent (invariant).

This property does not change regardless of the current culture.

IsReadOnly

ToString

[C#] public bool IsReadOnly {get;}
[C++] public: _property bool get_IsReadOnly( );
[VB] Public ReadOnly Property IsReadOnly As Boolean
[JScript] public function get IsReadOnly( ): Boolean;

Description

Gets a value indicating whether the System.Globalization.DateTimeFormatInfo is read-only.

LongDatePattern

ToString

[C#] public string LongDatePattern {get; set;}
[C++] public: _property String* get_LongDatePattern( );public: _property void set_LongDatePattern (String*);
[VB] Public Property LongDatePattern As String
[JScript] public function get LongDatePattern( ): String;public function set LongDatePattern(String);

Description

Indicates the format pattern for a long date value, which is associated with the 'D' format character.

See System.Globalization.DateTimeFormatInfo for patterns that can be combined to construct custom patterns; for example, "dddd, dd MMMM yyyy".

LongTimePattern

ToString

[C#] public string LongTimePattern {get; set;}
[C++] public: _property String* get_LongTimePattern( );public: _property void set_LongTimePattern (String*);
[VB] Public Property LongTimePattern As String [JScript] public function get LongTimePattern( ): String;public function set LongTimePattern(String);

Description

Indicates the format pattern for a long time value, which is associated with the 'T' format character.

See System.Globalization.DateTimeFormatInfo for patterns that can be combined to construct custom patterns; for example, "HH:mm:ss".

MonthDayPattern

ToString

[C#] public string Month DayPattern {get; set;}
[C++] public: _property String* get_MonthDayPattern( );public: _property void set_MonthDaypattern (String*);
[VB] Public Property MonthDayPattern As String
[JScript] public function get MonthDayPattern( ): String; public function set MonthDayPattern(String);

Description

Indicates the format pattern for a month and day value, which is associated with the 'm' and 'M' format characters.

See System.Globalization.DateTimeFormatInfo for patterns that can be combined to construct custom patterns; for example, "MMMM dd".

MonthNames

ToString

[C#] public string[ ] MonthNames {get; set;}
[C++] public: _property String* get_MonthNames( ); public: _property void set_MonthNames(String* _gc[ ]);

[VB] Public Property MonthNames As String ( )
[JScript] public function get MonthNames( ): String[ ];public function set MonthNames(String[ ]);

Description

Gets or sets a one-dimensional array of type System.String containing the full names of the months.

If setting this property, the array must be one-dimensional and must have exactly 13 elements.

PMDesignator

ToString

[C#] public string PMDesignator {get; set;}
[C++] public: _property String* get_PMDesignator( );public: _property void set_PMDesignator(String*);
[VB] Public Property PMDesignator As String
[JScript] public function get PMDesignator( ): String;public function set PMDesignator(String);

Description

Indicates the System.String designator for hours that are "post meridiem" (after noon).

If the custom pattern includes the format pattern "tt" and the time is after noon, System.DateTime.ToString displays the value of System.Globalization.DateTimeFormatInfo.PMDesignator in place of the "tt" in the format pattern. If the custom pattern includes the format pattern "t", only the first character of System.Globalization.DateTimeFormatInfo.PMDesignator is displayed.

RFC1123 Pattern

ToString

[C#] public string RFC 1123 Pattern {get;}
[C++] public: _property String* get_RFC1123 Pattern( );
[VB] Public ReadOnly Property RFC 1123 Pattern As String
[JScript] public function get RFC1123 Pattern( ): String;

Description

Gets the format pattern for a time value, which is based on the Internet Engineering Task Force (IETF) Request for Comments (RFC) 1123 specification and is associated with the 'r' and 'R' format characters.

ShortDatePattern

ToString

[C#] public string ShortDatePattern {get; set;}
[C++] public: _property String* get_ShortDatePattern( );public: _property void set_ShortDatePattern(String*);
[VB] Public Property ShortDatePattern As String
[JScript] public function get ShortDatePattern( ): String;public function set ShortDatePattern(String);

Description

Indicates the format pattern for a short date value, which is associated with the 'd' format character.

See System.Globalization.DateTimeFormatInfo for patterns that can be combined to construct custom patterns; for example, "MM/dd/yyyy".

ShortTimePattern

ToString

[C#] public string ShortTimePattern {get; set;}
[C++] public: _property String* get_ShortTimePattern( );public: _property void set_ShortTimePattern(String*);
[VB] Public Property ShortTimePattern As String
[JScript] public function get ShortTimePattern( ): String;public function set ShortTimePattern(String);

Description

Indicates the format pattern for a short time value, which is associated with the 't' format character.

See System.Globalization.DateTimeFormatInfo for patterns that can be combined to construct custom patterns; for example, "HH:mm".

SortableDateTimePattern

ToString

[C#] public string SortableDateTimePattern {get;}
[C++] public: _property String* get_SortableDateTimePattern( );
[VB] Public ReadOnly Property SortableDateTimePattern As String
[JScript] public function get SortableDateTimePattern( ): String;

Description

Gets the format pattern for a sortable date and time value, which is associated with the 's' format character.

TimeSeparator

ToString

[C#] public string TimeSeparator {get; set;}
[C++] public: _property String* get_TimeSeparator( );public: _property void set_TimeSeparator(String*);
[VB] Public Property TimeSeparator As String
[JScript] public function get TimeSeparator( ): String;public function set TimeSeparator(String);

Description

Indicates the System.String that separates the components of time; that is, the hour, minutes, and seconds.

If the custom pattern includes the format pattern ":", System.DateTime.ToString displays the value of System.Globalization.DateTimeFormatInfo.TimeSeparator in place of the ":" in the format pattern.

UniversalSortableDateTimePattern

ToString

[C#] public string UniversalSortableDateTimePattern {get;}
[C++] public: _property String* get_UniversalSortableDateTimePattern( );
[VB] Public ReadOnly Property UniversalSortableDateTimePattern As String
[JScript] public function get UniversalSortableDateTimePattern( ): String;

Description

Gets the format pattern for a universal sortable date and time value, which is associated with the 'u' and 'U' format characters.

YearMonthPattern

ToString

[C#] public string YearMonthPattern {get; set;}
[C++] public: _property String* get_YearMonthPattern( );public: _property void set_YearMonthPattern(String*);
[VB] Public Property YearMonthPattern As String
[JScript] public function get YearMonthPattern( ): String; public function set YearMonthPattern(String);

Description

Indicates the format pattern for a year and month value, which is associated with the 'y' and 'Y' format characters.

See System.Globalization.DateTimeFormatInfo for patterns that can be combined to construct custom patterns; for example, "yyyy MMMM".

Clone

[C#] public object Clone( );
[C++] public: _sealed Object* Clone( );
[VB] NotOverridable Public Function Clone( ) As Object
[JScript] public function Clone( ): Object;

Description

Creates a shallow copy of the System.Globalization.DateTimeFormatInfo instance.

Return Value: A new System.Globalization.DateTimeFormatInfo instance copied from the original System.Globalization.DateTimeFormatInfo instance.

The clone is writable even if the original instance is read-only; therefore, the properties of the clone can be modified with user-defined patterns.

GetAbbreviatedDayName

[C#] public string GetAbbreviatedDayName(DayOfWeek dayofweek);

[C++] public: String* GetAbbreviatedDayName(DayOfWeek dayofweek);

[VB] Public Function GetAbbreviatedDayName(ByVal dayofweek As DayOfWeek) As String

[JScript] public function GetAbbreviatedDayName(dayofweek: DayOfWeek): String; Gets the abbreviated name of the specified day of the week.

Description

Gets the abbreviated name of the specified day of the week based on the System.Globalization.CultureInfo of the current thread.

Return Value: The abbreviated name of the day of the week represented by dayofweek.

For the default invariant System.Globalization.DateTimeFormatInfo instance, this method returns a string from the System.Globalization.GregorianCalendar: dayofweek Return Value Sunday "Sun" Monday "Mon" Tuesday "Tue" Wednesday "Wed" Thursday "Thu" Friday "Fri" Saturday "Sat" A System.DayOfWeek value.

GetAbbreviatedEraName

[C#] public string GetAbbreviatedEraName(int era);

[C++] public: String* GetAbbreviatedEraName(int era);

[VB] Public Function GetAbbreviatedEraName(ByVal era As Integer) As String

[JScript] public function GetAbbreviatedEraName(era: int): String;

Description

Gets the System.String containing the abbreviated name of the specified era, if an abbreviation exists.

Return Value: A System.String containing the abbreviated name of the specified era, if an abbreviation exists.

The valid values for era are listed in the System.Globalization.Calendar.Eras property of the appropriate class derived from System.Globalization.Calendar. For example: System.Globalization.JapaneseCalendar.Eras displays a list of eras that are supported by this implementation. The integer representing the era.

GetAbbreviatedMonthName

[C#] public string GetAbbreviatedMonthName(int month);

[C++] public: String* GetAbbreviatedMonthName(int month);

[VB] Public Function GetAbbreviatedMonthName(ByVal month As Integer) As String

[JScript] public function GetAbbreviatedMonthName (month: int): String; Gets the abbreviated name of the specified month.

Description

Gets the abbreviated name of the specified month based on the System.Globalization.CultureInfo of the current thread.

Return Value: The abbreviated name of the month represented by month. For the default invariant System.Globalization.DateTimeFormatInfo instance, this method returns a string from the System.Globalization.GregorianCalendar: month Return Value 1 "Jan" 2 "Feb" 3 "Mar" 4 "Apr" 5 "May" 6 "Jun" 7 "Jul" 8 "Aug" 9 "Sep" 10 "Oct" 11 "Nov" 12 "Dec" 13 " " System.Globalization.Calendar objects can accommodate calendars with 13 months. For 12-month calendars, the empty string is always returned as the name of the 13th month. An integer from 1 through 13 representing the name of the month to retrieve.

GetAllDateTimePatterns

[C#] public string[ ] GetAllDateTimePatterns( );

[C++] public: String* GetAllDateTimePatterns( ) _gc[ ];

[VB] Public Function GetAllDateTimePatterns( ) As String( )

[JScript] public function GetAllDateTimePatterns( ): String[ ]; Gets the standard patterns in which System.DateTime values can be formatted.

Description

Gets all the standard patterns in which System.DateTime values can be formatted.

Return Value: An array containing the standard patterns in which System.DateTime values can be formatted.

See the summary page of the System.Globalization.DateTimeFormatInfo class for a list of the standard format characters and their associated patterns.

GetAllDateTimePatterns

[C#] public string[ ] GetAllDateTimePatterns(char format);

[C++] public: String* GetAllDateTimePatterns(_wchar_t format) _gc[ ];

[VB] Public Function GetAllDateTimePatterns(ByVal format As Char) As String( )

[JScript] public function GetAllDateTimePatterns(format: Char): String[ ];

Description

Gets all the standard patterns in which System.DateTime values can be formatted using the specified format character.

Return Value: An array containing the standard patterns in which System.DateTime values can be formatted using the specified format character.

See the summary page of the System.Globalization.DateTimeFormatInfo class for a list of the standard format characters and their associated patterns. A standard format character.

GetDayName

[C#] public string GetDayName(DayOfWeek dayofweek);

[C++] public: String* GetDayName(DayOfWeek dayofweek);

[VB] Public Function GetDayName(ByVal dayofweek As DayOfWeek) As String

[JScript] public function GetDayName(dayofweek: DayOfWeek): String; Gets the full name of the specified day of the week.

Description

Gets the full name of the specified day of the week based on the System.Globalization.CultureInfo of the current thread.

Return Value: The full name of the day of the week represented by dayofweek.

For the default invariant System.Globalization.DateTimeFormatInfo instance, this method returns a string from the System.Globalization.GregorianCalendar: dayofweek Return Value Sunday "Sunday" Monday "Monday" Tuesday "Tuesday" Wednesday "Wednesday" Thursday "Thursday"

Friday "Friday" Saturday "Saturday" A System.DayOfWeek value.

GetEra

[C#] public int GetEra(string eraName);

[C++] public: int GetEra(String* eraName);

[VB] Public Function GetEra(ByVal eraName As String) As Integer

[JScript] public function GetEra(eraName: String): int;

Description

Gets the integer representing the specified era.

Return Value: The integer representing the era, if eraName is valid; otherwise, −1.

The comparison with eraName is case-insensitive; for example, "A.D." is equivalent to "a.d.". The System.String containing the name of the era.

GetEraName

[C#] public string GetEraName(int era);

[C++] public: String* GetEraName(int era);

[VB] Public Function GetEraName(ByVal era As Integer) As String

[JScript] public function GetEraName(era: int): String;

Description

Gets the System.String containing the name of the specified era.

Return Value: A System.String containing the name of the era.

The valid values for era are listed in the System.Globalization.Calendar.Eras property of the appropriate class derived from System.Globalization.Calendar. For example: System.Globalization.JapaneseCalendar.Eras displays a list of eras that are supported by this implementation. The integer representing the era.

GetFormat

[C#] public object GetFormat(Type formatType);

[C++] public: _sealed Object* GetFormat(Type* formatType);

[VB] NotOverridable Public Function GetFormat(ByVal formatType As Type) As Object

[JScript] public function GetFormat(formatType: Type): Object;

Description

Gets an object of the specified type that provides a System.DateTime formatting service.

Return Value: The current instance of the System.Globalization.DateTimeFormatInfo class, if formatType is the same as the type of the current instance; otherwise, null.

The Format(String, IFormatProvider) method supported by the base data types invoke this method when the current instance is passed as the System.IFormatProvider parameter. This method implements System.IFormatProvider.GetFormat(System.Type). The System.Type of the required formatting service.

GetInstance

[C#] public static DateTimeFormatInfo GetInstance(IFormatProvider provider);

[C++] public: static DateTimeFormatInfo* GetInstance (IFormatProvider* provider);

[VB] Public Shared Function GetInstance(ByVal provider As IFormatProvider) As DateTimeFormatInfo

[JScript] public static function GetInstance(provider: IFormatProvider) DateTimeFormatInfo;

Description

Gets the System.Globalization.DateTimeFormatInfo instance associated with the specified System.IFormatProvider.

Return Value: A System.Globalization.DateTimeFormatInfo instance associated with the specified System.IFormatProvider This method uses the System.IFormatProvider.GetFormat (System.Type) method of formatProvider using System.Globalization.DateTimeFormatInfo as the Type parameter. If formatProvider is null or if System.IFormatProvider.GetFormat (System.Type) returns null, this method returns System.Globalization.DateTimeFormatInfo.CurrentInfo. The System.IFormatProvider that gets the System.Globalization.DateTimeFormatInfo instance.

GetMonthName

[C#] public string GetMonthName(int month);

[C++] public: String* GetMonthName(int month);

[VB] Public Function GetMonthName(ByVal month As Integer) As String

[JScript] public function GetMonthName(month: int): String; Gets the full name of the specified month.

Description

Gets the full name of the specified month based on the System.Globalization.CultureInfo of the current thread.

Return Value: The full name of the month represented by month.

For the default invariant System.Globalization.DateTimeFormatInfo instance, this method returns a string from the System.Globalization.GregorianCalendar: month Return Value 1 "January" 2 "February" 3 "March" 4 "April" 5 "May" 6 "June" 7 "July" 8 "August" 9 "September" 10 "October" 11 "November" 12 "December" 13" " System.Globalization.Calendar objects can accommodate calendars with 13 months. For 12-month calendars, the empty string is always returned as the name of the 13th month. An integer from 1 through 13 representing the name of the month to retrieve.

ReadOnly

[C#] public static DateTimeFormatInfo ReadOnly (DateTimeFormatInfo dtfi);

[C++] public: static DateTimeFormatInfo* ReadOnly (DateTimeFormatInfo* dtfi);

[VB] Public Shared Function ReadOnly(ByVal dtfi As DateTimeFormatInfo) As DateTimeFormatInfo

[JScript] public static function ReadOnly(dtfi: DateTimeFormatInfo): DateTimeFormatInfo;

Description

Returns a read-only System.Globalization.DateTimeFormatInfo wrapper.

Return Value: A read-only System.Globalization.DateTimeFormatInfo wrapper around dtfi.

This wrapper prevents any modifications to dtfi. The System.Globalization.DateTimeFormatInfo to wrap.

DateTimeStyles enumeration (System.Globalization)

ToString

Description

Defines the formatting options that customize how the System.DateTime.Parse(System.String) and System.DateTime.ParseExact(System.String,System.String,System.IFormatProvider) methods parse a string.

The System.Globalization.DateTimeStyles.No CurrentDateDefault value is the only value that is useful with the System.DateTime.Parse(System.String) method, because System.DateTime.Parse(System.String) always ignores leading, trailing, and inner white-space characters.

ToString

[C#] public const DateTimeStyles AdjustToUniversal;

[C++] public: const DateTimeStyles AdjustToUniversal;

[VB] Public Const AdjustToUniversal As DateTimeStyles

[JScript] public var AdjustToUniversal: DateTimeStyles;

Description

Indicates that the date and time must be converted to Universal Time or Greenwich mean time (GMT).

ToString

[C#] public const DateTimeStyles AllowInnerWhite;

[C++] public: const DateTimeStyles AllowInnerWhite;

[VB] Public Const AllowInnerWhite As DateTimeStyles

[JScript] public var AllowInnerWhite: DateTimeStyles;

Description

Indicates that extra white-space characters in the middle of the string must be ignored.

ToString

[C#] public const DateTimeStyles AllowLeadingWhite;

[C++] public: const DateTimeStyles AllowLeadingWhite;

[VB] Public Const AllowLeadingWhite As DateTimeStyles

[JScript] public var AllowLeadingWhite: DateTimeStyles;

Description

Indicates that leading white-space characters must be ignored.

ToString

[C#] public const DateTimeStyles AllowTrailingWhite;

[C++] public: const DateTimeStyles AllowTrailingWhite;

[VB] Public Const AllowTrailingWhite As DateTimeStyles

[JScript] public var AllowTrailingWhite: DateTimeStyles;

Description

Indicates that trailing white-space characters must be ignored.

ToString

[C#] public const DateTimeStyles AllowWhiteSpaces;

[C++] public: const DateTimeStyles AllowWhiteSpaces;

[VB] Public Const AllowWhiteSpaces As DateTimeStyles

[JScript] public var AllowWhiteSpaces: DateTimeStyles;

Description

Indicates that extra white-space characters anywhere in the string must be ignored. This value is a combination of the System.Globalization.DateTimeStyles.AllowLeadingWhite, System.Globalization.DateTimeStyles.AllowTrailingwhite, and System.Globalization.DateTimeStyles.Allow InnerWhite values.

ToString

[C#] public const DateTimeStyles NoCurrentDateDefault;

[C++] public: const DateTimeStyles NoCurrentDateDefault;

[VB] Public Const NoCurrentDateDefault As DateTime Styles

[JScript] public var NoCurrentDateDefault: DateTimeStyles;

Description

Indicates that, if the string does not include a date, the year, month, and day will each be set to "1" instead of the current year, month, and day.

ToString

[C#] public const DateTimeStyles None;

[C++] public: const DateTimeStyles None;

[VB] Public Const None As DateTimeStyles

[JScript] public var None: DateTimeStyles;

Description

Indicates that the default formatting options must be used. This is the default style for System.DateTime.Parse(System.String) and System.DateTime.ParseExact(System.String, System.String,System.IFormatProvider).

DaylightTime class (System.Globalization)

ToString

Description

Defines the period of daylight saving time. Daylight saving time is a period during the year when the time is advanced, usually by an hour, to take advantage of the extended daylight hours. At the end of the period, the time is set back to the standard time.

DaylightTime

Example Syntax:

ToString

[C#] public DaylightTime(DateTime start, DateTime end, TimeSpan delta);

[C++] public: DaylightTime(DateTime start, DateTime end, TimeSpan delta);

[VB] Public Sub New(ByVal start As DateTime, ByVal end As DateTime, ByVal delta As TimeSpan)

[JScript] public function DaylightTime(start: DateTime, end: DateTime, delta: TimeSpan);

Description

Initializes a new instance of the System.Globalization.DaylightTime class.

The start parameter becomes the value of the System.Globalization.DaylightTime.Start property of the new instance. The end parameter becomes the value of the System.Globalization.DaylightTime.End property of the new instance. The delta parameter becomes the value of the System.Globalization.DaylightTime.Delta property of the new instance. The System.DateTime instance that represents the date and time when the daylight saving period begins. The value must be in local time. The System.DateTime instance that represents the date and time when the daylight saving period ends. The value must be in local time. The System.TimeSpan instance that represents the difference between the standard time and the daylight saving time in ticks.

Delta

ToString

[C#] public TimeSpan Delta {get;}

[C++] public: _property TimeSpan get_Delta( );

[VB] Public ReadOnly Property Delta As TimeSpan

[JScript] public function get Delta( ): TimeSpan;

Description

Gets the System.TimeSpan instance that represents the difference between the standard time and the daylight saving time.

At the start of daylight saving time, the clock time is advanced by the length of time specified in this property. At the end of daylight saving time, the clock time is set back by the length of time specified in this property.

End

ToString

[C#] public DateTime End {get;}

[C++] public: _property DateTime get_End( );

[VB] Public ReadOnly Property End As DateTime

[JScript] public function get Endo: DateTime;

Description

Gets the System.DateTime instance that represents the date and time when the daylight saving period ends.

When the daylight saving period ends, the clock time is set back to the standard time.

Start

ToString

[C#] public DateTime Start {get;}

[C++] public: _property DateTime get_Start( );

[VB] Public ReadOnly Property Start As DateTime

[JScript] public function get Start( ): DateTime;

Description

Gets the System.DateTime instance that represents the date and time when the daylight saving period begins.

When the daylight saving period begins, the clock time is advanced by the number of ticks defined in System.Globalization.DaylightTime.Delta to take advantage of the extended daylight hours.

GregorianCalendar class (System.Globalization)

ToString

Description

Represents the Gregorian calendar.

The Gregorian calendar recognizes two eras: B.C. (before Christ) or B.C.E. (before common era), and A.D. (Latin "Anno Domini", which means "in the year of the Lord") or C.E. (common era). This implementation of the System.Globalization.GregorianCalendar class recognizes only the current era (A.D. or C.E.).

ToString

[C#] public const int ADEra;

[C++] public: const int ADEra;

[VB] Public Const ADEra As Integer

[JScript] public var ADEra: int;

Description

Represents the current era.

The Gregorian calendar recognizes two eras: B.C. (before Christ) or B.C.E. (before common era), and A.D. (Latin "Anno Domini", which means "in the year of the Lord") or C.E. (common era). This implementation of the System.Globalization.GregorianCalendar class recognizes only the current era (A.D. or C.E.). This field always returns 1.

GregorianCalendar

Example Syntax:

ToString

[C#] public GregorianCalendar( );

[C++] public: GregorianCalendar( );

[VB] Public Sub New( )

[JScript] public function GregorianCalendar( ); Initializes a new instance of the System.Globalization.GregorianCalendar class.

Description

Initializes a new instance of the System.Globalization.GregorianCalendar class using the default System.Globalization.GregorianCalendarTypes value.

The default System.Globalization.GregorianCalendarTypes value is System.Globalization.GregorianCalendarTypes.Localized.

GregorianCalendar

Example Syntax:

ToString

[C#] public GregorianCalendar(GregorianCalendarTypes type);

[C++] public: GregorianCalendar(GregorianCalendarTypes type);

[VB] Public Sub New(ByVal type As GregorianCalendarTypes)

[JScript] public function GregorianCalendar(type: GregorianCalendarTypes);

Description

Initializes a new instance of the System.Globalization.GregorianCalendar class using the specified System.Globalization.GregorianCalendarTypes value. The System.Globalization.GregorianCalendarTypes value that denotes which version of the calendar to create.

CalendarType

ToString

[C#] public virtual GregorianCalendarTypes CalendarType {get; set;}

[C++] public: _property virtual GregorianCalendarTypes get_CalendarType( );public: _property virtual void set_CalendarType(GregorianCalendarTypes);

[VB] Overridable Public Property CalendarType As GregorianCalendarTypes

[JScript] public function get CalendarType( ): GregorianCalendarTypes;public function set CalendarType(GregorianCalendarTypes);

Description

Gets or sets the System.Globalization.GregorianCalendarTypes value that denotes the version of the current System.Globalization.GregorianCalendar instance.

Eras

ToString

[C#] public override int[ ] Eras {get;}

[C++] public: _property virtual int get_Eras( );

[VB] Overrides Public ReadOnly Property Eras As Integer ( )

[JScript] public function get Eras( ): int[ ];

Description

Gets the list of eras in the System.Globalization.GregorianCalendar.

The Gregorian calendar recognizes two eras: B.C. (before Christ) or B.C.E. (before common era), and A.D. (Latin "Anno Domini", which means "in the year of the Lord") or C.E. (common era). This implementation of the System.Globalization.GregorianCalendar class recognizes only the current era (A.D. or C.E.). This property always returns an array with only one element.

TwoDigitYearMax

ToString

[C#] public override int TwoDigitYearMax {get; set;}

[C++] public: _property virtual int get_TwoDigitYearMax( );public: _property virtual void set_TwoDigitYearMax(int);

[VB] Overrides Public Property TwoDigitYearMax As Integer

[JScript] public function get TwoDigitYearMax( ): int;public function set TwoDigitYearMax(int);

Description

Gets or sets the last year of a 100-year range that can be represented by a 2-digit year.

This property allows a 2-digit year to be properly translated to a 4-digit year. For example, if this property is set to 2029, the 100-year range is from 1930 to 2029; therefore, a 2-digit value of 30 is interpreted as 1930, while a 2-digit value of 29 is interpreted as 2029.

AddMonths

[C#] public override DateTime AddMonths(DateTime time, int months);

[C++] public: DateTime AddMonths(DateTime time, int months);

[VB] Overrides Public Function AddMonths(ByVal time As DateTime, ByVal months As Integer) As DateTime

[JScript] public override function AddMonths(time: DateTime, months: int): DateTime;

Description

Returns a System.DateTime that is the specified number of months away from the specified System.DateTime.

Return Value: The System.DateTime that results from adding the specified number of months to the specified System.DateTime.

The year part of the resulting System.DateTime is affected if the resulting month is beyond the last month of the current year. The day part of the resulting System.DateTime is also affected if the resulting day is not a valid day in the resulting month of the resulting year; it is changed to the last valid day in the resulting month of the resulting year. The time-of-day part of the resulting System.DateTime remains the same as the specified System.DateTime. The System.DateTime instance to add. The number of months to add.

AddWeeks

[C#] public override DateTime AddWeeks(DateTime time, int weeks);

[C++] public: DateTime AddWeeks(DateTime time, int weeks);

[VB] Overrides Public Function AddWeeks(ByVal time As DateTime, ByVal weeks As Integer) As DateTime

[JScript] public override function AddWeeks(time: DateTime, weeks: int): DateTime;

Description

Returns a System.DateTime that is the specified number of weeks away from the specified System.DateTime.

Return Value: The System.DateTime that results from adding the specified number of weeks to the specified System.DateTime.

If weeks is negative, the resulting System.DateTimne would be earlier than the specified System.DateTime. The System.DateTime instance to add. The number of weeks to add.

AddYears

[C#] public override DateTime AddYears(DateTime time, int years);

[C++] public: DateTime AddYears(DateTime time, int years);

[VB] Overrides Public Function AddYears(ByVal time As DateTime, ByVal years As Integer) As DateTime

[JScript] public override function AddYears(time: DateTime, years: int)

DateTime;

Description

Returns a System.DateTime that is the specified number of years away from the specified System.DateTime.

Return Value: The System.DateTime that results from adding the specified number of years to the specified System.DateTime.

The day part of the resulting System.DateTime is affected if the resulting day is not a valid day in the resulting month of the resulting year; it is changed to the last valid day in the resulting month of the resulting year. The time-of-day part of the resulting System.DateTime remains the same as the specified System.DateTime. The System.DateTime instance to add. The number of years to add.

GetDayOfMonth

[C#] public override int GetDayOfMonth(DateTime time);

[C++] public: int GetDayOfMonth(DateTime time);

[VB] Overrides Public Function GetDayOfMonth(ByVal time As DateTime) As Integer

[JScript] public override function GetDayOfMonth(time: DateTime): int;

Description

Gets the day of the month in the specified System.DateTime.

Return Value: An integer from 1 to 31 that represents the day of the month in time. The System.DateTime instance to read.

GetDayOfWeek

[C#] public override DayOfWeek GetDayOfWeek(DateTime time);

[C++] public: DayOfWeek GetDayOfWeek(DateTime time);

[VB] Overrides Public Function GetDayOfWeek(ByVal time As DateTime) As DayOfWeek

[JScript] public override function GetDayOfWeek(time: DateTime) DayOfWeek;

Description

Gets the day of the week in the specified System.DateTime.

Return Value: A System.DayOfWeek value that represents the day of the week in time.

The System.DayOfWeek values are Sunday, Monday, Tuesday, Wednesday, Thursday, Friday, and Saturday. The System.DateTime instance to read.

GetDayOfYear

[C#] public override int GetDayOfYear (DateTime time);

[C++] public: int GetDayOfYear(DateTime time);

[VB] Overrides Public Function GetDayOfYear(ByVal time As DateTime) As Integer

[JScript] public override function GetDayOfYear(time: DateTime): int;

Description

Gets the day of the year in the specified System.DateTime.

Return Value: An integer from 1 to 366 that represents the day of the year in time.

The System.DateTime instance to read.

GetDaysInMonth

[C#] public override int GetDaysInMonth(int year, int month, int era);

[C++] public: int GetDaysInMonth(int year, int month, int era);

[VB] Overrides Public Function GetDaysInMonth(ByVal year As Integer, ByVal month As Integer, ByVal era As Integer) As Integer

[JScript] public override function GetDaysInMonth(year: int, month: int, era: int): int; Gets the number of days in the specified month.

Description

Gets the number of days in the month specified by the year, month, and era parameters.

Return Value: The number of days in the specified month in the specified year in the specified era.

For example, this method might return 28 or 29 for February (month=2), depending on whether year is a leap year. An integer that represents the year. An integer that represents the month. An integer that represents the era.

GetDaysInYear

[C#] public override int GetDaysInYear(int year, int era);

[C++] public: int GetDaysInYear(int year, int era);

[VB] Overrides Public Function GetDaysInYear(ByVal year As Integer, ByVal era As Integer) As Integer

[JScript] public override function GetDaysInYear(year: int, era: int): int; Gets the number of days in the specified year.

Description

Gets the number of days in the year specified by the year and era parameters.

Return Value: The number of days in the specified year in the specified era.

For example, this method might return 365 or 366, depending on whether year is a leap year. An integer that represents the year. An integer that represents the era.

GetEra

[C#] public override int GetEra(DateTime time);

[C++] public: int GetEra(DateTime time);

[VB] Overrides Public Function GetEra(ByVal time As DateTime) As Integer

[JScript] public override function GetEra(time: DateTime): int;

Description

Gets the era in the specified System.DateTime.

Return Value: An integer that represents the era in time.

The Gregorian calendar recognizes two eras: B.C. (before Christ) or B.C.E. (before common era), and A.D. (Latin "Anno Domini", which means "in the year of the Lord") or C.E. (common era). This implementation of the System.Globalization.GregorianCalendar class recognizes only the current era (A.D. or C.E.). The System.DateTime instance to read.

GetMonth

[C#] public override int GetMonth(DateTime time);

[C++] public: int GetMonth(DateTime time);

[VB] Overrides Public Function GetMonth(ByVal time As DateTime) As Integer

[JScript] public override function GetMonth(time: DateTime): int;

Description

Gets the month in the specified System.DateTime.

Return Value: An integer between 1 and 12 that represents the month in time. The System.DateTime instance to read.

GetMonthsInYear

[C#] public override int GetMonthsInYear(int year, int era);

[C++] public: int (int year, int era);

[VB] Overrides Public Function GetMonthsInYear(ByVal year As Integer, ByVal era As Integer) As Integer

[JScript] public override function GetMonthsInYear(year: int, era: int): int; Gets the number of months in the specified year.

Description

Gets the number of months in the year specified by the year and era parameters.

Return Value: The number of months in the specified year in the specified era. An integer that represents the year. An integer that represents the era.

GetYear

[C#] public override int GetYear(DateTime time);

[C++] public: int GetYear(DateTime time);

[VB] Overrides Public Function GetYear(ByVal time As DateTime) As Integer

[JScript] public override function GetYear(time: DateTime): int;

Description

Gets the year in the specified System.DateTime.

Return Value: An integer between 1 and 9999 that represents the year in time. The System.DateTime instance to read.

IsLeapDay

[C#] public override bool IsLeapDay(int year, int month, int day, int era);

[C++] public: bool IsLeapDay(int year, int month, int day, int era);

[VB] Overrides Public Function IsLeapDay(ByVal year As Integer, ByVal month As Integer, ByVal day As Integer, ByVal era As Integer) As Boolean

[JScript] public override function IsLeapDay(year: int, month: int, day: int, era: int): Boolean; Determines whether the specified day is a leap day.

Description

Determines whether the date specified by the year, month, day, and era parameters is a leap day.

Return Value: true if the specified day is a leap day; otherwise, false.

A leap year in the Gregorian calendar is defined as a year that is evenly divisible by four, except if it is divisible by 100; however, years that are divisible by 400 are leap years. For example, the year 1900 was not a leap year, but the year 2000 was. A common year has 365 days and a leap year has 366 days. An integer that represents the year. An integer that represents the month. An integer that represents the day. An integer that represents the era.

IsLeapMonth

[C#] public override bool IsLeapMonth(int year, int month, int era);

[C++] public: bool IsLeapMonth(int year, int month, int era);

[VB] Overrides Public Function IsLeapMonth(ByVal year As Integer, ByVal month As Integer, ByVal era As Integer) As Boolean

[JScript] public override function IsLeapMonth(year: int, month: int, era: int): Boolean; Determines whether the specified month is a leap month.

Description

Determines whether the month specified by the year, month, and era parameters is a leap month.

Return Value: This method always returns false, unless overridden by a derived class.

A leap year in the Gregorian calendar is defined as a year that is evenly divisible by four, except if it is divisible by 100; however, years that are divisible by 400 are leap years. For example, the year 1900 was not a leap year, but the year 2000 was. A common year has 365 days and a leap year has 366 days. An integer that represents the year. An integer that represents the month. An integer that represents the era.

IsLeapYear

[C#] public override bool IsLeapYear(int year, int era);

[C++] public: bool IsLeapYear(int year, int era);

[VB] Overrides Public Function IsLeapYear(ByVal year As Integer, ByVal era As Integer) As Boolean

[JScript] public override function IsLeapYear(year: int, era: int): Boolean; Determines whether the specified year is a leap year.

Description

Determines whether the year specified by the year and era parameters is a leap year.

Return Value: true if the specified year is a leap year; otherwise, false.

A leap year in the Gregorian calendar is defined as a year that is evenly divisible by four, except if it is divisible by 100; however, years that are divisible by 400 are leap years. For example, the year 1900 was not a leap year, but the year 2000 was. A common year has 365 days and a leap year has 366 days. An integer that represents the year. An integer that represents the era.

ToDateTime

[C#] public override DateTime ToDateTime(int year, int month, int day, int hour, int minute, int second, int millisecond, int era);

[C++] public: DateTime ToDateTime(int year, int month, int day, int hour, int minute, int second, int millisecond, int era);

[VB] Overrides Public Function ToDateTime(ByVal year As Integer, ByVal month As Integer, ByVal day As Integer, ByVal hour As Integer, ByVal minute As Integer, ByVal second As Integer, ByVal millisecond As Integer, ByVal era As Integer) As DateTime

[JScript] public override function ToDateTime(year: int, month: int, day: int, hour: int, minute: int, second: int, millisecond: int, era: int): DateTime; Returns a System.DateTime that is set to the specified date.

Description

Returns a System.DateTime that is set to the specified date and time in the specified era.

Return Value: The System.DateTime instance set to the specified date and time in the current era. An integer that represents the year. An integer that represents the month. An integer that represents the day. An integer that represents the hour. An integer that represents the minute. An integer that represents the second. An integer that represents the millisecond. An integer that represents the era.

ToFourDigitYear

[C#] public override int ToFourDigitYear(int year);

[C++] public: int ToFourDigitYear(int year);

[VB] Overrides Public Function ToFourDigitYear(ByVal year As Integer) As Integer

[JScript] public override function ToFourDigitYear(year: int): int;

Description

Converts the specified two-digit year to a four-digit year by using the System.Globalization.GregorianCalendar.TwoDigitYearMax property to determine the appropriate century.

Return Value: An integer that contains the four-digit representation of year.

System.Globalization.GregorianCalendar.TwoDigitYearMax is the last year in the 100-year range that can be represented by a two-digit year. The century is determined by finding the sole occurrence of the two-digit year within that 100-year range. For example, if System.Globalization.GregorianCalendar.TwoDigitYearMax is set to 2029, the 100-year range is from 1930 to 2029; therefore, a 2-digit value of 30 is interpreted as 1930, while a 2-digit value of 29 is interpreted as 2029. A two-digit integer that represents the year to convert.

GregorianCalendarTypes enumeration (System.Globalization)

ToString

Description

Defines the different language versions of the Gregorian calendar.

Each version differs by language.

ToString

[C#] public const GregorianCalendarTypes Arabic;

[C++] public: const GregorianCalendarTypes Arabic;

[VB] Public Const Arabic As GregorianCalendarTypes

[JScript] public var Arabic: GregorianCalendarTypes;

Description

Refers to the Arabic version of the Gregorian calendar.

ToString

[C#] public const GregorianCalendarTypes Localized;

[C++] public: const GregorianCalendarTypes Localized;

[VB] Public Const Localized As GregorianCalendarTypes

[JScript] public var Localized: GregorianCalendarTypes;

Description

Refers to the localized version of the Gregorian calendar, based on the language of the System.Globalization.CultureInfo that uses the System.Globalization.DateTimeFormatInfo instance.

ToString

[C#] public const GregorianCalendarTypes MiddleEastFrench;

[C++] public: const GregorianCalendarTypes MiddleEastFrench;

[VB] Public Const MiddleEastFrench As GregorianCalendarTypes

[JScript] public var MiddleEastFrench: GregorianCalendarTypes;

Description

Refers to the Middle East French version of the Gregorian calendar.

ToString

[C#] public const GregorianCalendarTypes TransliteratedEnglish;

[C++] public: const GregorianCalendarTypes TransliteratedEnglish;

[VB] Public Const TransliteratedEnglish As GregorianCalendarTypes

[JScript] public var TransliteratedEnglish: GregorianCalendarTypes;

Description

Refers to the transliterated English version of the Gregorian calendar.

ToString

[C#] public const GregorianCalendarTypes TransliteratedFrench;

[C++] public: const GregorianCalendarTypes TransliteratedFrench;

[VB] Public Const TransliteratedFrench As GregorianCalendarTypes

[VScript] public var TransliteratedFrench: GregorianCalendarTypes;

Description

Refers to the transliterated French version of the Gregorian calendar.

ToString

[C#] public const GregorianCalendarTypes USEnglish;

[C++] public: const GregorianCalendarTypes USEnglish;

[VB] Public Const USEnglish As GregorianCalendarTypes

[JScript] public var USEnglish: GregorianCalendarTypes;

Description

Refers to the US English version of the Gregorian calendar.

HebrewCalendar class (System.Globalization)

ToString

Description

Represents the Hebrew calendar.

The Hebrew calendar recognizes two eras: B.C.E. (before the common era) and A.M. (Latin "Anno Mundi", which means "the year of the world"). This implementation of the System.Globalization.HebrewCalendar class recognizes only the current era (A.M.) and only the Hebrew years 5343 to 6000 (1582 to 2240 in the Gregorian calendar).

ToString

[C#] public static readonly it HebrewEra;

[C++] public: static int HebrewEra;

[VB] Public Shared ReadOnly HebrewEra As Integer

[JScript] public static var HebrewEra: int;

Description

Represents the current era.

The Hebrew calendar recognizes two eras: B.C.E. (before the common era) and A.M. (Latin "Anno Mundi", which means "the year of the world"). This implementation of the System.Globalization.HebrewCalendar class recognizes only the current era (A.M.). This field always returns 1.

HebrewCalendar

Example Syntax:

ToString

[C#] public HebrewCalendar( );

[C++] public: HebrewCalendar( );

[VB] Public Sub New( )

[JScript] public function HebrewCalendar( );

Description

Initializes a new instance of the System.Globalization.HebrewCalendar class.

Eras

ToString

[C#] public override int[ ] Eras {get;}

[C++] public: _property virtual int get_Eras( );

[VB] Overrides Public ReadOnly Property Eras As Integer ( )

[JScript] public function get Eras( ): int[ ];

Description

Gets the list of eras in the System.Globalization.HebrewCalendar.

The Hebrew calendar recognizes two eras: B.C.E. (before the common era) and A.M. (Latin "Anno Mundi", which means "the year of the world"). This implementation of the System.Globalization.HebrewCalendar class recognizes only the current era (A.M.). This property always returns an array with only one element.

TwoDigitYearMax

ToString

[C#] public override int TwoDigitYearMax {get; set;}

[C++] public: _property virtual int get_TwoDigitYearMax( );public: _property virtual void set_TwoDigitYearMax(int);

[VB] Overrides Public Property TwoDigitYearMax As Integer

[JScript] public function get TwoDigitYearMax( ): int;public function set TwoDigitYearMax(int);

Description

Gets or sets the last year of a 100-year range that can be represented by a 2-digit year.

This implementation of the System.Globalization.HebrewCalendar class recognizes only the Hebrew years 5343 to 6000 (1582 to 2240 in the Gregorian calendar).

AddMonths

[C#] public override DateTime AddMonths(DateTime time, int months);

[C++] public: DateTime AddMonths(DateTime time, int months);

[VB] Overrides Public Function AddMonths(ByVal time As DateTime, ByVal months As Integer) As DateTime

[JScript] public override function AddMonths(time: DateTime, months: int): DateTime;

Description

Returns a System.DateTime that is the specified number of months away from the specified System.DateTime.

Return Value: The System.DateTime that results from adding the specified number of months to the specified System.DateTime.

This implementation of the System.Globalization.HebrewCalendar class recognizes only the Hebrew years 5343 to 6000 (1582 to 2240 in the Gregorian calendar). The System.DateTime instance to add. The number of months to add.

AddYears

[C#] public override DateTime AddYears(DateTime time, int years);

[C++] public: DateTime AddYears(DateTime time, int years);

[VB] Overrides Public Function AddYears(ByVal time As DateTime, ByVal years As Integer) As DateTime

[JScript] public override function AddYears(time: DateTime, years: int): DateTime;

Description

Returns a System.DateTime that is the specified number of years away from the specified System.DateTime.

Return Value: The System.DateTime that results from adding the specified number of years to the specified System.DateTime.

This implementation of the System.Globalization.HebrewCalendar class recognizes only the Hebrew years 5343 to 6000 (1582 to 2240 in the Gregorian calendar). The System.DateTime instance to add. The number of years to add.

GetDayOfMonth

[C#] public override int GetDayOfMonth(DateTime time);

[C++] public: int GetDayOfMonth(DateTime time);

[VB] Overrides Public Function GetDayOfMonth(ByVal time As DateTime) As Integer

[JScript] public override function GetDayOfMonth(time: DateTime): int;

Description

Gets the day of the month in the specified System.DateTime.

Return Value: An integer from 1 to 30 that represents the day of the month in time. The System.DateTime instance to read.

GetDayOfWeek

[C#] public override DayOfWeek GetDayOfWeek(DateTime time);

[C++] public: DayOfWeek GetDayOfWeek(DateTime time);

[VB] Overrides Public Function GetDayOfWeek(ByVal time As DateTime) As DayOfWeek

[JScript] public override function GetDayOfWeek(time: DateTime) DayOfWeek;

Description

Gets the day of the week in the specified System.DateTime.

Return Value: A System.DayOfWeek value that represents the day of the week in time.

The System.DayOfWeek values are Sunday which indicates Yom Rishon, Monday which indicates Yom Sheni, Tuesday which indicates Yom Shlishi, Wednesday which indicates Yom Reviee, Thursday which indicates Yom Chamishi, Friday which indicates Yom Shishi, and Saturday which indicates Shabat. The System.DateTime instance to read.

GetDayOfYear

[C#] public override int GetDayOfYear (DateTime time);

[C++] public: int GetDayOfYear(DateTime time);

[VB] Overrides Public Function GetDayOfYear(ByVal time As DateTime) As Integer

[JScript] public override function GetDayOfYear(time: DateTime): int;

Description

Gets the day of the year in the specified System.DateTime.

Return Value: An integer from 1 to 385 that represents the day of the year in time.

This implementation of the System.Globalization.HebrewCalendar class recognizes only the Hebrew years 5343 to 6000 (1582 to 2240 in the Gregorian calendar). The System.DateTime instance to read.

GetDaysInMonth

[C#] public override int GetDaysInMonth(int year, int month, int era);

[C++] public: int GetDaysInMonth(int year, int month, int era);

[VB] Overrides Public Function GetDaysInMonth(ByVal year As Integer, ByVal month As Integer, ByVal era As Integer) As Integer

[JScript] public override function GetDaysInMonth(year: int, month: int, era: int): int; Gets the number of days in the specified month.

Description

Gets the number of days in the month specified by the year, month, and era parameters.

Return Value: The number of days in the specified month in the specified year in the specified era.

For example, this method might return 29 or 30 for Cheshvan, depending on the placement of Jewish holidays. An integer that represents the year. An integer that represents the month. An integer that represents the era.

GetDaysInYear

[C#] public override int GetDaysInYear(int year, int era);

[C++] public: int GetDaysInYear(int year, int era);

[VB] Overrides Public Function GetDaysInYear(ByVal year As Integer, ByVal era As Integer) As Integer

[JScript] public override function GetDaysInYear(year: int, era: int): int; Gets the number of days in the specified year.

Description

Gets the number of days in the year specified by the year and era parameters.

Return Value: The number of days in the specified year in the specified era.

For example, this method might return an integer from 353 to 355 or from 383 to 385, depending on the placement of Jewish holidays and depending on whether year is a leap year. An integer that represents the year. An integer that represents the era.

GetEra

[C#] public override int GetEra(DateTime time);

[C++] public: int GetEra(DateTime time);

[VB] Overrides Public Function GetEra(ByVal time As DateTime) As Integer

[JScript] public override function GetEra(time: DateTime): int;

Description

Gets the era in the specified System.DateTime.

Return Value: An integer that represents the era in time.

The Hebrew calendar recognizes two eras: B.C.E. (before the common era) and A.M. (Latin "Anno Mundi", which means "the year of the world"). This implementation of the System.Globalization.HebrewCalendar class recognizes only the current era (A.M.) and only the Hebrew years 5343 to 6000 (1582 to 2240 in the Gregorian calendar). The System.DateTime instance to read.

GetMonth

[C#] public override int GetMonth(DateTime time);

[C++] public: int GetMonth(DateTime time);

[VB] Overrides Public Function GetMonth(ByVal time As DateTime) As Integer

[JScript] public override function GetMonth(time: DateTime): int;

Description

Gets the month in the specified System.DateTime.

Return Value: An integer between 1 and 13 that represents the month in time. The System.DateTime instance to read.

GetMonthsInYear

[C#] public override int GetMonthsInYear(int year, int era);

[C++] public: int GetMonthsInYear(int year, int era);

[VB] Overrides Public Function GetMonthsInYear(ByVal year As Integer, ByVal era As Integer) As Integer

[JScript] public override function GetMonthsInYear(year: int, era: int): int; Gets the number of months in the specified year.

Description

Gets the number of months in the year specified by the year and era parameters.

Return Value: The number of months in the specified year in the specified era.

For example, this method might return 12 or 13, depending on whether year is a leap year. An integer that represents the year. An integer that represents the era.

GetYear

[C#] public override int GetYear(DateTime time);

[C++] public: int GetYear(DateTime time);

[VB] Overrides Public Function GetYear(ByVal time As DateTime) As Integer

[JScript] public override function GetYear(time: DateTime): int;

Description

Gets the year in the specified System.DateTime.

Return Value: An integer between 1 and 9999 that represents the year in time.

This implementation of the System.Globalization.HebrewCalendar class recognizes only the Hebrew years 5343 to 6000 (1582 to 2240 in the Gregorian calendar). The System.DateTime instance to read.

IsLeapDay

[C#] public override bool IsLeapDay(int year, int month, int day, int era);

[C++] public: bool IsLeapDay(int year, int month, int day, int era);

[VB] Overrides Public Function IsLeapDay(ByVal year As Integer, ByVal month As Integer, ByVal day As Integer, ByVal era As Integer) As Boolean

[JScript] public override function IsLeapDay(year: int, month: int, day: int, era: int): Boolean; Determines whether the specified day is a leap day.

Description

Determines whether the date specified by the year, month, day, and era parameters is a leap day.

Return Value: true if the specified day is a leap day; otherwise, false.

This implementation of the System.Globalization.HebrewCalendar class recognizes only the Hebrew years 5343 to 6000 (1582 to 2240 in the Gregorian calendar). An integer that represents the year. An integer that represents the month. An integer that represents the day. An integer that represents the era.

IsLeapMonth

[C#] public override bool IsLeapMonth(int year, int month, int era);

[C++] public: bool IsLeapMonth(int year, int month, int era);

[VB] Overrides Public Function IsLeapMonth(ByVal year As Integer, ByVal month As Integer, ByVal era As Integer) As Boolean

[JScript] public override function IsLeapMonth(year: int, month: int, era: int) Boolean; Determines whether the specified month is a leap month.

Description

Determines whether the month specified by the year, month, and era parameters is a leap month.

Return Value: true if the specified month is a leap month; otherwise, false.

This implementation of the System.Globalization.HebrewCalendar class recognizes only the Hebrew years 5343 to 6000 (1582 to 2240 in the Gregorian calendar). An integer that represents the year. An integer that represents the month. An integer that represents the era.

IsLeapYear

[C#] public override bool IsLeapYear(int year, int era);

[C++] public: bool IsLeapYear(int year, int era);

[VB] Overrides Public Function IsLeapYear(ByVal year As Integer, ByVal era As Integer) As Boolean

[JScript] public override function IsLeapYear(year: int, era: int): Boolean; Determines whether the specified year is a leap year.

Description

Determines whether the year specified by the year and era parameters is a leap year.

Return Value: true if the specified year is a leap year; otherwise, false.

This implementation of the System.Globalization.HebrewCalendar class recognizes only the Hebrew years 5343 to 6000 (1582 to 2240 in the Gregorian calendar). An integer that represents the year. An integer that represents the era.

ToDateTime

[C#] public override DateTime ToDateTime(int year, int month, int day, int hour, int minute, int second, int millisecond, int era);

[C++] public: DateTime ToDateTime(int year, int month, int day, int hour, int minute, int second, int millisecond, int era);

[VB] Overrides Public Function ToDateTime(ByVal year As Integer, ByVal month As Integer, ByVal day As Integer, ByVal hour As Integer, ByVal minute As Integer, ByVal second As Integer, ByVal millisecond As Integer, ByVal era As Integer) As DateTime

[JScript] public override function ToDateTime(year: int, month: int, day: int, hour: int, minute: int, second: int, millisecond: int, era: int): DateTime; Returns a System.DateTime that is set to the specified date.

Description

Returns a System.DateTime that is set to the specified date and time in the specified era.

Return Value: The System.DateTime instance set to the specified date and time in the current era.

This implementation of the System.Globalization.HebrewCalendar class recognizes only the Hebrew years 5343 to 6000 (1582 to 2240 in the Gregorian calendar). An integer that represents the year. An integer that represents the month. An integer that represents the day. An integer that represents the hour. An integer that represents the minute. An integer that represents the second. An integer that represents the millisecond. An integer that represents the era.

ToFourDigitYear

[C#] public override int ToFourDigitYear(int year);

[C++] public: int ToFourDigitYear(int year);

[VB] Overrides Public Function ToFourDigitYear(ByVal year As Integer) As Integer

[JScript] public override function ToFourDigitYear(year: int): int;

Description

Converts the specified two-digit year to a four-digit year by using the System.Globalization.HebrewCalendar.TwoDigitYearMax property to determine the appropriate century.

Return Value: An integer that contains the four-digit representation of year.

This implementation of the System.Globalization.HebrewCalendar class recognizes only the Hebrew years 5343 to 6000 (1582 to 2240 in the Gregorian calendar). A two-digit integer that represents the year to convert.

HijriCalendar class (System.Globalization)

ToString

Description

Represents the Hijri calendar.

The Hijri calendar recognizes one era: A.H. (Latin "Anno Hegirae", which means "the year of the migration" in reference to the migration of Muhammad from Mecca).

ToString

[C#] public static readonly int HijriEra;

[C++] public: static int HijriEra;

[VB] Public Shared ReadOnly HijriEra As Integer

[JScript] public static var HijriEra: int;

Description

Represents the current era.

The Hijri calendar recognizes one era: A.H. (Latin "Anno Hegirae", which means "the year of the migration" referring to the migration of Muhammad from Mecca).

HijriCalendar

Example Syntax:

ToString

[C#] public HijriCalendar( );

[C++] public: HijriCalendar( );

[VB] Public Sub New( )

[JScript] public function HijriCalendar( );

Description

Initializes a new instance of the System.Globalization.HijriCalendar class.

Eras

ToString

[C#] public override int[ ] Eras {get;}

[C++] public: _property virtual int get_Eras( );

[VB] Overrides Public ReadOnly Property Eras As Integer ( )

[JScript] public function get Eras( ): int[ ];

Description

Gets the list of eras in the System.Globalization.HijriCalendar.

The Hijri calendar recognizes one era: A.H. (Latin "Anno Hegirae", which means "the year of the migration" referring to the migration of Muhammad from Mecca).

TwoDigitYearMax

ToString

[C#] public override int TwoDigitYearMax {get; set;}

[C++] public: _property virtual int get_TwoDigitYearMax( );public: _property virtual void set_TwoDigitYearMax(int);

[VB] Overrides Public Property TwoDigitYearMax As Integer

[JScript] public function get TwoDigitYearMax( ): int;public function set TwoDigitYearMax(int);

Description

Gets or sets the last year of a 100-year range that can be represented by a 2-digit year.

This property allows a 2-digit year to be properly translated to a 4-digit year. For example, if this property is set to 1429, the 100-year range is from 1330 to 1429; therefore, a 2-digit value of 30 is interpreted as 1330, while a 2-digit value of 29 is interpreted as 1429.

AddMonths

[C#] public override DateTime AddMonths(DateTime time, int months);

[C++] public: DateTime AddMonths(DateTime time, int months);

[VB] Overrides Public Function AddMonths(ByVal time As DateTime, ByVal months As Integer) As DateTime

[JScript] public override function AddMonths(time: DateTime, months: int): DateTime;

Description

Returns a System.DateTime that is the specified number of months away from the specified System.DateTime.

Return Value: The System.DateTime that results from adding the specified number of months to the specified System. DateTime.

The year part of the resulting System.DateTime is affected if the resulting month is beyond the last month of the current year. The day part of the resulting System.DateTime is also affected if the resulting day is not a valid day in the resulting month of the resulting year; it is changed to the last valid day in the resulting month of the resulting year. The time-of-day part of the resulting System.DateTime remains the same as the specified System.DateTime. The System.DateTime instance to add. The number of months to add.

AddYears

[C#] public override DateTime AddYears(DateTime time, int years);

[C++] public: DateTime AddYears(DateTime time, int years);

[VB] Overrides Public Function AddYears(ByVal time As DateTime, ByVal years As Integer) As DateTime

[JScript] public override function AddYears(time: DateTime, years: int): DateTime;

Description

Returns a System.DateTime that is the specified number of years away from the specified System.DateTime.

Return Value: The System.DateTime that results from adding the specified number of years to the specified System. DateTime.

The day part of the resulting System.DateTime is affected if the resulting day is not a valid day in the resulting month of the resulting year; it is changed to the last valid day in the resulting month of the resulting year. The time-of-day part of the resulting System.DateTime remains the same as the specified System.DateTime. The System.DateTime instance to add. The number of years to add.

GetDayOfMonth

[C#] public override int GetDayOfMonth (DateTime time);

[C++] public: int GetDayOfMonth(DateTime time);

[VB] Overrides Public Function GetDayOfMonth(ByVal time As DateTime) As Integer

[JScript] public override function GetDayOfMonth(time: DateTime): int;

Description

Gets the day of the month in the specified System. DateTime.

Return Value: An integer from 1 to 30 that represents the day of the month in time. The System.DateTime instance to read.

GetDayOfWeek

[C#] public override DayOfWeek GetDayOfWeek(DateTime time);

[C++] public: DayOfWeek GetDayOfWeek(DateTime time);

[VB] Overrides Public Function GetDayOfWeek(ByVal time As DateTime) As DayOfWeek

[JScript] public override function GetDayOfWeek(time: DateTime): DayOfWeek;

Description

Gets the day of the week in the specified System.DateTime.

Return Value: A System.DayOfWeek value that represents the day of the week in time.

The System.DayOfWeek values are Sunday which indicates Al-Ahad, Monday which indicates Al-Ithnayn, Tuesday which indicates At-Thulaathaa', Wednesday which indicates Al-Arbi'aa', Thursday which indicates Al-Khamiis, Friday which indicates Al-Jumu'ah, and Saturday which indicates As-Sabt. The System.DateTime instance to read.

GetDayOfYear

[C#] public override int GetDayOfYear(DateTime time);

[C++] public: int GetDayOfYear(DateTime time);

[VB] Overrides Public Function GetDayOfYear(ByVal time As DateTime) As Integer

[JScript] public override function GetDayOfYear(time: DateTime): int;

Description

Gets the day of the year in the specified System.DateTime.

Return Value: An integer from 1 to 355 that represents the day of the year in time. The System.DateTime instance to read.

GetDaysInMonth

[C#] public override int GetDaysInMonth(int year, int month, int era);

[C++] public: int GetDaysInMonth(int year, int month, int era);

[VB] Overrides Public Function GetDaysInMonth(ByVal year As Integer, ByVal month As Integer, ByVal era As Integer) As Integer

[JScript] public override function GetDaysInMonth(year: int, month: int, era: int): int; Gets the number of days in the specified month.

Description

Gets the number of days in the month specified by the year, month, and era parameters.

Return Value: The number of days in the specified month in the specified year in the specified era.

For example, this method might return 29 or 30 for Zulhijjah (month=12), depending on whether year is a leap year. An integer that represents the year. An integer that represents the month. An integer that represents the era.

GetDaysInYear

[C#] public override int GetDaysInYear(int year, int era);

[C++] public: int GetDaysInYear(int year, int era);

[VB] Overrides Public Function GetDaysInYear(ByVal year As Integer, ByVal era As Integer) As Integer

[JScript] public override function GetDaysInYear(year: int, era: int): int; Gets the number of days in the specified year.

Description

Gets the number of days in the year specified by the year and era parameters.

Return Value: The number of days in the specified year in the specified era.

For example, this method might return 354 or 355, depending on whether year is a leap year. An integer that represents the year. An integer that represents the era.

GetEra

[C#] public override int GetEra(DateTime time);

[C++] public: int GetEra(DateTime time);

[VB] Overrides Public Function GetEra(ByVal time As DateTime) As Integer

[JScript] public override function GetEra(time: DateTime): int;

Description

Gets the era in the specified System.DateTime.

Return Value: An integer that represents the era in time.

The Hijri calendar recognizes one era: A.H. (Latin "Anno Hegirae", which means "the year of the migration" referring to the migration of Muhammad from Mecca). The System.DateTime instance to read.

GetMonth

[C#] public override int GetMonth(DateTime time);

[C++] public: int GetMonth(DateTime time);

[VB] Overrides Public Function GetMonth(ByVal time As DateTime) As Integer

[JScript] public override function GetMonth(time: DateTime): int;

Description

Gets the month in the specified System.DateTime.

Return Value: An integer between 1 and 12 that represents the month in time. The System.DateTime instance to read.

GetMonthsInYear

[C#] public override int GetMonthsInYear(int year, int era);

[C++] public: int GetMonthsInYear(int year, int era);

[VB] Overrides Public Function GetMonthsInYear(ByVal year As Integer, ByVal era As Integer) As Integer

[JScript] public override function GetMonthsInYear(year: int, era: int): int; Gets the number of months in the specified year.

Description

Gets the number of months in the year specified by the year and era parameters.

Return Value: The number of months in the specified year in the specified era. An integer that represents the year. An integer that represents the era.

GetYear

[C#] public override int GetYear(DateTime time);

[C++] public: int GetYear(DateTime time);

[VB] Overrides Public Function GetYear(ByVal time As DateTime) As Integer

[JScript] public override function GetYear(time: DateTime): int;

Description

Gets the year in the specified System.DateTime.

Return Value: An integer between 1 and 9999 that represents the year in time. The System.DateTime instance to read.

IsLeapDay

[C#] public override bool IsLeapDay(int year, int month, int day, int era);

[C++] public: bool IsLeapDay(int year, int month, int day, int era);

[VB] Overrides Public Function IsLeapDay(ByVal year As Integer, ByVal month As Integer, ByVal day As Integer, ByVal era As Integer) As Boolean

[JScript] public override function IsLeapDay(year: int, month: int, day: int, era: int): Boolean; Determines whether the specified day is a leap day.

Description

Determines whether the date specified by the year, month, day, and era parameters is a leap day.

Return Value: true if the specified day is a leap day; otherwise, false.

In every 30-year cycle that ends with a year that is evenly divisible by 30, the 2nd, 5th, 7th, 10th, 13th, 16th, 18th, 21st, 24th, 26th, and 29th years are leap years. A common year has 354 days and a leap year has 355 days. An integer that represents the year. An integer that represents the month. An integer that represents the day. An integer that represents the era.

IsLeapMonth

[C#] public override bool IsLeapMonth(int year, int month, int era);

[C++] public: bool IsLeapMonth(int year, int month, int era);

[VB] Overrides Public Function IsLeapMonth(ByVal year As Integer, ByVal month As Integer, ByVal era As Integer) As Boolean

[JScript] public override function IsLeapMonth(year: int, month: int, era: int): Boolean; Determines whether the specified month is a leap month.

Description

Determines whether the month specified by the year, month, and era parameters is a leap month.

Return Value: This method always returns false, unless overridden by a derived class.

In every 30-year cycle that ends with a year that is evenly divisible by 30, the 2nd, 5th, 7th, 10th, 13th, 16th, 18th, 21st, 24th, 26th, and 29th years are leap years. A common year has 354 days and a leap year has 355 days. An integer that represents the year. An integer that represents the month. An integer that represents the era.

IsLeapYear

[C#] public override bool IsLeapYear(int year, int era);

[C++] public: bool IsLeapYear(int year, int era);

[VB] Overrides Public Function IsLeapYear(ByVal year As Integer, ByVal era As Integer) As Boolean

[JScript] public override function IsLeapYear(year: int, era: int): Boolean; Determines whether the specified year is a leap year.

Description

Determines whether the year specified by the year and era parameters is a leap year.

Return Value: true if the specified year is a leap year; otherwise, false.

In every 30-year cycle that ends with a year that is evenly divisible by 30, the 2nd, 5th, 7th, 10th, 13th, 16th, 18th, 21st, 24th, 26th, and 29th years are leap years. A common year has 354 days and a leap year has 355 days. An integer that represents the year. An integer that represents the era.

ToDateTime

[C#] public override DateTime ToDateTime(int year, int month, int day, int hour, int minute, int second, int millisecond, int era);

[C++] public: DateTime ToDateTime(int year, int month, int day, int hour, int minute, int second, int millisecond, int era);

[VB] Overrides Public Function ToDateTime(ByVal year As Integer, ByVal month As Integer, ByVal day As Integer, ByVal hour As Integer, ByVal minute As Integer, ByVal second As Integer, ByVal millisecond As Integer, ByVal era As Integer) As DateTime

[JScript] public override function ToDateTime(year: int, month: int, day: int, hour: int, minute: int, second: int, millisecond: int, era: int): DateTime; Returns a System.DateTime that is set to the specified date.

Description

Returns a System.DateTime that is set to the specified date and time in the specified era.

Return Value: The System.DateTime instance set to the specified date and time in the current era. An integer that represents the year. An integer that represents the month. An integer that represents the day. An integer that represents the hour. An integer that represents the minute. An integer that represents the second. An integer that represents the millisecond. An integer that represents the era.

ToFourDigitYear

[C#] public override it ToFourDigitYear(int year);

[C++] public: int ToFourDigitYear(int year);

[VB] Overrides Public Function ToFourDigitYear(ByVal year As Integer) As Integer

[JScript] public override function ToFourDigitYear(year: int): int;

Description

Converts the specified two-digit year to a four-digit year by using the System.Globalization.HijriCalendar.TwoDigitYearMax property to determine the appropriate century.

Return Value: An integer that contains the four-digit representation of year.

System.Globalization.HijriCalendar.TwoDigitYearMax is the last year in the 100-year range that can be represented by a two-digit year. The century is determined by finding the sole occurrence of the two-digit year within that 100-year range. For example, if System.Globalization.HijriCalendar.TwoDigitYearMax is set to 1429, the 100-year range is from 1330 to 1429; therefore, a 2-digit value of 30 is interpreted as 1330, while a 2-digit value of 29 is interpreted as 1429. A two-digit integer that represents the year to convert.

JapaneseCalendar class (System.Globalization)

ToString

Description

Represents the Japanese calendar.

The Japanese calendar, which is also known as the Wareki calendar, works exactly like the Gregorian calendar, except that the year and era are different.

JapaneseCalendar

Example Syntax:

ToString

[C#] public JapaneseCalendar( );

[C++] public: JapaneseCalendar( );

[VB] Public Sub New( )

[JScript] public function JapaneseCalendar( );

Description

Initializes a new instance of the System.Globalization.JapaneseCalendar class.

Eras

ToString

[C#] public override int[ ] Eras {get;}

[C++] public: _property virtual int get_Eras( );

[VB] Overrides Public ReadOnly Property Eras As Integer ( )

[JScript] public function get Eras( ): int[ ];

Description

Gets the list of eras in the System.Globalization.JapaneseCalendar.

The Japanese calendar recognizes one era for every emperor's reign. The current era is the Heisei era, which began in the Gregorian calendar year 1989. The era name is typically displayed before the year. For example, the Gregorian calendar year 2001 is the Wareki calendar year Heisei 13. Note that the first year of an era is called "Gannen"; therefore, the Gregorian calendar year 1989 was the Wareki calendar year Heisei Gannen.

TwoDigitYearMax

ToString

[C#] public override int TwoDigitYearMax {get; set;}

[C++] public: _property virtual int get_TwoDigitYear Max( );public: _property virtual void set_TwoDigitYearMax(int);

[VB] Overrides Public Property TwoDigitYearMax As Integer

[JScript] public function get TwoDigitYearMax( ): int;public function set TwoDigitYearMax(int);

Description

Gets or sets the last year of a 100-year range that can be represented by a 2-digit year.

This property implements System.Globalization.Calendar.TwoDigitYearMax.

AddMonths

[C#] public override DateTime AddMonths(DateTime time, int months);

[C++] public: DateTime AddMonths(DateTime time, int months);

[VB] Overrides Public Function AddMonths(ByVal time As DateTime, ByVal months As Integer) As DateTime

[JScript] public override function AddMonths(time: DateTime, months: int): DateTime;

Description

Returns a System.DateTime that is the specified number of months away from the specified System.DateTime.

Return Value: The System.DateTime that results from adding the specified number of months to the specified System.DateTime.

The year part of the resulting System.DateTime is affected if the resulting month is beyond the last month of the current year. The day part of the resulting System.DateTime is also affected if the resulting day is not a valid day in the resulting month of the resulting year; it is changed to the last valid day in the resulting month of the resulting year. The time-of-day part of the resulting System.DateTime remains the same as the specified System.DateTime. The System.DateTime instance to add. The number of months to add.

AddYears

[C#] public override DateTime AddYears(DateTime time, int years);

[C++] public: DateTime AddYears(DateTime time, int years);

[VB] Overrides Public Function AddYears(ByVal time As DateTime, ByVal years As Integer) As DateTime

[JScript] public override function AddYears(time: DateTime, years: int): DateTime;

Description

Returns a System.DateTime that is the specified number of years away from the specified System.DateTime.

Return Value: The System.DateTime that results from adding the specified number of years to the specified System.DateTime.

The day part of the resulting System.DateTime is affected if the resulting day is not a valid day in the resulting month of the resulting year; it is changed to the last valid day in the resulting month of the resulting year. The time-of-day part of the resulting System.DateTime remains the same as the specified System.DateTime. The System.DateTime instance to add. The number of years to add.

GetDayOfMonth

[C#] public override int GetDayOfMonth(DateTime time);

[C++] public: int GetDayOfMonth(DateTime time);

[VB] Overrides Public Function GetDayOfMonth(ByVal time As DateTime) As Integer

[JScript] public override function GetDayOfMonth(time: DateTime): int;

Description

Gets the day of the month in the specified System.DateTime.

Return Value: An integer from 1 to 31 that represents the day of the month in time. The System.DateTime instance to read.

GetDayOfWeek

[C#] public override DayOfWeek GetDayOfWeek(DateTime time);

[C++] public: DayOfWeek GetDayOfWeek(DateTime time);

[VB] Overrides Public Function GetDayOfWeek(ByVal time As DateTime) As DayOfWeek

[JScript] public override function GetDayOfWeek(time: DateTime): DayOfWeek;

Description

Gets the day of the week in the specified System.DateTime.

Return Value: A System.DayOfWeek value that represents the day of the week in time.

The System.DayOfWeek values are Sunday which indicates NichiYoubi, Monday which indicates GetsuYoubi, Tuesday which indicates KaYoubi, Wednesday which indicates SuiYoubi, Thursday which indicates MokuYoubi, Friday which indicates KinYoubi, and Saturday which indicates DouYoubi. The System.DateTime instance to read.

GetDayOfYear

[C#] public override int GetDayOfYear(DateTime time);

[C++] public: int GetDayOfYear(DateTime time);

[VB] Overrides Public Function GetDayOfYear(ByVal time As DateTime) As Integer

[JScript] public override function GetDayOfYear(time: DateTime): int;

Description

Gets the day of the year in the specified System.DateTime.

Return Value: An integer from 1 to 366 that represents the day of the year in time.

The System.DateTime instance to read.

GetDaysInMonth

[C#] public override it GetDaysInMonth (int year, int month, int era);

[C++] public: int GetDaysInMonth(int year, int month, int era);

[VB] Overrides Public Function GetDaysInMonth(ByVal year As Integer, ByVal month As Integer, ByVal era As Integer) As Integer

[JScript] public override function GetDaysInMonth(year: int, month: int, era: int): int; Gets the number of days in the specified month.

Description

Gets the number of days in the month specified by the year, month, and era parameters.

Return Value: The number of days in the specified month in the specified year in the specified era.

For example, this method might return 28 or 29 for NiGatsu (February, month=2), depending on whether year is a leap year. An integer that represents the year. An integer that represents the month. An integer that represents the era.

GetDaysInYear

[C#] public override int GetDaysInYear(int year, int era);

[C++] public: int GetDaysInYear(int year, int era);

[VB] Overrides Public Function GetDaysInYear(ByVal year As Integer, ByVal era As Integer) As Integer

[JScript] public override function GetDaysInYear(year: int, era: int): int; Gets the number of days in the specified year.

Description

Gets the number of days in the year specified by the year and era parameters.

Return Value: The number of days in the specified year in the specified era.

For example, this method might return 365 or 366, depending on whether year is a leap year. An integer that represents the year. An integer that represents the era.

GetEra

[C#] public override int GetEra(DateTime time);

[C++] public: int GetEra(DateTime time);

[VB] Overrides Public Function GetEra(ByVal time As DateTime) As Integer

[JScript] public override function GetEra(time: DateTime): int;

Description

Gets the era in the specified System.DateTime.

Return Value: An integer that represents the era in time.

The Japanese calendar recognizes one era for every emperor's reign. The current era is the Heisei era, which began in the Gregorian calendar year 1989. The era name is typically displayed before the year. For example, the Gregorian calendar year 2001 is the Wareki calendar year Heisei 13. Note that the first year of an era is called "Gannen"; therefore, the Gregorian calendar year 1989 was the Wareki calendar year Heisei Gannen. The System.DateTime instance to read.

GetMonth

[C#] public override int GetMonth(DateTime time);

[C++] public: int GetMonth(DateTime time);

[VB] Overrides Public Function GetMonth(ByVal time As DateTime) As Integer

[JScript] public override function GetMonth(time: DateTime): int;

Description

Gets the month in the specified System.DateTime.

Return Value: An integer between 1 and 12 that represents the month in time. The System.DateTime instance to read.

GetMonthsInYear

[C#] public override int GetMonthsInYear(int year, int era);

[C++] public: it GetMonthsInYear(int year, it era);

[VB] Overrides Public Function GetMonthsInYear(ByVal year As Integer, ByVal era As Integer) As Integer

[JScript] public override function GetMonthsInYear(year: int, era: int): int; Gets the number of months in the specified year.

Description

Gets the number of months in the year specified by the year and era parameters.

Return Value: The number of months in the specified year in the specified era. An integer that represents the year. An integer that represents the era.

GetYear

[C#] public override int GetYear(DateTime time);

[C++] public: int GetYear(DateTime time);

[VB] Overrides Public Function GetYear(ByVal time As DateTime) As Integer

[JScript] public override function GetYear(time: DateTime): int;

Description

Gets the year in the specified System.DateTime.

Return Value: An integer between 1 and 9999 that represents the year in time. The System.DateTime instance to read.

IsLeapDay

[C#] public override bool IsLeapDay(int year, int month, int day, int era);

[C++] public: bool IsLeapDay(int year, int month, int day, int era);

[VB] Overrides Public Function IsLeapDay(ByVal year As Integer, ByVal month As Integer, ByVal day As Integer, ByVal era As Integer) As Boolean

[JScript] public override function IsLeapDay(year: int, month: int, day: int, era: int): Boolean; Determines whether the specified day is a leap day.

Description

Determines whether the date specified by the year, month, day, and era parameters is a leap day.

Return Value: true, if the specified day is a leap day; otherwise, false.

Leap years in the Japanese calendar correspond to the same leap years in the Gregorian calendar. A common year has 365 days and a leap year has 366 days. An integer that represents the year. An integer that represents the month. An integer that represents the day. An integer that represents the era.

IsLeapMonth

[C#] public override bool IsLeapMonth(int year, int month, int era);

[C++] public: bool IsLeapMonth(int year, int month, int era);

[VB] Overrides Public Function IsLeapMonth(ByVal year As Integer, ByVal month As Integer, ByVal era As Integer) As Boolean

[JScript] public override function IsLeapMonth(year: int, month: int, era: int) Boolean; Determines whether the specified month is a leap month.

Description

Determines whether the month specified by the year, month, and era parameters is a leap month.

Return Value: This method always returns false, unless overridden by a derived class.

Leap years in the Japanese calendar correspond to the same leap years in the Gregorian calendar. A common year has 365 days and a leap year has 366 days. An integer that represents the year. An integer that represents the month. An integer that represents the era.

IsLeapYear

[C#] public override bool IsLeapYear(int year, int era); to

[C++] public: bool IsLeapYear(int year, int era);

[VB] Overrides Public Function IsLeapYear(ByVal year As Integer, ByVal era As Integer) As Boolean

[JScript] public override function IsLeapYear(year: int, era: int): Boolean; Determines whether the specified year is a leap year.

Description

Determines whether the year specified by the year and era parameters is a leap year.

Return Value: true, if the specified year is a leap year; otherwise, false.

Leap years in the Japanese calendar correspond to the same leap years in the Gregorian calendar. A common year has 365 days and a leap year has 366 days. An integer that represents the year. An integer that represents the era.

ToDateTime

[C#] public override DateTime ToDateTime(int year, int month, int day, int hour, int minute, int second, int millisecond, int era);

[C++] public: DateTime ToDateTime(int year, int month, int day, int hour, int minute, int second, int millisecond, int era);

[VB] Overrides Public Function ToDateTime(ByVal year As Integer, ByVal month As Integer, ByVal day As Integer, ByVal hour As Integer, ByVal minute As Integer, ByVal second As Integer, ByVal millisecond As Integer, ByVal era As Integer) As DateTime

[JScript] public override function ToDateTime(year: int, month: int, day: int, hour: int, minute: int, second: int, millisecond: int, era: int): DateTime; Returns a System.DateTime that is set to the specified date.

Description

Returns a System.DateTime that is set to the specified date and time in the specified era.

Return Value: The System.DateTime instance set to the specified date and time in the current era. An integer that represents the year. An integer that represents the month. An integer that represents the day. An integer that represents the hour. An integer that represents the minute. An integer that represents the second. An integer that represents the millisecond. An integer that represents the era.

ToFourDigitYear

[C#] public override int ToFourDigitYear(int year);

[C++] public: int ToFourDigitYear(int year);

[VB] Overrides Public Function ToFourDigitYear(ByVal year As Integer) As Integer

[JScript] public override function ToFourDigitYear(year: int): int;

Description

Converts the specified two-digit year to a four-digit year by using the System.Globalization.JapaneseCalendar.TwoDigitYearMax property to determine the appropriate century.

Return Value: An integer that contains the four-digit representation of year.

This method implements System.Globalization.Calendar.ToFourDigitYear(System.Int32). A two-digit integer that represents the year to convert.

JulianCalendar class (System.Globalization)

ToString

Description

Represents the Julian calendar.

In 45 B.C., Julius Caesar ordered a calendar reform, which resulted in the calendar called the Julian calendar. The Julian calendar is the predecessor of the Gregorian calendar.

ToString

[C#] public static readonly int JulianEra;

[C++] public: static int JulianEra;

[VB] Public Shared ReadOnly JulianEra As Integer
[JScript] public static var JulianEra: int;

Description

Represents the current era.

The System.Globalization.JulianCalendar class recognizes only the current era. This field always returns 1.

JulianCalendar

Example Syntax:

ToString

[C#] public JulianCalendar( );
[C++] public: JulianCalendar( );
[VB] Public Sub New( )
[JScript] public function JulianCalendar( );

Description

Initializes a new instance of the System.Globalization.JulianCalendar class.

Eras

ToString

[C#] public override int[ ] Eras {get;}
[C++] public: _property virtual int get_Eras( );
[VB] Overrides Public ReadOnly Property Eras As Integer ( )
[JScript] public function get Eras( ): int[ ];

Description

Gets the list of eras in the System.Globalization.JulianCalendar

The System.Globalization.JulianCalendar class recognizes only the current era. This property always returns an array with only one element.

TwoDigitYearMax

ToString

[C#] public override int TwoDigitYearMax {get; set;}
[C++] public: _property virtual int get_TwoDigitYearMax( );public: _property virtual void set_TwoDigitYearMax(int);
[VB] Overrides Public Property TwoDigitYearMax As Integer
[JScript] public function get TwoDigitYearMax( ): int;public function set TwoDigitYearMax(int);

Description

Gets or sets the last year of a 100-year range that can be represented by a 2-digit year.

This property allows a 2-digit year to be properly translated to a 4-digit year. For example, if this property is set to 2029, the 100-year range is from 1930 to 2029; therefore, a 2-digit value of 30 is interpreted as 1930, while a 2-digit value of 29 is interpreted as 2029.

AddMonths

[C#] public override DateTime AddMonths(DateTime time, int months);
[C++] public: DateTime AddMonths(DateTime time, int months);
[VB] Overrides Public Function AddMonths(ByVal time As DateTime, ByVal months As Integer) As DateTime
[JScript] public override function AddMonths(time: DateTime, months: int): DateTime;

Description

Returns a System.DateTime that is the specified number of months away from the specified System.DateTime.

Return Value: The System.DateTime that results from adding the specified number of months to the specified System.DateTime.

The year part of the resulting System.DateTime is affected if the resulting month is beyond the last month of the current year. The day part of the resulting System.DateTime is also affected if the resulting day is not a valid day in the resulting month of the resulting year; it is changed to the last valid day in the resulting month of the resulting year. The time-of-day part of the resulting System.DateTime remains the same as the specified System.DateTime. The System.DateTime instance to add. The number of months to add.

AddYears

[C#] public override DateTime AddYears(DateTime time, int years);
[C++] public: DateTime AddYears(DateTime time, int years);
[VB] Overrides Public Function AddYears(ByVal time As DateTime, ByVal years As Integer) As DateTime
[JScript] public override function AddYears(time: DateTime, years: int): DateTime;

Description

Returns a System.DateTime that is the specified number of years away from the specified System.DateTime.

Return Value: The System.DateTime that results from adding the specified number of years to the specified System.DateTime.

The day part of the resulting System.DateTime is affected if the resulting day is not a valid day in the resulting month of the resulting year; it is changed to to the last valid day in the resulting month of the resulting year. The time-of-day part of the resulting System.DateTime remains the same as the specified System.DateTime. The System.DateTime instance to add. The number of years to add.

GetDayOfMonth

[C#] public override int GetDayOfMonth (DateTime time);
[C++] public: int GetDayOfMonth(DateTime time);
[VB] Overrides Public Function GetDayOfMonth(ByVal time As DateTime) As Integer
[JScript] public override function GetDayOfMonth(time: DateTime): int;

Description

Gets the day of the month in the specified System.DateTime.

Return Value: An integer from 1 to 31 that represents the day of the month in time. The System.DateTime instance to read.

GetDayOfWeek

[C#] public override DayOfWeek GetDayOfWeek(DateTime time);
[C++] public: DayOfWeek GetDayOfWeek(DateTime time);
[VB] Overrides Public Function GetDayOfWeek(ByVal time As DateTime) As DayOfWeek
[JScript] public override function GetDayOfWeek(time: DateTime): DayOfWeek;

Description

Gets the day of the week in the specified System.DateTime.

Return Value: A System.DayOfWeek value that represents the day of the week in time.

The System.DayOfWeek values are Sunday, Monday, Tuesday, Wednesday, Thursday, Friday, and Saturday. The System.DateTime instance to read.

GetDayOfYear

[C#] public override int GetDayOfYear(DateTime time);
[C++] public: int GetDayOfYear(DateTime time);
[VB] Overrides Public Function GetDayOfYear(ByVal time As DateTime) As Integer
[JScript] public override function GetDayOfYear(time: DateTime): int;

Description

Gets the day of the year in the specified System.DateTime.

Return Value: An integer from 1 to 366 that represents the day of the year in time. The System.DateTime instance to read.

GetDaysInMonth

[C#] public override int GetDaysInMonth (int year, int month, int era);

[C++] public: int GetDaysInMonth(int year, int month, int era);

[VB] Overrides Public Function GetDaysInMonth(ByVal year As Integer, ByVal month As Integer, ByVal era As Integer) As Integer

[JScript] public override function GetDaysInMonth(year: int, month: int, era: int): int; Gets the number of days in the specified month.

Description

Gets the number of days in the month specified by the year, month, and era parameters.

Return Value: The number of days in the specified month in the specified year in the specified era.

For example, this method might return 28 or 29 for February (month=2), depending on whether year is a leap year. An integer that represents the year. An integer that represents the month. An integer that represents the era.

GetDaysInYear

[C#] public override int GetDaysInYear(int year, int era);

[C++] public: int GetDaysInYear(int year, int era);

[VB] Overrides Public Function GetDaysInYear(ByVal year As Integer, ByVal era As Integer) As Integer

[JScript] public override function GetDaysInYear(year: int, era: int): int; Gets the number of days in the specified year.

Description

Gets the number of days in the year specified by the year and era parameters.

Return Value: The number of days in the specified year in the specified era.

For example, this method might return 365 or 366, depending on whether year is a leap year. An integer that represents the year. An integer that represents the era.

GetEra

[C#] public override int GetEra(DateTime time);

[C++] public: int GetEra(DateTime time);

[VB] Overrides Public Function GetEra(ByVal time As DateTime) As Integer

[JScript] public override function GetEra(time: DateTime): int;

Description

Gets the era in the specified System.DateTime.

Return Value: An integer that represents the era in time.

The System.Globalization.JulianCalendar class recognizes only the current era. The System.DateTime instance to read.

GetMonth

[C#] public override int GetMonth(DateTime time);

[C++] public: int GetMonth(DateTime time);

[VB] Overrides Public Function GetMonth(ByVal time As DateTime) As Integer

[JScript] public override function GetMonth(time: DateTime): int;

Description

Gets the month in the specified System.DateTime.

Return Value: An integer between 1 and 12 that represents the month in time. The System.DateTime instance to read.

GetMonthsInYear

[C#] public override int GetMonthsInYear(int year, int era);

[C++] public: int GetMonthsInYear(int year, int era);

[VB] Overrides Public Function GetMonthsInYear(ByVal year As Integer, ByVal era As Integer) As Integer

[JScript] public override function GetMonthsInYear(year: int, era: int): int; Gets the number of months in the specified year.

Description

Gets the number of months in the year specified by the year and era parameters.

Return Value: The number of months in the specified year in the specified era. An integer that represents the year. An integer that represents the era.

GetYear

[C#] public override int GetYear(DateTime time);

[C++] public: int GetYear(DateTime time);

[VB] Overrides Public Function GetYear(ByVal time As DateTime) As Integer

[JScript] public override function GetYear(time: DateTime): int;

Description

Gets the year in the specified System.DateTime.

Return Value: An integer between 1 and 9999 that represents the year in time. The System.DateTime instance to read.

IsLeapDay

[C#] public override bool IsLeapDay(int year, int month, int day, int era);

[C++] public: bool IsLeapDay(int year, int month, int day, int era);

[VB] Overrides Public Function IsLeapDay(ByVal year As Integer, ByVal month As Integer, ByVal day As Integer, ByVal era As Integer) As Boolean

[JScript] public override function IsLeapDay(year: int, month: int, day: int, era: int): Boolean; Determines whether the specified day is a leap day.

Description

Determines whether the date specified by the year, month, day, and era parameters is a leap day.

Return Value: true if the specified day is a leap day; otherwise, false.

Unlike the Gregorian calendar, the Julian calendar defines a leap year as a year that is evenly divisible by four with no exceptions; therefore, the calendar is inaccurate by one day every 128 years. For example, the year 1999 was not a leap year, but the year 2000 was. A common year has 365 days and a leap year has 366 days. An integer that represents the year. An integer that represents the month. An integer that represents the day. An integer that represents the era.

IsLeapMonth

[C#] public override bool IsLeapMonth(int year, int month, int era);

[C++] public: bool IsLeapMonth(int year, int month, int era);

[VB] Overrides Public Function IsLeapMonth(ByVal year As Integer, ByVal month As Integer, ByVal era As Integer) As Boolean

[JScript] public override function IsLeapMonth(year: int, month: int, era: int) Boolean; Determines whether the specified month is a leap month.

Description

Determines whether the month specified by the year, month, and era parameters is a leap month.

Return Value: This method always returns false, unless overridden by a derived class.

Unlike the Gregorian calendar, the Julian calendar defines a leap year as a year that is evenly divisible by four with no exceptions; therefore, the calendar is inaccurate by one day every 128 years. For example, the year 1999 was not a leap year, but the year 2000 was. A common year has 365 days and a leap year has 366 days. An integer that represents the year. An integer that represents the month. An integer that represents the era.

IsLeapYear

[C#] public override bool IsLeapYear(int year, int era);

[C++] public: bool IsLeapYear(int year, int era);

[VB] Overrides Public Function IsLeapYear(ByVal year As Integer, ByVal era As Integer) As Boolean

[JScript] public override function IsLeapYear(year: int, era: int): Boolean; Determines whether the specified year is a leap year.

Description

Determines whether the year specified by the year and era parameters is a leap year.

Return Value: true if the specified year is a leap year; otherwise, false.

Unlike the Gregorian calendar, the Julian calendar defines a leap year as a year that is evenly divisible by four with no exceptions; therefore, the calendar is inaccurate by one day every 128 years. For example, the year 1999 was not a leap year, but the year 2000 was. A common year has 365 days and a leap year has 366 days. An integer that represents the year. An integer that represents the era.

ToDateTime

[C#] public override DateTime ToDateTime(int year, int month, int day, int hour, int minute, int second, int millisecond, int era);

[C++] public: DateTime ToDateTime(int year, int month, int day, int hour, int minute, int second, int millisecond, int era);

[VB] Overrides Public Function ToDateTime(ByVal year As Integer, ByVal month As Integer, ByVal day As Integer, ByVal hour As Integer, ByVal minute As Integer, ByVal second As Integer, ByVal millisecond As Integer, ByVal era As Integer) As DateTime

[JScript] public override function ToDateTime(year: int, month: int, day: int, hour: int, minute: int, second: int, millisecond: int, era: int): DateTime; Returns a System.DateTime that is set to the specified date.

Description

Returns a System.DateTime that is set to the specified date and time in the specified era.

Return Value: The System.DateTime instance set to the specified date and time in the current era. An integer that represents the year. An integer that represents the month. An integer that represents the day. An integer that represents the hour. An integer that represents the minute. An integer that represents the second. An integer that represents the millisecond. An integer that represents the era.

ToFourDigitYear

[C#] public override int ToFourDigitYear(int year);

[C++] public: int ToFourDigitYear(int year);

[VB] Overrides Public Function ToFourDigitYear(ByVal year As Integer) As Integer

[JScript] public override function ToFourDigitYear(year: int): int;

Description

Converts the specified two-digit year to a four-digit year by using the System.Globalization.JulianCalendar.TwoDigitYearMax property to determine the appropriate century.

Return Value: An integer that contains the four-digit representation of year.

System.Globalization.JulianCalendar.TwoDigitYearMax is the last year in the 100-year range that can be represented by a two-digit year. The century is determined by finding the sole occurrence of the two-digit year within that 100-year range. For example, if System.Globalization.JulianCalendar.TwoDigitYearMax is set to 2029, the 100-year range is from 1930 to 2029; therefore, a 2-digit value of 30 is interpreted as 1930, while a 2-digit value of 29 is interpreted as 2029. A two-digit integer that represents the year to convert.

KoreanCalendar class (System.Globalization)

ToString

Description

Represents the Korean calendar.

The Korean calendar works exactly like the Gregorian calendar, except that the year and era are different.

ToString

[C#] public const int KoreanEra;

[C++] public: const int KoreanEra;

[VB] Public Const KoreanEra As Integer

[JScript] public var KoreanEra: int;

Description

Represents the current era.

The System.Globalization.KoreanCalendar class recognizes only the current era. This field always returns 1.

KoreanCalendar

Example Syntax:

ToString

[C#] public KoreanCalendar( );

[C++] public: KoreanCalendar( );

[VB] Public Sub New( )

[JScript] public function KoreanCalendar( );

Description

Initializes a new instance of the System.Globalization.KoreanCalendar class.

Eras

ToString

[C#] public override int[ ] Eras {get;}

[C++] public: _property virtual int get_Eras( );

[VB] Overrides Public ReadOnly Property Eras As Integer ( )

[JScript] public function get Eras( ): int[ ];

Description

Gets the list of eras in the System.Globalization.KoreanCalendar.

The System.Globalization.KoreanCalendar class recognizes only the current era. This property always returns an array with only one element.

TwoDigitYearMax

ToString

[C#] public override int TwoDigitYearMax {get; set;}

[C++] public: _property virtual int get_TwoDigitYear Max( );public: _property virtual void set_TwoDigitYearMax(int);

[VB] Overrides Public Property TwoDigitYearMax As Integer

[JScript] public function get TwoDigitYearMax( ): int;public function set TwoDigitYearMax(int);

Description

Gets or sets the last year of a 100-year range that can be represented by a 2-digit year.

This property allows a 2-digit year to be properly translated to a 4-digit year. For example, in the Gregorian calendar, if this property is set to 2029, the 100-year range is from 1930 to 2029; therefore, a 2-digit value of 30 is interpreted as 1930, while a 2-digit value of 29 is interpreted as 2029.

AddMonths

[C#] public override DateTime AddMonths(DateTime time, int months);

[C++] public: DateTime AddMonths(DateTime time, int months);

[VB] Overrides Public Function AddMonths(ByVal time As DateTime, ByVal months As Integer) As DateTime

[JScript] public override function AddMonths(time: DateTime, months: int): DateTime;

Description

Returns a System.DateTime that is the specified number of months away from the specified System.DateTime.

Return Value: The System.DateTime that results from adding the specified number of months to the specified System. DateTime.

The year part of the resulting System.DateTime is affected if the resulting month is beyond the last month of the current year. The day part of the resulting System.DateTime is also affected if the resulting day is not a valid day in the resulting month of the resulting year; it is changed to the last valid day in the resulting month of the resulting year. The time-of-day part of the resulting System.DateTime remains the same as the specified System.DateTime. The System.DateTime instance to add. The number of months to add.

AddYears

[C#] public override DateTime AddYears(DateTime time, int years);

[C++] public: DateTime AddYears(DateTime time, int years);

[VB] Overrides Public Function AddYears(ByVal time As DateTime, ByVal years As Integer) As DateTime

[JScript] public override function AddYears(time: DateTime, years: int): DateTime;

Description

Returns a System.DateTime that is the specified number of years away from the specified System.DateTime.

Return Value: The System.DateTime that results from adding the specified number of years to the specified System. DateTime.

The day part of the resulting System.DateTime is affected if the resulting day is not a valid day in the resulting month of the resulting year; it is changed to the last valid day in the resulting month of the resulting year. The time-of-day part of the resulting System.DateTime remains the same as the specified System.DateTime. The System.DateTime instance to add. The number of years to add.

GetDayOfMonth

[C#] public override int GetDayOfMonth (DateTime time);

[C++] public: int GetDayOfMonth(DateTime time);

[VB] Overrides Public Function GetDayOfMonth(ByVal time As DateTime) As Integer

[JScript] public override function GetDayOfMonth(time: DateTime): int;

Description

Gets the day of the month in the specified System. DateTime.

Return Value: An integer from 1 to 31 that represents the day of the month in time. The System.DateTime instance to read.

GetDayOfWeek

[C#] public override DayOfWeek GetDayOfWeek (Date Time time);

[C++] public: DayOfWeek GetDayOfWeek(DateTime time);

[VB] Overrides Public Function GetDayOfWeek(ByVal time As DateTime) As DayOfWeek

[JScript] public override function GetDayOfWeek(time: DateTime): DayOfWeek;

Description

Gets the day of the week in the specified System.DateTime.

Return Value: A System.DayOfWeek value that represents the day of the week in time.

The System.DayOfWeek values are Sunday, Monday, Tuesday, Wednesday, Thursday, Friday, and Saturday. The System.DateTime instance to read.

GetDayOfYear

[C#] public override int GetDayOfYear(DateTime time);

[C++] public: int GetDayOfYear(DateTime time);

[VB] Overrides Public Function GetDayOfYear(ByVal time As DateTime) As Integer

[JScript] public override function GetDayOfYear(time: DateTime): int;

Description

Gets the day of the year in the specified System.DateTime.

Return Value: An integer from 1 to 366 that represents the day of the year in time The System.DateTime instance to read.

GetDaysInMonth

[C#] public override int GetDaysInMonth(int year, int month, int era);

[C++] public: int GetDaysInMonth(int year, int month, int era);

[VB] Overrides Public Function GetDaysInMonth(ByVal year As Integer, ByVal month As Integer, ByVal era As Integer) As Integer

[JScript] public override function GetDaysInMonth(year: int, month: int, era: int): int; Gets the number of days in the specified month.

Description

Gets the number of days in the month specified by the year, month, and era parameters.

Return Value: The number of days in the specified month in the specified year in the specified era.

For example, this method might return 28 or 29 for February, month=2), depending on whether year is a leap year. An integer that represents the year. An integer that represents the month. An integer that represents the era.

GetDaysInYear

[C#] public override int GetDaysInYear(int year, int era);

[C++] public: int GetDaysInYear(int year, int era);

[VB] Overrides Public Function GetDaysInYear(ByVal year As Integer, ByVal era As Integer) As Integer

[JScript] public override function GetDaysInYear(year: int, era: int): int; Gets the number of days in the specified year.

Description

Gets the number of days in the year specified by the year and era parameters.

Return Value: The number of days in the specified year in the specified era.

For example, this method might return 365 or 366, depending on whether year is a leap year. An integer that represents the year. An integer that represents the era.

GetEra

[C#] public override int GetEra(DateTime time);

[C++] public: int GetEra(DateTime time);

[VB] Overrides Public Function GetEra(ByVal time As DateTime) As Integer

[JScript] public override function GetEra(time: DateTime): int;

Description

Gets the era in the specified System.DateTime.

Return Value: An integer that represents the era in time.

The System.Globalization.KoreanCalendar class recognizes only the current era. The System.DateTime instance to read.

GetMonth

[C#] public override int GetMonth(DateTime time);

[C++] public: int GetMonth(DateTime time);

[VB] Overrides Public Function GetMonth(ByVal time As DateTime) As Integer

[JScript] public override function GetMonth(time: DateTime): int;

Description

Gets the month in the specified System.DateTime.

Return Value: An integer between 1 and 12 that represents the month in time. The System.DateTime instance to read.

GetMonthsInYear

[C#] public override int GetMonthsInYear (int year, int era);

[C++] public: int GetMonthsInYear(int year, int era);

[VB] Overrides Public Function GetMonthsInYear(ByVal year As Integer, ByVal era As Integer) As Integer

[JScript] public override function GetMonthsInYear(year: int, era: int): int; Gets the number of months in the specified year.

Description

Gets the number of months in the year specified by the year and era parameters.

Return Value: The number of months in the specified year in the specified era. An integer that represents the year. An integer that represents the era.

GetYear

[C#] public override int GetYear(DateTime time);

[C++] public: int GetYear(DateTime time);

[VB] Overrides Public Function GetYear(ByVal time As DateTime) As Integer

[JScript] public override function GetYear(time: DateTime): int;

Description

Gets the year in the specified System.DateTime.

Return Value: An integer between 1 and 9999 that represents the year in time. The System.DateTime instance to read.

IsLeapDay

[C#] public override bool IsLeapDay(int year, int month, int day, int era);

[C++] public: bool IsLeapDay(int year, int month, int day, int era);

[VB] Overrides Public Function IsLeapDay(ByVal year As Integer, ByVal month As Integer, ByVal day As Integer, ByVal era As Integer) As Boolean

[JScript] public override function IsLeapDay(year: int, month: int, day: int, era: int): Boolean; Determines whether the specified day is a leap day.

Description

Determines whether the date specified by the year, month, day, and era parameters is a leap day.

Return Value: true if the specified day is a leap day; otherwise, false.

Leap years in the Korean calendar correspond to the same leap years in the Gregorian calendar. A common year has 365 days and a leap year has 366 days. An integer that represents the year. An integer that represents the month. An integer that represents the day. An integer that represents the era.

IsLeapMonth

[C#] public override bool IsLeapMonth(int year, int month, int era);

[C++] public: bool IsLeapMonth(int year, int month, int era);

[VB] Overrides Public Function IsLeapMonth(ByVal year As Integer, ByVal month As Integer, ByVal era As Integer) As Boolean

[JScript] public override function IsLeapMonth(year: int, month: int, era: int) Boolean; Determines whether the specified month is a leap month.

Description

Determines whether the month specified by the year, month, and era parameters is a leap month.

Return Value: This method always returns false, unless overridden by a derived class.

Leap years in the Korean calendar correspond to the same leap years in the Gregorian calendar. A common year has 365 days and a leap year has 366 days. An integer that represents the year. An integer that represents the month. An integer that represents the era.

IsLeapYear

[C#] public override bool IsLeapYear(int year, int era);

[C++] public: bool IsLeapYear(int year, int era);

[VB] Overrides Public Function IsLeapYear(ByVal year As Integer, ByVal era As Integer) As Boolean

[JScript] public override function IsLeapYear(year: int, era: int): Boolean; Determines whether the specified year is a leap year.

Description

Determines whether the year specified by the year and era parameters is a leap year.

Return Value: true if the specified year is a leap year; otherwise, false.

Leap years in the Korean calendar correspond to the same leap years in the Gregorian calendar. A common year has 365 days and a leap year has 366 days. An integer that represents the year. An integer that represents the era.

ToDateTime

[C#] public override DateTime ToDateTime(int year, int month, int day, int hour, int minute, int second, int millisecond, int era);

[C++] public: DateTime ToDateTime(int year, int month, int day, int hour, int minute, int second, int millisecond, int era);

[VB] Overrides Public Function ToDateTime(ByVal year As Integer, ByVal month As Integer, ByVal day As Integer, ByVal hour As Integer, ByVal minute As Integer, ByVal second As Integer, ByVal millisecond As Integer, ByVal era As Integer) As DateTime

[JScript] public override function ToDateTime(year: int, month: int, day: int, hour: int, minute: int, second: int, millisecond: int, era: int): DateTime; Returns a System. DateTime that is set to the specified date.

Description

Returns a System.DateTime that is set to the specified date and time in the specified era.

Return Value: The System.DateTime instance set to the specified date and time in the current era. An integer that represents the year. An integer that represents the month. An integer that represents the day. An integer that represents the hour. An integer that represents the minute. An integer that represents the second. An integer that represents the millisecond. An integer that represents the era.

ToFourDigitYear

[C#] public override it ToFourDigitYear(int year);

[C++] public: int ToFourDigitYear(int year);

[VB] Overrides Public Function ToFourDigitYear(ByVal year As Integer) As Integer

[JScript] public override function ToFourDigitYear(year: int): int;

Description

Converts the specified two-digit year to a four-digit year by using the System.Globalization.KoreanCalendar.TwoDigitYearMax property to determine the appropriate century.

Return Value: An integer that contains the four-digit representation of year.

System.Globalization.KoreanCalendar.TwoDigitYearMax is the last year in the 100-year range that can be represented by a two-digit year. The century is determined by finding the sole occurrence of the two-digit year within that 100 year range. For example, if System.Globalization.KoreanCalendar.TwoDigitYearMax is set to 2029, the 100-year range is from 1930 to 2029; therefore, a 2-digit value of 30 is interpreted as 1930, while a 2-digit value of 29 is interpreted as 2029. A two-digit integer that represents the year to convert.

NumberFormatInfo class (System.Globalization)

ToString

Description

Defines how numeric values are formatted and displayed, depending on the culture.

This class contains information, such as currency, decimal separators, and other numeric symbols. Numeric values are formatted using standard or custom patterns stored in the properties of a System.Globalization.NumberFormatInfo instance. To modify how a value is displayed, the System.Globalization.NumberFormatInfo instance must be writable so custom patterns can be saved in its properties.

NumberFormatInfo

Example Syntax:

ToString

[C#] public NumberFormatInfo( );

[C++] public: NumberFormatInfo( );

[VB] Public Sub New( )

[JScript] public function NumberFormatInfo( );

Description

Initializes a new writable instance of the System.Globalization.NumberFormatInfo class that is culture-independent (invariant).

The properties of the new instance can be modified if you want user-defined formatting.

CurrencyDecimalDigits

ToString

[C#] public int CurrencyDecimalDigits {get; set;}

[C++] public: _property int get_CurrencyDecimalDigits( );public: _property void set_CurrencyDecimalDigits(int);

[VB] Public Property CurrencyDecimalDigits As Integer

[JScript] public function get CurrencyDecimalDigits( ): int; public function set CurrencyDecimalDigits(int);

Description

Indicates the number of decimal places to use in currency values.

CurrencyDecimalSeparator

ToString

[C#] public string CurrencyDecimalSeparator {get; set;}

[C++] public: _property String* get_CurrencyDecimalSeparator( );public: _property void set_CurrencyDecimalSeparator(String*);

[VB] Public Property CurrencyDecimalSeparator As String

[JScript] public function get CurrencyDecimalSeparator( ): String;public function set CurrencyDecimalSeparator (String);

Description

Indicates the System.String to use as the decimal separator in currency values.

CurrencyGroupSeparator

ToString

[C#] public string CurrencyGroupSeparator {get; set;}

[C++] public: _property String* get_CurrencyGroupSeparator( );public: _property void set_CurrencyGroupSeparator (String*);

[VB] Public Property CurrencyGroupSeparator As String

[JScript] public function get CurrencyGroupSeparator( ): String;public function set CurrencyGroupSeparator (String);

Description

Indicates the System.String that separates groups of digits to the left of the decimal in currency values.

CurrencyGroupSizes

ToString

[C#] public int[ ] CurrencyGroupSizes {get; set;}

[C++] public: _property int get_CurrencyGroupSizes( );public: _property void set_CurrencyGroupSizes(int_gc[ ]);

[VB] Public Property CurrencyGroupSizes As Integer ( )

[JScript] public function get CurrencyGroupSizes( ): int[ ];public function set CurrencyGroupSizes(int[ ]);

Description

Indicates the number of digits in each group to the left of the decimal in currency values.

Every element in the one-dimensional array must be an integer from 1 through 9. The last element can be 0.

CurrencyNegativePattern

ToString

[C#] public int CurrencyNegativePattern {get; set;}

[C++] public: _property int get_CurrencyNegativePattern( );public: _property void set_CurrencyNegativePattern(int);

[VB] Public Property CurrencyNegativePattern As Integer

[JScript] public function get CurrencyNegativePattern( ): int; public function set CurrencyNegativePattern(int);

Description

Indicates the format pattern for negative currency values.

This property can have one of the values in the following table. The symbol "$" is the System.Globalization.NumberFormatInfo.CurrencySymbol, the symbol "–" is the System.Globalization.NumberFormatInfo.NegativeSign, and n is a number.

CurrencyPositivePattern

ToString

[C#] public int CurrencyPositivePattern {get; set;}

[C++] public: _property int get_CurrencyPositivePattern( );public: _property void set_CurrencyPositivePattern(int);

[VB] Public Property CurrencyPositivePattern As Integer
[JScript] public function get CurrencyPositivePattern( ): int; public function set ICurrencyPositivePattern(int);

Description

Indicates the format pattern for positive currency values.

This property can have one of the values in the following table. The symbol "$" is the System.Globalization.NumberFormatInfo.CurrencySymbol and n is a number.

CurrencySymbol

ToString

[C#] public string CurrencySymbol {get; set;}
[C++] public: _property String* get_CurrencySymbol( );public: _property void set_CurrencySymbol(String*);
[VB] Public Property CurrencySymbol As String
[JScript] public function get CurrencySymbol( ): String;public function set CurrencySymbol(String);

Description

Indicates the System.String to use as the currency symbol.

CurrentInfo

ToString

[C#] public static NumberFormatInfo CurrentInfo {get;}
[C++] public: _property static NumberFormatInfo* get_CurrentInfo( );
[VB] Public Shared ReadOnly Property CurrentInfo As NumberFormatInfo
[JScript] public static function get CurrentInfo( ): NumberFormatInfo;

Description

Gets a read-only System.Globalization.NumberFormatInfo instance that formats values based on the current culture.

InvariantInfo

ToString

[C#] public static NumberFormatInfo InvariantInfo {get;}
[C++] public: _property static NumberFormatInfo* get_InvariantInfo( );
[VB] Public Shared ReadOnly Property InvariantInfo As NumberFormatInfo
[JScript] public static function get InvariantInfo( ): NumberFormatInfo;

Description

Gets the default read-only System.Globalization.NumberFormatInfo instance that is culture-independent (invariant).

This property does not change, regardless of the current culture.

IsReadOnly

ToString

[C#] public bool IsReadOnly {get;}
[C++] public: _property bool get_IsReadOnly( );
[VB] Public ReadOnly Property IsReadOnly As Boolean
[JScript] public function get IsReadOnly( ): Boolean;

Description

Gets a value indicating whether the System.Globalization.NumberFormatInfo is read-only.

NaNSymbol

ToString

[C#] public string NaNSymbol {get; set;}
[C++] public: _property String* get_NaNSymbol( ); public: _property void set_NaNSymbol(String*);
[VB] Public Property NaNSymbol As String
[JScript] public function get NaNSymbol( ): String;public function set NaNSymbol(String);

Description

Indicates the System.String that represents the IEEE NaN (not a number) value.

NegativeInfinitySymbol

ToString

[C#] public string NegativeInfinitySymbol {get; set;}
[C++] public: _property String* get_NegativeInfinitySymbol ( );public: _property void set_NegativeInfinitySymbol (String*);
[VB] Public Property NegativeInfinitySymbol As String
[JScript] public function get NegativeInfinitySymbol( ): String;public function set NegativeInfinitySymbol (String);

Description

Indicates the System.String that represents negative infinity.

NegativeSign

ToString

[C#] public string NegativeSign {get; set;}
[C++] public: _property String* get_NegativeSign( ); public: _property void set_NegativeSign(String*);
[VB] Public Property NegativeSign As String
[JScript] public function get NegativeSign( ): String;public function set NegativeSign(String);

Description

Indicates the System.String that denotes that the associated number is negative.

NumberDecimalDigits

ToString

[C#] public int NumberDecimalDigits {get; set;}
[C++] public: _property int get_NumberDecimalDigits( );public: _property void set_NumberDecimalDigits(int);
[VB] Public Property NumberDecimalDigits As Integer
[JScript] public function get NumberDecimalDigits( ): int; public function set NumberDecimalDigits(int);

Description

Indicates the number of decimal places to use in numeric values.

NumberDecimalSeparator

ToString

[C#] public string NumberDecimalSeparator {get; set;}
[C++] public: _property String* get_NumberDecimalSeparator( );public: _property void set_NumberDecimalSeparator(String*);
[VB] Public Property NumberDecimalSeparator As String
[JScript] public function get NumberDecimalSeparator( ): String;public function set NumberDecimalSeparator (String);

Description

Indicates the System-String to use as the decimal separator in numeric values.

NumberGroupSeparator

ToString

[C#] public string NumberGroupSeparator {get; set;}
[C++] public: _property String* get_NumberGroupSeparator( );public: _property void set_NumberGroupSeparator (String*);
[VB] Public Property NumberGroupSeparator As String
[JScript] public function get NumberGroupSeparator( ): String;public function set NumberGroupSeparator (String);

Description

Indicates the System.String that separates groups of digits to the left of the decimal in numeric values.

NumberGroupSizes

ToString

[C#] public int[ ] NumberGroupSizes {get; set;}

[C++] public: _property int get_NumberGroupSizes( );public: _property void set_NumberGroupSizes(int_gc[ ]);

[VB] Public Property NumberroupSizes As Integer ( )

[JScript] public function get NumberGroupSizes( ): int[ ];public function set NumberGroupSizes(int[ ]);

Description

Indicates the number of digits in each group to the left of the decimal in numeric values.

Every element in the one-dimensional array must be an integer from 1 through 9. The last element can be 0.

NumberNegativePattern

ToString

[C#] public int NumberNegativePattern {get; set;}

[C++] public: _property int get_NumberNegative Pattern( );public: _property void set_NumberNegativePattern(int);

[VB] Public Property NumberNegativePattern As Integer

[JScript] public function get NumberNegativePattern( ): int; public function set NumberNegativePattern(int);

Description

Indicates the format pattern for negative numeric values.

This property can have one of the values in the following table. The symbol "–" is the System.Globalization.NumberFormatInfo.NegativeSign and n is a number.

PercentDecimalDigits

ToString

[C#] public int PercentDecimalDigits {get; set;}

[C++] public: _property int get_PercentDecimal Digits( );public: _property void set_PercentDecimalDigits (int);

[VB] Public Property PercentDecimalDigits As Integer

[JScript] public function get PercentDecimalDigits( ): int; public function set PercentDecimalDigits(int);

Description

Indicates the number of decimal places to use in percent values.

PercentDecimalSeparator

ToString

[C#] public string PercentDecimalSeparator {get; set;}

[C++] public: _property String* get_PercentDecimalSeparator( );public: _property void set_PercentDecimalSeparator (String*);

[VB] Public Property PercentDecimalSeparator As String

[JScript] public function get PercentDecimalSeparator( ): String;public function set PercentDecimalSeparator (String);

Description

Indicates the System.String to use as the decimal separator in percent values.

PercentGroupSeparator

ToString

[C#] public string PercentGroupSeparator {get; set;}

[C++] public: _property String* get_PercentGroupSeparator( );public: _property void set_PercentGroupSeparator (String*);

[VB] Public Property PercentGroupSeparator As String

[JScript] public function get PercentGroupSeparator( ): String;public function set PercentGroupSeparator(String);

Description

Indicates the System.String that separates groups of digits to the left of the decimal in percent values.

PercentGroupSizes

ToString

[C#] public int[ ] PercentGroupSizes {get; set;}

[C++] public: _property int get_PercentGroupSizes( );public: _property void set_PercentGroupSizes(int_gc[ ]);

[VB] Public Property PercentGroupSizes As Integer ( )

[JScript] public function get PercentGroupSizes( ): int[ ];public function set PercentGroupSizes(int[ ]);

Description

Indicates the number of digits in each group to the left of the decimal in percent values.

Every element in the one-dimensional array must be an integer from 1 through 9. The last element can be 0.

PercentNegativePattern

ToString

[C#] public int PercentNegativePattern {get; set;}

[C++] public: _property int get_PercentNegative Pattern( );public: _property void set_PercentNegativePattern(int);

[VB] Public Property PercentNegativePattern As Integer

[JScript] public function get PercentNegativePattern( ): int; public function set PercentNegativePattern(int);

Description

Indicates the format pattern for negative percent values.

This property can have one of the values in the following table. The symbol "%" is the System.Globalization.NumberFormatInfo.PercentSymbol, the symbol "–" is the System.Globalization.NumberFormatInfo.NegativeSign, and n is a number.

PercentPositivePattern

ToString

[C#] public int PercentPositivePattern {get; set;}

[C++] public: _property int get_PercentPositive Pattern( );public: _property void set_PercentPositivePattern(int);

[VB] Public Property PercentPositivePattern As Integer

[JScript] public function get PercentPositivePattern( ): int; public function set PercentPositivePattern(int);

Description

Indicates the format pattern for positive percent values.

This property can have one of the values in the following table. The symbol "%" is the System.Globalization.NumberFormatInfo.PercentSymbol and n is a number.

PercentSymbol

ToString

[C#] public string PercentSymbol {get; set;}

[C++] public: _property String* get_PercentSymbol( );public: _property void set_PercentSymbol(String*);

[VB] Public Property PercentSymbol As String

[JScript] public function get PercentSymbol( ): String;public function set PercentSymbol(String);

Description

Indicates the System.String to use as the percent symbol.

PerMilleSymbol

ToString

[C#] public string PerMilleSymbol {get; set;}

[C++] public: _property String* get_PerMilleSymbol( );public: _property void set_PerMilleSymbol(String*);

[VB] Public Property PerMilleSymbol As String

[JScript] public function get PerMilleSymbol( ): String;public function set PerMilleSymbol(String);

Description

Indicates the System.String to use as the per mille symbol.

PositiveInfinitySymbol

ToString

[C#] public string PositiveInfinitySymbol {get; set;}

[C++] public: _property String* get_PositiveInfinity Symbol( );public: _property void set_PositiveInfinitySymbol(String*);

[VB] Public Property PositiveInfinitySymbol As String

[JScript] public function get PositiveInfinitySymbol( ): String;public function set PositiveInfinitySymbol(String);

Description

Indicates the System.String that represents positive infinity.

PositiveSign

ToString

[C#] public string PositiveSign {get; set;}

[C++] public: _property String* get_PositiveSign( ); public: _property void set_PositiveSign(String*);

[VB] Public Property PositiveSign As String

[JScript] public function get PositiveSign( ): String;public function set PositiveSign(String);

Description

Indicates the System.String that denotes that the associated number is positive.

This property is used only for parsing numeric strings, not for formatting.

Clone

[C#] public object Clone( );

[C++] public: _sealed Object* Clone( );

[VB] NotOverridable Public Function Clone( ) As Object

[JScript] public function Clone( ): Object;

Description

Creates a shallow copy of the System.Globalization.NumberFormatInfo instance.

Return Value: A new System.Globalization.NumberFormatInfo instance copied from the original System.Globalization.NumberFormatInfo instance.

The clone is writable even if the original instance is read-only; therefore, the properties of the clone can be modified with user-defined patterns.

GetFormat

[C#] public object GetFormat(Type formatType);

[C++] public: __sealed Object* GetFormat(Type* formatType);

[VB] NotOverridable Public Function GetFormat(ByVal formatType As Type) As Object

[JScript] public function GetFormat(formatType: Type): Object;

Description

Gets an object of the specified type that provides a number formatting service.

Return Value: The current instance of the System.Globalization.NumberFormatInfo class, if formatType is the same as the type of the current instance; otherwise, null.

The Format(String, IFormatProvider) methods supported by the base data types invoke this method when the current instance is passed as the System.IFormatProvider parameter. This method implements System.IFormatProvider.GetFormat(System.Type). The System.Type of the required formatting service.

GetInstance

[C#] public static NumberFormatInfo GetInstance(IFormatProvider formatProvider);

[C++] public: static NumberFormatInfo* GetInstance(IFormatProvider* formatProvider);

[VB] Public Shared Function GetInstance(ByVal formatProvider As IFormatProvider) As NumberFormatInfo

[JScript] public static function GetInstance(formatProvider: IFormatProvider): NumberFormatInfo;

Description

Gets the System.Globalization.NumberFormatInfo instance associated with the specified System.IFormatProvider.

Return Value: The System.Globalization.NumberFormatInfo instance associated with the specified System.IFormatProvider.

This method uses the System.IFormatProvider.GetFormat (System.Type) method of formatProvider using System.Globalization.NumberFormatInfo as the Type parameter. If formatProvider is null or if System.IFormatProvider.GetFormat (System.Type) returns null, this method returns System.Globalization.NumberFormatInfo.CurrentInfo. The System.IFormatProvider used to get the System.Globalization.NumberFormatInfo instance.

ReadOnly

[C#] public static NumberFormatInfo ReadOnly(NumberFormatInfo nfi);

[C++] public: static NumberFormatInfo* ReadOnly(NumberFormatInfo* nfi);

[VB] Public Shared Function ReadOnly(ByVal nfi As NumberFormatInfo) As NumberFormatInfo

[JScript] public static function ReadOnly(nfi: NumberFormatInfo): NumberFormatInfo;

Description

Returns a read-only System.Globalization.NumberFormatInfo wrapper.

Return Value: A read-only System.Globalization.NumberFormatInfo wrapper around nfi.

This wrapper prevents any modifications to nfi. The System.Globalization.NumberFormatInfo to wrap.

NumberStyles enumeration (System. Globalization)

ToString

Description

Determines the styles permitted in numerical string arguments that are passed to the Parse methods of the numeric base type classes.

The symbols to use for currency symbol, thousands separator, decimal point indicator, and leading sign are specified by System.Globalization.NumberFormatInfo.

ToString

[C#] public const NumberStyles AllowCurrencySymbol;

[C++] public: const NumberStyles AllowCurrencySymbol;

[VB] Public Const AllowCurrencySymbol As NumberStyles

[JScript] public var AllowCurrencySymbol: NumberStyles;

Description

Indicates that a currency symbol is allowed. Valid currency symbols are, determined by the System.Globalization.NumberFormatInfo.CurrencySymbol property of System.Globalization.NumberFormatInfo ToString

[C#] public const NumberStyles AllowDecimalPoint;

[C++] public: const NumberStyles AllowDecimalPoint;

[VB] Public Const AllowDecimalPoint As NumberStyles

[JScript] public var AllowDecimalPoint: NumberStyles;

Description

Indicates that a decimal point is allowed. Valid decimal point characters are determined by the System.Globalization. NumberFormatInfo.NumberDecimalSeparator and System. Globalization.NumberFormatInfo.Currency DecimalSeparator properties of System.Globalization.NumberFormatInfo.

ToString

[C#] public const NumberStyles AllowExponent;
[C++] public: const NumberStyles AllowExponent;
[VB] Public Const AllowExponent As NumberStyles
[JScript] public var AllowExponent: NumberStyles;

Description

Indicates that an exponent is allowed. The format of the number should be {e|E} [{+|−}]n, where n is a number.

ToString

[C#] public const NumberStyles AllowHexSpecifier;
[C++] public: const NumberStyles AllowHexSpecifier;
[VB] Public Const AllowHexSpecifier As NumberStyles
[JScript] public var AllowHexSpecifier: NumberStyles;

Description

Indicates that hexadecimal numbers are allowed.

ToString

[C#] public const NumberStyles AllowLeadingSign;
[C++] public: const NumberStyles AllowLeadingSign;
[VB] Public Const AllowLeadingSign As NumberStyles
[JScript] public var AllowLeadingSign: NumberStyles;

Description

Indicates that a leading sign is allowed. Valid leading sign characters are determined by the System.Globalization.NumberFormatInfo.PositiveSign and System.Globalization. NumberFormatInfo.NegativeSign properties of System. Globalization.NumberFormatInfo.

ToString

[C#] public const NumberStyles AllowLeadingWhite;
[C++] public: const NumberStyles AllowLeadingWhite;
[VB] Public Const AllowLeadingWhite As NumberStyles
[JScript] public var AllowLeadingWhite: NumberStyles;

Description

Indicates that a leading white-space character is allowed. Valid white-space characters have the Unicode values U+0009, U+000A, U+000B, U+000C, U+000D, and U+0020.

ToString

[C#] public const NumberStyles AllowParentheses;
[C++] public: const NumberStyles AllowParentheses;
[VB] Public Const AllowParentheses As NumberStyles
[JScript] public var AllowParentheses: NumberStyles;

Description

Indicates that parentheses are allowed.

ToString

[C#] public const NumberStyles AllowThousands;
[C++] public: const NumberStyles AllowThousands;
[VB] Public Const AllowThousands As NumberStyles
[JScript] public var AllowThousands: NumberStyles;

Description

Indicates that group separators are allowed; for instance, separating the hundreds from the thousands. Valid group separator characters are determined by the System.Globalization.NumberFormatInfo.NumberGroupSeparator and System.Globalization.NumberFormatInfo.CurrencyGroupSeparator properties of System.Globalization.NumberFormatInfo and the number of digits in each group is determined by the System.Globalization.NumberFormatInfo.NumberGroupSizes and System.Globalization.NumberFormatInfo.CurrencyGroupSizes properties of System.Globalization.NumberFormatInfo.

ToString

[C#] public const NumberStyles AllowTrailingSign;
[C++] public: const NumberStyles AllowTrailingSign;
[VB] Public Const AllowTrailingSign As NumberStyles
[JScript] public var AllowTrailingSign: NumberStyles;

Description

Indicates that a trailing sign is allowed. Valid trailing sign characters are determined by the System.Globalization.NumberFormatInfo.PositiveSign and System.Globalization. NumberFormatInfo.NegativeSign properties of System. Globalization.NumberFormatInfo.

ToString

[C#] public const NumberStyles AllowTrailingWhite;
[C++] public: const NumberStyles AllowTrailingWhite;
[VB] Public Const AllowTrailingWhite As NumberStyles
[JScript] public var AllowTrailingWhite: NumberStyles;

Description

Indicates that trailing white-space character is allowed. Valid white-space characters have the Unicode values U+0009, U+000A, U+000B, U+000C, U+000D, and U+0020.

ToString

[C#] public const NumberStyles Any;
[C++] public: const NumberStyles Any;
[VB] Public Const Any As NumberStyles
[JScript] public var Any: NumberStyles;

Description

Indicates that all the AllowXXX bit styles are used. This is a composite number style.

ToString

[C#] public const NumberStyles Currency;
[C++] public: const NumberStyles Currency;
[VB] Public Const Currency As NumberStyles
[JScript] public var Currency: NumberStyles;

Description

Indicates that all styles except AllowExponent are used. This is a composite number style.

ToString

[C#] public const NumberStyles Float;
[C++] public: const NumberStyles Float;
[VB] Public Const Float As NumberStyles
[JScript] public var Float: NumberStyles;

Description

Indicates that the AllowLeadingWhite, AllowTrailingWhite, AllowLeadingSign, AllowDecimalPoint, and AllowExponent styles are used. This is a composite number style.

ToString

[C#] public const NumberStyles HexNumber;
[C++] public: const NumberStyles HexNumber;
[VB] Public Const HexNumber As NumberStyles
[JScript] public var HexNumber: NumberStyles;

Description

Indicates that the AllowLeadingWhite, AllowTrailingWhite, and AllowHexSpecifier styles are used. This is a composite number style.

ToString

[C#] public const NumberStyles Integer;
[C++] public: const NumberStyles Integer;
[VB] Public Const Integer As NumberStyles
[JScript] public var Integer: NumberStyles;

Description

Indicates that the AllowLeadingWhite, AllowTrailingWhite, and AllowLeadingSign styles are used. This is a composite number style.

ToString

[C#] public const NumberStyles None;

[C++] public: const NumberStyles None;

[VB] Public Const None As NumberStyles

[JScript] public var None: NumberStyles;

Description

Indicates that none of the bit styles are allowed.

ToString

[C#] public const NumberStyles Number;

[C++] public: const NumberStyles Number;

[VB] Public Const Number As NumberStyles

[JScript] public var Number: NumberStyles;

Description

Indicates that the AllowLeadingWhite, AllowTrailingWhite, AllowLeadingSign, AllowTrailingSign, AllowDecimalPoint, and AllowThousands styles are used. This is a composite number style.

RegionInfo class (System.Globalization)

ToString

Description

Contains information about the country/region.

In contrast to System.Globalization.CultureInfo, System.Globalization.RegionInfo does not represent preferences of the user and does not depend on the user's language or culture.

RegionInfo

Example Syntax:

ToString

[C#] public RegionInfo(int culture);

[C++] public: RegionInfo(int culture);

[VB] Public Sub New(ByVal culture As Integer)

[JScript] public function RegionInfo(culture: int);

Description

Initializes a new instance of the System.Globalization.RegionInfo class based on the country/region associated with the specified culture identifier.

The culture identifier is mapped to the corresponding National Language Support (NLS) locale identifier. A list of culture identifiers is provided in the System.Globalization.CultureInfo class topic. A culture identifier.

RegionInfo

Example Syntax:

ToString

[C#] public RegionInfo(string name);

[C++] public: RegionInfo(String* name);

[VB] Public Sub New(ByVal name As String)

[JScript] public function RegionInfo(name: String); Initializes a new instance of the System.Globalization.RegionInfo class.

Description

Initializes a new instance of the System.Globalization.RegionInfo class based on the country/region specified by name.

The System.Globalization.RegionInfo name is one of the two-letter codes defined in ISO 3166 for country/region. A System.String containing one of the two-letter codes defined in ISO 3166 for country/region.

CurrencySymbol

ToString

[C#] public virtual string CurrencySymbol {get;}

[C++] public: _property virtual String* get_CurrencySymbol( );

[VB] Overridable Public ReadOnly Property CurrencySymbol As String

[JScript] public function get CurrencySymbol( ): String;

Description

Gets the currency symbol associated with the country/region.

For example, the currency symbol for the United States is "$".

CurrentRegion

ToString

[C#] public static RegionInfo CurrentRegion {get;}

[C++] public: _property static RegionInfo* get_CurrentRegion( );

[VB] Public Shared ReadOnly Property CurrentRegion As RegionInfo

[JScript] public static function get CurrentRegion( ): RegionInfo;

Description

Gets the System.Globalization.RegionInfo instance that represents the country/region used by the current thread.

The value of this property is based on the locale selected through the Regional and Language Options (or Regional Options or Regional Settings) applet in Windows Control Panel. However, that information can change during the life of the System.AppDomain. The System.Globalization.RegionInfo class does not detect changes in the system settings automatically.

DisplayName

ToString

[C#] public virtual string DisplayName {get;}

[C++] public: _property virtual String* get_DisplayName( );

[VB] Overridable Public ReadOnly Property DisplayName As String

[JScript] public function get DisplayName( ): String;

Description

Gets the full name of the country/region in the localized language of the .NET Framework.

For example, if the .NET Framework English version is installed, the United States is "United States". If the .NET Framework Spanish version is installed, regardless of the language that the system is set to display, the country/region name is displayed in Spanish; therefore, the United States is "Estados Unidos".

EnglishName

ToString

[C#] public virtual string EnglishName {get;}

[C++] public: _property virtual String* get_EnglishName( );

[VB] Overridable Public ReadOnly Property EnglishName As String

[JScript] public function get EnglishName( ): String;

Description

Gets the full name of the country/region in English.

For example, the United States is "United States".

IsMetric

ToString

[C#] public virtual bool IsMetric {get;}

[C++] public: _property virtual bool get_IsMetric( );

[VB] Overridable Public ReadOnly Property IsMetric As Boolean

[JScript] public function get IsMetric( ): Boolean;

Description

Gets a value indicating whether the country/region uses the metric system for measurements.

ISOCurrencySymbol

ToString

[C#] public virtual string ISOCurrencySymbol {get;}

[C++] public: _property virtual String* get_ISOCurrencySymbol( );

[VB] Overridable Public ReadOnly Property ISOCurrencySymbol As String

[JScript] public function get ISOCurrencySymbol( ): String;

Description

Gets the three-character ISO 4217 currency symbol associated with the country/region.

A list of the three-character ISO 4217 currency symbols is provided in the System.Globalization.RegionInfo class topic. For example, the ISO 4217 currency symbol for the United States dollar is “USD”.

Name

ToString

[C#] public virtual string Name {get;}

[C++] public: _property virtual String* get_Name( );

[VB] Overridable Public ReadOnly Property Name As String

[JScript] public function get Name( ): String;

Description

Gets the two-letter code defined in ISO 3166 for the country/region.

The System.Globalization.RegionInfo name is one of the two-letter codes defined in ISO 3166 for country/region. For example, the two-letter code for United States is “US”.

ThreeLetterISORegionName

ToString

[C#] public virtual string ThreeLetterISORegionName {get;}

[C++] public: _property virtual String* get_ThreeLetterISORegionName( );

[VB] Overridable Public ReadOnly Property ThreeLetterISORegionName As String

[JScript] public function get ThreeLetterISORegionName( ): String;

Description

Gets the three-letter code defined in ISO 3166 for the country/region.

The System.Globalization.RegionInfo.Three LetterISORegionName property contains one of the three-letter codes defined in ISO 3166 for country/region. For example, the three-letter code for United States is “USA”.

ThreeLetterWindowsRegionName

ToString

[C#] public virtual string ThreeLetterWindowsRegionName {get;}

[C++] public: _property virtual String* get_ThreeLetterWindowsRegionName( );

[VB] Overridable Public ReadOnly Property ThreeLetterWindowsRegionName As String

[JScript] public function get ThreeLetterWindowsRegionName( ): String;

Description

Gets the Windows version of the three-letter code for the country/region of this System.Globalization.RegionInfo.

For example, the three-letter code for United States is “USA”.

TwoLetterISORegionName

ToString

[C#] public virtual string TwoLetterISORegionName {get;}

[C++] public: _property virtual String* get_TwoLetterISORegionName( );

[VB] Overridable Public ReadOnly Property TwoLetterISORegionName As String

[JScript] public function get TwoLetterISORegionName( ): String;

Description

Gets the two-letter code defined in ISO 3166 for the country/region.

The System.Globalization.RegionInfo name is one of the two-letter codes defined in ISO 3166 for country/region. For example, the two-letter code for United States is “US”.

Equals

[C#] public override bool Equals(object value);

[C++] public: bool Equals(Object* value);

[VB] Overrides Public Function Equals(ByVal value As Object) As Boolean

[JScript] public override function Equals(value: Object): Boolean;

Description

Determines whether the specified System.Object is the same instance as the current System.Globalization.RegionInfo instance.

Return Value: true if the specified System.Object is the same instance as the current System.Globalization.RegionInfo instance; otherwise, false.

This method overrides System.Object.Equals(System.Object). The System.Object to compare with the current System.Globalization.RegionInfo instance.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Serves as a hash function for the current System.Globalization.RegionInfo instance, suitable for use in hashing algorithms and data structures, such as a hash table.

Return Value: A hash code for the current System.Globalization.RegionInfo instance.

This method overrides System.Object.GetHashCode.

ToString

[C#] public override string ToString( );

[C++] public: String* ToString( );

[VB] Overrides Public Function ToString( ) As String

[JScript] public override function ToString( ): String;

Description

Returns a System.String containing the name of the current System.Globalization.RegionInfo instance, which is one of the three-letter country/region codes defined in ISO 3166.

Return Value: A System.String containing the name of the current System.Globalization.RegionInfo, which is one of the three-letter country/region codes defined in ISO 3166.

This method overrides System.Object.ToString.

SortKey class (System.Globalization)

ToString

Description

Maps strings to their sort keys.

Each character in a string is given several categories of sort weights, including script, alphabetic, case, and diacritic weights. A sort key serves as the repository of these weights for a particular string. For example, a sort key might contain a string of alphabetic weights, followed by a string of case weights, and so on.

KeyData

ToString

[C#] public virtual byte[ ] KeyData {get;}

[C++] public: _property virtual unsigned char get_Key Data( );

[VB] Overridable Public ReadOnly Property KeyData As Byte ( )

[JScript] public function get KeyData( ): Byte[ ];

Description

Gets the byte array representing the current System.Globalization.SortKey instance.

OriginalString

ToString

[C#] public virtual string OriginalString {get;}

[C++] public: _property virtual String* get_OriginalString( );

[VB] Overridable Public ReadOnly Property OriginalString As String

[JScript] public function get OriginalString( ): String;

Description

Gets the original string used to create the current System. Globalization.SortKey instance.

Compare

[C#] public static int Compare(SortKey sortkey1, SortKey sortkey2);

[C++] public: static int Compare(SortKey* sortkey1, SortKey* sortkey2);

[VB] Public Shared Function Compare(ByVal sortkey1 As SortKey, ByVal sortkey2 As SortKey) As Integer

[JScript] public static function Compare(sortkey1: SortKey, sortkey2: SortKey): int;

Description

Compares two sort keys.

Return Value: Value Condition Zero The two sort keys are equal. The first sort key to compare. The second sort key to compare.

Equals

[C#] public override bool Equals(object value);

[C++] public: bool Equals(Object* value);

[VB] Overrides Public Function Equals(ByVal value As Object) As Boolean

[JScript] public override function Equals(value: Object): Boolean;

Description

Determines whether the specified System.Object is the same instance as the current System.Globalization.SortKey.

Return Value: true if the specified System.Object is the same instance as the current System.Globalization.SortKey; otherwise, false.

This method overrides System.Object.Equals(System.Object). The System.Object to compare with the current System.Globalization.SortKey.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Serves as a hash function for the current System.Globalization.SortKey instance, suitable for use in hashing algorithms and data structures, such as a hash table.

Return Value: A hash code for the current System.Globalization.SortKey instance.

This method overrides System.Object.GetHashCode.

ToString

[C#] public override string ToString( );

[C++] public: String* ToString( );

[VB] Overrides Public Function ToString( ) As String

[JScript] public override function ToString( ): String;

Description

Returns a System.String that represents the current System.Globalization.SortKey instance.

Return Value: A System.String that represents the current System.Globalization.SortKey instance.

This method overrides System.Object.ToString.

StringInfo class (System. Globalization)

ToString

Description

Provides functionality to split a string into text elements and to iterate through those text elements.

The .NET Framework defines a text element as a unit of text that is displayed as a single character; that is, a grapheme. A text element can be a base character, a surrogate pair, or a combining character sequence. The Unicode Standard defines a surrogate pair as a coded character representation for a single abstract character that consists of a sequence of two code units, where the first unit of the pair is a high-surrogate and the second is a low-surrogate. The Unicode Standard defines a combining character sequence as a combination of a base character and one or more combining characters. A surrogate pair can represent a base character or a combining character. For more information on surrogate pairs and combining character sequences, see The Unicode Standard at http://www.unicode.org.

StringInfo

Example Syntax:

ToString

[C#] public StringInfo( );

[C++] public: StringInfo( );

[VB] Public Sub New( )

[JScript] public function StringInfo( );

GetNextTextElement

[C#] public static string GetNextTextElement(string str);

[C++] public: static String* GetNextTextElement(String* str);

[VB] Public Shared Function GetNextTextElement(ByVal str As String) As String

[JScript] public static function GetNextTextElement(str: String): String; Gets the first text element in a specified string.

Description

Gets the first text element in a specified string.

Return Value: A System.String containing the first text element in str.

The .NET Framework defines a text element as a unit of text that is displayed as a single character; that is, a grapheme. A text element can be a base character, a surrogate pair, or a combining character sequence. The Unicode Standard defines a surrogate pair as a coded character representation for a single abstract character that consists of a sequence of two code units, where the first unit of the pair is a high-surrogate and the second is a low-surrogate. The Unicode Standard defines a combining character sequence as a combination of a base character and one or more combining characters. A surrogate pair can represent a base character or a combining character. For more information on surrogate pairs and combining character sequences, see The Unicode Standard at http://www.unicode.org. The System.String to get the text element from.

GetNextTextElement

[C#] public static string GetNextTextElement(string str, int index);

[C++] public: static String* GetNextTextElement(String* str, int index);

[VB] Public Shared Function GetNextTextElement(ByVal str As String, ByVal index As Integer) As String

[JScript] public static function GetNextTextElement(str: String, index: int): String;

Description

Gets the text element at the specified index of the specified string.

Return Value: A System.String containing the text element at index of str.

The .NET Framework defines a text element as a unit of text that is displayed as a single character; that is, a grapheme. A text element can be a base character, a surrogate pair, or a combining character sequence. The Unicode Standard defines a surrogate pair as a coded character representation for a single abstract character that consists of a sequence of two code units, where the first unit of the pair is a high-surrogate and the second is a low-surrogate. The Unicode Standard defines a combining character sequence as a combination of a base character and one or more combining characters. A surrogate pair can represent a base character or a combining character. For more information on surrogate pairs and combining character sequences, see The Unicode Standard at http://www.unicode.org. The System.String to get the text element from. The index at which the text element starts.

GetTextElementEnumerator

[C#] public static TextElementEnumerator GetTextElementEnumerator(string str);

[C++] public: static TextElementEnumerator* GetTextElementEnumerator(String* str);

[VB] Public Shared Function GetTextElementEnumerator (ByVal str As String) As TextElementEnumerator

[JScript] public static function GetTextElementEnumerator (str: String): TextElementEnumerator; Returns an enumerator that can iterate through the text elements of a System.String.

Description

Returns an enumerator that can iterate through the text elements of the entire System.String.

Return Value: A System.Globalization.TextElementEnumerator for the entire System.String.

The .NET Framework defines a text element as a unit of text that is displayed as a single character; that is, a grapheme. A text element can be a base character, a surrogate pair, or a combining character sequence. The Unicode Standard defines a surrogate pair as a coded character representation for a single abstract character that consists of a sequence of two code units, where the first unit of the pair is a high-surrogate and the second is a low-surrogate. The Unicode Standard defines a combining character sequence as a combination of a base character and one or more combining characters. A surrogate pair can represent a base character or a combining character. For more information on surrogate pairs and combining character sequences, see The Unicode Standard at http://www.unicode.org. The System.String to iterate through.

GetTextElementEnumerator

[C#] public static TextElementEnumerator GetTextElementEnumerator(string str, int index);

[C++] public: static TextElementEnumerator* GetTextElementEnumerator(String* str, int index);

[VB] Public Shared Function GetTextElementEnumerator (ByVal str As String, ByVal index As Integer) As TextElementEnumerator

[JScript] public static function GetTextElementEnumerator (str: String, index: int): TextElementEnumerator;

Description

Returns an enumerator that can iterate through the text elements of the System.String starting at the specified index.

Return Value: A System.Globalization.TextElementEnumerator for the System.String starting at the specified index.

The .NET Framework defines a text element as a unit of text that is displayed as a single character; that is, a grapheme. A text element can be a base character, a surrogate pair, or a combining character sequence. The Unicode Standard defines a surrogate pair as a coded character representation for a single abstract character that consists of a sequence of two code units, where the first unit of the pair is a high-surrogate and the second is a low-surrogate. The Unicode Standard defines a combining character sequence as a combination of a base character and one or more combining characters. A surrogate pair can represent a base character or a combining character. For more information on surrogate pairs and combining character sequences, see The Unicode Standard at http://www.unicode.org. The System.String to iterate through. The index at which to start iterating.

ParseCombiningCharacters

[C#] public static int[ ] ParseCombiningCharacters(string str);

[C++] public: static int ParseCombiningCharacters(String* str) _gc[ ];

[VB] Public Shared Function ParseCombiningCharacters (ByVal str As String) As Integer( )

[JScript] public static function ParseCombiningCharacters (str: String): int[ ];

Description

Returns the indexes of each base character, high-surrogate, or control character within the specified string.

Return Value: An array of integers that contains the indexes of each base character, high-surrogate, or control character within the specified string.

The Unicode Standard defines a surrogate pair as a coded character representation for a single abstract character that consists of a sequence of two code units, where the first unit of the pair is a high-surrogate and the second is a low-surrogate. A high-surrogate is a Unicode code point in the range U+D800 through U+DBFF and a low-surrogate is a Unicode code point in the range U+DC00 through U+DFFF. The System.String to search.

TaiwanCalendar class (System.Globalization)

ToString

Description

Represents the Taiwanese calendar.

The Taiwanese calendar works exactly like the Gregorian calendar, except that the year and era are different.

TaiwanCalendar

Example Syntax:

ToString

[C#] public TaiwanCalendar( );

[C++] public: TaiwanCalendar( );

[VB] Public Sub New( )
[JScript] public function TaiwanCalendar( );

Description

Initializes a new instance of the System.Globalization.TaiwanCalendar class.

Eras

ToString

[C#] public override int[ ] Eras {get;}
[C++] public: _property virtual int get_Eras( );
[VB] Overrides Public ReadOnly Property Eras As Integer ( )
[JScript] public function get Eras( ): int[ ];

Description

Gets the list of eras in the System.Globalization.TaiwanCalendar.

The System.Globalization.TaiwanCalendar class recognizes only the current era. This property always returns an array with only one element.

TwoDigitYearMax

ToString

[C#] public override int TwoDigitYearMax {get; set;}
[C++] public: _property virtual int get_TwoDigitYearMax( );public: _property virtual void set_TwoDigitYearMax(int);
[VB] Overrides Public Property TwoDigitYearMax As Integer
[JScript] public function get TwoDigitYearMax( ): int;public function set TwoDigitYearMax(int);

Description

Gets or sets the last year of a 100-year range that can be represented by a 2-digit year.

This property allows a 2-digit year to be properly translated to a 4-digit year. For example, in the Gregorian calendar, if this property is set to 2029, the 100-year range is from 1930 to 2029; therefore, a 2-digit value of 30 is interpreted as 1930, while a 2-digit value of 29 is interpreted as 2029.

AddMonths

[C#] public override DateTime AddMonths(DateTime time, int months);
[C++] public: DateTime AddMonths(DateTime time, int months);
[VB] Overrides Public Function AddMonths(ByVal time As DateTime, ByVal months As Integer) As DateTime
[JScript] public override function AddMonths(time: DateTime, months: int): DateTime;

Description

Returns a System.DateTime that is the specified number of months away from the specified System.DateTime.

Return Value: The System.DateTime that results from adding the specified number of months to the specified System.DateTime.

The year part of the resulting System.DateTime is affected if the resulting month is beyond the last month of the current year. The day part of the resulting System.DateTime is also affected if the resulting day is not a valid day in the resulting month of the resulting year; it is changed to the last valid day in the resulting month of the resulting year. The time-of-day part of the resulting System.DateTime remains the same as the specified System.DateTime. The System.DateTime instance to add. The number of months to add.

AddYears

[C#] public override DateTime AddYears(DateTime time, int years);
[C++] public: DateTime AddYears(DateTime time, int years);
[VB] Overrides Public Function AddYears(ByVal time As DateTime, ByVal years As Integer) As DateTime
[JScript] public override function AddYears(time: DateTime, years: int): DateTime;

Description

Returns a System.DateTime that is the specified number of years away from the specified System.DateTime.

Return Value: The System.DateTime that results from adding the specified number of years to the specified System.DateTime.

The day part of the resulting System.DateTime is affected if the resulting day is not a valid day in the resulting month of the resulting year; it is changed to the last valid day in the resulting month of the resulting year. The time-of-day part of the resulting System.DateTime remains the same as the specified System.DateTime. The System.DateTime instance to add. The number of years to add.

GetDayOfMonth

[C#] public override int GetDayOfMonth (DateTime time);
[C++] public: int GetDayOfMonth(DateTime time);
[VB] Overrides Public Function GetDayOfMonth(ByVal time As DateTime) As Integer
[JScript] public override function GetDayOfMonth(time: DateTime): int;

Description

Gets the day of the month in the specified System.DateTime.

Return Value: An integer from 1 to 31 that represents the day of the month in time. The System.DateTime instance to read.

GetDayOfWeek

[C#] public override DayOfWeek GetDayOfWeek(DateTime time);
[C++] public: DayOfWeek GetDayOfWeek(DateTime time);
[VB] Overrides Public Function GetDayOfWeek(ByVal time As DateTime) As DayOfWeek
[JScript] public override function GetDayOfWeek(time: DateTime): DayOfWeek;

Description

Gets the day of the week in the specified System.DateTime.

Return Value: A System.DayOfWeek value that represents the day of the week in time.

The System.DayOfWeek values are Sunday, Monday, Tuesday, Wednesday, Thursday, Friday, and Saturday. The System.DateTime instance to read.

GetDayOfYear

[C#] public override int GetDayOfYear(DateTime time);
[C++] public: int GetDayOfYear(DateTime time);
[VB] Overrides Public Function GetDayOfYear(ByVal time As DateTime) As Integer
[JScript] public override function GetDayOfYear(time: DateTime): int;

Description

Gets the day of the year in the specified System.DateTime.

Return Value: An integer from 1 to 366 that represents the day of the year in time. The System.DateTime instance to read.

GetDaysInMonth

[C#] public override int GetDaysInMonth(int year, int month, int era);
[C++] public: int GetDaysInMonth(int year, int month, int era);
[VB] Overrides Public Function GetDaysInMonth(ByVal year As Integer, ByVal month As Integer, ByVal era As Integer) As Integer

[JScript] public override function GetDaysInMonth(year: int, month: int, era: int): int; Gets the number of days in the specified month.

Description

Gets the number of days in the month specified by the year, month, and era parameters.

Return Value: The number of days in the specified month in the specified year in the specified era.

For example, this method might return 28 or 29 for February (month=2), depending on whether year is a leap year. An integer that represents the year. An integer that represents the month. An integer that represents the era.

GetDaysInYear

[C#] public override int GetDaysInYear(int year, int era);

[C++] public: int GetDaysInYear(int year, int era);

[VB] Overrides Public Function GetDaysInYear(ByVal year As Integer, ByVal era As Integer) As Integer

[JScript] public override function GetDaysInYear(year: int, era: int): int; Gets the number of days in the specified year.

Description

Gets the number of days in the year specified by the year and era parameters.

Return Value: The number of days in the specified year in the specified era.

For example, this method might return 365 or 366, depending on whether year is a leap year. An integer that represents the year. An integer that represents the era.

GetEra

[C#] public override int GetEra(DateTime time);

[C++] public: int GetEra(DateTime time);

[VB] Overrides Public Function GetEra(ByVal time As DateTime) As Integer

[JScript] public override function GetEra(time: DateTime): int;

Description

Gets the era in the specified System.DateTime.

Return Value: An integer that represents the era in time.

The System.Globalization.TaiwanCalendar class recognizes only the current era. The System.DateTime instance to read.

GetMonth

[C#] public override int GetMonth(DateTime time);

[C++] public: int GetMonth(DateTime time);

[VB] Overrides Public Function GetMonth(ByVal time As DateTime) As Integer

[JScript] public override function GetMonth(time: DateTime): int;

Description

Gets the month in the specified System.DateTime.

Return Value: An integer between 1 and 12 that represents the month in time. The System.DateTime instance to read.

GetMonthsInYear

[C#] public override int GetMonthsInYear(int year, int era);

[C++] public: int GetMonthsInYear(int year, int era);

[VB] Overrides Public Function GetMonthsInYear(ByVal year As Integer, ByVal era As Integer) As Integer

[JScript] public override function GetMonthsInYear(year: int, era: int): int; Gets the number of months in the specified year.

Description

Gets the number of months in the year specified by the year and era parameters.

Return Value: The number of months in the specified year in the specified era. An integer that represents the year. An integer that represents the era.

GetYear

[C#] public override int GetYear(DateTime time);

[C++] public: int GetYear(DateTime time);

[VB] Overrides Public Function GetYear(ByVal time As DateTime) As Integer

[JScript] public override function GetYear(time: DateTime): int;

Description

Gets the year in the specified System.DateTime.

Return Value: An integer between 1 and 9999 that represents the year in time. The System.DateTime instance to read.

IsLeapDay

[C#] public override bool IsLeapDay(int year, int month, int day, int era);

[C++] public: bool IsLeapDay(int year, int month, int day, int era);

[VB] Overrides Public Function IsLeapDay(ByVal year As Integer, ByVal month As Integer, ByVal day As Integer, ByVal era As Integer) As Boolean

[JScript] public override function IsLeapDay(year: int, month: int, day: int, era int): Boolean; Determines whether the specified day is a leap day.

Description

Determines whether the date specified by the year, month, day, and era parameters is a leap day.

Return Value: true if the specified day is a leap day; otherwise, false.

Leap years in the Taiwanese calendar correspond to the same leap years in the Gregorian calendar. A common year has 365 days and a leap year has 366 days. An integer that represents the year. An integer that represents the month. An integer that represents the day. An integer that represents the era.

IsLeapMonth

[C#] public override bool IsLeapMonth(int year, int month, int era);

[C++] public: bool IsLeapMonth(int year, int month, int era);

[VB] Overrides Public Function IsLeapMonth(ByVal year As Integer, ByVal month As Integer, ByVal era As Integer) As Boolean

[JScript] public override function IsLeapMonth(year: int, month: int, era: int): Boolean; Determines whether the specified month is a leap month.

Description

Determines whether the month specified by the year, month, and era parameters is a leap month.

Return Value: This method always returns false, unless overridden by a derived class.

Leap years in the Taiwanese calendar correspond to the same leap years in the Gregorian calendar. A common year has 365 days and a leap year has 366 days. An integer that represents the year. An integer that represents the month. An integer that represents the era.

IsLeapYear

[C#] public override bool IsLeapYear(int year, int era);

[C++] public: bool IsLeapYear(int year, int era);

[VB] Overrides Public Function IsLeapYear(ByVal year As Integer, ByVal era As Integer) As Boolean

[JScript] public override function IsLeapYear(year: int, era: int): Boolean; Determines whether the specified year is a leap year.

Description

Determines whether the year specified by the year and era parameters is a leap year.

Return Value: true if the specified year is a leap year; otherwise, false.

Leap years in the Taiwanese calendar correspond to the same leap years in the Gregorian calendar. A common year has 365 days and a leap year has 366 days. An integer that represents the year. An integer that represents the era.

ToDateTime

[C#] public override DateTime ToDateTime(int year, int month, int day, int hour, int minute, int second, int millisecond, int era);

[C++] public: DateTime ToDateTime(int year, int month, int day, int hour, int minute, int second, int millisecond, int era);

[VB] Overrides Public Function ToDateTime(ByVal year As Integer, ByVal month As Integer, ByVal day As Integer, ByVal hour As Integer, ByVal minute As Integer, ByVal second As Integer, ByVal millisecond As Integer, ByVal era As Integer) As DateTime

[JScript] public override function ToDateTime(year: int, month: int, day: int, hour: int, minute: int, second: int, millisecond: int, era: int): DateTime; Returns a System.DateTime that is set to the specified date.

Description

Returns a System.DateTime that is set to the specified date and time in the specified era.

Return Value: The System.DateTime instance set to the specified date and time in the current era. An integer that represents the year. An integer that represents the month. An integer that represents the day. An integer that represents the hour. An integer that represents the minute. An integer that represents the second. An integer that represents the millisecond. An integer that represents the era.

ToFourDigitYear

[C#] public override int ToFourDigitYear(int year);

[C++] public: int ToFourDigitYear(int year);

[VB] Overrides Public Function ToFourDigitYear(ByVal year As Integer) As Integer

[JScript] public override function ToFourDigitYear(year: int): int;

Description

Converts the specified two-digit year to a four-digit year by using the System.Globalization.TaiwanCalendar.TwoDigitYearMax property to determine the appropriate century.

Return Value: An integer that contains the four-digit representation of year.

This method implements System.Globalization.Calendar.ToFourDigitYear(System.Int32). A two-digit integer that represents the year to convert.

TextElementEnumerator class (System.Globalization)

ToString

Description

Enumerates the text elements of a System.String.

The .NET Framework defines a text element as a unit of text that is displayed as a single character; that is, a grapheme. A text element can be a base character, a surrogate pair, or a combining character sequence. The Unicode Standard defines a surrogate pair as a coded character representation for a single abstract character that consists of a sequence of two code units, where the first unit of the pair is a high-surrogate and the second is a low-surrogate. The Unicode Standard defines a combining character sequence as a combination of a base character and one or more combining characters. A surrogate pair can represent a base character or a combining character. For more information on surrogate pairs and combining character sequences, see The Unicode Standard at http://www.unicode.org.

Current

ToString

[C#] public object Current {get;}

[C++] public: _property Object* get_Current( );

[VB] Public ReadOnly Property Current As Object

[JScript] public function get Current( ): Object;

Description

Gets the current text element in the System.String.

The .NET Framework defines a text element as a unit of text that is displayed as a single character; that is, a grapheme. A text element can be a base character, a surrogate pair, or a combining character sequence. The Unicode Standard defines a surrogate pair as a coded character representation for a single abstract character that consists of a sequence of two code units, where the first unit of the pair is a high-surrogate and the second is a low-surrogate. The Unicode Standard defines a combining character sequence as a combination of a base character and one or more combining characters. A surrogate pair can represent a base character or a combining character. For more information on surrogate pairs and combining character sequences, see The Unicode Standard at http://www.unicode.org.

ElementIndex

ToString

[C#] public int ElementIndex {get;}

[C++] public: _property int get_ElementIndex( );

[VB] Public ReadOnly Property ElementIndex As Integer

[JScript] public function get ElementIndex( ): int;

Description

Gets the index of the text element that the enumerator is currently positioned over.

The .NET Framework defines a text element as a unit of text that is displayed as a single character; that is, a grapheme. A text element can be a base character, a surrogate pair, or a combining character sequence. The Unicode Standard defines a surrogate pair as a coded character representation for a single abstract character that consists of a sequence of two code units, where the first unit of the pair is a high-surrogate and the second is a low-surrogate. The Unicode Standard defines a combining character sequence as a combination of a base character and one or more combining characters. A surrogate pair can represent a base character or a combining character. For more information on surrogate pairs and combining character sequences, see The Unicode Standard at http://www.unicode.org.

GetTextElement

[C#] public string GetTextElement( );

[C++] public: String* GetTextElement( );

[VB] Public Function GetTextElement( ) As String

[JScript] public function GetTextElement( ): String;

Description

Gets the current text element in the System.String.

Return Value: A System.String instance containing the current text element in the System.String.

The .NET Framework defines a text element as a unit of text that is displayed as a single character; that is, a grapheme. A text element can be a base character, a surrogate pair, or a combining character sequence. The Unicode Standard defines a surrogate pair as a coded character representation for a single abstract character that consists of a sequence of two code units, where the first unit of the pair is a high-surrogate and the second is a low-surrogate. The Unicode Standard defines a combining character sequence as a combination of a base character and one or more combining characters. A surrogate pair can represent a base character or a combining character. For more information on surrogate pairs and combining character sequences, see The Unicode Standard at http://www.unicode.org.

MoveNext

[C#] public bool MoveNext( );

[C++] public: _sealed bool MoveNext( );

[VB] NotOverridable Public Function MoveNext( ) As Boolean

[JScript] public function MoveNext( ): Boolean;

Description

Advances the enumerator to the next text element of the System.String.

Return Value: true if the enumerator was successfully advanced to the next text element; false if the enumerator has passed the end of the System.String.

The .NET Framework defines a text element as a unit of text that is displayed as a single character; that is, a grapheme. A text element can be a base character, a surrogate pair, or a combining character sequence. The Unicode Standard defines a surrogate pair as a coded character representation for a single abstract character that consists of a sequence of two code units, where the first unit of the pair is a high-surrogate and the second is a low-surrogate. The Unicode Standard defines a combining character sequence as a combination of a base character and one or more combining characters. A surrogate pair can represent a base character or a combining character. For more information on surrogate pairs and combining character sequences, see The Unicode Standard at http://www.unicode.org.

Reset

[C#] public void Reset( );

[C++] public: _sealed void Reset( );

[VB] NotOverridable Public Sub Reset( )

[JScript] public function Reset( );

Description

Sets the enumerator to its initial position, which is before the first text element in the System.String.

The .NET Framework defines a text element as a unit of text that is displayed as a single character; that is, a grapheme. A text element can be a base character, a surrogate pair, or a combining character sequence. The Unicode Standard defines a surrogate pair as a coded character representation for a single abstract character that consists of a sequence of two code units, where the first unit of the pair is a high-surrogate and the second is a low-surrogate. The Unicode Standard defines a combining character sequence as a combination of a base character and one or more combining characters. A surrogate pair can represent a base character or a combining character. For more information on surrogate pairs and combining character sequences, see The Unicode Standard at http://www.unicode.org.

TextInfo class (System.Globalization)

ToString

Description

Defines properties and behaviors, such as casing, that are specific to a writing system.

A writing system is the collection of scripts and orthographic rules required to represent a language as text.

ANSICodePage

ToString

[C#] public virtual int ANSICodePage {get;}

[C++] public: _property virtual int get_ANSICodePage( );

[VB] Overridable Public ReadOnly Property ANSICodePage As Integer

[JScript] public function get ANSICodePage( ): int;

Description

Gets the American National Standards Institute (ANSI) code page used by the writing system represented by the System.Globalization.TextInfo instance.

EBCDICCodePage

ToString

[C#] public virtual int EBCDICCodePage {get;}

[C++] public: _property virtual int get_EBCDICCodePage( );

[VB] Overridable Public ReadOnly Property EBCDICCodePage As Integer

[JScript] public function get EBCDICCodePage( ): int;

Description

Gets the Extended Binary Coded Decimal Interchange Code (EBCDIC) code page used by the writing system represented by the System.Globalization.TextInfo instance.

ListSeparator

ToString

[C#] public virtual string ListSeparator {get;}

[C++] public: _property virtual String* get_ListSeparator( );

[VB] Overridable Public ReadOnly Property ListSeparator As String

[JScript] public function get ListSeparator( ): String;

Description

Gets the System.String that separates items in a list.

The default for the invariant culture is ",".

MacCodePage

ToString

[C#] public virtual int MacCodePage {get;}

[C++] public: _property virtual int get_MacCodePage( );

[VB] Overridable Public ReadOnly Property MacCodePage As Integer

[JScript] public function get MacCodePage( ): int;

Description

Gets the Macintosh code page used by the writing system represented by the System.Globalization.TextInfo instance.

OEMCodePage

ToString

[C#] public virtual int OEMCodePage {get;}

[C++] public: _property virtual int get_OEMCodePage( );

[VB] Overridable Public ReadOnly Property OEMCodePage As Integer

[JScript] public function get OEMCodePage( ): int;

Description

Gets the original equipment manufacturer (OEM) code page used by the writing system represented by the System.Globalization.TextInfo instance.

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Determines whether the specified System.Object represents the same writing system as the current System.Globalization.TextInfo.

Return Value: true if the specified System.Object represents the same writing system as the current System.Globalization.TextInfo; otherwise, false.

This method overrides System.Object.Equals(System.Object). The System.Object to compare with the current System.Globalization.TextInfo.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Serves as a hash function for the current System.Globalization.TextInfo instance, suitable for use in hashing algorithms and data structures, such as a hash table.

Return Value: A hash code for the current System.Globalization.TextInfo instance.

This method overrides System.Object.GetHashCode.

IDeserializationCallback.OnDeserialization

[C#] void IDeserializationCallback.OnDeserialization(object sender);

[C++] void IDeserializationCallback::OnDeserialization (Object* sender);

[VB] Sub OnDeserialization(ByVal sender As Object) Implements IDeserializationCallback.OnDeserialization

[JScript] function IDeserializationCallback.OnDeserialization(sender: Object);

ToLower

[C#] public virtual char ToLower(char c);

[C++] public: virtual _wchar_t ToLower(_wchar_t c);

[VB] Overridable Public Function ToLower(ByVal c As Char) As Char

[JScript] public function ToLower(c: Char): Char; Converts the specified character or string to lowercase.

Description

Converts the specified character to lowercase.

Return Value: The specified character converted to lowercase.

Casing semantics depend on the culture in use. If using the invariant culture, the casing semantics are not culture-sensitive. If using a specific culture, the casing semantics are sensitive to that culture. The character to convert to lowercase.

ToLower

[C#] public virtual string ToLower(string str);

[C++] public: virtual String* ToLower(String* str);

[VB] Overridable Public Function ToLower(ByVal str As String) As String

[JScript] public function ToLower(str: String): String;

Description

Converts the specified string to lowercase.

Return Value: The specified string converted to lowercase.

The returned string might differ in length from the input string. For more information on casing, refer to the Unicode Technical Report #21 "Case Mappings," published by the Unicode Consortium (http://www.unicode.org). The current implementation preserves the length of the string; however, this behavior is not guaranteed and could change in future implementations. The string to convert to lowercase.

ToString

[C#] public override string ToString( );

[C++] public: String* ToString( );

[VB] Overrides Public Function ToString( ) As String

[JScript] public override function ToString( ): String;

Description

Returns a System.String that represents the current System.Globalization.TextInfo instance.

Return Value: A System.String that represents the current System.Globalization.TextInfo instance.

This method overrides System.Object.ToString.

ToTitleCase

[C#] public string ToTitleCase(string str);

[C++] public: String* ToTitleCase(String* str);

[VB] Public Function ToTitleCase(ByVal str As String) As String

[JScript] public function ToTitleCase(str: String): String;

Description

Converts the specified string to titleCase.

Return Value: The specified string converted to titleCase.

Generally, title casing converts the first character of a word to uppercase and converts the rest of the letters to lowercase. Words that are selected for title casing is dependent on the language. The string to convert to titleCase.

ToUpper

[C#] public virtual char ToUpper(char c);

[C++] public: virtual _wchar_t ToUpper(_wchar_t c);

[VB] Overridable Public Function ToUpper(ByVal c As Char) As Char

[JScript] public function ToUpper(c: Char): Char; Converts the specified character or string to uppercase.

Description

Converts the specified character to uppercase.

Return Value: The specified character converted to uppercase.

Casing semantics depend on the culture in use. If using the invariant culture, the casing semantics are not culture-sensitive. If using a specific culture, the casing semantics are sensitive to that culture. The character to convert to uppercase.

ToUpper

[C#] public virtual string ToUpper(string str);

[C++] public: virtual String* ToUpper(String* str);

[VB] Overridable Public Function ToUpper(ByVal str As String) As String

[JScript] public function ToUpper(str: String): String;

Description

Converts the specified string to uppercase.

Return Value: The specified string converted to uppercase.

The returned string might differ in length from the input string. For more information on casing, refer to the Unicode Technical Report #21 "Case Mappings," published by the Unicode Consortium (http://www.unicode.org). The current implementation preserves the length of the string; however this behavior might change in future versions of the .NET Framework. The string to convert to uppercase.

ThaiBuddhistCalendar class (System.Globalization)

ToUpper

Description

Represents the Thai Buddhist calendar.

The Thai Buddhist calendar works exactly like the Gregorian calendar, except that the year and era are different.

ToUpper

[C#] public const int ThaiBuddhistEra;

[C++] public: const int ThaiBuddhistEra;

[VB] Public Const ThaiBuddhistEra As Integer

[JScript] public var ThaiBuddhistEra: int;

Description

Represents the current era.

The System.Globalization.ThaiBuddhistCalendar class recognizes only the current era. This field always returns 1.

ThaiBuddhistCalendar

Example Syntax:

ToUpper

[C#] public ThaiBuddhistCalendar( );

[C++] public: ThaiBuddhistCalendar( );

[VB] Public Sub New( )

[JScript] public function ThaiBuddhistCalendar( );

Description

Initializes a new instance of the System.Globalization.ThaiBuddhistCalendar class.

Eras

ToUpper

[C#] public override int[ ] Eras {get;}

[C++] public: _property virtual int get_Eras( );

[VB] Overrides Public ReadOnly Property Eras As Integer ( )

[JScript] public function get Eras( ): int[ ];

Description

Gets the list of eras in the System.Globalization.ThaiBuddhistCalendar.

The System.Globalization.ThaiBuddhistCalendar class recognizes only the current era. This property always returns an array with only one element.

TwoDigitYearMax

ToUpper

[C#] public override int TwoDigitYearMax {get; set;}

[C++] public: _property virtual int get_TwoDigitYearMax( );public: _property virtual void set_TwoDigitYearMax(int);

[VB] Overrides Public Property TwoDigitYearMax As Integer

[JScript] public function get TwoDigitYearMax( ): int;public function set TwoDigitYearMax(int);

Description

Gets or sets the last year of a 100-year range that can be represented by a 2-digit year.

This property allows a 2-digit year to be properly translated to a 4-digit year. For example, in the Gregorian calendar, if this property is set to 2029, the 100-year range is from 1930 to 2029; therefore, a 2-digit value of 30 is interpreted as 1930, while a 2-digit value of 29 is interpreted as 2029.

AddMonths

[C#] public override DateTime AddMonths(DateTime time, int months);

[C++] public: DateTime AddMonths(DateTime time, int months);

[VB] Overrides Public Function AddMonths(ByVal time As DateTime, ByVal months As Integer) As DateTime

[JScript] public override function AddMonths(time: DateTime, months: int): DateTime;

Description

Returns a System.DateTime that is the specified number of months away from the specified System.DateTime.

Return Value: The System.DateTime that results from adding the specified number of months to the specified System.DateTime.

The year part of the resulting System.DateTime is affected if the resulting month is beyond the last month of the current year. The day part of the resulting System.DateTime is also affected if the resulting day is not a valid day in the resulting month of the resulting year; it is changed to the last valid day in the resulting month of the resulting year. The time-of-day part of the resulting System.DateTime remains the same as the specified System.DateTime. The System.DateTime instance to add. The number of months to add.

AddYears

[C#] public override DateTime AddYears(DateTime time, int years);

[C++] public: DateTime AddYears(DateTime time, int years);

[VB] Overrides Public Function AddYears(ByVal time As DateTime, ByVal years As Integer) As DateTime

[JScript] public override function AddYears(time: DateTime, years: int): DateTime;

Description

Returns a System.DateTime that is the specified number of years away from the specified System.DateTime.

Return Value: The System.DateTime that results from adding the specified number of years to the specified System.DateTime.

The day part of the resulting System.DateTime is affected if the resulting day is not a valid day in the resulting month of the resulting year; it is changed to the last valid day in the resulting month of the resulting year. The time-of-day part of the resulting System.DateTime remains the same as the specified System.DateTime. The System.DateTime instance to add. The number of years to add.

GetDayOfMonth

[C#] public override int GetDayofMonth(DateTime time);

[C++] public: int GetDayOfMonth(DateTime time);

[VB] Overrides Public Function GetDayOfMonth(ByVal time As DateTime) As Integer

[JScript] public override function GetDayOfMonth(time: DateTime): int;

Description

Gets the day of the month in the specified System.DateTime

Return Value: An integer from 1 to 31 that represents the day of the month in time. The System.DateTime instance to read.

GetDayOfWeek

[C#] public override DayOfWeek GetDayOfWeek(DateTime time);

[C++] public: DayOfWeek GetDayOfWeek(DateTime time);

[VB] Overrides Public Function GetDayOfWeek(ByVal time As DateTime) As DayOfWeek

[JScript] public override function GetDayOfWeek(time: DateTime): DayOfWeek;

Description

Gets the day of the week in the specified System.DateTime.

Return Value: A System.DayOfVeek value that represents the day of the week in time.

The System.DayOfWeek values are Sunday, Monday, Tuesday, Wednesday, Thursday, Friday, and Saturday. The System.DateTime instance to read.

GetDayOfYear

[C#] public override int GetDayOfYear(DateTime time);

[C++] public: int GetDayOfYear(DateTime time);

[VB] Overrides Public Function GetDayOfYear(ByVal time As DateTime) As Integer

[JScript] public override function GetDayOfYear(time: DateTime): int;

Description

Gets the day of the year in the specified System.DateTime.

Return Value: An integer from 1 to 366 that represents the day of the year in time.

The System.DateTime instance to read.

GetDaysInMonth

[C#] public override int GetDaysInMonth(int year, int month, int era);

[C++] public: int GetDaysInMonth(int year, int month, int era);

[VB] Overrides Public Function GetDaysInMonth(ByVal year As Integer, ByVal month As Integer, ByVal era As Integer) As Integer

[JScript] public override function GetDaysInMonth(year: int, month: int, era: int): int; Gets the number of days in the specified month.

Description

Gets the number of days in the month specified by the year, month, and era parameters.

Return Value: The number of days in the specified month in the specified year in the specified era.

For example, this method might return 28 or 29 for February (month=2), depending on whether year is a leap year. An integer that represents the year. An integer that represents the month. An integer that represents the era.

GetDaysInYear

[C#] public override int GetDaysInYear(int year, int era);

[C++] public: int GetDaysInYear(int year, int era);

[VB] Overrides Public Function GetDaysInYear(ByVal year As Integer, ByVal era As Integer) As Integer

[JScript] public override function GetDaysInYear(year: int, era: int): int; Gets the number of days in the specified year.

Description

Gets the number of days in the year specified by the year and era parameters.

Return Value: The number of days in the specified year in the specified era.

For example, this method might return 365 or 366, depending on whether year is a leap year. An integer that represents the year. An integer that represents the era.

GetEra

[C#] public override int GetEra(DateTime time);

[C++] public: int GetEra(DateTime time);

[VB] Overrides Public Function GetEra(ByVal time As DateTime) As Integer

[JScript] public override function GetEra(time: DateTime): int;

Description

Gets the era in the specified System.DateTime.

Return Value: An integer that represents the era in time.

The System.Globalization.ThaiBuddhistCalendar class recognizes only the current era. The System.DateTime instance to read.

GetMonth

[C#] public override int GetMonth(DateTime time);

[C++] public: int GetMonth(DateTime time);

[VB] Overrides Public Function GetMonth(ByVal time As DateTime) As Integer

[JScript] public override function GetMonth(time: DateTime): int;

Description

Gets the month in the specified System.DateTime.

Return Value: An integer between 1 and 12 that represents the month in time. The System.DateTime instance to read.

GetMonthsInYear

[C#] public override int GetMonthsInYear(int year, int era);

[C++] public: int GetMonthsInYear(int year, int era);

[VB] Overrides Public Function GetMonthsInYear(ByVal year As Integer, ByVal era As Integer) As Integer

[JScript] public override function GetMonthsInYear(year: int, era: int): int; Gets the number of months in the specified year.

Description

Gets the number of months in the year specified by the year and era parameters.

Return Value: The number of months in the specified year in the specified era. An integer that represents the year. An integer that represents the era.

GetYear

[C#] public override int GetYear(DateTime time);

[C++] public: int GetYear(DateTime time);

[VB] Overrides Public Function GetYear(ByVal time As DateTime) As Integer

[JScript] public override function GetYear(time: DateTime): int;

Description

Gets the year in the specified System.DateTime.

Return Value: An integer between 1 and 9999 that represents the year in time. The System.DateTime instance to read.

IsLeapDay

[C#] public override bool IsLeapDay(int year, int month, int day, int era);

[C++] public: bool IsLeapDay(int year, int month, int day, int era);

[VB] Overrides Public Function IsLeapDay(ByVal year As Integer, ByVal month As Integer, ByVal day As Integer, ByVal era As Integer) As Boolean

[JScript] public override function IsLeapDay(year: int, month: int, day: int, era: int): Boolean; Determines whether the specified day is a leap day.

Description

Determines whether the date specified by the year, month, day, and era parameters is a leap day.

Return Value: true if the specified day is a leap day; otherwise, false.

Leap years in the Thai Buddhist calendar correspond to the same leap years in the Gregorian calendar. A common year has 365 days and a leap year has 366 days. An integer that represents the year. An integer that represents the month. An integer that represents the day. An integer that represents the era.

IsLeapMonth

[C#] public override bool IsLeapMonth(int year, int month, int era);

[C++] public: bool IsLeapMonth(int year, int month, int era);

[VB] Overrides Public Function IsLeapMonth(ByVal year As Integer, ByVal month As Integer, ByVal era As Integer) As Boolean

[JScript] public override function IsLeapMonth(year: int, month: int, era: int): Boolean; Determines whether the specified month is a leap month.

Description

Determines whether the month specified by the year, month, and era parameters is a leap month.

Return Value: This method always returns false, unless overridden by a derived class.

Leap years in the Thai Buddhist calendar correspond to the same leap years in the Gregorian calendar. A common year has 365 days and a leap year has 366 days. An integer that represents the year. An integer that represents the month. An integer that represents the era.

IsLeapYear

[C#] public override bool IsLeapYear(int year, int era);

[C++] public: bool IsLeapYear(int year, int era);

[VB] Overrides Public Function IsLeapYear(ByVal year As Integer, ByVal era As Integer) As Boolean

[JScript] public override function IsLeapYear(year: int, era: int): Boolean; Determines whether the specified year is a leap year.

Description

Determines whether the year specified by the year and era parameters is a leap year.

Return Value: true if the specified year is a leap year; otherwise, false.

Leap years in the Thai Buddhist calendar correspond to the same leap years in the Gregorian calendar. A common year has 365 days and a leap year has 366 days. An integer that represents the year. An integer that represents the era.

ToDateTime

[C#] public override DateTime ToDateTime(int year, int month, int day, int hour, int minute, int second, int millisecond, int era);

[C++] public: DateTime ToDateTime(int year, int month, int day, int hour, int minute, int second, int millisecond, int era);

[VB] Overrides Public Function ToDateTime(ByVal year As Integer, ByVal month As Integer, ByVal day As Integer, ByVal hour As Integer, ByVal minute As Integer, ByVal second As Integer, ByVal millisecond As Integer, ByVal era As Integer) As DateTime

[JScript] public override function ToDateTime(year: int, month: int, day: int, hour: int, minute: int, second: int, millisecond: int, era: int): DateTime; Returns a System.DateTime that is set to the specified date.

Description

Returns a System.DateTime that is set to the specified date and time in the specified era.

Return Value: The System.DateTime instance set to the specified date and time in the current era. An integer that represents the year. An integer that represents the month. An integer that represents the day. An integer that represents the hour. An integer that represents the minute. An integer that represents the second. An integer that represents the millisecond. An integer that represents the era.

ToFourDigitYear

[C#] public override int ToFourDigitYear(int year);

[C++] public: int ToFourDigitYear(int year);

[VB] Overrides Public Function ToFourDigitYear(ByVal year As Integer) As Is Integer

[JScript] public override function ToFourDigitYear(year: int): int;

Description

Converts the specified two-digit year to a four-digit year by using the System.Globalization.ThaiBuddhistCalendar.TwoDigitYearMax property to determine the appropriate century.

Return Value: An integer that contains the four-digit representation of year.

System.Globalization.ThaiBuddhistCalendar.TwoDigitYearMax is the last year in the 100-year range that can be represented by a two-digit year. The century is determined by finding the sole occurrence of the two-digit year within that 100-year range. For example, if System.Globalization.ThaiBuddhistCalendar. TwoDigitYearMax is set to 2029, the 100-year range is from 1930 to 2029; therefore, a 2-digit value of 30 is interpreted as 1930, while a 2-digit value of 29 is interpreted as 2029. A two-digit integer that represents the year to convert.

UnicodeCategory enumeration (System.Globalization)

ToString

Description

Defines the Unicode category of a character.

The Unicode Standard defines the following: A surrogate pair is a coded character representation for a single abstract character that consists of a sequence of two code units, where the first unit of the pair is a high-surrogate and the Is second is a low-surrogate. A high-surrogate is a Unicode code point in the range U+D800 through U+DBFF and a low-surrogate is a Unicode code point in the range U+DC00 through U+DFFF.

ToString

[C#] public const UnicodeCategory ClosePunctuation;

[C++] public: const UnicodeCategory ClosePunctuation;

[VB] Public Const ClosePunctuation As UnicodeCategory

[JScript] public var ClosePunctuation: UnicodeCategory;

Description

Indicates that the character is the closing character of one of the paired punctuation marks, such as parentheses, square brackets, and braces. The value is 21.

ToString

[C#] public const UnicodeCategory ConnectorPunctuation;

[C++] public: const UnicodeCategory ConnectorPunctuation;

[VB] Public Const ConnectorPunctuation As UnicodeCategory

[JScript] public var ConnectorPunctuation: UnicodeCategory;

Description

Indicates that the character is a connector punctuation, which connects two characters. The value is 18.

ToString

[C#] public const UnicodeCategory Control;

[C++] public: const UnicodeCategory Control;

[VB] Public Const Control As UnicodeCategory

[JScript] public var Control: UnicodeCategory;

Description

Indicates that the character is a control code, whose Unicode value is U+007F or in the range U+0000 through U+001F or U+0080 through U+009F. The value is 14.

ToString

[C#] public const UnicodeCategory CurrencySymbol;

[C++] public: const UnicodeCategory CurrencySymbol;

[VB] Public Const CurrencySymbol As UnicodeCategory

[JScript] public var CurrencySymbol: UnicodeCategory;

Description

Indicates that the character is a currency symbol. The value is 26.

ToString

[C#] public const UnicodeCategory DashPunctuation;

[C++] public: const UnicodeCategory DashPunctuation;

[VB] Public Const DashPunctuation As UnicodeCategory

[JScript] public var DashPunctuation: UnicodeCategory;

Description

Indicates that the character is a dash or a hyphen. The value is 19.

ToString

[C#] public const UnicodeCategory DecimalDigitNumber;

[C++] public: const UnicodeCategory DecimalDigitNumber;

[VB] Public Const DecimalDigitNumber As UnicodeCategory

[JScript] public var DecimalDigitNumber: UnicodeCategory;

Description

Indicates that the character is a decimal digit; that is, in the range 0 through 9. The value is 8.

ToString

[C#] public const UnicodeCategory EnclosingMark;

[C++] public: const UnicodeCategory EnclosingMark;

[VB] Public Const EnclosingMark As UnicodeCategory

[JScript] public var EnclosingMark: UnicodeCategory;

Description

Indicates that the character is an enclosing mark, which is a nonspacing combining character that surrounds all previous characters up to and including a base character. The value is 7.

ToString

[C#] public const UnicodeCategory FinalQuotePunctuation;

[C++] public: const UnicodeCategory FinalQuotePunctuation;

[VB] Public Const FinalQuotePunctuation As UnicodeCategory

[JScript] public var FinalQuotePunctuation: UnicodeCategory;

Description

Indicates that the character is a closing or final quotation mark. The value is 23.

ToString

[C#] public const UnicodeCategory Format;

[C++] public: const UnicodeCategory Format;

[VB] Public Const Format As UnicodeCategory

[JScript] public var Format: UnicodeCategory;

Description

Indicates that the character is a format character, which is not normally rendered but affects the layout of text or the operation of text processes. The value is 15.

ToString

[C#] public const UnicodeCategory InitialQuotePunctuation;

[C++] public: const UnicodeCategory InitialQuotePunctuation;

[VB] Public Const InitialQuotePunctuation As UnicodeCategory

[JScript] public var InitialQuotePunctuation: UnicodeCategory;

Description

Indicates that the character is an opening or initial quotation mark. The value is 22.

ToString

[C#] public const UnicodeCategory LetterNumber;

[C++] public: const UnicodeCategory LetterNumber;

[VB] Public Const LetterNumber As UnicodeCategory

[JScript] public var LetterNumber: UnicodeCategory;

Description

Indicates that the character is a number represented by a letter, instead of a decimal digit; for example, the Roman numeral for five, which is 'V'. The value is 9.

ToString

[C#] public const UnicodeCategory LineSeparator;

[C++] public: const UnicodeCategory LineSeparator;

[VB] Public Const LineSeparator As UnicodeCategory

[JScript] public var LineSeparator: UnicodeCategory;

Description

Indicates that the character is used to separate lines of text. The value is 12.

ToString

[C#] public const UnicodeCategory LowercaseLetter;

[C++] public: const UnicodeCategory LowercaseLetter;

[VB] Public Const LowercaseLetter As UnicodeCategory

[JScript] public var LowercaseLetter: UnicodeCategory;

Description

Indicates that the character is a lowercase letter. The value is 1.

ToString

[C#] public const UnicodeCategory MathSymbol;

[C++] public: const UnicodeCategory MathSymbol;

[VB] Public Const MathSymbol As UnicodeCategory

[JScript] public var MathSymbol: UnicodeCategory;

Description

Indicates that the character is a mathematical symbol, such as '+' or '='. The value is 25.

ToString

[C#] public const UnicodeCategory ModifierLetter;

[C++] public: const UnicodeCategory ModifierLetter;

[VB] Public Const ModifierLetter As UnicodeCategory

[JScript] public var ModifierLetter: UnicodeCategory;

Description

Indicates that the character is a modifier letter, which is free-standing spacing character that indicates modifications of a preceding letter. The value is 3.

ToString

[C#] public const UnicodeCategory ModifierSymbol;

[C++] public: const UnicodeCategory ModifierSymbol;

[VB] Public Const ModifierSymbol As UnicodeCategory

[JScript] public var ModifierSymbol: UnicodeCategory;

Description

Indicates that the character is a modifier symbol, which indicates modifications of surrounding characters; for example, the fraction slash indicates that the number to the left is the numerator and the number to the right is the denominator. The value is 27.

ToString

[C#] public const UnicodeCategory NonSpacingMark;

[C++] public: const UnicodeCategory NonSpacingMark;

[VB] Public Const NonSpacingMark As UnicodeCategory

[JScript] public var NonSpacingMark: UnicodeCategory;

Description

Indicates that the character is a nonspacing character, which indicates modifications of a base character. The value is 5.

ToString

[C#] public const UnicodeCategory OpenPunctuation;

[C++] public: const UnicodeCategory OpenPunctuation;

[VB] Public Const OpenPunctuation As UnicodeCategory

[JScript] public var OpenPunctuation: UnicodeCategory;

Description

Indicates that the character is the opening character of one of the paired punctuation marks, such as parentheses, square brackets, and braces. The value is 20.

ToString

[C#] public const UnicodeCategory OtherLetter;

[C++] public: const UnicodeCategory OtherLetter;

[VB] Public Const OtherLetter As UnicodeCategory

[JScript] public var OtherLetter: UnicodeCategory;

Description

Indicates that the character is a letter that is not an uppercase letter, a lowercase letter, a titlecase letter, or a modifier letter. The value is 4.

ToString

[C#] public const UnicodeCategory OtherNotAssigned;

[C++] public: const UnicodeCategory OtherNotAssigned;

[VB] Public Const OtherNotAssigned As UnicodeCategory

[JScript] public var OtherNotAssigned: UnicodeCategory;

Description

Indicates that the character is not assigned to any Unicode category. The value is 29.

ToString

[C#] public const UnicodeCategory OtherNumber;

[C++] public: const UnicodeCategory OtherNumber;

[VB] Public Const OtherNumber As UnicodeCategory

[JScript] public var OtherNumber: UnicodeCategory;

Description

Indicates that the character is a number that is neither a decimal digit nor a letter number; for example, the fraction ½. The value is 10.

ToString

[C#] public const UnicodeCategory OtherPunctuation;

[C++] public: const UnicodeCategory OtherPunctuation;

[VB] Public Const OtherPunctuation As UnicodeCategory

[JScript] public var OtherPunctuation: UnicodeCategory;

Description

Indicates that the character is a punctuation that is not a connector punctuation, a dash punctuation, an open punctuation, a close punctuation, an initial quote punctuation, or a final quote punctuation. The value is 24.

ToString

[C#] public const UnicodeCategory OtherSymbol;

[C++] public: const UnicodeCategory OtherSymbol;

[VB] Public Const OtherSymbol As UnicodeCategory

[JScript] public var OtherSymbol: UnicodeCategory;

Description

Indicates that the character is a symbol that is not a mathematical symbol, a currency symbol or a modifier symbol. The value is 28.

ToString

[C#] public const UnicodeCategory ParagraphSeparator;

[C++] public: const UnicodeCategory ParagraphSeparator;

[VB] Public Const ParagraphSeparator As UnicodeCategory

[JScript] public var ParagraphSeparator: UnicodeCategory;

Description

Indicates that the character is used to separate paragraphs. The value is 13.

ToString

[C#] public const UnicodeCategory PrivateUse;

[C++] public: const UnicodeCategory PrivateUse;

[VB] Public Const PrivateUse As UnicodeCategory

[JScript] public var PrivateUse: UnicodeCategory;

Description

Indicates that the character is a private-use character, whose Unicode value is in the range U+E000 through U+F8FF. The value is 17.

ToString

[C#] public const UnicodeCategory SpaceSeparator;

[C++] public: const UnicodeCategory SpaceSeparator;

[VB] Public Const SpaceSeparator As UnicodeCategory

[JScript] public var SpaceSeparator: UnicodeCategory;

Description

Indicates that the character is a space character, which has no glyph but is not a control or format character. The value is 11.

ToString

[C#] public const UnicodeCategory SpacingCombiningMark;

[C++] public: const UnicodeCategory SpacingCombiningMark;

[VB] Public Const SpacingCombiningMark As UnicodeCategory

[JScript] public var SpacingCombiningMark: UnicodeCategory;

Description

Indicates that the character is a spacing character, which indicates modifications of a base character and affects the width of the glyph for that base character. The value is 6.

ToString

[C#] public const UnicodeCategory Surrogate;

[C++] public: const UnicodeCategory Surrogate;

[VB] Public Const Surrogate As UnicodeCategory

[JScript] public var Surrogate: UnicodeCategory;

Description

Indicates that the character is a high-surrogate or a low-surrogate. Surrogate code values are in the range U+D800 through U+DFFF. The value is 16.

ToString

[C#] public const UnicodeCategory TitlecaseLetter;

[C++] public: const UnicodeCategory TitlecaseLetter;

[VB] Public Const TitlecaseLetter As UnicodeCategory

[JScript] public var TitlecaseLetter: UnicodeCategory;

Description

Indicates that the character is a titlecase letter. The value is 2.

ToString

[C#] public const UnicodeCategory UppercaseLetter;

[C++] public: const UnicodeCategory UppercaseLetter;

[VB] Publ

System.Resources Namespace

Creating resources can help developers develop robust, culture-aware programs without having to recompile an application because the resources have changed. Resources are an application-building feature that allows developers to place culture-specific data inside satellite data files (called resource files), rather than directly in a main application. The main assembly does not strong bind to these satellite data files that give developers the flexibility to deploy them in different phases. When building an application, the developer can identify aspects that are culture-specific such as user visible strings, graphics etc., and put these in a different resources file for each culture where the application may be used. At run time, the appropriate set of resources will be loaded, based on the user's culture settings. The specific setting used is the CurrentUICulture for the main thread of execution, which the user can set programmatically.

The ResourceManager class provides the user with the ability to access and control resources stored in the main assembly or in resource satellite assemblies. Use the ResourceManager.GetObject and ResourceManager.GetString methods to retrieve culture-specific objects and strings, as illustrated in the following example.

```
class Class1
{
  //Creates a resource manger bound to the localizable
  //resource file associated with this assembly.
  static ResourceManager rm = new ResourceManager(
  "strings",Assembly.GetExecutingAssembly( ));
  static void Main(string[ ] args)
  {
  //Pulls the string with the key "Hello" out of the
  //resource file that is the best match for the current
  //culture.
  Console.WriteLine (rm.GetString ("Hello"));
  }
}
```

SYSTEM.NET NAMESPACE

The System.Net namespace provides a simple programming interface to many of the protocols found on the network today. The WebRequest and WebResponse classes form the basis of "pluggable protocols," an implementation of network services that enables developers to develop applications that use Internet resources without worrying about the specific details of the protocol used.

The System.Net.Sockets namespace provides a managed implementation of the Windows Sockets interface for developers that need to tightly control access to the network. Developers familiar with the Winsock API can readily develop applications using the Socket class.

The TCPClient, TCPListener, and UDPClient classes encapsulate the details of creating TCP and UDP connections to the Internet.

The following is a more detailed description of the System.Net namespace, identifying various classes, interfaces, enumerations, and so forth contained in the System.Net and System.Net.Sockets namespaces.

System.Net

The namespace provides a simple programming interface to many of the protocols found on the network today. The and classes form the basis of "pluggable protocols," an implementation of network services that enables you to develop applications that use Internet resources without worrying about the specific details of the protocol used.

Description

The System.Net namespace provides a simple programming interface to many of the protocols found on the network today. The System.Net.WebRequest and System.Net.WebResponse classes form the basis of "pluggable protocols," an implementation of network services that enables you to develop applications that use Internet resources without worrying about the specific details of the protocol used.

AuthenticationManager class (System.Net)

Description

Manages the authentication modules called during the client authentication process.

System.Net.AuthenticationManager is a static class that manages the authentication modules that an application uses. When a request is made to protected resources, the System.Net.AuthenticationManager calls the System.Net.AuthenticationManager.Authenticate(System.String,System.Net.WebRequest,System.Net.ICredentials) method to get an System.Net.Authorization instance to use in subsequent requests.

Properties:

RegisteredModules

[C#] public static IEnumerator RegisteredModules {get;}

[C++] public: _property static IEnumerator* get_RegisteredModules( );

[VB] Public Shared ReadOnly Property RegisteredModules As IEnumerator

[JScript] public static function get RegisteredModules( ): IEnumerator;

Description

Gets a list of authentication modules that are registered with the authentication manager.

The System.Net.AuthenticationManager.RegisteredModules property provides an System.Collections.IEnumerator instance that enables the list of registered authentication modules to be read. The System.Net.AuthenticationManager.Register(System.Net.IAuthenticationModule) method adds modules to the list, and the System.Net.AuthenticationManager.Unregister(System.Net.IAuthentication Module) method removes modules from it.

Methods:

Authenticate

[C#] public static Authorization Authenticate(string challenge, WebRequest request, ICredentials credentials);

[C++] public: static Authorization* Authenticate(String* challenge, WebRequest* request, ICredentials* credentials);

[VB] Public Shared Function Authenticate(ByVal challenge As String, ByVal request As WebRequest, ByVal credentials As ICredentials) As Authorization

[JScript] public static function Authenticate(challenge: String, request: WebRequest, credentials: ICredentials): Authorization;

Description

Calls each registered authentication module to find the first module that can respond to the authentication request.

Return Value: An instance of the System.Net.Authorization class containing the result of the authorization attempt. If there is no authentication module to respond to the challenge, this method returns null.

The System.Net.AuthenticationManager.Authenticate(System.String,System.Net. WebRequest,System.Net.ICredentials) method calls the System.Net.IAuthenticationModule.Authenticate(System.String,System.Net. WebRequest, System.Net.ICredentials) method on each registered authentication module until one of the module responds with an System.Net.Authorization instance. The challenge returned by the Internet resource. The System.Net.WebRequest that initiated the authentication challenge. The System.Net.ICredentials associated with this request.

PreAuthenticate

[C#] public static Authorization PreAuthenticate(WebRequest request, ICredentials credentials);

[C++] public: static Authorization* PreAuthenticate(WebRequest* request, ICredentials* credentials);

[VB] Public Shared Function PreAuthenticate(ByVal request As WebRequest, ByVal credentials As ICredentials) As Authorization

[JScript] public static function PreAuthenticate(request: WebRequest, credentials: ICredentials): Authorization;

Description

Preauthenticates a request.

Return Value: An instance of the System.Net.Authorization class if the request can be preauthenticated; otherwise, null. If credentials is null, this method returns null.

If the authentication module can preauthenticate the request, the PreAuthenticate method returns an Authentication instance and sends the authorization information to the server preemptively instead of waiting for the resource to issue a challenge. This behavior is outlined in section 3.3 of RFC 2617 (HTTP Authentication: Basic and Digest Access Authentication). Authentication modules that support preauthentication allow clients to improve server efficiency by avoiding extra round trips caused by authentication challenges. A System.Net.WebRequest to an Internet resource. The System.Net.ICredentials associated with the request.

Register

[C#] public static void Register(IAuthenticationModule authenticationModule);

[C++] public: static void Register(IAuthenticationModule* authenticationModule);

[VB] Public Shared Sub Register(ByVal authenticationModule As IAuthenticationModule)

[JScript] public static function Register(authenticationModule: IAuthenticationModule);

Description

Registers an authentication module with the authentication manager.

The System.Net.AuthenticationManager.Register(System.Net.IAuthenticationModule) method adds authentication modules to the end of the list of modules called by the System.Net.AuthenticationManager.Authenticate(System.String,System.Net. WebRequest,System.Net.ICredentials) method. Authentication modules are called in the order in which they were added to the list. The System.Net.IAuthenticationModule to register with the authentication manager.

Unregister

[C#] public static void Unregister(IAuthenticationModule authenticationModule);

[C++] public: static void Unregister(IAuthenticationModule* authenticationModule);

[VB] Public Shared Sub Unregister(ByVal authenticationModule As IAuthenticationModule)

[JScript] public static function Unregister(authenticationModule: IAuthenticationModule); Removes authentication modules from the list of registered modules.

Description

Removes the specified authentication module from the list of registered modules.

The System.Net.AuthenticationManager.Unregister(System.Net.IAuthentication Module) method removes the specified authentication module from the list of authentication modules called by the System.Net.AuthenticationManager.Authenticate(System.String,System.Net. WebRequest, System.Net.ICredentials) method. The module must have been added to the list using the System.Net.AuthenticationManager.Register(System.Net.IAuthenticationModule) method before it can be removed from the list. The IAuthentication module to remove.

Unregister

[C#] public static void Unregister(string authenticationScheme);

[C++] public: static void Unregister(String* authenticationScheme);

[VB] Public Shared Sub Unregister(ByVal authenticationScheme As String)

[JScript] public static function Unregister(authenticationScheme: String);

Description

Removes authentication modules with the specified authentication scheme from the list of registered modules.

The System.Net.AuthenticationManager.Unregister(System.Net.IAuthentication Module) method removes the authentication module with the specified authentication scheme from the list of authentication modules called by the System.Net.AuthenticationManager.Authenticate(System.String,System.Net. WebRequest,System.Net.ICredentials) method. The module must have been added to the list using the System.Net.AuthenticationManager.Register(System.Net.IAuthenticationModule) method before it can be removed from the list. The authentication scheme of the module to remove.

Authorization class (System.Net)

Unregister

Description

Contains an authentication message for an Internet server.

The System.Net.AuthenticationManager returns an instance of the System.Net.Authorization class containing the authentication message that is sent to the Internet server to indicate that the client (such as System.Net.WebRequest or one of its descendants) is authorized to access the server.

Constructors:

Authorization

Example Syntax:

Unregister

[C#] public Authorization(string token);

[C++] public: Authorization(String* token);

[VB] Public Sub New(ByVal token As String)

[JScript] public function Authorization(token: String); Creates a new instance of the System.Net.Authorization class.

Description

Creates a new instance of the System.Net.Authorization class with the specified authorization message.

The System.Net.Authorization instance is created with the System.Net.Authorization.Message property set to token and the System.Net.Authorization.Complete property set to true. The encrypted authorization message expected by the server.

Authorization

Example Syntax:

Unregister

[C#] public Authorization(string token, bool finished);

[C++] public: Authorization(String* token, bool finished);

[VB] Public Sub New(ByVal token As String, ByVal finished As Boolean)

[JScript] public function Authorization(token: String, finished: Boolean);

Description

Creates a new instance of the System.Net.Authorization class with the specified authorization message and completion status.

The System.Net.Authorization instance is created with the System.Net.Authorization.Message property set to token and the System.Net.Authorization.Complete property set to finished. The encrypted authorization message expected by the server. The completion status of the authorization attempt.

Authorization

Example Syntax:

Unregister

[C#] public Authorization(string token, bool finished, string connectionGroupId);

[C++] public: Authorization(String* token, bool finished, String* connectionGroupId);

[VB] Public Sub New(ByVal token As String, ByVal finished As Boolean, ByVal connectionGroupId As String)

[JScript] public function Authorization(token: String, finished: Boolean, connectionGroupId: String);

Description

Creates a new instance of the System.Net.Authorization class with the specified authorization message, completion status, and connection group identifier. The encrypted authorization message expected by the server. The completion status of the authorization attempt. A unique identifier that can be used to create private Client-Server connections, that would only be bound to this authentication scheme.

Complete

Unregister

[C#] public bool Complete {get;}

[C++] public: _property bool get_Complete( );

[VB] Public ReadOnly Property Complete As Boolean

[JScript] public function get Complete( ): Boolean;

Description

Gets the completion status of the authorization.

The System.Net.Authorization.Complete property is set to true when the authentication process between the client and the server is finished. Some authentication modules, such as the Kerberos module, use multiple round trips between the client and server to complete the authentication process. To keep the System.Net.WebRequest or descendant that initiated the authentication process from interrupting while authorization is taking place, the authentication module sets the System.Net.Authorization.Complete property to false.

ConnectionGroupId

Unregister

[C#] public string ConnectionGroupId {get;}

[C++] public: _property String* get_ConnectionGroupId( );

[VB] Public ReadOnly Property ConnectionGroupId As String

[JScript] public function get ConnectionGroupId( ): String;

Description

Gets a unique identifier for user-specific connections.

The System.Net.Authorization.ConnectionGroupId property is a unique string that associates a connection with a specific authenticating entity. For example, the NTLM authorization module ties the authentication credential information to a specific connection to prevent invalid reuse of the connection.

Message

Unregister

[C#] public string Message {get;}

[C++] public: _property String* get_Message( );

[VB] Public ReadOnly Property Message As String

[JScript] public function get Message( ): String;

Description

Gets the message returned to the server in response to an authentication challenge.

The System.Net.Authorization.Message property contains the authorization string that the client will return to the server when accessing protected resources. The actual contents of the message is defined by the authentication type the client and server are using. Basic HTTP authentication, for example, uses a different message than Kerberos authentication.

ProtectionRealm

Unregister

[C#] public string[ ] ProtectionRealm {get; set;}

[C++] public: _property String* get_Protection Realm( );public: _property void set_ProtectionRealm (String* _gc[ ]);

[VB] Public Property ProtectionRealm As String ( )

[JScript] public function get ProtectionRealm( ): String[ ]; public function set ProtectionRealm(String[ ]);

Description

Gets or sets the prefix for uniform resource identifiers (URIs) that can be authenticated with the System.Net.Authorization.Message property.

The System.Net.Authorization.ProtectionRealm property contains a list of URI prefixes that the System.Net.Authorization.Message property can be used to authenticate.

Cookie class (System.Net)

ToString

Description

Provides a set of properties and methods used to manage cookies. This class cannot be inherited.

For a list of initial property values for an instance of System.Net.Cookie, see the System.Net.Cookie.#ctor constructors.

Cookie

Example Syntax:

ToString

[C#] public Cookie( );

[C++] public: Cookie( );

[VB] Public Sub New( )

[JScript] public function Cookie( ); Initializes a new instance of the System.Net.Cookie class.

Description

Initializes a new instance of the System.Net.Cookie class using the empty string for default parameters: name, value, path, domain.

Cookie

Example Syntax:

ToString

[C#] public Cookie(string name, string value);

[C++] public: Cookie(String* name, String* value);

[VB] Public Sub New(ByVal name As String, ByVal value As String)

[JScript] public function Cookie(name: String, value: String);

Description

Initializes a new instance of the System.Net.Cookie class with specified name and value, using the empty string for default parameters: path, domain. string string Cookie Example Syntax:

ToString

[C#] public Cookie(string name, string value, string path);

[C++] public: Cookie(String* name, String* value, String* path);

[VB] Public Sub New(ByVal name As String, ByVal value As String, ByVal path As String)

[JScript] public function Cookie(name: String, value: String, path: String);

Description

Initializes a new instance of the System.Net.Cookie class with specified name, value, and path, using the empty string for default parameter domain. string string string Cookie Example Syntax:

ToString

[C#] public Cookie(string name, string value, string path, string domain);

[C++] public: Cookie(String* name, String* value, String* path, String* domain);

[VB] Public Sub New(ByVal name As String, ByVal value As String, ByVal path As String, ByVal domain As String)

[JScript] public function Cookie(name: String, value: String, path: String, domain: String);

Description

Initializes a new instance of the System.Net.Cookie class with specified name, value, path, and domain. string string string string Comment ToString

[C#] public string Comment {get; set;}

[C++] public: _property String* get_Comment( ); public: _property void set_Comment(String*);

[VB] Public Property Comment As String

[JScript] public function get Comment( ): String;public function set Comment(String);

Description

Gets a comment that the server can add to the cookie.

The client can inspect this optional comment for information added by the server about issues such as the privacy policy and so on.

CommentUri

ToString

[C#] public Uri CommentUri {get; set;}

[C++] public: _property Uri* get_CommentUri( ); public: _property void set_CommentUri(Uri*);

[VB] Public Property CommentUri As Uri

[JScript] public function get CommentUri( ): Uri;public function set CommentUri(Uri);

Description

Gets a URI that the server can provide with a cookie.

The URI can provide optional information such as how the server uses the cookie.

Discard

ToString

[C#] public bool Discard {get; set;}

[C++] public: _property bool get_Discard( );public: _property void set_Discard(bool);

[VB] Public Property Discard As Boolean

[JScript] public function get Discard( ): Boolean;public function set Discard(Boolean);

Description

Gets the discard flag set by the server.

When true, this property instructs the Web browser not to save the cookie on the user's hard drive when a session ends.

Domain

ToString

[C#] public string Domain {get; set;}

[C++] public: _property String* get_Domain( ); public: _property void set_Domain(String*);

[VB] Public Property Domain As String

[JScript] public function get Domain( ): String;public function set Domain(String);

Description

Gets the URI for which the cookie is valid.

A server cannot indicate a domain other than its own. However it can indicate more than one server.

Expired

ToString

[C#] public bool Expired {get; set;}

[C++] public: _property bool get_Expired( );public: _property void set_Expired(bool);

[VB] Public Property Expired As Boolean

[JScript] public function get Expired( ): Boolean;public function set Expired(Boolean);

Description

Gets the current state of the cookie.

Expires

ToString

[C#] public DateTime Expires {get; set;}

[C++] public: _property DateTime get_Expires( ); public: _property void set_Expires(DateTime);

[VB] Public Property Expires As DateTime

[JScript] public function get Expires( ): DateTime;public function set Expires(DateTime);

Description

Gets the expiration DateTime for the cookie.

Name

ToString

[C#] public string Name {get; set;}

[C++] public: _property String* get_Name( );public: _property void set_Name(String*);

[VB] Public Property Name As String

[JScript] public function get Name( ): String;public function set Name(String);

Description

Gets the name for the cookie.

Path

ToString

[C#] public string Path {get; set;}

[C++] public: _property String* get_Path( );public: _property void set_Path(String*);

[VB] Public Property Path As String

[JScript] public function get Path( ): String;public function set Path(String);

Description

Gets the URLs to which the cookie applies on the server.

Port

ToString

[C#] public string Port {get; set;}

[C++] public: _property String* get_Port( );public: _property void set_Port(String*);

[VB] Public Property Port As String

[JScript] public function get Port( ): String;public function set Port(String);

Description

Gets a list of TCP ports to which the cookie applies.

Secure

ToString

[C#] public bool Secure {get; set;}

[C++] public: _property bool get_Secure( );public: _property void set_Secure(bool);

[VB] Public Property Secure As Boolean

[JScript] public function get Secure( ): Boolean;public function set Secure(Boolean);

Description

Gets the security level set by the server.

TimeStamp

ToString

[C#] public DateTime TimeStamp {get;}

[C++] public: _property DateTime get_TimeStamp( );

[VB] Public ReadOnly Property TimeStamp As DateTime

[JScript] public function get TimeStamp( ): DateTime;

Description

Gets the DateTime when the cookie was issued.

Value

ToString

[C#] public string Value {get; set;}

[C++] public: _property String* get_Value( );public: _property void set_Value(String*);

[VB] Public Property Value As String

[JScript] public function get Value( ): String;public function set Value(String);

Description
Gets the server-supplied value for the cookie.
Version
ToString
[C#] public int Version {get; set;}
[C++] public: _property int get_Version( );public: _property void set_Version(int);
[VB] Public Property Version As Integer
[JScript] public function get Version( ): int;public function set Version(int);

Description
Gets the version of HTTP state maintenance to which the cookie conforms.
Equals
[C#] public override bool Equals(object comparand);
[C++] public: bool Equals(Object* comparand);
[VB] Overrides Public Function Equals(ByVal comparand As Object) As Boolean
[JScript] public override function Equals(comparand: Object): Boolean;

Description
An override of the Object.Equals method. A reference to a Cookie object.
GetHashCode
[C#] public override int GetHashCode( );
[C++] public: int GetashCode( );
[VB] Overrides Public Function GetHashCode( ) As Integer
[JScript] public override function GetHashCode( ): int;

Description
An override of Object.GetHashCode.
ToString
[C#] public override string ToString( );
[C++] public: String* ToString( );
[VB] Overrides Public Function ToString( ) As String
[JScript] public override function ToString( ): String;

Description
An override of Object.ToString.
CookieCollection class (System.Net)
ToString Description
Provides a collection container for Cookie or CookieCollection instances.
The CookieCollection class implements an ICollection interface to provide a general mechanism for handling collections of cookies. For example, this is useful in the case where an application wants to act on behalf of multiple users and store cookies for each user.
CookieCollection
Example Syntax:
ToString
[C#] public CookieCollection( );
[C++] public: Cookiecollection( );
[VB] Public Sub New( )
[JScript] public function CookieCollection( );

Description
Initializes a new instance of the System.Net.CookieCollection class.
Count
ToString
[C#] public int Count {get;}
[C++] public: _property int get_Count( );
[VB] Public ReadOnly Property Count As Integer
[JScript] public function get Count( ): int;

Description
Gets the number of elements contained in the CookieCollection
IsReadOnly
ToString
[C#] public bool IsReadOnly {get;}
[C++] public: _property bool get_IsReadOnly( );
[VB] Public ReadOnly Property IsReadOnly As Boolean
[JScript] public function get IsReadOnly( ): Boolean;

Description
Gets or sets a value indicating whether the CoookieCollection instance is read-only.
IsSynchronized
ToString
[C#] public bool IsSynchronized {get;}
[C++] public: _property bool get_IsSynchronized( );
[VB] Public ReadOnly Property IsSynchronized As Boolean
[JScript] public function get IsSynchronized( ): Boolean;

Description
Gets a value that indicates whether access to a CookieCollection is thread-safe.
SyncRoot returns an object that can be used to synchronize access to the CookieCollection.
Item
ToString
[C#] public Cookie this[int index] {get;}
[C++] public: _property Cookie* get_Item(int index);
[VB] Public Default ReadOnly Property Item(ByVal index As Integer) As Cookie
[JScript] returnValue=CookieCollectionObject.Item(index);
Gets a specific CookieCollection element.

Description
Gets the CookieCollection element with a specific index. The zero-based index of the Cookie.
Item
ToString
[C#] public Cookie this [string name] {get;}
[C++] public: _property Cookie* get_Item(String* name);
[VB] Public Default ReadOnly Property Item(ByVal name As String) As Cookie
[JScript] returnValue=CookieCollectionObject.Item(name);

Description
Gets the CookieCollection element with a specific name. The name of the
Cookie.
SyncRoot
ToString
[C#] public object SyncRoot {get;}
[C++] public: _property Object* get_SyncRoot( );
[VB] Public ReadOnly Property SyncRoot As Object
[JScript] public function get SyncRoot( ): Object;

Description
Gets an object that you can use to synchronize access to the CookieCollection.
Add
[C#] public void Add(Cookie cookie);
[C++] public: void Add(Cookie* cookie);
[VB] Public Sub Add(ByVal cookie As Cookie)
[JScript] public function Add(cookie: Cookie); Adds an item to the CookieCollection.

Description

Adds a Cookie to the CookieCollection. The Cookie to be added to the collection

Add

[C#] public void Add(CookieCollection cookies);

[C++] public: void Add(CookieCollection* cookies);

[VB] Public Sub Add(ByVal cookies As CookieCollection)

[JScript] public function Add(cookies: CookieCollection);

Description

Adds a CookieCollection to the CookieCollection. The CookieCollection to be added to the collection CopyTo

[C#] public void CopyTo(Array array, int index);

[C++] public: _sealed void CopyTo(Array* array, int index);

[VB] NotOverridable Public Sub CopyTo(ByVal array As Array, ByVal index As Integer)

[JScript] public function CopyTo(array: Array, index: int);

Description

Copies the elements of the collection to an Array, starting at a particular index.

The Arrayarray must be a one-dimensional array with zero-based indexing. The target Array. The zero-based index in array at which copying begins.

GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Gets an enumerator that you can use to iterate through a CookieCollection

Return Value: An IEnumerator that you can use to iterate through a CookieCollection.

You should only use Enumerators to read data in the collection. Enumerators cannot be used to modify the underlying collection. The enumerator does not have exclusive access to the collection.

CookieContainer class (System.Net)

ToString

Description

Contains CookieCollection objects.

ToString

[C#] public const it DefaultCookieLengthLimit;

[C++] public: const int DefaultCookieLengthLimit;

[VB] Public Const DefaultCookieLengthLimit As Integer

[JScript] public var DefaultCookieLengthLimit: int;

Description

Gets the maximum size, in bytes, of elements the CookieContainer can hold. This field is constant.

ToString

[C#] public const int DefaultCookieLimit;

[C++] public: const int DefaultCookieLimit;

[VB] Public Const DefaultCookieLimit As Integer

[JScript] public var DefaultCookieLimit: int;

Description

Gets the maximum number of elements the CookieContainer can hold. This field is constant.

ToString

[C#] public const int DefaultPerDomainCookieLimit;

[C++] public: const int DefaultPerDomainCookieLimit;

[VB] Public Const DefaultPerDomainCookieLimit As Integer

[JScript] public var DefaultPerDomainCookieLimit: int;

Description

Gets the maximum number of elements the CookieContainer can reference per domain. This field is constant.

CookieContainer

Example Syntax:

ToString

[C#] public CookieContainer( );

[C++] public: CookieContainer( );

[VB] Public Sub New( )

[JScript] public function CookieContainer( ); Initializes a new instance of the System.Net.CookieContainer class.

Description

Initializes a new instance of the System.Net.CookieContainer class with default values for DefaultCookieLimit, DefaultPerDomainCookieLimit, and DefaultCookieLengthLimit.

CookieContainer

Example Syntax:

ToString

[C#] public CookieContainer(int capacity);

[C++] public: CookieContainer(int capacity);

[VB] Public Sub New(ByVal capacity As Integer)

[JScript] public function CookieContainer(capacity: int);

Description

Initializes a new instance of the System.Net.CookieContainer class with a specified value for the number of elements the container can hold and default values for DefaultPerDomainCookieLimit, and DefaultCookieLengthLimit. The number of cookies the CookieContainer can hold.

CookieContainer

Example Syntax:

ToString

[C#] public CookieContainer(int capacity, int perDomainCapacity, int maxCookieSize);

[C++] public: CookieContainer(int capacity, int perDomainCapacity, int maxCookieSize);

[VB] Public Sub New(ByVal capacity As Integer, ByVal perDomainCapacity As Integer, ByVal maxCookieSize As Integer)

[JScript] public function CookieContainer(capacity: int, perDomainCapacity: int, maxCookieSize: int);

Description

Initializes a new instance of the System.Net.CookieContainer class with a specified value for the number of elements the container can hold, the number of cookies per domain, and the maximum element length. The number of elements the CookieContainer can hold. The number of elements per domain. The maximum size of the elements CookieContainer can hold.

Capacity

ToString

[C#] public int Capacity {get; set;}

[C++] public: _property int get_Capacity( );public: _property void set_Capacity(int);

[VB] Public Property Capacity As Integer

[JScript] public function get Capacity( ): int;public function set Capacity(int);

Description

Gets the number of elements the CookieContainer can hold.

Count

ToString

[C#] public int Count {get;}

[C++] public: _property int get_Count( );

[VB] Public ReadOnly Property Count As Integer

[JScript] public function get Count( ): int;

Description

Gets the number of elements the CookieContainer currently holds.

MaxCookieSize

ToString

[C#] public int MaxCookieSize {get; set;}

[C++] public: _property int get_MaxCookieSize( ); public: _property void set_MaxCookieSize(int);

[VB] Public Property MaxCookieSize As Integer

[JScript] public function get MaxCookieSize( ): int;public function set MaxCookieSize(int);

Description

Gets the maximum size of the elements held by the CookieContainer.

PerDomainCapacity

ToString

[C#] public int PerDomainCapacity {get; set;}

[C++] public: _property int get_PerDomainCapacity( );public: _property void set_PerDomainCapacity(int);

[VB] Public Property PerDomainCapacity As Integer

[JScript] public function get PerDomainCapacity( ): int;public function set PerDomainCapacity(int);

Description

Gets the number of elements allowed per domain.

Add

[C#] public void Add(Cookie cookie);

[C++] public: void Add(Cookie* cookie);

[VB] Public Sub Add(ByVal cookie As Cookie)

[JScript] public function Add(cookie: Cookie); Adds elements to the CookieContainer.

Description

Adds a Cookie to the CookieContainer. The Cookie to be added to the CookieContainer.

Add

[C#] public void Add(CookieCollection cookies);

[C++] public: void Add(CookieCollection* cookies);

[VB] Public Sub Add(ByVal cookies As CookieCollection)

[JScript] public function Add(cookies: CookieCollection);

Description

Adds a CookieCollection to the CookieContainer. The CookieCollection to be added to the CookieContainer.

Add

[C#] public void Add(Uri uri, Cookie cookie);

[C++] public: void Add(Uri* uri, Cookie* cookie);

[VB] Public Sub Add(ByVal uri As Uri, ByVal cookie As Cookie)

[JScript] public function Add(uri: Uri, cookie: Cookie);

Description

Adds a Cookie to the CookieContainer. The URI of the Cookie to be added to the CookieContainer. The Cookie to be added to the CookieContainer Add

[C#] public void Add(Uri uri, CookieCollection cookies);

[C++] public: void Add(Uri* uri, CookieCollection* cookies);

[VB] Public Sub Add(ByVal uri As Uri, ByVal cookies As CookieCollection)

[JScript] public function Add(uri: Uri, cookies: CookieCollection);

Description

Adds a CookieCollection to the CookieContainer. The URI of the CookieCollection to be added to the CookieContainer. The CookieCollection to be added to the CookieContainer.

GetCookieHeader

[C#] public string GetCookieHeader(Uri uri);

[C++] public: String* GetCookieHeader(Uri* uri);

[VB] Public Function GetCookieHeader(ByVal uri As Uri) As String

[JScript] public function GetCookieHeader(uri: Uri): String;

Description

Gets the HTTP header of the element associated with a specific URI. The URI desired.

GetCookies

[C#] public CookieCollection GetCookies(Uri uri);

[C++] public: CookieCollection* GetCookies(Uri* uri);

[VB] Public Function GetCookies(ByVal uri As Uri) As CookieCollection

[JScript] public function GetCookies(uri: Uri): CookieCollection;

Description

Gets the elements associated with a specific URI.

Return Value: A CookieCollection containing the elements associated with a specific URI. The URI of the elements desired.

SetCookies

[C#] public void SetCookies(Uri uri, string cookieHeader);

[C++] public: void SetCookies(Uri* uri, String* cookieHeader);

[VB] Public Sub SetCookies(ByVal uri As Uri, ByVal cookieHeader As String)

[JScript] public function SetCookies(uri: Uri, cookieHeader: String);

Description

Associates a cookie header with a specific URI. The URI of the header. CookieException class (System.Net)

ToString

Description

The exception that is thrown when XXX.

CookieException

Example Syntax:

ToString

[C#] public CookieException( );

[C++] public: CookieException( );

[VB] Public Sub New( )

[JScript] public function CookieException( ); Initializes a new instance of the System.Net.CookieException class.

Description

Initializes a new instance of the System.Net.CookieException class using default parameters.

CookieException

Example Syntax:

ToString

[C#] protected CookieException(SerializationInfo serializationInfo, StreamingContext streamingContext);

[C++] protected: CookieException(SerializationInfo* serializationInfo, StreamingContext streamingContext);

[VB] Protected Sub New(ByVal SerializationInfo As SerializationInfo, ByVal streamingContext As StreamingContext)

[JScript] protected function CookieException(SerializationInfo: SerializationInfo, streamingcontext: StreamingContext);

Description

Initializes a new instance of the System.Net.CookieException class with specified values of serializationInfo and streamingContext. The SerializationInfo to be used. The StreamingContext to be used.

HelpLink

HResult

InnerException

Message

Source

StackTrace

TargetSite

ISerializable.GetObjectData

[C#] void ISerializable.GetObjectData(SerializationInfo SerializationInfo, StreamingContext streamingContext);

[C++] void ISerializable::GetObjectData(SerializationInfo* SerializationInfo, StreamingContext streamingContext);

[VB] Sub GetObjectData(ByVal SerializationInfo As SerializationInfo, ByVal streamingContext As StreamingContext) Implements ISerializable.GetObjectData

[JScript] function ISerializable.GetObjectData(SerializationInfo: SerializationInfo, streamingContext: StreamingContext);

CredentialCache class (System.Net)

ToString

Description

Provides storage for multiple credentials.

The System.Net.CredentialCache class stores credentials for multiple Internet resources. Applications that need to access multiple resources can store the credentials for those resources in a System.Net.CredentialCache instance that then provides the proper set of credentials to the Internet resource when required. When the System.Net.CredentialCache.GetCredential(System.Uri,System.String) method is called, it compares the URI and authentication type provided with those stored in the cache and returns the first set of credentials that match.

CredentialCache

Example Syntax:

ToString

[C#] public CredentialCache( );

[C++] public: CredentialCache( );

[VB] Public Sub New( )

[JScript] public function CredentialCache( );

Description

Creates a new instance of the System.Net.CredentialCache class.

The constructor creates a System.Net.CredentialCache instance with its System.Net.CredentialCache.DefaultCredentials property initialized to the system credentials of the current security context. For client applications, these represent the user name, password, and domain of the user who is currently logged in. For ASP.NET applications, the credential is the process token of the IIS server or the process token being impersonated by the IIS server.

DefaultCredentials

ToString

[C#] public static ICredentials DefaultCredentials {get;}

[C++] public: _property static ICredentials* get_DefaultCredentials( );

[VB] Public Shared ReadOnly Property DefaultCredentials As ICredentials

[JScript] public static function get DefaultCredentials( ): ICredentials;

Description

Gets the system credentials of the application.

The System.Net.CredentialCache.DefaultCredentials property applies only to NTLM, negotiate, and Kerberos-based authentication.

Add

[C#] public void Add(Uri uriPrefix, string authType, NetworkCredential cred);

[C++] public: void Add(Uri* uriPrefix, String* authType, NetworkCredential* cred);

[VB] Public Sub Add(ByVal uriPrefix As Uri, ByVal authType As String, ByVal cred As NetworkCredential)

[JScript] public function Add(uriPrefix: Uri, authType: String, cred: NetworkCredential);

Description

Adds a System.Net.NetworkCredential instance to the credential cache.

The System.Net.CredentialCache.Add(System.Uri,System.String,System.Net.NetworkCredential) method places a System.Net.NetworkCredential instance into the System.Net.CredentialCache. The cache stores credentials in the order in which they are added to it. When the System.Net.CredentialCache.GetCredential(System.Uri,System.String) method is called, it returns the proper matching System.Net.NetworkCredential instance. A System.Uri that specifies the URI prefix of the resources that the credential grants access to. The authentication scheme used by the resource named in uriPrefix. The System.Net.NetworkCredential to add to the credential cache.

GetCredential

[C#] public NetworkCredential GetCredential(Uri uriPrefix, string authType);

[C++] public: _sealed NetworkCredential* GetCredential (Uri* uriPrefix, String* authType);

[VB] NotOverridable Public Function GetCredential(ByVal uriPrefix As Uri, ByVal authType As String) As NetworkCredential

[JScript] public function GetCredential(uriPrefix: Uri, authType: String): NetworkCredential;

Description

Returns the System.Net.NetworkCredential instance associated with the specified URI and authentication type.

Return Value: A System.Net.NetworkCredential or, if there is no matching credential in the cache, null.

The System.Net.CredentialCache.GetCredential (System.Uri,System.String) method searches the System.Net.CredentialCache and returns the System.Net.NetworkCredential instance for the specified URI and authorization type. If the System.Net.CredentialCache contains no matching System.Net.NetworkCredential instance, null is returned. A System.Uri that specifies the URI prefix of the resources that the credential grants access to. The authentication scheme used by the resource named in uriPrefix.

GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Returns an enumerator that can iterate through the System.Net.CredentialCache instance.

Return Value: An System.Collections.IEnumerator for the System.Net.CredentialCache Remove

[C#] public void Remove(Uri uriPrefix, string authType);

[C++] public: void Remove(Uri* uriPrefix, String* authType);

[VB] Public Sub Remove(ByVal uriPrefix As Uri, ByVal authType As String)

[JScript] public function Remove(uriPrefix: Uri, authType: String);

Description

Deletes a System.Net.NetworkCredential instance from the cache.

The System.Net.CredentialCache.Remove(System.Uri, System.String) method removes the specified System.Net.NetworkCredential instance from the System.Net.CredentialCache. Multiple calls to the System.Net.CredentialCache.Remove(System.Uri,System.String) method for the same System.Net.NetworkCredential have no effect. A System.Uri that specifies the URI prefix of the resources that the credential is used for. The authentication scheme used by the host named in uriPrefix.

Dns class (System.Net)

ToString

Description

Provides simple domain name resolution functionality.

The System.Net.Dns class is a static class that retrieves information about a specific host from the Internet Domain Name System (DNS).

BeginGetHostByName

[C#] public static IAsyncResult BeginGetHostByName (string hostName, AsyncCallback requestCallback, object stateObject);

[C++] public: static IAsyncResult* BeginGetHostByName (String* hostName, AsyncCallback* requestCallack, Object* stateObject);

[VB] Public Shared Function BeginGetHostByName(ByVal hostName As String, ByVal requestCallback As AsyncCallback, ByVal stateObject As Object) As IAsyncResult

[JScript] public static function BeginGetHostByName(hostName: String, requestCallback: AsyncCallback, stateObject: Object): IAsyncResult;

Description

Begins an asynchronous request for System.Net.IPHostEntry information about the specified DNS host name.

Return Value: An System.IAsyncResult instance that references the asynchronous request.

The System.Net.Dns.BeginGetHostByName(System.String,System.AsyncCallback, System.Object) method starts an asynchronous request for DNS host information. The asynchronous callback method uses the System.Net.Dns.EndGetHostByName(System.IAsyncResult) method to return the actual host information. A string containing the DNS name of the host. The System.AsyncCallback. The State object.

BeginResolve

[C#] public static IAsyncResult BeginResolve(string hostName, AsyncCallback requestCallback, object stateObject);

[C++] public: static IAsyncResult* BeginResolve(String* hostName, AsyncCallback* requestCallback, Object* stateObject);

[VB] Public Shared Function BeginResolve(ByVal hostName As String, ByVal requestCallback As AsyncCallback, ByVal stateObject As Object) As IAsyncResult

[JScript] public static function BeginResolve(hostName: String, requestCallback: AsyncCallback, stateObject: Object): IAsyncResult;

Description

Begins an asynchronous request to resolve a DNS host name or IP address in dotted-quad notation to an System.Net.IPAddress instance.

Return Value: An System.IAsyncResult instance that references the asynchronous request.

The System.Net.Dns.BeginResolve(System.String,System.AsyncCallback,System. Object) method starts an asynchronous request for DNS host information. The asynchronous callback method uses the System.Net.Dns.EndResolve(System.IAsyncResult) method to return the actual host information. A string containing the DNS name of the host. The System.AsyncCallback. The State object.

EndGetHostByName

[C#] public static IPHostEntry EndGetHostByName(IAsyncResult asyncResult);

[C++] public: static IPHostEntry* EndGetHostByName (IAsyncResult* asyncResult);

[VB] Public Shared Function EndGetHostByName(ByVal asyncResult As IAsyncResult) As IPHostEntry

[JScript] public static function EndGetHostByName (asyncResult: IAsyncResult) IPHostEntry;

Description

Ends an asynchronous request for DNS information.

Return Value: An System.Net.IPHostEntry object containin DNS information about a host.

The System.Net.Dns.EndGetHostByName(System.IAsyncResult) method completes an asynchronous request for DNS information that was started with a call to System.Net.Dns.BeginGetHostByName(System.String,System.AsyncCallback, System.Object). The pending request for DNS information.

EndResolve

[C#] public static IPHostEntry EndResolve(IAsyncResult asyncResult);

[C++] public: static IPHostEntry* EndResolve(IAsyncResult* asyncResult);

[VB] Public Shared Function EndResolve(ByVal asyncResult As IAsyncResult) As IPHostEntry

[JScript] public static function EndResolve(asyncResult: IAsyncResult) IPHostEntry;

Description

Ends an asynchronous request for DNS information.

Return Value: An System.Net.IPHostEntry object containin DNS information about a host.

The System.Net.Dns.EndResolve(System.IAsyncResult) method completes an asynchronous request for DNS information that was started with a call to System.Net.Dns.BeginResolve(System.String,System.AsyncCallback,System.Object). The pending request for DNS information.

GetHostByAddress

[C#] public static IPHostEntry GetHostByAddress(IPAddress address);

[C++] public: static IPHostEntry* GetHostByAddress(IPAddress* address);

[VB] Public Shared Function GetHostByAddress(ByVal address As IPAddress) As IPHostEntry

[JScript] public static function GetHostByAddress(address: IPAddress) IPHostEntry;

Description

Creates an System.Net.IPHostEntry instance from a specified System.Net.IPAddress instance.

Return Value: An System.Net.IPHostEntry instance. An System.Net.IPAddress instance.

GetHostByAddress

[C#] public static IPHostEntry GetHostByAddress(string address);

[C++] public: static IPHostEntry* GetHostByAddress (String* address);

[VB] Public Shared Function GetHostByAddress(ByVal address As String) As IPHostEntry

[JScript] public static function GetHostByAddress(address: String): IPHostEntry; Gets DNS host information for an IP address.

Description

Creates an System.Net.IPHostEntry instance from an address in dotted-quad notation ("198.162.1.2").

Return Value: An System.Net.IPHostEntry instance. A string that represents an IP address in dotted-quad notation (for example, "192.168.1.2").

GetHostByName

[C#] public static IPHostEntry GetHostByName(string hostName);

[C++] public: static IPHostEntry* GetHostByName(String* hostname);

[VB] Public Shared Function GetHostByName(ByVal hostName As String) As IPHostEntry

[JScript] public static function GetHostByName(hostName: String): IPHostEntry;

Description

Gets the DNS information for the specified DNS host name.

Return Value: An System.Net.IPHostEntry object containing host information for the address specified in hostName.

The System.Net.Dns.GetHostByName(System.String) method queries the Internet DNS server for host information. A string containing the DNS name of the host.

GetHostName

[C#] public static string GetHostName( );

[C++] public: static String* GetHostName( );

[VB] Public Shared Function GetHostName( ) As String

[JScript] public static function GetHostName( ): String;

Description

Gets the host name of the local machine.

Return Value: A string containing the DNS host name of the local machine.

IpToString

[C#] public static string IpToString(int address);

[C++] public: static String* IpToString(int address);

[VB] Public Shared Function IpToString(ByVal address As Integer) As String

[JScript] public static function IpToString(address: int): String;

Description

Converts an IP address to a dotted-quad string.

Return Value: The string representation of the IP address.

The System.Net.Dns.IpToString(System.Int32) method converts an IP address expressed as an integer (for example, 33663168) to an IP address expressed in dotted-quad notation (for example, "192.168.1.2"). The IP address to convert.

Resolve

[C#] public static IPHostEntry Resolve(string hostName);

[C++] public: static IPHostEntry* Resolve(String* hostName);

[VB] Public Shared Function Resolve(ByVal hostName As String) As IPHostEntry

[JScript] public static function Resolve(hostName: String): IPHostEntry;

Description

Resolves a DNS host name or IP address in dotted-quad notation to an System.Net.IPHostEntry instance.

Return Value: An System.Net.IPHostEntry instance containing address information about the host specified in hostName.

The System.Net.Dns.Resolve(System.String) method queries a DNS server for the IP address associated with a host name or IP address in dotted-quad notation. A DNS-style host name or IP address in dotted-quad notation. (for example, "www.contoso.com " or "192.168.1.2").

DnsPermission class (System.Net)

ToString

Description

Controls rights to access Domain Name System (DNS) servers on the network.

The default allows all local and Intranet zone applications to access DNS services, and no DNS permission for Internet zone applications.

DnsPermission

Example Syntax:

ToString

[C#] public DnsPermission(PermissionState state);

[C++] public: DnsPermission(PermissionState state);

[VB] Public Sub New(ByVal state As PermissionState)

[JScript] public function DnsPermission(state: PermissionState); Creates a new instance of the System.Net.DnsPermission class.

Description

Creates a new instance of the System.Net.DnsPermission class that either passes all demands or fails all demands.

If state is System.Security.Permissions.PermissionState.Unrestricted the System.Net.DnsPermission instance passes all demands. If state contains any other value, the System.Net.DnsPermission instance fails all demands. One of the System.Security.Permissions.PermissionState values.

Copy

[C#] public override IPermission Copy( );

[C++] public: IPermission* Copy( );

[VB] Overrides Public Function Copy( ) As IPermission

[JScript] public override function Copy( ): IPermission;

Description

Creates an identical copy of the current permission instance.

Return Value: A new instance of the System.Net.DnsPermission class that is an identical copy of the current instance.

A copy of a System.Net.DnsPermission instance provides the same access to DNS servers as the original permission instance.

FromXml

[C#] public override void FromXml(SecurityElement securityElement);

[C++] public: void FromXml(SecurityElement* securityElement);

[VB] Overrides Public Sub FromXml(ByVal securityElement As SecurityElement)

[JScript] public override function FromXml(securityElement: SecurityElement);

Description

Reconstructs a System.Net.DnsPermission instance from an XML encoding.

The System.Net.DnsPermission.FromXml(System.Security.SecurityElement) method reconstructs a System.Net.DnsPermission instance from an XML encoding defined by System.Security.SecurityElement class. The XML encoding to use to reconstruct the System.Net.DnsPermission instance.

Intersect

[C#] public override IPermission Intersect(IPermission target);

[C++] public: IPermission* Intersect(IPermission* target);

[VB] Overrides Public Function Intersect(ByVal target As IPermission) As IPermission

[JScript] public override function Intersect(target: IPermission): IPermission;

Description

Creates a permission instance that is the intersection of the current permission instance and the specified permission instance.

Return Value: A System.Net.DnsPermission instance that represents the intersection of the current System.Net.DnsPermission instance with the specified System.Net.DnsPermission instance, or null if the intersection is empty.

The System.Net.DnsPermission.Intersect(System.Security.IPermission) method returns a System.Net.DnsPermission instance that allows the access defined by both the current System.Net.DnsPermission instance and the specified System.Net.DnsPermission instance. Any demand must pass both permissions to pass their intersection. The System.Net.DnsPermission instance to combine with the current instance.

IsSubsetOf

[C#] public override bool IsSubsetOf(IPermission target);

[C++] public: bool IsSubsetOf(IPermission* target);

[VB] Overrides Public Function IsSubsetOf(ByVal target As IPermission) As Boolean

[JScript] public override function IsSubsetOf(target: IPermission): Boolean;

Description

Determines whether the current permission instance is a subset of the specified permission instance.

Return Value: true if the current permission instance is a subset of target; otherwise, false.

The current System.Net.DnsPermission instance is a subset of the specified System.Net.DnsPermission instance if the current System.Net.DnsPermission instance specifies a set of operations that is wholly contained by the specified System.Net.DnsPermission instance. The second System.Net.DnsPermission instance to be tested for the subset relationship.

IsUnrestricted

[C#] public bool IsUnrestricted( );

[C++] public: _sealed bool IsUnrestricted( );

[VB] NotOverridable Public Function IsUnrestricted( ) As Boolean

[JScript] public function IsUnrestricted( ): Boolean;

Description

Checks the overall permission state of the object.

Return Value: true if the System.Net.DnsPermission instance was created with System.Security.Permissions.PermissionState.Unrestricted; otherwise, false.

ToXml

[C#] public override SecurityElement ToXml( );

[C++] public: SecurityElement* ToXml( );

[VB] Overrides Public Function ToXml( ) As SecurityElement

[JScript] public override function ToXml( ): SecurityElement;

Description

Creates an XML encoding of a System.Net.DnsPermission instance and its current state.

Return Value: A System.Security.SecurityElement instance containing an XML-encoded representation of the security object, including state information.

The System.Net.DnsPermission.ToXml method creates a System.Security.SecurityElement instance to XML-encode a representation of the System.Net.DnsPermission instance, including state information.

Union

[C#] public override IPermission Union(IPermission target);

[VB] Overrides Public Function Union(ByVal target As IPermission) As IPermission

[JScript] public override function Union(target: IPermission): IPermission;

Description

Creates a permission instance that is the union of the current permission instance and the specified permission instance.

Return Value: A System.Net.DnsPermission instance that represents the union of the current System.Net.DnsPermission instance with the specified System.Net.DnsPermission instance.

The System.Net.DnsPernission.Union(System.Security.IPermission) method returns a System.Net.DnsPermission instance that allows the access defined by either the current System.Net.DnsPermission instance and the specified System.Net.DnsPermission instance. Any demand that passes either permission passes their union. The System.Net.DnsPermission instance to combine with the current instance.

DnsPermissionAttribute class (System.Net)

Union

Description

Enables security actions for System.Net.DnsPermission to be applied to code using declarative security. This class cannot be inherited.

DnsPermissionAttribute

Example Syntax:

Union

[C#] public DnsPermissionAttribute(SecurityAction action);

[C++] public: DnsPermissionAttribute(SecurityAction action);

[VB] Public Sub New(ByVal action As SecurityAction)

[JScript] public function DnsPermissionAttribute(action: SecurityAction);

Description

Initializes a new instance of the System.Net.DnsPermissionAttribute class with the specified System.Security.Permissions.SecurityAction value. One of the System.Security.Permissions.SecurityAction values.

Action

TypeId

Unrestricted

CreatePermission

[C#] public override IPermission CreatePermission( );

[C++] public: IPermission* CreatePermission( );

[VB] Overrides Public Function CreatePermission( ) As IPermission

[JScript] public override function CreatePermission( ): IPermission;

Description

Creates and returns a new instance of the System.Net.DnsPermission class.

Return Value: An instance of the System.Net.DnsPermission class corresponding to the security declaration.

The System.Net.DnsPermissionAttribute.CreatePermission method is called by the security system, not by application code.

EndPoint class (System.Net)

ToString

Description

Identifies a network address. This is an abstract class.

The System.Net.EndPoint class provides an abstract base class that represents a network resource or service. Descendant classes combine network connection information to form a connection point to a service.

EndPoint

Example Syntax:

ToString

[C#] protected EndPoint( );

[C++] protected: EndPoint( );

[VB] Protected Sub New( )

[JScript] protected function EndPoint( );

AddressFamily

ToString

[C#] public virtual AddressFamily AddressFamily {get;}

[C++] public: _property virtual AddressFamily get_AddressFamily( );

[VB] Overridable Public ReadOnly Property AddressFamily As AddressFamily

[JScript] public function get AddressFamily( ): AddressFamily;

Description

Gets the address family to which the endpoint belongs.

The System.Net.EndPoint.AddressFamily property specifies the addressing scheme used by the end point's underlying network protocol.

Create

[C#] public virtual EndPoint Create(SocketAddress socketAddress);

[C++] public: virtual EndPoint* Create(SocketAddress* socketAddress);

[VB] Overridable Public Function Create(ByVal socketAddress As SocketAddress) As EndPoint

[JScript] public function Create(socketAddress: SocketAddress): EndPoint;

Description

Creates an System.Net.EndPoint instance from a System.Net.SocketAddress instance.

Return Value: A new System.Net.EndPoint instance initialized from the specified System.Net.SocketAddress instance. The socket address that serves as the endpoint for a connection.

Serialize

[C#] public virtual SocketAddress Serialize( );

[C++] public: virtual SocketAddress* Serialize( );

[VB] Overridable Public Function Serialize( ) As SocketAddress

[JScript] public function Serialize( ): SocketAddress;

Description

Serializes endpoint information into a System.Net.SocketAddress instance.

Return Value: A System.Net.SocketAddress instance containing the endpoint information.

EndpointPermission class (System.Net)

ToString

Description

Defines an endpoint that is authorized by a System.Net.SocketPermission instance.

The System.Net.EndpointPermission class defines a network endpoint, including host name, network port number, and transport type used to make the connection.

Hostname

ToString

[C#] public string Hostname {get;}

[C++] public: _property String* get_Hostname( );

[VB] Public ReadOnly Property Hostname As String

[JScript] public function get Hostname( ): String;

Description

Gets the DNS host name or IP address of the server associated with this endpoint.

Port

ToString

[C#] public int Port {get;}

[C++] public: _property int get_Port( );

[VB] Public ReadOnly Property Port As Integer

[JScript] public function get Port( ): int;

Description

Gets the network port number associated with this endpoint.

Transport

ToString

[C#] public TransportType Transport {get;}

[C++] public: _property TransportType get_Transport( );

[VB] Public ReadOnly Property Transport As TransportType

[JScript] public function get Transport( ): TransportType;

Description

Gets the transport type associated with this endpoint.

Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

GetHashCode

[C#] public override int GetHashCode( );

[C++] public: int GetHashCode( );

[VB] Overrides Public Function GetHashCode( ) As Integer

[JScript] public override function GetHashCode( ): int;

Description

ToString

[C#] public override string ToString( );

[C++] public: String* ToString( );

[VB] Overrides Public Function ToString( ) As String

[JScript] public override function ToString( ): String;

Description

Returns a string that represents the current System.Net.EndpointPermission instance.

Return Value: A string that represents the current System.Net.EndpointPermission instance.

The System.Net.EndpointPermission.ToString method returns a string representing the contents for the System.Net.EndpointPermission instance. The string is in the form System.Net.EndpointPermission.Hostname # System.Net.EndpointPermission.Port # System.Net.EndpointPermission.Transport.

FileWebRequest class (System.Net)

ToString

Description

Provides a file system implementation of the System.Net.WebRequest class.

The System.Net.FileWebRequest class implements the System.Net.WebRequestabstract base class for URIs that use the file://scheme to request local files.

FileWebRequest

Example Syntax:

ToString

[C#] protected FileWebRequest(SerializationInfo serializationInfo, StreamingContext streamingContext);

[C++] protected: FileWebRequest(SerializationInfo* serializationInfo, StreamingContext streamingContext);

[VB] Protected Sub New(ByVal SerializationInfo As SerializationInfo, ByVal streamingcontext As StreamingContext)

[JScript] protected function FileWebRequest(serializationInfo: SerializationInfo, streamingcontext: StreamingContext);

Description

Initializes a new instance of the System.Net.FileWebRequest class from the specified instances of the System.Runtime.Serialization.SerializationInfo and System.Runtime.Serialization.StreamingContext classes.

This constructor implements the System.Runtime.Serialization.ISerializable interface for the System.Net.FileWebRequest class. A System.Runtime.Serialization.SerializationInfo instance that contains the information required to serialize the new System.Net.FileWebRequest instance. An instance of the System.Runtime.Serialization.StreamingContext class that contains the source of the serialized stream associated with the new System.Net.FileWebRequest instance.

ConnectionGroupName

ToString

[C#] public override string ConnectionGroupName {get; set;}

[C++] public: _property virtual String* get_ConnectionGroupName( );public: _property virtual void set_ConnectionGroupName(String*);

[VB] Overrides Public Property ConnectionGroupName As String

[JScript] public function get ConnectionGroupName( ): String;public function set ConnectionGroupName (String);

Description

Gets or sets the name of the connection group for the request. This property is reserved for future use.

The System.Net.FileWebRequest.ConnectionGroupName property is currently not used by the System.Net.FileWebRequest class.

ContentLength

ToString

[C#] public override long ContentLength {get; set;}

[C++] public: _property virtual _int64 get_ContentLength( );public: _property virtual void set_ContentLength(_int64);

[VB] Overrides Public Property ContentLength As Long

[JScript] public function get ContentLength( ): long;public function set ContentLength(long);

Description

Gets or sets the content length of the data being sent.

ContentType

ToString

[C#] public override string ContentType {get; set;}

[C++] public: _property virtual String* get_ContentType( );public: _property virtual void set_ContentType (String*);

[VB] Overrides Public Property ContentType As String

[JScript] public function get ContentType( ): String;public function set ContentType(String);

Description

Gets or sets the content type of the data being sent. This property is reserved for future use.

The System.Net.FileWebRequest.ContentType property contains the media type of the data being sent. This is typically the MIME encoding of the content. The System.Net.FileWebRequest.ContentType property is currently not used by the System.Net.FileWebRequest class.

Credentials

ToString

[C#] public override ICredentials Credentials {get; set;}

[C++] public: _property virtual ICredentials* get_Credentials( );public: _property virtual void set_Credentials(ICredentials*);

[VB] Overrides Public Property Credentials As ICredentials

[JScript] public function get Credentials( ): ICredentials;public function set Credentials(ICredentials);

Description

Gets or sets the credentials associated with this request. This property is reserved for future use.

Because the System.Net.FileWebRequest class does not authenticate requests for files from the local file system, it ignores the contents, if any, of the System.Net.FileWebRequest.Credentials property. Authentication for System.Net.FileWebRequest is handled by the access control lists for the file resource in the underlying file system.

Headers

ToString

[C#] public override WebHeaderCollection Headers {get;}

[C++] public: _property virtual WebHeaderCollection* get_Headers( );

[VB] Overrides Public ReadOnly Property Headers As WebHeaderCollection

[JScript] public function get Headers( ): WebHeaderCollection;

Description

Gets a collection of the name/value pairs associated with the request. This property is reserved for future use.

The System.Net.FileWebRequest.Headers property is currently not used by the System.Net.FileWebRequest class.

Method

ToString

[C#] public override string Method {get; set;}

[C++] public: _property virtual String* get_Method( );public: _property virtual void set_Method(String*);

[VB] Overrides Public Property Method As String

[JScript] public function get Method( ): String;public function set Method(String);

Description

Gets or sets the protocol method used for the request. This property is reserved for future use.

The System.Net.FileWebRequest.Method property is currently not used by the System.Net.FileWebRequest class.

PreAuthenticate

ToString

[C#] public override bool PreAuthenticate {get; set;}

[C++] public: _property virtual bool get_PreAuthenticate( ); public: _property virtual void set_PreAuthenticate(bool);

[VB] Overrides Public Property PreAuthenticate As Boolean

[JScript] public function get PreAuthenticate( ): Boolean; public function set PreAuthenticate(Boolean);

Description

Gets or sets a value indicating whether to preauthenticate a request. This property is reserved for future use.

The System.Net.FileWebRequest.PreAuthenticate property is currently not used by the System.Net.FileWebRequest class.

Proxy

ToString

[C#] public override IWebProxy Proxy {get; set;}

[C++] public: _property virtual IWebProxy* get_Proxy( ); public: _property virtual void set_Proxy(IWebProxy*);

[VB] Overrides Public Property Proxy As IWebProxy

[JScript] public function get Proxy( ): IWebProxy;public function set Proxy(IWebProxy);

Description

Gets or sets the network proxy to use for this request. This property is reserved for future use.

The System.Net.FileWebRequest.Proxy property is currently not used by the System.Net.FileWebRequest class.

RequestUri

ToString

[C#] public override Uri RequestUri {get;}

[C++] public: _property virtual Uri* get_RequestUri( );

[VB] Overrides Public ReadOnly Property RequestUri As Uri

[JScript] public function get RequestUri( ): Uri;

Description

Gets the URI of the request.

Timeout

ToString

[C#] public override int Timeout {get; set;}

[C++] public: _property virtual int get_Timeout( ); public: _property virtual void set_Timeout(int);

[VB] Overrides Public Property Timeout As Integer

[JScript] public function get Timeout( ): int;public function set Timeout(int);

Description

Gets or sets the length of time until the request times out.

BeginGetRequestStream

[C#] public override IAsyncResult BeginGetRequestStream (AsyncCallback callback, object state);

[C++] public: IAsyncResult* BeginGetRequestStream (AsyncCallback* callback, Object* state);

[VB] Overrides Public Function BeginGetRequestStream (ByVal callback As AsyncCallback, ByVal state As Object) As IAsyncResult

[JScript] public override function BeginGetRequestStream (callback: AsyncCallback, state: Object): IAsyncResult;

Description

Begins an asynchronous request for a System.IO.Stream instance to use to write data.

Return Value: An System.IAsyncResult that references the asynchronous request.

The System.Net.FileWebRequest.BeginGetRequestStream (System.AsyncCallback, System.Object) method starts an asynchronous request for a stream used to send data to a file system resource. The callback method that implements the System.AsyncCallback delegate uses the System.Net.FileWebRequest.EndGetRequestStream(System.IAsyncResult) method to return the request stream. The System.AsyncCallback delegate. An object containing state information for this request.

BeginGetResponse

[C#] public override IAsyncResult BeginGetResponse (AsyncCallback callback, object state);

[C++] public: IAsyncResult* BeginGetResponse(AsyncCallback* callback, Object* state);

[VB] Overrides Public Function BeginGetResponse(ByVal callback As AsyncCallback, ByVal state As Object) As IAsyncResult

[JScript] public override function BeginGetResponse(callback: AsyncCallback, state: Object): IAsyncResult;

Description

Begins an asynchronous request for a file system resource.

Return Value: An System.IAsyncResult that references the asynchronous request.

The System.Net.FileWebRequest.BeginGetResponse (System.AsyncCallback,System.Object) method starts an asynchronous request for a file system resource. The asynchronous callback method that implements the System.AsyncCallback delegate uses the System.Net.FileWebRequest.EndGetResponse(System.IAsyncResult) method to return the actual System.Net.FileWebResponse. The System.AsyncCallback delegate. An object containing state information for this request.

EndGetRequestStream

[C#] public override Stream EndGetRequestStream (IAsyncResult asyncResult);

[C++] public: Stream* EndGetRequestStream(IAsyncResult* asyncResult);

[VB] Overrides Public Function EndGetRequestStream(ByVal asyncResult As IAsyncResult) As Stream

[JScript] public override function EndGetRequestStream (asyncResult: IAsyncResult): Stream;

Description

Ends an asynchronous request for a System.IO.Stream instance that the application uses to write data.

Return Value: A System.IO.Stream instance that the application uses to write data.

The System.Net.FileWebRequest.EndGetRequestStream (System.IAsyncResult) method completes an asynchronous stream request that was started by the System.Net.File WebRequest.BeginGetRequestStream(System.AsyncCallback, System.Object) method. An System.IAsyncResult referencing the pending request for a stream.

EndGetResponse

[C#] public override WebResponse EndGetResponse (IAsyncResult asyncResult);

[C++] public: WebResponse* EndGetResponse(IAsyncResult* asyncResult);

[VB] Overrides Public Function EndGetResponse(ByVal asyncResult As IAsyncResult) As WebResponse

[JScript] public override function EndGetResponse (asyncResult: IAsyncResult): WebResponse;

Description

Ends an asynchronous request for a file system resource.

Return Value: A System.Net.WebResponse that contains the response from the file system resource.

The System.Net.FileWebRequest.EndGetResponse(System.IAsyncResult) method completes an asynchronous request for a file system resource that was started with the System.Net.FileWebRequest.BeginGetResponse(System.AsyncCallback,System. Object) method. An System.IAsyncResult referencing the pending request for a response.

GetRequestStream

[C#] public override Stream GetRequestStream( );

[C++] public: Stream* GetRequestStream( );

[VB] Overrides Public Function GetRequestStream( ) As Stream

[JScript] public override function GetRequestStream( ): Stream;

Description

Returns a System.IO.Stream instance for writing data to the file system resource.

Return Value: A System.IO.Stream for writing data to the file system resource.

The System.Net.FileWebRequest.GetRequestStream method returns a System.IO.Stream instance for writing data to the file system resource.

GetResponse

[C#] public override WebResponse GetResponse( );

[C++] public: WebResponse* GetResponse( );

[VB] Overrides Public Function GetResponse( ) As WebResponse

[JScript] public override function GetResponse( ): WebResponse;

Description

Returns a response to a file system request.

Return Value: A System.Net.WebResponse that contains the response from the file system resource.

The System.Net.FileWebRequest.GetResponse method returns a System.Net.WebResponse instance containing the response from the file system resource.

ISerializable.GetObjectData

[C#] void ISerializable.GetObjectData(SerializationInfo serializationInfo, StreamingContext streamingContext);

[C++] void ISerializable::GetObjectData(SerializationInfo* SerializationInfo, StreamingContext streamingContext);

[VB] Sub GetObjectData(ByVal SerializationInfo As SerializationInfo, ByVal streamingcontext As StreamingContext) Implements ISerializable.GetObjectData

[JScript] function ISerializable.GetObjectData(SerializationInfo: SerializationInfo, streamingcontext: StreamingContext);

FileWebResponse class (System.Net)

ToString

Description

Provides a file system implementation of the System.Net.WebResponse class.

The System.Net.FileWebResponse class implements the System.Net.WebResponseabstract base class to return file system resources for the System.Net.FileWebRequest class.

FileWebResponse

Example Syntax:

ToString

[C#] protected FileWebResponse(SerializationInfo SerializationInfo, StreamingContext streamingContext);

[C++] protected: FileWebResponse(SerializationInfo* SerializationInfo, StreamingContext streamingContext);

[VB] Protected Sub New(ByVal SerializationInfo As SerializationInfo, ByVal streamingcontext As StreamingContext)

[JScript] protected function FileWebResponse(SerializationInfo: SerializationInfo, streamingcontext: StreamingContext);

Description

Initializes a new instance of the System.Net.FileWebResponse class from the specified instances of the System.Runtime.Serialization.SerializationInfo and System.Runtime.Serialization.StreamingContext classes.

This constructor implements the System.Runtime.Serialization.ISerializable interface for the System.Net.FileWebResponse class. A System.Runtime.Serialization.SerializationInfo instance that contains the information required to serialize the new System.Net.FileWebResponse instance. An instance of the System.Runtime.Serialization.StreamingContext class that contains the source of the serialized stream associated with the new System.Net.FileWebResponse instance.

ContentLength

ToString

[C#] public override long ContentLength {get;}

[C++] public: _property virtual _int64 get_ContentLength( );

[VB] Overrides Public ReadOnly Property ContentLength As Long

[JScript] public function get ContentLength( ): long;

Description

Gets the length of the content in the file system resource.

The System.Net.FileWebResponse.ContentLength property contains the length, in bytes, of the file system resource.

ContentType

ToString

[C#] public override string ContentType {get;}

[C++] public: _property virtual String* get_ContentType( );

[VB] Overrides Public ReadOnly Property ContentType As String

[JScript] public function get ContentType( ): String;

Description

Gets the content type of the file system resource.

The System.Net.FileWebResponse.ContentType property contains the content type of the file system resource. The value of System.Net.FileWebResponse.ContentType is always "binary/octet-stream".

Headers

ToString

[C#] public override WebHeaderCollection Headers {get;}

[C++] public: _property virtual WebHeaderCollection* get_Headers( );

[VB] Overrides Public ReadOnly Property Headers As WebHeaderCollection

[JScript] public function get Headers( ): WebHeaderCollection;

Description

Gets a collection of header name/value pairs associated with the response.

The System.Net.FileWebResponse.Headers property contains two name/value pairs, one for content length and one for content type, both of which are also exposed as properties, System.Net.FileWebResponse.ContentLength and System.Net.FileWebResponse.ContentType.

ResponseUri

ToString

[C#] public override Uri ResponseUri {get;}

[C++] public: _property virtual Uri* get_ResponseUri( );

[VB] Overrides Public ReadOnly Property ResponseUri As Uri

[JScript] public function get ResponseUri( ): Uri;

Description

Gets the URI of the file system resource that provided the response.

The System.Net.FileWebResponse.ResponseUri property contains the URI of the file system resource that provided the response. This is always the file system resource that was requested.

Close

[C#] public override void Close( );

[C++] public: void Close( ); I[VB] Overrides Public Sub Close( )

[JScript] public override function Close( );

Description

Closes the response stream.

The System.Net.FileWebResponse.Close method cleans up the resources used by a System.Net.FileWebResponse and closes the response stream by calling the System.IO.Stream.Close method.

Dispose

[C#] protected virtual void Dispose(bool disposing);

[C++] protected: virtual void Dispose(bool disposing);

[VB] Overridable Protected Sub Dispose(ByVal disposing As Boolean)

[JScript] protected function Dispose(disposing: Boolean);

GetResponseStream

[C#] public override Stream GetResponseStream( );

[C++] public: Stream* GetResponseStream( );

[VB] Overrides Public Function GetResponseStream( ) As Stream

[JScript] public override function GetResponseStream( ): Stream;

Description

Returns the data stream from the file system resource.

Return Value: A System.IO.Stream for reading data from the file system resource.

The System.Net.FileWebResponse.GetResponseStream method returns the data stream from the file system resource.

IDisposable.Dispose

[C#] void IDisposable.Dispose( );

[C++] void IDisposable::Dispose( );

[VB] Sub Dispose( ) Implements IDisposable.Dispose

[JScript] function IDisposable.Dispose( ); ISerializable.GetObjectData

[C#] void ISerializable.GetObjectData(SerializationInfo SerializationInfo, StreamingContext streamingContext);

[C++] void ISerializable::GetObjectData(SerializationInfo* serializationInfo, StreamingContext streamingContext);

[VB] Sub GetObjectData(ByVal SerializationInfo As SerializationInfo, ByVal streamingcontext As StreamingContext) Implements ISerializable.GetObjectData

[JScript] function ISerializable.GetObjectData(SerializationInfo: SerializationInfo, streamingContext: StreamingContext);

GlobalProxySelection class (System.Net)

ToString

Description

Contains a global default proxy instance for all HTTP requests.

The System.Net.GlobalProxySelection stores the proxy settings for the default proxy that System.Net.WebRequest instances use to contact Internet sites beyond the local network. The default proxy setting is initialized from the global or application configuration file, and can be overridden for individual requests, or disabled by setting the System.Net.HttpWebRequest.Proxy property to the result of the System.Net.GlobalProxySelection.GetEmptyWebProxy method.

GlobalProxySelection

Example Syntax:

ToString

[C#] public GlobalProxySelection( );

[C++] public: GlobalProxySelection( );

[VB] Public Sub New( )

[JScript] public function GlobalProxySelection( );

Select

ToString

[C#] public static IWebProxy Select {get; set;}

[C++] public: _property static IWebProxy* get_Select( ); public: _property static void set_Select(IWebProxy*);

[VB] Public Shared Property Select As IWebProxy

[JScript] public static function get Select( ): IWebProxy;public static function set Select(IWebProxy);

Description

Gets or sets the global HTTP proxy.

The System.Net.GlobalProxySelection.Select method sets the proxy that all System.Net.HttpWebRequest instances use.

GetEmptyWebProxy

[C#] public static IWebProxy GetEmptyWebProxy( );

[C++] public: static IWebProxy* GetEmptyWebProxy( );

[VB] Public Shared Function GetEmptyWebProxy( ) As IWebProxy

[JScript] public static function GetEmptyWebProxy( ): IWebProxy;

Description

Returns an empty proxy instance.

Return Value: An System.Net.IWebProxy that contains no information.

The System.Net.GlobalProxySelection.GetEmptyWebProxy method returns a blank System.Net.IWebProxy instance to indicate that no proxy is used to access an Internet resource.

HttpContinueDelegate Delegate (System.Net)

ToString

Description

Represents the method that notifies callers when a continue response is received by the client. The numeric value of the HTTP status from the server. The headers returned with the 100-continue response from the server.

Use System.Net.HttpContinueDelegate to specify the callback method to be called when an HTTP 100-continue response is received from the server. When set, the delegate is called whenever protocol responses of type System.Net.HttpStatusCode.Continue are received.

HttpStatusCode enumeration (System.Net)

ToString

Description

Contains the values of status codes defined for HTTP.

The System.Net.HttpStatusCode enumeration contains the values of the status codes defined in RFC 2616 for HTTP 1.1.

ToString

[C#] public const HttpStatusCode Accepted;

[C++] public: const HttpStatusCode Accepted;

[VB] Public Const Accepted As HttpStatusCode

[JScript] public var Accepted: HttpStatusCode;

Description

Equivalent to HTTP status 202.

ToString

[C#] public const HttpStatusCode Ambiguous;
[C++] public: const HttpStatusCode Ambiguous;
[VB] Public Const Ambiguous As HttpStatusCode
[JScript] public var Ambiguous: HttpStatusCode;

Description

Equivalent to HTTP status 300.

ToString

[C#] public const HttpStatusCode BadGateway;
[C++] public: const HttpStatusCode BadGateway;
[VB] Public Const BadGateway As HttpStatusCode
[JScript] public var BadGateway: HttpStatusCode;

Description

Equivalent to HTTP status 502.

ToString

[C#] public const HttpStatusCode BadRequest;
[C++] public: const HttpStatusCode BadRequest;
[VB] Public Const BadRequest As HttpStatusCode
[JScript] public var BadRequest: HttpStatusCode;

Description

Equivalent to HTTP status 400.

ToString

[C#] public const HttpStatusCode Conflict;
[C++] public: const HttpStatusCode Conflict; I[VB] Public Const Conflict As HttpStatusCode
[JScript] public var Conflict: HttpStatusCode;

Description

Equivalent to HTTP status 409.

ToString

[C#] public const HttpStatusCode Continue;
[C++] public: const HttpStatusCode Continue;
[VB] Public Const Continue As HttpStatusCode
[JScript] public var Continue: HttpStatusCode;

Description

Equivalent to HTTP status 100.

ToString

[C#] public const HttpStatusCode Created;
[C++] public: const HttpStatusCode Created;
[VB] Public Const Created As HttpStatusCode
[JScript] public var Created: HttpStatusCode;

Description

Equivalent to HTTP status 201.

ToString

[C#] public const HttpStatusCode ExpectationFailed;
[C++] public: const HttpStatusCode ExpectationFailed;
[VB] Public Const ExpectationFailed As HttpStatusCode
[JScript] public var ExpectationFailed: HttpStatusCode;

Description

Equivalent to HTTP status 417.

ToString

[C#] public const HttpStatusCode Forbidden;
[C++] public: const HttpStatusCode Forbidden;
[VB] Public Const Forbidden As HttpStatusCode
[JScript] public var Forbidden: HttpStatusCode;

Description

Equivalent to HTTP status 403.

ToString

[C#] public const HttpStatusCode Found;
[C++] public: const HttpStatusCode Found;
[VB] Public Const Found As HttpStatusCode
[JScript] public var Found: HttpStatusCode;

Description

Equivalent to HTTP status 302.

ToString

[C#] public const HttpStatusCode GatewayTimeout;
[C++] public: const HttpStatusCode GatewayTimeout;
[VB] Public Const GatewayTimeout As HttpStatusCode
[JScript] public var GatewayTimeout: HttpStatusCode;

Description

Equivalent to HTTP status 504.

ToString

[C#] public const HttpStatusCode Gone;
[C++] public: const HttpStatusCode Gone;
[VB] Public Const Gone As HttpStatusCode
[JScript] public var Gone: HttpStatusCode;

Description

Equivalent to HTTP status 410.

ToString

[C#] public const HttpStatusCode HttpVersionNotSupported;
[C++] public: const HttpStatusCode HttpVersionNotSupported;
[VB] Public Const HttpVersionNotSupported As HttpStatusCode
[JScript] public var HttpVersionNotSupported: HttpStatusCode;

Description

Equivalent to HTTP status 505.

ToString

[C#] public const HttpStatusCode InternalServerError;
[C++] public: cofist HttpStatusCode InternalServerError;
[VB] Public Const InternalServerError As HttpStatusCode
[JScript] public var InternalServerError: HttpStatusCode;

Description

Equivalent to HTTP status 500.

ToString

[C#] public const HttpStatusCode LengthRequired;
[C++] public: const HttpStatusCode LengthRequired;
[VB] Public Const LengthRequired As HttpStatusCode
[JScript] public var LengthRequired: HttpStatusCode;

Description

Equivalent to HTTP status 411.

ToString

[C#] public const HttpStatusCode MethodNotAllowed;
[C++] public: const HttpStatusCode MethodNotAllowed;
[VB] Public Const MethodNotAllowed As HttpStatusCode
[JScript] public var MethodNotAllowed: HttpStatusCode;

Description

Equivalent to HTTP status 405.

ToString

[C#] public const HttpStatusCode Moved;
[C++] public: const HttpStatusCode Moved;
[VB] Public Const Moved As HttpStatusCode
[JScript] public var Moved: HttpStatusCode;

Description

Equivalent to HTTP status 301.

ToString

[C#] public const HttpStatusCode MovedPermanently;
[C++] public: const HttpStatusCode MovedPermanently;
[VB] Public Const MovedPermanently As HttpStatusCode
[JScript] public var MovedPermanently: HttpStatusCode;

Description
Equivalent to HTTP status 301.
ToString
[C#] public const HttpStatusCode MultipleChoices;
[C++] public: const HttpStatusCode MultipleChoices;
[VB] Public Const MultipleChoices As HttpStatusCode
[JScript] public var MultipleChoices: HttpStatusCode;

Description
Equivalent to HTTP status 300.
ToString
[C#] public const HttpStatusCode NoContent;
[C++] public: const HttpStatusCode NoContent;
[VB] Public Const NoContent As HttpStatusCode
[JScript] public var NoContent: HttpStatusCode;

Description
Equivalent to HTTP status 204.
ToString
[C#] public const HttpStatusCode NonAuthoritativeInformation;
[C++] public: const HttpStatusCode NonAuthoritativeInformation;
[VB] Public Const NonAuthoritativeInformation As HttpStatusCode
[JScript] public var NonAuthoritativeInformation: HttpStatusCode;

Description
Equivalent to HTTP status 203.
II ToString
[C#] public const HttpStatusCode NotAcceptable;
[C++] public: const HttpStatusCode NotAcceptable;
[VB] Public Const NotAcceptable As HttpStatusCode
[JScript] public var NotAcceptable: HttpStatusCode;

Description
Equivalent to HTTP status 406.
ToString
[C#] public const HttpStatusCode NotFound;
[C++] public: const HttpStatusCode NotFound;
[VB] Public Const NotFound As HttpStatusCode
[JScript] public var NotFound: HttpStatusCode;

Description
Equivalent to HTTP status 404.
ToString
[C#] public const HttpStatusCode NotImplemented;
[C++] public: const HttpStatusCode NotImplemented;
[VB] Public Const NotImplemented As HttpStatusCode
[JScript] public var NotImplemented: HttpStatusCode;

Description
Equivalent to HTTP status 501.
ToString
[C#] public const HttpStatusCode NotModified;
[C++] public: const HttpStatusCode NotModified;
[VB] Public Const NotModified As HttpStatusCode
[JScript] public var NotModified: HttpStatusCode;

Description
Equivalent to HTTP status 304.
ToString
[C#] public const HttpStatusCode OK;
[VB] Public Const OK As HttpStatusCode
[JScript] public var OK: HttpStatusCode;

Description
Equivalent to HTTP status 200.
ToString
[C#] public const HttpStatusCode PartialContent;
[C++] public: const HttpStatusCode PartialContent;
[VB] Public Const PartialContent As HttpStatusCode
[JScript] public var PartialContent: HttpStatusCode;

Description
Equivalent to HTTP status 206.
ToString
[C#] public const HttpStatusCode PaymentRequired;
[C++] public: const HttpStatusCode PaymentRequired;
[VB] Public Const PaymentRequired As HttpStatusCode
[JScript] public var PaymentRequired: HttpStatusCode;

Description
Equivalent to HTTP status 402.
ToString
[C#] public const HttpStatusCode PreconditionFailed;
[C++] public: const HttpStatusCode PreconditionFailed;
[VB] Public Const PreconditionFailed As HttpStatusCode
[JScript] public var PreconditionFailed: HttpStatusCode;

Description
Equivalent to HTTP status 412.
ToString
[C#] public const HttpStatusCode ProxyAuthenticationRequired;
[C++] public: const HttpStatusCode ProxyAuthenticationRequired;
[VB] Public Const ProxyAuthenticationRequired As HttpStatusCode
[JScript] public var ProxyAuthenticationRequired: HttpStatusCode;

Description
Equivalent to HTTP status 407.
ToString
[C#] public const HttpStatusCode Redirect;
[C++] public: const HttpStatusCode Redirect;
[VB] Public Const Redirect As HttpStatusCode
[JScript] public var Redirect: HttpStatusCode;

Description
Equivalent to HTTP status 302.
ToString
[C#] public const HttpStatusCode RedirectKeepVerb;
[C++] public: const HttpStatusCode RedirectKeepVerb;
[VB] Public Const RedirectKeepVerb As HttpStatusCode
[JScript] public var RedirectKeepVerb: HttpStatusCode;

Description
Equivalent to HTTP status 307.
ToString
[C#] public const HttpStatusCode RedirectMethod;
[C++] public: const HttpStatusCode RedirectMethod;
[VB] Public Const RedirectMethod As HttpStatusCode
[JScript] public var RedirectMethod: HttpStatusCode;

Description
Equivalent to HTTP status 303.
ToString
[C#] public const HttpStatusCode RequestedRangeNotSatisfiable;
[C++] public: const HttpStatusCode RequestedRangeNotSatisfiable;
[VB] Public Const RequestedRangeNotSatisfiable As HttpStatusCode
[JScript] public var RequestedRangeNotSatisfiable: HttpStatusCode;

Description
Equivalent to HTTP status 416.
ToString
[C#] public const HttpStatusCode RequestEntityTooLarge;
[C++] public: const HttpStatusCode RequestEntityTooLarge;

[VB] Public Const RequestEntityTooLarge As HttpStatusCode

[JScript] public var RequestEntityTooLarge: HttpStatusCode;

Description

Equivalent to HTTP status 413.

ToString

[C#] public const HttpStatusCode RequestTimeout;

[C++] public: const HttpStatusCode RequestTimeout;

[VB] Public Const RequestTimeout As HttpStatusCode

[JScript] public var RequestTimeout: HttpStatusCode;

Description

Equivalent to HTTP status 408.

ToString

[C#] public const HttpStatusCode RequestUriTooLong;

[C++] public: const HttpStatusCode RequestUriTooLong;

[VB] Public Const RequestUriTooLong As HttpStatusCode

[JScript] public var RequestUriTooLong: HttpStatusCode;

Description

Equivalent to HTTP status 414.

ToString

[C#] public const HttpStatusCode ResetContent;

[C++] public: const HttpStatusCode ResetContent;

[VB] Public Const ResetContent As HttpStatusCode

[JScript] public var ResetContent: HttpStatusCode;

Description

Equivalent to HTTP status 205.

ToString

[C#] public const HttpStatusCode SeeOther;

[C++] public: const HttpStatusCode SeeOther;

[VB] Public Const SeeOther As HttpStatusCode

[JScript] public var SeeOther: HttpStatusCode;

Description

Equivalent to HTTP status 303.

ToString

[C#] public const HttpStatusCode ServiceUnavailable;

[C++] public: const HttpStatusCode ServiceUnavailable;

[VB] Public Const ServiceUnavailable As HttpStatusCode

[JScript] public var ServiceUnavailable: HttpStatusCode;

Description

Equivalent to HTTP status 503.

ToString

[C#] public const HttpStatusCode SwitchingProtocols;

[C++] public: const HttpStatusCode SwitchingProtocols;

[VB] Public Const SwitchingProtocols As HttpStatusCode

[JScript] public var SwitchingProtocols: HttpStatusCode;

Description

Equivalent to HTTP status 101.

ToString

[C#] public const HttpStatusCode TemporaryRedirect;

[C++] public: const HttpStatusCode TemporaryRedirect;

[VB] Public Const TemporaryRedirect As HttpStatusCode

[JScript] public var TemporaryRedirect: HttpStatusCode;

Description

Equivalent to HTTP status 307.

ToString

[C#] public const HttpStatusCode Unauthorized;

[C++] public: const HttpStatusCode Unauthorized;

[VB] Public Const Unauthorized As HttpStatusCode

[JScript] public var Unauthorized: HttpStatusCode;

Description

Equivalent to HTTP status 401.

ToString

[C#] public const HttpStatusCode UnsupportedMediaType;

[C++] public: const HttpStatusCode UnsupportedMediaType;

[VB] Public Const UnsupportedMediaType As HttpStatusCode

[JScript] public var UnsupportedMediaType: HttpStatusCode;

Description

Equivalent to HTTP status 415.

ToString

[C#] public const HttpStatusCode Unused;

[C++] public: const HttpStatusCode Unused;

[VB] Public Const Unused As HttpStatusCode

[JScript] public var Unused: HttpStatusCode;

Description

Equivalent to HTTP status 306.

ToString

[C#] public const HttpStatusCode UseProxy;

[C++] public: const HttpStatusCode UseProxy;

[VB] Public Const UseProxy As HttpStatusCode

[JScript] public var UseProxy: HttpStatusCode;

Description

Equivalent to HTTP status 305.

HttpVersion class (System.Net)

ToString

Description

Defines the HTTP version numbers supported by the System.Net.HttpWebRequest and System.Net.HttpWebResponse classes.

The System.Net.HttpVersion class defines the HTTP versions supported by the System.Net.HttpWebRequest and System.Net.HttpWebResponse classes. The HTTP version number is used to control version-specific features of HTTP, such as pipelining and chunking.

ToString

[C#] public static readonly Version Version10;

[C++] public: static Version* Version10;

[VB] Public Shared ReadOnly Version10 As Version

[JScript] public static var Version10: Version;

Description

Defines a System.Version instance for HTTP 1.0.

ToString

[C#] public static readonly Version Version1.1;

[C++] public: static Version* Version11;

[VB] Public Shared ReadOnly Version11 As Version

[JScript] public static var Version11: Version;

Description

Defines a System.Version instance for HTTP 1.1.

HttpVersion

Example Syntax:

ToString

[C#] public HttpVersion( );

[C++] public: HttpVersion( );

[VB] Public Sub New( )

[JScript] public function HttpVersion( );

HttpWebRequest class (System.Net)

ToString

Description

Provides an HTTP-specific implementation of the System.Net.WebRequest class.

The System.Net.HttpWebRequest class provides support for the properties and methods defined in System.Net.WebRequest and for additional properties and methods that enable the user to interact directly with servers using HTTP.

HttpWebRequest

Example Syntax:

ToString

[C#] protected HttpWebRequest(SerializationInfo SerializationInfo, StreamingContext streamingContext);

[C++] protected: HttpWebRequest(SerializationInfo* SerializationInfo, StreamingContext streamingContext);

[VB] Protected Sub New(ByVal SerializationInfo As SerializationInfo, ByVal streamingContext As StreamingContext)

[JScript] protected function HttpWebRequest(SerializationInfo: SerializationInfo, streamingContext: StreamingContext);

Description

Initializes a new instance of the System.Net.HttpWebRequest class from the specified instances of the System.Runtime.Serialization.SerializationInfo and System.Runtime.Serialization.StreamingContext classes.

This constructor implements the System.Runtime.Serialization.ISerializable interface for the System.Net.Http WebRequest class. A System.Runtime.Serialization.SerializationInfo instance containing the information required to serialize the new System.Net.HttpWebRequest instance. A System.Runtime.Serialization.StreamingContext instance containing the source and destination of the serialized stream associated with the new System.Net.HttpWebRequest instance.

Accept

ToString

[C#] public string Accept {get; set;}

[C++] public: _property String* get_Accept( );public: _property void set_Accept(String*);

[VB] Public Property Accept As String

[JScript] public function get Accept ( ): String;public function set Accept(String);

Description

Gets or sets the value of the Accept HTTP header.

Address

ToString

[C#] public Uri Address {get;}

[C++] public: _property Uri* get_Address( );

[VB] Public ReadOnly Property Address As Uri

[JScript] public function get Address( ): Uri;

Description

Gets the URI of the Internet resource that actually responds to the request. The System.Net.HttpWebRequest.Address property is set to the URI that actually responds to a request, after any redirections that might happen during the request are complete.

AllowAutoRedirect

ToString

[C#] public bool AllowAutoRedirect {get; set;}

[C++] public: _property bool get_AllowAutoRedirect( );public: _property void set_AllowAutoRedirect(bool);

[VB] Public Property AllowAutoRedirect As Boolean

[JScript] public function get AllowAutoRedirect( ): Boolean; public function set AllowAutoRedirect(Boolean);

Description

Gets or sets a value that indicates whether the request should follow redirection responses.

Set System.Net.HttpWebRequest.AllowAutoRedirect to true if you want the request to automatically follow HTTP redirection headers to the new location of the resource. The maximum number of redirections to follow is set by the System.Net.HttpWebRequest.MaximumAutomaticRedirections property.

AllowWriteStreamBuffering

ToString

[C#] public bool AllowWriteStreamBuffering {get; set;}

[C++] public: _property bool get_AllowWriteStreamBuffering( );public: _property void set_AllowWriteStreamBuffering(bool);

[VB] Public Property AllowWriteStreamBuffering As Boolean

[JScript] public function get AllowWriteStreamBuffering( ): Boolean;public function set AllowWriteStreamBuffering (Boolean);

Description

Gets or sets a value that indicates whether to buffer the data sent to the Internet resource.

When System.Net.HttpWebRequest.AllowWriteStreamBuffering is true, the data is buffered in memory so it is ready to be resent in the event of redirections or authentication requests.

ClientCertificates

ToString

[C#] public X509CertificateCollection ClientCertificates {get;}

[C++] public: _property X509CertificateCollection* get_ClientCertificates( );

[VB] Public ReadOnly Property ClientCertificates As X509CertificateCollection

[JScript] public function get ClientCertificates( ): X509CertificateCollection;

Description

Gets the collection of security certificates associated with this request.

Connection

ToString

[C#] public string Connection {get; set;}

[C++] public: _property String* get_Connection( ); public: _property void set_Connection(String*);

[VB] Public Property Connection As String

[JScript] public function get Connection( ): String;public function set Connection(String);

Description

Gets or sets the value of the Connection HTTP header.

The request sends the System.Net.HttpWebRequest.Connection property to the Internet resource as the Connection HTTP header. If System.Net.HttpWebRequest.KeepAlive is true, the value "Keep-alive" is appended to the end of the Connection header.

ConnectionGroupName

ToString

[C#] public override string ConnectionGroupName {get; set;}

[C++] public: _property virtual String* get_ConnectionGroupName( );public: _property virtual void set_ConnectionGroupName(String*);

[VB] Overrides Public Property ConnectionGroupName As String

[JScript] public function get ConnectionGroupName( ): String;public function set ConnectionGroupName (String);

Description

Gets or sets the name of the connection group for the request.

The System.Net.HttpWebRequest.ConnectionGroupName property enables you to associate a request with a connection group. This is useful when your application makes requests to one server for different users, such as a Web site that retrieves customer information from a database server.

ContentLength

ToString

[C#] public override long ContentLength {get; set;}

[C++] public: _property virtual _int64 get_ContentLength( );public: _property virtual void set_ContentLength(_int64);

[VB] Overrides Public Property ContentLength As Long

[JScript] public function get ContentLength( ): long;public function set ContentLength(long);

Description

The System.Net.HttpWebRequest.ContentLength property contains the value to send as the Content-length HTTP header with the request.

ContentType

ToString

[C#] public override string ContentType {get; set;}

[C++] public: _property virtual String* get_ContentType( );public: _property virtual void set_ContentType (String*);

[VB] Overrides Public Property ContentType As String

[JScript] public function get ContentType( ): String;public function set ContentType(String);

Description

Gets or sets the value of the Content-type HTTP header.

The System.Net.HttpWebRequest.ContentType property contains the media type of the request. Values assigned to the System.Net.HttpWebRequest.ContentType property replace any existing contents when the request sends the Content-type HTTP header.

ContinueDelegate

ToString

[C#] public HttpContinueDelegate ContinueDelegate {get; set;}

[C++] public: _property HttpContinueDelegate* get_ContinueDelegate( );public: _property void set_ContinueDelegate(HttpContinueDelegate*);

[VB] Public Property ContinueDelegate As HttpContinueDelegate

[JScript] public function get ContinueDelegate( ): HttpContinueDelegate;public function set ContinueDelegate(HttpContinueDelegate);

Description

Gets or sets the delegate method called when an HTTP 100-continue response is received from the Internet resource.

The System.Net.HttpWebRequest.ContinueDelegate property specifies the callback method to call when the client receives a 100-Continue response.

CookieContainer

ToString

[C#] public CookieContainer CookieContainer {get; set;}

[C++] public: _property CookieContainer* get_CookieContainer( );public: _property void set_CookieContainer (CookieContainer*);

[VB] Public Property CookieContainer As CookieContainer

[JScript] public function get CookieContainer( ): CookieContainer;public function set CookieContainer(CookieContainer);

Description

Gets or sets the cookies associated with the request.

The System.Net.HttpWebRequest.CookieContainer property provides an instance of the System.Net.CookieContainer class that contains the cookies associated with this request.

Credentials

ToString

[C#] public override ICredentials Credentials {get; set;}

[C++] public: _property virtual ICredentials* get_Credentials( );public: _property virtual void set_Credentials(ICredentials*);

[VB] Overrides Public Property Credentials As ICredentials

[JScript] public function get Credentials( ): ICredentials;public function set Credentials(ICredentials);

Description

Provides authentication information for the request.

The System.Net.HttpWebRequest.Credentials property contains authentication information to identify the maker of the request. The System.Net.HttpWebRequest.Credentials property can be either an instance of System.Net.NetworkCredential, in which case the user, password, and domain information contained in the System.Net.NetworkCredential instance is used to authenticate the request, or it can be an instance of System.Net.CredentialCache, in which case the uniform resource identifier (URI) of the request is used to determine the user, password, and domain information to use to authenticate the request.

Expect

ToString

[C#] public string Expect {get; set;}

[C++] public: _property String* get_Expect( );public: _property void set_Expect(String*);

[VB] Public Property Expect As String

[JScript] public function get Expect( ): String;public function set Expect(String);

Description

Gets or sets the value of the Expect HTTP header.

By default, System.Net.HttpWebRequest.Expect is set to "100-continue". You can add other values to the list that System.Net.HttpWebRequest.Expect maintains, or you can delete all values except "100-continue" from the list by setting System.Net.HttpWebRequest.Expect to null.

HaveResponse

ToString

[C#] public bool HaveResponse {get;}

[C++] public: _property bool get_HaveResponse( );

[VB] Public ReadOnly Property HaveResponse As Boolean

[JScript] public function get HaveResponse( ): Boolean;

Description

Gets a value indicating whether a response has been received from an Internet resource.

Headers

ToString

[C#] public override WebHeaderCollection Headers {get; set;}

[C++] public: _property virtual WebHeaderCollection* get_Headers( );public: _property virtual void set_Headers (WebHeaderCollection*);

[VB] Overrides Public Property Headers As WebHeaderCollection

[JScript] public function get Headers( ): WebHeaderCollection;public function set Headers(WebHeaderCollection);

Description

Gets a collection of the name/value pairs that make up the HTTP headers.

The System.Net.HttpWebRequest.Headers collection contains the protocol headers associated with the request. The following table lists the HTTP headers that are not stored in the System.Net.HttpWebRequest.Headers collection but are either set by the system or set by properties or methods.

IfModifiedSince

ToString

[C#] public DateTime IfModifiedSince {get; set;}

[C++] public: _property DateTime get_IfModifiedSince( );public: _property void set_IfModifiedSince(DateTime);

[VB] Public Property IfModifiedSince As DateTime

[JScript] public function get IfModifiedSince( ): DateTime; public function set IfModifiedSince(DateTime);

Description

Gets or sets the value of the If-Modified-Since HTTP header.

KeepAlive

ToString

[C#] public bool KeepAlive {get; set;}

[C++] public: _property bool get_KeepAlive( ); public: _property void set_KeepAlive(bool);

[VB] Public Property KeepAlive As Boolean

[JScript] public function get KeepAlive( ): Boolean;public function set KeepAlive(Boolean);

Description

Gets or sets a value indicating whether to make a persistent connection to the Internet resource.

Set this property to true to send an Connection HTTP header with the value Keep-alive. An application uses System.Net.HttpWebRequest.KeepAlive to indicate a preference for persistent connections. When the System.Net.HttpWebRequest.KeepAlive property is true, the application makes persistent connections to the servers that support them.

MaximumAutomaticRedirections

ToString

[C#] public int MaximumAutomaticRedirections {get; set;}

[C++] public: _property int get_MaximumAutomaticRedirections( );public: _property void set_MaximumAutomaticRedirections(int);

[VB] Public Property MaximumAutomaticRedirections As Integer

[JScript] public function get MaximumAutomaticRedirections( ): int;public function set MaximumAutomaticRedirections(int);

Description

Gets or sets the maximum number of redirects that the request will follow.

The System.Net.HttpWebRequest.MaximumAutomaticRedirections method property sets the maximum number of redirections for the request to follow if the System.Net.HttpWebRequest.AllowAutoRedirect property is true MediaType ToString

[C#] public string MediaType {get; set;}

[C++] public: _property String* get_MediaType( ); public: _property void set_MediaType(String*);

[VB] Public Property MediaType As String

[JScript] public function get MediaType( ): String;public function set MediaType(String);

Description

Gets or sets the media type of the request.

The value of the System.Net.HttpWebRequest.MediaType property affects the System.Net.HttpWebResponse.CharacterSet property. When you set the System.Net.HttpWebRequest.MediaType in the request, the corresponding media type is chosen from the list of character sets returned in the response Content-type HTTP header.

Method

ToString

[C#] public override string Method {get; set;}

[C++] public: _property virtual String* get_Method( );public: _property virtual void set_Method(String*);

[VB] Overrides Public Property Method As String

[JScript] public function get Method( ): String;public function set Method(String);

Description

Gets or sets the method for the request.

The System.Net.HttpWebRequest.Method property can be set to any of the HTTP 1.1 protocol verbs: GET, HEAD, POST, PUT, DELETE, TRACE, or OPTIONS.

Pipelined

ToString

[C#] public bool Pipelined {get; set;}

[C++] public: _property bool get_Pipelined( );public: _property void set_Pipelined(bool);

[VB] Public Property Pipelined As Boolean

[JScript] public function get Pipelined( ): Boolean;public function set Pipelined(Boolean);

Description

Gets or sets a value indicating whether to pipeline the request to the Internet resource.

An application uses the System.Net.HttpWebRequest.Pipelined property to indicate a preference for pipelined connections. When System.Net.HttpWebRequest.Pipelined is true, an application makes pipelined connections to the servers that support them.

PreAuthenticate

ToString

[C#] public override bool PreAuthenticate {get; set;}

[C++] public: _property virtual bool get_PreAuthenticate( ); public: _property virtual void set_PreAuthenticate(bool);

[VB] Overrides Public Property PreAuthenticate As Boolean

[JScript] public function get PreAuthenticate( ): Boolean; public function set PreAuthenticate(Boolean);

Description

Gets or sets a value indicating whether to send a preauthentication header with the request.

When System.Net.HttpWebRequest.PreAuthenticate is true and credentials are supplied, the WWW-authenticate HTTP header is sent with the initial request if its value is known; otherwise the request uses standard authentication procedures.

ProtocolVersion

ToString

[C#] public Version ProtocolVersion {get; set;}

[C++] public: _property Version* get_ProtocolVersion( ); public: _property void set_ProtocolVersion(Version*);

[VB] Public Property ProtocolVersion As Version

[JScript] public function get ProtocolVersion( ): Version;public function set ProtocolVersion(Version);

Description

Gets or sets the version of HTTP to use for the request.

The System.Net.HttpWebRequest class supports only versions 1.0 and 1.1 of HTTP. Setting System.Net.HttpWebRequest.ProtocolVersion to a different version throws an exception.

Proxy

ToString

[C#] public override IWebProxy Proxy {get; set;}

[C++] public: _property virtual IWebProxy* get_Proxy( ); public: _property virtual void set_Proxy(IWebProxy*);

[VB] Overrides Public Property Proxy As IWebProxy

[JScript] public function get Proxy( ): IWebProxy;public function set Proxy(IWebProxy);

Description

Gets or sets proxy information for the request.

The System.Net.HttpWebRequest.Proxy property identifies the System.Net.WebProxy instance to use to process requests to Internet resources. To specify that no proxy should be used, set the System.Net.HttpWebRequest.Proxy property to the proxy instance returned by the System.Net.GlobalProxySelection.GetEmptyWebProxy method.

Referer

ToString

[C#] public string Referer {get; set;}

[C++] public: _property String* get_Referer( ); public: _property void set_Referer(String*);

[VB] Public Property Referer As String

[JScript] public function get Referer( ): String;public function set Referer(String);

Description

Gets or sets the value of the Referer HTTP header.

If the System.Net.HttpWebRequest.AllowAutoRedirect property is true, the System.Net.HttpWebRequest.Referer property is set automatically when the request is redirected to another site.

RequestUri

ToString

[C#] public override Uri RequestUri {get;}

[C++] public: _property virtual Uri* get_RequestUri( );

[VB] Overrides Public ReadOnly Property RequestUri As Uri

[JScript] public function get RequestUri( ): Uri;

Description

Gets the original URI of the request.

The System.Uri instance passed to System.Net.Http WebRequest by the call to System.Net.WebRequest.Create (System.Uri,System.Boolean).

SendChunked

ToString

[C#] public bool SendChunked {get; set;}

[C++] public: _property bool get_SendChunked( ); public: _property void set_SendChunked(bool);

[VB] Public Property SendChunked As Boolean

[JScript] public function get SendChunked( ): Boolean;public function set SendChunked(Boolean);

Description

Gets or sets a value indicating whether to send data in segments to the Internet resource.

When System.Net.HttpWebRequest.SendChunked is true, the request sends data to the Internet resource in segments. The Internet resource must support receiving chunked data.

ServicePoint

ToString

[C#] public ServicePoint ServicePoint {get;}

[C++] public: _property ServicePoint* get_ServicePoint( );

[VB] Public ReadOnly Property ServicePoint As ServicePoint

[JScript] public function get ServicePoint( ): ServicePoint;

Description

Gets the service point to use for the request.

The value of the System.Net.HttpWebRequest.ServicePoint property is null until the System.Net.HttpWebRequest.GetResponse method is called.

Timeout

ToString

[C#] public override int Timeout {get; set;}

[C++] public: _property virtual int get_Timeout( ); public: _property virtual void set_Timeout(int);

[VB] Overrides Public Property Timeout As Integer

[JScript] public function get Timeout( ): int;public function set Timeout(int);

Description

Gets or sets the timeout value for a request.

System.Net.HttpWebRequest.Timeout is the number of milliseconds that a synchronous request made with the System.Net.HttpWebRequest.GetResponse method waits for a response. If a resource does not respond within the time-out period, the request throws a System.Net.WebException with the System.Net.WebException.Status property set to System.Net.WebExceptionStatus.Timeout.

TransferEncoding

ToString

[C#] public string TransferEncoding {get; set;}

[C++] public: _property String* get_TransferEncoding( ); public: _property void set_TransferEncoding(String*);

[VB] Public Property TransferEncoding As String

[JScript] public function get TransferEncoding( ): String; public function set TransferEncoding(String);

Description

Gets or sets the value of the Transfer-encoding HTTP header.

Before you can set the System.Net.HttpWebRequest.TransferEncoding property, you must first set the System.Net.HttpWebRequest.SendChunked property to true. Clearing System.Net.HttpWebRequest.TransferEncoding by setting it to null has no effect on the value of System.Net.HttpWebRequest.SendChunked.

UserAgent

ToString

[C#] public string UserAgent {get; set;}

[C++] public: _property String* get_UserAgent( ); public: _property void set_UserAgent(String*);

[VB] Public Property UserAgent As String

[JScript] public function get UserAgent( ): String;public function set UserAgent(String);

Description

Gets or sets the value of the User-agent HTTP header.

Abort

[C#] public override void Abort( );

[C++] public: void Abort( );

[VB] Overrides Public Sub Abort( )

[JScript] public override function Abort( );

Description

Cancels a request to an Internet resource. System.Net.HttpWebRequest.Abort cancels a request to a resource. After a request is canceled, calling System.Net.HttpWeb Request.GetResponse, System.Net.HttpwebRequest.BeginGetResponse(System.AsyncCallback,System.Object), System.Net.HttpwebRequest.EndGetResponse(System.IAsyncResult), System.Net.HttpWebRequest.GetRequestStream, System.Net.HttpwebRequest.BeginGetRequestStream(System.AsyncCallback, System.Object), or will cause a System.Net.WebException with System.Net.WebException.Status set to System.Net.WebExceptionStatus.RequestCanceled.

AddRange

[C#] public void AddRange(int range);

[C++] public: void AddRange(int range);

[VB] Public Sub AddRange(ByVal range As Integer)

[JScript] public function AddRange(range: int);

Description

Adds a byte range header to a request for a specific range from the beginning or end of the requested data.

System.Net.HttpWebRequest.AddRange(System.Int32, System.Int32) adds a byte range header to the request. The starting or ending point of the range.

AddRange

[C#] public void AddRange(int from, int to);

[C++] public: void AddRange(int from, int to);

[VB] Public Sub AddRange(ByVal from As Integer, ByVal to As Integer)

[JScript] public function AddRange(from: int, to: int); Adds a range header to the request.

Description

Adds a byte range header to the request for a specified range.

System.Net.HttpWebRequest.AddRange(System.Int32, System.Int32) adds a byte range header to the request. The position at which to start sending data. The position at which to stop sending data.

AddRange

[C#] public void AddRange(string rangeSpecifier, int range);

[C++] public: void AddRange(String* rangeSpecifier, int range);

[VB] Public Sub AddRange(ByVal rangeSpecifier As String, ByVal range As Integer)

[JScript] public function AddRange(rangeSpecifier: String, range: int);

Description

Adds a range header to a request for a specific range from the beginning or end of the requested data.

If range is positive, the range is from the start of the data to range. The description of the range. The starting or ending point of the range.

AddRange

[C#] public void AddRange(string rangeSpecifier, int from, int to);

[C++] public: void AddRange(String* rangeSpecifier, int from, int to);

[VB] Public Sub AddRange(ByVal rangeSpecifier As String, ByVal from As Integer, ByVal to As Integer)

[JScript] public function AddRange(rangeSpecifier: String, from: int, to: int);

Description

Adds a range header to a request for a specified range. The description of the range. The position at which to start sending data. The position at which to stop sending data.

BeginGetRequestStream

[C#] public override IAsyncResult BeginGetRequestStream (AsyncCallback callback, object state);

[C++] public: IAsyncResult* BeginGetRequestStream (AsyncCallback* callback, Object* state);

[VB] Overrides Public Function BeginGetRequestStream (ByVal callback As AsyncCallback, ByVal state As Object) As IAsyncResult

[JScript] public override function BeginGetRequestStream (callback: AsyncCallback, state: Object): IAsyncResult;

Description

Begins an asynchronous request for a System.IO.Stream instance to use to write data.

Return Value: An System.IAsyncResult that references the asynchronous request.

The System.Net.HttpwebRequest.BeginGetRequestStream(System.AsyncCallback, System.Object) method starts an asynchronous request for a stream used to send data for the System.Net.HttpWebRequest. The asynchronous callback method uses the System.Net.HttpWebRequest.EndGetRequestStream(System.IAsyncResult) method to return the actual stream. The System.AsyncCallback delegate. The state object for this request.

BeginGetResponse

[C#] public override IAsyncResult BeginGetResponse (AsyncCallback callback, object state);

[C++] public: IAsyncResult* BeginGetResponse(AsyncCallback* callback, Object* state);

[VB] Overrides Public Function BeginGetResponse(ByVal callback As AsyncCallback, ByVal state As Object) As IAsyncResult

[JScript] public override function BeginGetResponse(callback: AsyncCallback, state: Object): IAsyncResult;

Description

Begins an asynchronous request to an Internet resource.

Return Value: An System.IAsyncResult that references the asynchronous request for a response.

The System.Net.HttpWebRequest.BeginGetResponse (System.AsyncCallback,System. Object) method starts an asynchronous request for a response from the Internet resource. The asynchronous callback method uses the System.Net.HttpWebRequest.EndGetResponse(System.IAsyncResult) method to return the actual System.Net.WebResponse. The System.AsyncCallback delegate The state object for this request.

EndGetRequestStream

[C#] public override Stream EndGetRequestStream(IAsyncResult asyncResult);

[C++] public: Stream* EndGetRequestStream(IAsyncResult* asyncResult);

[VB] Overrides Public Function EndGetRequestStream(ByVal asyncResult As IAsyncResult) As Stream

[JScript] public override function EndGetRequestStream (asyncResult: IAsyncResult): Stream;

Description

Ends an asynchronous request for a System.IO.Stream instance to use to write data.

Return Value: A System.IO.Stream to use to write request data.

The System.Net.HttpWebRequest.EndGetRequestStream (System.IAsyncResult) method completes an asynchronous request for a stream that was started by the System.Net.HttpWebRequest.BeginGetRequestStream(System.AsyncCallback, System.Object) method. Once the System.IO.Stream instance has been returned, you can send data with the System.Net.HttpWebRequest by using the System.IO.Stream.Write(System.Byte[ ],System.Int32,System.Int32) method. The pending request for a stream.

EndGetResponse

[C#] public override WebResponse EndGetResponse(IAsyncResult asyncResult);

[C++] public: WebResponse* EndGetResponse(IAsyncResult* asyncResult);

[VB] Overrides Public Function EndGetResponse(ByVal asyncResult As IAsyncResult) As WebResponse

[JScript] public override function EndGetResponse(asyncResult: IAsyncResult): WebResponse;

Description

Ends an asynchronous request to an Internet resource.

Return Value: A System.Net.WebResponse containing the response from the Internet resource.

The System.Net.HttpWebRequest.EndGetResponse(System.IAsyncResult) method completes an asynchronous request for an Internet resource that was started by calling System.Net.HttpwebRequest.BeginGetResponse(System. AsyncCallback,System. Object). The pending request for a response.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Gets the hash code for this System.Net.HttpWebRequest.

Return Value: The hash code for the System.Net.HttpWebRequest.

The hash codes for System.Net.HttpWebRequest A and B are guaranteed to be the same when A.Equals(B) is true.

GetRequestStream

[C#] public override Stream GetRequestStream( );

[C++] public: Stream* GetRequestStream( );

[VB] Overrides Public Function GetRequestStream( ) As Stream

[JScript] public override function GetRequestStream( ): Stream;

Description

Gets a System.IO.Stream instance to use to write request data.

Return Value: A System.IO.Stream to use to write request data.

The System.Net.HttpWebRequest.GetRequestStream method returns a stream to use to send data for the System. Net.HttpWebRequest. Once the System.IO.Stream instance has been returned, you can send data with the System.Net. HttpWebRequest by using the System.IO.Stream.Write(System.Byte[ ],System.Int32,System.Int32) method.

GetResponse

[C#] public override WebResponse GetResponse( );

[C++] public: WebResponse* GetResponse( );

[VB] Overrides Public Function GetResponse( ) As WebResponse

[JScript] public override function GetResponse( ): WebResponse;

Description

Returns a response from an Internet resource.

Return Value: A System.Net.WebResponse containing the response from the Internet resource.

The System.Net.HttpWebRequest.GetResponse method returns a System.Net.WebResponse instance containing the response from the Internet resource. The actual instance returned is an instance of System.Net.HttpWebResponse, and can be typecast to that class to access HTTP-specific properties.

SetServicePoint

[C#] protected void SetServicePoint(ServicePoint servicePoint);

[C++] protected: void SetServicePoint(ServicePoint* servicePoint);

[VB] Protected Sub SetServicePoint(ByVal servicePoint As ServicePoint)

[JScript] protected function SetServicePoint(servicePoint: ServicePoint);

ISerializable.GetObjectData

[C#] void ISerializable.GetObjectData(SerializationInfo SerializationInfo, StreamingContext streamingContext);

[C++] void ISerializable::GetObjectData(SerializationInfo* SerializationInfo, StreamingContext streamingContext);

[VB] Sub GetObjectData(ByVal SerializationInfo As SerializationInfo, ByVal streamingcontext As StreamingContext) Implements ISerializable.GetObjectData

[JScript] function ISerializable.GetObjectData(SerializationInfo: SerializationInfo, streamingcontext: StreamingContext);

HttpWebResponse class (System.Net)

ToString

Description

Provides an HTTP-specific implementation of the System. Net.WebResponse class.

The System.Net.HttpWebResponse class contains support for the properties and methods included in System.Net.WebResponse with additional elements that enable the user to interact directly with the HTTP protocol.

HttpWebResponse

Example Syntax:

ToString

[C#] protected HttpWebResponse(SerializationInfo SerializationInfo, StreamingContext streamingContext);

[C++] protected: HttpWebResponse(SerializationInfo* SerializationInfo, StreamingContext streamingContext);

[VB] Protected Sub New(ByVal SerializationInfo As SerializationInfo, ByVal streamingcontext As StreamingContext)

[JScript] protected function HttpWebResponse(SerializationInfo SerializationInfo, streamingcontext: StreamingContext);

Description

Initializes a new instance of the System.Net.HttpWebResponse class from the specified System.Runtime.Serialization.SerializationInfo and System.Runtime.Serialization. StreamingContext instances.

This constructor implements the System.Runtime.Serialization.ISerializable interface for the System.Net.HttpWebRequest class. A System.Runtime.Serialization.SerializationInfo containing the information required to serialize the new System.Net.HttpWebRequest instance. A System.Runtime. Serialization.StreamingContext containing the source of the serialized stream associated with the new System.Net.HttpWebRequest instance.

CharacterSet

ToString

[C#] public string CharacterSet {get;}

[C++] public: _property String* get_CharacterSet( );

[VB] Public ReadOnly Property CharacterSet As String

[JScript] public function get CharacterSet( ): String;

Description

ContentEncoding

ToString

[C#] public string ContentEncoding {get;}

[C++] public: _property String* get_ContentEncoding( );

[VB] Public ReadOnly Property ContentEncoding As String
[JScript] public function get ContentEncoding( ): String;

Description

Gets the method used to encode the body of the response.

The System.Net.HttpWebResponse.ContentEncoding property contains the value of the Content-Encoding header returned with the response.

ContentLength

ToString

[C#] public override long ContentLength {get;}
[C++] public: _property virtual _int64 get_ContentLength( );
[VB] Overrides Public ReadOnly Property ContentLength As Long
[JScript] public function get ContentLength( ): long;

Description

Gets the length of the content returned by the request.

The System.Net.HttpWebResponse.ContentLength property contains the value of the Content-length header returned with the response. If the Content-length header is not set in the response, System.Net.HttpWebResponse.ContentLength is set to the value−1.

ContentType

ToString

[C#] public override string ContentType {get;}
[C++] public: _property virtual String* get_ContentType( );
[VB] Overrides Public ReadOnly Property ContentType As String
[JScript] public function get ContentType( ): String;

Description

Gets the content type of the response.

The System.Net.HttpWebResponse.ContentType property contains the value of the Content-Type header returned with the response.

Cookies

ToString

[C#] public CookieCollection Cookies {get; set;}
[C++] public: _property CookieCollection* get_Cookies( ); public: _property void set_Cookies(CookieCollection*);
[VB] Public Property Cookies As CookieCollection
[JScript] public function get Cookies( ): CookieCollection; public function set Cookies(CookieCollection);

Description

Gets or sets the cookies associated with this request.

The System.Net.HttpWebResponse.Cookies property provides an instance of the System.Net.CookieCollection class holding the cookies associated with this response.

Headers

ToString

[C#] public override WebHeaderCollection Headers {get;}
[C++] public: _property virtual WebHeaderCollection* get_Headers( );
[VB] Overrides Public ReadOnly Property Headers As WebHeaderCollection
[JScript] public function get Headers( ): WebHeaderCollection;

Description

Gets the headers associated with this response from the server.

The System.Net.HttpWebResponse.Headers property is a collection of name/value pairs containing the HTTP header values returned with the response. Common headers, listed in the following table, are exposed as properties by the API: Header Property Content-Encoding System.Net.HttpWebResponse.ContentEncoding Content-Length System.Net.HttpWebResponse.ContentLength Content-Type System.Net.HttpWebResponse.ContentType Last-Modified System.Net.HttpWebResponse.LastModified Server System.Net.HttpWebResponse.Server Gets the headers associated with this response from the server.

LastModified

ToString

[C#] public DateTime LastModified {get;}
[C++] public: _property DateTime get_LastModified( );
[VB] Public ReadOnly Property LastModified As DateTime
[JScript] public function get LastModified( ): DateTime;

Description

Gets the last date and time that the contents of the response were modified.

The System.Net.HttpWebResponse.LastModified property contains the value of the Last-Modified header received with the response.

Method

ToString

[C#] public string Method {get;}
[C++] public: _property String* get_Method( );
[VB] Public ReadOnly Property Method As String
[JScript] public function get Method( ): String;

Description

Gets the method used to return the response.

ProtocolVersion

ToString

[C#] public Version ProtocolVersion {get;}
[C++] public: _property Version* get_ProtocolVersion( );
[VB] Public ReadOnly Property ProtocolVersion As Version
[JScript] public function get ProtocolVersion( ): Version;

Description

Gets the version of the HTTP protocol used in the response.

The System.Net.HttpWebResponse.ProtocolVersion property contains the HTTP protocol version number of the response sent by the Internet resource.

ResponseUri

ToString

[C#] public override Uri ResponseUri {get;}
[C++] public: _property virtual Uri* get_ResponseUri( );
[VB] Overrides Public ReadOnly Property ResponseUri As Uri
[JScript] public function get ResponseUri( ): Uri;

Description

Gets the uniform resource identifier (URI) of the Internet resource that responded to the request A System.Uri instance containing the URI of the Internet resource that responded to the request.

The System.Net.HttpWebResponse.ResponseUri property contains the URI of the Internet resource that actually responded to the request. This URI may not be the same as the originally requested URI if the request was redirected by the original server.

Server

ToString

[C#] public string Server {get;}
[C++] public: _property String* get_Server( );
[VB] Public ReadOnly Property Server As String
[JScript] public function get Server( ): String;

Description

Gets the name of the server that sent the response.

The System.Net.HttpWebResponse.Server property contains the value of the Server header returned with the response.

StatusCode

ToString

[C#] public HttpStatusCode StatusCode {get;}
[C++] public: _property HttpStatusCode get_StatusCode( );

[VB] Public ReadOnly Property StatusCode As HttpStatusCode
[JScript] public function get StatusCode( ): HttpStatusCode;

Description

Gets the status of the response.

The System.Net.HttpWebResponse.StatusCode parameter is a number indicating the status of the HTTP response. The expected values for status are defined in the System.Net.HttpStatusCode class.

StatusDescription

ToString

[C#] public string StatusDescription {get;}
[C++] public: _property String* get_StatusDescription( );
[VB] Public ReadOnly Property StatusDescription As String
[JScript] public function get StatusDescription( ): String;

Description

Gets the status description returned with the response.

Close

[C#] public override void Close( );
[C++] public: void Close( );
[VB] Overrides Public Sub Close( )
[JScript] public override function Close( );

Description

Closes the response stream.

The System.Net.HttpWebResponse.Close method closes the response stream and releases the connection to the Internet resource for reuse by other requests.

Dispose

[C#] protected virtual void Dispose(bool disposing);
[C++] protected: virtual void Dispose(bool disposing);
[VB] Overridable Protected Sub Dispose(ByVal disposing As Boolean)
[JScript] protected function Dispose(disposing: Boolean);

Description

GetHashCode

[C#] public override int GetHashCode( );
[C++] public: int GetHashCode( );
[VB] Overrides Public Function GetHashCode( ) As Integer
[JScript] public override function GetHashCode( ): int;

Description

GetResponseHeader

[C#] public string GetResponseHeader(string headerName);
[C++] public: String* GetResponseHeader(String* headerName);
[VB] Public Function GetResponseHeader(ByVal headerName As String) As String
[JScript] public function GetResponseHeader(headerName: String): String;

Description

Gets a specified header value returned with the response.

Return Value: The value of the header specified.

The System.Net.HttpWebResponse.GetResponseHeader (System.String) method returns the value of the specified header. The header value to return.

GetResponseStream

[C#] public override Stream GetResponseStream( );
[C++] public: Stream* GetResponseStream( );
[VB] Overrides Public Function GetResponseStream( ) As Stream
[JScript] public override function GetResponseStream( ): Stream;

Description

Gets the stream used for reading the body of the response from the server.

Return Value: A System.IO.Stream containing the body of the response.

The System.Net.HttpWebResponse.GetResponseStream method returns the data stream from the requested Internet resource.

IDisposable.Dispose

[C#] void IDisposable.Dispose( );
[C++] void IDisposable::Dispose( );
[VB] Sub Dispose( ) Implements IDisposable.Dispose
[JScript] function IDisposable.Dispose( ); ISerializable.GetObjectData
[C#] void ISerializable.GetObjectData(SerializationInfo SerializationInfo, StreamingContext streamingContext);
[C++] void ISerializable::GetObjectData(SerializationInfo* SerializationInfo, StreamingContext streamingContext);
[VB] Sub GetObjectData(ByVal SerializationInfo As SerializationInfo, ByVal streamingContext As StreamingContext) Implements ISerializable.GetObjectData
[JScript] function ISerializable.GetObjectData(SerializationInfo: SerializationInfo, streamingContext: StreamingContext);

IAuthenticationModule interface (System.Net)

ToString

Description

Provides the base authentication interface for Web client authentication modules.

The System.Net.IAuthenticationModule interface defines the properties and methods that custom authentication modules must use.

AuthenticationType

ToString

[C#] string AuthenticationType {get;}
[C++] String* get_AuthenticationType( );
[VB] ReadOnly Property AuthenticationType As String
[JScript] abstract function get AuthenticationType( ): String;

Description

Gets the authentication type provided by this authentication module.

The System.Net.IAuthenticationModule.AuthenticationType property identifies the authentication type implemented by this authentication module. The System.Net.IAuthenticationModule.AuthenticationType property is used by the System.Net.AuthenticationManager.Register(System.Net.IAuthenticationModule) method to determine if the authentication module has been registered, and by the System.Net.AuthenticationManager.Unregister (System.Net.IAuthentication Module) method to remove a registered authentication module.

CanPreAuthenticate

ToString

[C#] bool CanPreAuthenticate {get;}
[C++] bool get_CanPreAuthenticate( );
[VB] ReadOnly Property CanPreAuthenticate As Boolean
[JScript] abstract function get CanPreAuthenticate( ): Boolean;

Description

Gets a value indicating whether the authentication module supports preauthentication.

The System.Net.IAuthenticationModule.CanPre Authenticate property is set to true to indicate that the authentication module can respond with a valid System.Net.Authorization instance when the System.Net.IAuthenticationModule.PreAuthenticate(System.Net.WebRequest, System.Net.ICredentials) method is called.

Authenticate

[C#] Authorization Authenticate(string challenge, WebRequest request, ICredentials credentials);

[C++] Authorization* Authenticate(String* challenge, WebRequest* request, ICredentials* credentials);

[VB] Function Authenticate(ByVal challenge As String, ByVal request As WebRequest, ByVal credentials As ICredentials) As Authorization

[JScript] function Authenticate(challenge: String, request: WebRequest, credentials: ICredentials): Authorization;

Description

Returns an instance of the System.Net.Authorization class in respose to an authentication challenge from a server.

Return Value: An System.Net.Authorization instance containing the authorization message for the request, or null if the challenge cannot be handled.

The System.Net.IAuthenticationModule.Authenticate (System.String,System.Net. WebRequest,System.Net.ICredentials) method conducts the authentication process with the server and returns an System.Net.Authorization instance to the System.Net.AuthenticationManager. The authentication challenge sent by the server. The System.Net.WebRequest instance associated with the challenge. The credentials associated with the challenge.

PreAuthenticate

[C#] Authorization PreAuthenticate(WebRequest request, ICredentials credentials);

[C++] Authorization* PreAuthenticate(WebRequest* request, ICredentials* credentials);

[VB] Function PreAuthenticate(ByVal request As WebRequest, ByVal credentials As ICredentials) As Authorization

[JScript] function PreAuthenticate(request: WebRequest, credentials ICredentials): Authorization;

Description

Returns an instance of the System.Net.Authorization class for an authentication request to a server.

Return Value: An System.Net.Authorization instance containing the authorization message for the request.

When the System.Net.IAuthenticationModule.CanPreAuthenticate property is true, the System.Net.IAuthenticationModule.PreAuthenticate(System.Net.WebRequest, System.Net.ICredentials) method will return an instance of the System.Net.Authorization class containing an authentication message. The System.Net.WebRequest instance associated with the authentication request. The credentials associated with the authentication request.

ICertificatePolicy Interface (System.Net)

PreAuthenticate

Description

Validates a server certificate.

The System.Net.ICertificatePolicy interface is used to provide custom security certificate validation for an application. The default policy is to allow valid certificates, as well as valid certificates that have expired. To change this policy, implement the System.Net.ICertificatePolicy interface with a different policy, and then assign that policy to System.Net.ServicePointManager.CertificatePolicy.

CheckValidationResult

[C#] bool CheckValidationResult(ServicePoint srvPoint, X509Certificate certificate, WebRequest request, int certificateProblem);

[C++] bool CheckValidationResult(ServicePoint* srvPoint, X509Certificate* certificate, WebRequest* request, int certificateProblem);

[VB] Function CheckValidationResult(ByVal srvPoint As ServicePoint, ByVal certificate As X509Certificate, ByVal request As WebRequest, ByVal certificateProblem As Integer) As Boolean

[JScript] function CheckValidationResult(srvPoint: ServicePoint, certificate: X509Certificate, request: WebRequest, certificateProblem: int): Boolean;

Description

Validates a server certificate.

Return Value: true if the certificate should be honored; otherwise, false.

The System.Net.ICertificatePolicy.CheckValidation Result(System.Net.ServicePoint, System.Security.Cryptography.X509Certificates.X509Certificate,System.Net.Web Request,System.Int32) method implements the application certificate validation policy. The method can examine the srvPoint, certificate, request, and certificateProblem parameters to determine whether the certificate should be honored. The System.Net.ServicePoint that will use the certificate. The certificate to validate. The request that received the certificate. The problem encountered when using the certificate.

ICredentials Interface (System.Net)

CheckValidationResult

Description

Provides the base authentication interface for retrieving credentials for Web client authentication.

The System.Net.ICredentials interface provides the System.Net.ICredentials.GetCredential(System.Uri,System.String) method to objects that supply network credentials to applications.

GetCredential

[C#] NetworkCredential GetCredential(Uri uri, string authType);

[C++] NetworkCredential* GetCredential(Uri* uri, String* authType);

[VB] Function GetCredential(ByVal uri As Uri, ByVal authType As String) As NetworkCredential

[JScript] function GetCredential(uri: Uri, authType: String): NetworkCredential;

Description

Returns a System.Net.NetworkCredential object that is associated with the specified URI, and authentication type.

Return Value: The System.Net.NetworkCredential associated with the specified URI and authentication type, or if no credentials are available, null.

The System.Net.ICredentials.GetCredential(System.Uri, System.String) method returns a System.Net.NetworkCredential instance that contains the credentials associated with the specified URI and authorization scheme. When no credentials are available, the System.Net.ICredentials.GetCredential(System.Uri,System.String) method returns null. The System.Uri that the client is providing authentication for. The type of authentication, as defined in the System.Net.IAuthenticationModule.AuthenticationType property.

IPAddress class (System.Net)

GetCredential

Description

Provides an Internet Protocol (IP) address.

The System.Net.IPAddress class contains the address of a computer on an IP network.

GetCredential

[C#] public static readonly IPAddress Any;

[C++] public: static IPAddress* Any;

[VB] Public Shared ReadOnly Any As IPAddress
[JScript] public static var Any: IPAddress;

Description

Provides an IP address indicating that the server should listen for client activity on all network interfaces. This field is read-only.

The System.Net.Sockets.Socket.Bind(System.Net.EndPoint) method uses the System.Net.IPAddress.Any field to indicate that a System.Net.Sockets.Socket instance should listen for client activity on all network interfaces.

GetCredential

[C#] public static readonly IPAddress Broadcast;
[C++] public: static IPAddress* Broadcast;
[VB] Public Shared ReadOnly Broadcast As IPAddress
[JScript] public static var Broadcast: IPAddress;

Description

Provides the IP broadcast address. This field is read-only.

The System.Net.IPAddress.Broadcast field is equivalent to 255.255.255.255.

GetCredential

[C#] public static readonly IPAddress Loopback;
[C++] public: static IPAddress* Loopback;
[VB] Public Shared ReadOnly Loopback As IPAddress
[JScript] public static var Loopback: IPAddress;

Description

Provides the IP loopback address. This field is read-only.

The System.Net.IPAddress.Loopback field is equivalent to 127.0.0.1 in network byte order.

GetCredential

[C#] public static readonly IPAddress None;
[C++] public: static IPAddress* None;
[VB] Public Shared ReadOnly None As IPAddress
[JScript] public static var None: IPAddress;

Description

Provides an IP address indicating that no network interface should be used. This field is read-only.

The System.Net.Sockets.Socket.Bind(System.Net.EndPoint) method uses the System.Net.IPAddress.None field to indicate that a System.Net.Sockets.Socket instance should not listen for client activity.

IPAddress

Example Syntax:

GetCredential

[C#] public IPAddress(long newAddress);
[C++] public: IPAddress(_int64 newAddress);
[VB] Public Sub New(ByVal newAddress As Long)
[JScript] public function IPAddress(newAddress: long);

Description

Initializes a new instance of the System.Net.IPAddress class with the specified address.

The System.Net.IPAddress instance is created with the System.Net.IPAddress.Address property set to newaddress. The integer value of the IP address.

Address

GetCredential

[C#] public int Address {get; set;}
[C++] public: _property int get_Address( );public: _property void set_Address(int);
[VB] Public Property Address As Integer
[JScript] public function get Address( ): int;public function set Address(int);

Description

An Internet Protocol (IP) address.

To convert System.Net.IPAddress.Address to dotted-quad notation, use the System.Net.IPAddress.ToString method.

AddressFamily

GetCredential

[C#] public AddressFamily AddressFamily {get;}
[C++] public: _property AddressFamily get_AddressFamily( );
[VB] Public ReadOnly Property AddressFamily As AddressFamily
[JScript] public function get AddressFamily( ): AddressFamily;

Description

Specifies the address family of the IP address.

Equals

[C#] public override bool Equals(object comparand);
[C++] public: bool Equals(Object* comparand);
[VB] Overrides Public Function Equals(ByVal comparand As Object) As Boolean
[JScript] public override function Equals(comparand: Object): Boolean;

Description

Compares two IP addresses.

Return Value: true if the two address are equal; otherwise, false.

The System.Net.IPAddress.Equals(System.Object) method compares the current System.Net.IPAddress instance with the comparand parameter and returns true if the two instance contain the same IP address. An System.Net.IPAddress instance to compare to the current instance.

GetHashCode

[C#] public override int GetHashCode( );
[C++] public: int GetHashCode( );
[VB] Overrides Public Function GetHashCode( ) As Integer
[JScript] public override function GetHashCode( ): int;

Description

Returns a hash value for an IP address.

Return Value: An integer hash value.

The System.Net.IPAddress.GetHashCode method returns a hash code of the IP address. This value can be used as a key in hash tables.

HostToNetworkOrder

[C#] public static short HostToNetworkOrder(short host);
[C++] public: static short HostToNetworkOrder(short host);
[VB] Public Shared Function HostToNetworkOrder(ByVal host As Short) As Short %
[JScript] public static function HostToNetworkOrder(host: Int16): Int16;

Description

Converts a short value from host byte order to network byte order.

Return Value: A short value expressed in network byte order.

Different computers use different conventions for ordering the bytes within multi-byte integer values. Some computers put the most significant byte first (known as big-endian order) and others put the least-significant byte first (known as little-endian order). To enable computers that use different byte ordering, all integer values sent over the network are sent in network byte order. The number to convert expressed in host byte order.

HostToNetworkOrder

[C#] public static int HostToNetworkOrder(int host);
[C++] public: static int HostToNetworkOrder(int host);

[VB] Public Shared Function HostToNetworkOrder(ByVal host As Integer) As Integer

[JScript] public static function HostToNetworkOrder(host: int): int;

Description

Converts an integer value from host byte order to network byte order.

Return Value: An integer value expressed in network byte order.

Different computers use different conventions for ordering the bytes within multi-byte integer values. Some computers put the most significant byte first (known as big-endian order) and others put the least-significant byte first (known as little-endian order). To enable computers that use different byte ordering, all integer values sent over the network are sent in network byte order. The number to convert expressed in host byte order.

HostToNetworkOrder

[C#] public static long HostToNetworkOrder(lo ng host);

[C++] public: static _int64 HostToNetworkOrder(_int64 host);

[VB] Public Shared Function HostToNetworkOrder(ByVal host As Long) As Long

[JScript] public static function HostToNetworkOrder(host: long): long; Converts a value from host byte order to network byte order.

Description

Converts a long value from host byte order to network byte order.

Return Value: A long value expressed in network byte order.

Different computers use different conventions for ordering the bytes within multi-byte integer values. Some computers put the most significant byte first (known as big-endian order) and others put the least-significant byte first (known as little-endian order). To enable computers that use different byte ordering, all integer values sent over the network are sent in network byte order. The number to convert expressed in host byte order.

IsLoopback

[C#] public static bool IsLoopback(IPAddress address);

[C++] public: static bool IsLoopback(IPAddress* address);

[VB] Public Shared Function IsLoopback(ByVal address As IPAddress) As Boolean

[JScript] public static function IsLoopback(address: IPAddress): Boolean;

Description

Indicates whether the specified IP address is the loopback address.

Return Value: true if address is the loopback address; otherwise false.

The System.Net.IPAddress.IsLoopback(System.Net.IPAddress) method compares address to System.Net.IPAddress.Loopback and returns true if the two IP address are the same. An IP address.

NetworkToHostOrder

[C#] public static short NetworkToHostOrder(short network);

[C++] public: static short NetworkToHostOrder(short network);

[VB] Public Shared Function NetworkToHostOrder(ByVal network As Short) As Short

[JScript] public static function NetworkToHostOrder(network: Int16): Int16;

Description

Converts a short value from network byte order to host byte order.

Return Value: A short value expressed in host byte order.

Different computers use different conventions for ordering the bytes within multi-byte integer values. Some computers put the most significant byte first (known as big-endian order) and others put the least-significant byte first (known as little-endian order). To enable computers that use different byte ordering, all integer values sent over the network are sent in network byte order. The number to convert expressed in network byte order.

NetworkToHostOrder

[C#] public static int NetworkToHostOrder(int network);

[C++] public: static int NetworkToHostOrder(int network);

[VB] Public Shared Function NetworkToHostOrder(ByVal network As Integer) As Integer

[JScript] public static function NetworkToHostOrder(network: int): int;

Description

Converts an integer value from network byte order to host byte order.

Return Value: An integer value expressed in host byte order.

Different computers use different conventions for ordering the bytes within multi-byte integer values. Some computers put the most significant byte first (known as big-endian order) and others put the least-significant byte first (known as little-endian order). To enable computers that use different byte ordering, all integer values sent over the network are sent in network byte order. The number to convert expressed in network byte order.

NetworkToHostOrder

[C#] public static long NetworkToHostOrder(long network);

[C++] public: static _int64 NetworkToHostOrder(_int64 network);

[VB] Public Shared Function NetworkToHostOrder(ByVal network As Long) As Long

[JScript] public static function NetworkToHostOrder(network: long): long; Converts a number from network byte order to host byte order.

Description

Converts a long value from network byte order to host byte order.

Return Value: A long value expressed in host byte order.

Different computers use different conventions for ordering the bytes within multi-byte integer values. Some computers put the most significant byte first (known as big-endian order) and others put the least-significant byte first (known as little-endian order). To enable computers that use different byte ordering, all integer values sent over the network are sent in network byte order. The number to convert expressed in network byte order.

Parse

[C#] public static IPAddress Parse(string ipString);

[C++] public: static IPAddress* Parse(String* ipString);

[VB] Public Shared Function Parse(ByVal ipString As String) As IPAddress

[JScript] public static function Parse(ipString: String): IPAddress;

Description

Converts an IP address string to an System.Net.IPAddress instance.

Return Value: An System.Net.IPAddress instance.

The static System.Net.IPAddress.Parse(System.String) method creates an System.Net.IPAddress instance from an IP address expressed in dotted-quad (" 192.168.1.2") notation. A string containing an IP address in dotted-quad notation (for example, "192.168.1.2").

ToString

[C#] public override string ToString( );

[C++] public: String* ToString( );

[VB] Overrides Public Function ToString( ) As String

[JScript] public override function ToString( ): String;

Description

Converts an Internet address to standard dotted-quad format.

Return Value: A string containing the IP address in dotted-quad format (for example, "192.168.1.2").

The System.Net.IPAddress.ToString method converts the IP address stored in the System.Net.IPAddress.Address property is converted to dotted-quad notation (for example, "192.168.1.2").

IPEndPoint class (System.Net)

ToString

Description

Represents a network endpoint as an IP address and a port number.

The System.Net.IPEndPoint class contains the host and port information needed by an application to connect to a service on a host. By combining the host's IP address and port number of a service, the System.Net.IPEndPoint class forms a connection point to a service.

ToString

[C#] public const int MaxPort;

[C++] public: const int MaxPort;

[VB] Public Const MaxPort As Integer

[JScript] public var MaxPort: int;

Description

Specifies the maximum value that can be assigned to the System.Net.IPEndPoint.Port property. This field is read-only.

ToString

[C#] public const int MinPort;

[C++] public: const int MinPort;

[VB] Public Const MinPort As Integer

[JScript] public var MinPort: int;

Description

Specifies the minimum value that can be assigned to the System.Net.IPEndPoint.Port property. This field is read-only.

IPEndPoint

Example Syntax:

ToString

[C#] public IPEndPoint(long address, int port);

[C++] public: IPEndPoint(_int64 address, int port);

[VB] Public Sub New(ByVal address As Long, ByVal port As Integer)

[JScript] public function IPEndPoint(address: long, port: int); Initializes a new instance of the System.Net.IPEndPoint class.

Description

Initializes a new instance of the System.Net.IPEndPoint class with the specified address and port number. The IP address of the Internet host. The port number associated with the address, or 0 to specify any available port.

IPEndPoint

Example Syntax:

ToString

[C#] public IPEndPoint(IPAddress address, int port);

[C++] public: IPEndPoint(IPAddress* address, int port);

[VB] Public Sub New(ByVal address As IPAddress, ByVal port As Integer)

[JScript] public function IPEndPoint(address: IPAddress, port: int);

Description

Initializes a new instance of the System.Net.IPEndPoint class with the specified address and port number. The IP address of the Internet host. The port number associated with address.

Address

ToString

[C#] public IPAddress Address {get; set;}

[C++] public: _property IPAddress* get_Address( ); public: _property void set_Address(IPAddress*);

[VB] Public Property Address As IPAddress

[JScript] public function get Address( ): IPAddress;public function set Address(IPAddress);

Description

Gets or sets the IP address of the end point.

AddressFamily

ToString

[C#] public override AddressFamily AddressFamily {get;}

[C++] public: _property virtual AddressFamily get_AddressFamily( );

[VB] Overrides Public ReadOnly Property AddressFamily As AddressFamily

[JScript] public function get AddressFamily( ): AddressFamily;

Description

Gets the Internet Protocol (IP) address family.

Port

ToString

[C#] public int Port {get; set;}

[C++] public: _property int get_Port( );public: _property void set_Port(int);

[VB] Public Property Port As Integer

[JScript] public function get Port( ): int;public function set Port(int);

Description

Gets or sets the TCP port number of the end point.

Create

[C#] public override EndPoint Create(SocketAddress socketAddress);

[C++] public: Endpoint* Create(SocketAddress* socketAddress);

[VB] Overrides Public Function Create(ByVal socketAddress As SocketAddress) As EndPoint

[JScript] public override function Create(socketAddress: SocketAddress): EndPoint;

Description

Creates an end point from a socket address.

Return Value: An System.Net.EndPoint instance using the specified socket. The network socket to use for the end point.

Equals

[C#] public override bool Equals(object comparand);

[C++] public: bool Equals(Object* comparand);

[VB] Overrides Public Function Equals(ByVal comparand As Object) As Boolean

[JScript] public override function Equals(comparand: Object): Boolean;

GetHashCode

[C#] public override int GetHashCode( );

[C++] public: int GetHashCode( );

[VB] Overrides Public Function GetHashCode( ) As Integer

[JScript] public override function GetHashCode( ): int;

Serialize

[C#] public override SocketAddress Serialize( );

[C++] public: SocketAddress* Serialize( );

[VB] Overrides Public Function Serialize( ) As SocketAddress

[JScript] public override function Serialize( ): SocketAddress;

Description

Serializes end point information into a System.Net.SocketAddress instance.

Return Value: A System.Net.SocketAddress instance containing the socket address for the end point.

ToString

[C#] public override string ToString( );

[C++] public: String* ToString( );

[VB] Overrides Public Function ToString( ) As String

[JScript] public override function ToString( ): String;

Description

Returns the IP address and port number for the specified end point.

Return Value: A string containing the IP address, in dotted-quad notation, and the port number for the specified end point (for example, 192.168.1.2:23).

IPHostEntry class (System.Net)

ToString

Description

Provides a container class for Internet host address information.

The System.Net.IPHostEntry class associates a Domain Name System (DNS) host name with an array of aliases and an array of matching IP addresses.

IPHostEntry

Example Syntax:

ToString

[C#] public IPHostEntry( );

[C++] public: IPHostEntry( );

[VB] Public Sub New( )

[JScript] public function IPHostEntry( );

AddressList

ToString

[C#] public IPAddress[ ] AddressList {get; set;}

[C++] public: _property IPAddress* get_AddressList( );public: _property void set_AddressList(IPAddress* [ ]);

[VB] Public Property AddressList As IPAddress ( )

[JScript] public function get AddressList( ): IPAddress[ ]; public function set AddressList(IPAddress [ ]);

Description

Gets or sets a list of IP addresses associated with a host.

Aliases

ToString

[C#] public string[ ] Aliases {get; set;}

[C++] public: _property String* get_Aliases( );public: _property void set_Aliases(String* _gc[ ]);

[VB] Public Property Aliases As String ( )

[JScript] public function get Aliases( ): String[ ];public function set Aliases(String[ ]);

Description

Gets or sets a list of aliases associated with a host.

HostName

ToString

[C#] public string HostName {get; set;}

[C++] public: _property String* get_HostName( ); public: _property void set_HostName(String*);

[VB] Public Property HostName As String

[JScript] public function get HostName( ): String;public function set HostName(String);

Description

Gets or sets the DNS name of the host.

The System.Net.IPHostEntry.HostName property contains the primary host name for a server. If the DNS entry for the server defines additional aliases, they will be available in the System.Net.IPHostEntry.Aliases property.

IWebProxy interface (System.Net)

ToString

Description

Provides the base interface for implementation of proxy access for the System.Net.WebRequest class.

The System.Net.IWebProxy interface provides the methods and properties required by the System.Net.WebRequest class to access proxy servers.

Credentials

ToString

[C#] ICredentials Credentials {get; set;}

[C++] ICredentials* get_Credentials( ); void set_Credentials (ICredentials*);

[VB] Property Credentials As ICredentials

[JScript] abstract function get Credentials( ): ICredentials; public abstract function set Credentials(ICredentials);

Description

The credentials to submit to the proxy server for authentication.

The System.Net.IWebProxy.Credentials property is an System.Net.ICredentials instance containing the authorization credentials to send to the proxy server in response to an HTTP 407 (proxy authorization) status code.

GetProxy

[C#] Uri GetProxy(Uri destination);

[C++] Uri* GetProxy(Uri* destination);

[VB] Function GetProxy(ByVal destination As Uri) As Uri

[JScript] function GetProxy(destination: Uri): Uri;

Description

Returns the URI of a proxy.

Return Value: A System.Uri containing the URI of the proxy used to contact destination.

The System.Net.IWebProxy.GetProxy(System.Uri) method returns the URI of the proxy server that handles requests to the Internet resource specified in the destination parameter. A System.Uri specifying the requested Internet resource.

IsBypassed

[C#] bool IsBypassed(Uri host);

[C++] bool IsBypassed(Uri* host);

[VB] Function IsBypassed(ByVal host As Uri) As Boolean

[JScript] function IsBypassed(host: Uri): Boolean;

Description

Indicates that the proxy should not be used for the specified host.

Return Value: true if the proxy server should not be used for host; otherwise, false.

The System.Net.IWebProxy.IsBypassed(System.Uri) method indicates whether to use the proxy server to access the host specified in the host parameter. If System.Net.IWebProxy.IsBypassed(System.Uri) is true, the proxy is not used to contact the host and the request is passed directly to the server. The System.Uri of the host to check for proxy use.

IWebRequestCreate interface (System.Net)

IsBypassed

Description

Provides the base interface for creating System.Net.WebRequest instances.

The System.Net.IWebRequestCreate interface defines the method that System.Net.WebRequest descendants must use to register with the System.Net.WebRequest.Create(System.Uri,System.Boolean) method.

Create

[C#] WebRequest Create(Uri uri);

[C++] WebRequest* Create(Uri* uri);

[VB] Function Create(ByVal uri As Uri) As WebRequest

[JScript] function Create(uri: Uri): WebRequest;

Description

Creates a System.Net.WebRequest instance.

Return Value: A System.Net.WebRequest instance.

The System.Net.IWebRequestCreate.Create(System.Uri) method must return an initialized instance of the System.Net.WebRequest descendant capable of performing a standard request/response transaction for the protocol without needing any protocol-specific fields modified. The uniform resource identifier (URI) of the Web resource.

NetworkAccess enumeration (System.Net)

Create

Description

Specifies network access permissions.

The System.Net.NetworkAccess enumeration is used with the System.Net.WebPermission and System.Net.SocketPermission classes.

Create

[C#] public const NetworkAccess Accept;

[C++] public: const NetworkAccess Accept;

[VB] Public Const Accept As NetworkAccess

[JScript] public var Accept: NetworkAccess;

Description

Indicates that the application is allowed to accept connections from the Internet on a local resource.

Create

[C#] public const NetworkAccess Connect;

[C++] public: const NetworkAccess Connect;

[VB] Public Const Connect As NetworkAccess

[JScript] public var Connect: NetworkAccess;

Description

Indicates that the application is allowed to connect to specific Internet resources.

NetworkCredential class (System.Net)

ToString

Description

Provides credentials for password-based authentication schemes such as basic, digest, NTLM, and Kerberos authentication.

The System.Net.NetworkCredential class is a base class that supplies credentials in password-based authentication schemes such as basic, digest, NTLM, and Kerberos. Classes that implement the System.Net.ICredentials interface, such as the System.Net.CredentialCache class, return System.Net.NetworkCredential instances.

NetworkCredential

Example Syntax:

ToString

[C#] public NetworkCredential( );

[C++] public: NetworkCredential( );

[VB] Public Sub New( )

[JScript] public function NetworkCredential( );

NetworkCredential

Example Syntax:

ToString

[C#] public NetworkCredential(string userName, string password);

[C++] public: NetworkCredential(String* userName, String* password);

[VB] Public Sub New(ByVal userName As String, ByVal password As String)

[JScript] public function NetworkCredential(userName: String, password: String); Initializes a new instance of the System.Net.NetworkCredential class.

Description

Initializes a new instance of the System.Net.NetworkCredential class with the specified user name and password.

The constructor initializes a System.Net.NetworkCredential instance is initialized with the System.Net.NetworkCredential.UserName property set to userName and the System.Net.NetworkCredential.Password property set to password. The user name associated with the credentials. The password for the user name associated with the credentials.

NetworkCredential

Example Syntax:

ToString

[C#] public NetworkCredential(string userName, string password, string domain);

[C++] public: NetworkCredential(String* userName, String* password, String* domain);

[VB] Public Sub New(ByVal userName As String, ByVal password As String, ByVal domain As String)

[JScript] public function NetworkCredential(userName: String, password: String, domain: String);

Description

Initializes a new instance of the System.Net.NetworkCredential class with the specified user name, password, and domain.

The constructor initializes a System.Net.NetworkCredential instance with the System.Net.NetworkCredential.UserName property set to userName, the System.Net.NetworkCredential.Password property set to password, and the System.Net.NetworkCredential.Domain property set to domain. The user name associated with the credentials. The password for the user name associated with the credentials. The domain associated with these credentials.

ToString

[C#] public string Domain {get; set;}

[C++] public: _property String* get_Domain( ); public: _property void set_Domain(String*);

[VB] Public Property Domain As String

[JScript] public function get Domain( ): String;public function set Domain(String);

Description

Gets or sets the domain or machine name that verifies the credentials.

The System.Net.NetworkCredential.Domain property specifies the domain or realm to which the user name belongs. Typically, this is the host machine name where the application runs or user domain for the currently logged in user.

Password

ToString

[C#] public string Password {get; set;}

[C++] public: _property String* get_Password( ); public: _property void set_Password(String*);

[VB] Public Property Password As String

[JScript] public function get Password( ): String;public function set Password(String);

Description

Gets or sets the password for the user name associated with the credentials.

UserName

ToString

[C#] public string UserName {get; set;}

[C++] public: _property String* get_UserName( ); public: _property void set_UserName(String*);

[VB] Public Property UserName As String

[JScript] public function get UserName( ): String;public function set UserName(String);

Description

Gets or sets the user name associated with the credentials.

GetCredential

[C#] public NetworkCredential GetCredential(Uri uri, string authType);

[C++] public: __sealed NetworkCredential* GetCredential (Uri* uri, String* authType);

[VB] NotOverridable Public Function GetCredential(ByVal uri As Uri, ByVal authType As String) As NetworkCredential

[JScript] public function GetCredential(uri: Uri, authType: String): NetworkCredential;

Description

Returns an instance of the System.Net.NetworkCredential class for the specified URI and authentication type.

Return Value: A System.Net.NetworkCredential instance. The URI that the client is providing authentication for. The type of authentication requested as defined in the System.Net.IAuthenticationModule.AuthenticationType property.

ProtocolViolationException class (System.Net)

ToString

Description

The exception that is thrown when an error is made while using a network protocol.

A System.Net.ProtocolViolationException is thrown by descendants of System.Net.WebRequest and System.Net.WebResponse to indicate an error using the underlying protocol. For example, the System.Net.HttpWebRequest and System.Net.HttpWebResponse classes throw a System.Net.ProtocolViolationException to indicate an error using HTTP.

ProtocolViolationException

Example Syntax:

ToString

[C#] public ProtocolViolationException( );

[C++] public: ProtocolViolationException( );

[VB] Public Sub New( )

[JScript] public function ProtocolViolationException( ); Initializes a new instance of the System.Net.ProtocolViolationException class.

Description

Initializes a new instance of the System.Net.ProtocolViolationException class.

The default constructor initializes a new instance of the System.Net.ProtocolViolationException class with all properties set to null.

ProtocolViolationException

Example Syntax:

ToString

[C#] public ProtocolViolationException(string message);

[C++] public: ProtocolViolationException(String* message);

[VB] Public Sub New(ByVal message As String)

[JScript] public function ProtocolViolationException(message: String);

Description

Initializes a new instance of the System.Net.ProtocolViolationException class with the specified message.

The System.Net.ProtocolViolationException.#ctor constructor initializes a new instance of the System.Net.ProtocolViolationException class with the System.Exception.Message property set to the value of the message parameter. The error message string.

ProtocolViolationException

Example Syntax:

ToString

[C#] protected ProtocolViolationException(SerializationInfo SerializationInfo, StreamingContext streamingContext);

[C++] protected: ProtocolViolationException(SerializationInfo* serializationInfo, StreamingContext streamingContext);

[VB] Protected Sub New(ByVal SerializationInfo As SerializationInfo, ByVal streamingContext As StreamingContext)

[JScript] protected function ProtocolViolationException(SerializationInfo: SerializationInfo, streamingcontext: StreamingContext);

HelpLink

HResult

InnerException

Message

Source

StackTrace

TargetSite

ISerializable.GetObjectData

[C#] void ISerializable.GetObjectData(SerializationInfo SerializationInfo, StreamingContext streamingContext);

[C++] void ISerializable::GetObjectData(SerializationInfo* SerializationInfo, StreamingContext streamingContext);

[VB] Sub GetObjectData(ByVal SerializationInfo As SerializationInfo, ByVal streamingContext As StreamingContext) Implements ISerializable.GetObjectData

[JScript] function ISerializable.GetObjectData(SerializationInfo: SerializationInfo, streamingcontext: StreamingContext);

ServicePoint class (System.Net)

ToString

Description

Provides connection management for HTTP connections.

The System.Net.ServicePoint class handles connections to an Internet resource based on the host information passed in the resource's URI. The initial connection to the resource determines the information the System.Net.ServicePoint maintains, which is then shared by all subsequent requests to that resource.

Address

ToString

[C#] public Uri Address {get;}

[C++] public: _property Uri* get_Address( );

[VB] Public ReadOnly Property Address As Uri

[JScript] public function get Address( ): Uri;

Description

Gets the URI of the System.Net.ServicePoint.

Certificate

ToString

[C#] public X509Certificate Certificate {get;}

[C++] public: _property X509Certificate* get_Certificate( );

[VB] Public ReadOnly Property Certificate As X509Certificate

[JScript] public function get Certificate( ): X509Certificate;

Description

Gets the certificate received for this System.Net.ServicePoint.

Although a System.Net.ServicePoint can make multiple connections to an Internet resource, it can maintain only one certificate.

ClientCertificate

ToString

[C#] public X509Certificate ClientCertificate {get;}

[C++] public: _property X509Certificate* get_ClientCertificate( );

[VB] Public ReadOnly Property ClientCertificate As X509Certificate

[JScript] public function get ClientCertificate( ): X509Certificate; Gets the Client Certificate sent by us to the Server.

ConnectionLimit

ToString

[C#] public int ConnectionLimit {get; set;}

[C++] public: _property int get_ConnectionLimit( ); public: _property void set_ConnectionLimit(int);

[VB] Public Property ConnectionLimit As Integer

[JScript] public function get ConnectionLimit( ): int;public function set ConnectionLimit(int);

Description

Gets or sets the maximum number of connections allowed on this System.Net.ServicePoint.

The System.Net.ServicePoint.ConnectionLimit property sets the maximum number of connections that the System.Net.ServicePoint can make to an Internet resource. The value of the System.Net.ServicePoint.ConnectionLimit property is set to the value of the System.Net.ServicePointManager.DefaultConnectionLimit property when the System.Net.ServicePoint is created; subsequent changes to System.Net.ServicePointManager.DefaultConnectionLimit have no effect on existing System.Net.ServicePoint instances.

ConnectionName

ToString

[C#] public string ConnectionName {get;}

[C++] public: _property String* get_ConnectionName( );

[VB] Public ReadOnly Property ConnectionName As String

[JScript] public function get ConnectionName( ): String;

Description

Gets the connection group name established by the System.Net.WebRequest that created the connection.

The System.Net.ServicePoint.ConnectionName property contains the connection group assigned to the System.Net.WebRequest.ConnectionGroupName property of the System.Net.WebRequest that initiated the connection provided by this System.Net.ServicePoint. If the System.Net.ServicePoint.ConnectionName property is set, only System.Net.WebRequest instances with the same System.Net.WebRequest.ConnectionGroupName can use this System.Net.ServicePoint.

CurrentConnections

ToString

[C#] public int CurrentConnections {get;}

[C++] public: _property int get_CurrentConnections( );

[VB] Public ReadOnly Property CurrentConnections As Integer

[JScript] public function get CurrentConnections( ): int;

Description

Gets the number of connections associated with this System.Net.ServicePoint.

The System.Net.ServicePoint.CurrentConnections property contains the number of active Internet connections associated with this System.Net.ServicePoint. The value of System.Net.ServicePoint.CurrentConnections cannot exceed that of System.Net.ServicePoint.ConnectionLimit.

IdleSince

ToString

[C#] public DateTime IdleSince {get;}

[C++] public: _property DateTime get_IdleSince( );

[VB] Public ReadOnly Property IdleSince As DateTime

[JScript] public function get IdleSince( ): DateTime;

Description

Gets the date and time that the System.Net.ServicePoint was last accessed.

The System.Net.ServicePoint.IdleSince property records the last date and time at which a service point was accessed. When the difference between the current time and System.Net.ServicePoint.IdleSince exceeds the value of System.Net.ServicePoint.MaxIdleTime, the System.Net.ServicePoint is available for recycling to another connection.

MaxIdleTime

ToString

[C#] public int MaxIdleTime {get; set;}

[C++] public: _property int get_MaxIdleTime( ); public: _property void set_MaxIdleTime(int);

[VB] Public Property MaxIdleTime As Integer

[JScript] public function get MaxIdleTime( ): int;public function set MaxIdleTime(int);

Description

Gets or sets the maximum idle time for the System.Net.ServicePoint.

The System.Net.ServicePoint.MaxIdleTime property contains the length of time, in milliseconds, that the System.Net.ServicePoint is allowed to maintain an idle connection to an Internet resource before it is recycled for use in another connection.

ProtocolVersion

ToString

[C#] public virtual Version ProtocolVersion {get;}

[C++] public: _property virtual Version* get_ProtocolVersion( );

[VB] Overridable Public ReadOnly Property ProtocolVersion As Version

[JScript] public function get ProtocolVersion( ): Version;

Description

Gets the version of the HTTP protocol that the System.Net.ServicePoint uses.

SupportsPipelining

ToString

[C#] public bool SupportsPipelining {get;}

[C++] public: _property bool get_SupportsPipelining( );

[VB] Public ReadOnly Property SupportsPipelining As Boolean

[JScript] public function get SupportsPipelining( ): Boolean;

Description

Indicates whether the System.Net.ServicePoint supports pipelined connections.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

Gets the hash code for the System.Net.ServicePoint

Return Value: The hash code for the System.Net.ServicePoint.

The hash code for System.Net.ServicePoint A and B is the same if A.Equals(B) is true.

ServicePointManager class (System.Net)

ToString

Description

Manages the collection of System.Net.ServicePoint instances.

System.Net.ServicePointManager is a static class used to create, maintain, and delete instances of the System.Net.ServicePoint class.

ToString

[C#] public const int DefaultNonPersistentConnectionLimit;

[C++] public: const int DefaultNonPersistentConnectionLimit;

[VB] Public Const DefaultNonPersistentConnectionLimit As Integer

[JScript] public var DefaultNonPersistentConnectionLimit: int;

Description

The default number of nonpersistent connections allowed on a System.Net.ServicePoint connected to an HTTP/1.1 server.

ToString

[C#] public const int DefaultPersistentConnectionLimit;

[C++] public: const int DefaultPersistentConnectionLimit;

[VB] Public Const DefaultPersistentConnectionLimit As Integer

[JScript] public var DefaultPersistentConnectionLimit: int;

Description

The default number of persistent connections allowed on a System.Net.ServicePoint connected to an HTTP/1.0 server.

CertificatePolicy

ToString

[C#] public static ICertificatePolicy CertificatePolicy {get; set;}

[C++] public: _property static ICertificatePolicy* get_CertificatePolicy( );public: _property static void set_CertificatePolicy(ICertificatePolicy*);

[VB] Public Shared Property CertificatePolicy As ICertificatePolicy

[JScript] public static function get CertificatePolicy( ): ICertificatePolicy;public static function set CertificatePolicy (ICertificatePolicy);

Description

Gets or sets policy for server certificates.

When the System.Net.ServicePointManager. CertificatePolicy property is set to an System.Net.ICertificatePolicy interface instance, the System.Net.ServicePointManager uses the certificate policy defined in that instance instead of the default certificate policy.

DefaultConnectionLimit

ToString

[C#] public static int DefaultConnectionLimit {get; set;}

[C++] public: _property static int get_DefaultConnectionLimit( );public: _property static void set_DefaultConnectionLimit(int);

[VB] Public Shared Property DefaultConnectionLimit As Integer

[JScript] public static function get DefaultConnection Limit( ): int;public static function set DefaultConnectionLimit(int);

Description

The maximum number of concurrent connections allowed by a System.Net.ServicePoint instance.

The System.Net.ServicePointManager.Default ConnectionLimit property sets the default maximum number of concurrent connections that the System.Net.ServicePointManager assigns to the System.Net.ServicePoint.ConnectionLimit property when creating System.Net.ServicePoint instances.

MaxServicePointIdleTime

ToString

[C#] public static int MaxServicePointIdleTime {get; set;}

[C++] public: _property static int get_MaxServicePointIdleTime( );public: _property static void set_MaxServicePointIdleTime(int);

[VB] Public Shared Property MaxServicePointIdleTime As Integer

[JScript] public static function get MaxServicePointIdleTime( ): int;public static function set MaxServicePointIdleTime(int);

Description

Gets or sets the maximum idle time of a System.Net.ServicePoint instance.

The System.Net.ServicePointManager.MaxService PointIdleTime property sets the maximum idle time that the System.Net.ServicePointManager assigns to the System.Net.ServicePoint.MaxIdleTime property when creating System.Net.ServicePoint instances. Changes to this value will affect only System.Net.ServicePoint instances that are initialized after the value is changed.

MaxServicePoints

ToString

[C#] public static int MaxServicePoints {get; set;}

[C++] public: _property static int get_MaxService Points( );public: _property static void set_MaxServicePoints(int);

[VB] Public Shared Property MaxServicePoints As Integer

[JScript] public static function get MaxServicePoints( ): int; public static function set MaxServicePoints(int);

Description

Gets or sets the maximum number of System.Net.ServicePoint instances to maintain at any time.

When you reduce the System.Net.ServicePointManager.MaxServicePoints property below the number of System.Net.ServicePoint instances currently in existence, the System.Net.ServicePointManager deletes the System.Net.ServicePoint instances with the longest idle times. If the number of System.Net.ServicePoint instances with active connections is greater than the value of System.Net.ServicePointManager.MaxServicePoints, the System.Net.ServicePointManager will delete the System.Net.ServicePoint instances as they become idle.

FindServicePoint

[C#] public static ServicePoint FindServicePoint(Uri address);

[C++] public: static ServicePoint* FindServicePoint(Uri* address);

[VB] Public Shared Function FindServicePoint(ByVal address As Uri) As ServicePoint

[JScript] public static function FindServicePoint(address: Uri): ServicePoint; Finds an existing System.Net.Service- Point or creates a new System.Net.ServicePoint to manage communication for this request.

Description

Finds an existing System.Net.ServicePoint or creates a new System.Net.ServicePoint to manage communications with the specified System.Uri.

Return Value: The System.Net.ServicePoint that manages communications for the request.

The System.Net.ServicePointManager.FindServicePoint (System.Uri) method returns the System.Net.ServicePoint instance associated with the specified Internet host name. If no System.Net.ServicePoint exists for that host, the System.Net.ServicePointManager creates one. The System.Uri of the Internet resource to contact.

FindServicePoint

[C#] public static ServicePoint FindServicePoint(string uriString, IWebProxy proxy);

[C++] public: static ServicePoint* FindServicePoint(String* uriString, IWebProxy* proxy);

[VB] Public Shared Function FindServicePoint(ByVal uriString As String, ByVal proxy As IWebProxy) As ServicePoint

[Jscript] public static function FindServicePoint(uriString: String, proxy: IWebProxy): ServicePoint; Finds an existing System.Net.ServicePoint or creates a new System.Net.ServicePoint to manage communication for this request.

Description

Finds an existing System.Net.ServicePoint or creates a new System.Net.ServicePoint to manage communications with the specified URI.

Return Value: The System.Net.ServicePoint that manages communications for the request.

The System.Net.ServicePointManager.FindServicePoint (System.Uri) method returns the System.Net.ServicePoint instance associated with the specified Internet host name. If no System.Net.ServicePoint exists for that host, the System.Net.ServicePointManager creates one. The URI of the Internet resource to be contacted. Proxy data for this request.

FindServicePoint

[C#] public static ServicePoint FindServicePoint(Uri address, IWebProxy proxy);

[C++] public: static ServicePoint* FindServicePoint(Uri* address, IWebProxy* proxy);

[VB] Public Shared Function FindServicePoint(ByVal address As Uri, ByVal proxy As IWebProxy) As ServicePoint

[JScript] public static function FindServicePoint(address: Uri, proxy IWebProxy): ServicePoint;

Description

Finds an existing System.Net.ServicePoint or creates a new System.Net.ServicePoint to manage communications with the specified System.Uri instance.

Return Value: The System.Net.ServicePoint that manages communications for the request.

The System.Net.ServicePointManager.FindServicePoint (System.Uri) method returns the System.Net.ServicePoint instance associated with the specified Internet host name. If no System.Net.ServicePoint exists for that host, the System.Net.ServicePointManager creates one. A System.Uri instance containing the address of the Internet resource to contact. Proxy data for this request.

SocketAddress class (System.Net)

ToString

Description

Identifies a socket address.

SocketAddress

Example Syntax:

ToString

[C#] public SocketAddress(AddressFamily family);

[C++] public: SocketAddress(AddressFamily family);

[VB] Public Sub New(ByVal family As AddressFamily)

[JScript] public function SocketAddress(family: AddressFamily); Initializes a new instance of the System.Net.SocketAddress class.

Description

Initializes a new instance of the System.Net.SocketAddress class for the given address family.

SocketAddress

Example Syntax:

ToString

[C#] public SocketAddress(AddressFamily family, int size);

[C++] public: SocketAddress(AddressFamily family, int size);

[VB] Public Sub New(ByVal family As AddressFamily, ByVal size As Integer)

[JScript] public function SocketAddress(family: AddressFamily, size: int);

Description

Family

ToString

[C#] public AddressFamily Family {get;}

[C++] public: _property AddressFamily get_Family( );

[VB] Public ReadOnly Property Family As AddressFamily

[JScript] public function get Family( ): AddressFamily;

Description

Item

ToString

[C#] public byte this[int offset] {get; set;}

[C++] public: _property unsigned char get_Item(int offset); public: _property void set_Item(int offset, unsigned char);

[VB] Public Default Property Item(ByVal offset As Integer) As Byte

[JScript] returnValue=SocketAddressObject.Item(offset); SocketAddressObject.Item(offset)=returnValue;

Description

Size

ToString

[C#] public int Size {get;}

[C++] public: _property int get_Size( );

[VB] Public ReadOnly Property Size As Integer

[JScript] public function get Size( ): int;

Description

Equals

[C#] public override bool Equals(object comparand);

[C++] public: bool Equals(Object* comparand);

[VB] Overrides Public Function Equals(ByVal comparand As Object) As Boolean

[JScript] public override function Equals(comparand: Object): Boolean;

GetHashCode

[C#] public override int GetHashCode( );

[C++] public: int GetHashCode( );

[VB] Overrides Public Function GetHashCode( ) As Integer

[JScript] public override function GetHashCode( ): int;

ToString

[C#] public override string ToString( );

[C++] public: String* ToString( );

[VB] Overrides Public Function ToString( ) As String

[JScript] public override function ToString( ): String;

SocketPermission class (System.Net)

ToString

Description

Controls rights to make or accept connections on a transport address.

ToString

[C#] public const int AllPorts;

[C++] public: const int AllPorts;

[VB] Public Const AllPorts As Integer

[JScript] public var AllPorts: int;

Description

Defines a constant representing all ports.

SocketPermission

Example Syntax:

ToString

[C#] public SocketPermission(PermissionState state);

[C++] public: SocketPermission(PermissionState state);

[VB] Public Sub New(ByVal state As PermissionState)

[JScript] public function SocketPermission(state: PermissionState); Initializes a new instance of the System.Net.SocketPermission class.

Description

Initializes a new instance of the System.Net.SocketPermission class that passes all demands or fails all demands.

If the System.Net.SocketPermission instance was created with the Unrestricted value from System.Security.Permissions.PermissionState then the System.Net.SocketPermission instance will pass all demands. Any other value for state will result in a System.Net.SocketPermission instance that will fail all demands. One of the System.Security.Permissions. PermissionState values.

SocketPermission

Example Syntax:

ToString

[C#] public SocketPermission(NetworkAccess access, TransportType transport, string hostName, int portNumber);

[C++] public: SocketPermission(NetworkAccess access, TransportType transport, String* hostName, int portNumber);

[VB] Public Sub New(ByVal access As NetworkAccess, ByVal transport As TransportType, ByVal hostName As String, ByVal portNumber As Integer)

[JScript] public function SocketPermission(access: NetworkAccess, transport: TransportType, hostName: String, portNumber: int);

Description

Initializes a new instance of the System.Net.SocketPermission class for the given transport address with the specified permission. One of the System.Net.NetworkAccess values. One of the System.Net.TransportType values. The host name for the transport address. The port number for the transport address.

AcceptList

ToString

[C#] public IEnumerator AcceptList {get;}

[C++] public: _property IEnumerator* get_AcceptList( );

[VB] Public ReadOnly Property AcceptList As IEnumerator

[JScript] public function get AcceptList( ): IEnumerator;

Description

Gets a list of System.Net.EndpointPermission instances identifying the endpoints that can be accepted under this permission instance.

ConnectList

ToString

[C#] public IEnumerator ConnectList {get;}

[C++] public: _property IEnumerator* get_ConnectList( );

[VB] Public ReadOnly Property ConnectList As IEnumerator

[JScript] public function get ConnectList( ): IEnumerator;

Description

Gets a list of System.Net.EndpointPermission instances identifying the endpoints that can be connected to under this permission instance.

AddPermission

[C#] public void AddPermission(NetworkAccess access, TransportType transport, string hostName, int portNumber);

[C++] public: void AddPermission(NetworkAccess access, TransportType transport, String* hostName, int portNumber);

[VB] Public Sub AddPermission(ByVal access As NetworkAccess, ByVal transport As TransportType, ByVal hostName As String, ByVal portNumber As Integer)

[JScript] public function AddPermission(access: NetworkAccess, transport: TransportType, hostName: String, portNumber: int);

Description

Adds a permission to the set of permissions for a transport address.

Permissions are checked with a logical OR operation. One of the System.Net.NetworkAccess values. One of the System.Net.TransportType values. The host name for the transport address. The port number for the transport address.

Copy

[C#] public override IPermission Copy( );

[C++] public: IPermission* Copy( );

[VB] Overrides Public Function Copy( ) As IPermission

[JScript] public override function Copy( ): IPermission;

Description

Creates a copy of a System.Net.SocketPermission instance.

Return Value: A new instance of the System.Net.SocketPermission class that is a copy of the current instance.

FromXml

[C#] public override void FromXml(SecurityElement securityElement);

[C++] public: void FromXml(SecurityElement* securityElement);

[VB] Overrides Public Sub FromXml(ByVal securityElement As SecurityElement)

[JScript] public override function FromXml(securityElement: SecurityElement);

Description

Reconstructs a System.Net.SocketPermission instance for an XML encoding.

The System.Net.SocketPermission.FromXml(System.Security.SecurityElement) method reconstructs a System.Net.SocketPermission instance from an XML encoding defined by the System.Security.SecurityElement class. The XML encoding used to reconstruct the System.Net.SocketPermission instance.

Intersect

[C#] public override IPermission Intersect(IPermission target);

[C++] public: IPermission* Intersect(IPermission* target);

[VB] Overrides Public Function Intersect(ByVal target As IPermission) As IPermission

[JScript] public override function Intersect(target: IPermission): IPermission;

Description

Returns the logical intersection between two System.Net.SocketPermission instances.

Return Value: The System.Net.SocketPermission instance that represents the intersection of two System.Net.SocketPermission instances. The System.Net.SocketPermission instance to combine with the current instance.

IsSubsetOf

[C#] public override bool IsSubsetOf(IPermission target);

[C++] public: bool IsSubsetOf(IPermission* target);

[VB] Overrides Public Function IsSubsetOf(ByVal target As IPermission) As Boolean

[JScript] public override function IsSubsetOf(target: IPermission): Boolean;

Description

Compares two System.Net.SocketPermission instances.

Return Value: false if target is null; otherwise, an exception is thrown.

The System.Net.SocketPermission class does not support the System.Net.SocketPermission.IsSubsetOf(System.Security.IPermission) method. The second System.Net.SocketPermission instance to compare.

IsUnrestricted

[C#] public bool IsUnrestricted( );

[C++] public: _sealed bool IsUnrestricted( );

[VB] NotOverridable Public Function IsUnrestricted( ) As Boolean

[JScript] public function IsUnrestricted( ): Boolean;

Description

Checks the overall permission state of the object.

Return Value: true if the System.Net.SocketPermission instance was created with the Unrestricted value from System.Security.Pernissions.PermissionState; otherwise, false.

ToXml

[C#] public override SecurityElement ToXml( );

[C++] public: SecurityElement* ToXml( );

[VB] Overrides Public Function ToXml( ) As SecurityElement

[JScript] public override function ToXml( ): SecurityElement;

Description

Creates an XML encoding of a System.Net.SocketPermission instance and its current state.

Return Value: A System.Security.SecurityElement instance containing an XML-encoded representation of the System.Net.SocketPermission instance, including state information.

The System.Net.SocketPermission.ToXml method creates a System.Security.SecurityElement instance to encode a representation of the System.Net.SocketPermission instance, including state information, in XML.

Union

[C#] public override IPermission Union(IPermission target);

[C++] public: IPermission* Union(IPermission* target);

[VB] Overrides Public Function Union(ByVal target As IPermission) As IPermission

[JScript] public override function Union(target: IPermission): IPermission;

Description

Returns the logical union between two System.Net.SocketPermission instances.

Return Value: The System.Net.SocketPermission instance that represents the union of two System.Net.SocketPermission instances. The System.Net.SocketPermission instance to combine with the current instance.

SocketPermissionAttribute class (System.Net)

Union

Description

Enables security actions for System.Net.SocketPermission to be applied to code using declarative security. This class cannot be inherited.

SocketPermissionAttribute

Example Syntax:

Union

[C#] public SocketPermissionAttribute(SecurityAction action);

[C++] public: SocketPermissionAttribute(SecurityAction action);

[VB] Public Sub New(ByVal action As SecurityAction)

[JScript] public function SocketPermissionAttribute(action: SecurityAction);

Description

Initializes a new instance of the System.Net.SocketPermissionAttribute class with the specified System.Security.Permissions.SecurityAction value. One of the System.Security.Permissions.SecurityAction values.

Access

Union

[C#] public string Access {get; set;}

[C++] public: _property String* get_Access( );public: _property void set_Access(String*);

[VB] Public Property Access As String

[JScript] public function get Access( ): String;public function set Access(String);

Description

Gets or sets the network access method allowed by this permission instance.

Action

Host

Union

Description

The DNS host name or IP address associated with this permission instance.

Port

Union

[C#] public string Port {get; set;}

[C++] public: _property String* get_Port( );public: _property void set_Port(String*);

[VB] Public Property Port As String

[JScript] public function get Port( ): String;public function set Port(String);

Description

Gets or sets the transport type associated with this permission instance.

Transport

Union

[C#] public string Transport {get; set;}

[C++] public: _property String* get_Transport( ); public: _property void set_Transport(String*);

[VB] Public Property Transport As String
[JScript] public function get Transport( ): String;public function set Transport(String);

Description

Gets or sets the transport type associated with this permission instance.

TypeId

Unrestricted

CreatePermission

[C#] public override IPermission CreatePermission( );
[C++] public: IPermission* CreatePermission( );
[VB] Overrides Public Function CreatePermission( ) As IPermission
[JScript] public override function CreatePermission( ): IPermission;

Description

Creates and returns a new instance of the System.Net.SocketPermission class.

Return Value: An instance of the System.Net.SocketPermission class corresponding to the security declaration.

The System.Net.SocketPermissionAttribute.CreatePermission method is called by the security system, not by application code.

TransportType enumeration (System.Net)

ToString

Description

Defines transport types for the System.Net.SocketPermission and System.Net.Sockets.Socket classes.

The System.Net.TransportType enumeration defines transport types for the System.Net.SocketPermission and System.Net.Sockets.Socket classes.

ToString

[C#] public const TransportType All;
[C++] public: const TransportType All;
[VB] Public Const All As TransportType
[JScript] public var All: TransportType;

Description

All transport types.

ToString

[C#] public const TransportType Connectionless;
[C++] public: const TransportType Connectionless;
[VB] Public Const Connectionless As TransportType
[JScript] public var Connectionless: TransportType;

Description

The transport type is connectionless, such as UDP.

ToString

[C#] public const TransportType ConnectionOriented;
[C++] public: const TransportType ConnectionOriented;
[VB] Public Const ConnectionOriented As TransportType
[JScript] public var ConnectionOriented: TransportType;

Description

The transport is connection oriented, such as TCP.

ToString

[C#] public const TransportType Tcp;
[C++] public: const TransportType Tcp;
[VB] Public Const Tcp As TransportType
[JScript] public var Tcp: TransportType;

Description

TCP transport.

ToString

[C#] public const TransportType Udp;
[C++] public: const TransportType Udp;
[VB] Public Const Udp As TransportType
[JScript] public var Udp: TransportType;

Description

UDP transport.

WebClient class (System.Net)

ToString

Description

Provides common methods for sending data to and receiving data from a resource identified by a URI. This class cannot be inherited.

The System.Net.WebClient class provides common methods for sending data to or receiving data from any local, Intranet, or Internet resource identified by a URI.

WebClient

Example Syntax:

ToString

[C#] public WebClient( );
[C++] public: WebClient( );
[VB] Public Sub New( )
[JScript] public function WebClient( );

Description

Initializes a new instance of the System.Net.WebClient class.

The default constructor creates a new instance of the System.Net.WebClient class with all fields set to null BaseAddress ToString

[C#] public string BaseAddress {get; set;}
[C++] public: _property String* get_BaseAddress( ); public: _property void set_BaseAddress(String*);
[VB] Public Property BaseAddress As String
[JScript] public function get BaseAddress( ): String;public function set BaseAddress(String);

Description

Gets or sets the base URI for requests made by a System.Net.WebClient

The System.Net.WebClient.BaseAddress property contains a base URI that is combined with the relative address specified when calling an upload or download method.

Container

Credentials

ToString

Description

Gets or sets the network credentials used for authenticating the request with the Internet resource.

The System.Net.WebClient.Credentials property contains the authentication credentials required to access the Internet resource.

DesignMode

Events

Headers

ToString

Description

Gets or sets a collection of header name/value pairs associated with the request.

The System.Net.WebClient.Headers property contains a System.Net.WebHeaderCollection instance containing header information the System.Net.WebClient sends to the Internet resource. This is an unrestricted collection of headers, so setting headers that are restricted by System.Net.

WebRequest descendants like System.Net.HttpWebRequest is allowed.

QueryString

ToString

[C#] public NameValueCollection QueryString {get; set;}

[C++] public: _property NameValueCollection* get_QueryString( );public: _property void set_QueryString(NameValueCollection*);

[VB] Public Property QueryString As NameValueCollection

[JScript] public function get QueryString( ): NameValueCollection;public function set QueryString(NameValueCollection);

Description

Gets or sets a collection of query name/value pairs associated with the request.

The System.Net.WebClient.QueryString property contains a System.Collections.Specialized.Name ValueCollection instance containing name/value pairs that are appended to the URI as a query string. The contents of the System.Net.WebClient.QueryString property are preceded by a question mark (?), and each name/value pair is separated by an ampersand (&).

ResponseHeaders

ToString

[C#] public WebHeaderCollection ResponseHeaders {get;}

[C++] public: _property WebHeaderCollection* get_ResponseHeaders( );

[VB] Public ReadOnly Property ResponseHeaders As WebHeaderCollection

[JScript] public function get ResponseHeaders( ): WebHeaderCollection;

Description

Gets a collection of header name/value pairs associated with the response.

The System.Net.WebClient.ResponseHeaders property contains a System.Net.WebHeaderCollection instance containing header information the System.Net.WebClient receives from the Internet resource.

Site

DownloadData

[C#] public byte[ ] DownloadData(string address);

[C++] public: unsigned char DownloadData(String* address) _gc[ ];

[VB] Public Function DownloadData(ByVal address As String) As Byte( )

[JScript] public function DownloadData(address: String): Byte[ ];

Description

Downloads data from a resource identified by a URI.

Return Value: A byte array containing the data downloaded from the resource specified by address.

The System.Net.WebClient.DownloadData(System.String) method downloads the data from the URI specified by address to a local byte array. The URI from which the data will be downloaded.

DownloadFile

[C#] public void DownloadFile(string address, string fileName);

[C++] public: void DownloadFile(String* address, String* fileName);

[VB] Public Sub DownloadFile(ByVal address As String, ByVal fileName As String)

[JScript] public function DownloadFile(address: String, fileName: String);

Description

Downloads data from a resource identified by a URI to a local file.

The System.Net.WebClient.DownloadFile(System.String,System.String) method downloads the data from the URI specified by address to a local file. The URI from which the data will be downloaded. The name of the local file to receive the data.

OpenRead

[C#] public Stream OpenRead(string address);

[C++] public: Stream* OpenRead(String* address);

[VB] Public Function OpenRead(ByVal address As String) As Stream

[JScript] public function OpenRead(address: String): Stream;

Description

Opens a readable stream for the data downloaded from a resource identified by a URI.

Return Value: A System.IO.Stream used to read data from a resource.

The System.Net.WebClient.OpenRead(System.String) method creates a System.IO.Stream instance used to access the data specified by address. The URI from which the data will be downloaded.

OpenWrite

[C#] public Stream OpenWrite(string address);

[C++] public: Stream* OpenWrite(String* address);

[VB] Public Function OpenWrite(ByVal address As String) As Stream

[JScript] public function OpenWrite(address: String): Stream; Opens a stream for writing data to a resource identified by a URI.

Description

Opens a stream for writing data to the specified resource.

Return Value: A System.IO.Stream used to write data to the resource.

The System.Net.WebClient.OpenWrite(System.String) method returns a writable stream that is used to send data to a resource. The underlying request is made with the POST method. The URI of the resource to receive the data.

OpenWrite

[C#] public Stream OpenWrite(string address, string method);

[C++] public: Stream* OpenWrite(String* address, String* method);

[VB] Public Function OpenWrite(ByVal address As String, ByVal method As String) As Stream

[JScript] public function OpenWrite(address: String, method: String): Stream;

Description

Opens a stream for writing data to the specified resource identified by a URI using the specified method.

Return Value: A System.IO.Stream used to write data to the resource.

The System.Net.WebClient.OpenWrite(System.String) method returns a writable stream that is used to send data to a resource. The underlying request is made with the method specified in the method parameter. The URI of the resource to receive the data. The method used to send the data to the resource.

UploadData

[C#] public byte[ ] UploadData(string address, byte[ ] data);

[C++] public: unsigned char UploadData(String* address, unsigned char data _gc[ ]) _gc[ ];

[VB] Public Function UploadData(ByVal address As String, ByVal Data( ) As Byte) As Byte( )

[JScript] public function UploadData(address: String, data: Byte[ ]): Byte[ ];

Uploads a data buffer to a resource identified by a URI.

Description

Uploads a data buffer to the resource identified by a URI.

Return Value: An array of bytes containing the body of any response from the resource.

The System.Net.WebClient.UploadData(System.String, System.Byte[ ]) method sends a data buffer to a resource. The underlying request is made using the POST method. The URI of the resource to receive the data. The data buffer to send to the resource.

UploadData

[C#] public byte[ ] UploadData(string address, string method, byte[ ] data);

[C++] public: unsigned char UploadData(String* address, String* method, unsigned char data_gc[ ]) _gc[ ];

[VB] Public Function UploadData(ByVal address As String, ByVal method As String, ByVal Data( ) As Byte) As Byte( )

[JScript] public function UploadData(address: String, method: String, data: Byte[ ]): Byte[ ];

Description

Uploads a data buffer to the specified resource identified by a URI using the specified method.

Return Value: An array of bytes containing the body of any response from the resource.

The System.Net.WebClient.UploadData(System.String, System.Byte[ ]) method sends a data buffer to a resource using the method specified in the method parameter, and returns any response from the server. The URI of the resource to receive the data. The method used to send the data to the resource. The data buffer to send to the resource.

UploadFile

[C#] public byte[ ] UploadFile(string address, string fileName);

[C++] public: unsigned char UploadFile(String* address, String* fileName) _gc[ ];

[VB] Public Function UploadFile(ByVal address As String, ByVal fileName As String) As Byte( )

[JScript] public function UploadFile(address: String, fileName: String): Byte[ ]; Uploads a local file to a resource identified by a URI.

Description

Uploads the specified local file to the resource identified by a URI.

Return Value: An array of bytes containing the body of any response from the resource.

The System.Net.WebClient.UploadFile(System.String, System.String) method sends a local file to a resource. The underlying request is made using the POST method. The URI of the resource to receive the file. The file to send to the resource.

UploadFile

[C#] public byte[ ] UploadFile(string address, string method, string fileName);

[C++] public: unsigned char UploadFile(String* address, String* method, String* fileName) _gc[ ];

[VB] Public Function UploadFile(ByVal address As String, ByVal method As String, ByVal fileName As String) As Byte( )

[JScript] public function UploadFile(address: String, method: String, fileName: String): Byte[ ];

Description

Uploads the specified local file to the specified resource identified by a URI using the specified method.

Return Value: An array of bytes containing the body of any response from the resource.

The System.Net.WebClient.UploadFile(System.String, System.String) method sends a local file to a resource using the method specified in the method parameter, and returns any response from the server. The URI of the resource to receive the file. The method used to send the file to the resource. The file to send to the resource.

UploadValues

[C#] public byte[ ] UploadValues(string address, NameValueCollection data);

[C++] public: unsigned char UploadValues(String* address, NameValueCollection* data) _gc[ ];

[VB] Public Function UploadValues(ByVal address As String, ByVal data As NameValueCollection) As Byte( )

[JScript] public function UploadValues(address: String, data: NameValueCollection): Byte[ ]; Uploads a name/value collection to a resource identified by a URI.

Description

Uploads the specified name/value collection to the specified resource identified by a URI.

Return Value: An array of bytes containing the body of any response from the resource.

The System.Net.WebClient.UploadValues(System.String, System.Collections.Specialized. NameValueCollection) method sends a System.Collections.Specialized. NameValueCollection to an Internet server. The underlying request is made using the POST method. The URI of the resource to receive the collection. The System.Collections.Specialized. NameValueCollection to send to the resource.

UploadValues

[C#] public byte[ ] UploadValues(string address, string method, NameValueCollection data);

[C++] public: unsigned char UploadValues(String* address, String* method, NameValueCollection* data) _gc[ ];

[VB] Public Function UploadValues(ByVal address As String, ByVal method As String, ByVal data As NameValueCollection) As Byte( )

[JScript] public function UploadValues(address: String, method: String, data: NameValueCollection): Byte[ ];

Description

Uploads the specified name/value collection to the specified resource identified by a URI using the specified method.

Return Value: An array of bytes containing the body of any response from the resource.

The System.Net.WebClient.UploadValues(System.String, System.Collections.Specialized. NameValueCollection) method sends a System.Collections.Specialized. NameValueCollection to a resource using the method specified in the method parameter, and returns any response from the server. The URI of the resource to receive the collection. The method used to send the file to the resource. The System.Collections. Specialized.NameValueCollection to send to the resource.

WebException class (System.Net)

UploadValues

Description

The exception that is thrown when an error occurs while accessing the network through a pluggable protocol.

The System.Net.WebException class is thrown by classes descended from System.Net.WebRequest and System.Net.WebResponse that implement pluggable protocols for accessing the Internet.

WebException

Example Syntax:

UploadValues

[C#] public WebException( );

[C++] public: WebException( );

[VB] Public Sub New( )

[JScript] public function WebException( ); Initializes a new instance of the System.Net.WebException class.

Description

Initializes a new instance of the System.Net.WebException class.

The default constructor initializes a new instance of the System.Net.WebException class with all fields set to null WebException Example Syntax:

UploadValues

[C#] public WebException(string message);

[C++] public: WebException(String* message);

[VB] Public Sub New(ByVal message As String)

[JScript] public function WebException(message: String);

Description

Initializes a new instance of the System.Net.WebException class with the specified error message.

The System.Net.WebException instance is initialized with the System.Exception.Message property set to the value of message. The text of the error message.

WebException

Example Syntax:

UploadValues

[C#] protected WebException(SerializationInfo serializationInfo, StreamingContext streamingContext);

[C++] protected: WebException(SerializationInfo* serializationInfo, StreamingContext streamingContext);

[VB] Protected Sub New(ByVal SerializationInfo As SerializationInfo, ByVal streamingcontext As StreamingContext)

[JScript] protected function WebException(SerializationInfo: SerializationInfo, streamingcontext: StreamingContext);

WebException

Example Syntax:

UploadValues

[C#] public WebException(string message, Exception innerException);

[C++] public: WebException(String* message, Exception* innerException);

[VB] Public Sub New(ByVal message As String, ByVal innerException As Exception)

[JScript] public function WebException(message: String, innerException: Exception);

Description

Initializes a new instance of the System.Net.WebException class with the specified error message and nested exception.

The System.Net.WebException instance is initialized with the System.Exception.Message property set to the value of message and the System.Exception.InnerException property set to the value of innerException. The text of the error message. A nested exception.

WebException

Example Syntax:

UploadValues

[C#] public WebException(string message, WebExceptionStatus status);

[C++] public: WebException(String* message, WebExceptionStatus status);

[VB] Public Sub New(ByVal message As String, ByVal status As WebExceptionStatus)

[JScript] public function WebException(message: String, status WebExceptionStatus);

Description

Initializes a new instance of the System.Net.WebException class with the specified error message and status.

The System.Net.WebException instance is initialized with the System.Exception.Message property set to the value of message and the System.Net.WebException.Status property set to the value of status. The text of the error message. One of the System.Net.WebExceptionStatus values.

WebException

Example Syntax:

UploadValues

[C#] public WebException(string message, Exception innerException, WebExceptionStatus status, WebResponse response);

[C++] public: WebException(String* message, Exception* innerException, WebExceptionStatus status, WebResponse* response);

[VB] Public Sub New(ByVal message As String, ByVal innerException As Exception, ByVal status As WebExceptionStatus, ByVal response As WebResponse)

[JScript] public function WebException(message: String, innerException: Exception, status: WebExceptionStatus, response: WebResponse);

Description

Initializes a new instance of the System.Net.WebException class with the specified error message, nested exception, status, and response.

The System.Net.WebException instance is initialized with the System.Exception.Message property set to the value of message, the System.Exception.InnerException property set to the value of innerException, the System.Net.WebException.Status property set to the value of status, and the System.Net.WebException.Response property set to response. The text of the error message. A nested exception. One of the System.Net.WebExceptionStatus values. A System.Net.WebResponse instance containing the response from the remote host.

HelpLink

HResult

InnerException

Message

Response

UploadValues

Description

Gets the response that the remote host returned.

Some Internet protocols, such as HTTP, return otherwise valid responses indicating that an error has occurred at the protocol level. When the response to an Internet request indicates an error, System.Net.WebRequest.GetResponse sets the System.Net.WebException.Status property to System.Net.WebExceptionStatus.ProtocolError and provides the System.Net.WebResponse containing the error message in the System.Net.WebException.Response property of the System.Net.WebException that was thrown. The application can examine the System.Net.WebResponse to determine the actual error.

Source

StackTrace

Status

UploadValues

Description

Gets the status of the response.

The System.Net.WebException.Status property indicates the reason for the System.Net.WebException.

TargetSite

ISerializable.GetObjectData

[C#] void ISerializable.GetObjectData(SerializationInfo SerializationInfo, StreamingContext streamingContext);

[C++] void ISerializable::GetObjectData(SerializationInfo* SerializationInfo, StreamingContext streamingContext);

[VB] Sub GetObjectData(ByVal SerializationInfo As SerializationInfo, ByVal streamingContext As StreamingContext) Implements ISerializable.GetObjectData

[JScript] function ISerializable.GetObjectData(SerializationInfo: SerializationInfo, streamingcontext: StreamingContext);

WebExceptionStatus enumeration (System.Net)

ToString

Description

Defines status codes for the System.Net.WebException class.

The System.Net.WebExceptionStatus enumeration defines the status codes assigned to the System.Net.WebException.Status property.

ToString

[C#] public const WebExceptionStatus ConnectFailure;

[C++] public: const WebExceptionStatus ConnectFailure;

[VB] Public Const ConnectFailure As WebExceptionStatus

[JScript] public var ConnectFailure: WebExceptionStatus;

Description

The remote service point could not be contacted at the transport level.

ToString

[C#] public const WebExceptionStatus ConnectionClosed;

[C++] public: const WebExceptionStatus ConnectionClosed;

[VB] Public Const ConnectionClosed As WebExceptionStatus

[JScript] public var ConnectionClosed: WebExceptionStatus;

Description

The connection was prematurely closed.

ToString

[C#] public const WebExceptionStatus KeepAliveFailure;

[C++] public: const WebExceptionStatus KeepAliveFailure;

[VB] Public Const KeepAliveFailure As WebExceptionStatus

[JScript] public var KeepAliveFailure: WebExceptionStatus;

Description

The connection for a request that specifies the Keep-alive header was closed unexpectedly.

ToString

[C#] public const WebExceptionStatus NameResolutionFailure;

[C++] public: const WebExceptionStatus NameResolutionFailure;

[VB] Public Const NameResolutionFailure As WebExceptionStatus

[JScript] public var NameResolutionFailure: WebExceptionStatus;

Description

The name resolver service could not resolve the host name.

ToString

[C#] public const WebExceptionStatus Pending;

[C++] public: const WebExceptionStatus Pending;

[VB] Public Const Pending As WebExceptionStatus

[JScript] public var Pending: WebExceptionStatus;

Description

An internal asynchronous request is pending.

ToString

[C#] public const WebExceptionStatus PipelineFailure;

[C++] public: const WebExceptionStatus PipelineFailure;

[VB] Public Const PipelineFailure As WebExceptionStatus

[JScript] public var PipelineFailure: WebExceptionStatus;

Description

ToString

[C#] public const WebExceptionStatus ProtocolError;

[C++] public: const WebExceptionStatus ProtocolError;

[VB] Public Const ProtocolError As WebExceptionStatus

[JScript] public var ProtocolError: WebExceptionStatus;

Description

The response received from the server was complete but indicated a protocol-level error. For example, an HTTP protocol error such as 401 Access Denied would use this status.

ToString

[C#] public const WebExceptionStatus ProxyNameResolutionFailure;

[C++] public: const WebExceptionStatus ProxyNameResolutionFailure;

[VB] Public Const ProxyNameResolutionFailure As WebExceptionStatus

[JScript] public var ProxyNameResolutionFailure: WebExceptionStatus;

Description

The name resolver service could not resolve the proxy host name.

ToString

[C#] public const WebExceptionStatus ReceiveFailure;

[C++] public: const WebExceptionStatus ReceiveFailure;

[VB] Public Const ReceiveFailure As WebExceptionStatus

[JScript] public var ReceiveFailure: WebExceptionStatus;

Description

A complete response was not received from the remote server.

ToString

[C#] public const WebExceptionStatus RequestCanceled;

[C++] public: const WebExceptionStatus RequestCanceled;

[VB] Public Const RequestCanceled As WebExceptionStatus

[JScript] public var RequestCanceled: WebExceptionStatus;

Description

The request was canceled or the System.Net.WebRequest.Abort method was called.

ToString

[C#] public const WebExceptionStatus SecureChannelFailure;

[C++] public: const WebExceptionStatus SecureChannelFailure;

[VB] Public Const SecureChannelFailure As WebExceptionStatus

[Jscript] public var SecureChannelFailure: WebExceptionStatus;

Description

An error occurred in a secure channel link.

ToString

[C#] public const WebExceptionStatus SendFailure;

[C++] public: const WebExceptionStatus SendFailure;

[VB] Public Const SendFailure As WebExceptionStatus

[JScript] public var SendFailure: WebExceptionStatus;

Description

A complete request could not be sent to the remote server.

ToString

[C#] public const WebExceptionStatus ServerProtocolViolation;

[C++] public: const WebExceptionStatus ServerProtocolViolation;

[VB] Public Const ServerProtocolViolation As WebExceptionStatus

[JScript] public var ServerProtocolViolation: WebExceptionStatus;

Description

The server response was not a valid HTTP response.

ToString

[C#] public const WebExceptionStatus Success;

[C++] public: const WebExceptionStatus Success;

[VB] Public Const Success As WebExceptionStatus

[JScript] public var Success: WebExceptionStatus;

Description

No error was encountered. This is the default value for System.Net.WebException.Status.

ToString

[C#] public const WebExceptionStatus Timeout;

[C++] public: const WebExceptionStatus Timeout;

[VB] Public Const Timeout As WebExceptionStatus

[JScript] public var Timeout: WebExceptionStatus;

Description

No response was received during the timeout period for a request.

ToString

[C#] public const WebExceptionStatus TrustFailure;

[C++] public: const WebExceptionStatus TrustFailure;

[VB] Public Const TrustFailure As WebExceptionStatus

[JScript] public var TrustFailure: WebExceptionStatus;

Description

A server certificate could not be validated.

WebHeaderCollection class (System.Net)

ToString

Description

Contains protocol headers associated with a request or response.

The System.Net.WebHeaderCollection class is generally accessed through System.Net.WebRequest.Headers or System.Net.WebResponse.Headers. Some common headers are considered restricted and are either exposed directly by the API (such as Content-Type) or protected by the system and cannot be changed.

WebHeaderCollection

Example Syntax:

ToString

[C#] public WebHeaderCollection( );

[C++] public: WebHeaderCollection( );

[VB] Public Sub New( )

[JScript] public function WebHeaderCollection( ); Initializes a new instance of the System.Net.WebHeaderCollection class.

Description

Initializes a new instance of the System.Net.WebHeaderCollection class.

WebHeaderCollection

Example Syntax:

ToString

[C#] protected WebHeaderCollection(SerializationInfo SerializationInfo, StreamingContext streamingContext);

[C++] protected: WebHeaderCollection(SerializationInfo* SerializationInfo, StreamingContext streamingContext);

[VB] Protected Sub New(ByVal SerializationInfo As SerializationInfo, ByVal streamingcontext As StreamingContext)

[JScript] protected function WebHeaderCollection(serializationInfo: SerializationInfo, streamingContext: StreamingContext);

Description

Initializes a new instance of the System.Net.WebHeaderCollection class from the specified instances of the System.Runtime.Serialization.SerializationInfo and System.Runtime.Serialization.StreamingContext classes.

This constructor implements the System.Runtime.Serialization.ISerializable interface for the System.Net.WebHeaderCollection class. A System.Runtime.Serialization.SerializationInfo containing the information required to serialize the System.Net.WebHeaderCollection. A System.Runtime.Serialization.StreamingContext containing the source of the serialized stream associated with the new System.Net.WebHeaderCollection.

AllKeys

Count

IsReadOnly

Item

Item

Keys

Add

[C#] public void Add(string header);

[C++] public: void Add(String* header);

[VB] Public Sub Add(ByVal header As String)

[JScript] public function Add(header: String);

Description

Inserts the specified header into the collection.

The System.Net.WebHeaderCollection.Add(System.String,System.String) method inserts a new header into the list of header name/value pairs. The header value must be specified in the format "header:value". The header to add, with the name and value separated by a colon.

Add

[C#] public override void Add(string name, string value);

[C++] public: void Add(String* name, String* value);

[VB] Overrides Public Sub Add(ByVal name As String, ByVal value As String)

[JScript] public override function Add(name: String, value: String); Inserts a new header into the collection.

Description

Inserts a new header with the specified name and value into the collection.

The System.Net.WebHeaderCollection.Add(System-.String,System.String) method inserts a new header into the list of header name/value pairs. The header to add to the collection. The content of the header.

AddWithoutValidate

[C#] protected void AddWithoutValidate(string headerName, string headerValue);

[C++] protected: void AddWithoutValidate(String* headerName, String* headerValue);

[VB] Protected Sub AddWithoutValidate(ByVal headerName As String, ByVal headerValue As String)

[JScript] protected function AddWithoutValidate(headerName: String, headerValue: String);

Description

Inserts a header into the collection without checking whether the header is on the restricted header list.

The System.Net.WebHeaderCollection.AddWithout Validate(System.String,System.String) method adds a header to the collection without checking whether the header is on the restricted header list. The header to add to the collection. The content of the header.

GetValues

[C#] public override string[ ] GetValues(string header);

[C++] public: String* GetValues(String* header) _gc[ ];

[VB] Overrides Public Function GetValues(ByVal header As String) As String( )

[JScript] public override function GetValues(header: String): String[ ]; Gets an array of header values stored in a header.

Description

Gets an array of header values stored in a header.

Return Value: An array of header strings. System.Net.WebHeaderCollection.GetValues(System.String) returns the contents of the specified header as an array. The header to return.

IsRestricted

[C#] public static bool IsRestricted(string headerName);

[C++] public: static bool IsRestricted(String* headerName);

[VB] Public Shared Function IsRestricted(ByVal headerName As String) As Boolean

[JScript] public static function IsRestricted(headerName: String): Boolean;

Description

Tests whether the specified HTTP header can be set.

Return Value: true if the header is restricted; otherwise false.

The System.Net.WebHeaderCollection.IsRestricted(System.String) method returns true to indicate that a header is restricted and must be set using properties instead of directly. The restricted headers are: Accept Connection Date Expect Host Range Referer Tests if access to the HTTP header with the provided name is accessible for setting. The header to test.

OnDeserialization

[C#] public override void OnDeserialization(object sender);

[C++] public: void OnDeserialization(Object* sender);

[VB] Overrides Public Sub OnDeserialization(ByVal sender As Object)

[JScript] public override function OnDeserialization(sender: Object);

Description

Remove

[C#] public override void Remove(string name);

[C++] public: void Remove(String* name);

[VB] Overrides Public Sub Remove(ByVal name As String)

[JScript] public override function Remove(name: String);

Description

Removes the specified header from the collection.

System.Net.WebHeaderCollection.Remove(System.String) deletes the specified header from the collection. If the same header was added multiple times with System.Net.WebHeaderCollection.Add(System.String,System.String), a single call to System.Net.WebHeaderCollection.Remove (System.String) deletes all of the headers. The name of the header to remove from the collection.

Set

[C#] public override void Set(string name, string value);

[C++] public: void Set(String* name, String* value);

[VB] Overrides Public Sub Set(ByVal name As String, ByVal value As String)

[JScript] public override function Set(name: String, value: String);

Description

Sets the specified header to the specified value.

The System.Net.WebHeaderCollection.Set(System.String,System.String) method inserts a new header into the list of header name/value pairs. The header value must be specified in the format header: value. The header to set. The content of the header to set.

ISerializable.GetObjectData

[C#] void ISerializable.GetObjectData(SerializationInfo SerializationInfo, StreamingContext streamingContext);

[C++] void ISerializable::GetObjectData(SerializationInfo* SerializationInfo, StreamingContext streamingContext);

[VB] Sub GetObjectData(ByVal SerializationInfo As SerializationInfo, ByVal streamingcontext As StreamingContext) Implements ISerializable.GetObjectData

[JScript] function ISerializable.GetObjectData(SerializationInfo: SerializationInfo, streamingcontext: StreamingContext);

ToByteArray

[C#] public byte[ ] ToByteArray( );

[C++] public: unsigned char ToByteArray( ) _gc[ ];

[VB] Public Function ToByteArray( ) As Byte( )

[JScript] public function ToByteArray( ): Byte[ ];

Description

Obsolete.

ToString

[C#] public override string ToString( );

[C++] public: String* ToString( );

[VB] Overrides Public Function ToString( ) As String

[JScript] public override function ToString( ): String;

Description

Obsolete.

WebPermission class (System.Net)

ToString

Description

Controls rights to access an Internet resource.

WebPermission

Example Syntax:

ToString

[C#] public WebPermission( );

[C++] public: WebPermission( );

[VB] Public Sub New( )

[JScript] public function WebPermission( );

Description

Creates a new instance of the System.Net.WebPermission class.

WebPermission

Example Syntax:

ToString

[C#] public WebPermission(PermissionState state);

[C++] public: WebPermission(PermissionState state);

[VB] Public Sub New(ByVal state As PermissionState)

[JScript] public function WebPermission(state: PermissionState); Creates a new instance of the System.Net.WebPermission class.

Description

Creates a new instance of the System.Net.WebPermission class that passes all demands or fails all demands.

If System.Net.WebPermission is created with the Unrestricted value from System.Security.Permissions.PermissionState then the System.Net.WebPermission instance will pass all demands. Any other value for state will result in a System.Net.WebPermission instance that will fail all demands. One of the System.Security.Permissions.PermissionState values.

WebPermission

Example Syntax:

ToString

[C#] public WebPermission(NetworkAccess access, Regex uriRegex);

[C++] public: WebPermission(NetworkAccess access, Regex* uriRegex);

[VB] Public Sub New(ByVal access As NetworkAccess, ByVal uriRegex As Regex)

[JScript] public function WebPermission(access: NetworkAccess, uriRegex Regex);

Description

Initializes a new instance of the System.Net.WebPermission class with the specified access rights for the specified URI regular expression. The access right to grant. A regular expression describing the URI to grant the access right to.

WebPermission

Example Syntax:

ToString

[C#] public WebPermission(NetworkAccess access, string uriString);

[C++] public: WebPermission(NetworkAccess access, String* uriString);

[VB] Public Sub New(ByVal access As NetworkAccess, ByVal uriString As String)

[JScript] public function WebPermission(access: NetworkAccess, uriString: String);

Description

Initializes a new instance of the System.Net.WebPermission class with the specified access rights for the specified URI. The access right to grant. A regular expression describing the URI to grant the access right to.

AcceptList

ToString

[C#] public IEnumerator AcceptList {get;}

[C++] public: _property IEnumerator* get_AcceptList( );

[VB] Public ReadOnly Property AcceptList As IEnumerator

[JScript] public function get AcceptList( ): IEnumerator;

Description

Returns the enumeration of permissions to export a local URI.

ConnectList

ToString

[C#] public IEnumerator ConnectList {get;}

[C++] public: _property IEnumerator* get_ConnectList( );

[VB] Public ReadOnly Property ConnectList As IEnumerator

[JScript] public function get ConnectList( ): IEnumerator;

Description

Returns the enumeration of permissions to connect a remote URI.

AddPermission

[C#] public void AddPermission(NetworkAccess access, Regex uriRegex);

[C++] public: void AddPermission(NetworkAccess access, Regex* uriRegex);

[VB] Public Sub AddPermission(ByVal access As NetworkAccess, ByVal uriRegex As Regex)

[JScript] public function AddPermission(access: NetworkAccess, uriRegex Regex);

Description

Adds a new instance of the System.Net.WebPermission class with the specified access rights for the specified URI pattern. The access right to grant. A regular expression describing the URI to grant the access right to.

AddPermission

[C#] public void AddPermission(NetworkAccess access, string uriString);

[C++] public: void AddPermission(NetworkAccess access, String* uriString);

[VB] Public Sub AddPermission(ByVal access As NetworkAccess, ByVal uriString As String)

[JScript] public function AddPermission(access: NetworkAccess, uriString: String); Adds a new instance of the System.Net.WebPermission class with the specified access rights for the specified URI.

Description

Adds a new instance of the System.Net.WebPermission class with the specified access rights for the specified URI. The access right to grant. A string describing the URI to grant the access right to.

Copy

[C#] public override IPermission Copy( );

[C++] public: IPermission* Copy( );

[VB] Overrides Public Function Copy( ) As IPermission

[JScript] public override function Copy( ): IPermission;

Description

Creates a copy of a System.Net.WebPermission instance.

Return Value: A new instance of the System.Net.WebPermission class that is a copy of the current instance.

FromXml

[C#] public override void FromXml(SecurityElement securityElement);

[C++] public: void FromXml(SecurityElement* securityElement);

[VB] Overrides Public Sub FromXml(ByVal securityElement As SecurityElement)

[JScript] public override function FromXml(securityElement: SecurityElement);

Description

Reconstructs a System.Net.WebPermission instance from an XML encoding.

The System.Net.WebPermission.FromXml(System.Security.SecurityElement) method reconstructs a System.Net.WebPermission instance from an XML encoding defined by the System.Security.SecurityElement class. The XML encoding to use to reconstruct the System.Net.WebPermission instance.

Intersect

[C#] public override IPermission Intersect(IPermission target);

[C++] public: IPermission* Intersect(IPermission* target);

[VB] Overrides Public Function Intersect(ByVal target As IPermission) As IPermission

[JScript] public override function Intersect(target: IPermission): IPermission;

Description

Returns the logical intersection between two System.Net.WebPermission instances.

Return Value: System.Net.WebPermission instance that represents the intersection of two System.Net.WebPermission instances. The System.Net.WebPermission instance to combine with the current instance.

IsSubsetOf

[C#] public override bool IsSubsetOf(IPermission target);

[C++] public: bool IsSubsetOf(IPermission* target);

[VB] Overrides Public Function IsSubsetOf(ByVal target As IPermission) As Boolean

[JScript] public override function IsSubsetOf(target: IPermission): Boolean;

Description

Compares two System.Net.WebPermission instances.

Return Value: false if target is null; otherwise an exception is thrown.

The System.Net.WebPermission.IsSubsetOf(System.Security.IPermission) method is not supported by the System.Net.WebPermission class. The second System.Net.WebPermission instance to compare.

IsUnrestricted

[C#] public bool IsUnrestricted( );

[C++] public: _sealed bool IsUnrestricted( );

[VB] NotOverridable Public Function IsUnrestricted( ) As Boolean

[JScript] public function IsUnrestricted( ): Boolean;

Description

Checks the overall permission state of the object.

Return Value: true if the System.Net.WebPermission instance was created with the Unrestricted value from System.Security.Permissions.PermissionState; otherwise, false.

ToXml

[C#] public override SecurityElement ToXml( );

[C++] public: SecurityElement* ToXml( );

[VB] Overrides Public Function ToXml( ) As SecurityElement

[JScript] public override function ToXml( ): SecurityElement;

Description

Creates an XML encoding of a System.Net.WebPermission instance and its current state.

Return Value: A System.Security.SecurityElement instance containing an XML-encoded representation of the System.Net.WebPermission instance, including state information.

The System.Net.WebPermission.ToXml method creates a System.Security.SecurityElement instance to XML-encode a representation of the System.Net.WebPermission instance, including state information.

Union

[C#] public override IPermission Union(IPermission target);

[C++] public: IPermission* Union(IPermission* target);

[VB] Overrides Public Function Union(ByVal target As IPermission) As IPermission

[JScript] public override function Union(target: IPermission): IPermission;

Description

Returns the logical union between two System.Net.WebPermission instances.

Return Value: System.Net.WebPermission instance that represents the union of two System.Net.WebPermission instances. The System.Net.WebPermission instance to combine with the current instance.

WebPermissionAttribute class (System.Net)

Union

Description

Enables security actions for System.Net.WebPermission to be applied to code using declarative security. This class cannot be inherited.

WebPermissionAttribute

Example Syntax:

Union

[C#] public WebPermissionAttribute(SecurityAction action);

[C++] public: Web PermissionAttribute(SecurityAction action);

[VB] Public Sub New(ByVal action As SecurityAction)

[JScript] public function WebPermissionAttribute(action: SecurityAction);

Description

Initializes a new instance of the System.Net.WebPermissionAttribute class with the specified System.Security.Permissions.SecurityAction. One of the System.Security.Permissions.SecurityAction values.

Accept

Union

[C#] public string Accept {get; set;}

[C++] public: _property String* get_Accept( );public: _property void set_Accept(String*);

[VB] Public Property Accept As String

[JScript] public function get Accept( ): String;public function set Accept(String);

Description

Gets or sets the URI accepted by this permission instance.

AcceptPattern

Union

[C#] public string AcceptPattern {get; set;}

[C++] public: _property String* get_AcceptPattern( ); public: _property void set_AcceptPattern(String*);

[VB] Public Property AcceptPattern As String

[JScript] public function get AcceptPattern( ): String;public function set AcceptPattern(String);

Description

Gets or sets a regular expression pattern that describes the URI accepted by this permission instance.

Action

Connect

Union

Description

Gets or sets the URI connection controlled by this permission instance.

ConnectPattern

Union

[C#] public string ConnectPattern {get; set;}

[C++] public: _property String* get_ConnectPattern( );public: _property void set_ConnectPattern(String*);

[VB] Public Property ConnectPattern As String

[JScript] public function get ConnectPattern( ): String;public function set ConnectPattern(String);

Description

Gets or sets a regular expression pattern that describes the URI connection controlled by this permission instance.

TypeId

Unrestricted

CreatePermission

[C#] public override IPermission CreatePermission( );

[C++] public: IPermission* CreatePermission( );

[VB] Overrides Public Function CreatePermission( ) As IPermission

[JScript] public override function CreatePermission( ): IPermission;

Description

Creates and returns a new instance of the System.Net.WebPermission class.

Return Value: A System.Net.WebPermission instance corresponding to the security declaration.

WebProxy class (System.Net)

ToString

Description

Contains HTTP proxy settings for the System.Net.WebRequest class.

The System.Net.WebProxy class contains the proxy settings that System.Net.WebRequest instances use to override the proxy settings in System.Net.GlobalProxySelection.

WebProxy

Example Syntax:

ToString

[C#] public WebProxy( );

[C++] public: WebProxy( );

[VB] Public Sub New( )

[JScript] public function WebProxy( ); Initializes a new instance of the System.Net.WebProxy class.

Description

Initializes an empty instance of the System.Net.WebProxy class.

The default constructor initializes an empty instance of the System.Net.WebProxy class initializes an empty instance of the System.Net.WebProxy class with the System.Net.WebProxy.Address property set to null. When the System.Net.WebProxy.Address property is null, the System.Net.WebProxy.IsBypassed(System.Uri) method returns true, and the System.Net.WebProxy.GetProxy(System.Uri) method returns the destination address.

WebProxy

Example Syntax:

ToString

[C#] public WebProxy(string Address);

[C++] public: WebProxy(String* Address);

[VB] Public Sub New(ByVal Address As String)

[JScript] public function WebProxy(Address: String);

Description

Initializes a new instance of the System.Net.WebProxy class with the specified URI.

The System.Net.WebProxy instance is initialized with the System.Net.WebProxy.Address property set to a System.Uri instance containing Address. The URI of the proxy server.

WebProxy

Example Syntax:

ToString

[C#] public WebProxy(Uri Address);

[C++] public: WebProxy(Uri* Address);

[VB] Public Sub New(ByVal Address As Uri)

[JScript] public function WebProxy(Address: Uri);

Description

Initializes a new instance of the System.Net.WebProxy class from the specified System.Uri.

The System.Net.WebProxy instance is initialized with the System.Net.WebProxy.Address property set to the Address parameter. A System.Uri containing the address of the proxy server.

WebProxy

Example Syntax:

ToString

[C#] protected WebProxy(SerializationInfo SerializationInfo, StreamingContext streamingContext);

[C++] protected: WebProxy(SerializationInfo* SerializationInfo, StreamingContext streamingContext);

[VB] Protected Sub New(ByVal SerializationInfo As SerializationInfo, ByVal streamingContext As StreamingContext)

[JScript] protected function WebProxy(SerializationInfo: SerializationInfo, streamingcontext: StreamingContext);

Description

Initializes a new instance of the System.Net.WebProxy class from the specified instances of the System.Runtime.Serialization.SerializationInfo and System.Runtime.Serialization.StreamingContext classes.

This constructor implements the System.Runtime.Serialization.ISerializable interface for the System.Net.WebProxy class. A System.Runtime.Serialization.SerializationInfo containing the information required to serialize the new System.Net.WebProxy instance. A System.Runtime.Serialization.StreamingContext containing the source and destination of the serialized stream associated with the new System.Net.WebProxy.

WebProxy

Example Syntax:

ToString

[C#] public WebProxy(string Address, bool BypassOnLocal);

[C++] public: WebProxy(String* Address, bool BypassOnLocal);

[VB] Public Sub New(ByVal Address As String, ByVal BypassOnLocal As Boolean)

[JScript] public function WebProxy(Address: String, BypassOnLocal: Boolean);

Description

Initializes a new instance of the System.Net.WebProxy class with the specified URI and bypass setting.

The System.Net.WebProxy instance is initialized with the System.Net.WebProxy.Address property set to a System.Uri instance containing Address and the System.Net.WebProxy.BypassProxyOnLocal property set to BypassOnLocal. The URI of the proxy server. true to bypass the proxy for local addresses; otherwise, false.

WebProxy

Example Syntax:

ToString

[C#] public WebProxy(string Host, int Port);

[C++] public: WebProxy(String* Host, int Port);

[VB] Public Sub New(ByVal Host As String, ByVal Port As Integer)

[JScript] public function WebProxy(Host: String, Port: int);

Description

Initializes a new instance of the System.Net.WebProxy class with the specified host and port number.

The System.Net.WebProxy instance is initialized with the System.Net.WebProxy.Address property set to a System.Uri instance of the form http://Host: Port. The name of the proxy host. The port number on Host to use.

WebProxy

Example Syntax:

ToString

[C#] public WebProxy(Uri Address, bool BypassOnLocal);

[C++] public: WebProxy(Uri* Address, bool BypassOnLocal);

[VB] Public Sub New(ByVal Address As Uri, ByVal BypassOnLocal As Boolean)

[JScript] public function WebProxy(Address: Uri, BypassOnLocal: Boolean);

Description

Initializes a new instance of the System.Net.WebProxy class with the System.Uri and bypass setting.

The System.Net.WebProxy instance is initialized with the System.Net.WebProxy.Address property set to Address and with the System.Net.WebProxy.BypassProxyOnLocal property set to BypassOnLocal. A System.Uri containing the address of the proxy server. true to bypass the proxy for local addresses; otherwise, false.

WebProxy

Example Syntax:

ToString

[C#] public WebProxy(string Address, bool BypassOnLocal, string[ ] BypassList);

[C++] public: WebProxy(String* Address, bool BypassOnLocal, String* BypassList _gc[ ]);

[VB] Public Sub New(ByVal Address As String, ByVal BypassOnLocal As Boolean, ByVal BypassList( ) As String)

[JScript] public function WebProxy(Address: String, BypassOnLocal: Boolean, BypassList: String[ ]);

Description

Initializes a new instance of the System.Net.WebProxy class with the specified URI, bypass setting, and list of URIs to bypass.

The System.Net.WebProxy instance is initialized with the System.Net.WebProxy.Address property set to a System.Uri instance containing Address, the System.Net.WebProxy.BypassProxyOnLocal property set to BypassOnLocal, and the System.Net.WebProxy.BypassList property set to BypassList. The URI of the proxy server. true to bypass the proxy for local addresses; otherwise, false. An array of regular expression strings containing the URIs of the servers to bypass.

WebProxy

Example Syntax:

ToString

[C#] public WebProxy(Uri Address, bool BypassOnLocal, string[ ] BypassList);

[C++] public: WebProxy(Uri* Address, bool BypassOnLocal, String* BypassList _gc[ ]);

[VB] Public Sub New(ByVal Address As Uri, ByVal BypassOnLocal As Boolean, ByVal BypassList( ) As String)

[JScript] public function WebProxy(Address: Uri, BypassOnLocal: Boolean, BypassList: String[ ]);

Description

Initializes a new instance of the System.Net.WebProxy class with the specified System.Uri, bypass setting, and list of URIs to bypass.

The System.Net.WebProxy instance is initialized with the System.Net.WebProxy.Address property set to Address, the System.Net.WebProxy.BypassProxyOnLocal property set to BypassOnLocal, and the System.Net.WebProxy.BypassList property set to BypassList. A System.Uri containing the address of the proxy server. true to bypass the proxy for local addresses; otherwise, false. An array of regular expression strings containing the URIs of the servers to bypass.

WebProxy

Example Syntax:

ToString

[C#] public WebProxy(string Address, bool BypassOnLocal, string[ ] BypassList, ICredentials Credentials);

[C++] public: WebProxy(String* Address, bool BypassOnLocal, String* BypassList gc[ ], ICredentials* Credentials);

[VB] Public Sub New(ByVal Address As String, ByVal BypassOnLocal As Boolean, ByVal BypassList( ) As String, ByVal Credentials As ICredentials)

[JScript] public function WebProxy(Address: String, BypassOnLocal: Boolean, BypassList: String[ ], Credentials: ICredentials);

Description

Initializes a new instance of the System.Net.WebProxy class with the specified URI, bypass setting, list of URIs to bypass, and credentials.

The System.Net.WebProxy instance is initialized with the System.Net.WebProxy.Address property set to a System.Uri instance containing Address, the System.Net.WebProxy.BypassProxyOnLocal property set to BypassOnLocal, the System.Net.WebProxy.BypassList property set to BypassList, and the System.Net.WebProxy.Credentials property set to Credentials. The URI of the proxy server. true to bypass the proxy for local addresses; otherwise, false. An array of regular expression strings containing the URIs of the servers to bypass. An System.Net.ICredentials to submit to the proxy server for authentication.

WebProxy

Example Syntax:

ToString

[C#] public WebProxy(Uri Address, bool BypassOnLocal, string[ ] BypassList, ICredentials Credentials);

[C++] public: WebProxy(Uri* Address, bool BypassOnLocal, String* BypassList _gc[ ], ICredentials* Credentials);

[VB] Public Sub New(ByVal Address As Uri, ByVal BypassOnLocal As Boolean, ByVal BypassList( ) As String, ByVal Credentials As ICredentials)

[JScript] public function WebProxy(Address: Uri, BypassOnLocal: Boolean, BypassList: String[ ], Credentials: ICredentials);

Description

Initializes a new instance of the System.Net.WebProxy class with the specified System.Uri, bypass setting, list of URIs to bypass, and credentials.

The System.Net.WebProxy instance is initialized with the System.Net.WebProxy.Address property set to Address, the System.Net.WebProxy.BypassProxyOnLocal property set to BypassOnLocal, the System.Net.WebProxy.BypassList property set to BypassList, and the System.Net.WebProxy.Credentials property set to Credentials A System.Uri containing the address of the proxy server. true to bypass the proxy for local addresses; otherwise, false. An array of regular expression strings containing the URIs of the servers to bypass. An System.Net.ICredentials to submit to the proxy server for authentication.

Address

ToString

[C#] public Uri Address {get; set;}

[C++] public: _property Uri* get_Address( );public: _property void set_Address(Uri*);

[VB] Public Property Address As Uri

[JScript] public function get Address( ): Uri;public function set Address(Uri);

Description

Gets or sets the address of the proxy server.

The System.Net.WebProxy.Address property contains the address of the proxy server. When System.Net.WebProxy.Address is null, all requests bypass the proxy and connect directly to the destination host.

BypassArrayList

ToString

[C#] public ArrayList BypassArrayList {get;}

[C++] public: _property ArrayList* get_BypassArrayList( );

[VB] Public ReadOnly Property BypassArrayList As ArrayList

[JScript] public function get BypassArrayList( ): ArrayList;

Description

Gets a list of addresses that do not use the proxy server.

The System.Net.WebProxy.BypassList property contains an array of URI strings that a System.Net.WebRequest instance accesses directly instead of through the proxy server.

BypassList

ToString

[C#] public string[ ] BypassList {get; set;}

[C++] public: _property String* get BypassList( ); public: _property void set_BypassList(String* _gc[ ]);

[VB] Public Property BypassList As String ( )

[JScript] public function get BypassList( ): String[ ];public function set BypassList(String[ ]);

Description

Gets or sets an array of addresses that do not use the proxy server.

The System.Net.WebProxy.BypassList property contains an array of regular expressions that describe URIs that a System.Net.WebRequest instance accesses directly instead of through the proxy server.

BypassProxyOnLocal

ToString

[C#] public bool BypassProxyOnLocal {get; set;}

[C++] public: _property bool get_BypassProxyOnLocal( );public: _property void set_BypassProxyOnLocal(bool);

[VB] Public Property BypassProxyOnLocal As Boolean

[JScript] public function get BypassProxyOnLocal( ): Boolean;public function set BypassProxyOnLocal(Boolean);

Description

Gets or sets a value indicating whether to bypass the proxy server for local addresses.

The setting of the System.Net.WebProxy.BypassProxyOnLocal property determines whether System.Net.WebRequest instances use the proxy server when accessing local Internet resources.

Credentials

ToString

[C#] public ICredentials Credentials {get; set;}

[C++] public: _property ICredentials* get_Credentials( ); public: _property void set_Credentials(ICredentials*);

[VB] Public Property Credentials As ICredentials

[JScript] public function get Credentials( ): ICredentials;public function set Credentials(ICredentials);

Description

Gets or sets the credentials to submit to the proxy server for authentication.

The System.Net.WebProxy.Credentials property contains the authentication credentials to send to the proxy server in response to an HTTP 407 (proxy authorization) status code.

GetDefaultProxy

[C#] public static WebProxy GetDefaultProxy( );

[C++] public: static WebProxy* GetDefaultProxy( );

[VB] Public Shared Function GetDefaultProxy( ) As WebProxy

[JScript] public static function GetDefaultProxy( ): WebProxy;

Description

Reads the Internet Explorer nondynamic proxy settings.

Return Value: A System.Net.WebProxy instance containing the nondynamic proxy settings from Internet Explorer 5.5.

The System.Net.WebProxy.GetDefaultProxy method reads the nondynamic proxy settings stored by Internet Explorer 5.5 and creates a System.Net.WebProxy instance with those settings.

GetProxy

[C#] public Uri GetProxy(Uri destination);

[C++] public: _sealed Uri* GetProxy(Uri* destination);

[VB] NotOverridable Public Function GetProxy(ByVal destination As Uri) As Uri

[JScript] public function GetProxy(destination: Uri): Uri;

Description

Returns the proxied URI for a request.

Return Value: The System.Uri of the Internet resource, if the resource is on the bypass list; otherwise, the System.Uri of the proxy.

The System.Net.WebProxy.GetProxy(System.Uri) method returns the URI that the System.Net.WebRequest uses to access the Internet resource. The System.Uri of the requested Internet resource.

IsBypassed

[C#] public bool IsBypassed(Uri host);

[C++] public: _sealed bool IsBypassed(Uri* host);

[VB] NotOverridable Public Function IsBypassed(ByVal host As Uri) As Boolean

[JScript] public function IsBypassed(host: Uri): Boolean;

Description

Indicates whether to use the proxy server for the specified host.

Return Value: true if the proxy server should not be used for host; otherwise, false.

The System.Net.WebProxy.IsBypassed(System.Uri) method is used to determine whether to bypass the proxy server when accessing an Internet resource. The System.Uri of the host to check for proxy use.

ISerializable.GetObjectData

[C#] void ISerializable.GetObjectData(SerializationInfo SerializationInfo, StreamingContext streamingContext);

[C++] void ISerializable::GetObjectData(SerializationInfo* SerializationInfo, StreamingContext streamingContext);

[VB] Sub GetObjectData(ByVal SerializationInfo As SerializationInfo, ByVal streamingcontext As StreamingContext) Implements ISerializable.GetObjectData

[JScript] function ISerializable.GetObjectData(SerializationInfo: SerializationInfo, streamingcontext: StreamingContext);

WebRequest class (System.Net)

ToString

Description

Makes a request to a Uniform Resource Identifier (URI). This is an abstract class.

System.Net.WebRequest is the abstract base class for the .NET Framework's request/response model for accessing data from the Internet. An application that uses the request/response model can request data from the Internet in a protocol-agnostic manner, in which the application works with instances of the System.Net.WebRequest class while protocol-specific descendant classes carry out the details of the request.

WebRequest

Example Syntax:

ToString

[C#] protected WebRequest( );

[C++] protected: WebRequest( );

[VB] Protected Sub New( )

[JScript] protected function WebRequest( ); Initializes a new instance of the System.Net.WebRequest class.

Description

Initializes a new instance of the System.Net.WebRequest class.

Use the System.Net.WebRequest.Create(System.Uri,System.Boolean) method to initialize new System.Net.WebRequest instances. Do not use the constructor.

WebRequest

Example Syntax:

ToString

[C#] protected WebRequest(SerializationInfo serializationInfo, StreamingContext streamingContext);

[C++] protected: WebRequest(SerializationInfo* serializationInfo, StreamingContext streamingContext);

[VB] Protected Sub New(ByVal SerializationInfo As SerializationInfo, ByVal streamingcontext As StreamingContext)

[JScript] protected function WebRequest(SerializationInfo: SerializationInfo, streamingcontext: StreamingContext);

Description

Initializes a new instance of the System.Net.WebRequest class from the specified instances of the System.Runtime.Serialization.SerializationInfo and System.Runtime.Serialization.StreamingContext classes.

When implemented by a descendant class, this constructor implements the System.Runtime.Serialization.ISerializable interface for the System.Net.WebRequest descendant. A System.Runtime.Serialization.SerializationInfo that contains the information required to serialize the new System.Net.WebRequest instance. A System.Runtime.Serialization. StreamingContext that indicates the source of the serialized stream associated with the new System.Net.WebRequest instance.

ConnectionGroupName

ToString

[C#] public virtual string ConnectionGroupName {get; set;}

[C++] public: _property virtual String* get_ConnectionGroupName( );public: _property virtual void set_ConnectionGroupName(String*);

[VB] Overridable Public Property ConnectionGroupName As String

[JScript] public function get ConnectionGroupName( ): String;public function set ConnectionGroupName (String);

Description

When overridden in a descendant class, gets or sets the name of the connection group for the request.

The System.Net.WebRequest.ConnectionGroupName property associates specific requests within an application to one or more connection pools.

ContentLength

ToString

[C#] public virtual long ContentLength {get; set;}

[C++] public: _property virtual _int64 get_ContentLength( ); public: _property virtual void set_ContentLength(_int64);

[VB] Overridable Public Property ContentLength As Long

[JScript] public function get ContentLength( ): long;public function set ContentLength(long);

Description

When overridden in a descendant class, gets or sets the content length of the request data being sent.

The System.Net.WebRequest.ContentLength property contains the number of bytes of data sent to the Internet resource by the System.Net.WebRequest instance.

ContentType

ToString

[C#] public virtual string ContentType {get; set;}

[C++] public: _property virtual String* get_ContentType( );public: _property virtual void set_ContentType(String*);

[VB] Overridable Public Property ContentType As String

[JScript] public function get ContentType( ): String;public function set ContentType(String);

Description

When overridden in a descendant class, gets or sets the content type of the request data being sent.

The System.Net.WebRequest.ContentType property contains the media type of the request. This is typically the MIME encoding of the content.

Credentials

ToString

[C#] public virtual ICredentials Credentials {get; set;}

[C++] public: _property virtual ICredentials* get_Credentials( );public: _property virtual void set_Credentials(ICredentials*);

[VB] Overridable Public Property Credentials As ICredentials

[JScript] public function get Credentials( ): ICredentials;public function set Credentials(ICredentials);

Description

When overridden in a descendant class, gets or sets the network credentials used for authenticating the request with the Internet resource.

The System.Net.WebRequest.Credentials property contains the authentication credentials required to access the Internet resource.

Headers

ToString

[C#] public virtual WebHeaderCollection Headers {get; set;}

[C++] public: _property virtual WebHeaderCollection* get_Headers( );public: _property virtual void set_Headers (WebHeaderCollection*);

[VB] Overridable Public Property Headers As WebHeaderCollection

[JScript] public function get Headers( ): WebHeaderCollection;public function set Headers(WebHeaderCollection);

Description

When overridden in a descendant class, gets or sets the collection of header name/value pairs associated with the request.

The System.Net.WebRequest.Headers property contains a System.Net.WebHeaderCollection instance containing the header information to send to the Internet resource.

Method

ToString

[C#] public virtual string Method {get; set;}

[C++] public: _property virtual String* get_Method( );public: _property virtual void set_Method(String*);

[VB] Overridable Public Property Method As String

[JScript] public function get Method( ): String;public function set Method(String);

Description

When overridden in a descendant class, gets or sets the protocol method to use in this request.

When overridden in a descendant class, the System.Net.WebRequest.Method property contains the request method to use in this request.

PreAuthenticate

ToString

[C#] public virtual bool PreAuthenticate {get; set;}

[C++] public: _property virtual bool get_PreAuthenticate( ); public: _property virtual void set_PreAuthenticate(bool);

[VB] Overridable Public Property PreAuthenticate As Boolean

[JScript] public function get PreAuthenticate( ): Boolean; public function set PreAuthenticate(Boolean);

Description

When overridden in a descendant class, indicates whether to preauthenticate the request.

The System.Net.WebRequest.PreAuthenticate property indicates whether to send authentication information with the initial request. When System.Net.WebRequest.PreAuthenticate is false, the System.Net.WebRequest waits for an authentication challenge before sending authentication information.

Proxy

ToString

[C#] public virtual IWebProxy Proxy {get; set;}

[C++] public: _property virtual IWebProxy* get_Proxy( ); public: _property virtual void set_Proxy(IWebProxy*);

[VB] Overridable Public Property Proxy As IWebProxy

[JScript] public function get Proxy( ): IWebProxy;public function set Proxy(IWebProxy);

Description

When overridden in a descendant class, gets or sets the network proxy to use to access this Internet resource.

The System.Net.WebRequest.Proxy property identifies the network proxy that the request uses to access the Internet resource. The request is made through the proxy server rather than directly to the Internet resource.

RequestUri

ToString

[C#] public virtual Uri RequestUri {get;}

[C++] public: _property virtual Uri* get_RequestUri( );

[VB] Overridable Public ReadOnly Property RequestUri As Uri

[JScript] public function get RequestUri( ): Uri;

Description

When overridden in a descendant class, gets the URI of the Internet resource associated with the request.

When overridden in a descendant class, the System.Net.WebRequest.RequestUri property contains the System.Uri instance that System.Net.WebRequest.Create(System.Uri,System.Boolean) method uses to create the request.

Timeout

ToString

[C#] public virtual int Timeout {get; set;}

[C++] public: _property virtual int get_Timeout( ); public: _property virtual void set_Timeout(int);

[VB] Overridable Public Property Timeout As Integer

[JScript] public function get Timeout( ): int;public function set Timeout(int);

Description

Gets or sets the length of time before the request times out.

The System.Net.WebRequest.Timeout property indicates the length of time, in milliseconds, until the request times out and throws a System.Net.WebException. The System.Net.WebRequest.Timeout property affects only synchronous requests made with the System.Net.WebRequest.GetResponse method. To time out asynchronous requests, use the System.Net.WebRequest.Abort method.

Abort

[C#] public virtual void Abort( );

[C++] public: virtual void Abort( );

[VB] Overridable Public Sub Abort( )

[JScript] public function Abort( );

Description

Cancels an asynchronous request to an Internet resource.

The System.Net.WebRequest.Abort method cancels asynchronous requests to Internet resources started with the System.Net.WebRequest.BeginGetResponse(System.AsyncCallback,System.Object) method.

BeginGetRequestStream

[C#] public virtual IAsyncResult BeginGetRequestStream (AsyncCallback callback, object state);

[C++] public: virtual IAsyncResult* BeginGetRequestStream(AsyncCallback* callback, Object* state);

[VB] Overridable Public Function BeginGetRequestStream (ByVal callback As AsyncCallback, ByVal state As Object) As IAsyncResult

[JScript] public function BeginGetRequestStream(callback: AsyncCallback, state Object): IAsyncResult;

Description

When overridden in a descendant class, provides an asynchronous version of the System.Net.WebRequest.GetRequestStream method.

Return Value: An System.IAsyncResult that references the asynchronous request.

The System.Net.WebRequest.BeginGetRequestStream (System.AsyncCallback,System.Object) method starts an asynchronous request for a stream used to send data to an Internet resource. The callback method that implements the System.AsyncCallback delegate uses the System.Net.WebRequest.EndGetRequestStream(System.IAsyncResult) method to return the request stream. The System.AsyncCallback delegate. An object containing state information for this asynchronous request.

BeginGetResponse

[C#] public virtual IAsyncResult BeginGetResponse(AsyncCallback callback, object state);

[C++] public: virtual IAsyncResult* BeginGetResponse (AsyncCallback* callback, Object* state);

[VB] Overridable Public Function BeginGetResponse(ByVal callback As AsyncCallback, ByVal state As Object) As IAsyncResult

[JScript] public function BeginGetResponse(callback: AsyncCallback, state: Object): IAsyncResult;

Description

When overridden in a descendant class, begins an asynchronous request for an Internet resource.

Return Value: An System.IAsyncResult that references the asynchronous request.

The System.Net.WebRequest.BeginGetResponse(System.AsyncCallback,System.Object) method starts an asynchronous request for a response. The callback method that implements the System.AsyncCallback delegate uses the System.Net.WebRequest.EndGetResponse(System.IAsyncResult) method to return the System.Net.WebResponse from the Internet resource. The System.AsyncCallback delegate. An object containing state information for this asynchronous request.

Create

[C#] public static WebRequest Create(string requestUriString);

[C++] public: static WebRequest* Create(String* requestUriString);

[VB] Public Shared Function Create(ByVal requestUriString As String) As WebRequest

[JScript] public static function Create(requestUriString: String): WebRequest; Initializes a new System.Net.WebRequest.

Description

Initializes a new System.Net.WebRequest instance for the specified URI scheme.

Return Value: A System.Net.WebRequest descendant for the specific URI scheme.

The System.Net.WebRequest.Create(System.Uri,System.Boolean) method returns a descendant of the System.Net.WebRequest class determined at run time by the scheme of the URI in requestUriString. For example, when a URI beginning with http:// is passed in requestUriString, an System.Net.HttpWebRequest instance is returned by System.Net.WebRequest.Create(System.Uri,System.Boolean). If a URI beginning with file:// is passed instead, the System.Net.WebRequest.Create(System.Uri,System.Boolean) method will return a System.Net.FileWebRequest instance. The URI that identifies the Internet resource.

Create

[C#] public static WebRequest Create(Uri requestUri);

[C++] public: static WebRequest* Create(Uri* requestUri);

[VB] Public Shared Function Create(ByVal requestUri As Uri) As WebRequest

[JScript] public static function Create(requestUri: Uri): WebRequest;

Description

Initializes a new System.Net.WebRequest instance for the specified URI scheme.

Return Value: A System.Net.WebRequest descendant for the specified URI scheme.

The System.Net.WebRequest.Create(System.Uri,System.Boolean) method returns a descendant of the System.Net.WebRequest class determined at run time by the scheme of the URI in requestUri. For example, when a URI beginning with http:// is passed in requestUri, an System.Net.HttpWebRequest instance is returned by System.Net.WebRequest.Create(System.Uri,System.Boolean). If a URI beginning with file:// is passed instead, the System.Net.WebRequest.Create(System.Uri,System.Boolean) method will return a System.Net.FileWebRequest instance. A System.Uri containing the URI of the requested resource.

CreateDefault

[C#] public static WebRequest CreateDefault(Uri requestUri);

[C++] public: static WebRequest* CreateDefault(Uri* requestUri);

[VB] Public Shared Function CreateDefault(ByVal requestUri As Uri) As WebRequest

[JScript] public static function CreateDefault(requestUri: Uri): WebRequest;

Description

Initializes a new System.Net.WebRequest instance for the specified URI scheme.

Return Value: A System.Net.WebRequest descendant for the specified URI scheme.

The System.Net.WebRequest.CreateDefault(System.Uri) method returns a System.Net.WebRequest descendant instance based on only the scheme portion of a URI. A System.Uri containing the URI of the requested resource.

EndGetRequestStream

[C#] public virtual Stream EndGetRequestStream(IAsyncResult asyncResult);

[C++] public: virtual Stream* EndGetRequestStream(IAsyncResult* asyncResult);

[VB] Overridable Public Function EndGetRequestStream (ByVal asyncResult As IAsyncResult) As Stream

[JScript] public function EndGetRequestStream(asyncResult: IAsyncResult): Stream;

Description

When overridden in a descendant class, returns a System.IO.Stream for writing data to the Internet resource.

Return Value: A System.IO.Stream to write data to.

The System.Net.WebRequest.EndGetRequestStream (System.IAsyncResult) method completes an asynchronous stream request that was started by the System.Net.WebRequest.BeginGetRequestStream(System.AsyncCallback,System.Object) method. An System.IAsyncResult that references a pending request for a stream.

EndGetResponse

[C#] public virtual WebResponse EndGetResponse(IAsyncResult asyncResult);

[C++] public: virtual WebResponse* EndGetResponse (IAsyncResult* asyncResult);

[VB] Overridable Public Function EndGetResponse(ByVal asyncResult As IAsyncResult) As WebResponse

[JScript] public function EndGetResponse(asyncResult: IAsyncResult): WebResponse;

Description

When overridden in a descendant class, returns a System.Net.WebResponse.

Return Value: A System.Net.WebResponse that contains a response to the Internet request.

The System.Net.WebRequest.EndGetResponse(System.IAsyncResult) method completes an asynchronous request for an Internet resource that was started with the System.Net.WebRequest.BeginGetResponse(System.AsyncCallback,System.Object) method. An System.IAsyncResult that references a pending request for a response.

GetRequestStream

[C#] public virtual Stream GetRequestStream( );

[C++] public: virtual Stream* GetRequestStream( );

[VB] Overridable Public Function GetRequestStream( ) As Stream

[JScript] public function GetRequestStream( ): Stream;

Description

When overridden in a descendant class, returns a System.IO.Stream for writing data to the Internet resource.

Return Value: A System.IO.Stream for writing data to the Internet resource.

The System.Net.WebRequest.GetRequestStream method initiates a request to send data to the Internet resource and returns a System.IO.Stream instance for sending data to the Internet resource.

GetResponse

[C#] public virtual WebResponse GetResponse( );

[C++] public: virtual WebResponse* GetResponse( );

[VB] Overridable Public Function GetResponse( ) As WebResponse

[JScript] public function GetResponse( ): WebResponse;

Description

When overridden in a descendant class, returns a response to an Internet request.

Return Value: A System.Net.WebResponse containing the response to the Internet request.

The System.Net.WebRequest.GetResponse method sends a request to an Internet resource and returns a System.Net.WebResponse instance. If the request has already been initiated by a call to System.Net.WebRequest.GetRequestStream, the System.Net.WebRequest.GetResponse method completes the request and returns any response.

RegisterPrefix

[C#] public static bool RegisterPrefix(string prefix, IWebRequestCreate creator);

[C++] public: static bool RegisterPrefix(String* prefix, IWebRequestCreate* creator);

[VB] Public Shared Function RegisterPrefix(ByVal prefix As String, ByVal creator As IWebRequestCreate) As Boolean

[JScript] public static function RegisterPrefix(prefix: String, creator: IWebRequestCreate): Boolean;

Description

Registers a System.Net.WebRequest descendant for the specified URI.

Return Value: true if registration is successful; otherwise, false.

The System.Net.WebRequest.RegisterPrefix(System.String,System.Net.IWebRequestCreate) method registers System.Net.WebRequest descendants to service requests. The URI prefix that the System.Net.WebRequest descendant services. The create method that the System.Net.WebRequest calls to create the System.Net.WebRequest descendant.

ISerializable.GetObjectData

[C#] void ISerializable.GetObjectData(SerializationInfo serializationInfo, StreamingContext streamingContext);

[C++] void ISerializable::GetObjectData(SerializationInfo* serializationInfo, StreamingContext streamingContext);

[VB] Sub GetObjectData(ByVal serializationInfo As SerializationInfo, ByVal streamingContext As StreamingContext) Implements ISerializable.GetObjectData

[JScript] function ISerializable.GetObjectData(serializationInfo: SerializationInfo, streamingContext: StreamingContext);

WebResponse class (System.Net)

ToString

Description

Provides a response from a Uniform Resource Identifier (URI). This is an abstract class.

The System.Net.WebResponse class is the abstract base class from which protocol-specific response classes are derived. Applications can use the System.Net.WebResponse class to handle responses in a protocol-agnostic manner. In that case, the application works with instances of the System.Net.WebResponse class while the details of the request are carried out by protocol-specific descendant classes.

WebResponse

Example Syntax:

ToString

[C#] protected WebResponse( );

[C++] protected: WebResponse( );

[VB] Protected Sub New( )

[JScript] protected function WebResponse( ); Initializes a new instance of the System.Net.WebResponse class.

Description

Initializes a new instance of the System.Net.WebResponse class.

Applications do not call the System.Net.WebResponse constructor directly, use the System.Net.WebRequest.GetResponse method on a System.Net.WebRequest instance.

WebResponse

Example Syntax:

ToString

[C#] protected WebResponse(SerializationInfo serializationInfo, StreamingContext streamingContext);

[C++] protected: WebResponse(SerializationInfo* serializationInfo, StreamingContext streamingContext);

[VB] Protected Sub New(ByVal serializationInfo As SerializationInfo, ByVal streamingContext As StreamingContext)

[JScript] protected function WebResponse(serializationInfo: SerializationInfo, streamingContext: StreamingContext);

Description

Initializes a new instance of the System.Net.WebResponse class from the specified instances of the System.Runtime.Serialization.SerializationInfo and System.Runtime.Serialization.StreamingContext classes.

When implemented by a descendant class, this constructor implements the System.Runtime.Serialization.ISerializable interface for the System.Net.WebResponse descendant. An instance of the System.Runtime.Serialization.SerializationInfo class containing the information required to serialize the new System.Net.WebRequest instance. An instance of the System.Runtime.Serialization. StreamingContext class indicating the source of the serialized stream associated with the new System.Net.WebRequest instance.

ContentLength

ToString

[C#] public virtual long ContentLength {get; set;}

[C++] public: _property virtual _int64 get_ContentLength( ); public: _property virtual void set_ContentLength(_int64);

[VB] Overridable Public Property ContentLength As Long

[JScript] public function get ContentLength( ): long;public function set ContentLength(long);

Description

When overridden in a descendant class, gets or sets the content length of data being received.

The System.Net.WebResponse.ContentLength property contains the length, in bytes, of the response from the Internet resource. For request methods that contain header information, the System.Net.WebResponse.ContentLength does not include the length of the header information.

ContentType

ToString

[C#] public virtual string ContentType {get; set;}

[C++] public: _property virtual String* get_ContentType( ); public: _property virtual void set_ContentType(String*);

[VB] Overridable Public Property ContentType As String

[JScript] public function get ContentType( ): String;public function set ContentType(String);

Description

When overridden in a derived class, gets or sets the content type of the data being received.

The System.Net.WebResponse.ContentType property contains the MIME content type of the response from the Internet resource, if known.

Headers

ToString

[C#] public virtual WebHeaderCollection Headers {get;}

[C++] public: _property virtual WebHeaderCollection* get_Headers( );

[VB] Overridable Public ReadOnly Property Headers As WebHeaderCollection

[JScript] public function get Headers( ): WebHeaderCollection;

Description

When overridden in a derived class, gets a collection of header name-value pairs associated with this request.

The System.Net.WebResponse.Headers property contains the name-value header pairs returned in the response.

ResponseUri

ToString

[C#] public virtual Uri ResponseUri {get;}

[C++] public: _property virtual Uri* get_ResponseUri( );

[VB] Overridable Public ReadOnly Property ResponseUri As Uri

[JScript] public function get ResponseUri( ): Uri;

Description

When overridden in a derived class, gets the URI of the Internet resource that actually responded to the request. The System.Net.WebResponse.ResponseUri property contains the URI of the Internet resource that actually provided the response data. This resource may not be the originally requested URI if the underlying protocol allows redirection of the request.

Close

[C#] public virtual void Close( );

[C++] public: virtual void Close( );

[VB] Overridable Public Sub Close( )

[JScript] public function Close( );

Description

When overridden by a descendent class, closes the response stream.

The System.Net.WebResponse.Close method cleans up the resources used by a System.Net.WebResponse and closes the underlying stream by calling the System.IO.Stream.Close method.

GetResponseStream

[C#] public virtual Stream GetResponseStream( );

[C++] public: virtual Stream* GetResponseStream( );

[VB] Overridable Public Function GetResponseStream( ) As Stream

[JScript] public function GetResponseStream( ): Stream;

Description

When overridden in a descendant class, returns the data stream from the Internet resource.

Return Value: An instance of the System.IO.Stream class for reading data from the Internet resource.

The System.Net.WebResponse.GetResponseStream method returns the data stream from the Internet resource.

IDisposable.Dispose

[C#] void IDisposable.Dispose( );

[C++] void IDisposable::Dispose( );

[VB] Sub Dispose( ) Implements IDisposable.Dispose

[JScript] function IDisposable.Dispose( );

ISerializable.GetObjectData

[C#] void ISeria

System.Net.Sockets

The namespace provides a managed implementation of the Windows Sockets interface for developers that need to tightly control access to the network. Developers familiar with the Winsock API should have no problems developing applications using the class.

Description

The System.Net.Sockets namespace provides a managed implementation of the Windows Sockets interface for developers that need to tightly control access to the network. Developers familiar with the Winsock API should have no problems developing applications using the System.Net.Sockets.Socket class.

AddressFamily enumeration (System.Net.Sockets)

Description

Specifies the addressing scheme that an instance of the System.Net.Sockets.Socket class can use.

An System.Net.Sockets.AddressFamily member specifies the addressing scheme that a System.Net.Sockets.Socket instance uses to resolve an address. For example, System.Net.Sockets.AddressFamily.InterNetwork indicates that an IP version 4 address is expected when a System.Net.Sockets.Socket connects to an end point.

[C#] public const AddressFamily AppleTalk;

[C++] public: const AddressFamily AppleTalk;

[VB] Public Const AppleTalk As AddressFamily

[JScript] public var AppleTalk: AddressFamily;

Description

AppleTalk address.

[C#] public const AddressFamily Atm;

[C++] public: const AddressFamily Atm;

[VB] Public Const Atm As AddressFamily

[JScript] public var Atm: AddressFamily;

Description

Native ATM services address.

[C#] public const AddressFamily Banyan;

[C++] public: const AddressFamily Banyan;

[VB] Public Const Banyan As AddressFamily

[JScript] public var Banyan: AddressFamily;

Description

Banyan address.

[C#] public const AddressFamily Ccitt;

[C++] public: const AddressFamily Ccitt;

[VB] Public Const Ccitt As AddressFamily

[JScript] public var Ccitt: AddressFamily;

Description

Addresses for CCITT protocols, such as X.25.

[C#] public const AddressFamily Chaos;

[C++] public: const AddressFamily Chaos;

[VB] Public Const Chaos As AddressFamily

[JScript] public var Chaos: AddressFamily;

Description

Address for MIT CHAOS protocols.

[C#] public const AddressFamily Cluster;

[C++] public: const AddressFamily Cluster;

[VB] Public Const Cluster As AddressFamily

[JScript] public var Cluster: AddressFamily;

Description

Address for Microsoft cluster products.

[C#] public const AddressFamily DataKit;

[C++] public: const AddressFamily DataKit;

[VB] Public Const DataKit As AddressFamily

[JScript] public var DataKit: AddressFamily;

Description
Address for Datakit protocols.
[C#] public const AddressFamily DataLink;
[C++] public: const AddressFamily DataLink;
[VB] Public Const DataLink As AddressFamily
[JScript] public var DataLink: AddressFamily;

Description
Direct data-link interface address.
[C#] public const AddressFamily DecNet;
[C++] public: const AddressFamily DecNet;
[VB] Public Const DecNet As AddressFamily
[JScript] public var DecNet: AddressFamily;

Description
DECnet address.
[C#] public const AddressFamily Ecma;
[C++] public: const AddressFamily Ecma;
[VB] Public Const Ecma As AddressFamily
[JScript] public var Ecma: AddressFamily;

Description
European Computer Manufacturers Association (ECMA) address.
[C#] public const AddressFamily FireFox;
[C++] public: const AddressFamily FireFox;
[VB] Public Const FireFox As AddressFamily
[JScript] public var FireFox: AddressFamily;

Description
FireFox address.
[C#] public const AddressFamily HyperChannel;
[C++] public: const AddressFamily HyperChannel;
[VB] Public Const HyperChannel As AddressFamily
[JScript] public var HyperChannel: AddressFamily;

Description
NSC Hyperchannel address.
[C#] public const AddressFamily Ieee12844;
[C++] public: const AddressFamily Ieee12844;
[VB] Public Const Ieee12844 As AddressFamily
[JScript] public var Ieee12844: AddressFamily;

Description
IEEE 1284.4 workgroup address.
[C#] public const AddressFamily ImpLink;
[C++] public: const AddressFamily ImpLink;
[VB] Public Const ImpLink As AddressFamily
[JScript] public var ImpLink: AddressFamily;

Description
ARPANET IMP address.
[C#] public const AddressFamily InterNetwork;
[C++] public: const AddressFamily InterNetwork;
[VB] Public Const InterNetwork As AddressFamily
[JScript] public var InterNetwork: AddressFamily;

Description
Address for IP version 4.
[C#] public const AddressFamily InterNetworkV6;
[C++] public: const AddressFamily InterNetworkV6;
[VB] Public Const InterNetworkV6 As AddressFamily
[JScript] public var InterNetworkV6: AddressFamily;

Description
Address for IP version 6.
[C#] public const AddressFamily Ipx;
[C++] public: const AddressFamily Ipx;
[VB] Public Const Ipx As AddressFamily
[JScript] public var Ipx: AddressFamily;

Description
IPX or SPX address.
[C#] public const AddressFamily Irda;
[C++] public: const AddressFamily Irda;
[VB] Public Const Irda As AddressFamily
[JScript] public var Irda: AddressFamily;

Description
IrDA address.
[C#] public const AddressFamily Iso;
[C++] public: const AddressFamily Iso;
[VB] Public Const Iso As AddressFamily
[JScript] public var Iso: AddressFamily;

Description
Address for ISO protocols.
[C#] public const AddressFamily Lat;
[C++] public: const AddressFamily Lat;
[VB] Public Const Lat As AddressFamily
[JScript] public var Lat: AddressFamily;

Description
LAT address.
[C#] public const AddressFamily Max;
[C++] public: const AddressFamily Max;
[VB] Public Const Max As AddressFamily
[JScript] public var Max: AddressFamily;

Description
MAX address.
[C#] public const AddressFamily NetBios;
[C++] public: const AddressFamily NetBios;
[VB] Public Const NetBios As AddressFamily
[JScript] public var NetBios: AddressFamily;

Description
NetBios address.
[C#] public const AddressFamily NetworkDesigners;
[C++] public: cofist AddressFamily NetworkDesigners;
[VB] Public Const NetworkDesigners As AddressFamily
[JScript] public var NetworkDesigners: AddressFamily;

Description
Address for Network Designers OSI gateway-enabled protocols.
[C#] public const AddressFamily NS;
[C++] public: const AddressFamily NS;
[VB] Public Const NS As AddressFamily
[JScript] public var NS: AddressFamily;

Description
Address for Xerox NS protocols.
[C#] public const AddressFamily Osi;
[C++] public: const AddressFamily Osi;
[VB] Public Const Osi As AddressFamily
[JScript] public var Osi: AddressFamily;

Description
Address for ISO protocols.
[C#] public const AddressFamily Pup;
[C++] public: const AddressFamily Pup;
[VB] Public Const Pup As AddressFamily
[JScript] public var Pup: AddressFamily;

Description
Address for PUP protocols.
[C#] public const AddressFamily Sna;
[C++] public: const AddressFamily Sna;
[VB] Public Const Sna As AddressFamily
[JScript] public var Sna: AddressFamily;

Description

IBM SNA address.

[C#] public const AddressFamily Unix;

[C++] public: const AddressFamily Unix;

[VB] Public Const Unix As AddressFamily

[JScript] public var Unix: AddressFamily;

Description

Unix local to host address.

[C#] public const AddressFamily Unknown;

[C++] public: const AddressFamily Unknown;

[VB] Public Const Unknown As AddressFamily

[JScript] public var Unknown: AddressFamily;

Description

Unknown address family.

[C#] public const AddressFamily Unspecified;

[C++] public: const AddressFamily Unspecified;

[VB] Public Const Unspecified As AddressFamily

[JScript] public var Unspecified: AddressFamily;

Description

Unspecified address family.

[C#] public const AddressFamily VoiceView;

[C++] public: const AddressFamily VoiceView;

[VB] Public Const VoiceView As AddressFamily

[JScript] public var VoiceView: AddressFamily;

Description

VoiceView address.

Methods:

LingerOption class (System.Net.Sockets)

ToString

Description

Contains information about a socket's linger time, the amount of time it will remain after closing if data remains to be sent.

The settings of the System.Net.Sockets.LingerOption instance associated with a System.Net.Sockets.Socket instance control the length of time that a socket will remain after closing if data remains to be sent.

Constructors:

LingerOption

Example Syntax:

ToString

[C#] public LingerOption(bool enable, int seconds);

[C++] public: LingerOption(bool enable, int seconds);

[VB] Public Sub New(ByVal enable As Boolean, ByVal seconds As Integer)

[JScript] public function LingerOption(enable: Boolean, seconds: int);

Description

Initializes a new instance of the System.Net.Sockets.LingerOption class.

The System.Net.Sockets.LingerOption instance is created with System.Net.Sockets.LingerOption.Enabled property set to enable and the System.Net.Sockets.LingerOption. LingerTime property set to seconds. true to enable remaining connected after System.Net.Sockets.Socket.Close is called; otherwise, false. The number of seconds to remain connected after System.Net.Sockets.Socket.Close is called.

Properties:

Enabled

ToString

[C#] public bool Enabled {get; set;}

[C++] public: _property bool get_Enabled( );public: _property void set_Enabled(bool);

[VB] Public Property Enabled As Boolean

[JScript] public function get Enabled( ): Boolean;public function set Enabled(Boolean);

Description

Gets or sets a value indicating whether to linger after the socket is closed.

LingerTime

ToString

[C#] public int LingerTime {get; set;}

[C++] public: _property int get_LingerTime( );public: _property void set_LingerTime(int);

[VB] Public Property LingerTime As Integer

[JScript] public function get LingerTime( ): int;public function set LingerTime(int);

Description

Gets or sets the amount of time to remain connected after the socket is closed.

MulticastOption class (System.Net.Sockets)

ToString

Description

Contains IP address values for IP multicast packets.

The System.Net.Sockets.MulticastOption class sets IP address values when joining or leaving an IP multicast group. It is used with the System.Net.Sockets.Socket.SetSocketOption(System.Net.Sockets.SocketOptionLevel, System.Net.Sockets.SocketOptionName,System.Int32) and System.Net.Sockets.Socket.GetSocketOption(System.Net.Sockets.SocketOptionLevel,System.Net.Sockets.SocketOptionName) methods when the optionName parameter is set to System.Net.Sockets.SocketOptionName.AddMembership or System.Net.Sockets.SocketOptionName.DropMembership.

MulticastOption

Example Syntax:

ToString

[C#] public MulticastOption(IPAddress group);

[C++] public: MulticastOption(IPAddress* group);

[VB] Public Sub New(ByVal group As IPAddress)

[JScript] public function MulticastOption(group: IPAddress);

Description

Initializes a new version of the System.Net.Sockets.MulticastOption class for the specified IP multicast group. The IP address of the multicast group.

MulticastOption

Example Syntax:

ToString

[C#] public MulticastOption(IPAddress group, IPAddress mcint);

[C++] public: MulticastOption(IPAddress* group, IPAddress* mcint);

[VB] Public Sub New(ByVal group As IPAddress, ByVal mcint As IPAddress)

[JScript] public function MulticastOption(group: IPAddress, mcint: IPAddress); Initializes a new instance of the System.Net.Sockets.MulticastOption class.

Description

Initializes a new instance of the System.Net.Sockets.MulticastOption class with the specified IP multicast group address and local interface address. The group IP address. The local IP address.

Group

ToString

[C#] public IPAddress Group {get; set;}

[C++] public: _property IPAddress* get_Group( ); public: _property void set_Group(IPAddress*);

[VB] Public Property Group As IPAddress

[JScript] public function get Group( ): IPAddress;public function set Group(IPAddress);

Description

Gets or sets the IP address of a multicast group.

Valid IP addresses for multicast packets are in the range 224.0.0.0 to 239.255.255.255.

LocalAddress

ToString

[C#] public IPAddress LocalAddress {get; set;}

[C++] public: _property IPAddress* get_LocalAddress( ); public: _property void set_LocalAddress(IPAddress*);

[VB] Public Property LocalAddress As IPAddress

[JScript] public function get LocalAddress( ): IPAddress; public function set LocalAddress(IPAddress);

Description

Gets or sets the local address associated with a multicast group.

The System.Net.Sockets.MulticastOption.LocalAddress property contains the IP address of the interface associated with the multicast group membership. If System.Net.Sockets.MulticastOption.LocalAddress is set to System.Net.IPAddress.Any, the default interface is used.

NetworkStream class (System.Net.Sockets)

ToString

Description

Provides the underlying stream of data for network access.

System.Net.Sockets.NetworkStream implements the standard .NET Framework stream mechanism to send and receive data through network sockets.

NetworkStream

Example Syntax:

ToString

[C#] public NetworkStream(Socket socket);

[C++] public: NetworkStream(Socket* socket);

[VB] Public Sub New(ByVal socket As Socket)

[JScript] public function NetworkStream(socket: Socket); Creates a new instance of the System.Net.Sockets.NetworkStream class.

Description

Creates a new instance of the System.Net.Sockets.NetworkStream class for the specified System.Net.Sockets.Socket.

The System.Net.Sockets.NetworkStream is created with read/write access to the specified socket. The System.Net.Sockets.NetworkStream does not own to the underlying socket, so calling the System.Net.Sockets.NetworkStream.Close method will not close the socket. The System.Net.Sockets.Socket that provides the network data for the new System.Net.Sockets.NetworkStream.

NetworkStream

Example Syntax:

ToString

[C#] public NetworkStream(Socket socket, bool ownsSocket);

[C++] public: NetworkStream(Socket* socket, bool ownsSocket);

[VB] Public Sub New(ByVal socket As Socket, ByVal ownsSocket As Boolean)

[JScript] public function NetworkStream(socket: Socket, ownsSocket: Boolean);

Description

Initializes a new instance of the System.Net.Sockets.NetworkStream class for the specified socket with the specified System.Net.Sockets.Socket ownership.

The System.Net.Sockets.NetworkStream is created with read/write access to the specified socket. If ownsSocket is true, the System.Net.Sockets.NetworkStream owns the underlying socket, and calling System.Net.Sockets.NetworkStream.Close will also close the underlying socket. The network socket that the new System.Net.Sockets.NetworkStream will encapsulate. true if the socket will be owned by this System.Net.Sockets.NetworkStream instance; otherwise, false.

NetworkStream

Example Syntax:

ToString

[C#] public NetworkStream(Socket socket, FileAccess access);

[C++] public: NetworkStream(Socket* socket, FileAccess access);

[VB] Public Sub New(ByVal socket As Socket, ByVal access As FileAccess)

[JScript] public function NetworkStream(socket: Socket, access: FileAccess);

Description

Creates a new instance of the System.Net.Sockets.NetworkStream class for the specified System.Net.Sockets.Socket with the specified access rights.

The System.Net.Sockets.NetworkStream is created with the specified access to the specified socket. The System.Net.Sockets.NetworkStream does not own the underlying socket, so calling the System.Net.Sockets.NetworkStream.Close method will not close the socket. The System.Net.Sockets.Socket that provides the network data. One of the System.IO.FileAccess values that sets the System.Net.Sockets.NetworkStream.CanRead and System.Net.Sockets.NetworkStream.CanWrite properties of the System.Net.Sockets.NetworkStream.

NetworkStream

Example Syntax:

ToString

[C#] public NetworkStream(Socket socket, FileAccess access, bool ownsSocket);

[C++] public: NetworkStream(Socket* socket, FileAccess access, bool ownsSocket);

[VB] Public Sub New(ByVal socket As Socket, ByVal access As FileAccess, ByVal ownsSocket As Boolean)

[JScript] public function NetworkStream(socket: Socket, access: FileAccess, ownsSocket: Boolean);

Description

Creates a new instance of the System.Net.Sockets.NetworkStream class for the specified System.Net.Sockets.Socket with the specified access rights and the specified System.Net.Sockets.Socket ownership.

The System.Net.Sockets.NetworkStream is created with the specified access to the specified socket. If ownsSocket is true, the System.Net.Sockets.NetworkStream owns the underlying socket, and calling System.Net.Sockets.NetworkStream.Close will also close the underlying socket. The System.Net.Sockets.Socket that provides the network data. One of the System.IO.FileAccess values that sets the System.Net.Sockets.NetworkStream.CanRead and System.Net.Sockets.NetworkStream.CanWrite properties of the System.Net.Sockets.NetworkStream. true if the socket will be owned by this System.Net.Sockets.NetworkStream instance; otherwise, false.

CanRead

ToString

[C#] public override bool CanRead {get;}

[C++] public: _property virtual bool get_CanRead( );

[VB] Overrides Public ReadOnly Property CanRead As Boolean
[JScript] public function get CanRead( ): Boolean;

Description

Gets a value indicating whether the current stream supports reading.

CanSeek

ToString

[C#] public override bool CanSeek {get;}
[C++] public: _property virtual bool get_CanSeek( );
[VB] Overrides Public ReadOnly Property CanSeek As Boolean
[JScript] public function get CanSeek( ): Boolean;

Description

Gets a value indicating whether the stream supports seeking. This property always returns false.

CanWrite

ToString

[C#] public override bool CanWrite {get;}
[C++] public: _property virtual bool get_CanWrite( );
[VB] Overrides Public ReadOnly Property CanWrite As Boolean
[JScript] public function get CanWrite( ): Boolean;

Description

Gets a value that indicates whether the current stream supports writing.

DataAvailable

ToString

[C#] public virtual bool DataAvailable {get;}
[C++] public: _property virtual bool get_DataAvailable( );
[VB] Overridable Public ReadOnly Property DataAvailable As Boolean
[JScript] public function get DataAvailable( ): Boolean;

Description

Gets a value indicating whether data is available on the stream to be read.

Length

ToString

[C#] public override long Length {get;}
[C++] public: _property virtual _int64 get_Length( );
[VB] Overrides Public ReadOnly Property Length As Long
[JScript] public function get Length( ): long;

Description

The length of the data available on the stream. This property always throws a System.NotSupportedException.

Position

ToString

[C#] public override long Position {get; set;}
[C++] public: _property virtual _int64 get_Position( ); public: _property virtual void set_Position(_int64);
[VB] Overrides Public Property Position As Long
[JScript] public function get Position( ): long;public function set Position(long);

Description

Gets or sets the current position in the stream. This property always throws a System.NotSupportedException.

Readable

ToString

[C#] protected bool Readable {get; set;}
[C++] protected: _property bool get_Readable( ); protected: _property void set_Readable(bool);
[VB] Protected Property Readable As Boolean
[JScript] protected function get Readable( ): Boolean;protected function set Readable(Boolean);

Description

Gets or sets a value indicating that the stream can be read.

The System.Net.Sockets.NetworkStream.Readable property is accessible only through this class or a derived class. Other classes can determine whether a System.Net.Sockets.NetworkStream is readable by checking the System.Net.Sockets.NetworkStream.CanRead property.

Socket

ToString

[C#] protected Socket Socket {get;}
[C++] protected: _property Socket* get_Socket( );
[VB] Protected ReadOnly Property Socket As Socket
[JScript] protected function get Socket( ): Socket;

Description

Gets the underlying network connection.

The System.Net.Sockets.NetworkStream.Socket property represents the underlying network socket that this System.Net.Sockets.NetworkStream encapsulates.

Writeable

ToString

[C#] protected bool Writeable {get; set;}
[C++] protected: _property bool get_Writeable( ); protected: _property void set_Writeable(bool);
[VB] Protected Property Writeable As Boolean
[JScript] protected function get Writeable( ): Boolean;protected function set Writeable(Boolean);

Description

Gets a value that indicates whether the stream is writable.

The System.Net.Sockets.NetworkStream.Writeable property is accessible only through this class or a derived class. Other classes can determine whether a System.Net.Sockets.NetworkStream is writable by checking the System.Net.Sockets.NetworkStream.CanWrite property.

BeginRead

[C#] public override IAsyncResult BeginRead(byte[ ] buffer, int offset, int size, AsyncCallback callback, object state);
[C++] public: IAsyncResult* BeginRead(unsigned char buffer _gc[ ], int offset, int size, AsyncCallback* callback, Object* state);
[VB] Overrides Public Function BeginRead(ByVal buffer( ) As Byte, ByVal offset As Integer, ByVal size As Integer, ByVal callback As AsyncCallback, ByVal state As Object) As IAsyncResult
[JScript] public override function BeginRead(buffer: Byte[ ], offset: int, size: int, callback: AsyncCallback, state: Object): IAsyncResult;

Description

Begins an asynchronous read from a stream.

Return Value: An System.IAsyncResult representing the asynchronous call.

The System.Net.Sockets.NetworkStream.BeginRead (System.Byte[ ],System.Int32,System.Int32,System.AsyncCallback,System.Object) method begins an asynchronous request for data from a network stream. The method that implements the System.AsyncCallback delegate uses the System.Net.Sockets.NetworkStream.EndRead(System.IAsyncResult) method to return the amount of data read from the stream. The location in memory that stores the data from the stream. The location in buffer to begin storing the data to. The size of buffer. The delegate to call when the asynchronous call is complete. An object containing additional information supplied by the client.

BeginWrite

[C#] public override IAsyncResult BeginWrite(byte[ ] buffer, int offset, int size, AsyncCallback callback, object state);

[C++] public: IAsyncResult* BeginWrite(unsigned char buffer _gc[ ], int offset, int size, AsyncCallback* callback, Object* state);

[VB] Overrides Public Function BeginWrite(ByVal buffers As Byte, ByVal offset As Integer, ByVal size As Integer, ByVal callback As AsyncCallback, ByVal state As Object) As IAsyncResult

[JScript] public override function BeginWrite(buffer: Byte[ ], offset: int, size: int, callback: AsyncCallback, state: Object): IAsyncResult;

Description

Begins an asynchronous write to a stream.

Return Value: An System.IAsyncResult representing the asynchronous call.

The System.Net.Sockets.NetworkStream.BeginWrite (System.Byte[ ],System.Int32,System.Int32,System.AsyncCallback,System.Object) method begins to send data asynchronously to the network stream. The method that implements the System.AsyncCallback delegate uses the System.Net.Sockets.NetworkStream.EndRead(System.IAsyncResult) method to complete sending the data. The location in memory that holds the data to send. The location in buffer to begin sending the data. The size of buffer. The delegate to call when the asynchronous call is complete. An object containing additional information supplied by the client.

Close

[C#] public override void Close( );

[C++] public: void Close( );

[VB] Overrides Public Sub Close( )

[JScript] public override function Close( );

Description

Closes the stream and optionally closes the underlying socket.

The System.Net.Sockets.NetworkStream.Close method frees resources used by the System.Net.Sockets.NetworkStream instance and, if the System.Net.Sockets.NetworkStream owns the underlying socket, closes the underlying socket.

Dispose

[C#] protected virtual void Dispose(bool disposing);

[C++] protected: virtual void Dispose(bool disposing);

[VB] Overridable Protected Sub Dispose(ByVal disposing As Boolean)

[JScript] protected function Dispose(disposing: Boolean);

Description

Cleans up a network stream. true if this method was called by another method such as System.Net.Sockets.NetworkStream.Close or System.Net.Sockets.NetworkStream.Dispose(System.Boolean); false if this method was called by the finalizer.

EndRead

[C#] public override int EndRead(IAsyncResult asyncResult);

[C++] public: int EndRead(IAsyncResult* asyncResult);

[VB] Overrides Public Function EndRead(ByVal asyncResult As IAsyncResult) As Integer

[JScript] public override function EndRead(asyncResult: IAsyncResult): int;

Description

Handles the end of an asynchronous read.

Return Value: The number of bytes read from the stream.

The System.Net.Sockets.NetworkStream.EndRead(System.IAsyncResult) method completes an asynchronous read of the network stream started with the System.Net.Sockets.NetworkStream.BeginRead(System.Byte[ ],System.Int32,System.Int32,System.AsyncCallback,System.Object) method. An System.IAsyncResult representing an asynchronous call.

EndWrite

[C#] public override void EndWrite(IAsyncResult asyncResult);

[C++] public: void EndWrite(IAsyncResult* asyncResult);

[VB] Overrides Public Sub EndWrite(ByVal asyncResult As IAsyncResult)

[JScript] public override function EndWrite(asyncResult: IAsyncResult);

Description

Handles the end of an asynchronous write.

The System.Net.Sockets.NetworkStream.EndWrite(System.IAsyncResult) method completes an asynchronous write to a network stream started with the System.Net.Sockets.NetworkStream.BeginWrite(System.Byte[ ],System.Int32,System.Int32,System.AsyncCallback,System.Object) method. The System.IAsyncResult representing the asynchronous call.

Finalize

[C#]~NetworkStream( );

[C++]~NetworkStream( );

[VB] Overrides Protected Sub Finalize( )

[JScript] protected override function Finalize( );

Description

Frees resources used by the System.Net.Sockets.NetworkStream.

The System.Net.Sockets.NetworkStream finalizer calls the System.Net.Sockets.NetworkStream.Close method to close the stream.

Flush

[C#] public override void Flush( );

[C++] public: void Flush( );

[VB] Overrides Public Sub Flush( )

[JScript] public override function Flush( );

Description

Flushes data from the stream. This method is reserved for future use.

The System.Net.Sockets.NetworkStream.Flush method implements the System.IO.Stream.Flush method but, because System.Net.Sockets.NetworkStream is not buffered, has no effect on network streams. Calling the System.Net.Sockets.NetworkStream.Flush method will not throw an exception.

Read

[C#] public override int Read(in byte[ ] buffer, int offset, int size);

[C++] public: int Read(_in unsigned char* buffer gc[ ], int offset, int size);

[VB] Overrides Public Function Read(ByVal buffers As Byte, ByVal offset As Integer, ByVal size As Integer) As Integer

[JScript] public override function Read(in buffer: Byte[ ], offset: int, size: int) int;

Description

Reads data from the stream.

Return Value: The number of bytes read from the stream.

The System.Net.Sockets.NetworkStream.Read(System.Byte[ ],System.Int32,System.Int32) method reads data from the network stream into a data buffer. The location in memory to store data read from the stream. The location in the buffer to begin storing the data to. The number of bytes to read from the stream.

Seek

[C#] public override long Seek(long offset, SeekOrigin origin);

[C++] public: _int64 Seek(_int64 offset, SeekOrigin origin);

[VB] Overrides Public Function Seek(ByVal offset As Long, ByVal origin As SeekOrigin) As Long

[JScript] public override function Seek(offset: long, origin: SeekOrigin): long;

Description

Sets the current position of the stream to the given value. This method always throws a System.NotSupportedException. This parameter is not used. This parameter is not used.

SetLength

[C#] public override void SetLength(long value);

[C++] public: void SetLength(_int64 value);

[VB] Overrides Public Sub SetLength(ByVal value As Long)

[JScript] public override function SetLength(value: long);

Description

Sets the length of the stream. This method always throws a System.NotSupportedException. This parameter is not used.

IDisposable.Dispose

[C#] void IDisposable.Dispose( );

[C++] void IDisposable::Dispose( );

[VB] Sub Dispose( ) Implements IDisposable.Dispose

[JScript] function IDisposable.Dispose( );

Write

[C#] public override void Write(byte[ ] buffer, int offset, int size);

[C++] public: void Write(unsigned char buffer _gc[ ], int offset, int size);

[VB] Overrides Public Sub Write(ByVal buffers As Byte, ByVal offset As Integer, ByVal size As Integer)

[JScript] public override function Write(buffer: Byte[ ], offset: int, size: int);

Description

Writes data to the stream.

Return Value: The number of bytes written to the stream.

The System.Net.Sockets.NetworkStream.Write(System.Byte[ ],System.Int32,System.Int32) method sends the contents of a data buffer to the network. The data to write to the stream. The location in the buffer to start writing data from. The number of bytes to write to the stream.

ProtocolFamily enumeration (System.Net. Sockets)

WriteByte

Description

Specifies the type of protocol that an instance of the System.Net.Sockets.Socket class can use.

The System.Net.Sockets.ProtocolFamily enumeration specifies the protocol scheme used by the System.Net.Sockets.Socket class to resolve an address. For example, System.Net.Sockets.ProtocolFamily.InterNetwork indicates that the IP version 4 protocol is expected when a System.Net.Sockets.Socket connects to an endpoint.

WriteByte

[C#] public const ProtocolFamily AppleTalk;

[C++] public: const ProtocolFamily AppleTalk;

[VB] Public Const AppleTalk As ProtocolFamily

[JScript] public var AppleTalk: ProtocolFamily;

Description

AppleTalk protocol.

WriteByte

[C#] public const ProtocolFamily Atm;

[C++] public: const ProtocolFamily Atm;

[VB] Public Const Atm As ProtocolFamily

[JScript] public var Atm: ProtocolFamily;

Description

Native ATM services protocol.

WriteByte

[C#] public const ProtocolFamily Banyan;

[C++] public: const ProtocolFamily Banyan;

[VB] Public Const Banyan As ProtocolFamily

[JScript] public var Banyan: ProtocolFamily;

Description

Banyan protocol.

WriteByte

[C#] public const ProtocolFamily Ccitt;

[C++] public: const ProtocolFamily Ccitt;

[VB] Public Const Ccitt As ProtocolFamily

[JScript] public var Ccitt: ProtocolFamily;

Description

CCITT protocol, such as X.25.

WriteByte

[C#] public const ProtocolFamily Chaos;

[C++] public: const ProtocolFamily Chaos;

[VB] Public Const Chaos As ProtocolFamily

[JScript] public var Chaos: ProtocolFamily;

Description

MIT CHAOS protocol.

WriteByte

[C#] public const ProtocolFamily Cluster;

[C++] public: const ProtocolFamily Cluster;

[VB] Public Const Cluster As ProtocolFamily

[JScript] public var Cluster: ProtocolFamily;

Description

Microsoft Cluster products protocol.

WriteByte

[C#] public const ProtocolFamily DataKit;

[C++] public: const ProtocolFamily DataKit;

[VB] Public Const DataKit As ProtocolFamily

[JScript] public var DataKit: ProtocolFamily;

Description

DataKit protocol.

WriteByte

[C#] public const ProtocolFamily DataLink;

[C++] public: const ProtocolFamily DataLink;

[VB] Public Const DataLink As ProtocolFamily

[JScript] public var DataLink: ProtocolFamily;

Description

Direct data link protocol.

WriteByte

[C#] public const ProtocolFamily DecNet;

[C++] public: cofist ProtocolFamily DecNet;

[VB] Public Const DecNet As ProtocolFamily

[JScript] public var DecNet: ProtocolFamily;

Description

DECNet protocol.

WriteByte

[C#] public const ProtocolFamily Ecma;

[C++] public: const ProtocolFamily Ecma;

[VB] Public Const Ecma As ProtocolFamily

[JScript] public var Ecma: ProtocolFamily;

Description
European Computer Manufactures Association (ECMA) protocol.
WriteByte
[C#] public const ProtocolFamily FireFox;
[C++] public: const ProtocolFamily FireFox;
[VB] Public Const FireFox As ProtocolFamily
[JScript] public var FireFox: ProtocolFamily;

Description
FireFox protocol.
WriteByte
[C#] public const ProtocolFamily HyperChannel;
[C++] public: const ProtocolFamily HyperChannel;
[VB] Public Const HyperChannel As ProtocolFamily
[JScript] public var HyperChannel: ProtocolFamily;

Description
NSC HyperChannel protocol.
WriteByte
[C#] public const ProtocolFamily Ieee12844;
[C++] public: const ProtocolFamily Ieee12844;
[VB] Public Const Ieee12844 As ProtocolFamily
[JScript] public var Ieee12844: ProtocolFamily;

Description
IEEE 1284.4 workgroup protocol.
WriteByte
[C#] public const ProtocolFamily ImpLink;
[C++] public: const ProtocolFamily ImpLink;
[VB] Public Const ImpLink As ProtocolFamily
[JScript] public var ImpLink: ProtocolFamily;

Description
ARPANET IMP protocol.
WriteByte
[C#] public const ProtocolFamily InterNetwork;
[C++] public: const ProtocolFamily InterNetwork;
[VB] Public Const InterNetwork As ProtocolFamily
[JScript] public var InterNetwork: ProtocolFamily;

Description
IP version 4 protocol.
WriteByte
[C#] public const ProtocolFamily InterNetworkV6;
[C++] public: const ProtocolFamily InterNetworkV6;
[VB] Public Const InterNetworkV6 As ProtocolFamily
[JScript] public var InterNetworkV6: ProtocolFamily;

Description
IP version 6 protocol.
WriteByte
[C#] public const ProtocolFamily Ipx;
[C++] public: const ProtocolFamily Ipx;
[VB] Public Const Ipx As ProtocolFamily
[JScript] public var Ipx: ProtocolFamily;

Description
IPX or SPX protocol.
WriteByte
[C#] public const ProtocolFamily Irda;
[C++] public: const ProtocolFamily Irda;
[VB] Public Const Irda As ProtocolFamily
[JScript] public var Irda: ProtocolFamily;

Description
IrDA protocol.
WriteByte
[C#] public const ProtocolFamily Iso;
[C++] public: const ProtocolFamily iso;
[VB] Public Const Iso As ProtocolFamily
[JScript] public var Iso: ProtocolFamily;

Description
ISO protocol.
WriteByte
[C#] public const ProtocolFamily Lat;
[C++] public: const ProtocolFamily Lat;
[VB] Public Const Lat As ProtocolFamily
[JScript] public var Lat: ProtocolFamily;

Description
LAT protocol.
WriteByte
[C#] public const ProtocolFamily Max;
[C++] public: const ProtocolFamily Max;
[VB] Public Const Max As ProtocolFamily
[JScript] public var Max: ProtocolFamily;

Description
MAX protocol.
WriteByte
[C#] public const ProtocolFamily NetBios;
[C++] public: const ProtocolFamily NetBios;
[VB] Public Const NetBios As ProtocolFamily
[JScript] public var NetBios: ProtocolFamily;

Description
NetBios protocol.
WriteByte
[C#] public const ProtocolFamily NetworkDesigners;
[C++] public: const ProtocolFamily NetworkDesigners;
[VB] Public Const NetworkDesigners As ProtocolFamily
[JScript] public var NetworkDesigners: ProtocolFamily;

Description
Network Designers OSI gateway enabled protocol.
WriteByte
[C#] public const ProtocolFamily NS;
[C++] public: const ProtocolFamily NS;
[VB] Public Const NS As ProtocolFamily
[JScript] public var NS: ProtocolFamily;

Description
Xerox NS protocol.
WriteByte
[C#] public const ProtocolFamily Osi;
[C++] public: const ProtocolFamily Osi;
[VB] Public Const Osi As ProtocolFamily
[JScript] public var Osi: ProtocolFamily;

Description
OSI protocol.
WriteByte
[C#] public const ProtocolFamily Pup;
[C++] public: const ProtocolFamily Pup;
[VB] Public Const Pup As ProtocolFamily
[JScript] public var Pup: ProtocolFamily;

Description
PUP protocol.
WriteByte
[C#] public const ProtocolFamily Sna;
[C++] public: const ProtocolFamily Sna;
[VB] Public Const Sna As ProtocolFamily
[JScript] public var Sna: ProtocolFamily;

Description
IBM SNA protocol.
WriteByte
[C#] public const ProtocolFamily Unix;
[C++] public: const ProtocolFamily Unix;
[VB] Public Const Unix As ProtocolFamily
[JScript] public var Unix: ProtocolFamily;

Description
Unix local to host protocol.
WriteByte
[C#] public const ProtocolFamily Unknown;
[C++] public: const ProtocolFamily Unknown;
[VB] Public Const Unknown As ProtocolFamily
[JScript] public var Unknown: ProtocolFamily;

Description
Unknown protocol.
WriteByte
[C#] public const ProtocolFamily Unspecified;
[C++] public: const ProtocolFamily Unspecified;
[VB] Public Const Unspecified As ProtocolFamily
[JScript] public var Unspecified: ProtocolFamily;

Description
Unspecified protocol.
WriteByte
[C#] public const ProtocolFamily VoiceView;
[C++] public: const ProtocolFamily VoiceView;
[VB] Public Const VoiceView As ProtocolFamily
[JScript] public var VoiceView: ProtocolFamily;

Description
VoiceView protocol.
ProtocolType enumeration (System.Net.Sockets)
ToString Description
Specifies the protocols that the System.Net.Sockets.Socket class supports.

The System.Net.Sockets.ProtocolType enumeration is used by the System.Net.Sockets.Socket class to indicate to the Windows Socket API the requested protocol for the socket. Low-level driver software for the requested protocol must be present on the computer for the System.Net.Sockets.Socket to be created.

ToString
[C#] public const ProtocolType Ggp;
[C++] public: const ProtocolType Ggp;
[VB] Public Const Ggp As ProtocolType
[JScript] public var Ggp: ProtocolType;

Description
Gateway To Gateway Protocol.
ToString
[C#] public const ProtocolType Icmp;
[C++] public: const ProtocolType Icmp;
[VB] Public Const Icmp As ProtocolType
[JScript] public var Icmp: ProtocolType;

Description
Internet Control Message Protocol.
ToString
[C#] public const ProtocolType Idp;
[C++] public: const ProtocolType Idp;
[VB] Public Const Idp As ProtocolType
[JScript] public var Idp: ProtocolType;

Description
IDP Protocol.
ToString
[C#] public const ProtocolType Igmp;
[C++] public: const ProtocolType Igmp;
[VB] Public Const Igmp As ProtocolType
[JScript] public var Igmp: ProtocolType;

Description
Internet Group Management Protocol.
ToString
[C#] public const ProtocolType IP;
[C++] public: const ProtocolType IP;
[VB] Public Const IP As ProtocolType
[JScript] public var IP: ProtocolType;

Description
Internet Protocol.
ToString
[C#] public const ProtocolType Ipx;
[C++] public: const ProtocolType Ipx;
[VB] Public Const Ipx As ProtocolType
[JScript] public var Ipx: ProtocolType;

Description
IPX Protocol.
ToString
[C#] public const ProtocolType ND;
[C++] public: const ProtocolType ND;
[VB] Public Const ND As ProtocolType
[JScript] public var ND: ProtocolType;

Description
Net Disk Protocol (unofficial).
ToString
[C#] public const ProtocolType Pup;
[C++] public: const ProtocolType Pup;
[VB] Public Const Pup As ProtocolType
[JScript] public var Pup: ProtocolType;

Description
PUP Protocol.
ToString
[C#] public const ProtocolType Raw;
[C++] public: const ProtocolType Raw;
[VB] Public Const Raw As ProtocolType
[JScript] public var Raw: ProtocolType;

Description
Raw UP packet protocol.
ToString
[C#] public const ProtocolType Spx;
[C++] public: const ProtocolType Spx;
[VB] Public Const Spx As ProtocolType
[JScript] public var Spx: ProtocolType;

Description
SPX Protocol.
ToString
[C#] public const ProtocolType SpxII;
[C++] public: const ProtocolType SpxII;
[VB] Public Const SpxII As ProtocolType
[JScript] public var SpxII: ProtocolType;

Description
SPX Version 2 Protocol.
ToString
[C#] public const ProtocolType Tcp;
[C++] public: const ProtocolType Tcp;
[VB] Public Const Tcp As ProtocolType
[JScript] public var Tcp: ProtocolType;

Description
Transmission Control Protocol.
ToString
[C#] public const ProtocolType Udp; [C++] public: const ProtocolType Udp;
[VB] Public Const Udp As ProtocolType
[JScript] public var Udp: ProtocolType;

Description
User Datagram Protocol.
ToString
[C#] public const ProtocolType Unknown;
[C++] public: const ProtocolType Unknown;
[VB] Public Const Unknown As ProtocolType
[JScript] public var Unknown: ProtocolType;

Description
Unknown protocol.
ToString
[C#] public const ProtocolType Unspecified;
[C++] public: const ProtocolType Unspecified;
[VB] Public Const Unspecified As ProtocolType
[JScript] public var Unspecified: ProtocolType;

Description
Unspecified protocol.
SelectMode enumeration (System.Net.Sockets)
ToString Description
Defines the polling modes for the System.Net.Sockets.Socket.Poll(System.Int32,System.Net.Sockets.SelectMode) method.

The System.Net.Sockets.SelectMode enumeration defines the polling modes that can be passed to the System.Net.Sockets.Socket.Poll(System.Int32,System.Net.Sockets.SelectMode) method.
ToString
[C#] public const SelectMode SelectError;
[C++] public: const SelectMode SelectError;
[VB] Public Const SelectError As SelectMode
[JScript] public var SelectError: SelectMode;

Description
Error status mode.
ToString
[C#] public const SelectMode SelectRead;
[C++] public: const SelectMode SelectRead;
[VB] Public Const SelectRead As SelectMode
[JScript] public var SelectRead: SelectMode;

Description
Read status mode.
ToString
[C#] public const SelectMode SelectWrite;
[C++] public: const SelectMode SelectWrite;
[VB] Public Const SelectWrite As SelectMode
[JScript] public var SelectWrite: SelectMode;

Description
Write status mode.
Socket class (System.Net.Sockets)
ToString

Description
Implements the Berkeley sockets interface.

The System.Net.Sockets.Socket class creates a managed version of an Internet transport service. Once the socket is created, it is bound to a specific endpoint through the System.Net.Sockets.Socket.Bind(System.Net.EndPoint) method, and the connection to that endpoint is established through the System.Net.Sockets.Socket.Connect(System.Net.EndPoint) method.
Socket
Example Syntax:
ToString
[C#] public Socket(AddressFamily addressFamily, SocketType socketType, ProtocolType protocolType);
[C++] public: Socket(AddressFamily addressFamily, SocketType socketType, ProtocolType protocolType);
[VB] Public Sub New(ByVal addressFamily As AddressFamily, ByVal socketType As SocketType, ByVal protocolType As ProtocolType)
[JScript] public function Socket(addressFamily: AddressFamily, socketType: SocketType, protocolType: ProtocolType);

Description
Initializes a new instance of the System.Net.Sockets.Socket class.

The addressFamily parameter specifies the addressing scheme that the socket uses, the socketType parameter specifies the type of the socket, and the protocolType parameter specifies the protocol used by the socket. The three parameters are not independent. Some address families restrict which protocols can be used with them, and often the socket type is implicit in the protocol. If the combination of address family, socket type, and protocol type results in an invalid socket, a System.Net.Sockets.SocketException is thrown. One of the System.Net.Sockets.AddressFamily values. One of the System.Net.Sockets.SocketType values. One of the System.Net.Sockets.ProtocolType values.
AddressFamily
ToString
[C#] public AddressFamily AddressFamily {get;}
[C++] public: _property AddressFamily get_AddressFamily( );
[VB] Public ReadOnly Property AddressFamily As AddressFamily
[JScript] public function get AddressFamily( ): AddressFamily;

Description
Gets the address family of the socket.

Available
ToString
[C#] public int Available {get;}
[C++] public: _property int get_Available( );
[VB] Public ReadOnly Property Available As Integer
[JScript] public function get Available( ): int;

Description
Gets the amount of data that has been received from the network and is available to be read.
Blocking
ToString
[C#] public bool Blocking {get; set;}
[C++] public: _property bool get_Blocking( );public: _property void set_Blocking(bool);
[VB] Public Property Blocking As Boolean
[JScript] public function get Blocking( ): Boolean;public function set Blocking(Boolean);

Description
Gets or sets a value that indicates whether the socket is in blocking mode.

The System.Net.Sockets.Socket.Blocking property indicates whether a System.Net.Sockets.Socket is in blocking mode.

Connected

ToString

[C#] public bool Connected {get;}

[C++] public: _property bool get_Connected( );

[VB] Public ReadOnly Property Connected As Boolean

[JScript] public function get Connected( ): Boolean;

Description

Gets a value indicating whether a socket is connected to a remote resource.

System.Net.Sockets.Socket.Connected returns true if the socket has either connected to a remote resource or accepted a connection from a remote resource.

Handle

ToString

[C#] public IntPtr Handle {get;}

[C++] public: _property IntPtr get_Handle( );

[VB] Public ReadOnly Property Handle As IntPtr

[JScript] public function get Handle( ): IntPtr;

Description

Gets the operating system handle for the socket.

LocalEndPoint

ToString

[C#] public EndPoint LocalEndPoint {get;}

[C++] public: _property EndPoint* get_LocalEndPoint( );

[VB] Public ReadOnly Property LocalEndPoint As EndPoint

[JScript] public function get LocalEndPoint( ): EndPoint;

Description

Gets the local endpoint.

The System.Net.Sockets.Socket.LocalEndPoint property contains the network connection information associated with the local network device.

ProtocolType

ToString

[C#] public ProtocolType ProtocolType {get;}

[C++] public: _property ProtocolType get_ProtocolType( );

[VB] Public ReadOnly Property ProtocolType As ProtocolType

[JScript] public function get ProtocolType( ): ProtocolType;

Description

Gets the protocol type of the socket.

RemoteEndPoint

ToString

[C#] public EndPoint RemoteEndPoint {get;}

[C++] public: _property EndPoint* get_RemoteEndPoint( );

[VB] Public ReadOnly Property RemoteEndPoint As EndPoint

[JScript] public function get RemoteEndPoint( ): EndPoint;

Description

Gets the remote endpoint.

The System.Net.Sockets.Socket.RemoteEndPoint property gets the network connection information associated with the remote network device.

SocketType

ToString

[C#] public SocketType SocketType {get;}

[C++] public: _property SocketType get_SocketType( );

[VB] Public ReadOnly Property SocketType As SocketType

[JScript] public function get SocketType( ): SocketType;

Description

Gets the type of the socket.

Accept

[C#] public Socket Accept( );

[C++] public: Socket* Accept( );

[VB] Public Function Accept( ) As Socket

[JScript] public function Accept( ): Socket;

Description

Creates a new System.Net.Sockets.Socket to handle an incoming connection request.

Return Value: A System.Net.Sockets.Socket instance to handle an incoming connection request.

The System.Net.Sockets.Socket.Accept method extracts the first connection request from the queue of pending requests and creates a new System.Net.Sockets.Socket instance to handle it. The System.Net.Sockets.Socket returned by System.Net.Sockets.Socket.Accept is a duplicate of the current System.Net.Sockets.Socket.

BeginAccept

[C#] public IAsyncResult BeginAccept(AsyncCallback callback, object state);

[C++] public: IAsyncResult* BeginAccept(AsyncCallback* callback, Object* state);

[VB] Public Function BeginAccept(ByVal callback As AsyncCallback, ByVal state As Object) As IAsyncResult

[JScript] public function BeginAccept(callback: AsyncCallback, state: Object): IAsyncResult;

Description

Begins an asynchronous request to create a new socket to accept an incoming connection request.

Return Value: An System.IAsyncResult that references the asynchronous socket creation.

The System.Net.Sockets.Socket.BeginAccept(System.AsyncCallback,System.Object) method starts an asynchronous request to create a socket to handle an incoming connection request. The callback method that implements the System.AsyncCallback delegate uses the System.Net.Sockets.Socket.EndAccept(System.IAsyncResult) method to return the socket. The System.AsyncCallbackdelegate. An object containing state information for this request.

BeginConnect

[C#] public IAsyncResult BeginConnect(EndPoint remoteEP, AsyncCallback callback, object state);

[C++] public: IAsyncResult* BeginConnect(EndPoint* remoteEP, AsyncCallback* callback, Object* state);

[VB] Public Function BeginConnect(ByVal remoteEP As EndPoint, ByVal callback As AsyncCallback, ByVal state As Object) As IAsyncResult

[JScript] public function BeginConnect(remoteEP: EndPoint, callback: AsyncCallback, state: Object): IAsyncResult;

Description

Begins an asynchronous request for a connection to a network device.

Return Value: An System.IAsyncResult that references the asynchronous connection.

The System.Net.Sockets.Socket.BeginConnect(System.Net.EndPoint,System.AsyncCallback,System.Object) method starts an asynchronous request for a connection to a remote device. The callback method that implements the System.AsyncCallback delegate uses the System.Net.Sockets.Socket.EndConnect(System.IAsyncResult) method to return the socket. An System.Net.EndPoint instance that represents the remote device. The System.AsyncCallback delegate. An object that contains state information for this request.

BeginReceive

[C#] public IAsyncResult BeginReceive(byte[ ] buffer, int offset, int size, SocketFlags socketFlags, AsyncCallback callback, object state);

[C++] public: IAsyncResult* BeginReceive(unsigned char buffer _gc[ ], int offset, int size, SocketFlags socketFlags, AsyncCallback* callback, Object* state);

[VB] Public Function BeginReceive(ByVal buffer( ) As Byte, ByVal offset As Integer, ByVal size As Integer, ByVal socketFlags As SocketFlags, ByVal callback As AsyncCallback, ByVal state As Object) As IAsyncResult

[JScript] public function BeginReceive(buffer: Byte[ ], offset: int, size: int, socketFlags: SocketFlags, callback: AsyncCallback, state: Object): IAsyncResult;

Description

Begins to asynchronously receive data from a connected socket.

Return Value: An System.IAsyncResult that references the asynchronous read.

The System.Net.Sockets.Socket.BeginReceive(System.Byte[ ],System.Int32,System.Int32,System.Net.Sockets.SocketFlags,System.AsyncCallback,System.Object) method starts asynchronously reading data from a socket. The callback method that implements the System.AsyncCallback delegate uses the System.Net.Sockets.Socket.EndReceive (System.IAsyncResult) method to return the data read from the socket. The storage location for the received data. The zero-based position in the buffer at which to store the received data. The number of bytes to receive. A bitwise combination of the System.Net.Sockets.SocketFlags values. The System.AsyncCallback delegate. An object containing state information for this request.

BeginReceiveFrom

[C#] public IAsyncResult BeginReceiveFrom(byte[ ] buffer, int offset, int size, SocketFlags socketFlags, ref EndPoint remoteEP, AsyncCallback callback, object state);

[C++] public: IAsyncResult* BeginReceiveFrom(unsigned char buffer _gc[ ], int offset, int size, SocketFlags socketFlags, EndPoint** remoteEP, AsyncCallback* callback, Object* state);

[VB] Public Function BeginReceiveFrom(ByVal buffers As Byte, ByVal offset As Integer, ByVal size As Integer, ByVal socketFlags As SocketFlags, ByRef remoteEP As EndPoint, ByVal callback As AsyncCallback, ByVal state As Object) As IAsyncResult

[JScript] public function BeginReceiveFrom(buffer: Byte[ ], offset: int, size: int, socketFlags: SocketFlags, remoteEP: EndPoint, callback: AsyncCallback, state Object): IAsyncResult;

Description

Begins to asynchronously receive data from a specified network device.

Return Value: An System.IAsyncResult that references the asynchronous read.

The System.Net.Sockets.Socket.BeginReceiveFrom(System.Byte[ ],System.Int32,System.Int32,System.Net.Sockets.SocketFlags,System.Net.EndPoint @,System.AsyncCallback,System.Object) method starts asynchronously reading data from a socket. The callback method that implements the System.AsyncCallback delegate uses the System.Net.Sockets.Socket.EndReceive(System.IAsyncResult) method to return the data read from the socket. The storage location for the received data. The zero-based position in the buffer at which to store the data. The number of bytes to receive. A bitwise combination of the System.Net.Sockets.SocketFlags values. An System.Net.EndPoint that represents the source of the data. The System.AsyncCallback delegate. An object containing state information for this request.

BeginSend

[C#] public IAsyncResult BeginSend(byte[ ] buffer, int offset, int size, SocketFlags socketFlags, AsyncCallback callback, object state);

[C++] public: IAsyncResult* BeginSend(unsigned char buffer _gc[ ], int offset, int size, SocketFlags socketFlags, AsyncCallback* callback, Object* state);

[VB] Public Function BeginSend(ByVal buffers As Byte, ByVal offset As Integer, ByVal size As Integer, ByVal socketFlags As SocketFlags, ByVal callback As AsyncCallback, ByVal state As Object) As IAsyncResult

[JScript] public function BeginSend(buffer: Byte[ ], offset: int, size: int, socketFlags: SocketFlags, callback: AsyncCallback, state: Object) IAsyncResult;

Description

Sends data asynchronously to a connected socket.

Return Value: An System.IAsyncResult that references the asynchronous send.

The System.Net.Sockets.Socket.BeginSend(System.Byte[ ],System.Int32,System.Int32,System.Net.Sockets.SocketFlags,System.AsyncCallback,System.Object) method starts asynchronously sending data through a socket. The callback method that implements the System.AsyncCallback delegate uses the System.Net.Sockets.Socket.EndSend (System.IAsyncResult) method to complete sending data. The data to send. The zero-based position in buffer at which to begin sending data. The number of bytes to send. A bitwise combination of the System.Net.Sockets.SocketFlags values. The System.AsyncCallback delegate. An object containing state information for this request.

BeginSendTo

[C#] public IAsyncResult BeginSendTo(byte[ ] buffer, int offset, int size, SocketFlags socketFlags, EndPoint remoteEP, AsyncCallback callback, object state);

[C++] public: IAsyncResult* BeginSendTo(unsigned char buffer _gc[ ], int offset, int size, SocketFlags socketFlags, EndPoint* remoteEP, AsyncCallback* callback, Object* state);

[VB] Public Function BeginSendTo(ByVal buffer( ) As Byte, ByVal offset As Integer, ByVal size As Integer, ByVal socketFlags As SocketFlags, ByVal remoteEP As EndPoint, ByVal callback As AsyncCallback, ByVal state As Object) As IAsyncResult

[JScript] public function BeginSendTo(buffer: Byte[ ], offset: int, size: int, socketFlags: SocketFlags, remoteEP: EndPoint, callback: AsyncCallback, state: Object): IAsyncResult;

Description

Sends data asynchronously to a specific network device.

Return Value: An System.IAsyncResult that references the asynchronous send.

The System.Net.Sockets.Socket.BeginSendTo(System.Byte[ ],System.Int32,System.Int32,System.Net.Sockets.SocketFlags,System.Net.EndPoint,System.AsyncCallback,System.Object) method starts asynchronously sending data through a socket. The callback method that implements the System.AsyncCallback delegate uses the System.Net.Sockets.Socket.EndSendTo(System.IAsyncResult) method to complete sending data. The data to send. The zero-based position in buffer at which to begin sending data. The number of bytes to send. A bitwise combination of the System.Net.Sockets.SocketFlags values. An System.Net.EndPoint that represents the remote device. The System.AsyncCallback delegate. An object containing state information for this request.

Bind

[C#] public void Bind(EndPoint localEP);

[C++] public: void Bind(EndPoint* localEP);

[VB] Public Sub Bind(ByVal localEP As EndPoint)

[JScript] public function Bind(localEP: EndPoint);

Description

Associates a socket with a local endpoint.

You must call the System.Net.Sockets.Socket.Bind(System.Net.EndPoint) method before you call the System.Net.Sockets.Socket.Listen(System.Int32) or System.Net.Sockets.Socket.Connect (System.Net.EndPoint) methods. The local System.Net.EndPoint to associate with the socket.

Close

[C#] public void Close( );

[C++] public: void Close( );

[VB] Public Sub Close( )

[JScript] public function Close( );

Description

Forces a socket connection to close.

The System.Net.Sockets.Socket.Connected property is set to false when the socket is closed.

Connect

[C#] public void Connect(EndPoint remoteEP);

[C++] public: void Connect(EndPoint* remoteEP);

[VB] Public Sub Connect(ByVal remoteEP As EndPoint)

[JScript] public function Connect(remoteEP: EndPoint);

Description

Establishes a connection to a remote device.

The System.Net.Sockets.Socket.Connect(System.Net.EndPoint) method establishes a network connection between System.Net.Sockets.Socket.LocalEndPoint and the device identified by remoteEP. Once the connection has been made, you can send data to the remote device with the System.Net.Sockets.Socket.Send(System.Byte[ ],System.Int32,System.Net.Sockets.SocketFlags) method, or receive data from the remote device with the System.Net.Sockets.Socket.Receive (System.Byte[ ],System.Int32,System.Net.Sockets.SocketFlags) method. An System.Net.EndPoint instance that represents the remote device.

Dispose

[C#] protected virtual void Dispose(bool disposing);

[C++] protected: virtual void Dispose(bool disposing);

[VB] Overridable Protected Sub Dispose(ByVal disposing As Boolean)

[JScript] protected function Dispose(disposing: Boolean);

Description

EndAccept

[C#] public Socket EndAccept(IAsyncResult asyncResult);

[C++] public: Socket* EndAccept(IAsyncResult* asyncResult);

[VB] Public Function EndAccept(ByVal asyncResult As IAsyncResult) As Socket

[JScript] public function EndAccept(asyncResult: IAsyncResult): Socket;

Description

Ends an asynchronous request to create a new socket to accept an incoming connection request.

Return Value: A System.Net.Sockets.Socket to handle the incoming connection.

The System.Net.Sockets.Socket.EndAccept(System.IAsyncResult) method completes a request for a connection that was started with the System.Net.Sockets.Socket.BeginAccept(System.AsyncCallback,System.Object) method. The pending request for an incoming socket.

EndConnect

[C#] public void EndConnect(IAsyncResult asyncResult);

[C++] public: void EndConnect(IAsyncResult* asyncResult);

[VB] Public Sub EndConnect(ByVal asyncResult As IAsyncResult)

[JScript] public function EndConnect(asyncResult: IAsyncResult);

Description

Ends a pending synchronous connection request. The pending asynchronous connection request.

EndReceive

[C#] public int EndReceive(IAsyncResult asyncResult);

[C++] public: int EndReceive(IAsyncResult* asyncResult);

[VB] Public Function EndReceive(ByVal asyncResult As IAsyncResult) As is Integer

[JScript] public function EndReceive(asyncResult: IAsyncResult): int;

Description

Ends a pending asynchronous read.

Return Value: The number of bytes received. The pending asynchronous read.

EndReceiveFrom

[C#] public int EndReceiveFrom(IAsyncResult asyncResult, ref EndPoint endPoint);

[C++] public: int EndReceiveFrom(IAsyncResult* asyncResult, EndPoint** endPoint);

[VB] Public Function EndReceiveFrom(ByVal asyncResult As IAsyncResult, ByRef endPoint As EndPoint) As Integer

[JScript] public function EndReceiveFrom(asyncResult: IAsyncResult, endPoint: EndPoint): int;

Description

Ends a pending asynchronous read from a specific endpoint.

Return Value: If successful, the number of bytes received. If unsuccessful, then if the socket was closed with System.Net.Sockets.Socket.Close, returns 0; otherwise, returns an invalid socket error. The pending asynchronous read. The source endpoint.

EndSend

[C#] public int EndSend(IAsyncResult asyncResult);

[C++] public: int EndSend(IAsyncResult* asyncResult);

[VB] Public Function EndSend(ByVal asyncResult As IAsyncResult) As Integer

[JScript] public function EndSend(asyncResult: IAsyncResult): int;

Description

Ends a pending asynchronous send.

Return Value: If successful, the number of bytes sent to the socket; otherwise, an invalid socket error is returned. The pending asynchronous send.

EndSendTo

[C#] public int EndSendTo(IAsyncResult asyncResult);

[C++] public: int EndSendTo(IAsyncResult* asyncResult);

[VB] Public Function EndSendTo(ByVal asyncResult As IAsyncResult) As Integer

[JScript] public function EndSendTo(asyncResult: IAsyncResult): int;

Description

Ends a pending asynchronous send to a specific location.

Return Value: If successful, the number of bytes sent; otherwise, an invalid socket error is returned. The pending asynchronous send.

Finalize

[C#]~Socket( );

[C++]~Socket( );

[VB] Overrides Protected Sub Finalize( )

[JScript] protected override function Finalize( );

Description

Frees resources used by the System.Net.Sockets.Socket class.

The System.Net.Sockets.Socket class finalizer calls the System.Net.Sockets.Socket.Close method to close the socket and free resources associated with the socket.

GetHashCode

[C#] public override int GetHashCode( );

[C++] public: int GetHashCode( );

[VB] Overrides Public Function GetHashCode( ) As Integer

[JScript] public override function GetHashCode( ): int;

Description

GetSocketOption

[C#] public object GetSocketOption(SocketOptionLevel optionLevel, SocketOptionName optionName);

[C++] public: Object* GetSocketOption(SocketOptionLevel optionLevel, SocketOptionName optionName);

[VB] Public Function GetSocketOption(ByVal optionLevel As SocketOptionLevel, ByVal optionName As SocketOptionName) As Object

[JScript] public function GetSocketOption(optionLevel: SocketOptionLevel, optionName: SocketOptionName): Object; Gets the value of a socket option.

Description

Gets the value of a specified socket option.

Return Value: The value of the option. When optionName is set to System.Net.Sockets.SocketOptionName.Linger the return value is an instance of System.Net.Sockets.LingerOption. When optionName is set to System.Net.Sockets.SocketOptionName.AddMembership or System.Net.Sockets.SocketOptionName.DropMembership, the return value is an instance of System.Net.Sockets.MulticastOption. When optionName is any other value, the return value is an integer. One of the System.Net.Sockets.SocketOptionLevel values. One of the System.Net.Sockets.SocketOptionName values.

GetSocketOption

[C#] public void GetSocketOption(SocketOptionLevel optionLevel, SocketOptionName optionName, byte[ ] optionValue);

[C++] public: void GetSocketOption(SocketOptionLevel optionLevel, SocketOptionName optionName, unsigned char optionValue_gc[ ]);

[VB] Public Sub GetSocketOption(ByVal optionLevel As SocketOptionLevel, ByVal optionName As SocketOptionName, ByVal optionValue( ) As Byte)

[JScript] public function GetSocketOption(optionLevel: SocketOptionLevel, optionName: SocketOptionName, optionValue: Byte[ ]);

Description

Gets the specified socket option setting. One of the System.Net.Sockets.SocketOptionLevel values. One of the System.Net.Sockets.SocketOptionName values. The buffer to receive the option setting.

GetSocketOption

[C#] public byte[ ] GetSocketOption(SocketOptionLevel optionLevel, SocketOptionName optionName, int optionLength);

[C++] public: unsigned char GetSocketOption(SocketOptionLevel optionLevel, SocketOptionName optionName, int optionLength) _gc[ ];

[VB] Public Function GetSocketOption(ByVal optionLevel As SocketOptionLevel, ByVal optionName As SocketOptionName, ByVal optionLength As Integer) As Byte( )

[JScript] public function GetSocketOption(optionLevel: SocketOptionLevel, optionName: SocketOptionName, optionLength: int): Byte[ ];

Description

Gets the value of the specified socket option and returns an array.

Return Value: An array of bytes containing the value of the socket option.

The optionLength parameter sets the maximum size of the returned byte array. If the option value requires fewer bytes, the array will contain only that many bytes. If the option value requires more bytes, a System.Net.Sockets.SocketException will be thrown. One of the System.Net.Sockets.SocketOptionLevel values. One of the System.Net.Sockets.SocketOptionName values. The length, in bytes, of the expected return value.

IOControl

[C#] public int IOControl(int ioControlCode, byte[ ] optionInValue, byte[ ] optionOutValue);

[C++] public: int IOControl(int ioControlCode, unsigned char optionInValue_gc[ ], unsigned char optionOutValue_gc[ ]);

[VB] Public Function IOControl(ByVal ioControlCode As Integer, ByVal optionInValue( ) As Byte, ByVal optionOutValue( ) As Byte) As Integer

[JScript] public function IOControl(ioControlCode: int, optionInValue: Byte[ ], optionOutValue: Byte[ ]): int;

Description

Sets low-level operating modes for the socket.

Return Value: The number of bytes returned in optionOutValue.

The System.Net.Sockets.Socket.IOControl(System.Int32,System.Byte[ ],System.Byte[ ]method provides low-level access to the operating system socket underlying the System.Net.Sockets.Socket class instance. For more information about System.Net.Sockets.Socket.IOControl(System.Int32,System.Byte[ ],System.Byte[ ]), see the documentation in MSDN. The control code of the operation to perform. The input data required by the operation. The output data returned by the operation.

Listen

[C#] public void Listen(int backlog);

[C++] public: void Listen(int backlog);

[VB] Public Sub Listen(ByVal backlog As Integer)

[JScript] public function Listen(backlog: int);

Description

Places a socket in a listening state.

If System.Net.Sockets.Socket.Listen(System.Int32) is successful, System.Net.Sockets.Socket.Connected is set to true. Maximum length of the queue of pending connections.

Poll

[C#] public bool Poll(int microseconds, SelectMode mode);

[C++] public: bool Poll(int microSeconds, SelectMode mode);

[VB] Public Function Poll(ByVal microseconds As Integer, ByVal mode As SelectMode) As Boolean

[JScript] public function Poll(microSeconds: int, mode: SelectMode): Boolean;

Description

Determines the status of the socket.

Return Value: Mode Return Value SelectRead (System.Net.Sockets.SelectMode)true if System.Net.Sockets.Socket.Listen(System.Int32) has been called and a connection is pending, System.Net.Sockets.Socket.Accept will succeed—or—true if data is available for reading—or—true, if connection has been closed, reset, or terminated; otherwise, returns false. The time to wait for a response, in microseconds. One of the System.Net.Sockets.SelectMode values.

Receive

[C#] public int Receive(byte[ ] buffer);

[C++] public: int Receive(unsigned char buffer _gc[ ]);

[VB] Public Function Receive(ByVal buffers As Byte) As Integer

[JScript] public function Receive(buffer: Byte[ ]): int;

Description

Receives data from a connected socket into a specific location of the receive buffer.

Return Value: The number of bytes received. Storage location for received data.

Receive

[C#] public int Receive(byte[ ] buffer, SocketFlags socketFlags);

[C++] public: int Receive(unsigned char buffer _gc[ ], SocketFlags socketFlags);

[VB] Public Function Receive(ByVal buffers As Byte, ByVal socketFlags As SocketFlags) As Integer

[JScript] public function Receive(buffer: Byte[ ], socketFlags: SocketFlags): int;

Description

Receives data from a connected socket into a specific location of the receive buffer.

Return Value: The number of bytes received. Storage location for received data. A bitwise combination of the System.Net.Sockets.SocketFlags values.

Receive

[C#] public int Receive(byte[ ] buffer, int size, SocketFlags socketFlags);

[C++] public: int Receive(unsigned char buffer gc[ ], int size, SocketFlags socketFlags);

[VB] Public Function Receive(ByVal buffers As Byte, ByVal size As Integer, ByVal socketFlags As SocketFlags) As Integer

[JScript] public function Receive(buffer: Byte[ ], size: int, socketFlags SocketFlags): int; Receives data from a connected socket.

Description

Receives data from a connected socket into a specific location of the receive buffer.

Return Value: The number of bytes received. Storage location for received data. The number of bytes to receive. A bitwise combination of the System.Net.Sockets.SocketFlags values.

Receive

[C#] public int Receive(byte[ ] buffer, int offset, int size, SocketFlags socketFlags);

[C++] public: int Receive(unsigned char buffer _gc[ ], int offset, int size, SocketFlags socketFlags);

[VB] Public Function Receive(ByVal buffers As Byte, ByVal offset As Integer, ByVal size As Integer, ByVal socketFlags As SocketFlags) As Integer

[JScript] public function Receive(buffer: Byte[ ], offset: int, size: int, socketFlags: SocketFlags): int;

Description

Receives data from a connected socket into a specific location of the receive buffer.

Return Value: The number of bytes received. Storage location for received data. The location in buffer to store the received data. The number of bytes to receive. A bitwise combination of the System.Net.Sockets.SocketFlags values.

ReceiveFrom

[C#] public int ReceiveFrom(byte[ ] buffer, ref EndPoint remoteEP);

[C++] public: int ReceiveFrom(unsigned char buffer _gc[ ], EndPoint** remoteEP);

[VB] Public Function ReceiveFrom(ByVal buffer(As Byte, ByRef remoteEP As EndPoint) As Integer

[JScript] public function ReceiveFrom(buffer: Byte[ ], remoteEP: EndPoint): int;

Description

Receives a datagram into a specific location in the data buffer and stores the endpoint.

Return Value: The number of bytes received. Storage location for received data. An System.Net.EndPoint, passed by reference, that represents the remote server.

ReceiveFrom

[C#] public int ReceiveFrom(byte[ ] buffer, SocketFlags socketFlags, ref EndPoint remoteEP);

[C++] public: int ReceiveFrom(unsigned char buffer gc[ ], SocketFlags socketFlags, EndPoint** remoteEP);

[VB] Public Function ReceiveFrom(ByVal buffer(As Byte, ByVal socketFlags As SocketFlags, ByRef remoteEP As EndPoint) As Integer

[JScript] public function ReceiveFrom(buffer: Byte[ ], socketFlags: SocketFlags, remoteEP: EndPoint): int;

Description

Receives a datagram into a specific location in the data buffer and stores the endpoint.

Return Value: The number of bytes received. Storage location for, received data. A bitwise combination of the System.Net.Sockets.SocketFlags values. An System.Net.EndPoint, passed by reference, that represents the remote server.

ReceiveFrom

[C#] public int ReceiveFrom(byte[ ] buffer, int size, SocketFlags socketFlags, ref EndPoint remoteEP);

[C++] public: int ReceiveFrom(unsigned char buffer _gc[ ], int size, SocketFlags socketFlags, EndPoint** remoteEP);

[VB] Public Function ReceiveFrom(ByVal buffers As Byte, ByVal size As Integer, ByVal socketFlags As SocketFlags, ByRef remoteEP As EndPoint) As Integer

[JScript] public function ReceiveFrom(buffer: Byte[ ], size: int, socketFlags SocketFlags, remoteEP: EndPoint): int;

Description

Receives a datagram into a specific location in the data buffer and stores the endpoint.

Return Value: The number of bytes received. Storage location for received data. The number of bytes to receive. A bitwise combination of the System.Net.Sockets.SocketFlags values. An System.Net.EndPoint, passed by reference, that represents the remote server.

ReceiveFrom

[C#] public int ReceiveFrom(byte[ ] buffer, int offset, int size, SocketFlags socketFlags, ref EndPoint remoteEP);

[C++] public: int ReceiveFrom(unsigned char buffer _gc[ ], int offset, int size, SocketFlags socketFlags, EndPoint** remoteEP);

[VB] Public Function ReceiveFrom(ByVal buffers As Byte, ByVal offset As Integer, ByVal size As Integer, ByVal socketFlags As SocketFlags, ByRef remoteEP As EndPoint) As Integer

[JScript] public function ReceiveFrom(buffer: Byte[ ], offset: int, size: int, socketFlags: SocketFlags, remoteEP: EndPoint): int; Receives a datagram and stores the source endpoint.

Description

Receives a datagram into a specific location in the data buffer and stores the endpoint.

Return Value: The number of bytes received. Storage location for received data. The position in buffer to store the received data. The number of bytes to receive. A bitwise combination of the System.Net.Sockets.SocketFlags values. An System.Net.EndPoint, passed by reference, that represents the remote server. Select

[C#] public static void Select(IList checkRead, IList checkWrite, IList checkError, int microseconds);

[C++] public: static void Select(IList* checkRead, IList* checkWrite, IList* checkError, int microseconds);

[VB] Public Shared Sub Select(ByVal checkRead As IList, ByVal checkWrite As IList, ByVal checkError As IList, ByVal microseconds As Integer)

[JScript] public static function Select(checkRead: IList, checkWrite: IList, checkError: IList, microseconds: int);

Description

Determines the status of a socket.

System.Net.Sockets.Socket.Select(System.Collections.IList,System.Collections.IList,System.Collections.IList, System.Int32) is a static method that determines the status of a set of System.Net.Sockets.Socket instances. For example, to determine which of a set of System.Net.Sockets.Socket instances has data ready to be read, place the System.Net.Sockets.Socket in an System.Collections.IList instance, and then call System.Net.Sockets.Socket.Select(System.Collections.IList,System.Collections.IList,System.Collections.IList,System.Int32). After the call to System.Net.Sockets.Socket.Select(System.Collections.lList,System.CollectionsIList, System.Collections.IList,System.Int32), the System.Collections.IList will contain only those System.Net.Sockets.Socket instances with data ready to be read. A list of System.Net.Sockets.Socket instances to check for data to read. A list of System.Net.Sockets.Socket instances to check that are available for writing. A list of System.Net.Sockets.Socket instances to check for errors. The time to wait for a response, in microseconds.

Send

[C#] public int Send(byte[ ] buffer);

[C++] public: int Send(unsigned char buffer _gc[ ]);

[VB] Public Function Send(ByVal buffers As Byte) As Integer

[JScript] public function Send(buffer: Byte[ ]): int;

Description

Sends data to a connected socket, starting at the indicated location in the data.

Return Value: The number of bytes sent to the socket. The data to be sent.

Send

[C#] public int Send(byte[ ] buffer, SocketFlags socketFlags);

[C++] public: int Send(unsigned char buffer _gc[ ], SocketFlags socketFlags);

[VB] Public Function Send(ByVal buffers As Byte, ByVal socketFlags As SocketFlags) As Integer

[JScript] public function Send(buffer: Byte[ ], socketFlags: SocketFlags): int;

Description

Sends data to a connected socket, starting at the indicated location in the data.

Return Value: The number of bytes sent to the socket. The data to be sent. A bitwise combination of the System.Net.Sockets.SocketFlags values.

Send

[C#] public int Send(byte[ ] buffer, int size, SocketFlags socketFlags);

[C++] public: int Send(unsigned char buffer _gc[ ], int size, SocketFlags socketFlags);

[VB] Public Function Send(ByVal buffers As Byte, ByVal size As Integer, ByVal socketFlags As SocketFlags) As Integer

[JScript] public function Send(buffer: Byte[ ], size: int, socketFlags SocketFlags): int; Sends data to a connected socket.

Description

Sends data to a connected socket, starting at the indicated location in the data.

Return Value: The number of bytes sent to the socket. The data to be sent. The number of bytes to send. A bitwise combination of the System.Net.Sockets.SocketFlags values.

Send

[C#] public int Send(byte[ ] buffer, int offset, int size, SocketFlags socketFlags);

[C++] public: int Send(unsigned char buffer _gc[ ], int offset, int size, SocketFlags socketFlags);

[VB] Public Function Send(ByVal buffer(As Byte, ByVal offset As Integer, ByVal size As Integer, ByVal socketFlags As SocketFlags) As Integer

[JScript] public function Send(buffer: Byte[ ], offset: int, size: int, socketFlags SocketFlags): int;

Description

Sends data to a connected socket, starting at the indicated location in the data.

Return Value: The number of bytes sent to the socket. The data to be sent. The position in the data buffer to begin sending data. The number of bytes to send. A bitwise combination of the System.Net.Sockets.SocketFlags values.

SendTo

[C#] public int SendTo(byte[ ] buffer, EndPoint remoteEP);

[C++] public: int SendTo(unsigned char buffer gc[ ], EndPoint* remoteEP);

[VB] Public Function SendTo(ByVal buffers As Byte, ByVal remoteEP As EndPoint) As Integer

[JScript] public function SendTo(buffer: Byte[ ], remoteEP: EndPoint): int;

Description

Sends data to a specific endpoint.

Return Value: The number of bytes sent. The data to be sent. The destination location for the data.

SendTo

[C#] public int SendTo(byte[ ] buffer, SocketFlags socketFlags, EndPoint remoteEP);

[C++] public: int SendTo(unsigned char buffer _gc[ ], SocketFlags socketFlags, EndPoint* remoteEP);

[VB] Public Function SendTo(ByVal buffers As Byte, ByVal socketFlags As SocketFlags, ByVal remoteEP As EndPoint) As Integer

[JScript] public function SendTo(buffer: Byte[ ], socketFlags: SocketFlags, remoteEP: EndPoint): int;

Description

Sends data to a specific endpoint.

Return Value: The number of bytes sent. The data to be sent. A bitwise combination of the System.Net.Sockets.SocketFlags values. The destination location for the data.

SendTo

[C#] public int SendTo(byte[ ] buffer, int size, SocketFlags socketFlags, EndPoint remoteEP);

[C++] public: int SendTo(unsigned char buffer _gc[ ], int size, SocketFlags socketFlags, EndPoint* remoteEP);

[VB] Public Function SendTo(ByVal buffers As Byte, ByVal size As Integer, ByVal socketFlags As SocketFlags, ByVal remoteEP As EndPoint) As Integer

[JScript] public function SendTo(buffer: Byte[ ], size: int, socketFlags SocketFlags, remoteEP: EndPoint): int;

Description

Sends data to a specific endpoint.

Return Value: The number of bytes sent. The data to be sent. The number of bytes to send. A bitwise combination of the System.Net.Sockets.SocketFlags values. The destination location for the data.

SendTo

[C#] public int SendTo(byte[ ] buffer, int offset, int size, SocketFlags socketFlags, EndPoint remoteEP);

[C++] public: int SendTo(unsigned char buffer _gc[ ], int offset, int size, SocketFlags socketFlags, EndPoint* remoteEP);

[VB] Public Function SendTo(ByVal buffers As Byte, ByVal offset As Integer, ByVal size As Integer, ByVal socketFlags As SocketFlags, ByVal remoteEP As EndPoint) As Integer

[JScript] public function SendTo(buffer: Byte[ ], offset: int, size: int, socketFlags: SocketFlags, remoteEP: EndPoint): int; Sends data to a specific endpoint.

Description

Sends data to a specific endpoint, starting at the indicated location in the data.

Return Value: The number of bytes sent. The data to be sent. The position in the data buffer to begin sending data. The number of bytes to send. A bitwise combination of the System.Net.Sockets.SocketFlags values. The destination location for the data.

SetSocketOption

[C#] public void SetSocketOption(SocketOptionLevel optionLevel, SocketOptionName optionName, byte[ ] optionValue);

[C++] public: void SetSocketOption(SocketOptionLevel optionLevel, SocketOptionName optionName, unsigned char optionValue_gc[ ]);

[VB] Public Sub SetSocketOption(ByVal optionLevel As SocketOptionLevel, ByVal optionName As SocketOptionName, ByVal optionValue( ) As Byte)

[JScript] public function SetSocketOption(optionLevel: SocketOptionLevel, optionName: SocketOptionName, optionValue: Byte[ ]);

Description

Sets the specified option to the specified value. One of the System.Net.Sockets.SocketOptionLevel values. One of the System.Net.Sockets.SocketOptionName values. The value of the option.

SetSocketOption

[C#] public void SetSocketOption(SocketOptionLevel optionLevel, SocketOptionName optionName, int optionValue);

[C++] public: void SetSocketOption(SocketOptionLevel optionLevel, SocketOptionName optionName, int optionValue);

[VB] Public Sub SetSocketOption(ByVal optionLevel As SocketOptionLevel, ByVal optionName As SocketOptionName, ByVal optionValue As Integer)

[JScript] public function SetSocketOption(optionLevel: SocketOptionLevel, optionName: SocketOptionName, optionValue: int); Sets a socket option.

Description

Sets the specified option to the specified value. One of the System.Net.Sockets.SocketOptionLevel values. One of the System.Net.Sockets.SocketOptionName values. The value of the option.

SetSocketOption

[C#] public void SetSocketOption(SocketOptionLevel optionLevel, SocketOptionName optionName, object optionValue);

[C++] public: void SetSocketOption(SocketOptionLevel optionLevel, SocketOptionName optionName, Object* optionValue);

[VB] Public Sub SetSocketOption(ByVal optionLevel As SocketOptionLevel, ByVal optionName As SocketOptionName, ByVal optionValue As Object)

[JScript] public function SetSocketOption(optionLevel: SocketOptionLevel, optionName: SocketOptionName, optionValue: Object);

Description

Sets the specified option to the specified value. One of the System.Net.Sockets.SocketOptionLevel values. One of the System.Net.Sockets.SocketOptionName values. An instance of System.Net.Sockets.LingerOption or System.Net.Sockets.MulticastOption containing the value of the option.

Shutdown

[C#] public void Shutdown(SocketShutdown how);

[C++] public: void Shutdown(SocketShutdown how);

[VB] Public Sub Shutdown(ByVal how As SocketShutdown)

[JScript] public function Shutdown(how: SocketShutdown);

Description

Disables sends and receives on a socket.

The System.Net.Sockets.SocketShutdown class contains the valid values for how. The valid values are: Value Description Send Disable sending on this socket. The function that will no longer be allowed.

IDisposable.Dispose

[C#] void IDisposable.Dispose( ); I[C++] void IDisposable::Dispose( );

[VB] Sub Dispose( ) Implements IDisposable.Dispose
[JScript] function IDisposable.Dispose( );
SocketException class (System.Net.Sockets)
ToString Description The exception that is thrown when a socket error occurs.

A System.Net.Sockets.SocketException is thrown by the System.Net.Sockets.Socket and System.Net.Dns classes when an error occurs with the network.

SocketException
Example Syntax:
ToString

[C#] public SocketException( );
[C++] public: SocketException( );
[VB] Public Sub New( )
[JScript] public function SocketException( ); Initializes a new instance of the System.Net.Sockets.SocketException class.

Description

Initializes a new instance of the System.Net.Sockets.SocketException class with the last operating system error code.

The System.Net.Sockets.SocketException.#ctor constructor sets the System.Net.Sockets.SocketException.ErrorCode property to the last operating system socket error that occurred. For more information about socket error codes, see the Windows Socket Version 2 API error code documentation in MSDN.

SocketException
Example Syntax:
ToString

[C#] public SocketException(int errorCode);
[C++] public: SocketException(int errorCode);
[VB] Public Sub New(ByVal errorCode As Integer)
[JScript] public function SocketException(errorCode: int);

Description

Initializes a new instance of the System.Net.Sockets.SocketException class with the specified error code.

The System.Net.Sockets.SocketException.#ctor constructor sets the System.Net.Sockets.SocketException.ErrorCode property to errorCode. The error code indicating the error that occurred.

SocketException
Example Syntax:
ToString

[C#] protected SocketException(SerializationInfo serializationInfo, StreamingContext streamingContext);
[C++] protected: SocketException(SerializationInfo* serializationInfo, StreamingContext streamingContext);
[VB] Protected Sub New(ByVal SerializationInfo As serializationInfo, ByVal streamingContext As StreamingContext)
[JScript] protected function SocketException(serializationInfo: SerializationInfo, streamingcontext: StreamingContext);

Description

Initializes a new instance of the System.Net.Sockets.SocketException class from the specified instances of the System.Runtime.Serialization.SerializationInfo and System.Runtime.Serialization.StrearningContext classes.

This constructor implements the System.Runtime.Serialization.ISerializable interface for the System.Net.Sockets.SocketException class. A System.Runtime.Serialization.SerializationInfo instance containing the information required to serialize the new System.Net.Sockets.SocketException instance. A System.Runtime.Serialization. StreamingContext containing the source of the serialized stream associated with the new System.Net.Sockets.SocketException instance.

ErrorCode
ToString

[C#] public override int ErrorCode {get;}
[C++] public: _property virtual int get_ErrorCode( );
[VB] Overrides Public ReadOnly Property ErrorCode As Integer
[JScript] public function get ErrorCode( ): int;

Description

Gets the error code associated with this exception.

The System.Net.Sockets.SocketException.ErrorCode property contains the error code associated with the error that caused the exception.

HelpLink
HResult
InnerException
Message
NativeErrorCode
Source
StackTrace
TargetSite
SocketFlags enumeration (System.Net. Sockets)
ToString Description Provides constant values for socket messages.

ToString

[C#] public const SocketFlags DontRoute;
[C++] public: const SocketFlags DontRoute;
[VB] Public Const DontRoute As SocketFlags
[JScript] public var DontRoute: SocketFlags;

Description

Send without using routing tables.

ToString

[C#] public const SocketFlags MaxIOVectorLength;
[C++] public: const SocketFlags MaxIOVectorLength;
[VB] Public Const MaxIOVectorLength As SocketFlags
[JScript] public var MaxIOVectorLength: SocketFlags;

Description

Provides a standard value for the number of WSABUF structures used to send and receive data.

ToString

[C#] public const SocketFlags None;
[C++] public: const SocketFlags None;
[VB] Public Const None As SocketFlags
[JScript] public var None: SocketFlags;

Description

Use no flags for this call.

ToString

[C#] public const SocketFlags OutOfBand;
[C++] public: const SocketFlags OutOfBand;
[VB] Public Const OutOfBand As SocketFlags
[JScript] public var OutOfBand: SocketFlags;

Description

Process out-of-band data.

ToString

[C#] public const SocketFlags Partial;
[C++] public: const SocketFlags Partial;
[VB] Public Const Partial As SocketFlags
[JScript] public var Partial: SocketFlags;

Description

Partial send or receive for message.

ToString

[C#] public const SocketFlags Peek;

[C++] public: const SocketFlags Peek;

[VB] Public Const Peek As SocketFlags

[JScript] public var Peek: SocketFlags;

Description

Peek at incoming message.

SocketOptionLevel enumeration (System.Net. Sockets)

ToString

Description

Defines socket option levels for the System.Net.Sockets.Socket.SetSocketOption(System.Net.Sockets.SocketOptionLevel, System.Net.Sockets.SocketOptionName,System.Int32) and System.Net.Sockets.Socket.GetSocketOption (System.Net.Sockets.SocketOptionLevel, System.Net.Sockets.SocketOptionName) methods.

The System.Net.Sockets.SocketOptionLevel enumeration defines the socket option levels that can be passed to the System.Net.Sockets.Socket.SetSocketOption(System.Net.Sockets.SocketOptionLevel, System.Net.Sockets.SocketOptionName,System.Int32) and System.Net.Sockets.Socket.GetSocketOption(System.Net.Sockets.SocketOptionLevel, System.Net.Sockets.SocketOptionName) methods.

ToString

[C#] public const SocketOptionLevel IP;

[C++] public: const SocketOptionLevel IP;

[VB] Public Const IP As SocketOptionLevel

[JScript] public var IP: SocketOptionLevel;

Description

Socket options apply to IP sockets.

ToString

[C#] public const SocketOptionLevel Socket;

[C++] public: const SocketOptionLevel Socket;

[VB] Public Const Socket As SocketOptionLevel

[JScript] public var Socket: SocketOptionLevel;

Description

Socket options apply to the socket itself.

ToString

[C#] public const SocketOptionLevel Tcp;

[C++] public: const SocketOptionLevel Tcp;

[VB] Public Const Tcp As SocketOptionLevel

[JScript] public var Tcp: SocketOptionLevel;

Description

Socket options apply to TCP sockets.

ToString

[C#] public const SocketOptionLevel Udp;

[C++] public: const SocketOptionLevel Udp;

[VB] Public Const Udp As SocketOptionLevel

[JScript] public var Udp: SocketOptionLevel;

Description

Socket options apply to UDP sockets.

SocketOptionName enumeration (System.Net.Sockets)

ToString

Description

Defines socket option names for the System.Net.Sockets.Socket class.

ToString

[C#] public const SocketOptionName AcceptConnection;

[C++] public: const SocketOptionName AcceptConnection;

[VB] Public Const AcceptConnection As SocketOptionName

[JScript] public var AcceptConnection: SocketOptionName;

Description

Socket is listening.

ToString

[C#] public const SocketOptionName AddMembership;

[C++] public: const SocketOptionName AddMembership;

[VB] Public Const AddMembership As SocketOptionName

[JScript] public var AddMembership: SocketOptionName;

Description

Add an IP group membership.

ToString

[C#] public const SocketOptionName AddSourceMembership;

[C++] public: const SocketOptionName AddSourceMembership;

[VB] Public Const AddSourceMembership As SocketOptionName

[JScript] public var AddSourceMembership: SocketOptionName;

Description

Join a source group.

ToString

[C#] public const SocketOptionName BlockSource;

[C++] public: const SocketOptionName BlockSource;

[VB] Public Const BlockSource As SocketOptionName

[JScript] public var BlockSource: SocketOptionName;

Description

Block data from a source.

ToString

[C#] public const SocketOptionName Broadcast;

[C++] public: const SocketOptionName Broadcast;

[VB] Public Const Broadcast As SocketOptionName

[JScript] public var Broadcast: SocketOptionName;

Description

Permit sending broadcast messages on the socket.

ToString

[C#] public const SocketOptionName BsdUrgent;

[C++] public: const SocketOptionName BsdUrgent;

[VB] Public Const BsdUrgent As SocketOptionName

[JScript] public var BsdUrgent: SocketOptionName;

Description

Use urgent data as defined in RFC-1222. This option can be set only once, and once set, cannot be turned off.

ToString

[C#] public const SocketOptionName ChecksumCoverage;

[C++] public: const SocketOptionName ChecksumCoverage;

[VB] Public Const ChecksumCoverage As SocketOptionName

[JScript] public var ChecksumCoverage: SocketOptionName;

Description

Set or get UDP checksum coverage.

ToString

[C#] public const SocketOptionName Debug;

[C++] public: const SocketOptionName Debug;

[VB] Public Const Debug As SocketOptionName

[JScript] public var Debug: SocketOptionName;

Description
Record debugging information.
ToString
[C#] public const SocketOptionName DontFragment;
[C++] public: const SocketOptionName DontFragment;
[VB] Public Const DontFragment As SocketOptionName
[JScript] public var DontFragment: SocketOptionName;

Description
Do not fragment IP datagrams.
ToString
[C#] public const SocketOptionName DontLinger;
[C++] public: const SocketOptionName DontLinger;
[VB] Public Const DontLinger As SocketOptionName
[JScript] public var DontLinger: SocketOptionName;

Description
Close socket gracefully without lingering.
ToString
[C#] public const SocketOptionName DontRoute;
[C++] public: const SocketOptionName DontRoute;
[VB] Public Const DontRoute As SocketOptionName
[JScript] public var DontRoute: SocketOptionName;

Description
Do not route; send directly to interface addresses.
ToString
[C#] public const SocketOptionName DropMembership;
[C++] public: const SocketOptionName DropMembership;
[VB] Public Const DropMembership As SocketOptionName
[JScript] public var DropMembership: SocketOptionName;

Description
Drop an IP group membership.
ToString
[C#] public const SocketOptionName DropSourceMembership;
[C++] public: const SocketOptionName DropSourceMembership;
[VB] Public Const DropSourceMembership As SocketOptionName
[JScript] public var DropSourceMembership: SocketOptionName;

Description
Drop a source group.
ToString
[C#] public const SocketOptionName Error;
[C++] public: const SocketOptionName Error;
[VB] Public Const Error As SocketOptionName
[JScript] public var Error: SocketOptionName;

Description
Get error status and clear.
ToString
[C#] public const SocketOptionName ExclusiveAddressUse;
[C++] public: const SocketOptionName ExclusiveAddressUse;
[VB] Public Const ExclusiveAddressUse As SocketOptionName
[JScript] public var. ExclusiveAddressUse: SocketOptionName;

Description
Enables a socket to be bound for exclusive access.
ToString
[C#] public const SocketOptionName Expedited;
[C++] public: const SocketOptionName Expedited;
[VB] Public Const Expedited As SocketOptionName
[JScript] public var Expedited: SocketOptionName;

Description
Use expedited data as defined in RFC-1222. This option can be set only once, and once set, cannot be turned off.
ToString
[C#] public const SocketOptionName HeaderIncluded;
[C++] public: const SocketOptionName HeaderIncluded;
[VB] Public Const HeaderIncluded As SocketOptionName
[JScript] public var HeaderIncluded: SocketOptionName;

Description
Indicates application is providing the IP header for outgoing datagrams.
ToString
[C#] public const SocketOptionName IPOptions;
[C++] public: const SocketOptionName IPOptions;
[VB] Public Const IPOptions As SocketOptionName
[JScript] public var IPOptions: SocketOptionName;

Description
Specifies IP options to be inserted into outgoing datagrams.
ToString
[C#] public const SocketOptionName IpTimeToLive;
[C++] public: const SocketOptionName IpTimeToLive;
[VB] Public Const IpTimeToLive As SocketOptionName
[JScript] public var IpTimeToLive: SocketOptionName;

Description
Set the IP header time-to-live field.
ToString
[C#] public const SocketOptionName KeepAlive;
[C++] public: const SocketOptionName KeepAlive;
[VB] Public Const KeepAlive As SocketOptionName
[JScript] public var KeepAlive: SocketOptionName;

Description
Send keep-alives.
ToString
[C#] public const SocketOptionName Linger;
[C++] public: const SocketOptionName Linger;
[VB] Public Const Linger As SocketOptionName
[JScript] public var Linger: SocketOptionName;

Description
Linger on close if unsent data is present.
ToString
[C#] public const SocketOptionName MaxConnections;
[C++] public: const SocketOptionName MaxConnections;
[VB] Public Const MaxConnections As SocketOptionName
[JScript] public var MaxConnections: SocketOptionName;

Description
Maximum queue length that can be specified by System.Net.Sockets.Socket.Listen(System.Int32).
ToString
[C#] public const SocketOptionName MulticastInterface;
[C++] public: const SocketOptionName MulticastInterface;
[VB] Public Const MulticastInterface As SocketOptionName
[JScript] public var MulticastInterface: SocketOptionName;

Description
Set the interface for outgoing multicast packets.
ToString
[C#] public const SocketOptionName MulticastLoopback;
[C++] public: const SocketOptionName MulticastLoopback;
[VB] Public Const MulticastLoopback As SocketOptionName
[JScript] public var MulticastLoopback: SocketOptionName;

Description
IP multicast loopback.
ToString
[C#] public const SocketOptionName MulticastTimeToLive;
[C++] public: const SocketOptionName MulticastTimeToLive;
[VB] Public Const MulticastTimeToLive As SocketOptionName
[JScript] public var MulticastTimeToLive: SocketOptionName;

Description
IP multicast time to live.
ToString
[C#] public const SocketOptionName NoChecksum;
[C++] public: const SocketOptionName NoChecksum;
[VB] Public Const NoChecksum As SocketOptionName
[JScript] public var NoChecksum: SocketOptionName;

Description
Send UDP datagrams with checksum set to zero.
ToString
[C#] public const SocketOptionName NoDelay;
[C++] public: const SocketOptionName NoDelay;
[VB] Public Const NoDelay As SocketOptionName
[JScript] public var NoDelay: SocketOptionName;

Description
Disables the Nagle algorithm for send coalescing.
ToString
[C#] public const SocketOptionName OutOfBandInline;
[C++] public: const SocketOptionName OutOfBandInline;
[VB] Public Const OutOfBandInline As SocketOptionName
[JScript] public var OutOfBandInline: SocketOptionName;

Description
Receives out-of-band data in the normal data stream.
ToString
[C#] public const SocketOptionName PacketInformation;
[C++] public: const SocketOptionName PacketInformation;
[VB] Public Const PacketInformation As SocketOptionName
[JScript] public var PacketInformation: SocketOptionName;

Description
Return information about received packets.
ToString
[C#] public const SocketOptionName ReceiveBuffer;
[C++] public: const SocketOptionName ReceiveBuffer;
[VB] Public Const ReceiveBuffer As SocketOptionName
[JScript] public var ReceiveBuffer: SocketOptionName;

Description
Send low water mark.
ToString
[C#] public const SocketOptionName ReceiveLowWater;
[C++] public: const SocketOptionName ReceiveLowWater;
[VB] Public Const ReceiveLowWater As SocketOptionName
[JScript] public var ReceiveLowWater: SocketOptionName;

Description
Receive low water mark.
ToString
[C#] public const SocketOptionName ReceiveTimeout;
[C++] public: const SocketOptionName ReceiveTimeout;
[VB] Public Const ReceiveTimeout As SocketOptionName
[JScript] public var ReceiveTimeout: SocketOptionName;

Description
Receive time out.
ToString
[C#] public const SocketOptionName ReuseAddress;
[C++] public: const SocketOptionName ReuseAddress;
[VB] Public Const ReuseAddress As SocketOptionName
[JScript] public var ReuseAddress: SocketOptionName;

Description
Allows the socket to be bound to an address that is already in use.
ToString
[C#] public const SocketOptionName SendBuffer;
[C++] public: const SocketOptionName SendBuffer;
[VB] Public Const SendBuffer As SocketOptionName
[JScript] public var SendBuffer: SocketOptionName;

Description
Specifies the total per-socket buffer space reserved for sends. This is unrelated to the maximum message size or the size of a TCP window.
ToString
[C#] public const SocketOptionName SendLowWater;
[C++] public: const SocketOptionName SendLowWater;
[VB] Public Const SendLowWater As SocketOptionName
[JScript] public var SendLowWater: SocketOptionName;

Description
Specifies the total per-socket buffer space reserved for receives. This is unrelated to the maximum message size or the size of a TCP window.
ToString
[C#] public const SocketOptionName SendTimeout;
[C++] public: const SocketOptionName SendTimeout;
[VB] Public Const SendTimeout As SocketOptionName
[JScript] public var SendTimeout: SocketOptionName;

Description
Send timeout.
ToString
[C#] public const SocketOptionName Type;
[C++] public: const SocketOptionName Type;
[VB] Public Const Type As SocketOptionName
[JScript] public var Type: SocketOptionName;

Description
Get socket type.
ToString
[C#] public const SocketOptionName TypeOfService;
[C++] public: const SocketOptionName TypeOfService;
[VB] Public Const TypeOfService As SocketOptionName
[JScript] public var TypeOfService: SocketOptionName;

Description
Change the IP header type of service field.
ToString
[C#] public const SocketOptionName UnblockSource;
[C++] public: const SocketOptionName UnblockSource;
[VB] Public Const UnblockSource As SocketOptionName
[JScript] public var UnblockSource: SocketOptionName;

Description
Unblock a previously blocked source.
ToString
[C#] public const SocketOptionName UseLoopback;
[C++] public: const SocketOptionName UseLoopback;
[VB] Public Const UseLoopback As SocketOptionName
[JScript] public var UseLoopback: SocketOptionName;

Description

Bypass hardware when possible.

SocketShutdown enumeration (System.Net.Sockets)

ToString

Description

Defines constants used by the System.Net.Sockets.Socket.Shutdown(System.Net.Sockets.SocketShutdown) method.

The System.Net.Sockets.SocketShutdown class is a helper class that defines the values that can be passed to the System.Net.Sockets.Socket.Shutdown(System.Net.Sockets.SocketShutdown) method.

ToString

[C#] public const SocketShutdown Both;

[C++] public: const SocketShutdown Both;

[VB] Public Const Both As SocketShutdown

[JScript] public var Both: SocketShutdown;

Description

Shuts down a socket for both sending and receiving. This field is constant.

ToString

[C#] public const SocketShutdown Receive;

[C++] public: const SocketShutdown Receive;

[VB] Public Const Receive As SocketShutdown

[JScript] public var Receive: SocketShutdown;

Description

Shuts down a socket for receiving. This field is constant.

ToString

[C#] public const SocketShutdown Send;

[C++] public: const SocketShutdown Send;

[VB] Public Const Send As SocketShutdown

[JScript] public var Send: SocketShutdown;

Description

Shuts down a socket for sending. This field is constant.

SocketType enumeration (System.Net. Sockets)

ToString

Description

Specifies the type of socket an instance of the System.Net.Sockets.Socket class represents.

ToString

[C#] public const SocketType Dgram;

[C++] public: const SocketType Dgram;

[VB] Public Const Dgram As SocketType

[JScript] public var Dgram: SocketType;

Description

ToString

[C#] public const SocketType Raw;

[C++] public: const SocketType Raw;

[VB] Public Const Raw As SocketType

[JScript] public var Raw: SocketType;

Description

ToString

[C#] public const SocketType Rdm;

[C++] public: const SocketType Rdm;

[VB] Public Const Rdm As SocketType

[JScript] public var Rdm: SocketType;

Description

ToString

[C#] public const SocketType Seqpacket;

[C++] public: const SocketType Seqpacket;

[VB] Public Const Seqpacket As SocketType

[JScript] public var Seqpacket: SocketType;

Description

ToString

[C#] public const SocketType Stream;

[C++] public: const SocketType Stream;

[VB] Public Const Stream As SocketType

[JScript] public var Stream: SocketType;

Description

ToString

[C#] public const SocketType Unknown;

[C++] public: const SocketType Unknown;

[VB] Public Const Unknown As SocketType

[JScript] public var Unknown: SocketType;

Description

TcpClient class (System.Net.Sockets)

ToString

Description

Provides client connections for TCP network services.

The System.Net.Sockets.TcpClient class builds upon the System.Net.Sockets.Socket class to provide TCP services at a higher level of abstraction. You can establish a System.Net.Sockets.TcpClient connection can be establish by one of two ways.

TcpClient

Example Syntax:

ToString

[C#] public TcpClient( );

[C++] public: TcpClient( );

[VB] Public Sub New( )

[JScript] public function TcpClient( );

Description

Initializes a new instance of the System.Net.Sockets.TcpClient class.

The default constructor sets the IP address to System.Net.IPAddress.Any and the port number to 0.

TcpClient

Example Syntax:

ToString

[C#] public TcpClient(IPEndPoint localEP);

[C++] public: TcpClient(IPEndPoint* localEP);

[VB] Public Sub New(ByVal localEP As IPEndPoint)

[JScript] public function TcpClient(localEP: IPEndPoint);

Initializes a new instance of the System.Net.Sockets.TcpClient class.

Description

Initializes a new instance of the System.Net.Sockets.TcpClient class with the local endpoint.

The localEP parameter specifies the local endpoint. This constructor instantiates a socket and binds that socket to the provided local endpoint. The local endpoint to which you bind the TCP connection.

TcpClient

Example Syntax:

ToString

[C#] public TcpCient(string hostname, int port);

[C++] public: TcpClient(String* hostname, int port);

[VB] Public Sub New(ByVal hostname As String, ByVal port As Integer)

[JScript] public function TcpClient(hostname: String, port: int);

Description

Initializes a new instance of the System.Net.Sockets.TcpClient class and connects to the specified port on the specified host.

This constructor accepts two parameters. Name of the remote host to which you intend to connect. Port number of the remote host to which you intend to connect.

Active

ToString

[C#] protected bool Active {get; set;}

[C++] protected: _property bool get_Active( ); protected: _property void set_Active(bool);

[VB] Protected Property Active As Boolean

[JScript] protected function get Active( ): Boolean;protected function set Active(Boolean);

Description

Gets or set a value that indicates whether a connection has been made.

Client

ToString

[C#] protected Socket Client {get; set;}

[C++] protected: _property Socket* get_Client( ); protected: _property void set_Client(Socket*);

[VB] Protected Property Client As Socket

[JScript] protected function get Client( ): Socket;protected function set Client(Socket);

Description

Gets or sets the underlying System.Net.Sockets.Socket instance.

Use this property to set or get the underlying System.Net. Sockets.Socket instance of System.Net.Sockets.TcpClient.

LingerState

ToString

[C#] public LingerOption LingerState {get; set;}

[C++] public: _property LingerOption* get_Linger State( );public: _property void set_LingerState(LingerOption*);

[VB] Public Property LingerState As LingerOption

[JScript] public function get LingerState( ): LingerOption; public function set LingerState(LingerOption);

Description

Gets or sets the value of the connection's System.Net. Sockets.LingerOption An instance of the System.Net.Sockets.LingerOption class.

This property sets or gets a System.Net.Sockets.LingerOption instance. If the System.Net.Sockets.LingerOption. Enabled property of the System.Net.Sockets.LingerOption instance is true, and data remains to be sent, then System.Net. Sockets.TcpClient remains open even after System.Net. Sockets.TcpClient.Close is called. The amount of time the object remains open is specified by the System.Net.Sockets.LingerOption.LingerTime property of the System.Net. Sockets.LingerOption instance. If the Enabled property of the System.Net.Sockets.LingerOption instance is false, then System.Net.Sockets.TCPClient will close immediately, even if data remains to be sent.

NoDelay

ToString

[C#] public bool NoDelay {get; set;}

[C++] public: _property bool get_NoDelay( );public: _property void set_NoDelay(bool);

[VB] Public Property NoDelay As Boolean

[JScript] public function get NoDelay( ): Boolean;public function set NoDelay(Boolean);

Description

Gets or sets a value that enables a delay when send or receive buffers are full.

If System.Net.Sockets.TcpClient.NoDelay is set to false, System.Net.Sockets.TcpClient delays the sending and receiving of data while buffers are full. If System.Net.Sockets.TcpClient.NoDelay is set to true, then System.Net.Sockets.TcpClient continues writing to buffers even if there is no capacity left.

ReceiveBufferSize

ToString

[C#] public int ReceiveBufferSize {get; set;}

[C++] public: _property int get_ReceiveBufferSize( ); public: _property void set_ReceiveBufferSize(int);

[VB] Public Property ReceiveBufferSize As Integer

[JScript] public function get ReceiveBufferSize( ): int;public function set ReceiveBufferSize(int);

Description

Gets or sets the size of the receive buffer.

The System.Net.Sockets.TcpClient.ReceiveBufferSize property gets or sets the amount of bytes that can be stored in the receive buffer. After using System.Net.Sockets.TcpClient.GetStream to retrieve the underlying System.Net.Sockets.NetworkStream instance, you will initiate a read by using one of the System.Net.Sockets.NetworkStream read methods. The amount of data that can be stored from this read, will be determined by the System.Net.Sockets.TcpClient.ReceiveBufferSize property.

ReceiveTimeout

ToString

[C#] public int ReceiveTimeout {get; set;}

[C++] public: _property int get_ReceiveTimeout( ); public: _property void set_ReceiveTimeout(int);

[VB] Public Property ReceiveTimeout As Integer

[JScript] public function get ReceiveTimeout( ): int;public function set ReceiveTimeout(int);

Description

Gets or sets the amount of time a System.Net.Sockets.TcpClient object will wait to receive data once a read is initiated.

The System.Net.Sockets.TcpClient.ReceiveTimeout property determines the amount of time a System.Net.Sockets.TcpClient object will wait to receive data after a read is initiated. This time is measured in milliseconds.

SendBufferSize

ToString

[C#] public int SendBufferSize {get; set;}

[C++] public: _property int get_SendBufferSize( ); public: _property void set_SendBufferSize(int);

[VB] Public Property SendBufferSize As Integer

[JScript] public function get SendBufferSize( ): int;public function set SendBufferSize(int);

Description

Gets or sets the size of the send buffer.

The System.Net.Sockets.TcpClient.SendBufferSize property gets or sets the amount of bytes that can be stored in the send buffer. After using System.Net.Sockets.TcpClient.GetStream to retrieve the underlying System.Net.Sockets.NetworkStream instance, you will initiate a send by using one of the System.Net.Sockets.NetworkStream send methods. The amount of data that can be sent for each send, will be determined by the System.Net.Sockets.TcpClient.SendBufferSize property.

SendTimeout

ToString

[C#] public int SendTimeout {get; set;}

[C++] public: _property int get_SendTimeout( ); public: _property void set_SendTimeout(int);

[VB] Public Property SendTimeout As Integer

[JScript] public function get SendTimeout( ): int;public function set SendTimeout(int);

Description

Gets or sets the amount of time a System.Net.Sockets.TcpClient object will wait to receive confirmation you initiate a send.

After you initiate a send, the underlying System.Net.Sockets.Socket instance returns the number of bytes actually sent to the host. The System.Net.Sockets.TcpClient.SendTimeout property determines the amount of time a System.Net.Sockets.TcpClient object will wait before receiving the number of bytes returned by the System.Net.Sockets.Socket class.

Close

[C#] public void Close( );

[C++] public: void Close( );

[VB] Public Sub Close( )

[JScript] public function Close( );

Description

Closes the TCP connection.

Closes the TCP connection.

Connect

[C#] public void Connect(IPEndPoint remoteEP);

[C++] public: void Connect(IPEndPoint* remoteEP);

[VB] Public Sub Connect(ByVal remoteEP As IPEndPoint)

[JScript] public function Connect(remoteEP: IPEndPoint);

Description

Connects the client to a remote TCP host using the specified remote network endpoint.

System.Net.Sockets.TcpClient.Connect(System.String, System.Int32) establishes a TCP connection using the specified network endpoint. Before you call System.Net.Sockets.TcpClient.Connect(System.String,System.Int32), you must first instantiate an System.Net.IPEndPoint object using an IP address and port number. This is your network endpoint. After you have instantiated the System.Net.Sockets.IPEndPoint object, you can then call System.Net.Sockets.TcpClient.Connect(System.String,System.Int32) and use the System.Net.IPEndPoint object as its argument. The IP endpoint to which you intend to connect.

Connect

[C#] public void Connect(IPAddress address, int port);

[C++] public: void Connect(IPAddress* address, int port);

[VB] Public Sub Connect(ByVal address As IPAddress, ByVal port As Integer)

[JScript] public function Connect(address: IPAddress, port: int);

Description

Connects the client to a remote TCP host using the specified IP Address and port number.

System.Net.Sockets.TcpClient.Connect(System.String, System.Int32) establishes a TCP connection using the specified port and IP address. This method establishes a connection by calling the System.Net.Sockets.Socket.Connect(System.Net.EndPoint) method of the underlying System.Net.Sockets.Socket instance. After the connection is established, you can use the underlying System.Net.Sockets.NetworkStream instance to send and receive data. Use System.Net.Sockets.TcpClient.GetStream to obtain the underlying System.Net.Sockets.NetworkStream instance. IP address of the host to which you intend to connect. The port number to which you intend to connect.

Connect

[C#] public void Connect(string hostname, int port);

[C++] public: void Connect(String* hostname, int port);

[VB] Public Sub Connect(ByVal hostname As String, ByVal port As Integer)

[JScript] public function Connect(hostname: String, port: int); Connects the client to a remote TCP host using the specified host name and port number.

Description

Connects the client to the specified port on the specified host.

System.Net.Sockets.TcpClient.Connect(System.String, System.Int32) establishes a TCP connection to the host device using the specified port and hostname specified. This method establishes a connection by calling the System.Net.Sockets.Socket.Connect(System.Net.EndPoint) method of the underlying System.Net.Sockets.Socket instance. After the connection is established, you can use the underlying System.Net.Sockets.NetworkStream instance to send and receive data. Use System.Net.Sockets.TcpClient.GetStream to obtain the underlying System.Net.Sockets.NetworkStream instance. Name of the remote host to which you intend to connect. Port number of the remote host to which you intend to connect.

Dispose

[C#] protected virtual void Dispose(bool disposing);

[C++] protected: virtual void Dispose(bool disposing);

[VB] Overridable Protected Sub Dispose(ByVal disposing As Boolean)

[JScript] protected function Dispose(disposing: Boolean);

Description

Releases the unmanaged resources used by the System.Net.Sockets.TcpClient and optionally releases the managed resources.

This method releases the underlying System.Net.Sockets.NetworkStream and System.Net.Sockets.Socket instances. There are no managed resources that require releasing. If you call System.Net.Sockets.TcpClient.Dispose(System.Boolean) and specify true as its parameter, then be sure to suppress the finalizer by calling the System.Net.Sockets.TcpClient.suppressfinalize method of the garbage collector. If true, releases both managed and unmanaged resources; if false, releases only unmanaged resources.

Finalize

[C#]~TcpClient( );

[C++]~TcpClient( );

[VB] Overrides Protected Sub Finalize( )

[JScript] protected override function Finalize( );

Description

Frees resources used by the System.Net.Sockets.TcpClient class.

The System.Net.Sockets.TcpClient class finalizer calls the System.Net.Sockets.TcpClient.Close method to close the TCP connection, shut down the network stream, and free the socket.

GetStream

[C#] public NetworkStream GetStream( );

[C++] public: NetworkStream* GetStream( );

[VB] Public Function GetStream( ) As NetworkStream

[JScript] public function GetStream( ): NetworkStream;

Description

Returns the stream used to send and receive data.

Return Value: The underlying System.Net.Sockets.NetworkStream instance.

System.Net.Sockets.TcpClient.GetStream returns the underlying System.Net.Sockets.NetworkStream used to send and receive data.

IDisposable.Dispose

[C#] void IDisposable.Dispose( );

[C++] void IDisposable::Dispose( );

[VB] Sub Dispose( ) Implements IDisposable.Dispose
[JScript] function IDisposable.Dispose( );
TcpListener class (System.Net.Sockets)
ToString Description
Listens for connections from TCP network clients.
The System.Net.Sockets.TcpListener class builds upon the System.Net.Sockets.Socket class to provide TCP services at a higher level of abstraction.
TcpListener
Example Syntax:
ToString
[C#] public TcpListener(int port);
[C++] public: TcpListener(int port);
[VB] Public Sub New(ByVal port As Integer)
[JScript] public function TcpListener(port: int);

Description
Initializes a new instance of the System.Net.Sockets.TcpListener that listens on the specified port.
The port parameter specifies the local port number on which you intend to listen. This constructor instantiates the underlying System.Net.Sockets.IPEndPoint using the specified port number. When you call System.Net.Sockets.TcpListener.Start, System.Net.Sockets.TcpListener uses the default network interface to listen for connections on the specified port number. The port on which to listen. If this number is 0, a port number will be selected at random.
TcpListener
Example Syntax:
ToString
[C#] public TcpListener(IPEndPoint localEP);
[C++] public: TcpListener(IPEndPoint* localEP);
[VB] Public Sub New(ByVal localEP As IPEndPoint)
[JScript] public function TcpListener(localEP: IPEndPoint);
Initializes a new instance of the System.Net.Sockets.TcpListener class.

Description
Initializes a new instance of the System.Net.Sockets.TcpListener class with the specified local endpoint.
The localEP parameter specifies the local endpoint. This constructor sets the underlying System.Net.Sockets.IPEndPoint of System.Net.Sockets.TcpListener to the specified local endpoint. If you call System.Net.Sockets.TcpListener.Start, System.Net.Sockets.TcpListener will listen for connections using this endpoint. The localend point to bind the listener connection to.
TcpListener
Example Syntax:
ToString
[C#] public TcpListener(IPAddress localaddr, int port);
[C++] public: TcpListener(IPAddress* localaddr, int port);
[VB] Public Sub New(ByVal localaddr As IPAddress, ByVal port As Integer)
[JScript] public function TcpListener(localaddr: IPAddress, port: int);

Description
Initializes a new instance of the System.Net.Sockets.TcpListener class that listens to the specified IP address and port.
This constructor instantiates the underlying System.Net.Sockets.IPEndPoint of System.Net.Sockets.TcpListener using the specified IP address and port number. If you call System.Net.Sockets.TcpListener.Start, System.Net.Sockets.TcpListener listens for connections using the underlying endpoint. The local IP address to listen to. The port on which to listen. If this is set to 0, a port number will be selected at random.
Active
ToString
[C#] protected bool Active {get;}
[C++] protected: _property bool get_Active( );
[VB] Protected ReadOnly Property Active As Boolean
[JScript] protected function get Active( ): Boolean;

Description
Gets or Sets a value that indicates whether System.Net.Sockets.TcpListener is actively listening for client connections.
LocalEndpoint
ToString
[C#] public EndPoint LocalEndpoint {get;}
[C++] public: _property EndPoint* get_LocalEndpoint( );
[VB] Public ReadOnly Property LocalEndpoint As EndPoint
[JScript] public function get LocalEndPoint( ): EndPoint;

Description
Gets the underlying System.Net.Sockets.EndPoint of System.Net.Sockets.TcpListener.
Server
ToString
[C#] protected Socket Server {get;}
[C++] protected: _property Socket* get_Server( );
[VB] Protected ReadOnly Property Server As Socket
[JScript] protected function get Server( ): Socket;

Description
Used by the class to get or set the underlying network socket.
Use this property to get the underlying System.Net.Sockets.Socket instance of System.Net.Sockets.TcpListener.
AcceptSocket
[C#] public Socket AcceptSocket( );
[C++] public: Socket* AcceptSocket( );
[VB] Public Function AcceptSocket( ) As Socket
[JScript] public function AcceptSocket( ): Socket;

Description
Accepts a pending connection request.

Return Value: A System.Net.Sockets.Socket instance to handle the incoming connection request.
System.Net.Sockets.TcpListener.AcceptSocket returns a System.Net.Sockets.Socket instance used to facilitate communication with the connecting client. This System.Net.Sockets.Socket is initialized with the IP Address and port number of the connecting client. You can use any of the System.Net.Sockets.Socket.Send(System.Byte[ ],System.Int32,System.Net.Sockets.SocketFlags) and System.Net.Sockets.Socket.Receive(System.Byte[ ],System.Int32 System.Net.Sockets.SocketFlags) methods available in the System.Net.Sockets.Socket class to facilitate communication.
AcceptTcpClient
[C#] public TcpCient AcceptTcpClient( );
[C++] public: TcpClient* AcceptTcpClient( );
[VB] Public Function AcceptTcpClient( ) As TcpClient
[JScript] public function AcceptTcpClient( ): TcpClient;

Description
Accepts a pending connection request

Return Value: A System.Net.Sockets.TcpClient instance to handle the incoming connection request.
System.Net.Sockets.TcpListener.AcceptTcpClient returns System.Net.Sockets.TcpClient instance used to facilitate communication with the connecting client. Use System.Net.Sockets.TcpClient.GetStream to obtain the underlying System.Net.Sockets.NetworkStream instance of System.Net.Sockets.TcpClient. You can use this System.Net.Sockets.TcpClient.NetworkStream to facilitate communication with the client.

Finalize

[C#]~TcpListener( );

[C++]~TcpListener( );

[VB] Overrides Protected Sub Finalize( )

[JScript] protected override function Finalize( );

Description

Frees resources used by the System.Net.Sockets.TcpClient class.

The finalizer for the System.Net.Sockets.TcpListener class calls the System.Net.Sockets.TcpListener.Stop method to free the underlying System.Net.Sockets.Socket.

Pending

[C#] public bool Pending( );

[C++] public: bool Pending( );

[VB] Public Function Pending( ) As Boolean

[JScript] public function Pending( ): Boolean;

Description

Determine if there are pending connection requests.

Return Value: true if connections are pending; otherwise, false.

Before System.Net.Sockets.TcpListener can poll for client connection attempts, it must first initialize its underlying System.Net.Sockets.Socket instance to listen for incoming connection requests. The way you inititailize the underlying System.Net.Sockets.Socket is by calling the System.Net.Sockets.TcpListener.Start method.

Start

[C#] public void Start( );

[C++] public: void Start( );

[VB] Public Sub Start( )

[JScript] public function Start( );

Description

Starts listening to network requests.

System.Net.Sockets.TcpListener.Start initializes the underlying System.Net.Sockets.Socket instance. After this initialization, System.Net.Sockets.Start does the following: Binds the underlying System.Net.Sockets.Socket instance using the underlying System.Net.Sockets.IPEndPoint instance Begins listening for client connections by calling the System.Net.Sockets.Socket.Listen(System.Int32) method of the underlying System.Net.Sockets.Socket instance.

Stop

[C#] public void Stop( );

[C++] public: void Stop( );

[VB] Public Sub Stop( )

[JScript] public function Stop( );

Description

Closes the network connection.

Close closes the network connection.

UdpClient class (System.Net.Sockets)

ToString

Description

Provides UDP (User Datagram Protocol) network services.

The System.Net.Sockets.UdpClient class builds upon the System.Net.Sockets.Socket class to provide UDP services at a higher level of abstraction. Because UDP is a connectionless transport protocol, you do not need to establish a remote host connection prior to sending and receiving data. You do however, have the option to establish a System.Net.Sockets.UdpClient connection with a remote host using one of the following ways.

UdpClient

Example Syntax:

ToString

[C#] public UdpClient( );

[C++] public: UdpClient( );

[VB] Public Sub New( )

[JScript] public function UdpClient( ); Initializes a new instance of the System.Net.Sockets.UdpClient class.

Description

Initializes a new instance of the System.Net.Sockets.UdpClient class.

The default constructor sets the IP address to System.Net.IPAddress.Any and the port number to 0.

UdpClient

Example Syntax:

ToString

[C#] public UdpClient(int port);

[C++] public: UdpClient(int port);

[VB] Public Sub New(ByVal port As Integer)

[JScript] public function UdpClient(port: int);

Description

Initializes a new instance of the System.Net.Sockets.UdpClient class that communicates on a specified port.

The port parameter specifies the local port number on which you intend to communicate. This constructor instantiates an underlying System.Net.Sockets.Socket and binds that System.Net.Sockets.Socket using the provided port number. This constructor configures the underlying System.Net.Sockets.Socket to use the default local network interface for communication. The local port number from which you intend to communicate.

UdpClient

Example Syntax:

ToString

[C#] public UdpClient(IPEndPoint localEP);

[C++] public: UdpClient(IPEndPoint* localEP);

[VB] Public Sub New(ByVal localEP As IPEndPoint)

[JScript] public function UdpClient(localEP: IPEndPoint);

Description

Initializes a new instance of the System.Net.Sockets.UdpClient class that communicates on a specified local endpoint.

The localEP parameter specifies the local end point. This constructor instantiates a socket and binds that socket to the local end point provided. The local endpoint to which you bind the Udp connection.

UdpClient

Example Syntax:

ToString

[C#] public UdpClient(string hostname, int port);

[C++] public: UdpClient(String* hostname, int port);

[VB] Public Sub New(ByVal hostname As String, ByVal port As Integer)

[JScript] public function UdpClient(hostname: String, port: int);

Description

Initializes a new instance of the System.Net.Sockets.UdpClient class and connects to a specified remote host on a specified port.

This constructor accepts two parameters. The remote host name to which you intend to connect The remote port number to which you intend to connect Active ToString

[C#] protected bool Active {get; set;}

[C++] protected: _property bool get_Active( ); protected: _property void set_Active(bool);

[VB] Protected Property Active As Boolean

[JScript] protected function get Active( ): Boolean;protected function set Active(Boolean);

Description

Gets or sets a value indicating whether a connection to a remote host has been made.

Client

ToString

[C#] protected Socket Client {get; set;}

[C++] protected: _property Socket* get_Client( ); protected: _property void set_Client(Socket*);

[VB] Protected Property Client As Socket

[JScript] protected function get Client( ): Socket;protected function set Client(Socket);

Description

Gets or sets the underlying network socket.

System.Net.Sockets.UdpClient creates a System.Net.Sockets.Socket instance to handle the actual sending and receiving of data over a network.

Close

[C#] public void Close( );

[C++] public: _void Close( );

[VB] Public Sub Close( )

[JScript] public function Close( );

Description

Closes the UDP connection.

System.Net.Sockets.TcpClient.Close disposes the UDP connection.

Connect

[C#] public void Connect(IPEndPoint endPoint);

[C++] public: void Connect(IPEndPoint* endPoint);

[VB] Public Sub Connect(ByVal endPoint As IPEndPoint)

[JScript] public function Connect(endPoint: IPEndPoint);

Description

Connects the client to a remote UDP host using the specified remote network endpoint.

System.Net.Sockets.UdpClient.Connect(System.String, System.Int32) establishes a UDP connection to the host using the specified System.Net.IPEndPoint. The network endpoint to which you intend to connect.

Connect

[C#] public void Connect(IPAddress addr, int port);

[C++] public: void Connect(IPAddress* addr, int port);

[VB] Public Sub Connect(ByVal addr As IPAddress, ByVal port As Integer)

[JScript] public function Connect(addr: IPAddress, port: int);

Description

Connects the client to a remote UDP host using the specified IP Address and port number.

System.Net.Sockets.TcpClient.Connect(System.String, System.Int32) establishes a UDP connection using the port and IP address specified. This method establishes a connection by calling the System.Net.Sockets.Socket.Connect(System.Net.EndPoint) method of the underlying System.Net.Sockets.Socket instance. After a connection is established, you can use the System.Net.Sockets.UdpClient.Send(System.Byte[ ],System.Int32,System.Net.I PEndPoint) and System.Net.Sockets.UdpClient.Receive(System.Net.IPEndPoint@) methods to communicate with the remote host. IP address of the host to which you intend to connect. The port number to which you intend to connect.

Connect

[C#] public void Connect(string hostname, int port);

[C++] public: void Connect(String* hostname, int port);

[VB] Public Sub Connect(ByVal hostname As String, ByVal port As Integer)

[JScript] public function Connect(hostname: String, port: int); Establishes a connection to a remote host.

Description

Establishes a connection to the specified port on the specified remote host.

System.Net.Sockets.TcpClient.Connect(System.String, System.Int32) establishes a UDP connection to the host machine using the specified port and hostname. This method establishes a connection by calling the System.Net.Sockets.Socket.Connect(System.Net.EndPoint) method of the underlying System.Net.Sockets.Socket instance. Once a connection is established, you can use the System.Net.Sockets.UdpClient.Send(System.Byte[ ],System.Int32,System.Net.IPEndPoint) and System.Net.Sockets.UdpClient.Receive(System.Net.IPEndPoint@) methods to communicate with the remote host. Name of the remote host to which you intend to connect. Port number on the remote host to which you intend to connect.

DropMulticastGroup

[C#] public void DropMulticastGroup(IPAddress multicastAddr);

[C++] public: void DropMulticastGroup(IPAddress* multicastaddr);

[VB] Public Sub DropMulticastGroup(ByVal multicastAddr As IPAddress)

[JScript] public function DropMulticastGroup(multicastAddr: IPAddress);

Description

Leaves a multicast group.

System.Net.Sockets.UdpClient.DropMulticastGroup (System.Net.IPAddress) disassociates a System.Net.Sockets.UdpClient instance with a multicast group. In order to remove the System.Net.Sockets.UdpClient instance from a multicast group, you must call System.Net.Sockets.UdpClient.DropMulticastGroup(System.Net.IPAddress) using the System.Net.Sockets.IPAddress of the group from which you intend to withdrawal. The System.Net.IPAddressof the multicast group to leave.

JoinMulticastGroup

[C#] public void JoinMulticastGroup(IPAddress multicastAddr);

[C++] public: void JoinMulticastGroup(IPAddress* multicastaddr);

[VB] Public Sub JoinMulticastGroup(ByVal multicastAddr As IPAddress)

[JScript] public function JoinMulticastGroup(multicastAddr: IPAddress); Adds a System.Net.Sockets.UdpClient to a multicast group.

Description

Adds a System.Net.Sockets.UdpClient to a multicast group.

System.Net.Sockets.UdpClient.JoinMulticastGroup(System.Net.IPAddress) associates the System.Net.Sockets.UdpClient instance with a multicast group. In order to receive data from this group, you must call System.Net.Sockets.UdpClient.JoinMulticastGroup(System.Net.IPAddress) using the System.Net.Sockets.IPAddress of the group to which you intend to join. The multicast System.Net.Sockets.IPAddress of the group you wish to join.

JoinMulticastGroup

[C#] public void JoinMulticastGroup(IPAddress multicastAddr, int timeToLive);

[C++] public: void JoinMulticastGroup(IPAddress* multicastAddr, int timeToLive);

[VB] Public Sub JoinMulticastGroup(ByVal multicastAddr As IPAddress, ByVal timeToLive As Integer)

[JScript] public function JoinMulticastGroup(multicastAddr: IPAddress, timeToLive: int);

Description

Adds a System.Net.Sockets.UdpClient to a multicast group with the specified Time to Live (TTL).

System.Net.Sockets.UdpClient.JoinMulticastGroup(System.Net.IPAddress) associates the System.Net.Sockets.UdpClient instance with a multicast group. This overload requires two parameters. The System.Net.IPAddress of the multicast group to join. The Time to Live (TTL)

Receive

[C#] public byte[ ] Receive(ref IPEndPoint remoteEP);

[C++] public: unsigned char Receive(IPEndPoint** remoteEP) _gc[ ];

[VB] Public Function Receive(ByRef remoteEP As IPEndPoint) As Byte( )

[JScript] public function Receive(remoteEP: IPEndPoint): Byte[ ];

Description

Returns a UDP datagram that was sent by a remote host.

Return Value: An array of 8-bit unsigned integers that contains the datagram data. An System.Net.IPEndPoint representing the remote host from which the data was sent.

Send

[C#] public int Send(byte[ ] dgram, int bytes);

[C++] public: int Send(unsigned char dgram_gc[ ], int bytes);

[VB] Public Function Send(ByVal dgram( ) As Byte, ByVal bytes As Integer) As Integer

[JScript] public function Send(dgram: Byte[ ], bytes: int): int;

Description

Sends a UDP datagram to a remote host.

Return Value: The number of bytes sent.

System.Net.Sockets.UdpClient.Send(System.Byte[ ],System.Int32,System. Net.IPEndPoint) sends the provided datagram to a remote host. Before using System.Net.Sockets.UdpClient.Send(System.Byte[ ],System.Int32, System.Net.IPEndPoint), you must first use System.Net.Sockets.UdpClient.Connect(System.String,System.Int32) to establish a remote host connection. The UDP datagram that you intend to send. The number of bytes in the datagram.

Send

[C#] public int Send(byte[ ] dgram, int bytes, IPEndPoint endPoint);

[C++] public: int Send(unsigned char dgram_gc[ ], int bytes, IPEndPoint* endPoint);

[VB] Public Function Send(ByVal dgram( ) As Byte, ByVal bytes As Integer, ByVal endPoint As IPEndPoint) As Integer

[JScript] public function Send(dgram: Byte[ ], bytes: int, endPoint: IPEndPoint): int; Sends a UDP datagram to a remote host.

Description

Sends a UDP datagram to the host that is at the remote endpoint.

Return Value: The number of bytes sent.

The System.Net.Sockets.UdpChient.Send(System.Byte[ ], System.Int32,System.Net.IPEndPoint) method establishes a UDP connection to the remote host using the specified System.Net.IPEndPoint, and then sends the datagram. The UDP datagram to send. The number of bytes in the datagram. An System.Net.IPEndPoint that represents the host and port to which to send the datagram.

Send

[C#] public int Send(byte[ ] dgram, int bytes, string hostname, int port);

[C++] public: int Send(unsigned char dgram_gc[ ], int bytes, String* hostname, int port);

[VB] Public Function Send(ByVal dgram( ) As Byte, ByVal bytes As Integer, ByVal hostname As String, ByVal port As Integer) As Integer

[JScript] public function Send(dgram: Byte[ ], bytes: int, hostname: String, port: int): int;

Description

Sends a UDP datagram to a specified port on a specified remote host.

Return Value: The number of bytes sent.

System.Net.Sockets.UdpClient.Send(System.Byte[ ],System.Int32,System.Net.IPEndPoint) establishes a UDP connection to the specified host and port and then sends the datagram. The data is sent by calling the System.Net.Sockets.Socket.SendTo(System.Byte[ ],System.Int32,System.Int32,System.Net.Sockets.SocketFlags,System.Net.EndPoint) method of the underlying System.Net.Sockets.Socket instance. The UDP datagram to send.

System.Security Namespace

The System.Security namespace provides the underlying structure of the security system, including base classes for permissions. Cryptographic classes in the namespace are integrated with streams, allowing the classes to be used with file or network I/O seamlessly. Additionally, security is made available due to isolated storage that allows code running with restricted permissions to use its own private file system. Furthermore, a role-based user identity programming model is unified across different underlying authentication technologies, enabling applications to write to a single API that works for all the authentication technologies. As part of this role-based user identity programming model, an IIdentity interface defines the basic functionality of an identity object (which represents the user on whose behalf the code is running), and an IPrincipal interface defines the basic functionality of a principal object (which represents the security context of the user on whose behalf the code is running, including that user's identity (IIdentity) and any roles to which the user belongs).

The System.Security namespace includes a System.Security.Cryptography namespace, a System.Security.Cryptography.X509Certificates namespace, a System.Security.Cryptography.Xml namespace, a System.Security.Permissions namespace, a System.Security.Policy namespace, and a System.Security.Principal namespace.

The System.Security.Cryptography namespace provides cryptographic services, including secure encoding and decoding of data, as well as many other operations, such as hashing, random number generation, and message authentication. The System.Security.Cryptography.X509Certificates namespace contains the common language runtime implementation of the Authenticode X.509 v.3 certificate. This certificate is signed with a private key, uniquely and positively identifying the holder of the certificate. The System.Security.Cryptography.Xml namespace contains an XML model for use within the .net framework security system, allowing XML objects to be signed Is with a digital signature.

The System.Security.Permissions namespace defines classes that control access to operations and resources based on policy. The System.Security.Policy namespace contains three types of classes: code groups, membership conditions, and evidence. These three types of classes are used to create the rules applied by the common language runtime security policy system. Evidence classes are the input to security policy and membership conditions are the switches; together these create policy statements and determine the granted permission set. Policy levels and code groups are the structure of the policy hierarchy. Code groups are the encapsulation of a rule and are arranged hierarchically in a policy level. The System.Security.Principal namespace defines a principal object that represents the security context under which code is running.

System.Management Namespace

The System.Management namespace includes numerous objects and methods that enable rich management through late binding to WMI providers. Various management functionality and capacity is made available, including standard querying on management data, events-publication/subscription, management data retrieval, method invocation (system reboots, process kill, etc.), system/application configuration, discoverability through common schema, support for management relationship hierarchies, etc.

Numerous objects representing management instrumentation are accessible through the System.Management namespace (which includes the System.Management.Instrumentation namespace), from configuration to events that can be consumed by .NET clients to manage devices. The System.Management namespace exposes multiple classes (e.g., ManagementObject( ) and ManagementObjectSearcher( ), etc.) that allow client devices to query and enumerate through management classes and invoke methods, write configurations, subscribe for events, etc. Examples of this functionality include: SNMP management (traps, etc.); WDM management (windows drivers); MSI management (windows installer); DS management (directory services); Security settings management; Network Adapters/bindings management; Computer System management; Memory, CPU, Processor, and Disks management; File and directory management; Application management; System Device management; and so forth.

System.ServiceProcess Namespace

As discussed above, the System.ServiceProcess namespace contains classes that allow developers to install and run services. These allow services (e.g., Windows NT® operating system services) to be written, installed, and run relatively easily. These also allow custom installation actions for services to be packaged into assemblies, easing the installation process.

System.Runtime.Serialization Namespace

The System.Runtime.Serialization namespace contains classes that can be used for serializing and deserializing objects in a relatively simple manner. Serialization is the process of converting an object or a graph of objects into a linear sequence of bytes for either storage or transmission to another location. Deserialization is the process of taking in stored information and recreating objects from it. An ISerializable interface provides a way for classes to control their own serialization behavior. The System.Runtime.Serialization namespace includes three additional namespaces: the System.Runtime.Serialization.Formatters namespace (which contains common enumerations, interfaces and classes that are used by serialization formatters), the System.Runtime.Serialization.Formatters.Binary namespace (which contains a BinaryFormatter class that can be used to serialize and deserialize objects in binary format), and the System.Runtime.Serialization.Formatters.Soap namespace (which contains a SoapFormatter class that can be used to serialize and deserialize objects in the SOAP format).

System.Messaging Namespace

The System.Messaging namespace provides classes that allow connecting to message queues on the network, sending messages to queues, receiving messages from queues, and peeking at (reading without removing) messages from queues. A MessageQueue class supports both synchronous and asynchronous retrieval of messages from a queue. Peek and Receive methods on the MessageQueue class interrupt processing until a message is available in the queue (or until a specified timeout expires), while BeginPeek and BeginReceive methods on the MessageQueue class allow processing to continue and use event notification or callbacks to indicate that a message exists or has arrived in the queue. MessageQueue use an internal connection cache (or pool), allowing repeated instantiation of MessageQueue to bind to the same queue very quickly. Additionally, any object can be sent or received as a message, and the object on the server and client can be of a different type (as long as the schemas are the same).

The MessageQueue class and Message class are the primary classes that provide the functionality for message queuing. MessageQueue provides a means for getting and setting queue properties and default message properties, as well as initiating message send, peek, or receive operations. MessageQueue also provides support for transactional message processing. The Message class is used to peek or receive messages from a queue, or to have fine control over message properties when sending a message to a queue.

System.Diagnostics Namespace

As discussed above, the System.Diagnostics namespace contains classes that are used to debug applications and to trace code execution, as well as start system processes, read and write to event logs, and monitor system performance. These classes allow, for example, easy publishing of performance counter data and writing to event logs (e.g., without having to generate separate dlls in order to do so). A Trace class contains a set of methods and properties that help a developer trace the execution of code. A Debug class contains a set of methods and properties that help a developer debug code. A Process class enables access to local and remote processes, allowing a developer to start and stop local system processes. An EventLog class enables interaction with Windows® operating systems event logs, which record information about important software or hardware events. A PerformanceCounter class represents a Windows NT® operating system performance counter component that can be used for both reading existing predefined or custom counters and publishing (writing) performance data to custom counters.

Exemplary Computing System and Environment

Figure 4:
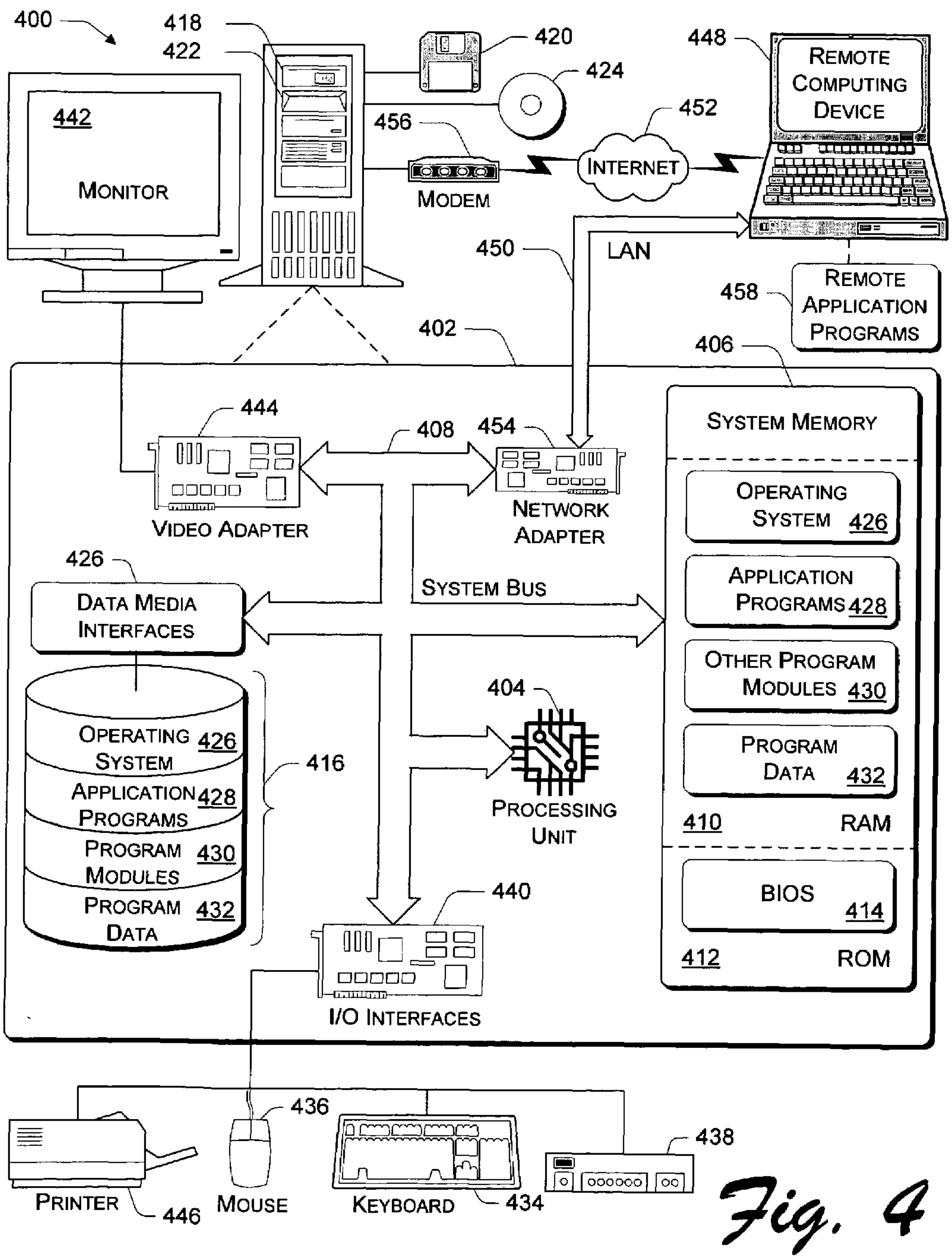
FIG. 4 is a block diagram of an exemplary computer that may execute all or part of the software architecture.

FIG. 4 illustrates an example of a suitable computing environment 400 within which the programming framework 132 may be implemented (either fully or partially). The computing environment 400 may be utilized in the computer and network architectures described herein.

The exemplary computing environment 400 is only one example of a computing environment and is not intended to suggest any limitation as to the scope of use or functionality of the computer and network architectures. Neither should the computing environment 400 be interpreted as having any dependency or requirement relating to any one or combination of components illustrated in the exemplary computing environment 400.

The framework 132 may be implemented with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as cellular phones, personal digital assistants, handheld computers, or other communication/computing devices.

The framework 132 may be described in the general context of computer-executable instructions, such as program modules, being executed by one or more computers or other devices. Generally, program modules include routines, programs, objects, components, data structures, etc. that perform particular tasks or implement particular abstract data types. The framework 132 may also be practiced in distributed computing environments where tasks are performed by remote processing devices that are linked through a communications network. In a distributed computing environment, program modules may be located in both local and remote computer storage media including memory storage devices.

The computing environment 400 includes a general-purpose computing device in the form of a computer 402. The components of computer 402 can include, by are not limited to, one or more processors or processing units 404, a system memory 406, and a system bus 408 that couples various system components including the processor 404 to the system memory 406.

The system bus 408 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of the operating system 426, one or more application programs 428, other program modules 430, and program data 432 (or some combination thereof) may include elements of the programming framework 132.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and so on. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

An implementation of the framework 132, and particularly, the API 142 or calls made to the API 142, may be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Alternatively, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A computer-implemented method having instructions executable by a processor, comprising:

receiving one or more application program interface (API) calls from one or more remote devices over a network to an application program interface (API), wherein the API includes a set of base classes and types that are used in substantially all applications executing on the one or more remote devices, wherein the set of base classes and types comprises:

an AsyncCallback delegate supplied to an application, wherein the AsyncCallback delegate references a callback method to be called when a corresponding asynchronous operation is completed; and an IAsyncResult interface that enables a determination of a status of an asynchronous operation, wherein the IAsyncResult interface includes:

an AsyncState property that returns an object that was provided as a last parameter as part of a Begin call corresponding to the asynchronous operation;

an AsyncWaitHandle property that returns a WaitHandle that can be used to allow the application to wait for a call to be completed without needing to poll;

a CompletedSynchronously property that is set to true if the Begin call corresponding to the asynchronous operation completed synchronously; and an IsCompleted property that is set to true after processing if the asynchronous operation is complete; and performing a function requested in each of the one or more calls.

2. A method as recited in claim 1, wherein the application program interface further comprises a collections namespace that includes a plurality of classes and interfaces for in-memory data storage and manipulation.

3. A method as recited in claim 1, wherein the application program interface further comprises a net namespace that includes a plurality of classes that enables use of Internet resources without details of one or more protocols used to access the Internet resources.

4. A software architecture for a distributed computing system, comprising:

a memory;

a processor coupled to the memory;

an application executable by the processor to receive one or more application program interface (API) calls from one or more remote devices over a network to an application program interface (API), wherein the API includes a set of base classes and types that are used in substantially all applications executing on the one or more remote devices, wherein the set of base classes and types comprises:

an AsyncCallback delegate supplied to an application executed on a remote device, wherein the AsyncCallback delegate references a callback method to be called when a corresponding asynchronous operation is completed; and an IAsyncResult interface that enables a determination of a status of an asynchronous operation, wherein the IAsyncResult interface includes:

an AsyncState property that returns an object that was provided as a last parameter as part of a Begin call corresponding to the asynchronous operation;

an AsyncWaitHandle property that returns a WaitHandle that can be used to allow the application to wait for a call to be completed without needing to poll;

a CompletedSynchronously property that is set to true if the Begin call corresponding to the asynchronous operation completed synchronously; and an IsCompleted property that is set to true after processing if the asynchronous operation is complete; and the application configured to perform a function requested in each of the one or more calls.

5. A software architecture as recited in claim 4, wherein the API further comprises a collections namespace that includes a plurality of classes and interfaces for in-memory data storage and manipulation.

6. A software architecture as recited in claim 4, wherein the API further comprises a net namespace that includes a plurality of classes that enables use of Internet resources without details of one or more protocols used to access the Internet resources.

7. A computer-readable storage media containing instructions for an application in a software architecture in a distributed computing system, the instructions being executable by a computer to perform actions comprising:

receiving one or more application program interface (API) calls from one or more remote devices over a network to an application program interface (API), wherein the API includes a set of base classes and types that are used in substantially all applications executing on the one or more remote devices, wherein the set of base classes and types comprises:

an AsyncCallback delegate supplied to an application executing on a remote device, wherein the AsyncCallback delegate references a callback method to be called when a corresponding asynchronous operation is completed; and an IAsyncResult interface that enables a determination of a status of an asynchronous operation, wherein the IAsyncResult interface includes:

an AsyncState property that returns an object that was provided as a last parameter as part of a Begin call corresponding to the asynchronous operation;

an AsyncWaitHandle property that returns a WaitHandle that can be used to allow the application to wait for a call to be completed without needing to poll;

a CompletedSynchronously property that is set to true if the Begin call corresponding to the asynchronous operation completed synchronously; and an IsCompleted property that is set to true after processing if the asynchronous operation is complete; and performing a function requested in each of the one or more calls.

8. A computer readable storage media as recited in claim 7, wherein the API further comprises a collections namespace that includes a plurality of classes and interfaces for in-memory data storage and manipulation.

9. A computer readable storage media as recited in claim 7, wherein the API further comprises a net namespace that includes a plurality of classes that enables use of Internet resources without details of one or more protocols used to access the Internet resources.

* * * * *